US007551612B2

(12) United States Patent
Kobayashi et al.

(10) Patent No.: US 7,551,612 B2

(45) Date of Patent: Jun. 23, 2009

(54) INTRA-STATION CONTROL SYSTEM FOR CONNECTIONLESS COMMUNICATIONS SYSTEM

(75) Inventors: Yasusi Kobayashi, Kawasaki (JP); Yoshihiro Watanabe, Kawasaki (JP); Hiroshi Nishida, Kawasaki (JP); Masami Murayama, Kawasaki (JP); Naoyuki Izawa, Kawasaki (JP); Yasuhiro Aso, Kawasaki (JP); Yoshihiro Uchida, Kawasaki (JP); Hiromi Yamanaka, Kawasaki (JP); Jin Abe, Kawasaki (JP); Yoshihisa Tsuruta, Kawasaki (JP); Yoshiharu Kato, Kawasaki (JP); Satoshi Kakuma, Kawasaki (JP); Shiro Uriu, Kawasaki (JP); Noriko Samejima, Kawasaki (JP); Eiji Ishioka, Kawasaki (JP); Shigeru

(Continued)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/277,213

(22) Filed: Mar. 26, 1999

(65) Prior Publication Data

US 2003/0179712 A1 Sep. 25, 2003

Related U.S. Application Data

(62) Division of application No. 08/518,110, filed on Aug. 21, 1995, now Pat. No. 6,333,932.

(30) Foreign Application Priority Data

Aug. 22, 1994 (JP) .................................. 6-255120

(51) Int. Cl.
*H04L 12/66* (2006.01)

(52) U.S. Cl. .................... 370/368; 370/386; 370/395.1; 370/465; 709/227

(58) Field of Classification Search ................. 370/241, 370/242, 245, 249, 352, 389, 396, 397, 419, 370/420, 465, 467, 469, 524, 250, 445, 462, 370/401, 402, 223, 248, 437, 410
See application file for complete search history.

(56) References Cited

U.S. PATENT DOCUMENTS 4,543,654 A * 9/1985 Jones ......................... 370/445

(Continued)

FOREIGN PATENT DOCUMENTS

EP 347 754 12/1989

(Continued)

OTHER PUBLICATIONS

Yokotani T et al. "Bandwidth Allocation for Connectionless Service in Private Networks Based on ATM Technology" IEICE Transactioms on Communications, vol. E77-B, No. 3: Mar. 1, 1994.

(Continued)

*Primary Examiner*—Chi H. Pham
*Assistant Examiner*—Shick Hom
(74) *Attorney, Agent, or Firm*—Katten Muchin Rosenman LLP

(57) ABSTRACT

A switch station including an ATM switch; a memory storing control data for operations of the switch station; an intra-station device, accommodating a subscriber line, performing communication operation on subscriber ATM cell; a control processor generating control information in link access protocol (LAP) format; and an interface unit converting LAP control information into ATM cell to the intra-station device through the ATM switch, wherein the control information is communicated according to LAP, the intra-station device receives the control information and transmits a direct memory access request to obtain control data stored in the memory, the interface unit obtains and converts the data format of the control data into ATM cell to transmit to the intra-station device through the switch, and the intra-station device performs the communication operation on the subscriber ATM cell based on the control data received through the switch.

2 Claims, 914 Drawing Sheets

(75) Inventors: Sekine, Kawasaki (JP); Yoshiyuki Karakawa, Fukuoka (JP); Atsushi Kagawa, Yokohama (JP); Mikio Nakayama, Kawasaki (JP); Miyuki Kawataka, Kawasaki (JP); Satoshi Esaka, Fukuoka (JP); Nobuyuki Tsutsui, Kawasaki (JP); Fumio Hirase, Kawasaki (JP); Atsuko Suzuki, Kawasaki (JP); Shouji Kohira, Kawasaki (JP); Kenichi Okabe, Kawasaki (JP); Takashi Hatano, Kawasaki (JP); Yasuhiro Nishikawa, Yokohama (JP); Jun Itoh, Yokohama (JP); Shinichi Araya, Yokohama (JP)

U.S. PATENT DOCUMENTS 4,587,651 A * 5/1986 Nelson et al. ............... 370/437
4,590,467 A * 5/1986 Lare .......................... 370/462
4,679,189 A * 7/1987 Olson et al. ................. 370/396
4,718,060 A * 1/1988 Oguchi et al. ............... 370/389
4,771,418 A * 9/1988 Narasimhan et al. ........ 370/465
4,782,485 A * 11/1988 Gollub ....................... 370/118
4,862,452 A * 8/1989 Milton et al. ................. 370/62
4,993,015 A 2/1991 Fite, Jr.
5,170,394 A 12/1992 Biber et al.
5,249,178 A * 9/1993 Kurano et al. ............... 370/392
5,251,204 A 10/1993 Izawa et al.
5,274,641 A 12/1993 Shobatake et al.
5,278,977 A 1/1994 Spencer et al.
5,282,203 A * 1/1994 Oouchi ....................... 370/232
5,287,199 A * 2/1994 Zoccolillo ................... 358/402
5,293,587 A * 3/1994 Deb et al. ................... 395/162
5,303,236 A * 4/1994 Kunimoto et al. ........... 370/398
5,331,637 A 7/1994 Francis et al.
5,339,318 A 8/1994 Tanaka et al.
5,341,376 A * 8/1994 Yamashita .................. 370/466
5,359,600 A * 10/1994 Ueda et al. .................. 370/399
5,364,270 A * 11/1994 Aoyama et al. ............... 435/55
5,375,117 A * 12/1994 Morita et al. ............... 370/420
5,416,842 A 5/1995 Aziz
5,422,876 A * 6/1995 Turudic ...................... 370/249
5,438,528 A * 8/1995 Emerson et al. ............. 370/241
5,459,723 A * 10/1995 Thor ........................... 370/60
5,467,350 A * 11/1995 Price et al. .................. 370/467
5,490,141 A * 2/1996 Lai et al. .................... 370/397
5,490,252 A * 2/1996 Macera et al. .............. 370/402
5,506,847 A * 4/1996 Shobatake .................. 370/338
5,530,434 A * 6/1996 Kanda ................... 340/825.04
5,550,978 A * 8/1996 Takahashi et al. ........... 709/236
5,568,479 A * 10/1996 Watanabe et al. ........... 370/399
5,570,348 A 10/1996 Holden
5,600,652 A 2/1997 Kreamer et al.
5,602,826 A 2/1997 Yoshimura et al.
5,638,360 A 6/1997 Sugawara
5,638,364 A 6/1997 Sugita
5,774,637 A * 6/1998 Haber et al. ................ 395/114
5,854,816 A * 12/1998 Kim et al. ................... 370/249
6,633,547 B1 * 10/2003 Akatsu et al. ............... 370/255

FOREIGN PATENT DOCUMENTS

EP 477 553 4/1992
EP 479 478 4/1992
EP 482 551 4/1992
EP 498 967 8/1992
EP 524 316 1/1993
EP 552 385 7/1993
EP 570 630 11/1993
FR 2 701 618 8/1994
JP 02027843 * 1/1990
JP 04-119042 4/1992
JP 04-156026 5/1992
JP 04-157838 5/1992
JP 05-122239 5/1993
WO 92 17014 10/1992

OTHER PUBLICATIONS

Giddy D et al. "An Experimental ATM Network Featuring De-Coupled Modular Control" Communication for Global Users, vol. 1; Dec. 6, 1992.

Sallbeerg K et al. "ATM Traffic Management at the Initial Deployment of B-ISDN"- vol. 71, No. 4 Ericsson Review; Jan. 1, 1994.

Japanese Office Action dated Sep. 28, 2004 with partial translation.

* cited by examiner

BRLC : Broadband Remote Line Concentrator
BRSU : Broadband Remote Switching Unit
CPE : Customer Premises Equipment
HOST : Broadband Host Switch ASSW ATM Subscriber Switch
AISW ATM Interconnection Switch
BRLC Broadband Remote Line Concentrator B-NT : Broadband Network Termination
SMDS-MH : SMDS Message Handler
SMDS-TA : SMDS Terminal Adapter
SMDS-TE : SMDS Terminal Equipment CP: Central Processor
CPR: Call Processor
DK: Disk
FR: Frame Relay FIFSH : Fiber Interface Shelf ADSISH : ATM DS1 Shelf SIFSH : Subscriber Interface Shelf ASSWSH : ATM Switch Shelf SBMESH : Subscriber Message Handler Shelf GWMESH : Gateway Message Handler Shelf BSGCSH : Broadband Signaling Controller Shelf ASSWSH : ATM
BCPR : Broadband Call Processor
BSGC : Broadband Signaling Controller
BSGCCOM : BSGC Common Card
BSGCSH : BSGC Shelf
CHW : Chain Highway
INFA : Interface Type A
INFT : Interface Type T
SHW : Subscriber Highway

——— = 622

– – – – =

| | |
|---|---|
| SIFSH | Subscriber Interface Shelf |
| ADS1SH | ATM DS1 Shelf |
| FIFSH | Fiber Interface Shelf |
| RMXSH | Remote Multiplex Shelf |

BCPR : Broadband Call Processor

BMPR : Broadband Main Processor

BSGC : Broadband Signaling Controller

CPU : Central Processing Unit

ETC : Ethernet Controller

MM : Main Memory

INF : Interface

SMDS-MH : SMDS Massage Handler

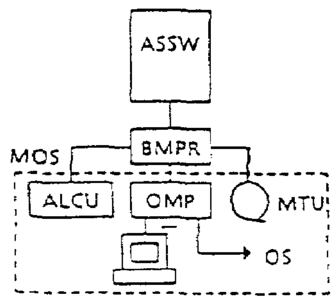

<Small Host: Broadband only>

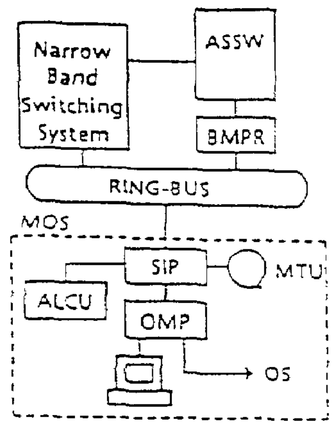

<Small Host with Narrow band>

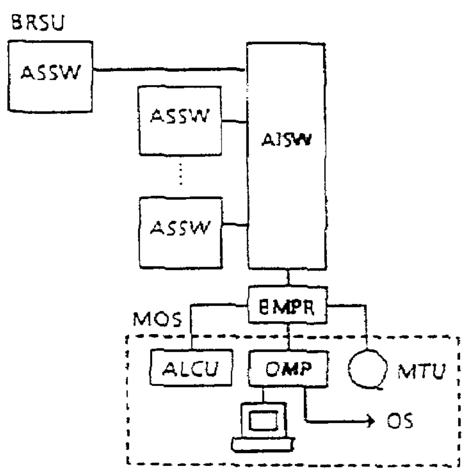

<Large Host: Broadband only>

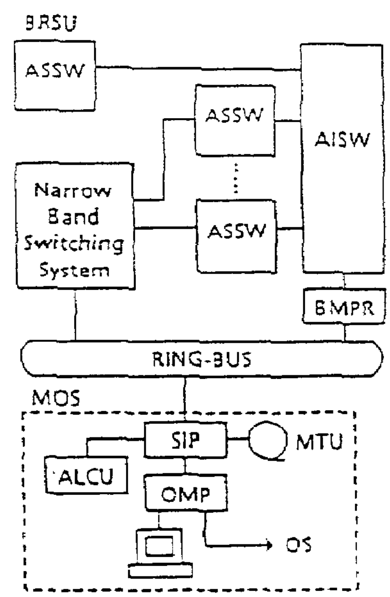

<Large Host with Narrow band>

Legend

ISW : ATM Interconnection Switch
ALCU : Alarm Control Unit
ASSW : ATM Subscriber Switch
BMPR : Broadband Main Processor
BRSU : Broadband Remote Switching Unit
MTU : Magnetic Tape Unit
MOS : Maintenance and Operation Subsystem
SIP : System Integration Processor
OMP : Operation and Maintenance Processor
OS : Operations System

FIG. 25

BMPR : Broadband Main Processor

OS : Operations Support System

SIP : Systems Integration Processor

BCPR : Broadband Call Processor
BSGC : Broadband Signaling Controller
SMDS-MH : SMDS Message Handler BCPR : Broadband Call Processor
GWMH : Gateway Message Handler
SBMH : Subscriber Message Handler AAL : ATM Adaptation Layer
ATM : ATM Layer
CPE : Customer Premises Equipment
SMDS-MH : SMDS Message Handler
SIP : SMDS Interface Protocol BOM : Beginning of Message
COM : Continuation of Message
EOM : End of Message
SAR : Segmention and Re-assembly

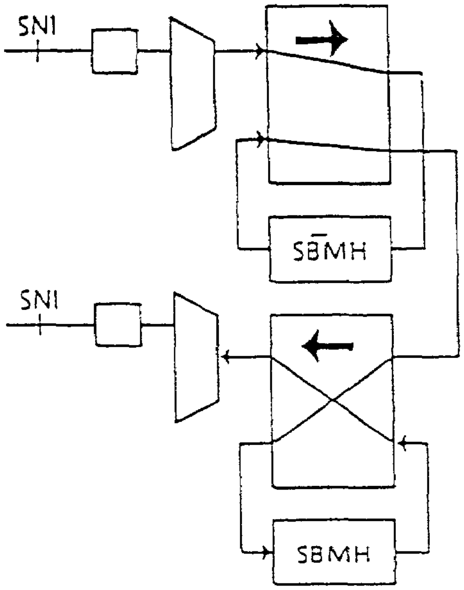
Intra-office connection
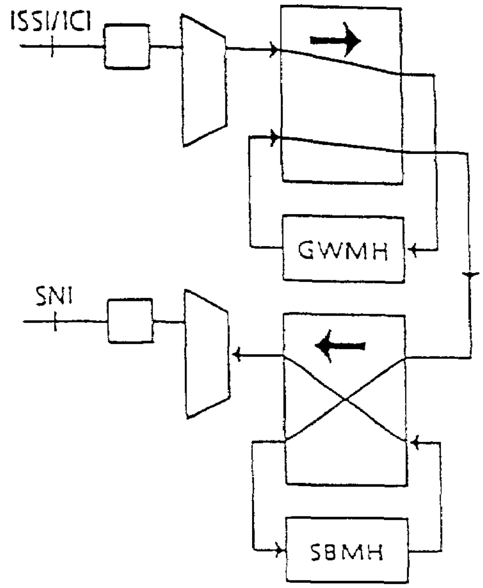
Incoming Connection
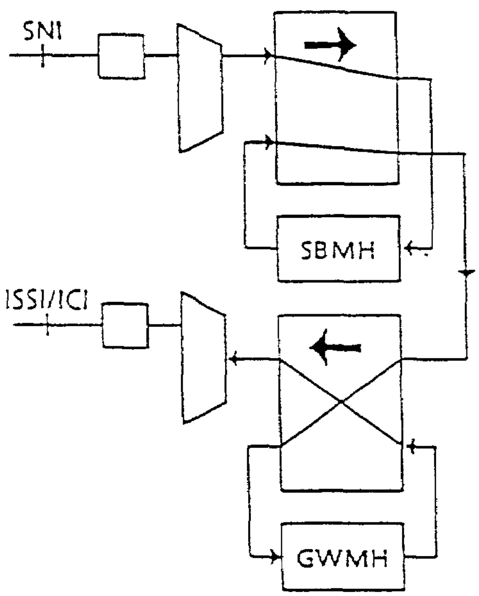
Outgoing Connection
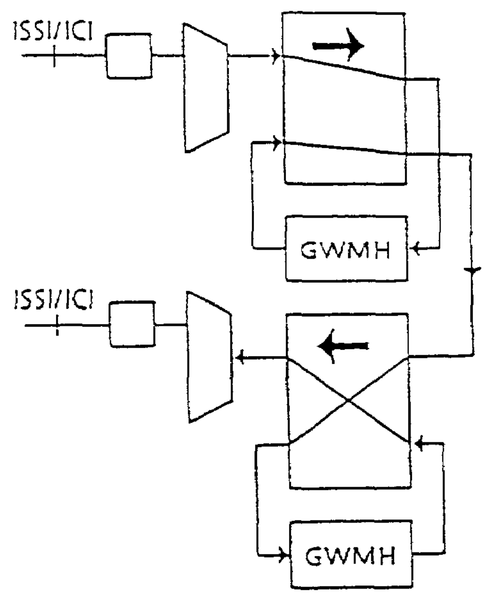
Transit Connection
FIG. 32

680 bit

| | 1 | 84 | 1 | 84 | 1 | 84 | 1 | 84 | 1 | 84 | 1 | 84 | 1 | 84 | 1 | 84 |
|---|---|---|---|---|---|---|---|---|---|---|---|---|---|---|---|---|
| Subframe 1 | X | PYLD | F1 | PYLD | C | PYLD | F0 | PYLD | C | PYLD | F0 | PYLD | C | PYLD | F1 | PYLD |
| Subframe 2 | X | PYLD | F1 | PYLD | C | PYLD | F0 | PYLD | C | PYLD | F0 | PYLD | C | PYLD | F1 | PYLD |
| Subframe 3 | P | PYLD | F1 | PYLD | C | PYLD | F0 | PYLD | C | PYLD | F0 | PYLD | C | PYLD | F1 | PYLD |
| Subframe 4 | P | PYLD | F1 | PYLD | C | PYLD | F0 | PYLD | C | PYLD | F0 | PYLD | C | PYLD | F1 | PYLD |
| Subframe 5 | M0 | PYLD | F1 | PYLD | C | PYLD | F0 | PYLD | C | PYLD | F0 | PYLD | C | PYLD | F1 | PYLD |
| Subframe 6 | M1 | PYLD | F1 | PYLD | C | PYLD | F0 | PYLD | C | PYLD | F0 | PYLD | C | PYLD | F1 | PYLD |
| Subframe 7 | M0 | PYLD | F1 | PYLD | C | PYLD | F0 | PYLD | C | PYLD | F0 | PYLD | C | PYLD | F1 | PYLD |

X : YELLOW ALARM (NORMALLY X = 1. TWO X BITS IN SAME MULTIFRAME SHARE SAME VALUE)
M0, M1 : MULTIFRAME ALIGNMENT (M0 = 0, M1 = 1)
F0, F1 : SUBFRAME ALIGNMENT (F0 = 0, F1 = 1)
P : PARITY (OF EVEN NUMBER FOR PRECEDING INFORMATION PAYLOAD)
C : AIS (AIS C = 0, X = 1, PYLD = 1010, · · · · · 10)

FIG. 36

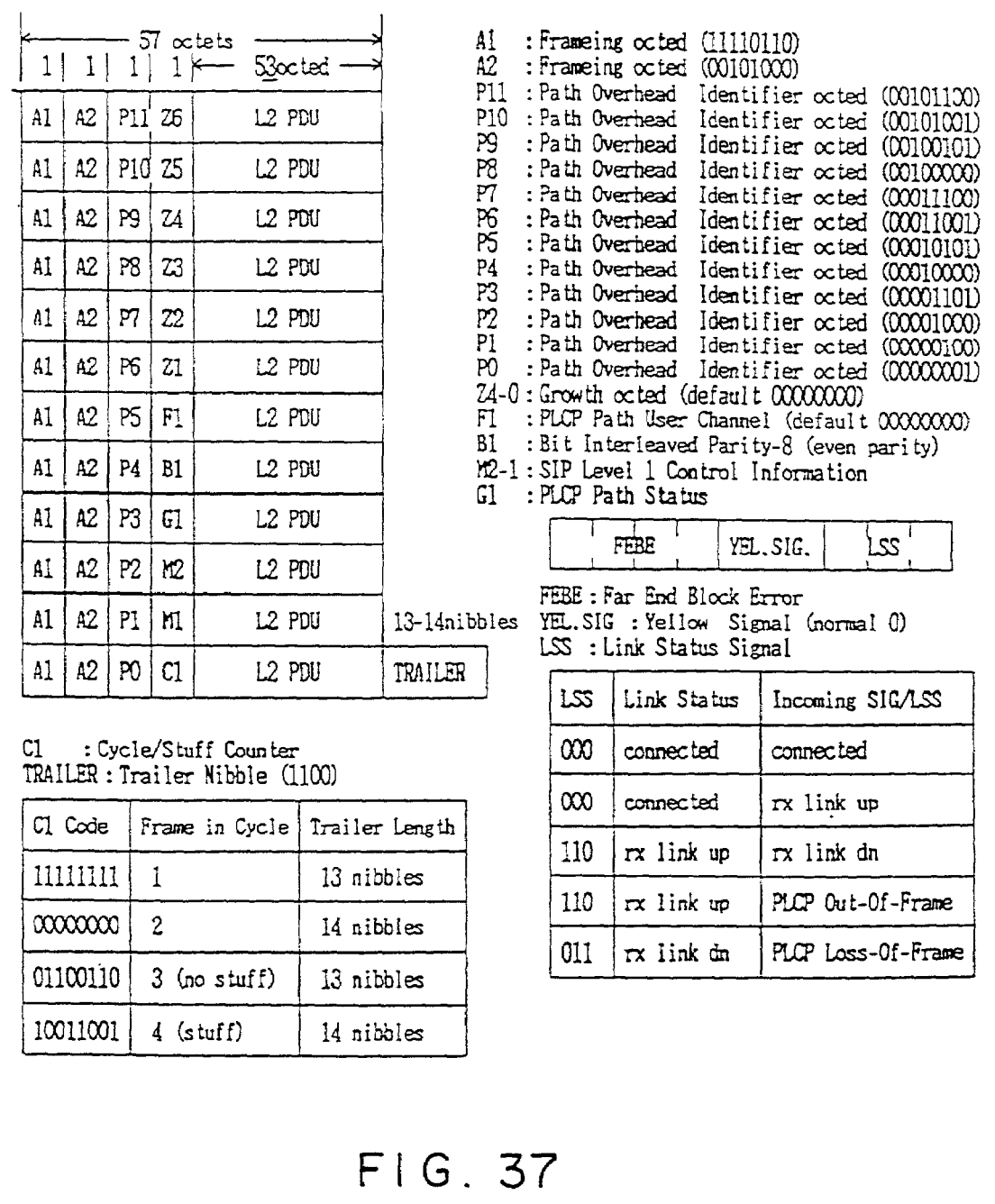

57 octets

| 1 | 1 | 1 | 1 | 53octed | |
|---|---|---|---|---|---|
| A1 | A2 | P11 | Z6 | L2 PDU | |
| A1 | A2 | P10 | Z5 | L2 PDU | |
| A1 | A2 | P9 | Z4 | L2 PDU | |
| A1 | A2 | P8 | Z3 | L2 PDU | |
| A1 | A2 | P7 | Z2 | L2 PDU | |
| A1 | A2 | P6 | Z1 | L2 PDU | |
| A1 | A2 | P5 | F1 | L2 PDU | |
| A1 | A2 | P4 | B1 | L2 PDU | |
| A1 | A2 | P3 | G1 | L2 PDU | |
| A1 | A2 | P2 | M2 | L2 PDU | |
| A1 | A2 | P1 | M1 | L2 PDU | 13-14nibbles |
| A1 | A2 | P0 | C1 | L2 PDU | TRAILER |

C1 : Cycle/Stuff Counter
TRAILER : Trailer Nibble (1100)

| C1 Code | Frame in Cycle | Trailer Length |
|---|---|---|
| 11111111 | 1 | 13 nibbles |
| 00000000 | 2 | 14 nibbles |
| 01100110 | 3 (no stuff) | 13 nibbles |
| 10011001 | 4 (stuff) | 14 nibbles |

A1 : Frameing octed (11110110)
A2 : Frameing octed (00101000)
P11 : Path Overhead Identifier octed (00101100)
P10 : Path Overhead Identifier octed (00101001)
P9 : Path Overhead Identifier octed (00100101)
P8 : Path Overhead Identifier octed (00100000)
P7 : Path Overhead Identifier octed (00011100)
P6 : Path Overhead Identifier octed (00011001)
P5 : Path Overhead Identifier octed (00010101)
P4 : Path Overhead Identifier octed (00010000)
P3 : Path Overhead Identifier octed (00001101)
P2 : Path Overhead Identifier octed (00001000)
P1 : Path Overhead Identifier octed (00000100)
P0 : Path Overhead Identifier octed (00000001)
Z4-0 : Growth octed (default 00000000)
F1 : PLCP Path User Channel (default 00000000)
B1 : Bit Interleaved Parity-8 (even parity)
M2-1 : SIP Level 1 Control Information
G1 : PLCP Path Status

| FEBE | YEL.SIG. | LSS |
|---|---|---|

FEBE : Far End Block Error
YEL.SIG : Yellow Signal (normal 0)
LSS : Link Status Signal

| LSS | Link Status | Incoming SIG/LSS |
|---|---|---|
| 000 | connected | connected |
| 000 | connected | rx link up |
| 110 | rx link up | rx link dn |
| 110 | rx link up | PLCP Out-Of-Frame |
| 011 | rx link dn | PLCP Loss-Of-Frame |

FIG. 37

| | VCI | PT | SP | HCS |
|---|---|---|---|---|
| IF L2 PDU CONTAINS INFORMATION DATA | 11111111 11111111 1111 | 00 | 00 | 00100010 |
| IF L2 PDU CONTAINS NO INFORMATION DATA | 00000000 00000000 0000 | 00 | 00 | 00000000 |

FIG. 40

| VALUE | MEANING |
|---|---|
| 00 | CONTINUATION MESSAGE (COM) (EMPTY L2 PDU FROM MSS) |
| 01 | END OF MESSAGE (EOM) |
| 10 | BEGINNING OF MESSAGE (BOM) |
| 11 | SINGLE SEGMENT MESSAGE (SSM) |

FIG. 41

| FUNCTION | VPI | VCI | PT | CLP |
|---|---|---|---|---|
| UNASSIGNED CELL | 00000000 0000 | 0000 00000000 0000 | XXX | 0 |
| ASSIDNED CELL | YYYYYYYY YYYY | YYYY YYYYYYYY YYYY | YYY | Y |

X : NOT FIXED
Y : OPTIONAL

FIG. 44

| FAULTY DETECTION | FAULT TO BE MASKED | | | | | |
|---|---|---|---|---|---|---|
| | LOS | AIS | OOF | YEL | POOF | PYEL |
| LOS | – | X | X | X | X | X |
| AIS | | – | X | X | X | X |
| OOF | | | – | X | X | X |
| YEL | – | | | – | | |
| POOF | | | | | – | X |
| PYEL | | | | | | – |

"X" INDICATES FAULT TO BE MASKED

POOF: PLCP OOF

PYEL: PLCP YELLOW SIGNAL

FIG. 47

| | DETECTION CONDITION | RECOVERY CONDITION | REACTION |
|---|---|---|---|
| LOS OF SIGNAL | 175±75 SEQUENCE OF 0 ( NO PULSE ) | AVERAGE PULSE DENSITY OF 33% | RED CGA DECLRED<br>TRANSMISSION OF YELLOW ALARM |
| OUT-OF-FRAME (DS3) | THREE OR MORE ERRORS IN FRAME BITS OF 16 OR LESS IN SERIES | Framing bit pattern AND MATCHING OF CRC | RED CGA DECLRED<br>TRANSMISSION OF YELLOW ALARM |
| AIS | C=0, X=1, INFO. PYLD=1010, ...10 | VALUES OTHER THAN LEFT DATA | AIS DECLRED<br>TRANSMISSION OF YELLOW ALARM |
| YELLOW ALARM (DS3) | X=0 | X=1 | YELLOW SIGNAL<br>RECEPTION DECLARED |

F I G. 48

| | DETECTION CONDITION | RECOVERY CONDITION | REACTION |
|---|---|---|---|
| OUT-OF-FRAME (DS3 PLCP) | A1 AND A2 DETECT REEOR OR PATH OVERHEAD IDENTIFIER DETECTS RERORS TWICE CONTINUOUSLY | MATCHING A1 AND A2, MATCHING PATH OVERHEAD IDENTIFIER | TRANSMISSION OF YELLOW SIGNAL |
| YELLOW SIGNAL (DS3 PLCP) | DETECTION OF "1" IN FIFTH G1 BIT. | DETECTION OF "0" IN FIFTH G1 BIT. | YELLOW SIGNAL RECEPTION DECLARED |

FIG. 51

| Parameters | Normal counter Advance | Counter Advance During Failure Events and Conditions | | | |
|---|---|---|---|---|---|
| | | LOS | OOF | AIS | UAT |
| LCV | Each BPV | No | Yes | Yes | No |
| LES | If at least 1 LCV during sec. | Yes | Yes | Yes | No |
| LSES | If 45 or more LCVs during sec. | Yes | Yes | Yes | No |
| CV | Each P-bit error | No | No | Yes | No |
| ES | If at least 1 P-bit error during sec. | No | Yes | Yes | No |
| SES | If 44 or more P-bit error during sec. | No | Yes | Yes | No |
| SEFS | If at least one SEF event during sec. | No | Yes | Yes | No |
| AISS | If at least one incoming AIS during sec. | No | No | No | Yes |
| UAS | Start at oneset of a failure condition | No | No | No | Yes |

FIG. 53

| Parameters | Normal counter Advance | Counter Advance During Failure Events and Conditions | |
|---|---|---|---|
| | | OOF | UAT |
| CV(BIP-8) | Each BIP-8 | No | No |
| ES(BIP-8) | If at least 1 BIP-8 during sec, | Yes | No |
| SES(BIP-8) | If 5 or more BIP-8 error during sec. | Yes | No |
| SEFS(BIP-8) | If at least one SEFS during sec. | Yes | No |
| UAS(BIP-8) | Status at oneset of a failure condition | No | Yes |

FIG. 54

IN CASE OF CONVERSION AT SENDER EFECTIVE ACF CELL IS "10000000"

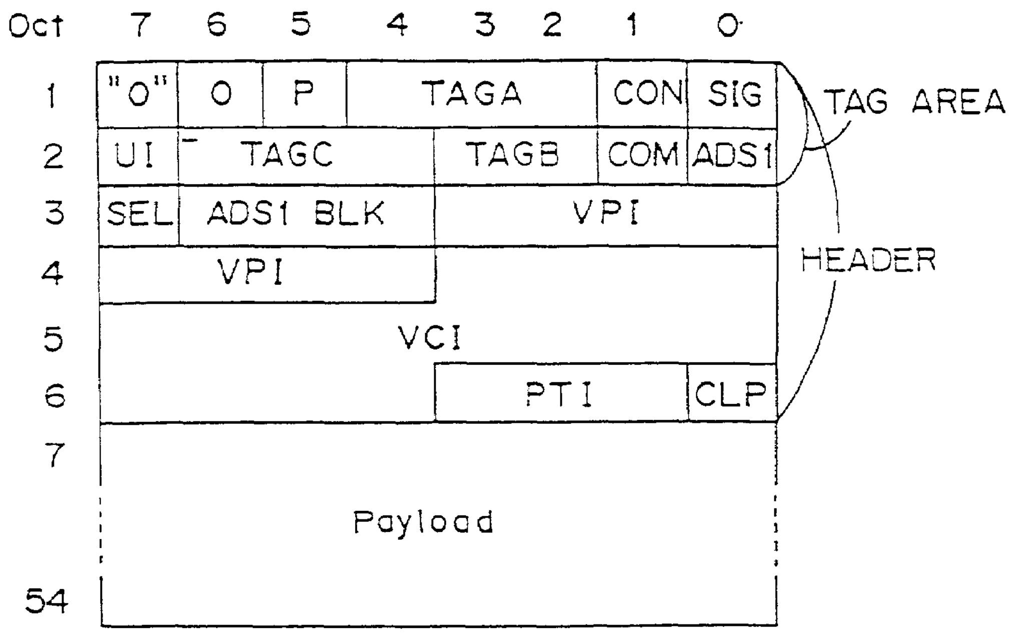

O : ONE-TO-ONE COMMUNICATIONS MODE (NO COPY MODE)
O : INTERNAL TEST CELL INDICATOR (O: USER CELL, 1: INTERNAL CELL)
P : QUALITY INDICATOR
CON : PRIORITY CLASS INDICATOR AT CONGESTION
TAG A : 2.4 G 4 x 4 SELECTED
TAG B : 2.4 G ⇨ 600 M SELECTED
TAG C : 600 M ⇨ 156 M SELECTED
UL : DAISY-CHAIN HIGH ORDER / LOW ORDER
COM : SELECTING COMMON UNIT ACCOMMODATING 600 MHW
SIG : INTRA-STATION CELL IDENTIFICATION
ADS 1 BLK : MUX ⇨ DTC SELECTED ("000" FOR DS3-SMDS)
ADS 1 SEL : ADS 1 CARD SELECTED ("0" FOR DS3-SMDS)

FIG. 56

| BYTE \ BIT | D7 | D6 | D5 | D4 | D3 | D2 | D1 | D0 |
|---|---|---|---|---|---|---|---|---|
| 000 | PLT1 | PLT0 | | | | | | DTEN |
| 001 | | | | | | | | |
| 002 | | | | | | | | |
| 003 | | SDFRST | μPRST | | | | | |
| 004 | | | | | | | | |
| 005 | | LOOP-2 | LOOP-3 | AISSND | | | O-LOOP | V-LOOP |
| 006 | | | | | | | | |
| 007 | PF-CK | PF-CF | PF-PTY | | PF-WDT | | PTYRST | DS3DEC |
| 008 | | | | | | | | |
| 009 | | | | | | | | |
| 010 | | | | | | | | |
| 011 | | | | | | | | |
| 012 | | | | | | | | |
| 013 | | | | | | | | |
| 014 | | | | | | | | |
| 015 | | | | | | | | |
| 016 | | | | | | | | |
| 017 | | | | | | | | |
| 018 | | | | | | | | |
| 019 | | | | | | | | |
| 020 | | | | | | | | |
| 021 | | | | | | | | |
| ⋮ | ⋮ | ⋮ | ⋮ | ⋮ | ⋮ | ⋮ | ⋮ | ⋮ |
| 246 | | | | | | | | |
| ⋮ | UNUSED AREA | | | | | | | |
| 256 | | | | | | | | |

FIG. 58

| ROW No | DATA | ABBR | MEANING | POLARITY | TYPE |
|---|---|---|---|---|---|
| 000 | 0 | DTEN | DATA ENABLE (SET IN SIFSH COMMON) | Neg | S/R |
| 000 | 6 | PLT0 | STUCK MONITOR PILOT BIT (FIXED EARTH) | Neg | S/R |
| 000 | 7 | PLT1 | STUCK MONITOR PILOT BIT (FIXED AT +5) | Neg | S/R |
| 003 | 5 | μPRST | μ-PROCESSOR RESET (FOR MAINTENANCE) | Neg | S/R |
| 003 | 6 | SDFRST | FAULT RESET | Neg | S/R |
| 005 | 0 | V-LOOP | SPECIFYING VPI/VCI CELL LOOPBACK | Pos | S/R |
| 005 | 1 | 0-LOOP | SPECIFYING "0"-BIT CELL LOOPBACK | Pos | S/R |
| 005 | 4 | AISSND | SPECIFYING TRANSMISSION OF AIS PATTERN IN DS3 LINE | Pos | S/R |
| 005 | 5 | LOOP-3 | SPECIFYING LINE LOOPBACK | Pos | S/R |
| 005 | 6 | LOOP-2 | SPECIFYING INTERNAL LOOPBACK (DS3 SMDS ALL LOOP) | Pos | S/R |
| | | | | | |
| 007 | 0 | DS3DEC | SPECIFYING DIAGNOSYS OF DS3-HARDWARE | Pos | S/R |
| 007 | 1 | PTYRST | PARITY ERROR RESET | Pos | S/R |
| 007 | 4 | PF-WDT | SPECIFYING PSEUDO-FAULT OF WATCH DOG TIMER | Pos | S/R |
| 007 | 5 | PF-PTY | SPECIFYING PSEUDO-FAULT OF PARITY ERROR | Pos | S/R |
| 007 | 6 | PF-CF | SPECIFYING PSEUDO-FAULT OF CELL FRAME PULSE DISCONNETION CHECKER | Pos<br>Pos | S/R<br>S/R |
| 007 | 7 | PF-CK | SPECIFYING PSEUDO-FAULT OF CELL DISCONNETION CHECKER | Pos | S/R |
| | | | | | |
| | | | | | |
| | | | | | |
| | | | | | |
| | | | | | |
| | | | | | |
| | | | | | |

POLARITY . Neg : 0/1 = SIGNIFICANT/INSIGNIFICANT
. Pos : 0/1 = INSIGNIFICANT/SIGNIFICANT
. DOUBLE VALUES : SIGNIFICANT AT CHANGE POINT

FIG. 59

| BIT / BYTE | D7 | D6 | D5 | D4 | D3 | D2 | D1 | D0 |
|---|---|---|---|---|---|---|---|---|
| 000 | PLT1 | PLT0 | PWCS GROUP ID | | | | | |
| 001 | 0 | 0 | 1 | 0 | 0 | 0 | 0 | 1 |
| 002 | SYNCF0 | PLTF0 | SYNCF1 | PLTF1 | PE0 | PE1 | | |
| 003 | – | SDFRST | μPRST | | | | | |
| 004 | | | | | | | | |
| 005 | | LOOP-2 | LOOP-3 | AISSND | | | O-LOOP | V-LOOP |
| 006 | | | | | | | | |
| 007 | PF-CK | PF-CF | PF-PTY | | PF-WDT | | PTYRST | DS3DEC |
| 008 | | | | | | | | |
| 009 | | | | | | | | |
| 010 | | | | | | | | |
| 011 | | | | | | | | |
| 012 | | | | | | | | |
| 013 | | | | | | | | |
| 014 | | | | | | | | |
| 015 | EC-AC1 | EC-AC0 | EC-TID | EC-TQH | EC-TSM | | | |
| 016 | FERR-1 | FERR-2 | L1ALM | TCAALM | CLOSAL | | | TIMALM |
| 017 | | | MPE | | | TSTEND | TSTIND | INS |
| 018 | DH19M0 | DH19M1 | DHCF0 | DHCF1 | DHDPT0 | DHDPT1 | | |
| 019 | UHDPT | UH19M | EGPTY | | | | | |
| 020 | | | LIFLG | TCAFLG | CLFLG | | | |
| 021 | | | | | | | | |
| ⋮ | ⋮ | ⋮ | ⋮ | ⋮ | ⋮ | ⋮ | ⋮ | ⋮ |
| 031 | | DEC NG PHASE No. | | | | DEC NG TST No. | | |
| ⋮ | ⋮ | ⋮ | ⋮ | ⋮ | ⋮ | ⋮ | ⋮ | ⋮ |
| 246 | | | | | | | | |
| ⋮ | UNUSED AREA | | | | | | | |
| 255 | | | | | | | | |

FIG. 61

| ROW No | DATA | ABBREVIATION | MEANINGS | POLARITY | TYPE | RESET |
|---|---|---|---|---|---|---|
| 000 | 6 | PLT0 | STUCK MONITOR PILOT BIT (EARTH FIXED) | Neg | — | — |
| 000 | 7 | PLT1 | STUCK MONITOR PILOT BIT (+5V FIXED) | Neg | — | — |
| 001 | 0-7 | PWCB ID | LOADED PWCB ID | Pos | — | — |
| 002 | 2 | PE1 | #1 SYSTEM INTERFACE UNIT REPRESENTATIVE ALARM | Neg | HELD | FRST1 |
| 002 | 3 | PE0 | #0 SYSTEM INTERFACE UNIT REPRESENTATIVE ALARM | Neg | HELD | FRST0 |
| 002 | 4 | PLTF1 | #1 PILOT SIGNAL ERROR | Neg | — | — |
| 002 | 5 | SYNCF1 | #1 SYSTEM FCK SYNCHRONIZATION ERROR | Neg | — | — |
| 002 | 6 | PLTF0 | #0 SYSTEM PILOT SIGNAL REEOR | Neg | — | — |
| 002 | 7 | SYNCF0 | #1 SYSTEM FCK SYNCHRONIZATION ERROR | Neg | — | — |
| 003 | 5 | μPRST | μ-PROCESSER RESET | Pos | — | — |
| 003 | 6 | SDFRST | FAULT RESET | Pos | — | — |
| 005 | 0 | V-LOOP | SPECIFIED VPI/VCI CELL LOOPBACK INSTRUCTION | Pos | — | — |
| 005 | 1 | 0-LOOP | "0"-BIT CELL LOOPBACK INSTRUCTION | Pos | — | — |
| 005 | 4 | AISSND | AIS PATTERN TRANSMIT INSTRUCTION TO DS3 LINE | Pos | — | — |
| 005 | 5 | LOOP-3 | LINE LOOPBACK INSTRUCTION | Pos | — | — |
| 005 | 6 | LOOP-2 | INTERNAL LOOPBACK INSTRUCTION | Pos | — | — |
| | | | | | | |
| 007 | 0 | SD3DEC | DS3-SMDS HARDWARE DIAGNOSTIC INSTRUCTION | Pos | — | — |
| 007 | 1 | PTY-RS | PARITY ERROR RESET | Pos | — | — |
| 007 | 3 | PF-WDT | WATCH DOG TIME PSEUDO FAULT INSTRUCTION | Pos | — | — |
| 007 | 5 | PF-PTY | PARITY ERROR PSEUDO FAULT INSTRUCTION | Pos | — | — |
| 007 | 6 | PF-CF | CELL FRAME PULSE DISCONNECTION CHECKER PSEUDO FAULT INSTRUCTION | Pos | — | — |
| 007 | 7 | PF-CK | CLOCK DISCONNECTION CHECKER PSEUDO FAULT INSTRUCTION | Pos | — | — |
| 015 | 3 | EB-T5M | ECHO-BACK OF OTHER LINE MSD(TIMER 5-MINUTE) | ALTERNATION | — | — |
| 015 | 4 | EC-TQH | ECHO-BACK OF OTHER LINE MSD(TIMER QUARTER HOURLY) | ALTERNATION | — | — |
| 015 | 5 | EC-TID | ECHO-BACK OF OTHER LINE MSD(TIMER 1 DAY) | ALTERNATION | — | — |

POLARITY.NEG 0/1=SIGNIFICANT/INSIGNIFICANT.POS 0/1
=INSIGNIFICANT/SIGNIFICANT.ALTERNATION SIGNIFICANT WHEN CHANGE IS MADE

FIG. 62

| ROW No | DATA | ABBREVIATION | MEANINGS | POLARITY | TYPE | RESET |
|---|---|---|---|---|---|---|
| 015 | 6 | EC-ACO | ECHO-BACK OF OTHER LINE MSD(ACT#0) | Neg | — | — |
| 015 | 7 | EC-AC1 | ECHO-BACK OF OTHER LINE MSD(ACT#1) | Neg | — | — |
| 016 | 0 | TIMALMD | OTHER LINE TIMER INFORMATION NG OR CONDITION | Pos | NOT HELD | SDFRST |
| 016 | 3 | CLOSAL | 156M →45M CONVERSION BUFFER CELL DISCARD START OR CONDITION | Pos | NOT HELD | — |
| 016 | 4 | TCAALM | DS3/PLCP TCA OR CONDITION | Pos | NOT HELD | — |
| 016 | 5 | LIALM | DS3/PLCP ALARM OR CONDITION | Pos | NOT HELD | — |
| 016 | 6 | FEER-2 | SD3-SMDS INF HARDWARE FAULT OR CONDITION | Pos | HELD | SDFRST |
| 016 | 7 | FEER-1 | INTRA-STATION COMMUNCATION DISABLE DS3→MSDS INF HARDWARE FAULT | Pos | HELD | SDFRST |
| 017 | 0 | INS | DS3-SMDS INF MICROPROCESSOR INITIALIZATION TERMINATE | Pos | HELD | — |
| 017 | 1 | TSTIND | DS3-SMDS DIAGNOSTICS RESULT INDICATOR | Pos | HELD | SDFRST |
| 017 | 2 | TSTEND | DS3-SMDS DIAGNOSTICS COMPLETION INDICATOR | Pos | HELD | SDFRST |
| 017 | 5 | MPE | DS3-SMDS INF MICROPROCESSOR FAULT | Pos | HELD | μPRST |
| 018 | 2 | DHDPT1 | #1 SYSTEM DOWNWARD PRIMARY SIGNAL DATA PARITY ERROR | Pos | HELD | FRST1 |
| 018 | 3 | DHDPT0 | #0 SYSTEM DOWNWARD PRIMARY SIGNAL DATA PARITY ERROR | Pos | HELD | FRST0 |
| 018 | 4 | DHCF1 | #1 SYSTEM CELL FRAME FAULT | Pos | HELD | FRST1 |
| 018 | 5 | DHCF0 | #0 SYSTEM CELL FRAME FAULT | Pos | HELD | FRST0 |
| 018 | 6 | DH19M1 | #1 SYSTEM DOWN 19M CLOCK FAULT | Pos | HELD | FRST1 |
| 018 | 7 | DH19M0 | #0 SYSTEM DOWN 19M CLOCK FAULT | Pos | HELD | FRST0 |
| 019 | 5 | EGPTY | EGCLAD PARITY ERROR | Pos | HELD | SDFRST |
| 019 | 6 | UH19M | UP 19M CLOCK FAULT | Pos | HELD | SDFRST |
| 019 | 7 | UHDPT | UPWARD PRIMARY SIGNAL DATA PARITY DRROR | Pos | HELD | SDFRST |
| 020 | 3 | CLFLG | 156M →45M CONVERSION BUFFER CELL DISCARD START CHANGE FLAG | ALTERNATION | NOT HELD | — |
| 020 | 4 | TCAFLG | DS3/PLCP TCA CHANGE FLAG | ALTERNATION | NOT HELD | — |
| 020 | 5 | LIFLG | DS3/PLCP ALARM CHANGE FLAG | ALTERNATION | NOT HELD | — |
| 031 | 0-3 | DEC NG TST No. | DS3-SMDS INF DIAGNOSTICS NG TST No. INDICATOR | Pos | HELD | — |
| 031 | 4-7 | DEC NG Ph No. | DS3-SMDS INF DIAGNOSTICS NG PH No. INDICATOR | Pos | HELD | — |

POLARITY;NEG:0/1=SIGNIFICANT/INSIGNIFICANT;POS:0/1
=INSIGNIFICANT/SIGNIFICANT;ALTERNATION:SIGNIFICANT WHEN CHANGE IS MADE

FIG. 63

ST : SEGMENT TYPE (BOM, EOM, SSM, etc)
SN : SEQUENCE NUMBER
LI : PAYLOAD BYTE LENGTH INDICATOR
CRC : CRC (CRC-10 OF ST, SN, MID, AND PAYLOAD)
MID : d.c. FOR INTRA-STATION COMMUNICATIONS CELL SAPI : ALL '0'
C/R : '1'
EA : EXTENSION ADDRESS (=0)
TEI : ALL 0 IN SINF → BSGC DIRECTION PRIORITY LEVEL IS DEFINED FOR 3 LOWER BITS.
CONTROL FIELD : ID IS ASSIGNED TO SABM, UA, RR, AND DISC.

LIHI : INDICATES HIGHER HITS OF OCTETS ≤ LILW
LILW : INDICATES LOWER HITS OF OCTETS ≤ LILW
APID : INDICATES APPLICATION TO BE COMMUNICATED
MESG : IDENTIFIES MESSAGE IN APPLICATION
NS : BCPR → DEVICE SIGNAL
COMMAND ID : SOFTWARE SEQUENCE NUMBER

T1: TIMEOUT AFTER 500 (MSEC) x 30 TIMES
*1: SET WHEN NECESSARY (3) DS3-SMDS INTERFACE OUS PROCEDURE ( MAINTENANCE BLOCK )

(4) DS3-SMDS INTERFACE HARDWARE FAULT
③ μ PROCESSOR FAULT (4) DS3-SMDS INTERFACE HARDWARE FAULT

④ SIFSH COMMON UNIT - DS3 SMDS IN INTER-CONNECTING UNIT FAULT (ACT SYSTEM)

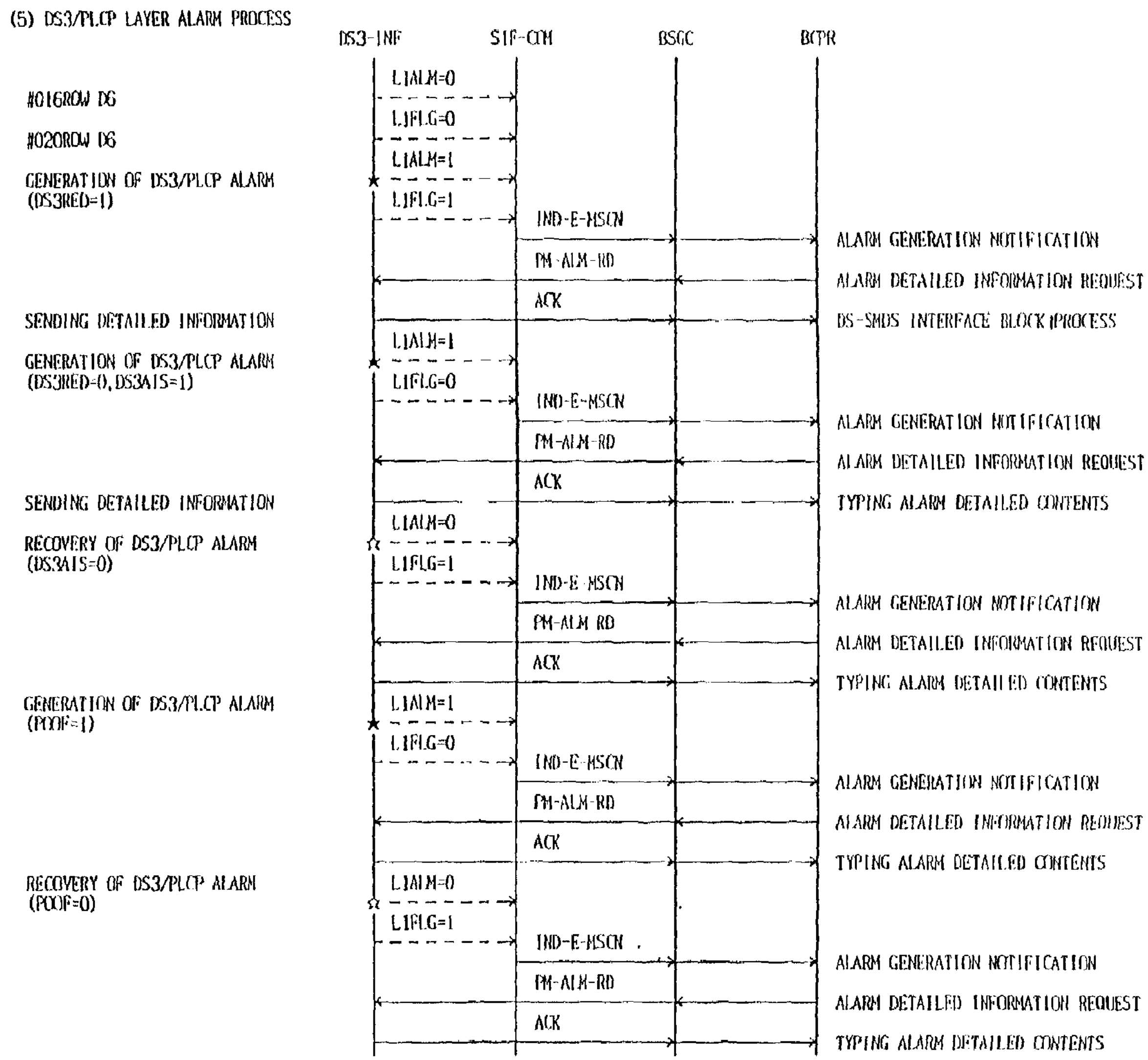
F I G. 7 8

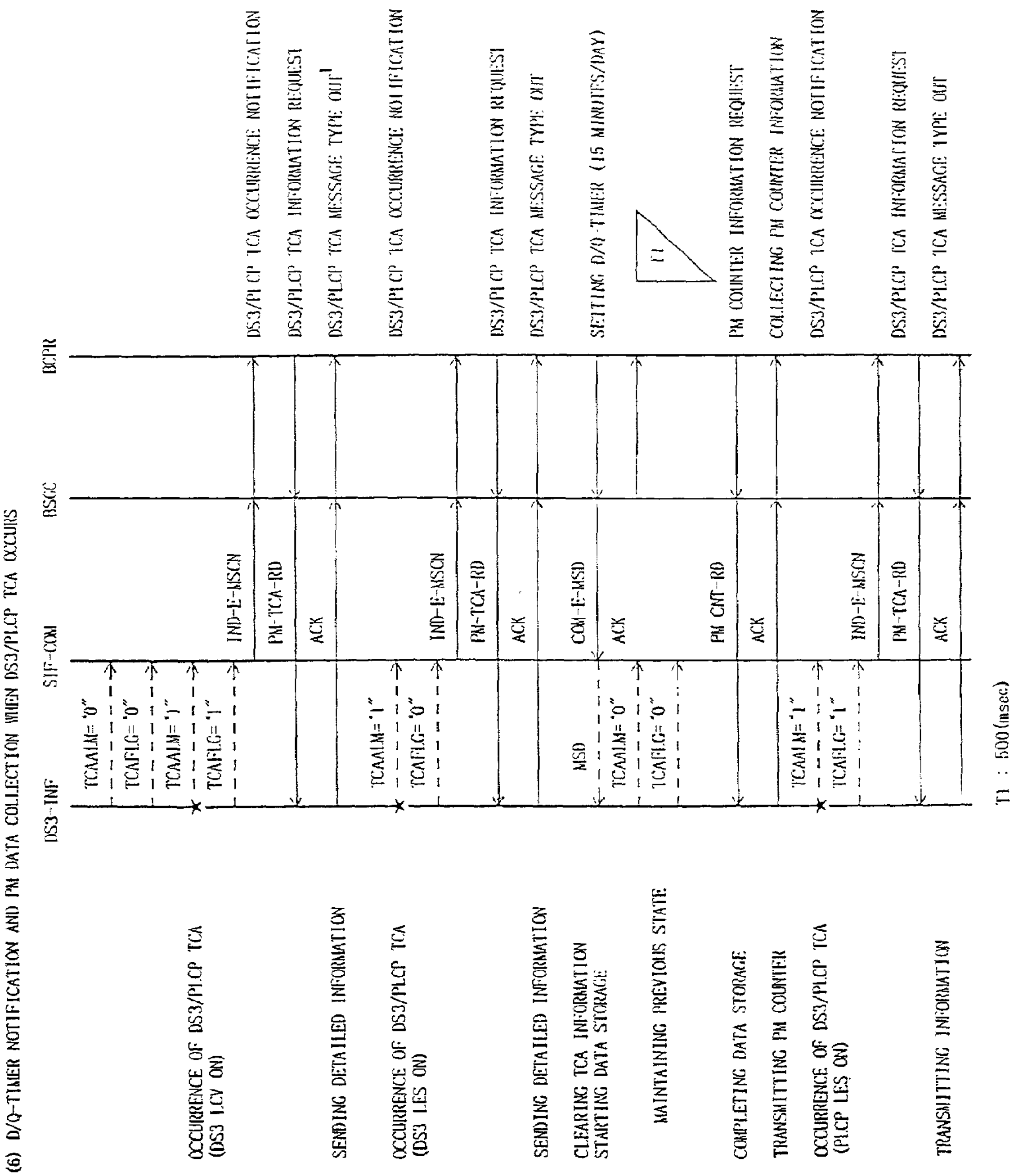
F I G. 79

(6) D/O-TIMER NOTIFICATION AND BUFFER DATA COLLECTION WHEN DS3/PLCP TCA OCCURS
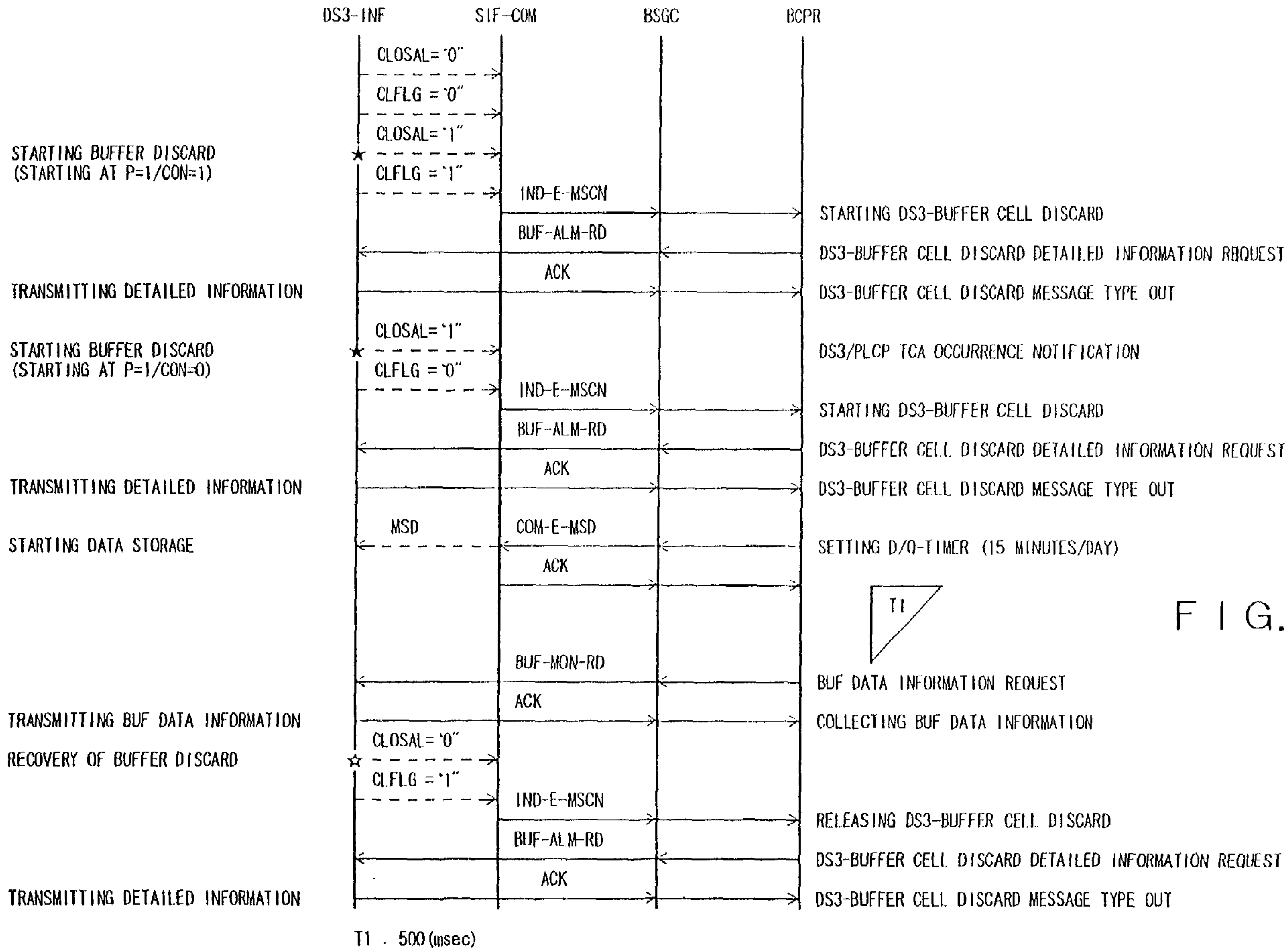
F I G. 80

NOTE 1 : IN INDIVIDUAL UNIT PACKAGE, EVEN-NUMBER LINES ARE ACCOMMODATED IN LEFT HALF WHILE ODD-NUMBER LINES ARE ACCOMMODATED IN RIGHT HALF

| #0 SYSTEM ACT | #1 SYSTEM ACT | ACT STATE |
|---|---|---|
| 0 | 0 | MAINTAINING PREVIOUS STATE |
| 1 | 0 | #1 SYSTEM ACT |
| 0 | 1 | #0 SYSTEM ACT |
| 1 | 1 | MAINTAINING PREVIOUS STATUS |

FIG. 91

| PKG NAME | FUNCTION |
|---|---|
| HSF01A | Shelf common controller |
| HMX04A | Shelf common up highway multiplexer |
| HMX05A | Shelf common down higway demultiplexer A |
| HMX06A | Shelf common down higway demultiplexer B |
| HPT01A | -48V power supply |

FIG. 95

| SYSTEM SELECT SIGNAL | | SIFSH-A ACTIVE SYSTEM |
|---|---|---|
| SWITCH SELECT INDICATOR IN PRESENT SYSTEM | SWITCH SELECT INDICATOR IN OTHER SYSTEMS | |
| SELECTING SYSTEM 0 | SELECTING SYSTEM 0 | SYSTEM 0 |
| SELECTING SYSTEM 1 | SELECTING SYSTEM 1 | SYSTEM 0 |
| SELECTING SYSTEM 0 | SELECTING SYSTEM 1 | MAINTAINING OLD SYSTEM |
| SELECTING SYSTEM 1 | SELECTING SYSTEM 0 | MAINTAINING OLD SYSTEM |

FIG. 99

| | COM-E-MSD INSTRUCTION | | OL-2 CIRCUIT ALARM STATE | | SELECTED SYSTEM (COM-E-MSCN) |
|---|---|---|---|---|---|
| | SYSTEM #0 | SYSTEM #1 | SYSTEM #0 | SYSTEM #1 | |
| | OFF | OFF | ○ | ○ | MAINTAINING OLD SYSTEM |
| | ON | OFF | ○ | ○ | SYSTEM #0 |
| | OFF | ON | ○ | ○ | SYSTEM #1 |
| (NOTE 1) | ON | ON | ○ | ○ | MAINTAINING OLD SYSTEM |
| | Don't | Care | ○ | × | SYSTEM #0 |
| | Don't | Care | × | ○ | SYSTEM #1 |
| | Don't | Care | × | × | MAINTAINING OLD SYSTEM |

NOTE 1: BOTH SYSTEMS CANNOT BE SELECTED AT COM-E-MSD WHEN SOFTWARE/FIRMWARE OPERATE NORMALLY.

FIG. 101

| ACT0 | ACT1 | SYSTEM SELECTION |
|---|---|---|
| H | H | MAINTAINING PREVIOUS STATE |
| H | L | #1 ACT |
| L | H | #0 ACT |
| L | L | MAINTAINING PREVIOUS STATE |

FIG. 106

| SEL | SELECTION |
|---|---|
| 0 | SYSTEM 0 |
| 1 | SYSTEM 1 |

※: PILOT SIGNAL IS CHECKED AND DTEM MONITOR IS PERFOMED IN THIS BLOCK.

| FAULT | INDIVIDUAL UNIT | | COMMON UNIT | |
|---|---|---|---|---|
| | FAULT DETECTING METHOD | FAULT NOTIFYING METHOD | FAULT DETECTING METHOD | TYPE OF FAULT |
| EMSD HW STACK | PLT0/1 ASYNCHRONIZATION | EMSCN(PLTF) | EMSCN(PLTF) | EMSD HW STACK |
| 512 CLOCK STACK | INDIVIDUAL UNIT LOCKED | EMSCN STACK | EMSCN PLT0/1 STACK | EMSCN HW STACK |
| FCK STACK | FCK STACK | EMSCN(SYNCF) | EMSCN(SYNCF) | FCK ASYNCHRONIZATION |
| EMSCN HW STACK | | | EMSCN PLT0/1 STACK | EMSCN HW STACK |

FIG. 115

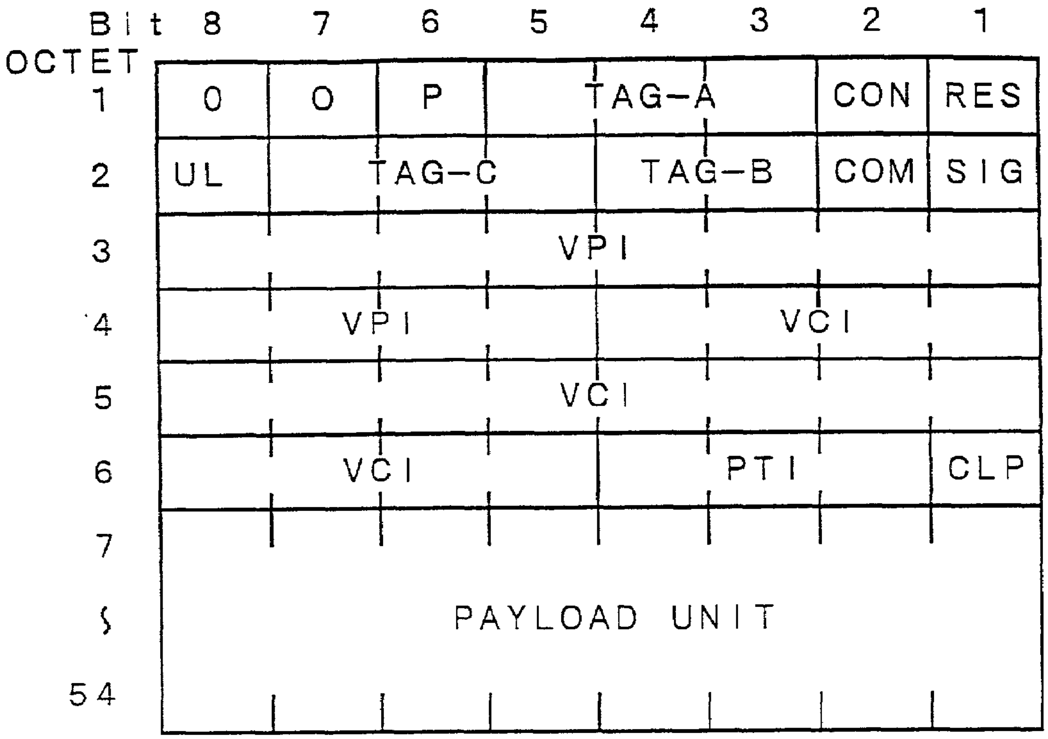

O : INTERNAL CELL INDICATOR.
INTRA-STATION COMMUNICATIONS CELL IS FIXED TO "1".

P : QUALITY INDICATOR.
HIGH QUALITY IS FIXED TO "1" BY FIRMWARE.

CON : HIGH PRIORITY CLASS.
HIGH PRIORITY IS FIXED TO "1" BY FIRMWARE.

RES : FORCED BLANK CELL INDICATOR. FIXED TO "0".

COM : COMMON UNIT SIGNALLING SPECIFICAON OF "1" (COMMON UNIT IS SPECIFIED).

SIG : SIGNALING SPECIFICATION TAG OF "1" (SIGNALING).

VPI : FIXED VALUE IS DEFINED WHEN INTRA-STATION SIGNALING IS ADOPTED.

VCI : FIXED VALUE IS DEFINED WHEN INTRA-STATION SIGNALING IS ADOPTED.

PTI : FIXED VALUE OF "000"

CLP : FIXED VALUE OF "0"

TAG-A : CELL ROUTING INDICATOR

TAG-B : CELL ROUTING INDICATOR

TAG-C : CELL ROUTING INDICATOR

FIG. 118

ST : SEGMENT TYPE (BOM = "00" / COM = "01" / EOM = "10" / SSM = "11")

SN : SEQUENCE NUMBER ("0000" ⇨ "1111" CYCLIC INCREMENT)

MID : NOT DEFINED WHEN INTRA-STATION SIGNALING IS ADOPTED (RECEIVED CELL D.C. / TRANSMITTED CELL ALL BITS "0")

LI : LENGTH INDICATOR (SIGNIFICANT BYTE LENGTH INDICATOR IN PAYLOAD (BOM, COM, = "101100" SSM, EOM = OPTIONAL LENGTH)

CRC : CRC (CRC-10 FOR ST, SN, MID, AND PAYLOAD)

| | 8 | 7 | 6 | 5 | 4 | 3 | 2 | 1 |
|---|---|---|---|---|---|---|---|---|
| 1 | SAPI (DLCI Lower) | | | | | | C/R | EA1 |
| 2 | TEI (DLCI Lower) | | | | | | | EA2 |
| 3 | CONTROL FIELD (C-Field) | | | | | | | |
| 4 ∫ UP TO 512 | INFORMATION FIELD (I-Field) | | | | | | | |

SAPI : ALL BITS ARE SET TO "0" AS FIXED VALUE.
TEI : ALL BITS ARE SET TO "0" AS FIXED VALUE.
C/R : COMMAND = "0" / RESPONSE = "1"
EA1 : EXTENSION ADDRESS "0" AS FIXED VALUE.
EA2 : EXTENSION ADDRESS "1" AS FIXED VALUE.
CONTROL FIELD : SABM = "01111111" / UA = "01110011" / UI = "00000011" / RR = "00000001"

FIG. 120

| | 8 | 7 | 6 | 5 | 4 | 3 | 2 | 1 |
|---|---|---|---|---|---|---|---|---|
| 1 | 0 | 0 | P | TAGA | | | Con. | Resv |
| 2 | UL | TAGC | | | TAGB | | COM | SIG |
| 3 | MUXM | ADS1-BLK | | | ADS1-SEL | | VPI | |
| 4 | VPI | | | | | | | |
| 5 | | | | | | | | |
| 6 | | | | | PTI | | | CLP |
| ~ 54 | INFORMATION FIELD | | | | | | | |

0 : FIXED VALUE (COPY INDICATOR. "0" INDICATES ONE TO ONE TRANSMISSION)

0 : INTERNAL TEST CELL INDICATOR ("0" INDICATES A USER CELL WHILE "1" INDICATES INTERNAL CELL)

P : HIGH PRIORITY CLASS ("0" FOR HIGHER PRIORITY: AND "1" FOR LOWER PRIORITY.)

Con. : CONGESTION CONTROL (IMPORTANT CALLS FROM POLICE AND FIRE DEPARTMENTS ARE IDENTIFIED)

Resv : RESERVE BITS
USED TO IDENTIFY INSIGNIFICANT CELL
WHEN SYSTEMS ARE SWITCHED IN BSGCSH.

TAGA : 2.4G 4×4 HIGHWAY IS SELECTED IN SW (AHM SPECIFICATION)
(2 BITS ONLY ARE UNED IN 3 BITS. POSITION AND POLARITY OF REMAINING ONE BIT ARE NOT CHECKED.)

TAGB : 2.4G 622M×4 HIGHWAY IS SELECTED IN SW (AHM SPECIFICATION)
USED AS UL IN RMXSH

TAGC : SELECTING 622M → 156M HIGHWAY –

UL : HIGHER/LOWER ORDER IN DAISY CHAIN

COM : SELECTING COMMON UNIT
USED TO IDENTIFY CELL FROM SIMPLEX/DUPLEX DEVICE IN BSGCSH.

SIG : IDENTIFICATION OF INTRA-STATION LAP CELL

MUXM : FOR DS1 CARDS IN AND AFTER MUX MULTICAST BIT MUX

ADS1-SEL : SELECTING ADSI CARD

F I G. 1 2 1

| SIG | UL | TAGC | COM | TRANSMISSION LINE |
|---|---|---|---|---|
| 0/1 | 0 | 000 | 0 | SIFSH#0 LINE0/SIGNALING |
| 0/1 | 0 | 001 | 0 | SIFSH#0 LINE1/SIGNALING |
| | | ≀ | | ≀ |
| 0/1 | 0 | 111 | 0 | SIFSH#0 LINE7/SIGNALING |
| 0/1 | 1 | 000 | 0 | SIFSH#1 LINE0/SIGNALING |
| 0/1 | 1 | 001 | 0 | SIFSH#1 LINE1/SIGNALING |
| | | ≀ | | ≀ |
| 0/1 | 1 | 111 | 0 | SIFSH#1 LINE7/SIGNALING |
| 1 | 0 | 000 | 1 | SIFSH#0 COM SIGNALING |
| 1 | 1 | 000 | 1 | SIFSH#1 COM SIGNALING |

FIG. 123

: USED IN RMUXCOM

SIG, UL, TAGB, TAGC,
COM :
TAG FOR HIGHWAYS OF SMALLER THAN 622M (ONLY LOWEST BIT OF TAGB IS USED)

| SIG | UL | TAGB | TAGC | COM | TRANSMISSION LINE |
|---|---|---|---|---|---|
| 0/1 | 0 | 0 | 000 | 0 | RMUXSH#0 LINE0 / SIGNALING |
| 0/1 | 0 | 0 | 001 | 0 | RMUXSH#0 LINE1 / SIGNALING |
| | | | ~ | | ~ |
| 0/1 | 0 | 0 | 111 | 0 | RMUXSH#0 LINE7 / SIGNALING |
| 0/1 | 1 | 0 | 000 | 0 | RMUXSH#1 LINE0 / SIGNALING |
| 0/1 | 1 | 0 | 001 | 0 | RMUXSH#1 LINE1 / SIGNALING |
| | | | ~ | | ~ |
| 0/1 | 1 | 0 | 111 | 0 | RMUXSH#1 LINE7 / SIGNALING |
| 0/1 | 1 | 1 | 000 | 0 | RMUXSH#2 LINE0 / SIGNALING |
| 0/1 | 1 | 1 | 001 | 0 | RMUXSH#2 LINE1 / SIGNALING |
| | | | ~ | | ~ |
| 0/1 | 1 | 1 | 111 | 0 | RMUXSH#2 LINE7 / SIGNALING |
| 1 | 0 | 0 | 000 | 1 | RMUXSH#0 COM SIGNALING |
| 1 | 1 | 0 | 000 | 1 | RMUXSH#1 COM SIGNALING |
| 1 | 1 | 1 | 000 | 1 | RMUXSH#2 COM SIGNALING |

FIG. 125

| SIG | UL | TAGC | TRANSMISSION LINE |
|---|---|---|---|
| 0 | 0 | 000 | BSGCSH#0/LINE0 |
| 0 | 0 | 001 | BSGCSH#0/LINE1 |
| | | ⌇ | ⌇ |
| 0 | 0 | 111 | BSGCSH#0/LINE7 |
| 0 | 1 | 000 | BSGCSH#1/LINE0 |
| 0 | 1 | 001 | BSGCSH#1/LINE1 |
| | | ⌇ | ⌇ |
| 0 | 1 | 111 | BSGCSH#1/LINE7 |
| 1 | 0 | 000 | BSGCSH#2/LINE0 |
| 1 | 0 | 001 | BSGCSH#2/LINE1 |
| | | ⌇ | ⌇ |
| 1 | 0 | 111 | BSGCSH#2/LINE7 |
| 1 | 1 | 000 | BSGCSH#3/LINE0 |
| 1 | 1 | 001 | BSGCSH#3/LINE1 |
| | | ⌇ | ⌇ |
| 1 | 1 | 111 | BSGCSH#3/LINE7 |

FIG. 127

| SIG | ADS1 BLK | ADS1 SEL | |
|---|---|---|---|
| 0 | 000 | 0 0<br>~<br>1 1 | USER CELL TO DTC 0/ Line 0<br>~<br>USER CELL TO DTC 0/ Line 3 |
| | ~ | | |
| 0 | 111 | 0 0<br>~<br>1 1 | USER CELL TO DTC 7/ Line 0<br>~<br>USER CELL TO DTC 7/ Line 3 |
| 1 | 000 | 0 0<br>~<br>1 1 | LAP CELL TO DTC 0/ Line 0<br>~<br>LAP CELL TO DTC 0/ Line 3 |
| | ~ | | |
| 1 | 111 | 0 0<br>~<br>1 1 | LAP CELL TO DTC 7/ Line 0<br>~<br>LAP CELL TO DTC 7/ Line 3 |

FIG. 128

SELECTOR: LOWER ORDER DEVICE IN DAISY CHAIN SELECTS SIGNAL FROM HIGHER ORDER.

※ NO DATA IS WRITTEN TO FIFO AT TIMING AT WHICH NO CELLS EXIST IN ALL LINES.

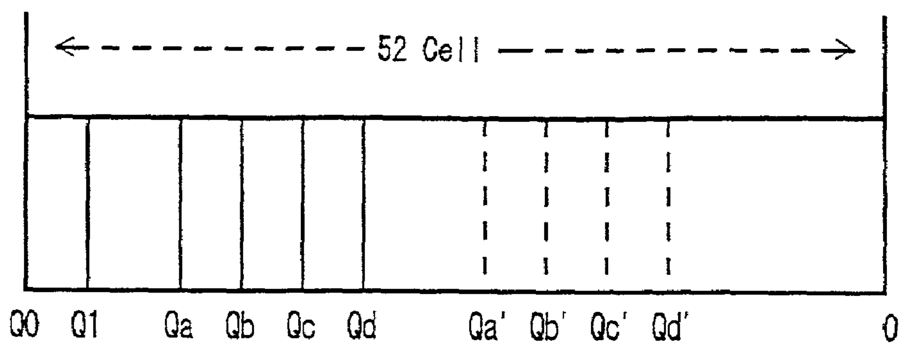

Q0 : PHYSICAL MAXIMUM OF BUFFER
Q1 : PHYSICAL MAXIMUM OF BUFFER
Qa : CELL DISCARD PROCESS STARTING THRESHOLD OF CELL HAVING "P" BIT= "0" , "CON" BIT= "0"
Qb : CELL DISCARD PROCESS STARTING THRESHOLD OF CELL HAVING "P" BIT= "0" , "CON" BIT= "1"
Qc : CELL DISCARD PROCESS STARTING THRESHOLD OF CELL HAVING "P" BIT= "1" , "CON" BIT= "0"
Qd : CELL DISCARD PROCESS STARTING THRESHOLD OF CELL HAVING "P" BIT= "1" , "CON" BIT= "1"
Qa' : CELL DISCARD PROCESS RELEASING THRESHOLD OF CELL HAVING "P" BIT= "0" , "CON" BIT= "0"
Qb' : CELL DISCARD PROCESS RELEASING THRESHOLD OF CELL HAVING "P" BIT= "0" , "CON" BIT= "1"
Qc' : CELL DISCARD PROCESS RELEASING THRESHOLD OF CELL HAVING "P" BIT= "1" , "CON" BIT= "0"
Qd' : CELL DISCARD PROCESS RELEASING THRESHOLD OF CELL HAVING "P" BIT= "1" , "CON" BIT= "1"

F I G. 1 3 9

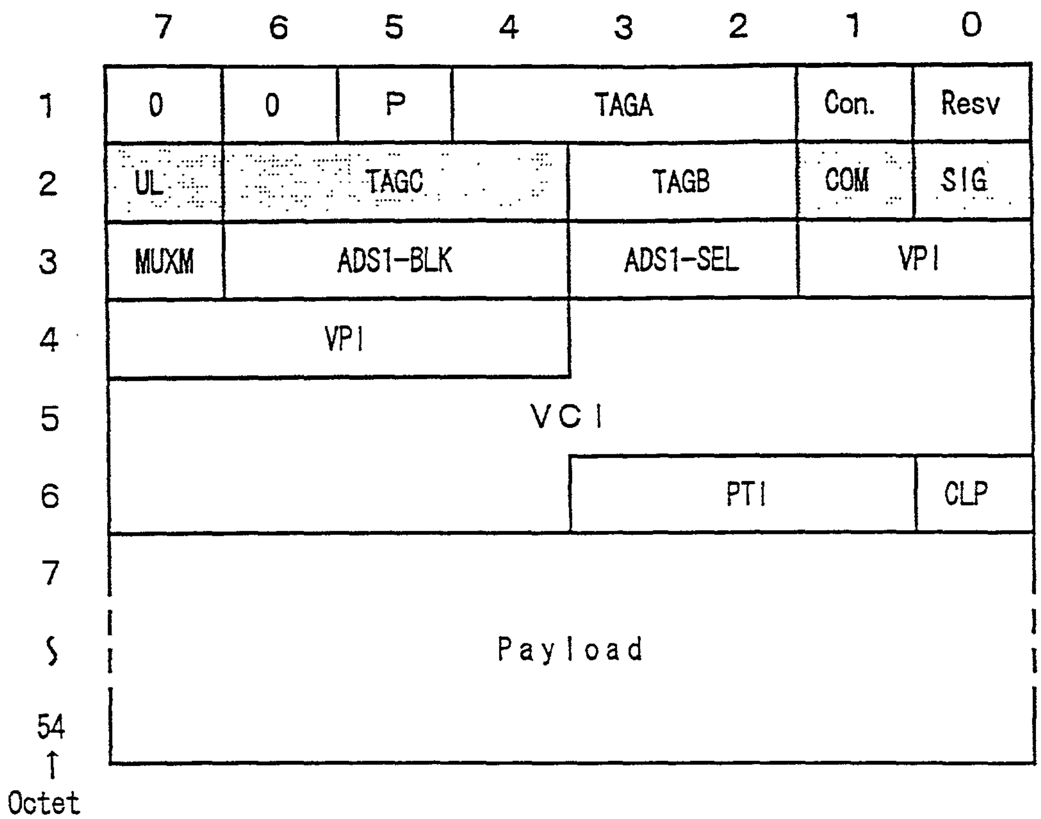

"0" : ONE-TO-ONE COMMUNICATIONS MODE (NO COPY MODE)
0 : INTERNAL TEST CELL INDICATOR
("0":USER CELL, "1":INTERNAL CELL)
P : QUALITY INDICATOR
CON : PRIORTY CLASS INDICATOR
RES : RESERVE BITS
PTI : PAYLOAD TYPE
TAGA : 2.4G 4×4 TAG
TAGB : 2.4G → 600M 4 HIGHWAY TAG
COM : SELECTING COMMON UNIT
SIG, UL, TAGC : TAG FOR SMALLER THAN 600M
MUXM : MUX MULTICAST
ADS1 BLK : TAG FROM MUX TO ADS1 BLOCK
ADSI SEL : TAG TO ADS1
: USED IN SIFCOM DMUX

F I G. 142

| SIG | UL | TAGC | COM | TRANSMISSION LINE |
|---|---|---|---|---|
| 0/1 | 0 | 000 | 0 | SIFSH0 Line#0/Signal |
| 0/1 | 0 | 001 | 0 | 〃 Line#1/Signal |
| | | ∫ | | ∫ |
| 0/1 | 0 | 111 | 0 | SIFSH0 Line#7/Signal |
| 0/1 | 1 | 000 | 0 | SIFSH1 Line#0/Signal |
| 0/1 | 1 | 001 | 0 | 〃 Line#1/Signal |
| | | ∫ | | |
| 0/1 | 1 | 111 | 0 | SIFSH1 Line#7/Signal |
| 1 | 0 | 000 | 1 | SIFSH0 Common Signal |
| 1 | 1 | 000 | 1 | SIFSH1 Common Signal |

FIG. 143

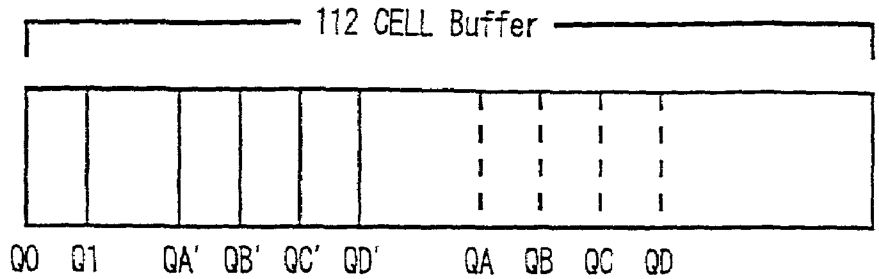

Q0 : PHYSICALLY FULL
Q1 : PHYSICALLY FULL
QA : CELL DISCARD PROCESS STARTING THRESHOLD OF CELL HAVING "P" BIT= "0" , "CON" BIT= "0"
QB : CELL DISCARD PROCESS STARTING THRESHOLD OF CELL HAVING "P" BIT= "0" , "CON" BIT= "1"
QC : CELL DISCARD PROCESS STARTING THRESHOLD OF CELL HAVING "P" BIT= "1" , "CON" BIT= "0"
QD : CELL DISCARD PROCESS STARTING THRESHOLD OF CELL HAVING "P" BIT= "1" , "CON" BIT= "1"
QA' : CELL DISCARD PROCESS RELEASING THRESHOLD OF CELL HAVING "P" BIT= "0" , "CON" BIT= "0"
QB' : CELL DISCARD PROCESS RELEASING THRESHOLD OF CELL HAVING "P" BIT= "0" , "CON" BIT= "1"
QC' : CELL DISCARD PROCESS RELEASING THRESHOLD OF CELL HAVING "P" BIT= "1" , "CON" BIT= "0"
QD' : CELL DISCARD PROCESS RELEASING THRESHOLD OF CELL HAVING "P" BIT= "1" , "CON" BIT= "1"

FIG. 145

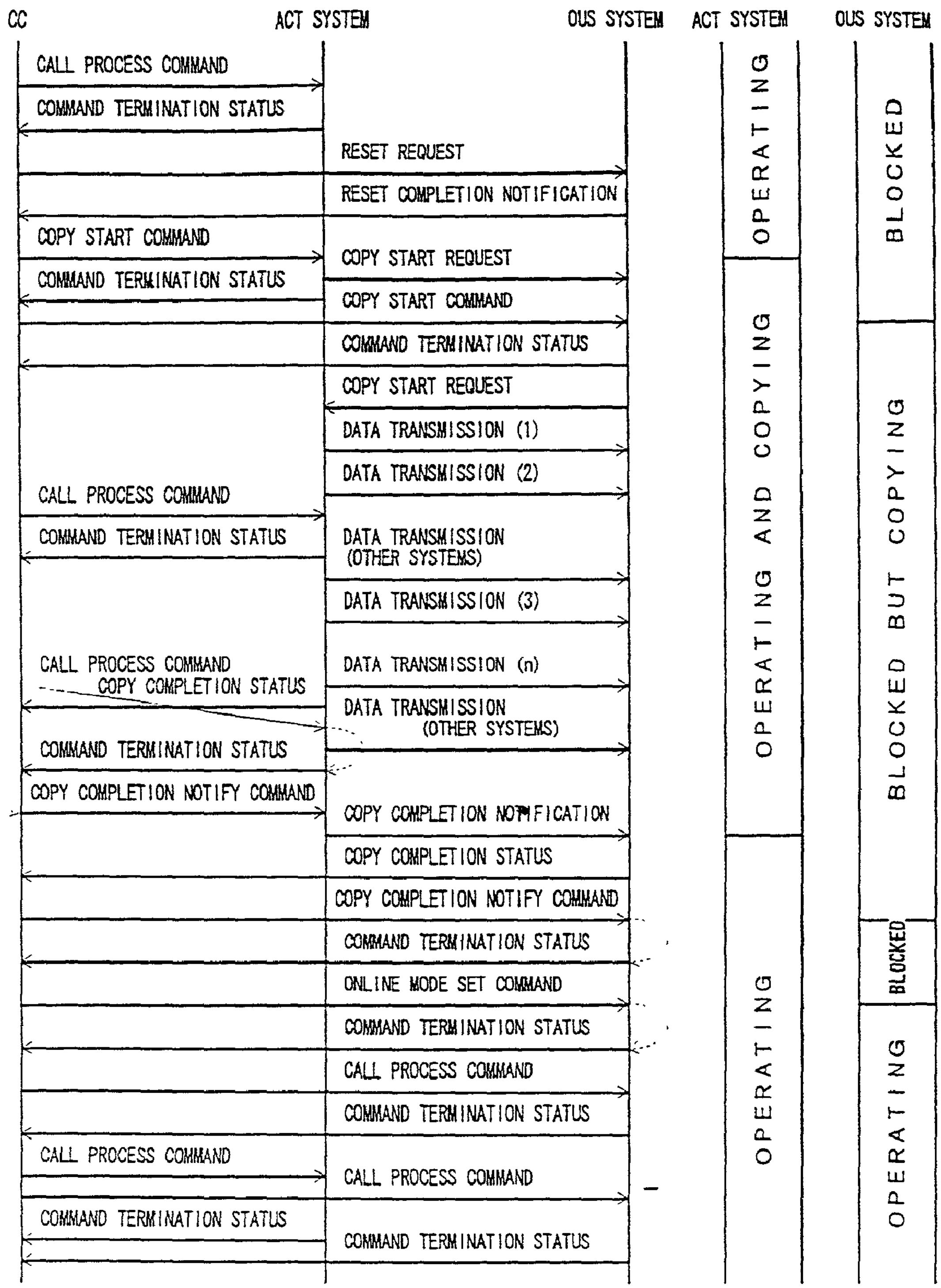
F I G. 1 4 8

| ACT SYSTEM STATUS | OUS SYSTEM STATUS | IS COPY ALLOWED ? | PROCESS OF CC |
|---|---|---|---|
| COPY CIMPLETION REPORT | COPY CIMPLETION REPORT | ○ | COPY COMPLETION COTIFICATION COMMAND IS ISSUED TO ACT SYSTEM AND OUS SYSTEM. |
| COPY CIMPLETION REPORT | COPY DISABLED OR NOT REPORTED | × | COPY COMPLETION NOTIFICATION COMMAND IS ISSUED TO ACT SYSTEM.<br>OUT SYSTEM IS RESET AND RETRIED.<br>IF RETRY IS ALLOWED,<br>VCC IS INDIVIDUALLY SET IN OUS SYSTEM. |
| COPY DISABLED OR NOT REPORTED | COPY CIMPLETION REPORT | × | |
| COPY DISABLED OR NOT REPORTED | COPY DISABLED OR NOT REPORTED | × | |

F I G. 1 4 9

| FAULT POINT | DETECTION LOGIC AND DETECTION POINT | FAULT NOTIFICATION | DETECTION CYCLE |
|---|---|---|---|
| OBP FAULT,<br>CLOCK DISCONNECTION,<br>REF. CLOLK DISCONNECTION,<br>WATCH DOG OVERFLOW | MATE SYSTEM SIFCOM FIRMWARE MONITORS PERIODCALLY. | REPORTED FROM SOFTWARE OF MATE SIFCOM | |
| PARITY ERROR DURING VCC COPY | ACT SYSTEM SIFCOM FIRMWARE MONITORS CONSTANTLY. | REPORTED FROM SOFTWARE OF ACT SYSTEM SIFCOM. | |
| INDIVIDUAL INTERFACE UNIT HARDWARE FAULT | HOME SYSTEM SIFCOM FIRMWARE MONITORS PERIODICALLY. | REPORTED FROM SOFTWARE OF HOME SYSTEM SIFCOM. | 1sec × 2 |
| COMMON UNIT HARDWARE FAULT | HOME SYSTEM SIFCOM FIRMWARE MONITORS PERIODICALLY, AND NOTIFY MATE SYSTEM THROUGH SIC. | REPORTED FROM SOFTWARE OF BOTH SYSTEM SIFCOMS | 250ms × 2 |
| −48V DISCONNECTION (POWER PKG MISSING, AMPLIFIER CONNECTOR MISSING) | MATE SIFCOM PERIODICALLY MONITORS. | REPORTED FROM SOFTWARE OF MATE SIFCOM | 250ms × 2 |
| −48V INDIVIDUAL UNIT FUSE DISCONNECTION | SIFCOMS OF BOTH SYSTEMS, PERIODICALLY MONITORS. | REPORTED FROM SOFTWARE OF HOME SYSTEM SIFCOM. | 250ms × 2 |
| −48V COMMON UNIT FUSE DISCONNECTION | MATE SYSTEM SIFCOM PERIODICALLY MONITORS. | REPORTED FROM SOFTWARE OF HOME SYSTEM SIFCOM. | 250ms × 2 |
| SIFCOM PKG MISSING | MATE SYSTEM SIFCOM PERIODICALLY MONITORS. | REPORTED FROM SOFTWARE OF MATE SIFCOM | 250ms × 2 |

F I G. 163

| | 7 | | 0 |
|---|---|---|---|
| 1 | MSB LI (0CH) | | |
| 2 | | | LSB |
| 3 | APID (06H) | | |
| 4 | APID (04H) | | |
| 5 | MSGCD (00H) | | |
| 6 | MSGCD (06H) | | |
| ~ | | | ~ |
| D | — | | Unit No. |
| E | UL * | TAG C * | — |

* : VALUES OF UL AND TAG-C TO BE CHANGED

FIG. 166

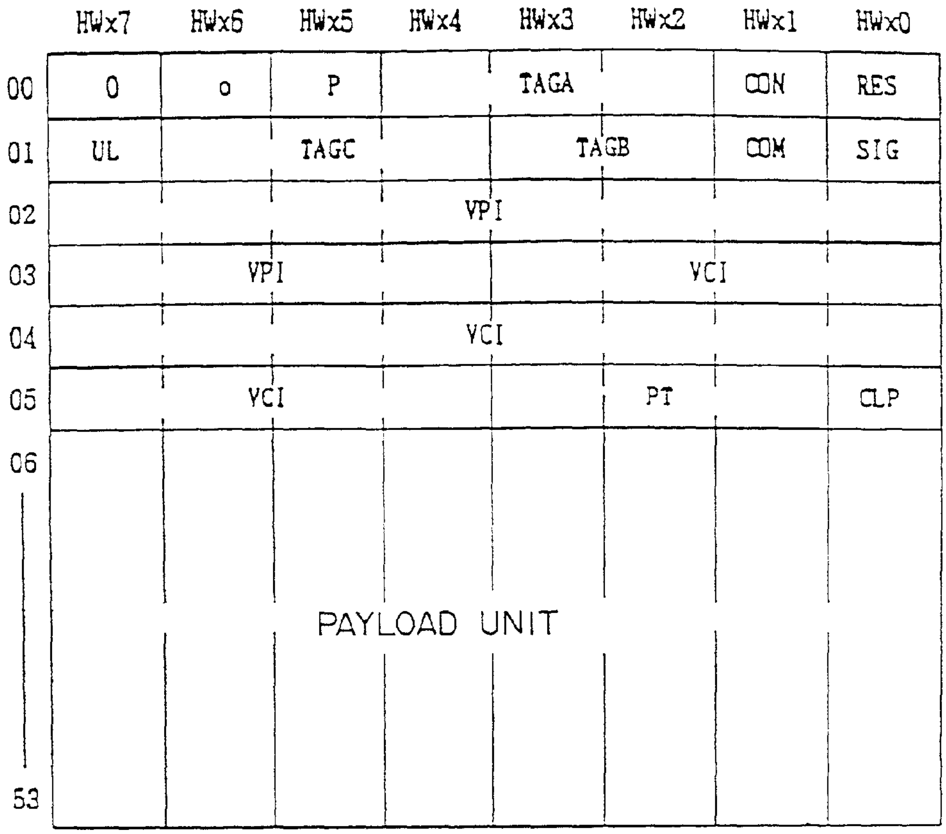

TAG AREA

0 : Fixed zero (COPY INDICATION 0 REFERS TO 1 : 1 COMMUNICATIONS.)
o : Test bit
P : Priority bit (CLP の copy) (0:High priority)
TAGA : 2.4G 4x4 Switch TAG
TAGB : 2.4GHW ⇒ 622MHW Demultiplex TAG
TAGC : 622MHW ⇒ 155MHW Demultiplex TAG
CON : Congestion Control bit (IMPORTANT CALL IDENTIFICATION)
RES : reserve
COM : COMMON UNIT IDENTIFICATION IN TERMINAL DEVICE (1: COMMON UNIT)
SIG : INTRA-STATION LAP CELL (1: LAP CELL)

ATM Header AREA

VPI : Virtual Path Identifier
VCI : Virtual Channel Identifier
PT : Payload Type
CLP : Cell Loss Priority bit

FIG. 170

| DIRECTION | SIGNAL NAME | BIT NUMBER | TRANSMISSION FORMAT | SIGNAL FORMAT | REMARKS |
|---|---|---|---|---|---|
| PIFA→ASSW | SRCLKC | 1 | V 1 1 BALANCE (1 : 1) | ←→ 250nsec | |
| | SBACK | 1 | | | BUS USE RIGHT PERMISSION |
| | RESET | 1 | | | PULSE WIDTH : 500nsec P-ON-R or M-RST |
| | SYSEL | 1 | | | SBY ACT |
| ASSW→PIFA | SRCLKL | 1 | V 1 1 BALANCE (1 : 1) | ←→ 250nsec | |
| | SBRQ | 1 | | | BUS USE REQUEST |
| | ALM | 1 | | | NORMAL VALUE ALARM |
| BI-DIRECTIONAL | SB0 ~ 7 | 8 | V 1 1 BALANCE BI-DIRECTIONAL | | |
| | SBPTY | 1 | | | |

| SYSTEM SELECTION SIGNAL | | SELECTION AT TERMINAL DEVICE |
|---|---|---|
| HOME SYSTEM SW SELECTION INDICATION | MATE SYSTEM SW SELECTION INDICATION | |
| SELECTING SYSTEM 0 | SELECTING SYSTEM 0 | SYSTEM 0 |
| SELECTING SYSTEM 1 | SELECTING SYSTEM 1 | SYSTEM 1 |
| SELECTING SYSTEM 0 | SELECTING SYSTEM 1 | RETAINING PREVIOUS STATE |
| SELECTING SYSTEM 1 | SELECTING SYSTEM 0 | RETAINING PREVIOUS STATE |

FIG. 174

| SIGNAL NAME | SENDING/RECEIVING | LEVEL | MEANING OF SIGNAL |
|---|---|---|---|
| IHWCKx | RECEIVING | ECL | 155.52 MHz INPUT CLOCK |
| IHWxx | | ECL | 2.4G INPUT HW 16-BIT PARALLEL DATA |
| IHWFPx | | ECL | INPUT CELL FRAME PULSE |
| IHWENx | | ECL | INPUT CELL ENABLE |
| IHWxP | | ECL | ODD PARITY FOR 16-BIT INPUT DATA |
| JISOx | | TTL | 2.4G HW IMPLEMENTATION INDICATION |
| SWCK | | ECL | SW BUFFER READING 155.52 MHz CLOCK |
| SWSYN | | ECL | |
| OHWCKx | SENDING | ECL | 155.52 MHz OUTPUT CLOCK |
| OHWxx | | ECL | 2.4G OUTPUT HW 16-BIT PARALLEL DATA |
| OHWFPx | | ECL | OUTPUT CELL FRAME PULSE |
| OHWENx | | ECL | OUTPUT CELL ENABLE |
| OHWxP | | ECL | ODD PARITY FOR 16-BIT OUTPUT DATA |
| Dxx | BIDIRECTIONAL | TTL | PROCESSOR DATA BUS |
| Axx | | TTL | PROCESSOR ADDRESS BUS |
| WR | | TTL | WRITE REQUEST SIGNAL |
| RD | | TTL | READ REQUEST SIGNAL |
| PKGCS | RECEIVING | TTL | PACKAGE SELECTION |
| RESET | | TTL | POWER-ON, OR OF M-RST |
| ALM | SENDING | TTL | NG-OR OF FAULT MONITOR POINT IN EACH PACKAGE |
| BUSY | | TTL | - |

F I G. 1 7 6

| SIGNAL NAME | SENDING/RECEIVING | LEVEL | MEANING OF SIGNAL |
|---|---|---|---|
| IHWCK | RECEIVING | ECL | 155.52 MHz INPUT CLOCK |
| IHWx | | ECL | 2.4G INPUT HW 16-BIT PARALLEL DATA |
| IHWFP | | ECL | INPUT CELL FRAME PULSE |
| IHWEN | | ECL | INPUT CELL ENABLE |
| IHWP | | ECL | ODD PARITY FOR 16-BIT INPUT DATA |
| MDXCK | | TTL | MUX BUFFER READING 155.52 MHz CLOCK |
| MDXSYN | | ECL | |
| OHWCK | SENDING | ECL | 155.52 MHz OUTPUT CLOCK |
| OHWx | | ECL | 2.4G OUTPUT HW 16-BIT PARALLEL DATA |
| OHWFP | | ECL | OUTPUT CELL FRAME PULSE |
| OHWEN | | ECL | OUTPUT CELL ENABLE |
| OHWP | | ECL | ODD PARITY FOR 16-BIT OUTPUT DATA |
| JSOU | | ECL* | 2Z4G HW IMPLEMENTATION INDICATION |
| Dxx | BIDIRECTIONAL | TTL | PROCESSOR DATA BUS |
| Axx | | TTL | PROCESSOR ADDRESS BUS |
| WR | | TTL | WRITE REQUEST SIGNAL |
| RD | | TTL | READ REQUEST SIGNAL |
| PKGCS | RECEIVING | TTL | PACKAGE SELECTION |
| RESET | | TTL | POWER-ON, OR OF M-RST |
| ALM | SENDING | TTL | NG-OR OF FAULT MONITOR POINT IN EACH PACKAGE |
| BUSY | | TTL | – |

FIG. 178

| SIGNAL NAME | SENDING/RECEIVING | LEVEL | MEANING OF SIGNAL |
|---|---|---|---|
| Dxx | BIDIRECTIONAL | TTL | PROCESSOR DATA BUS |
| Axx | | TTL | PROCESSOR ADDRESS BUS |
| WR | | TTL | WRITE REQUEST SIGNAL |
| RD | | TTL | READ REQUEST SIGNAL |
| PKGCS | SENDING | TTL | PACKAGE SELECTION |
| RESET | | TTL | POWER-ON, OR OF M-RST |
| ALM | RECEIVING | TTL | NG-OR OF FAULT MONITOR POINT IN EACH PACKAGE |
| BUSY | | TTL | |

FIG. 180

| BLOCK NAME | FUNCTION |
| --- | --- |
| SWMDX | CELLS ARE MULTIPLEXED FROM 620 MBPS FULL ATM HIGHWAY TO 2.4 GBPS HIGHWAY IN SWITCH<br>CELLS ARE DEMULTIPLEXED FRON 2.4 GBPS HIGHWAY IN SWITCH 620 MB S FULL ATM HIGHWAY<br>TRAFFIC MEASUREMENT FUNCTION AND CONGESTION CONTROL FUNCTION |
| SWMX | 4 ×4 SELF-ROUTING IN 2.4 GBPS HIHGWAY<br>CONGESTION CONTROL FUNCTION |
| SWCNT | INTERFACE WITH DUPLEX CC<br>FAULT MONITOR IN DEVICE |
| SWTIF | DISTRIBUTING ACT SIGNAL OF DUPLEX SYSTEM TO EACH TERMINAL DEVICE COMMON UNIT |
| SCLK | SELECTING SYSTEM OF CLK#0/1<br>GENERATING 155.52 MHZ FROM SELECTED 10.368 MSZ AND DISTRIBUTING IT TO EACH UNIT |
| POW | NECESSARY POWER SOURCE IS SUPPLIED IN DEVICE |

FIG. 181

CSP : Cell Serial/Paralell Convertor
AMUX : ATM cell Multiplexer
ADMUX : ATM cell Demultiplexer
TRFM : Traffic Monitor

| BLOCK NAME | FUNCTION |
|---|---|
| CSP | ·CONVERSION FROM 622 MBPS HIGHWAY 16 PARALLEL (TTL) TO 8 PARALLEL (ECL)<br>·CONVERSION FROM 622 MBPS HIGHWAY 8 PARALLEL (ECL) TO 16 PARALLEL (TTL)<br>·CHECKING PARITY IN INPUT HIGHWAY<br>·GENERATING PARITY IN OUTPUT HIGHWAY |
| AMUX | ·FOUR 622 MBPS HIGHWAYS ARE CELL-MULTIPLEXED INTO 2.4 GBPS HIGHWAYS<br>·CHECKING PARITY IN INPUT HIGHWAY<br>·GENERATING PARITY IN OUTPUT HIGHWAY<br>·GENERATING AND CHECKING PARITY OF INTERNAL BUFFER |
| ADMUX | ·2.4 GBPS HIGHWAY IS DEMULTIPLEXED INTO FOUR 622 MBPS HIHGWAYS ACCORDING TO TAG INFORMATION IN CELL<br>·CHECKING PARITY IN INPUT HIGHWAY (CELL IS DISCARDED IF HEADER PARITY ERROR OCCURS)<br>·GENERATING PARITY IN OUTPUT HIGHWAY<br>·GENERATING AND CHECKING PARITY OF INTERNAL BUFFER<br>·OUTPUTTING CELL DISCARD NOTIFICATION, VALID CELL PASSING NITOFICATION, AND TRAFFIC MEASUREMENT HEADER INFORMATION<br>·SERVICE CLASS IS CONTROLLED BY P BIT WHEN DMUX BUFFER USE EXCEEDS THRESHOLD. (REFER TO TRAFFIC CONTROL FOR DETAILS) |
| TRFM | ·SETTING AND READING PARAMETER FROM PROCESSOR (COUNTING NUMBER OF CELLS ARRIVING AND DISCARDED AT EACH OUTPUT LINE ACCORDING TO TRAFFIC INFORMATION FROM ADMUX) |

FIG. 183

SWCNT : Switch Controller
ATMSW : ATM Switch
REG : Register
PRINF : Processor Interface

| BLOCK NAME | FUNCTION |
|---|---|
| SWCNT | ·CELL READ FROM ATMSW IS CONTROLLED.<br>·ATMSW USE OF BUFFER IS MONITORED.<br>·SERVICE CLASS IS CONTROLLED BY P BIT WHEN BUFFER USE EXCEEDS THRESHOLD. |
| ATMSW | 2×2 SELF-ROUTING SWITCH OF 2.4 GBPS HIGHWAY |
| REG | RETIMING INPUT HIGHWAY FROM SWMDX AND DISTRIBUTING IT TO ATMSWM |
| PRINF | SETTING AND READING PARAMETER FROM PROCESOR |

FIG. 185

MPU : Micro-processor
IOC : I/O Controller
TIM : TIMER
ROM : Read Only Memory
RAM : Random Access Memory
SBINF : Switch Bus Interfacer
DLC : Data Link Controller
DMAC : DMA controller
DBINF : Debug Interfacer
DET : Fault Detecter
CNT : Interupt Controller

| BLOCK NAME | FUNCTION |
| --- | --- |
| MPU | SW UNIT CONTROL PROCESSOR |
| IOC | RECEIVING INTERRUPT REQUEST FROM I/O DEVICE AND CONTROLLING INTERRUPTION PROCESS |
| TIM | GENERATING FIRMWARE MONITOR TIMER AND DBINF COMMUNICATIONS CLOCK |
| ROM | STORING SW UNIT CONTROL PROGRAM |
| RAM | USED AS CONTROL PROCESSOR WORK AREA |
| SBINF | INTERFACING BETWEEN PIFA-SW BUS AND CONTROL PROCESSOR BUS. PERFORMING CC ACCESS PROCESS, DMA ACCESS PROCESS, AND MSCN PROCESS. |
| DLC | SERIAL COMMUNICATIONS CONTROLLER TO ESTABLISH COMMUNICATIONS WITH MATE SYSTEM |
| DMAC | DMA CONTROLLER FOR CONTROLLING DLC 4 CHANNEL |
| DBINF | DEBUGGING RS232C INTERFACE |
| DET | CONNECTING FAULT INFORMATION |
| CNT | CONTROLS VARIOUS INTERRUPTION INFORMATION |

FIG. 187

PIC : Processor Interface Controller
CIC : Communication Interface Controller
INF : Lower Unit Interfacer

| BLOCK NAME | FUNCTION |
|---|---|
| PIC | CONTROLLING INTERFACE WITH SW UNIT CONTROL PROCESSOR (i80C186)<br>SELECTING LINE, REPORTING INTERRUPTION OCCURRENCE, ETC. |
| CIC | CONTROLLING INTERFACE WITH SWCNT DLC |
| INF | DETECTING COMMUNICATIONS CONTROL SIGNAL TO SW EXTENSION (NOT EXISTING)<br>MONITORING PROCESSOR FAULT IN SW EXTENSION (NOT EXISTING) |

FIG. 189

CKD : Clock Down Detector
CKS : Clock Select Controller
SEL : Clock Selectore
PLL : Phase Lock Loop
TIM : Timing Generator

| BLOCK NAME | FUNCTION |
|---|---|
| CKD | DETECTING DISCONNECTION OF SYSTEM CLOCK FROM CLOCKS 0 AND 1 SYSTEMS<br>DETECTING DISCONNECTION FROM OUTPUT CLOCK FROM PLL |
| CKS | SELECTING SYSTEM OF SYSTEM CLOCK<br>(AUTONOMOUS SWITCH ACCORDING TO INFORMATION FROM CLKD)<br>NOTIFYING SWCNT OF CLOCK FAULT AND SYSTEM SELECTION STATE |
| SEL | SELECTING AND OUTPUTTING CLOCK TO BE USED IN SRSW ACCORDING TO CONTROL SIGNAL OF CKS |
| PLL | GENERATING 155.5 MHZ FROM REFERENCE CLOCK 10.368 MHZ |
| TIM | GENERATING CLOCK/READ FRAME PULSE TO BE SUPPLIED TO SWMX AND SWMDX<br>SYNCHRONIZING READ FRAME PULSE ACCORDING TO SYNCHRONIZATION SIGNAL FROM MATE SYSTEM AT INITIALIZATION |

FIG. 191

| SERVICE ( CELL DISCARD CLASS ) | CLP | P |
|---|---|---|
| Assured service (High priority) | 0 | 0 |
| Assured service (Low priority) | 1 | 0 |
| Non-assured service | 1 | 1 |

FIG. 192

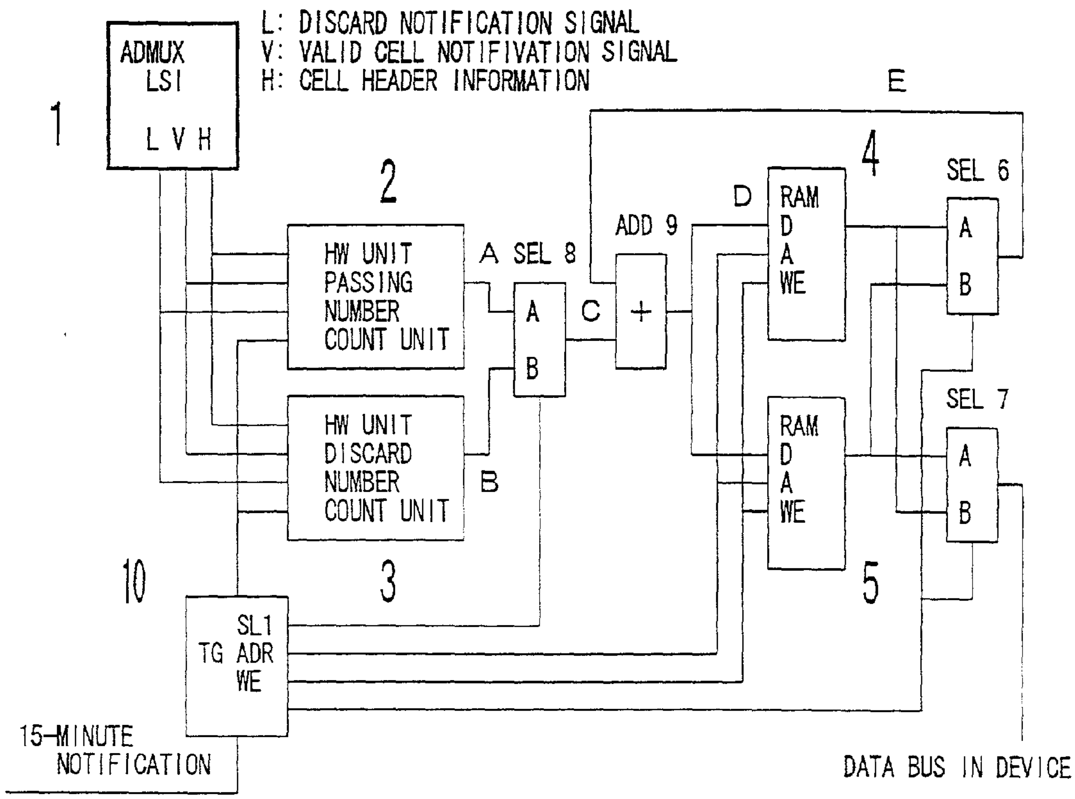
F I G. 1 9 3

(1) READ/WRITE READ : 1 WRITE : 0
(2) ORDER/ANSWER ORDER : 1 ANSWER : 0
(3) ERROR1 ERROR EXISTING : 1 ERROR NOT EXSITING : 0
(4) ERROR2 ERROR EXISTING : 1 ERROR NOT EXSITING : 0

| ORDER TYPE | IN/OUT | ORDER | | MSB 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | LSB 00 |
|---|---|---|---|---|---|---|---|---|---|---|---|---|---|---|---|---|---|---|---|---|---|---|---|---|---|---|---|---|---|---|---|---|---|---|---|
| | | | | CONTENTS OF COMMANDS | | | | | | | | | | | | | | | | | | | | | | | | | | | | | | | |
| COMMAND ACTIVATION | OUT | 0010 | A | 1 | D C | | | | | | (1) | D C | | | O | D C. | | | | | | | | | | | | | | | | ORDER | | | |
| | | | D | DC | NUMBER OF COMMANDS | | | | | | | COMMAND ADDRESS | | | | | | | | | | | | | | | | | | | | | | | |
| RETRY INSTRUC-TION | OUT | 0100 | A | 1 | D C | | | | | | (1) | D. C. | | | O | D. C. | | | | | | | | | | | | | | | | ORDER | | | |
| | | | D | D. C. | | | | | | | | | | | | | | | | | | | | | | | | | | | | | | | |
| MSCN READ | IN | 1000 | A | 1 | D C | | | | | | (1) | D. C | | | O | D C. | | | | | | | | | | | | | | | | ORDER | | | |
| | | | D | MSCN READ DATA | | | | | | | | | | | | | | | | | | | | | | | | | | | | | | | |
| WRITIN TEST LOOP-BACK DATA | OUT | 0001 | A | 1 | D C. | | | | | | (1) | D C | | | O | D C. | | | | | | | | | | | | | | | | ORDER | | | |
| | | | D | LOOPBACK DATA | | | | | | | | | | | | | | | | | | | | | | | | | | | | | | | |
| READING TEST LOOP-BACK DATA | IN | 1001 | A | 1 | D. C | | | | | | (1) | D. C. | | | O | D C. | | | | | | | | | | | | | | | | ORDER | | | |
| | | | D | LOOPBACK DATA | | | | | | | | | | | | | | | | | | | | | | | | | | | | | | | |

F I G. 1 9 9

| LINE ADDRESS 1byte | CONTROL FIELD 1byte | MSCN SETTING BIT 1byte | ADDITIONAL INFOMATION 1byte | FAULT DETAILS WRITE DATA 4byte |
|---|---|---|---|---|

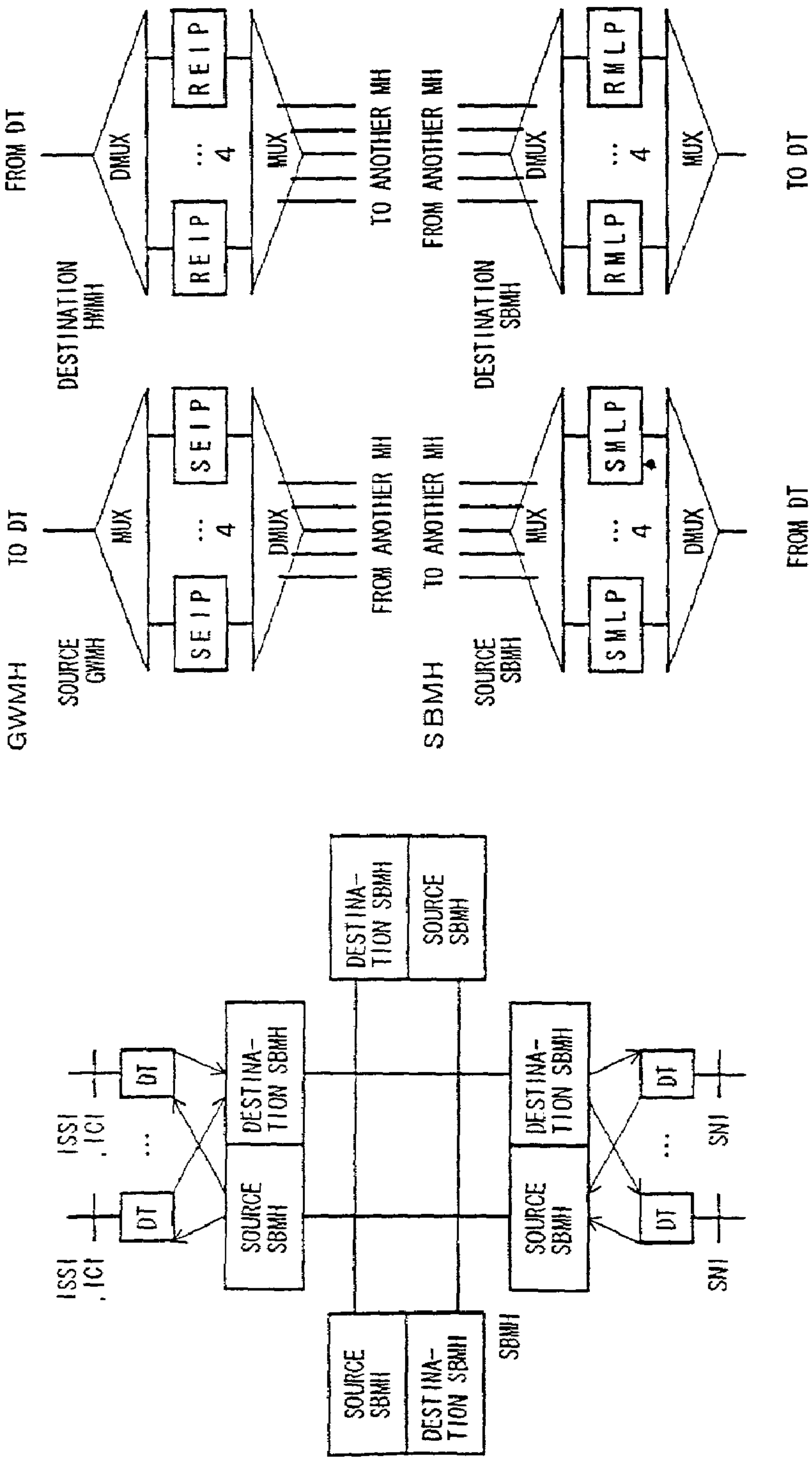
F I G. 2 1 1

BOM : Beginning of Message
COM : Continuation of Message
EOM : End of Message
SAR : Segmention and Re-assembly

VCI/MID ALLOCATING SYSTEM BY CELL TYPE

| | OUTPUT VCI DETERMINING SYSTEM | OUTPUT MID DETERMINING SYSTEM |
|---|---|---|
| SSM | DETERMINED BY DA FULL ANALYSIS | ASSIGNING NON-USED MID |
| BOM | | |
| COM | RETRIEVING ROUTING MEMORY BY INPUT VCI/MID | |
| EOM | | |

FIG. 214

| | | SOURCE SNI | SOURCE SBMH | | DESTINATION SBMH | |
|---|---|---|---|---|---|---|
| | | | DMUX | SMLP | RMLP | RMLP |
| ROUTING FUNCTION | | VCI ALLOCATION<br>MID ALLOCATION | LP<br>DISTRIBUTION | VCI CONVERSION<br>MID CONVERSION | LP<br>DISTRIBUTION | VCI CONVERSION<br>MID CONVERSION |
| USAGE INFORMATION | BOM, SSM | NONE | TAG | DA | DA | DA |
| | COM, EOM | | | VCI , MID | VCI , MID | VCI , MID |

FIG. 215

| SNI No | VPI (hex) | VCI (hex) |
|---|---|---|
| SNI# 0 | 03f | 0300 |
| SNI# 1 | 03f | 0301 |
| ⋮ | ⋮ | ⋮ |
| SNI#31 | 03f | 031f |

FIG. 216

| DESTINATION MH | VPI (hex) | VCI (hex) |
|---|---|---|
| SBMH# 0<br>:<br>SBMH#31 | 03f<br>:<br>03f | 0300<br>:<br>031f |
| GWMH# 0<br>:<br>GWMH#31 | 03f<br>:<br>03f | 0340<br>:<br>035f |

NOTE : VCI INDICATES NUMBER OF RECEIVING MH BETWEEN SENDING MH AND ASSW, AND NUMBER OF SENDING MH BETWEEN ASSW AND RECEIVMG MH.

F I G. 2 1 9

| SMLP | RANGE OF MID (hex) |
| --- | --- |
| SMLP#0 | 000 ~ 0ff |
| SMLP#1 | 100 ~ 1ff |
| SMLP#2 | 200 ~ 2ff |
| SMLP#3 | 300 ~ 3ff |

FIG. 221

※1: DISCARDED IF THERE IS NO SNI TO ACCOMMODATE CORRESPONDING GA IN DESTINATION SBMH

| | DETERMIN-ATION | DETERMIN-ATION AREA | PROCESS EXAMPLES |
|---|---|---|---|
| SMLP | SOURCE SNI | INPUT VCI | Screening, Traffic Measure, Etc. |
| | L3 PDU | INPUT VCI/MID | SN Check, Routing, Etc. |
| RMLP | DESTINA-TION SNI | OUTPUT VCI | Screening, Traffic Measure, Etc. |
| | L3 PDU | OUTPUT VCI/MID | Routing Egress Restriction, Etc. |

| ITEM | BLOCK NAME | CONTENTS | PROCESS FOR EACH OBJECT CELL | | | | PWCB |
|---|---|---|---|---|---|---|---|
| | | | SUB | ME | CC | MS | |
| 01 | INTER-CONNECTIOM SELECTION S | SELECTING MDX ACT SYSTEM DATA ACCORDING TO SWITCH SYSTEM INFORMATION. LOSING TCG CELL. | ○ | — | — | — | HMH 03A |
| 02 | TEST CELL MULTIPLEXING | MULTIPLEXING TEST CELL WHEN LINE IS IDLE. PRIORITIZING TEST CELL DURING DIAGNOSTICS. | ○ | ○ | — | — | |
| 03 | CRC-10 CHECK S | CRC DIVING CELL PAYLOAD CHECKING FOR ERRORS. | ○ | × | — | — | |
| 04 | PL LENGTH CHECK S | CHECKING WHETHER OR NOT PAYLOAD LENGTH INDICATES PREDEYERMINED VALUE. | ○ | × | ○ | — | |
| 05 | MID VALUE CHECK S | CHECKING WHETHER OR NOT MID VALUEE IS PREDEYERMINED VALUE. | ○ | × | ○ | — | |
| 06 | MID CHECK S | CHECKING WHETHER VCI/MID IS NOT ACTIVE AT BOM, AND WHETHER VCI/MID IS ACTIVE AT COM AND EOM. | ○ | × | △ | — | |
| 07 | SN CHECK S | INITIALIZING SN AT BOM AND SSM. AND CHECKING ORDER OF SN AT COM AND EOM | ○ | × | △ | — | |
| 08 | AT CHECK S | CHECKING WHETHER OR NOT ADDRESS TYPE INDICATES PREDETERMINED VALUE. | ○ | × | ○ | — | |
| 09 | DA CHECK S | CHECKING WHETHER DA IS NOT IA ENTERED IN INPUT SNI. | ○ | × | ○ | — | |
| 10 | BAsize CHECK S | CHECKING WHETHER OR NOT BA SIZE INDICATES PREDETERMINED VALUE. | ○ | × | ○ | — | |
| 11 | INGRESS FLOW CHECK S | CHECKING WHETHER OF NOT SNI OF DS3 MEETS ACCESS CLASS OF CLASSES 1-4. | ○ | × | × | — | |
| 12 | ERROR EDITION I | ALLOCATING ERROR CHECKED BY EACH CHECKER TO EACH POSITION OF ERROR FLAG. | ○ | × | ○ | — | |
| 13 | SIMULTANEOUS INPUT NUMBER CHECK S | LIMITING NUMBER OF MID SIMULTANEOUSLY INPUT FROM 1 SNI TO 1 OR 16. | ○ | × | ○ | ○ | HMH 04A |
| 14 | MRI TIMEOUT CHECK S | CHECKING TIME FROM BOM TO EOM IN 1 L3 PDU UNITS. | ○ | × | ○ | ○ | |
| 15 | HEL CHECK S | CHECKING WHETHER OR NOT HEADER EXTENSION LENGTH INDICATES PREDETERMINED VALUE. | ○ | × | — | × | |
| 16 | HE FORMAT CHECK S | CHECKING FORMAT OF HEADER EXTENSION. | ○ | × | — | × | |

SUB : SNI LOOPBACK TEST CELL ME : INTER-MH PVC TEST CELL CC : CRC-10-ERROR CELL MS : MASTER ERROR CELL
○ : APPLIED FOR PROCESS OBJECT OR DURING PROCESS × : NOT OBJECT OF PROCESS
— : NO CELL PASSES OR NO RELATED CELLS △ : CHECKING BUT NO WRITING TO MEMORY

| ITEM | BLOCK NAME | CONTENTS | PROCESS FOR EACH OBJECT CELL SUB | ME | CC | MS | PWCB |
|---|---|---|---|---|---|---|---|
| 17 | SA CHECK S | CHECKING WHETHER SA IS AN IA ENTERED IN INPUT SNI. | ○ | × | — | ○ | HMH 04A |
| 18 | DA SCREENING | RECEPTION IS LIMITED AT DA IN INPUT SNI UNITS. SHARED WITH TABLE OF RMLP SA SCREENING R. | ○ | × | — | ○ | |
| 19 | BE tag MATCH CHECK S | CHECKING WHETHER OR NOT BE TAG OF SIP L3 HEADER MATCHES BE TAG OF TRAILER. | ○ | × | — | ○ | |
| 20 | BA size MATCH CHECK S | CHECKING WHETHER OR NOT BA SIZE OF SIP L3 HEADER MATCHES BE LENGTH OF TRAILER. | ○ | × | — | ○ | |
| 21 | INFORMATION LENGTH CHECK S | CHECKING WHETHER OR NOT ACTUAL LENGTH OF L3 PDU MATCHES LENGTH OF SIP L3 TRAILER. | ○ | × | — | ○ | |
| 22 | ERROR EDITION II | ALLOCATING ERROR CHECKED BY EACH CHECKER TO EACH POSITION OF ERROR FLAG. | ○ | × | — | ○ | |
| 23 | ENCAPSULATION S | CHANGING SIP INTO FORMAT OF INTER-MH INF. PDU. ADDING ISSI-L3 DTPDU HEADER AND CGV HEADER TO NEW BOM. | ○ | ○ | — | ○ | HMH 05A |
| 24 | CARRIER SELECTION S | SETTING SIP L3 HEADER CARRIER OR CARRIER ENTERED IN SNI UNITS IN CARRIER AREA IN ISSI L3 DTPDU HEADER. | ○ | ○ | — | ○ | |
| 25 | ROUTING S | SPECIFYING, FROM DA, MH(SBMH/GWMH) ACCOMMODATING DESTINATION SNI. | ○ | ○ | — | ○ | |
| 26 | CARRIER SCREENING S | LIMITING SENDING OF CARRIER. | ○ | ○ | — | ○ | |
| 27 | GA COPY S | OUTPUT CELL INPUT AT GA TO EACH SUBSCRIBER. | ○ | ○ | — | ○ | HMH 06A |
| 28 | OUTPUT BAND RESTRICTION S | LIMITING OUTPUT BAND(PEAK RATE) FOR EACH OUTPUT MH. | ○ | ○ | — | ○ | |
| 29 | DISCARD COUNT S | COUNTING NUMBER OF L2 AND L3 MESSAGES DISCARDED BY OUTPUT BAND RESTRICTION AND REPORTING IT TO PM OF LP-COM. | ○ | ○ | — | ○ | |
| 30 | MID ACQUISITION S | ASSIGNING OUTPUT MID TO OUTPUT MH UNIT. | ○ | ○ | — | × | |
| 31 | SN ALLOCATION S | ASSIGNING SEQUENCE NUMBER (SN). | ○ | ○ | — | ○ | |
| 32 | ERROR CELL DISCARD S | MASTER ERROR(MS) OF ERROR FLAG DISCARDS NG CELLS. | ○ | ○ | — | ○ | |

SUB : SNI LOOPBACK TEST CELL ME : INTER-MH PVC TEST CELL CC : CRC-10 ERROR CELL MS : MASTER ERROR CELL
○ : APPLIED FOR PROCESS OBJECT OR DURING PROCESS × : NOT OBJECT OF PROCESS
— : NO CELL PASSES OR NO RELATED CELLS

FIG. 227

| ITEM | BLOCK NAME | CONTENTS | PROCESS FOR EACH OBJECT CELL | | | | PWCB |
|---|---|---|---|---|---|---|---|
| | | | SUB | ME | CC | MS | |
| 33 | μ-P INTERFACE S | INTERFACING WITH MNG μ-P OF HLP01A | — | — | — | — | COMMON TO PWCB |
| 34 | 9MG S | GENERATING CLOCK BASED ON 19M CLOCK RECEIVED FROM HLP02A AND CELL FRAME | — | — | — | — | |
| 35 | 9MCFG S | GENERATING 9M CLOCK BASED ON 19M CLOCK RECEIVED FROM HLP02A AND CELL FRAME, AND REFERENCE CELL FRAME BASED ON SMLP. | — | — | — | — | HMH 03A |

SUB : LOOPBACK TEST CELL  ME : INTER-MH PVC TEST CELL  CC : ERROR CELL  MS : MASTER ERROR CELL
○ APPLIED FOR PROCESS OBJECT OR DURING PROCESS  × NOT OBJECT OF PEOCESS  — : NO CELL PASSES OR NO RELATED CELLS

F I G. 2 2 8

| MESSAGE \ EF | E1 MS | E1 RN | E2 PL | E2 IM | E1 IM | E2 MA | E1 MA | E2 SN | E2 DT | E2 ST | E2 DA | E2 BA | E2 AC | E2 EM | E2 MT | E2 HE | E2 VE | E2 CS | E2 SA | E2 DA | E2 BE | E2 LE | E2 IL | E2 EB | PV C |
|---|---|---|---|---|---|---|---|---|---|---|---|---|---|---|---|---|---|---|---|---|---|---|---|---|---|
| CRC-10 CHECK S | ON | ON | — | — | — | — | — | — | — | — | — | — | — | — | — | — | — | — | — | — | — | — | — | — | M |
| PL LENGTH CHECK S | ON | ON | ON | — | — | — | — | — | — | — | — | — | — | — | — | — | — | — | — | — | — | — | — | — | M |
| MID VALUE CHECK S (S/B) | ON | ON | — | ON | | — | — | — | — | — | — | — | — | — | — | — | — | — | — | — | — | — | — | — | M |
| MID CHECK S (B) | | O | — | — | — | ON | | — | — | — | — | — | — | — | — | — | — | — | — | — | — | — | — | — | M |
| MID CHECK S (E) | ON | O | — | — | — | ON | | — | — | — | — | — | — | — | — | — | — | — | — | — | — | — | — | — | M |
| MID CHECK S (C) | ON | O | — | — | — | | ON | — | — | — | — | — | — | — | — | — | — | — | — | — | — | — | — | — | M |
| SN CHECK S | ON | O | — | — | — | O | O | ON | — | — | — | — | — | — | — | — | — | — | — | — | — | — | — | — | M |
| ADDRESS FORMAT CHECK S (DA) | ON | — | — | — | — | — | — | — | ON | | — | — | — | — | — | — | — | — | — | — | — | — | — | — | M |
| ADDRESS FORMAT CHECK S (SA) | ON | — | — | — | — | ⊥ | — | — | | ON | — | — | — | — | — | — | — | — | — | — | — | — | — | — | M |

'ON' : EF WHICH IS SET ON WHEN CHECK RESULT INDICATES NG. '—' : CHECK IS MADE REGARDLESS OF OK/NG OF EF WITH THIS MARK.
'O' : CHECK IS MADE ONLY WHEN EF WITH THIS MARK INDICATES OK. 'M' : NO CHECK IS MADE FOR INTER-MESH PVC TEST CELL.

F I G. 2 2 9

| BLOCK NAME \ EF | E1 MS | E1 RM | E2 PL | E2 IM | E1 IM | E2 MA | E1 MA | E2 SN | E2 DT | E2 ST | E2 DA | E2 BA | E2 AC | E2 EM | E2 MT | E2 HE | E2 VE | E2 CS | E2 SA | E2 DA | E2 BE | E2 LE | E2 IL | E2 EB | PV C |
|---|---|---|---|---|---|---|---|---|---|---|---|---|---|---|---|---|---|---|---|---|---|---|---|---|---|
| DA CHECK S (B/S) | ON | — | — | — | — | — | — | — | — | — | ON | — | — | — | — | — | — | — | — | — | — | — | — | — | M |
| BA SIZE CHECK S (B/S) | ON | — | — | — | — | — | — | — | — | — | — | ON | — | — | — | — | — | — | — | — | — | — | — | — | M |
| INGRESS FLOW CHECK S (B/S) | ON | O | — | — | — | — | — | — | — | — | — | O | ON | — | — | — | — | — | — | — | — | — | — | — | M |
| SIMULTANEOUS INPUT NUMBER CHECK S (E) | ON O | O | — | — | — | — | — | — | — | — | — | — | — | ON | — | — | — | — | — | — | — | — | — | — | M |
| SIMULTANEOUS INPUT NUMBER CHECK S (C) | ON O | O | — | — | — | — | — | — | — | — | — | — | — | — | — | — | — | — | — | — | — | — | — | — | M |
| MRI TIME OUT S (E) | ON O | O | — | — | — | — | — | — | — | — | — | — | — | — | ON | — | — | — | — | — | — | — | — | — | M |
| HEL CHECK S (B/S) | ON O | — | — | — | — | — | — | — | — | — | — | — | — | — | — | ON | — | — | — | — | — | — | — | — | M |
| HE FORMAT CHECK S - 1ST (B/S) | ON O | — | — | — | — | — | — | — | — | — | — | — | — | — | — | — | ON | — | — | — | — | — | — | — | M |
| HE FORMAT CHECK S - 2ND (B/S) | ON O | — | — | — | — | — | — | — | — | — | — | — | — | — | — | — | — | ON | — | — | — | — | — | — | M |
| SA CHECK A (B/S) | ON — | — | — | — | — | — | — | I — | — | — | — | — | — | — | — | — | — | — | ON | — | — | — | — | — | |

'ON' EF WHICH IS SET ON WHEN CHECK RESULT INDICATES NG. '—'. CHECK IS MADE REGARDLESS OF OK/NG OF EF WITH THIS MARK.
'O' . CHECK IS MADE ONLY WHEN EF WITH THIS MARK INDICATES OK. 'M' : NO CHECK IS MADE FOR INTER-MESH PVC TEST CELL.

F I G. 2 3 0

| BLOCK NAME \ EF | E1 MS | E1 RM | E2 PL | E2 IM | E1 IM | E2 MA | E1 MA | E2 SN | E2 DT | E2 ST | E2 DA | E2 BA | E2 AC | E2 EN | E2 NT | E2 HE | E2 VE | E2 CS | E2 SA | E2 DA | E2 BE | E2 LE | E2 IL | E2 EB | PVC |
|---|---|---|---|---|---|---|---|---|---|---|---|---|---|---|---|---|---|---|---|---|---|---|---|---|---|
| DA SCREENING S (B/S) | ON — | — | — | — | — | — | — | — | — | — | — | — | — | — | — | — | — | — | — | ON | — | — | — | — | M |
| BE TAG MATCH S (E) | ON — | — | — | — | — | — | — | — | — | — | — | — | — | — | — | — | — | — | — | — | ON | — | O | — | M |
| BA SIZE MATCH CHECK S (E) | ON — | O | — | — | — | — | — | — | — | — | — | — | — | — | — | — | — | — | — | — | O | ON | O | — | M |
| INFORMATION LENGTH CHECK S (S/C/E) | ON — | — | — | — | — | — | — | — | — | — | — | — | — | — | — | — | — | — | — | — | — | — | ON | — | M |
| ENCAPSULATION S (C/E) | ON *1 | — | — | — | — | — | — | — | — | — | — | — | — | — | — | — | — | — | — | — | — | — | — | — | M |
| | *1 WHEN L2-PDU WHOSE 'EIMS' IS ON IS RECEIVED AT BOM AND COM HAVING SAME RMID VALUE, SUBSEQUENTLY RECEIVED COM AND EOM HAVE 'EIMS' SET 'ON'. | | | | | | | | | | | | | | | | | | | | | | | | |
| CARRIER SELECTION S (ISSIB) | ON O | — | — | — | — | — | — | — | — | — | — | — | — | — | — | — | — | — | — | — | — | — | ON | — | M |
| ROUTING S | | — | — | — | — | — | — | — | — | — | — | — | — | — | — | — | — | — | — | — | — | — | — | — | M |
| CARRIER SCREENING (ISSIB) | O | — | — | — | — | — | — | — | — | — | — | — | — | — | — | — | — | — | — | — | — | — | — | — | M |
| GA COPY S (C/E) | *2 | — | — | — | — | — | — | — | — | — | — | — | — | — | — | — | — | — | — | — | — | — | — | — | M |
| | *2 BOM WHOSE 'EFMS' INDICATES NG (ON) IS NOT COPIED, BUT ORIGINAL CELL IS SET MHID AND TRANSMITTED IF COM AND EOM ARE FIRST NG CELL, THEY ARE COPIED. | | | | | | | | | | | | | | | | | | | | | | | | |

'ON' : EF WHICH IS SET ON WHEN CHECK RESULT INDICATES NG. '—': CHECK IS MADE REGARDLESS OF OK/NG OF EF WITH THIS MARK.
'O' : CHECK IS MADE ONLY WHEN EF WITH THIS MARK INDICATES OK. 'M' : NO CHECK IS MADE FOR INTER-MESH PVC TEST CELL.

FIG. 231

| BLOCK NAME \ EF | E1 MS | E1 RM | E2 PL | E2 IM | E1 IM | E2 MA | E1 MA | E2 SN | E2 DT | E2 ST | E2 DA | E2 BA | E2 AG | E2 EM | E2 MT | E2 HE | E2 VE | E2 CS | E2 SA | E2 DA | E2 BE | E2 LE | E2 IL | E2 EB | E2 C |
|---|---|---|---|---|---|---|---|---|---|---|---|---|---|---|---|---|---|---|---|---|---|---|---|---|---|
| OUTPUT BAND CONTROL S | — | — | — | — | — | — | — | — | — | — | — | — | — | — | — | — | — | — | — | — | — | — | — | — | — |
| MID ACQUISITION S | ○ | — | — | — | — | — | — | — | — | — | — | — | — | — | — | — | — | — | — | — | — | — | — | — | — |
| SN ASSIGNMENT S | — | — | — | — | — | — | — | — | — | — | — | — | — | — | — | — | — | — | — | — | — | — | — | — | — |
| ERROR CELL DISCARD S | × | — | — | — | — | — | — | — | — | — | — | — | — | — | — | — | — | — | — | — | — | — | — | — | — |

'ON' : EF WHICH IS SET ON WHEN CGECK RESULT INDICATES NG.
'○' : CHECK IS MADE ONLY WHEN EF WITH THIS MARK INDICATES OK
'×' : CHECK IS MADE ONLY WHEN EF WITH THIS MARK INDICATES NG
'—' : CHECK IS MADE REGARDLESS OF OK/NG OF EF WITH THIS MARK.
'M' : NO CHECK IS MADE FOR INTER-MESH PVC TEST CELL.

F I G. 2 3 2

| | |
|---|---|
| SIP ST : | ST OF SIP FORMAT IS ENTERED. (ASSIGNED IN ERROR EDITION I). |
| BC : | INDICATES WHERE TO BROADCAST TO. (ASSIGNED IN ROOUTING PROCESS UNIT). |
| DESTINATION MH ID : | INDICATES OUTPUT VCI (DESTINATION MH ID). |
| TRIAL : | INDICATES WHETHER OR NOT IT IS PVC TEST CELL (INTERMESH/SNI LOOPBACK). TEST CELL IS 1. (ASSIGNED BEFORE CRC-10 CHECK PROCESS UNIT BETWEEN MESHS. ASSIGNED AT ROUTING PROCESS UNIT AT SNI LOOPBACK) |
| SNI ID : | 8-BIT LSB OF VCI INPUT FROM MDX. INDICATES SOURCE SNI ID. 15-12 IS 4-BIT MSB (1-BIT MSB IS TEST BIT), AND 3-0 IS 4-BIT LSB (MOVED IN ERROR EDITION I ). |
| HOME MESH : | INDICATES WHETHER OR NOT IT IS LOOPBACK CELL TO HOME MESH (ASSIGNED IN DA CHECK PROCESS UNIT. LOOPBACK CELL TO HOME MESH DOES NOT REQUIRE RETRIEVAL OF ROUTE INFORMATION IN ROUTING PROCESS UNIT). |
| OUTPUT VCI : | DESTINATION MH ID. 1-BIT MSB OF TEST CELL IS 1. |
| PT : | PAYLOAD TYPE (NOT CHANGED IN PROCESS UNIT). |
| CLP : | CELL LOSS PRIORITY (NOT CHANGED IN PROCESS UNIT). |
| ST : | SEGMENT TYPE OF INTER-MH (REASSIGNMENT FROM SIP IN ENCAPSULATION PROCESS UNIT). |
| SN : | SEQUENCE NUMBER (REASSIGNMENT IN SN ASSIGNING UNIT). |
| MID : | MESSAGE IDENTIFIER 1. RMID FROM VCI* AND MID IS ENTERED IN SIMULTANEOUS INPUT NUMBER CHECK UNIT. 2. OUTPUT MID IS ENTERED IN MID ACQUIRING UNIT. |
| SAR PL : | SAR PAYLOAD, |
| PL : | PL OF SIP IS INPUT. |
| CRC : | REASSIGNED IN CRC-10 ASSIGNING UNIT. |
| CP : | 0 FOR ORIGINAL CELL, AND 1 FOR COPIED CELL. |

F I G. 2 3 4

SINCE ERROR CELL IS NOT ENCAPSULATED, NO ERROR FLAG OTHER THAN E2MN AND E2EB IS SET.

| INPUT | | | OUTPUT | | |
|---|---|---|---|---|---|
| LP UNIT STATUS | LINE CELL ENB | TEST CELL ENB | CELL ENB | CELL | TEST CELL FETCH TSOK |
| IN NORMAL OPERATION | ENB | DSB | ENB | LINE CELL | NG |
| | ENB | ENB | ENB | LINE CELL | NG |
| | DSB | ENB | ENB | TEST CELL | OK |
| | DSB | DSB | DSB | LINE CELL | NG |
| IN DIAGNOSTICS | DSB BY COMPULSORY MASK | ENB | ENB | TEST CELL | OK |
| | | DSB | DSB | TEST CELL | NG |

ENB : ENABLE ( ENABLE CELL )
DSB : DISABLE ( DISABLE CELL )

FIG. 240

| INPUT | OUTPUT |
|---|---|
| RESIDUAL CELL PAYLOAD | EFCC |
| 0 | OFF |
| OTHER THAN 0 | ON |

FIG. 241

| ST | ERROR CONDITION | | |
|---|---|---|---|
| BOM | PL ≠ 44 OCTET | ———— | PL IS NOT MULTIPLE OF 4 OCTETS. |
| COM | PL ≠ 44 OCTET | ———— | PL IS NOT MULTIPLE OF 4 OCTETS. |
| EOM | 4 OCTET > PL | 4 OCTET < PL | PL IS NOT MULTIPLE OF 4 OCTETS. |
| SSM | 28 OCTET > PL | 44 OCTET < PL | PL IS NOT MULTIPLE OF 4 OCTETS. |

FIG. 242

| ST | ERROR CONDITION | E1 EFIM | E2 EFIM |
|---|---|---|---|
| BOM | MID = 0 | OFF | ON |
| COM | MID = 0 | ON | OFF |
| EOM | MID = 0 | OFF | ON |
| SSM | MID ≠ 0 | ON | ON |

F I G. 2 4 3

| INPUT | | OUTPUT | | |
|---|---|---|---|---|
| ST | MID CHECK | EF1 MA | EF2 MA | MID CHECK |
| BOM | not ACT | OFF | OFF | ACT |
| BOM | ACT | OFF | ON | ACT *1 |
| COM | ACT | OFF | OFF | ACT |
| COM | not ACT | ON | OFF | not ACT |
| EOM | ACT | OFF | OFF | not ACT |
| EOM | not ACT | OFF | ON | not ACT |
*1 : ERROR FLAG(EF2MA) IS SET, BUT MASTER ERROR FLAG(EF1MS) IS NOT SET.
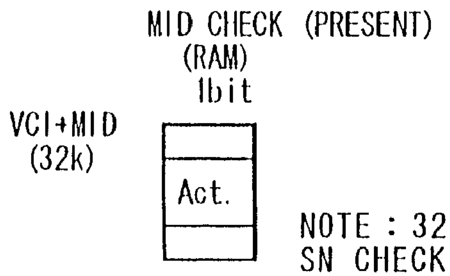
NOTE : 32k=32SNI x1k(MID 10bit)
SN CHECK S AND RAM ARE USED IN COMBINATION
F I G. 244

| I INPUT | | | OUTPUT | |
|---|---|---|---|---|
| ST | CELL SN | SN CHECK | EFSN | SN CHECK |
| BOM, SSM | SN | D. C. | OFF | SN+1 |
| COM, EOM | SN | SN | OFF | SN+1 |
| COM, EOM | SN | ≠SN | ON | SN+1 |

| ST | | ERROR CONDITION (ADDRESS TYPE 4BIT) | EFDT | EFST |
|---|---|---|---|---|
| BOM SSM | DA | VALUE OTHER THAN 1100 OR 1110 | ON | OFF |
| | SA | VALUE OTHER THAN 1100 | OFF | ON |

FIG. 246

| INPUT | | | OUTPUT |
|---|---|---|---|
| ST | DA CHECK | MATCHING ADDRESS *1 | EFSA |
| BOM, SSM | No Match | D. C. | *2 |
| BOM, SSM | Match | ≠SNI# | *3 |
| BOM, SSM | Match | =SNI# | |
| COM, EOM | D. C. | D. C. | ACT |

*1 : MATCHING ADDRESS MSB 4bit
*2 : ROUTE RETRIEVAL IS REQUIRED IN ROUTING UNIT
*3 : ROUTE RETRIEVAL IS REQUIRED IN ROUTING UNIT

NOTE : 512 =32SNI × 8ADDRESS/SNI

| ST | ERROR CONDITION |
|---|---|
| BOM, SSM | BASIZE<32OCTETS, BASIZE >92224CTETS |

FIG. 248

READ AND WRITE DATA TO RMID CONVERSION CAM AND MRI CAM

| INPUT \ CAM | RMID CONVERSION | | MRMRI | | OUTPUT | RMID CONVERSION | MRI |
|---|---|---|---|---|---|---|---|
| TYPE | MATCHING DATA | RESULT | MATCHING DATA | RESULT | ERROR FLAG | WRITE DATA | WRITE DATA |
| FOR EACH CELL FRAME (FOR IDLE CELL) | — | | 0+1+PRESENT TIME | MATCHING | EFMT*1 | ALL 1 | ALL 1 |
| FOR EACH CELL FRAME (FOR BOM, COM, EOM, AND SSM) | — | | 0+1+PRESENT TIME | MATCHING | — | — | 0+1+TO TIME |
| FOR EACH CELL FRAME (FOR ALL CELLS) | — | | 0+1+PRESENT TIME | NON-MATCHING | — | — | — |
| IDLE CELL (WHEN MRI MATCHING FOR CELL FRAME) | — | | NO MATCHING OPERATION | | REFER TO ABOVE LISTED "FOR CELL FRAME (FOR IDLE CELL)" | | |
| IDLE CELL (WHEN MRI NON-MATCHING FOR CELL FRAME) | — | | 1+0+ ALL 1 | MATCHING | EFMT*1 | ALL 1 | ALL 1 |
| IDLE CELL (WHEN MRI NON-MATCHING FOR CELL FRAME) | — | | 1+0+ ALL 1 | NON-MATCHING | — | — | — |
| FOR EACH CELL FRAME +) BOM | — | | — | | — | VCI+MID | 0+1+TO TIME |
| FOR EACH CELL FRAME +) COM | VCI+MID | MATCHING | — | | — | — | — |
| FOR EACH CELL FRAME +) COM | VCI+MID | NON-MATCHING | — | | E1RM | — | — |
| FOR EACH CELL FRAME +) EOM | VCI+MID | MATCHING | — | | — | ALL 1 | ALL 1 |
| FOR EACH CELL FRAME +) EOM | VCI+MID | NON-MATCHING | — | | E1RM | — | — |
| SSM | D.C. | | | | | | |

*1 : EOM (TIME OUT) CELL GENERATION

FIG. 252

TABLE RMID RMID ACQUISITION UNIT, SIMULTANEOUS INPUT LIMIT, MRI T.O. SET/RELEASE PROCESS

| INPUT | | | RMID ACQUISITION CHECK | SIMULTANEOUS INPUT LIMIT CHECK | OUTPUT | | | RMID | MRI T.O. | RECEIVED CELL NUMBER | READ POINTER | WRITE POINTER | REMARKS |
|---|---|---|---|---|---|---|---|---|---|---|---|---|---|
| CELL | MS | RM | | | MS | RM | EM | | | | | | |
| SSM | × | × | ACQUIRED | — | × | × | × | IMPOSSIBLE | — | — | — | — | RELEASING RMID |
| | | | NOT-ACQUIRED | OK | × | × | × | NEW RMID | — | — | +1 | +1 | |
| | | | | NG | ○ | ○ | ○ | ALL 1 | — | — | — | — | |
| | ○ | × | ACQUIRED | — | ○ | × | × | IMPOSSIBLE | — | — | — | — | |
| | | | NOT-ACQUIRED | — | | ○ | × | ALL 1 | — | — | — | — | |
| | ○ | ○ | — | — | ○ | ○ | × | ALL 1 | — | — | — | — | |
| BOM | × | × | ACQUIRED | — | × | × | × | ACQUIRED RMID | RESETTING | — | — | — | |
| | | | NOT-ACQUIRED | OK | × | × | × | NEW RMID | SETTING | +1 | +1 | — | |
| | | | | NG | ○ | ○ | ○ | ALL 1 | — | — | — | — | |
| | ○ | × | ACQUIRED | — | ○ | × | × | ACQUIRED RMID | CLEAR | −1 | — | +1 | RELEASING RMID |
| | | | NOT-ACQUIRED | — | | ○ | × | ALL 1 | — | — | — | — | |
| | ○ | ○ | — | — | ○ | ○ | × | ALL 1 | — | — | — | — | |
| COM | × | × | ACQUIRED | — | × | × | × | ACQUIRED RMID | — | — | — | — | |
| | | | NOT-ACQUIRED | — | ○ | ○ | × | ALL 1 | — | — | — | — | |
| | ○ | × | ACQUIRED | — | ○ | × | × | ACQUIRED RMID | CLEAR | −1 | — | +1 | RELEASING RMID |
| | | | NOT-ACQUIRED | — | | ○ | × | ALL 1 | — | — | — | — | |
| | ○ | ○ | — | — | ○ | ○ | × | ALL 1 | — | — | — | — | |
| EOM | × | × | ACQUIRED | — | × | × | × | ACQUIRED RMID | CLEAR | −1 | — | +1 | RELEASING RMID |
| | | | NOT-ACQUIRED | — | ○ | ○ | × | ALL 1 | — | — | — | — | |
| | ○ | × | ACQUIRED | — | ○ | × | × | ACQUIRED RMID | CLEAR | −1 | — | +1 | RELEASING RMID |
| | | | NOT-ACQUIRED | — | | ○ | × | ALL 1 | — | — | — | — | |
| | ○ | ○ | — | — | ○ | ○ | × | ALL 1 | — | — | — | — | |
| T.O. | — | — | ACQUIRED | — | ○ | × | × | ACQUIRED RMID | CLEAR | −1 | — | +1 | RELEASING RMID |
| PVC | — | — | — | — | × | × | × | INPUT MID | — | — | — | — | NO ACTION |

○ : ERROR ON, × : ERROR OFF, — : NO OBJECT OF PROCESS

FIG. 256

| ST | | NORMAL VALUE OF HEADER EXTENTION | | | | | |
|---|---|---|---|---|---|---|---|
| | | FIRST ELEMENT | | | SECOND ELEMENT | | |
| | | FIRST OCTET | SECOND OCTET | THIRD OCTET | FOURTH OCTET | FIFTH OCTET | SIXTH OCTET |
| BOM SSM | CONDITION 1 | 3 | 0 | 1 | 4, 6, OR 8 | 1 | D. C. |
| | CONDITION 2 | 3 | 0 | 1 | D. C. | VALUE OTHER THAN 1 | D. C. |

FIG. 257

| INPUT | | | OUTPUT |
|---|---|---|---|
| ST | SA CHECK | MATCHING ADDRESS *1 | EFSA |
| BOM, SSM | No | D. C. | ON |
| COM, EOM | Match | ≠SNI# | ON |
| COM, EOM | Match | =SNI# | OFF |
| COM, EOM | D. C. | D. C. | OFF |

*1 : MATCHING ADDRESS MSB 4 bit

| SC ATTRIBUTE | MATCHING AT CAM | NON-MATCHING AT CAM |
|---|---|---|
| 1 | ERROR(NOT RECEIVABLE AT ENTERED ADDRESS) | SENDING EANBLED |
| 0 | SENDING ENABLED | ERROR(NOT RECEIVABLE AT ADDRESS OTHER THAN ENTERED ADDRESS) |

- COM AND EOM ARE NOT OBJECT OF PROCESS.
- CELL WHOSE TEST BIT OF 02TH WORD INDICATES 1 (INTER-MESH PVC TEST CELL) IS NOT OBJECT OF PROCESS.

| INPUT | | | | OUTPUT | |
|---|---|---|---|---|---|
| ST (SIP) | BEtag (H) | BEtag CHECK | BEtag (T) | EFBE | BEtag CHECK |
| BOM | BEtag H | D. C. | D. C. | OFF | BE tag H |
| COM | D. C. | D. C. | D. C. | OFF | ——— |
| EOM | D. C. | BEtag | = BEtag | OFF | D. C. |
| EOM | D. C. | BEtag | ≠ BEtag | ON | D. C. |
| SSM | BEtag H | D. C. | = BEtagH | OFF | D. C. |
| SSM | BEtag H | D. C. | ≠ BEtagH | ON | D. C. |

H : Header
T : Trailer

| INPUT | | | | OUTPUT | |
|---|---|---|---|---|---|
| ST (SIP) | BASIZE | BASIZE CHECK | LENGTH | EFBE | BASIZE CHECK |
| BOM | BASIZE | D. C. | D. C. | OFF | BASIZE |
| COM | D. C. | D. C. | D. C. | OFF | —— |
| EOM | D. C. | BASIZE | = LENGTH | OFF | D. C. |
| EOM | D. C. | BASIZE | ≠ LENGTH | ON | D. C. |
| SSM | BASIZE | D. C. | = LENGTH | OFF | D. C. |
| SSM | BASIZE | D. C. | ≠ LENGTH | ON | D. C. |
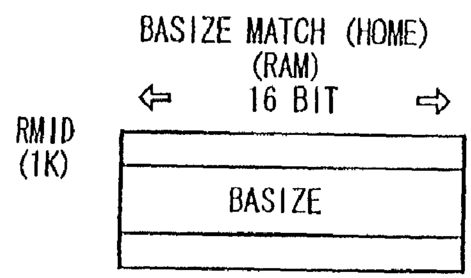
F I G. 2 6 1

| INPUT | | | | | | OUTPUT (2) | | |
|---|---|---|---|---|---|---|---|---|
| ST | BASIZE | PAD LENGTH | CELL COUNT | PL LENGTH | INFORMATION LENGTH PL LENGTH OF EOM | CELL COUNT | EFIL | INFORMATION LENGTH |
| BOM | BASIZE | PAD | D. C. | D. C. | D. C. | INITIAL VALUE | OFF | PL LENGTH OF EOM |
| COM | D. C. | D. C. | ≠0 | D. C. | D. C. | DOWN | OFF | ——— |
| COM | D. C. | D. C. | =0 | D. C. | D. C. | D. C. | ON | ——— |
| EOM | D. C. | D. C. | ≠0 | D. C. | D. C. | D. C. | ON | ——— |
| EOM | D. C. | D. C. | =0 | PL | ≠PL | D. C. | ON | D. C. |
| EOM | D. C. | D. C. | =0 | PL | =PL | D. C. | OFF | D. C. |
| SSM | BASIZE | PAD | D. C. | PL | ≠PL | D. C. | ON | D. C. |
| SSM | BASIZE | PAD | D. C. | PL | =PL | D. C. | OFF | D. C. |
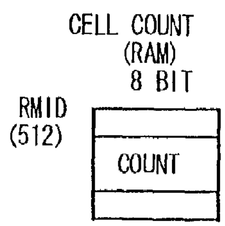
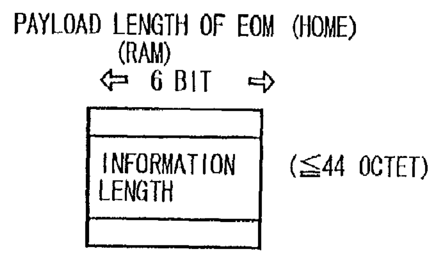
FIG. 262

○ PROCESS FOR ERRONEOUS MEMORY
ERROR (HOME)
2bit (RAM)

TRIAL BIT+VCI+MID
(32k)

MS(Mster) : 1 IF MASTER ERROR FLAG OF CELL IS SET

DM(Discard Message) : IDENTIFIER INDICATING WHETHER OR NOT EOM HAS ARRIVED (1 AT ARRIVA )

· ERROR MEMORY MATRIX

| ITEM | INPUT CELL | read data | | write data | | OUTPUT CELL PROCESS |
|---|---|---|---|---|---|---|
| | ST | MS | DM | MS | DM | |
| (1) | BOM (NORMAL CELL) | D. C. | D. C. | 0 | 0 | NO (INPUT THROUGH) |
| (2) | BOM (ERROR CELL) | D. C. | D. C. | 1 | 0 | NO (INPUT THROUGH) |
| (3) | COM (NORMAL CELL) | 0 | 0 | 0 | 0 | NO (INPUT THROUGH) |
| (4) | COM (NORMAL CELL) | 1 | 0 | 1 | 0 | SETTING MASTER ERROR FLAG |
| (5) | COM (NORMAL CELL) | D. C. | 1 | 1 | 1 | SETTING MASTER ERROR FLAG |
| (6) | COM (ERROR CELL) | D. C. | 0 | 1 | 0 | NO (INPUT THROUGH) |
| (7) | COM (ERROR CELL) | D. C. | 1 | 1 | 1 | NO (INPUT THROUGH) |
| (8) | EOM | 0 | 0 | 0 | 1 | NO (INPUT THROUGH) |
| (9) | EOM | 1 | 0 | 1 | 1 | SETTING MASTER ERROR FLAG |
| (10) | EOM | D. C. | 1 | D. C. | 11 | INVALID CELL |

FIG. 265

| INPUT | | | OUTPUT (CELL DATA, ETC.) | | | | | |
|---|---|---|---|---|---|---|---|---|
| ST | | ISSI ASSIGNING HEADER | IST | STC | SN | MID | PL | CRC |
| BOM | GENERATING BOM | ASSIGNING HEADER | — | BOM | COPY | COPY | COPY | COPY |
| | ARRIVAL OF BOM | D. C. | BOM | COM | — | — | — | — |
| COM | | D. C. | COM | COM | — | — | — | — |
| EOM | | D. C. | EON | EOM | — | — | — | — |
| SSM | GENERATING BOM | ASSIGNING HEADER | — | BOM | COPY | COPY* | COPY | COPY |
| | ARRIVAL OF SSM | D. C. | SSM | EOM | — | — | — | — |

FIG. 266

○ ISSI HEADER TO BE ASSIGNED TO INTER-MH INF BOM

| NAME | INFORMATION LENGTH | LEVEL | ACTION | PROCESS POSITION |
|---|---|---|---|---|
| RV(RESERVE) | 1 cot | L2 | D.C (COPY ARRIVING BOM) | (22) ENCAPSULATION |
| BEtag | 1 cot | L2 | D.C (COPY ARRIVING BOM) | (22) ENCAPSULATION |
| BAsize | 2 cot | L2 | D.C (COPY ARRIVING BOM) | (22) ENCAPSULATION |
| DA(Destination Address) | 8 cot | L3 | D.C. (COPY ARRIVING BOM) | (22) ENCAPSULATION |
| SA(Source Address) | 8 cot | L3 | D.C. (COPY ARRIVING BOM) | (22) ENCAPSULATION |
| D.C | 17 cot | L3 | D.C. (COPY ARRIVING BOM) | (22) ENCAPSULATION |
| IIT | 1 cot | L3 | SETTING $01_H$ | (23) CARRIER SELECTION |
| ES(Explicit Selection) | 1 cot | L3 | SETTING 0 OR 1 | (23) CARRIER SELECTION |
| Rv(reserve) | 7 cot | L3 | SETTING ALL 0 | (23) CARRIER SELECTION |
| C(Carrier) | 2 cot | L3 | ASSIGNING CARRIER INFORMATION | (23) CARRIER SELECTION |
| INID | 2 cot | L3 | SETTING ALL 0 | (23) CARRIER SELECTION |
| IITPS | 2 cot | L3 | SETTING ALL 0 | (23) CARRIER SELECTION |

F I G. 267

| AT INDICATES GA | CAM MATCHING | | | DETERMI-NATION | ACTION | BC (BROADCAST IDENTIFIER) | | ISSI CARRIER AREA |
|---|---|---|---|---|---|---|---|---|
| | INTRA-STATION TABLE | INTRA-STATION NUMBER TABLE | EXTERNAL NUMBER TABLE | | | MSB | LSB | |
| ○ | D.C. | D.C. | D.C. | GA | BROADCAST TO ALL MH | 1 | 1 | ASSIGNING CARRIER |
| X | MATCHING | D.C. | D.C. | INTRA-STATION | ASSIGNING SBMH SPECIFIED VCI | 0 | 0 | CLEARING CARRIER |
| X | NON-MATCHING | MATCHING | NON-MATCHING | INTRA-STATION | BROADCAST TO ALL SBMH | 0 | 1 | CLEARING CARRIER |
| X | NON-MATCHING | NON-MATCHING | MATCHING | EXTERNAL | ASSIGNING GWMH SPECIFIED VCI | 0 | 0 | CLEARING CARRIER |
| X | NON-MATCHING | NON-MATCHING | NON-MATCHING | DETERMINATION IMPOSSIBLE | BROADCAST TO ALL GWMH | 1 | 0 | ASSIGNING CARRIER |

FIG. 270

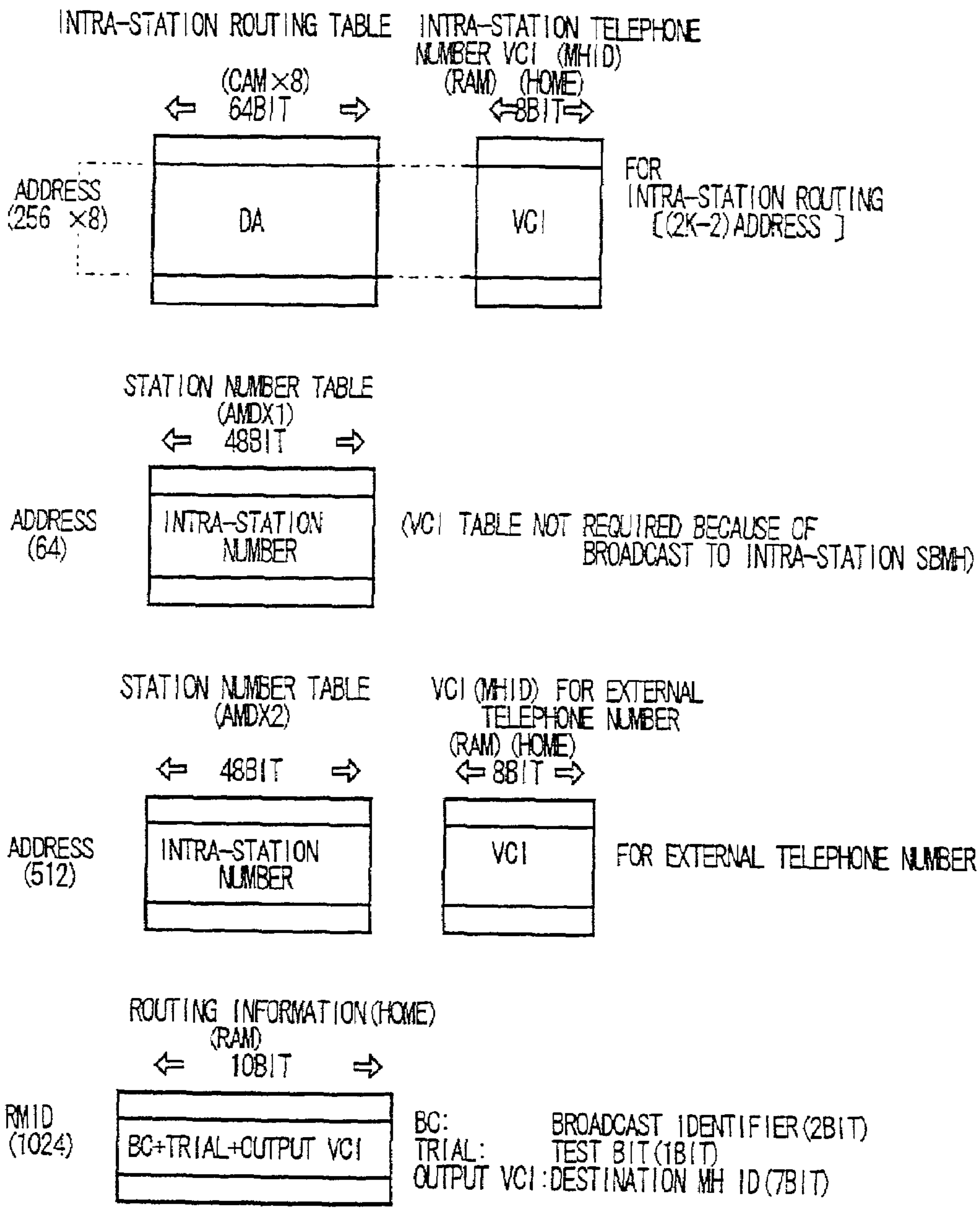
F I G. 271

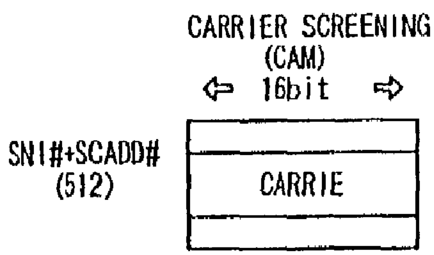

NOTE : 1k=(32SNI) x 16

CARRIER AREA STATE

| ROUTING METHOD | CARRIER AREA | REMARKS |
|---|---|---|
| BROADCAST TO ALL MH | ASSIGNING CARRIER | CELL NOT USING ICI REQUIRES MASKING IN GWMH |
| ASSIGNING SBMH SPECIFIED VCI | CLEARING CARRIER | MASKING CARRIER AREA WITH "INTRA-STATION" DETERMINED |
| BROADCAST TO ALL SBMH | CLEARING CARRIER | MASKING CARRIER AREA WITH "INTRA-STATION" DETERMINED |
| ASSIGNING GWMH SPECIFIED VCI | CLEARING CARRIER | MASKING CARRIER AREA WITH "LATA" DETERMINED |
| BROADCAST TO GWMH | ASSIGNING CARRIER | CELL NOT USING ICI REQUIRES MASKING IN GWMH |

FIG. 272

SPECIFYING BROADCAST

| BC(2BIT) | TRANSFERRED TO: |
|---|---|
| ( 11 ) | TRANSFER TO ALL MH (DETERMINED AS GA) |
| ( 00 ) | DETERMINING DESTINATION MH (BROADCAST NOT REQUIRED) |
| ( 01 ) | TRANSFER TO ALL SBMH (DESTINATION IN HOME STATION) |
| ( 10 ) | TRANSFER TO ALL GWMH (DESTINATION IN MATE STATION) |

FIG. 273

SMLP TABLE (1/2)

| PKG NAME | FUNCTION NAME | TABLE NAME | TYPE | HARDWARE ACCESS | SIZE(ADDRESS ×BIT WIDTH) | PKG No | ADDRESS | DATA | REMARKS |
|---|---|---|---|---|---|---|---|---|---|
| 1HH03A | (9) DA CHECK S | ① DA CHECK S | CAMLSI | READ | 256×64 | 03 | 00000 ~ 000FF | 00~63 | CAM LSI× 1 |
| | (6) HID CHECK S | ① HID CHECK S | RAM | READ/WRITE | 32k×1 | | 80000 ~ 87FFF | 04 | HB81C84A ×2 (ODD PARITY) |
| | (7) SN CHECK S | ① SN CHECK S | RAM | READ/WRITE | 32k×4 | | | 00~03 | |
| | (10) INGRESS FLOW CHECK S | ① LEAKY BUCKET S | RAM | READ/WRITE | 32×14 | | 90000 ~ 9001F | 00~13 | HB81C79A ×2 (EVEN PARITY) |
| | | ② INCREMENTED OCTET NUMBER | RAM | READ | 32×14 | | 90020 ~ 9003F | | |
| 1HH04A | (15) SA CHECK S | ① SA CHECK | CAMLSI | READ | 256×64 | 04 | 00000 ~ 000FF | 00~63 | CAM LSI× 1 |
| | (16) DA SCREENING S | ① DS SCREENING | CAMLSI | READ | 1k×64 | | 00100 ~ 004FF | 00~63 | CAM LSI× 4 |
| | (12) SIMULTANEOUS INPUT NUMBER CHECK S | ① RHID CONVERSION S | AMDCAM | READ/WRITE | 512×15 | | 60000 ~ 601FF | 00~14 | AM99C10A ×2 |
| | | ② MRI TIME S | AMDCAM | READ/WRITE | 512×18 | | 60200 ~ 603FF | 00~17 | AM99C10A ×2 |
| | | ③ SIMULATHEOUS INPUT LIMIT NUMBER | RAM | READ | 32×1 | | 80000 ~ 8001F | 00 | HB81C79A (ODD PARITY) |
| | | ④ RHID ASSINGNING MANAGEMENT | RAM | READ/WRITE | 512×13 | | 90000 ~ 901FF | 00~12 | HB81C79A (ODD PARITY) |
| | | ④ RHID MANAGEMENT S | RAM | READ/WRITE | 512×13 | | 90200 ~ 903FF | | |
| | (16) DA SCREENING S | ② SC ATTRIBUTE | RAM | READ | 32×2 | | A0000 ~ A001F | 00~02 | HB81C79A (EVEN PARITY) |
| | (18) BA SIZE MATCHING CHECK S | ① BA SIZE VALUE S | RAM | READ/WRITE | 512×16 | | B0000 ~ B01FF | 00~15 | HB81C79A ×2 (EVEN PARITY) |
| | (19) INFORMATION LENGTH CHECK S | ① DOWN CNT VALUE S | RAM | READ/WRITE | 512×16 | | B0200 ~ B03FF | | |
| | (19) BE TAG MATCHING S | ② BE TAG MATCHING S | RAM | READ/WRITE | 512×16 | | B0400 ~ B05FF | | |
| 1HH05A | (25) ROUTING S | ① INTRA-STATION ROUTING TALBE S | CAMLSI | READ | 2k×64 | 05 | 00000 ~ 007FF | 00~63 | CAM-LSI×8 |
| | | ② INTRA-STATION NUMBER TABLE S | AMDCAM | READ | 64×48 | | 60000 ~ 6003F | 00~47 | AM99C10A (MAX ADDRESS 256) |
| | | ③ EXTERNAL STATION NUMBER TABLE S | AMDCAM | READ | 512×48 | | 60100 ~ 602FF | 00~47 | AM99C10A ×2 |
| | (26) CARRIER SCREENING S | ① CARRIER SCREENING S | AMDCAM | READ | 512×16 | | 60300 ~ 604FF | 00~47 | AM99C10A ×2 |
| | (22) ERROR EDITION S | ① ERROR& DISCARD MEMORY S | RAM | READ/WRITE | 64k×2 | | 80000 ~ 8FFFF | 00~01 | HB81C79A (EVEN PARITY) |
| | (24) CARRIER SELECTION S | ① CARRIER SELECTION TABLE S | RAM | READ | 32×16 | | 90000 ~ 9001F | 00~15 | HB81C79A ×2 (EVEN PARITY) |
| | (25) ROUTING S | ④ INTRA-STATION PHONE NUMBER VCI S | RAM | READ | 2k×8 | | A0000 ~ A07FF | 00~07 | HB81C79A (EVEN PARITY) |
| | | ⑤ EXTERNAL STATION PHONE NUMBER VCI S | RAM | READ | 512×8 | | B0000 ~ B01FF | 00~07 | HB81C79A (EVEN PARITY) |
| | | ⑦ RATING INFORMATION | RAM | READ/WRITE | 512×10 | | C0000 ~ C01FF | 00~09 | HB81C79A (EVEN PARITY) |
| | (26) ENCAPSULATION S | CELL FIFO S | RAM | READ/WRITE | 4k×18(FOR 128CELL) | MHG NO FIRMWARE ACCESS | | | AM7204A×2(PARITY ODD, EVEN MIXED) |
| | | COPY MEMORY S | RAM | READ/WRITE | 8k×18(FOR 1 CELL) | | | | HB81C79A ×2(USED IN COMBINATION WITH PARITY OF CELL FIFO S) |

FIG. 280

SMLP TABLE (2/2)

| PKG NAME | FUNCTION NAME | TABLE NAME | TYPE | HARDWARE ACCESS | SIZE (ADDRESS ×BIT WIDTH) | PKG No | ADDRESS | DATA | REMARKS |
|---|---|---|---|---|---|---|---|---|---|
| IMH06A | (26) OUTPUT BAND LIMIT S | ⑧ READ ENTRY S | RAM | READ/WRITE | 8k×8 | 06 | 30000 ~ 31FFF | 00~07 | MB81C79A (EVEN PARITY) |
| | | ① VC WRITE ADDRESS COUNTER S | RAM | READ/WRITE | 256×18 | | 32000 ~ 320FF | 00~17 | VCSH-LSI (EVEN PARITY) |
| | | ② VC READ ADDRESS COUNTER S | RAM | READ/WRITE | 256×18 | | 32100 ~ 321FF | 00~17 | VCSH-LSI (EVEN PARITY) |
| | | ③ VO PEAK RATE S | RAM | READ | 256×10 | | 32300 ~ 323FF | 00~09 | VCSH-LSI (EVEN PARITY) |
| | | ④ VC NEXT TIMING S | RAM | READ/WRITE | 256×16 | | 32000 ~ 320FF | 11~26 | VCSH-LSI (EVEN PARITY) |
| | | ⑤ VC OK S | RAM | READ/WRITE | 256×1 | | | 10 | |
| | | ⑥ VC LIEKY BUCKET S | RAM | READ/WRITE | 256×10 | | | 00~09 | |
| | | ⑦ SHAPER CLOCK S | RAM | READ/WRITE | ♦ 1×16 | | 32800 | 00~15 | VCSH-LSI |
| | | ⑩ SHAPER TRANSMISSION OK S | RAM | READ/WRITE | 64k×1 | | 80000 ~ 8FFFF | 00 | MB81C84A (EVEN PARITY) |
| | | ⑪ L2 DISCARD COUNT S | D-RAM | READ/WRITE | 4k×16 | MSR μ-P DIRECTLY-CONNECTED MEMORY (LOGICAL DUPLEX CONFIGURATION) | | | IDT7024 |
| | | L3 DISCARD COUNT S | D-RAM | READ/WRITE | | | | | |
| | | ⑫ ENCAP. DISCARD COUNT S | D-RAM | READ/WRITE | | | | | |
| | | CELL MEMORY S | RAM | READ/WRITE | (FOR 28k CELLS) | MNG NO FIRMWARE ACCESS | | | TC5516645×3(VC · SH PARITY CONTROL |
| | (27) GA COPY S | ① FIFO WRITE S | RAM | READ/WRITE | 64k×1 | | 90000 ~ 9FFFF | 00 | MB81C84A (ODD PARITY) |
| | | ② IMPLEMENTATION SB. GWMH S | RAM | READ | 8×8 | | A0000 ~ A0007 | 00~07 | MB81C79A (EVEN PARITY) |
| | | CELL MEMORY S | RAM | READ/WRITE | 16k×18 (FOR 606 CELLS) | MNG NO FIRMWARE ACCESS | | | IDT7206×3(PARITY ODD/EVEN MIXED) |
| | | COPY MEMORY S | RAM | READ/WRITE | 8k×18 (FOR 1 CELL) | | | | MB81C79A ×2 (USED IN COMBINATION WITH PARITY OF CELL FIFO S) |
| | (30) MID ACQUISITION S | ① NEXT R & NEXT W COUNTER S | RAM | READ/WRITE | 128×9 | | B0000 ~ B007F | 00~08 | TC5516645 (ODD PARITY) |
| | | ② MID MANAGEMENT TABLE S | RAM | READ/WRITE | 16k×8 | | C0000 ~ C3FFF | 00~07 | TC5516645 (ODD PARITY) |
| | | ③ MID CONVERSION TABLE S | RAM | READ/WRITE | 32k×9 | | D0000 ~ D7FFF | 00~08 | TC5516645 (ODD PARITY) |

| ITEM | BLOCK NAME | CONTENTS [ ] : RELATED ERROR FLAG | PROCESS FOR EACH OBJECT CELL SUB | SPE | AL | ERR | PWCB |
|---|---|---|---|---|---|---|---|
| 01 | INTER-CONNECTION SELECTION R | SELECTING MDX ACT SYSTEM DATA ACCORDING TO SWITCH SYSTEM INFORMATION. | — | ○ | ○ | — | HMH 00A |
| 02 | 39 MG R | RECEIVING 78MHZ CLOCK FROM HLP02A AND GENERATING 39MHZ CLOCK USED IN RMLP UNIT AND CELL FRAME. | — | — | — | — | |
| 03 | ADDRESS FILTER R | SELECTING CELL TO BE PROCESSED BY RMLP FROM CELLS OF 622M DATA. BUFFERING SELECTED CELLS. AND PASSING THEM TO 150M PROCESSING UNIT. ALSO DISCARDING TCG CELLS. | — | ○ | ○ | — | |
| 04 | TEST CELL MULTIPLEXING R | MULTIPLEXING TEST CELL FOR SNI LOOPBACK TEST INPUT FROM HLP02A WHEN LINE CONTAINS IDLE CELLS. | ○ | ○ | ○ | — | HMH 01A |
| 05 | MID CHECK R | CHECKING WHETHER VCI/MID IS NOT ACTIVE AT BOM. AND WHETHER VCI/MID IS ACTIVE AT COM AND EOM. [MS, MA, MC] | × | ○ | ○ | — | |
| 06 | SN CHECK R | INITIALIZING SN AT BOM AND SSM. AND CHECKING ORDER OF SN AT COM AND EOM [MS, SN] | × | ○ | ○ | — | |
| 07 | ENCAPSULATION R | RETRIEVING SIP FROM INTER-MH INF. PDU AND CHANGING ST (SEGMENT TYPE). [MS, SN] | ○ | ○ | ○ | — | |
| 08 | ERROR EDITION I R | ALLOCATING ERROR CHECKED BY EACH CHECKER TO EACH POSITION OF ERROR FLAG. (MS, MA, MC, SN, EN) | ○ | ○ | ○ | ○ | |
| 09 | RMID ACQUISITION R | COMPRESSING VCI/MID FOR INTERNAL PROCESS. (VCI:8BIT, MID:10BIT) → (RMID:10BIT) [MS, MN, MD] | ○ | ○ | ○ | ○ | |
| 10 | MRI TIME OUT CHECK R | DETERMINING MRI TIMEOUT. (TIMEOUT VALUE: 177MS) TIMEOUT CELL IS TRANSMITTED WHEN TIMEOUT OCCURS. [MS, MT] | ○ | ○ | ○ | | |
| 11 | GA COPY R | COPYING INPUT CELL IN WHICH DA IS INPUT BY GA AND OUTPUTTING IT TO EACH SUBSCRIBER. [MS, GA] | ○ | ○ | ○ | ○ | |
| 12 | SNI AVAILABLE R | DESCARDING CELL WHEN SNI INDICATES DT FAULT OR RECEPTION ERROR. [MS, DA] | ○ | × | ○ | ○ | |
| 13 | ERROR EDITION II R | ALLOCATING ERROR CHECKED BY EACH CHECKER TO EACH POSITION OF ERROR FLAG. (MS, MN, MD, MT, GA, DA) | ○ | ○ | ○ | ○ | |
| 14 | SA CHECK R | RETURNING LOOPBACK CELL IN RESPONSE TO GA MESSAGE. [MS, DO] | ○ | × | ○ | × | |
| 15 | DISCARD COUNTER I R | COUNTING DISCARDED CELLS GENERATED IN 600M-155M CONVERSION UNIT AND GA COPY UNIT, AND REPORTING IT TO HLM01A. — | ○ | × | ○ | × | |

SUB : SNI LOOPBACK TEST CELL SPE: INTER-MH PVC TEST CELL (SPECIAL DA) AL : INTER-MH PVC TEST CELL (ALLOCATED DA)
ERR. ERROR CELL (MASTER ERROR FLAG ON) ○ : APPLIED FOR PROCESS OBJECT OR DURING PROCESS
× : NOT OBJECT OF PROCESS — : NO CELL PASSES OR NO RELATED CELLS

FIG. 283

| ITEM | BLOCK NAME | CONTENTS [ ] : RELATED ERROR FLAG | PROCESS FOR EACH OBJECT CELL | | | | PWCB |
|---|---|---|---|---|---|---|---|
| | | | SUB | SPE | ASS | ERR | |
| -- | SA SCREENING R | LIMITING RECEPTION AT DESTINATION SNI . [MS, SS ] | ○ | × | ○ | ○ | HMH 04A |
| 16 | SIMULTANEOUS TRANSMISSION NUMBER LIMIT | LIMITING NUMBER OF MESSAGES FOR EACH SNI. [MS, EM, ED] | ○ | × | ○ | ○ | HMH 02A |
| 17 . | OUTPUT MID ACQUISTION R | CONVERTING FROM EMID (COMPRESSED MID) TO S OUTPUT MID. | ○ | — | ○ | — | |
| 18 | EGRESS FLOW LIMIT | LIMITING OUTPUT BAND (PEAK RATE) FOR EACH SNI. | ○ | — | ○ | — | |
| 19 | CRC-10 GENERATION R | GENERATING AND ASSIGNING CRC-10 OF CELL PAYLOAD. | ○ | — | ○ | — | |
| 20 | TRANSMISSION CONTROL R (DECAPUSLATION) | PREVENTING MHCOM FROM TRANSMITTING ENCAPUSLATED BOM. | ○ | — | ○ | — | |
| 21 | DISCARD DOUNTER II R | COUNTING CELLS DISCARDED IN EGRESS FLOW LIMITING UNIT AND REPORTING IT TO HLM01A. | ○ | — | ○ | — | |
| 22 | μ-P INTERFACE R | INTERFACING WITH MNG μ-P OF HLP02A (ACTUALLY USING SCTL2 LSI). | — | — | — | — | COMMON TO EACH PWCB |
| 23 | 9MG R | RECEIVING 10MHZ CLOCK FROM HLP02A AND GENERATING 9MHZ CLOCK TO BE USED IN RMLP. | — | — | — | — | |

SUB : SNI LOOPBACK TEST CELL SPE: TEST USING INTER-MH SPECIAL DA ASS: LOOPBACK TEST INTER-MH ASSIGNED DA
ERR: ERROR CELL (MASTER ERROR FLAG ON) ○ : APPLIED FOR PROCESS OBJECT OR DURING PROCESS
× : NOT OBJECT OF PROCESS — : NO CELL PASSES OR NO RELATED CELLS

FIG. 284

| EF / BLOCK NAME | E1 MS | E2 MA | E1 MC | E2 SN | E2 EN | E2 MN | E1 MD | E2 MT | E1 GA | E2 DA | E2 DO | E2 SS | E2 EM | E1 ED | PVC TEST SUB | SPE | ASS |
|---|---|---|---|---|---|---|---|---|---|---|---|---|---|---|---|---|---|
| MID CHECK R (B/S) DM=0 | ON | ON | — | — | — | — | — | — | — | — | — | — | — | — | × | | |
| MID CHECK R (B/S) DM=1 | — | ON | — | — | — | — | — | — | — | — | — | — | — | — | × | | |
| MID CHECK R (C/E) | ON | — | ON | — | — | — | — | — | — | — | — | — | — | — | × | | |
| SN CHECK R (C/E) | ON | — | — | ON | — | — | — | — | — | — | — | — | — | — | × | | |
| ENCAPSULATION R (ISSIS) | ON | — | — | — | ON | — | — | — | — | — | — | — | — | — | | | |
| RMID ACQUISITION R (B/S) | ON | — | — | — | — | ON | — | — | — | — | — | — | — | — | | | |
| RMID ACQUISITION R (C/E) | ON | — | — | — | — | — | ON | — | — | — | — | — | — | — | | | |
| MRI TIMEOUT CHECK R (TO CELL) | ON | — | — | — | — | — | — | ON | — | — | — | — | — | — | | | |
| CELL ARRIVING AFTER TIMEOUT (C/E) | ON | — | — | — | — | — | ON | — | — | — | — | — | — | — | | | |
| GA COPY R | ON | — | — | — | — | — | — | — | ON | — | — | — | — | — | | | |
| IF IBOM ARRIVES BEFORE IEOM, MS AND GA IS SET ON (COPYING FOR RDA AFTER COPYING FOR RMID) IF MS IS SET ON IN ICOM (EFMD IS ALSO SET ON), CELL IS TRANSMITTED WITH VCI=E0 WHEN CELL WHOSE E1MS IS SET ON IS COPIED, FLAG AT EF2 IS MASKED AND E1GA IS SET ON (TO PREVENT DOUBLE COUNT) | | | | | | | | | | | | | | | | | |
| SNI AVAILABLE R (B/S) | ON | — | — | — | — | — | — | — | — | ON | — | — | — | — | | × | |
| SA CHECK R (B/S) | ON ○ | — | — | — | — | — | — | — | — | — | ON | — | — | — | | × | |
| SA SCREENING R (B/S) | ON | — | — | — | — | — | — | — | — | — | — | ON | — | — | | × | |
| SIMULTANEOUS TRANSMISSION NUMBER LIMIT R (B) | ON | — | — | — | — | — | — | — | — | — | — | — | ON | — | | × | |
| SIMULTANEOUS TRANSMISSION NUMBER LIMIT R (C/E) | ON | — | — | — | — | — | ○ | — | — | — | — | — | — | ON | | × | |

'ON' : EF WHICH IS SET ON WHEN CHECK RESULT INDICATES NG.

'○' : CHECK IS MADE ONLY WHEN EF WITH THIS MARK INDICATES OK.

'SUB' : SUBSCRIBER LOOPBACK TEST

'ASS' : TEST USING INTER-MH ASSIGNED DA

'—' : CHECK IS MADE REGARDLESS OF OK/NG OF EF WITH THIS MARK

'SPE' : TEST USING INTER-MH SPECIAL DA

'×' : NO CHECK IS MADE WHEN CELL TESTED IN SPECIFIED PVC TEST.

FIG. 290

| ITEM | | INTER-MH BOM | SIP BOM | SIP COM | EOM | SIP SSM | INTER-MH SSM |
|---|---|---|---|---|---|---|---|
| CELL00 | IST | 10 | 00 | 00 | 01 | 01 | 11 |
| CELL03 | SST | 10 | 10 | 10 | 01 | 11 | 11 |
| CELL26 | PL | 2CH | 2CH | 2CH | 4H-2CH | 24H-2CH | — |
| E101 | EFMS | ERRONEOUS OR (ERROR: L) | | | | | L |
| E201 | EFMT | (NONE) | | L AT MRI TIMEOUT | | (NONE) | |
| E204 | EFMA | L WHEN ACTIVE (NOT OBJECT OF EFMS) | (NONE) | | L IN NO ACTIVE | | L IN ACTIVE STATE (NOT OBJECT OF EFMS) |
| E104 | EFMC | (NONE) | L WHEN NO ACTIVE | | (NONE) | | |
| E205 | EFSN | NO CHECK | L AT SN ORDER ERROR | | | | NO CHECK |
| E210 | EFMN | L WHEN RMID IS UNAVAILABLE | (NONE) | | | | L WHEN RMID IS UNAVAILABLE |
| E110 | EFMD | (NONE) | L WHEN RMID IS NOT CONVERTIBLE | | | | (NONE) |
| E211 | EFEN | (NONE) | | | | | ALL "L" |
| E106 | EFGA | DISCARDED CELL L WHEN RMID ACTIVE | (NONE) | | | | L WHEN RMID ACTIVE |
| E207 | EFDA | L WHEN DESTINATION SMI IS UNAVAILABLE | (STOP AT SIMULTANEOUS TRANSMISSION NUMBER LIMITING MECHANISM) | | | | L WHEN DESTINATION SMI IS UNAVAILABLE |
| E202 | EFOO | L AT SELF-LOOPBACK | (STOP AT SIMULTANEOUS TRANSMISSION NUMBER LIMITING MECHANISM) | | | | L AT SELF-LOOPBACK |
| E206 | EFSS | L AT SCREENING VIOLATION | (STOP AT SIMULTANEOUS TRANSMISSION NUMBER LIMITING MECHANISM) | | | | L AT SCREENING VIOLATION |
| E208 | EFEM | L AT DISCARD UNDER SIMULTANEOUS TRANSMISSION CONTROL | NONE | | | | (NO CHECK) |
| E108 | EFED | (NONE) | L AT STOP UNDER SIMULTANEOUS TRANSMISSION CONTROL | | | | (NONE) |

FIG. 292

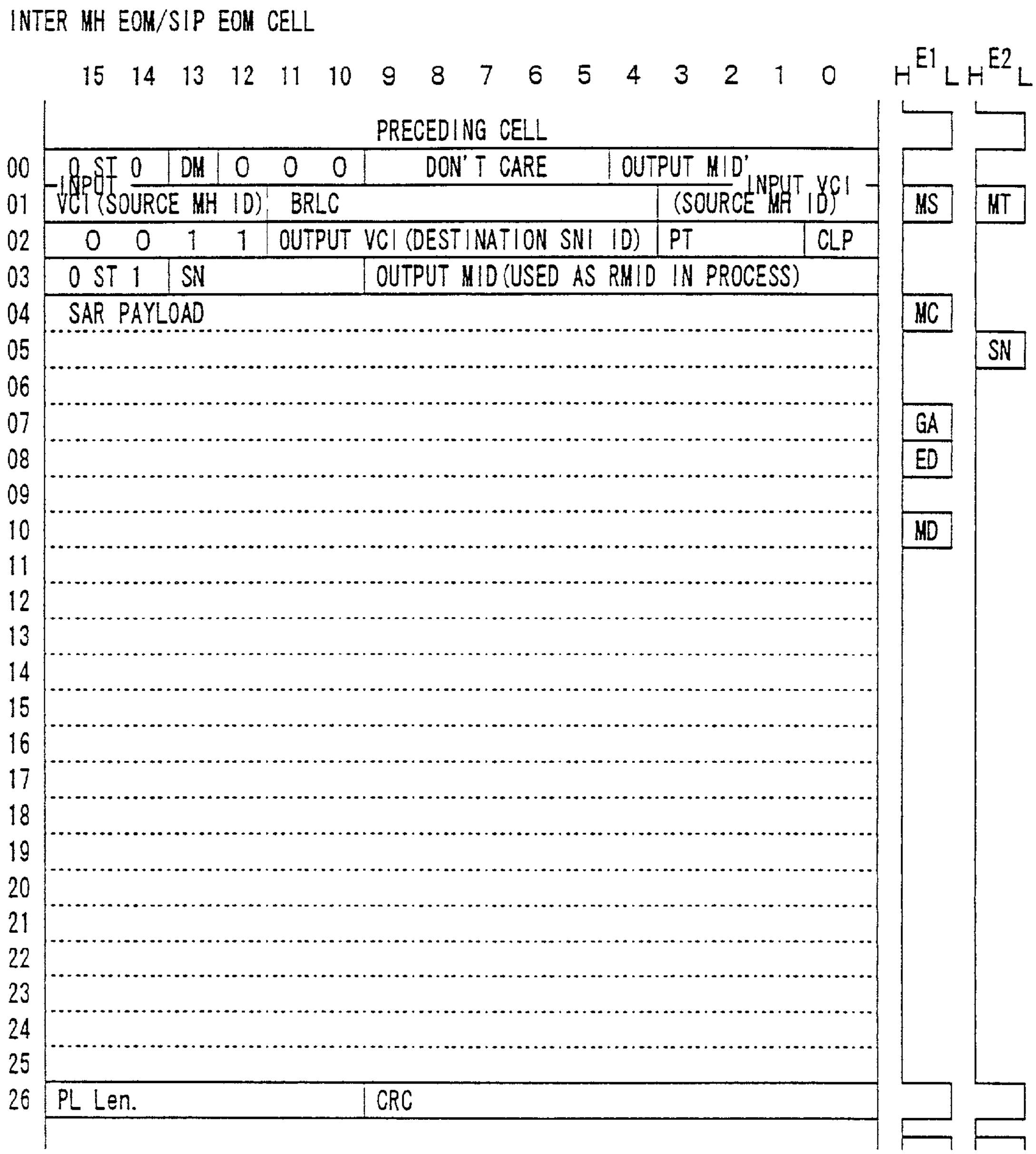
F I G. 2 9 5

| ITEM | BLOCK NAME | REMARKS |
|---|---|---|
| 01 | CROSS-CONNECTION SELECT R | SELECTING ACTIVE SYSTEM DATA OF MDX ACCORDING TO SWITCH SYSTEM INFORMATION |
| 02 | TIMING GENERATOR R | RECEIVING 78MHz CLOCK FROM HLP02A FOR USE IN RMLP. GENERATING 39MHz AND 9MHz CLOCK AND CELL FRAME |
| 03 | ADDRESS FILTER R | SELECTING CELL TO BE PROCESSED AT RMLP FROM CELLS IN 622M DATA, AND BUFFERING AND PASSING SELECTED CELL TO 155M PROCESSING UNIT |

FIG. 297

| ITEM | FUNCTION BLOCK NAME | REMARKS |
| --- | --- | --- |
| 01 | RECEIVING HOME SYSTEM DATA | RECEIVING 39M16 PARALLEL DATA AS ECL UNBALANCED FROM HOME SYSTEM MHCOM THROUGH B. W. B<br>CHECKING CLOCK, CELL FRAME DISCONNECTION, AND PARITY |
| 02 | RECEIVING MATE SYSTEM DATA | RECEIVING 39M16 PARALLEL DATA AS ECL BALANCED FROM MATE SYSTEM MHCOM THROUGH FRONT ACONN.<br>CHECKING CLOCK, CELL FRAME DISCONNECTION, AND PARITY. |
| 03 | TRANSMITTING CROSS-CONNECTION DATA | TRANSMITTING DATA RECEIVED FROM HOME MHCOM THROUGH B. W. B TO HMH00A OF MATE SYSTEM. |
| 04 | 39MHz FIFO | REALLOCATING CLOCK USING V1 DMX LSI.<br>READING DATA RECEIVED BY HOME AND MATE SYSTEMS IN SYNCHRONISM WITH READING CLOCK AND CELL FRAME. |
| 05 | SELECTING CROSS-COMMECTION DATA | SELECTING DATA RECEIVED FROM MHCOM OF HOME AND MATE SYSTEM ACCORDING TO ACT OF MHCOM.<br>SWITCHING SYSTEMS IN SYNCHRONISM WITH FIFO READ CELL FRAME. |
| 06 | ADDRESS FILTER R INF | CONVERTING 39M/16 PARALLEL ECL DATA INTO 13M/48 PARALLEL TTL USING CSPCAD LSI TO INTERFACE WITH ADDRESS FILTER R. |

FIG. 299

| ITEM | POINT NAME | REMARKS |
|---|---|---|
| ① | HRDXCK | DISCONNECTION OF INPUT CLOCK 39M AND CELL FRAME FROM HOME SYSTEM MHCOM |
| ② | HRDXPC | PARITY HECK ERROR OF INPUT DATA FROM HOME SYSTEM MHCOM |
| ③ | MRDXCK | DISCONNECTION OF INPUT CLOCK 39M AND CELL FRAME FROM MATE SYSTEM MHCOM |
| ④ | MRDXPC | PARITY CHECK ERROR OF INPUT DATA FROM MATE SYSTEM MHCOM |
| ⑤ | CSPCPC | PARITY CHECK ERROR OF INPUT DATA TO CSPCAD LSI |

FIG. 303

| ITEM | FUNCTION BLOCK NAME | REMARKS |
|---|---|---|
| 01 | 39MHz GEN. | RECEIVING 78MHz CLOCK AND GENERATING 39MHz CLOCK AND FRAME PULSE |
| 02 | 39MHz CF GEN. | GENERATING READ CF OF V2 DMX LSI FROM GENERATED CLOCK AND FRAME PULSE |
| 03 | 9MHz GEN. | RECEIVING 19MHz CLOCK AND FRAME PULSE, GENERATING 9MHz CLOCK, AND MAKING CELL FRAME IN SYNCHRONISM WITH MSTCF. READING V2 DMX LSI USING THIS CLOCK AND CELL FRAME. |

FIG. 305

| ITEM | POINT NAME | REMARKS |
|---|---|---|
| ① | CK39M | DISCONNECTION OF GENERATED 39M CLOCK AND CELL FRAME |
| ② | CK19M | DISCONNECTION OF GENERATED 9M CLOCK AND FRAME PULSE |
| ③ | CK9M | DISCONNECTION OF GENERATED 9M CLOCK AND CELL FRAME |

FIG. 307

| ITEM | FUNCTION BLOCK NAME | REMARKS |
|---|---|---|
| 01 | DA MATCHER | OPERATING MATCHER ON BOM ADN SSM USING DA-CTL LSI AT DESTINATION ADDRESS (DA). WRITING T TAG PORTION DEGENERATED RDA ARISING AT DA FILTER. |
| 02 | VCI/MID | OPERATING MATCHER ON COM AND EOM AT VCI/MID. |
| 03 | ENABLE CONTROL | OUTPUTTING ONLY MATCHING CELLS TO PROCESSING UNIT ACCORDING TO RESULT OF DA MATCHER AND MID MATCHER. |
| 04 | 622M⇒155M CONVERSION | CONVERTING SPEED OF 622M (13M, 48 PARALLEL) INTO 155M (9M, 16 PARALLEL) USING V2 DMX LSI. |

FIG. 309

| OOBT | SEGMENT TYPE | | | DA-CTL MATCH | READ DATA | WRITE DATA | ENABLE PROCESS | REMARKS |
|---|---|---|---|---|---|---|---|---|
| | ST01 | | ST00 | | | | | |
| 1 | — | | — | — | — | — | INVALID | DISCARD |
| 0 | 0 | | 0 | — | 0 | — | INVALID | DISCARD |
| | 0 | COM | 0 | — | 1 | — | VALID | FETCH |
| | 0 | | 1 | — | 0 | — | INVALID | DISCARD |
| | 0 | EOM | 1 | — | 1 | 0 | VALID | FETCH AND WRITE "0" |
| | 1 | | 0 | 0 | 0 | — | INVALID | DISCARD |
| | 1 | BOM | 0 | 0 | 1 | 0 | VALID | FETCH AND WRITE "0" |
| | 1 | BOM | 0 | 1 | — | 1 | VALID | FETCH AND WRITE "1" |
| | 1 | | 1 | 0 | 0 | — | INVALID | DISCARD |
| | 1 | SSM | 1 | 0 | 1 | 0 | VALID | FETCH AND WRITE "0" |
| | 1 | SSM | 1 | 1 | — | 0 | VALID | FETCH AND WRITE "0" |

F I G. 3 1 0

| ITEM | POINT NAME | REMARKS |
|---|---|---|
| ① | DACTLP | PARITY CHECK ERROR OF INPUT DATA TO DACTL LSI |
| ② | MIDMEM | PARITY CHECK ERROR BY DATA WRITE/READ IN RAM FOR VCI/MID MATCHER |
| ③ | MATADP | DACTL LSI MATCH ADDRESS PARITY ERROR |
| ④ | MIDPC | DACTL LSI VCI/ST/MID PARITY ERROR |
| ⑤ | OUTPC | PARITY CHECK ERROR OF INPUT DATA TO V2 DMX LSI |

FIG. 311

| ITEM | BLOCK NAME | CONTENTS |
|---|---|---|
| 01 | TEST CELL MULTIPLEX R<br>9MG R | MULTIPLEXING TEST CELL WHEN LINE CONTAINS IDLE CELLS<br>GENERATING 9MCK USING 19MCK AND FP FROM HLP02A |
| 02 | MID CHECK R | CHECKING WHETHER OR NOT VCI/MID IS NOT ACTIVE AT BOM AND WHETHER OR NOT VCI/MID IS ACTIVE AT COM AND EOM. |
| 03 | SN CHECK R | INITIALIZING SN AT BON AND SSM AND CHECKING SEQUENCE IN SN AT COM AND EOM. |
| 04 | ENCAPSULATION R | FETCHING SIP INF. PDU FROM INTER-MH INF. PDU AND CHANGING SEGMENT TYPE(ST). |
| 05 | ERROR EDIT I R | ASSIGNING ERROR CHECKED BY EACH CHECKER TO EACH POSITION OF ERROR FLAG |
| 06 | RMID ACQUISITION R | COMPRESSING MID FOR INTERNAL PROCESS |
| 07 | MID TIMEOUT CHECK R | DETERMINING MRI TIMEOUT |
| 08 | GA COPY R | OUTPUTTING CELL INPUT AT GA TO EACH SUBSCRIBER |
| 09 | SNI AVAILABLE R | DISCARDING CELL AT DT FAULT OF SNI OR OTHER DISABLED RECEPTION |
| 10 | ERROR EDIT II R | ASSIGNING ERROR CHECKED BY EACH CHECKER TO EACH POSITION OF ERROR FLAG |
| 11 | SA CHECK R | RETURNING SELF-LOOPBACK CELL IN RESPONSE TO GA MESSAGE |
| 12 | DISCARD COUNTER IR | COUNTING DISCARDED CELLS AT V2 DMX OF HMH00A AND GA COPY UNIT OF HMH01A |

FIG. 313

| ITEM | FUNCTION BLOCK NAME | REMARKS |
|---|---|---|
| 01 | TEST CELL RECEPTION | RECEIVING TEST CELL TRANSMITTED BY HLP02A |
| 02 | TEST CELL TRANSMISSION CONTROL | MONITORING IDLE CELL IN LINE AND TRANSMITTING RECEIVED TEST CELL. NOTIFYING HLP02A AFTER TRANSMITTING. |
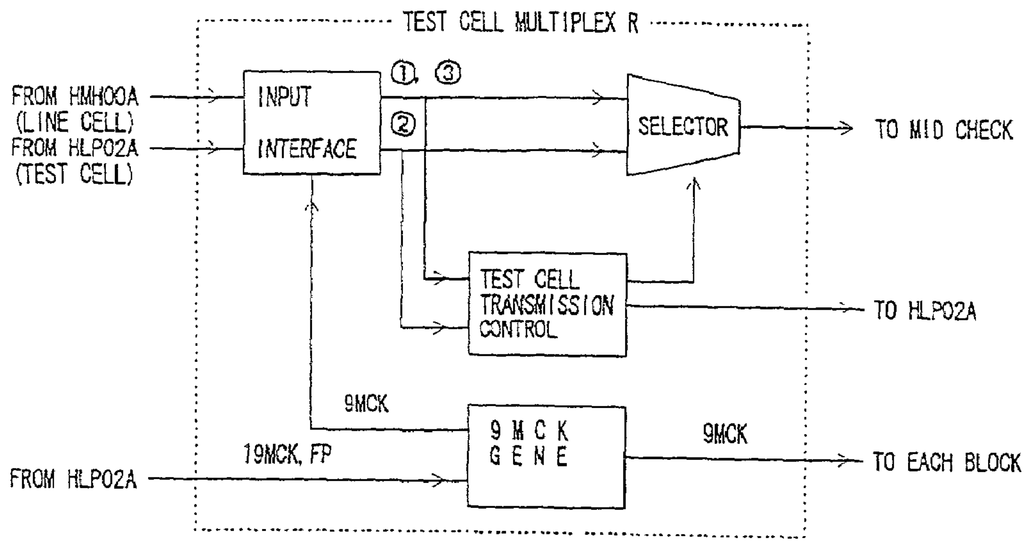
F I G. 314

| ITEM | POINT NAME | REMARKS |
|---|---|---|
| ① | INPC | PARITY CHECK ERROR OF INPUT DATA (LINE CELL) FROM HMH00A |
| ② | TSTPC | PARITY CHECK ERROR OF INPUT DATA (TEST CELL) FROM HMH02A |
| ③ | INCF | DISCONNECTION CHECK OF 9MCK GENERATED BASED ON INPUT CELL FRAME FROM HMH00A AND 19MCK AND FP FROM HLP02A |

FIG. 315

| ITEM | FUNCTION BLOCK NAME | REMARKS |
|---|---|---|
| 01 | ST CHECK | LATCHING SEGMENT TYPE (ST) OF INPUT CELL AND STORING FOR PROCESS FOR EACH ST. |
| 02 | MID CHECK | CHECKING THAT VCI/MID IS NOT IN USE AT BOM AND SSM AND THAT VCI/MID IS IN USE AT COM AND EOM. |

| SEGMENT TYPE | DM | RAM INFORMATION(READ) | PROCESS |
|---|---|---|---|
| INTER-MH BOM | MATCH | ACT | SETTING IN ACT STATE |
| INTER-MH BOM | UNMATCH | ACT | RELEASING |
| INTER-MH BOM | MATCH | NOT ACT | SETTING IN ACT STATE |
| INTER-MH BOM | UNMATCH | NOT ACT | RELEASING |
| INTER-MH SSM | MATCH | ACT | RELEASING |
| INTER-MH SSM | UNMATCH | ACT | RELEASING |
| INTER-MH SSM | MATCH | NOT ACT | RELEASING |
| INTER-MH SSM | UNMATCH | NOT ACT | RELEASING |
| INTER-MH COM | D. C. | ACT | SETTING IN ACT STATE |
| INTER-MH COM | D. C. | NOT ACT | RELEASING |
| INTER-MH EOM | D. C. | ACT | RELEASING |
| INTER-MH EOM | D. C. | NOT ACT | RELEASING |

FIG. 317

| Segment Type | error | DM | Error Flag | |
|---|---|---|---|---|
| Inter-MH BOM | VCI/MID Is Active | 0 | EF1 | EFMS(Master Error Flag) |
| | | | EF2 | EFMA(MID Active Error) |
| | | 1 | EF2 | EFMA(MID Active Error) |
| Inter-MH SSM | VCI/MID Is Active | 0 | EF1 | EFMS(Master Error Flag) |
| | | | EF2 | EFMA(MID Active Error) |
| | | 1 | EF2 | EFMA(MID Active Error) |
| Inter-MH COM | VCI/MID Is Not Active | EF1 | EF1 | EFMC(COM MID Active Error)<br>EFMS(Master Error Flag) |
| Inter-MH EOM | VCI/MID Is Not Active | EF1 | EF1 | EFMC(COM MID Active Error)<br>EFMS(Master Error Flag) |

FIG. 318

| ITEM | POINT NAME | address | bit | REMARKS |
|---|---|---|---|---|
| ① | SNMEM | 0210 | 06 | SN check memory parity NG |

FIG. 319

| ITEM | FUNCTION BLOCK NAME | REMARKS |
|---|---|---|
| 01 | SN+1 | ADDING 1 TO SEQUENCE NUMBER (SN) |
| 02 | SN CHECK | STORING SN+1 WHEN BOM ARRIVES. COMPARING LATCHED SN WITH STORED SN WHEN COM ARRIVES TO CHECK WHETHER OR NOT THEY MATCH (SEQUENTIAL). EOM AND COM PERFORM SIMILAR PROCESSES. SSM IS NOT OBJECT OF CHECK. |
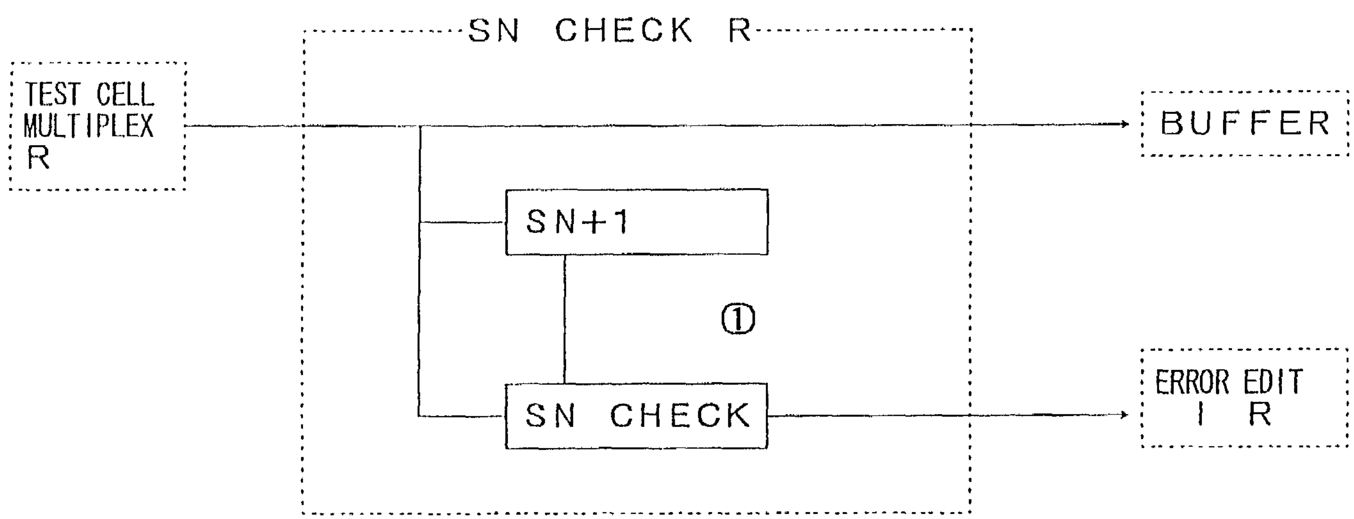
F I G. 320

| Segment Type | error | Error Flag | |
|---|---|---|---|
| Inter-MH COM | DIFFERENT SEQUENCES | EF1 | EFMS(Master Error Flag) |
| | | EF2 | EFSN(Invalid Sequence Number) |
| Inter-MH BOM | DIFFERENT SEQUENCES | EF1 | EFMS(Master Error Flag) |
| | | EF2 | EFSN(Invalid Sequence Number) |

FIG. 321

| ITEM | POINT NAME | address | bit | REMARKS |
|---|---|---|---|---|
| ① | SNMEM | 0210 | 06 | SN check memory parity NG |

FIG. 322

| ITEM | FUNCTION BLOCK NAME | REMARKS |
|---|---|---|
| 01 | SN CHECK | LATCHING SEGMENT TYPE(ST) OF INPUT CELL AND STORING IT FOR USE IN PROCESS OF EACH ST. |
| 02 | ENCAPSULATION | CHANGING INTO BOM IF COM IS NEXT TO BOM, AND INTO SSM IF EOM IS NEXT TO BOM. |

| Segment Type | error | Error Flag | |
|---|---|---|---|
| Inter-MII SSM | UNCONDITIONAL ERROR | EF1 | EFMS (Master Error Flag) |
| | | EF2 | EFEN (Encapsulation Error) |

FIG. 324

| ITEM | POINT NAME | address | bit | REMARKS |
|---|---|---|---|---|
| ① | SNMEM | 0210 | 06 | SN check memory parity NG |

FIG. 325

| ITEM | FUNCTION BLOCK NAME | REMARKS |
|---|---|---|
| 01 | DEFINING ERROR | ASSIGNING ERROR INFORMATION OF EACH CHECKER TO POSITION OF EACH ERROR FLAG. |

| ITEM | FUNCTION BLOCK NAME | REMARKS |
|---|---|---|
| 01 | ACQUIRING ST | FETCHING ST OF VALID CELL AND DETERMINING ST. |
| 02 | GENERATING IDLE PATTERN | TRANSMITTING IDLE PATTERN (ALL 1) TO AMD-CAM AS INITIALIZATION |
| 03 | ACQUIRING VCI/MID | ACQUIRING VCI/MID OF VALID CELL AND TRANSMITTING IT TO RMID MANAGEMENT |
| 04 | MANAGING RMID (AMD-CAM) | DETERMINING WHETHER OR NOT ACQUIRED VCI/MID MATCH IF MATCHING, MATCH ADDRESS SIGNAL IS OUTPUT |
| 05 | CONVERTING RMID ⇨ MID | OVERWRITING MATCH ADDRESS SIGNAL (RMID) OUTPUT AT AMD-CAM ON MID OF CELL |

FIG. 328

| SEGMENT TYPE | ERROR | ERROR FLAG | |
|---|---|---|---|
| INTER-MH BOM | WHEN RMID CANNOT BE ACQUIRED | EF1 | EFMS (MASTER ERROR FLAG) |
| | | EF2 | EFMN (RMID ASSIGNED ERROR) |
| INTER-MH SSM | WHEN RMID CANNOT BE ACQUIRED | EF1 | EFMS (MASTER ERROR FLAG) |
| | | EF2 | EFMN (RMID ASSIGNED ERROR) |
| INTER-MH COM | WHEN RMID IS NOT ACQUIRED PREVIOUSLY, AND IS RELEASED | EF1 | EFMD (RMID ACTIVE ERROR)<br>EFMS (MASTER ERROR FLAG) |
| INTER-MH EOM | WHEN RMID IS NOT ACQUIRED PREVIOUSLY, AND IS RELEASED | EF1 | EFMD (RMID ACTIVE ERROR)<br>EFMS (MASTER ERROR FLAG) |

FIG. 329

| ITEM | FUNCTION BLOCK NAME | REMARKS |
|---|---|---|
| 01 | CELL ST DETERMINATION (CONCURRENT WITH MID COMPRESSION) | FETCHING ST OF VALID CELL AND DETERMINING ST. |
| 02 | CELL COUNTER | CELL COUNTER HAVING MODE IN WHICH CELLS ARE COUNTED EACH TIME ALL CELLS ARRIVE AND HAVING MODE IN WHICH ONLY VALID CELLS ARE COUNTED |
| 03 | GENERATING IDLE PATTERN (CONCURRENT WITH MID COMPRESSION) | INITIALIZING MRI TIME (AMD-CAM)<br>TRANSMITTING IDLE PATTERN FOR BOM |
| 04 | MRI TIME (AMDCAM) | CHECKING FOR TIMEOUT FOR EACH CELL |
| 05 | TO GENERATING PATTERN | OUTPUTTING TO PATTERN TO MRI TIME (AMD-CAM) AT TIMEOUT |
| 06 | TO TRANSMITTING CELL | OUTPUTTING TO CELL INSTEAD OF EOM OF TIMEOUT MESSAGE |

FIG. 331

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| 0 | D. C. | | | | | | | | | | | | | | |
| 0 | D. C. | | | | | | | | | | | | | | |
| 0 | D. C. | | | 0 | 0 | 0 | DESTINATION SNI-ID | | | | | D. C. | | | |
| 0 | D. C. | | | | | RMID | | | | | | | | | |

D.C.: Don't care

FIG. 332

| Segment Type | error | Error Flag | |
|---|---|---|---|
| Inter MH COM | IEOM DOES NOT ARRIVE WITHIN 177MS AFTER IBOM ARRIVED | EF1 | EFMS(Master Error Flag) |
| | | EF2 | EFMT(MRI time out) |
| Inter MH COM<br>Inter MH EOM | CELL ARRIVED AFTER TO CELL IS TRANSMITTED | EF1 | EFMD(RMID Active Error)<br>EFMS(Master Error Flag) |

FIG. 333

| ITEM | FUNCTION BLOCK NAME | REMARKS |
|---|---|---|
| 01 | WRITE OK CHECK | READING WRITE O.K.R TABLE ACCORDING TO VCI/MID AND DETERMINING WHETHER OR NOT DATA CAN BE WRITTEN TO BUFFER FOR GA COPY. IF BUFFER IS FULL (NOT WRITABLE), DISCARD SIGNAL IS TRANSMITTED TO DISCARD COUNT. |
| 02 | BUFFER FOR GA COPY | BUFFER IN WHICH CELLS ARE WRITTEN TO MAKE COPIES AT GA COPY. |
| 03 | RMID ACT R | STORING, FOR EACH RMID, INFORMATION ABOUT WHETHER OR NOT PRESENTLY RECEIVED MESSAGE IS BEING GA COPIED. |
| 04 | IA/GA CHECK | DETERMINING WHETHER RDA OF EACH MESSAGE IS IA OR GA. |
| 05 | ST CHECK | LATCHING SIP SEGMENT TYPE(SST) OF INPUT CELL AND STORING IT TO PROCESS IT FOR EACH ST. |
| 06 | COPY FOR RDA | IF RDA IS GA IN IBOM, COPIED-TO SNI IS DETERMINED FROM GA COPY R TABLE USING ADDRESS OF RDA AND COPIED CELL IS TRANSMITTED. |
| 07 | COPY FOR RMID | IF RDA OF ICOM AND IEOM IS GA, COPIED-TO SNI IS DETERMINED FROM MESSAGE COPY TABLE USING ADDRESS OF RMID AND COPIED CELL IS TRANSMITTED. |
| 07 | ASSIGNING DESTINATION SNI-ID | ASSIGNING DESTINATION SNI-ID TO TRANSMITTED CELL. IF RDA IS IA, IT IS OBTAINED DIRECTLY FROM RDA. IF RDA IS GA, IT IS OBTAINED FROM COPY TABLE. |
| 09 | CONTROLLING ERROR FLAG | IF EFMS(MASTER ERROR FLAG) OF CELL IS SET "ON" AND CELL IS COPIED, ERROR FLAG AT EF2 IS MASKED TO PREVENT DOUBLE COUNT AT TM PORTION OF HLM01A. |

FIG. 335

| Segment Type | error | Error Flag | |
|---|---|---|---|
| Inter MH BOM | IEOM HAS NOT ARRIVED AND IBOM HAVING SAME RMID ARRIVES | EF1 | EFMS(Master Error Flag) |
| | | | EFGA(GA Active Error) |
| Inter MH BOM'<br>Inter MH COM<br>Inter MH EOM | EFMS (MASTER ERROR FLAG) OF CELL IS SET "ON" AND CELL IS COPIED | EF1 | EFGA(GA Active Error) |

FIG. 336

| ITEM | POINT NAME | REMARKS |
|---|---|---|
| ① | GACOPY | GA COPY INPUT UNIT LINE ERROR |
| ② | WOKMEM | Write OK memory Parity Check Error |
| ③ | GAMEM | GA copy cell memory Parity Check Error |
| ④ | GAACTP | GA ACT Parity Check Error |
| ⑤ | GACPPC | GA copy bit map Parity Check Error |

FIG. 337

| ITEM | FUNCTION BLOCK NAME | REMARKS |
|---|---|---|
| 01 | SNI BLOCK INFORMATION | SUPPRESSING TRANSMISSION OF MESSAGE TO SNI ACCORDING TO BLOCK INFORMATION. |

| Segment Type | error | Error Flag | |
|---|---|---|---|
| Inter-MH BOM | not Available | EF1 | EFMS(Master Error Flag) |
| | | EF2 | EFDA(Destination SNI not Available) |
| Inter-MH SSM | not Available | EF1 | EFMS(Master Error Flag) |
| | | EF2 | EFDA(Destination SNI not Available) |

FIG. 339

| ITEM | POINT NAME | REMARKS |
|---|---|---|
| ① | AVPC | SNI AVAILABLE PARITY CHECK ERROR |
| ② | BRLCPC | BRLC NUMBER PARITY CHECK ERROR |

FIG. 340

| ITEM | FUNCTION BLOCK NAME | REMARKS |
|---|---|---|
| 01 | DEFINING ERROR | ASSIGNING ERROR INFORMATION OF EACH CHECKER TO POSITION OF EACH ERROR FLAG. |
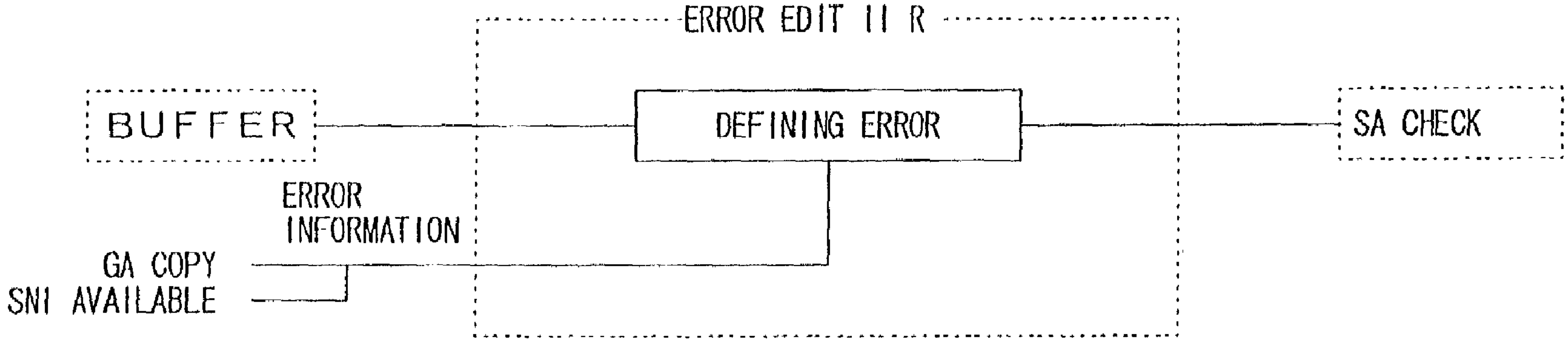
F I G. 341

| ITEM | FUNCTION BLOCK NAME | REMARKS |
|---|---|---|
| 01 | SA CHECK | RETURNING LOOPBACK CELL RECEIVED FROM ENTERED SA |
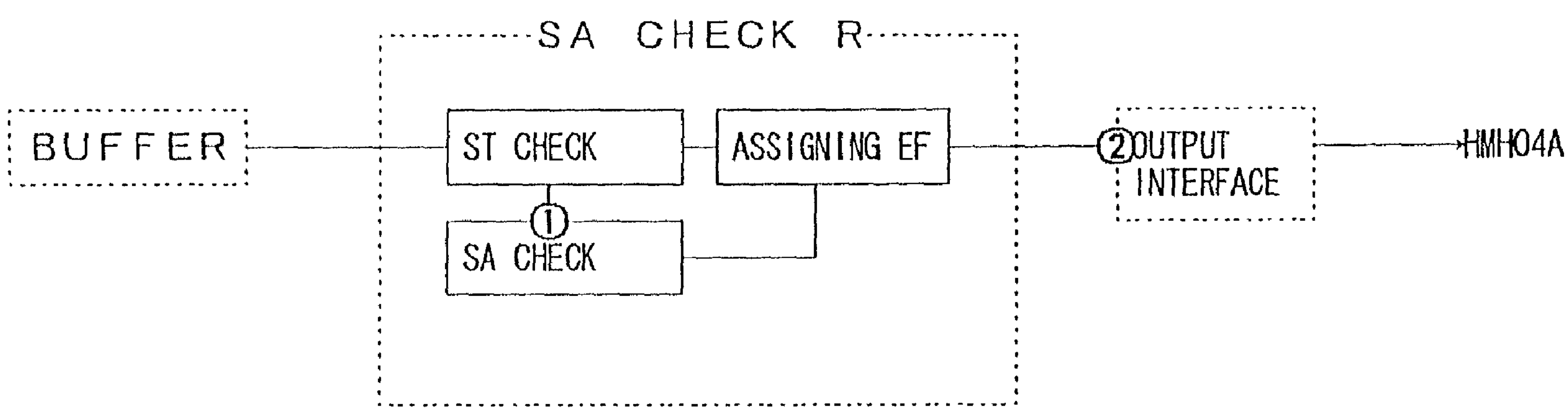
F I G. 3 4 2

| Segment Type | error | Error Flag | |
|---|---|---|---|
| Inter-MH BOM | SELF-LOOPBACK CELL | EF1 | EFMS(Master Error Flag) |
| | | EF2 | EFDO(Destination equal to Org.SNI) |
| Inter-MH SSM | SELF-LOOPBACK CELL | EF1 | EFMS(Master Error Flag) |
| | | EF2 | EFDO(Destination equal to Org.SNI) |

NOTE: INTER-MH COM AND INTER-MH COM ARE D.C.
NOT OBJECT OF CHECK IF HIGHEST ORDER BIT OF DESTINATION SNI-ID IS 1
NOT OBJECT OF CHECK IF EFMS OF CELL HAS ALREADY BEEN SET "ON"

FIG. 343

| ITEM | POINT NAME | REMARKS |
|---|---|---|
| ① | SAMADP | PARITY CHECK ERROR OF SA: CHECK MATCH ADDRESS |
| ② | OUTPC | HMH01A EXIT PARITY CHECK ERROR |

FIG. 344

| SC ATTRIBUTE | WHEN MATCHING AT CAM | WHEN NON-MATCHING AT CAM |
|---|---|---|
| 1 | ERROR (UNACCEPTABLE AT ENTERD ADDRESS) | TRANSMISSION ENABLED |
| 2 | TRANSMISSION ENABLED | ERROR (UNACCEPTABLE AT ADDERSS OTHER THEN ENTERED ADDRESS) |

FIG. 345

| ITEM | FUNCTION | REMARKS |
|---|---|---|
| 01 | CONTROLLING MESSAGE | TRANSMISSION LIMIT OF MESSAGE AND BAND CONTROL |
| 02 | μP I/F | RECEIVING VARIOUS CONTROL SIGNAL TRANSMITTED FROM μP AND DATA, AND INTERNAL CONTROL |
| 03 | GENERATING CLK | GENERATING 9MHz. CLK BASED ON RECEIVED 19MHz. CLK |
| 04 | MONITORING FAULTS | MONITORING FAULT MONITOR OBJECT POINT IN PWCB |

FIG. 348

| ITEM | FUNCTION | |
|---|---|---|
| 01 | SIMULTANEOUS TRANSMISSION LIMIT | LIMITING NUMBER OF MESSAGES FOR EACH SNI |
| 02 | OUTPUT MID ACQUISITION | CONVERTING RMID (COMPRESSED MID) INTO OUTPUT MID |
| 03 | EGRESS FLOW LIMIT | LIMITING OUTPUT BAND (PEAK RATE) FOR EACH SNI |
| 04 | DISCARD COUNTER | COUNTING AND STORING CELLS AND MESSAGES DISCARD AT EGRESS FLOW LIMITING UNIT |
| 05 | CRC-10 GENERATION | GENERATING AND ASSIGNING CRC-10 OF CELL PAYLOAD |
| 06 | TRANSMISSION CONTROL | MANIPULATING HEADER PATTERN FOR SPECIFIED CELL AND RELEASING ENCAPSULATION |
| 07 | INTER-SYSTEM CROSS-CONNECTION | FETCHING HW DATA FROM HMH02A OF MATE SYSTEM AND TRANSMITTING DATA TO MDX UNIT OF HOME SYSTEM |

FIG. 350

| LIMIT NUMBER | TRANSMISSION NUMBER : LIMIT NUMBER | |
|---|---|---|
| 1 | NUMBER OF MESSAGES = 0 | MESSAGE TRANSMISSION ENABLED |
| | NUMBER OF MESSAGES = 1 | NEXT MESSAGE IS BUFFERED AND SUBSEQUENT MESSAGES CANNOT BE TRANSMITTED |
| 16 | 16 > NUMBER OF MESSAGES | MESSAGE TRANSMISSION ENABLED |
| | NUMBER OF MESSAGES = 16 | NEXT MESSAGE IS BUFFERED AND SUBSEQUENT MESSAGES CANNOT BE TRANSMITTED |

FIG. 352

| ITEM | FUNCTION | |
|---|---|---|
| 01 | MESSAGE CONTROL CONTROL | CONTROLLING EACH FUNCTION OF MESSAGE CONTROL UNIT |
| 02 | MEMORY WRT/RED CONTROL | MANAGING AND CONTROLLING MEMORY OF EACH FUNCTION BLOCK |
| 03 | I/F | INTERFACING WITH MNG μ-P OF HLP02A |

FIG. 362

| PWCB CODE | OUTLINE OF FUNCTIONS |
|---|---|
| HMX10A | SMUX FUNCTION (MULTIPLEXING ATM-CELL FROM SMLP TO 622 MBPS HIGHWAY) |
| | RDMX FUNCTION (TRANSMITTING 622MBPS HIGHWAY FROM ASSW TO RMLP) |
| | TDMX FUNCTION (DMUXING TEST CELL FROM 622 MBPS HIGHWAY FROM ASSW) |
| HMX11A | RMUX FUNCTION (MULTIPLEXING ATM-CELL FROM RMLP TO 622 MBPS HIGHWAY) |
| | SDMX FUNCTION (DMUXING SMLP CELL FROM 622 MBPS HIGHWAY FROM ASSW) |
| | SIG-MUX FUNCTION (MULTIPLEXING INTRA-STATION COMMUNICATIONS CELL TO 622 MBPS HIGHWAY TO ASSW) |
| | SIG-DMX FUNCTION (DMUXING INTRA-STATION COMMUNICATIONS CELL FROM 622 MBPS HIGHWAY FROM ASSW) |
| HMX12A | SVCC FUNCTION (VCCM-CONVERTING ATM CELL FROM SMLP) |
| | RVCC FUNCTION (VCCM-CONVERTING ATM CELL FROM RMLP) |
| | TMUX FUNCTION (MULTIPLEXING TEST CELL DMUXED IN TDMX OF HMX10A TO RMLP HIGHWAY, AND MULTIPLEXING CELL DMUXED IN SDMX OF HMX11A TO SMLP HIGHWAY) |
| | SCHEDULER FUNCTION (CONTROLLING SMUX/RMUX OPERATION) |
| HSF05A | LAP TERMINATING FUNCTION (TERMINATING INTRA-STATION COMMUNICATIONS SIMPLE LAP AND COMMUNICATING WITH BSGC-SH) |
| | MSCN/MSD TERMINATING/EDITING FUNCTION |
| | VCC COPY FUNCTION |
| | CLOCK DISTRIBUTING FUNCTION |

FIG. 363

| MONITOR POINT NAME | POINT-NO | DETAILED FAULT MONITOR | REMARKS |
|---|---|---|---|
| CSINPC | | ASSW(UPWARS DAISY CHAIN) ⇨ INPUT HW PARITY CHECK<br>(CSPC S/P INPUT) DATA ODD PARITY | CSPC INTERNAL MONITOR |
| CSINCK | | ASSW(UPWARS DAISY CHAIN) ⇨ INPUT HW 78MHz CLOCK CHECK<br>(78MHz CLOCK) | CSPC INTERNAL MONITOR |
| ADINPC | | ASSW(UPWARS DAISY CHAIN) ⇨ INPUT HW PARITY CHECK<br>(CSPCAD S/P INPUT) DATA ODD PARITY | CSPCAD INTERNAL MONITOR |
| DXINCK | | DMUX INPUT 13MHz CLOCK CHECK<br>(13MHz CLOCK) | PWCB INTERNAL MONITOR |
| RADPC | | RMLP SIDE CSPCAD INPUT PARITY CHECK<br>(RMLP-CSPCAD P/S INPIT) DATA ODD PARITY | CSPCAD INTERNAL MONITOR |
| RDXPC | | RTCG-DMUX INPUT PARITY CHECK<br>(RTCG-DMUX INPUT) DATA+EN ODD PARITY | RTCG-DMUX INTERNAL MONITOR |
| TDXFIPC | | RTCG-DMUX INTERNAL PARITY CHECK<br>(RTCG-DMUX INTERNAL FIFO) DATA+EN ODD PARITY | RTCG-DMUX INTERNAL MONITOR |
| TDXSLD 0 | | RTCG-DMUX CONGESTION STATE CHECK (P=0,CON=0)<br>(RTCG-DMUX INTERNAL FIFO) | RTCG-DMUX INTERNAL MONITOR |
| TDXSLD 1 | | RTCG-DMUX CONGESTION STATE CHECK (P=0,CON=1)<br>(RTCG-DMUX INTERNAL FIFO) | |
| TDXSLD 2 | | RTCG-DMUX CONGESTION STATE CHECK (P=1,CON=0)<br>(RTCG-DMUX INTERNAL FIFO) | |
| TDXSLD 3 | | RTCG-DMUX CONGESTION STATE CHECK (P=1,CON=1)<br>(RTCG-DMUX INTERNAL FIFO) | |
| TDXBFFL | | RTCG-DMUX BUFFER-FULL CHECK<br>(RTCG-DMUX INTERNAL FIFO) | RTCG-DMUX INTERNAL MONITOR |
| ADIMOPC | | ASSW ⇨ DOWNWARD DAISY CHAIN PARITY CHECK<br>(CSPCAD P/S INPUT) DATA ODD PARITY | CSPCAD INTERNAL MONITOR |
| CSIMOPC | | ASSW ⇨ DOWNWARD DAISY CHAIN PARITY CHECK<br>(CSPC P/S INPUT) DATA ODD PARITY | CSPC INTERNAL MONITOR |
| CSIMIPC | | DOWNWARD DAISY CHAIN ⇨ ASSW PARITY CHECK<br>(CSPC S/P INPUT) DATA ODD PARITY | CSPC INTERNAL MONITOR<br>EXCLUDING LOWEST ORDER SH |
| CSIMICK | | DOWNWARD DAISY CHAIN ⇨ ASSW 78MHz CLOCK CHECK<br>(78MHz CLOCK) | CSPC INTERNAL MONITOR |
| ADIMIPC | | DOWNWARD DAISY CHAIN ⇨ ASSW PARITY CHECK<br>(CSPCAD S/P INPUT) DATA ODD PARITY | CSPC INTERNAL MONITOR<br>EXCLUDING LOWEST ORDER SH |
| MXINCK | | MUX INPUT 13MHz CLOCK CHECK<br>(13MHz CLOCK) | PWCB INTERNAL MONITOR |

F I G. 3 6 5

| MONITOR POINT NAME | POINT-NO | DETAILED FAULT MONITOR | REMARKS |
|---|---|---|---|
| MXINPC | | DOWNWARD DAISY CHAINAIN) ⇒ ASSW HIGH-SPEED PARITY CHECK<br>(HIGH-SPEED INPUT) DATA-EN ODD PARITY | SMLP-MUX INTERNAL MONITOR<br>EXCKUDING LOWEST ORDER SH |
| MXSPC | | SMLP-MUX INPUT PARITY CHECK<br>(SMLP-MUX INPUT) DATA+EN ODD PARITY | SMLP-MUX INTERNAL MONITOR |
| MXFIPC | | SMLP-MUX INTERNAL PARITY CHECK<br>(SMLP-MUX INTERNAL FIFO) DATA+EN ODD PARITY | CSPCAD INTERNAL MONITOR |
| MXSLD 0 | | SMLP ⇒ SMLP-MUX CONGESTION STATE CHECK (P=0, COM=0)<br>(SMLP-MUX LOW-SPEED INPUT INTERNAL FIFO) | SMLP-MUX INTERNAL MONITOR |
| MXSLD 1 | | SMLP ⇒ SMLP-MUX CONGESTION STATE CHECK (P=0, COM=1)<br>(SMLP-MUX LOW-SPEED INPUT INTERNAL FIFO) | |
| MXSLD 2 | | SMLP ⇒ SMLP-MUX CONGESTION STATE CHECK (P=1, COM=0)<br>(SMLP-MUX LOW-SPEED INPUT INTERNAL FIFO) | |
| MXSLD 3 | | SMLP ⇒ SMLP-MUX CONGESTION STATE CHECK (P=1, COM=1)<br>(SMLP-MUX LOW-SPEED INPUT INTERNAL FIFO) | |
| MXBFFL | | SMLP ⇒ SMLP-MUX BUFFER-FULL CHECK<br>(SMLP-MUX INTERNAL FIFO) | SMLP-MUX INTERNAL MONITOR |
| MXOCK | | SMLP-MUX ⇒ ASSW(UPWARD DAISY CHAIN) 13MHz CLOCK CHECK<br>(13MHz CLOCK) | PWCB INTERNAL MONITOR |
| ADOPC | | SMLP-MUX ⇒ ASSW(UPWARD DAISY CHAIN) PARITY CHECK<br>(CSPCAD P/S INPUT) DATA ODD PARITY | CSPCAD INTERNAL MONITOR |
| CSOPC | | SMLP-MUX ⇒ ASSW(UPWARD DAISY CHAIN) PARITY CHECK<br>(CSPC P/S INPUT) DATA ODD PARITY | CSPC INTERNAL MONITOR |
| 19MCK | | HSF05A ⇒ MASTER 19MHz CLOCK CHECK<br>(19MHYz CLOCK) | PWCB INTERNAL MONITOR |
| 9MCK | | PWCB INTERNAL ,ASTER 9MHz CLOCK CHECK<br>(9MHz CLOCK) | PWCB INTERNAL MONITOR |
| SMXICK | | SMUX INPUT 13 MHz CLOCK CHECK<br>(13MHz CLOCK) | PWCB INTERNAL MONITOR |

FIG. 366

| MONITOR POINT NAME | POINT-NO | DETAILED FAULT MONITOR | REMARKS |
|---|---|---|---|
| CSINPC | ① | ASSW(UPWARD DAISY CHAIN) ⇨ INPUT HW PARITY CHECK (CSPC S/P INPUT) DATA ODD PARITY | CSPC INTERNAL MONITOR |
| CSINCK | ② | ASSW(UPWARD DAISY CHAIN) ⇨ INPUT HW 78MHz CLOCK (78MHz CLOCK) CHECK | CSPC INTERNAL MONITOR |
| ADINPC | ③ | ASSW(UPWARD DAISY CHAIN) ⇨ INPUT HW PARITY CHECK (CSPCAD S/P INPUT) DATA ODD PARITY | CSPCAD INTERNAL MONITOR |
| DXINCK | ④ | DMUX INPUT 13MHz CLOCK CHECK (13MHz CLOCK) | PWCB INTERNAL MONITOR |
| SDXINPC | ⑤ | SMLP-DMUX INPUT PARITY CHECK (SMLP-DMUX INPUT) DATA+EN ODD PARITY | SMLP-DMUX INTERNAL MONITOR |
| SDXFIPC | ⑥ | SMLP-DMUX INTERNAL PARITY CHECK (SMLP-DMUX INTERNAL FIFO) DATA+EN ODD PARITY | SMLP-DMUX INTERNAL MONITOR |
| SDXSLD 0 | ⑦ | SMLP-DMUX CONGESTION STATE CHECK (P=0, CON=0) (SMLP-DMUX INTERNAL FIFO) | SMLP-DMUX INTERNAL MONITOR |
| SDXSLD 1 | | SMLP-DMUX CONGESTION STATE CHECK (P=0, CON=1) (SMLP-DMUX INTERNAL FIFO) | |
| SDXSLD 2 | | SMLP-DMUX CONGESTION STATE CHECK (P=1, CON=0) (SMLP-DMUX INTERNAL FIFO) | |
| SDXSLD 3 | | SMLP-DMUX CONGESTION STATE CHECK (P=1, CON=1) (SMLP-DMUX INTERNAL FIFO) | |
| SDXBFFL | ⑧ | SMLP-DMUX BUFFER-FULL CHECK (SMLP-DMUX INTERNAL FIFO) | SMLP-DMUX INTERNAL MONITOR |
| SGDXIPC | ⑨ | SIG-DMUX INPUT PARITY CHECK (SMLP-DMUX INPUT) DATA+EN ODD PARITY | SIG-DMUX INTERNAL MONITOR |
| SGDXFIPC | ⑩ | SIG-DMUX INTERNAL PARITY CHECK (SMLP-DMUX INTERNAL FIFO) DATA+EN ODD PARITY | SIG-DMUX INTERNAL MONITOR |
| SGDXSLD 0 | ⑪ | SIG-DMUX CONGESTION STATE CHECK (P=0, CON=0) (SMLP-DMUX INTERNAL FIFO) | SIG-DMUX INTERNAL MONITOR |
| SGDXSLD 1 | | SIG-DMUX CONGESTION STATE CHECK (P=0, CON=1) (SMLP-DMUX INTERNAL FIFO) | |
| SGDXSLD 2 | | SIG-DMUX CONGESTION STATE CHECK (P=1, CON=0) (SMLP-DMUX INTERNAL FIFO) | |
| SGDXSLD 3 | | SIG-DMUX CONGESTION STATE CHECK (P=1, CON=1) (SMLP-DMUX INTERNAL FIFO) | |

FIG. 368

| MONITOR POINT NAME | POINT-NO | DETAILED FAULT MONITOR | REMARKS |
|---|---|---|---|
| SGDXBFFL | 12 | SIG-DMUX BUFFER-FULL CHECK<br>(SMLP-MUX INTERNAL FIFO) | SIG-DMUX INTERNAL MONITOR |
| ADIMOPC | 13 | ASSW ⇨ DOWNWARD DAISY CHAIN PARITY CHECK<br>(CSPCAD P/S INPUT) DATA ODD PARITY | CSPCAD INTERNAL MONITOR |
| CSIMOPC | 14 | ASSW ⇨ DOWNWARD DAISY CHAIN PARITY CHECK<br>(CSPC P/S INPUT) DATA ODD PARITY | CSPC INTERNAL MONITOR |
| CSIMIPC | 15 | DOWNWARD DAISY CHAIN ⇨ ASSW PARITY CHECK<br>(CSPC S/P INPUT) DATA ODD PARITY | CSPC INTERNAL MONITOR EXCLUDING LOWEST ORDER SH |
| CSIMICK | 16 | DOWNWARD DAISY CHAIN ⇨ ASSW 78MHz CLOCK CHECK<br>(78MHz CLOCK) | CSPC INTERNAL MONITOR |
| ADIMIPC | 17 | DOWNWARD DAISY CHAIN ⇨ ASSW PARITY CHECK<br>(CSPCAD S/P INPUT) DATA ODD PARITY | CSPC INTERNAL MONITOR EXCLUDING LOWEST ORDER SH |
| RDXICK | 18 | RMUX INPUT 13MHz CLOCK CHECK<br>(13MHz CLOCK) | PWCB INTERNAL MONITOR |
| MXIMPC | 19 | DOWNWARD DAISY CHAIN ⇨<br>ASSW HIGH-SPEED DATA PARITY CHECK<br>(RMLP-MUX HIGH-SPEED INPUT) DATA+EN ODD PARITY | RMLP-MUX INTERNAL MONITOR EXCLUDING LOWEST ORDER SH |
| MXRPC | 20 | RMLP-MUX INPUT PARITY CHECK<br>(RMLP-MUX INPUT) DATA+EN ODD PARITY | RMLP-DMUX INTERNAL MONITOR |
| MXFIPC | 21 | RMLP-MUX INTERNAL PARITY CHECK<br>(RMLP-MUX INTERNAL FIFO) DATA+EN ODD PARITY | RMLP-DMUX INTERNAL MONITOR |
| MXSDL 0 | 22 | RMLP-MUX CONGESTION STATE CHECK (P=0, CON=0)<br>(RMLP-MUX LOW-SPEED INPUT INTERNAL FIFO) | RMLP-MUX INTERNAL MONITOR |
| MXSDL 1 | | RMLP-MUX CONGESTION STATE CHECK (P=0, CON=1)<br>(RMLP-MUX LOW-SPEED INPUT INTERNAL FIFO) | |
| MXSDL 2 | | RMLP-MUX CONGESTION STATE CHECK (P=1, CON=0)<br>(RMLP-MUX LOW-SPEED INPUT INTERNAL FIFO) | |
| MXSDL 3 | | RMLP-MUX CONGESTION STATE CHECK (P=1, CON=1)<br>(RMLP-MUX LOW-SPEED INPUT INTERNAL FIFO) | |
| MXBFFL | 23 | RMLP-MUX BUFFER-FULL CHECK<br>(RMLP-MUX INTERNAL FIFO) | RMLP-MUX INTERNAL MONITOR |
| SGXXPC | 24 | RMLP-MUX ⇨ SIG-MUX HIGH-SPEED DATA PARITY CHECK<br>(SIG-MUX HIGH-SPEED INPUT) DATA+EN ODD PARITY | SIG-MUX INTERNAL MONITOR |
| SGXMPC | 25 | SIG(MATE)-MUX INPUT PARITY CHECK<br>(SIG MATE-MUX INPUT) DATA+EN ODD PARITY | SIG-MUX INTERNAL MONITOR |

FIG. 369

| MONITOR POINT NAME | POINT-NO | DETAILED FAULT MONITOR | REMARKS |
|---|---|---|---|
| SGXMFIPC | (26) | SIG(MATE)-MUX INTERNAL PARITY CHECK (SIG MATE-MUX INTERNAL FIFO) DATA+EN ODD PARITY | SIG-MUX INTERNAL MONITOR |
| SGXMSL 0 | (27) | SIG(MATE)-MUX CONGESTION STATE CHECK (P=0, CON=0) (SIG MATE-MUX LOW-SPEED INPUT INTERNAL FIFO) | SIG-MUX INTERNAL MONITOR |
| SGXMSL 1 | | SIG(MATE)-MUX CONGESTION STATE CHECK (P=0, CON=1) (SIG MATE-MUX LOW-SPEED INPUT INTERNAL FIFO) | |
| SGXMSL 2 | | SIG(MATE)-MUX CONGESTION STATE CHECK (P=1, CON=0) (SIG MATE-MUX LOW-SPEED INPUT INTERNAL FIFO) | |
| SGXMSL 3 | | SIG(MATE)-MUX CONGESTION STATE CHECK (P=1, CON=1) (SIG MATE-MUX LOW-SPEED INPUT INTERNAL FIFO) | |
| SGXBFFL | (28) | SIG(MATE)-MUX BUFFER-FULL CHECK (SIG MATE-MUX INTERNAL FIFO) | SIG-MUX INTERNAL MONITOR |
| SGXHPC | (29) | SIG(HOME)-MUX INPUT PARITY CHECK (SIG HOME-MUX INPUT) DATA+EN ODD PARITY | SIG-MUX INTERNAL MONITOR |
| SGXHFIPC | (30) | SIG(HOME)-MUX INTERNAL PARITY CHECK (SIG HOME-MUX INTERNAL FIFO) DATA+EN ODD PARITY | SIG-MUX INTERNAL MONITOR |
| SGXHSL | (31) | SIG(HOME)-MUX CONGESTION STATE CHECK (P=0, CON=0) (SIG HOME-MUX LOW-SPEED INPUT INTERNAL FIFO) | SIG-MUX INTERNAL MONITOR |
| SGXHSL | | SIG(HOME)-MUX CONGESTION STATE CHECK (P=0, CON=1) (SIG HOME-MUX LOW-SPEED INPUT INTERNAL FIFO) | |
| SGXHSL | | SIG(HOME)-MUX CONGESTION STATE CHECK (P=1, CON=0) (SIG HOME-MUX LOW-SPEED INPUT INTERNAL FIFO) | |
| SGXHSL | | SIG(HOME)-MUX CONGESTION STATE CHECK (P=1, CON=1) (SIG HOME-MUX LOW-SPEED INPUT INTERNAL FIFO) | |
| SGXHBFFL | 32 | SIG(HOME)-MUX BUFFER-FULL CHECK (SIG HOME-MUX INTERNAL FIFO) | SIG-MUX INTERNAL MONITOR |
| MXOCK | 33 | SIG-MUX ⇨ ASSW(UPWARD DAISY CHAIN) 13MHz CLOCK CHECK (13MHz CLOCK) | PWC8 INTERNAL MONITOR |
| ADOPC | 34 | SIG-MUX ⇨ ASSW(UPWARD DAISY CHAIN) PARITY CHECK (CSPCAD P/S INPUT) DATA ODD PARITY | CSPCAD INTERNAL MONITOR |
| CSOPC | 35 | SIG-MUX ⇨ ASSW(UPWARD DAISY CHAIN) PARITY CHECK (CSPC P/S INPUT) DATA ODD PARITY | CSPC INTERNAL MONITOR |
| 19MCK | 36 | HSF05A ⇨ MASTER 19MHz CLOCK CHECK (19MHz CLOCK) | PWC8 INTERNAL MONITOR |
| 9MCK | 37 | PWC8 INTERNAL MASTER 9MHz CLOCK CHECK (19MHz CLOCK) | PWC8 INTERNAL MONITOR |

FIG. 370

| MONITOR POINT NAME | POINT-NO | DETAILED FAULT MONITOR | REMARKS |
|---|---|---|---|
| SN1PC | ① | SMLP-CELL DATA SEL-N1 INPUT PARITY CHECK DATA+EN ODD PARITY | PWCB INTERNAL MONITOR |
| STN1PC | ② | STCG-CELL DATA SEL-N1 INPUT PARITY CHECK DATA+EN ODD PARITY | PWCB INTERNAL MONITOR |
| RN1PC | ③ | RMLP-CELL DATA SEL-N1 INPUT PARITY CHECK DATA+EN ODD PARITY | PWCB INTERNAL MONITOR |
| RTN1PC | ④ | RTCG-CELL DATA SEL-N1 INPUT PARITY CHECK DATA+EN ODD PARITY | PWCB INTERNAL MONITOR |
| SN1MPC | ⑤ | SEL-N1 MEMORY PARITY CHECK (SMLP, STCG SEL-N1) DATA ODD PARITY | SEL-N1 INTERNAL MONITOR |
| SN1SL | ⑥ | SMLP SEL-N1 CONGESTION STATE CHECK (SMLP-SEL-N1 INTERNAL FIFO) | SEL-N1 INTERNAL MONITOR |
| STN1SL | ⑦ | STCG SEL-N1 CONGESTION STATE CHECK (STCG-SEL-N1 INTERNAL FIFO) | SEL-N1 INTERNAL MONITOR |
| SN1BFFL | ⑧ | SMLP SEL-N1 BUFFER-FULL CHECK (SMLP-SEL-N1 INTERNAL FIFO) | SEL-N1 INTERNAL MONITOR |
| STN1BFFL | ⑨ | STCG SEL-N1 BUFFER-FULL CHECK (STCG-SEL-N1 INTERNAL FIFO) | SEL-N1 INTERNAL MONITOR |
| RN1MPC | ⑩ | SEL-N1 MEMORY PARITY CHECK (RMLP, RTCG SEL-N1) DATA ODD PARITY | SEL-N1 INTERNAL MONITOR |
| RN1SL | ⑪ | RMLP SEL-N1 CONGESTION STATE CHECK (RMLP-SEL-N1 INTERNAL FIFO) | SEL-N1 INTERNAL MONITOR |
| RTN1SL | ⑫ | RTCG SEL-N1 CONGESTION STATE CHECK (RTCG-SEL-N1 INTERNAL FIFO) | SEL-N1 INTERNAL MONITOR |
| RN1BFFL | ⑬ | RMLP SEL-N1 BUFFER-FULL CHECK (RMLP-SEL-N1 INTERNAL FIFO) | SEL-N1 INTERNAL MONITOR |
| RTN1BFFL | ⑭ | RTCG SEL-N1 BUFFER-FULL CHECK (RTCG-SEL-N1 INTERNAL FIFO) | SEL-N1 INTERNAL MONITOR |
| SVCHDPC | ⑮ | SMLP VCIP INPUT DATA HEADER FIELD PARITY CHECK (SMLP VCIP INPUT) DATA ODD PARITY | VCIP INTERNAL MONITOR |

F I G. 373

| MONITOR POINT NAME | POINT-NO | DETAILED FAULT MONITOR | REMARKS |
|---|---|---|---|
| SVCDTPC | | SMLP VCIP INPUT DATA PARITY CHECK<br>(SMLP VCIP INPUT) DATA ODD PARITY | VCIP INTERNAL MONITOR |
| SVCTBPC | | SMLP VCIP VCC-TABLE PARITY CHECK | VCIP INTERNAL MONITOR |
| SVCMPC | | SMLP VCIP VCC MEMORY CHECK | VCIP INTERNAL MONITOR |
| SVCALM | | SMLP VCIP UNSET CELL ARRIVAL ALM | VCIP INTERNAL MONITOR |
| RVCHDPC | | RMLP VCIP INPUT DATA HEADER FIELD PARITY CHECK<br>(RMLP VCIP INPUT) DATA ODD PARITY | VCIP INTERNAL MONITOR |
| RVCDTPC | | RMLP VCIP INPUT DATA PARITY CHECK<br>(RMLP VCIP INPUT) DATA ODD PARITY | VCIP INTERNAL MONITOR |
| RVCTBPC | | RMLP VCIP VCC-TABLE PARITY CHECK | VCIP INTERNAL MONITOR |
| RVCMPC | | RMLP VCIP VCC MEMORY CHECK | VCIP INTERNAL MONITOR |
| RVCALM | | RMLP VCIP UNSET ARRIVAL ALM | VCIP INTERNAL MONITOR |
| SVCOPC | | SMLP-VCIP ⇨ SMLP-MUX OUTPUT PARITY CHECK<br>DATA ODD PARITY | PWCB INTERNAL MONITOR |
| RVCOPV | | RMLP-VCIP ⇨ RMLP-MUX OUTPUT PARITY CHECK<br>DATA ODD PARITY | PWCB INTERNAL MONITOR |
| LAPCK | | LAP MATE SYSTEM CROSS-CONNECTION MASTER 9MHz CLOCK<br>CHECK (SIGNALING-9M CLOCK) | PWCB INTERNAL MONITOR |
| LAPPC | | LAP MATE SYSTEM CROSS-CONNECTION PARITY CHECK<br>(SIGNALING-DATA) DATA+EN ODD PARITY | PWCB INTERNAL MONITOR |
| SYFP | | INTRA-SYSTEM PHASE MONITOR FRAME CHECK | PWCB INTERNAL MONITOR<br>HIGHEST ORDER CH |
| 19MCK | | HSF05A ⇨ MASTER 19MHz CLOC CHECK<br>(19MHz CLOCK) | PWCB INTERNAL MONITOR |

F I G. 3 7 4

| MONITOR POINT NAME | POINT-NO | DITAILED FAULT MONITOR | REMARKS |
|---|---|---|---|
| SHFP | 31 | SMLP MUX SCHEDULER MASTER FRAME CHECK (HMX 10A ⇨ HMX12A) | PWCB INTERNAL MONITOR |
| SHSGFP | 32 | RMLP, SIG MUX SCHEDULER MASTER FRAME CHECK (HMX11A ⇨ HMX12A) | PWCB INTERNAL MONITOR |
| SSHFIPC | 33 | SMLP MUX SCHEDULER FIFO PARITY CHECK | SMLP-SCHEDULER-LCA INTERNAL MONITOR |
| SSHCLT | 34 | SMLP MUX SCHEDULER CONTROL FAULT CHECK | SMLP-SCHEDULER-LCA INTERNAL MONITOR |
| SSHBFFL | 35 | SMLP MUX SCHEDULER FIFO FULL CHECK | SMLP-SCHEDULER-LCA INTERNAL MONITOR |
| RSHFIPC | 36 | RMLP, SIG MUX SCHEDULER FIFO PARITY CHECK | RMLP, SIG SCHEDULER LCA INTERNAL MONITOR |
| RSHCLT | 37 | RMLP SIG MUX SCHEDULER CONTROL FAULT CHECK | RMLP, SIG SCHEDULER LCA INTERNAL MONITOR |
| RSHBFFL | 38 | RMLP', SIG MUX SCHEDULER FIFO FULL CHECK | RMLP, SIG SCHEDULER LCA INTERNAL MONITOR |
| IMSYFP | 39 | INTER-DAISY-CHAIN PHASE SYNCHRONIZING MASTER FRAME CHECK | PWCB INTERNAL MONITOR |

FIG. 375

| MONITOR POINT NAME | POINT-NO | DETAILED FAULT MONITOR | REMARKS |
|---|---|---|---|
| OPTOCK | | SYSTEM 0 OPTICAL 8MHz CLOCK CHECK (0# OL2) | PWCB INTERNAL MONITOR |
| OPT1CK | | SYSTEM 1 OPTICAL 8MHz CLOCK CHECK (1# OL2) | PWCB INTERNAL MONITOR |
| CR8MCK | | MATE SYSTEM μP 8MHz CLOCK CHECK | PWCB INTERNAL MONITOR |
| OBPALM | | MATE SYSTEM OBP FAULT CHECK | PWCB INTERNAL MONITOR |
| EGINPC | | EGCLAD SIGNALING-DATA INPUT PARITY CHECK (HMX11A ⇨ HSF05A) DATA+EN ODD PARITY | EGCLAD INTERNAL MONITOR |
| EGINMPC | | EGCLAD INTERNAL MEMORY PARITY CHECK | EGCLAD INTERNAL MONITOR |
| EGEXMPC | | EGCLAD EXTERNAL MEMORY PARITY CHECK | EGCLAD INTERNAL MONITOR |
| EGBFFL | | EGCLAD BUFFER-FULL CHECK | EGCLAD INTERNAL MONITOR |
| EGEXPC | | SIGNALING-DATA PWCB INPUT PARITY CHECK (HMX11A ⇨ HSF05A) DATA+EN ODD PARITY | PWCB INTERNAL MONITOR |
| SIPTC | | INTER-SYSTEM COMMUNICATIONS PARITY, TIME-OUT CHECK | SIC INTERNAL MONITOR |
| SYFP | | INTER-SYSTEM PHASE SYNCHRONIZATION FRAME CHECK (HLP02A ⇨ HSF05A) | PWCB INTERNAL MONITOR |
| FALM0 | | FUSE DISCONNECTION CHECK (HPT01A ⇨ HSF05A) | PWCB INTERNAL MONITOR |
| FALM1 | | | |
| WDTOF | | MATE SYSTEM WATCHDOG TIMER CHECK | μP INTERNAL MONITOR |

F I G. 3 7 7

| BLOCK | FUNCTION | |
|---|---|---|
| MAIN CONTROL UNIT | MPU | 16BIT MICROPROCESSOR (80C186-10) |
| | RAM | 128K X 16 BIT SRAM FOR FIRMWARE WORK |
| | ROM | 64K X 16 BIT EPROM FOR FIRMWARE STORAGE |
| | OCS | 16 MHz OSCILLATOR |
| REGISTER GROUPS | MSCN & MSD | MSCN: AREA FOR USE IN REPORTING EACH CHECK NG (LISTED IN FIGURE 6.1.2) TO HLP02A |
| | | MSD : AREA FOR USE IN SETTING PSEUDO-FAULT FROM HLP02A |
| | 2PORT COMMUNICATIONS | ACTIVATING/RELEASING INTERRUPTION DURING COMMUNICATIONS WITH HLP02A |
| | LP-COM IMPLEMENTATION INDICATOR | INDICATING IMPLEMENTATION OF LP-COM AND OTHER PWC3 (HLP02A AND HLM00A) |
| | RS232C INF | INTERFACE WITH WORK STATION FOR DEBUGGING |
| | LOCAL-INHIBIT | INITIAL STATE INDICATOR OF PM/TM COUNT VALUE STORAGE RAM |
| | RAM PHASE SWITCHING | INDICATOR OF HARDWARE ACCESS PHASE OF PM/TM COUNT VALUE STORAGE 2-PHASE RAM |
| | LOCAL-RESET | INTERNAL RESET |
| CLK GENERATION | | GENERATING 9MCLK USING 19MCLK AND 19MFP FROM HLP02A |
| OBP | | CONVERTING ON BOARD POWER -48V INTO +5V |

FIG. 380

| BLOCK | FUNCTION |
|---|---|
| INGRESS | COUNTING INGRESS L2/3 SUM OF ERROR, L2/3 INDIVIDUAL ERROR, L3 BURSTY ERROR, NETWORK DATA COLLECTION DERINED ACCORDING TO TR774. |
| TIMING GENERATION | GENERATING EACH TIMING ACCORDING TO 9MCLK, CELL FRAME (CF), AND ENABLE (EN) SIGNAL. |
| SNI, ST, SA/DA, MID IDENTIFICATION | IDENTIFYING SOURCE SNI, SEGMENT TYPE, SA/DA/, MID AND MID FROM CELL DATA |
| ERR. ANALYSIS | ANALYZING ERROR TYPE ACCORDING TO ERROR FLAG (FF) SIGNAL |
| INGRESS LOG-REG. | AREA FOR USE IN REPORTING ERROR TYPE, SOURCE SNI, SA, AND DA WHEN LOG OBJECT ERROR ARISES |
| SA/DA TYPE ACCUMULATION RAM | RAM FOR ACCUMULATING SA AND DA TO COLLECT LOG. |
| THRESHOLD RAM | FIRMWARE SETS THRESHOLD OF L2/3 SUM OF ERROR, AND NI AND NB OF L3 BURSTY ERROR AT INITIALIZATION |
| L2/3 SUM OF ERR. COUNT VALUE D. P. RAM | DUAL PORT RAM FOR STORING COUNT VALUE OF L2/3 SUM OF ERROR |
| ERR. FLAG-REG. | AREA FOR USE IN REPORTING TO FIRMWARE WHEN SUM OF ERROR COUNT VALUE EXCEEDS THRESHOLD |
| L3 BURSTY ERR. COUNT VALUE D. P. RAM | DUAL PORT RAM FOR STORING L3 BURSTY ERROR PDU COUNT VALUE, ERRORED-PDU COUNT VALUE, INTERVAL COUNT VALUE, AND BAD INTERVAL COUNT VALUE |
| E-PDU FLAG RAM | RAM FOR USE IN COUNTING NUMBER OF ERRORED PDU OF L3 BURSTY ERROR |
| L2/3 INDIVIDUAL ERR. D. P. RAM | DUAL PORT RAM FOR STORING COUNT VALUE OF L2/3 INDIVIDUAL ERROR |
| NDC COUNT VALUE D. P. RAM | DUAL PORT RAM FOR STORING COUNT VALUE OF NETWORK DATA COLLECTION |
| EGRESS | COUNTING EGRESS L2/3 INDIVIDUAL ERROR AND NETWORK DATA COLLECTION DEFINED ACCORDING TO TR774. |
| TIMING GENERATION | GENERATING EACH TIMING ACCORDING TO 9MCLK, CELL FRAME (CF), AND ENABLE (EN) SIGNAL. |
| SNI, MH, ST, SA/DA, MID IDENTIFICATION | IDENTIFYING DESTINATION SNI, SOURCE MH, SEGMENT TYPE, SA/DA, AND MID FROM CELL DATA |
| ERR. ANALYSIS | ANALYZING ERROR TYPE ACCORDING TO ERROR FLAG (FF) SIGNAL |
| EGRESS LOG-REG. | AREA FOR USE INREPORTING ERROR TYPE, SOURCE SNI, SA, AND DA WHEN LOG OBJECT ERROR ARISES |
| ERR. TYPE ACCUMULATION RAM | ACCUMULATING ERROR TYPE FOR LOG COLLECTION |
| L2/3 INDIVIDUAL ERR. D. P. RAM | DUAL PORT RAM FOR STORING COUNT VALUE OF L2/3 INDIVIDUAL ERROR |
| NDC COUNT VALUE D. P. RAM | DUAL PORT RAM FOR STORING COUNT VALUE OF NETWORK DATA COLLECTION |

FIG. 381

| CHECK NAME | OBJECT OF CHECK |
|---|---|
| CLKa | DISCONNECTION CHECK OF 19M CLOCK AND FRAME PULSE FROM HLP02A |
| CLKb | DISCONNECTION CHECK OF INTERNALLY GENERATED 9M CLOCK AND CELL FRAME FROM SMLP |
| CLKc | DISCONNECTION CHECK OF INTERNALLY GENERATED 9M CLOCK AND ERROR FLAG 2 FROM SMLP |
| CLKd | DISCONNECTION CHECK OF INTERNALLY GENERATED 9M CLOCK AND CELL FRAME FROM RMLP |
| CLKe | DISCONNECTION CHECK OF INTERNALLY GENERATED 9M CLOCK AND ERROR FLAG 2 FROM RMLP |
| WDTI | TIMEOUT OF WATCHDOG TIMER, AND DICONNECTION OF MPU OUTPUT 8M CLOCK |
| PCa | PARITY CHECK OF DATA AND ENABLE FROM SMLP |
| PCb | PARITY CHECK OF DATA AND ENABLE FROM RMLP |
| PCc | PARITY CHECK OF SA/DA ACCUMULATION RAM |
| PCd | PARITY CHECK OF ERROR TYPE ACCUMULATION RAM |
| PCe | PARITY CHECK OF THRESHOLD RAM |
| PCf | PARITY CHECK OF L2/3 SUM OF ERR. COUNT VALUE D.P. RAM |
| PCg | PARITY CHECK OF INGRESS L2/3 INDIVIDUAL ERR. COUNT VALUE D.P. RAM |
| PCh | PARITY CHECK OF L3 BURSTY ERR. COUNT VALUE D.P. RAM |
| PCi | PARITY CHECK OF EGRESS L2/3 INDIVIDUAL ERR. COUNT VALUE D.P. RAM |
| PCj | PARITY CHECK OF INGRESS NDC COUNT VALUE D.P. RAM |
| PCk | PARITY CHECK OF EGRESS NDC COUNT VALUE D.P. RAM |
| PCl | PARITY CHECK OF E-PDU FLAG RAM |

FIG. 382

| CHECK NAME | CHECK CONDITION |
| --- | --- |
| PCc | RECEIVING ERROR NOTIFICATION OF LOG REQUIRED ERROR FROM SMLP |
| PCd | CELL RECEIVED FROM RMLP IS SIP-BOM OR SIP-SSM |
| PCe | RECEIVING ERROR NOTIFICATION OF L2/3 SUM OF ERROR FROM SMLP |
| PCf | RECEIVING ERROR NOTIFICATION OF L2/3 SUM OF ERROR FROM SMLP |
| PCg | RECEIVING ERROR NOTIFICATION OF L2/3 INDIVIDUAL COUNT ERROR FROM SMLP |
| PCh | CELL RECEIVED FROM SMLP IS INTER-BOM (SIP-BOM OR SIP-SSM UNLESS ENCAPSULATED). |
| | RECEIVING ERROR NOTIFICATION OF L3 BURSTY ERROR THAT ERRORED-PDU SHOULD BE COUNTED |
| | NI=PDU COUNT AS RESULT OF NI COMPARISON IN L3 BURSTY ERROR PROCESS |
| | NI≦ERRORED-PDU COUNT AS RESULT OF NB COMPARISON IN L3 BURSTY ERROR PROCESS |
| | CHECKING UNDER ANY OF FOUR ABOVE LISTED CONDITIONS |
| PCi | RECEIVING ERROR NOTIFICATION OF L2/3 INDIVIDUAL COUNT ERROR FROM RMLP |
| PCj | CELL RECEIVED FROM SMLP IS CELL OTHER THAN INTER-BOM. |
| | CELL RECEIVED FROM SMLP IS INTER-BOM (SIP-BOM OR SIP-SSM UNLESS ENCAPSULATED). |
| | RECEIVING ERROR NOTIFICATION OF NDC INDIVIDUAL COUNT ERROR FROM SMLP |
| | CHECKING UNDER ANY OF THREE ABOVE LISTED CONDITIONS |
| PCk | CELL RECEIVED FROM RMLP IS CELL OTHER THAN INTER-BOM |
| | CELL RECEIVED FROM RMLP IS SIP-BOM OR SIP-SSM. |
| | RECEIVING ERROR NOTIFICATION OF NDC INDIVIDUAL COUNT ERROR FROM RMLP |
| | CHECKING UNDER ANY OF THREE ABOVE LISTED CONDITIONS |
| PCl | CELL RECEIVED FROM SMLP IS EOM. |

F I G. 383

| GROUP | ITEM | Source | LEVEL | Check | Action | No |
|---|---|---|---|---|---|---|
| A | 1 | Maintenance | L3 | MRI time out | Count Log | 1 |
| B | 1 | TR-772 | L2 | Busy Bit = 0 | Stop | — |
| C | 1 | Maintenance | L2 | HCS Violation | Stop Count | — |
| D | 1 | TR-772 | L2 | NCI ≠ 規定pattern | Stop | — |
| E | 1 | Maintenance | L2 | Payload CRC Violation | Stop Count | 2 |
| F | 1 | Maintenance | L2 | Payload Length Error | Stop Count | 3 |
| | 2 | Maintenance | L2 | BOMs/SSMs with Invalid MIDs | Stop Count | 4 |
| G | 1 | Maintenance | L2 | MID Currently Active | Stop Count | 5 |
| | 2 | Maintenance | L2 | Unappreved MID | Stop Count | 5 |
| H | 1 | Maintenance | L2 | Invalid Sequence Number | Stop Count | 6 |
| I | 1 | Maintenance | L3 | Invalid SA Type | Stop Count | 7 |
| | 2 | Maintenance | L3 | Invalid DA Type | Stop Count | 8 |
| J | 1 | Maintenance | L3 | Invalid SMDS Address Type | Stop Count | 9 |
| K | 1 | Maintenance | L3 | Individual DA Assign to Org. SNI | Stop Count | 10 |
| | 2 | Maintenance | L3 | DA Field Format Error | Stop Count Log | 11 |
| | 3 | Maintenance | L3 | SA Field Format Error | Stop Count Log | 12 |
| L | 1 | Maintenance | L3 | Invalid BAsize Field Value | Stop Count Log | 13 |
| | 2 | NDC | L3 | Access Class Violation | Stop Count Log | 14 |
| M | 1 | Maintenance | L3 | Invalid HEL Field Value | Stop Count Log | 15 |
| | 2 | Maintenance | L3 | Invalid HE- Carrier Selection | Stop Count Log | 16 |
| | 3 | Maintenance | L3 | Invalid HE- Version | Stop Count Log | 17 |
| | 4 | NDC | L3 | Exceed Max. Number of CDU | Stop Count Log | 18 |
| | 5 | NDC | L3 | SA not Assigned to Org. SNI | Stop Count Log | 19 |
| | 6 | NDC | L3 | DA Screening Violation | Stop Count Log | 20 |
| N | 1 | Maintenance | L3 | BEtag Mismatch | Stop Count Log | 21 |
| | 2 | Maintenance | L3 | Incorrect Length | Stop Count Log | 22 |
| | 3 | Maintenance | L3 | BAsize Field≠Length Field | Stop Count Log | 23 |
| O | 1 | UNIQUE SPECIFICATION | -- | MID Assigned Error | Stop Count | 24 |
| | 2 | UNIQUE SPECIFICATION | L3 | End User Blocking | Stop Count | 25 |

FIG. 384

| SIGNAL NAME | POLARITY | EXPLANATION |
|---|---|---|
| 9M CLOCK | ——— | ALL SIGNALS OTHER THAN BASIC CLOCK CHANGE AT RISE OF THIS CLOCK |
| CELL FRAME | ⇨ | LAST 1 $\tau$ OF SIGNAL CELL INDICATING BOUNDARY OF CELL ONLY INDICATES L |
| ENABLE | ⇨ | SIGNAL INDICATING VALID/INVALID OF CELL<br>ENTIRE CELL AREA INDICATES L WHEN VALID |
| ERROR NOTIFICATION (2) | ⇨ | SIGNAL INDICATING ERROR TYPE DESCRIBED LATER IN DETAIL L INDICATES ERROR |
| DATA | POSITIVE | 16 PARALLEL DATA + PARITY<br>PARITY IS ODD PARITY IN TOTAL 17 BITS OF 16 BIT PARALLEL DATA + ENABLE |

FIG. 386

| | SST | IST |
|---|---|---|
| Inter-BOM | 1 0 | 1 0 |
| SIP-BOM | 1 0 | ( 0 0 ) |
| COM | 0 0 | 0 0 |
| EOM | 0 1 | 0 1 |
| SIP-SSM | 1 1 | ( 0 1 ) |

FIG. 387

| GROUP | ITEM | SOURCE | LEVEL | CHECK | ACTION | NO |
|---|---|---|---|---|---|---|
| A | 1 | UNIQUE SPECIFICATION | L3 | MRI TIME OUT | COUNT | 1 |
| | 2 | UNIQUE SPECIFICATION | ······ | DEST. EQUAL TO ORG. SNI | ———— | 2 |
| B | 1 | UNIQUE SPECIFICATION | L2 | PAYLOAD CRC VIOLATION | STOP COUNT | 3 |
| C | 1 | UNIQUE SPECIFICATION | L2 | MID CURRENTLY ACTIVE | STOP COUNT | 4 |
| D | 1 | UNIQUE SPECIFICATION | L2 | INVALID SEQUENCE NUMBER | STOP COUNT | 5 |
| E | 1 | NDC | L3 | SA SCREENING VIOLATION | STOP COUNT LOG | 6 |
| | 2 | NDC | L3 | DEST. SNI NOT AVAILABLE | STOP COUNT LOG | 7 |
| F | 1 | NDC | L3 | EXCEED MAX. NUMBER OF CDU | STOP COUNT LOG | 8 |
| G | 1 | UNIQUE SPECIFICATION | L3 | BETAG MISMATCH | STOP COUNT | 9 |
| H | 1 | UNIQUE SPECIFICATION | ······ | MID ASSIGNED ERROR | COUNT | 10 |
| I | 1 | UNIQUE SPECIFICATION | ······ | ENCAPSULATION ERROR | COUNT | 11 |

FIG. 393

| SIGNAL NAME | POLARITY | EXPLANATION |
|---|---|---|
| 9M CLOCK | —— | ALL SIGNALS OTHER THAN BASIC CLOCK CHANGE AT RISE OF THIS CLOCK |
| CELL FRAME | ⇨ | LAST 1 $\tau$ OF SIGNAL CELL INDICATING BOUNDARY OF CELL ONLY INDICATES L. |
| ENABLE | ⇨ | SIGNAL INDICATING VALID/INVALID OF CELL<br>ENTIRE CELL AREA INDICATES L WHEN VALID. |
| ERROR NOTIFICATION | ⇨ | SIGNAL INDICATING ERROR TYPE<br>DESCRIBED LATER IN DETAIL. |
| DATA | + | 16 PARALLEL DATA + PARITY<br>ODD PARITY IN TOTAL 17 BITS OF 16 BIT PARALLEL DATA + ENABLE. |

FIG. 395

| | IST | SST |
|---|---|---|
| Inter-BOM | 1 0 | 1 0 |
| SIP-BOM | 0 0 | 1 0 |
| COM | 0 0 | 0 0 |
| EOM | 0 1 | 0 1 |
| SIP-SSM | 0 1 | 1 1 |

FIG. 396

| BLOCK NAME | FUNCTION |
|---|---|
| 16M | GENERATING 16 MHZ CLOCK FOR MICROPROCESSOR |
| MPU | μP (80C186) |
| ROM | STORING FIRMWARE FOR MPU |
| FOR SENDING T-CELL | TEST CELL SENDING MEMORY |
| FOR RECEIVING T-CELL | TEST CELL RECEIVING MEMORY |
| T-CELL LCA | SENDING TEST CELL FOR HMH01A AND 03A (ASSIGNING ODD PARITY AND ADJUSTING TIMIGN), RECEIVING TEST CELL, MAKING PARITY CHECK, ETC. |
| SRAM | WORK MEMORY FOR MPU |
| 2-PORT SENDING SRAM MNG → MSR | DATA SENDING MEMORY FOR MSR-FIRM |
| 2-PORT RECEIVING SRAM MNG← MSR | DATA RECEIVING MEMORY FROM MSR-FIRM |
| 2-PORT SENDING SRAM MNG → ACC | DATA SENDING MEMORY FOR ACC-FIRM |
| 2-PORT RECEIVING SRAM MNG← ACC | DATA RECEIVING MEMORY FROM ACC-FIRM |
| PIF inf | CONTROLLING INTERFACE WITH PIF (SBIF-LSI) |
| FOR COMMAND MEMORY | SRAM FOR SENDING COMMAND |
| FOR RESPONSE MEMORY | SRAM FOR RECEIVING RESPONSE |
| S-CTL LCA | COMMAND AND RESPONSE CONTROL FOR LP |
| STATE CONTROL | CONTROLLING ACT, INHBIT, ETC.<br>OUS CONTROL TO MATE SYSTEM |
| SEL | SELECTING 64 KHZ CLOCK FROM MH-COM OF HOME AND MATE SYSTEMS |
| PLO | GENERATING 155 MHZ CLOCK IN SYNCHRONISM WITH 64 KHZ CLOCK |
| TMG | GENERATING 78 MHZ AND 19 MHZ CLOCKS FROM 155 MHZ CLOCK |

F I G. 408

| BLOCK NAME | FUNCTION |
|---|---|
| CLKb | DISCONNECTING 8 M CLOCK FOR μP OPERATION |
| CLKe | DISCONNECTING SENDING CELL FRAME (COMMON TO SMLP AND RMLP) |
| CLKf | DISCONNECTING RECEIVING CELL FRAME(COMMON TO SMLP AND RMLP) |
| CLKg | DISCONNECTING ERROR FLAG-1(COMMON TO SMLP AND RMLP) |
| CLKh | DISCONNECTING ERROR FLAG-2(COMMON TO SMLP AND RMLP) |
| PCa | RECEIVING CELL DATA PARITY NG(COMMON TO SMLP AND RMLP) |
| LCA2 | HLP02A LCA CONFIGURATION NG |
| CRNG | ABNORMAL COMMAND AND RESPONSE IN S-CTL1 |
| CLKc | DISCONNECTING 64 K HOME SYSTEM CLOCK |
| CLKd | DISCONNECTING 64 K MATE SYSTEM CLOCK |
| CLKa | DISCONNECTING 19 M CLOCK/FRAME PULSE |

FIG. 409

| 7 | 6 | 5 | 4 | 3 | 2 | 1 | 0 |
|---|---|---|---|---|---|---|---|
| 0 | 0 | 0 | TAGA | | | 0 | 0 |
| UL | TAGC | | | TAGB | | COM | SIG |
| VPI | | | | | | | |
| VPI | | | | VCI | | | |
| VCI | | | | | | | |
| VCI | | | | | | | |
| ~ | | | | | | | ~ |

FIG. 410

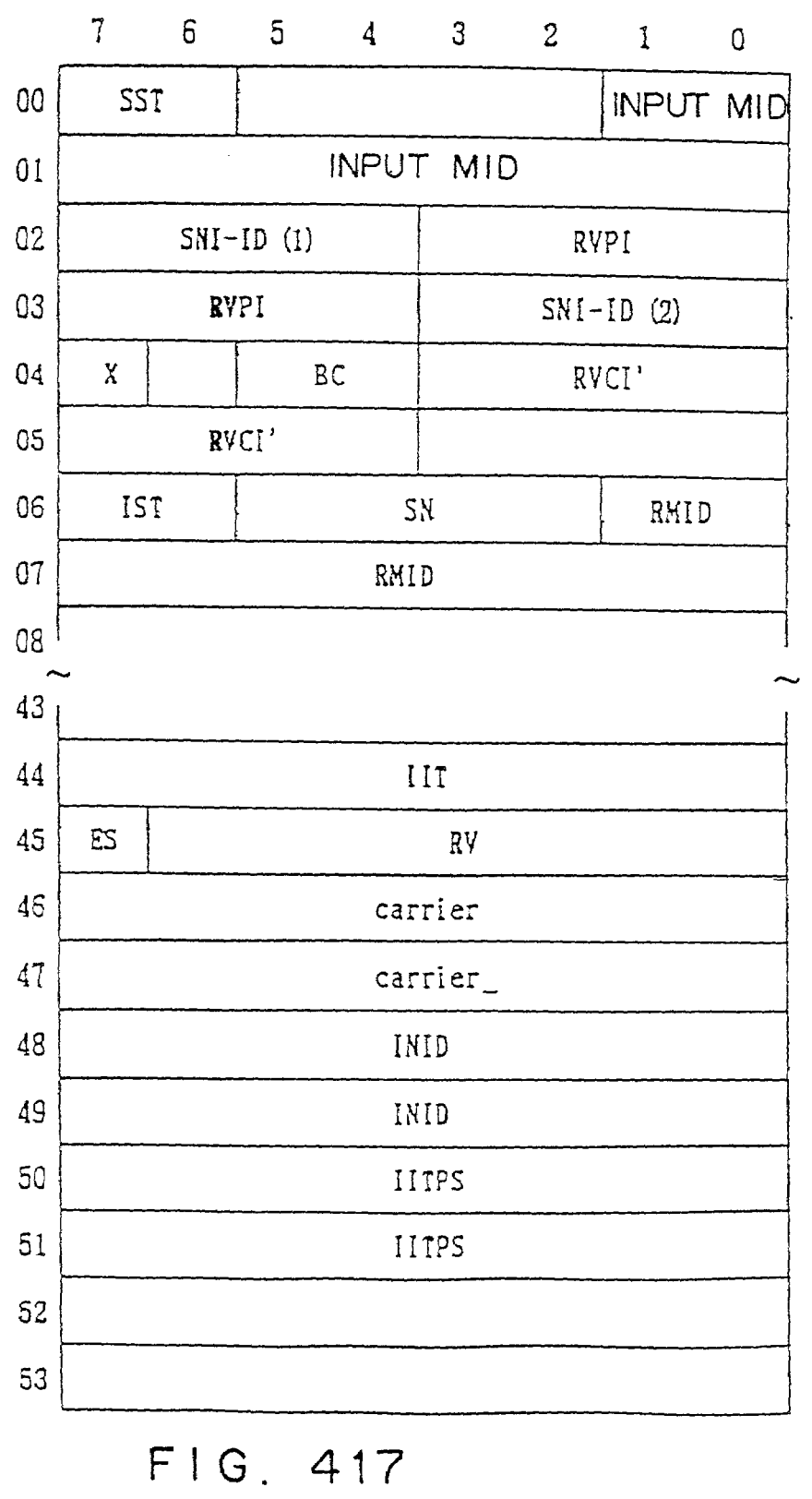

| | 7 | 6 | 5 | 4 | 3 | 2 | 1 | 0 |
|---|---|---|---|---|---|---|---|---|
| 00 | SST | | | | | | INPUT MID | |
| 01 | INPUT MID | | | | | | | |
| 02 | SNI-ID (1) | | | | RVPI | | | |
| 03 | RVPI | | | | SNI-ID (2) | | | |
| 04 | X | | BC | | RVCI' | | | |
| 05 | RVCI' | | | | | | | |
| 06 | IST | | SN | | | | RMID | |
| 07 | RMID | | | | | | | |
| 08 | | | | | | | | |
| ~ | | | | | | | | |
| 43 | | | | | | | | |
| 44 | IIT | | | | | | | |
| 45 | ES | RV | | | | | | |
| 46 | carrier | | | | | | | |
| 47 | carrier_ | | | | | | | |
| 48 | INID | | | | | | | |
| 49 | INID | | | | | | | |
| 50 | IITPS | | | | | | | |
| 51 | IITPS | | | | | | | |
| 52 | | | | | | | | |
| 53 | | | | | | | | |

FIG. 417

| 7 | 6 | 5 | 4 | 3 | 2 | 1 | 0 |
|---|---|---|---|---|---|---|---|
| SST | | | | | | INPUT MID | |
| INPUT MID | | | | | | | |
| TRIAL | CP | SNI-ID (1) | | RVPI | | | |
| RVPI | | | | SNI-ID (2) | | | |
| X | | BC | | RVCI'' | | | |
| RVCI'' | | | | | | | |
| IST | | SN | | | | OUTPUT MID | |
| OUTPUT MID | | | | | | | |

FIG. 419

<table>
<tr><th>7</th><th>6</th><th>5</th><th>4</th><th>3</th><th>2</th><th>1</th><th>0</th></tr>
<tr><td>0</td><td>0</td><td>0</td><td colspan="3">TAGA</td><td>0</td><td>0</td></tr>
<tr><td>UL</td><td colspan="3">TAGC</td><td colspan="2">TAGB</td><td>COM</td><td>SIG</td></tr>
<tr><td colspan="8">VPI</td></tr>
<tr><td colspan="4">VPI</td><td colspan="4">VCI</td></tr>
<tr><td colspan="8">VCI</td></tr>
<tr><td colspan="4">VCI</td><td colspan="4"></td></tr>
<tr><td colspan="8">~ ~</td></tr>
</table>

FIG. 420

| 7 | 6 | 5 | 4 | 3 | 2 | 1 | 0 |
|---|---|---|---|---|---|---|---|
| IST | | | | | | | |
| | | | OUTPUT MID | | | | |
| 0 | 0 | 0 | 0 | 0 | 0 | 1 | 1 |
| 1 | 1 | 1 | 1 | 0 | 0 | 0 | 0 |
| 0 | 0 | 1 | 1 | RVCI | | | |
| RVCI | | | | | | | |
| SST | | SN | | | | OUTPUT MID | |
| OUTPUT MID | | | | | | | |
| ~ | | | | | | | ~ |

FIG. 430

| 7 | 6 | 5 | 4 | 3 | 2 | 1 | 0 |
|---|---|---|---|---|---|---|---|
| 0 | 0 | 0 | TAGA | | | 0 | 0 |
| UL | TAGC | | | TAGB | | COM | SIG |
| VPI | | | | | | | |
| VPI | | | | VCI | | | |
| VCI | | | | | | | |
| VCI | | | | | | | |
| | | | | | | | |

FIG. 431

10.24 ERROR FLAG ( IN SMLP )

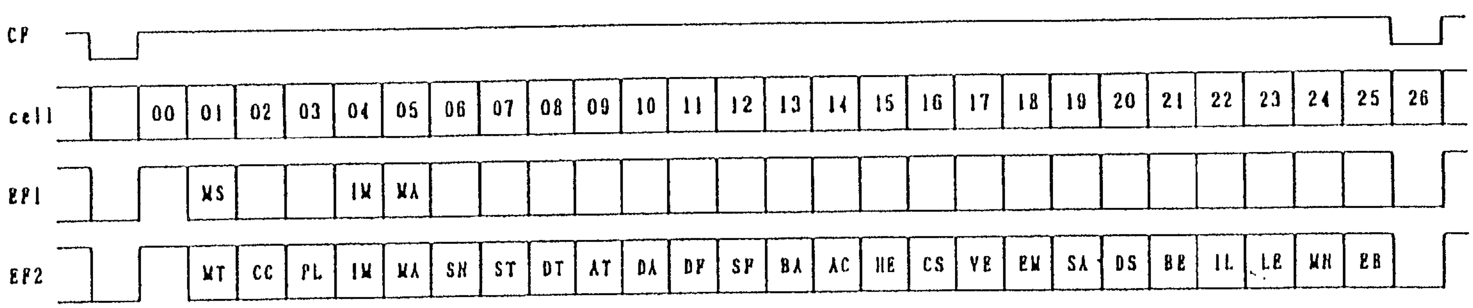

[EP1]

MS : master
IM : COM with MID=0
MA : MID not active (COM)

[EP2]

MT : MRI time out
CC : Payload CRC violation
PL : Payload length error
IM : BOM/SSM with invalid MID
MA : MID currently active or BOM with unapproved MID
SN : Invalid sequence number
ST : Invalid SA type
DT : Invalid DA type
AT : Invalid SMDS address type
DA : Individual DA assigned to originating SNI
DF : DA field format error
SP : SA field format error
BA : Invalid BAsize field value
AC : Access class violation
HE : Invalid HE length field value
CS : Invalid HE carrier selection
VE : Invalid HE version
EM : Exceed maximum number of CDU
SA : SA not assigned to originating SNI
DS : DA screening violation
BE : BEtag mismatch
IL : Incorrect length
LE : BAsize field not equal to length field
MN : MID assigned error
EB : End-user blocking

FIG. 432

10.25 ERROR FLAG (IN RMLP)

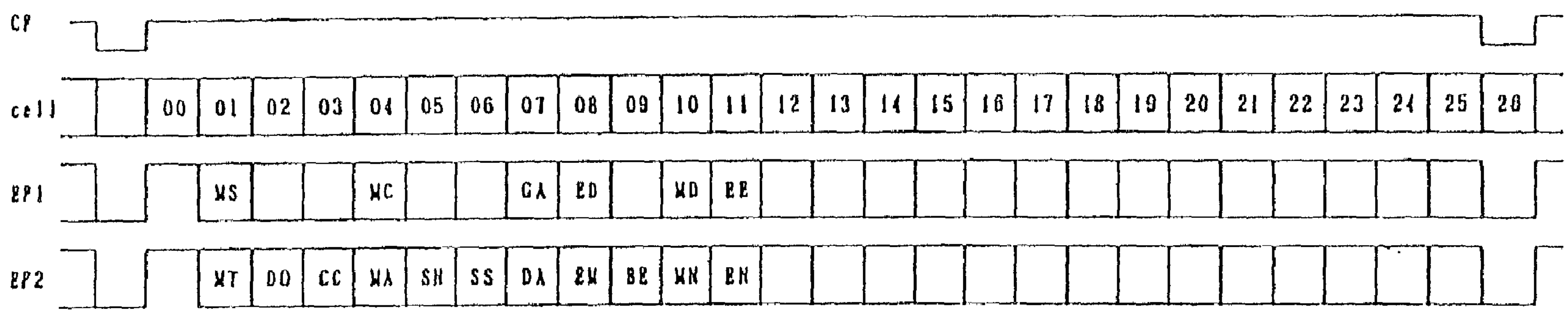

[EP1]

MS : master
MC : COM MID active error
GA : GA active error
ED : CDU active error
MD : RMID active error
BE : Encapsulation D.C.

[EP2]

MT : MRI time out
DO : Destination equal to originating SNI
CC : Payload CRC violation
MA : MID active error
SN : Invalid sequence number
SS : SA screening violation
DA : Destination SNI not available
EM : Exceed maximum number of CDU
BE : BFlag mismatch
MN : RMID assigned error
EN : Encapsulation error

FIG. 433

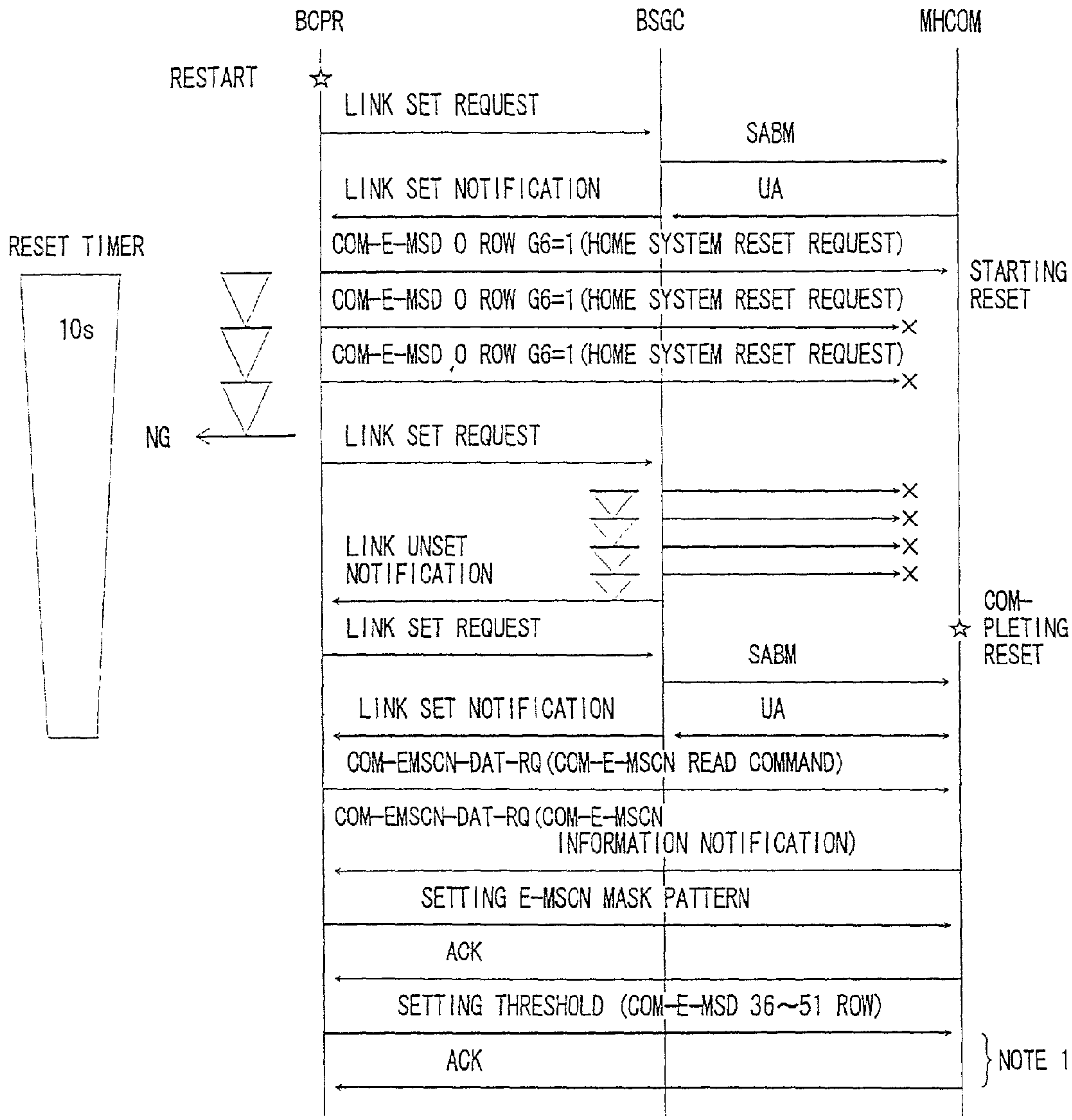
NOTE 1 : NOT NECESSARY TO SET THRESHOLD WHEN HARDWARE DEFAULT VALUE IS USED. SINGLE COMMAND CAN SET THRESHOLD OF 1MUX OR 1DMUX ONLY.
F I G. 434

| RECEIVING VPI/VCI VALUE | | USE | SENDING VPI/VCI VALUE | | USE |
|---|---|---|---|---|---|
| VPI (H) | VCI (H) | | VPI (H) | VCI (H) | |
| 000 | 03FC | INTRA-SYSTEM-#0 COMMUNICATIONS | 0AA | 0000 ∫ 03FF | AA : BSGC CARD NO.<br>VCI: BSGC PORT NO.<br>03FA AND 03FB FOR TEST USE (TCG) |
| 000 | 03FD | INTRA-SYSTEM-#1 COMMUNICATIONS | | | |

FIG. 436

| shelf No. | UL | TAGC | COM | SIG | 0 |
|---|---|---|---|---|---|
| 0 | 0 | 0 | 0 | 0 | 0 |
| 1 | 0 | 1 | 0 | 0 | 0 |
| 2 | 0 | 2 | 0 | 0 | 0 |
| 3 | 0 | 3 | 0 | 0 | 0 |

FIG. 439

| shelf No. | UL | TAGC | COM | SIG | 0 |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |

FIG. 440

| ITEM | FAULT TYPE | NOTIFICATION METHOD | NOTIFYING SYSTEM | SUSPECT UNIT | ACTION | | | | | REMARKS |
|---|---|---|---|---|---|---|---|---|---|---|
| | | | | | ASSW SYSTEM SWITCH | FAULT BLOCK | FAULT MESSAGE | ALM LIGHTED | MAKING DIAGNOSIS | |
| 1 | HARDWARE FAULT (EXCEPT SIGNALLING UNIT AND RMUX UNIT ) | HOME SYSTEM E-MSCN | ACT | ACT MHCOM | ○ | ○ | ○ | ○ | ○ PREVIOUS ACT | ACTIVATING DIAGNOSIS FROM MATE SYSTEM |
| | | | SBY | SBY MHCOM | — | ○ | ○ | ○ | ○ SBY | |
| 2 | HARDWARE FAULT (SIGNALLING UNIT AND RMUX UNIT) | MATE SYSTEM E-MSCN | ACT | SBY MHCOM | — | ○ | ○ | ○ | ○ SBY | |
| | | | SBY | ACT MHCOM | ○ | ○ | ○ | ○ | ○ PREVIOUS ACT | |
| 3 | OBP FAULT | MATE SYSTEM E-MSCN | ACT | SBY MHCOM | — | ○ | ○ | ○ | ○ SBY | |
| | | | SBY | ACT MHCOM | ○ | ○ | ○ | ○ | ○ PREVIOUS ACT | |
| 4 | MATE POWER PWCB FAULT (DISCONNECTION OF FUSE) | MATE SYSTEM E-MSCN | ACT | SBY SYSTEM POWER PWCB | — | ○ | ○ | ○ | ○ SBY | POWER SUPPLIED BY POWER PWCB CLOSING MHCOM ↓ BLOCKING ASSW OF CORRESPONDING SYSTEM |
| | | | SBY | ACT SYSTEM POWER PWCB | ○ | ○ | ○ | ○ | ○ PREVIOUS ACT | |

FIG. 444

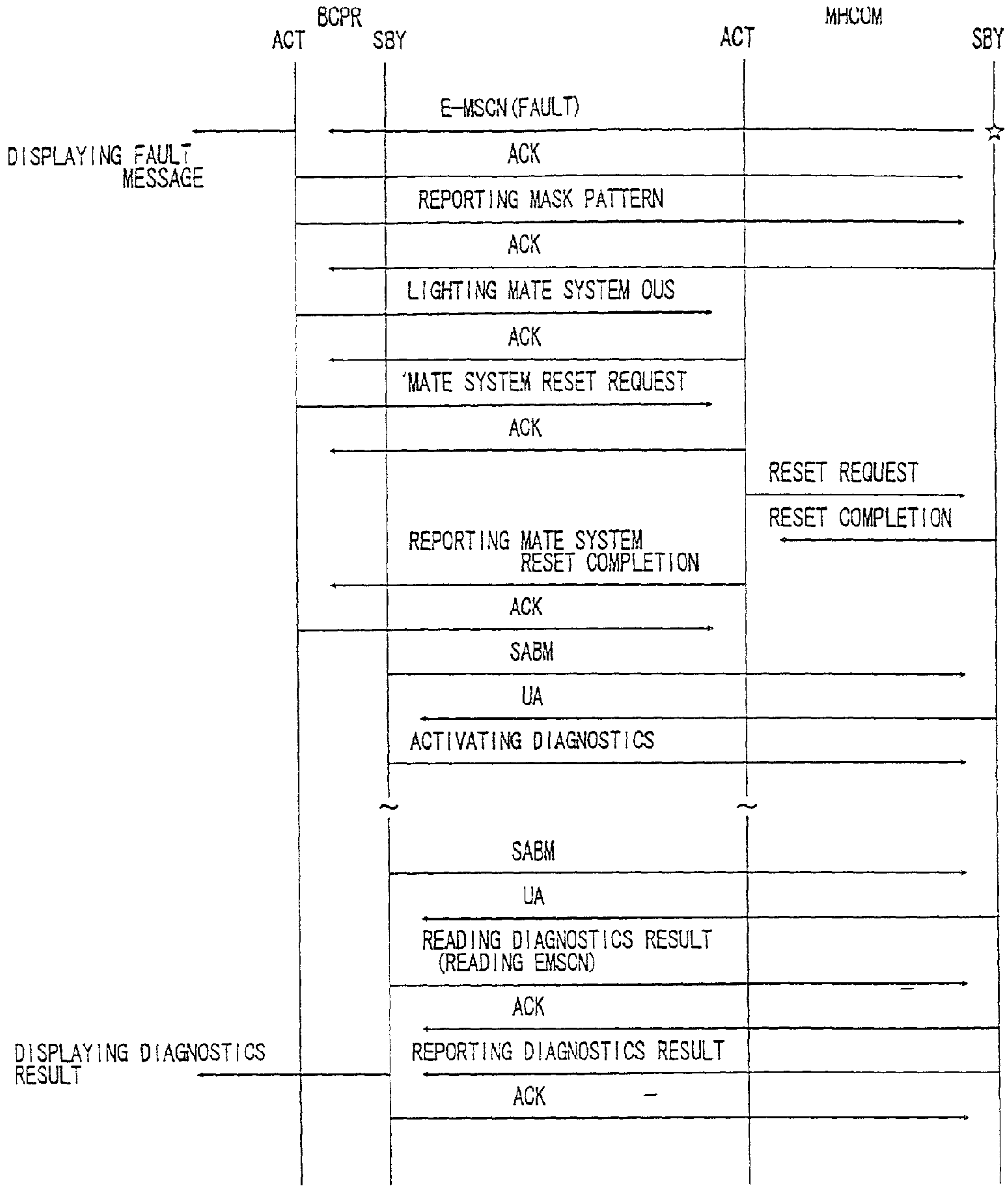
F I G. 445

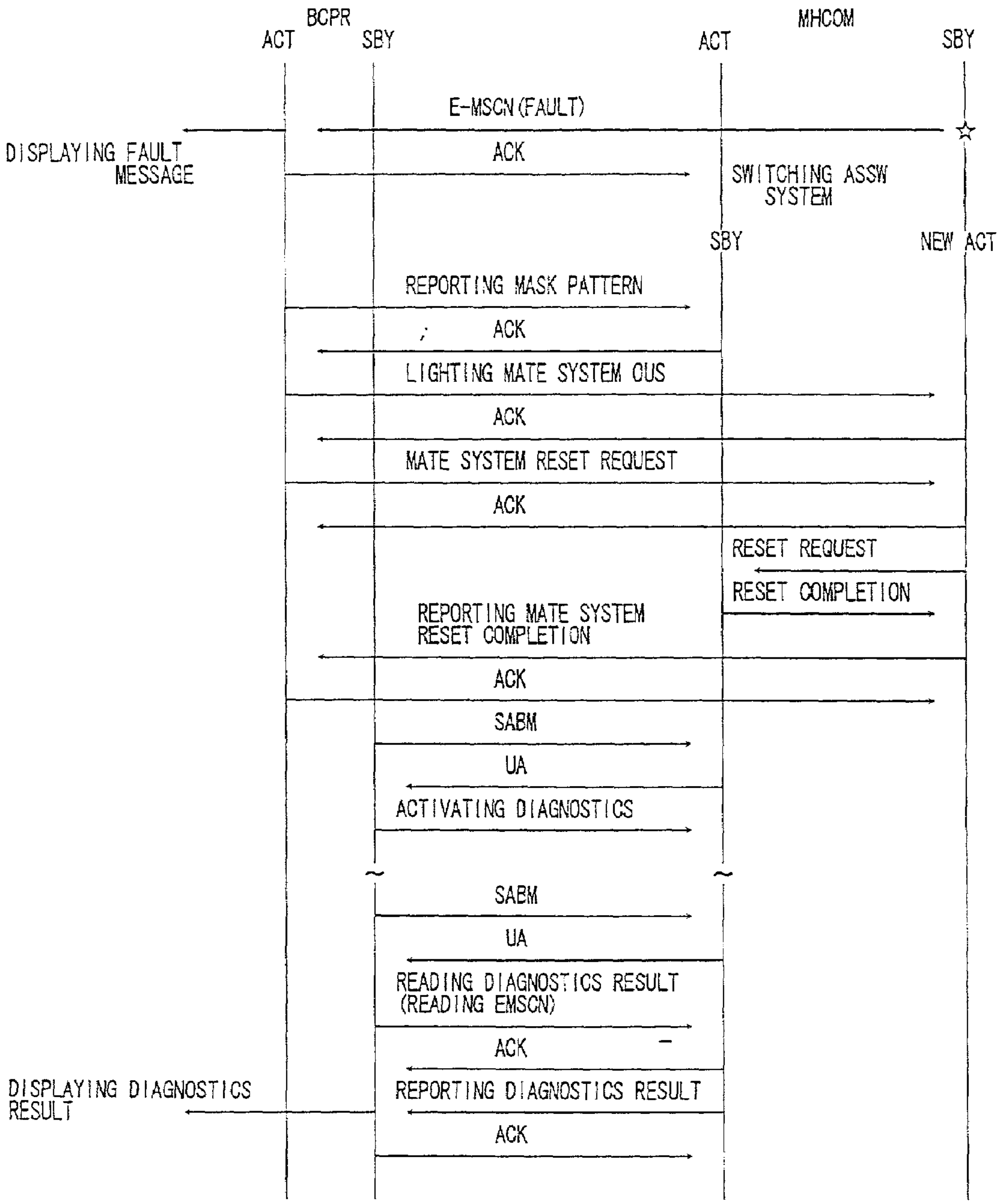
F I G. 446

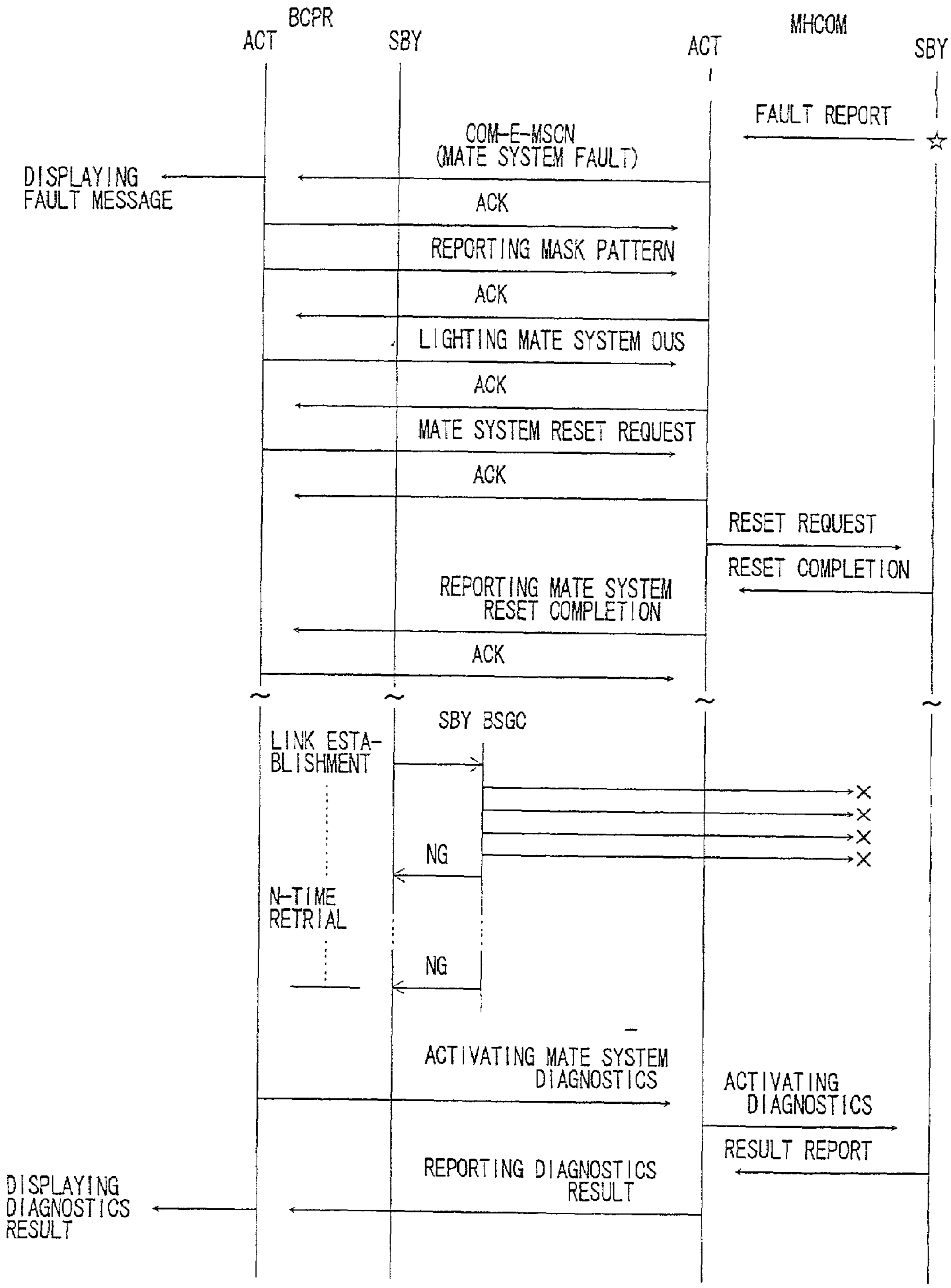
F I G. 447

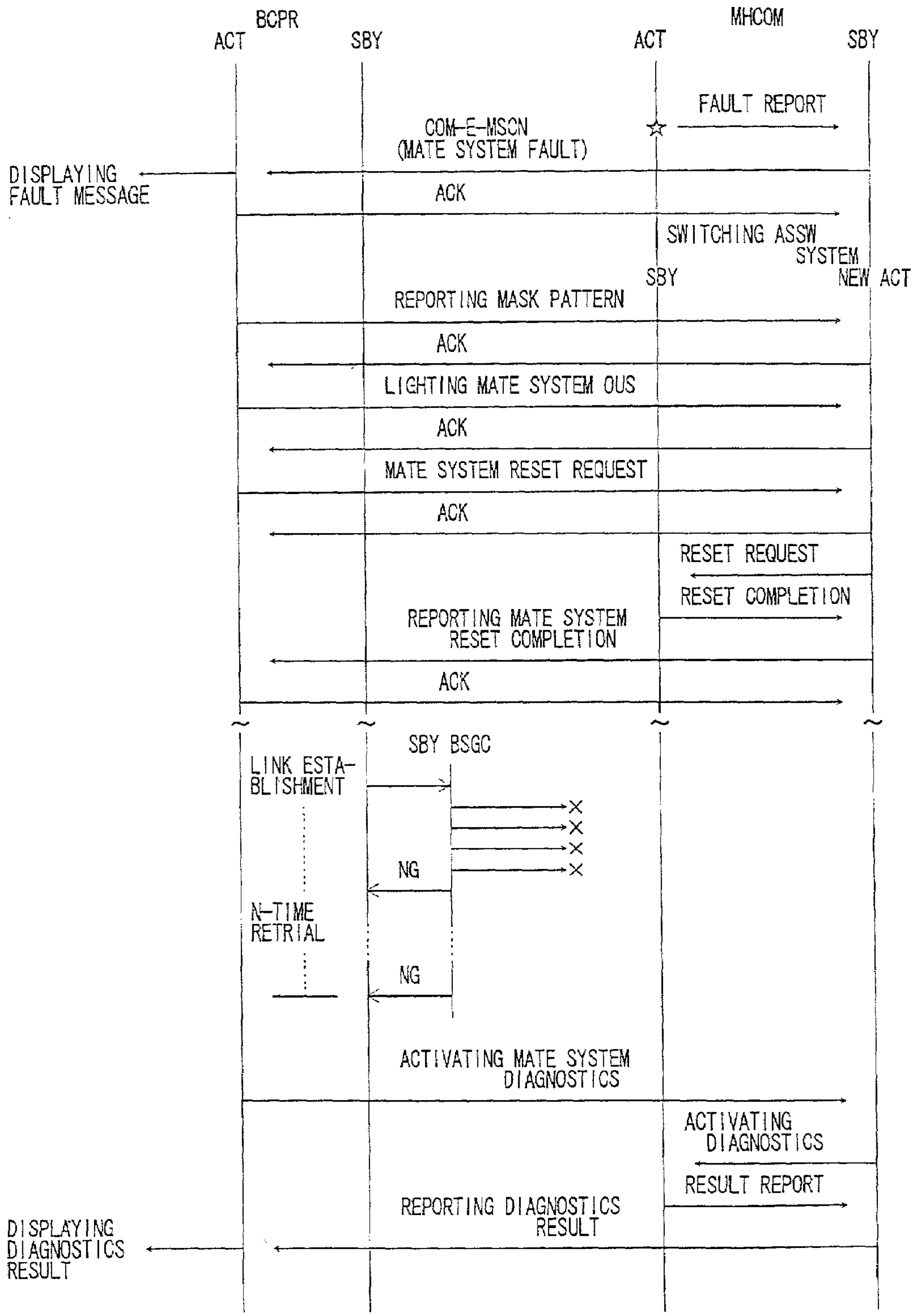
F I G. 448

| BIT | CONTENTS | POLARITY |
|---|---|---|
| 31 | DISPLAYING RESET COMPLETION | 1 WHEN RESET COMPLETION |
| 30 | DON'T CARE | ———— |
| 29 | LP UNIT FAULT | 1 WHEN FAULT OCCURS |
| 28 | DMA ACCESS ERROR 1 | 1 WHEN ERROR OCCURS |
| 27 | DMA ACCESS ERROR 2 | 1 WHEN ERROR OCCURS |
| 26 | DMA PARITY ERROR | 1 WHEN ERROR OCCURS |
| 25 | DMA TIME OVER | 1 AT TIME OVER |
| 24 | DON'T CARE | ———— |
| 23 | MPAL : MATE LP UNIT FAULT | 1 WHEN FAULT OCCURS |
| 22 | MFAL : MATE FUSE ALARM | 1 WHEN ALARM IS OUTPUT |
| 21 | HOME SDMX ⇨ SMLP CROSS-CONNECTION FAULT PARITY NG | 1 AT NG |
| 20 | HOME SDMX ⇨ SMLP CROSS-CONNECTION FAULT CF NG OR CLOCK NG | 1 AT NG |
| 19 | MATE SDMX ⇨ SMLP CROSS-CONNECTION FAULT PARITY NG | 1 AT NG |
| 18 | MATE SDMX ⇨ SMLP CROSS-CONNECTION FAULT CF NG OR CLOCK NG | 1 AT NG |
| 17 | SMLP ⇨ HOME SMUX CROSS-CONNECTION FAULT PARITY NG | 1 AT NG |
| 16 | SMLP ⇨ HOME SMUX CROSS-CONNECTION FAULT CF NG OR CLOCK NG | 1 AT NG |
| 15 | SMLP ⇨ MATE SMUX CROSS-CONNECTION FAULT PARITY NG | 1 AT NG |
| 14 | SMLP ⇨ MATE SMUX CROSS-CONNECTION FAULT CF NG OR CLOCK NG | 1 AT NG |
| 13 | HOME RDMX ⇨ RMLP CROSS-CONNECTION FAULT PARITY NG | 1 AT NG |
| 12 | HOME RDMX ⇨ RMLP CROSS-CONNECTION FAULT CF NG OR CLOCK NG | 1 AT NG |
| 11 | MATE RDMX ⇨ RMLP CROSS-CONNECTION FAULT PARITY NG | 1 AT NG |
| 10 | MATE RDMX ⇨ RMLP CROSS-CONNECTION FAULT CF NG OR CLOCK NG | 1 AT NG |
| 09 | RMLP ⇨ HOME RMUX CROSS-CONNECTION FAULT PARITY NG | 1 AT NG |
| 08 | RMLP ⇨ HOME RMUX CROSS-CONNECTION FAULT CF NG OR CLOCK NG | 1 AT NG |
| 07 | RMLP ⇨ MATE RMUX CROSS-CONNECTION FAULT PARITY NG | 1 AT NG |
| 06 | RMLP ⇨ MATE RMUX CROSS-CONNECTION FAULT CF NG OR CLOCK NG | 1 AT NG |
| 05 | DON'T CARE | ———— |
| 04 | DON'T CARE | ———— |
| 03 | DON'T CARE | ———— |
| 02 | DON'T CARE | ———— |
| 01 | HOME MH-COM ⇨ LP CROSS-CONNECTION FAULT SOURCE CLOCK NG | 1 AT NG |
| 00 | MATE MH-COM ⇨ LP CROSS-CONNECTION FAULT SOURCE CLOCK NG | 1 AT NG |

F I G. 450

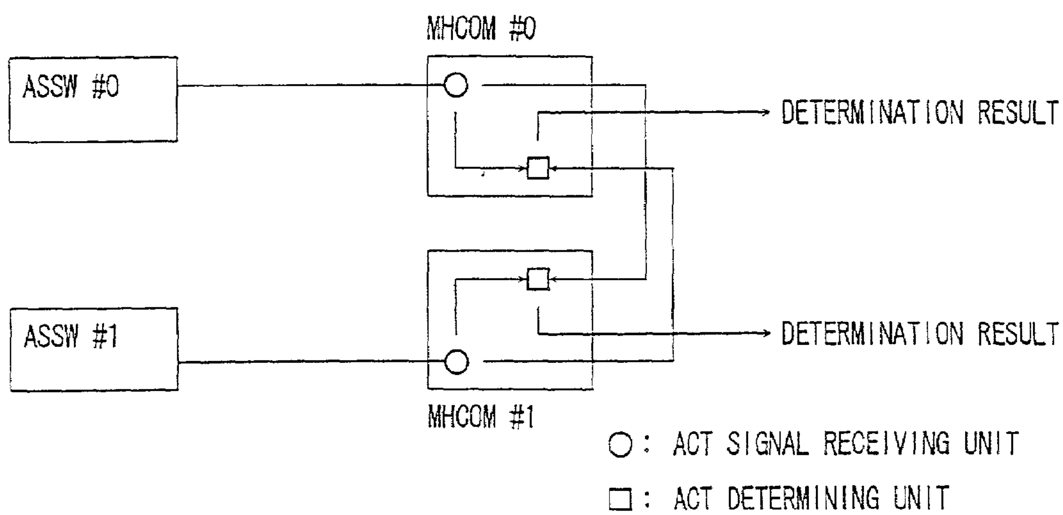
F I G. 458

| shelf No. | UL | TAGC | COM | SIG | 0 |
|---|---|---|---|---|---|
| 0 | 0 | 0 | 0 | 0 | 1 |
| 1 | 0 | 1 | 0 | 0 | 1 |
| 2 | 0 | 2 | 0 | 0 | 1 |
| 3 | 0 | 3 | 0 | 0 | 1 |

FIG. 462

| TEST OBJECT | EXISTENCE OF BLOCK | LOOPBACK |
|---|---|---|
| SMDS DS1 DT<br>SMDS DS3 DT | BLOCKED | USING LOOP FUNCTION OF LINE (ALL CELLS ARE LOOPED BACK) |
| ATM DS1 DT<br>ATM DS3 DT<br>SINF<br>UMBILICAL DS3 DT | NOT BLOCKED | USING SPECIFIED VPI/VCI LOOPBACK FUNCTION (TEST CELLS ARE LOOPED BACK) |

| TEST CELL SENDING UNIT FAULT DISPLAY AREA | | | | TEST CELL RECEIVING UNIT FAULT DISPLAY AREA | | | | |
|---|---|---|---|---|---|---|---|---|
| CELL 7 | CELL 6 | CELL 5 | CELL 4 | CELL 3 | CELL 2 | CELL 1 | CELL 0 | SNI-SBMESH PVC TEST RESULT DISPLAY AREA |
| CELL 15 | CELL 14 | CELL 13 | CELL 12 | CELL 11 | CELL 10 | CELL 9 | CELL 8 | |
| CELL 23 | CELL 22 | CELL 21 | CELL 20 | CELL 19 | CELL 18 | CELL 17 | CELL 16 | |
| CELL 31 | CELL 30 | CELL 29 | CELL 28 | CELL 27 | CELL 26 | CELL 25 | CELL 24 | |
| CELL 7 | CELL 6 | CELL 5 | CELL 4 | CELL 3 | CELL 2 | CELL 1 | CELL 0 | MESH-MH PVC TEST RESULT DISPLAY AREA ( WHEN SPECIFIC TEST DA IS USED ) |
| CELL 15 | CELL 14 | CELL 13 | CELL 12 | CELL 11 | CELL 10 | CELL 9 | CELL 8 | |
| CELL 23 | CELL 22 | CELL 21 | CELL 20 | CELL 19 | CELL 18 | CELL 17 | CELL 16 | |
| CELL 31 | CELL 30 | CELL 29 | CELL 28 | CELL 27 | CELL 26 | CELL 25 | CELL 24 | |
| CELL 7 | CELL 6 | CELL 5 | CELL 4 | CELL 3 | CELL 2 | CELL 1 | CELL 0 | MESH-MH PVC TEST RESULT DISPLAY AREA ( WHEN ALLOCATED DA IS USED ) |
| CELL 15 | CELL 14 | CELL 13 | CELL 12 | CELL 11 | CELL 10 | CELL 9 | CELL 8 | |
| CELL 23 | CELL 22 | CELL 21 | CELL 20 | CELL 19 | CELL 18 | CELL 17 | CELL 16 | |
| CELL 31 | CELL 30 | CELL 29 | CELL 28 | CELL 27 | CELL 26 | CELL 25 | CELL 24 | |

F I G. 4 6 9

| | PURPOSE | USE | STORAGE POSITION | ACTIVATION METHOD | REPORT OF RESULT |
|---|---|---|---|---|---|
| CONSTRUCTION TP | CONFIRMING NORMALITY OF HARDWARE AFTER COMPLETION OF CONSTRUCTION | FOR ACTUAL CONSTRUCTION | BUILT IN ROM OF HSF05A | AT POWER SUPPLY (INSERTING PWCB INTO SBMESH) | OK/NG INDICATION ON 7 SEG LED |
| FIRST TEST OF TP | HSF05A CONFIRMING UNIT OPERATION | FIRST TEST UNIT TEST | | DIP-SW 01 = ON<br>DIP-SW 02 = ON<br>+<br>① AT POWER SUPPLY<br>② RESET SW ON | OK/NG INDICATION ON 7 SEG LED |
| THIRD TEST OF TP | FOR DEVICE TEST AT DELIVERY FROM FACTORY | MHCOM DELIVERY TEST | | DIP-SW 01 = ON<br>DIP-SW 02 = OFF<br>+<br>① AT POWER SUPPLY<br>② RESET SW ON | OK/NG INDICATION ON 7 SEG LED |
| DP | FOR ONLINE DIAGNOSITCS | ON-LINE | | AUTOMATIC DIAGNOSTICS WHEN FAULT OCCURS COMMAND DIAGNOSTICS | OK/NG INDICATION ON 7 SEG LED REPORT DIAGNOSTICS RESULT TO COM-E-MSCN |

FIG. 475

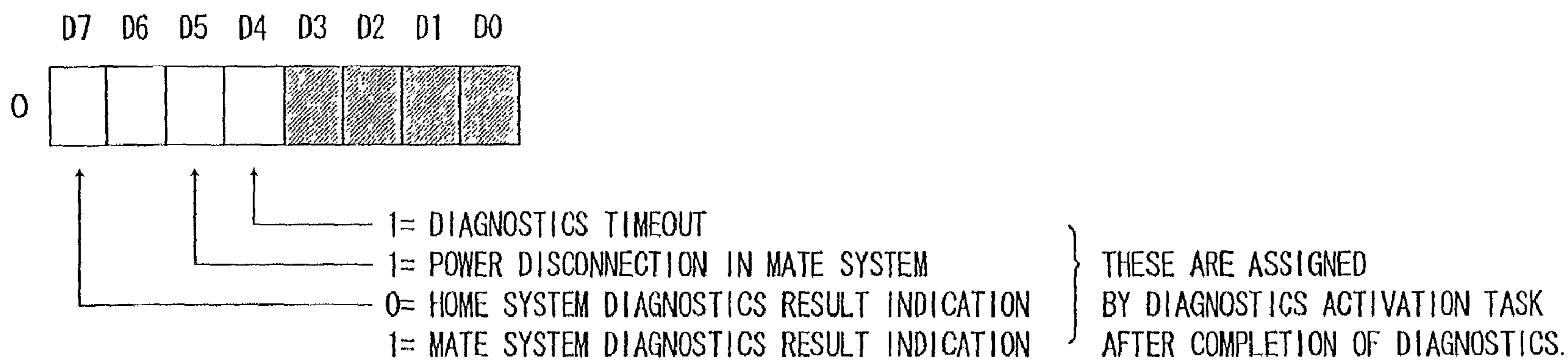
ALL 0 IN D0 THROUGH D6 WHEN DIAGNOSTICS INDICATES OK.
D0~D3 : 1 = CNT PWCB (HSF05A) NG
2 = SMUX/RDMX PWCB (HMX10A) NG
3 = RMUX/SDMX PWCB (HMX11A) NG
4 = VCC/SCHED PWCB (HMX12A) NG
F I G. 477

| | D7 D0 |
|---|---|
| 2 | Di LOWER ORDER BYTE (D7~D0) |
| 3 | Di HIGHER ORDER BYTE (D15~D8) |
| 4 | Ax LOWER ORDER BYTE (D7~D0) |
| 5 | Ax HIGHER ORDER BYTE (D15~D8) |
| 6 | Bx LOWER ORDER BYTE (D7~D0) |
| 7 | Bx HIGHER ORDER BYTE (D15~D8) |
| 8 | Cx LOWER ORDER BYTE (D7~D0) |
| 9 | Cx HIGHER ORDER BYTE (D15~D8) |
| ~ F | Don't care |

F I G. 479

| 0–3 | 4–7 | 8–11 | 12–15 | 16–19 | 20–23 | 24–27 | 28–31 | |
|---|---|---|---|---|---|---|---|---|
| *1 | | don't care | | | | | | |
| phase No. area | | sub-phase No. area | | test No. area | | | | |
| HMX10A | HMX11A | HMX12A | HSF05A | HMH00A | HMH01A | HMH02A | HMH03A | SUSPECT PRIORITY DISPLAY AREA (HOME SYSTEM) |
| HMH04A | HMH05A | HMH06A | HLP02A | HLM00A | HLM01A | HPT01A | don't care | |
| HMX10A | HMX11A | HMX12A | HSF05A | HMH00A | HMH01A | HMH02A | HMH03A | SUSPECT PRIORITY DISPLAY AREA (MATE SYSTEM) |
| HMH04A | HMH05A | HMH06A | HLP02A | HLM00A | HLM01A | HPT01A | don't care | |

FIG. 480

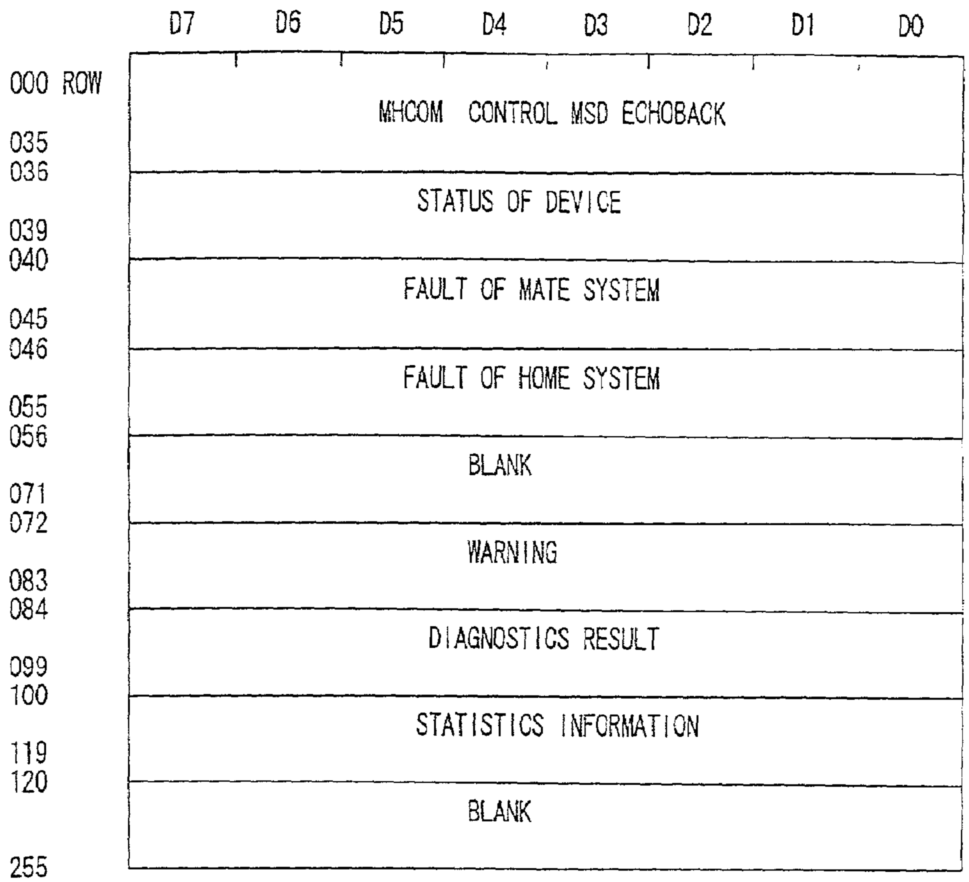
F I G. 481

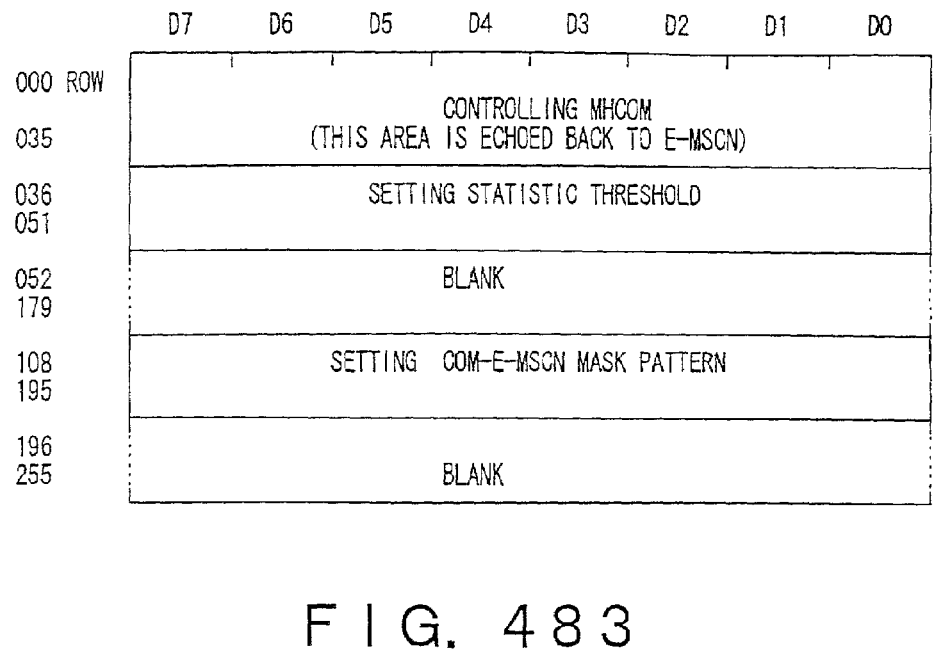

| ROW | D7 D6 D5 D4 D3 D2 D1 D0 |
|---|---|
| 000 ROW<br>035 | CONTROLLING MHCOM<br>(THIS AREA IS ECHOED BACK TO E-MSCN) |
| 036<br>051 | SETTING STATISTIC THRESHOLD |
| 052<br>179 | BLANK |
| 108<br>195 | SETTING COM-E-MSCN MASK PATTERN |
| 196<br>255 | BLANK |

FIG. 483

| ROW | D7 | D6 | D5 | D4 | D3 | D2 | D1 | D0 | |
|---|---|---|---|---|---|---|---|---|---|
| 0 | RESETTING MATE SYSTEM | RESETTING HOME SYSTEM | | | | | | | |
| 1 | | | | | PRESENT OS | MATE SYSTEM SHALM | MATE SYSTEM SHOS | MATE SYSTEM OS | |
| 2 | | | | | | | SELECTING OL2B | SELECTING OL2A | |
| 3 | | | | | | | HOME SYSTEM DIAGNOSTICS ACTIVATION | MATE SYSTEM DIAGNOSTICS ACTIVATION | |
| 4 | | | | | | | | | |
| 5 | MSB | SPECIFYING INTRA-STATION LAP BAND | | | | | | | |
| 6 | (SPECIFYING VALUE n FOR 64 KBPS X n. VARIABLE 1~4075) | | | | | | | LSB | |
| 7<br>23 | | | | | | | | | |
| 24 | | | | DEMUX 15-MINUTE NOTIFICATION | START OF STATISTICS | | MUX 15-MINUTE NOTIFICATION | START OF STATISTICS | SMLP |
| 25 | | | | | | | MUX 15-MINUTE NOTIFICATION | START OF STATISTICS | RMLP |
| 26 | | | | DEMUX 15-MINUTE NOTIFICATION | START OF STATISTICS | | | | R-TCG |
| 27<br>31 | | | | | | | | | |
| 32 | | | | DEMUX 15-MINUTE NOTIFICATION | START OF STATISTICS | | MUX 15-MINUTE NOTIFICATION | START OF STATISTICS | h-SIG |
| 33<br>35 | | | | | | | | | |

FIG. 484

| POINT NAME | STORAGE POSITION | EXPLANATION |
|---|---|---|
| RESETTING MATE SYSTEM | 0 ROW D7 | RESET INSTRUCTION POINT OF MATE SYSTEM MHCOM. AUTOMATIC RESET POINT. SETTING THIS POINT DISCONNECTS INTRA-STATION COMMUNICATIONS LAP. |
| RESETTING HOME SYSTEM | 0 ROW D6 | RESET INSTRUCTION POINT OF HOME SYSTEM MHCOM. AUTOMATIC RESET POINT. SETTING THIS POINT DISCONNECTS INTRA-STATION COMMUNICATIONS LAP. |
| PRESENT OS | 1 ROW D3 | LIGHTING LAMP INDICATING PRESENT OS BY SETTING THIS POINT. |
| MATE SYSTEM SHALM | 1 ROW D2 | LIGHTING LAMP (ACCOMMODATED IN HPT01A) INDICATING MATE SYSTEM SHELF ALM BY SETTING THIS POINT. |
| MATE SYSTEM SHOS | 1 ROW D1 | LIGHTING LAMP (ACCOMMODATED IN HPT01A ) INDICATING MATE SYSTEM SHELF OS BY SETTING THIS POINT. |
| MATE SYSTEM SHOS | 1 ROW D0 | LIGHTING LAMP (ACCOMMODATED IN HSF05A ) INDICATING MATE SYSTEM MHCCM OS BY SETTING THIS POINT. |
| SELECTING OL2B | 2 ROW D1 | COMPULSORILY SELECTING OPTICAL 8MCLK #1 BY CHANGING THIS POINT FROM RESET TO SET. |
| SELECTING OL2A | 2 ROW D0 | COMPULSORILY SELECTING OPTICAL 8MCLK #0 BY CHANGING THIS POINT FROM RESET TO SET. |
| HOME SYSTEM DIAGNOSTICS ACTIVATION | 3 ROW D1 | PERFORMING ONLINE DP IN HOME SYSTEM BY CHANGING THIS POINT FROM RESET TO SET. IF HOME SYSTEM IS ACT, IT IS NOT PERFORMED. |
| MATE SYSTEM DIAGNOSTICS ACTIVATION FIFO FULL | 3 ROW D0 | REQUESTING MATE SYSTEM TO PERFORM ONLINE DP IN HOME SYSTEM BY CHANGING THIS POINT FROM RESET TO SET. IF MATE SYSTEM IS ACT, THE REQUEST IS IGNORED. |
| | 5 ~6 ROW | · SPECIFYING BAND OF INTRA-STATION LAP. 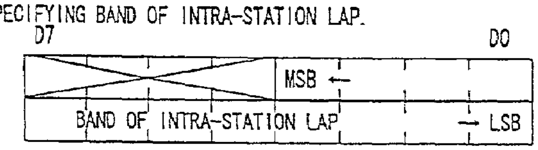  SPECIFYING n FOR 64 KBPS X n ( n=1 ~4075) DEFAULT IS n = 1 |
| SDMX 15-MINUTE NOTIFICATION | 24 ROW D4 | 15-MINUTE NOTIFICATION FOR STATISTIC PROCESS OF SDMX. STATISTIC DATA IS COLLECTED BY CHANGING THIS POINT FROM RESET TO SET. |
| SDMX START OF STATISTICS | 24 ROW D3 | INSTRUCTING TO START STATISTIC PROCESS OF SDMX. STATISTICS IS STARTED BY CHANGING THIS POINT FROM RESET TO SET. |
| SMUX 15-MINUTE NOTIFICATION | 24 ROW D1 | 15-MINUTE NOTIFICATION FOR STATISTIC PROCESS OF SMUX. STATISTIC DATA IS COLLECTED BY CHANGING THIS POINT FROM RESET TO SET. |
| SMUX START OF STATISTICS | 24 ROW D0 | INSTRUCTING TO START STATISTIC PROCESS OF SMUX. STATISTICS IS STARTED BY CHANGING THIS POINT FROM RESET TO SET. |
| RMUX 15-MINUTE NOTIFICATION | 25 ROW D1 | 15-MINUTE NOTIFICATION FOR STATISTIC PROCESS OF RMUX. STATISTIC DATA IS COLLECTED BY CHANGING THIS POINT FROM RESET TO SET. |
| RMUX START OF STATISTICS | 25 ROW D0 | INSTRUCTING TO START STATISTIC PROCESS OF RMUX. STATISTICS IS STARTED BY CHANGING THIS POINT FROM RESET TO SET. |

FIG. 485

| POINT NAME | STORAGE POSITION | EXPLANATION |
|---|---|---|
| RTCG-DMX 15-MINUTE NOTIFICATION | 26 ROW D4 | 15-MINUTE NOTIFICATION FOR STATISITC PROCESS OF RTCG-DMX. STATISTIC DATA IS COLLECTED BY CHANGING THIS POINT FROM RESET TO SET. |
| RTCG-MDX START OF STATISTICS | 26 ROW D3 | INSTRUCTING TO START STATISTIC PROCESS OF RTCG-DMX. STATISTICS IS STARTED BY CHANGING THIS POINT FROM RESET TO SET. |
| HOME SIG-DMX 15-MINUTE NOTIFICATION | 32 ROW D4 | 15-MINUTE NOTIFICATION FOR STATISITC PROCESS OF HOME SIG-DMX. STATISTIC DATA IS COLLECTED BY CHANGING THIS POINT FROM RESET TO SET. |
| HOME SIG-DMX START OF STATISTICS | 32 ROW D3 | INSTRUCTING TO START STATISTIC PROCESS OF SIG-DMX. STATISTICS IS STARTED BY CHANGING THIS POINT FROM RESET TO SET. |
| HOME SIG-MUX 15-MINUTE NOTIFICATION | 32 ROW D1 | 15-MINUTE NOTIFICATION FOR STATISITC PROCESS OF HOME SIG-MUX. STATISTIC DATA IS COLLECTED BY CHANGING THIS POINT FROM RESET TO SET. |
| HOME SIG-MUX START OF STATISTICS | 32 ROW D0 | INSTRUCTING TO START STATISTIC PROCESS OF SIG-MUX. STATISTICS IS STARTED BY CHANGING THIS POINT FROM RESET TO SET. |

FIG. 486

| ROW | D7 | D6 | D5 | D4 | D3 | D2 | D1 | D0 |
|---|---|---|---|---|---|---|---|---|
| 36 | | | | | | | | |
| 37 | | | | | | | | |
| 38 | | | DMUX | MUX | Unit No. | | | |
| 39 | QI | | | | | | | |
| 40 | QA | | | | | | | |
| 41 | QA' | | | | | | | |
| 42 | QB | | | | | | | |
| 43 | QB' | | | | | | | |
| 44 | QC | | | | | | | |
| 45 | QC' | | | | | | | |
| 46 | QD | | | | | | | |
| 47 | QD' | | | | | | | |
| 48 | 0 | 0 | 0 | 0 | SPECIFIC VCI | | | |
| 49 | SPECIFIC VCI | | | | | | | |
| 50 | SPECIFIC VCI | | | | | | | |
| 51 | SPECIFIC VCI | | | | | | | |

FIG. 487

<table>
<tr><th>POINT NAME</th><th>STORAGE POSITION</th><th>EXPLANATION</th></tr>
<tr><td>DEMUX<br>MUX<br>UNIT No.</td><td>38 ROW</td><td>
· PARAMETER GROUP SPECIFYING FOR WHICH STATISTIC INFORMATION COLLECTION POINT STATISTIC THRESHOLD VALUE IS SET.
<table>
<tr><th>ROW</th><th>D7</th><th></th><th></th><th></th><th></th><th>D0</th></tr>
<tr><td>102</td><td>X</td><td>DMUX</td><td>MUX</td><td>MSB ←</td><td>UNIT No.</td><td>→ LSB</td></tr>
</table>
DUMX .... "1" INDICATES THAT THRESHOLD IS SET FOR DEMULTIPLEXER.<br>
MUX .... "1" INDICATES THAT THRESHOLD IS SET FOR MULTIPLEXER.<br>
※ DMUX AND MUX CANNOT BE SIMULTANEOUSLY SET TO 1. IF BOTH FIELDS ARE SIMULTANEOUSLY SET TO 1. MHCOM RECOGNIZES SETTINGS.<br>
UNIT No. .... INDICATES FOR WHICH LINE THRESHOLD IS SET (REFER TO FOLLOWING TABLE.)
<table>
<tr><th>UNIT No.</th><th>LINE TYPE</th><th>MUX</th><th>DEMUX</th></tr>
<tr><td>0</td><td>SMLP</td><td>○</td><td>○</td></tr>
<tr><td>1</td><td>RMLP</td><td>○</td><td>×</td></tr>
<tr><td>2</td><td>R-TCG</td><td>×</td><td>○</td></tr>
<tr><td>8</td><td>HOME SYSTEM INTRA-STATION COMMUNICATIONS</td><td>○</td><td>○</td></tr>
</table>
INDICATES EXISTENCE OF MUX/DEMUX IN EACH LINE.<br>
※ NO COMBINATION IS MADE AMONG X-MARKED MUX, DEMUX, AND UNIT No. (BECAUSE CORRESPONDING POINT DOES NOT CONTAIN MUX AND DEMUX). WHEN X-MARKED COMBINATION IS SET, MHCOM IGNORES IT.
</td></tr>
<tr><td>Q1<br>LOGICAL<br>THRESHOLD<br>VALUE</td><td>39 ROW</td><td>
· LOGICAL THRESHOLD VALUE IS SET FOR POINT SPECIFIED BY 38 ROW. IF USE OF BUFFER EXCEEDS Q1, CELLS SRE DISCARDED.<br>
THRESHOLD IS SET IN RANGE OF 0~70(H).
<table>
<tr><th>ROW</th><th>D7</th><th></th><th></th><th>D0</th></tr>
<tr><td>39</td><td>X</td><td>MSB ←</td><td>Q1 (LOGICAL THRESHOLD VALUE)</td><td>→ LSB</td></tr>
</table>
※ DEFAULT IS MAXIMUM VALUE (112 CELLS).
</td></tr>
<tr><td>QA, QA'<br>(DISCARD START/RE-LEASE THRE-SHOLD FOR CELL OF P=0, CON=0.)</td><td>40, 41ROW</td><td>
· QA ... DISCARD START THRESHOLD FOR CELL OF P=0, CON=0 FOR POINT SPECIFIED BY 38 ROW. IF USE OF BUFFER EXCEEDS QA, DISCARD OF CELL OF P=0, CON=0 IS STARTED.<br>
· QA' ... DISCARD RELEASE THRESHOLD FOR CELL OF P=0, CON=0 FOR POINT SPECIFIED BY 38 ROW. IF USE OF BUFFER DOES NOT EXCEEDS QA', DISCARD OF CELL OF P=0, CON=0 IS RELEASED.
<table>
<tr><th>ROW</th><th>D7</th><th></th><th></th><th>D0</th></tr>
<tr><td>40 (41)</td><td>X</td><td>MSB ←</td><td>QA (QA')</td><td>→ LSB</td></tr>
</table>
※ DEFAULT IS MAXIMUM VALUE (112 CELLS).<br>
$0 < QA' \leq QA$
</td></tr>
</table>

FIG. 488

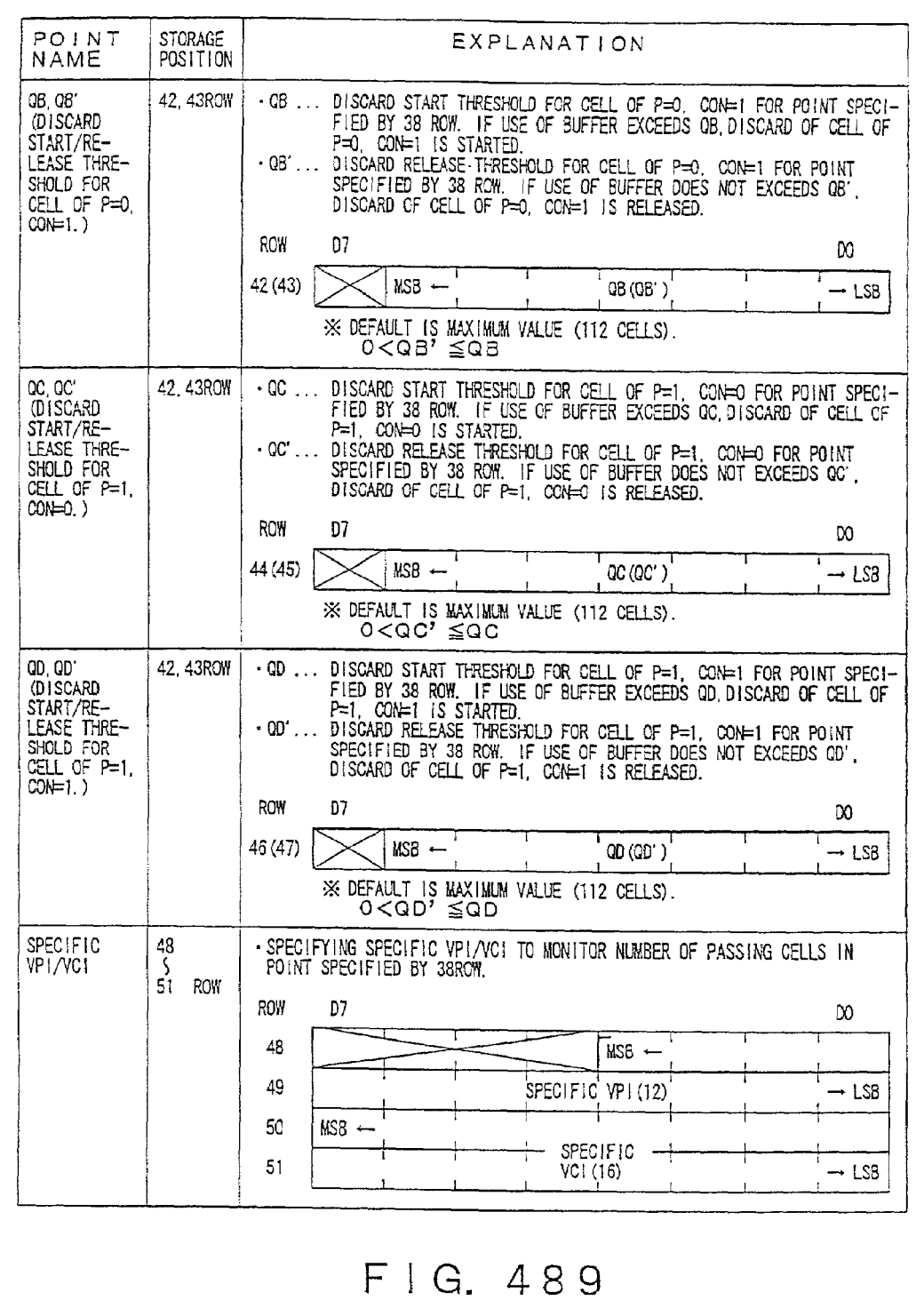

| POINT NAME | STORAGE POSITION | EXPLANATION |
|---|---|---|
| QB, QB' (DISCARD START/RE-LEASE THRE-SHOLD FOR CELL OF P=0, CON=1.) | 42, 43ROW | · QB ... DISCARD START THRESHOLD FOR CELL OF P=0, CON=1 FOR POINT SPECIFIED BY 38 ROW. IF USE OF BUFFER EXCEEDS QB, DISCARD OF CELL OF P=0, CON=1 IS STARTED.<br>· QB' ... DISCARD RELEASE THRESHOLD FOR CELL OF P=0, CON=1 FOR POINT SPECIFIED BY 38 ROW. IF USE OF BUFFER DOES NOT EXCEEDS QB', DISCARD OF CELL OF P=0, CON=1 IS RELEASED.<br>ROW D7 ... D0<br>42 (43): [X] MSB ← QB (QB') → LSB<br>※ DEFAULT IS MAXIMUM VALUE (112 CELLS).<br>0<QB' ≦QB |
| QC, QC' (DISCARD START/RE-LEASE THRE-SHOLD FOR CELL OF P=1, CON=0.) | 42, 43ROW | · QC ... DISCARD START THRESHOLD FOR CELL OF P=1, CON=0 FOR POINT SPECIFIED BY 38 ROW. IF USE OF BUFFER EXCEEDS QC, DISCARD OF CELL OF P=1, CON=0 IS STARTED.<br>· QC' ... DISCARD RELEASE THRESHOLD FOR CELL OF P=1, CON=0 FOR POINT SPECIFIED BY 38 ROW. IF USE OF BUFFER DOES NOT EXCEEDS QC', DISCARD OF CELL OF P=1, CON=0 IS RELEASED.<br>ROW D7 ... D0<br>44 (45): [X] MSB ← QC (QC') → LSB<br>※ DEFAULT IS MAXIMUM VALUE (112 CELLS).<br>0<QC' ≦QC |
| QD, QD' (DISCARD START/RE-LEASE THRE-SHOLD FOR CELL OF P=1, CON=1.) | 42, 43ROW | · QD ... DISCARD START THRESHOLD FOR CELL OF P=1, CON=1 FOR POINT SPECIFIED BY 38 ROW. IF USE OF BUFFER EXCEEDS QD, DISCARD OF CELL OF P=1, CON=1 IS STARTED.<br>· QD' ... DISCARD RELEASE THRESHOLD FOR CELL OF P=1, CON=1 FOR POINT SPECIFIED BY 38 ROW. IF USE OF BUFFER DOES NOT EXCEEDS QD', DISCARD OF CELL OF P=1, CON=1 IS RELEASED.<br>ROW D7 ... D0<br>46 (47): [X] MSB ← QD (QD') → LSB<br>※ DEFAULT IS MAXIMUM VALUE (112 CELLS).<br>0<QD' ≦QD |
| SPECIFIC VPI/VCI | 48 ~ 51 ROW | · SPECIFYING SPECIFIC VPI/VCI TO MONITOR NUMBER OF PASSING CELLS IN POINT SPECIFIED BY 38ROW.<br>ROW D7 ... D0<br>48: [X] MSB ←<br>49: SPECIFIC VPI (12) → LSB<br>50: MSB ←<br>51: SPECIFIC VCI (16) → LSB |

F I G. 489

| ROW | D7 | D6 | D5 | D4 | D3 | D2 | D1 | D0 |
|---|---|---|---|---|---|---|---|---|
| 52<br>179 | | | | BLANK | | | | |
| 180 | 8 | | | | | | | 1WORD |
| 181 | 16 | | | | | | | 9 |
| 182 | 24 | | | | | | | 17 |
| 183 | 32 | | | | | | | 25 |
| 184 | 40 | | | | | | | 33 |
| 185 | 48 | | | | | | | 41 |
| 186 | 56 | | | | | | | 49 |
| 187 | 64 | | | | | | | 57 |
| 188 | 72 | | | | | | | 65 |
| 189 | 80 | | | | | | | -73 |
| 190 | 88 | | | | | | | 81 |
| 191 | 96 | | | | | | | 89 |
| 192 | 104 | | | | | | | 97 |
| 193 | 112 | | | | | | | 105 |
| 194 | 120 | | | | | | | 113 |
| 195 | 128 | | | | | | | 121 |

* MASK WORD WHICH IS SET TO "1".

FIG. 490

| POINT NAME | STORAGE POSITION | EXPLANATION |
|---|---|---|
| SPECIFYING MASK | 180 ∫ 195 ROW | · SPECIFYING MASK PATTERN OF COM-E-MSCN IN WORD UNIT. |

| E-MSD ROW No. | BIT POSITION | ROW NO. OF MASKED E-MSCN |
|---|---|---|
| 180 | D0 | 0, 1 |
| | 1 | 2, 3 |
| | 2 | 4, 5 |
| | 3 | 6, 7 |
| | 4 | 8, 9 |
| | 5 | 10, 11 |
| | 6 | 12, 13 |
| | 7 | 14, 15 |
| 181 | D0 | 16, 17 |
| 194 | D7 | 238, 239 |
| 195 | D0 | 240, 241 |
| | 1 | 242, 243 |
| | 2 | 244, 245 |
| | 3 | 246, 247 |
| | 4 | 248, 249 |
| | 5 | 250, 251 |
| | 6 | 252, 253 |
| | 7 | 254, 255 |

※ "1" INDICATES MASKING.

FIG. 491

*1 : COMMAND IS NOT COMPLETED AND RESET REQUEST IS ISSUED AFTER LINK IS RE-ESTABLISHED.

*2 : COMMAND IS SET DOUBLE BECAUSE DEVICE L3 DETERMINES NORMAL SEQUENCE.

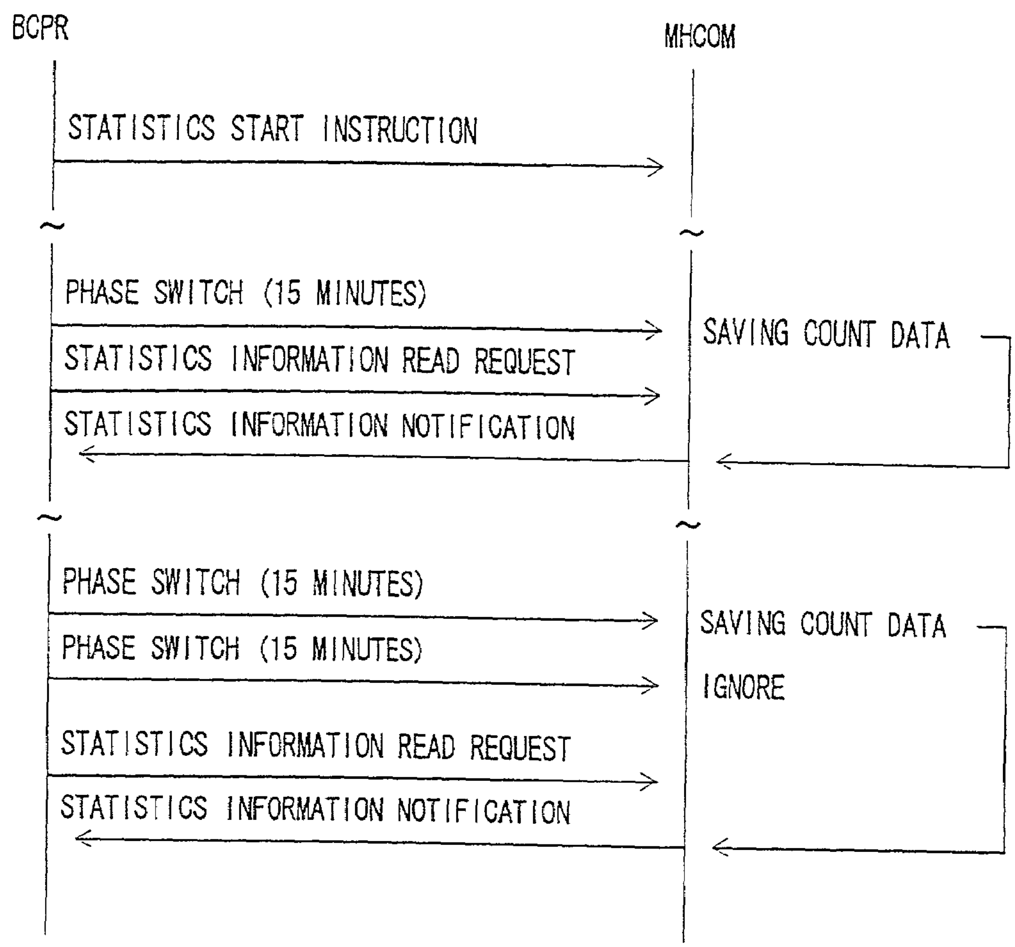
F I G. 494

NOTE: ALTERNATE LONG AND SHORT DASH LINE INDICATES PORTION TO BE PROCESSED INTO LSI.

| ITEM | BLOCK NAME | CONTENTS |
|---|---|---|
| 1 | CROSS-CONNECT SELECTION | MUX ACT SYSTEM DATA IS SELECTED ACCORDING TO SYSTEM INFORMATION OF SWITCH. TCG CELL (TEST CELL) IS DROPPED. |
| 2 | INPUT INTERFACE IDENTIFICATION | INPUT INTERFACE IS IDENTIFIED AS ISSI OR ICI. |
| 3 | TEST CELL MULTIPLEXING | TEST CELL IS MULTIPLEXED WHEN LINE IS IN IDLE CELL STATE. TEST CELL IS TRANSMITTED DURING DIAGNOSIS |
| 4 | CRC CHECK | CRC OPERATION IS PERFORMED ON CELL PAYLOAD AND CHECK IS MADE FOR ERROR. |
| 5 | PL CHECK | CHECK IS MADE THAT PAYLOAD LENGTH INDICATES PREDETERMINED VALUE. |
| 6 | SEGMENT TYPE CHECK | CHEK IS MADE WHETHER SEGMENT TYPE IS BOM, COM, EOM, OR SSM. |
| 7 | MID CHECK | CHECK IS MADE THAT VCI/MID IS NOT ACTIVE AT BOM AND VCI/MID IS ACTIVE AT COM AND EOM |
| 8 | SN CHECK | CHECK IS MADE THAT SN IS INITIALIZED AT BOM AND SN IS IN ORDER AT COM AND EOM. |
| 9 | BA SIZE CHECK | CHECK IS MADE THAT BASIZE INDICATES PREDETERMINED VALUE (40-9280). |
| 10 | AT CHECK | CHECK IS MADE THAT ADDRESS TYPE IN DA AND SA FORMAT INDICATES PREDETERMINED VALUE. |
| 11 | SERVICE TYPE CHECK | CHECK IS MADE THAT SERVICE TYPE INDICATES PREDETERMINED VALUE(NO ERROR FLAG IS SET) |
| 12 | PD CHECK | CHECK IS MADE THAT PROTOCOL DISCRIMINATOR INDICATES PREDETERMINED VALUE. |
| 13 | HOP COUNT CHECK | CHECK IS MADE THAT HOP COUNT FIELD VALUE DOES NOT INDICATE 0 |
| 14 | IIT CHECK | CHECK IS MADE THAT INGRESS INTERFACE TYPE INDICATES PREDETERMINED VALUE. |
| 15 | BE TAG MATCHING CHECK | CHECK IS MADE THAT BE TAG OF L3 HEADER MATCHES BE TAG OF TAILER. |
| 16 | BA SIZE MATCHING CHECK | CHECK IS MADE THAT BE SIZE OF L3 HEADER MATCHES LENGTH OF TAILER. |
| 17 | ERROR EDIT I | ERROR CHECKED BY EACH CHECKER IS POSITIONED IN ERROR FLAG. |
| 18 | MRI TIMEOUT CHECK | MRI TIMEOUT IS DETERMINED IN LL3PDU UNIT. |
| 19 | ERROR EDIT II | ERROR CHECKED BY EACH CHECKER IS POSITIONED IN ERROR FLAG. |
| 20 | TO CELL PROCESS | WHEN TIMEOUT IS REACHED IN MRI TIMEOUT CHECK, TIMEOUT CELL IS TRANSMITTED WHEN CELL IS INVALID. |
| 21 | CELL FORMAT CONVERSION | FORMAT OF ICIP/ISSIP IS CONVERTED INTO INTER-MH INTERFACE FORMAT (INCLUDING INPUT INF ICI/ISSI DISCRIMINATION INFORMATION). |
| 22 | ERROR CELL PROCESS | IF L3PDU IS DETERMINED TO BE ERRONEOUS AS RESULT OF EACH CHECK, IT IS SUSPENDED. |
| 23 | ROUTING | DA AND CARRIER FIELD VALUE ARE IDENTIFIED AND MESSAGE ROUTING TABLE IS REFERRED TO IN ORDER TO SPECIFY MH (SBMH AND GHMH) CONTAINING DESTINATION SNI, ISSI, AND ICI. |
| 24 | CELL COPY | WHEN THERE ARE PLURAL DESTINATION MHs AS RESULT OF ROUTING, CELLS ARE COPIED WITH VCI ASSIGNED TO EACH MH. |
| 25 | CELL DISCARD COUNTER | CELL (L2 OR L3?) IS COUNTED IF IT IS DISCARDED BECAUSE OF INSUFFICIENT CAPACITY OF CELL COPY BUFFER. |
| 26 | OUTPUT BAND RESTRICTION | OUTPUT BAND (PEAK RATE) IS LIMITED FOR EACH OUTPUT MH. |
| 27 | CELL DISCARD | CELL IS DISCARDED WHEN OUTPUT BAND LIMIT IS EXCEEDED. |
| 28 | DISCARD COUNTER | NUMBER OF L2 AND L3 MESSAGES DISCARDED BY OUTPUT BAND LIMIT IS COUNTED. |
| 29 | MRI TIMEOUT CHECK | MRI TIMEOUT IS DETERMINED IN L3 PDU UNITS. |
| 30 | ERROR EDIT | ERROR CHECKED BY MRI TIMEOUT IS POSITIONED IN ERROR FLAG. |
| 31 | TO CELL PROCESS | WHEN TIMEOUT IS REACHED IN MRI TIMEOUT CHECK, TIMEOUT CELL IS TRANSMITTED WHEN CELL IS INVALID. |
| 32 | MID ACQUISITION | OUTPUT MID IS ASSIGNED IN OUTPUT MH UNITS. |
| 33 | ERROR CELL DISCARD | IF CELL IS DETERMINED TO BE ERRONEOUS AS RESULT OF EACH CHECK, IT IS DISCARDED. |
| 34 | μP INTERFACE | LP COM IS INTERFACED WITH μP (SCMT). |
| 35 | MSD/MSCM INTERFACE | LP COM IS INTERFACED WITH MSD/MSCM. |
| 36 | NDC INTERFACE | LP COM IS INTERFACED WITH μP IN RELATION TO NETWORK DATA COLLECTION (NDC). |

FIG. 514

| | Message \ Error Flag | E1 MS | E1 RM | E2 MT | E2 CC | E3 PL | E2 EN | E1 MC | E2 MA | E2 SN | E2 BA | E2 DT | E2 ST | E2 PI | E2 PD | E2 HC | E2 II | E2 EM | E2 BE | E2 LE | PVC |
|---|---|---|---|---|---|---|---|---|---|---|---|---|---|---|---|---|---|---|---|---|---|
| A | Invalid Payload CRC Code | ON | ON | | ON | | | | | | | | | | | | | | | | M |
| B | Payload Length Error | ON | ON | | | ON | | | | | | | | | | | | | | | M |
| C | Encapsulation Error (Segment Type = SSM) | ON | ON | | | | ON | | | | | | | | | | | | | | M |
| D | BOM with Unexpected MID | | OK | | | | | | ON | | | | | | | | | | | | M |
| | COM with Unexpected MID | ON | OK | | | | | ON | | | | | | | | | | | | | M |
| | EOM with Unexpected MID | ON | OK | | | | | | ON | | | | | | | | | | | | M |
| E | Unexpected SN Error | ON | OK | | | | | OK | OK | ON | | | | | | | | | | | M |
| F | Invalid BAsize Field Value | ON | | | | | | | | | ON | | | | | | | | | | M |
| | Invalid DA Type | ON | | | | | | | | | | ON | | | | | | | | | M |
| | Invalid SA Type | ON | | | | | | | | | | | ON | | | | | | | | M |
| | Invalid Protocol ID (ICIP) & Invalid Service Type (ISSIP) | ON | | | | | | | | | | | | ON | | | | | | | M |
| | Invalid Protocol Descriminator (ISSIP) | ON | | | | | | | | | | | | | ON | | | | | | M |
| | Hop Count = 0 (ISSIP) | ON | | | | | | | | | | | | | | ON | | | | | M |
| | Invalid Ingress Interface Type (ISSIP) | ON | | | | | | | | | | | | | | | ON | | | | M |
| G | BEtag Mismatch | ON | OK | | | | | | | | | | | | | | | | ON | | M |
| | BAsize ≠ Length | ON | OK | | | | | | | | | | | | | | | | OK | ON | M |

'ON': EF INDICATING "ON" WHEN CHECK RESULT OUTPUTS NG
'OK': CHECK IS MADE ONLY WHEN OK-MARKED EF INDICATES "OK".
'NO MARK': CHECK IS MADE REGARDLESS OF OK OR NG OF 'NO MARK' EF.
'M': NO CHECK IS MADE FOR INTER-MESH PVC TEST CELL.

FIG. 515

| | Message \ Error Flag | E1 MS | E1 RM | E2 MT | E2 CC | E2 PL | E2 EN | E1 MC | E2 MA | E2 SN | E2 BA | E2 DT | E2 ST | E2 PI | E2 PD | E2 HC | E2 II | E2 EM | E2 BE | E2 LE | PVC |
|---|---|---|---|---|---|---|---|---|---|---|---|---|---|---|---|---|---|---|---|---|---|
| H | SIMULTANEOUS INPUT NUMBER CHECK 1 | ON<br>OK | OK | | | | | | | | | | | | | | | ON | | | M |
| | MRI Time Out 1 | ON | | ON | | | | | | | | | | | | | | | | | M |
| J | ROUTING | OK | OK | | | | | | | | | | | | | | | | | | |
| | CELL COPY | OK | OK | | | | | | | | | | | | | | | | | | |
| | OUTPUT BAND LIMIT | OK | OK | | | | | | | | | | | | | | | | | | |
| K | SIMULTANEOUS IMPUT NUMBER CHECK 2 | ON<br>OK | OK | | | | | | | | | | | | | | | ON | | | |
| | MRI Time Out 2 | ON | | ON | | | | | | | | | | | | | | | | | |
| | MID ACQUISITION | OK | OK | | | | | | | | | | | | | | | | | | |
| | DISCARDING ERROR CELLI | NG | | | | | | | | | | | | | | | | | | | |

'ON': EF INDICATING "ON" WHEN CHECK RESULT OUTPUTS NG
'OK': CHECK IS MADE ONLY WHEN OK-MARKED EF INDICATES "OK".
'NO MARK': CHECK IS MADE REGARDLESS OF OK OR NG OF 'NO MARK'EF.
'M': NO CHECK IS MADE FOR INTER-MESH PVC TEST CELL.

FIG. 516

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | 0 | OAM | 0 | TAGA | | | 0 | 0 | 0 | TAGC | | | TAGB | | 0 | 0 |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | IF | LID | | | | PT | | | CLP |
| 03 | 1 (ST) 0 | | SN | | | | MID | | | | | | | | | |
| 04 | 0 | 0 | 0 | 0 | 0 | 0 | 0 | 0 | BEtag | | | | | | | |
| 05 | BAsize | | | | | | | | | | | | | | | |
| 06 | Address Type | | | | 0 | 0 | 0 | 1 | | | | | | | | |
| 07 | DA | | | | | | | | | | | | | | | |
| 08 | | | | | | | | | | | | | | | | |
| 09 | 1 | 1 | 1 | 1 | 1 | 1 | 1 | 1 | 1 | 1 | 1 | 1 | 1 | 1 | 1 | 1 |
| 10 | Address Type | | | | 0 | 0 | 0 | 1 | | | | | | | | |
| 11 | SA | | | | | | | | | | | | | | | |
| 12 | | | | | | | | | | | | | | | | |
| 13 | 1 | 1 | 1 | 1 | 1 | 1 | 1 | 1 | 1 | 1 | 1 | 1 | 1 | 1 | 1 | 1 |
| 14 | Service Type | | | | | | PL | | Priority | | | | CIB | HEL | | |
| 15 | Protocol Version | | | | | | | | Protocol Descriminator | | | | | | | |
| 16 | HE | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Ingress Interface Type | | | | | | | | Carrier | | | | | | | |
| 23 | Carrier | | | | | | | | ES | HOP Count Indicator | | | | | | |
| 24 | Incoming NW ID | | | | | | | | | | | | | | | |
| 25 | Incoming ICL-TPS ID | | | | | | | | | | | | | | | |
| 26 | Payload Length | | | | | | Payload CRC | | | | | | | | | |

TCG CELL OF OAM=1 IS DISCARDED IN ICLP INPUT UNIT.
IF: INTERFACE IDENTIFICATION (0=ISSI, 1=ICI)
LID: INPUT LINK NUMBER (0-7)

FIG. 517

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | 0 | OAM | 0 | TAGA | | | 0 | 0 | 0 | TAGC | | | TAGB | | 0 | 0 |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | IF | LID | | | | PT | | | CLP |
| 03 | 1 (ST) 0 | | SN | | | | MID | | | | | | | | | |
| 04 | 0 | 0 | 0 | 0 | 0 | 0 | 0 | 0 | BEtag | | | | | | | |
| 05 | BAsize | | | | | | | | | | | | | | | |
| 06 | Address Type | | | | 0 | 0 | 0 | 1 | | | | | | | | |
| 07 | DA | | | | | | | | | | | | | | | |
| 08 | | | | | | | | | | | | | | | | |
| 09 | 1 | 1 | 1 | 1 | 1 | 1 | 1 | 1 | 1 | 1 | 1 | 1 | 1 | 1 | 1 | 1 |
| 10 | Address Type | | | | 0 | 0 | 0 | 1 | | | | | | | | |
| 11 | SA | | | | | | | | | | | | | | | |
| 12 | | | | | | | | | | | | | | | | |
| 13 | 1 | 1 | 1 | 1 | 1 | 1 | 1 | 1 | 1 | 1 | 1 | 1 | 1 | 1 | 1 | 1 |
| 14 | Protocol ID | | | | | | PL | | QOS | | | | CIB | HEL | | |
| 15 | Bridging | | | | | | | | | | | | | | | |
| 16 | HE | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | ICIP Version | | | | | | | | Carrier | | | | | | | |
| 23 | Carrier | | | | | | | | ES | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 |
| 26 | Payload Length | | | | | | Payload CRC | | | | | | | | | |

TCG CELL OF OAM=1 IS DISCARDED IN ICLP INPUT UNIT.
IF:INTERFACE IDENTIFICATION(0=ISSI, I=ICI)
LID:INPUT LINK NUMBER(0-7)

FIG. 518

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | 0 | OAM | 0 | TAGA | | | 0 | 0 | 0 | TAGC | | | TAGB | | 0 | 0 |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | IF | LID | | | | PT | | | CLP |
| 03 | 0 (ST) 1 | | SN | | | | MID | | | | | | | | | |
| 04 | 0 | 0 | 0 | 0 | 0 | 0 | 0 | 0 | BEtag(SIP) | | | | | | | |
| 05 | BAsize(SIP) | | | | | | | | | | | | | | | |
| 06 | Address Type | | | | 0 | 0 | 0 | 1 | | | | | | | | |
| 07 | DA(SIP) | | | | | | | | | | | | | | | |
| 08 | | | | | | | | | | | | | | | | |
| 09 | 1 | 1 | 1 | 1 | 1 | 1 | 1 | 1 | 1 | 1 | 1 | 1 | 1 | 1 | 1 | 1 |
| 10 | Address Type | | | | 0 | 0 | 0 | 1 | | | | | | | | |
| 11 | SA(SIP) | | | | | | | | | | | | | | | |
| 12 | | | | | | | | | | | | | | | | |
| 13 | 1 | 1 | 1 | 1 | 1 | 1 | 1 | 1 | 1 | 1 | 1 | 1 | 1 | 1 | 1 | 1 |
| 14 | HLPI | | | | | | PL | | QOS | | | | CIB | HEL | | |
| 15 | Bridging | | | | | | | | | | | | | | | |
| 16 | HE | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | 0 | 0 | 0 | 0 | 0 | 0 | 0 | 0 | BEtag | | | | | | | |
| 25 | Length | | | | | | | | | | | | | | | |
| 26 | Payload Length | | | | | | | | Payload CRC | | | | | | | |

TCG CELL OF OAM=1 IS DISCARDED IN ICLP INPUT UNIT.
IF:INTERFACE IDENTIFICATION(0=ISSI, 1=ICI)
LID:INPUT LINK NUMBER(0~7)

FIG. 519

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | 0 | OAM | 0 | TAGA | | | 0 | 0 | 0 | TAGC | | | TAGB | | 0 | 0 |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | IF | LID | | | | PT | | | CLP |
| 03 | 0 (ST) 0 | | SN | | | | MID | | | | | | | | | |
| 04 | 0 | 0 | 0 | 0 | 0 | 0 | 0 | 0 | BEtag(SIP) | | | | | | | |
| 05 | BAsize(SIP) | | | | | | | | | | | | | | | |
| 06 | Address Type | | | | 0 | 0 | 0 | 1 | | | | | | | | |
| 07 | DA(SIP) | | | | | | | | | | | | | | | |
| 08 | | | | | | | | | | | | | | | | |
| 09 | 1 | 1 | 1 | 1 | 1 | 1 | 1 | 1 | 1 | 1 | 1 | 1 | 1 | 1 | 1 | 1 |
| 10 | Address Type | | | | 0 | 0 | 0 | 1 | | | | | | | | |
| 11 | SA(SIP) | | | | | | | | | | | | | | | |
| 12 | | | | | | | | | | | | | | | | |
| 13 | 1 | 1 | 1 | 1 | 1 | 1 | 1 | 1 | 1 | 1 | 1 | 1 | 1 | 1 | 1 | 1 |
| 14 | HLPI | | | | | | PL | | QOS | | | | CIB | HEL | | |
| 15 | Bridging | | | | | | | | | | | | | | | |
| 16 | HE | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | | | | | | | | | | | | | | | | |
| 25 | | | | | | | | | | | | | | | | |
| 26 | Payload Length | | | | | | Payload CRC | | | | | | | | | |

TCG CELL OF OAM=1 IS DISCARDED IN ICLP INPUT UNIT.
IF:INTERFACE IDENTIFICATION(0=ISSI, I=ICI)
LID:INPUT LINK NUMBER(0-7)

FIG. 520

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | 0 | OAM | 0 | TAGA | | | 0 | 0 | 0 | TAGC | | | TAGB | | 0 | 0 |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | IF | LID | | | | PT | | | CLP |
| 03 | 0 (ST) 0 | | SN | | | | MID | | | | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 25 | Payload Length | | | | | | Payload CRC | | | | | | | | | |

TCG CELL OF OAM=1 IS DISCARDED IN ICLP INPUT UNIT.
IF:INTERFACE IDENTIFICATION(0=ISSI, 1=ICI)
LID:INPUT LINK NUMBER (0-7)

FIG. 521

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | 0 | OAM | 0 | TAGA | | | 0 | 0 | 0 | TAGC | | | TAGB | | 0 | 0 |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | IF | LID | | | | PT | | | CLP |
| 03 | 0 (ST) 1 | | SN | | | | MID | | | | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | 0 | 0 | 0 | 0 | 0 | 0 | 0 | 0 | BEtag | | | | | | | |
| 19 | Length | | | | | | | | | | | | | | | |
| 20 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 |
| 25 | Payload Length | | | | | | Payload CRC | | | | | | | | | |

TCG CELL OF OAM=1 IS DISCARDED IN ICLP INPUT UNIT.
IF:INTERFACE IDENTIFICATION(0=ISSI, 1=ICI)
LID:INPUT LINK NUMBER (0-7)

FIG. 522

RVCI: DESTINATION MHID=SBMH (00–1Fh) AND GWMH (40–5Fh) FOR USER CELL
RVCI=FFh FOR MESH-MH TEST CELL
SOURCE SHELF ID: 0–3
BASIZE(SIP): ENCAPSULATION BASIZE–44
HOP COUNT INDICATOR: D.C WHEN DIRECTED FOR SBMH
IF:INTERFACE IDENTIFICATION(0=ISSI, 1=ICI)

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | d.c | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | RVCI | | | | | | | | PT | | | CLP |
| 03 | 1 (ST) 0 | | SN | | | | SOURCE SHELF ID | | MID | | | | | | | |
| 04 | 0 | 0 | 0 | 0 | 0 | 0 | 0 | 0 | BEtag | | | | | | | |
| 05 | BAsize(SIP) | | | | | | | | | | | | | | | |
| 06 | Address Type | | | | 0 | 0 | 0 | 1 | | | | | | | | |
| 07 | DA | | | | | | | | | | | | | | | |
| 08 | | | | | | | | | | | | | | | | |
| 09 | 1 | 1 | 1 | 1 | 1 | 1 | 1 | 1 | 1 | 1 | 1 | 1 | 1 | 1 | 1 | 1 |
| 10 | Address Type | | | | 0 | 0 | 0 | 1 | | | | | | | | |
| 11 | SA | | | | | | | | | | | | | | | |
| 12 | | | | | | | | | | | | | | | | |
| 13 | 1 | 1 | 1 | 1 | 1 | 1 | 1 | 1 | 1 | 1 | 1 | 1 | 1 | 1 | 1 | 1 |
| 14 | Protocol ID | | | | | | PL | | QOS | | | | CB | HEL | | |
| 15 | Bridgtag | | | | | | | | | | | | | | | |
| 16 | IIE | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Ingress Interface Type | | | | | | | | ES | 0 | 0 | 0 | 0 | 0 | 0 | 0 |
| 23 | Carrier | | | | | | | | | | | | | | | |
| 24 | Incoming NW ID | | | | | | | | | | | | | | | |
| 25 | Incoming ICI TPS ID | | | | | | | | | | | | | | | |
| 25 | Payload Length | | | | | | IF | d.c | | | | | | | | |

RVCI: DESTINATION MHID=SBMH (00-1Fh) AND GWMH (40-5Fh) FOR USER CELL
RVCI=FFh FOR MESH-MH TEST CELL
SOURCE SHELF ID: 0-3
BASIZE(SIP): ENCAPSULATION BASIZE-44
HOP COUNT INDICATOR: D.C WHEN DIRECTED FOR SBMH
IF:INTERFACE IDENTIFICATION(0=ISSI, I=ICI)

FIG. 524

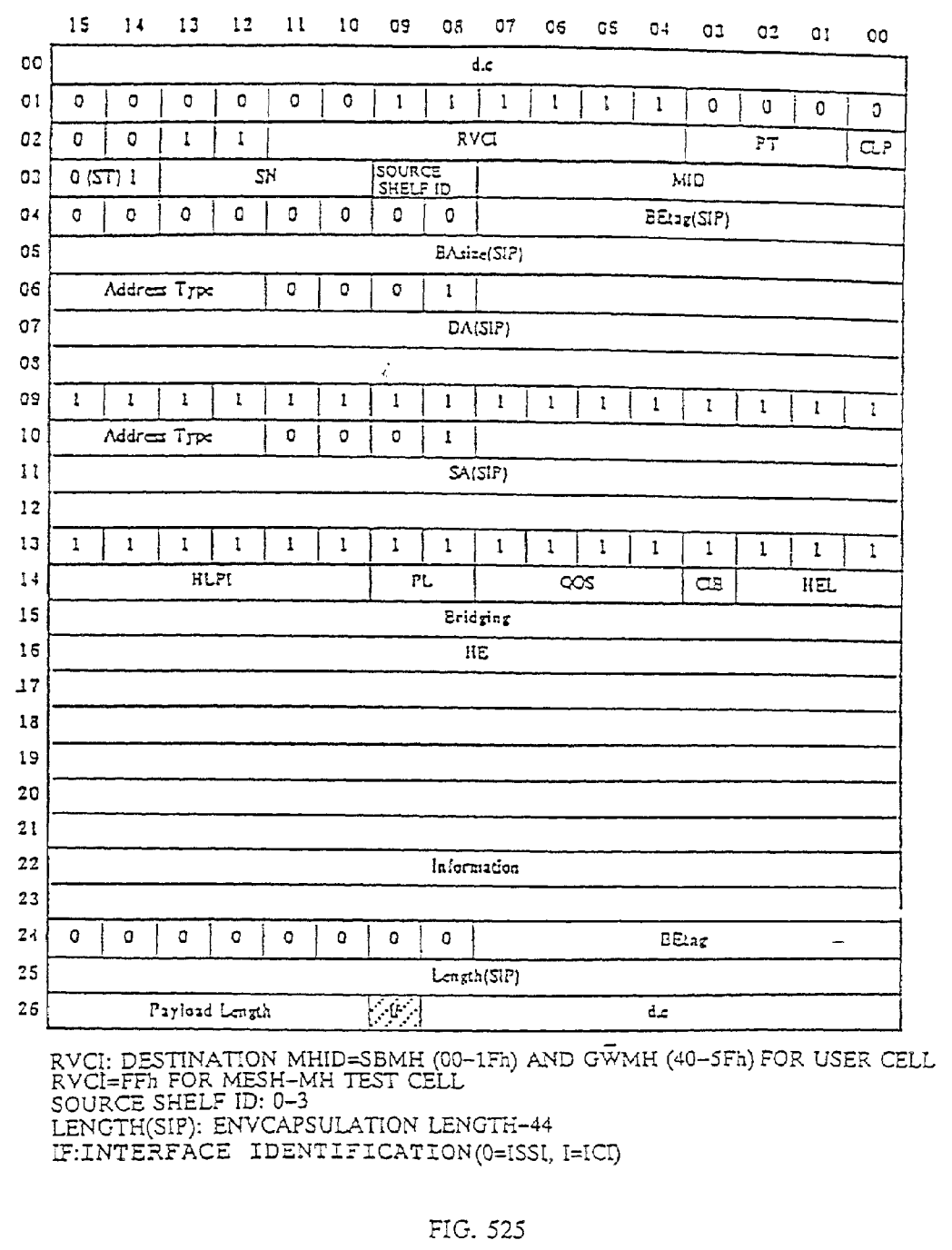

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | d.c | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | RVCI | | | | | | | | PT | | | CLP |
| 03 | 0 (ST) 1 | | SN | | | | SOURCE SHELF ID | | MID | | | | | | | |
| 04 | 0 | 0 | 0 | 0 | 0 | 0 | 0 | 0 | BEtag(SIP) | | | | | | | |
| 05 | BAsize(SIP) | | | | | | | | | | | | | | | |
| 06 | Address Type | | | | 0 | 0 | 0 | 1 | | | | | | | | |
| 07 | DA(SIP) | | | | | | | | | | | | | | | |
| 08 | | | | | | | | | | | | | | | | |
| 09 | 1 | 1 | 1 | 1 | 1 | 1 | 1 | 1 | 1 | 1 | 1 | 1 | 1 | 1 | 1 | 1 |
| 10 | Address Type | | | | 0 | 0 | 0 | 1 | | | | | | | | |
| 11 | SA(SIP) | | | | | | | | | | | | | | | |
| 12 | | | | | | | | | | | | | | | | |
| 13 | 1 | 1 | 1 | 1 | 1 | 1 | 1 | 1 | 1 | 1 | 1 | 1 | 1 | 1 | 1 | 1 |
| 14 | HLPI | | | | | | PL | | QOS | | | | CIB | HEL | | |
| 15 | Bridging | | | | | | | | | | | | | | | |
| 16 | HE | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | 0 | 0 | 0 | 0 | 0 | 0 | 0 | 0 | BEtag | | | | | | | |
| 25 | Length(SIP) | | | | | | | | | | | | | | | |
| 26 | Payload Length | | | | | | IF | d.c | | | | | | | | |

RVCI: DESTINATION MHID=SBMH (00-1Fh) AND GWMH (40-5Fh) FOR USER CELL
RVCI=FFh FOR MESH-MH TEST CELL
SOURCE SHELF ID: 0-3
LENGTH(SIP): ENVCAPSULATION LENGTH-44
IF:INTERFACE IDENTIFICATION(0=ISSI, I=ICI)

FIG. 525

RVCI: DESTINATION MHID=SBMH (00-1Fh) AND GWMH (40-5Fh) FOR USER CELL
RVCI=FFh FOR MESH-MH TEST CELL
SOURCE SHELF ID: 0-3
IF: INTERFACE IDENTIFICATION(0=ISSI, 1=ICI)

RVCI: DESTINATION MHID=SBMH (00-1Fh) AND GWMH (40-5Fh) FOR USER CELL
RVCI=FFh FOR MESH-MH TEST CELL
SOURCE SHELF ID: 0-3
IF:INTERFACE IDENTIFICATION(0=ISSI, I=ICI)

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | d.c | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | RVCI | | | | | | | | PT | | | CLP |
| 03 | 0 (ST) 1 | | SN | | | | SOURCE SHELF ID | | MID | | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | 0 | 0 | 0 | 0 | 0 | 0 | 0 | 0 | BEtag | | | | | | | |
| 19 | Length(SIP) | | | | | | | | | | | | | | | |
| 20 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 |
| 26 | Payload Length | | | | | | 0 | d.c | | | | | | | | |

RVCI: DESTINATION MHID=SBMH (00-1Fh) AND GWMH (40-5Fh) FOR USER CELL
RVCI=FFh FOR MESH-MH TEST CELL
SOURCE SHELF ID: 0-3
LENGTH(SIP): ENVCAPSULATION LENGTH-44
IF: INTERFACE IDENTIFICATION(0=ISSI, 1=ICI)

FIG. 528

| EF1 |

MS : Master ERROR
RM : CC.PL NG OR
MC: MID not active (COM)
LA : LINK not active
(ODEN=H:not EN)

| EF2 |

MT : MRI time out
CC : Payload CRC violation
PL : Payload length error
MA : MID currently active or EOM with unapproved MID
SN : Invalid sequence number
BA : Invalid BAsize field value
DT : Invalid DA type
ST : Invalid SA type
PI : Invalid Protocol ID
(= IS : Invalid Service Type)
PD : Invalid Protocol Descriminator
HC : Hop Count=0
II : Ingress Interface Type
BE : BEtag mismatch
EM : Exceed maximum number of CDU
RE :Routing Error
LE : BAsize field not equal to length field
EN : Encapsulation error(Segment Type =SSM)

MS : Master ERROR
RM : CC,PL NG OR
MC: MID not active (COM)
LA : LINK not active
(ODEN=H:not EN)
BD : BOM droup

[EF2]

MT : MRI time out
CC : Payload CRC violation
PL : Payload length error
MA : MID currently active or EOM with unapproved MID
SN : Invalid sequence number
BA : Invalid BAsize field value
DT : Invalid DA type
ST : Invalid SA type
PI : Invalid Protocol ID
(= IS : Invalid Service Type)
PD : Invalid Protocol Descriminator
HC : Hop Count=0
II : Ingress Interface Type
BE : BEtag mismatch
ME:MID assign error
EM : Exceed maximum number of CDU
RE :Routing Error
LE : BAsize field not equal to length field
EN : Encapsulation error(Segment Type =SSM)

FIG. 538

| EF1 |

MS : Master ERROR
RM : CC,PL NG OR
MC: MID not active (COM)
LA : LINK not active
(ODEN=H:not EN)
BD : BOM droup

| EF2 |

MT : MRI time out
CC : Payload CRC violation
PL : Payload length error
MA : MID currently active or EOM with unapproved MID
SN : Invalid sequence number
BA : Invalid BAsize field value
DT : Invalid DA type
ST : Invalid SA type
PI : Invalid Protocol ID
(= IS : Invalid Service Type)
PD : Invalid Protocol Descriminator
HC : Hop Count=0
II : Ingress Interface Type
BE : BEtag mismatch
ME:MID assign error
EM : Exceed maximum number of CDU
RE :Routing Error
LE : BAsize field not equal to length field
EN : Encapsulation error(Segment Type =SSM)

FIG. 542

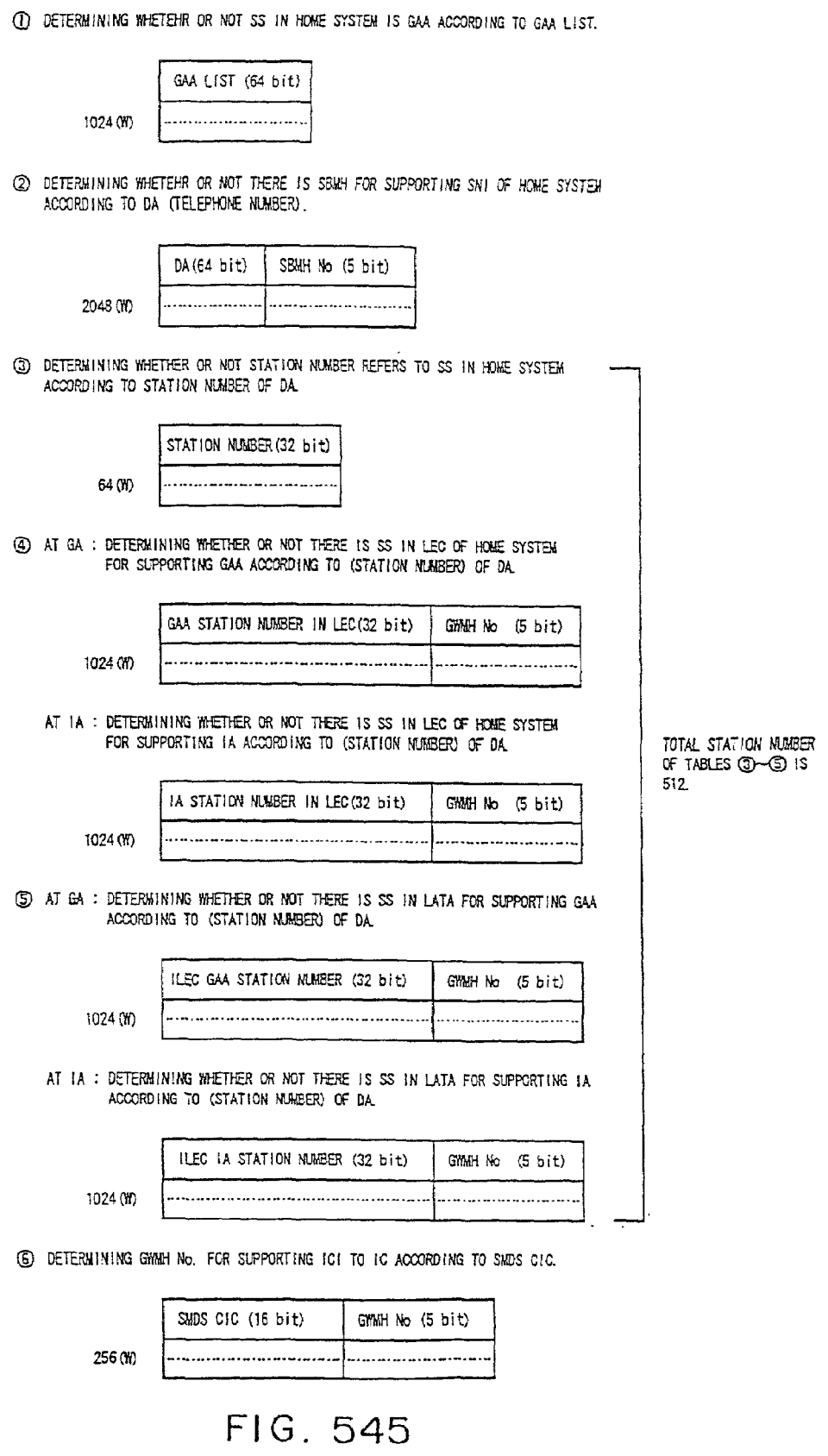

① DETERMINING WHETEHR OR NOT SS IN HOME SYSTEM IS GAA ACCORDING TO GAA LIST.

| | GAA LIST (64 bit) |
|---|---|
| 1024 (W) | ........ |

② DETERMINING WHETEHR OR NOT THERE IS SBWH FOR SUPPORTING SNI OF HOME SYSTEM ACCORDING TO DA (TELEPHONE NUMBER).

| | DA (64 bit) | SBWH No (5 bit) |
|---|---|---|
| 2048 (W) | ........ | ........ |

③ DETERMINING WHETHER OR NOT STATION NUMBER REFERS TO SS IN HOME SYSTEM ACCORDING TO STATION NUMBER OF DA.

| | STATION NUMBER (32 bit) |
|---|---|
| 64 (W) | ........ |

④ AT GA : DETERMINING WHETHER OR NOT THERE IS SS IN LEC OF HOME SYSTEM FOR SUPPORTING GAA ACCORDING TO (STATION NUMBER) OF DA.

| | GAA STATION NUMBER IN LEC (32 bit) | GWMH No (5 bit) |
|---|---|---|
| 1024 (W) | ........ | ........ |

AT IA : DETERMINING WHETHER OR NOT THERE IS SS IN LEC OF HOME SYSTEM FOR SUPPORTING IA ACCORDING TO (STATION NUMBER) OF DA.

| | IA STATION NUMBER IN LEC (32 bit) | GWMH No (5 bit) |
|---|---|---|
| 1024 (W) | ........ | ........ |

⑤ AT GA : DETERMINING WHETHER OR NOT THERE IS SS IN LATA FOR SUPPORTING GAA ACCORDING TO (STATION NUMBER) OF DA.

| | ILEC GAA STATION NUMBER (32 bit) | GWMH No (5 bit) |
|---|---|---|
| 1024 (W) | ........ | ........ |

AT IA : DETERMINING WHETHER OR NOT THERE IS SS IN LATA FOR SUPPORTING IA ACCORDING TO (STATION NUMBER) OF DA.

| | ILEC IA STATION NUMBER (32 bit) | GWMH No (5 bit) |
|---|---|---|
| 1024 (W) | ........ | ........ |

TOTAL STATION NUMBER OF TABLES ③~⑤ IS 512.

⑥ DETERMINING GWMH No. FOR SUPPORTING ICI TO IC ACCORDING TO SMDS CIC.

| | SMDS CIC (16 bit) | GWMH No (5 bit) |
|---|---|---|
| 256 (W) | ........ | ........ |

FIG. 545

| NAME | POLARITY | LEVEL | POSITION | EXPLANATION OF FUNCTION | REMARKS |
|---|---|---|---|---|---|
| SDXD00~15 | P | TTL | BWB | HIGHWAY DATA OF SDMX →ICLP. MSB FOR SDXD15, AND LSB FOR SDXD00 | |
| SDXDP | P | TTL | BWB | ODD PARITY FOR SDXDxx AND SDXEN | |
| SDXEN | N | TTL | BWB | ENABLE OF SDSMX→ ICLP | |
| SDXCF | N | TTL | BWB | CELL FRAME OF SDMX →ICLP | |
| SDXCK | CLK | TTL | BWB | 9MHZ CLK IN PARALLEL TO HIGHWAY DATA OF SDMX → ICLP | |
| MD00~15 | P | TTL | FCN | HIGHWAY DATA OF MATE ICLP. MSB FOR MD15, AND LSB FOR MD00 | |
| MDP | P | TTL | FCN | ODD PARITY FOR MDxx AND MEN | |
| MEN | N | TTL | FCN | ENABLE OF MATE ICLP | |
| MCF | N | TTL | FCN | CELL FRAME OF MATE ICLP | |
| MCK | CLK | TTL | FCN | 9MHZ CLK IN PARALLEL TO HIGHWAY DATA OF MATE ICLP | |
| TD00~15 | P | TTL | BWB | TEST DATA OF HLP07 →ICLP. MSB FOR TD15, AND LSB FOR TD00 | |
| TDP | P | TTL | BWB | ODD PARITY FOR TDxx AND TENS | |
| TENS | N | TTL | BWB | TEST CELL ENABLE | |
| TS00 | N | TTL | BWB | ICLP CELL FRAME | |
| TS01 | N | TTL | BWB | TEST CELL SEND OK/NG | |
| SMAD00~15 | P | TTL | BWB | HIGHWAY DATA OF HMH11A →HMH09A. MSB FOR SMAD15, AND LSB FOR SMAD00 | |
| SMADP | P | TTL | BWB | ODD PARITY FOR SMADxx AND SMAEN | |
| SMAEN | N | TTL | BWB | ENABLE OF HMH11A →HMH09A | |
| SMACF | N | TTL | BWB | CELL FRAME OF HMH11A →HMH09A | |
| SMAEF1 | N | TTL | BWB | ERROR FLAG OF HMH11A →HMH09A (PROTECTION AGAINST STACK FOR 0, 26WORD) NG:L, GOOD:H | |
| SMAEF2 | N | TTL | BWB | ERROR FLAG OF HMH11A →HMH09A (PROTECTION AGAINST STACK FOR 0, 26WORD) NG:L, GOOD:H | |
| SWACTA | — | TTL | BWB | INDICATES ACTIVE SW UNIT (HOME SW ACT(L)/MATE SW ACT(H)) | |
| LPACTA | — | TTL | BWB | INDICATES ACTIVE LP UNIT (HOME LP ACT(L)/MATE LP ACT(H)) | |
| MSTCF | N | TTL | BWB | SYNCHRONIZATION FRAME PULSE FROM ICLP TO OGLP | |
| SA19CK | CLK | TTL | BWB | HLP02A → ALL LP UNITS 19MHz CLK | |
| SA19FP | N | TTL | BWB | HLP02A → ALL LP UNITS 19MHz FRAME PULSE | |
| RQD00 ~07 | P | TTL | BWB | HLP07A → ALL LP UNIT 8BIT COMMAND BUS. MSB FOR RQD07, AND LSB FOR RQD00 | |
| REQ | N | TTL | BWB | HLP07A ← ALL LP UNITS REQUEST ENABLE | |
| CK4M | CLK | TTL | BWB | HLP07A → ALL LP UNITS 4MHz CLK | |
| RSD00~07 | P | TTL | BWB | HLP07A ← ALL LP UNIT 8BIT COMMAND BUS. MSB FOR RSD07, AND LSB FOR RSD00 | |
| RES | N | TTL | BWB | HLP07A ← ALL LP UNITS RESPONSE ENABLE | |

FIG. 547

(1) FLOWCHART OF FIFO WRITING UNIT (REALIZED BY RU CTL LSI)
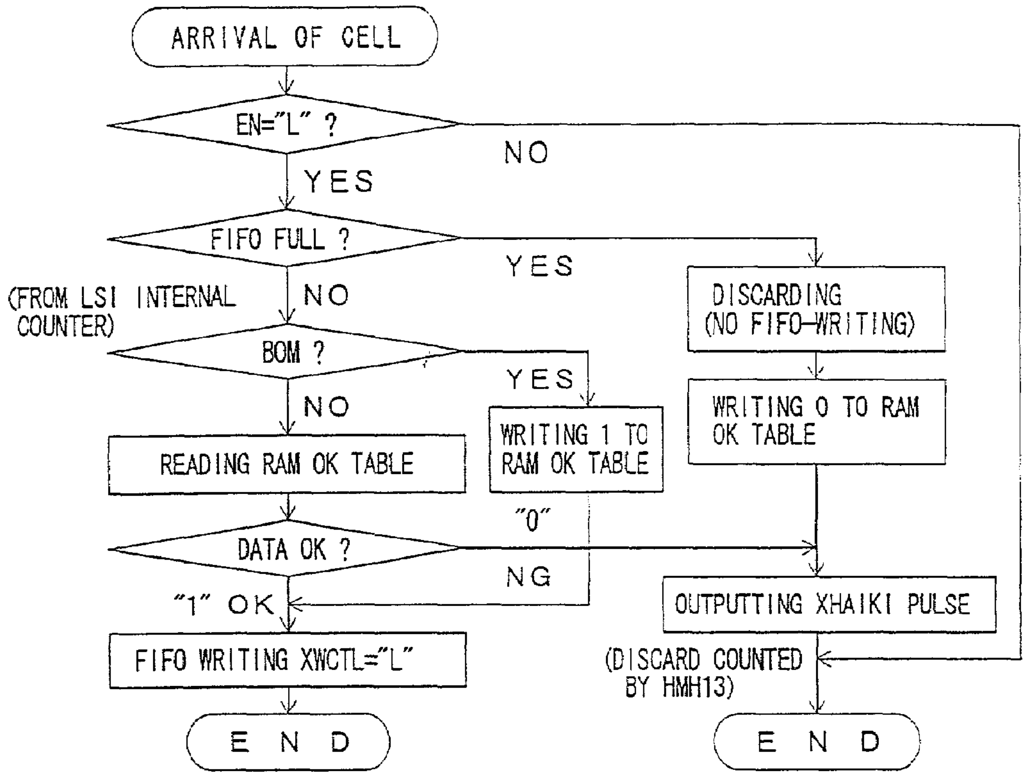
(1) FLOWCHART OF FIFO READ CLOCK GENERATING UNIT (REALIZED BY BROAD CAST LCA)
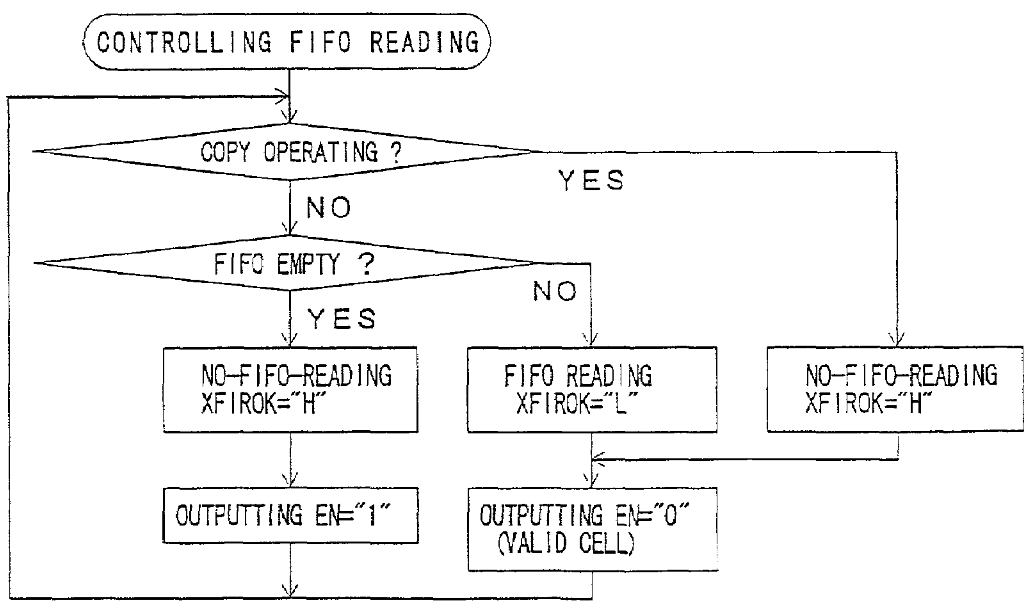
F I G. 563

(3) FLOWCHART OF COPY CONTROL UNIT (REALIZED BY BROADCAST LCA)
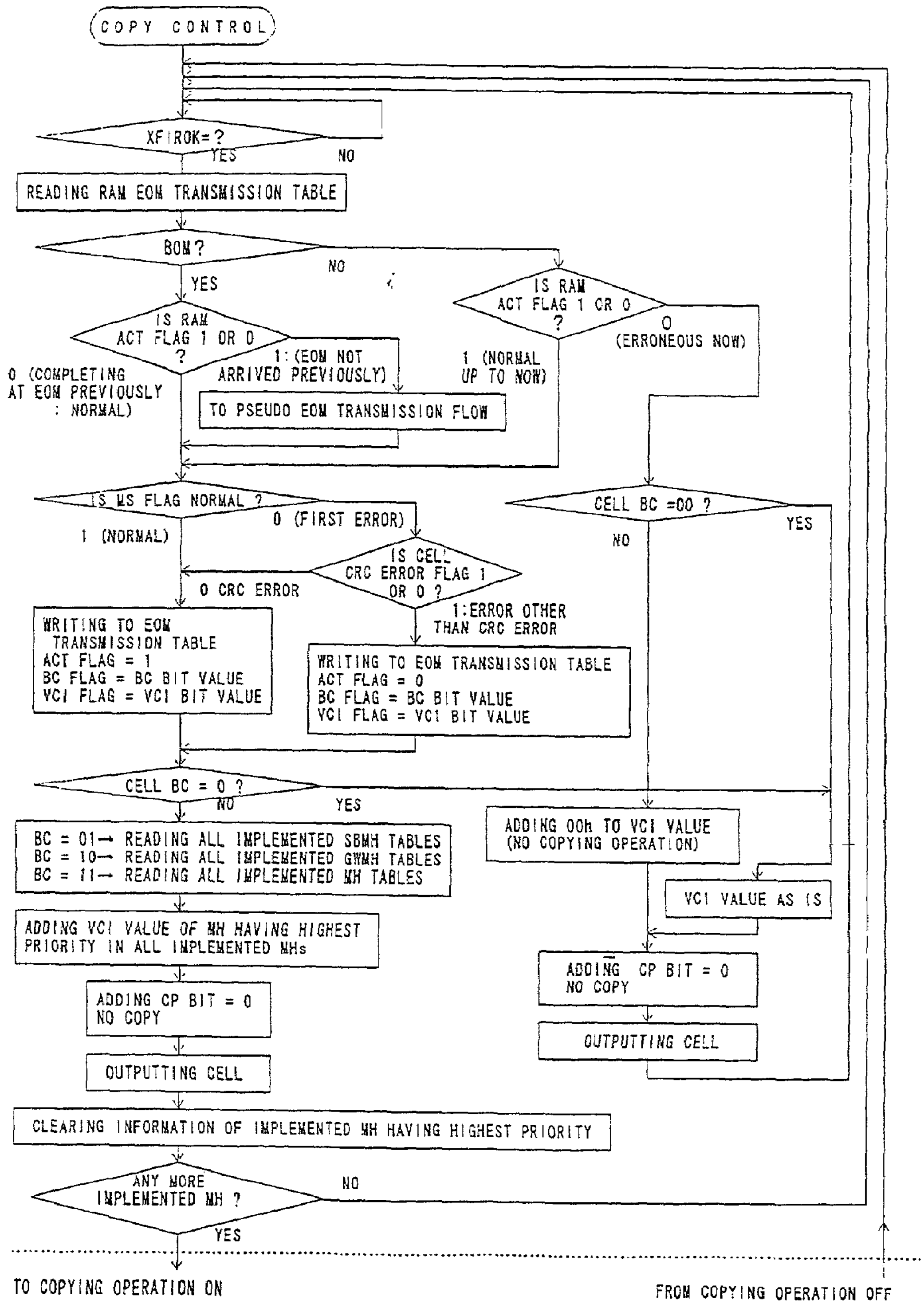
F I G. 5 6 4

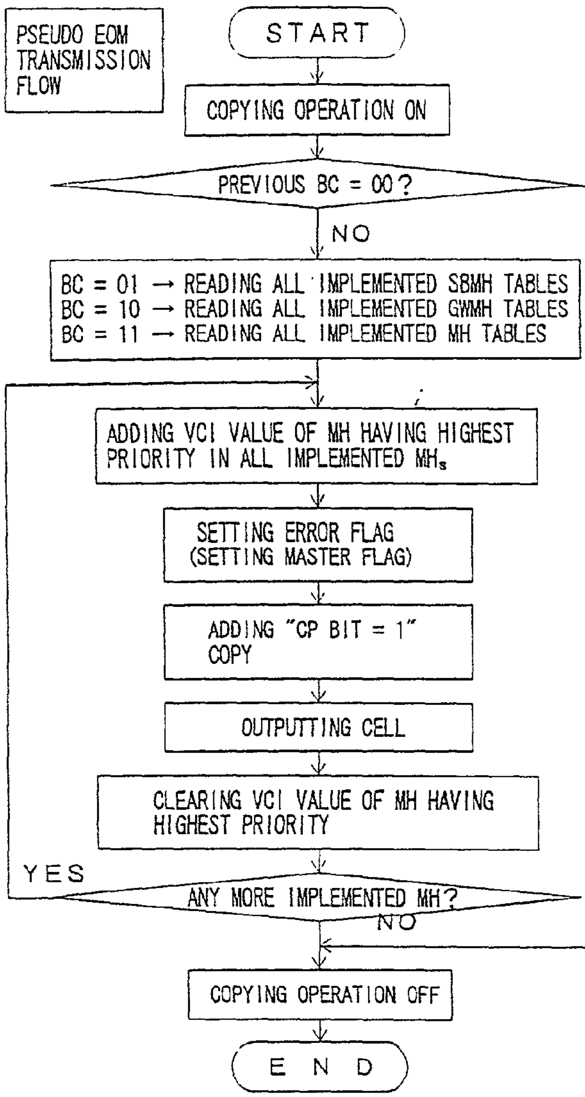

| | BOM | COM | COM | COM | COM | EOM |
|---|---|---|---|---|---|---|
| EF MS FLAG | OK | OK | NG | — | — | — |
| RAM ACT TABLE NO ACT | ACT | ACT | ACT | NO ACT | NO ACT | NO ACT |
| PROCESS | ALL MHs DISTRIBUTED | ALL MHs DISTRIBUTED | ALL MHs DISTRIBUTED | 1 MH TRANSMISSION (VCI VALUE $00_H$ ) | 1 MH TRANSMISSION (VCI VALUE $00_H$ ) | 1 MH TRANSMISSION (VCI VALUE $00_H$ ) |

(4) FIFO MONITOR UNIT OPERATION CONDITION (REALIZED BY RU CTL LSI)
- COUNTING UP WITH FIFO WRITE
- COUNTING DOWN WITH FIFO READ
- FIFO FULL OUTPUT WITH COUNT VALUE 511
- FIFO EMPTY OUTPUT WITH COUNT VALUE 0

F I G. 566

VPI / VCI REASSIGNMENT
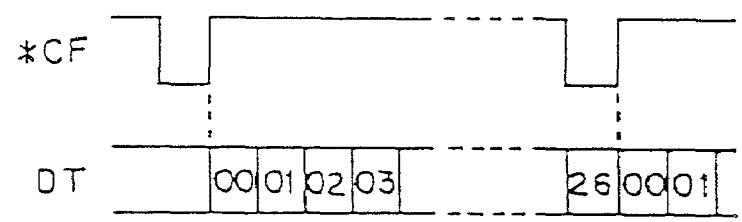
HMH12A→HMH13A INPUT CELL FORMAT
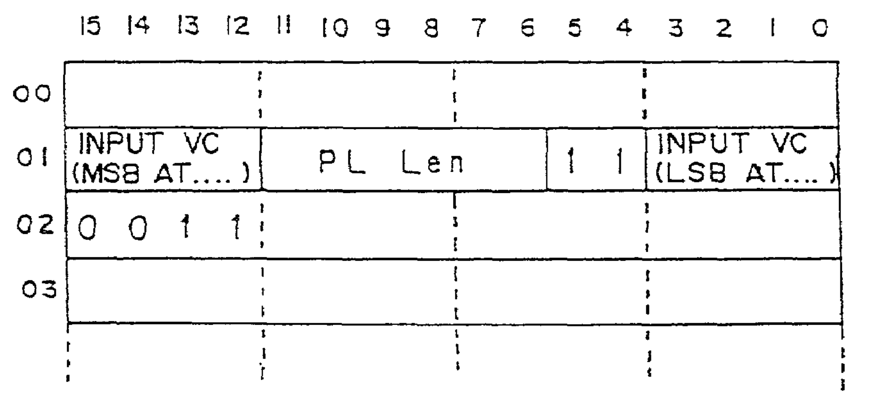
HMH13A OUTPUT CELL FORMAT
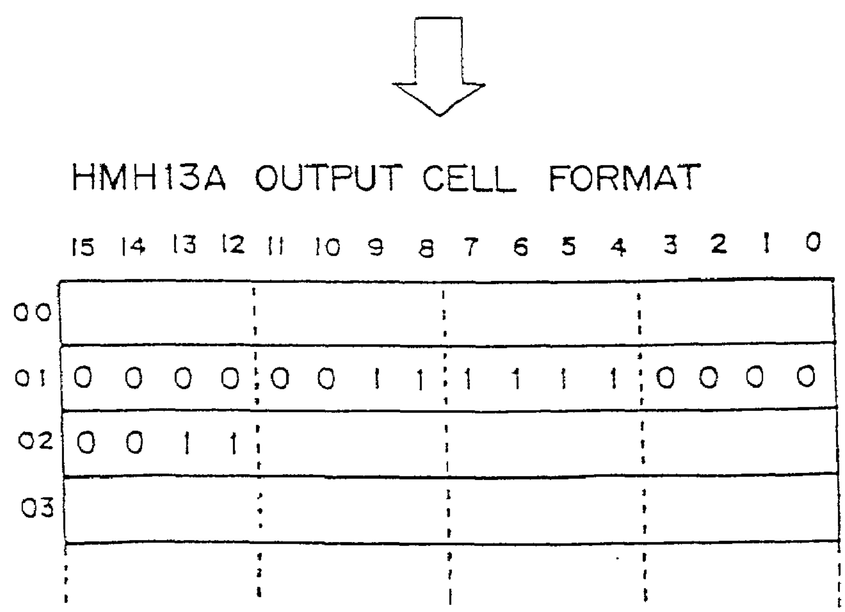
FIG. 573

| ITEM | BROCK NAME | CONTENTS | PWCB |
|---|---|---|---|
| 1 | CROSS-CONNECT SELECTION | TCG CELL FOR USE IN SELECTING MDX ACT SYSTEM DATA ACCORDING TO SYSTEM INFORMATION OF SWITCH. | HMH07A |
| 2 | S/P | 38.88 MB/S (16 PARALLEL) IS CONVERTED INTO 12.96 MB/S (48 PARALLEL). | |
| 3 | DA FILTERING (V2DMUX NUMBER OF DISCARDED CELLS) | ISSI AND ICI ADDRESSED TO DESTINATION ARE SPECIFIED BY DA AND CARRIER. | |
| 4 | LOAD SPLITTING | KEY IS GENERATED BY COMBINATION OF DA AND SA. | HMH08A |
| 5 | DMUX | 622.08 MB/S (12.96 MHZ 48 PARALLEL) IS CONVERTED INTO 155.52 MB/S (9.72 MHZ 16 PARALLEL). | |
| 6 | MULTIPLEXING TEST CELL | TEST CELL IS MULTIPLEXED AT IDLE CELLS IN LINE. TEST CELL IS PRIORITIZED DURING DIAGNOSTICS. | |
| 7 | REASSIGNING ST | ST VALUE OF SIP IS ASSIGNED TO ENCAPSULATED CELL. | |
| 8 | AMENDING BA SIZE LENGTH | BA SIZE LENGTH VALUE IS AMENDED. | |
| 9 | MID CHECK | IT IS CHECKED THAT VCI/MID IS NOT ACTIVE AT BOM AND THAT VCI/MID IS ACTIVE AT COM AND EOM. | |
| 10 | SN CHECK | IT IS CHECKED THAT SN IS INITIALIZED AT BOM AND SN IS IN GOOD ORDER AT COM AND EOM. | |
| 11 | HOP COUNT | 1 IS SET EACH TIME INITIAL VALUE IS SET AND SS IS PASSED TO DETECT INDEFINITE SS LOOP OF PACKET. RESULTANT 0 INDICATES DISCARD. | |
| 12 | ERROR EDIT I | ERROR GENERATED AT EACH CHECK UINT IS ASSIGNED TO EACH POSITION. | |
| 13 | GA COPY (NUMBER OF DISCARDED CELLS) | CELL INPUT AT GA IS COPIED AND OUTPUT TO ISSI AND ICI ADDRESSED TO DESTINATION. | HMH09A |
| 14 | IC/ILEC UNAVAILABLE | CELL DETERMINED TO BE IC/ILEC UNAVAILABLE BY ROUTING TABLE IS DISCARDED. | |
| 15 | MRI TIMEOUT CHECK | TIME TO BOM AND EOM IS CHECKED IN L3 PDU UNITS. | HMH10A |
| 16 | MID ACQUISITION | OUTPUT MID IS CONVERTED. | |
| 17 | ERROR EDIT II | ERROR FLAG GENERATED IN EACH CHECKER IS ASSIGNED TO EACH POSITION. | |
| 18 | DISCARDING ERROR CELLS | NG CELLS ARE DISCARDED BY MS (MASTER ERROR) OF ERROR FLAG. | |
| 19 | OUTPUT BAND LIMIT (VC SHAPING, NUMBER OF DISCARDED CELLS) (VC SHAPING, NUMBER OF DISCARDED PACKETS) | OUTPUT BAND (PEAK PATE) IS LIMITED FOR EACH OUTPUT MH. | |
| 20 | DISCARD COUNTER | DISCARDED CELLS GENERATED BY DMUX, GA COPY, AND OUTPUT BAND LIMIT ARE COUNTED AND REPORTED TO LP-COM. | |
| 21 | GENERATING CRC-10 | CRC-10 OF CELL PAYLOAD IS GENERATED AND ADDED. | |
| 22 | CONVERTING FORMAT | FORMAT IS CONVERTED. | |
| 23 | 39MC | 78 MHZ CLOCK IS RECEIVED FROM HLP02A TO GENERATE 39 MHZ CLOCK TO BE USED IN OGLP UNIT AND CELL FRAME. | HMH07A |
| 24 | μP INTERFACE | INTERFACES WITH μP OF HLM01A. | PWCB EXCLUDING HMH07A |
| 25 | 9MC | 19 MHZ CLOCK IS RECEIVED FROM HLP02A TO GENERATE 9 MHZ CLOCK TO BE USED IN OGLP UNIT. | PWCB EXCLUDING HMH07A |
| 26 | COMMAND RESPONSE INTERFACE | INTERFACES WITH C/R OF HLP02A. | COMMON TO EACH PWCB |

F I G. 580

| | Message \ Error Flag | E1 MS | E2 MT | E1 MC | E2 MA | E2 SN | E2 LC | E2 GA | E2 EM | PVC |
|---|---|---|---|---|---|---|---|---|---|---|
| A | BOM with Unexpected MID | ON | | | ON | | | | | |
| | COM with Unexpected MID | ON | | ON | | | | | | |
| | EOM with Unexpected MID | ON | | | ON | | | | | |
| B | Unexpected SN Error | ON | | OK | OK | ON | | | | |
| C | ILEC/IC Unavailable | ON | | | | | ON | | | |
| D | CARRIER SELECTION | OK | | | | | | | | |
| E | RMID ACQUISITION | OK | | | | | | | | |
| F | MRI Time Out | | ON | | | | | | | |
| G | GA COPY | ON | | OK | OK | ON | | | | |
| H | LIMIT OF SIMULTANEOUS TRANSMISSION NUMBER | ON | | OK | OK | | | | ON | |

'ON': EF INDICATING "ON" WHEN CHECK RESULT OUTPUTS NG
'OK': CHECK IS MADE ONLY WHEN OK-MARKED EF INDICATES "OK".
'NO MARK': CHECK IS MADE REGARDLESS OF OK OR NG OF 'NO MARK' EF
'M': NO CHECK IS MADE FOR INTER-MESH PVC TEST CELL.

FIG. 581

HMH07 INPUT CELL (FROM SB)
INTER-MH BOM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | | 0 | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 1 | 0 | SN | | | | INPUT MID | | | | | | | | | |
| 04 | 0 | 0 | 0 | 0 | 0 | 0 | 0 | 0 | SIP PBEtag | | | | | | | |
| 05 | SIP BAsize | | | | | | | | | | | | | | | |
| 06 | ISSIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | High Layer Protocol | | | | | | Pad I | | QOS | | | | CI | HE Len | | |
| 15 | Bridging | | | | | | | | | | | | | | | |
| 16 | Header Extension (SIP) | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Ingress Interface Type | | | | | | | | ES | DC | | | | | | |
| 23 | Carrier | | | | | | | | | | | | | | | |
| 24 | Incominng Network ID | | | | | | | | | | | | | | | |
| 25 | Incoming ICI Transmission Path Set | | | | | | | | | | | | | | | |
| 26 | PL Len. | | | | | | CRC | | | | | | | | | |

FIG. 582

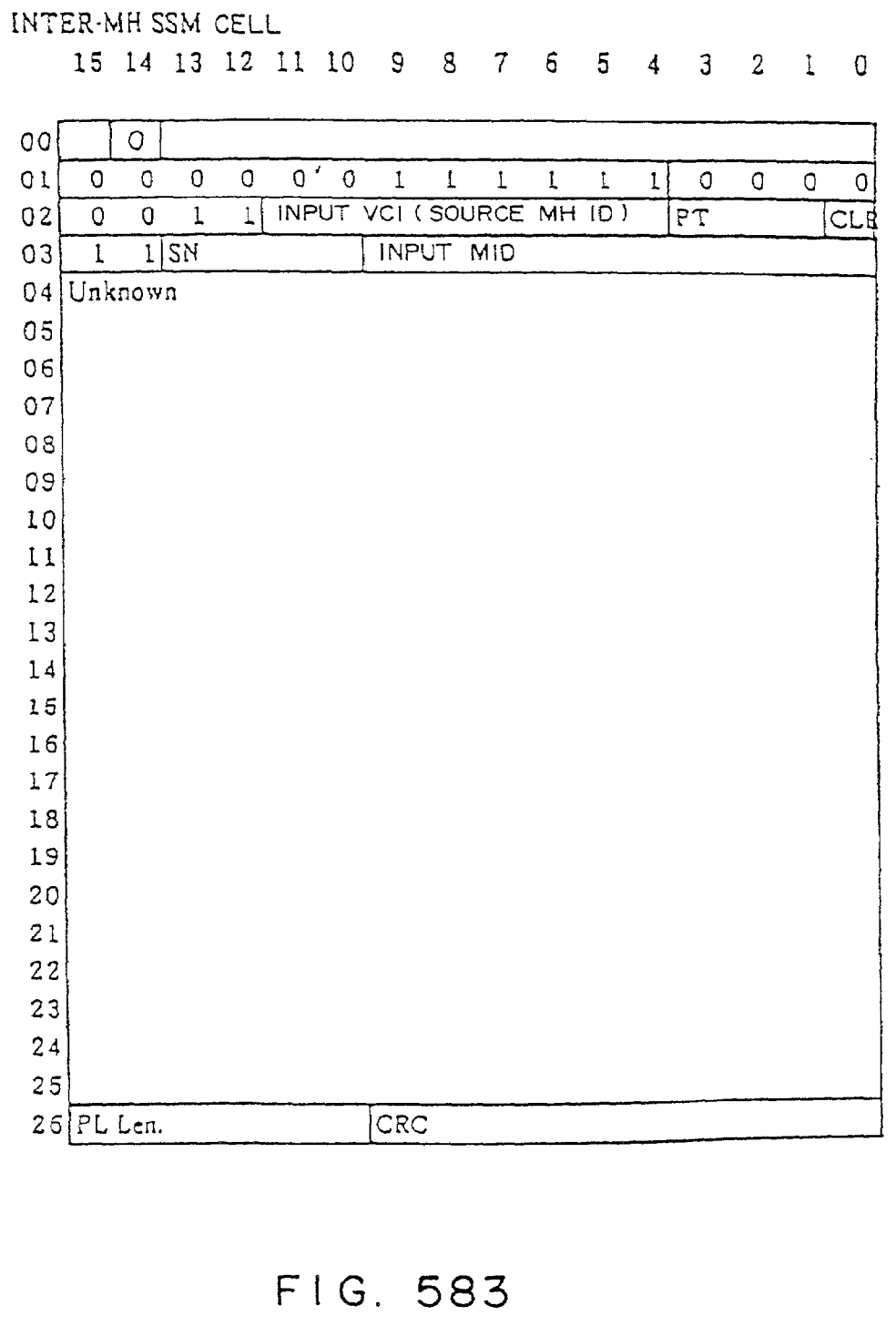

INTER-MH SSM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | | 0 | | | | | | | | | | | | | | |
| 01 | 0 | 0 | 0 | 0 | 0' | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLB |
| 03 | 1 | 1 | SN | | | | INPUT MID | | | | | | | | | |
| 04 | Unknown | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 583

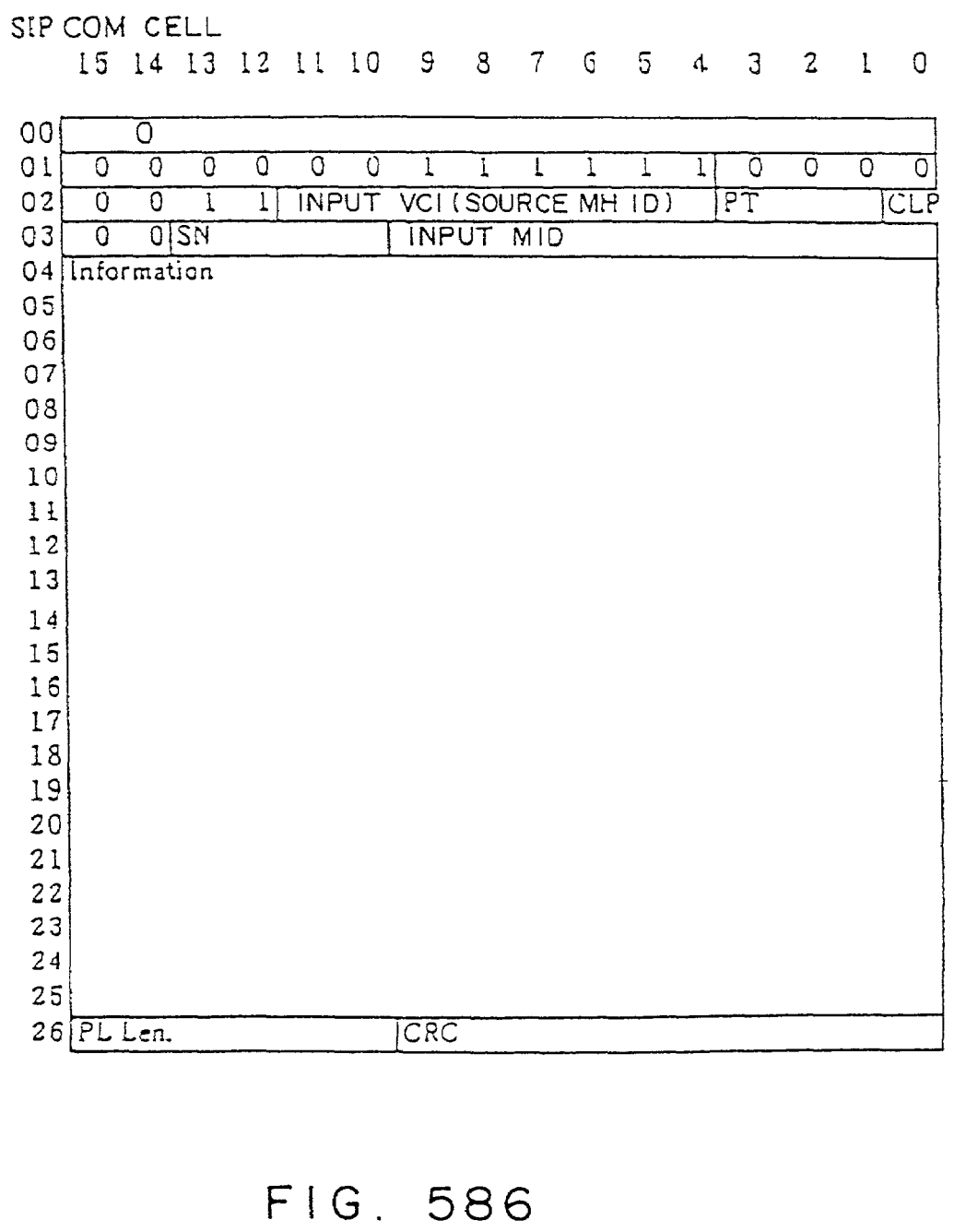

SIP COM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | 0 | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 0 | 0 | SN | | | | INPUT MID | | | | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 586

HMH07 INPUT CELL (FROM GW)
INTER-MH BOM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | | 0 | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 1 | 0 | SN | | | | INPUT MID | | | | | | | | | |
| 04 | 0 | 0 | 0 | 0 | 0 | 0/ | 0 | 0 | ISSIP BEtag | | | | | | | |
| 05 | SIP BAsize | | | | | | | | | | | | | | | |
| 06 | ISSIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | Service type | | | | | | | | | | | | | | | |
| 15 | | | | | | | | | | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Ingress Interface Type | | | | | | | | ES | Hop Count Ind | | | | | | |
| 23 | Carrier | | | | | | | | | | | | | | | |
| 24 | Incominng Network ID | | | | | | | | | | | | | | | |
| 25 | Incoming ICI Transmission Path Set | | | | | | | | | | | | | | | |
| 26 | PL Len. | | | | | | If | | (CRC) | | | | | | | |

VALID ONLY WHEN INPUT INTERFACE TO SS OF HOME SYSTEM IS ISSI AND IF BIT INDICATES 0

FIG. 588

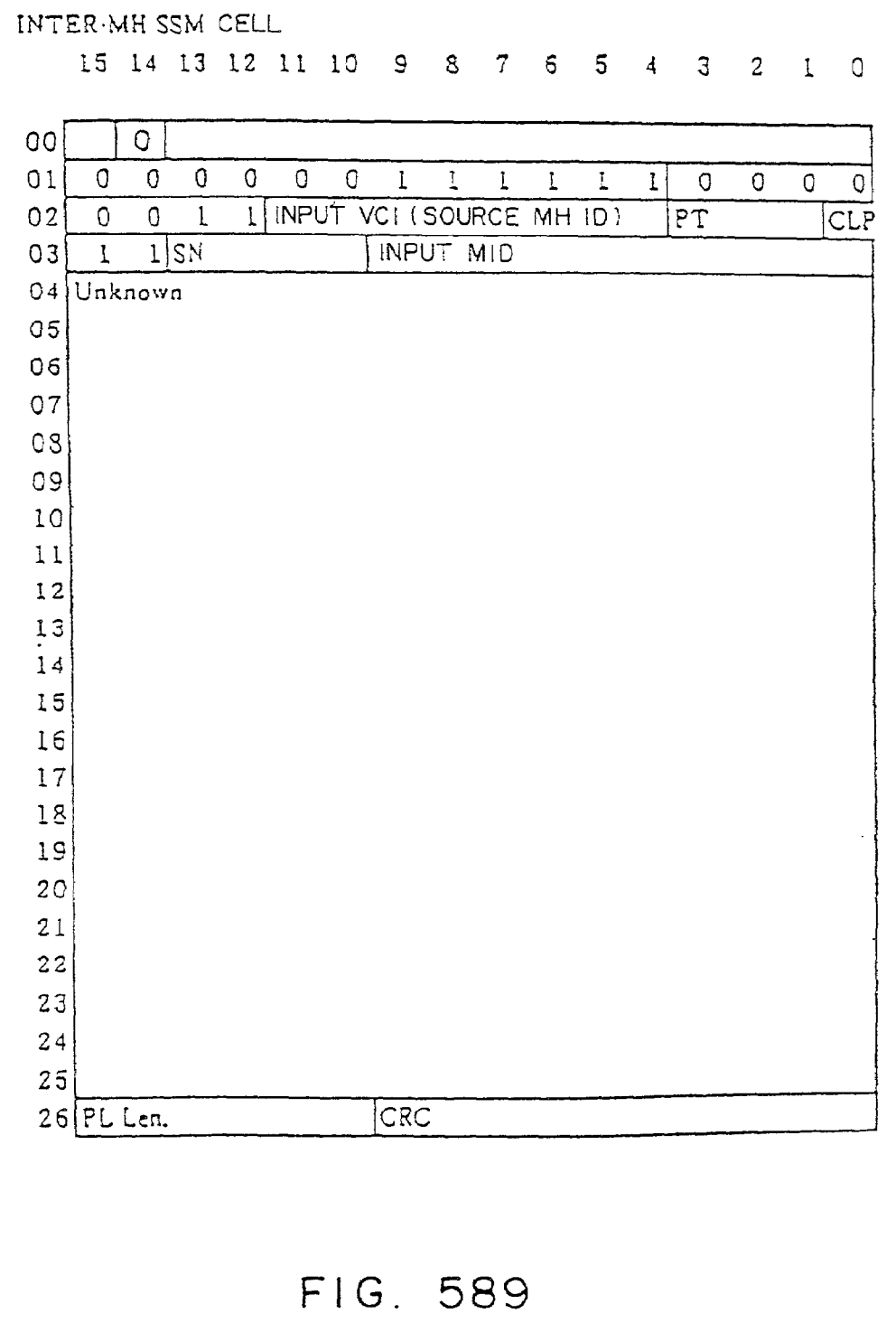

INTER·MH SSM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | | 0 | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 1 | 1 | SN | | | | INPUT MID | | | | | | | | | |
| 04 | Unknown | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 589

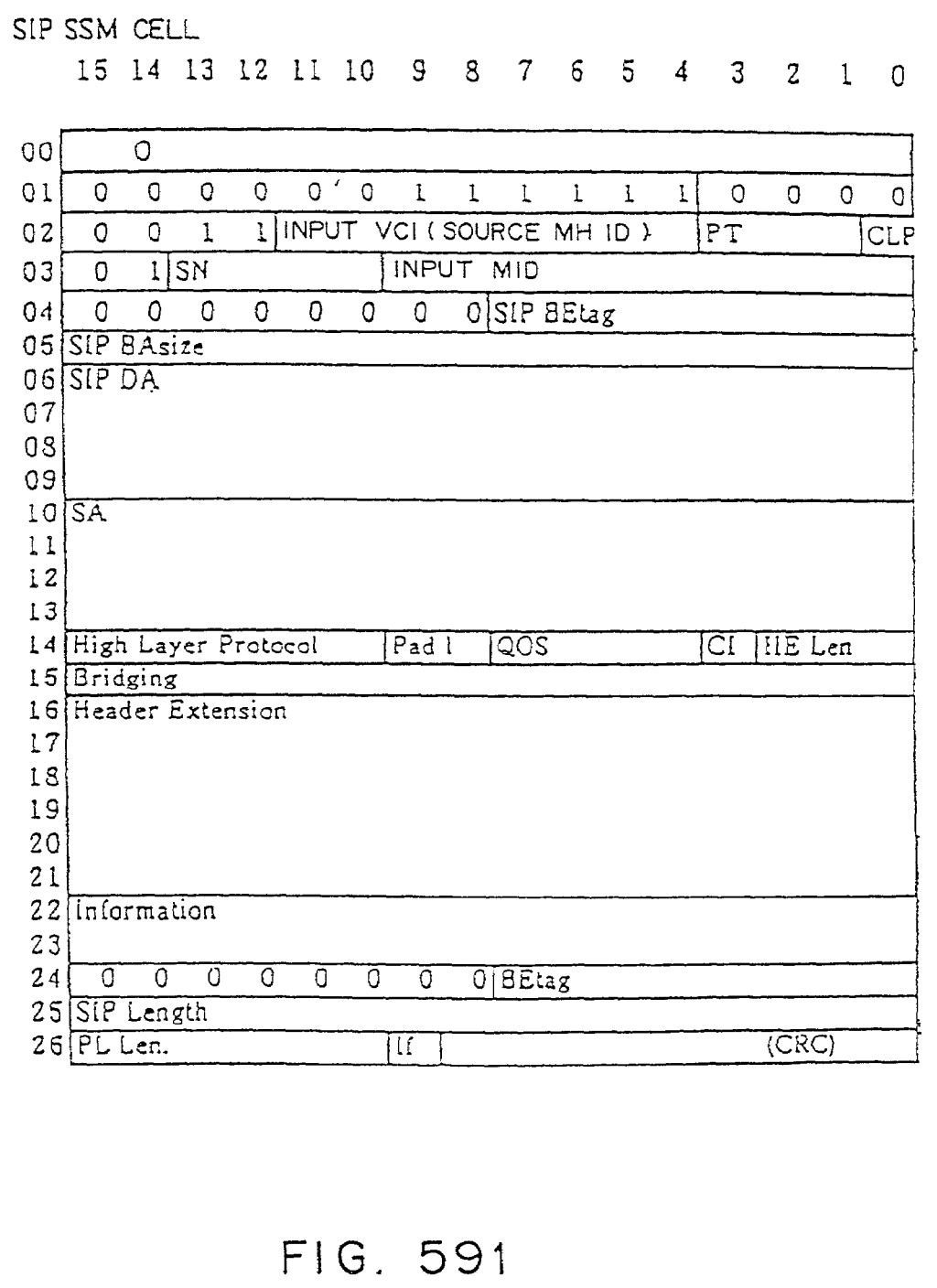

SIP SSM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | 0 | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI ( SOURCE MH ID ) | | | | | | | | PT | | | CLP |
| 03 | 0 | 1 | SN | | | | INPUT MID | | | | | | | | | |
| 04 | 0 | 0 | 0 | 0 | 0 | 0 | 0 | 0 | SIP BEtag | | | | | | | |
| 05 | SIP BAsize | | | | | | | | | | | | | | | |
| 06 | SIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | High Layer Protocol | | | | | | Pad l | | QOS | | | | CI | HE Len | | |
| 15 | Bridging | | | | | | | | | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | 0 | 0 | 0 | 0 | 0 | 0 | 0 | 0 | BEtag | | | | | | | |
| 25 | SIP Length | | | | | | | | | | | | | | | |
| 26 | PL Len. | | | | | | lf | | (CRC) | | | | | | | |

FIG. 591

HMH08 INPUT CELL (FROM GW)
INTER-MH BOM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | ST | | DM | DC | | | MCHPO | | | MADRO | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 1 | 0 | SN | | | | INPUT MID | | | | | | | | | |
| 04 | 0 | 0 | 0 | 0 | 0 | 0 | 0 | 0 | ISSIP BEtag | | | | | | | |
| 05 | SIP BAsize | | | | | | | | | | | | | | | |
| 06 | ISSIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | Service type | | | | | | | | | | | | | | | |
| 15 | | | | | | | | | | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Ingress Interface Type | | | | | | | | ES | Hop Count Ind | | | | | | |
| 23 | Carrier | | | | | | | | | | | | | | | |
| 24 | Incominng Network ID | | | | | | | | | | | | | | | |
| 25 | Incoming ICI Transmission Path Set | | | | | | | | | | | | | | | |
| 26 | PL Len. | | | | | | If | | | | | | (CRC) | | | |

VALID ONLY WHEN INPUT INTERFACE TO SS OF HOME SYSTEM IS ISSI AND IF BIT INDICATES 0

FIG. 594

INTER-MH SSM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | ST | | DM | DC | | | MCHPO | | | MADRO | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 1 | 1 | SN | | | | INPUT MID | | | | | | | | | |
| 04 | Unknown | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 595

SIP SSM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | ST | | DC | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 0 | 1 | SN | | | | INPUT MID | | | | | | | | | |
| 04 | 0 | 0 | 0 | 0 | 0 | 0 | 0 | 0 | SIP BEtag | | | | | | | |
| 05 | SIP BAsize | | | | | | | | | | | | | | | |
| 06 | SIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | High Layer Protocol | | | | | | Pad l | | QOS | | | | CI | HE Len | | |
| 15 | Bridging | | | | | | | | | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | 0 | 0 | 0 | 0 | 0 | 0 | 0 | 0 | BEtag | | | | | | | |
| 25 | SIP Length | | | | | | | | | | | | | | | |
| 26 | PL Len. | | | | | | If | (CRC) | | | | | | | | |

FIG. 597

SIP COM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | ST | | DC | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI (SOURCE MH ID) | | | | | | | | PT | | | CLP |
| 03 | 0 | 0 | SN | | | | INPUT MID | | | | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | If | (CRC) | | | | | | | | |

FIG. 598

SIP EOM(Inter-MH EOM) CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | ST | | DC | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | INPUT VCI(SOURCE MH ID) | | | | | | | | PT | | | CLP |
| 03 | 0 | 1 | SN | | | | INPUT MID | | | | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 2N | Reserved | | | | | | | | BEtag | | | | | | | |
| 2N+1 | Length(SIP) | | | | | | | | | | | | | | | |
| 2N+2 | 0 | 0 | 0 | 0 | 0 | 0 | 0 | 0 | 0 | 0 | 0 | 0 | 0 | 0 | 0 | 0 |
| | | | | | | | | | | | | | | | | |
| 25 | 0 | 0 | 0 | 0 | 0 | 0 | 0 | 0 | 0 | 0 | 0 | 0 | 0 | 0 | 0 | 0 |
| 26 | PL Len. | | | | | | If | | (CRC) | | | | | | | |

FIG. 599

DATA INTERFACE BETWEEN OGLP AND LPCOM

*VALID ONLY WHEN INPUT INTERFACE TO SS OF HOME SYSTEM IS ISSI AND IF BIT IS 0.

HMH10 OUTPUT CELL (ICI)

INTER-MH BOM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 1 | 0 | Link ID | | | PT | | | CLP |
| 03 | 1 | 0 | SN | | | | 0 | 0 | 0 | MID | | | | | | |
| 04 | 0 | 0 | 0 | 0 | 0 | 0 | 0 | 0 | ICIP BEtag | | | | | | | |
| 05 | ICI BA size | | | | | | | | | | | | | | | |
| 06 | ICIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | Protocol ID | | | | | | Pad l | | QOS | | | | CI | HE Len | | |
| 15 | Bridging | | | | | | | | | | | | | | | |
| 16 | | | | | | | | | | | | | | | | |
| 17 | | | | | | | | | | | | | | | | |
| 18 | Header Extension | | | | | | | | | | | | | | | |
| 19 | | | | | | | | | | | | | | | | |
| 20 | | | | | | | | | | | | | | | | |
| 21 | | | | | | | | | | | | | | | | |
| 22 | ICIP Version | | | | | | | | Carrier | | | | | | | |
| .23 | | | | | | | | | ES | Reserved | | | | | | |
| 24 | Reserved | | | | | | | | | | | | | | | |
| 25 | | | | | | | | | | | | | | | | |
| 26 | PL Len | | | | | | CRC | | | | | | | | | |

FIG. 619

SIP SSM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 1 | 0 | Link ID | | | PT | | | CLP |
| 03 | 0 | 1 | SN | | | | 0 | 0 | 0 | MID | | | | | | |
| 04 | 0 | 0 | 0 | 0 | 0 | 0 | 0 | 0 | SIP BEtag | | | | | | | |
| 05 | SIP BAsize | | | | | | | | | | | | | | | |
| 06 | SIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | High Layer Protocol | | | | | | Pad l | | QOS | | | | CI | HE Len | | |
| 15 | Bridging | | | | | | | | | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | 0 | 0 | 0 | 0 | 0 | 0 | 0 | 0 | SIP BEtag | | | | | | | |
| 25 | SIP Length | | | | | | | | | | | | | | | |
| 26 | PL Len. | | | | | | CRC | | | | | | | | | |

FIG. 621

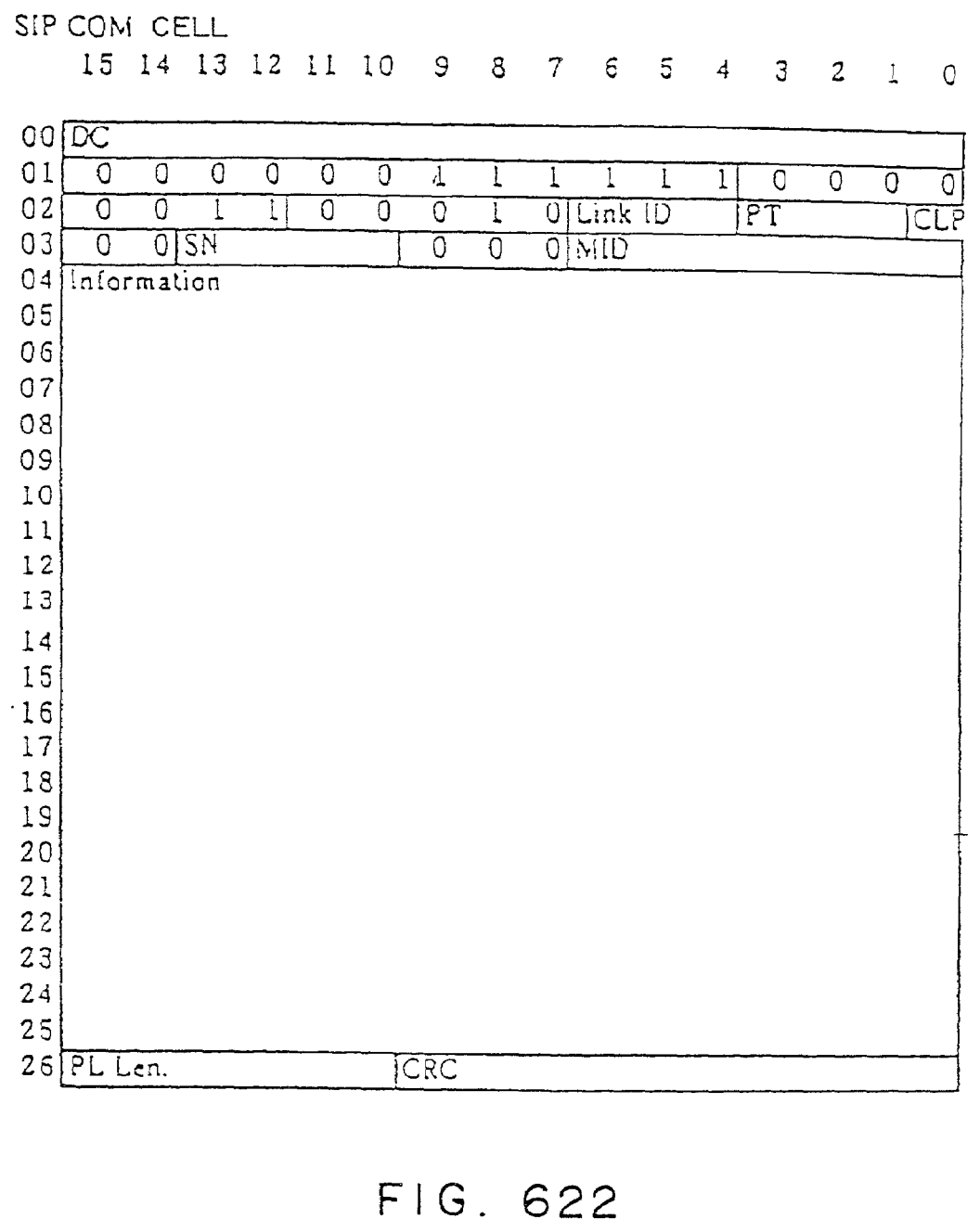

SIP COM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 1 | 0 | Link ID | | | PT | | | CLP |
| 03 | 0 | 0 | SN | | | | 0 | 0 | 0 | MID | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 622

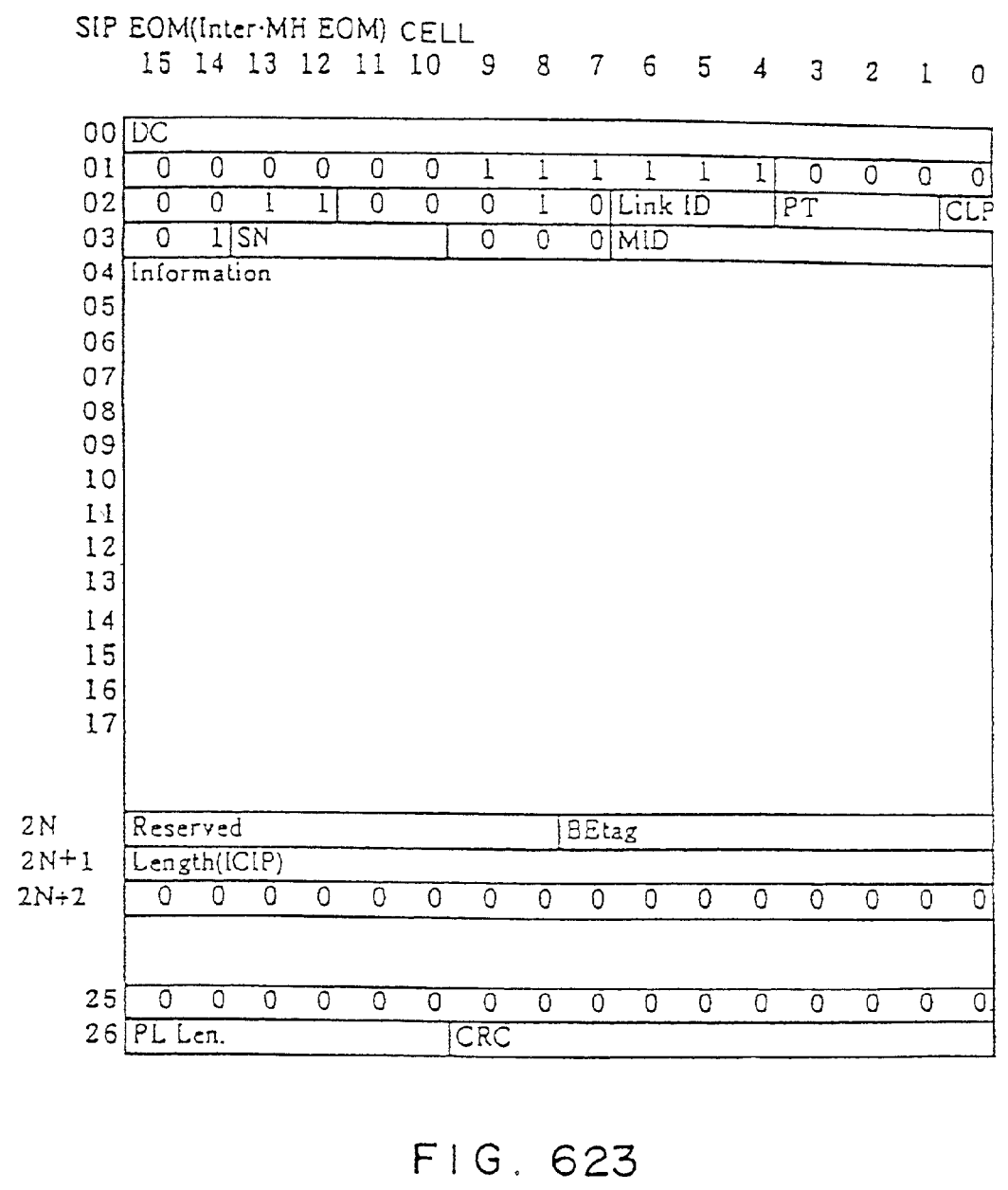

SIP EOM(Inter·MH EOM) CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 1 | 0 | Link ID | | | PT | | | CLP |
| 03 | 0 | 1 | SN | | | | 0 | 0 | 0 | MID | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 2N | Reserved | | | | | | | | BEtag | | | | | | | |
| 2N+1 | Length(ICIP) | | | | | | | | | | | | | | | |
| 2N÷2 | 0 | 0 | 0 | 0 | 0 | 0 | 0 | 0 | 0 | 0 | 0 | 0 | 0 | 0 | 0 | 0 |
| | | | | | | | | | | | | | | | | |
| 25 | 0 | 0 | 0 | 0 | 0 | 0 | 0 | 0 | 0 | 0 | 0 | 0 | 0 | 0 | 0 | 0 |
| 26 | PL Len. | | | | | | CRC | | | | | | | | | |

FIG. 623

HMH10 OUTPUT CELL (ISSI)

ISSI-MH BOM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 0 | 0 | Link ID | | | PT | | | CLP |
| 03 | 1 | 0 | SN | | | | 0 | 0 | 0 | MID | | | | | | |
| 04 | 0 | 0 | 0 | 0 | 0 | 0 | 0 | 0 | ISSIP BEtag | | | | | | | |
| 05 | ISSI BA size | | | | | | | | | | | | | | | |
| 06 | ISSIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | Service type | | | | | | Pad 1 | | Priority | | | | CI | HE Len | | |
| 15 | Protocol Version | | | | | | | | Protool Discriminator | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Ingress Int.Type | | | | | | | | Carrier | | | | | | | |
| 23 | | | | | | | | | ES | Hop Count Ind | | | | | | |
| 24 | Incoming Network ID | | | | | | | | | | | | | | | |
| 25 | Incoming ICI TPS ID | | | | | | | | | | | | | | | |
| 26 | PL Len. | | | | | | CRC | | | | | | | | | |

FIG. 624

SIP BOM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0/ | 0 | 0 | 0 | 0 | Link ID | | | PT | | | CLP |
| 03 | 0 | 0 | SN | | | | 0 | 0 | 0 | MID | | | | | | |
| 04 | 0 | 0 | 0 | 0 | 0 | 0 | 0 | 0 | SIP BEtag | | | | | | | |
| 05 | SIP BAsize | | | | | | | | | | | | | | | |
| 06 | SIP DA | | | | | | | | | | | | | | | |
| 07 | | | | | | | | | | | | | | | | |
| 08 | | | | | | | | | | | | | | | | |
| 09 | | | | | | | | | | | | | | | | |
| 10 | SA | | | | | | | | | | | | | | | |
| 11 | | | | | | | | | | | | | | | | |
| 12 | | | | | | | | | | | | | | | | |
| 13 | | | | | | | | | | | | | | | | |
| 14 | High Layer Protocol | | | | | | Pad l | | QOS | | | | CI | HE Len | | |
| 15 | Bridging | | | | | | | | | | | | | | | |
| 16 | Header Extension | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | Information | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 625

SIP COM CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 0 | 0 | Link ID | | | PT | | | CLP |
| 03 | 0 | 0 | SN | | | | 0 | 0 | 0 | MID | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |
| 20 | | | | | | | | | | | | | | | | |
| 21 | | | | | | | | | | | | | | | | |
| 22 | | | | | | | | | | | | | | | | |
| 23 | | | | | | | | | | | | | | | | |
| 24 | | | | | | | | | | | | | | | | |
| 25 | | | | | | | | | | | | | | | | |
| 26 | PL Len. | | | | | | CRC | | | | | | | | | |

FIG. 627

SIP EOM(Inter-MH EOM) CELL

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 00 | DC | | | | | | | | | | | | | | | |
| 01 | 0 | 0 | 0 | 0 | 0 | 0 | 1 | 1 | 1 | 1 | 1 | 1 | 0 | 0 | 0 | 0 |
| 02 | 0 | 0 | 1 | 1 | 0 | 0 | 0 | 0 | 0 | Link ID | | | PT | | | CLP |
| 03 | 0 | 1 | SN | | | | 0 | 0 | 0 | MID | | | | | | |
| 04 | Information | | | | | | | | | | | | | | | |
| 05 | | | | | | | | | | | | | | | | |
| 06 | | | | | | | | | | | | | | | | |
| 07 | | | | | | | | | | | | | | | | |
| 08 | | | | | | | | | | | | | | | | |
| 09 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 2N | Reserved | | | | | | | | BEtag | | | | | | | |
| 2N+1 | Length(ISSIP) | | | | | | | | | | | | | | | |
| 2N+2 | 0 | 0 | 0 | 0 | 0 | 0 | 0 | 0 | 0 | 0 | 0 | 0 | 0 | 0 | 0 | 0 |
| | | | | | | | | | | | | | | | | |
| 25 | 0 | 0 | 0 | 0 | 0 | 0 | 0 | 0 | 0 | 0 | 0 | 0 | 0 | 0 | 0 | 0 |
| 26 | PL Len. | | | | | | CRC | | | | | | | | | |

FIG. 628

① DETERMINING WHETHER OR NOT SS IN HOME SYSTEM "GAA" ACCORDING TO GAA LIST.

| | GAA (64 bit) | GA ID (10 bit) |
|---|---|---|
| 1024 (W) | | |

② COPYING WHILE ASSIGNING GA-SUPPORTED IA, ISSI/ICI No., GA MEMBER ID, AND FLAG FOR OUTSIDE OF LATA.

| | GA ID (10bit) |
|---|---|
| 1024 (W) | |

⇨ ⋮ ⇨

| IA (64 bit) | ISSI/ICI No. (3 bit) | GA MEMBER ID (6 bit) | OUTSIDE LATA (1 bit) |
|---|---|---|---|
| | | | |

③ ASSIGNING CARRIER BY REFERRING TO TABLE BELOW WHEN OUTSIDE-OF-LATA FLAG IS SET AFTER VOPYING GA.

| | SMDS CIC(16 bit) | ISSI/ICI No. (3bit) |
|---|---|---|
| 256 (W) | | |

④ DETERMINING WHETHER OR NOT SPECIFIED LINK IS SUPPORTED BY MESH OF HOME SYSTEM ACCORDING TO TABLE BELOW.

| | ISSI/ICI No. (3 bit) | GA MEMBER ID (6 bit) | LINK (3 bit) |
|---|---|---|---|
| 256 (W) | | | |

FIG. 631

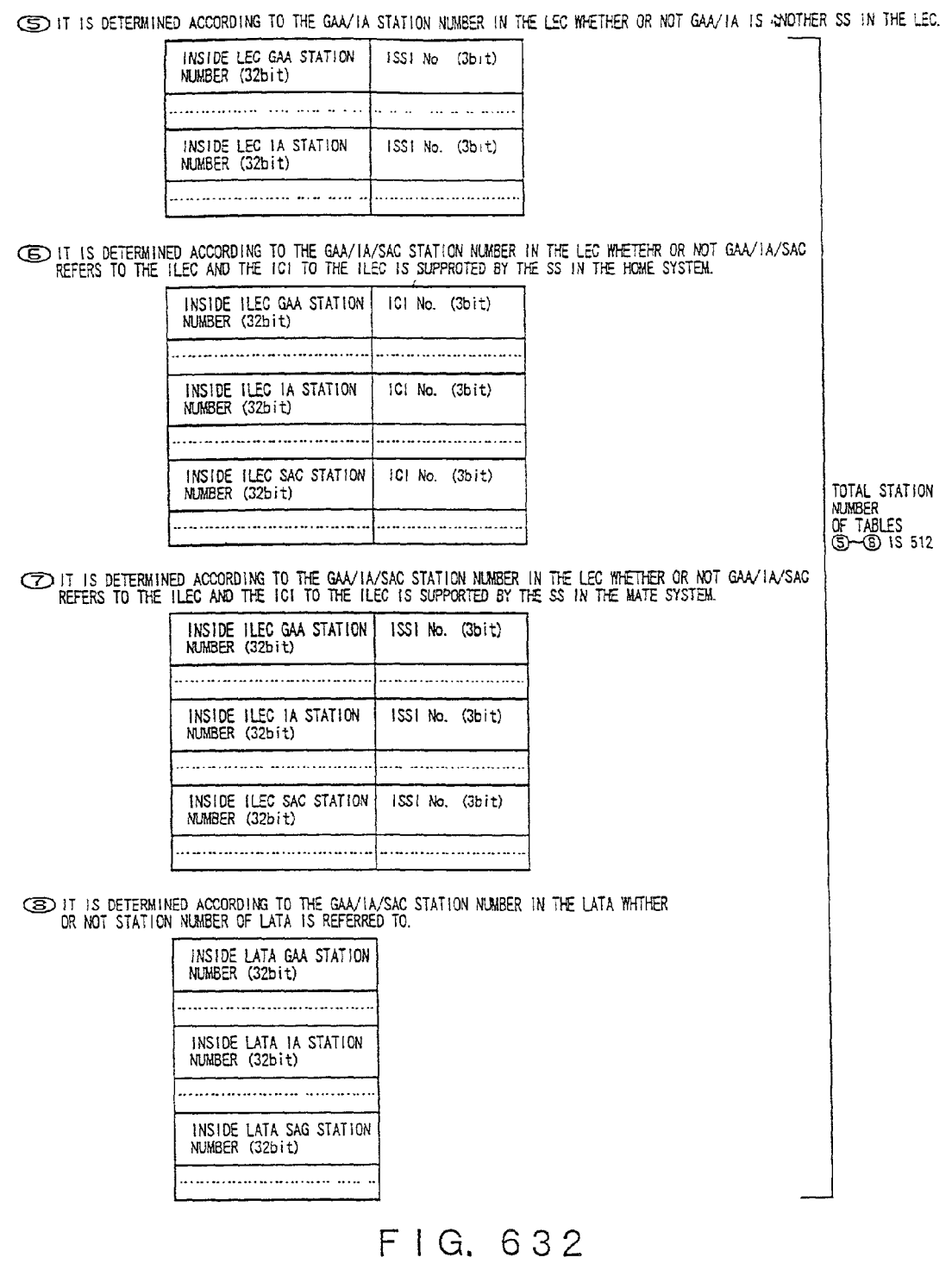

⑤ IT IS DETERMINED ACCORDING TO THE GAA/IA STATION NUMBER IN THE LEC WHETHER OR NOT GAA/IA IS ANOTHER SS IN THE LEC.

| | |
|---|---|
| INSIDE LEC GAA STATION NUMBER (32bit) | ISSI No (3bit) |
| ...... | ...... |
| INSIDE LEC IA STATION NUMBER (32bit) | ISSI No. (3bit) |
| ...... | ...... |

⑥ IT IS DETERMINED ACCORDING TO THE GAA/IA/SAC STATION NUMBER IN THE LEC WHETEHR OR NOT GAA/IA/SAC REFERS TO THE ILEC AND THE ICI TO THE ILEC IS SUPPROTED BY THE SS IN THE HOME SYSTEM.

| | |
|---|---|
| INSIDE ILEC GAA STATION NUMBER (32bit) | ICI No. (3bit) |
| ...... | ...... |
| INSIDE ILEC IA STATION NUMBER (32bit) | ICI No. (3bit) |
| ...... | ...... |
| INSIDE ILEC SAC STATION NUMBER (32bit) | ICI No. (3bit) |
| ...... | ...... |

⑦ IT IS DETERMINED ACCORDING TO THE GAA/IA/SAC STATION NUMBER IN THE LEC WHETHER OR NOT GAA/IA/SAC REFERS TO THE ILEC AND THE ICI TO THE ILEC IS SUPPORTED BY THE SS IN THE MATE SYSTEM.

| | |
|---|---|
| INSIDE ILEC GAA STATION NUMBER (32bit) | ISSI No. (3bit) |
| ...... | ...... |
| INSIDE ILEC IA STATION NUMBER (32bit) | ISSI No. (3bit) |
| ...... | ...... |
| INSIDE ILEC SAC STATION NUMBER (32bit) | ISSI No. (3bit) |
| ...... | ...... |

⑧ IT IS DETERMINED ACCORDING TO THE GAA/IA/SAC STATION NUMBER IN THE LATA WHTHER OR NOT STATION NUMBER OF LATA IS REFERRED TO.

| |
|---|
| INSIDE LATA GAA STATION NUMBER (32bit) |
| ...... |
| INSIDE LATA IA STATION NUMBER (32bit) |
| ...... |
| INSIDE LATA SAG STATION NUMBER (32bit) |
| ...... |

TOTAL STATION NUMBER OF TABLES ⑤~⑧ IS 512

FIG. 632

(9) IT IS DETERMINED WHETHER OR NOT ICI FROM SMDS CIC TO IC IS SUPPORTED BY SS OF HOME SYSTEM.

| SMDS CIC (16BIT) | ICI No. (3 BIT) |
|---|---|
| | |

(10) IT IS DETERMINED WHETHER OR NOT ICI FROM SMDS CIC TO IC IS SUPPORTED BY SS OF MATE SYSTEM.

| SMDS CIC (16BIT) | ISSI No. (3 BIT) |
|---|---|
| | |

A TOTAL OF 256 CARRIERS ARE SPECIFIED FOR (12) AND (13)

FIG. 633

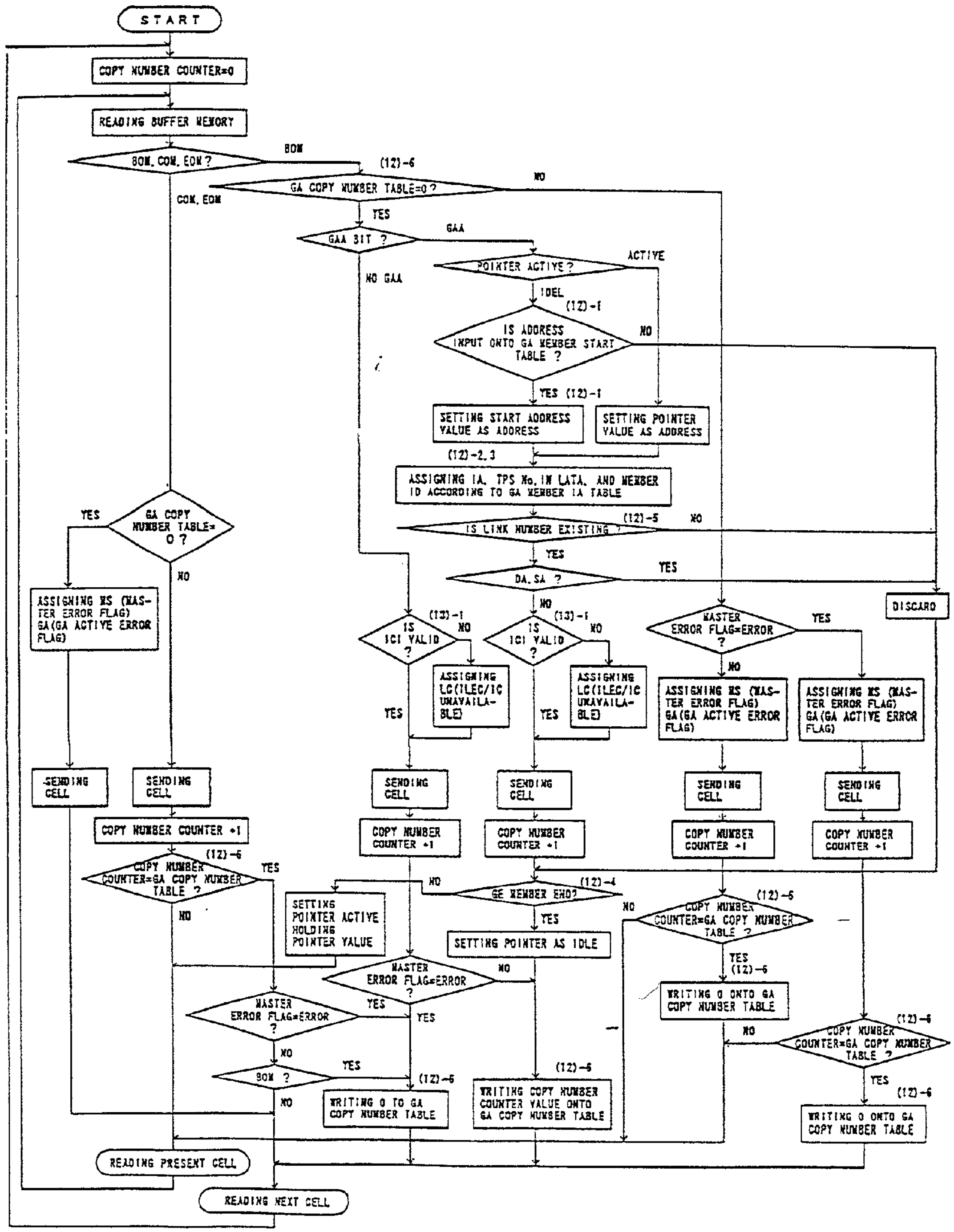
F I G. 645

| ITEM | FUNCTION | REMARKS |
|---|---|---|
| 1 | PARITY CHECK | PERFORMING PARITY CHECK ON DATA AND ENABLE. |
| 2 | MRI TIMEOUT | DETERMINING MRI TIMEOUT OF MESSAGE |
| 3 | MID CONVERSION | CONVERTING INPUT MID TO VCI AND MID OF OUTPUT LINK |
| 4 | CELL DELAY | TIME DELAY REQUIRED FOR TIMEOUT PROCESS AND MID CONVERSION PROCESS. |
| 5 | ERROR CELL DISCARD | RECEIVING ERROR FLAG AND DISCARDING CELL. |
| 6 | OUTPUT BAND LIMIT | LIMITING OUTPUT BAND BASED ON LIMITED BAND. |
| 7 | FORMAT CONVERSION | CONVERTING CELL FORMAT INTO ISSI OR ICI FORMAT. |
| 8 | GENERATING AND ASSIGNING CRC-10 | PERFORMING CRC-10 OPERATION ON PAYLOAD EXCLUDING HEADER AND ASSIGNING OPERATION RESULT. |
| 9 | DISCARD COUNTER | RECEIVING DISCARDED CELLS FROM HMH08A, HMH09A, AND VC-SH II, COUNTING THEM, AND PASSING THEM TO LP-COM. |
| 10 | C/R UNIT | RECEIVING COMMANDS FROM HLP07A BY SCTL2 LSI, AND RETURNING RESPONSE. |
| 11 | MSCN, MSD UNIT | RECEIVING VARIOUS CONTROL SIGNALS AND DATA FROM μP UNIT AND CONTROLLING INTERNAL UNITS. |
| 12 | CLK Gen. | GENERATING 9.72 MHz CLOCK FROM 19.44 MHz CLOCK AND FRAME PULSE. |

FIG. 647

GROUPING INTO VC-SH BLOCKS (IN PKG)
0 : INPUT DATA AND OUTPUT DATA
1 : CELL MEMORY ADDRESS, /WE, /OE
2~4 : CELL MEMORY DATA AND ERROR FLAG
5 : ADDRESS AREA MEMORY
6 : READ ORDER MEMORY AND READ ENTRY MEMORY
7 : SCNT 2 DATA AND CONTROL

8 : PARITY CHECK, RESET, CONTROL
9 : SCAN PIN, TEST MONITOR OUTPUT (NOT SHOWN IN BLOCK DIAGRAM ABOVE)

1. COMMON PROCESS (INDEPENDENT OF BOM, COM, OR EOM)

① TEST CELL WHEN CELL 01 WORD b15 (INPUT VCI HIGHER ORDER BIT) IS 1, GW CELL WHEN b14 IS 1, AND SB CELL WHEN b14 IS 0.
② WRITING 03F0(H) TO CELL 01 WORD
③ WRITING 0011(b) TO CELL 02 WORD b15-12.
④ ASSIGNING CELL 02 WORD b6-4 (LINK ID) AS ADDRESS OF EXTERNAL RAM. WHEN b7 (TYPE BIT) OF READ DATA IS 1, ICI CELL IS ASSUMED AND 1(b) IS WRITTEN TO CELL 02 WORD b8. b8 IS NOT REWRITTEN WHEN b7 OF READ DATA IS 0.

2. IDENTIFYING SEGMENT TYPE

① BOM WHEN CELL 03 WORD b15-14 IS 10, COM WHEN 00, AND EOM WHEN 01. WHEN 11, PROCESS FOR BOM IS PERFORMED. (WHEN b15 IS 1, PROCESS FOR BOM IS PERFORMED.)

3. WHEN CELL IS BOM OF ICI

① WRITING 0000000(b) IS WRITTEN TO CELL 14 WORD b9-3.
② WHEN CELL 14 WORD b15-10 (PROTOCOL ID) IS 48 (DEC) OR 60 (DEC) AND IT IS TEST CELL OR GW CELL, PROCESS TERMINATES.
③ IF ② ABOVE IS NOT SATISFIED, IT IS USER CELL AND READ DATA b5-b0 IN 1-④ ABOVE IS WRITTEN TO 14 WORD b15-10 (PROTOCOL ID).
④ CELL 22 WORD AND 23 WORD ARE REWRITTEN AS FOLLOWS.

BEFORE PROCESS

| | b15 ~ b8 | b7 ~ b0 |
|---|---|---|
| CELL 22 | ICIP VERSION | B |
| CELL 23 | C | D |

⇨

AFTER PROCESS

| | b15 ~ b8 | b7 ~ b0 |
|---|---|---|
| CELL 22 | 00000011(b) | C |
| CELL 23 | D | IN B b7 UNCHANGED AND FOLLOWED BY ALL 0000000 FOR b6 ~b0 |

⑤ 0 IS WRITTEN TO ALL BITS OF CELL 24 WORD AND 25 WORD.

4. WHEN CELL IS BOM OF ISSI

① WHEN CELL 14 WORD b15-10 (SERVICE TYPE) IS 48 (DEC) OR 60 (DEC) AND IT IS TEST CELL OR GW CELL, 00000001(b) IS WRITTEN TO CELL 15 WORD AND b15-8.
② IF ① ABOVE IS NOT SATISFIED, IT IS USER CELL AND READ DATA b5-b0 IN 1-④ ABOVE IS WRITTEN TO 14 WORD b15-10 (SERVICE TYPE), AND 0001000(b) IS WRITTEN TO CELL 14 WORD b9-3.
③ WRITING 0000001(b) IS WRITTEN TO CELL 15 WORD b7-0 (PROTOCOL DISCRIMINATOR).
④ CELL 22 WORD AND 23 WORD ARE REWRITTEN AS FOLLOWS.

BEFORE PROCESS

| | b15 ~ b8 | b7 ~ b0 |
|---|---|---|
| CELL 22 | A | B |
| CELL 23 | C | D |

⇨

AFTER PROCESS

| | b15 ~ b8 | b7 ~ b0 |
|---|---|---|
| CELL 22 | A | C |
| CELL 23 | D | B |

FIG. 656

※ ⊂⊃ · · · INDICATES REASSIGNMENT POINT OF CLOCK

▯ · · · LSI HAVING INTERFACE WITH μP

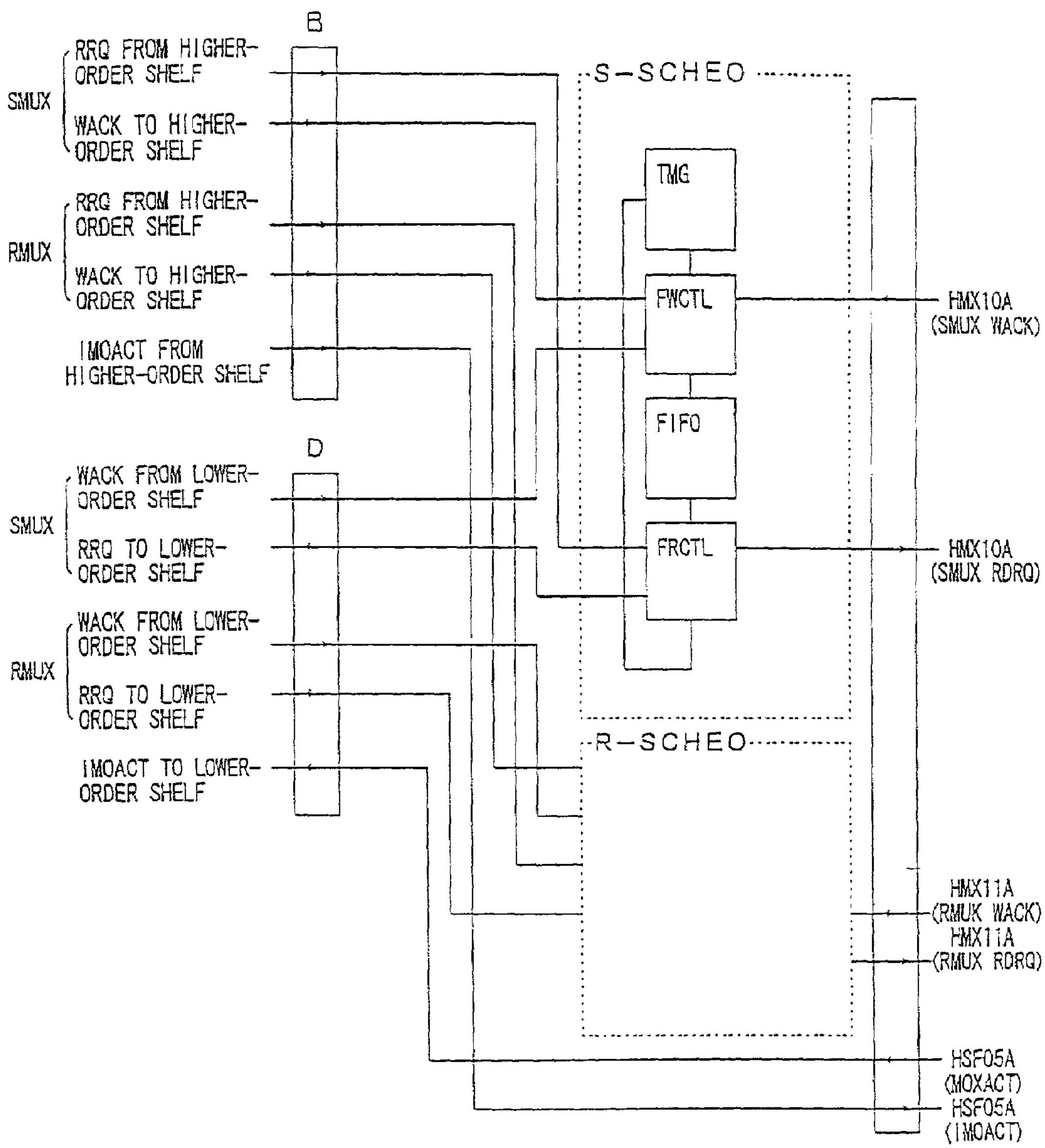
F I G. 663

| BLOCK | | FUNCTIONS |
|---|---|---|
| MAIN CONTROL UNIT | MPU | 16BIT MICROPROCESSOR (80C186-10) |
| | RAM | FOR FIRMWARE WORK 128K ×16BIT SRAM |
| | ROM | FOR STORING FIRMWARE 64K×16BIT EPROM |
| | OCS | 16MHz OSCILLATOR |
| REGISTER GROUP | MSCN & MSD | MSCN:AREA THROUGH WHICH NG OF EACH CHECK (REFER TO LIST IN FIGURE 6.1.2) IS REPORTED TO HLP07A |
| | | MSD: AREA THROUGH WHICH PSEUDO FAULT IS SET FROM HLP07A |
| | 2PORT COMMUNICATIONS | ACTIVATING/RELEASING INTERRUPTION MADE DURING COMMUNICATIONS TO HLP07A |
| | LP-COM IMPLEMENTATION | INDICATING IMPLEMENTATION OF LP-COM AND OTHER PWCB (HLP07A AND HLM02A). |
| | RS232C INF | INTERFACE WITH WORK STATION FOR DEBUGGING |
| | LOCAL-INHIBIT | INITIALIZE INSTRUCTION FOR PM/TM COUNT VALUE STORING RAM |
| | RAM PHASE REASSIGNMENT | HARDWARE ACCESS PHASE INSTRUCTION FOR PM/TM COUNT VALUE STORING TWO PHASE CONSTRUCTION RAM |
| | LACAL-RESET | INTERNAL RESET |
| CLK GENERATION | | GENERATING 9MCLK USING 19MCLK AND 19MFP FROM HLP07A |
| OBP | | CONVERTING ON BOARD POWER 048V INTO +5V |

FIG. 667

| BLOCK | | FUNCTION |
|---|---|---|
| INCOMING | | COUNTING L2/3 SUM OF ERROR, L2/3 INDIVIDUAL ERROR. NETWORK DATA COLLECTION AT INCOMING TERMINAL. |
| | TIMING GENERATION | GENERTING EACH TIMING ACCORDING TO 9MFLK, CELL-FRAME (CF), AND ENABLE (EN) SIGNAL. |
| | ICI/ISSI, ST SA/DA, MID IDENTIFICATION | IDENTIFYING SOURCE ICI/ISSI, SEGMENT TYPE, SA/DA, AND MID FROM CELL DATA. |
| | ERR. ANALYSIS | ANALYZING ERROR TYPE ACCORDING TO ERROR FLAG (EF). |
| | INCOMING LOG-REG. | AREA THROUGH WHICH ERROR TYPE, SOURCE ICI/ISSI, SA, AND DA ARE REPORTED TO FIRMWARE WHEN LOG OBJECT ERROR HAS OCCURRED |
| | SA/DA ACCUMULATION RAM | RAM ACCUMULATING SA AND DA TO COLLECT LOG. |
| | THRESHOLD RAM | SETTING THRESHOLD OF L2/3 SUM OF ERROR AT INITIALIZATION. |
| | L2/3 SUM OF ERR. COUNT VALUE D. P. RAM | DUAL PORT RAM STORING COUNT VALUE OF L2/3 SUM OF EEROR. |
| | ERR. FLAG-REG. | AREA THROUGH WHECH SUM OF ERROR VALUE EXCEEDING THRESHOLD IS REPORTED TO FIRMWARE. |
| | L2/3 INDIVIDUAL ERR. D. P. RAM | DUAL PORT RAM STORING COUNT VALUE OF L2/3 INDIVIDUAL ERROR. |
| | NDC COUNT VALUE D. P. RAM | DUAL PORT RAM STORING COUNT VALUE RELATED TO NETWORK DATA COLLECTION |
| OUTGOING | | COUNTING L2/3 INDIVIDUAL ERROR, NETWORK DATA COLLECTION, AND BILLING PROCESSES AT OUTGOING TERMINAL. |
| | TIMING GENERATION | GENERATING EACH TIMING ACCORDING TO 9MCLK, CELL-FRAME (CF), AND ENABLE (EN) SIGNAL. |
| | ICI/ISSI, MH ST, SA/DA, MID IDENTIFICATION | IDENTIFYING DESTINATION ICI/ISSI, DESTINATION MH, SEGMENT TYPE, SA/DA, AND MID ACCORDING TO CELL DATA. |
| | ERR. ANALYSIS | ANALYZING ERROR TYPE ACCORDING TO ERROR FLAG (EF) SIGNAL |
| | OUTGOING LOG-REG. | AREA THROUGH WHICH ERROR TYPE, DESTINATION ICI/ISSI, SA, AND DA ARE REPORTED TO FIRMWARE WHEN LOG OBJECT ERROR HAS OCCURRED |
| | L2/3 INDIVIDUAL ERR. D. P. RAM | DUAL PORT RAM STORING COUNT VALUE OF L2/3 INDIVIDUAL ERROR. |
| | NDC COUNT VALUE D. P. RAM | DUAL PORT RAM STORING COUNT VALUE RELATED TO NETWORK DATA COLLECTION. |
| | BILLING COUNT VALUE D. P. RAM | DUAL PORT RAM STORING COUNT VALUES RELATED TO BILLING OPERATIONS. |

FIG. 668

| CHECK NAME | CHECK OBJECT |
|---|---|
| CLKa | 19M CLOCK FROM HLP07A, AND DISCONNECTION OF FRAME PULSE |
| CLKb | 19M CLOCK GENERATED INTERNALLY, AND DISCONNECTION OF CELL FRAME FROM INCOMING LP |
| CLKc | 19M CLOCK GENERATED INTERNALLY, AND DISCONNECTION OF ERROR FLAG 2 FROM INCOMING LP |
| CLKd | 19M CLOCK GENERATED INTERNALLY, AND DISCONNECTION OF CELL FRAME FROM OUTGOING LP |
| CLKe | 19M CLOCK GENERATED INTERNALLY, AND DISCONNECTION OF ERROR FLAG 2 FROM OUTGOING LP |
| CLKf | 19M CLOCK GENERATED INTERNALLY, AND DISCONNECTION OF CELL FRAME FRAME FROM OUTGOING LP |
| WDTI | TIME OUT OF WATCHDOG TIMER, AND DISCONNECTION MPU OUTPUT 8M CLOCK |
| PCa | DATA FROM INCOMING LP, PARITY CHECK OF ENABLE |
| PCb | DATA FROM OUTGOING LP, PARITY CHECK OF ENABLE |
| PCc | DATA FROM OUTGOING LP, PARITY CHECK OF ENABLE |
| PCd | PARITY CHECK OF SA/DA ACCUMULATION RAM |
| PCf | PARITY CHECK OF THRESHOLD RAM |
| PCg | PARITY CHECK OF L2/3 SUM F ERR. COUNT VALUE D.P.RAM |
| PCh | PARITY CHECK IF INCOMING L2/3 INDIVIDUAL ERR. COUNT VALUE D.P.RAM |
| PCi | PARITY CHECK OF INCOMING NDC COUNT VALUE D.P.RAM |
| PCj | PARITY CHECK OF OUTGOING L2/3 INDIVIDUAL ERR. COUNT VALUE D.P.RAM |
| PCk | PARITY CHECK OF OUTGOING NDC COUNT VALUE D.P.RAM |
| PCl | PARITY CHECK OF BILLING COUNT VALUE D.P.RAM |

FIG. 669

| CHECK NAME | CHECK CONDITIONS |
|---|---|
| PCd | NOTIFICATION OF LOG-REQUIRED ERROR FROM INCOMING LP |
| PCf | NOTIFICATION OF ERROR RELATED TO L2/3 SUM OF ERROR FROM INCOMING LP |
| PCg | NOTIFICATION OF ERROR RELATED TO L2/3 SUM OF ERROR FROM INCOMING LP |
| PCh | NOTIFICATION OF L2/3 INDIVIDUAL COUNT ERROR FROM INCOMING LP |
| PCi | NOTIFICATION OF NDC INDIVIDUAL COUNT ERROR FROM INCOMING LP |
| PCj | NOTIFICATION OF L2/3 INDIVIDUAL COUNT ERROR FROM OUTGOING LP |

FIG. 670

| GROUP | ITEM | LEVEL | CHECK | No | ERROR GENERATING CELL | ACTION |
|---|---|---|---|---|---|---|
| A | 1 | L2 | MRI. TIME OUT | 2 | EOM (PSEUDO EOM) | COUNT |
| B | 1 | L2 | INVALID PAYLOAD CRC CODE | 3 | BOM, COM, EOM | DISCARD COUNT |
| C | 1 | L2 | PAYLOAD LENGTH REEOR | 4 | BOM, COM, EOM | DISCARD COUNT |
| D | 1 | L2 | BOM WITH UNEXPECTED MID | 5 | BOM | COUNT |
| | 2 | L2 | EOM WITH UNEXPECTED MID | 5 | EOM | DISCARD COUNT |
| E | 1 | L2 | UNEXPECTED SN ERROR | 6 | COM, EOM | DISCARD COUNT |
| F | 1 | L3 | INVALID BASIZE FIELD VALUE | 7 | BOM | DISCARD COUNT |
| | 2 | L3 | INVALID DA TYPE | 8 | BOM | DISCARD COUNT |
| | 3 | L3 | INVALID SA TYPE | 9 | BOM | DISCARD COUNT |
| | 4 | L3 | INVALID SERVICE TYPE (ISSI) | 11 | BOM | DISCARD COUNT LOG |
| | 5 | L3 | INVALID PROTOCOL ID (ICI) | 11 | BOM | DISCARD COUNT LOG |
| | 6 | L3 | INVALID PROTOCOL DESCRIMINATOR | 13 | BOM | DISCARD COUNT LOG |
| | 7 | L3 | HOP COUNT = 0 | 15 | BOM | DISCARD COUNT LOG |
| | 8 | L3 | INVALID INGRESS INTERFACE TYPE | 16 | BOM | DISCARD COUNT LOG |
| | 9 | L3 | BETAG MISMATCH | 18 | EOM | DISCARD COUNT |
| G | 1 | UNIQUE | MID ASSIGNED ERROR | 20 | BOM | DISCARD COUNT |
| | 2 | UNIQUE | EXCEED MAXIMUM NUMBER OF CDU | 21 | BOM | DISCARD COUNT |
| | 3 | UNIQUE | ROUTING ERROR | 22 | BOM | DISCARD COUNT |
| | 4 | UNIQUE | BASIZE ≠ LENGTH | 23 | EOM | DISCARD COUNT |
| | 5 | UNIQUE | ENCAPSULATION ERROR | 24 | SSM | DISCARD COUNT |

FIG. 671

| SIGNAL NAME | POLARITY | EXPLANATION |
|---|---|---|
| 9M CLOCK | — | ALL SIGNALS STARTING WITH REFERENCE CLOCK ARE CHANGED AT RISE OF MAIN CLOCK. |
| CELL FRAME | ⇨ | SIGNAL INDICATING BOUNDARY OF CELL. L FOR ONLY LAST 1 $\tau$ OF CELL. |
| ENABLE | ⇨ | SIGNAL INDICATING VALID/INVALID CELL. ALL CELL AREAS ARE L WHEN VALID. |
| ERROR NOTIFI-CATION (2) | ⇨ | SIGNAL INDICATING ERROR TYPE. DETAILED EXPLANATION IS GIVEN LATER AND ERROR IS REPRESENTED BY L. |
| DATA | PLUS | 16 PARALLEL DATA + PARITY. PARITY IS ODD PARITY FOR ALL 17 BITS OF 16 BIT PARALLEL DATA + ENABLE. |

FIG. 673

| | SST | IST |
|---|---|---|
| Inter-BOM | 1 0 | 1 0 |
| SIP-BOM | 1 0 | 0 0 |
| COM | 0 0 | 0 0 |
| EOM | 0 1 | 0 1 |
| SIP-SSM | 1 1 | 0 1 |

FIG. 674

| Group | Item | Level | Check | No. | Error generating cell | Action |
|---|---|---|---|---|---|---|
| A | 1 | L2 | MRI time out | 1 | EOM(Pseudo-EOM) | Count |
| B | 1 | L2 | MID currently active | 4 | BOM | Count |
| | 2 | L2 | EOM with unapproved MID | 4 | EOM | Count of discard |
| C | 1 | L2 | Unexpected SN error | 5 | BOM, COM, EOM | Count of discard |
| D | 1 | L3 | ISSI/ICI Unavailable | 7 | BOM | Count Log of discard |
| E | 1 | Unique | Exceed maximum number of CDU | 8 | BOM | Count of discard |
| | 2 | Unique | Encapsulation Error | 1 | SSM | Count of discard |

FIG. 676

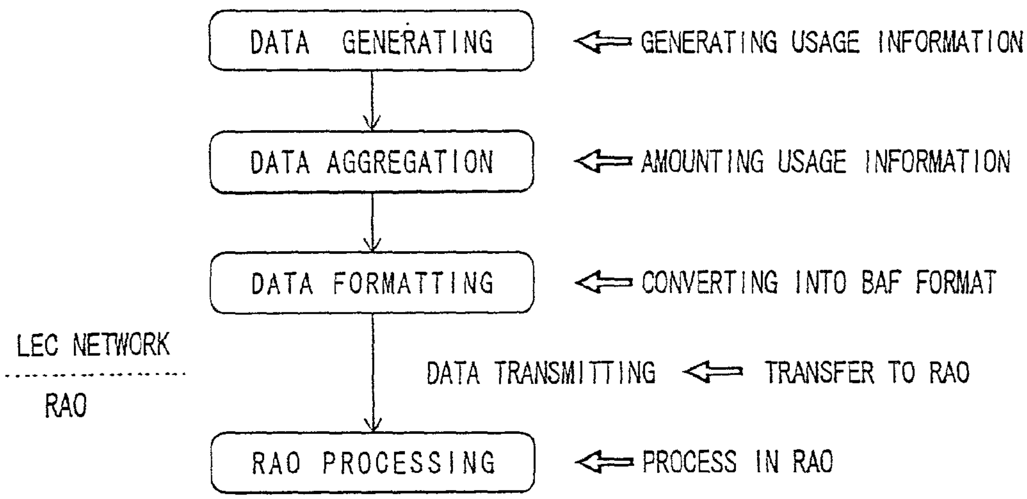
F I G. 6 8 2

| | FIGURE | LEC Network Function | SA | DA | SNI Add | Incoming NW ID | Incoming ICI TPS ID | Outgoing NW ID | Outgoing ICI TPS ID | Carrier ID | Cond Code | Packet Count | Seg. Count | Ingress Inf Type |
|---|---|---|---|---|---|---|---|---|---|---|---|---|---|---|
| INDIVIDUAL ADDRESS DATA TRANSFER | 1 | Orig. XA-SMDS (ICI) | O | O | | * | * | O | O | | O | O | O | O (CIC) |
| | 2 | Source Function for Exchange SMDS (ICI) | O | O | | * | * | O | O | | O | O | O | O (NBCA) |
| | 7 | Term. XA-SMDS (SNI) | O | O | | O | O | | | | O | O | O | O (CIC) |
| | 8 | Dest. Function for Exchange SMDS (SNI) | O | O | | O | O | | | | O | O | O | O (NBCA) |
| GROUP ADDRESS DATA TRANSFER | 1 | Orig. XA-SMDS (ICI) | O | O | O | * | * | O | O | | O | O | O | O |
| | 2 | Source Function for Exchange SMDS and Orig. XA-SMDS (ICI) | O | O | O | * | * | O | O | | O | O | O | O |
| | 3 | Term. XA-SMDS (ICI) | O | O | O | O | O | O | O | | O | O | O | O |
| | 4 | Dest. Function for Exchange SMDS (ICI) | O | O | O | O | O | O | O | | O | O | O | O |
| | 5 | Dest. Function for Orig. XA-SMDS (ICI) | O | O | O | O | O | O | O | | O | O | O | O |
| | 8 | Source Function for Term. XA-SMDS (ICI) | O | O | O | O | O | O | O | | O | O | O | O |
| | 7 | Term. XA-SMDS (SNI) | O | O | O | O | O | | | O | O | O | O | O |
| | 8 | Dest. Function for Exchange SMDS (SNI) | O | O | O | O | O | | | O | O | O | O | O |
| | 9 | Dest. Function for Term. XA-SMDS (SNI) | O | O | O | O | O | | | O | O | O | O | O |

O: REQUIRED. *: SETTING O. NO MARK: NOT REQUIRED.

FIG. 684

IP)+RDA(ICIP)+RSA+RCA

| | |
|---|---|
| 0 | SA 64bit, DA(SIP) 64bit, DA(ICIP) 64bit, CARRIER INFORMATION 37 bit |
| 1 | SA 64bit, DA(SIP) 64bit, DA(ICIP) 64bit, CARRIER INFORMATION 37 bit |
| 2 | SA 64bit, DA(SIP) 64bit, DA(ICIP) 64bit, CARRIER INFORMATION 37 bit |
| ⋮ | ⋮ |
| FFFD | SA 64bit, DA(SIP) 64bit, DA(ICIP) 64bit, CARRIER INFORMATION 37 bit |
| FFFE | SA 64bit, DA(SIP) 64bit, DA(ICIP) 64bit, CARRIER INFORMATION 37 bit |
| FFFF | SA 64bit, DA(SIP) 64bit, DA(ICIP) 64bit, CARRIER INFORMATION 37 bit |

FIG. 685

| BLOCK NAME | FUNCTION |
|---|---|
| 16M | GENERATING 16 MHz CLOCK FOR MICROPROCESSOR |
| MPU | μP (80C186) |
| ROM | STORING FIRMWARE FOR MPU |
| FOR SENDING T-CELL | MEMORY FOR SENDING TEST CELL |
| FOR RECEIVING T-CELL | MEMORY FOR RECEIVING TEST CELL |
| T-CELL LCA | SENDING TEST CELL FOR HMH01A AND 03A, (ASSIGNING ODD PARITY, ADJUSTING TIMING), RECEIVING TEST CELL FROM HMH02A AND 06A, MAKING PARITY CHECK, ETC. |
| SRAM | WORK MEMORY FOR MPU |
| FOR SENDING 2 PORT SRAM MNG →MSR | DATA SENDING MEMORY FOR MSR-FIRMWARE |
| FOR RECEIVING 2 PORT SRAM MNG ←MSR | DATA RECEIVING MEMORY FROM MSR-FIRMWARE |
| FOR SENDING 2 PORT SRAM MNG →ACC | DATA SENDING MEMORY FOR ACC-FIRMWARE |
| FOR RECEIVING 2 PORT SRAM MNG ←ACC | DATA RECEIVING MEMORY FROM ACC-FIRMWARE |
| INF inf | CONTROLLING INTERFACE WITH INF |
| FOR COMMAND MEMORY | SRAM FOR SENDING COMMAND |
| FOR RESPONSE MEMORY | SRAM FOR RECEIVING RESPONSE |
| S-CTL LCA | CONTROLLING COMMAND AND RESPONSE FOR LP UNIT |
| STATE CONTROL | CONTROLLING ACT, INHBIT, ETC.<br>CONTROLLING OCS TO MATE SYSTEM |
| SEL | SELECTING 64 KHz CLOCK RECEIVED FROM MH-COM OF HOME AND MATE SYSTEMS. |
| PLO | SELECTING 155 HMz CLOCK IN SYNCHRONISM WITH 64 MHz CLOCK. |
| TMG | GENERATING 78 MHz AND 19 MHz CLOCKS FROM 155 MHz CLOCK. |

FIG. 688

| BLOCK NAME | FUNCTION |
|---|---|
| CLKb | μP OPERATION 8 M CLOCK DISCONNECTION |
| CLKe | DISCONNECTION OF SENDING CELL FRAME (COMMON BETWEEN ICLP AND OGLP) |
| CLKf | DISCONNECTION OF RECEIVING CELL FRAME (COMMON BETWEEN ICLP AND OGLP) |
| CLKg | DISCONNECTION OF ERROR FLAG 1 (COMMON BEWEEN ICLP AND OGLP) |
| CLKh | DISCONNECTION OF ERROR FLAG 2 (COMMON BEWEEN ICLP AND OGLP) |
| PCa | RECEIVING CELL DATA PARITY NG (COMMON BEWEEN ICLP AND OGLP) |
| LCA2 | HLP07A LCA CONFIGURATION NG |
| CRNG | ABNORMAL COMMAND AND RESPONSE AT S-CTL1 |
| CLKc | HOME SYSTEM 64K CLOCK DISCONNECTION |
| CLKd | MATE SYSTEM 64K CLOCK DISCONNECTION |
| CLKa | 19M CLOCK/FRAME PULSE DISCONNECTION |

F I G. 689

| MESH AT RECEVING UNIT | | REMARKS | MESH AT SENDING UNIT | | REMARKS |
|---|---|---|---|---|---|
| VPI | VCI | | VPI | VCI | |
| "000"H | "03FC"H | COMMUNICATIONS CELL IN #0 SYSTEM | "0AA"H | "0000"H ∫ "03FF"H | VPI : BSGC CARD NUMBER<br>VCI : BSGC PORT NUMBER<br>"03FF"H, "03FB"H FOR TEST USE |
| "000"H | "03FD"H | COMMUNICATIONS CELL IN #1 SYSTEM | | | |

FIG. 690

| ITEM | FAULT TYPE | NOTIFICATION METHOD | NOTIFYING SYSTEM | TEST DEVICE | ACTION | | | | | PROCEDURE | REMARKS |
|---|---|---|---|---|---|---|---|---|---|---|---|
| | | | | | ASSW SYSTEM SWITCH | FAULT BLOCK | FAULT MASSAGE | ALM LIGHTING | DIAGNOSTICS PROCESS | | |
| 1 | HARDWARE FAULT EXCLUDING SIGNAL PROCESSING UNIT AND OMUX. | HOME SYSTEM | ACT | ACT MHCOM | ○ | ○ | ○ | ○ | ○ PREVIOUSLY ACT | ② | DIAGNOSTICS IS ACTIVATED BY MATE SYSTEM |
| | | | SBY | SBY MHCOM | — | ○ | ○ | ○ | ○ SBY | ① | |
| 2 | HARDWARE FAULT OF SIGNAL PROCESSING UNIT AND OMUX. | MATE SYSTEM E-MSCN | ACT | SBY MHCOM | — | ○ | ○ | ○ | ○ SBY | ③ | |
| | | | SBY | ACT MHCOM | ○ | ○ | ○ | ○ | ○ PREVIOUSLY ACT | ④ | |
| 3 | OBP FAULT | MATE SYSTEM E-MSCN | ACT | SBY MHCOM | — | ○ | ○ | ○ | ○ SBY | ③ | |
| | | | SBY | ACT MHCOM | ○ | ○ | ○ | ○ | ○ PREVIOUSLY ACT | ④ | |
| 4 | MATE POWER SOURCE PWCB FAULT (FUSE DIS-CONNECTION) | MATE SYSTEM E-MSCN | ACT | SBY POWER SOURCE PWCB | — | ○ | ○ | ○ | ○ SBY | ③ | HMCOM PROVIDED BY POWER SOURCE PWCB IS BLOCKED, AND ASSWSH-A IN HOME SYSTEM IS ALSO BLOCKED. |
| | | | SBY | ACT POWER SOURCE PWCB | ○ | ○ | ○ | ○ | ○ PREVIOUSLY ACT | ④ | |

FIG. 691

| VPI | VCI | UL | TAGA | TAGB | TAGC | COM | SIG | 0 |
|---|---|---|---|---|---|---|---|---|
| ALL '0' | 03FA OR 03FB | 0 | 2.4G HW NUMBER (0-3 FOR CARD NUMBER OF ASSW HMX03A) | 622M HW NUMBER (0-3 FOR HW NUMBER IN ASSW HMX03A) | 155M HW NUMBER (0-3 FOR SH NUMBER OF GWMESH) | 0 | 0 | 1 |

FIG. 692

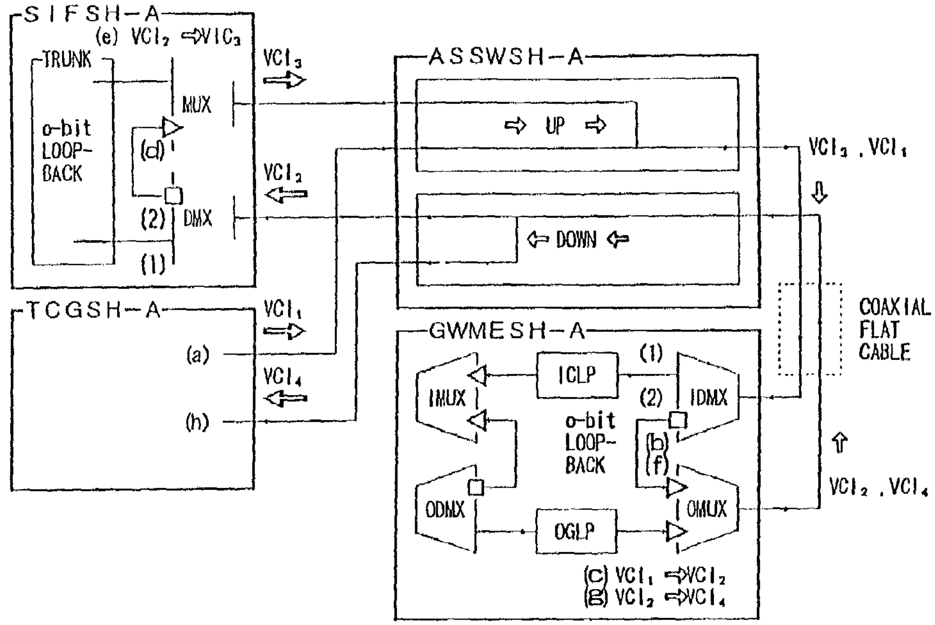

(a) GENERATING TEST CELL(0 BIT IS 1) OF $VCI_1$ AND SWITCHING TAG FOR IDMX FROM, TCGSH-A
(b) DROPPING CELL OF 0-BIT=1 AT IDMX AND LOOPING IT BACK TO OMUX.
(c) CONVERTING $VCI=VCI_1$ INTO $VCI_2$ AT OMUX AND PROCESSING IA AS TEST-CELL OF SWITCHING TAG FOR TRUNK.
(d) DROPPING CELL OF 0-BIT=1 AT DMX OF SIFSH-A HAVING TRUNK AND LOOPING IT BACK TO MUX.
(e) CONVERTING $VCI=VCI_2$ INTO $VCI_3$ AT MUX AND PROCESSING IS AS TEST CELL OF SWITCHING TAG FOR IDMX.
(f) DROPPING CELL OF 0-BIT=1 AT IDMX AND LOOPING IT BACK TO OMUX.
(g) CONVERTING $VCI=VCI_3$ INTO $VCI_4$ AT OMUX AND PROCESSING IT AS TEST CELL OF SWITCHING TAG FOR TCGSH-A.
(h) CHECKING CONTENTS OF TEST CELL AT TCGSH-A.

NOTE : DROP ONLY FOR □ :0-BIT=1 ◁ ▷: VCC

FIG. 693

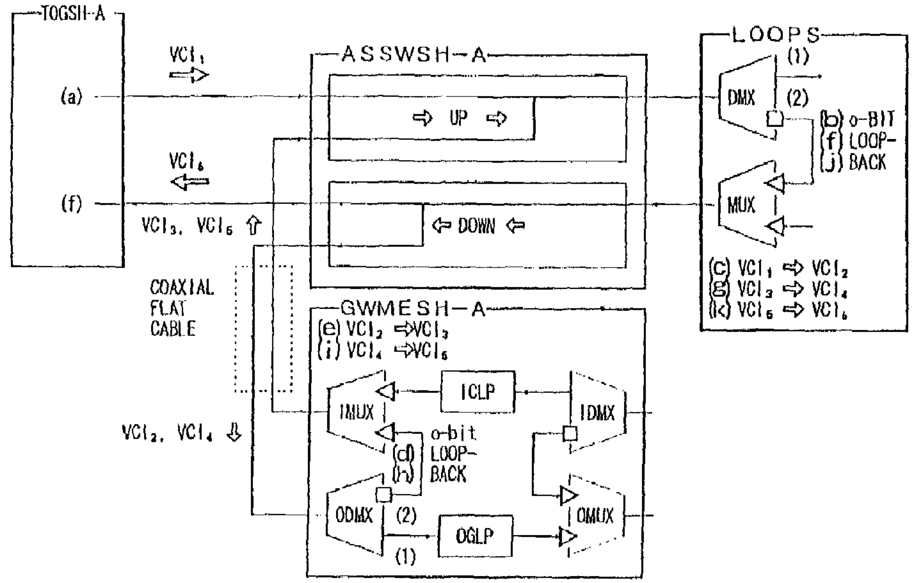

(a) GENARATING TEST CELL (0 BIT IS 1) OF VCI₁ AND SWITCHING TAG FOR LOOP FROM TCGSH-A
(b) DROPPING CELL OF O-BIT=1 AT LOOP AND LOOPING IT BACK TO MUX.
(c) CONVERTING VCI=VCI₁ INTO VCI₂ AT MUX AND PROCESSING IT AS TEST CELL OF SWITCHING TAG FOR ODMX.
(d) DROPPING CELL OF O-BIT=1 AT ODMX AND LOOPING IT BACK TO IMUX.
(e) CONVERTING VCI=VCI₂ INTO VCI₃ AT IMUX AND PROCESSING IT AS TEST CELL OF SWITCHING TAG FOR LOOP.
(f) DROPPING CELL OF O-BIT=1 AT LOOP AND LOOPING IT BACK TO MUX.
(g) CONVERTING VCI=VCI₃ INTO VCI₄ AT MUX AND PROCESSING IT AS TEST CELL OF SWITCHING TAG FOR ODMX.
(h) DROPPING CEL OF O-BIT=1 AT ODMX AND LOOPING IT BACK TO IMUX.
(i) CONVERTING VCI=VCI₄ INTO VCI₅ AT IUX AND PROCESSING IT AS TEST CELL OF SWITCHING TAG FOR LOOP.
(j) DROPPING CELL OF O-BIT=1 AT LOOP AND LOOPING IT BACK TO MUX.
(k) CONVERTING VCI=VCI₅ INTO VCI₆ AT MUX AND PROCESSING IT AS TEST CELL OF SWITCHING TAG FOR TCGSH-A.
(l) CHECKING CONTENTS OF TEST CELL AT TCGSH-A

NOTE : DROP ONLY FOR □ :O-BIT=1 ◁ ▷: VCC

FIG. 694

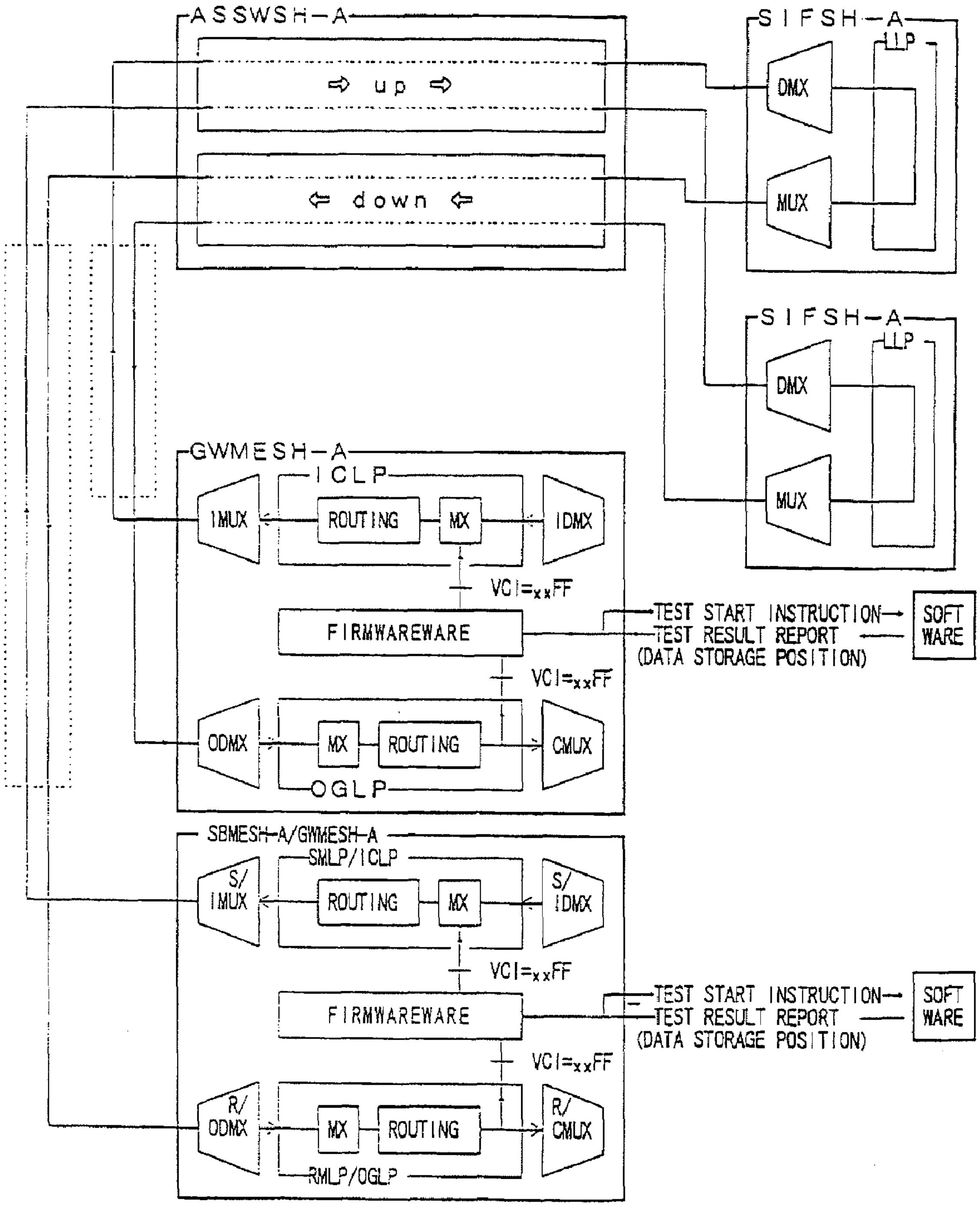
F I G. 696

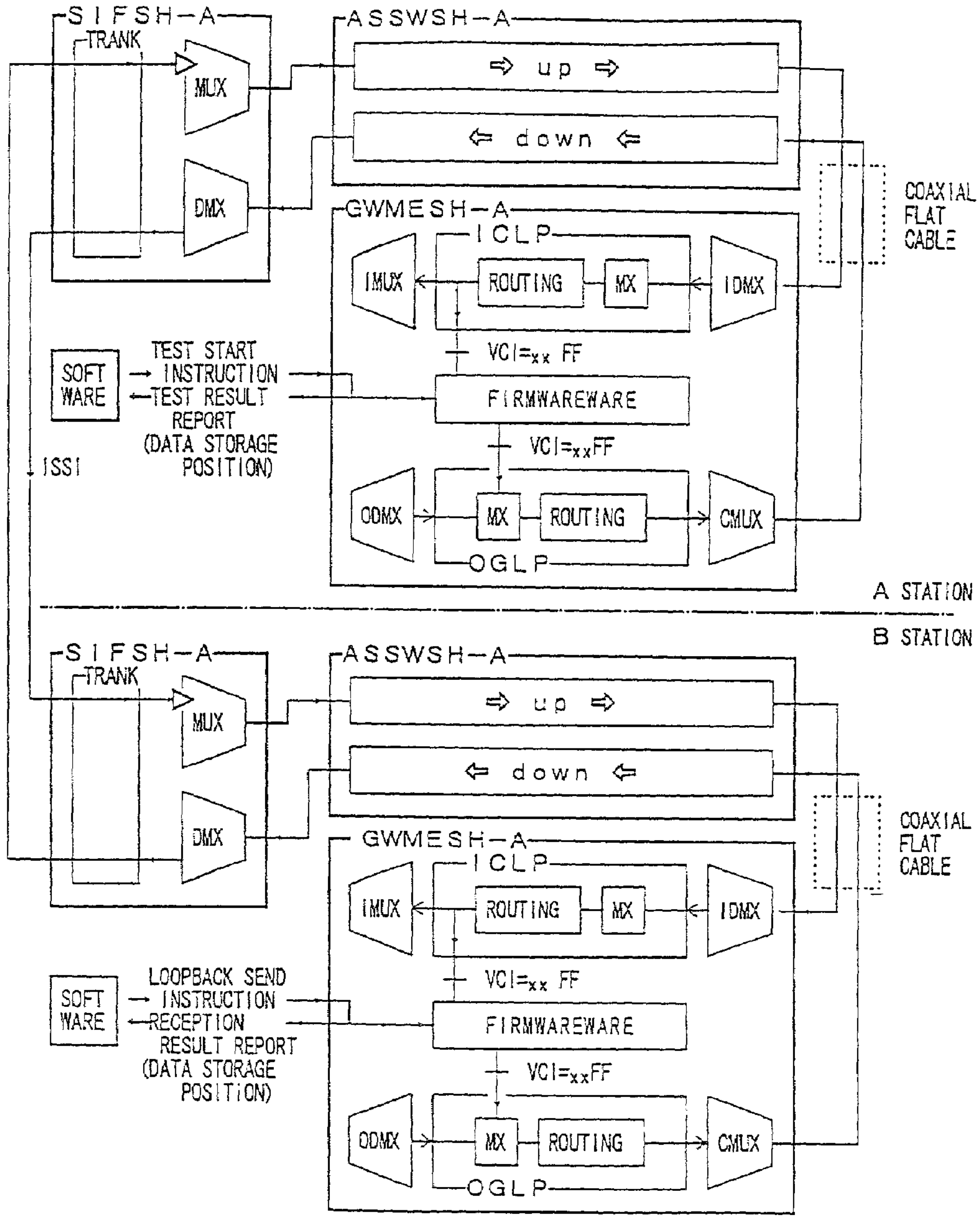
F I G. 697

| NO | | ITEM | SPECIFICATION | REMARKS |
|---|---|---|---|---|
| 1 | BSGC CARD | PROCESSOR | MBL80186 (16 BIT MICRO PROCESSOR) | |
| 2 | | REDUNDANCY | DUPLICATION | |
| 3 | | MEMORY CAPACITY | ROM 256 K BYTE (BANK SWITCH)<br>S-RAM 32 K BYTE<br>D-RAM 896 K BYTE | |
| 4 | | MAXIMUM NUMBER OF SIMULTANEOUS LINK CONNECTIONS | 256 CHANNEL (TO BE EXTENDE INTO 1024 CHANNEL* ) | |
| 5 | | SBIF LSI | INF FOR CONTROLLING MB651623 | |
| 6 | | CARP1/2 LSI | CLAD FOR CONTROLLING MBCG31134, MB630615 | |
| 7 | | MUX | CELL MULTIPLEX LSI MBCG31204-639 | |
| 8 | | ACT CONTROL | DEPENDING ON ACT OF INF | |
| 9 | | NUMBER OF PCB | 1 PCB | |
| 10 | COM | VCC | TAG CONVERSION MEMORY MBCG21503 | |
| 11 | | SELN1 | O&M FOR CONTROLLING MBCG21XXX | |
| 12 | | MUX | CELL MULTIPLEX LSI MBCG31204-639 | |
| 13 | | DMUX | CELL DEMULTIPLEX LSI MBCG31204-638 | |
| 14 | | ACT CONTROL | DEPENDING ON ACT OF SWITCH | |
| 15 | | NUMBER OF PCB | 5 PCB | |
| 16 | SHELF | SHELF CONFIGURATION | LOADED WITH ONE SYSTEM 6 BSGC AND 1 COM | |
| 17 | | DUPLEX CROSS CONNECTION | CROSS CONNECTION OF BSGC AND COM | |
| 18 | | FUNCTIONS | ①TERMINATING INTRA-STATION DEVICE LINK<br>②META-SIGNAL COMMUNICATIONS PORT CONTROL<br>③SUBSCRIBER TERMINAL UNIT SIGNALING PORT CONTROL<br>④SVC PORT CONTROL OF DSIFR<br>⑤SETTING VCC (ONLY STARTING NUMBER BSGC) | |

FIG. 701

※ FOUR BSGCs ARE CONNECTABLE FOR AN INFA.
BSGCSH ACCOMMODATES 6BSGCs note) 1. ░: LOADED BY VCC
2. ACT OF BSGCCOM IS DEPENDENT ON SWITCH
3. ACT OF BSGC IS DEPENDENT ON INDIVIDUAL SYSTEM SPECIFICATION OF INF (a) IN HOST/BRLC

| VPI (H) | VCI (H) | USE |
|---|---|---|
| FROM 00 TO 3F | FROM 0000 TO 001F | REQUIREMENT RESERVE<br>E.G. FOR SIGNALING<br>FOR OAM CELL |
| | FROM 0020 TO 03EF | USER CELL<br>E.G. FOR ATM-UNI, CE, FR |
| | FROM 03F0 TO 03FE | SYSTEM RESERVE<br>FOR INTRA-STATION LAP<br>SIF-COM #0 : VPI=00, VCI=03FC<br>SIF-COM #1 : VPI=00, VCI=03FD<br>RMX-COM #0 : VPI=3F, VCI=03F0<br>RMX-COM #1 : VPI=3F, VCI=03F1<br>DS3, SINF : VPI=00, VCI=03FE<br>DS1 : VPI=AA, VCI=03FE<br>AA: 5 LOWER ORDER BITS ARE FOR DS1 UNIT NUMBER<br>FOR TEST : VPI=00, VCI=03FA, 03FB |
| | 03FF | USER CELL (EXCLUSIVELY FOR SMDS) |

(b) IN UNBILICAL LINK

| VPI (H) | VCI (H) | USE |
|---|---|---|
| FROM 00 TO XX | FROM 0000 TO 001F | REQUIREMENT RESERVE<br>E.G. FOR SIGNALING<br>FOR OAM CELL |
| | FROM 0020 TO 03EF | USER CELL<br>E.G. FOR ATM-UNI, CE, FR |
| 3 F | FROM 0020 TO 03EF | FOR INTRA LAP OF SIMPLEX DEVICE IN BRLC |
| | FROM 03F0 TO 03F7 | FOR INTRA LAP OF DUPLEX DEVICE IN BRLC |

F I G. 7 1 0

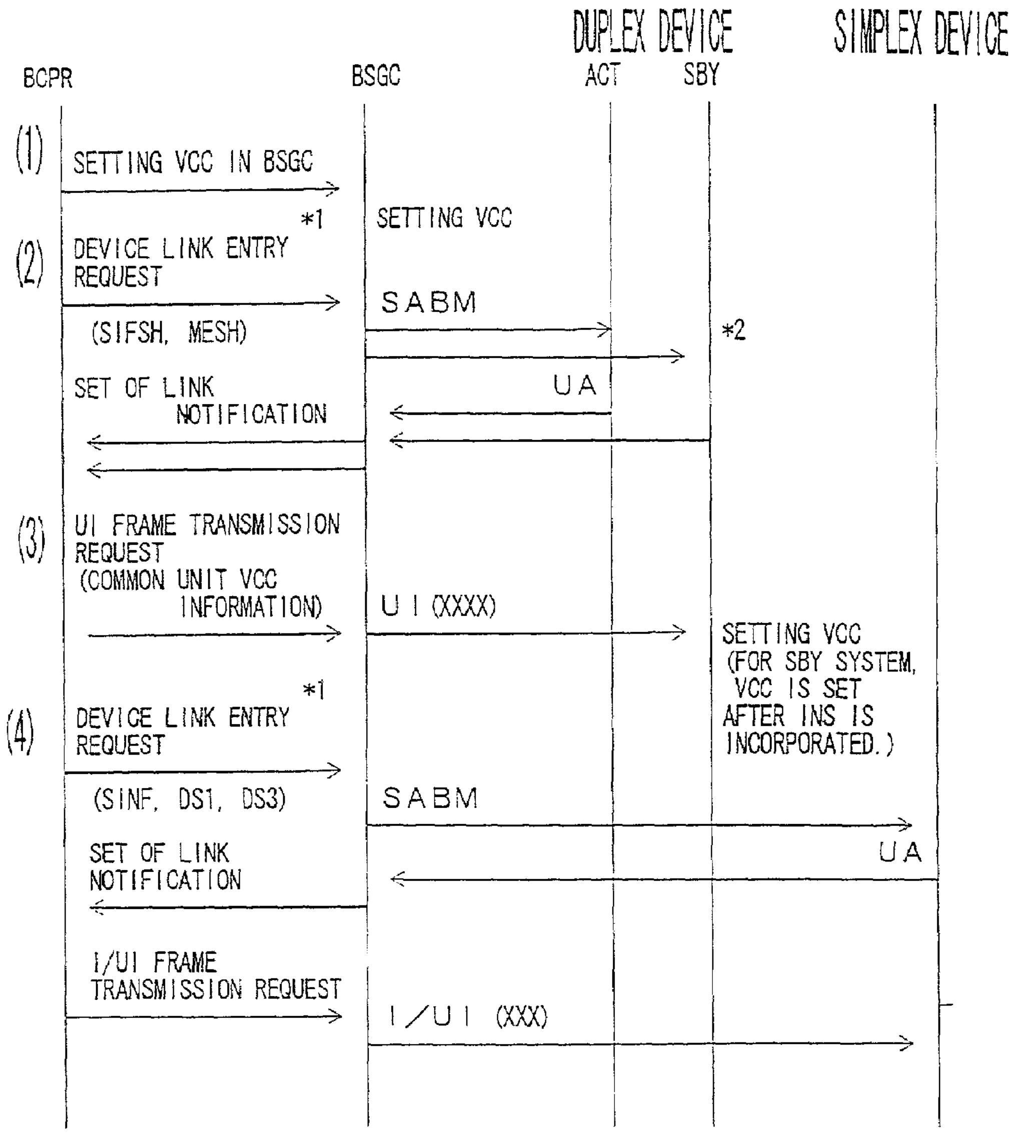
＊1 : ENTIRE LINKS ARE ESTABLISHED BASED ON BCPR DATA.
＊2 : RETURNING TAG INFORMATION IS ASSIGNED TO SABM TO COMMON UNIT.
F I G. 714

(1) – (4) : INDICATES LAP LINK SETTING NUMBER
(1) AND (3) : SIMPLEX COMMUNICATIONS PORT
(2) AND (4) : 2 LINKS OF ACT/SBY ARE ESTABLISHED FOR DUPLEX COMMUNICATIONS PORT.
LINK ESTABLISHING PROCEDURE IS SAME AS THAT FOR SIFCOM COMMON UNIT

NOTE 1 : DMA OF INF IS REALIZED BY DMA FUNCTIONS OF 80186 AND SBIF.
NOTE 2 : DMA OF CARP IS REALIZED BY DMA FUNCTIONS IN CARP 2
NOTE 3 : SBIF AND CARP ARE CONTROLLED BY 80186 EXTERNAL INTERRUPTION (INT3).

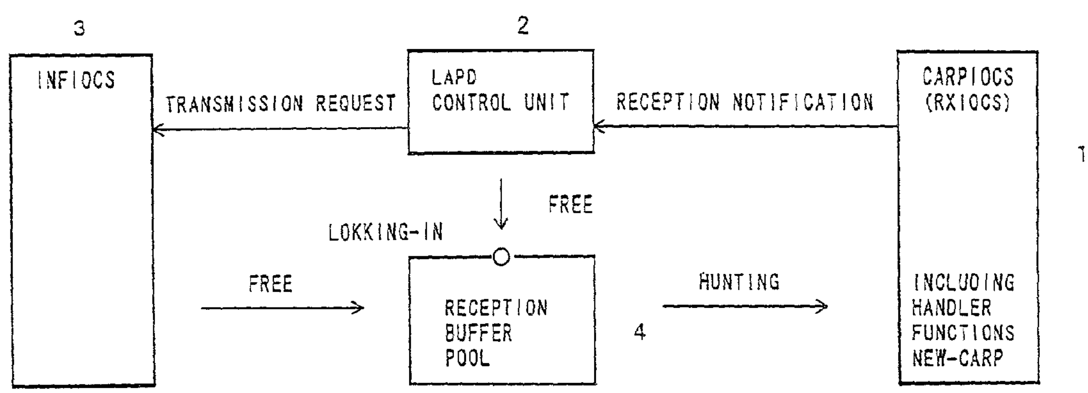
F I G. 7 1 9

INITIALIZATION COMMAND

| 0 | | 16 | 31 |
|---|---|---|---|
| COMMAND TYPE | | COMMAND CODE | |
| D. C | | D. C | |
| INF INITIAL INFORMATION SETTING TABLE SIZE | | | |
| INF INITIAL INFORMATION SETTING TABLE ADDRESS | | | |

INF INITIALIZATION INFORMATION TABLE

| 0 | 16 | 31 |
|---|---|---|
| STATUS QUEUE ADDRESS (FOR URGENT USE) | | |
| STATUS QUEUE ADDRESS (FOR PRIORITIZED USE) | | |
| STATUS QUEUE ADDRESS (FOR NON-PRIORITIZED USE) | | |
| RECEIVED BUFFER LENGTH (FOR URGENT USE) | NUMBER OF ENTERED BUFFERS (FOR URGENT USE) | |
| LEADING ADDRESS OF RECEIVED BUFFER QUEUE (FOR URGENT USE) | | |
| RECEIVED BUFFER LENGTH (FOR URGENT USE) | NUMBER OF ENTERED BUFFERS (FOR URGENT USE) | |
| LEADING ADDRESS OF RECEIVED BUFFER QUEUE (FOR URGENT USE) | | |
| RECEIVED BUFFER LENGTH (FOR PRIORITIZED USE) | NUMBER OF ENTERED BUFFERS (FOR PRIORITIZED USE) | |
| LEADING ADDRESS OF RECEIVED BUFFER QUEUE (FOR PRIORITIZED USE) | | |
| RECEIVED BUFFER LENGTH (FOR PRIORITIZED USE) | NUMBER OF ENTERED BUFFERS (FOR PRIORITIZED USE) | |
| LEADING ADDRESS OF RECEIVED BUFFER QUEUE (FOR PRIORITIZED USE) | | |
| RECEIVED BUFFER LENGTH (FOR NON-PRIORITIZED USE) | NUMBER OF ENTERED BUFFERS (FOR NON-PRIORITIZED USE) | |
| LEADING ADDRESS OF RECEIVED BUFFER QUEUE (FOR NON-PRIORITIZED USE) | | |
| RECEIVED BUFFER LENGTH (FOR NON-PRIORITIZED USE) | NUMBER OF ENTERED BUFFERS (FOR NON-PRIORITIZED USE) | |
| LEADING ADDRESS OF RECEIVED BUFFER QUEUE (FOR NON-PRIORITIZED USE) | | |

F I G. 7 2 1

| SIG | UL | TAGC | COM | PATH |
|---|---|---|---|---|
| 0/1 | 0 | 000 | 0 | SIFSH#0 LINE0/SIGNALING |
| 0/1 | 0 | 001 | 0 | SIFSH#0 LINE1/SIGNALING |
| | | ∫ | | ∫ |
| 0/1 | 0 | 111 | 0 | SIFSH#0 LINE7/SIGNALING |
| 0/1 | 1 | 000 | 0 | SIFSH#1 LINE0/SIGNALING |
| 0/1 | 1 | 001 | 0 | SIFSH#1 LINE1/SIGNALING |
| | | ∫ | | ∫ |
| 0/1 | 1 | 111 | 0 | SIFSH#1 LINE7/SIGNALING |
| 1 | 0 | 000 | 1 | SIFSH#0 COM SIGNALING |
| 1 | 1 | 000 | 1 | SIFSH#1 COM SIGNALING |

FIG. 722

| SIG | UL | TAGB | TAGC | COM | PATH |
|---|---|---|---|---|---|
| 0/1 | 0 | 0 | 000 | 0 | RMUXSH#0 LINE0 / SIGNALING |
| 0/1 | 0 | 0 | 001 | 0 | RMUXSH#0 LINE1 / SIGNALING |
| | | | ∫ | | ∫ |
| 0/1 | 0 | 0 | 111 | 0 | RMUXSH#0 LINE7 / SIGNALING |
| 0/1 | 1 | 0 | 000 | 0 | RMUXSH#1 LINE0 / SIGNALING |
| 0/1 | 1 | 0 | 001 | 0 | RMUXSH#1 LINE1 / SIGNALING |
| | | | ∫ | | ∫ |
| 0/1 | 1 | 0 | 111 | 0 | RMUXSH#1 LINE7 / SIGNALING |
| 0/1 | 1 | 1 | 000 | 0 | RMUXSH#2 LINE0 / SIGNALING |
| 0/1 | 1 | 1 | 001 | 0 | RMUXSH#2 LINE1 / SIGNALING |
| | | | ∫ | | ∫ |
| 0/1 | 1 | 1 | 111 | 0 | RMUXSH#2 LINE7 / SIGNALING |
| 1 | 0 | 0 | 000 | 1 | RMUXSH#0 COM SIGNALING |
| 1 | 1 | 0 | 000 | 1 | RMUXSH#1 COM SIGNALING |
| 1 | 1 | 1 | 000 | 1 | RMUXSH#2 COM SIGNALING |

FIG. 723

| SIG | ADS1 BLK | ADS1 SEL | |
|---|---|---|---|
| 0 | 0 0 0 | 0 0<br>∫<br>1 1 | USER CELL TO DTC 0/LINE 0<br>∫<br>USER CELL TO DTC 0/LINE 3 |
| | ∫ | | |
| 0 | 1 1 1 | 0 0<br>∫<br>1 1 | USER CELL TO DTC 7/LINE 0<br>∫<br>USER CELL TO DTC 7/LINE 3 |
| 1 | 0 0 0 | 0 0<br>∫<br>1 1 | LAP CELL TO DTC 0/LINE 0<br>∫<br>LAP CELL TO DTC 0/LINE 3 |
| | ∫ | | |
| 1 | 1 1 1 | 0 0<br>∫<br>1 1 | LAP CELL TO DTC 7/LINE 0<br>∫<br>LAP CELL TO DTC 7/LINE 3 |

F I G. 7 2 4

| SIG | UL | TAGC | PATH |
|---|---|---|---|
| 0 | 0 | 000 | BSGCSH#0/LINE0 |
| | | ∫ | ∫ |
| 0 | 0 | 111 | BSGCSH#0/LINE5 |
| 0 | 1 | 000 | BSGCSH#1/LINE0 |
| 0 | 1 | 001 | BSGCSH#1/LINE1 |
| | | ∫ | ∫ |
| 0 | 1 | 111 | BSGCSH#1/LINE5 |

→ BSGC CARD NO.
→ DAISY-CHAINED SHELF NO.

FIG. 725

FIG. 730
BCPR
BSGC#0
VCC#0
VCC#1
SETTING SW
IN OUS STATE
COM INS NOTIFICATION(MATE)
MARK SW#0
OUS
COM INS RESPONSE
*3) AFTERWARDS, VCC IS WRITTEN IN ONLY INS SYSTEM(#1)

| FAULT POINT | | | | AFTER-FAULT STATE OF BSGC SYSTEM | | AFTER-FAULT STATE OF BSGC-COM SYSTEM | | INTER-RUPTED BSGC SYSTEM | REMARKS |
|---|---|---|---|---|---|---|---|---|---|
| BSGC#0SCN | | BSGC#1SCN | | | | | | | |
| (a) | (b) | (a)' | (b)' | #0 | #1 | #0 | #1 | | |
| 1 | 0 | 0 | 0 | OUS | ACT | ACT/SBY | NO AMENDMENT | BSGC#0 | BSGC#1 → COM#0, COM#1 AVAILABLE |
| 0 | 1 | 0 | 0 | ACT | OUS | ACT/SBY | NO AMENDMENT | BSGC#0 | BSGC#0 → COM#0, COM#1 AVAILABLE |
| 0 | 0 | 1 | 0 | OUS | ACT | ACT/SBY | NO AMENDMENT | BSGC#1 | BSGC#1 → COM#0, COM#1 AVAILABLE |
| 0 | 0 | 0 | 1 | ACT | OUS | ACT/SBY | NO AMENDMENT | BSGC#1 | BSGC#0 → COM#0, COM#1 AVAILABLE |

FIG. 734

| FAULT POINT | | | | AFTER-FAULT STATE OF BSGC SYSTEM | | AFTER-FAULT STATE OF BSGC-COM SYSTEM | | INTER-RUPTED BSGC SYSTEM | REMARKS |
|---|---|---|---|---|---|---|---|---|---|
| BSGC#0SCN | | BSGC#1SCN | | | | | | | |
| (a) | (b) | (a)' | (b)' | #0 | #1 | #0 | #1 | | |
| 1 | 1 | 0 | 0 | OUS | ACT | (NOTE 1) ACT/SBY | NO AMENDMENT | BSGC#0 | BSGC#1 → COM#0, COM#1 AVAILABLE |
| 0 | 0 | 1 | 1 | ACT | OUS | (NOTE 2) ACT/SBY | NO AMENDMENT | BSGC#0 | BSGC#0 → COM#0, COM#1 AVAILABLE |
| 1 | 0 | 1 | 0 | (NOTE 3) ACT/SBY NO AMENDMENT | | OUS | ACT | BSGC#0<br>BSGC#1 | BSGC#0 → COM#1, AVAILABLE<br>BSGC#1 → COM#1, AVAILABLE |
| 0 | 1 | 0 | 1 | (NOTE 4) ACT/SBY NO AMENDMENT | | ACT | OUS | BSGC#0<br>BSGC#1 | BSGC#0 → COM#0, AVAILABLE<br>BSGC#1 → COM#0, AVAILABLE |

FIG. 735

CASE−1

(a) — FAULT IN BSGC-COM#0, (b) — FAULT IN BSGC#0

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | OUS | ACT |

⇨ SETTING SYSTEM AS MASTER/SLAVE AFTER SWITCHING BSGC/COM-PKG AND CONFIRMING NORMALITY.

BSGC-COM-PKG=XXXXXX

CASE−2

(a) — FAULT IN BSGC#0 (b) — FAULT IN BSGC-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | ACT | OUS |

⇨ SETTING SYSTEM AS MASTER/SLAVE AFTER SWITCHING BSGC/COM-PKG AND CONFIRMING NORMALITY.

BSGC-COM-PKG=XXXXXX

CASE−3

(a) — FAULT IN BSGC-COM#0, (b) — FAULT IN BSGC-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | OUS | ACT |

⇨ AFTER SWITCHING BSGC-COM xxxxx-PKG AND CONFIRMING NORMALITY ;

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | ACT | OUS |

⇨ AFTER SWITCHING BSGC-COM xxxxx-PKG AND CONFIRMING NORMALITY ;

RETURNING BSGC/BSGC-COM=SW TO MASTER/SLAVE.

FIG. 736

CASE-1

(a)' — FAULT IN BSGC-COM#0, (b)' — FAULT IN BSGC#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | OUS | ACT |

⇨ SETTING SYSTEM AS MASTER/SLAVE AFTER SWITCHING BSGC/COM-PKG AND CONFIRMING NORMALITY.

BSGC-COM-PKG=XXXXXX

CASE-2

(a)' — FAULT IN BSGC#1 (b)' — FAULT IN BSGC-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | ACT | OUS |

⇨ SETTING SYSTEM AS MASTER/SLAVE AFTER SWITCHING BSGC/COM-PKG AND CONFIRMING NORMALITY.

BSGC-COM-PKG=XXXXXX

CASE-3

(a) — FAULT IN BSGC-COM#0, (b) — FAULT IN BSGC-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | OUS | ACT |

⇨ AFTER SWITCHING BSGC-COM xxxxx-PKG AND CONFIRMING NORMALITY ;

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | ACT | OUS |

⇨ AFTER SWITCHING BSGC-COM xzxxx-PKG AND CONFIRMING NORMALITY ;

⇩ RETURNING BSGC/BSGC-COM=SW TO MASTER/SLAVE.

FIG. 737

| FAULT POINT | | | | AFTER-FAULT STATE OF BSGC SYSTEM | | AFTER-FAULT STATE OF BSGC-COM SYSTEM | | INTER-RUPTED BSGC SYSTEM | REMARKS |
|---|---|---|---|---|---|---|---|---|---|
| BSGC#0SCN | | BSGC#1SCN | | | | | | | |
| (a) | (b) | (a)' | (b)' | #0 | #1 | #0 | #1 | | |
| 1 | 0 | 0 | 0 | OUS | ACT | ACT/SBY | NO AMENDMENT | BSGC#0 | |
| | | | | ⇩ DIAGNOSTICS EXECUTED : FORLLOWING STATE IS ENTERED WHEN N. G. IS SPECIFIED FOR BSGC-COM #0 WHEN N. G. IS SPECIFIED FOR BSGC#0, BSGC#0 IS MAINTAINED ONLY. | | | | | |
| | | | | SBY | ACT | OUS | ACT | — | BSGC-COM#0 MAINTENANCE |
| 0 | 1 | 0 | 0 | ACT | OUS | ACT/SBY | NO AMENDMENT | BSGC#1 | |
| | | | | ⇩ DIAGNOSTICS EXECUTED : FORLLOWING STATE IS ENTERED WHEN N. G. IS SPECIFIED FOR BSGC-COM #0 WHEN N. G. IS SPECIFIED FOR BSGC#1, BSGC#1 IS MAINTAINED ONLY. | | | | | |
| | | | | ACT | SBY | OUS | ACT | — | BSGC-COM#0 MAINTENANCE |
| 0 | 0 | 1 | 0 | OUS | ACT | ACT/SBY | NO AMENDMENT | BSGC#0 | |
| | | | | ⇩ DIAGNOSTICS EXECUTED : FORLLOWING STATE IS ENTERED WHEN N. G. IS SPECIFIED FOR BSGC-COM #1 WHEN N. G. IS SPECIFIED FOR BSGC#0, BSGC#0 IS MAINTAINED ONLY. | | | | | |
| | | | | SBY | ACT | ACT | OUS | — | BSGC-COM#1 MAINTENANCE |
| 0 | 0 | 0 | 1 | ACT | OUS | ACT/SBY | NO AMENDMENT | BSGC#1 | |
| | | | | ⇩ DIAGNOSTICS EXECUTED : FORLLOWING STATE IS ENTERED WHEN N. G. IS SPECIFIED FOR BSGC-COM #1 WHEN N. G. IS SPECIFIED FOR BSGC#1, BSGC#1 IS MAINTAINED ONLY. | | | | | |
| | | | | ACT | SBY | ACT | OUS | — | BSGC-COM#1 MAINTENANCE |

FIG. 739

| FAULT POINT | | | | AFTER-FAULT STATE OF BSGC SYSTEM | | | | INTERRUPTED BSGC SYSTEM | REMARKS |
|---|---|---|---|---|---|---|---|---|---|
| BSGC#0SCN | | BSGC#1SCN | | | | | | | |
| (a) | (b) | (a) | (b) | #0 | #1 | #0 | #1 | | |
| 1 | 1 | 0 | 0 | (NOTE1) ACT/SBY | NO AMENDMENT | OUS | ACT | BSGC#0<br>BSGC#1 | BSGC#0 → COM#1 AVAILABLE<br>BSGC#1 → COM#1 AVAILABLE |
| 0 | 0 | 1 | 1 | (NOTE2) ACT/SBY | NO AMENDMENT | ACT | OUS | BSGC#0<br>BSGC#1 | BSGC#0 → COM#0 AVAILABLE<br>BSGC#1 → COM#0 AVAILABLE |
| 1 | 0 | 1 | 0 | OUS | ACT | (NOTE3) ACT/SBY | NO AMENDMENT | BSGC#0 | BSGC#1 → COM#0, COM#1 AVAILABLE |
| 0 | 1 | 0 | 1 | ACT | OUS | (NOTE4) ACT/SBY | NO AMENDMENT | BSGC#1 | BSGC#0 → COM#0, COM#1 AVAILABLE |

FIG. 740

CASE-1

(a) — FAULT IN BSGC-COM#0, (a)' — FAULT IN BSGC#0

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | OUS | ACT |

⇨ SETTING SYSTEM AS MASTER/SLAVE AFTER SWITCHING BSGC/COM-PKG AND CONFIRMING NORMALITY.

BSGC-COM-PKG=XXXXXX

CASE-2

(a) — FAULT IN BSGC#0 (a)' — FAULT IN BSGC-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | ACT | OUS |

⇨ SETTING SYSTEM AS MASTER/SLAVE AFTER SWITCHING BSGC/COM-PKG AND CONFIRMING NORMALITY.

BSGC-COM-PKG=XXXXXX

CASE-3

(a) — FAULT IN BSGC-COM#0, (a)' — FAULT IN BSG-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | OUS | ACT |

⇨ AFTER SWITCHING COM#0 xxxxx-PKG AND CONFIRMING NORMALITY ;

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| OUS | ACT | ACT | OUS |

⇨ AFTER SWITCHING COM#1 xxxxx-PKG AND CONFIRMING NORMALITY ;

⇩ RETURNING BSGC/BSGC-COM=SW TO MASTER/SLAVE.

FIG. 741

CASE-1

(b) — FAULT IN BSGC-COM#1, (b)' — FAULT IN BSGC#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | OUS | ACT |

⇨ SETTING SYSTEM AS MASTER/SLAVE AFTER SWITCHING BSGC/COM-PKG AND CONFIRMING NORMALITY.

BSGC-COM-PKG=XXXXXX

CASE-2

(b) — FAULT IN BSGC#1 (b)' — FAULT IN BSGC-COM#0

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | ACT | OUS |

⇨ SETTING SYSTEM AS MASTER/SLAVE AFTER SWITCHING BSGC/COM-PKG AND CONFIRMING NORMALITY.

BSGC-COM-PKG=XXXXXX

CASE-3

(b) — FAULT IN BSGC-COM#0, (b) — FAULT IN BSG-COM#1

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | OUS | ACT |

⇨ AFTER SWITCHING COM#0 xxxxx-PKG AND CONFIRMING NORMALITY ;

| AFTER-DIAGNOSTICS STATE OF BSGC SYSTEM | | AFTER-DIAGNOSTICS STATE OF BSGC-COM SYSTEM | |
|---|---|---|---|
| #0 | #1 | #0 | #1 |
| ACT | OUS | ACT | OUS |

⇨ AFTER SWITCHING COM#1 xxxxx-PKG AND CONFIRMING NORMALITY ;

RETURNING BSGC/BSGC-COM=SW TO MASTER/SLAVE.

F I G. 742

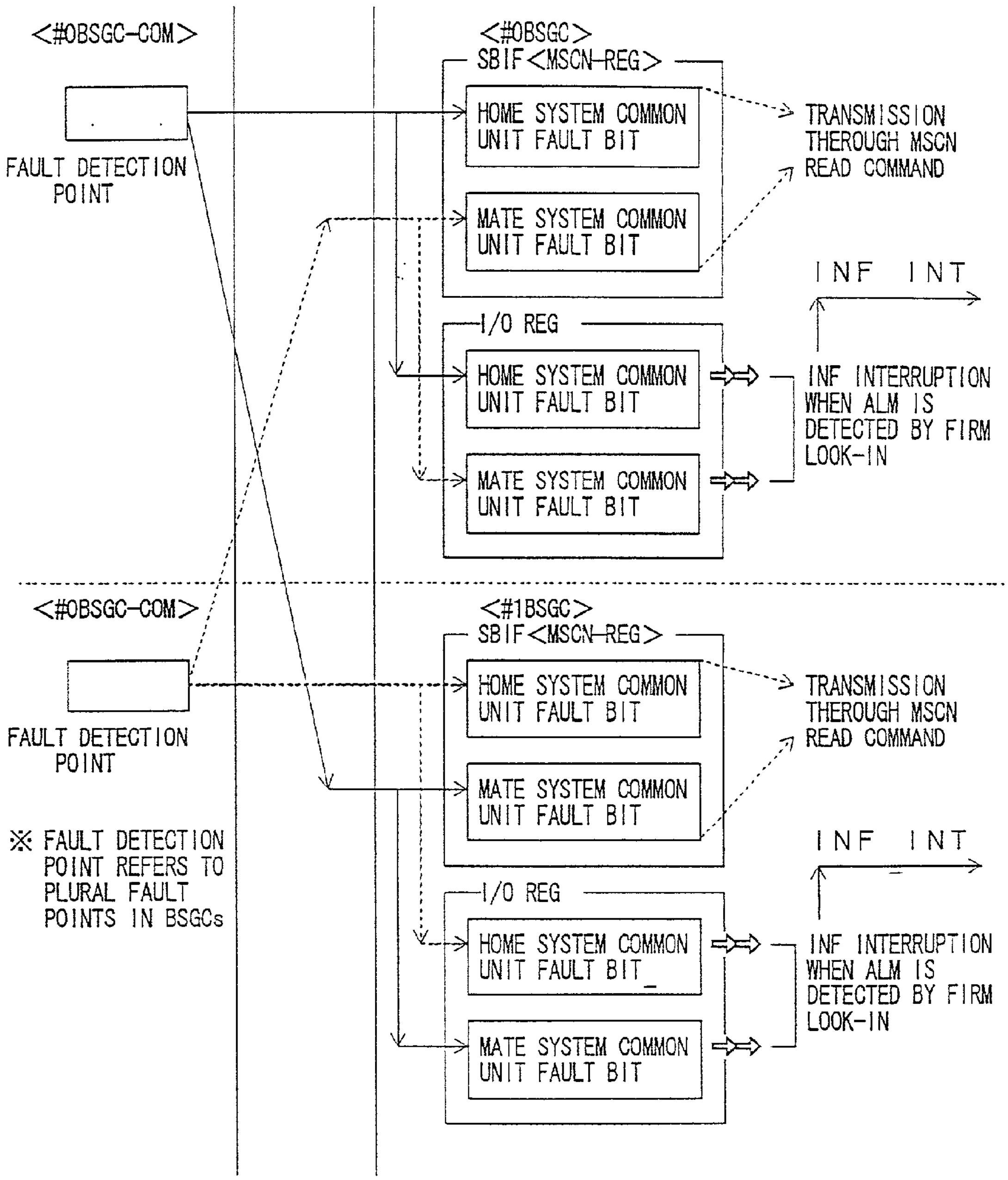
F I G. 7 4 3

| No | CONTENTS | CC INTERRUPTION | FIRM INTERRUPTION | MSCN-BIT | FAULT CORRECTING PROCESS | REMARKS |
|---|---|---|---|---|---|---|
| 1 | INF DMA ACCESS ERROR 1 | EXISTING | EXISTING | 28 | RETRIAL PROCESS FAULT IF NG | ANSWER SBER1- BIT=1. AT DMA-TRANSFER, INFT PARITY CHECKER GENERATES N. G. IN BSGC ⟶ PFT DIRECTION. |
| 2 | INF DMA ACCESS ERROR 2 | EXISTING | EXISTING | 27 | RETRIAL PROCESS FAULT IF NG | ANSWER SBER2-BIT=1. AT DMA-TRANSFER, INFT BECOMES BERR THROUGH ACCESS TO TOXBUS AND DMA ADDRES GUARD ERROR OCCURS. |
| 3 | INF DMA PARITY ERROR | EXISTING | EXISTING | 26 | RETRIAL PROCESS FAULT IF NG | ERROR OCCURS IN PARITY CHECK OF ANSWER RECEPTION DATA. |
| 4 | INF DMA TIMEOVER | EXISTING | EXISTING | 25 | RETRIAL PROCESS FAULT IF NG | TIME NOMITOR TIMER INDICATES "OVER" DURING PERIOD FROM DMA ACCESS TERMINATION TO ANSWER (NO ANSWER) |
| 5 | BSGC FAULT | EXISTING | EXISTING | 23 | SETTING AS OUS STATE SYSTEM SWITCH FOR ACT SYSTEM | BSGC FAULT ① WATCH DOG TIMER OVER ② DRAM PARITY N. G ③ WRITE PROTECT ERROR |

FIG. 744

| BIT | CONTENTS | |
|---|---|---|
| 31 | RESET COMPLETION INDICATOR | |
| 30 | (DON'T CARE) | |
| 29 | BSGC FAULT | (1) |
| 28 | DMA ACCESS ERROR 1 (OCCURRENCE OF ANSWER ER1) | (1) |
| 27 | DMA ACCESS ERROR 2 (OCCURRENCE OF ANSWER ER2) | (1) |
| 26 | DMA PARITY ERROR | (1) |
| 25 | DMA TIME OVER | (1) |
| 24 | HPAL : HOME BSGC-COM OBP FAULT | (3) |
| 23 | MPAL : MATE BSGC-COM OBP FAULT | (3) |
| 22 | MFAL : MATE FUSE ALRAM (MATE SYSTEM HPT01A LOADED FUSE DISCONNECTION STATE) | (3) |
| 21 | HOME SYSTEM BSGC-COM FAULT-1 ☆VALID BIT FOR ONLY STARTING NUMBER BSGC | (3) |
| 20 | MATE SYSTEM BSGC-COM FAULT-1 ☆VALID BIT FOR ONLY STARTING NUMBER BSGC | (3) |
| 19 | HOME SYSTEM BSGC-COM FAULT-2 | (3) |
| 18 | MATE SYSTEM BSGC-COM FAULT-2 | (3) |
| 17 | (DON'T CARE) | |
| 16 | (DON'T CARE) | |
| 15 | BSGC—BSGC-COM DETECTION FAULT AT BSGC-COM IN HOME SYSTEM DATA PARITY N.G | (2) |
| 14 | BSGC—BSGC-COM DETECTION FAULT AT BSGC-COM IN HOME SYSTEM CELL FRAME DISCONNECTION OR CLOCK DISCONNECTION | (2) |
| 13 | (DON'T CARE) | |
| 12 | BSGC—BSGC-COM DETECTION FAULT AT BSGC-COM IN MATE SYSTEM DATA PARITY N.G | (2) |
| 11 | BSGC—BSGC-COM DETECTION FAULT AT BSGC-COM IN MATE SYSTEM CELL FRAME DISCONNECTION OR CLOCK DISCONNECTION | (2) |
| 10 | (DON'T CARE) | |
| 09 | BSGC—BSGC-COM DETECTION FAULT AT BSGC IN HOME SYSTEM DATA PARITY N.G | (2) |
| 08 | BSGC—BSGC-COM DETECTION FAULT AT BSGC IN HOME SYSTEM CELL FRAME DISCONNECTION OR CLOCK DISCONNECTION | (2) |
| 07 | (DON'T CARE) | |
| 06 | BSGC—BSGC-COM DETECTION FAULT AT BSGC-COM IN MATE SYSTEM DATA PARITY N.G | (2) |
| 05 | BSGC—BSGC-COM DETECTION FAULT AT BSGC-COM IN MATE SYSTEM CELL FRAME DISCONNECTION OR CLOCK DISCONNECTION | (2) |
| 04 | (DON'T CARE) | |
| 03 | (DON'T CARE) | |
| 02 | (DON'T CARE) | |
| 01 | (DON'T CARE) | |
| 00 | (DON'T CARE) | |

☆··BITS 21-16 RECEIVES REPORT FROM STARTING NUMBER BSGC ONLY . OTHER BSGCFs ARE "DON'T CARE"

F I G. 745

| | | | |
|---|---|---|---|
| | BSGC FAULT | 29 | WATCH DOG TIME OVER, DRAM PARITY N.G, DRAM WRITE PROTECT ERR<br>MUX LSI ALM FOR ACT/SBY-LINK MULTIPLEX, 54/53 CNV ALM, PIF RETRY OUT |

FIG. 746

| NO | MSCN CONTENTS | BIT NO | DETAILED FACTOR LISTING |
|---|---|---|---|
| 2 | HOME-SYSTEM BSGC-COM FAULT-1 | 21 | BIT INDICATING ONLY STARTING NUMBER BSGC<br>ALL SUBSEQUENT BITS ARE FAULT BITS IN HOME SYSTEM BSGC-COM.<br>1)MUX UNIT IN HOME SYSTEM IS FAULTY. |
| 3 | MATE-SYSTEM BSGC-COM FAULT-1 | 20 | BIT INDICATING ONLY STARTING NUMBER BSGC<br>ALL SUBSEQUENT BITS ARE FAULT BITS IN MATE SYSTEM BSGC-COM.<br>1)MUX UNIT IN MATE SYSTEM IS FAULTY. |
| 4 | HOME-SYSTEM BSGC-COM FAULT-2 | 19 | FAULT NOTIFICATION FROM EACH BSGC. ALL FAULT ARE FROM BSGC-COM IN HOME SYSTEM.<br>EACH BSGC-PKG CORRESPONDING UNIT<br>1)MUX UNIT IN HOME SYSTEM IS FAULTY.<br>2)DMUX-VCC UNIT IN HOME SYSTEM IS FAULTY.<br>3)BSGC-CORRESPOMDING MUX UNIT IN HOME SYSTEM IS FAULTY. |
| 5 | MATE-SYSTEM BSGC-COM FAULT-2 | 18 | FAULT NOTIFICATION FROM EACH BSGC. ALL FAULTS ARE FROM BSGC-COM IN MATE SYSTEM.<br>EACH BSGC-PKG CORRESPONDING UNIT<br>1)MUX UNIT IN MATE SYSTEM IS FAULTY.<br>2)DMUX-VCC UNIT IN MATE SYSTEM IS FAULTY.<br>3)BSGC-CORRESPONDING MUX UNIT IN MATE SYSTEM IS FAULTY. |

FIG. 747

Fig 6.1.3 UI FORMAT (SIFSH⇒BSGC)

| | | |
|---|---|---|
| LENGTH | APDI | |
| MESG | NS | 0 |
| COMMAND ID | 00 | |
| USER INFORMATION | | |

MAXIMUM LENGTH 512 BYTE

THIS FORMAT IS DIFFERENT IN SIMPLE LAP AND FULL LAPD IN THE FOLLOWING POINTS.

1. MAXIMUM MESSAGE LENGTH IS 509 BYTES FOR SIMPLE LAP.
2. NS FIELD IS FIXED AT 0 FOR FULL LAPD.

APID/MESG VALUE IS CENTRALLY MANAGED BY SOFTWARE FOR ALL DEVICES.

FIG. 752

HMX00A

| NO | FUNCTION BLOCK NAME | OUTLINE OF FUNCTIONS | MAIN LSI |
|---|---|---|---|
| 1 | CSPC | LEVEL IS CONVERTED BETWEEN ECL AND TTL OF 622M UP/DOWN DATA BY INTERFACING WITH ASSWSH.<br>CONVERSION BETWEEN ECL LEVEL 8 BITS, 78M AND LEVEL 16 BITS, 39M. | MB222M607-CR-G |
| 2 | 16 ⇨ 48<br>16 ⇦ 48<br>CONV<br>(CSPCAD) | AMENDMENT IS MADE FROM 39M, 16 BITS TO 13M, 48 BITS OR FROM 13M, 48 BITS TO 39M, 16 BITS. | MBCG10572-607CR-G |
| 3 | SCHEDULER | MAIN FUNCTION OF SCHEDULER CAPABLE OF CELL MULTIPLEXING CONTROL FOR HOME SH 6BSGC AND LOWER SH 6BSGC IS REALIZED BY LCA. | 64K EPROM<br>LCA<br>E76C-0024-0740<br>#6470G132 |
| 4 | MUX | 156M CELL 2 SYSTEM AND 622M HIGH SPEED CELL 1 SYSTEM CAN BE MULTIPLEXED. MULTIPLEXER. | MBCG31204-639CR-G |
| 5 | 2/1 SEL | DATA, ADD, SELECTOR OF CONTROL LINE, AND ACT-BSGC ARE SELECTED FROM HOME/MATE SYSTEM STARTING NUMBER BSGC. | ——— |

F I G. 756

HMX01A

| NO | FUNCTION BLOCK NAME | OUTLINE OF FUNCTIONS | MAIN LSI |
|---|---|---|---|
| 1 | DMUX | TAG IS DETECTED FROM CELL OF 622M, MATCHED WITH PREDETERMINED TAG INFORMATION, AND OUTPUT AS 156M CELL IF THEY MATCH.<br>INPUT 13M, 48 PARALLEL ⇨ OUTPUT 19M, 8 PARALLEL | MBCG31204-638CR-G |
| 2 | SEL-N1<br>(a) | FOR CELL BY CELL LOOPBACK TO BSGC<br>SPECIFYING LOOPBACK CELL FROM 0-BIT IN TAG. | MBCG21104-616ZFV |
| 3 | SEL-N1<br>(b) | FOR CELL BY CELL LOOPBACK TO ASSWSH<br>SPECIFYING LOOPBACK CELL FROM 0-BIT IN TAG.<br>VCI OF TEST CELL IS SPECIFIED BY SPECIFIC VRLUE. VCI=03FE, 03FF | MBCG21104-616ZFV |
| 4 | VCIP | REALIZING VCC FUNCTION.<br>EXTERNALLY PROVIDING MEMORY AND CONVERTING CELL1-6 OCT DATA TO A VALUE WRITTEN TO MEMORY.<br>AS SRAM, 64K × 16BIT CMOS SRAM<br>(TC551664J-20 : FROM TOSHIBA) | MBCG21503-609ZFV<br>E76L-0025-0269##<br>5164-20 |
| 5 | 2/1 SEL | DATA, ADD, SELECTOR OF CONTROL LINE, AND ACT-BSGC ARE SELECTED FROM HOME/MATE SYSTEM STARTING NUMBER BSGC. | ———— |

FIG. 757

HSF00A/HSF04A

| NO | FUNCTION BLOCK NAME | OUTLINE OF FUNCTIONS | MAIN LSI |
|---|---|---|---|
| 1 | FIFO | MEMORY FOR USE IN CONVERTING FROM 19M, 8 PARALLEL TO 1M, 8 PARALLEL | IDT 7206-20 |
| 2 | 8 ⇨ 4 CONV | CONVERTING PARALLEL WIDTH FROM 8 TO 4 TO INTERFACE WITH BSGC<br>2M, 8BIT ⇨ 4M, 4BIT | ——— |
| 3 | 2/1 SEL (a) | BSGC-DIRECTION LOOPBACK SELECTOR | ——— |
| 4 | 2/1 SEL (b) | HOME/MATE SYSTEM SELECTOR IN BSGC DIRECTION SELECTING ACT-BSGC | ——— |
| 5 | 4 ⇨ 8 CONV | CONVERTING PARALLEL WIDTH FROM 4 TO 8 TO INTERFACE WITH BSGC<br>4M, 4BIT ⇨ 2M, 8BIT | |
| 6 | 53/54 CONV | CONVERTING CELL VALID OCT LENGTH 53OCT (CARP LSI SPECIFICATION)<br>CONVERSION FOR 54OCT IN SW | MB632607-G (CELL FIFO) |

FIG. 758

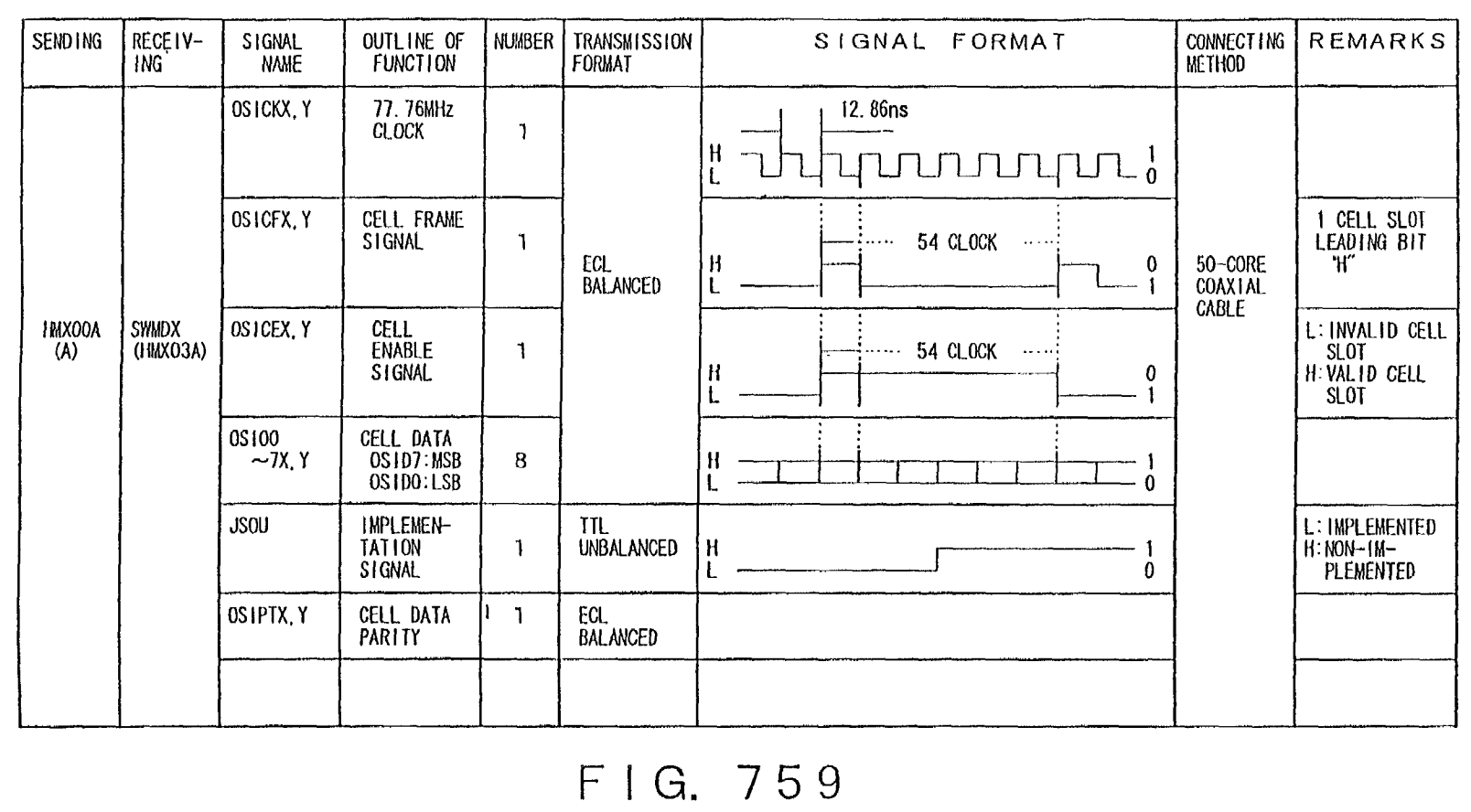

| SENDING | RECEIV-ING | SIGNAL NAME | OUTLINE OF FUNCTION | NUMBER | TRANSMISSION FORMAT | SIGNAL FORMAT | CONNECTING METHOD | REMARKS |
|---|---|---|---|---|---|---|---|---|
| IMX00A (A) | SWMDX (IMX03A) | OSICKX, Y | 77.76MHz CLOCK | 1 | ECL BALANCED | 12.86ns H L 1 0 | 50-CORE COAXIAL CABLE | |
| | | OSICFX, Y | CELL FRAME SIGNAL | 1 | | 54 CLOCK H L 0 1 | | 1 CELL SLOT LEADING BIT "H" |
| | | OSICEX, Y | CELL ENABLE SIGNAL | 1 | | 54 CLOCK H L 0 1 | | L: INVALID CELL SLOT H: VALID CELL SLOT |
| | | OSI00 ~7X, Y | CELL DATA OSID7: MSB OSID0: LSB | 8 | | H L 1 0 | | |
| | | JSOU | IMPLEMEN-TATION SIGNAL | 1 | TTL UNBALANCED | H L 1 0 | | L: IMPLEMENTED H: NON-IM-PLEMENTED |
| | | OSIPTX, Y | CELL DATA PARITY | 1 | ECL BALANCED | | | |
| | | | | | | | | |

FIG. 759

| SENDING | RECEIVING | SIGNAL NAME | OUTLINE OF FUNCTION | NUMBER | TRANSMISSION FORMAT | SIGNAL FORMAT | CONNECTING METHOD | REMARKS |
|---|---|---|---|---|---|---|---|---|
| SWMDX (HMX03A) | HMX00A (A) | ISICKX, Y | 77. 76MHz CLOCK | 1 | ECL BALANCED | 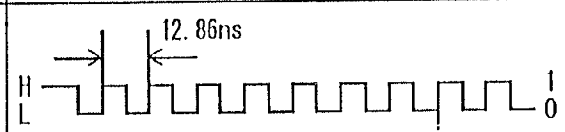  | 50-CORE COAXIAL CABLE | |
| | | ISICFX, Y | CELL FRAME SIGNAL | 1 | | 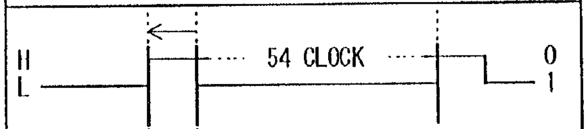  | | CELL SLOT LEADING BIT 'H' |
| | | ISICEX, Y | CELL ENABLE SIGNAL | 1 | | 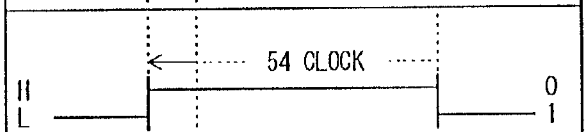  | | L: INVALID CELL SLOT H: VALID CELL SLOT |
| | | ISI00-7X, Y | SELF DATA IMDX7 : MSB IMDX0 : LSB | 8 | | 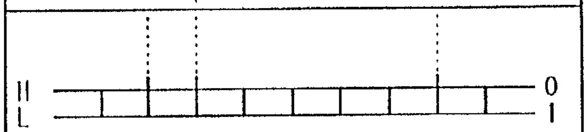 | | |
| | | ISIPTX, Y | CELL DATA PARITY | 1 | | | | |
| | | | | | | | | |
| | | | | | | | | |

| SENDING | RECEIV-ING | SIGNAL NAME | OUTLINE OF FUNCTION | NUMBER | TRANSMISSION FORMAT | SIGNAL FORMAT | CONNECTING METHOD | REMARKS |
|---|---|---|---|---|---|---|---|---|
| HSF04A | SWTIF (HNC00A) | | LOWER ORDER $\mu$P FAULT SIGNAL | 2 | PSEUDO ECL BALANCED | 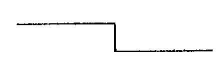 H L 1 0 | 12-PAIR AC BUS CABLE | L : VALID H : INVALID |
| | | | LOWER ORDER DEVICE IM-PLEMENTATION SIGNAL | 2 | | 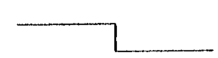 H L 1 0 | | L : IMPLEMENTED H : NON-IMPLEMENTED |

(b)

| SENDING | RECEIV-ING | SIGNAL NAME | OUTLINE OF FUNCTION | NUMBER | TRANSMISSION FORMAT | SIGNAL FORMAT | CONNECTING METHOD | REMARKS |
|---|---|---|---|---|---|---|---|---|
| SWTIF (HNC00A) | HSF04A | | SENDING/ RECEIVING CLOCK | 2 | PSEUDO ECL BALANCED | 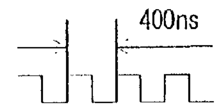 400ns H L 1 0 | 12-PAIR AC BUS CABLE | |
| | | | LU SYSTEM SELECTION SIGNAL | 2 | | 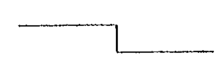 H L 1 0 | | L:0 SYSTEM SELECT INSTRUCTION H:1 SYSTEM SELECT INSTRUCTION |
| | | | LU SYSTEM SELECTION STROBE SIGNAL | 2 | |  H L 1 0 | | L: VALID H: INVALID |

FIG. 761

| FUNCTION BLOCK NAME | OUTLINE OF FUNCTION | MAIN LSI |
|---|---|---|
| MPU | MAIN CONTROL PROCESSOR 8MHz OPERATION. INF INTERFACE/SUBCRIBER, INTER-DEVICE LAP CONTROL | INTEL80C186 |
| ROM | 64 KBYTE X 4 PHASE BAND CONFIGURATION | HN27C4096G-10 |
| RAM | SRAM - 32 KBYTE | MB84256A |
| | DRAM - 896 KBYTE | MB81256 X 4<br>81C4256 X 8 |
| DMC | DETECTING DRAM CONTROL, MEMORY WRITE PROTECT, AND MATE SYSTEM CLOCK DISCONNECTION. DETECTING MATE SYSTEM POWER SOURCE DISCONNECTION | MB670639 |
| CARP-1 | MULTIPLEXING LSI CAPABLE OF SIMULTANEOUSLY OPERATING UP TO 16 CH CELL DISASSEMBLY AND ASSEMBLY BY SUPPORTING TYPSE-3 OF ATM LAYER OF B-ISDN PROTOCOL AND CELL DISASSEMBLY/ASSEMBLY SUBLAYER (SAR) | MBCG31134-602 |
| CARP-2 | CARP-2 IS CONNECTED TO CARP-1 AND TRANSFERS TRANSMISSION DATA IN MEMORY TO SW IN DMA OPERATION AS TRANSMISSION PROCESS | MB630615 |
| SIC | FOR SYSTEM CROSS-CONNECTION, PARALLEL DATA FROM CPU IS CONVERTED INTO SERIAL DATA FOR COMMUNICATIONS | MB674602 |
| SOS | LSI FOR PERFORMING 80186 CPU REALTIME COMPASS III PROCESS AT HIGH SPEED | MB602773 |
| SBIF | DATA TRANSFER PROCESS BETWEEN INF INTERFACE AND CPU BUS. COMMAND ACTIVATION IS REALIZED AND REPORTED THROUGH INTERRUPTION TO CPU. DATA TRANSMISSION DMA IS SPECIFIED FOR REG IN SBIF | MB651623 |
| DRV/REV | ELECTRICAL CHANGE IS MADE IN INF INTERFACE (V.11) | MB412/MB413 |

FIG. 771

| No. | INSTRUCTION TYPE | IN/OUT | READ/WRITE | REMARKS |
|---|---|---|---|---|
| 1 | COMMAND ACTIVATION | OUT | WRITE | |
| 2 | RETRY INSTRUCTION | OUT | WRITE | |
| 3 | MSCN READ | IN | READ | |
| 4 | TEST LOOPBACK DATA WRITE | OUT | WRITE | |
| 5 | TEST LOOPBACK DATA READ | IN | READ | |

FIG. 774

■ ...... INDICATES 2-1 SEL. SELECT LOGIC CIRCUIT. NORMALLY ACT-BSGE IS SELECTED.

| ACT SYSTEM TEST | SBY SYSTEM TEST | OUS STATE |
|---|---|---|
| SINCE COMMUNICATIONS IS ESTABLISHED BY SIMPLE LAP PROTOCOL, NO TEST IS MADE | SINCE SIMPLE LAP PROTOCOL COMMUNICATIONS ARE MADE FROM BSGC OF ACT SYSTEM TO SW OF SBY SYSTEM, NO TEST IS MADE AS IN ACT SYSTEM | CONTINUITY TEST IS MADE CELL-BY-CELL LOOPBACK IS MADE BY BSGC-COM CELL-BY-CELL LOOP TRIGGER IS O-BIT IN ATM HEADER |

F I G. 778

| INPUT MID | TAG | OUTPUT MID |
| --- | --- | --- |
| | | |
| | | |
| | | |
| | ⋮ | ⋮ |
| | | |

FIG. 784

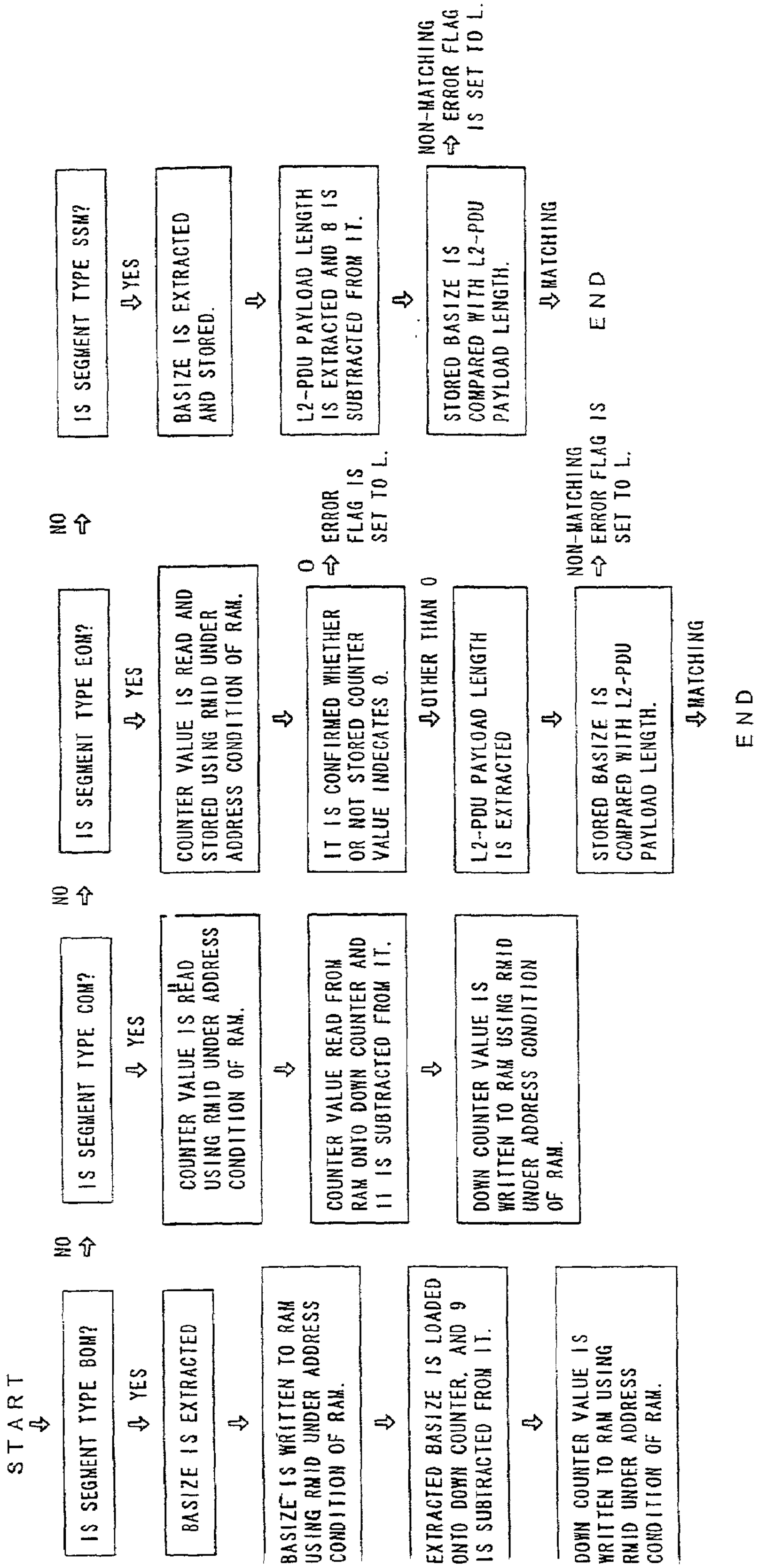
F I G. 7 9 8

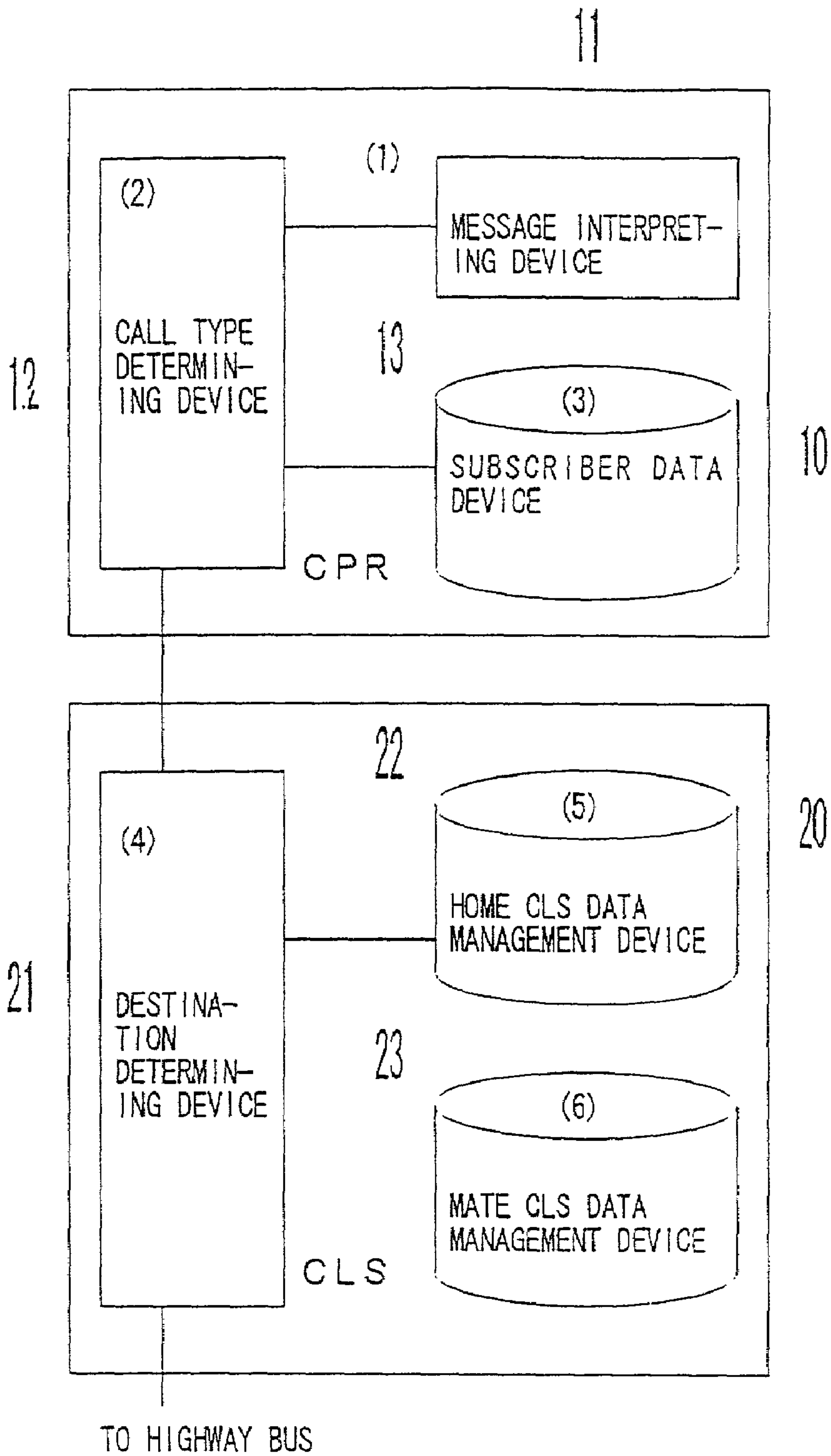
F I G. 803

(a) MANAGEMENT DATA ADDRESSED TO HOME CLS

| TELEPHONE NUMBER | CONNECTION ID |
|---|---|
| 0001 | VCI=112, VPI=100 |
| 0002 | VCI=113, VPI=100 |
| 0003 | VCI=114, VPI=100 |
| 0004 | VCI=115, VPI=100 |
| . . . . | . . . . |

(b) MANAGEMENT DATA ADDRESSED TO MATE CLS

| TELEPHONE NUMBER | CLS IDENTIFICATION NUMBER |
|---|---|
| 1001 | 0002 |
| 1002 | 0002 |
| 1003 | 0003 |
| 1004 | 0003 |
| . . . . | . . . . |

FIG. 804

VCC : ROUTING SYMBOL ASSIGNING UNIT
LAP : LAP COMMUNICATING UNIT
μP : MICROPROCESSOR
MUX : MULTIPLEXING
DMUX : DEMULTIPLEXING

------ CELL DATA FLOW

| | |
|---|---|
| 00H | DISCARD CELL NUMBER LOWER 8 bit |
| 01H | DISCARD CELL NUMBER 8 bit |
| 02H | DISCARD CELL NUMBER 8 bit |
| 03H | DISCARD CELL NUMBER HIGHER 8 bit |
| 04H | PASSING CELL NUMBER LOWER 8 bit |
| 05H | PASSING CELL NUMBER 8 bit |
| 06H | PASSING CELL NUMBER 8 bit |
| 07H | PASSING CELL NUMBER HIGHER 8 bit |
| | |

FIG. 820

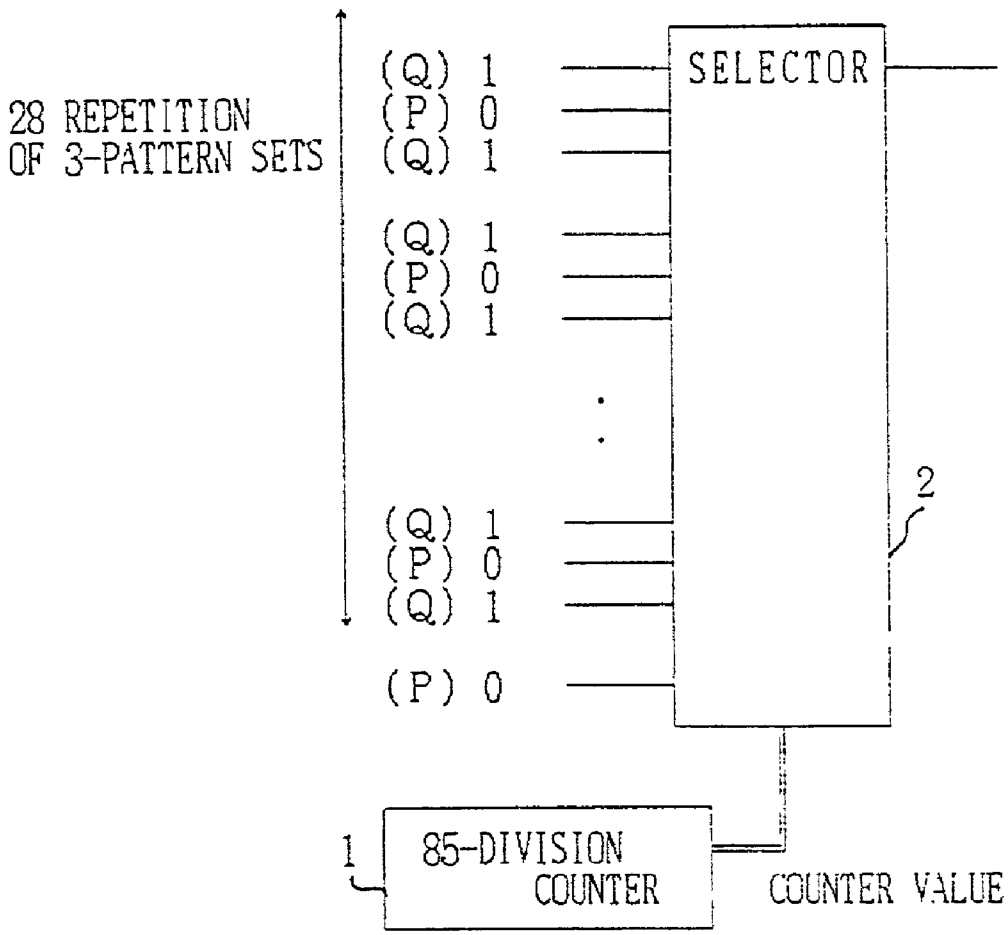
F I G. 8 3 0

| SYSTEM | MERITS | DEMERITS |
|---|---|---|
| TRUNK SYSTEM | · EASY TO CONTROL SWITCHES ONLY POINT-TO-POINT CONNECTION<br>· REASSIGNMENT OF VPI/VCI IS NOT REQUIRED | · TRUNK IS REQUIRED<br>· NUMBER OF PATHS DEPENDS ON CAPACITY OF TRUNK<br>· BAND OF PATH SUPPORTED BY SYSTEM DECREASES FOR TRUNKS<br>· DOUBLE DELAY OVER POINT-TO-POINT CONNECTION BECAUSE OF TEMPORARY ACCOMMODATION IN TRUNK |
| INPUT COPY SYSTEM | · EASY TO CONTROL SWITCHES ONLY POINT-TO-POINT CONNECTION | · REASSIGNMENT OF VPI/VCI IS REQUIED<br>· COPYING FUNCTION SHOULD BE ADDED<br>· BAND OF PATH SUPPORTED BY SYSTEM DECREASES FOR COPY IN PREVIOUS STEP |
| INTERNAL COPY SYSTEM | · BAND OF PATH SUPPORTED BY SYSTEM IS ALLOWED FOR MAXIMUM CAPACITY OF SYSTEM | · REASSIGNMENT OF VPI/VCI IS REQUIRED<br>· COPYING FUNCTION SHOULD BE INCORPORATED.<br>· COMPLICATED SWITCH CONTROL |

FIG. 833

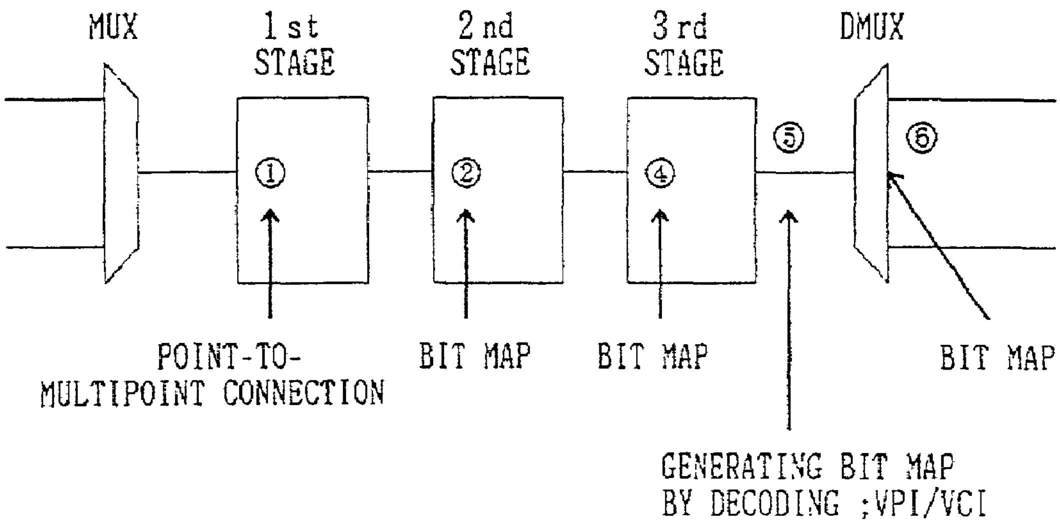
F I G. 8 3 4

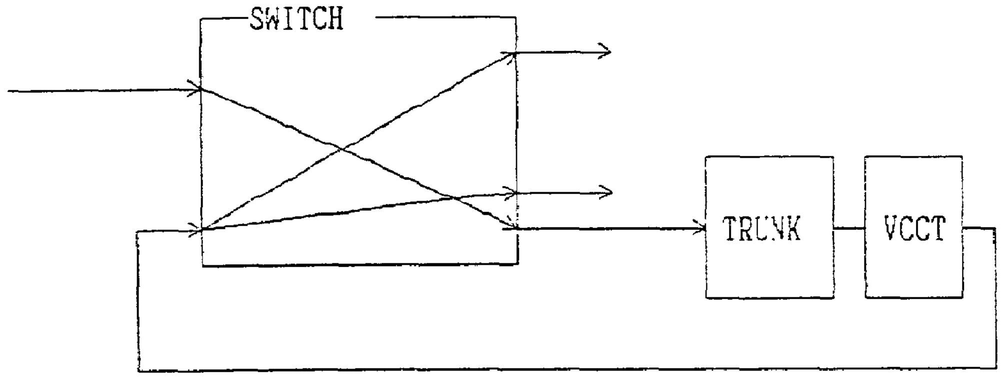
F I G. 8 3 5

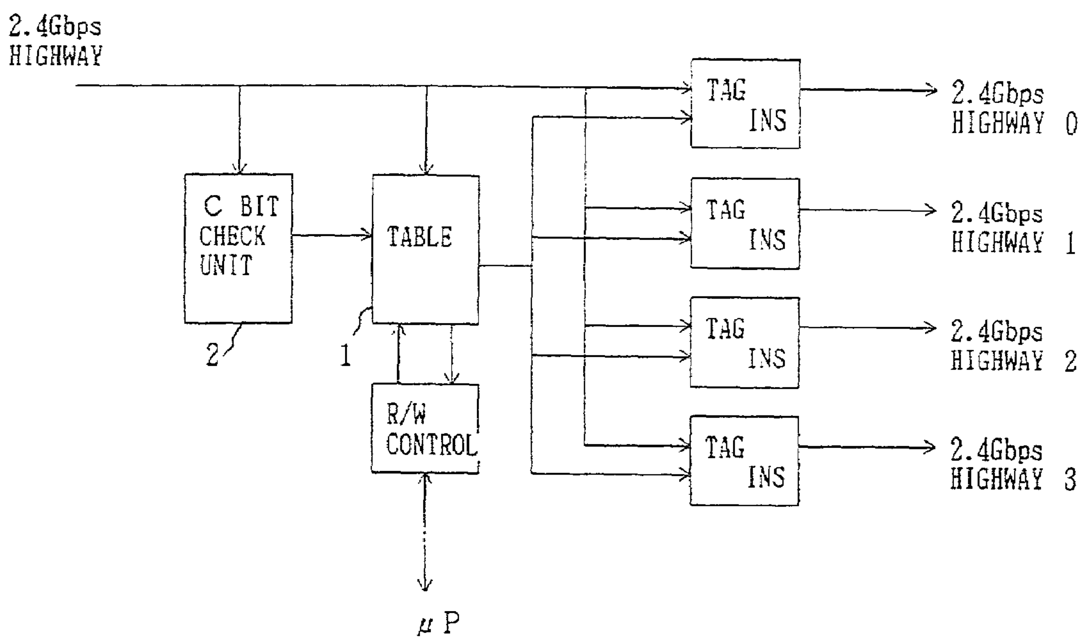
F I G. 8 3 6

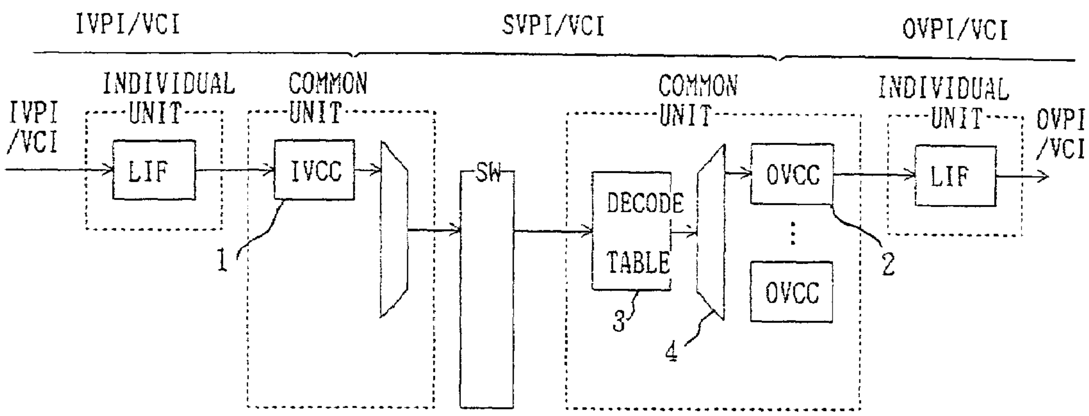
F I G. 8 3 7

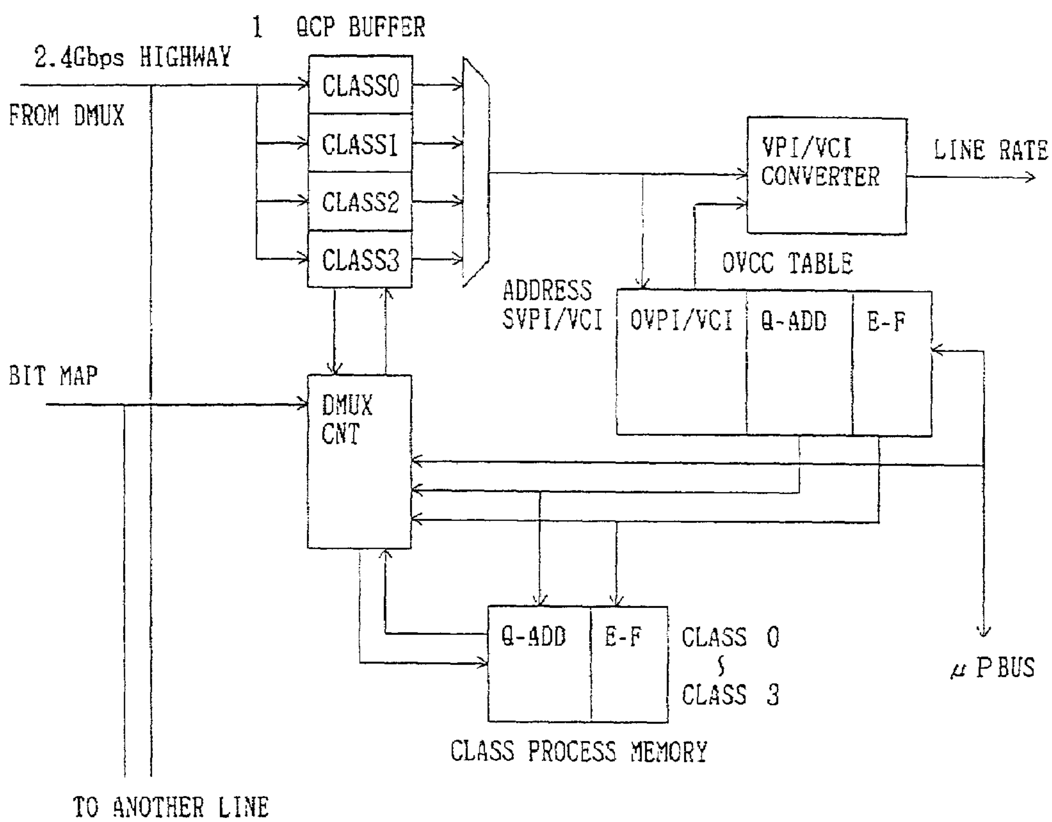
F I G. 8 3 8

| | ADDRESS | CONTENTS OF OVCC TABLE OVPI/VCI | Q-ADD | E-F |
|---|---|---|---|---|
| POINT-TO POINT CONNECTION | SVPI/VCI | OVPI/VCI | D.C. | 1 |
| POINT-TO-MULTIPOINT CONNECTION | SVPI/VCI | OVPI/VCI | ADDRESS | x |

F I G. 8 3 9

| ADDRESS | OVPI/VCI | Q-ADD | E-F | |
|---|---|---|---|---|
| a | b0 | c0 | 0 | ← CELL TO TRANSMISSION 1 |
| c0 | b1 | c1 | 0 | ← CELL TO TRANSMISSION 2 |
| c1 | b2 | c2 | 0 | ← CELL TO TRANSMISSION 3 |
| c2 | b3 | D.C. | 1 | ← CELL TO TRANSMISSION 4 |

F I G. 8 4 0

ADD-CHK : CONVERTING VPI/VCI INTO ADDRESS ON TABLE

IVPI/VCI CNV : CONVERSION FROM IVPI/VCI INTO SVPI/VCI
SVPI/VCI CNV : CONVERSION FROM SVPI/VCI INTO OVPI/VCI

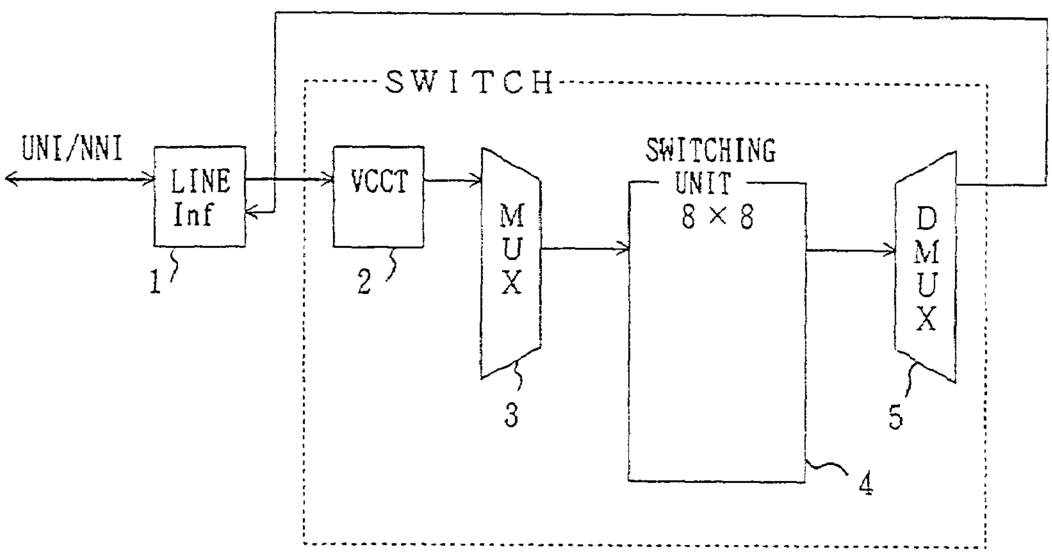
F I G. 8 4 5

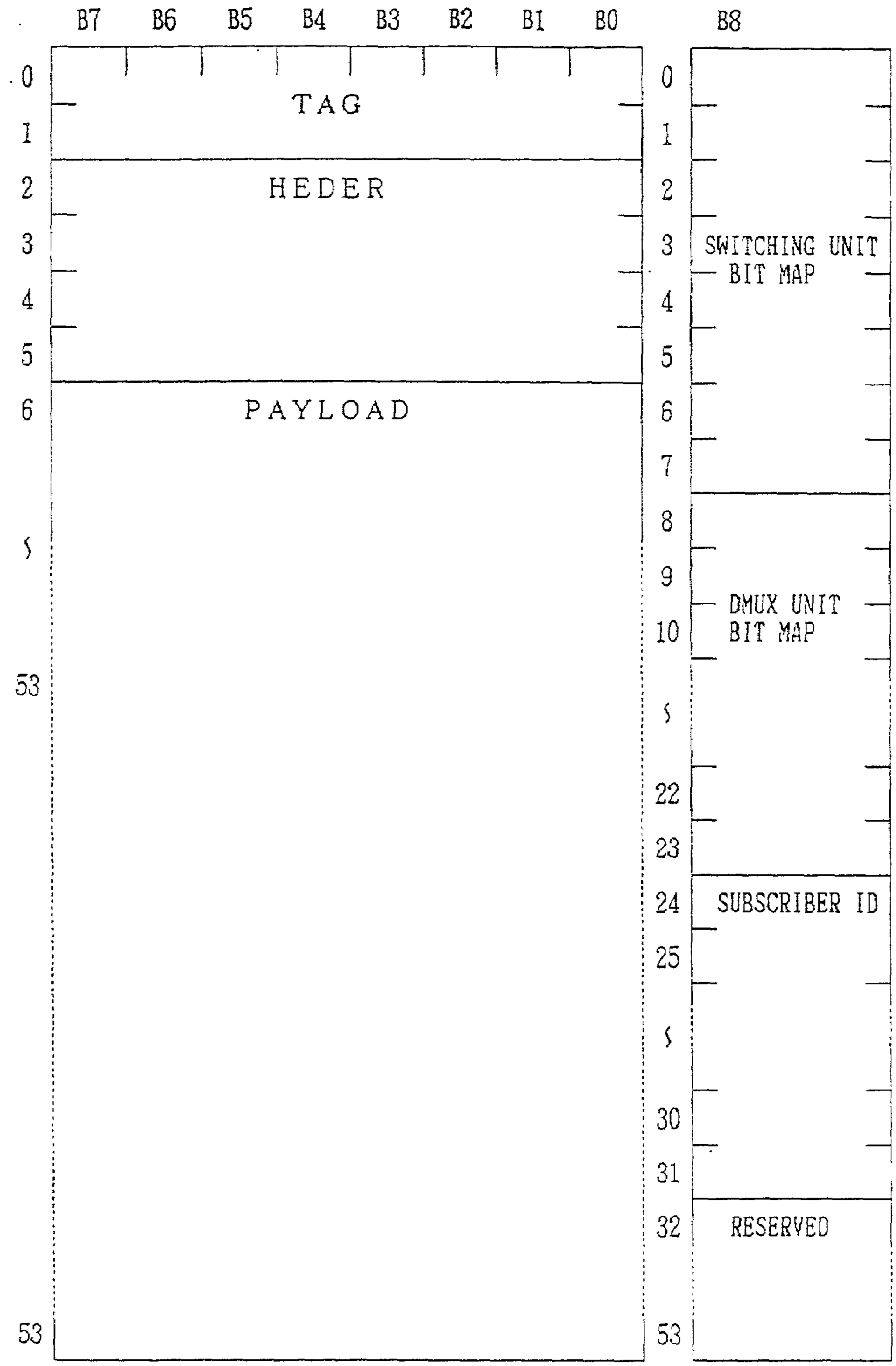
F I G. 8 4 6

(a)

(b)

| | | | | | | | |
|---|---|---|---|---|---|---|---|
| 0 | 1 | 1 | 0 | 1 | 1 | 0 | 0 |

SWITCHING UNIT BIT MAP

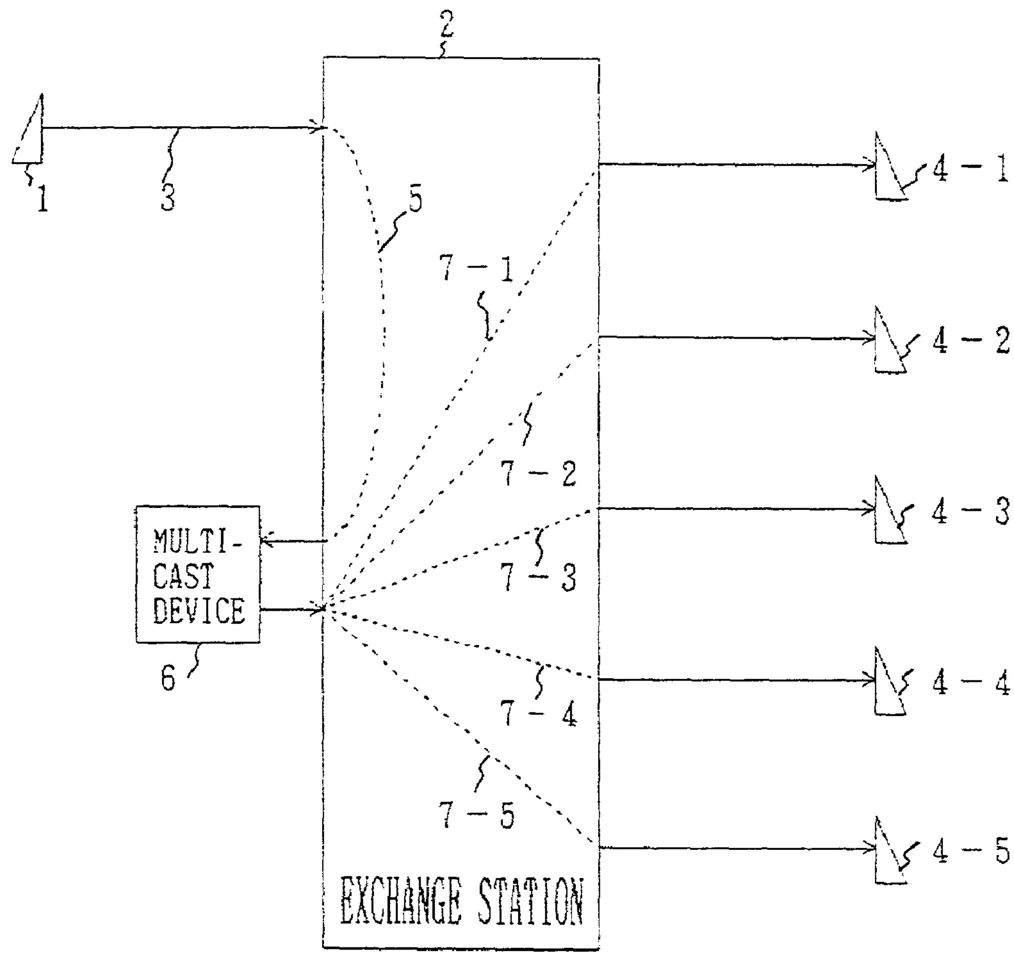
F I G. 8 4 8

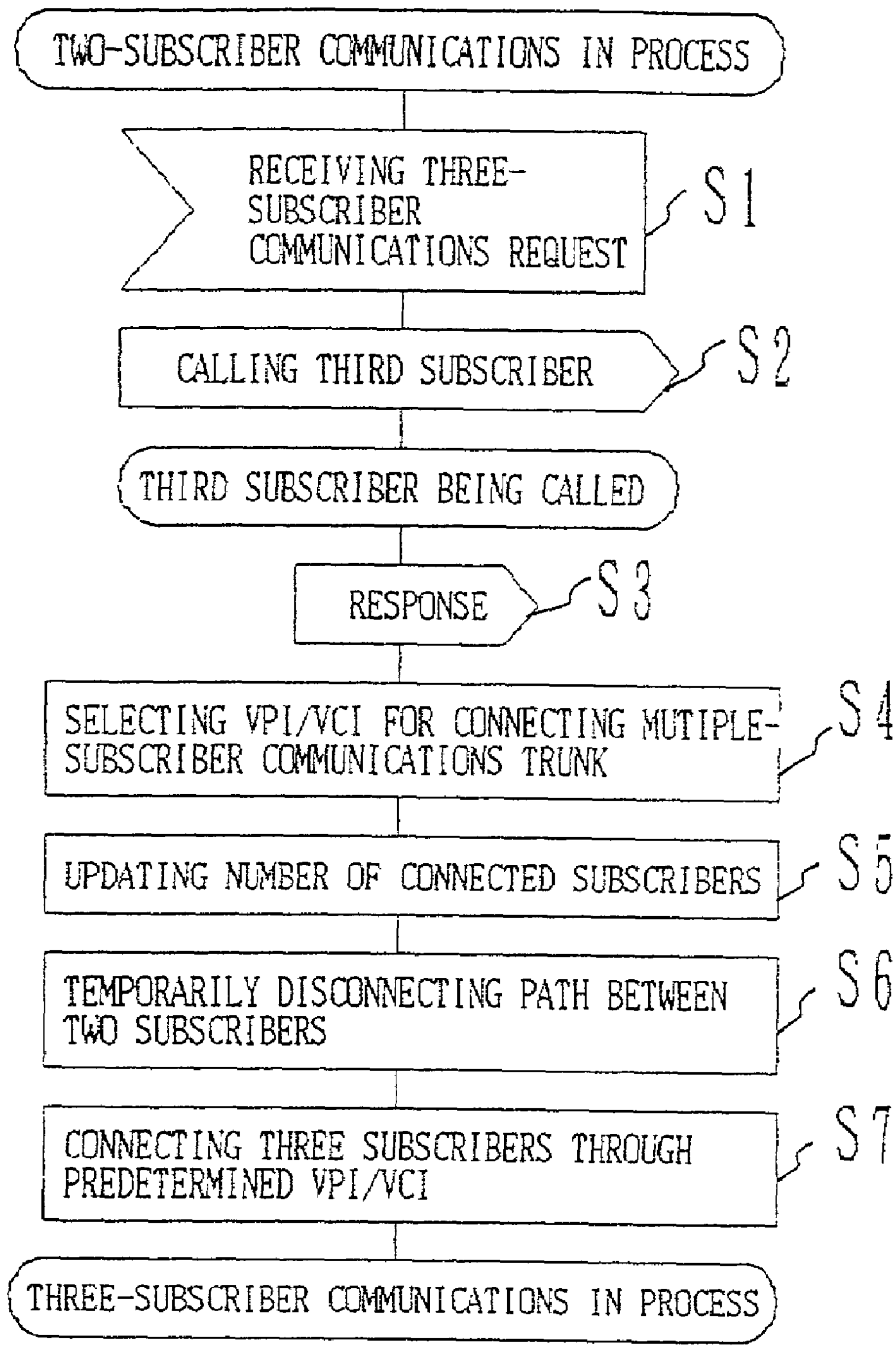
F I G. 8 5 3

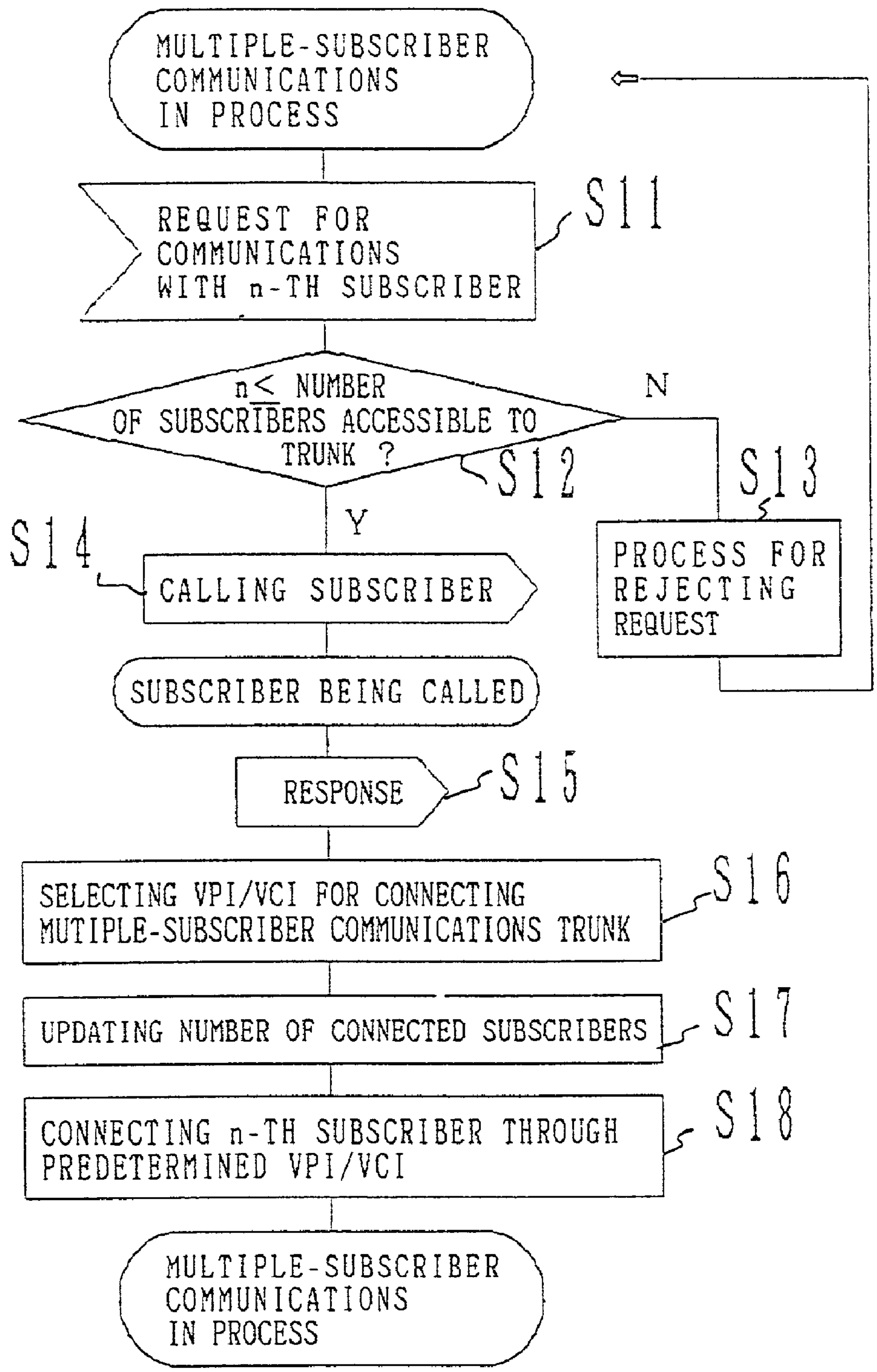
F I G. 854

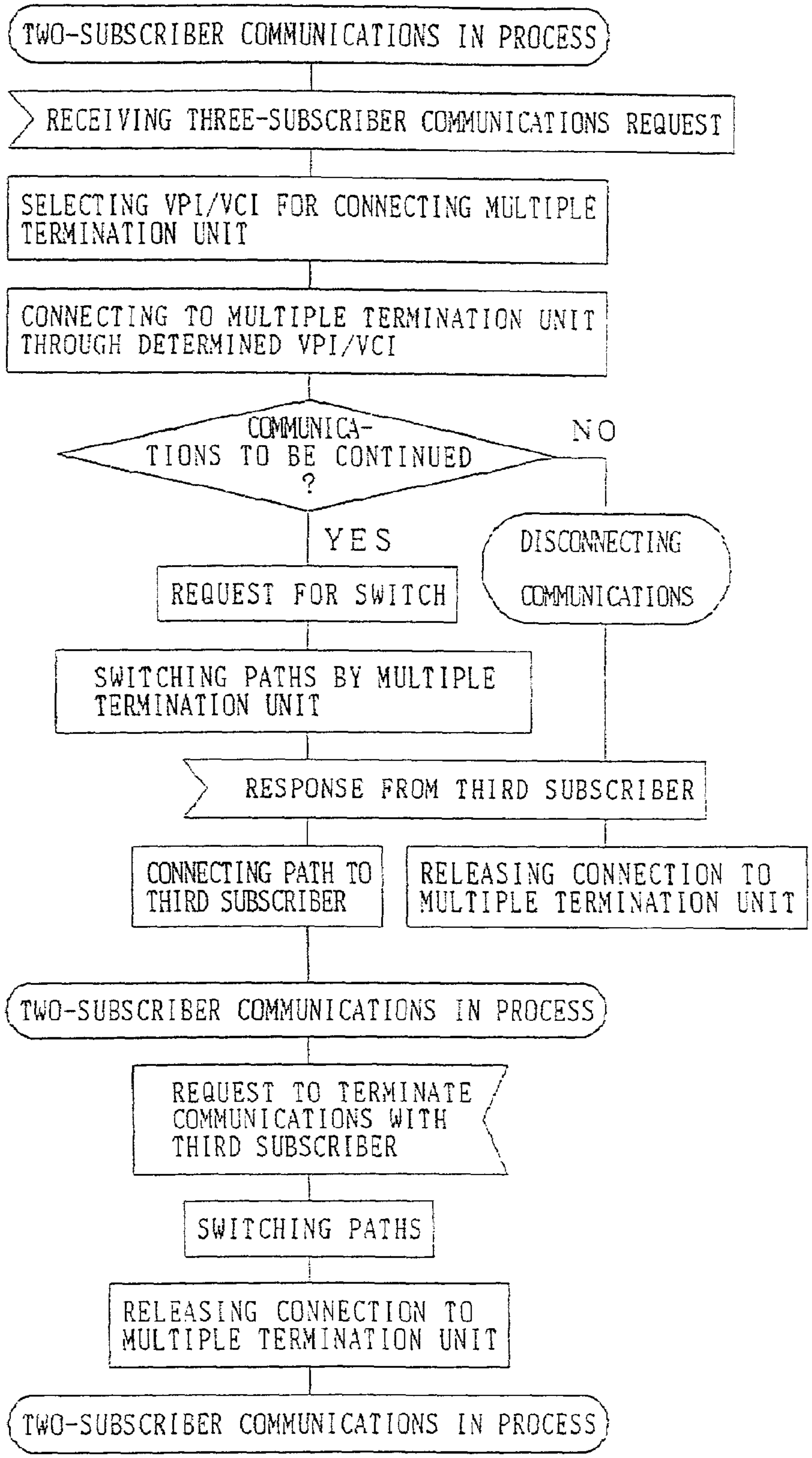
F I G. 862

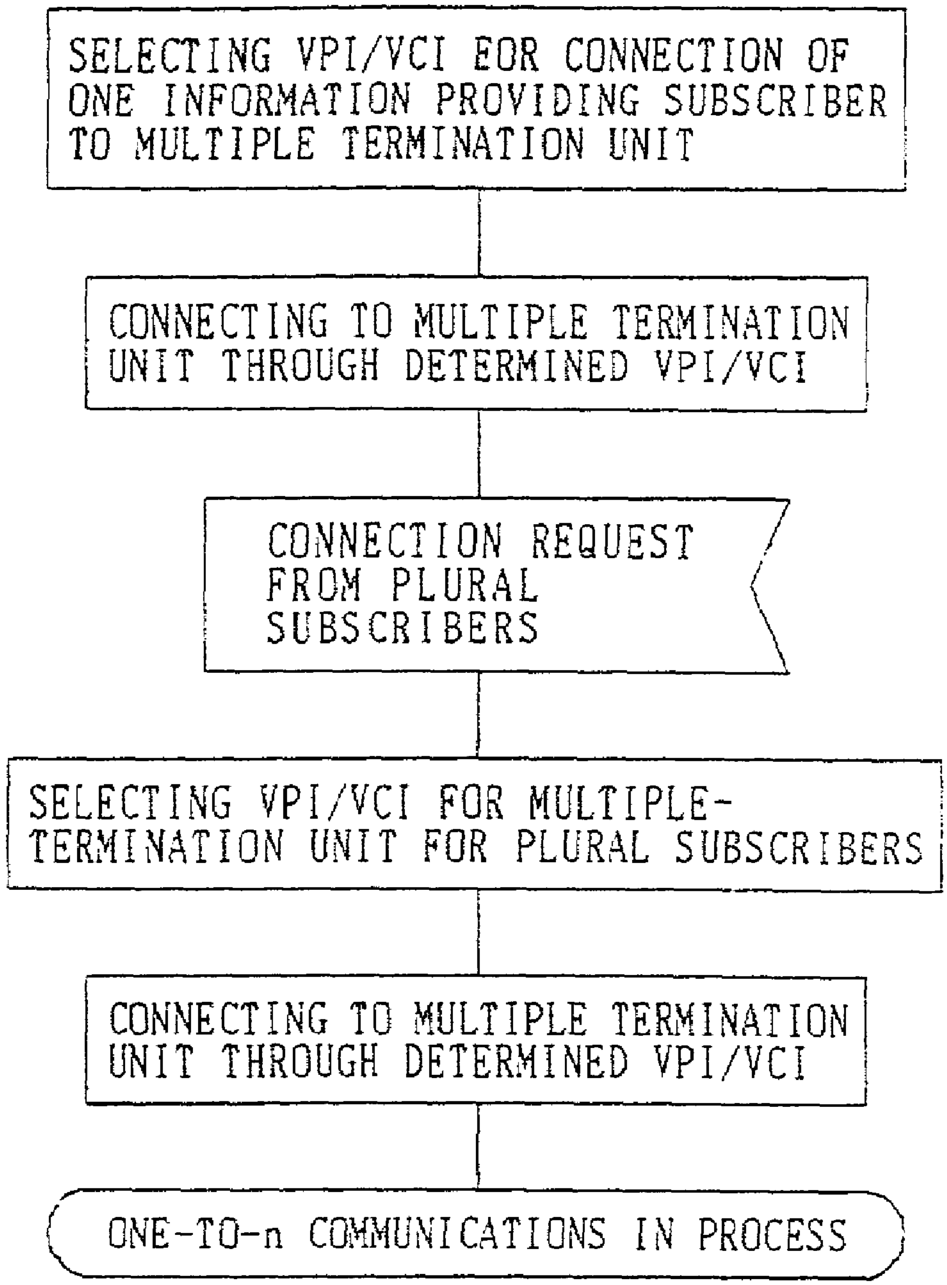
F I G. 8 6 5

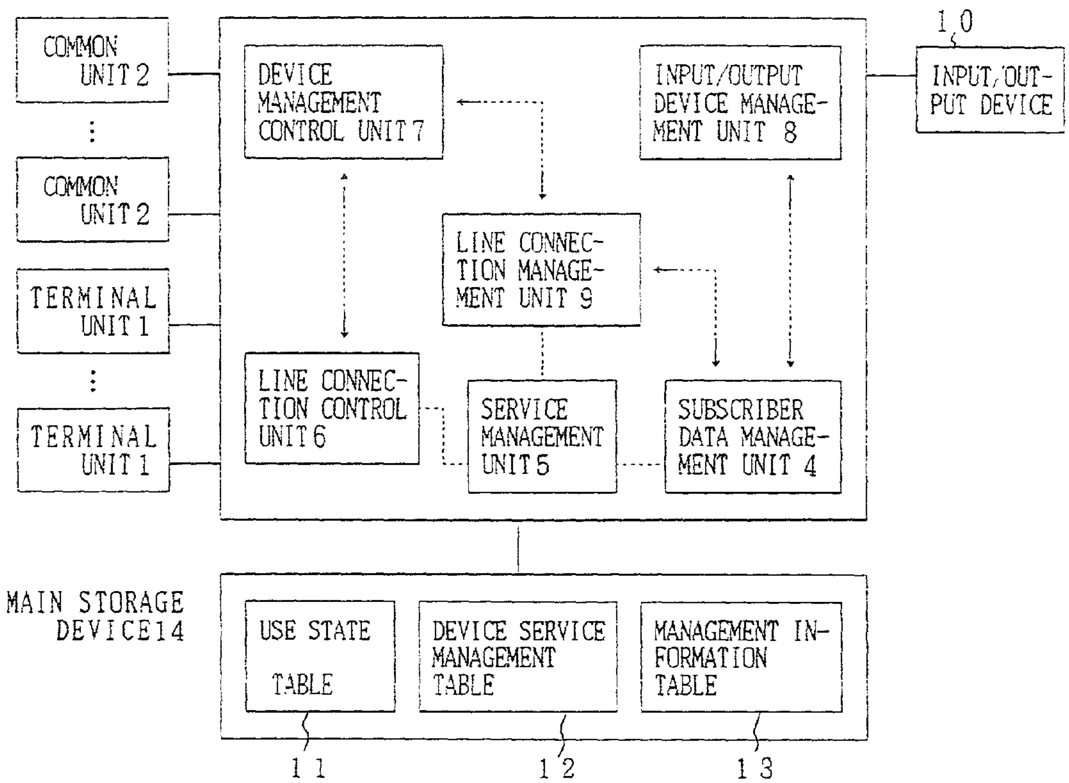
F I G. 8 6 7

(I) CELL TYPE LEVEL ······ OAM CELL, INTRA-STATION LAP CELL, COMMON CELL, TEST CELL, ETC.
(II) SERVICE LEVEL ······ FR, SMDS, CR, CE, ETC.
(III) AVAILABLE BAND LEVEL··· DEFINING PRIORITY OR NON-PRIORITY DEPENDING ON SIZE OF AVAILABLE BAND.
(IV) LINE TYPE LEVEL ······ OC3, OC12, ETC.

| CELL TYPE | CELL SIGNAL NAME | PRIORITY LEVEL |
|---|---|---|
| OAM CELL | AIS (WARNING DISPLAY SIGNAL)<br>FERF (REMOTE TERMINAL RECEPTION FAULT)<br>PERFORMANCE MONITOR SIGNAL etc | 1 |
| INTRA-STATION LAP CELL | TRAFFIC INFORMATION<br>BILLING INFORMATION<br>PERFORMANCE INFORMATION etc | 2 |
| COMMON CELL | PRIORITY BIT ON INFORMATION IN CELL FOR EACH SERVICE (WITH 1 PIECE OF INFORMATION FOR CELL CONTAINING SMALL AMOUNT OF INFORMATION OR SMALL NUMBER OF CELLS) | 3 |
| | PRIORITY BIT ON INFORMATION IN CELL FOR EACH SERVICE (WITH 1 PIECE OF INFORMATION FOR CELL CONTAINING LARGE AMOUNT OF INFORMATION OR LARGE NUMBER OF CELLS) | 4 |
| | PRIORITY BIT OFF INFORMATION IN CELL FOR EACH SERVICE (WITH 1 PIECE OF INFORMATION FOR CELL CONTAINING SMALL AMOUNT OF INFORMATION OR SMALL NUMBER OF CELLS) | 5 |
| | PRIORITY BIT OFF INFORMATION IN CELL FOR EACH SERVICE (WITH 1 PIECE OF INFORMATION FOR CELL CONTAINING LARGE AMOUNT OF INFORMATION OR LARGE NUMBER OF CELLS) | 6 |
| TEST CELL | CELL LOOPBACK TEST INFORMATION<br>LOOPBACK TEST INFORMATION etc | 7 |

FIG. 878

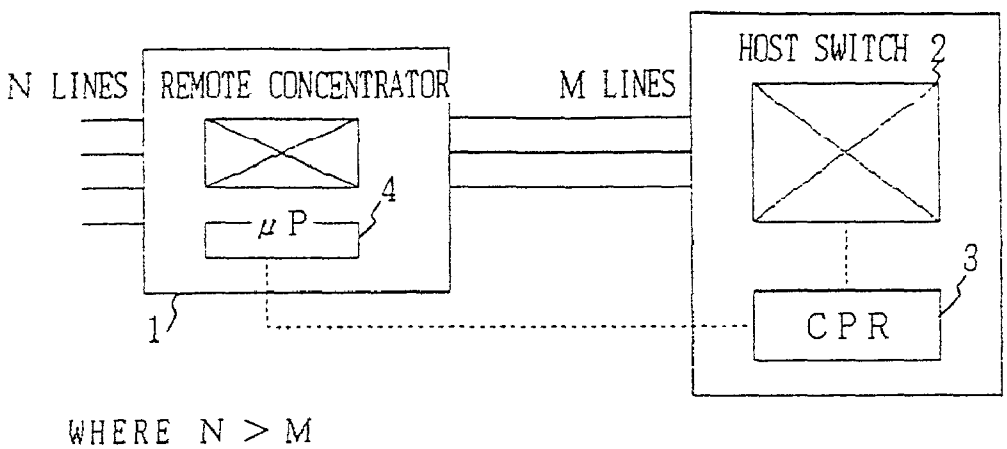
F I G. 8 7 9

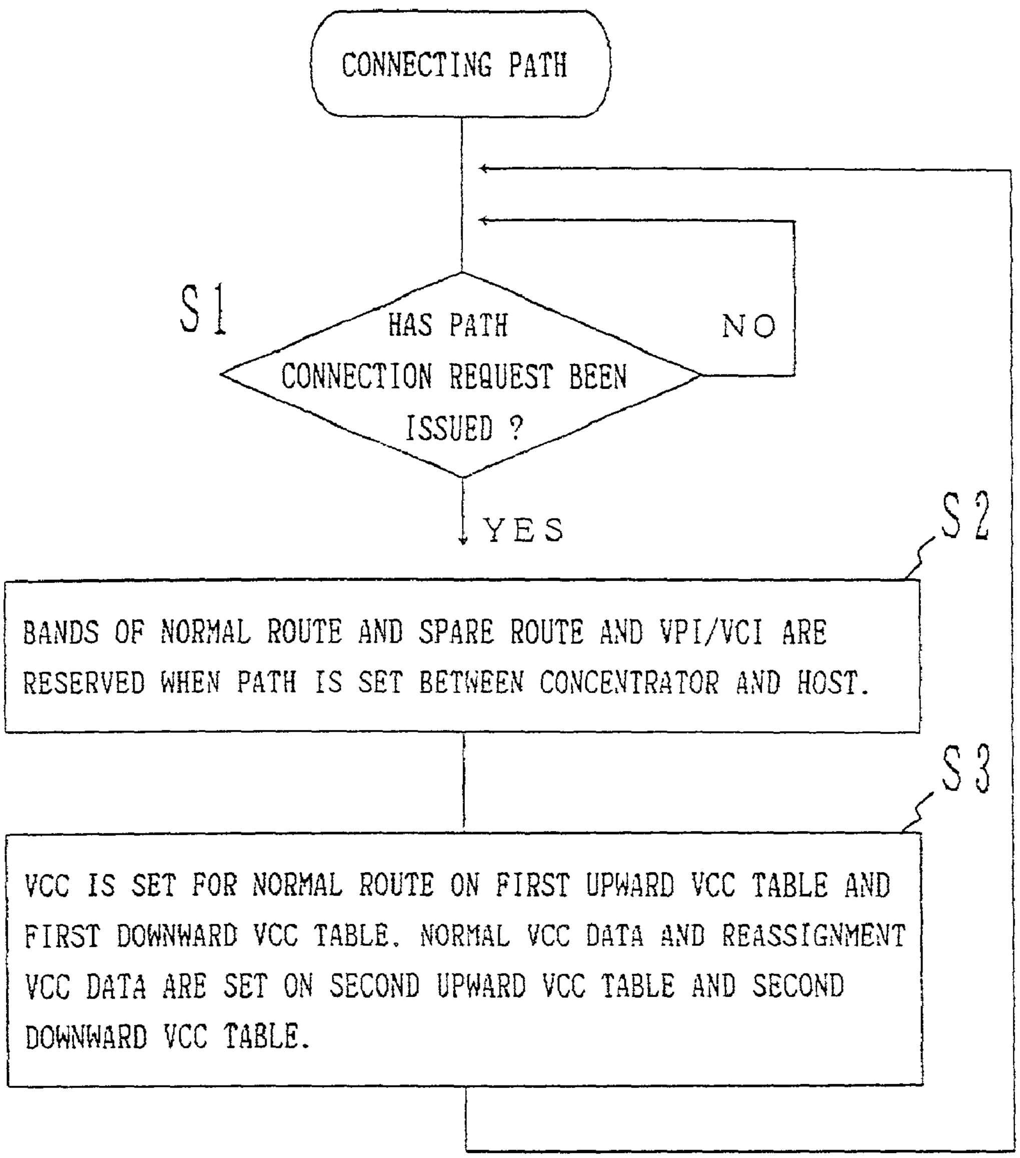
F I G. 8 8 3

| NORMAL VCC DATA | | | REASSIGNMENT VCC DATA | | |
|---|---|---|---|---|---|
| OUTPUT VCC | OUTPUT VCI | TAG | OUTPUT VPI | OUTPUT VCI | TAG |
| AAAA | BBBB | #1 | CCCC | DDDDD | #4 |

F I G. 884

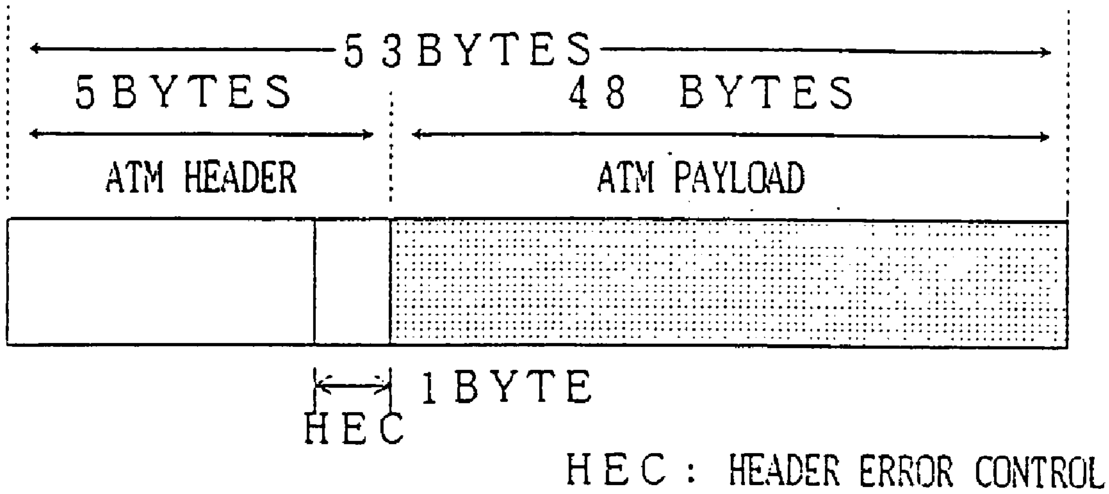
(a) CONFIGURATION OF ATM CELL
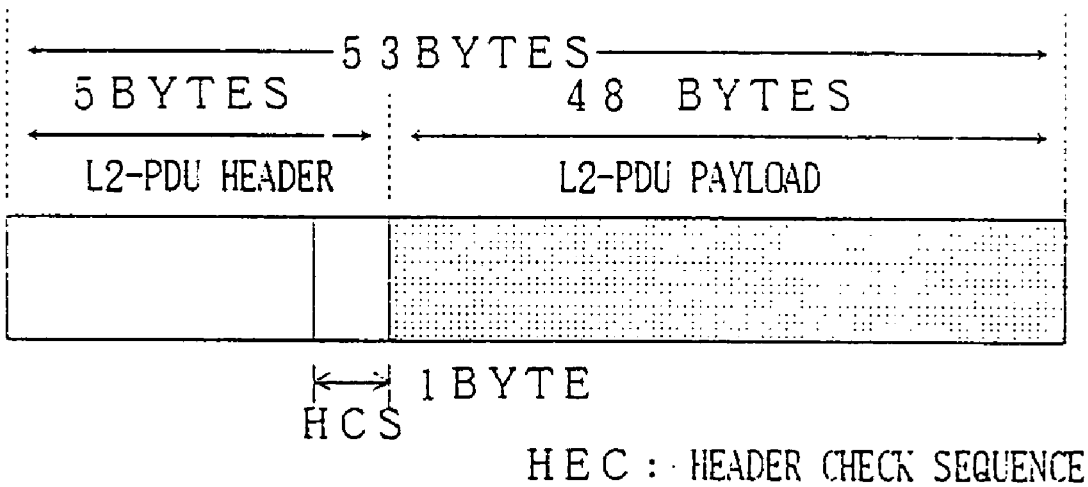
(b) CONFIGURATION OF SMDS CELL
FIG. 907
(Prior Art)

PLCP HEADER: 2BYTES | 1BYTE | 1BYTE — PLCP PAYLOAD: 53 (OCTET)

12 STEPS

| | | POH1 | POH | | |
|---|---|---|---|---|---|
| A1 | A2 | P11 | Z6 | 1st L2-PDU | |
| A1 | A2 | P10 | Z5 | L2-PDU | |
| A1 | A2 | P9 | Z4 | L2-PDU | |
| A1 | A2 | P8 | Z3 | L2-PDU | |
| A1 | A2 | P7 | Z2 | L2-PDU | |
| A1 | A2 | P6 | Z1 | L2-PDU | |
| A1 | A2 | P5 | F1 | L2-PDU | |
| A1 | A2 | P4 | B1 | L2-PDU | |
| A1 | A2 | P3 | G1 | L2-PDU | |
| A1 | A2 | P2 | M2 | L2-PDU | |
| A1 | A2 | P1 | M1 | L2-PDU | 13/14 NIBBLES |
| A1 | A2 | P0 | C1 | 12th L2-PDU | TRAILER |

A1, A2 : FRAME ALIGNMENT
POHI (P11~P0) : PATH OVERHEAD IDENTIFIER OCTET
POH : PATH OVERHEAD OCTET
Z6~Z1 : GROSS OCTET
F1 : PLCP PATH USER CHANNEL
B1 : BIT INTERVAL PARITY 8
G1 : PLCP PATH STATUS
M2~M1 : SIP LEVEL 1 CONTROL INFORMATION
C1 : CYCLE STUFF COUNTER

FIG. 908

(Prior Art)

| ITEM | | BIT PATTERN | REMARKS |
|---|---|---|---|
| C1 | CYCLE STUFF COUNTER | | TL IS REPRESENTED BY 4 TYPES OF C1 AS SHOWN BELOW BECAUSE TRAILER LENGTH TL PERIODICALLY CHANGES IN DS3 PLCP FRAME. |
| | | 11111111 | ⇒ FIRST TYPE (TL=13) |
| | | 00000000 | ⇒ SECOND TYPE (TL=14) |
| | | 01100110 | ⇒ THIRD TYPE (TL=13 : NO STUFF) |
| | | 10011001 | ⇒ THIRD TYPE (TL=14 : STUFF) |
| TRAILER | | 1100 | LENGTH DEPENDS ON C1 BYTE VALUE. |

FIG. 909

(Prior Art)

INTRA-STATION CONTROL SYSTEM FOR CONNECTIONLESS COMMUNICATIONS SYSTEM

This is a Division of application Ser. No. 08/518,110 filed Aug. 21, 1995, now U.S. Pat. No. 6,333,932.

BACKGROUND OF THE INVENTION

1. Field of the Invention

The present invention relates to a connectionless communications system for transmitting data at a high speed, to a method of testing the system, and to an intra-station control system of a switching station for transmitting data at a high speed.

2. Description of the Related Art

Recently, high-performance information processing devices such as work stations, personal computers, etc. have been developed to perform a distribution process in which a number of information processing devices are interconnected through a high speed local area network (LAN). The network connecting such LANs should also be provided with high speed processing capabilities.

One of the services to realize the above described high speed data communications is a switched multi-megabit data service (SMDS). The SMDS is a connectionless data switching service based on the transfer speed of 1.5 Mbps and 45 Mbps.

An asynchronous transfer mode (ATM) system is well known as a method of realizing a broadband ISDN, and the SMDS can be provided through an ATM network. In this case, an SMDS processing server (SMDS message handler) is supplied for a predetermined ATM switch, and a permanent virtual circuit or a permanent virtual channel (PVC) connects an SMDS subscriber with the SMDS processing server accommodating the SMDS subscriber. The connectionless data output from the SMDS subscriber is transferred to the SMDS processing server to perform a routing process, etc. at the server.

The connectionless data normally refers to a variable packet (data frame). However, since the above described PVC is a path to be established in a network, the connectionless data is transferred after being converted (decomposed) into an ATM cell format before it is input to the ATM switch. The cell is a 53-byte structure consisting of a 48-byte payload and a 5-byte header.

The ATM cell format data is temporarily structured as the layer-3 protocol data unit (L3-PDU) or in a data format of a higher-level layer in the SMDS processing server as shown in FIG. 897 to analyze routing information, etc. according to a destination address DA, a source address SA, etc. stored in the L3-PDU. Then, the data is decomposed again into cells to route the data according to the analyzed information.

As described above, the conventional SMDS is limited in its speed because input cells are structured in a higher level layer data format (for example, in L3-PDUs) when the SMDS processing server performs a routing process through software of a microcomputer program, etc. Additionally, such processes as a data copying process performed when a group address is specified as a destination address DA, a traffic smoothing process, an action against no reception of an end-of-message cell (EOM: a cell storing the last portion of data when an L3-PDU is decomposed into a plurality of cells) have been processed through software by microcomputers, etc.

Thus, the conventional SMDS has been limited in its process speed because the processes in the SMDS processing server are performed through various software. Therefore, when connectionless communications data is transmitted using an SMDS, the operations of the transmission line and switch are speed up with the SMDS processing server processes interfering as a bottleneck, thereby preventing an actual high-speed process from being successfully realized. Furthermore, when the above described structuring process in the SMDS processing server, all cells forming each L3-PDU should be temporarily stored. Therefore, the necessary buffer capacity undesirably becomes very large.

In the SMDS, protocol performance is monitored when a service is offered as follows. That is, the formats of various parameters are checked in the data, and counted is the data which has been rejected by the check (the data which cannot be recognized as valid). A predetermined specific type of check is followed by a counting process performed on the rejected data based on a predetermined algorithm. If the resultant value exceeds a predetermined threshold, then output is a threshold crossing alert (TCA) indicating that the threshold is exceeded. Furthermore, an error log is collected each time data is rejected.

The following parameters are collected in the error log.

(1) Destination address DA (2) Source address SA (3) SNI number (subscriber network interface No.)

(4) Error type

In the PVC between the user (subscriber) and the SMDS processing server,

In the PVC between the user (subscriber) and an SMDS processing server, data is transferred in the cell format as described above (actually, the data is transmitted in the ATM cell format and processed in the L2-PDU in the SMDS processing server. The ATM cell and L2-PDU are based on the 53-byte configuration and simply referred to as cells. However, since the above described error log collection is mostly related to the layer 3, the data is received in the cell format and then reassembled into the L3-PDU in the SMDS processing server.

As described above, input cells are reassembled in the data format of the higher order layer (for example, L3-PDU) in the conventional SMDS. This prevents the processes from being performed at a high speed in the SMDS.

The above described services are based on the high reliability of the physical quality of the transmission lines forming the network. Therefore, it is important to test and evaluate the transmission quality of the network.

The test and evaluation of the transmission lines are activated from the OS center (operation center for managing the network) in the connectionless communications service network, and an inter-station loopback test is conducted to confirm the normality of any inter-station link (path between switches). The inter-station loopback test is described below by referring to FIG. 898. In this embodiment, the test is conducted to check the link between SW station 3 and SW station 6.

The test is started by issuing a test connectionless packet transmission request message (test start request) from the OS center 1 to SW station 3. The request message contains an identification information ID indicating terminal SW station 6. SW station 3 generates a test packet with the identification address of terminal SW station 6 set as its destination address DA and the identification address of its home station (SW station 3) set as its source address SA. The test packet is output to terminal SW station 6. In SW stations 4 and 5, test packets are processed as normal packets and transferred to terminal SW station 6. On receipt of the test packet, terminal SW station 6 outputs the packet with its DA and SA inverted.

That is, the packet is returned from terminal SW station 6 to SW station 3, and it is reported to the OS center 1 upon re-arrival of the packet at the source SW station 3.

Thus, the OS center 1 checks whether or not the packet is normally transmitted in the network, that is, checks the normality of the transmission line (the link between SW station 3 and terminal SW station 6 in this embodiment). In the procedure, since the source SW station 3 and the terminal SW station 6 mark the time stamp onto the payload field of the packet, the OS center 1 is informed of the transmission time of packets according to the information.

However, in the above described test method, the information obtained by the test is to be provided for the OS center (operation center), and no method has been provided for the subscriber (terminal unit 2 in FIG. 898) to be autonomously informed of the transmission quality in the network (transmission delay time, etc.). Therefore, if a packet is not normally transmitted from a source subscriber to a destination subscriber, the subscribers cannot detect in which the factor of the fault resides, the subscriber terminal unit or the network transmission line. Thus, the OS center is invoked to recover from the fault, thereby requiring much time and cost.

FIG. 899 shows an embodiment of the SMDS. In FIG. 899, the SMDS support module analyzes a destination address DA and makes various checks. An SMDS support module S accommodates a plurality of source SMDS subscribers (a) and (b) to analyze a DA and make various checks. The SMDS support module R accommodates a plurality of destination SMDS subscribers (x) and (y) to make various checks. The modules comprising these S and R correspond to the above described SMDS processing server (SMDS message handler).

Each of the source SMDS subscribers (a) and (b) is connected to the SMDS support module S through the PVCs 1 and 2. The SMDS support module S is connected to the SMDS support module R through the PVC 3. The SMDS support module R is connected to each of the destination SMDS subscribers (x) and (y) through the PVC 4 and 5.

If the SW shown in FIG. 899 comprises an ATM switch, the connectionless data (SMDS message) output from the source SMDS subscribers (a) and (b) is converted into the cell format in the interface not shown in FIG. 899. The cell is transferred to the SMDS support module S by assigning to the header of the cell a specific VPI/VCI specifying the SMDS support module (VPI/VCI specifying the PVC 1 and 2) as its destination. In the transfer between the SMDS support modules S and R, the VPI/VCI value indicating the PVC 3 is assigned and output. The cell transferred from the SMDS support module R to the destination SMDS subscribers (x) and (y) with a specific VPI/VCI value indicating the PVCs 4 and 5 is output from the SMDS support module R, and arrives at the destination SMDS subscribers (x) and (y). Each of the PVCs is established at the system initialization.

Since the numbers of the source and destination SMDS subscribers accommodated in the SMDS support modules S and R are limited, a plurality of SMDS support modules are provided if a single SW station accommodates SMDS subscribers in excess of the maximum number. FIG. 900 shows an example of this. In this case, each connection is made by the PVC. FIG. 900 shows an example that SMDS subscribers (a), (b), (x), and (y) are accommodated in the SMDS support module 1 and SMDS subscribers (c), (d), (v), and (w) are accommodated in the SMDS support module 2. The PVC also connects SMDS support module 1 to SMDS support module 2.

As described above, the data transfer path is set at the system initialization in the SMDS. If the source SMDS subscribers (a) and (b) output SMDS messages, the messages are led to the SMDS support module S through the PVCs 1 and 2, and transferred to the destination SMDS subscribers (x) and (y) through the PVCs 3, 4, and 5. Therefore, it cannot be verified that the SMDS messages output from the source SMDS subscribers (a) and (b) have arrived at the destination SMDS subscribers (x) and (y) through the PVCs.

If the data cannot be successfully transferred, a complaint is expected from the source SMDS subscribers (a) and (b) or destination SMDS subscribers (x) and (y). The subscriber's complaint should be appropriately verified at the lowest possible cost.

The PVC test and the transmission time test are described above, and the SMDS needs confirming the normality of the transmitted SMDS data. The method of confirming the normality of data includes checking the BS-size of the L3-PDU, length of the L2-PDU, etc.

In the BA-size check, it is confirmed whether or not the value for use in checking the payload length of the L3-PDU (CPCS-PDU) is correct. In the BE-tag (beginning tag and end tag) check, the normality of the L3-PDU data can be confirmed by verifying the matching between the leading and trailing tags of the L3-PDU. In the length check, it is confirmed that the assembling and disassembling between the L3-PDU and L2-PDU are normally performed by verifying the relationship between the valid payload length value of the L2-PDU and the BA-size of the L3-PDU.

When the normality of the L3-PDU is confirmed in the disassembled L2-PDUs, the scale of the circuit becomes undesirably large. Since the BA-size and BE-tag of the L3-PDU and the length of the L2-PDU are checked as being closely related to one another, it is difficult to perform a process for each cell (for each L2-PDU). If the data in the format of the cell input to the SMDS processing server (L2-PDU) is processed after being assembled into the L3-PDU, a high-speed process is prohibited by the software process involved as described above.

When the connectionless communications service is realized in the ATM switch network, a connectionless data processing server (SMDS processing server in the SMDS) is provided to request the server to check the routing process on the connectionless data output from the subscriber terminal unit and to make various checks. FIG. 901 shows an example of the method of realizing such connectionless communications services. The configuration shown in FIG. 901 is the same as that shown in FIG. 899. That is, a PVC 11 is set between the source SMDS subscriber (a) and the connectionless data processing server CLS 2. A PVC 13 is set between the destination SMDS subscriber (x) and the connectionless data processing server CLS 6. These PVCs are set using a call processor CPRs 3 and 7.

In the configuration shown in FIG. 901, the connectionless data processing server CLS 2 accommodating the source subscriber (a) and the connectionless data processing server CLS 6 accommodating the destination subscriber (x) are provided in different switch stations. That is, the connectionless data processing server CLS 2 is provided in the SW station 1, while the connectionless data processing server CLS 6 is provided in the SW station 5. These connectionless data processing servers CLS 2 and 6 are connected to each other by the PVC 12. A large-scale relay switch 4, in which the PVC 12 is provided, has the configuration of relaying switches such as SW 1 or SW 5, or is an ATM interconnection switch (AISW).

When connectionless data is transferred from the source SMDS subscriber (a) to the destination SMDS subscribes (x) with the above described configuration, the data output from the source SMDS subscriber (a) is input to the connectionless data processing server CLS 2 through the PVC 11, and then transferred to the connectionless data processing server CLS 6 through the PVC 12. Then, it is transferred to the destination SMDS subscriber (x) from the connectionless data processing server CLS 6 through the PVC 13. The data is transferred through the PVCs in cell units and routed by the connectionless data processing servers CLS 2 and 6.

In the conventional connectionless communications service, the connectionless data processing server CLS 2 accommodating the source SMDS subscriber (a) is connected to the connectionless data processing server CLS 6 accommodating the destination SMDS subscriber (x) through the PVC 12 as shown in FIG. 901 if these servers are different from each other. The PVC 12 is set such that it passes through the SWs 1 and 5, and the large-scale relay switch 4. Therefore, the band resource for connectionless services should be preliminarily reserved in the switches to manage the services.

In the conventional systems, the band resource for each switch is used even when the connectionless service data is not being transmitted, and the band resource management is complicated.

By contrast, the switches for switching cells such as a B-ISDN (broadband ISDN) switch for providing broadband services, for example, ATM (asynchronous transfer mode) services, an SMDS switch for providing SMDS (switched megabit data service) services, etc. require considerably high performances and functions as compared with the conventional telephone switches or N-IDSN (narrowband ISDN) switches. Therefore, these switches require unique technology for intra-station control.

The prior art technology and the problems are clearly described below.

Described below is the problems related to the intra-station control communications technology for communicating the control information between the intra-station devices such as various transmission line interface device (trunk), etc. and the switch processor.

In controlling the intra-station devices in the conventional switching system, each of the intra-station devices 6 and 7 for operating with an ATM switch 5 is connected through an input control device 4 to a system bus 3 to which a switch processor (CC)1 is connected as shown in FIG. 902 to transfer the control information between the intra-station device and a main storage memory (MM) 2 connected to the CC 1 by the direct memory access (DMA) system.

In this system, however, all the intra-station devices 6 and 7 should be connected to the system bus 3, and the cable should be mounted to connect the intra-station devices 6 and 7 to the system bus 3. Thus, the farther the intra-station devices 6 and 7 are located from the system bus 3, the longer the cable should be, thereby causing the problem of complicated connection.

Connecting all the intra-station devices 6 and 7 to the system bus 3 causes a conflict for the acquisition of an access right required to access the bus, thereby resulting in the congestion of bus access.

Furthermore, extending the system bus 3 to each of the intra-station devices 6 and 7 lowers the transmission quality, and may generate a transmission error such as a data error and parity error in the DMA procedure which includes no error control procedure.

Described next is the problem related to the technology for communicating control information such as call setting information, etc. between a terminal unit and a control device such as a switch processor.

Controlling a terminal interface device in the ATM switch system, etc. requires communicating control information with a control system device such as a switch processor, etc.

The conventional technology to communicate control information can be the system in which a physical interface is connected to a terminal unit (TERM) 4 connected from the control system device (MPR1 and PRIF2) to the switch (SW) 3 as shown in FIG. 903 as in the case shown in FIG. 902.

Since a physical interface is required for each terminal 4 in this system, the entire system configuration is complicated and the problem occurs that the terminal units 4 cannot easily added.

Described below is the subject related to the technology of testing a switch as an intra-station control system.

In the ATM switch, etc, a test is conducted whether or not a cell transmission highway is faulty by connecting to a highway a test device for sending cells and retreiving and collecting received cells. In this case, a test cell is transmitted after setting the destination information VPI (virtual path identifier), VCI (virtual channel identifier), cell loopback in the test device, and other LSIs through the test device.

However, such a system requires a complicated configuration of a test device, and takes time in setting a test device.

Described below is the loopback test in the technology of testing switches.

With an increasing use of ATM switches and ATM switch network in which the information of different traffic characteristics such as voice, data, animation, etc. can be combined and switched, a test of confirming the normality of an inter-station path has been required. If a fault occurs between the two stations having a lot of stations existing between the two stations in an actual operation, it is required that faults should be detected and corrected at the earliest possible stage. The loopback test method of an ATM switch network is an effective test method for quickly detecting a fault between the stations.

The ATM switch has just been introduced in the market, and the ATM switch has never been tested between stations. However, the following test method is considered to be an effective inter-station ATM switch network test method based on the conventional electronic switch test method.

According to this method, if a number of stations exist in the ATM switch network, a test device should be provided for each test device.

If there are not sufficient test devices, a test device should be shared among stations for the test.

Furthermore, some stations are not constantly attended by operators and the operators should go to the stations to conduct the test.

Thus, in the above described method, operators are required to go to trouble in conducting an inter-station test.

Described next is the subject related to the technology of measuring the performance in a switch according to the intrestation control system.

The self routing module (SRM) switching method using the ATM is the condition for structuring a broadband ISDN system. However, measuring the performance in the SRM has been a difficult task.

Finally, the subject related to the control of a trailer in the PLCP, which is a physical layer conversion protocol interfaced in the DS3 format, that is, the digital signal level 3 format, is described below as one of the intra-station control system.

In the B-ISDN or SMDS service, the DS3 (digital signal level 3) format is used to realize the service of 44.736 MHz.

FIGS. 904 and 905 show examples of system configurations according to the present invention. FIG. 904 shows the configuration in which the BISDN terminal unit is connected to the BISDN switch. FIG. 905 shows the configuration in which the SMDS terminal unit is connected to the SMDS switch. The present invention is related to the transmitting units in the BISDN terminal unit and BISDN switch or the SMDS terminal unit and SMDS switch.

FIG. 906 shows the configuration of the DS 3 multi-frames. The DS 3 frame comprises 85-bit basic frames. The basic frame comprises a 1-bit DS 3 header and an 84-bit DS3 payload. Eight basic frames form a subframe, and seven subframes form a single mult-frame. That is, one multi-frame consists of 56 (8×7) basic frames.

The ATM cell of the BISDN is a 53-octet cell, and the L2-PDU (level 2 protocol data unit cell) of the SMDS is a 53-byte cell. That is, they are similar in basic configuration, but different in contents of the header and payload and in value of the HEC and HCS. FIGS. 907(*a*) and (*b*) show the configurations of the ATM cell and L2-PDU cell.

An ATM cell or L2-PDU cell are not directly stored in the payload of the DS3 reference frame, and transmitted through the frame of the PLCP (physical layer convergence protocol).

FIG. 908 shows the configuration of the PLCP multiframe interfaced in the DS3 format.

Each of the ATM cell or L2-PDU cell is stored in a 53-octet PLCP payload in the PLCP frame. The PLCP multiframe is divided into 84-bit segments, and each segment is stored in an 84-octet DS3 payload in the DS3 frame and then transmitted.

The PLCP frame is a multiframe comprising 12 pairs of a 4-byte PLCP header and 53-byte PLCP payload and a trailer. The PLCP header comprises A1 and A2 bytes, POHI, and POH. The trailer length is 13 or nibbles. A nibble is 4 bits and refers to a half byte. The trailer data is 13 or 14 4-bit patterns “1100”.

One PLCP multiframe is transmitted at an average of 125 μsec (8 KHz cycle). Variable trailer length defines an average value.

Described below is the trailer. Since the DS3 frame is transmitted at a speed of 44.736 MHz, 5592 bits are transmitted in the 125-μsec period according to the following equation.

$$\text{number of bits}=44.736\times10^{6}(\text{bit/sec})\times125\times10^{-6}(\text{sec})=5592\text{ bits} \quad \text{[equation 1]}$$

However, the data forming the DS3 frame comprises a 1-bit frame bit data and an 84-bit DS3 payload, the number of bits in the DS3 payload for the period of 125 μsec is 5592×84/85=5526.211 . . . as not divisible.

The number of bits in the PLCP multiframe is 57×12×8+13×4=5524 bits when the trailer length is 13 nibbles, and 57×12×8+14×4=5528 bits when the trailer length is 14 nibbles. That is, there is a residue in the DS3 payload in the 125-μsec period when the trailer length is 13 nibbles, and there is a deficiency in the DS3 payload in the 125-μsec period when the trailer length is 13 nibbles.

To transmit PLCP multiframes at an average speed of 125 μsec (8 KHz cycle), the PLCP multiframes are transmitted with their trailer length changed between 13 and 14 nibbles.

A C1-byte cycle staff counter is used to display the trailer length (refer to FIG. 908) FIG. 909 shows the definition related to the cycle staff counter.

As shown in FIG. 908, the C1 byte is cyclically changed on three multiframe cycles. In the first multiframe, C1 refers to FFH and the trailer length is 13 nibbles. In the second multiframe, C1 refers to $00_H$ and the trailer length is 14 nibbles. In the third multiframe, C1 refers to $66_H$ or $99_H$ and the trailer length is 13 nibbles for C1=$66_H$ and 14 nibbles for C1=$99_H$.

The trailer length of 13 or 14 nibbles is determined such that the PLCP multiframes are transmitted at an average speed of 125 μsec (8 KHz cycle).

Then, there arises a problem as to what the value of C1 of the third multiframe should be, that is, how to control the trailer. Described below is the conventional method of controlling the trailer.

Assuming that the pattern p refers to 13 nibbles for the third multiframe and the pattern Q refers to 14 nibbles for the third multiframe, the number of nibbles for the trailer changes 13→14→13 for the pattern P, and 13→14→14 for the pattern Q.

In the 125 μsec period, the number of bits of the DS3 payload is 5592×84/85=5526.211. The number of bits in the PLCP multiframes is 5524 when the trailer length is 13 nibbles, and 5528 when the trailer length is 14 nibbles. Therefore, the cycle of the PLCP multiframe is fast on the cycle of 125 μsec when the PLCP multiframe pattern is P, and is behind on the cycle of 125 μsec when the PLCP multiframe pattern is Q.

Conventionally, the cycle of a transmitted PLCP frame is monitored, and the phase of the extracted clock is compared with the phase of the 8 KHz clock obtained by dividing 44.736 MHz. If the phase of the PLCP multiframe to be transmitted is forward, the trailer pattern is switched to P. If it is behind, the trailer pattern is switched to Q. Thus, the transmission cycle of the PLCP multiframe is adjusted properly.

FIGS. 910 and 911 are timing charts showing the circuit configuration and the operation for realizing the above listed functions.

A PLCP frame cycle monitoring unit 7 monitors the transmission cycle of the PLCP frames to be transmitted from a selector 3 to output a phase comparison pulse S for every third PLCP frame. A dividing unit 6 generates 8 KHz clock by dividing 44.736 MHz clock by 5,592 generated by a clock generating unit 5. A phase comparing unit 8 compares the phase comparison pulse S with the phase of the 8 KHz clock, and outputs a pattern switch signal C as a value of 1 when the phase comparison pulse S is behind and a value of 0 when is forward.

The selector 3 selects input A1 and A2 according to the pattern switch signal C. That is, the selector 3 selects the pattern P when the pattern switch signal C indicates 0 and selects the pattern Q when it indicates 1.

The PLCP frame generating units 1 and 2 for the patterns P and Q store an ATM cell or an L2-PDU cell in the PLCP payload and add a PLCP header and trailer to assemble a PLCP frame.

The pattern P PLCP frame generating unit 1 adds a trailer for indicating the number of nibbles 13, 14, and 13 on three cycles. The pattern Q PLCP frame generating unit 2 adds a trailer for indicating the number of nibbles 13, 14, and 14 on three cycles.

The DS3 interface unit 4 inserts a PLCP frame into the DS3 payload and adds a DS3 header to assemble and transmit a DS3 frame.

However, the above described conventional technology selects a trailer pattern according to the phase comparison result, and the transmission order of the pattern P and Q is not fixed.

As a result, there arises a problem that the complicated operations generate a complicated circuit.

Additionally, there is a problem of a large deviation of transmission timing.

The following functions are required to realize the multicasting capabilities (point-to-multipoint connection) in the ATM switch.

1. Copying a cell
2. Reassigning a VPI/VCI

The efficiency in use of the resources as a switch is higher when cells are copied at a point nearer to the exit of the exchange station. The copied cells are distributed to each subscriber. The cells distributed to each subscriber has different VPI/VCIs. That is, the VPI/VCI depends on the destination subscriber. The number of bits of the VPI/VCI is equal to or larger than 22 bits. Simply converting the large number of bits undesirably results in large-scale hardware.

The ATM switch exchange cells in a self-routing system. If a large-capacity system performs a self-routing process, the efficiency of the switch is higher when the multicasting capabilities are supported in the switch. Thus, the entire system can be smaller in size with the cost reduced.

The services supported in the B-ISDN should include a large number of point-to-multipoint connection services as well as multicasting capabilities. To reduce the scale of the entire switch, the multicasting capabilities added to realize the point-to-multipoint connection should be minimized for smaller scale and cost. Furthermore, the future extension of the multicasting capabilities should be considered.

In the point-to-multipoint connection, such information as specifies the number of copied cells and the destination of each of the copied cells is required. The information is normally set as tag information added to the cell when it is input to the exchange station. However, since the amount of the above described information is not small, the tag information occupies about 10 bytes. Adding such tag information to a cell makes the entire cell length longer than in the exchange station. That is, when the tag information is longer, the ratio of the actual data to the entire cell becomes smaller, thereby lowering the throughput.

FIG. 912 shows the configuration of the form of the conventional multicasting capabilities. In FIG. 912, a source terminal 1 multicast-transfers data to destination terminals 4-1-4-5 through an ATM switch 2.

Line 3 connects the source terminal 1 with the ATM switch 2. The line 3 can multiplex and transmit a plurality of calls (paths). The ATM switch 2 is also connected to the destination terminals 4-1-4-5 through a subscriber line capable of multiplexing and transmitting data. In the ATM switch 2, a virtual path is set according to the destination information written in the cell transmitted by the source terminal 1. In the example shown in FIG. 912, virtual paths 5-1-5-5 are set as paths for transferring cells to the destination terminals 4-1-4-5.

In the above described multicasting transfer, cells are copied for the destination terminals in the source terminal 1 and transferred through the paths set between the source terminal 1 and the destination terminals 4-1-4-5. At this time, 5 channels are multiplexed in the line 3 to transfer cells to the destination terminals 4-1-4-5. That is, the bands of 5 channels are occupied.

Thus, since N paths are set between the source terminal and destination terminal when 1:N multicast transfer is made according to the conventional method shown in FIG. 912, the resources for the line 3 and ATM switch 2 have been used more than necessary and the load on the source terminal 1 has been heavy.

It is expected that the demand or dynamic images will greatly increase. For example, members of companies in the distance have a lot of opportunities to have things settled through conferences over telephone using dynamic images. These services not only satisfy individual subscribers but also promote business smoothly regardless of geographical disadvantages.

Nevertheless, these services have not been sufficiently offered. That is, the 1:1 communications are more popular than the private line services in the broadband communications network, and the method of controlling the multi-terminal connection, for example, a three-subscriber communications has not been put to practical use.

Described below is the problem related to the process performed in the event of a failure on a device in the exchange station which processes a transmission line.

With the ATM switch, a communications line system device in the exchange station processes a number of virtual lines (hereinafter referred to simply as lines) specified by individual VPI/VCIs. When a failure occurs on a communications line system device, how to handle the lines processed by the device is very important in maintaining the quality of the communications.

When a failure occurs on a communications line system device in the exchange station, a call connected through the line processed by the device is compulsorily terminated by a compulsory release process activated by the fault monitor process for the entire system. Therefore, the subscribers have the problem that the communications may be suddenly terminated.

The conventional systems have not provided the mechanism of managing the line processed by the communications line system device.

Described below is the problem relating to the process performed when a failure is detected on the line.

When a line failure is detected on a single-structured, not duplex, ATM switch, the transmission information such as subscriber information, billing information, traffic information, performance information, etc. is saved by a line switch process in physical line units using a reserved line, etc. conventionally.

Practically, if a failure is detected on one physical line when a remote concentrator 1 and an ATM switch 2 are connected through a plurality of physical lines as shown in FIG. 913, then the faulty band or an idle band for other lines are not used, but the state of the faulty line is assigned to a new alternate line such as a spare line, etc.

Therefore, even though large idle bands exist in other lines, they are not utilized effectively, thereby lowering the use rate of the lines.

To perform a line switch process in physical line units, it is necessary either to reserve sufficient spare lines or to duplex each of the physical lines. As a result, the communications may cost high.

It is also necessary to duplex the intra-station device such as a communications system device, etc. in the exchange station to maintain the reliability of the communications. If a failure occurs on the intra-station device of the active system, then various communications control data are transferred to the intra-station device of a standby system to stop the operation of the intra-station device which has been a device in the active system and start the operation of the intra-station device which has been an intra-station device of the standby system.

In this case, various communications control data set in the intra-station device of the active system have been conventionally transferred to the intra-station device of a standby system by a processor controlling the intra-station device. However, since the amount of the various communications control data is large for the ATM switch, etc., a long time is required by the processor to transfer the data from the intra-station device of an active system to the intra-station device of a standby system, thereby disadvantageously affecting the reliability of the exchange station when a failure occurs on the exchange station.

SUMMARY OF THE INVENTION

A connectionless communications system requires high reliability including the above described SMDS, but there has not been technology developed to improve the entire system. The present invention aims at improving the quality of the connectionless communications system and providing an efficient method of internally controlling a switch for switching cells, etc.

One of the important configurations of the present invention is designed as a switching process performed in layer 2 protocol data units (L2-PDU) of connectionless communications using a table having a MID (message identifier) as a key.

According to other aspects related to the above described subjects, the destination address stored in a beginning of message (BOM) cell is retrieved when the BOM cell is received. According to the destination address, the permanent virtual circuit (PVC), which is predetermined and connected to the destination, is recognized to retrieve the routing information (tag information) specifying the PVC. The destination address is referred to so that the MID (output MID) not currently used in the path to the destination can be acquired. The BOM cell is output with the tag information and output MID assigned, and then transferred to the destination through the route according to the tag information. Then, a table storing the above described routing information and output MIDS is generated according to the MID (input MID) obtained when the BOM cell is received. When a continuation of message (COM) cell or an end of message (EOM) cell is received, the above described table is searched by using the MID of the cell as a key to retrieve routing information (tag information) and an output MID.

The COM cell or EOM cell is assigned the routing information and output MID and is output to be transferred to the destination as in the case of the BOM cell.

If the destination address stored in the BOM cell is a group address, the group address development table should be referred to. A group address development table is a table storing the information for use in developing a group address into an individual address using an input MID as a key. The table is generated when a BOM cell is received. Upon receipt of the COM cell or EOM cell, a copying process and routing process are performed according to the MID of the cell.

If a single segment message (SSM) cell is received, the routing process is performed by retrieving the destination address stored by the SSM as in the case of the BOM cell.

With the above described configuration, the correspondence between the input MID of a BOM cell and the output MID of the routing information (tag information) is written to a table upon receipt of the BOM cell. When a COM cell or an EOM is received, the routing information and output MID are obtained using the input MID of the cell as a key. That is, since a plurality of cells obtained by dividing one connectionless data frame contain a unique information MID for the data frame, common routing information can be extracted using the MID as a key. (A MID is identification information uniquely assigned to each SNI, and different SNIs can be assigned the same MID. Therefore, a system accommodating a plurality of SNIs represents as a MID in a wide sense the value obtained by combining the MID and SNI or a value uniquely obtained based on the two values.)

Therefore, each cell can be routed with the routing information retrieved for each cell without assembling data transmitted in cell units into a data frame in a higher order layer (without assembling L3-PDUs). In this case, the routing process is performed in cell units (in L2-PDUs), not by the software, at a high speed in the layer 2 as if it were processed by the hardware.

Since the routing process is sequentially performed in cell units without assembling data frames in the higher order layer, it is not necessary to buffer a number of input cells forming a data frame in a higher order layer, thereby reducing the capacity of memory, etc.

BRIEF DESCRIPTION OF THE DRAWINGS

FIG. 25 shows the configuration of the maintenance and operation system (MOS).

FIG. 32 shows the routing of the cell in the SMDS.

FIG. 36 shows the DS3 frame format.

FIG. 37 shows the DS3 PLCP frame format.

FIG. 40 shows the contents of the network control information field.

FIG. 41 shows the contents of the segment types.

FIG. 44 shows the DS3-ATM header field.

FIG. 47 shows the priority levels of the alarm in the DS3 layer.

FIG. 48 shows the detection and recovery conditions of various types of alarm.

FIG. 51 shows the detection and recovery conditions of various types of alarm.

FIG. 53 shows the types of performance parameters related to the DS3 layer; the count-up condition of the accumulated value of each parameter; and the alert threshold for the accumulated value of each parameter.

FIG. 54 shows the types of performance parameters related to the DS3-PLCP layer; the count-up condition of the accumulated value of each parameter; and the alert threshold for the accumulated value of each parameter.

FIG. 56 shows the format of the ATM cell transferred in the switch.

FIG. 58 is a table showing the accommodation states of the E-MSD information transferred between the DS3-SMDS interface and SIFSH common unit.

FIG. 59 shows the contents of each bit of the E-MSD information.

FIG. 61 is a table showing the accommodation states of the E-MSCN information transferred between the DS3-SMDS interface and SIFSH common unit.

FIG. 62 shows the contents (1) of each bit of the E-MSCN information.

FIG. 63 shows the contents (2) of each bit of the E-MSCN information.

FIG. 78 shows the process sequence of the DS3-SMDS interface (DS3/PLCP layer alarm process).

FIG. 79 shows the process sequence of the DS3-SMDS interface (reporting the D/Q-timer at the occurrence of the DS3/PLCP TCA, and collecting PM data).

FIG. 80 shows the process sequence of the DS3-SMDS interface (reporting the D/Q-timer at the occurrence of the DS3-SMDS interface buffer alarm, and collecting buffer data).

FIG. 91 shows the active control function.

FIG. 95 shows the configuration of the package of the SIFCOM.

FIG. 99 shows the relationship between the system switch signal and the active system selection state in the SIFSH-A.

FIG. 101 shows the relationship among the instruction, alarm, and selected system states of the COM-E-MSD command in each system.

FIG. 106 shows the logic of the system control under the ACT controller.

FIG. 115 shows the methods of detecting in the individual unit and reporting an interface fault between the SIFCOM and individual unit, detecting method in the SIFCOM, and a list of the contents of the faults.

FIG. 118 shows the format of the cell of the ATM layer in the simple LAP-D.

FIG. 120 shows the format of the LAP-D of the layer 2.

FIG. 121 shows the format of the ATM cell.

FIG. 122 shows the configuration of the ATM cell header data used in the SIFSH-A.

FIG. 123 shows the method of using the ATM header data in the SIFSH-A.

FIG. 124 shows the configuration of the ATM cell header data used in the RMXSH.

FIG. 125 shows the method of using the ATM header data in the RMXSH.

FIG. 126 shows the configuration of the ATM cell header data used in the RSGCSH.

FIG. 127 shows the method of using the ATM header data in the BSGCSH.

FIG. 128 shows the method of using the SIG/ADS1BLK/ADS1SEL in the SIFSH-A.

FIG. 129 shows the assignment of the functions in the SIFSH-A and ADS1SH (refer to FIG. 8) of the ATM cell header data defined in FIGS. 122, 123, and 128.

FIG. 130 shows the position of the MUX in the SIFSH-A.

FIG. 131 shows the configuration of the serial connection of the SIFSH-A.

FIG. 132 shows the configuration of the MUX.

FIG. 133 shows the outline of the configuration of the scheduler.

Figure 134:
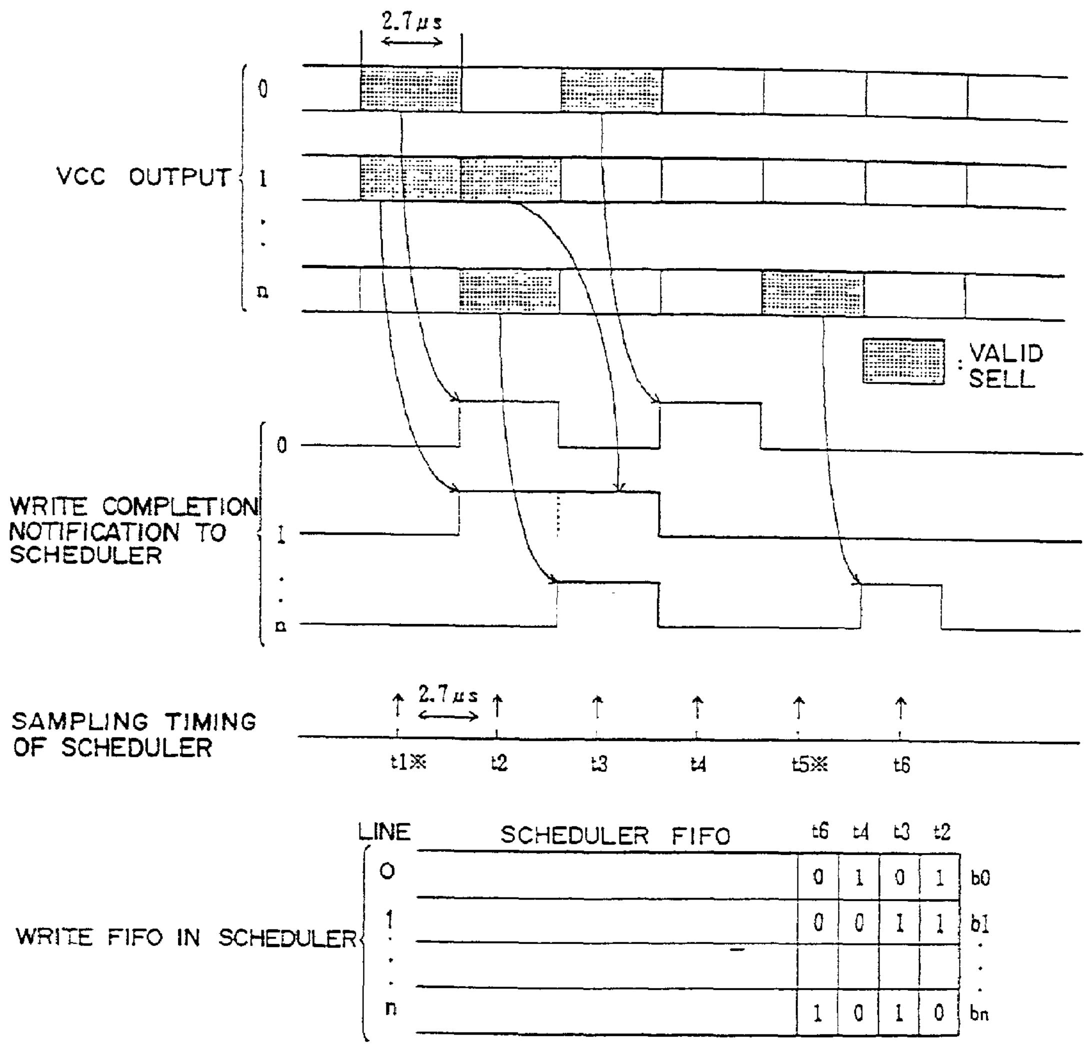

FIG. 134 shows the timing of writing an ATM cell to the FIFO (first-in-first-out buffer) scheduler.

Figure 135:
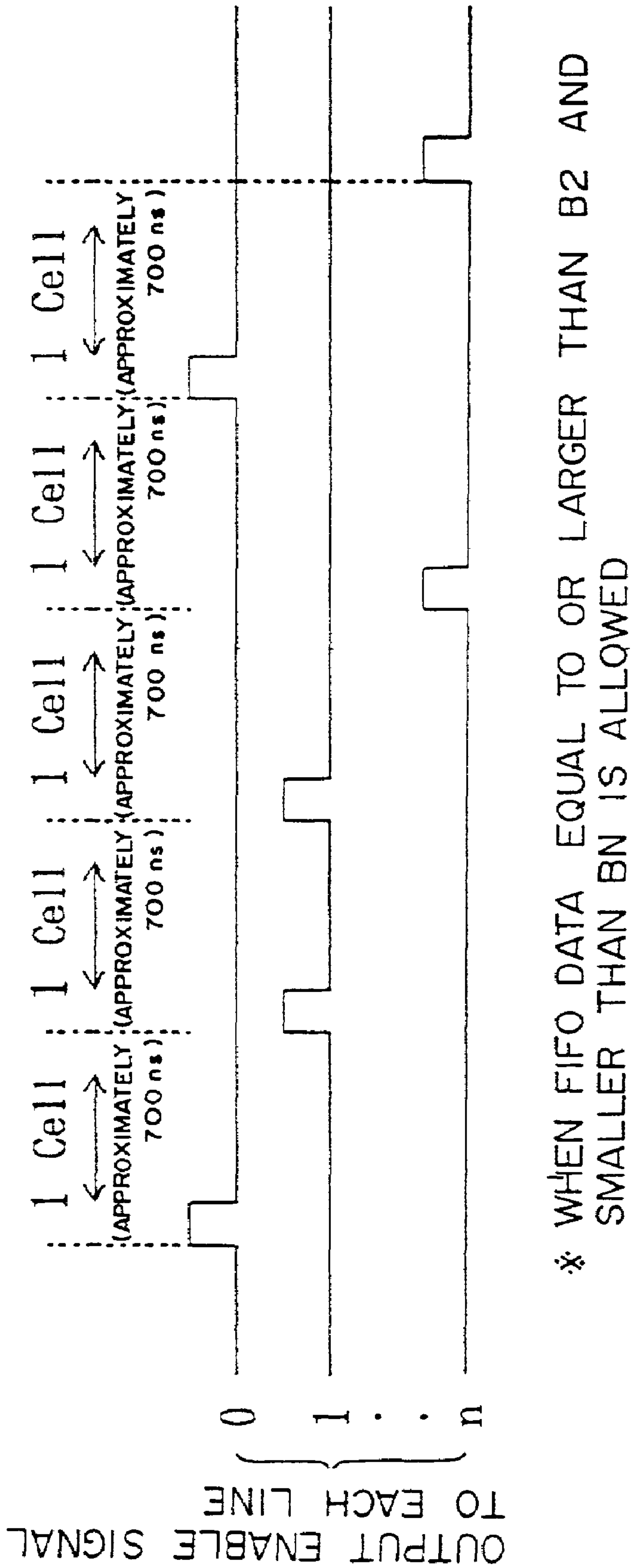

FIG. 135 shows the timing sending an output enable signal.

Figure 136:
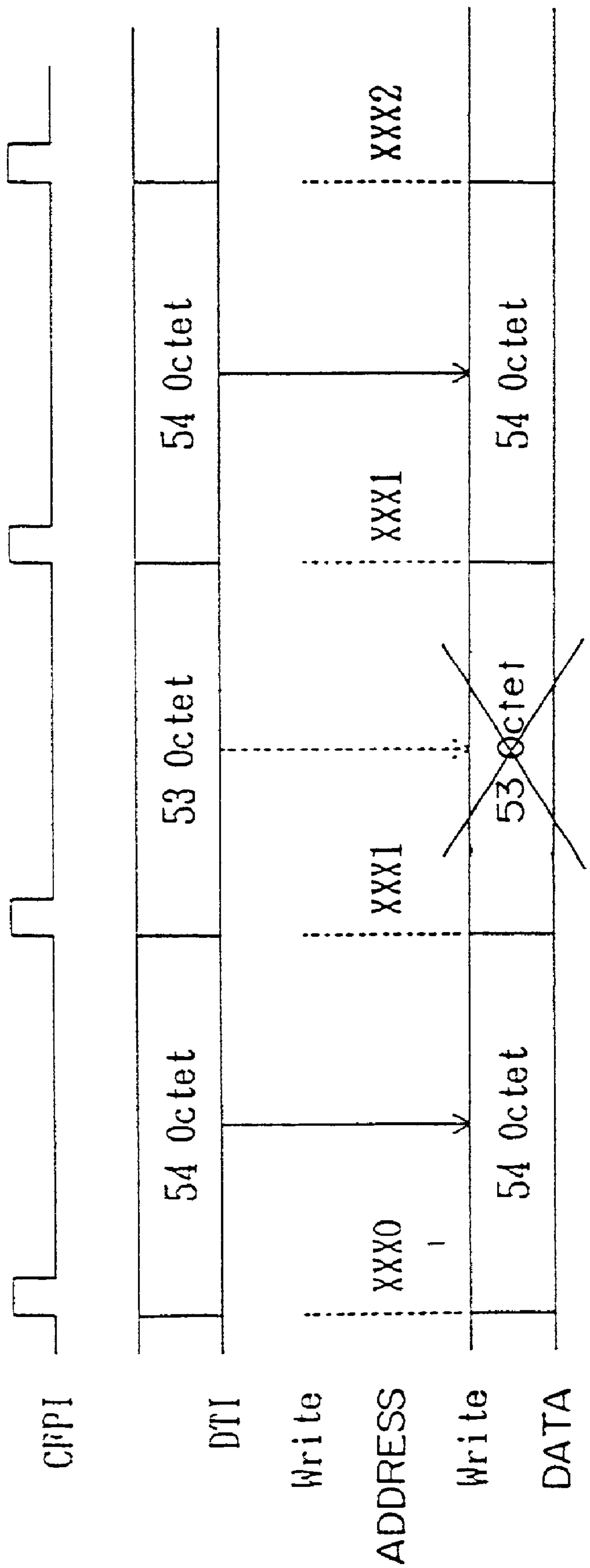

FIG. 136 shows the write abnormal process performed when the data length of an input cell is short.

Figure 137:
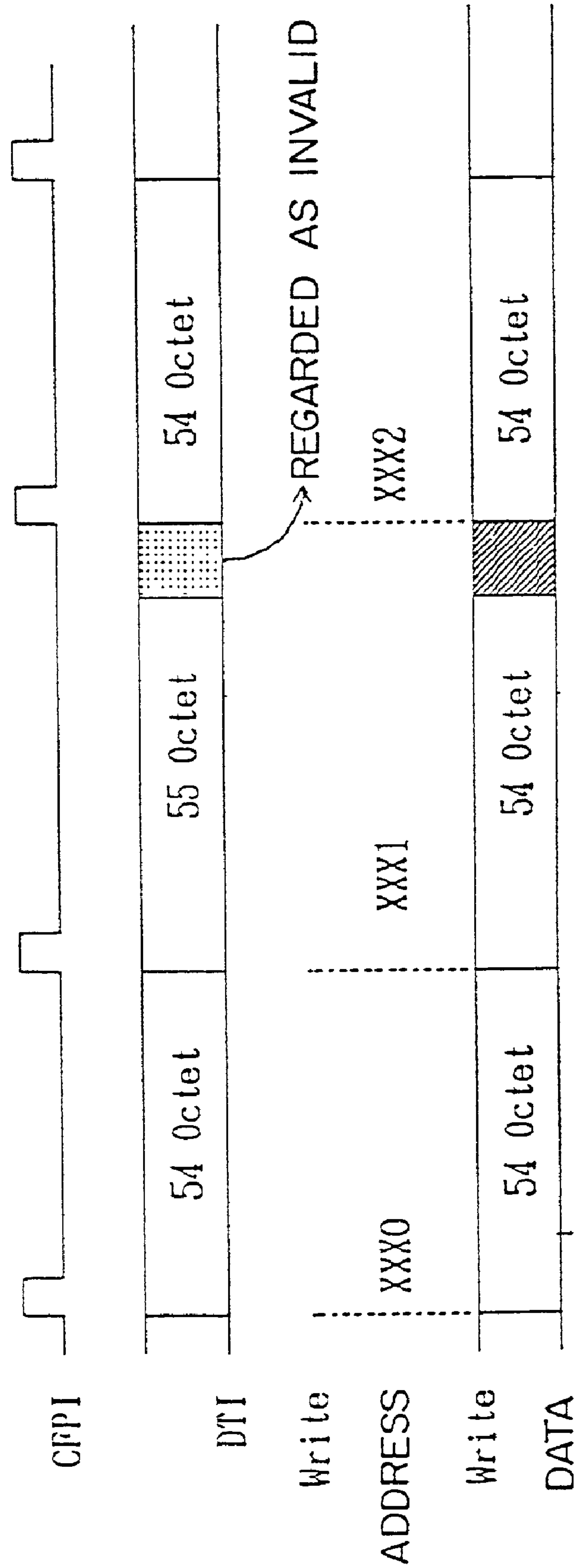

FIG. 137 shows the write abnormal process performed when the data length of an input cell is long.

Figure 138:
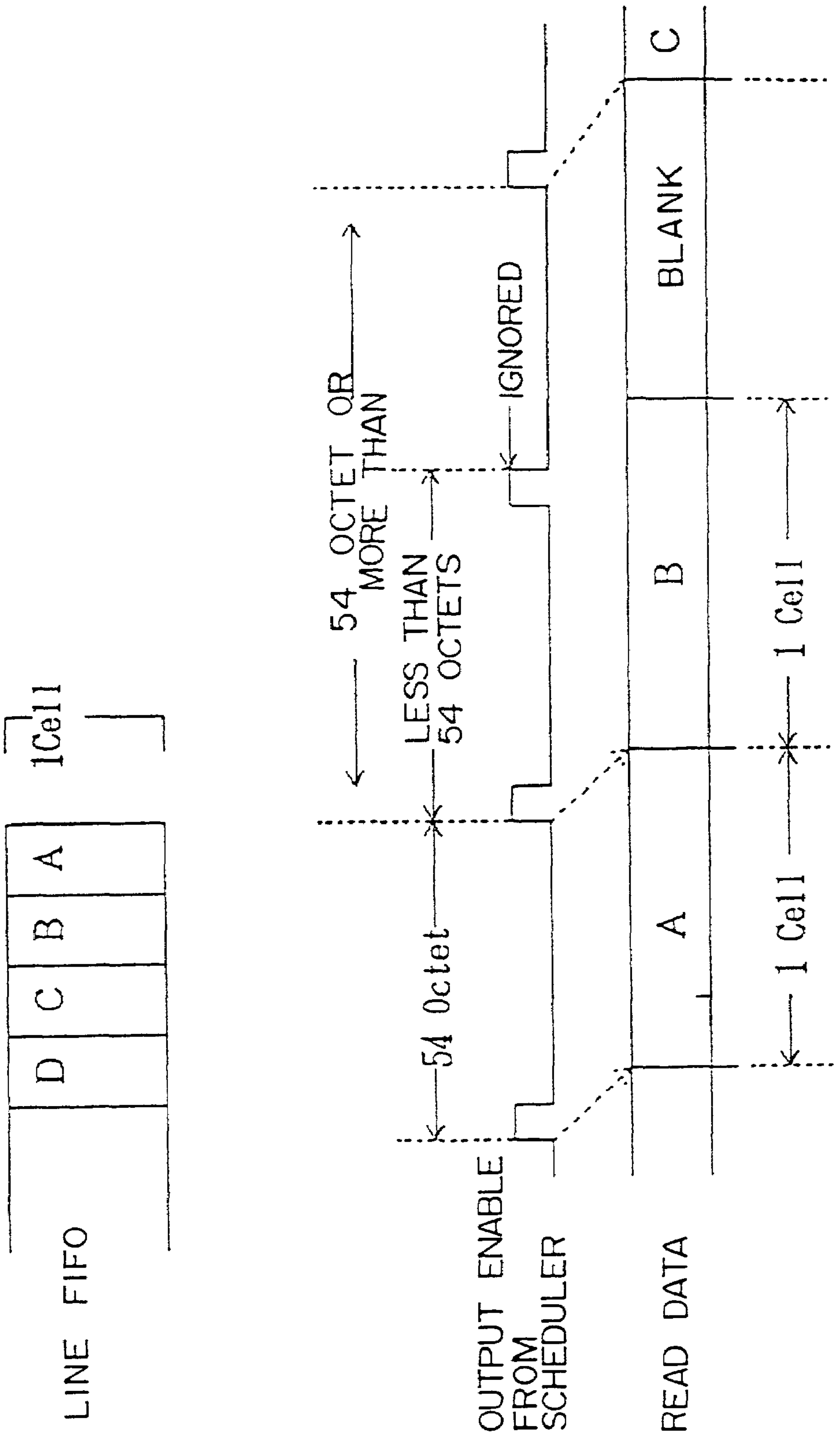

FIG. 138 shows the read abnormal process.

FIG. 139 shows the threshold set in the buffer in the MUX.

Figure 140:
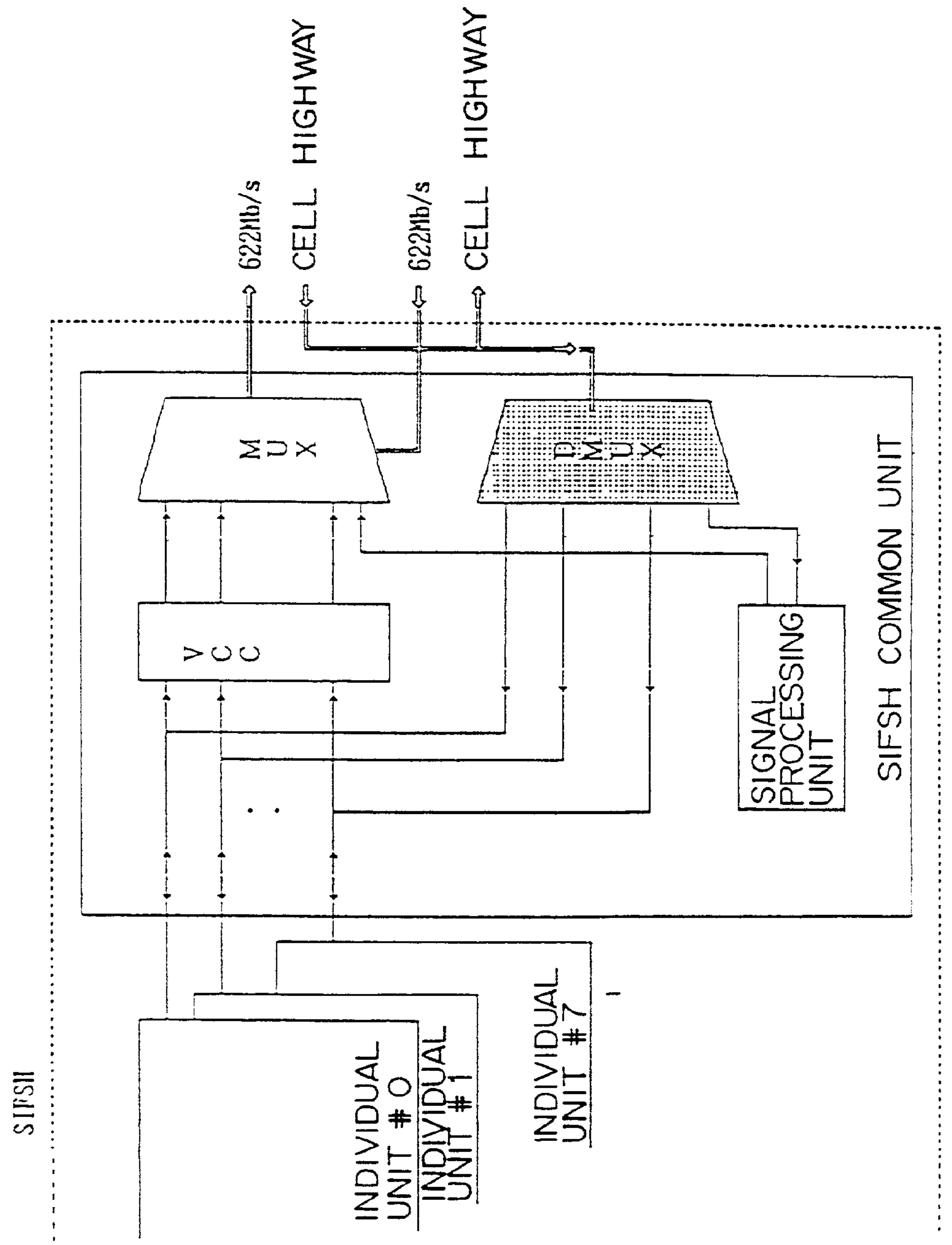

FIG. 140 shows the position of the DMUX in the SIFSH-A.

Figure 141:
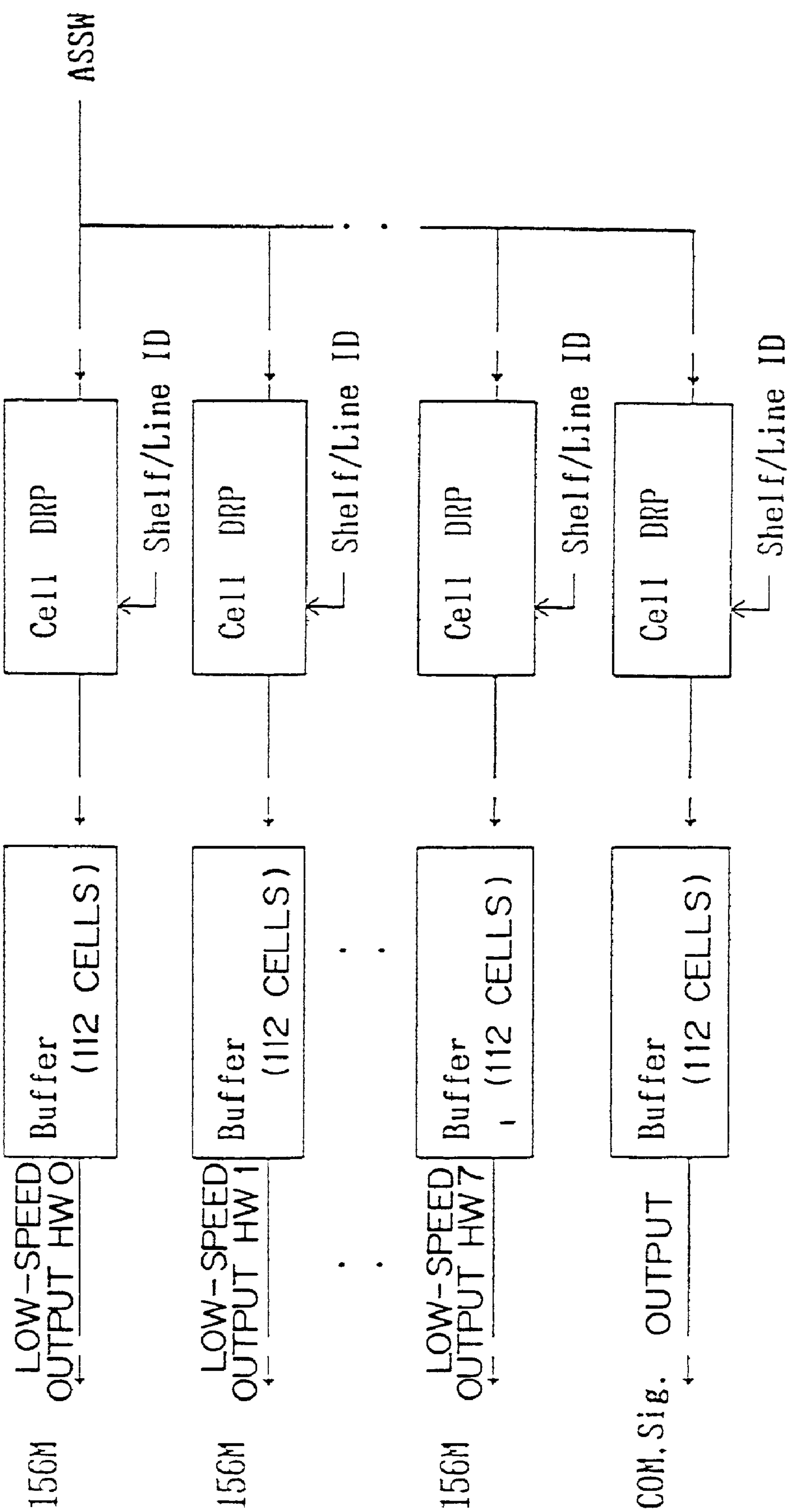

FIG. 141 shows the configuration of the DMUX.

FIG. 142 shows the cell format in the switch.

FIG. 143 shows the location of the matching bit of the header used in the DMUX.

Figure 144:
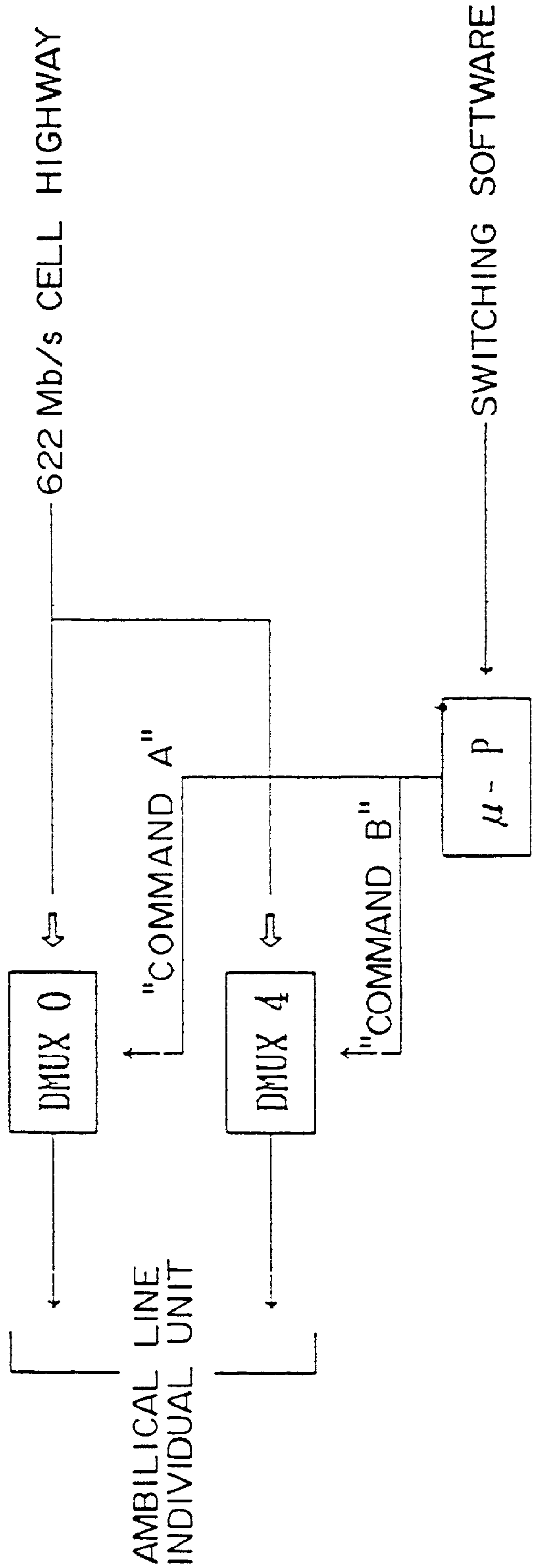

FIG. 144 shows the outline of the umbilical protection switching.

FIG. 145 shows the threshold set in the buffer in the DMUX.

Figure 146:
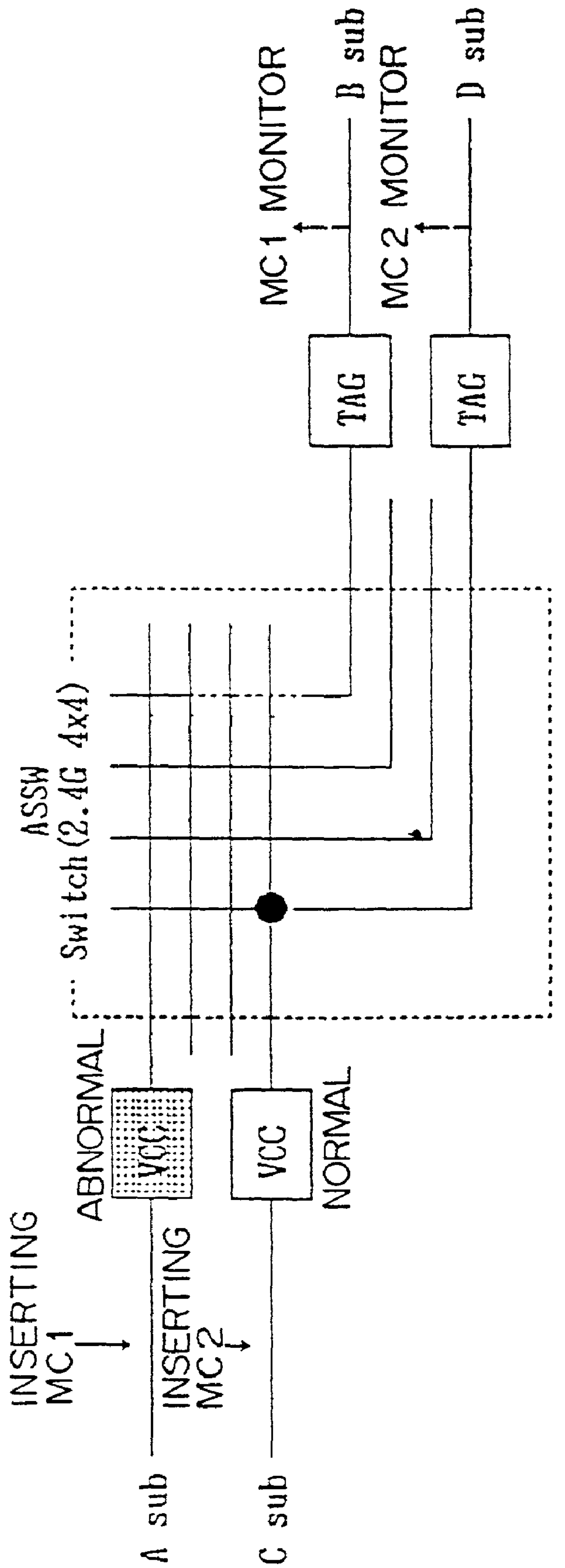

FIG. 146 shows the VCC/ATM switch fault.

Figure 147:
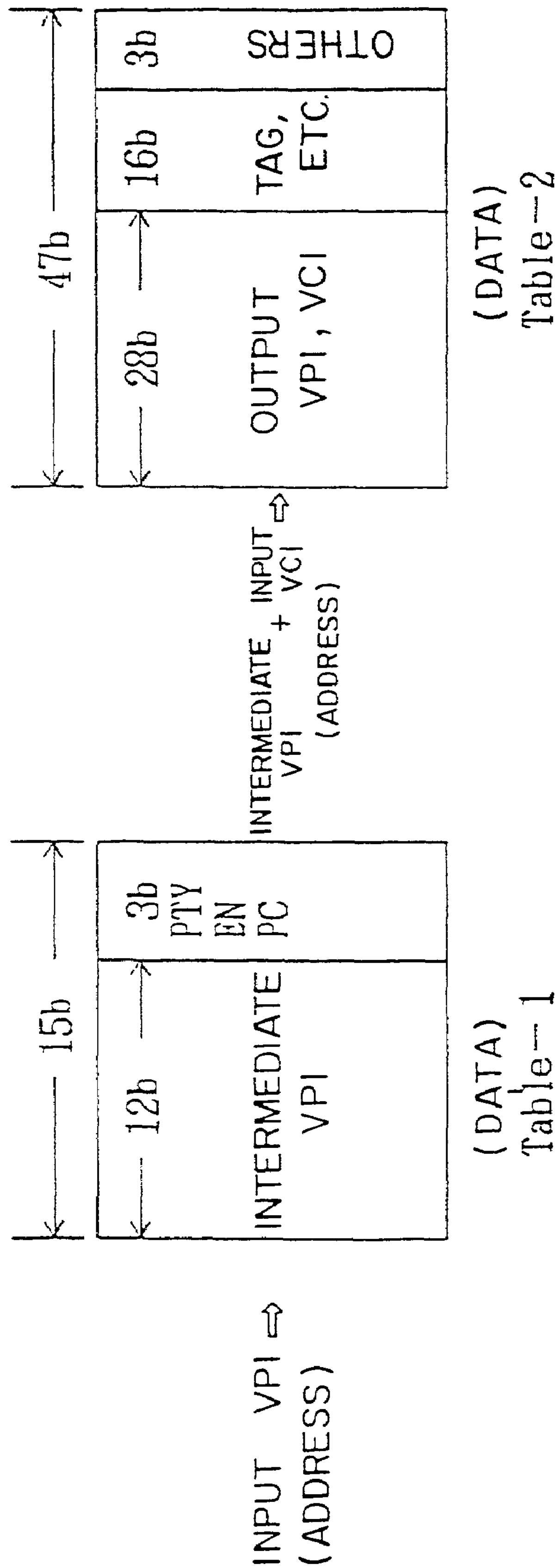

FIG. 147 shows the configuration of the table in the VCC memory.

FIG. 148 is an arrow diagram showing the INS procedure.

FIG. 149 the status of each system and the process performed by the CC (switching processor).

Figure 150:
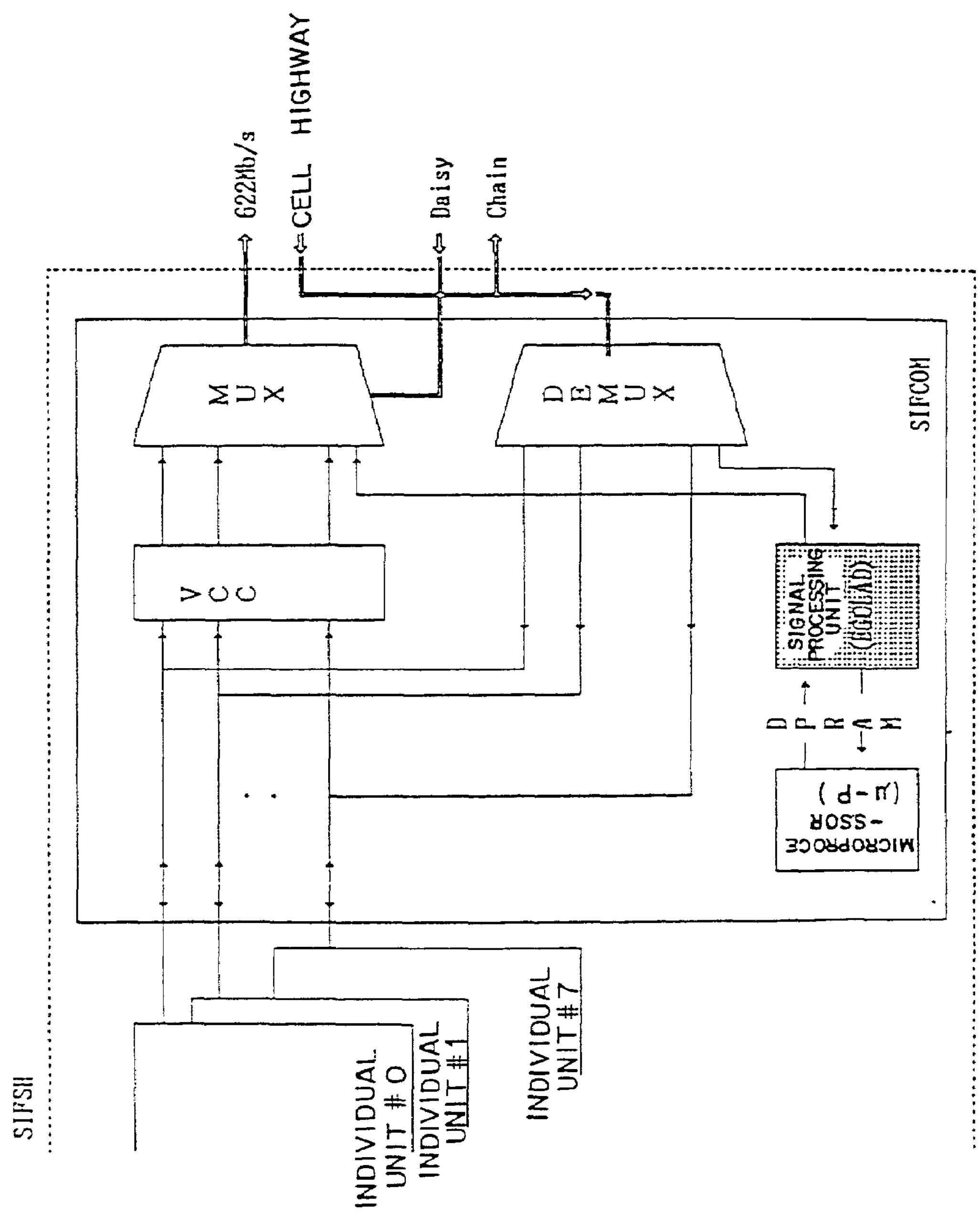

FIG. 150 shows the position of the signal processing unit (EGCLAD) in the SIFSH-A.

Figure 151:
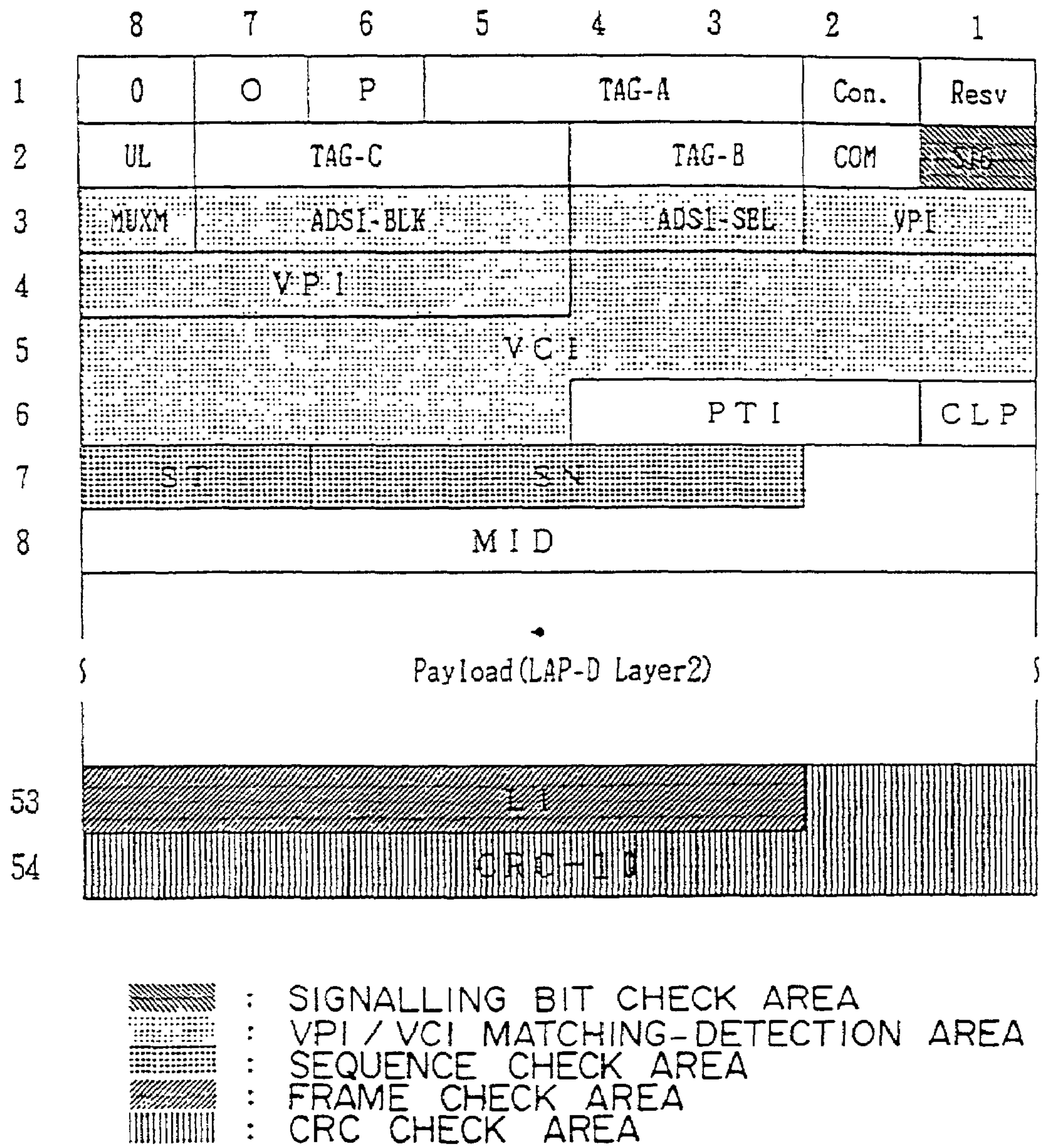

FIG. 151 shows the header check area.

Figure 152:
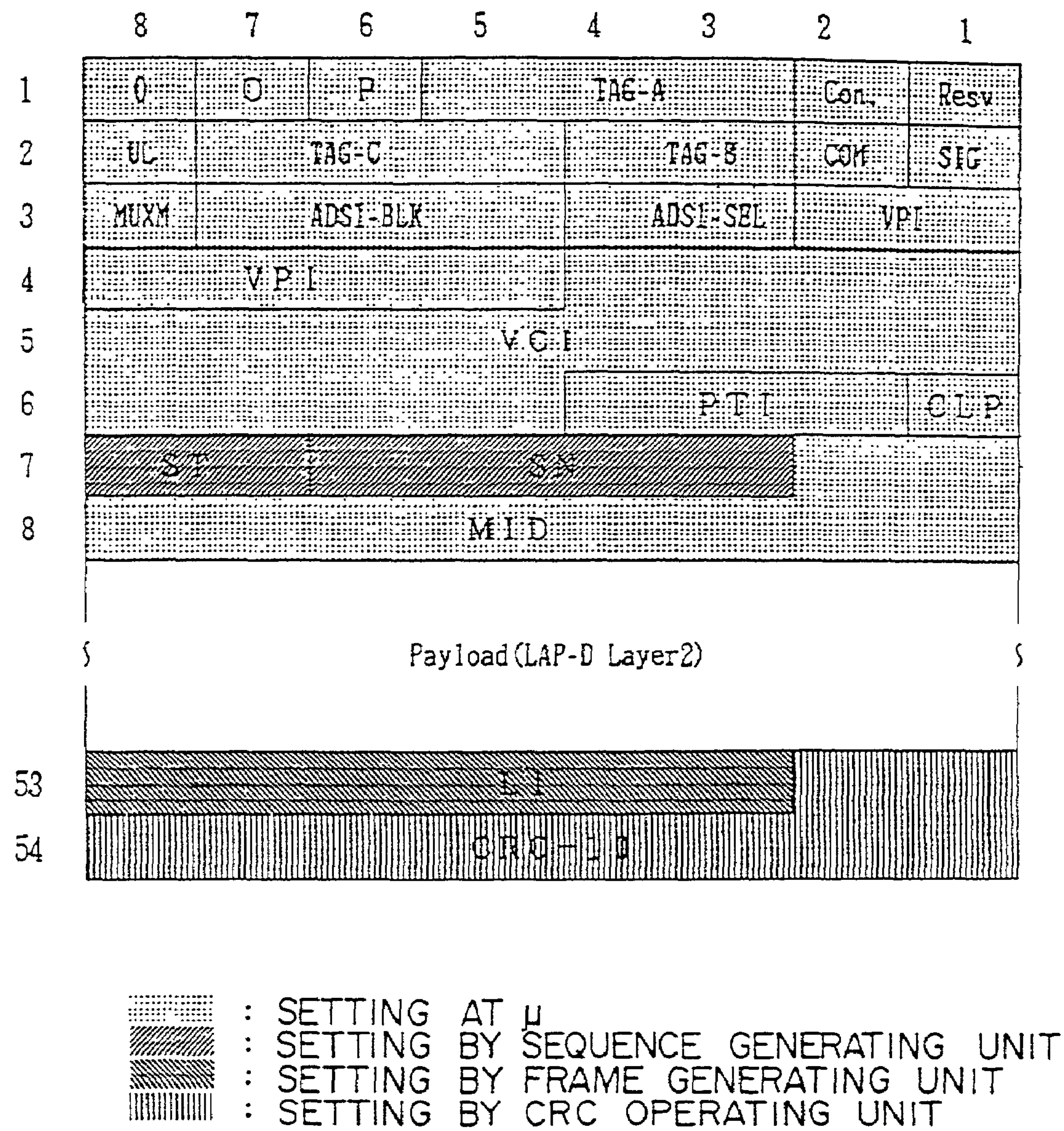

FIG. 152 shows the header insertion area.

Figure 153:
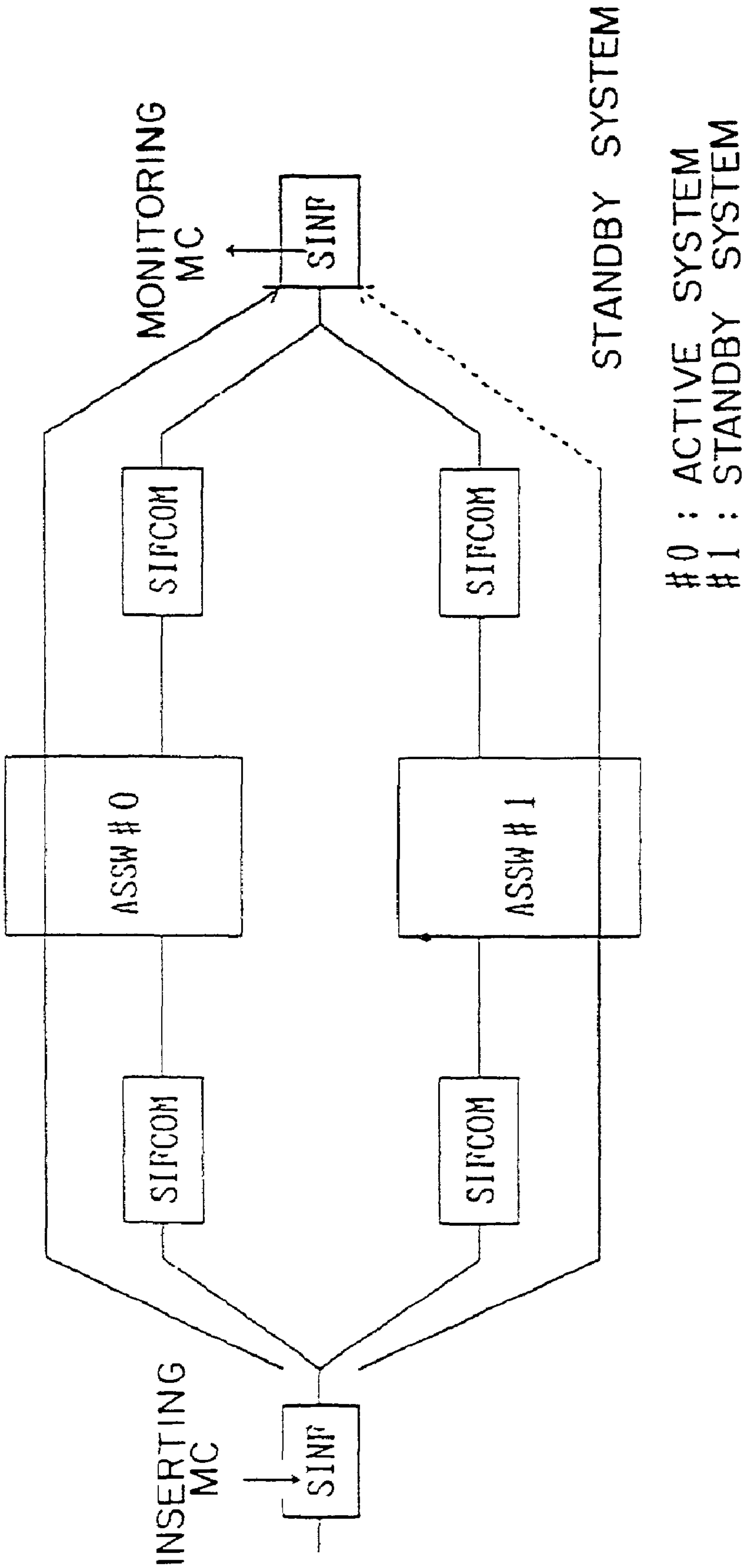

FIG. 153 shows the points of inserting and monitoring the monitoring cell MC, and shows their routes.

Figure 154:
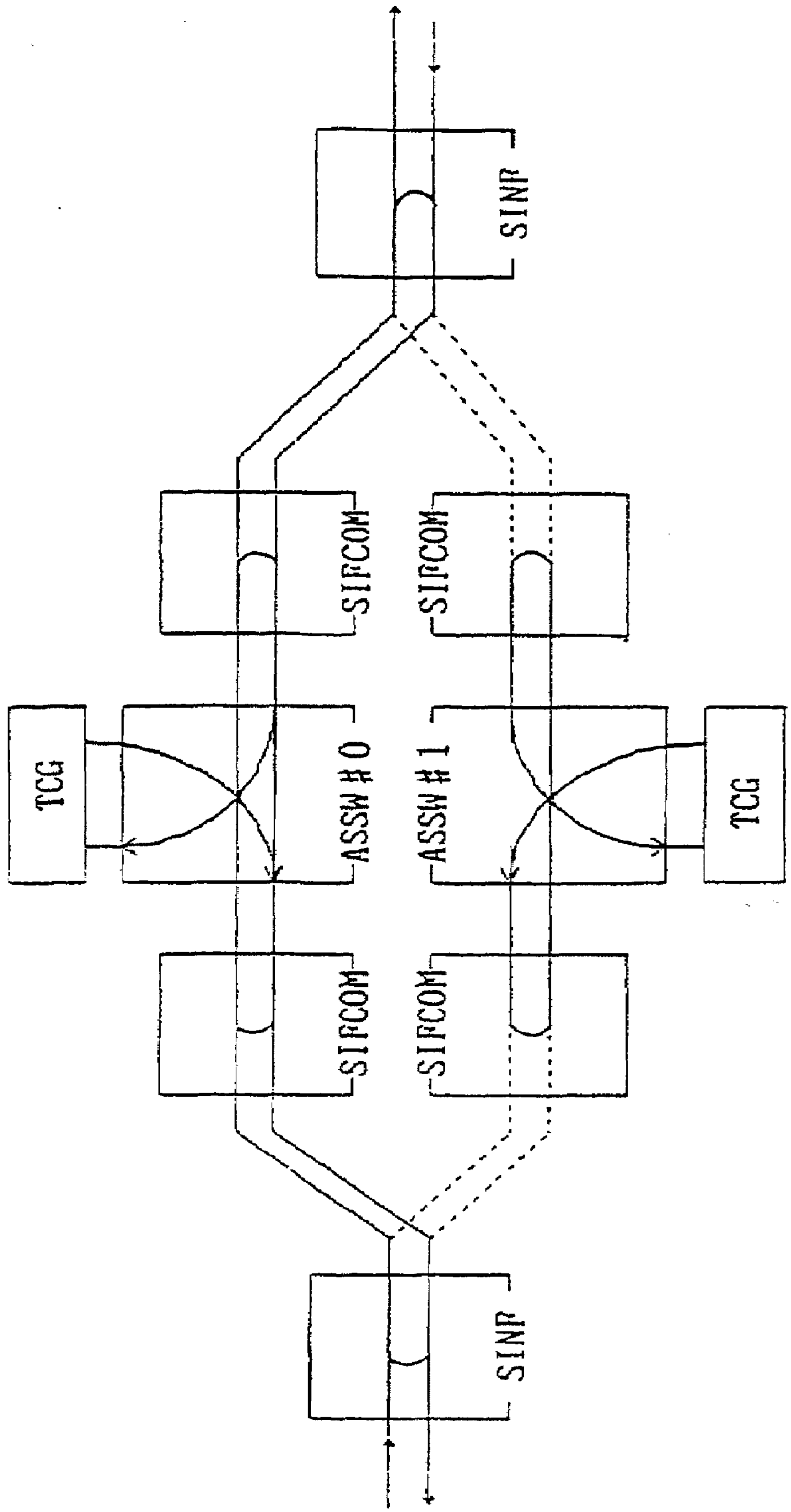

FIG. 154 shows the route of the TCG test.

Figure 155:
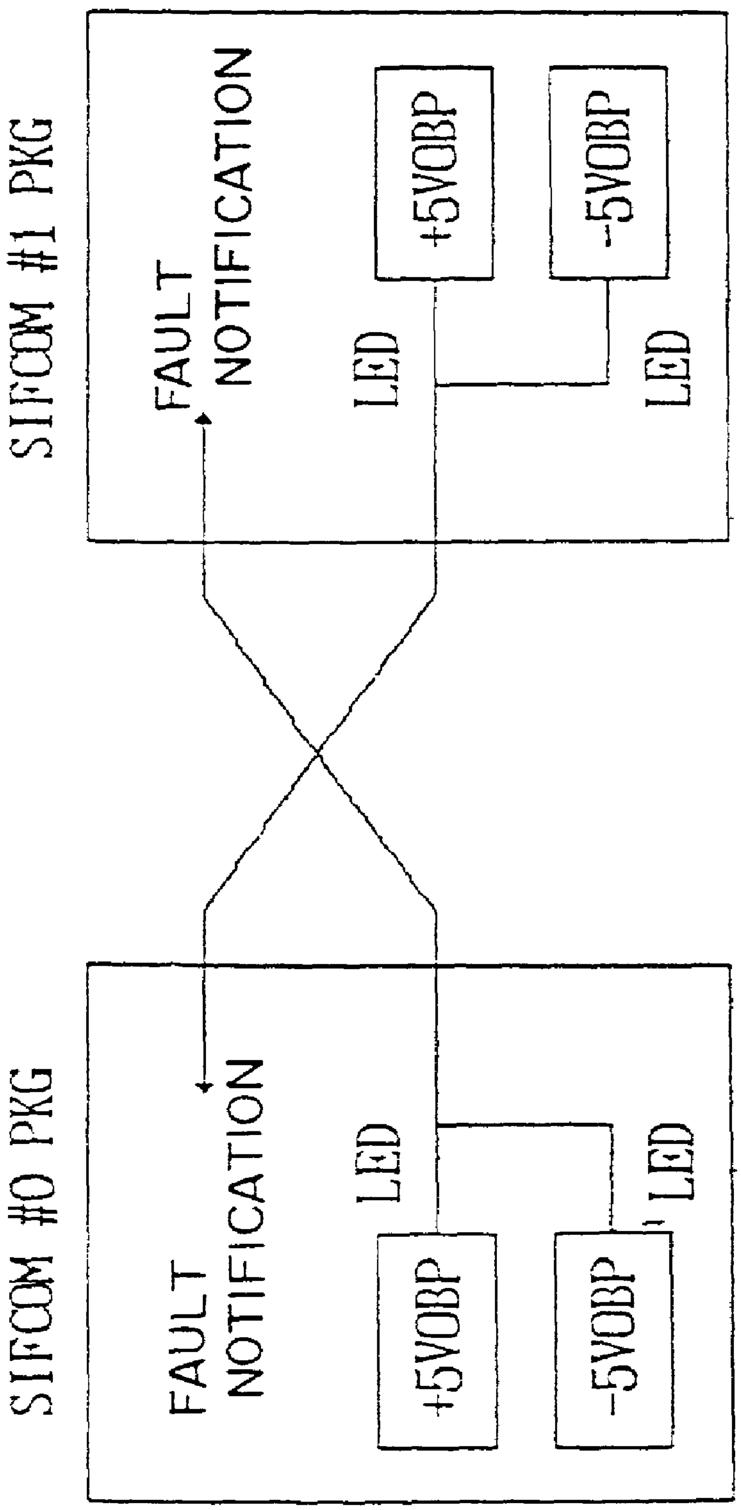

FIG. 155 shows the process of detecting an OBP fault in the SIFCOM.

Figure 156:
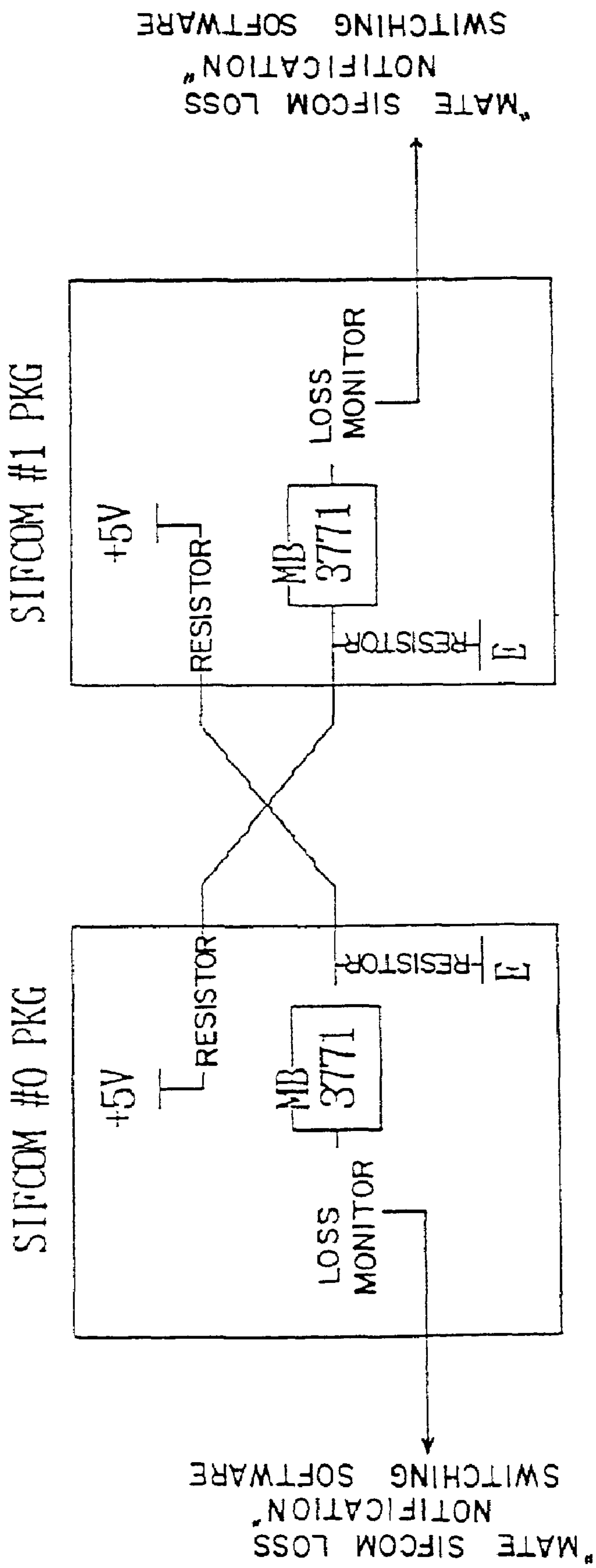

FIG. 156 shows the process of detecting a package missing fault in the SIFCOM.

Figure 157:
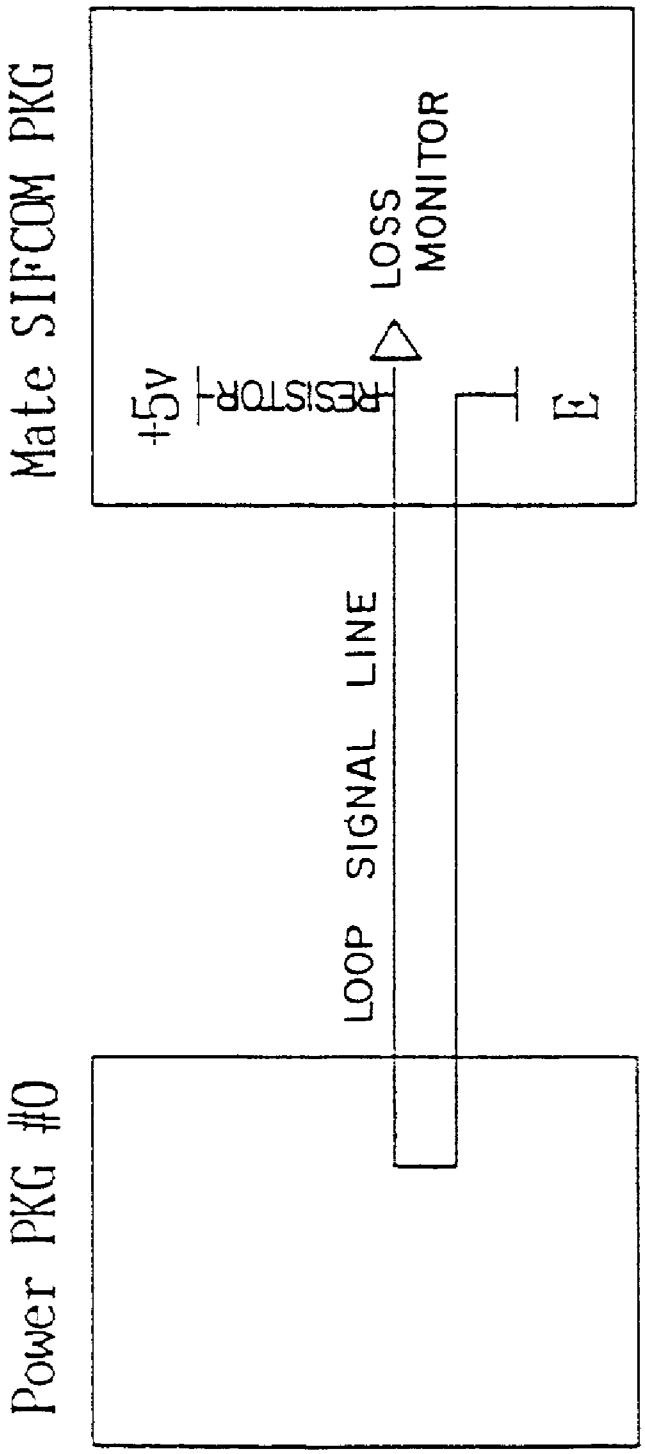

FIG. 157 shows the process of detecting a power package missing fault.

Figure 158:
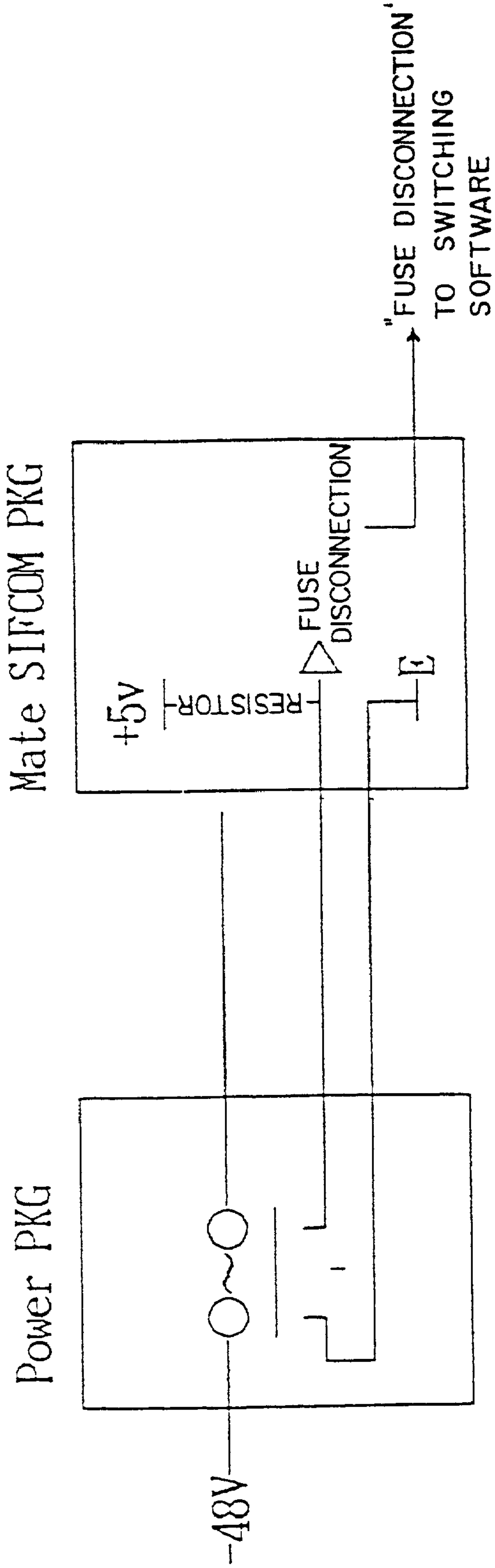

FIG. 158 shows the process of detecting a SIFCOM fuse disconnection fault.

Figure 159:
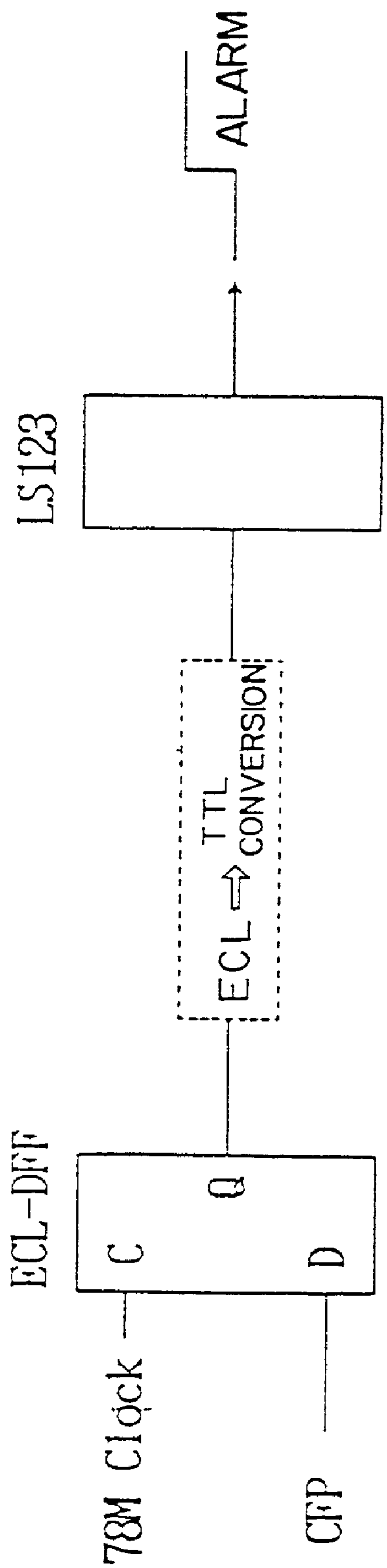

FIG. 159 shows the process of detecting a downward coaxial flat cable fault.

Figure 160:
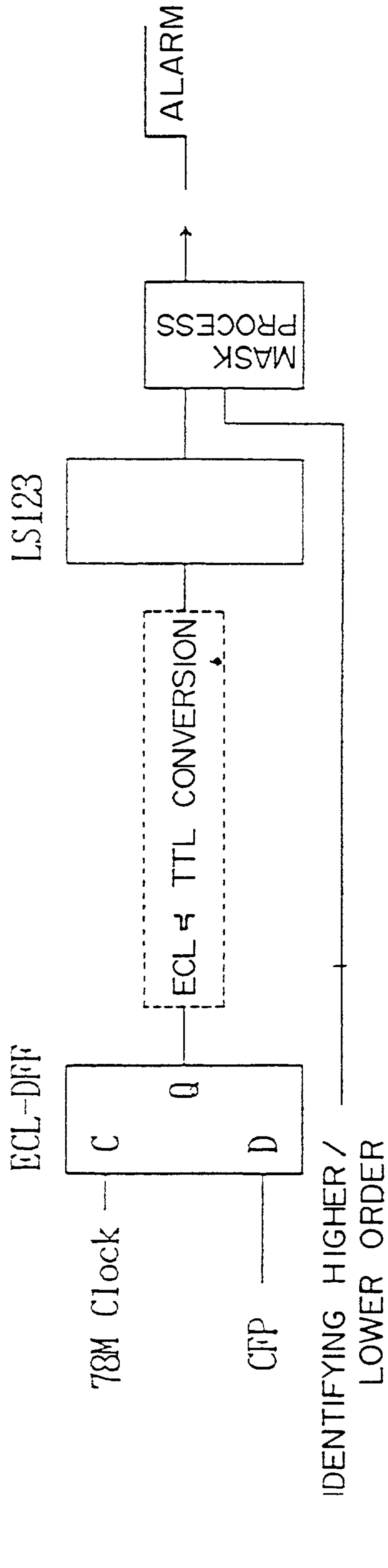

FIG. 160 shows the process of detecting an upward coaxial flat cable fault.

Figure 161:
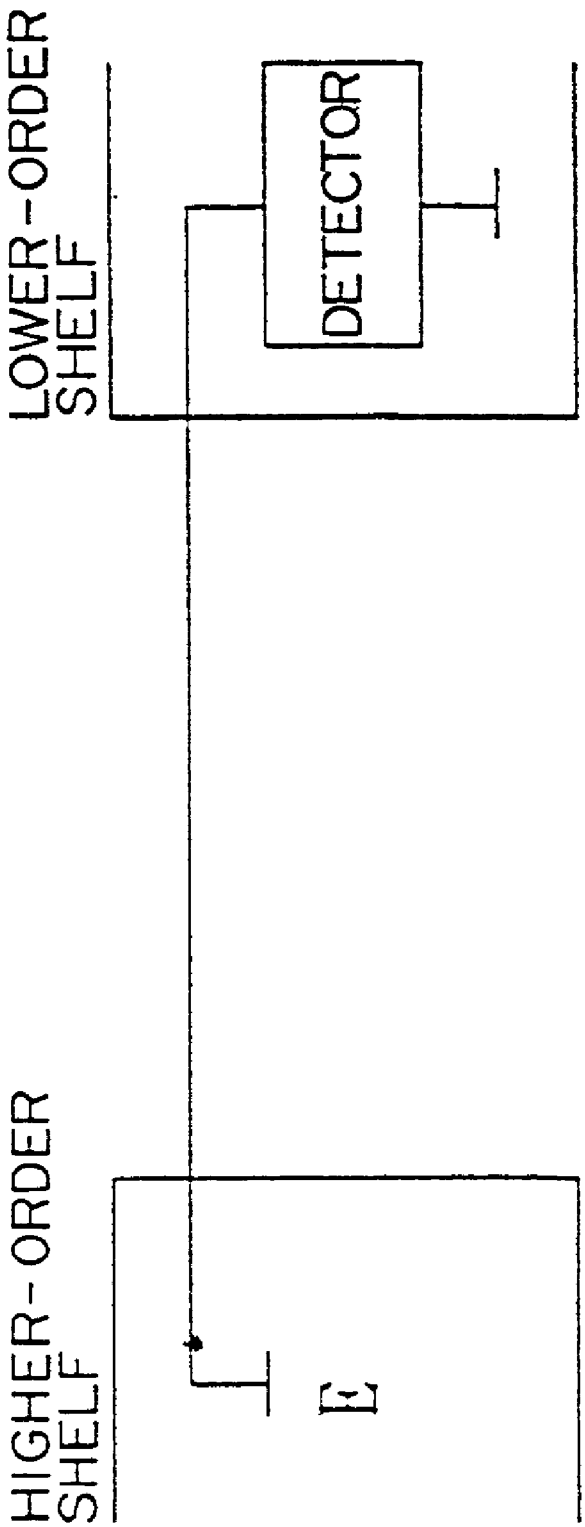

FIG. 161 shows the process of detecting a TD bus cable fault.

Figure 162:
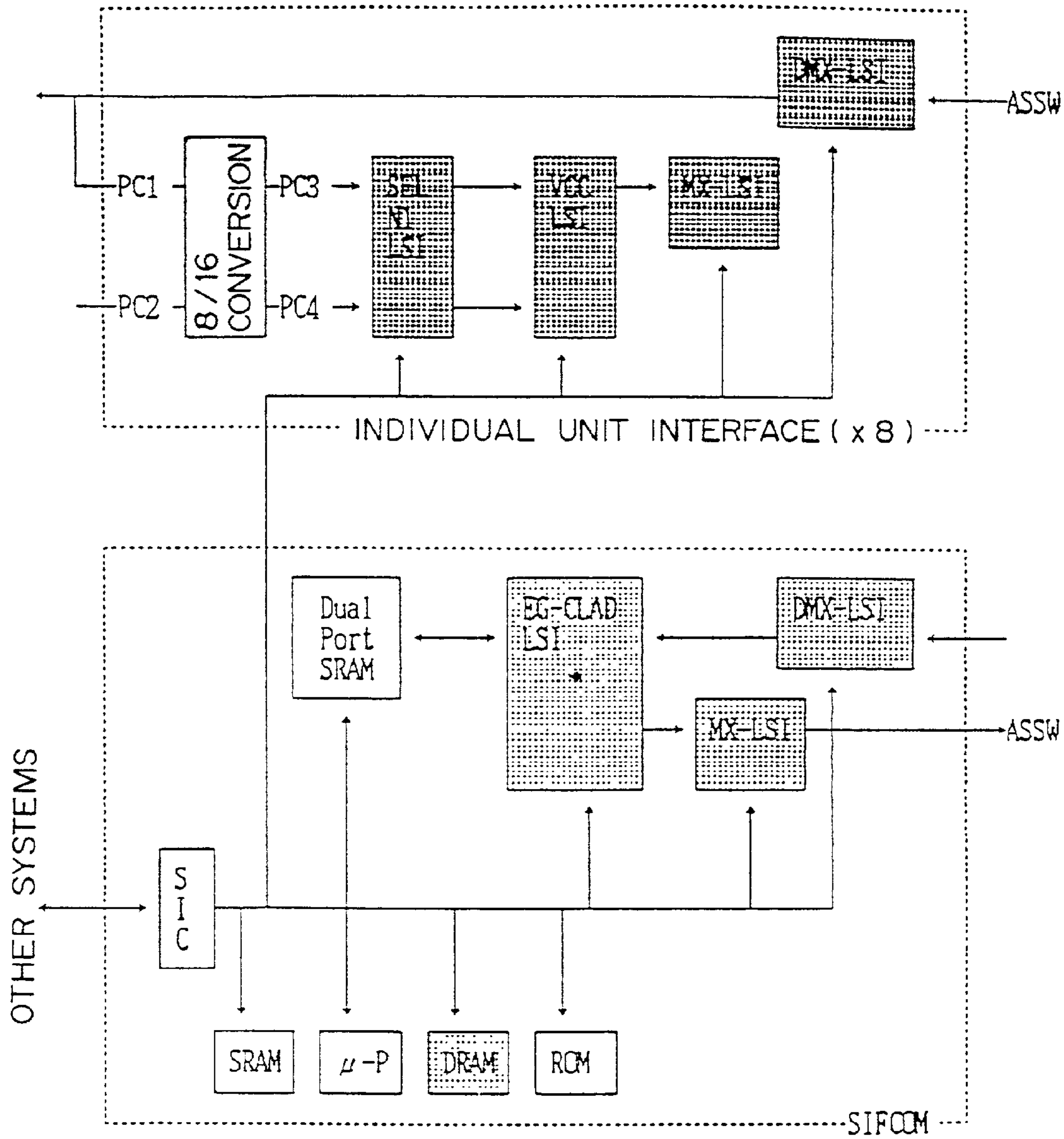

FIG. 162 shows the SIFCOM fault (1).

FIG. 163 shows the SIFCOM fault (2).

Figure 164:
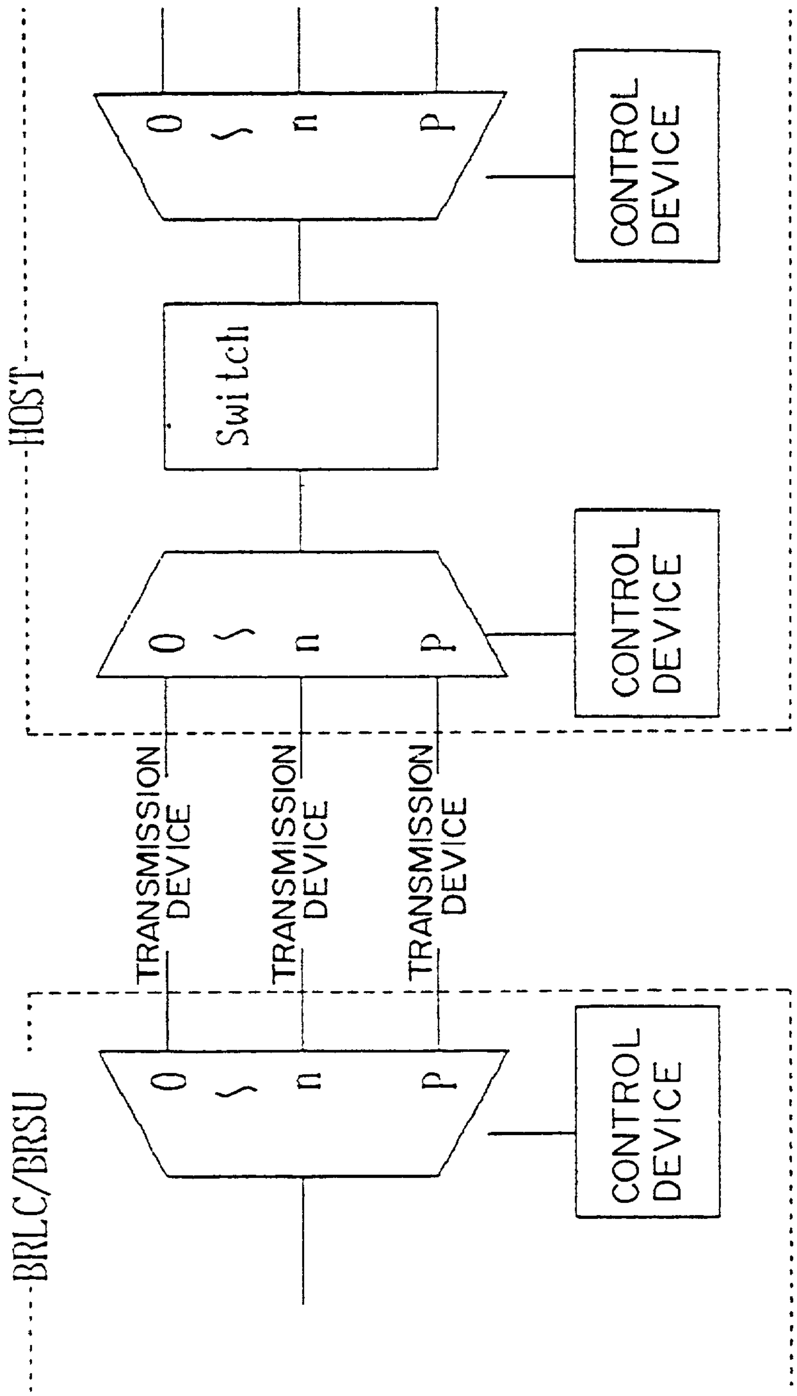

FIG. 164 shows the umbilical circuit for connecting the host switch to the BRLC.

Figure 165:
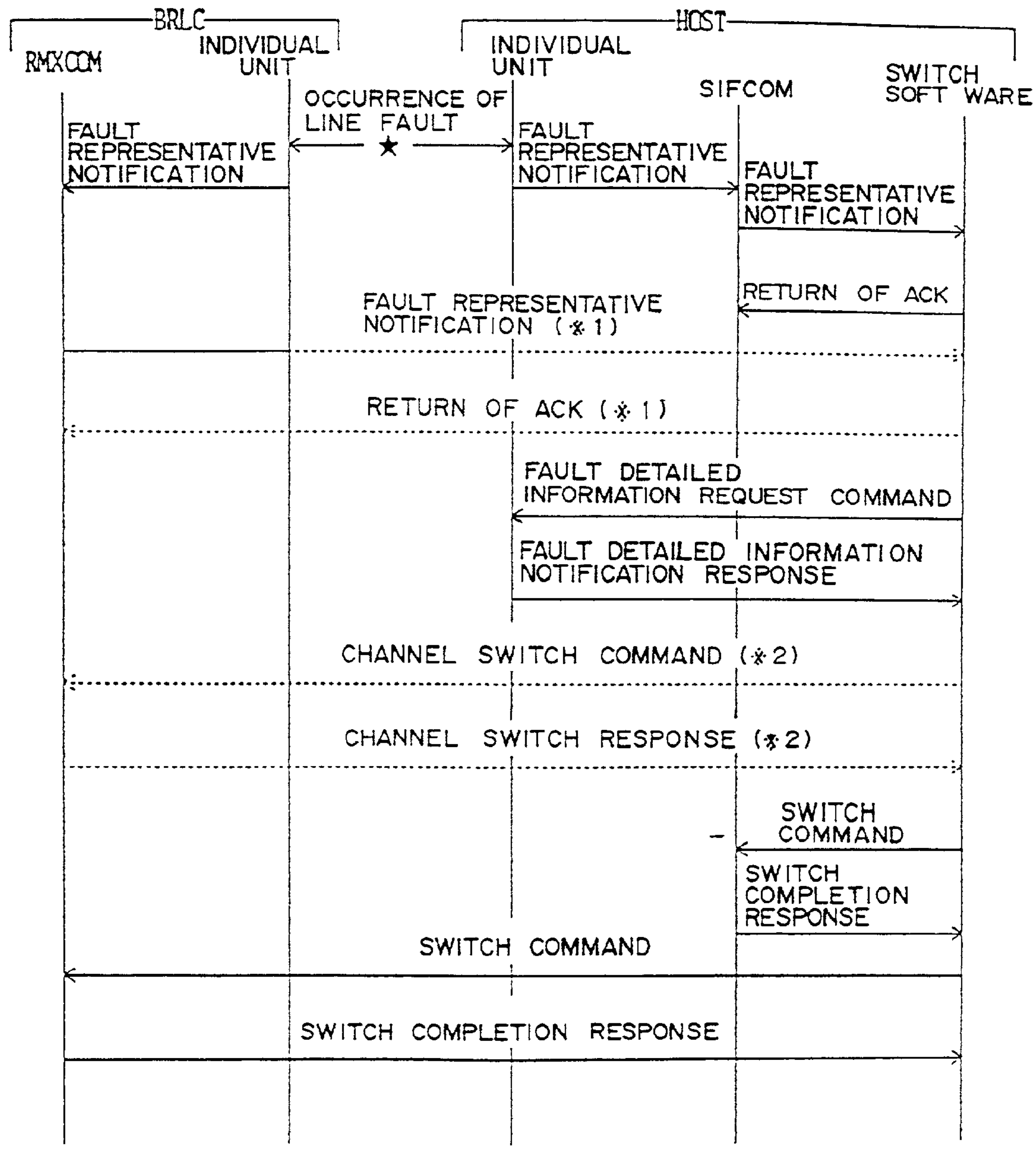

FIG. 165 shows the switching sequence of the circuit in the circuit protection.

Figure 166:
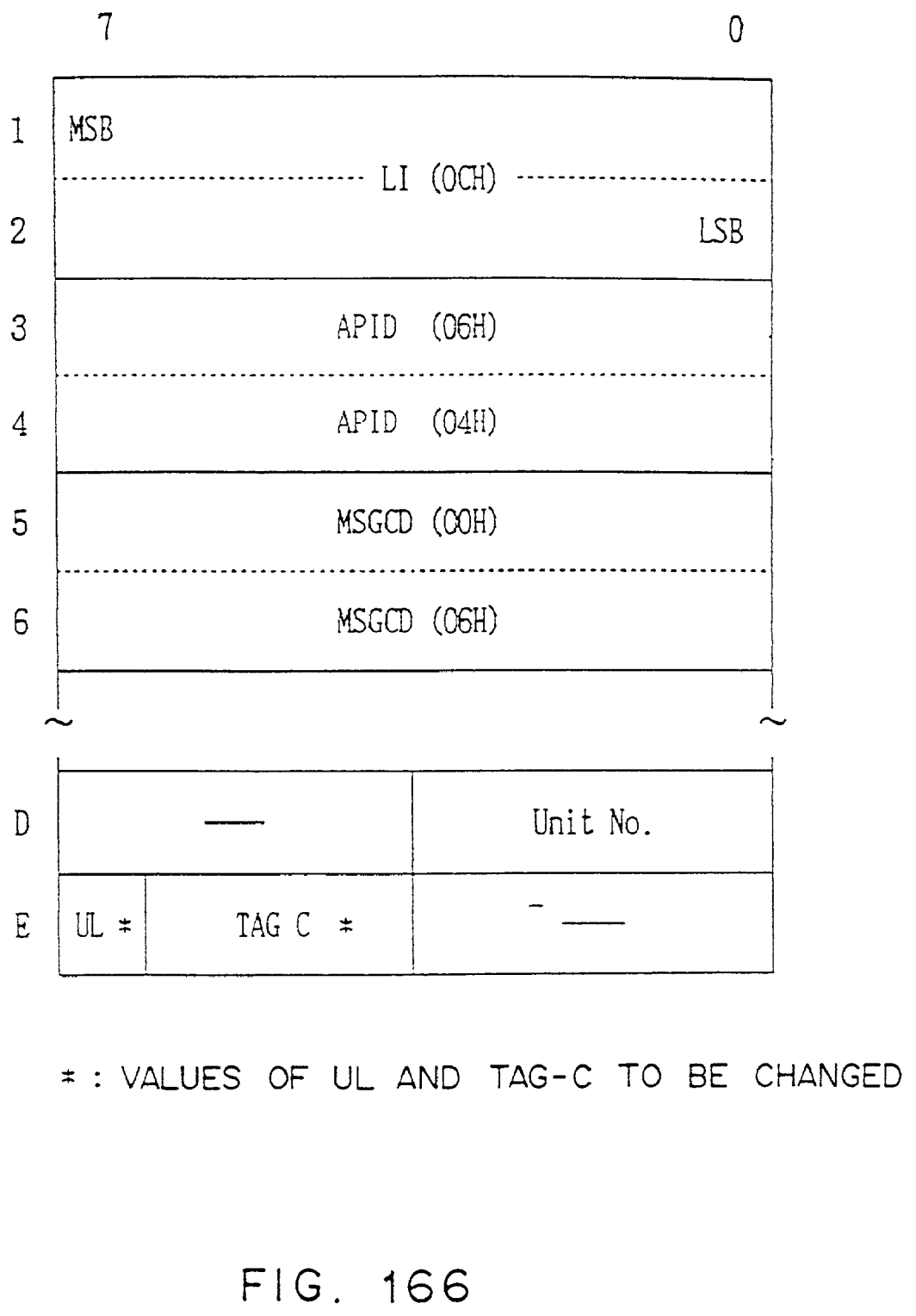

FIG. 166 shows the format of the command for switching circuit.

Figure 167:
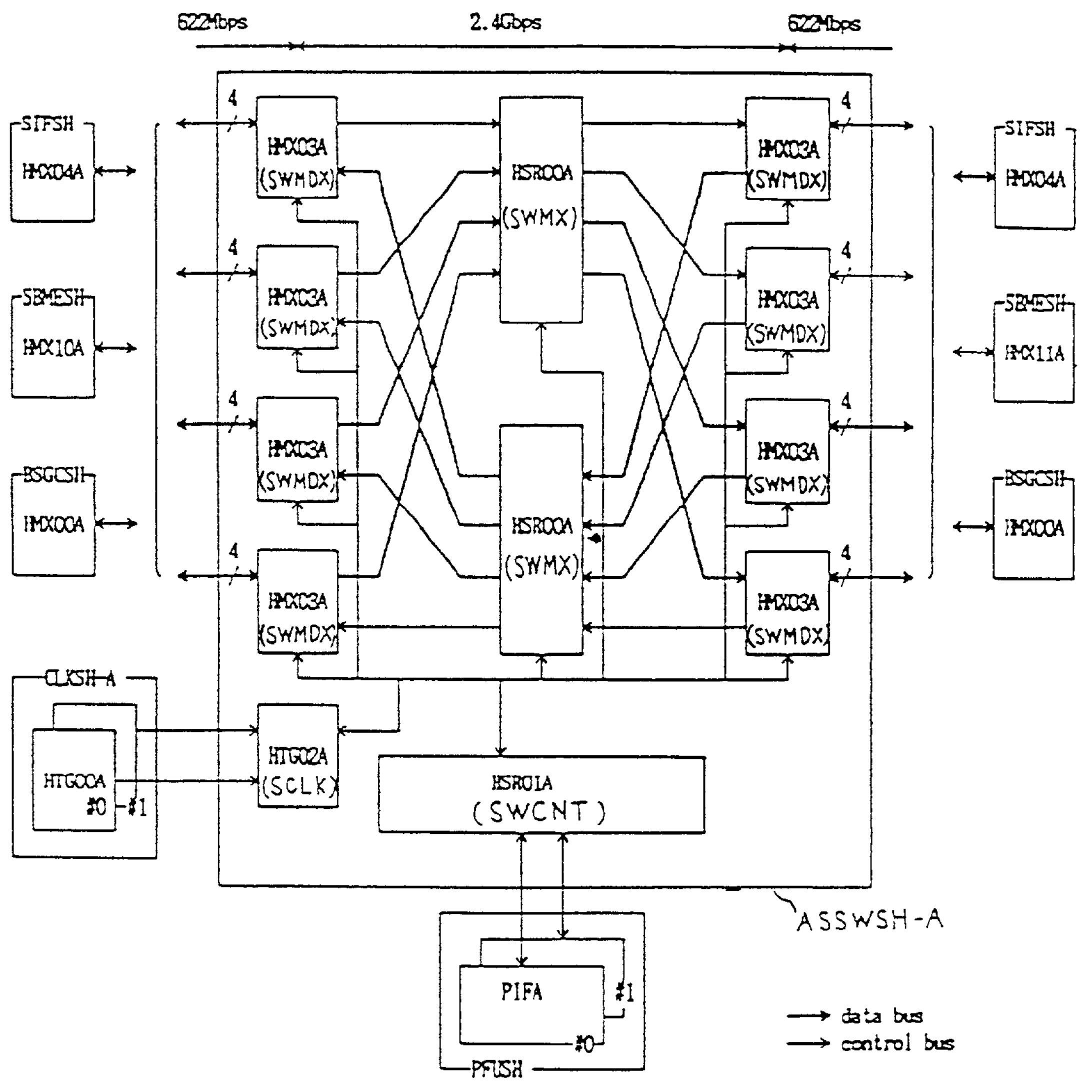

FIG. 167 shows the internal configuration of the ASSWSH-A.

Figure 168:
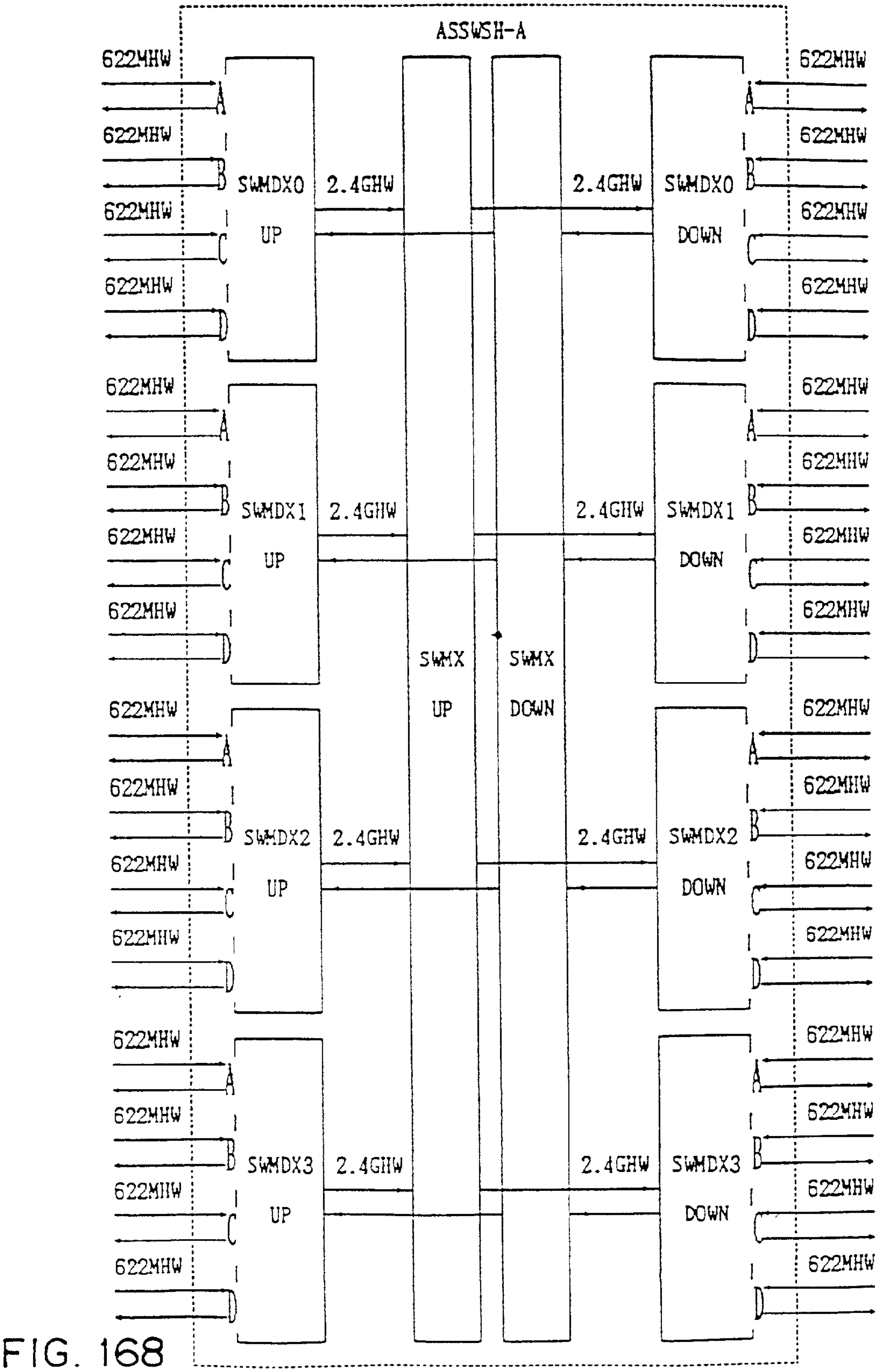

FIG. 168 shows the configuration of the connection of the communications line system.

Figure 169:
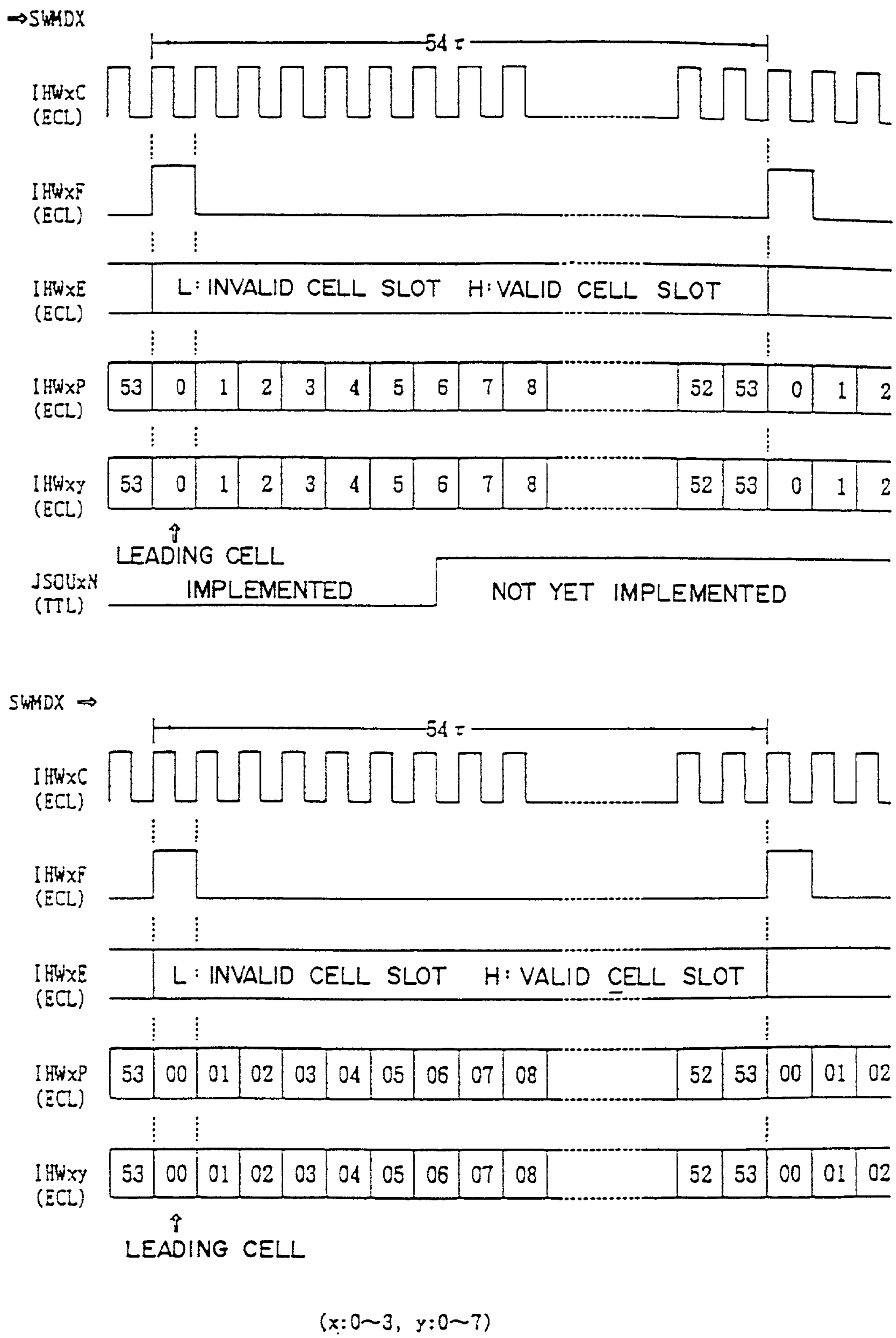

FIG. 169 shows the signal timing in the interface between the SWMDX and the ATM highway of 622 Mbps.

FIG. 170 shows the format of the cell in the interface between the SWMDX and the ATM highway of 622 Mbps.

Figure 171:
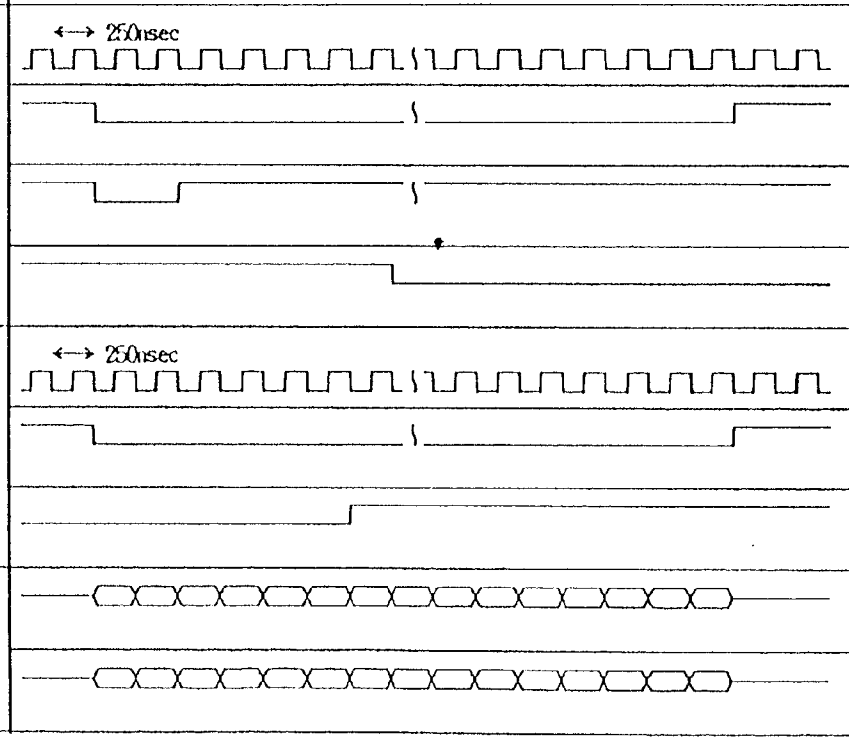

FIG. 171 shows the interface between the INFA and ASSWSH-A.

Figure 172:
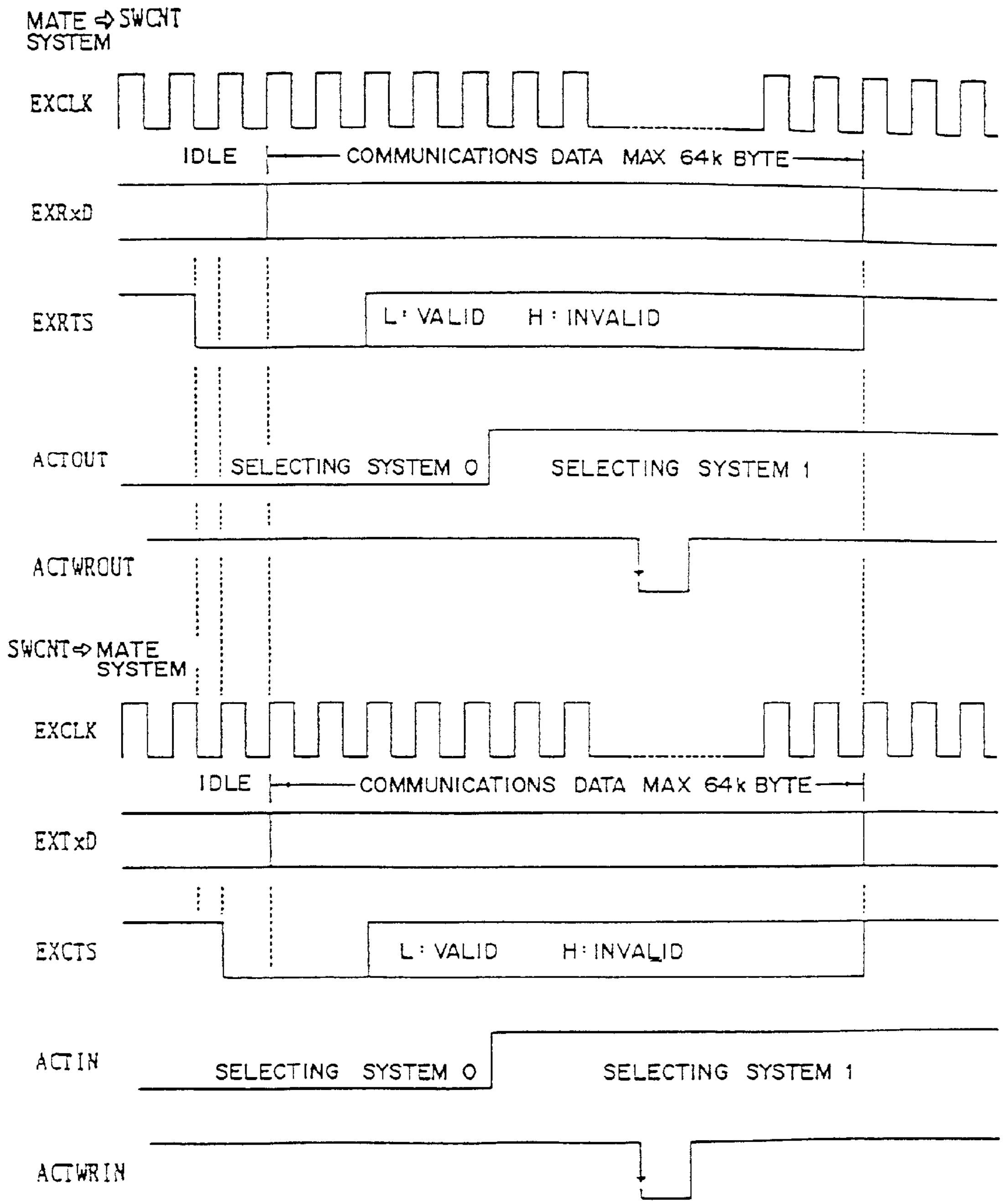

FIG. 172 shows the interface between the SWCNT of the home system and the SWCNT of the mate system.

Figure 173:
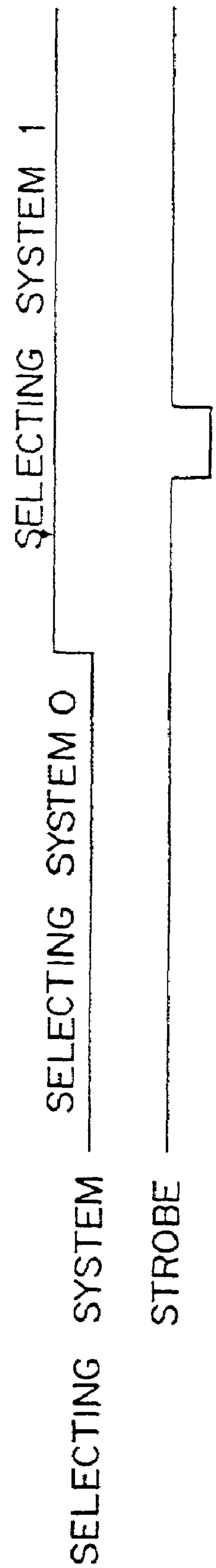

FIG. 173 shows the system selection signal and its strobe signal.

FIG. 174 shows the system selection logic related to the system selection signal.

Figure 175:
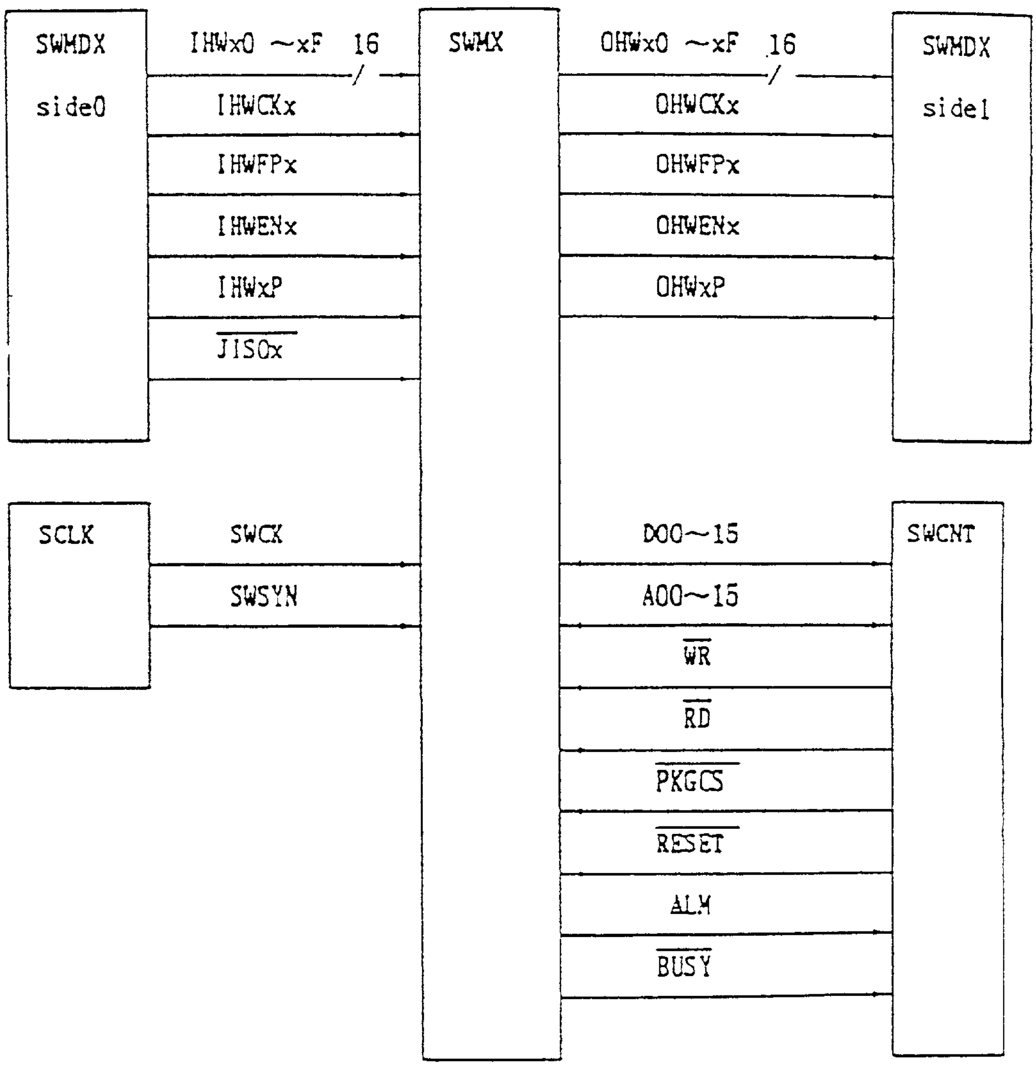

FIG. 175 shows the external interface (1) for the SWMX.

FIG. 176 shows the external interface (2) for the SWMX.

Figure 177:
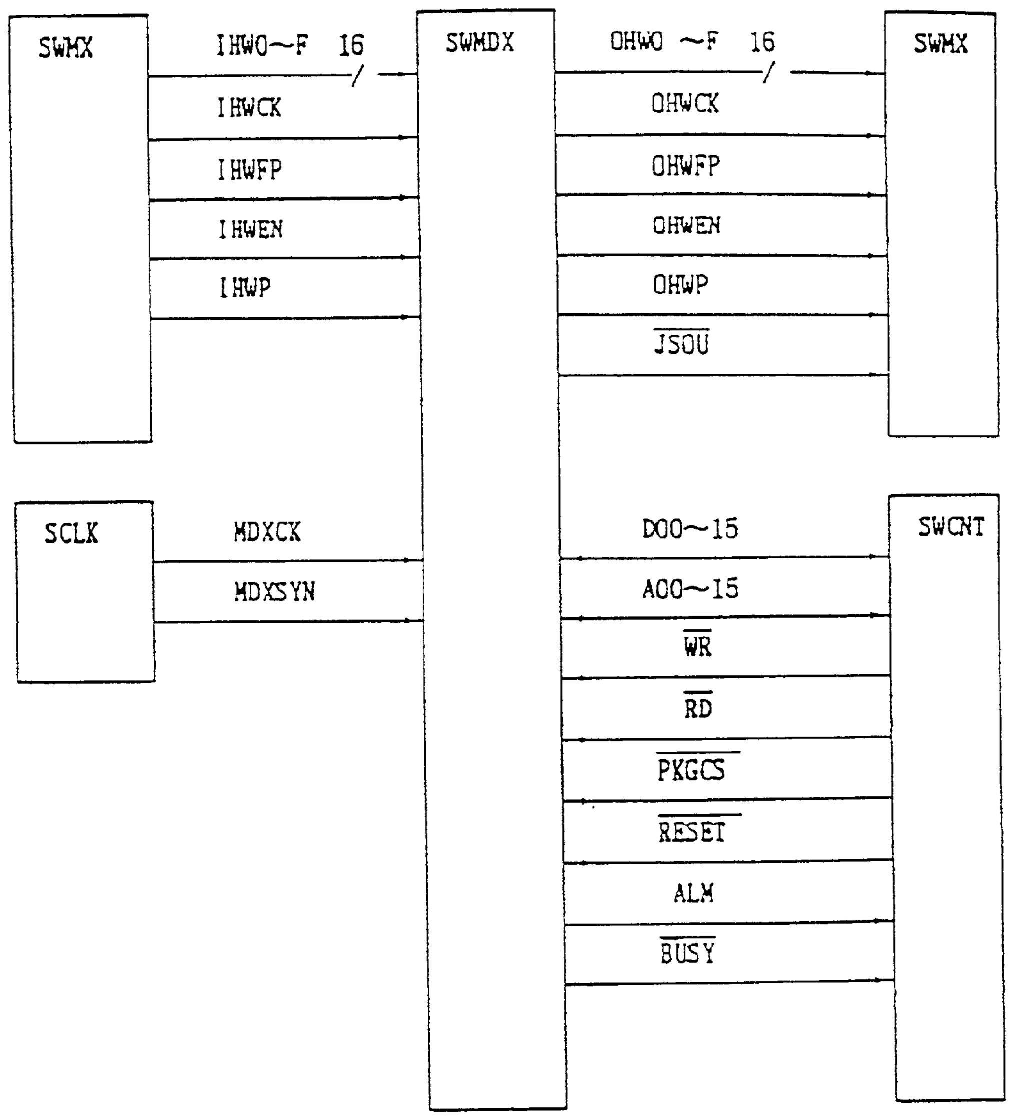

FIG. 177 shows the external interface (1) for the SWMDX.

FIG. 178 shows the external interface (2) for the SWMDX.

Figure 179:
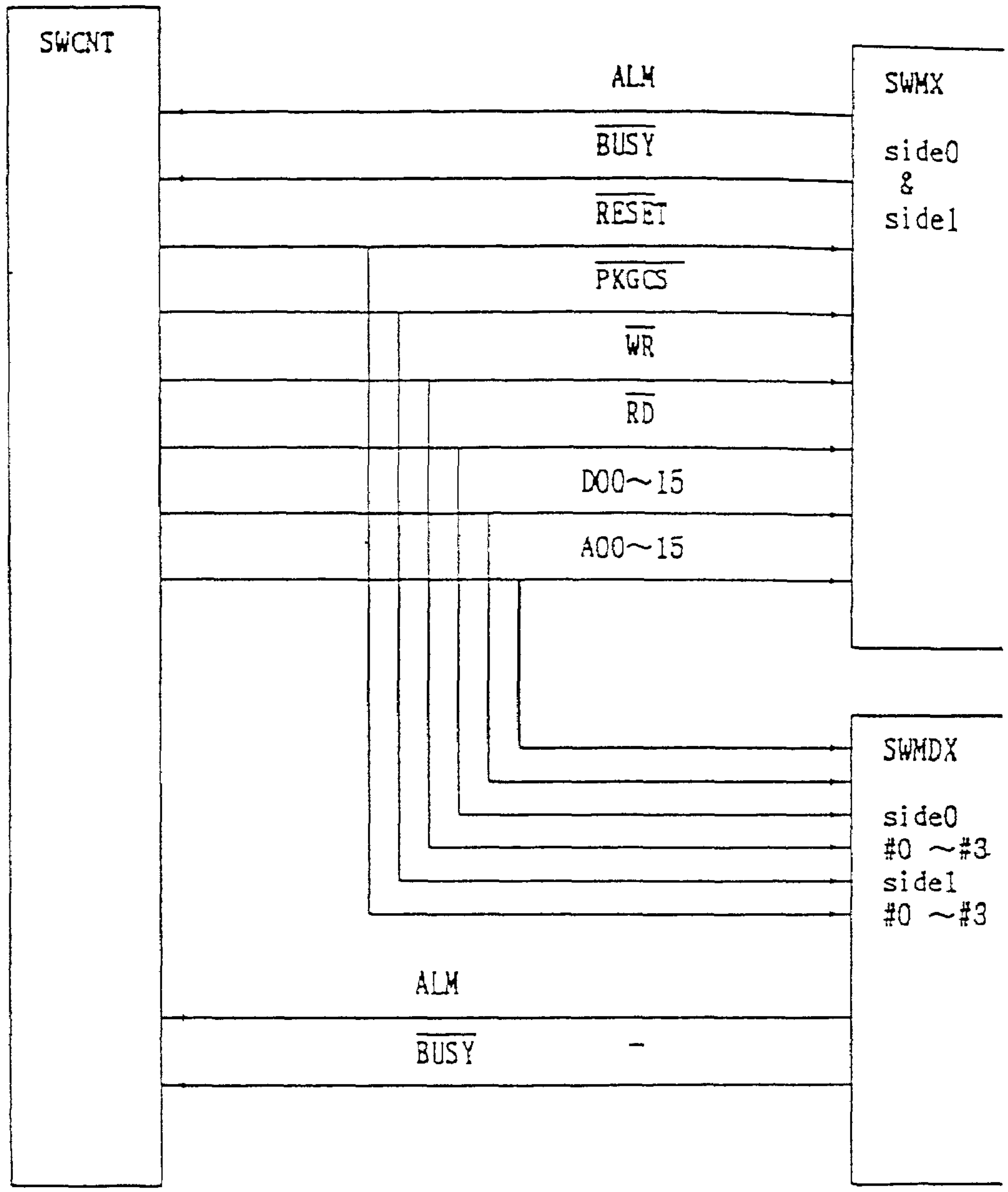

FIG. 179 shows the external interface (1) for the SWCNT.

FIG. 180 shows the external interface (2) for the SWCNT.

FIG. 181 shows the detailed functions of each block forming part of the ASSWSH-A.

Figure 182:
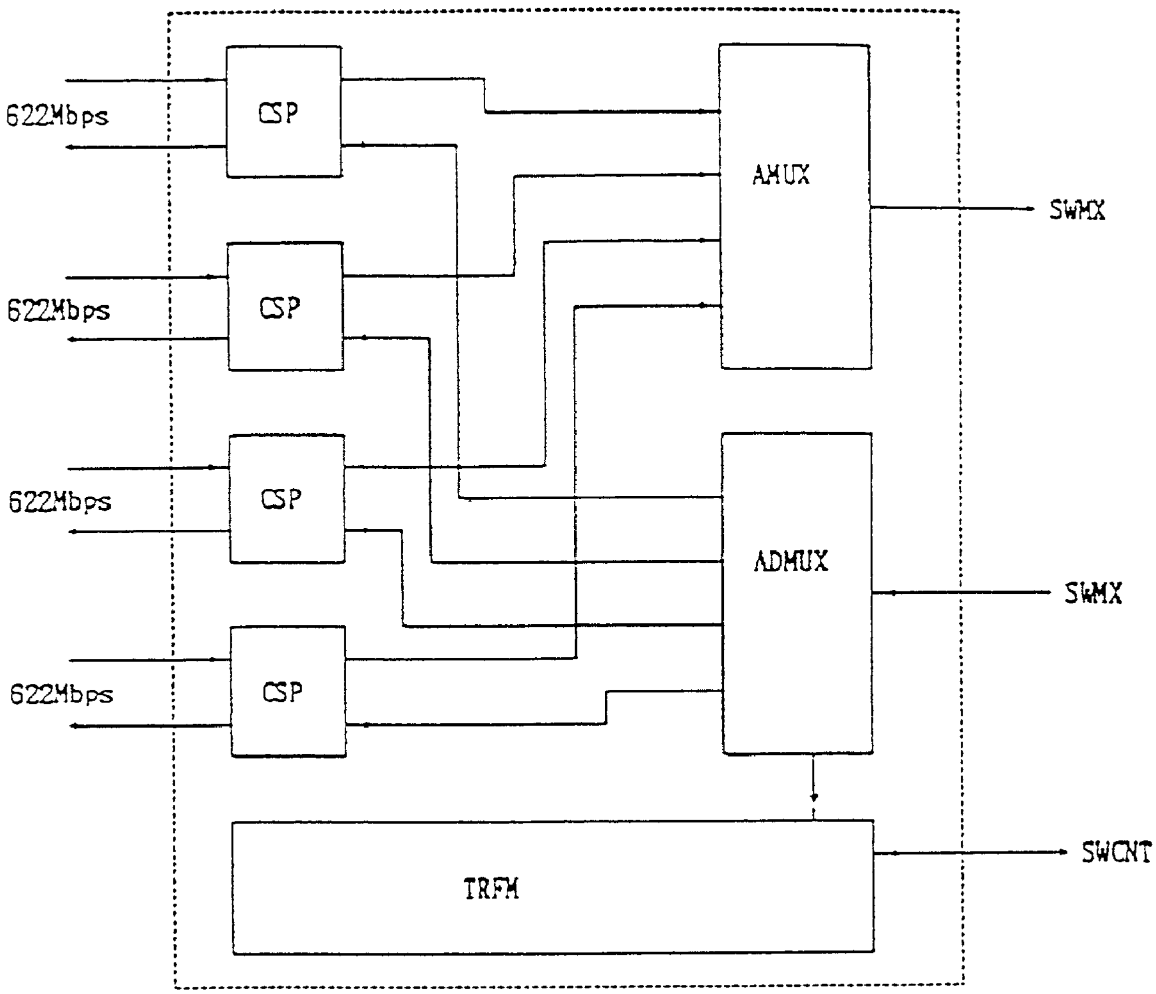

FIG. 182 shows each block forming part of the SWMDX.

FIG. 183 shows the functions of each block in the SWMDX.

Figure 184:
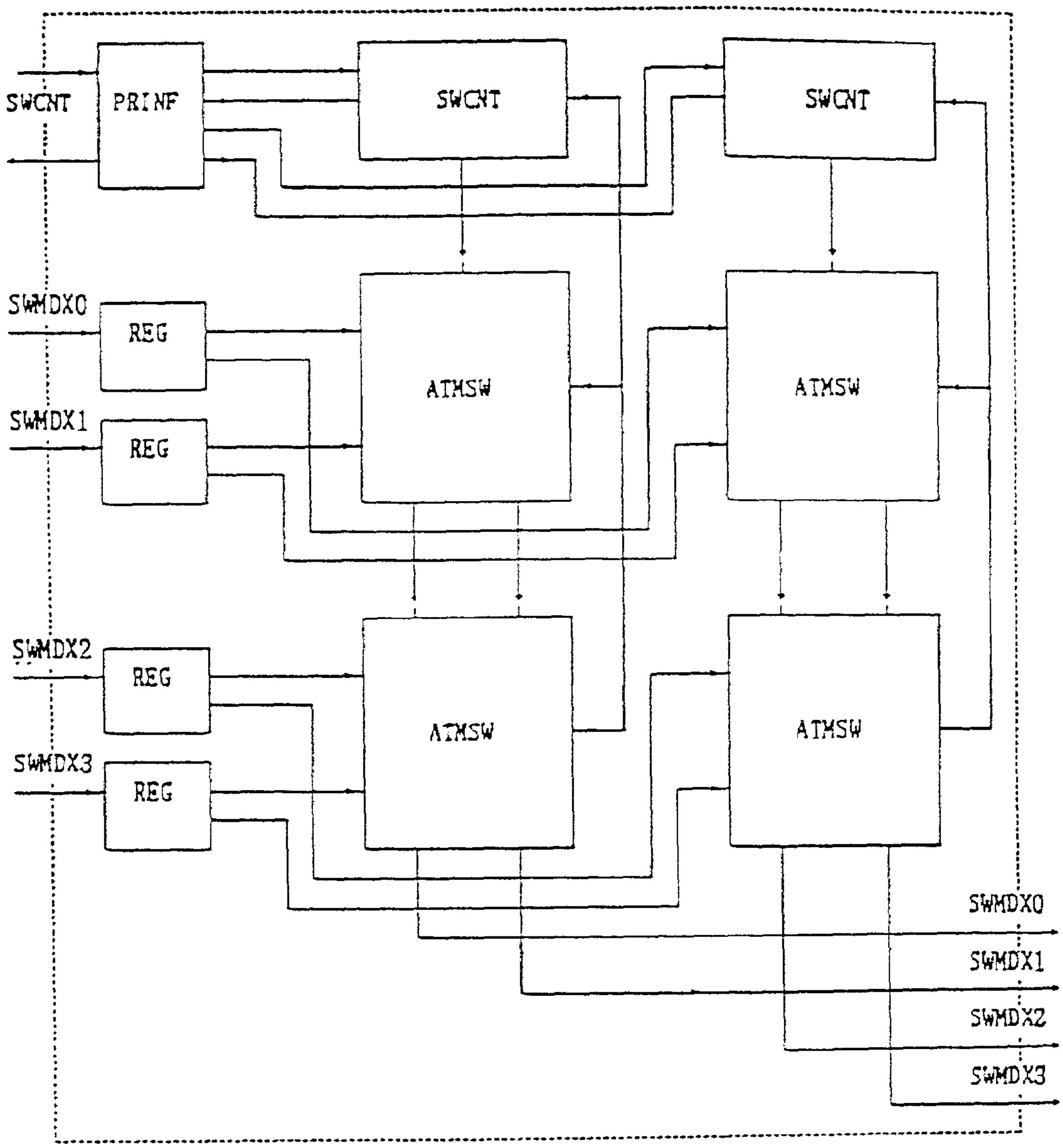

FIG. 184 shows each block forming part of the SWMX.

FIG. 185 shows the functions of each block in the SWMX.

Figure 186:
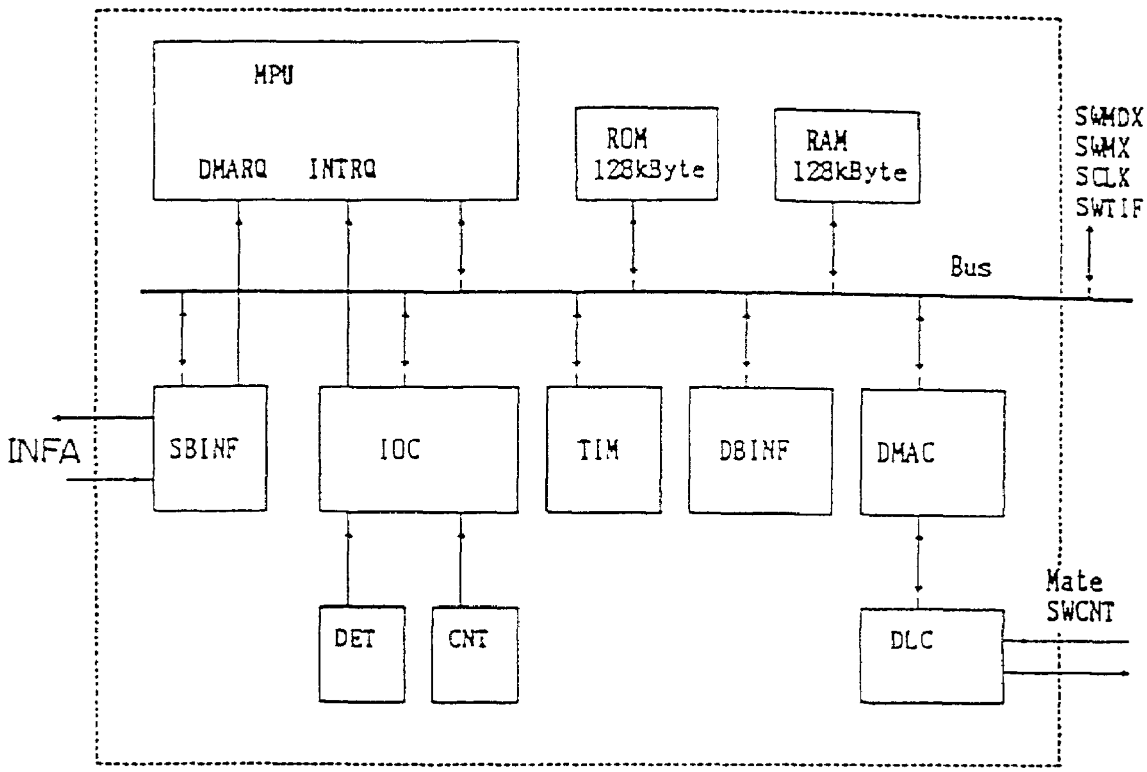

FIG. 186 shows each block forming part of the SWCNT.

FIG. 187 shows the functions of each block in the SWCNT.

Figure 188:
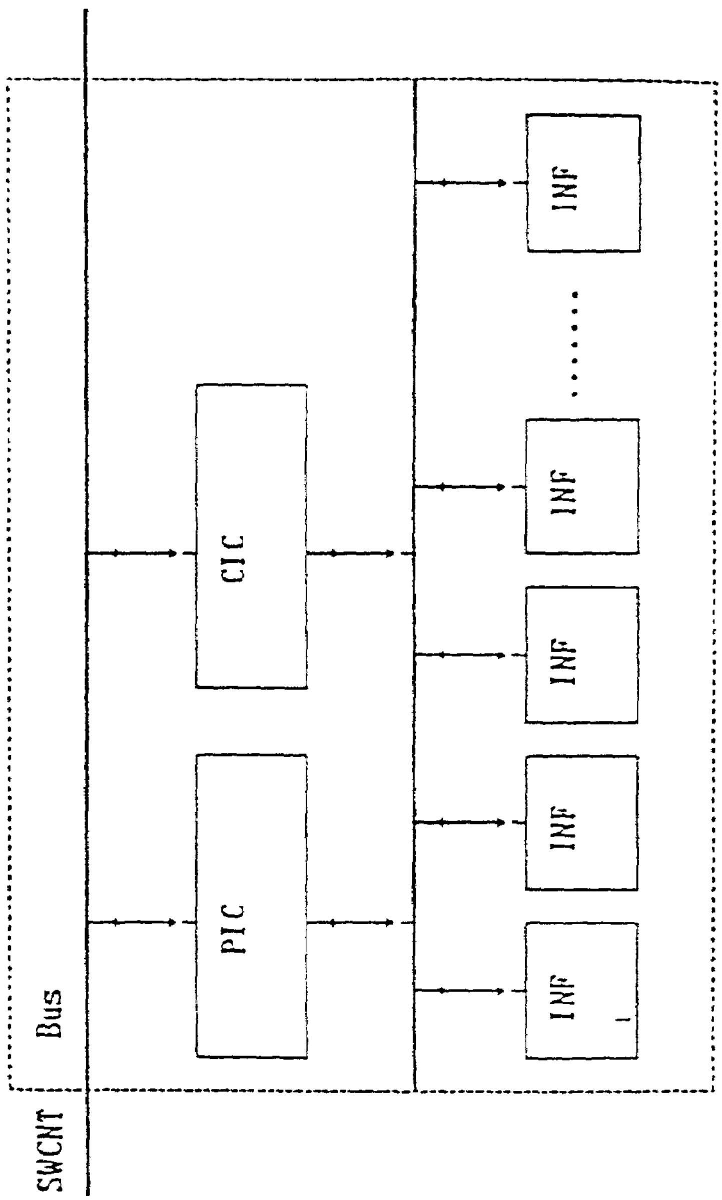

FIG. 188 shows each block forming part of the SWTIF.

FIG. 189 shows-the functions of each block in the SWTIF.

Figure 190:
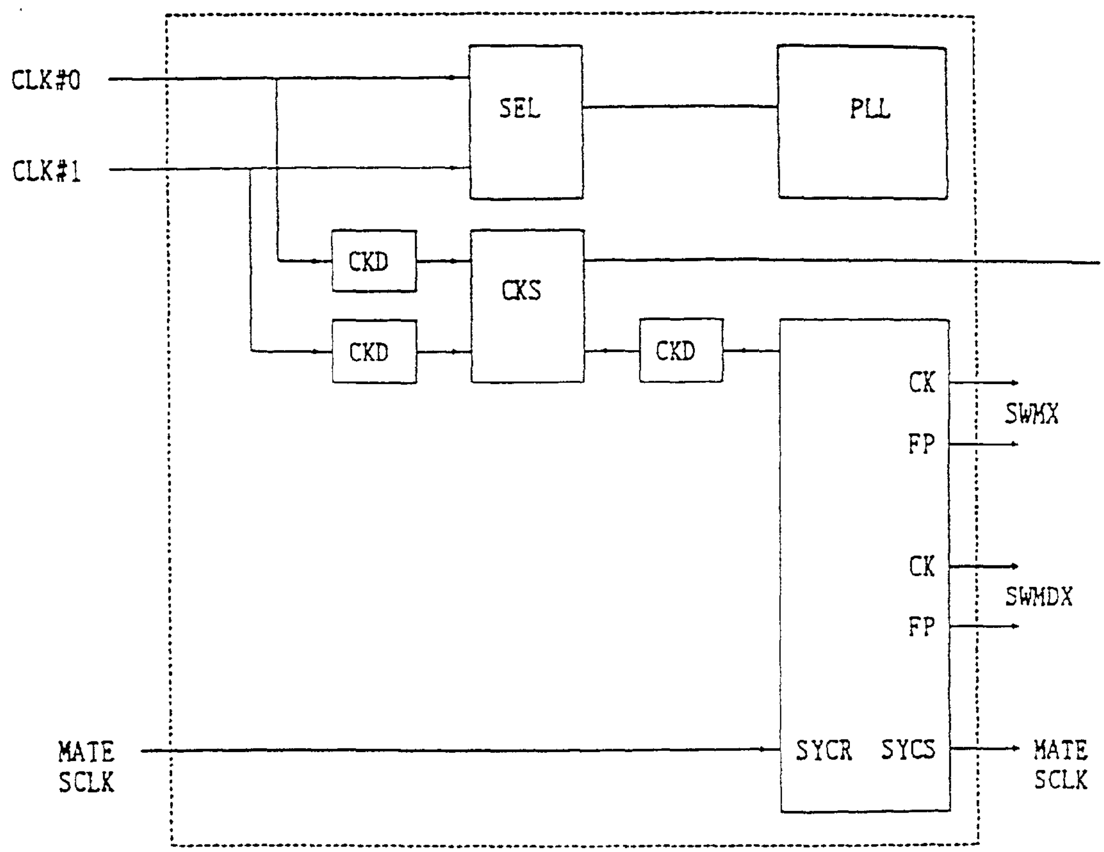

FIG. 190 shows each block forming part of the SCLK.

FIG. 191 shows the functions of each block in the SCLK.

FIG. 192 shows the cell discard class.

FIG. 193 is a block diagram showing the traffic measuring circuit.

Figure 194:
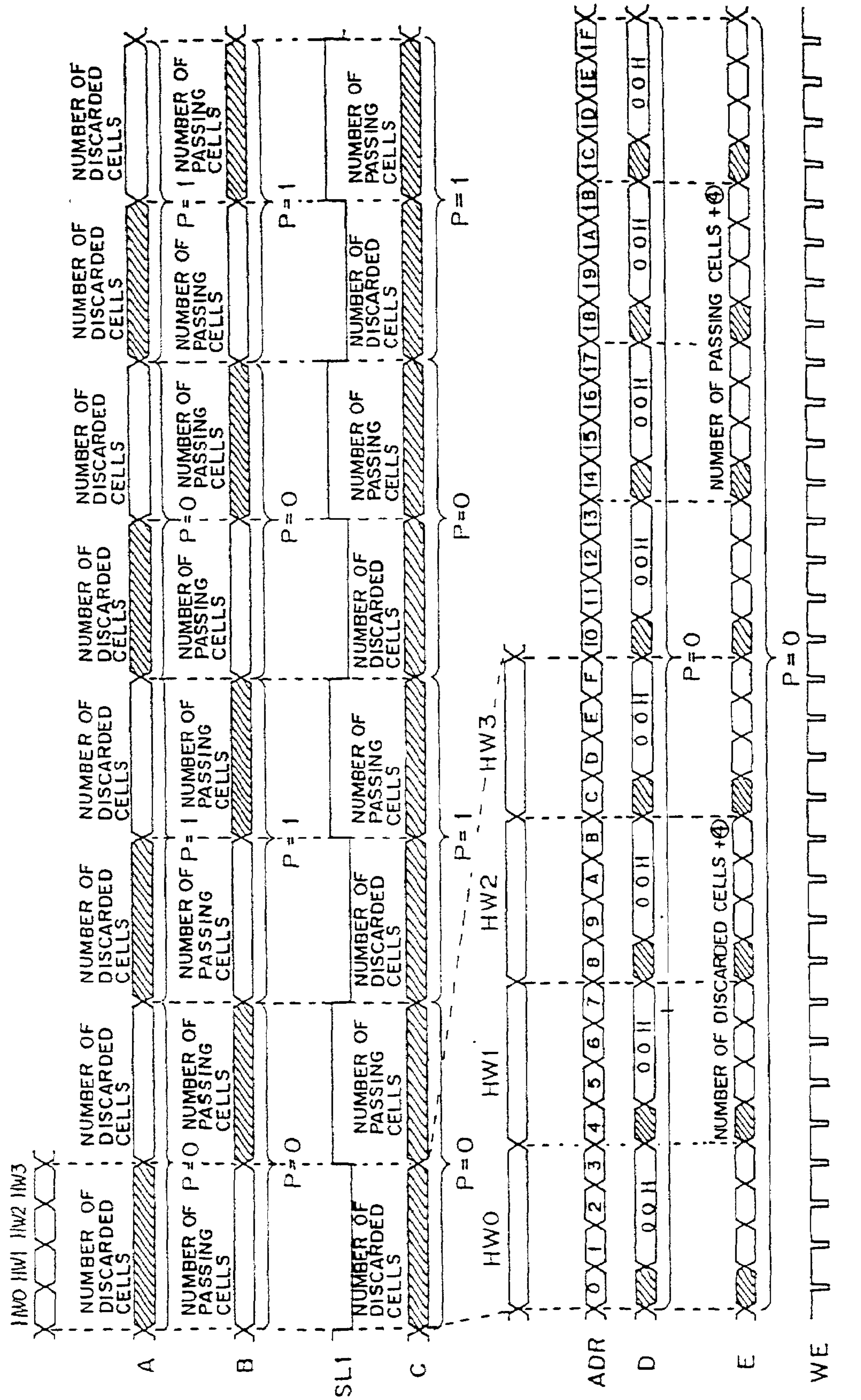

FIG. 194 is a timing chart showing the operation of the traffic measuring circuit.

Figure 195:
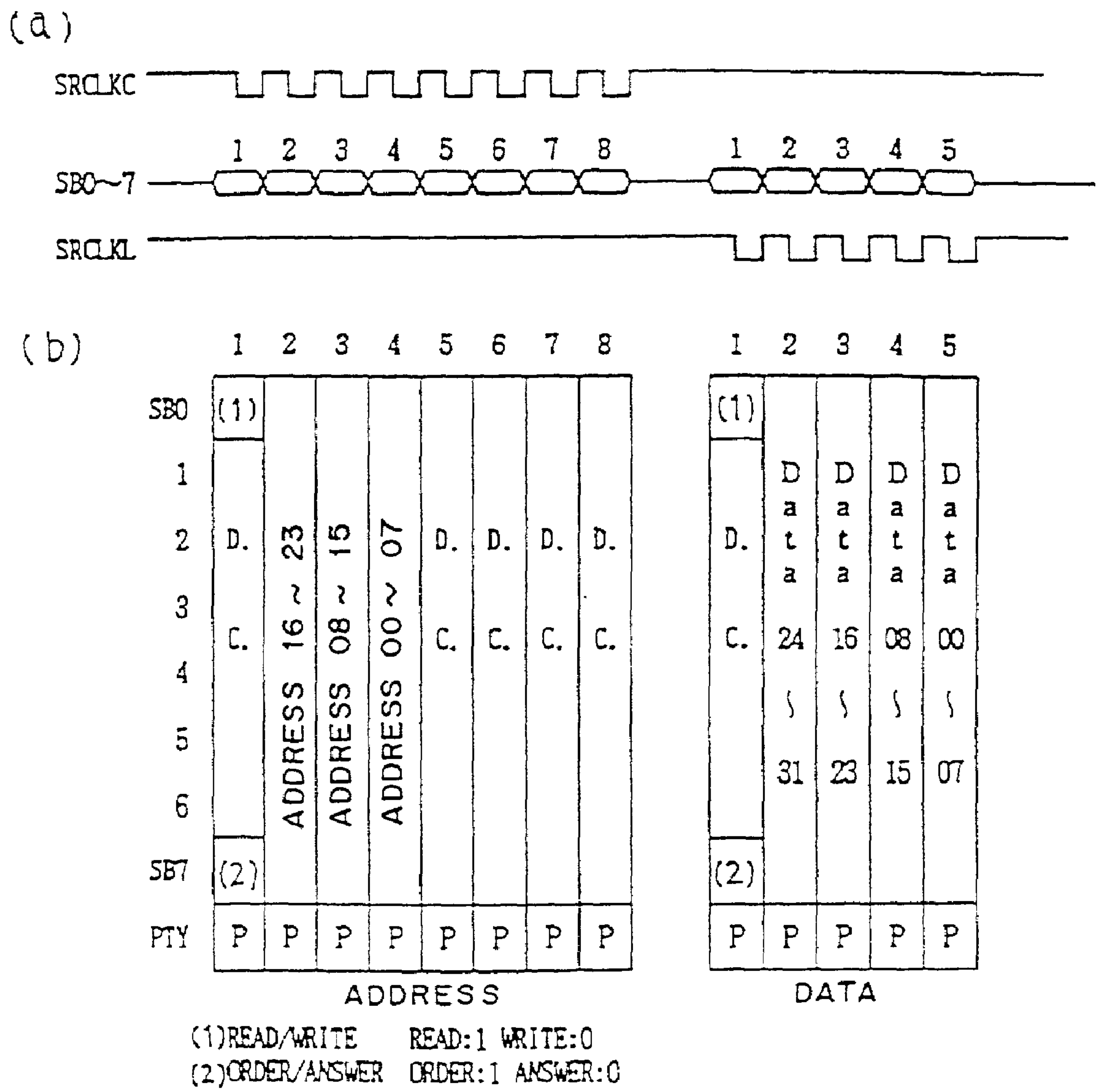

FIG. 195 is a timing chart (a) showing the CC access (IN instruction) and shows the address/data format (b).

Figure 196:
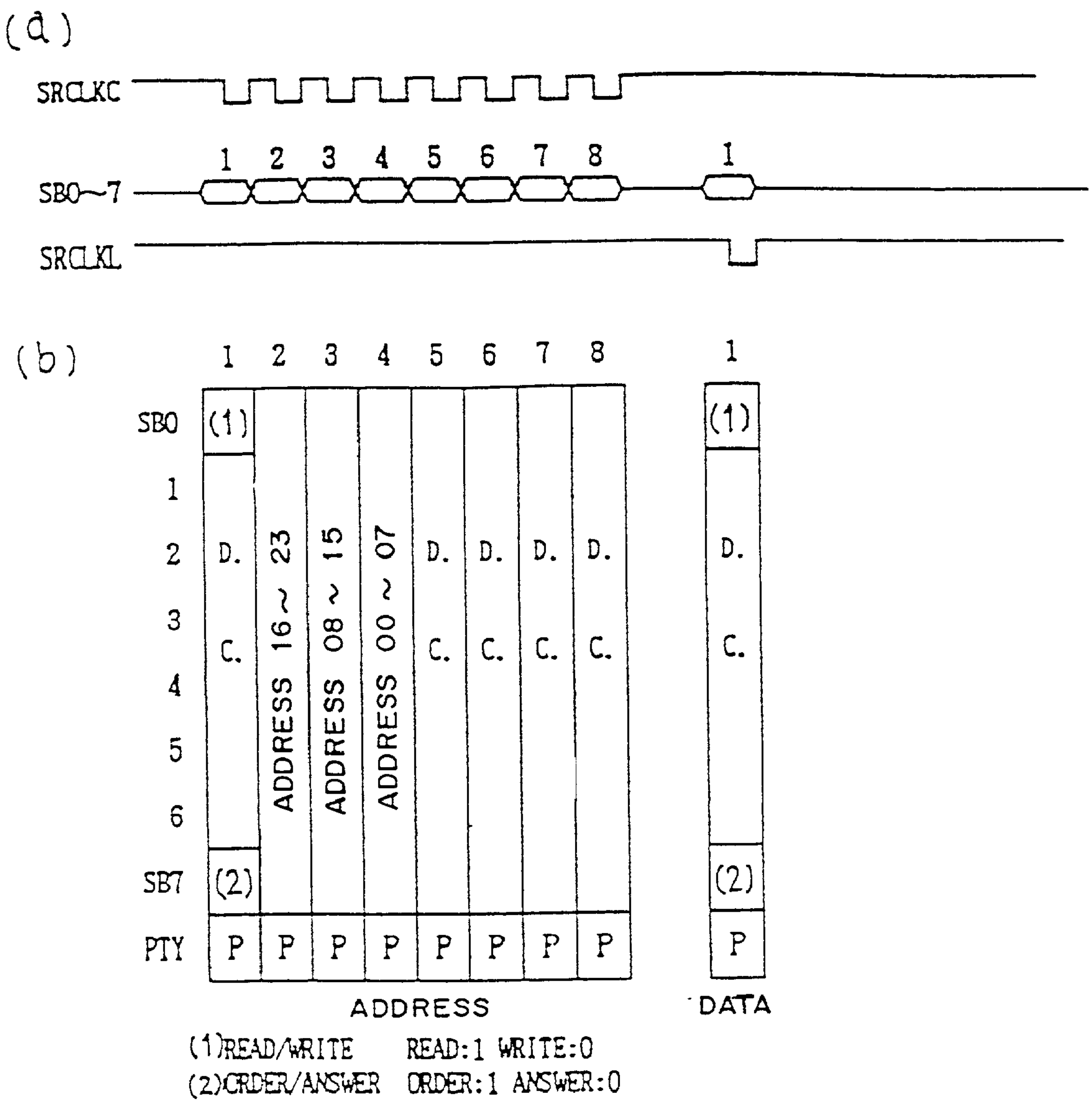

FIG. 196 is a timing chart (a) showing the CC access (OUT instruction) and shows the address/data format (b).

Figure 197:
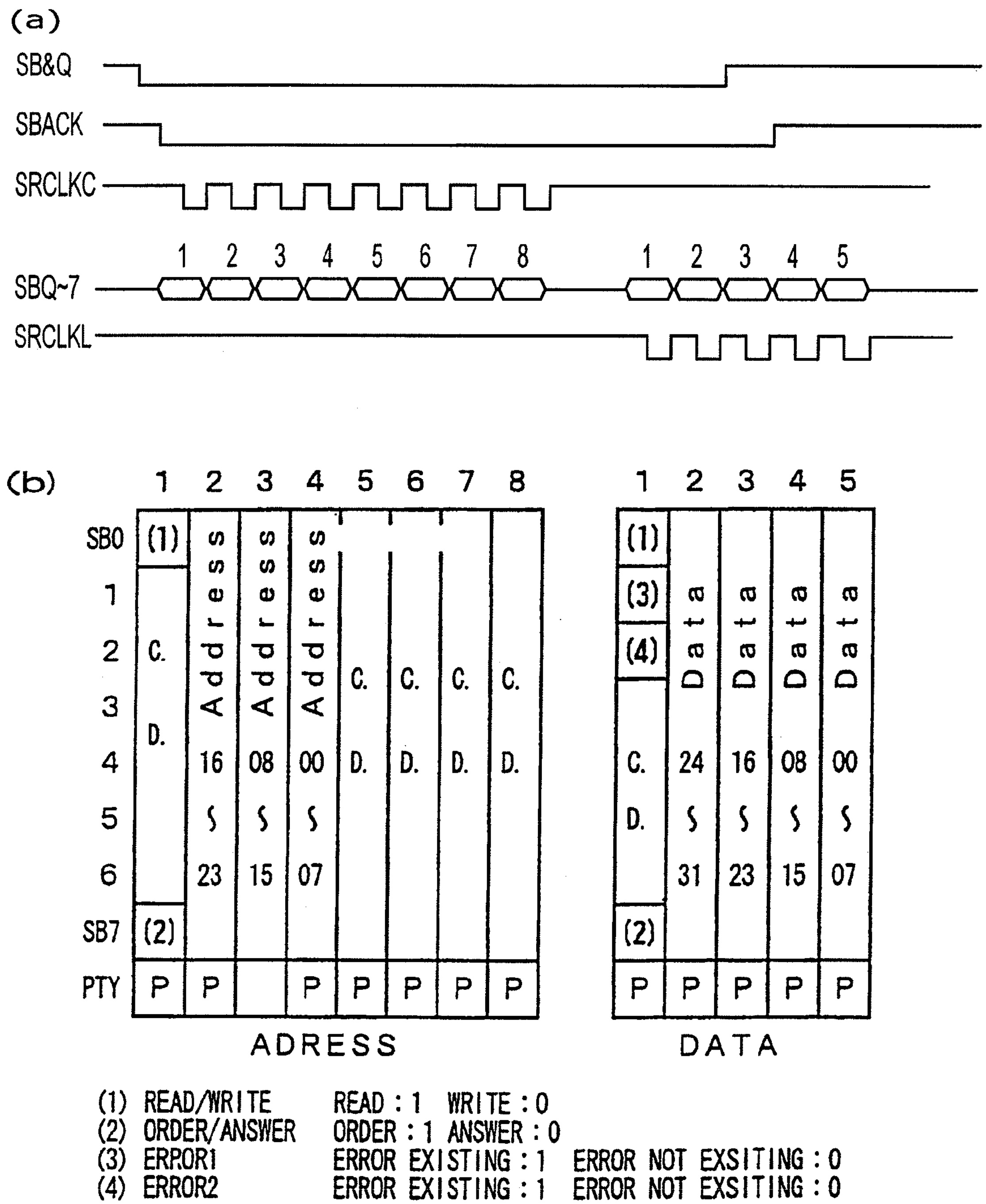

FIG. 197 is a timing chart (a) showing the DMA access (read) and shows the address/data format (b).

Figure 198:
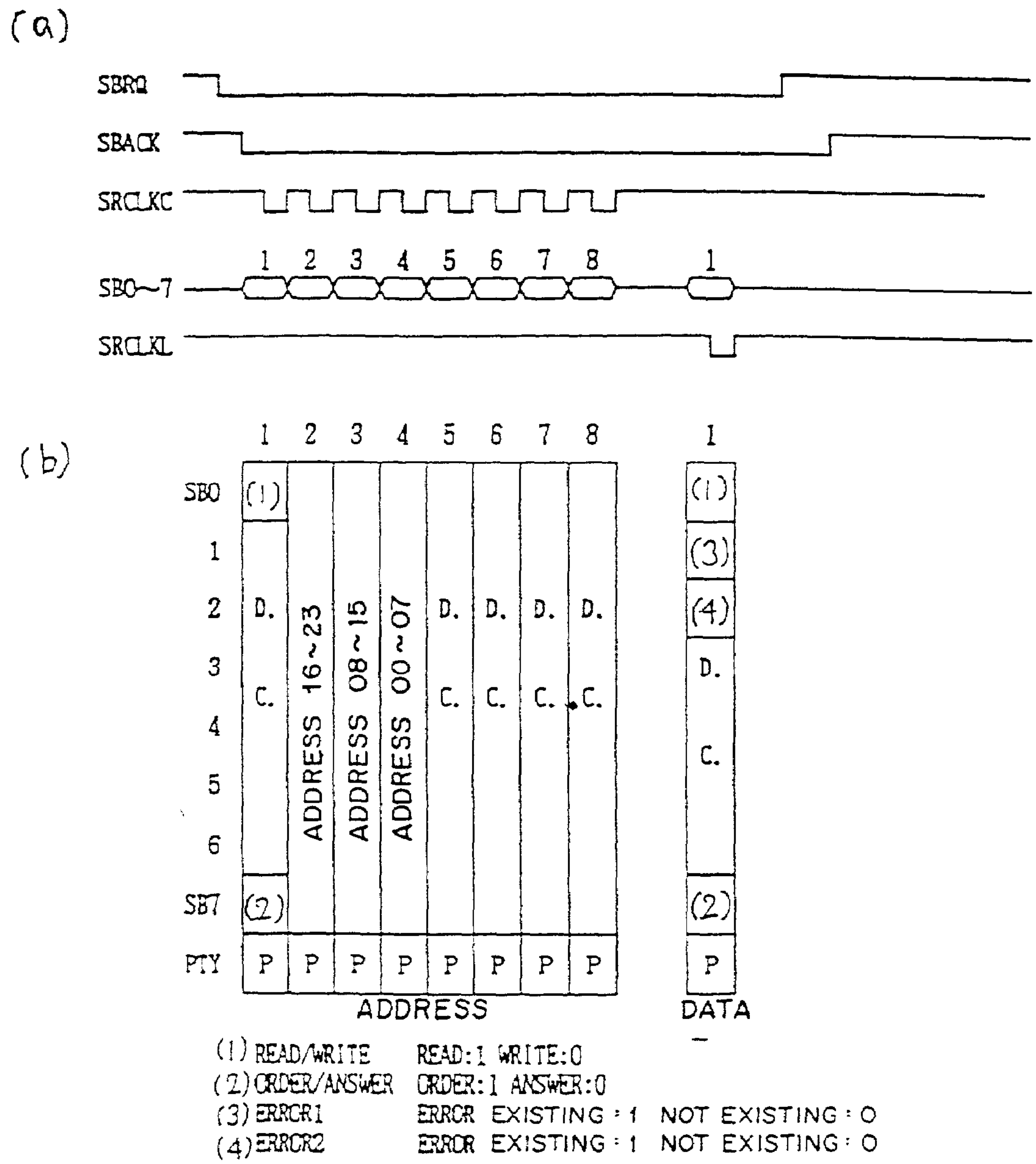

FIG. 198 is a timing chart (a) showing the DMA access (write) and shows the address/data format (b).

FIG. 199 is a list of IN/OUT instructions.

Figure 200:
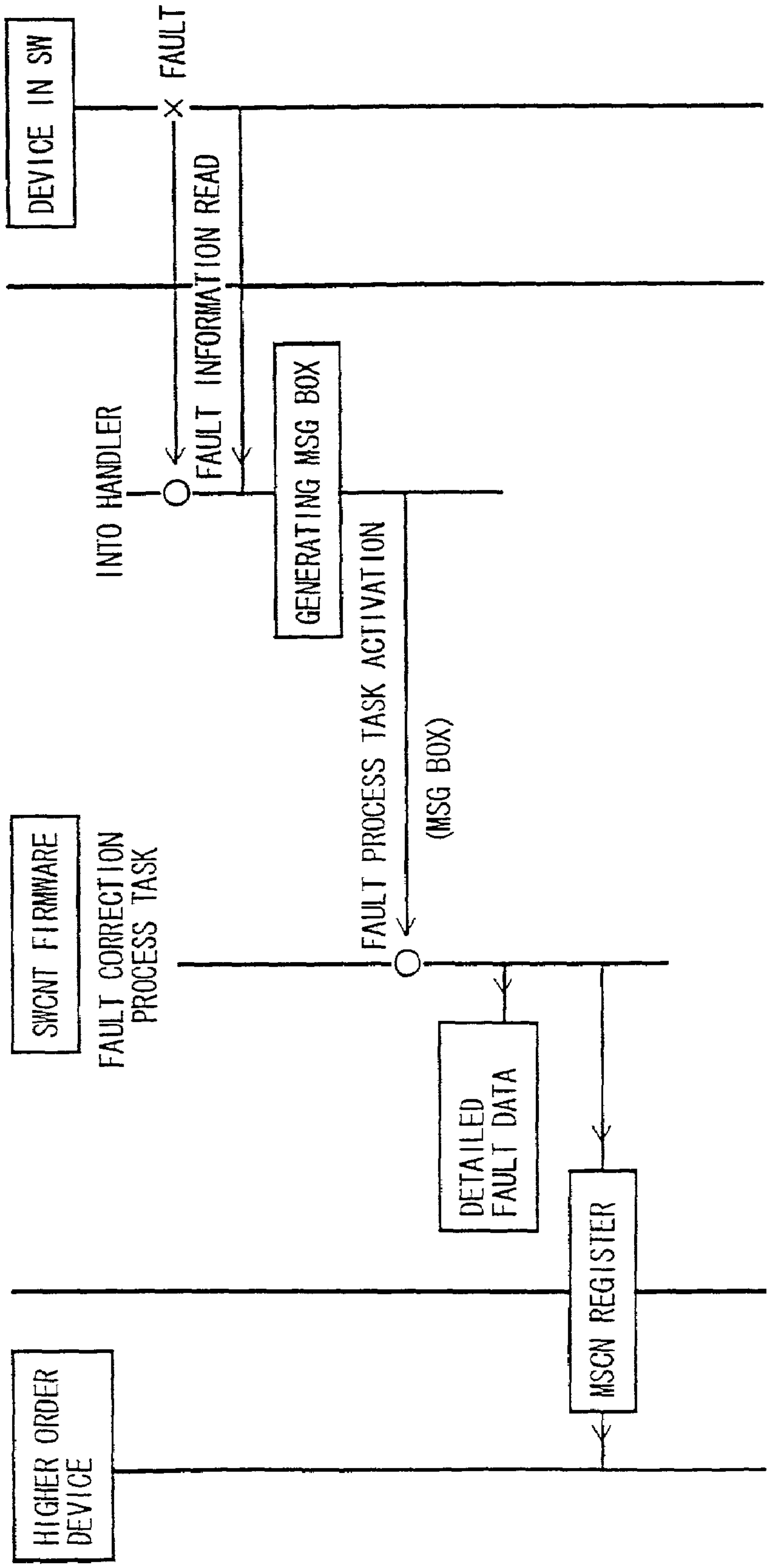

FIG. 200 shows the procedure of detecting a fault (when a report is made by the MSCN).

Figure 201:
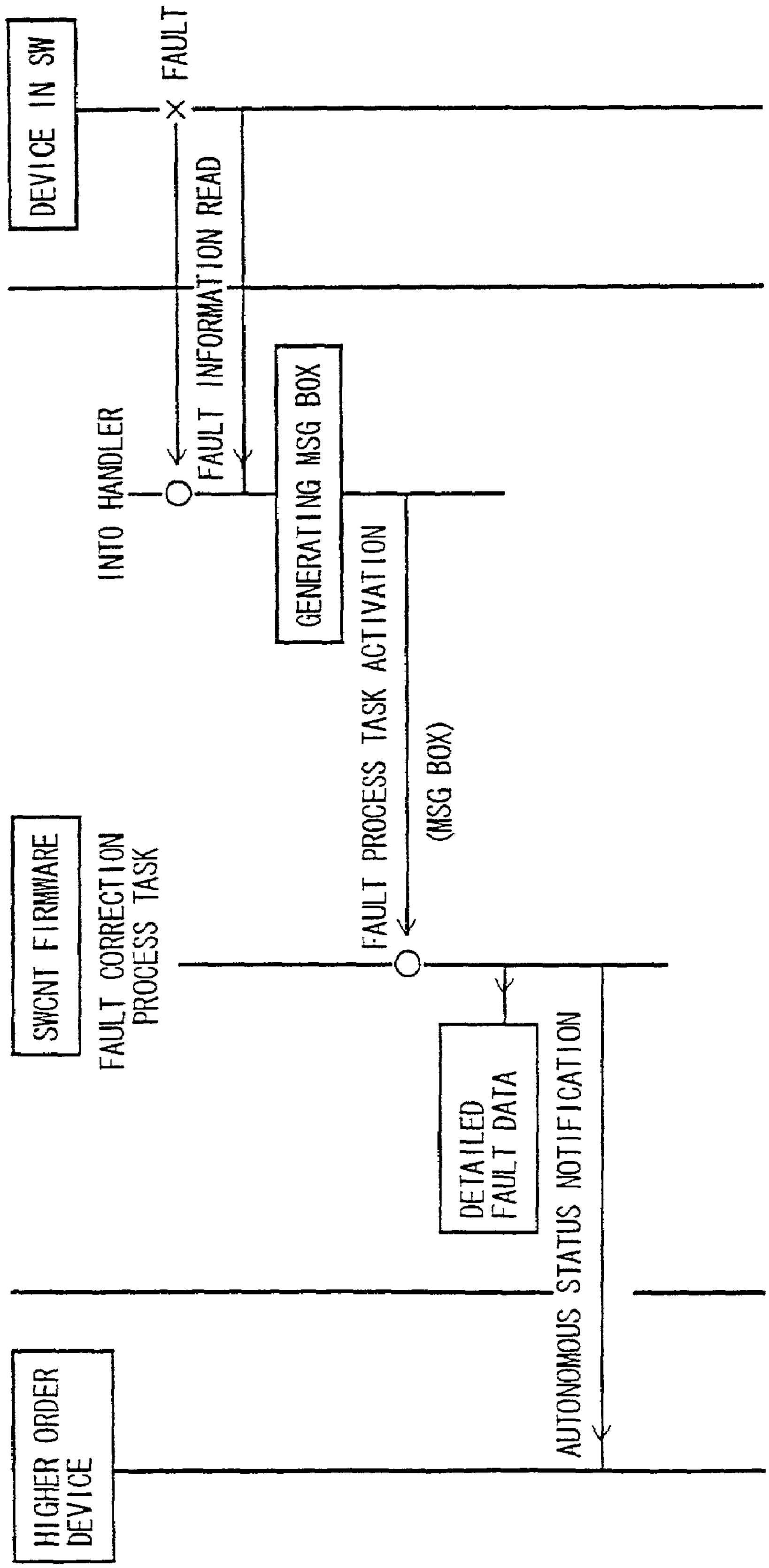

FIG. 201 shows the procedure of detecting a fault (when status is autonomously reported).

FIG. 202 shows the basic format of the message box processed by the fault processing task.

Figure 203:
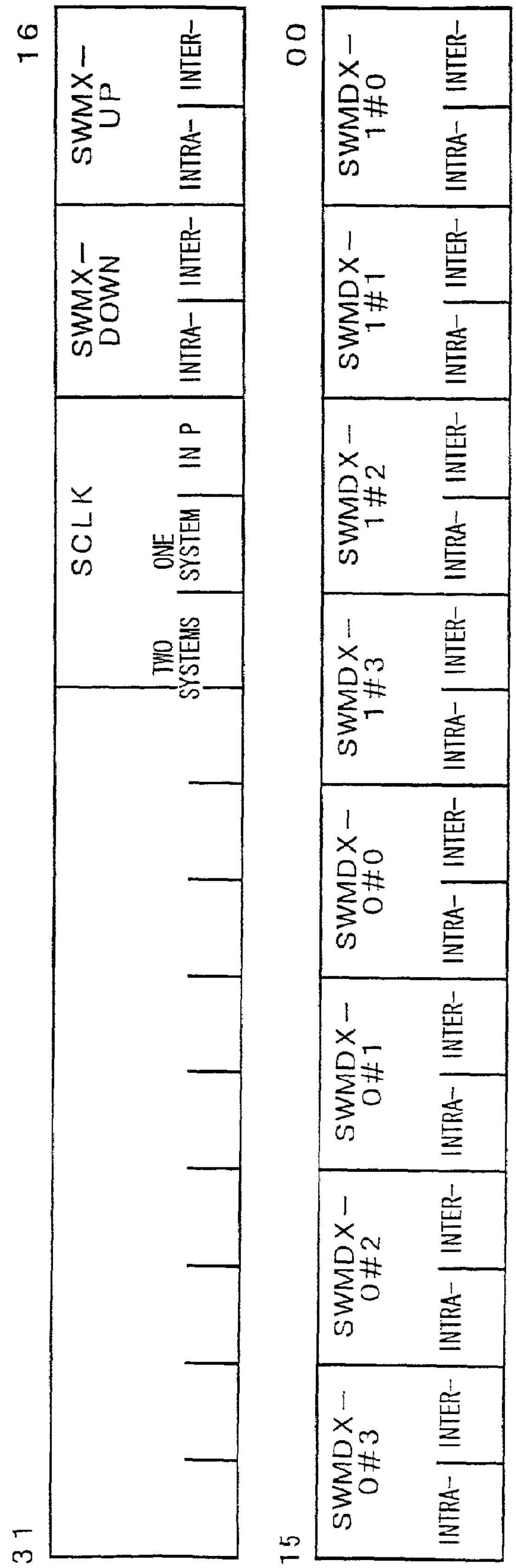

FIG. 203 shows the fault content write data in the message box for a common fault.

Figure 204:
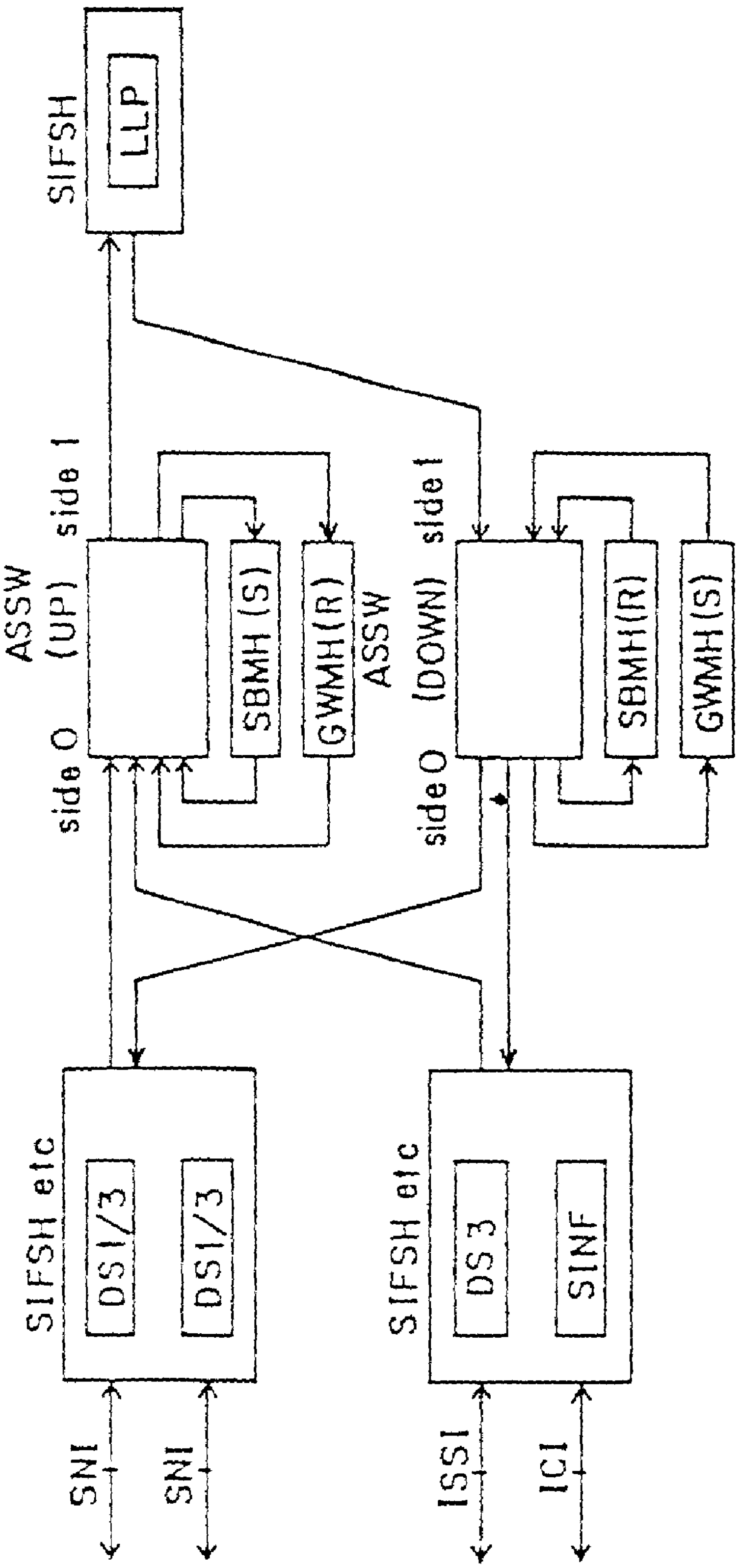

FIG. 204 shows the entire configuration of the position of the SBMESH in the system.

Figure 205:
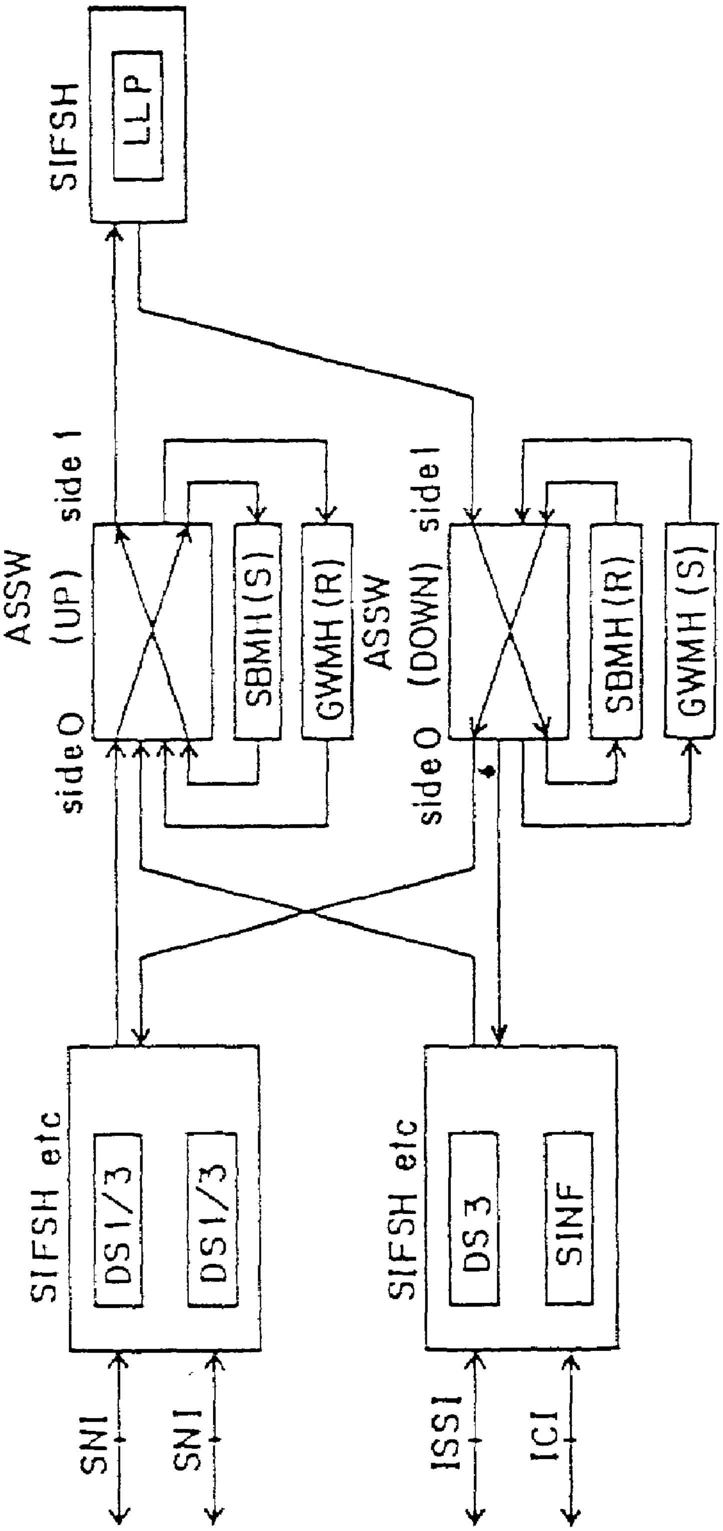

FIG. 205 shows the route of the SMDS data between SNIs.

Figure 206:
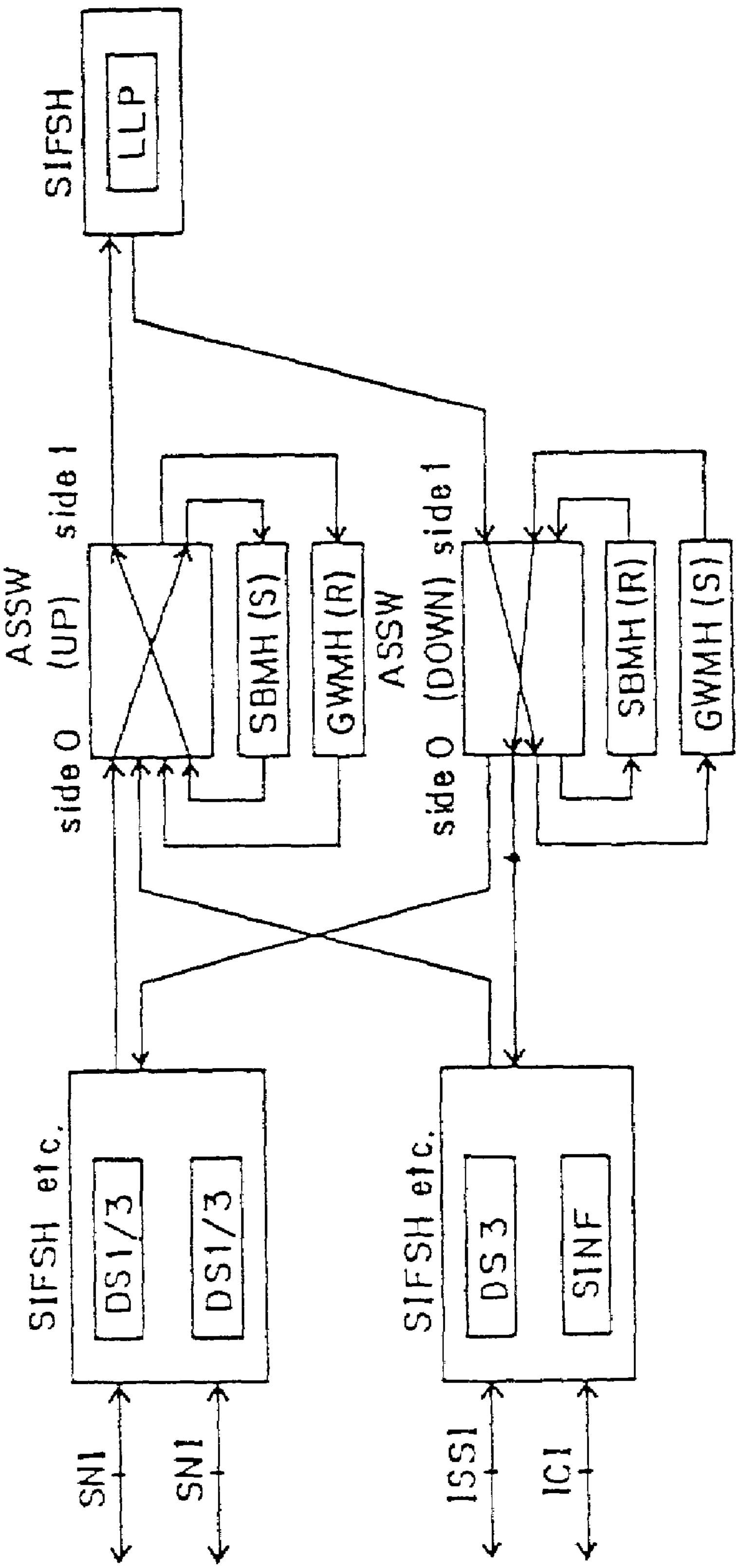

FIG. 206 shows the route of transferring SMDS data from the SNI to the ISSI or ICI.

Figure 207:
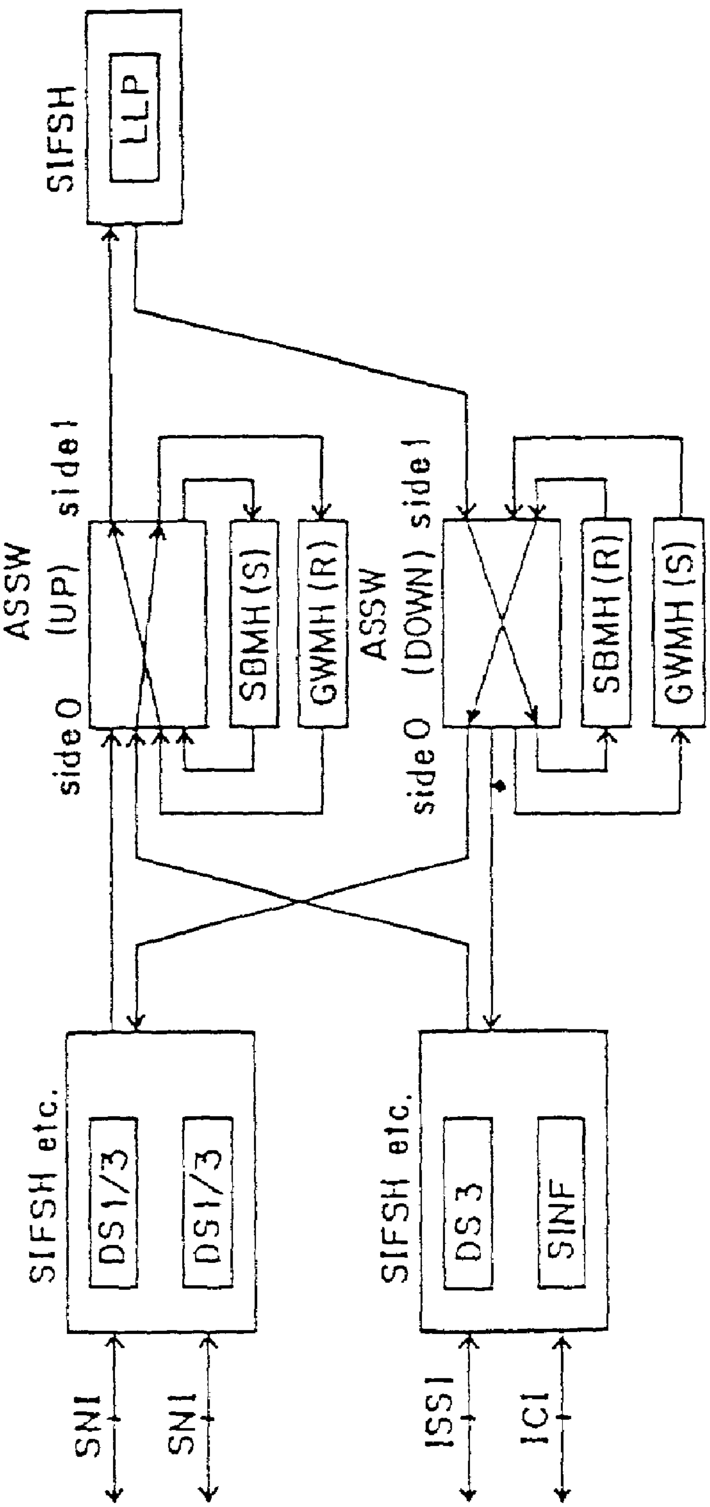

FIG. 207 shows the route of transferring SMDS data from the ISSI or ICI to the SNI.

Figure 208:
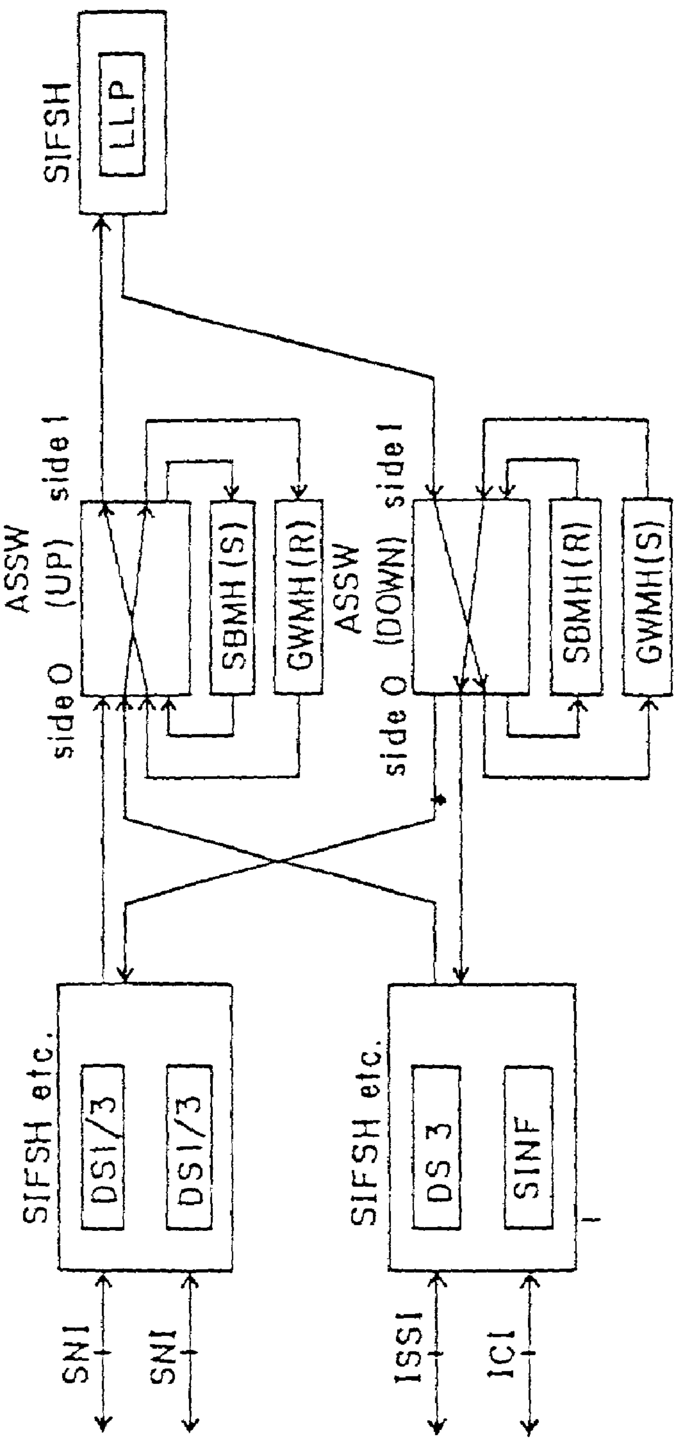

FIG. 208 shows the route of transferring SMDS data from the ISSI or ICI to the ISSI or ICI.

Figure 209:
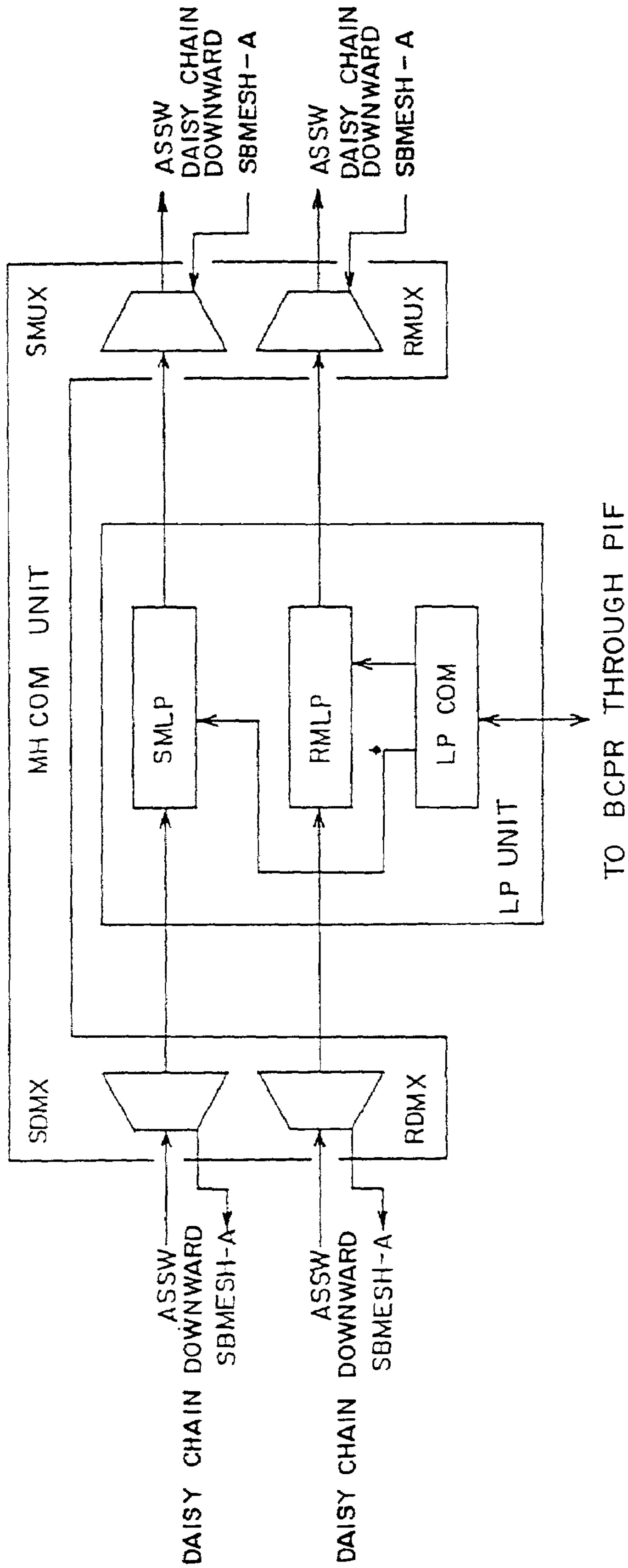

FIG. 209 is a block diagram showing the SBMESH.

Figure 210:
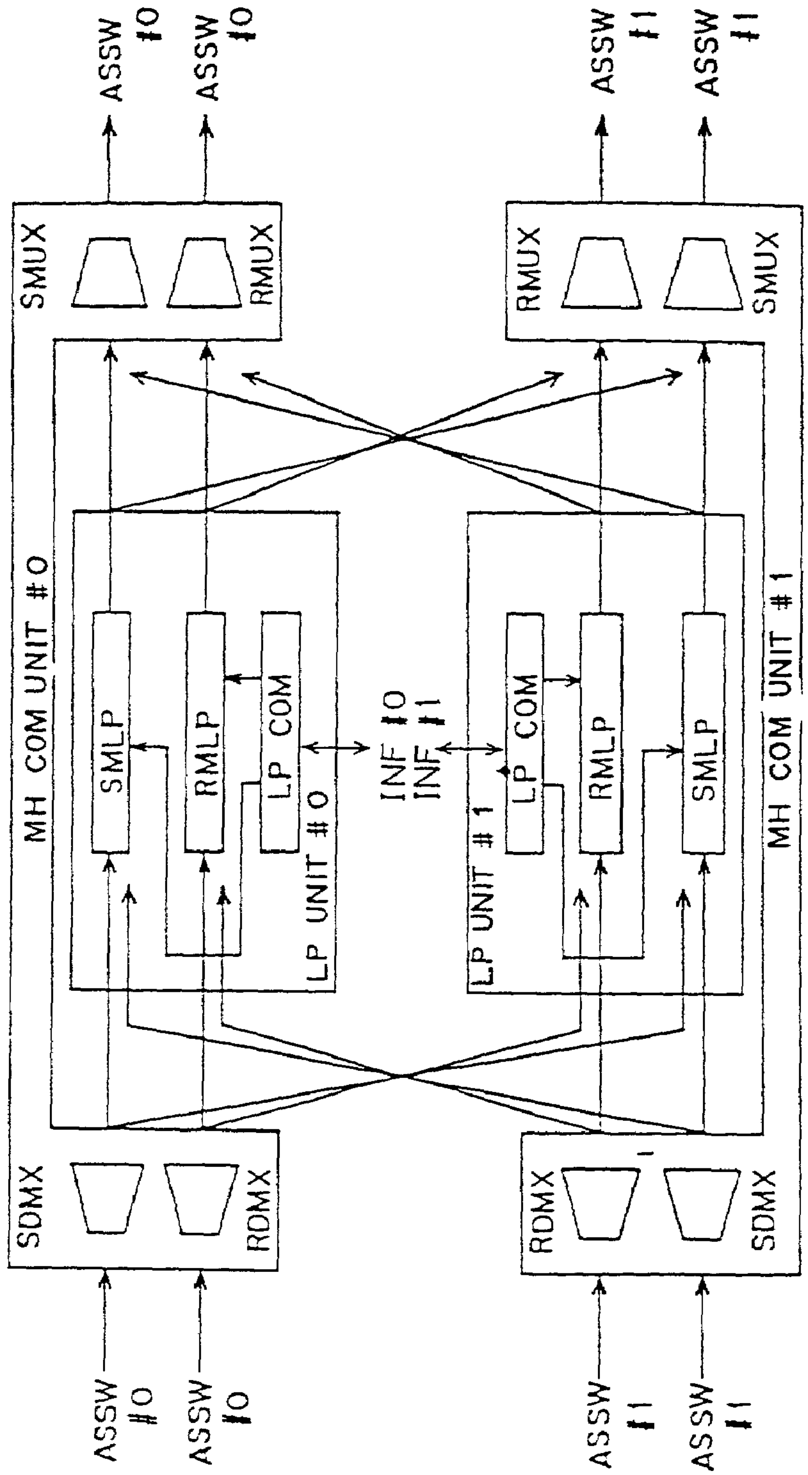

FIG. 210 is a block diagram showing the redundant configuration of the SBMESH.

FIG. 211 shows the logical connection between message handlers MH.

Figure 212:
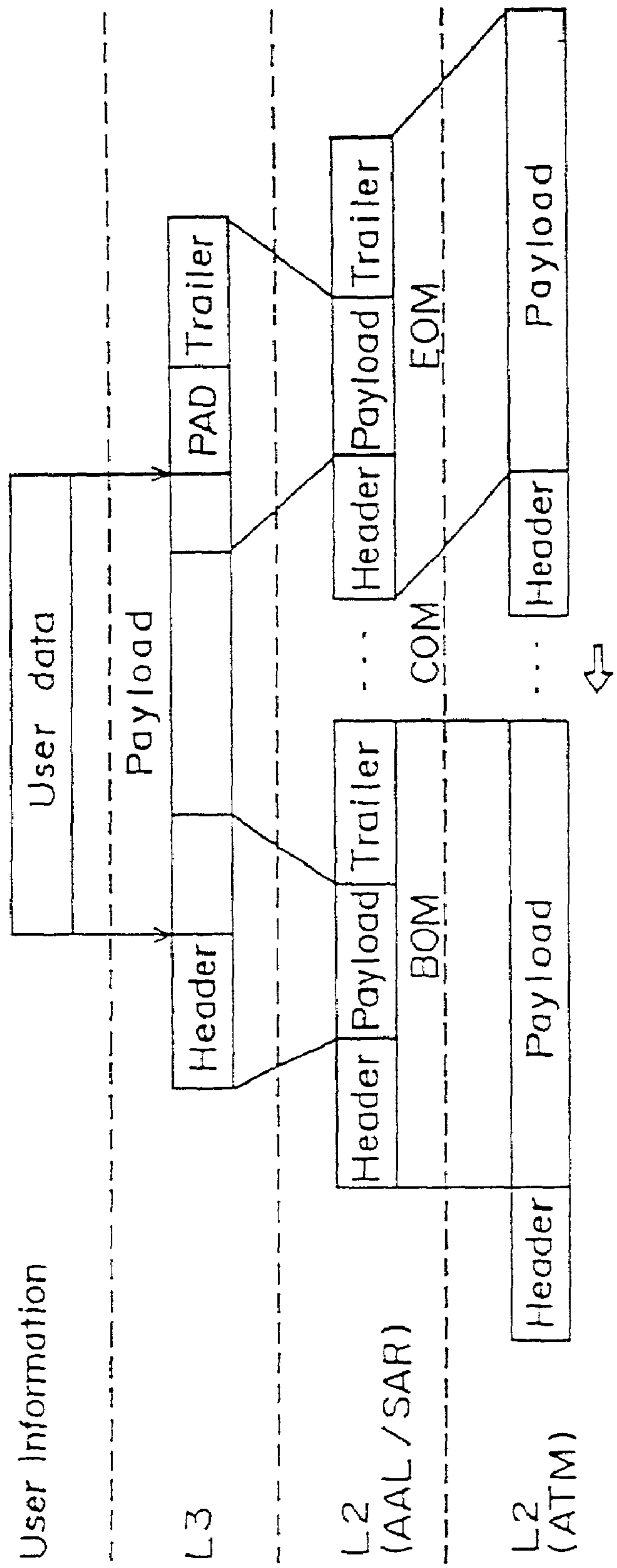

FIG. 212 shows the disassembling/assembling user information in layers 2 and 3.

Figure 213:
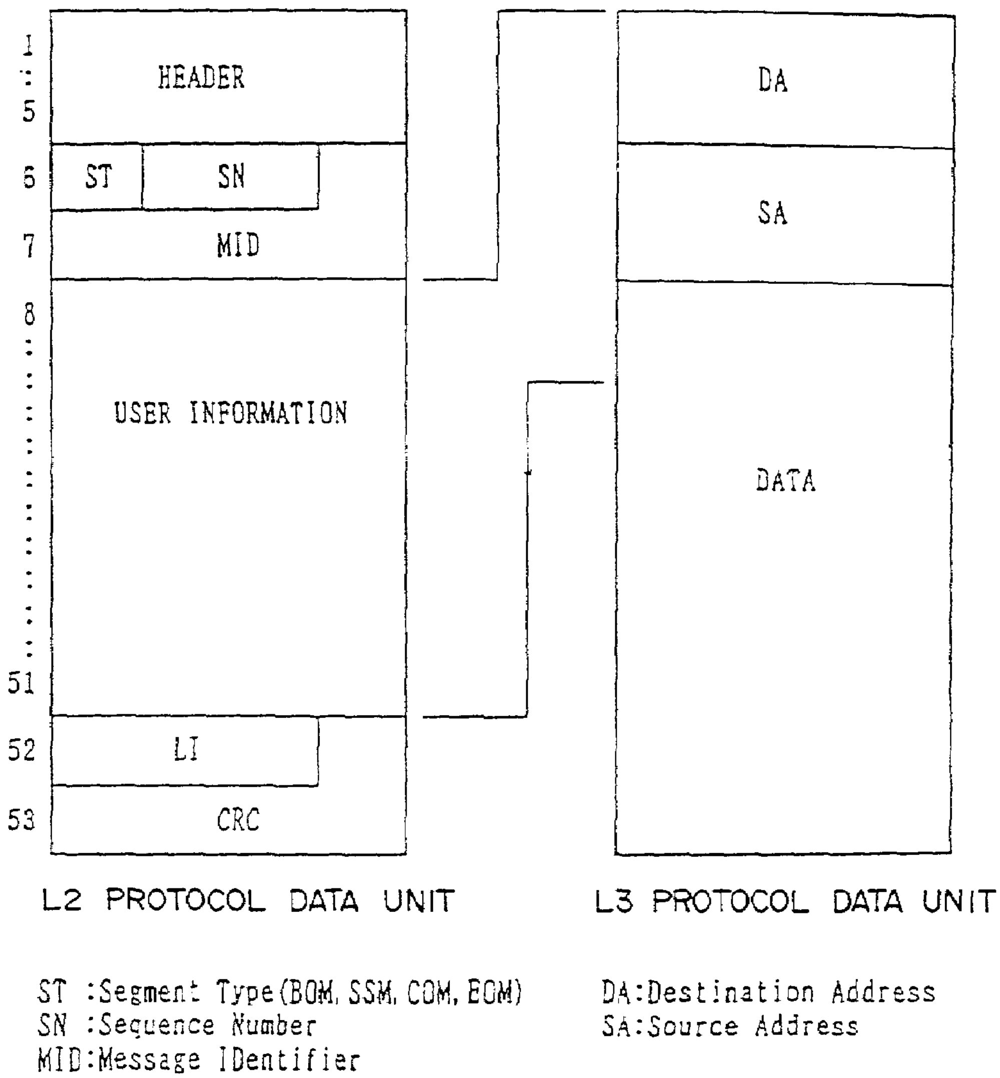

FIG. 213 shows the data configuration of the AAL/SAR of layer 2.

FIG. 214 shows the method of assigning the output VCI/MID depending on the type of cell.

FIG. 215 shows routing function at each position in the system, and shows the information in the cell used in the routing function.

FIG. 216 shows an example of assigning the VCI corresponding to the SNI.

Figure 217:
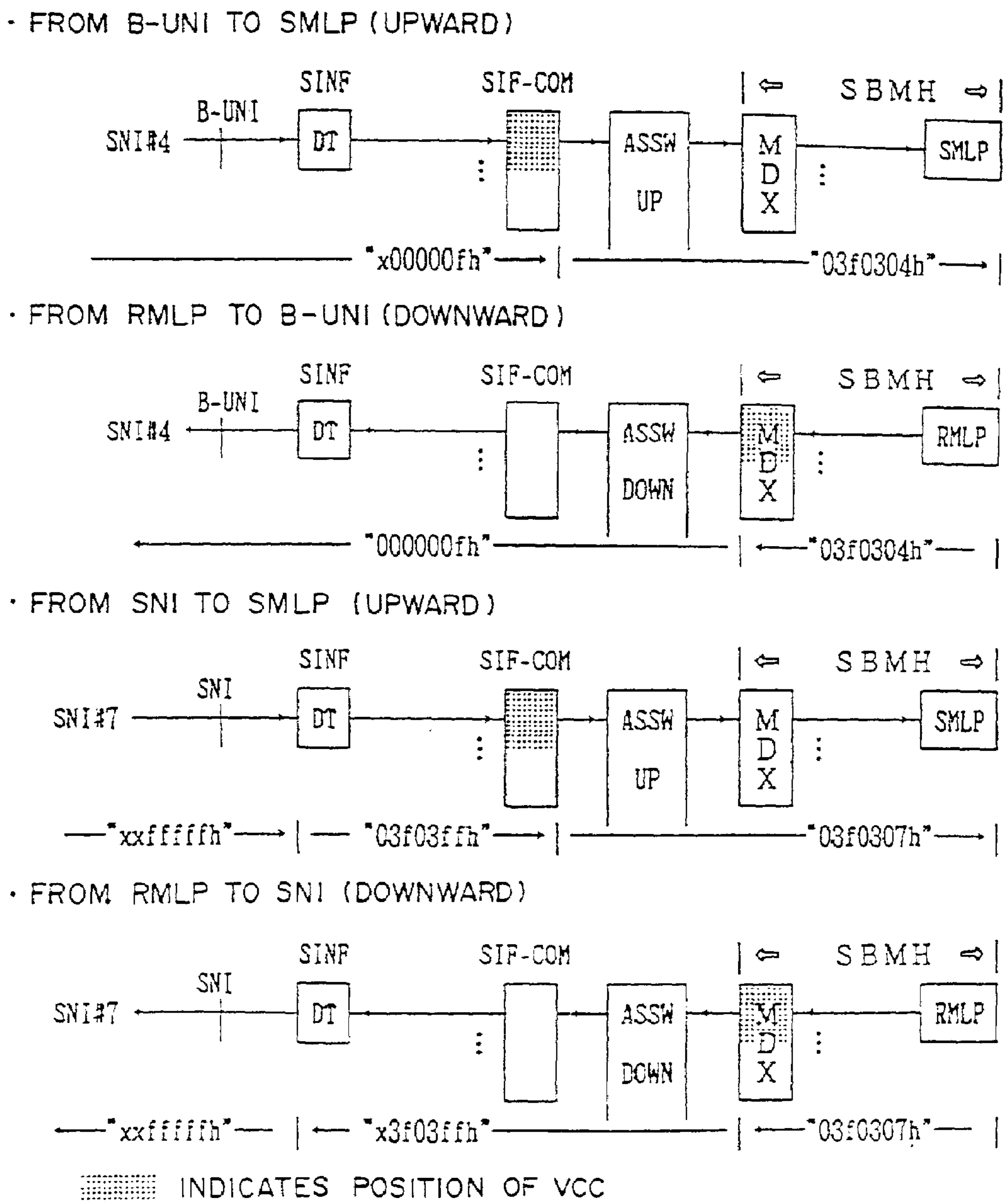

FIG. 217 shows the assignment (1) of a VPI/VCI between the SNI and SBMH.

Figure 218:
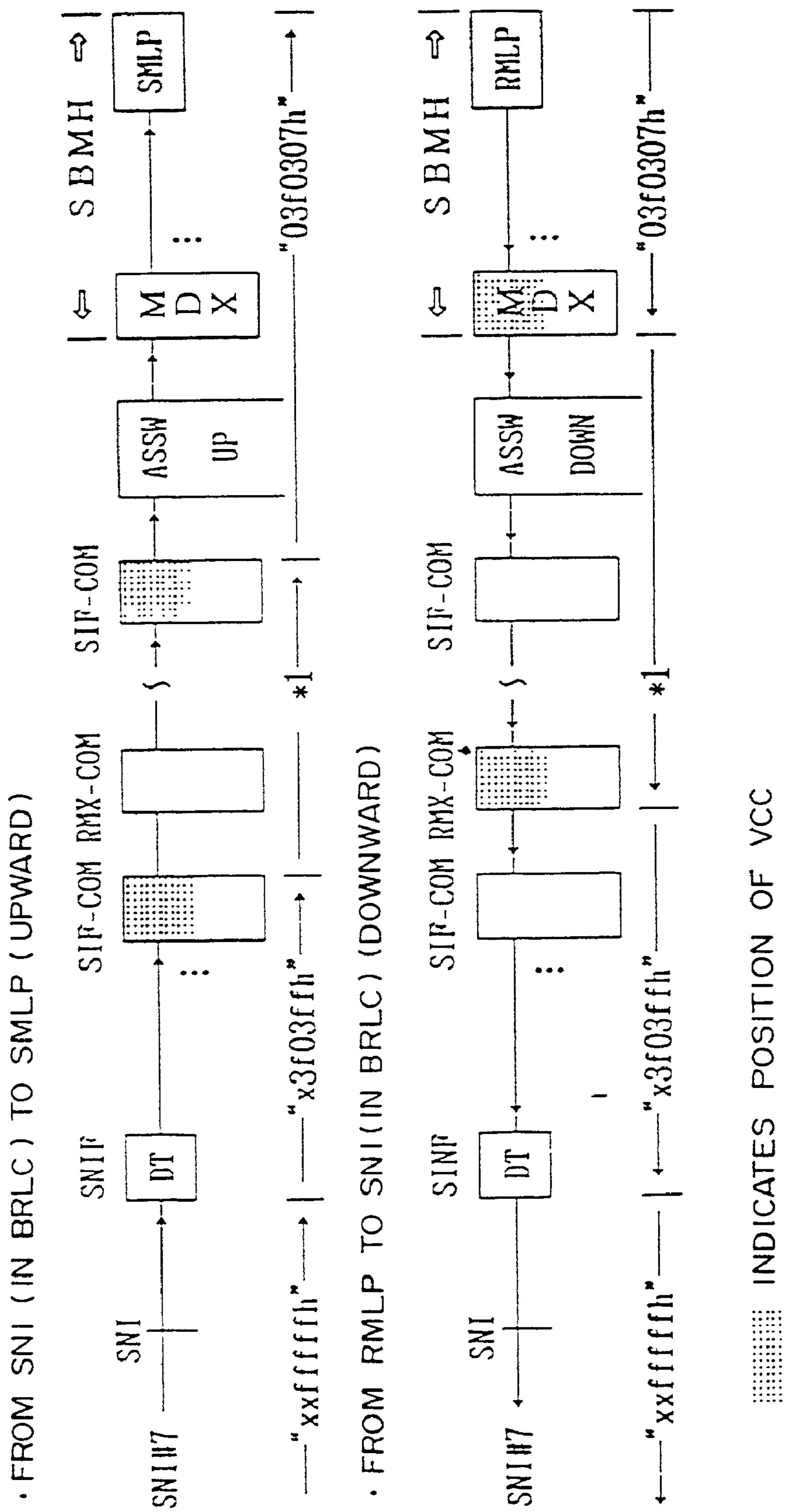

FIG. 218 shows the assignment (2) of a VPI/VCI between the SNI and SBMH.

FIG. 219 shows an example of assigning a VPI/VCI between message handlers MH.

Figure 220:
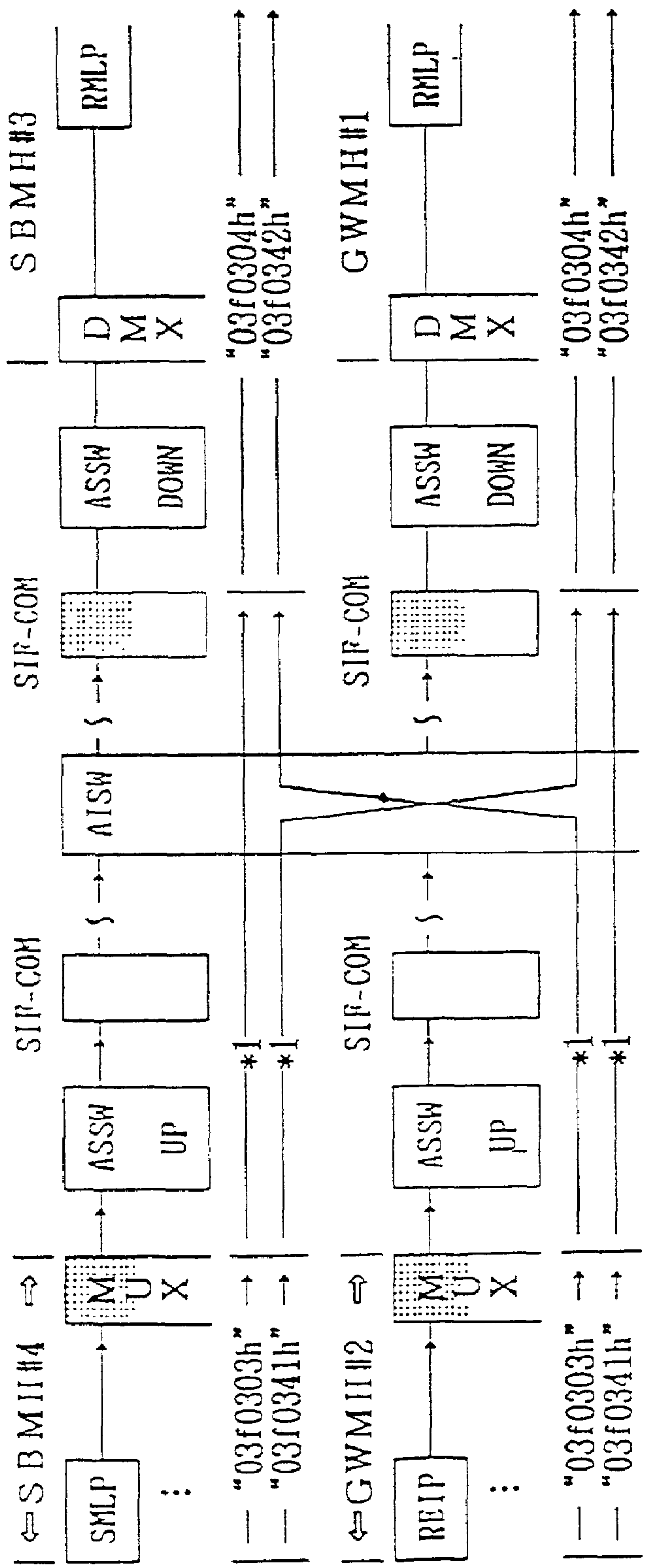

FIG. 220 shows the assignment of a VPI/VCI between message handlers MH.

FIG. 221 shows an example of assigning a MID to each SMLP.

Figure 222:
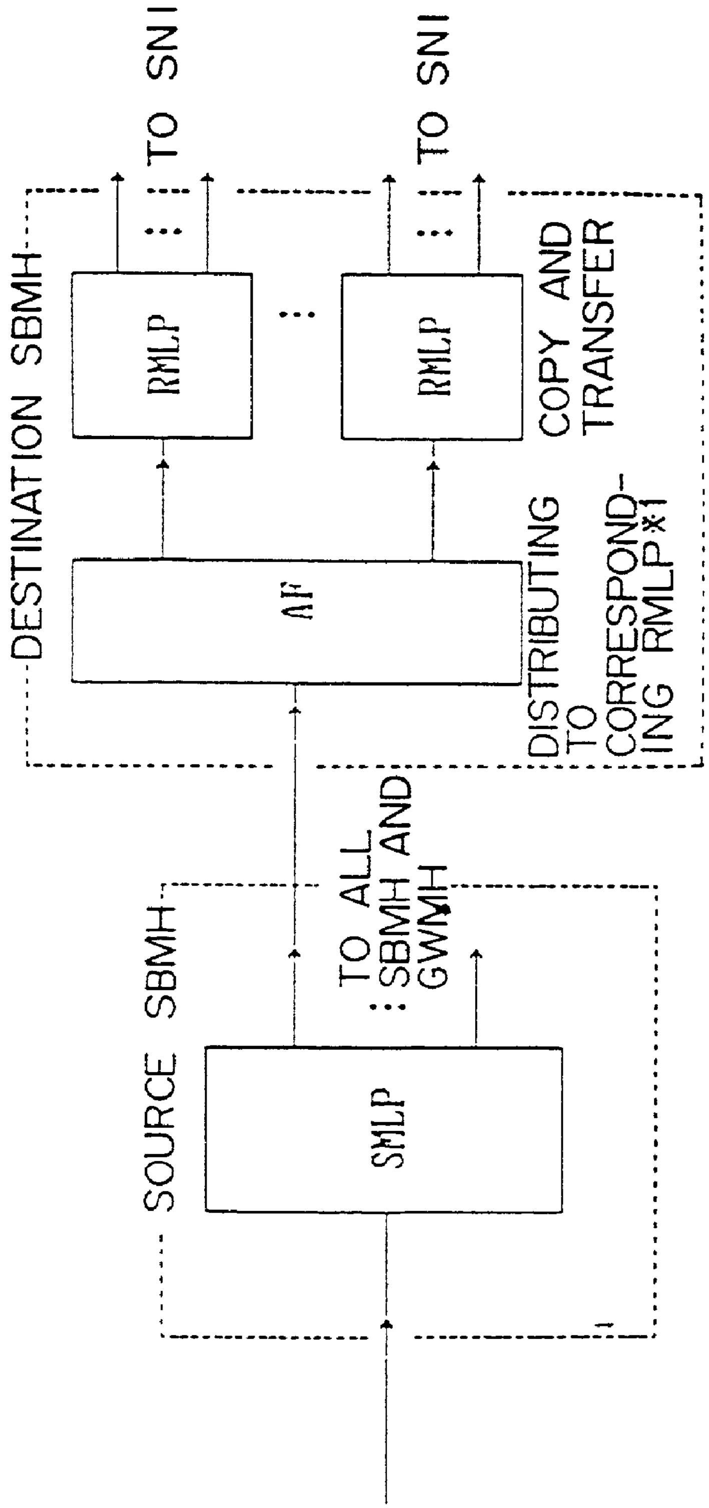

FIG. 222 shows the concept of data distribution using a group address.

FIG. 223 shows the information used to identify the SNI to which each cell belongs and the L3-PDU.

Figure 224:
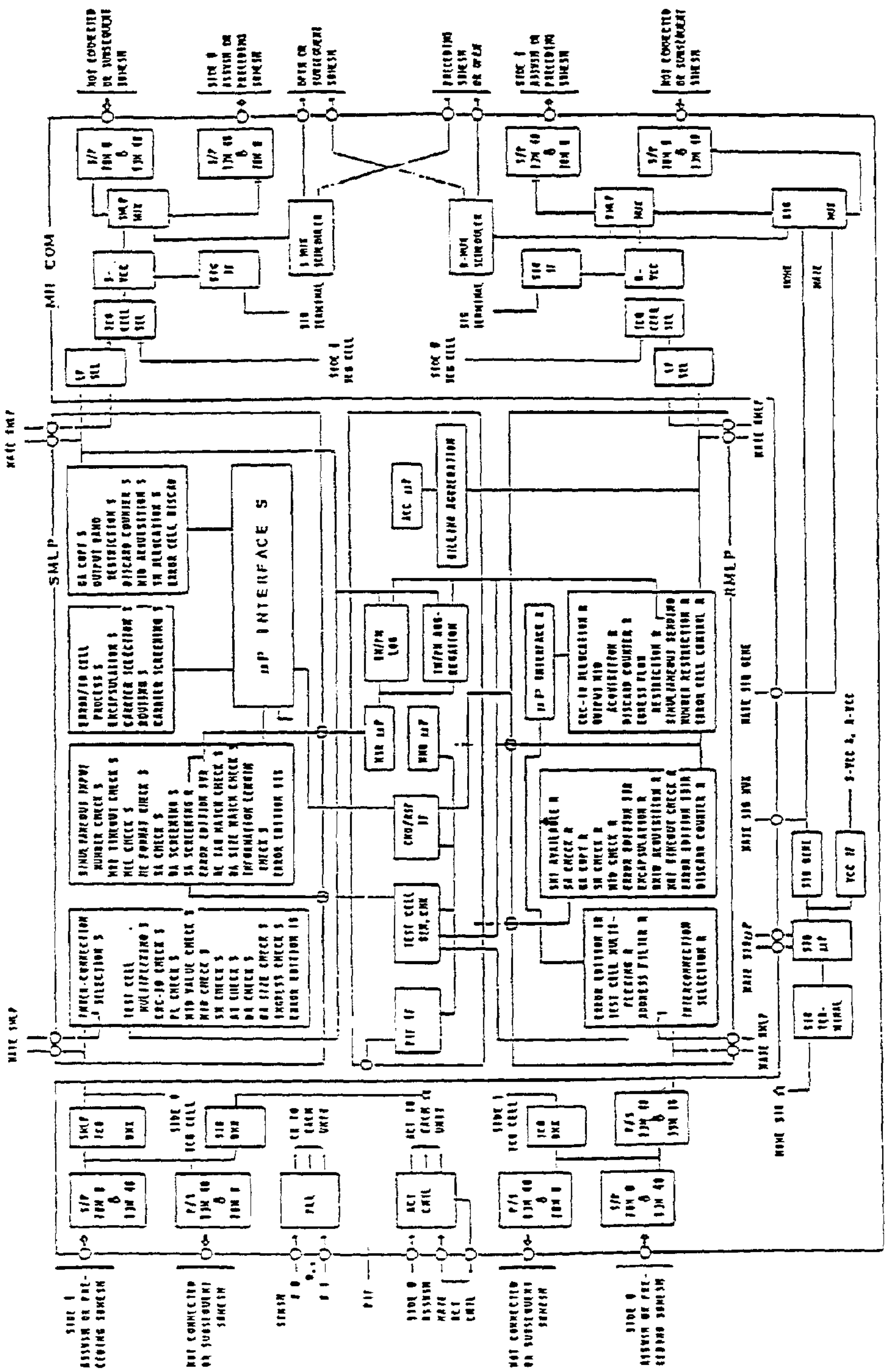

FIG. 224 is a block diagram showing the function of the SBMESH.

Figure 225:
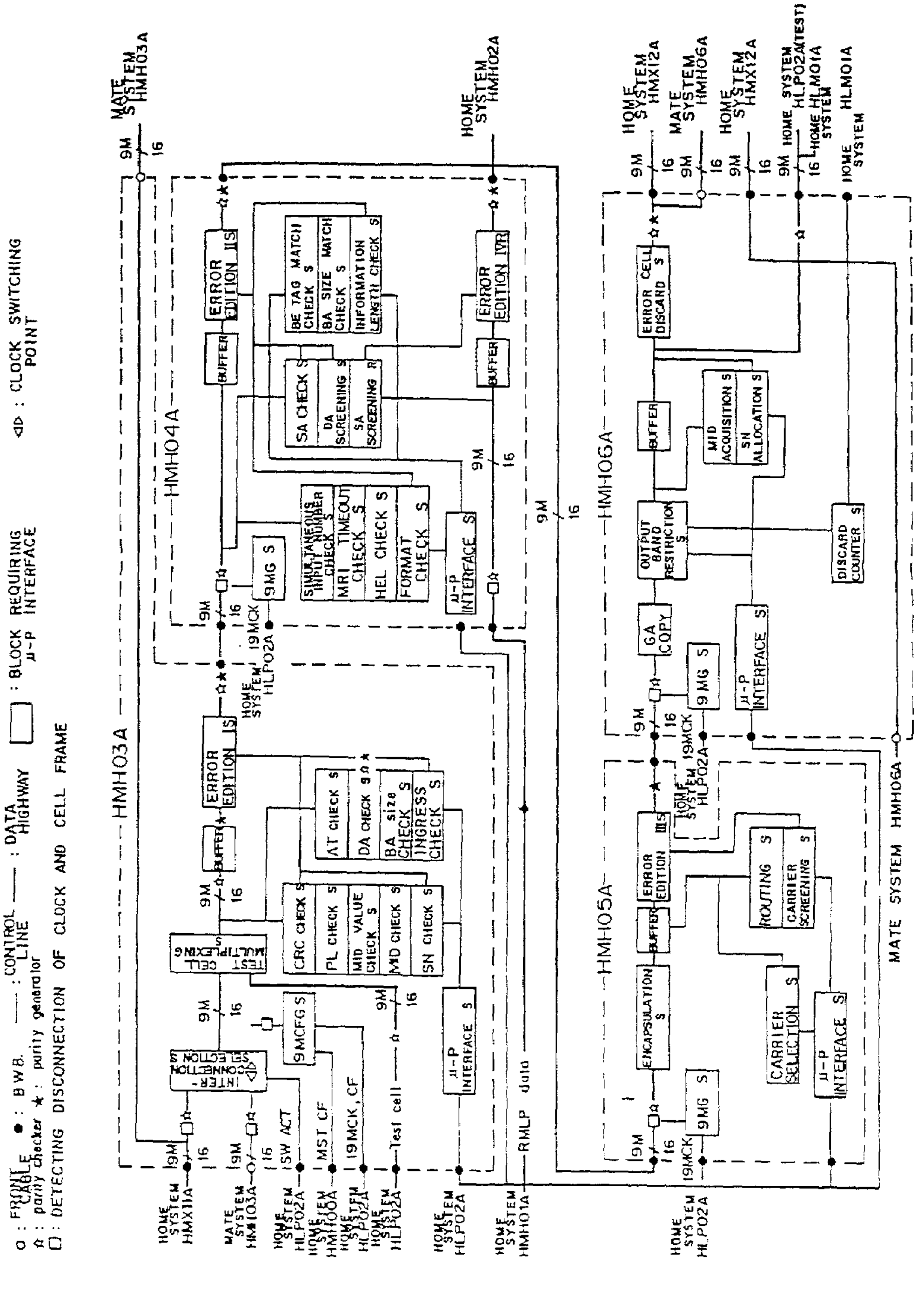

FIG. 225 if a block diagram showing the entire configuration of the SMLP unit.

FIG. 226 shows the outline (1) of the functions of each block of the SMLP unit shown in FIG. 225.

FIG. 227 shows the outline (2) of the functions of each block of the SMLP unit shown in FIG. 225.

FIG. 228 shows the outline (3) of the functions of each block of the SMLP unit shown in FIG. 225.

FIG. 229 shows the outline (1) of the error flags operated for each block of the SMLP unit shown in FIG. 225.

FIG. 230 shows the outline (2) of the error flags operated for each block of the SMLP unit shown in FIG. 225.

FIG. 231 shows the outline (3) of the error flags operated for each block of the SMLP unit shown in FIG. 225.

FIG. 232 shows the outline (4) of the error flags operated for each block of the SMLP unit shown in FIG. 225.

Figure 233:
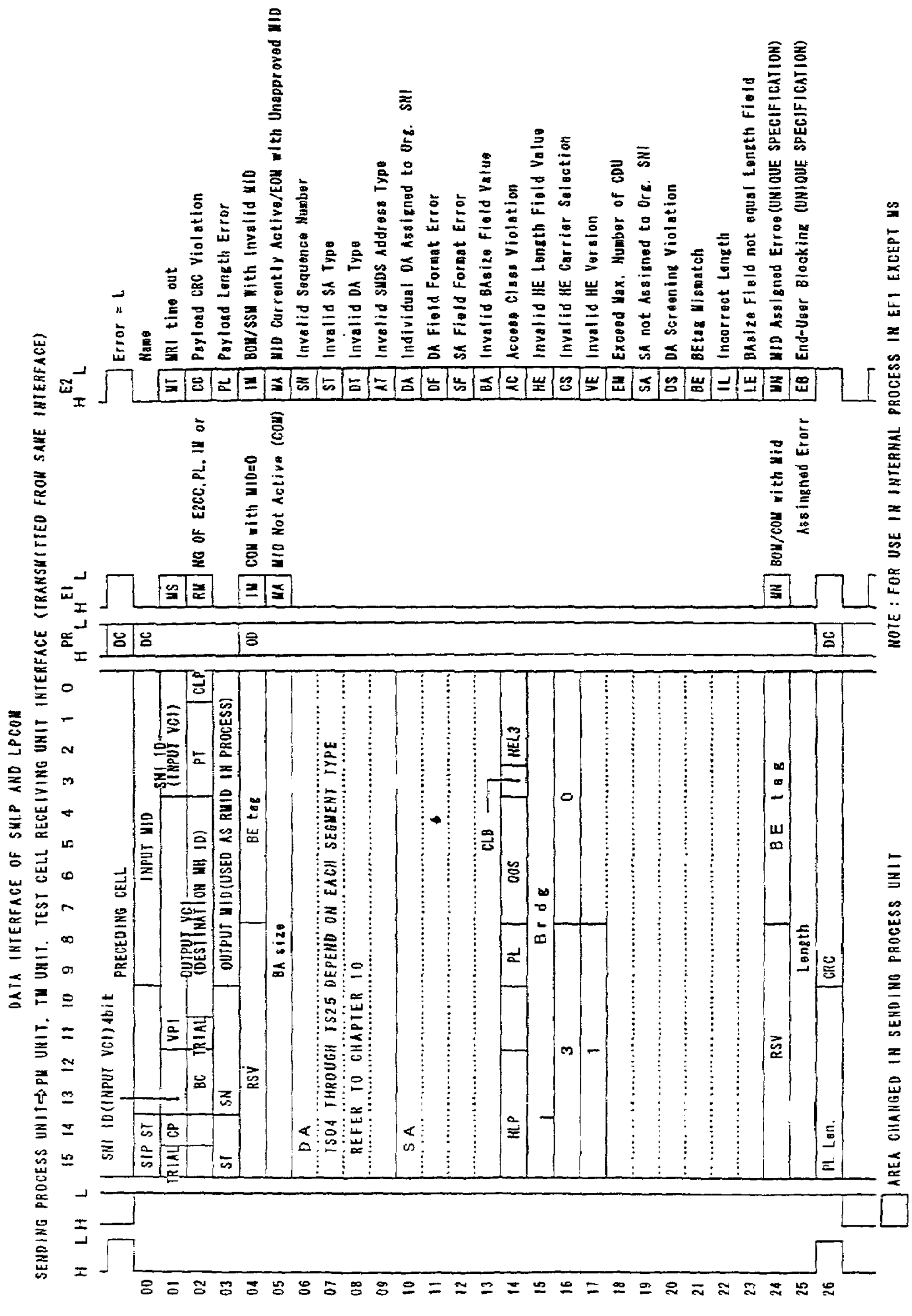

FIG. 233 shows the correspondence between the error flag EF and the error name (naming in the TR) and the position (1) of the EF.

FIG. 234 shows the correspondence between the error flag EF and the error name (naming in the TR) and the position (2) of the EF.

Figure 235:
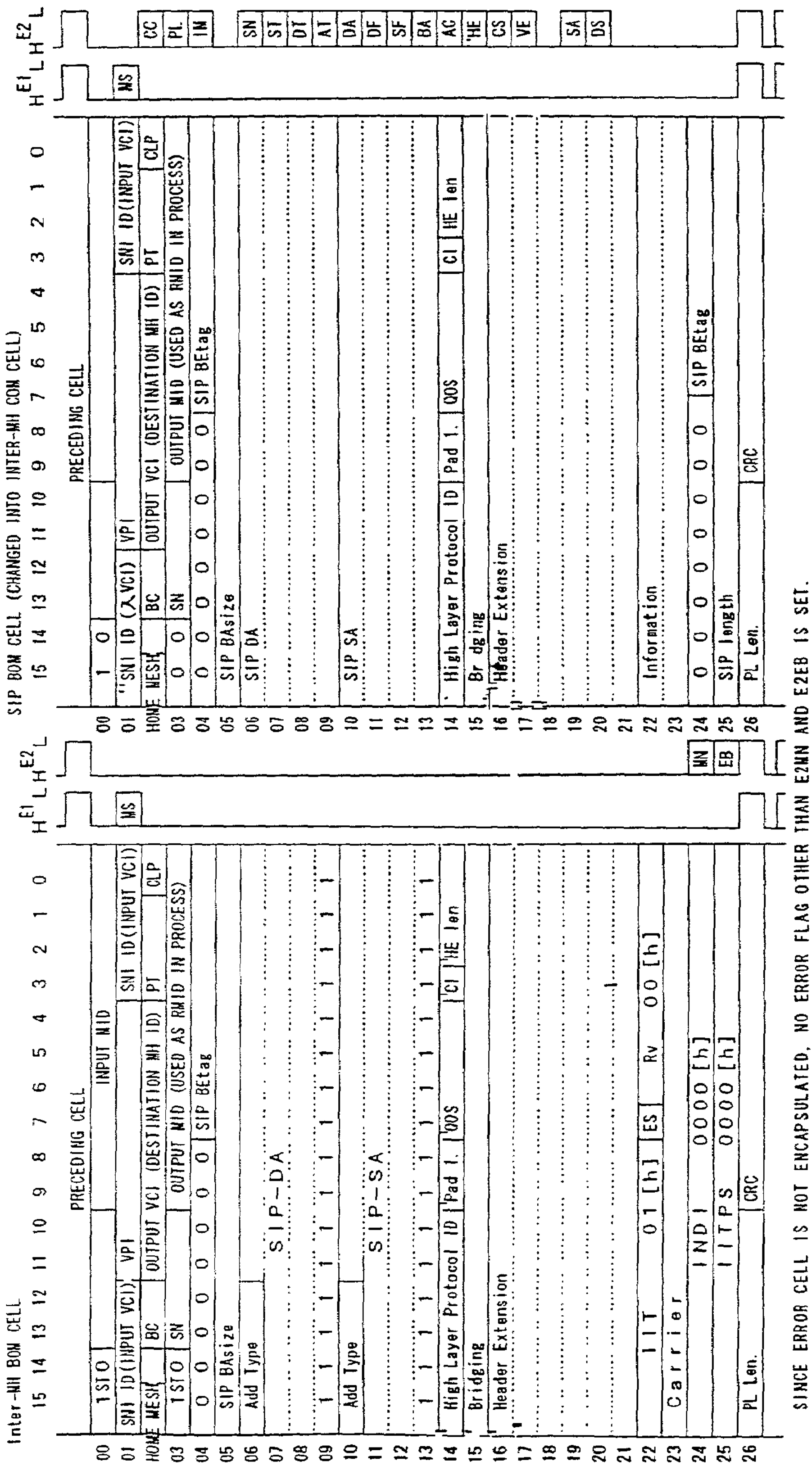

FIG. 235 shows the correspondence between the error flag EF and the error name (naming in the TR) and the position (3) of the EF.

Figure 236:
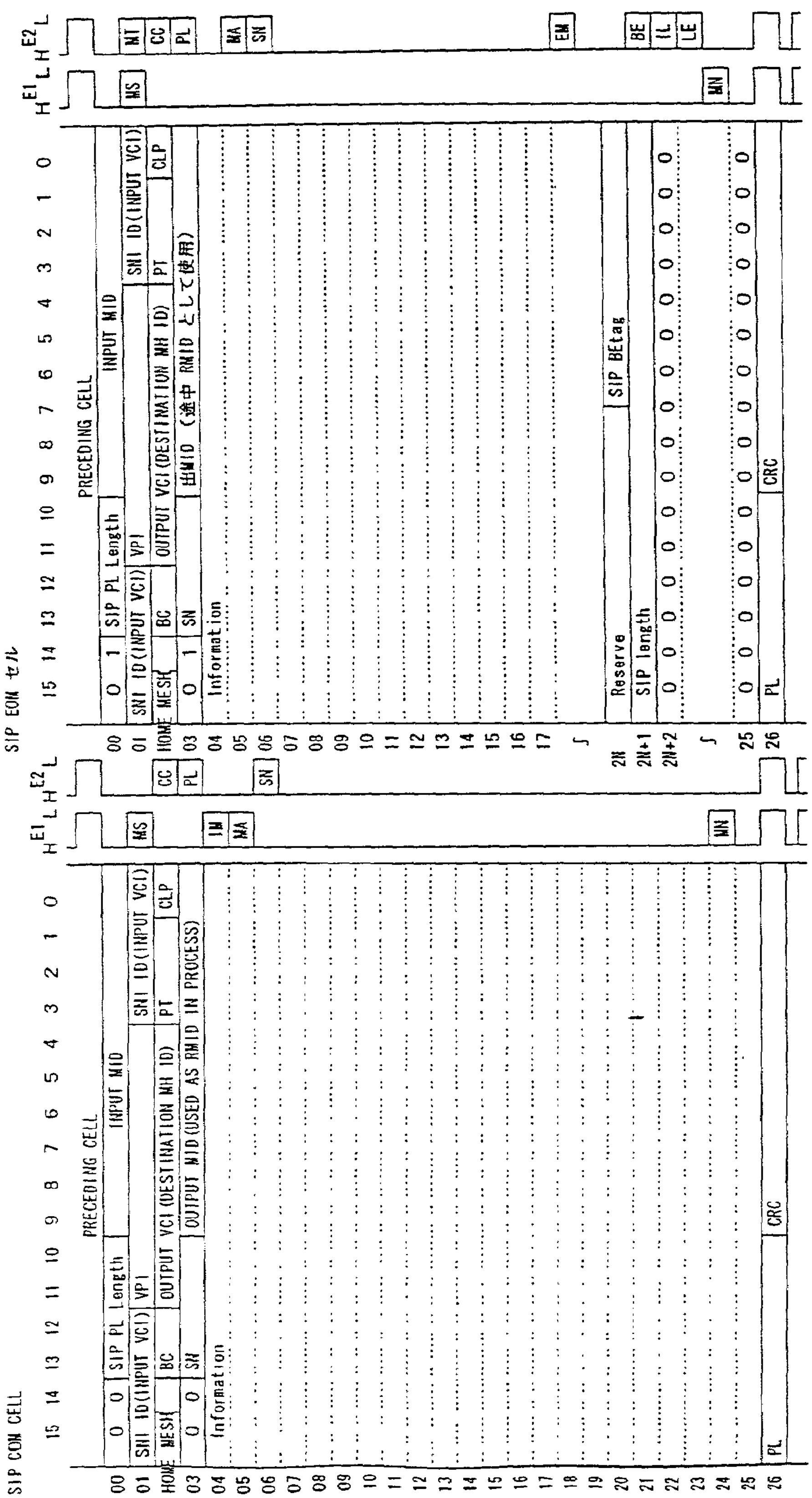

FIG. 236 shows the correspondence between the error flag EF and the error name (naming in the TR) and the position (4) of the EF.

Figure 237:
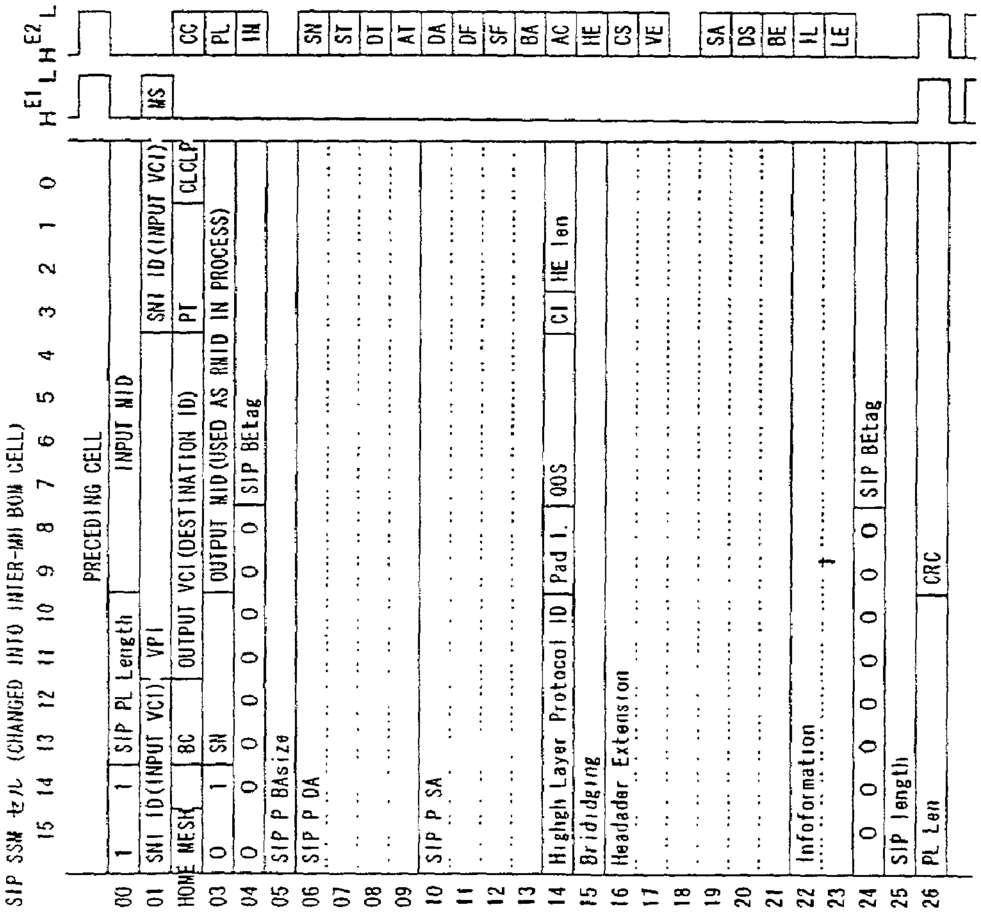

FIG. 237 shows the correspondence between the error flag EF and the error name (naming in the TR) and the position (5) of the EF.

Figure 238:
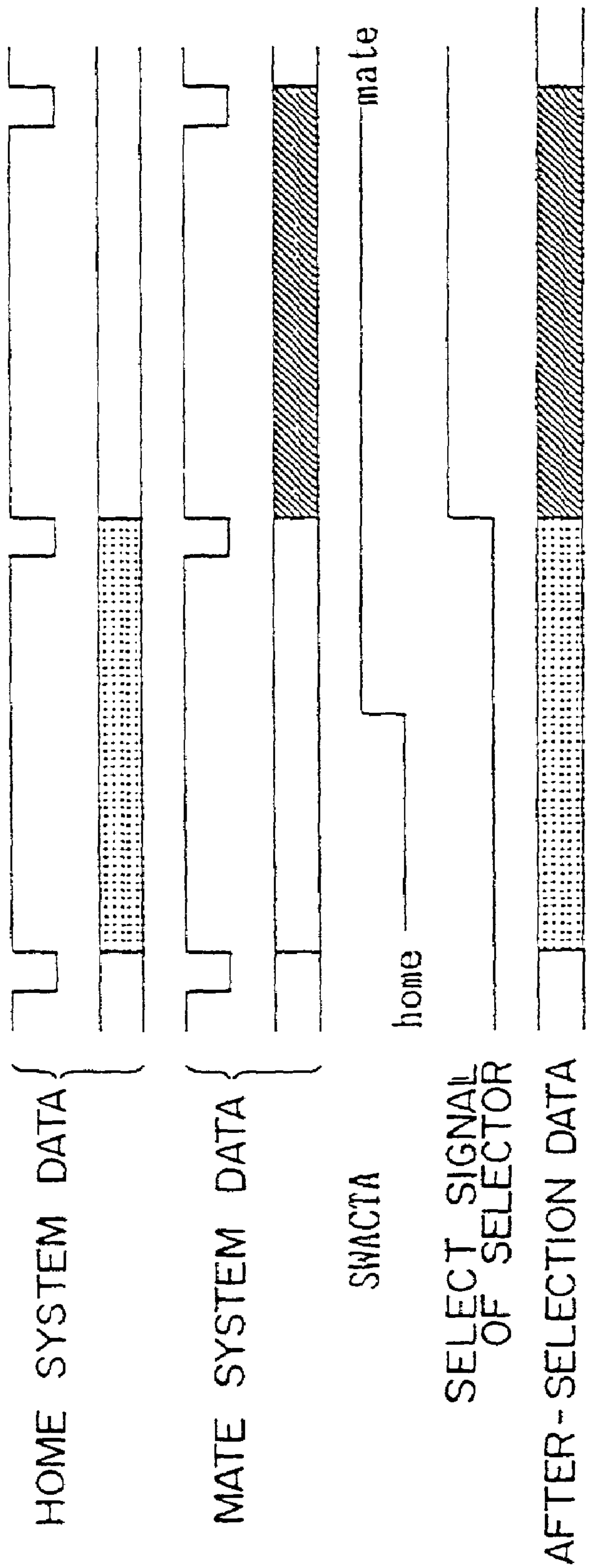

FIG. 238 shows the timing in the cross-connection select S.

Figure 239:
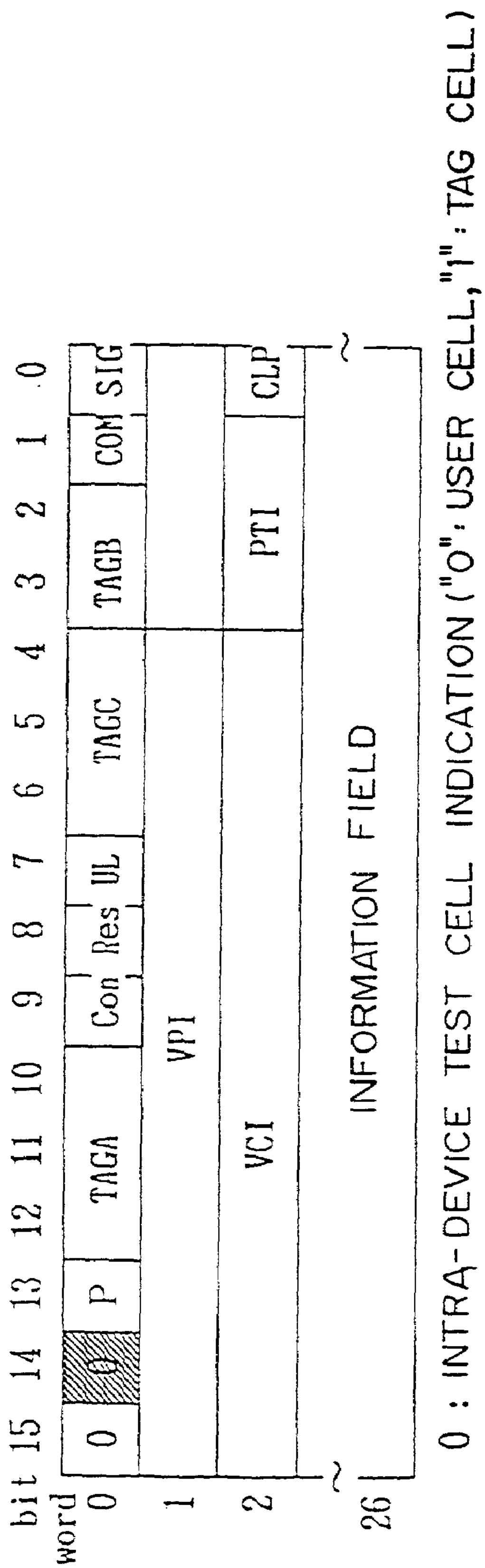

FIG. 239 shows the format of a cell (header field).

FIG. 240 shows the sending operation of the line cell and test cell then the test cell is multiplexed.

FIG. 241 shows the process related to the CRC-10 check.

FIG. 242 shows the process related to the PL length check for each segment type.

FIG. 243 shows the process related to the MID value check for each segment type.

FIG. 244 shows the process related to the MID check for each segment type.

Figure 245:
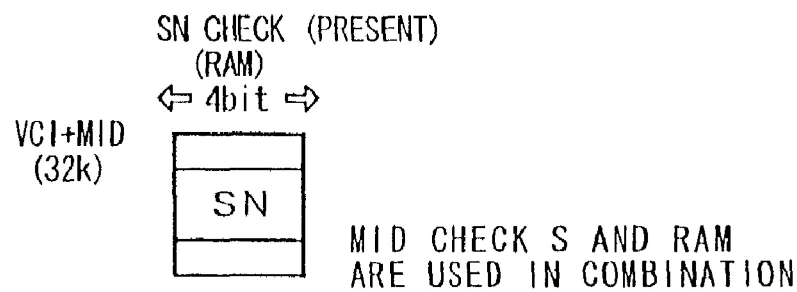

FIG. 245 shows the process related to the SN check for each segment type.

FIG. 246 shows the process related to the address format check.

Figure 247:
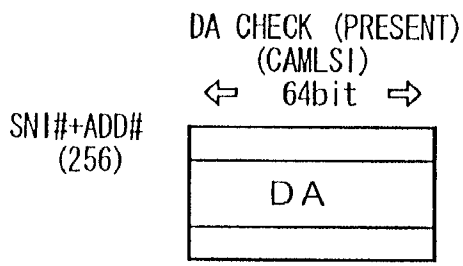

FIG. 247 shows the process related to the DA check for each segment type.

FIG. 248 shows the process related to the BA-BA-size check.

Figure 249:
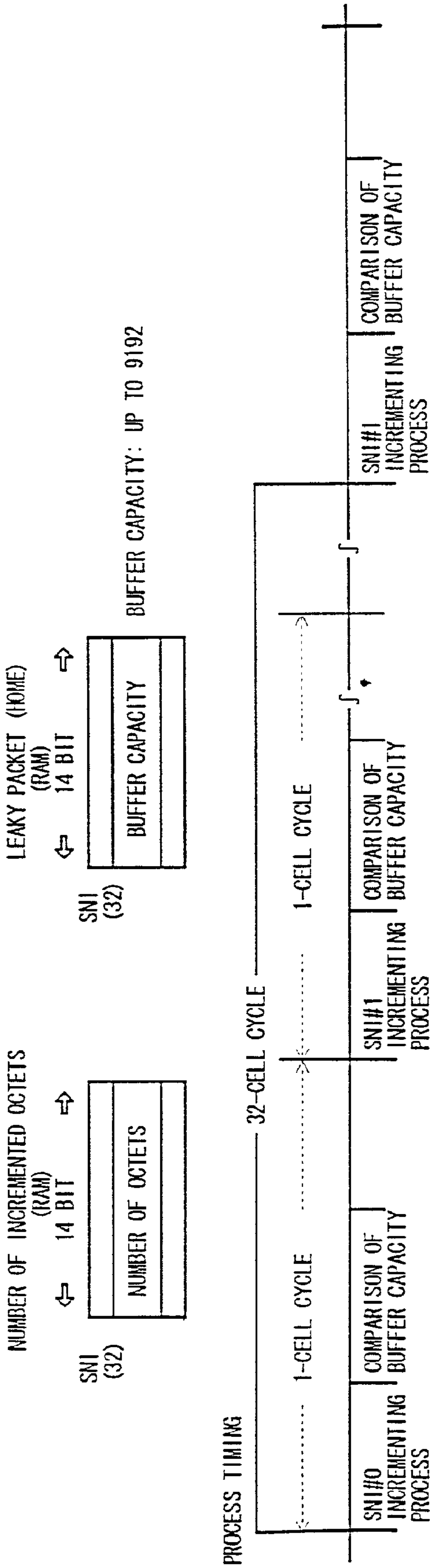

FIG. 249 shows the process timing in the ingress flow check.

Figure 250:
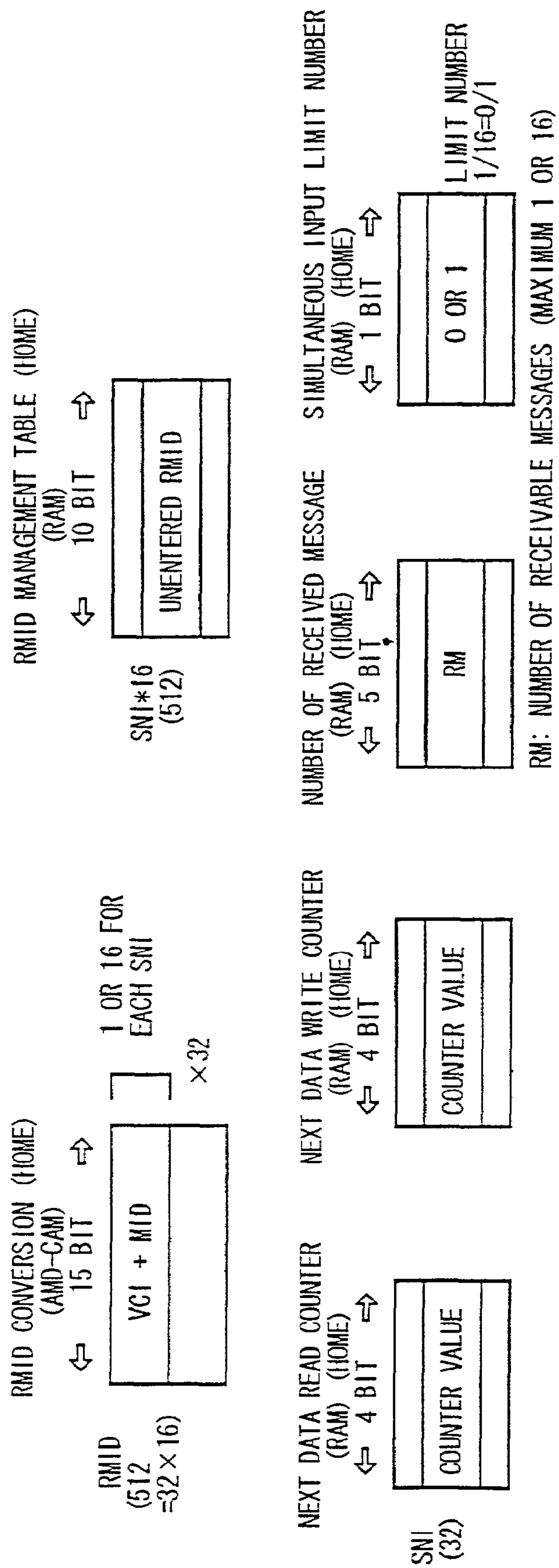

FIG. 250 shows the process related to the simultaneous input number check.

Figure 251:
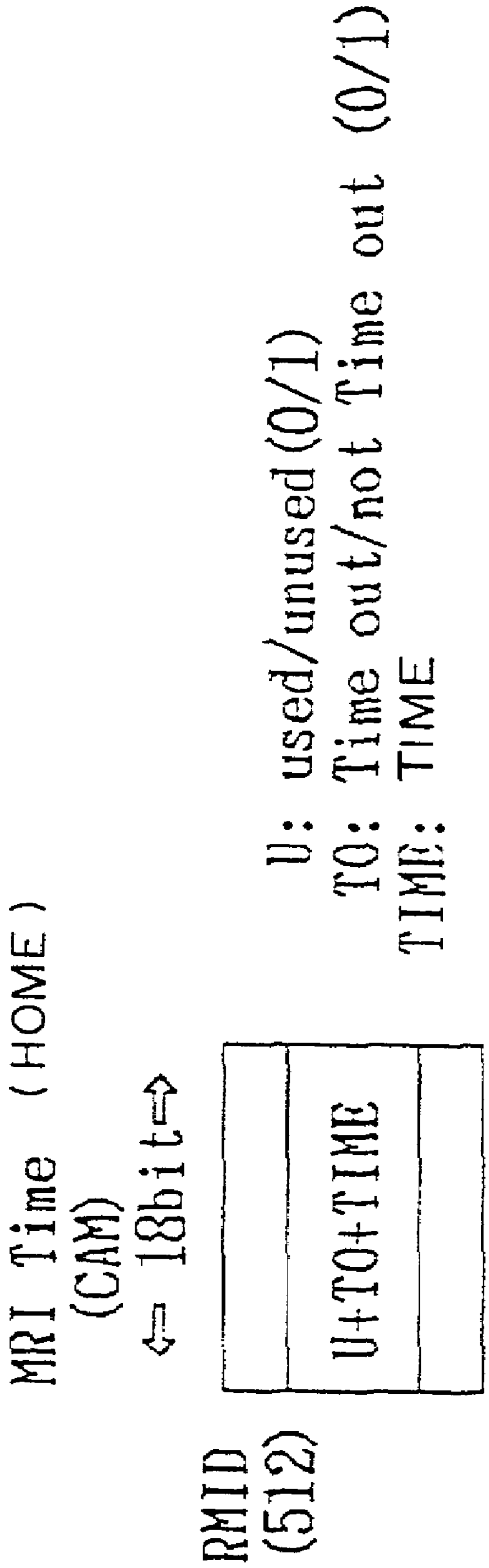

FIG. 251 shows the process related to the MID timeout check.

FIG. 252 shows the read/write data to the RMID conversion CAM and MRI CAM.

Figure 253:
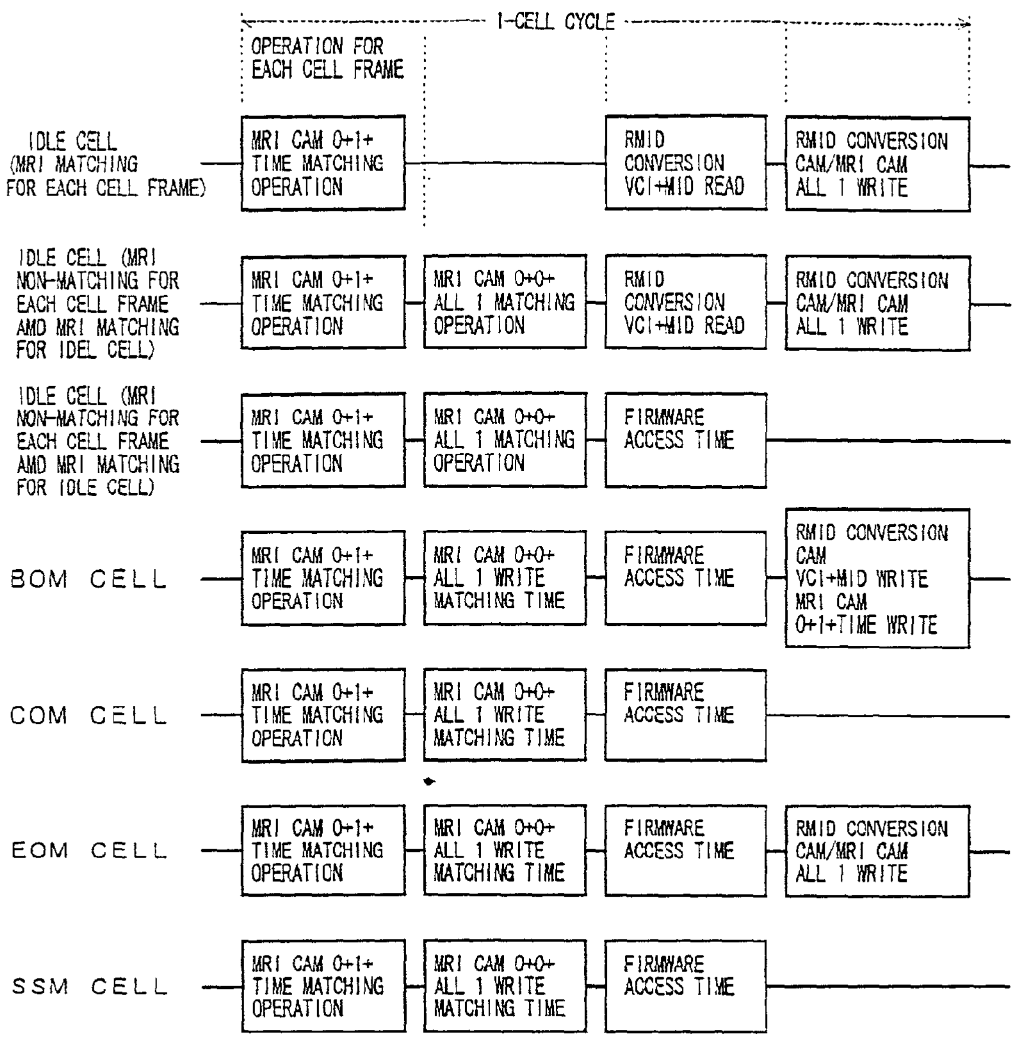

FIG. 253 shows the matching and read/write timing of the RMID conversion CAM and MRI CAM for each cell.

Figure 254:
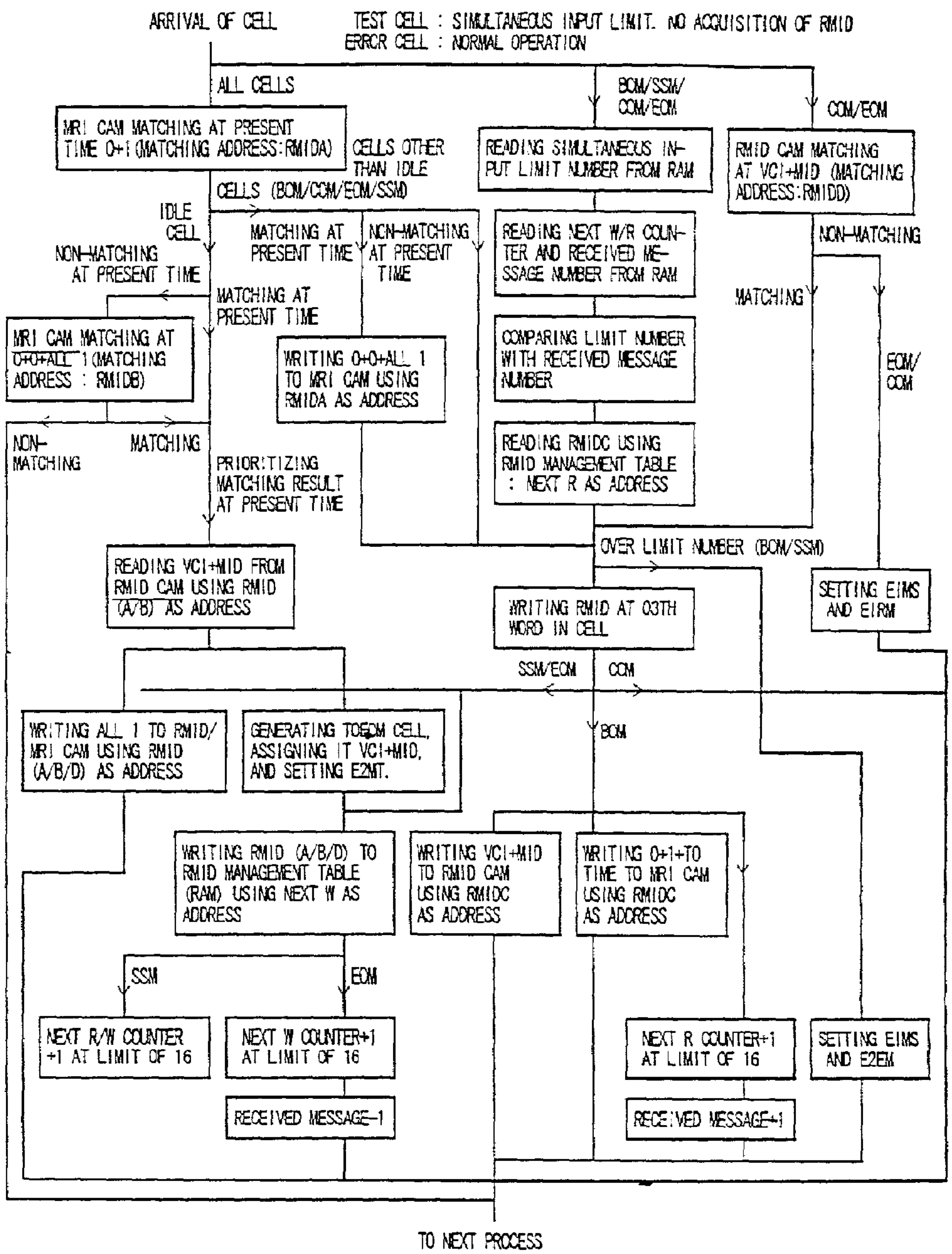

FIG. 254 is a flowchart showing the process of the simultaneous input number limit RMID acquisition/MRI timeout.

Figure 255:
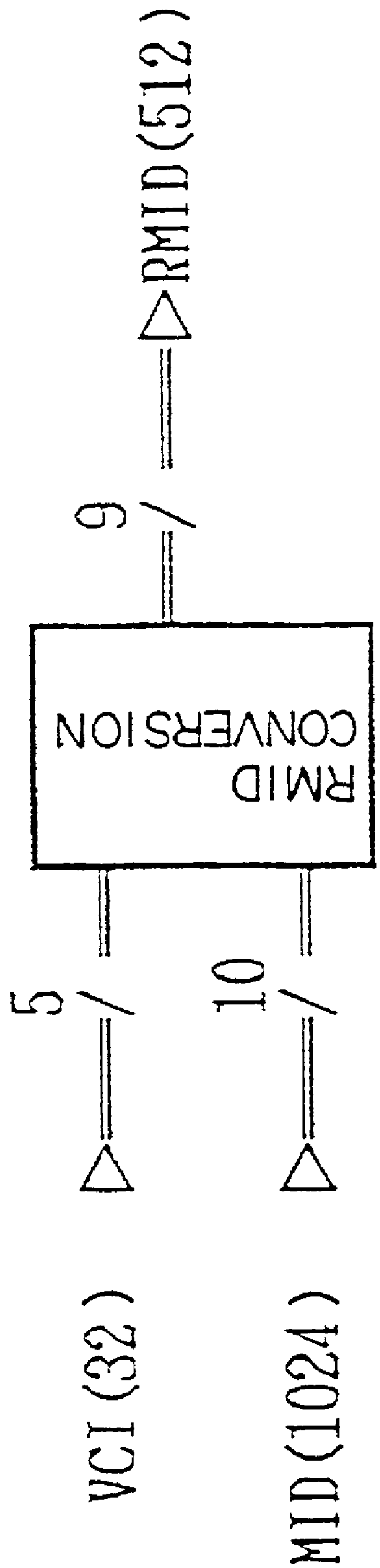

FIG. 255 shows the concept of the degeneration of the RMID.

FIG. 256 shows the process of normal and abnormal cells in the RMID acquiring unit, simultaneous input limit, and MRI T.O set/release for each segment type.

FIG. 257 shows the process related to the header extension (HE) format check.

Figure 258:
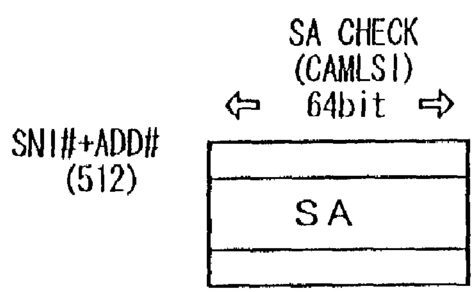

FIG. 258 shows the process related to the source address (SA) check for each segment type.

Figure 259:
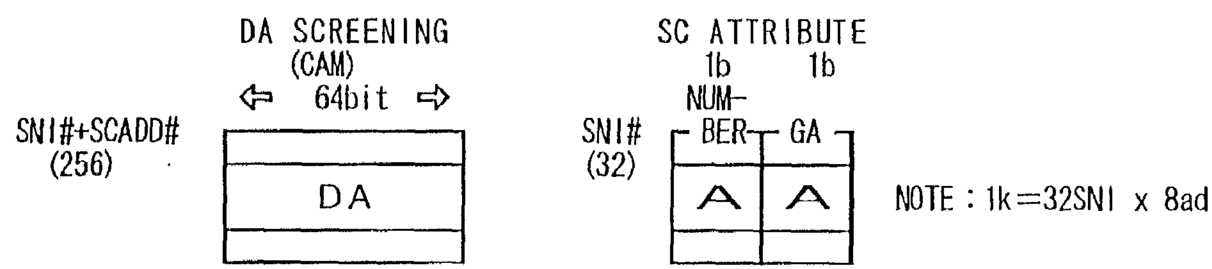

FIG. 259 shows the process related to the screening of a destination address DA.

Figure 260:
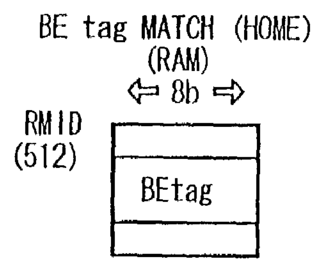

FIG. 260 shows the process related to the matching of a BE tag.

FIG. 261 shows the process related to the matching check on the BA size.

FIG. 262 shows the process related to the information length check.

Figure 263:
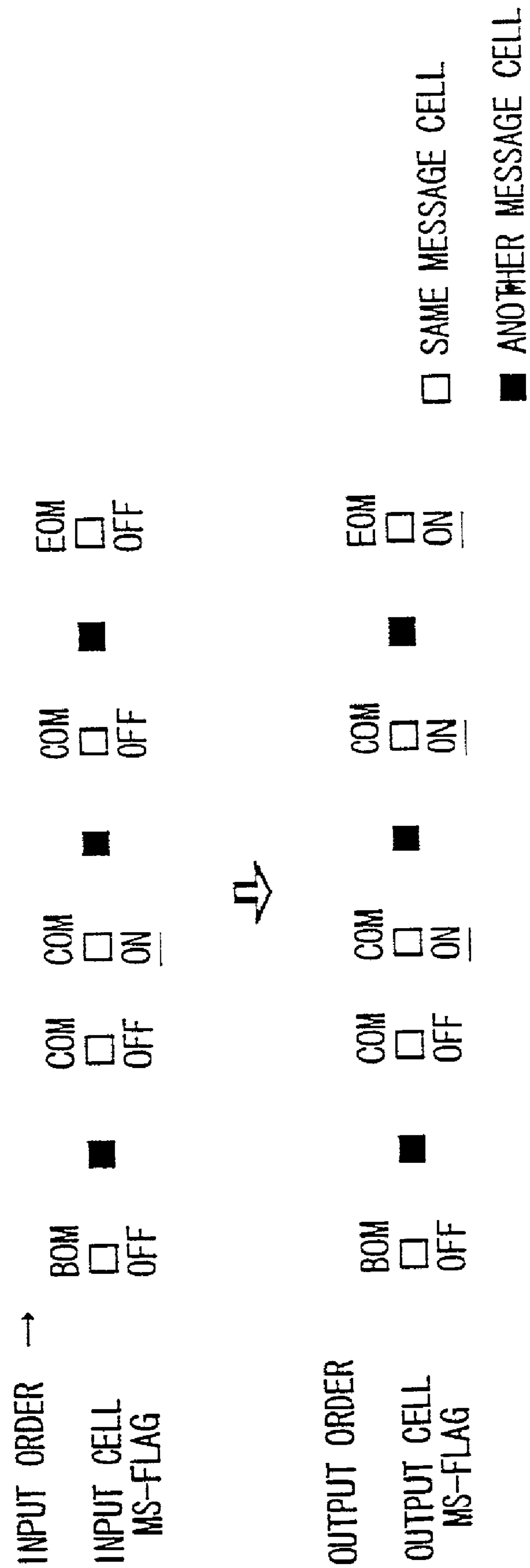

FIG. 263 shows the discard of an error message in the L3-PDU.

Figure 264:
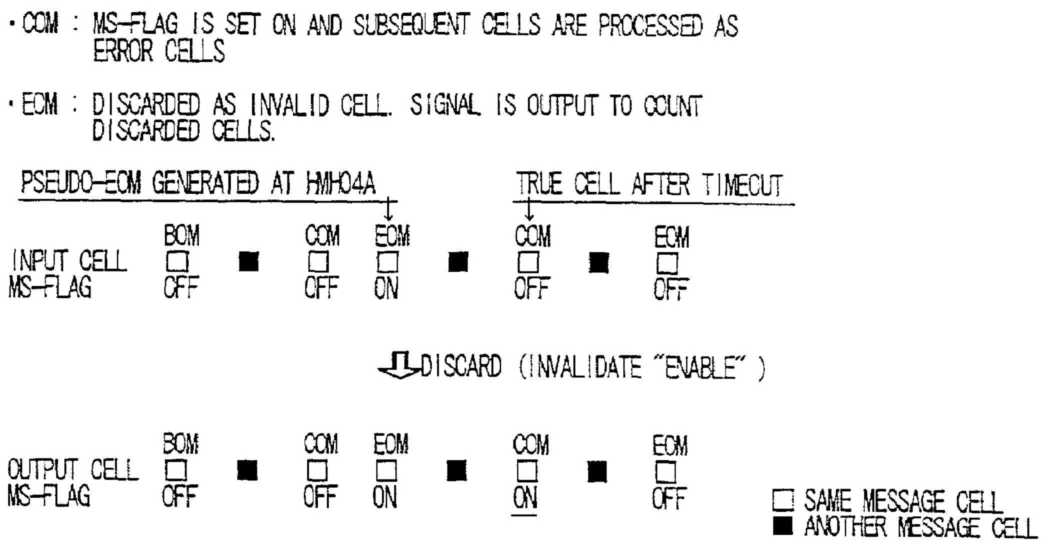

FIG. 264 shows the discard of a message received after an MRI timeout EOM.

FIG. 265 shows the process for error memory for each segment type.

FIG. 266 shows the encapsulation.

FIG. 267 shows the ISSI header assigned to the information BON between the-message handlers (MH).

Figure 268:
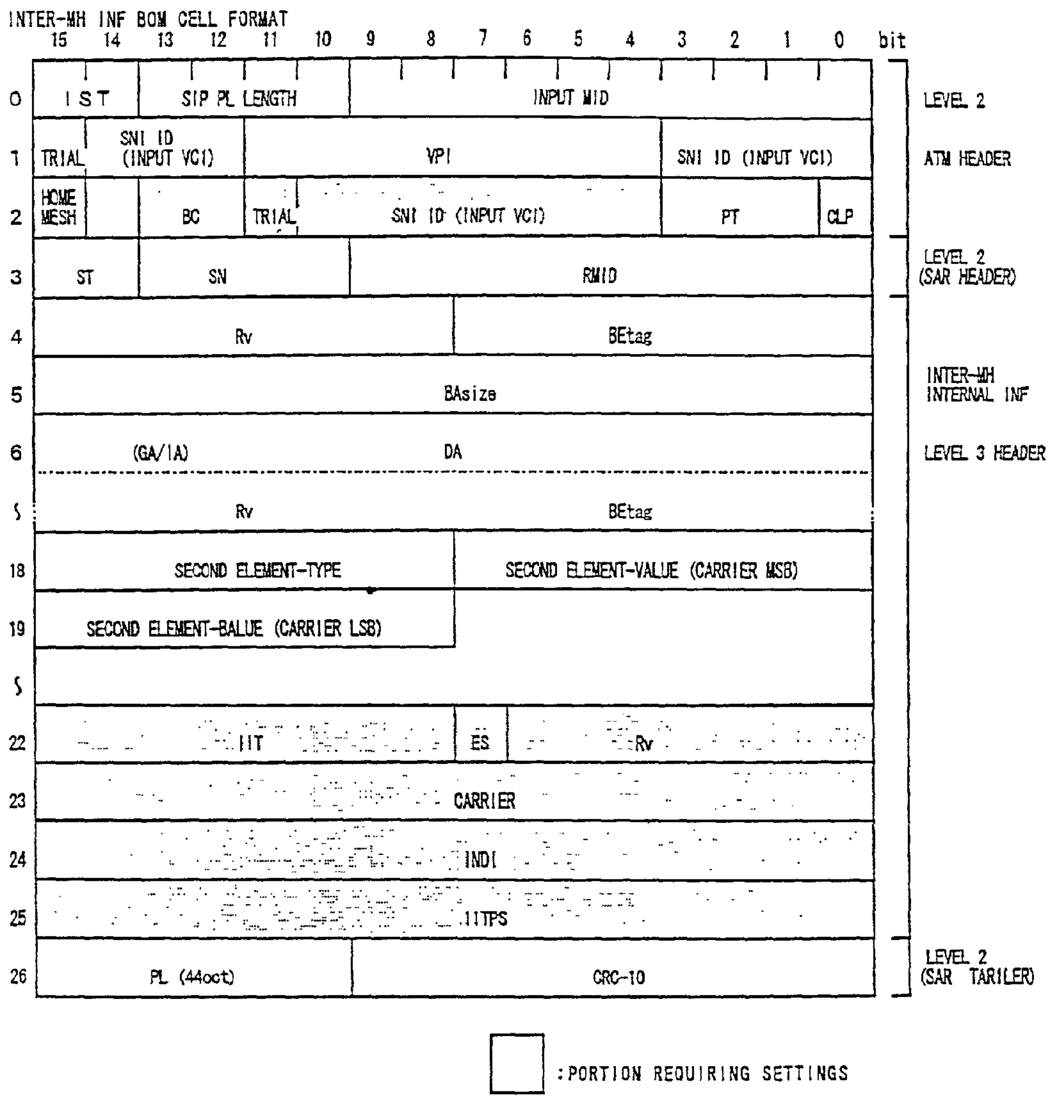

FIG. 268 shows the format of the information BON between the message handlers (MH).

Figure 269:
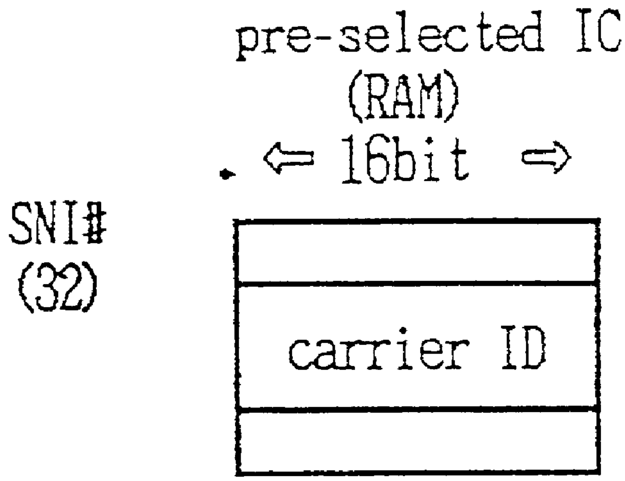

FIG. 269 shows the process related to the carrier selection.

FIG. 270 shows the outline of the process related to the routing.

FIG. 271 shows the concept of the process related to the routing.

FIG. 272 shows the outline of the process related to the carrier screening.

FIG. 273 shows the broadcast specification bit.

Figure 274:
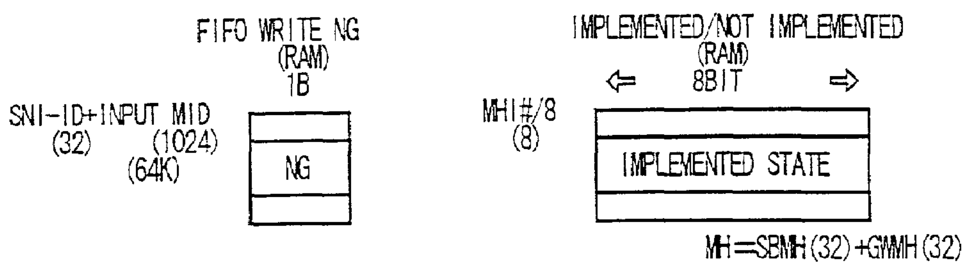

FIG. 274 shows the process related to the copy of cells.

Figure 275:
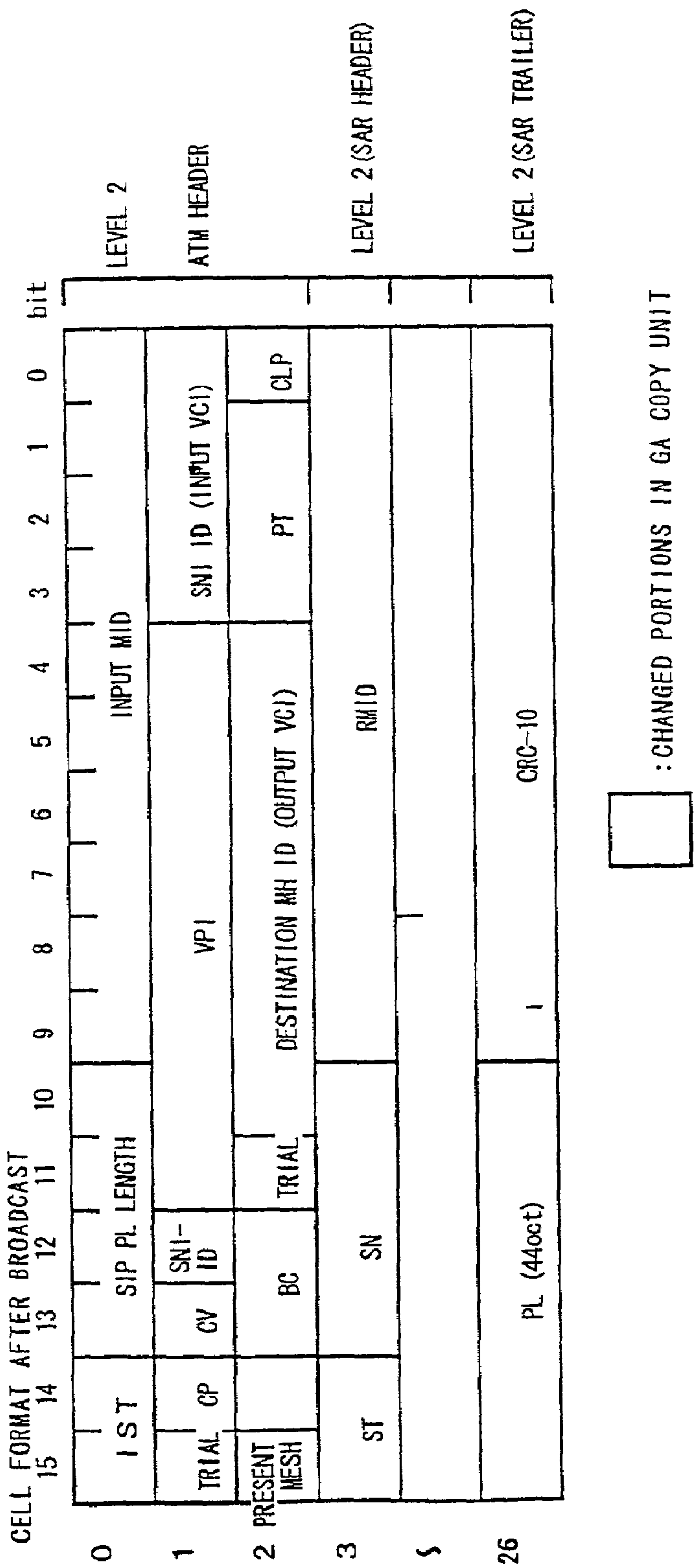

FIG. 275 shows the format of the cell after being broadcast.

Figure 276:
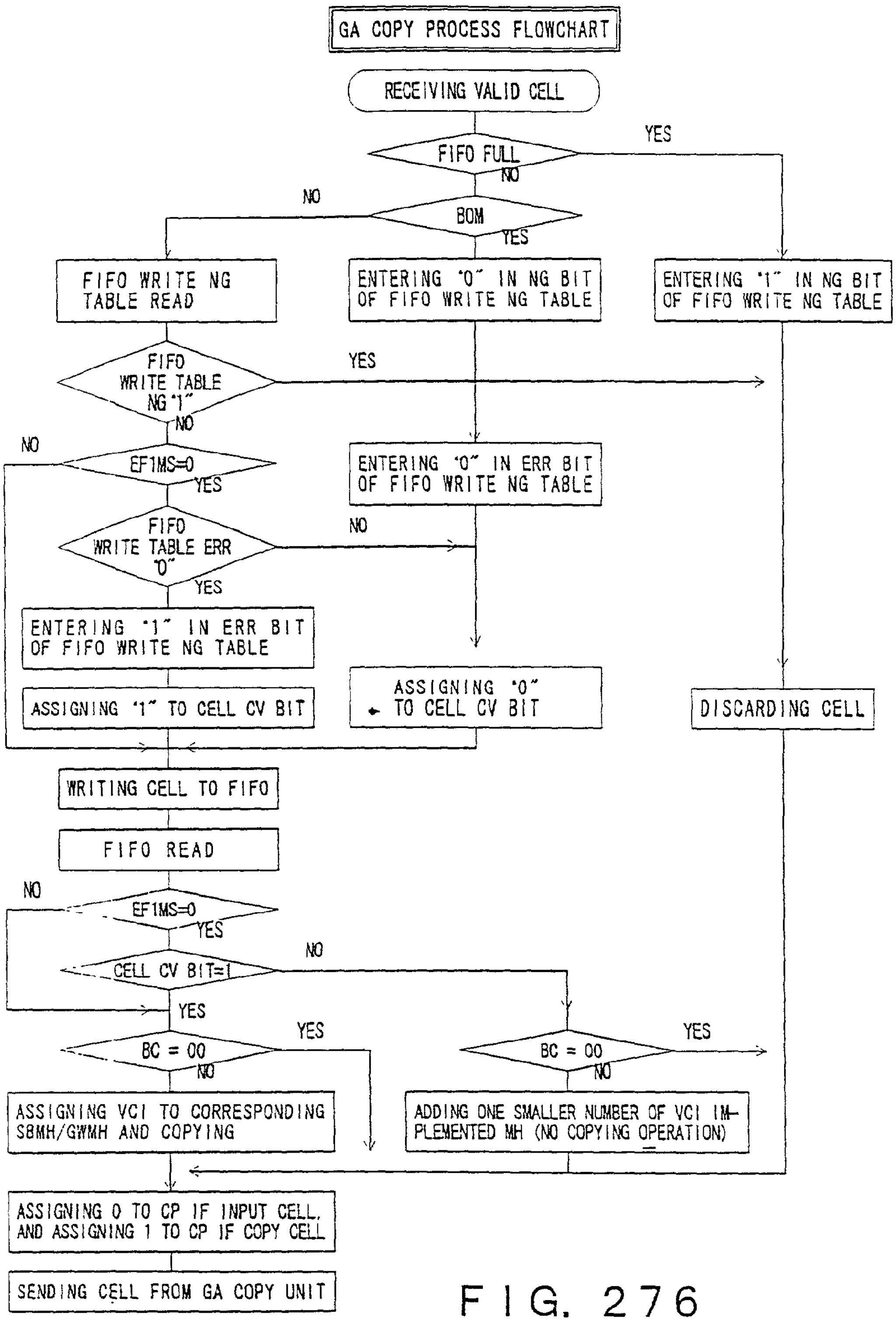

FIG. 276 is a flowchart of the copying process on the group address GA field.

Figure 277:
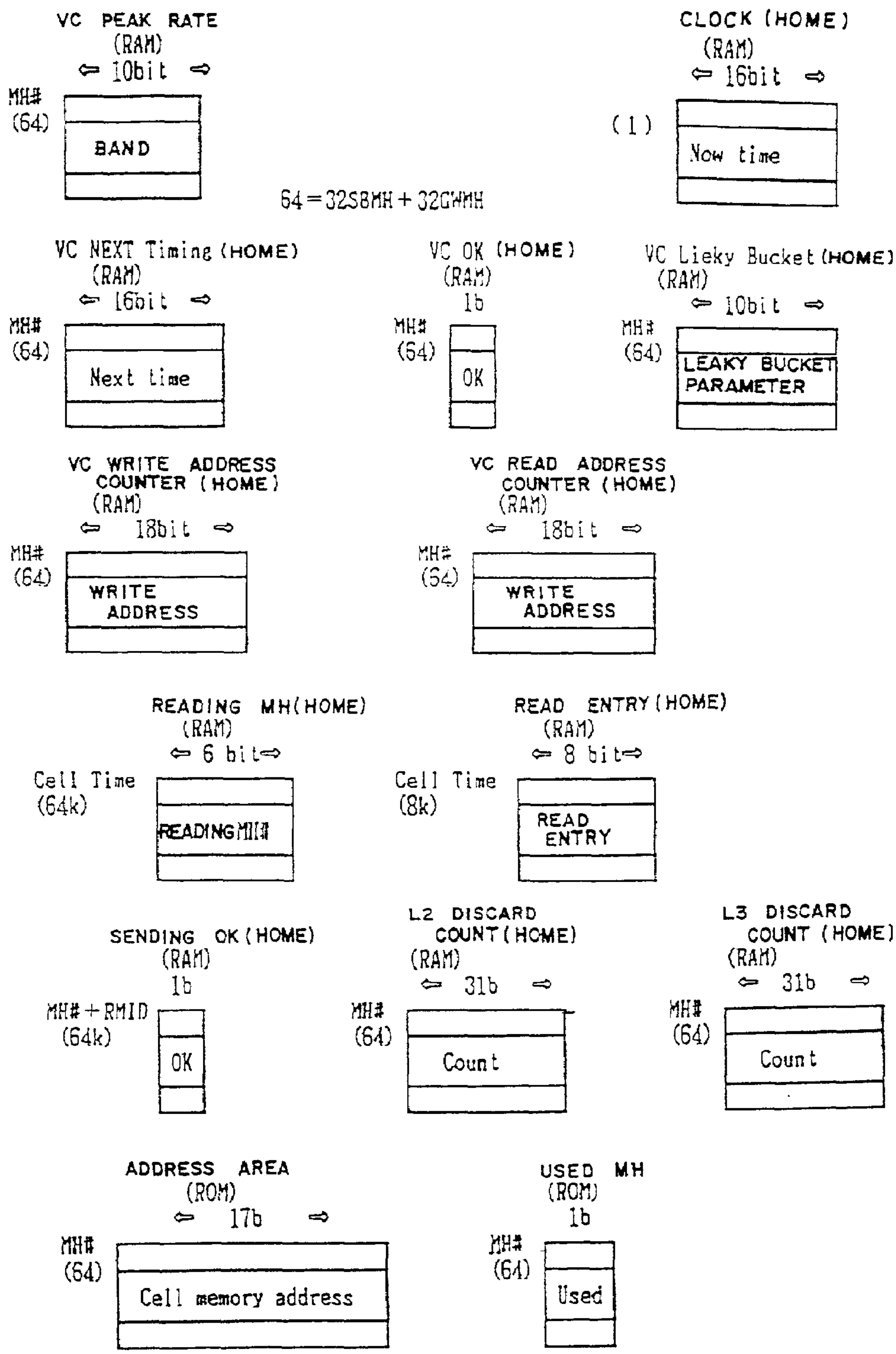

FIG. 277 shows the process related to the output band limit.

Figure 278:
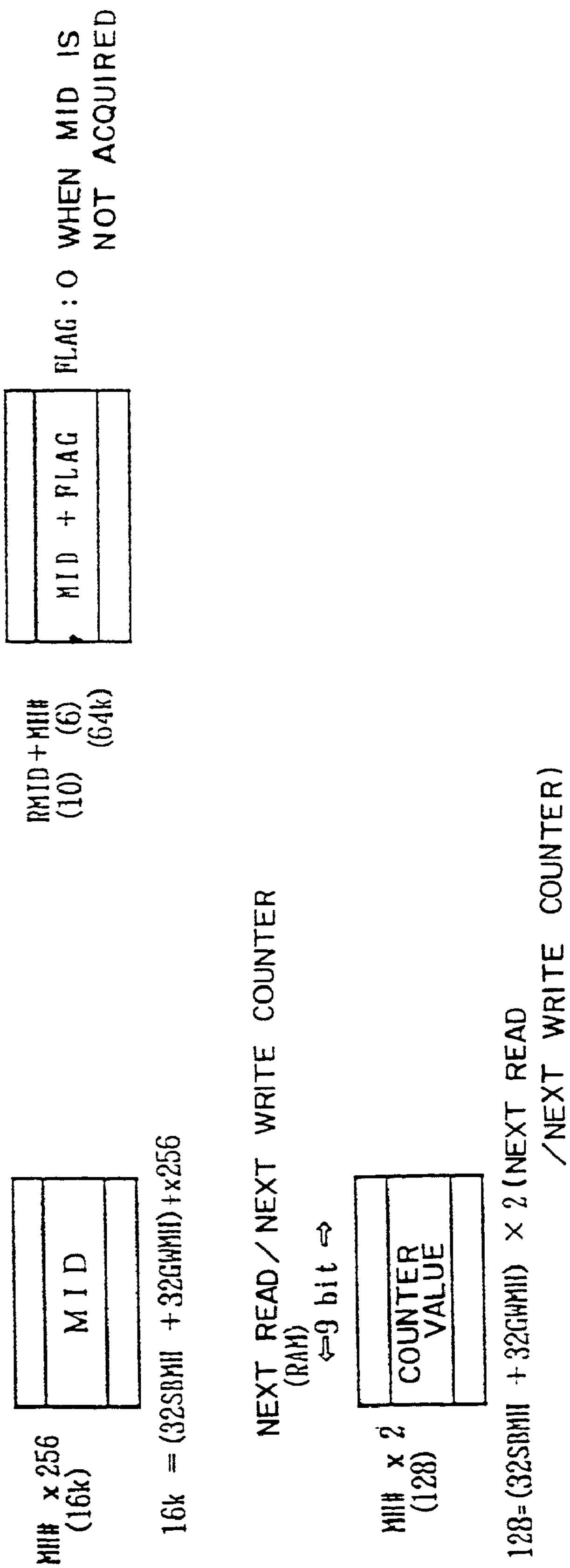

FIG. 278 shows the process of acquiring an output MID.

Figure 279:
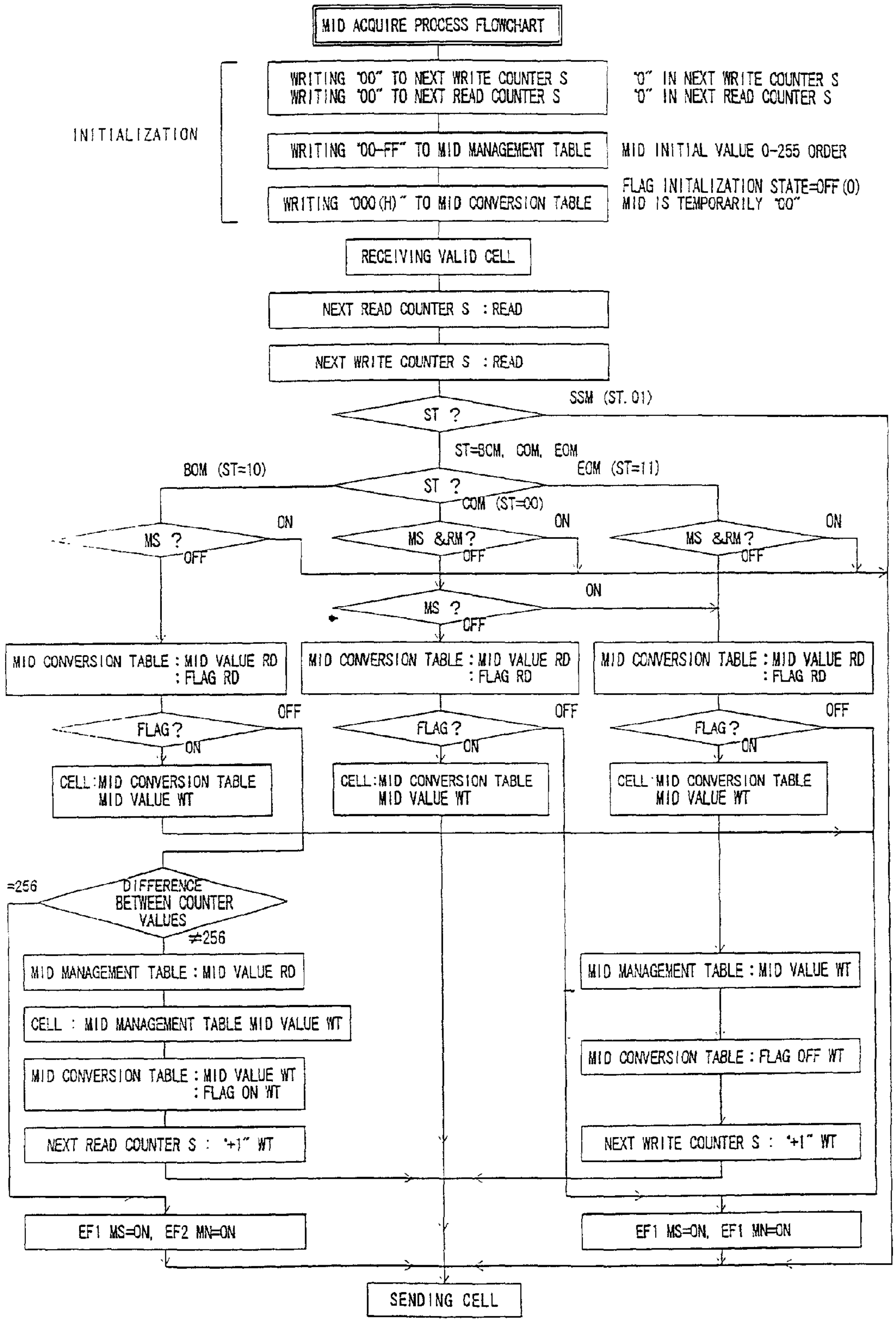

FIG. 279 is a flowchart of the process related to the acquisition of the MID.

FIG. 280 is a list (1) of the SMLP table.

FIG. 281 is a list (2) of the SMLP table.

Figure 282:
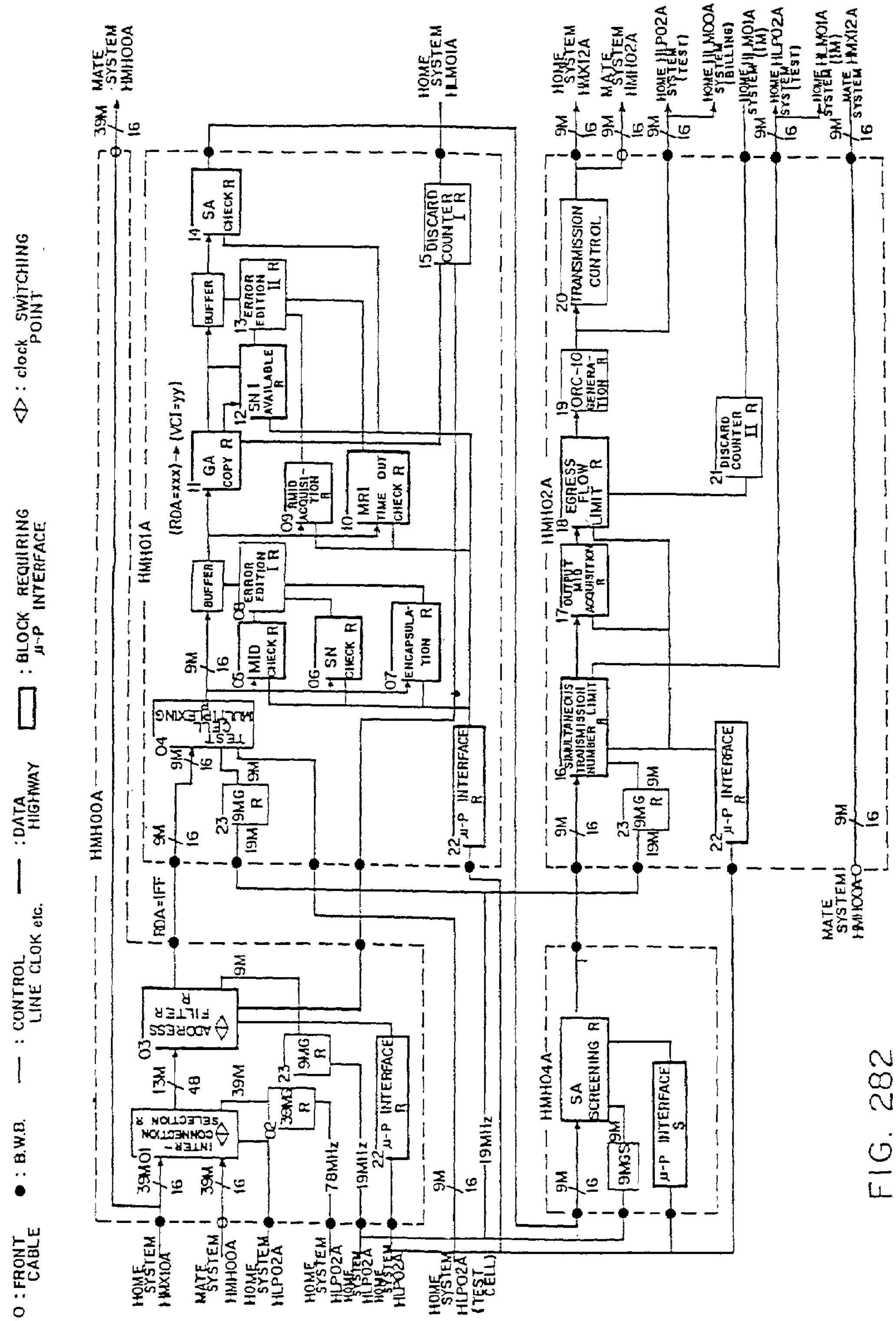

FIG. 282 is the block diagram showing the entire configuration of the RMLP.

FIG. 283 shows the outline (1) of the functions of each block of the RMLP.

FIG. 284 shows the outline (2) of the functions of each block of the RMLP.

Figure 285:
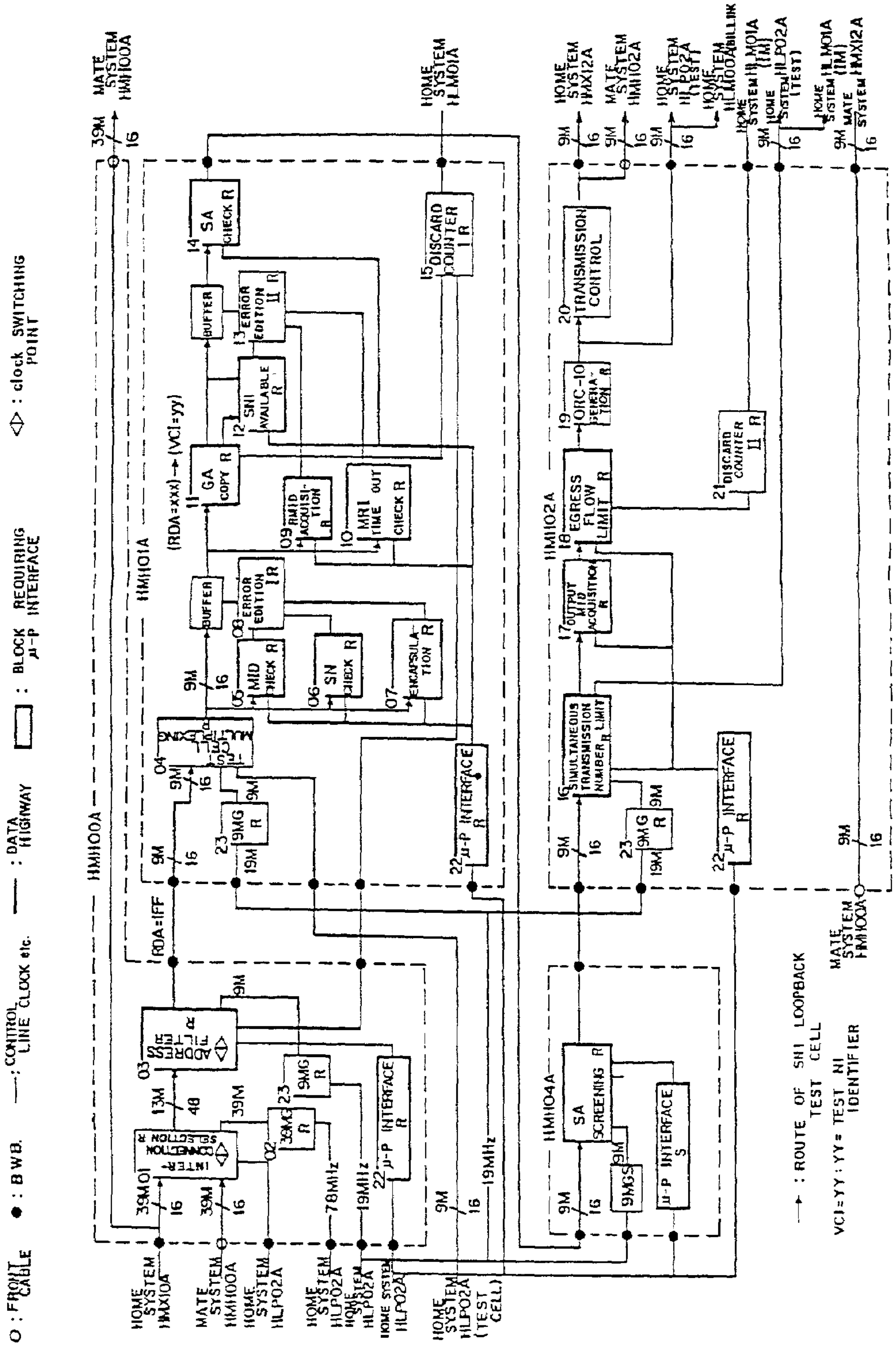

FIG. 285 shows the route (1) of the test cell in the PVC test, and shows the SNI loopback test.

Figure 286:
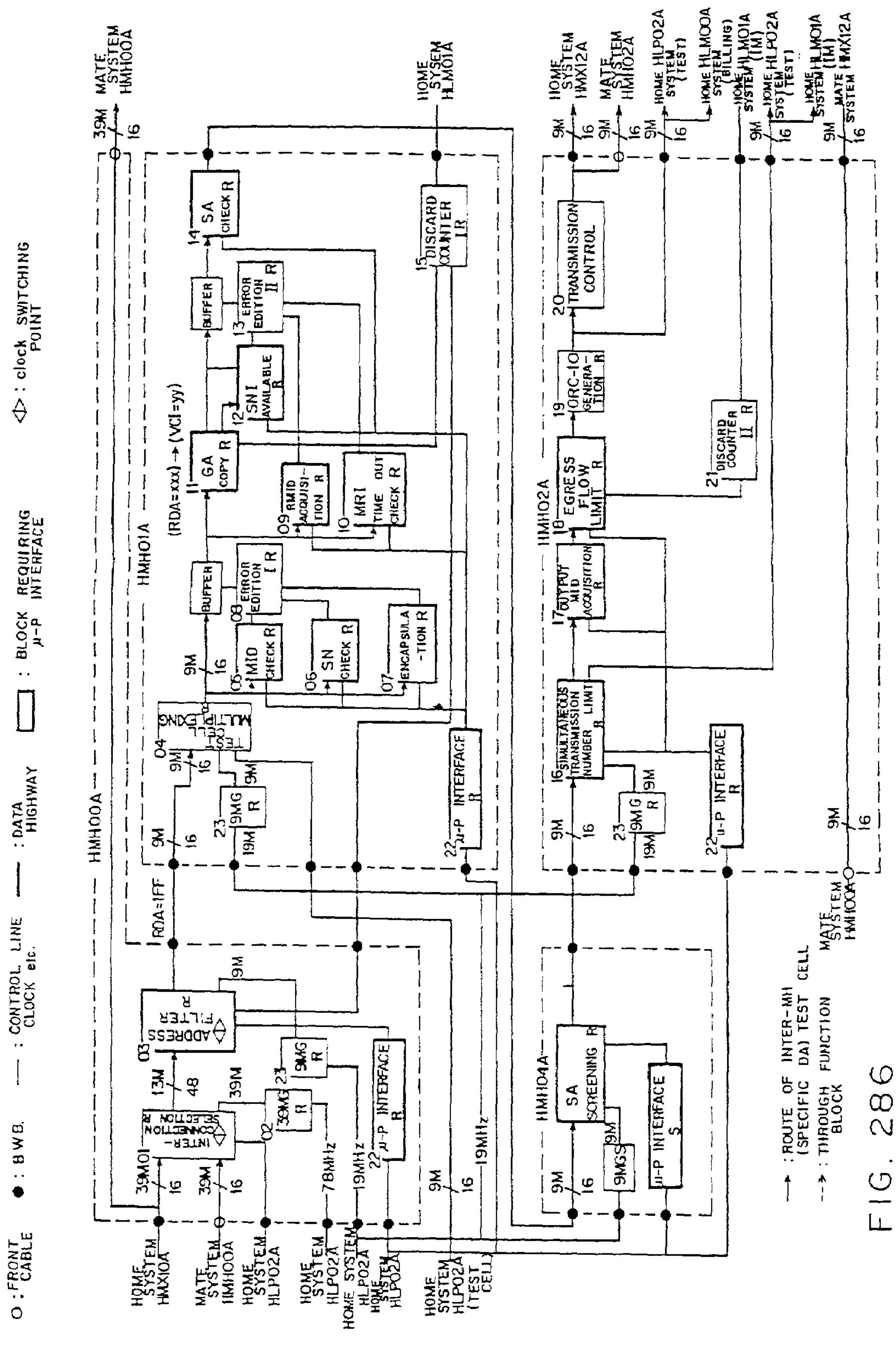

FIG. 286 shows the route (2) of the test cell in the PVC test, and shows the inter-MH (using a specific DA) test.

Figure 287:
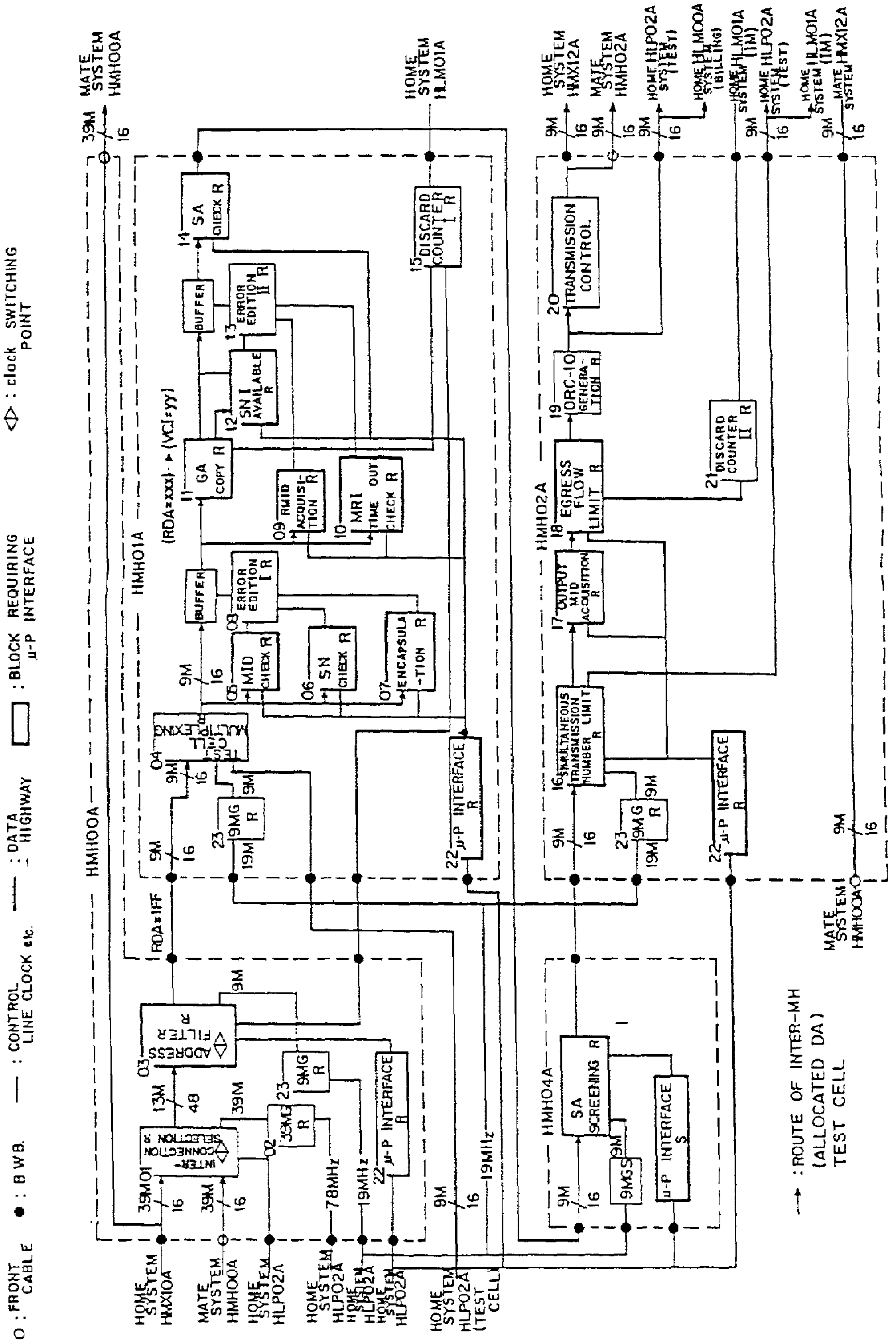

FIG. 287 shows the route (3) of the test cell in the PVC test, and shows the inter-MH (using an allocated DA) test.

Figure 288:
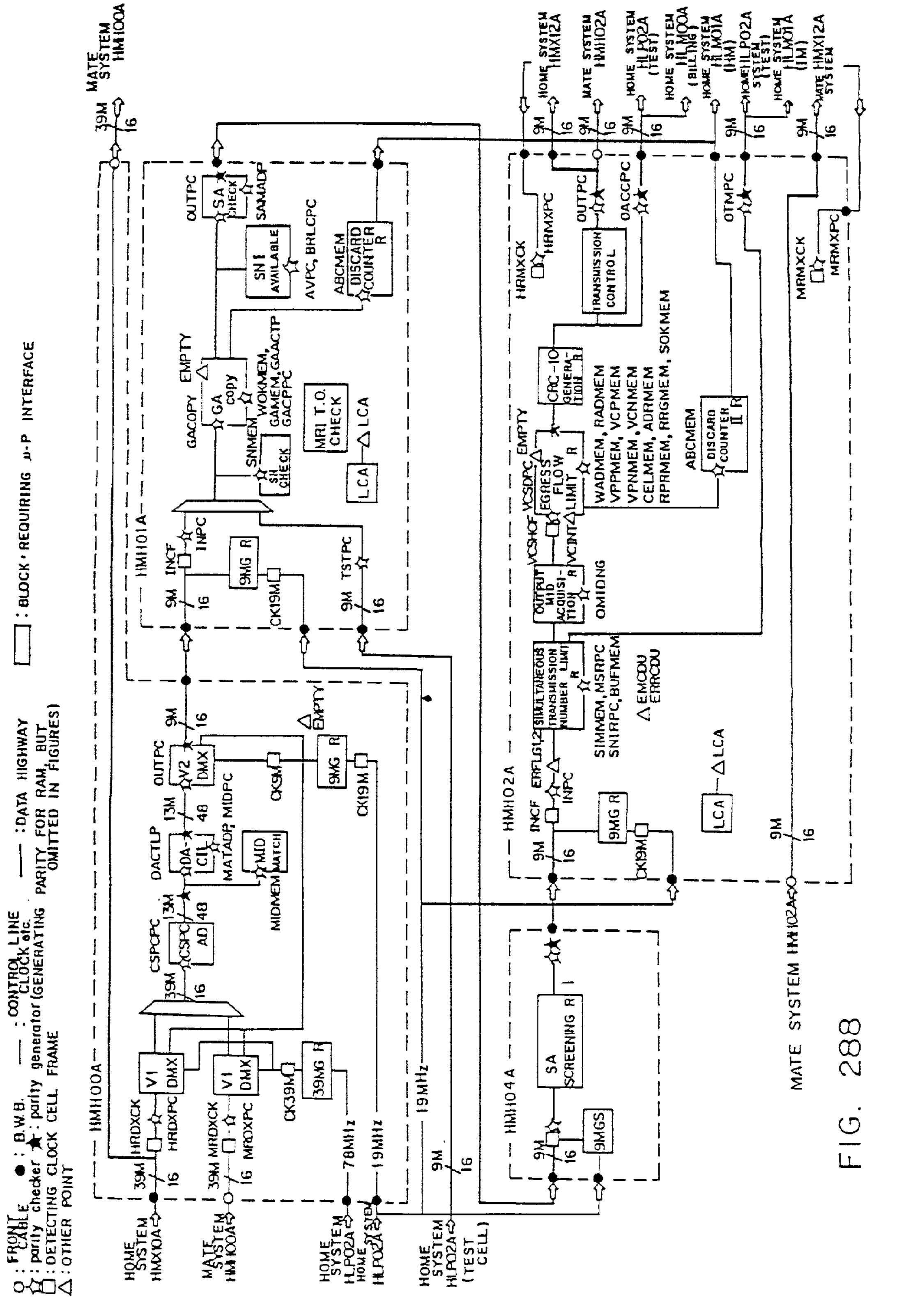

FIG. 288 shows the RMLP accommodating the MSCN.

Figure 289:
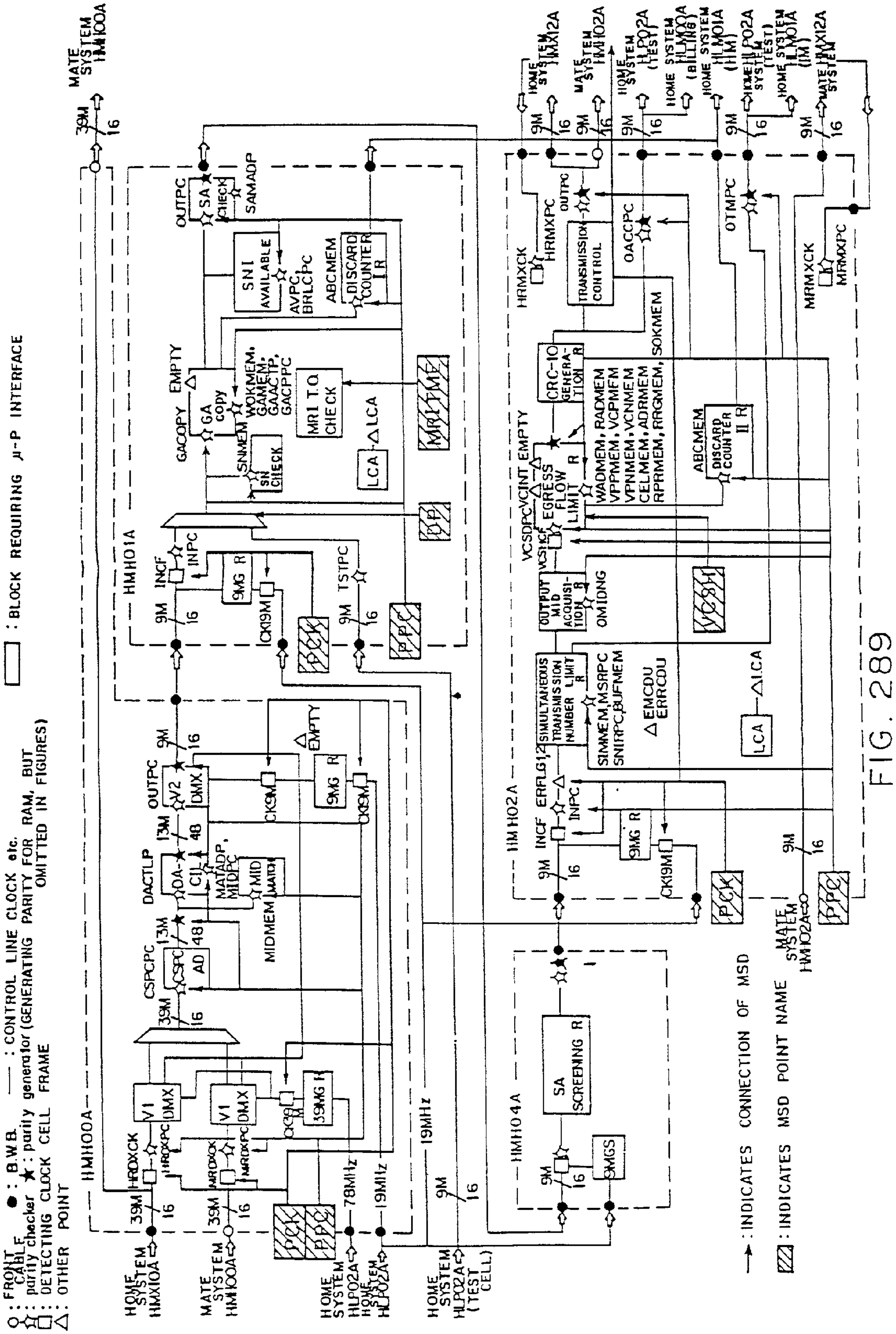

FIG. 289 shows the RMLP accommodating the MSD.

FIG. 290 shows the error flag (EF) operated for each function block of the RMLP.

Figure 291:
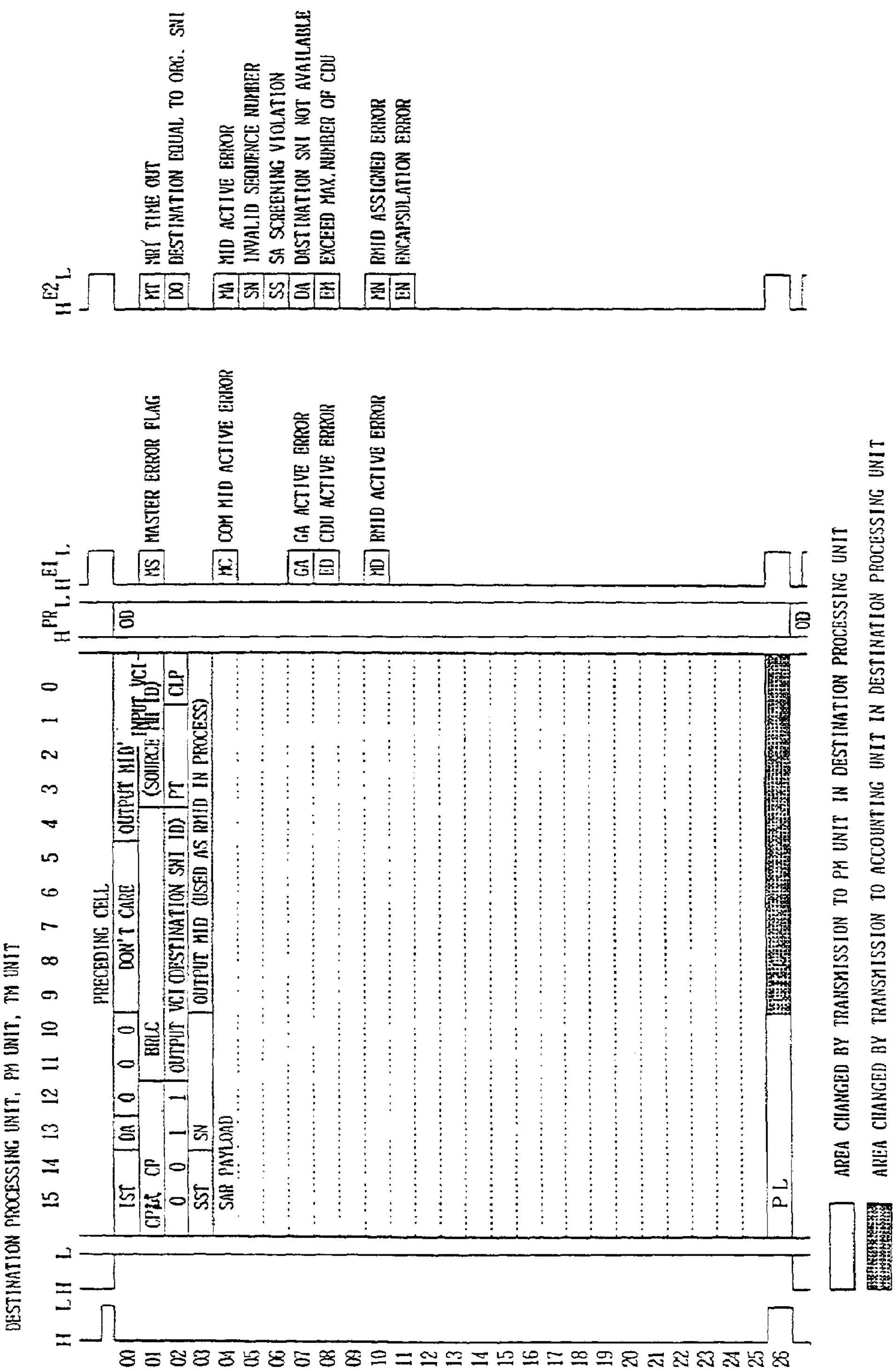

FIG. 291 shows the data interface of the RMLP and LP-COM, and the format (1) of the cell.

FIG. 292 shows the data interface of the RMLP and LP-COM, and the format (2) of the cell.

Figure 293:
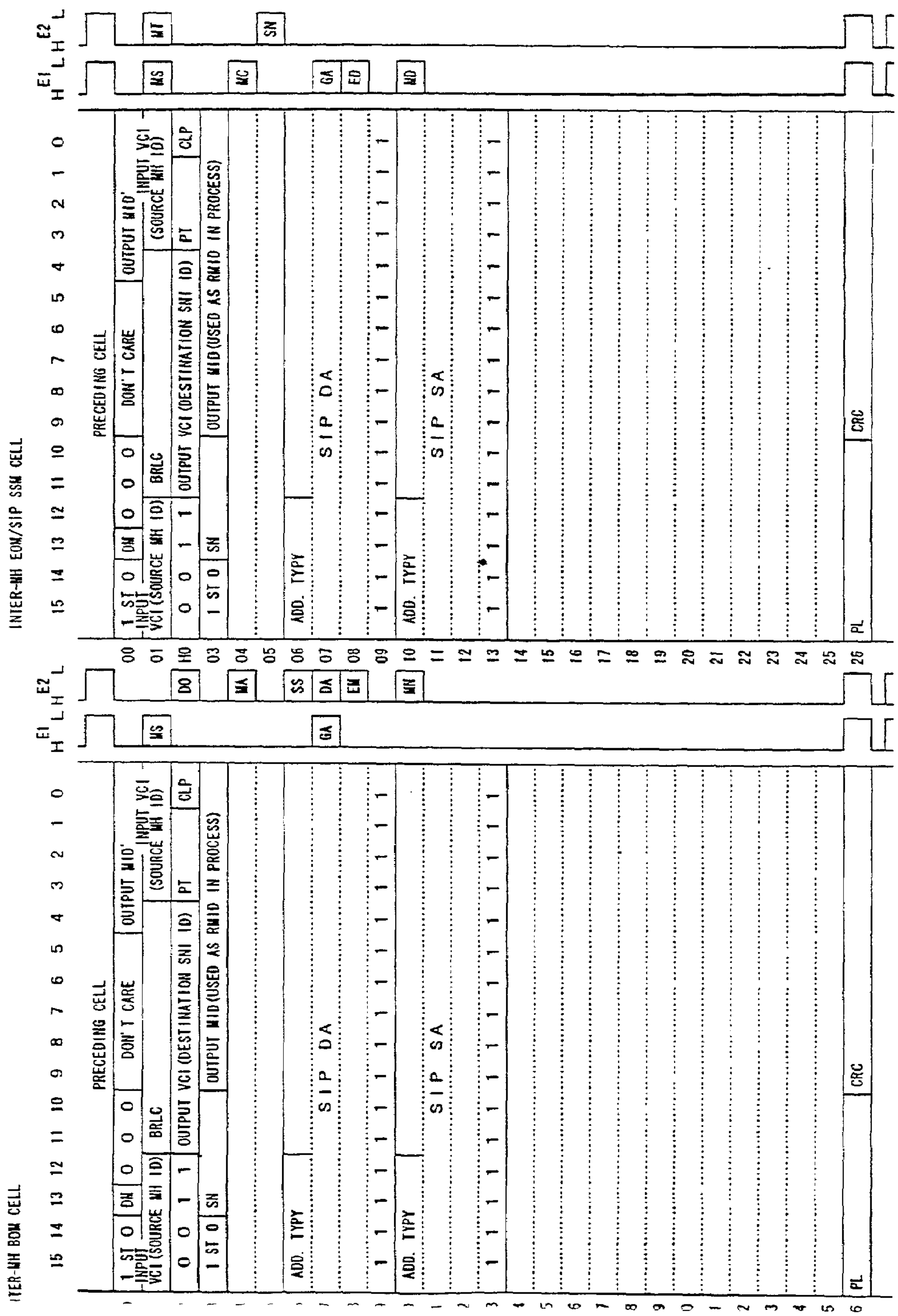

FIG. 293 shows the data interface of the RMLP and LP-COM, and the format (3) of the cell.

Figure 294:
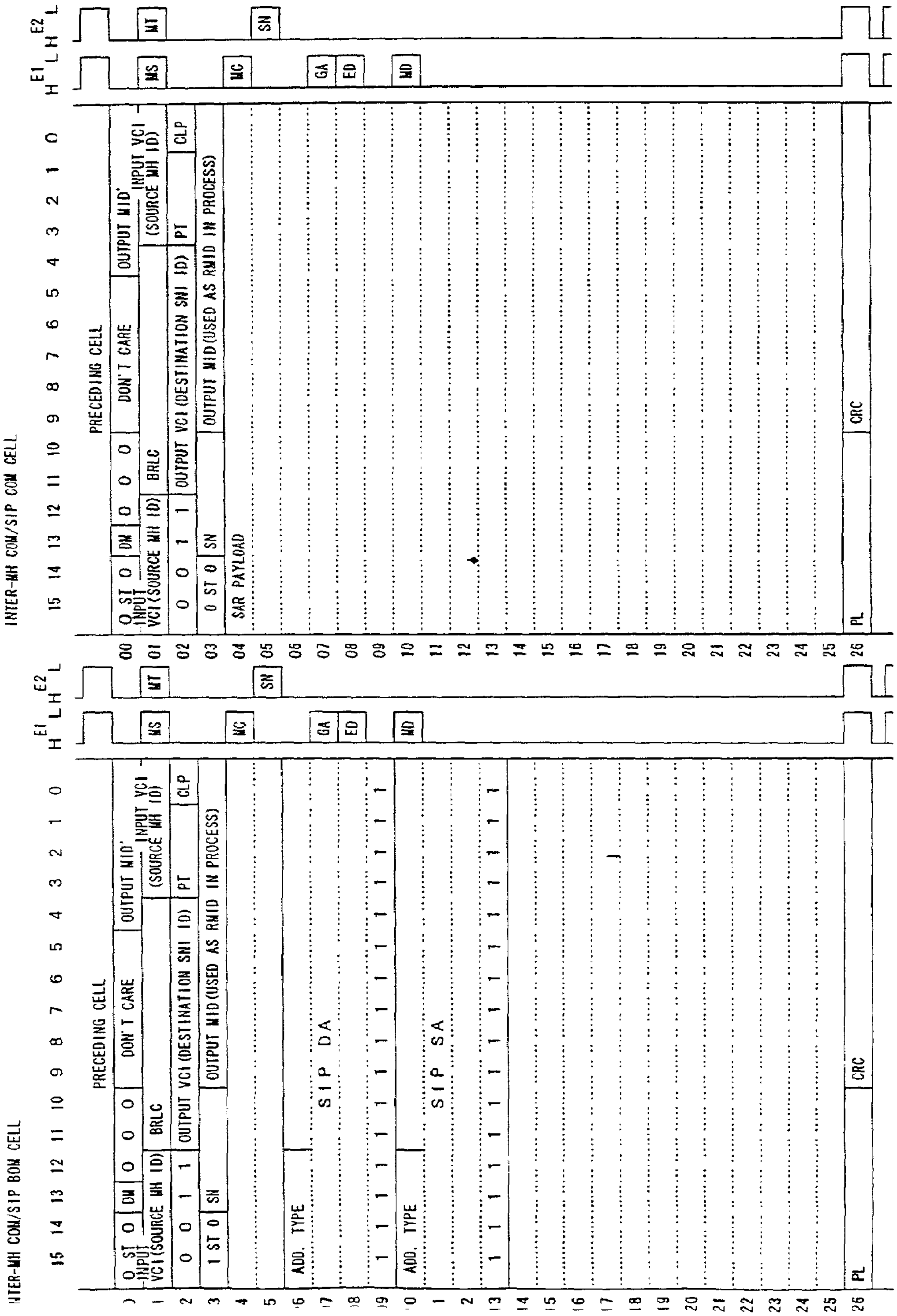

FIG. 294 shows the data interface of the RMLP and LP-COM, and the format (4) of the cell.

FIG. 295 shows the data interface of the RMLP and LP-COM, and the format (5) of the cell.

Figure 296:
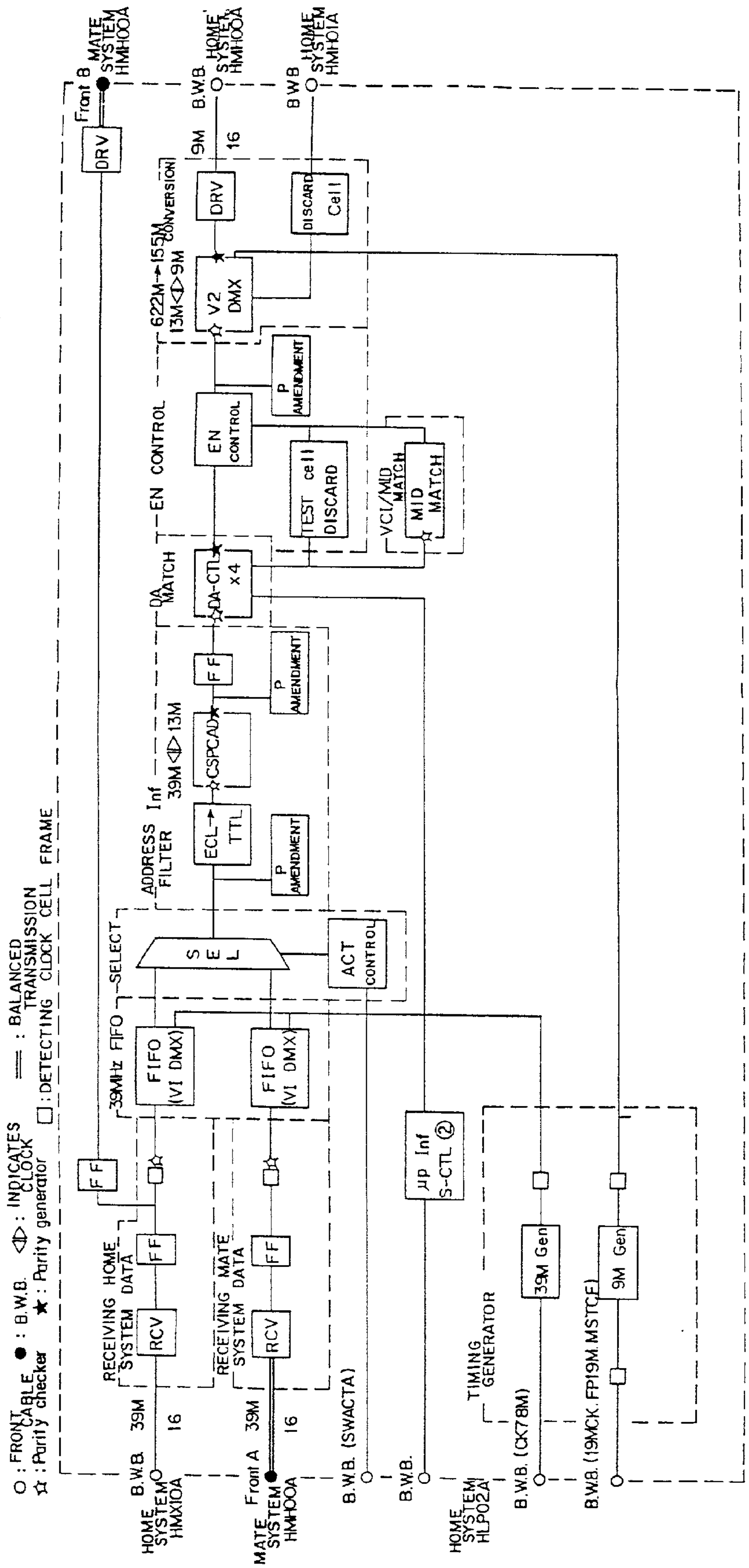

FIG. 296 is a block diagram showing the functions of the HMH00A.

FIG. 297 shows the outline of the functions of each block of the HMH00A.

Figure 298:
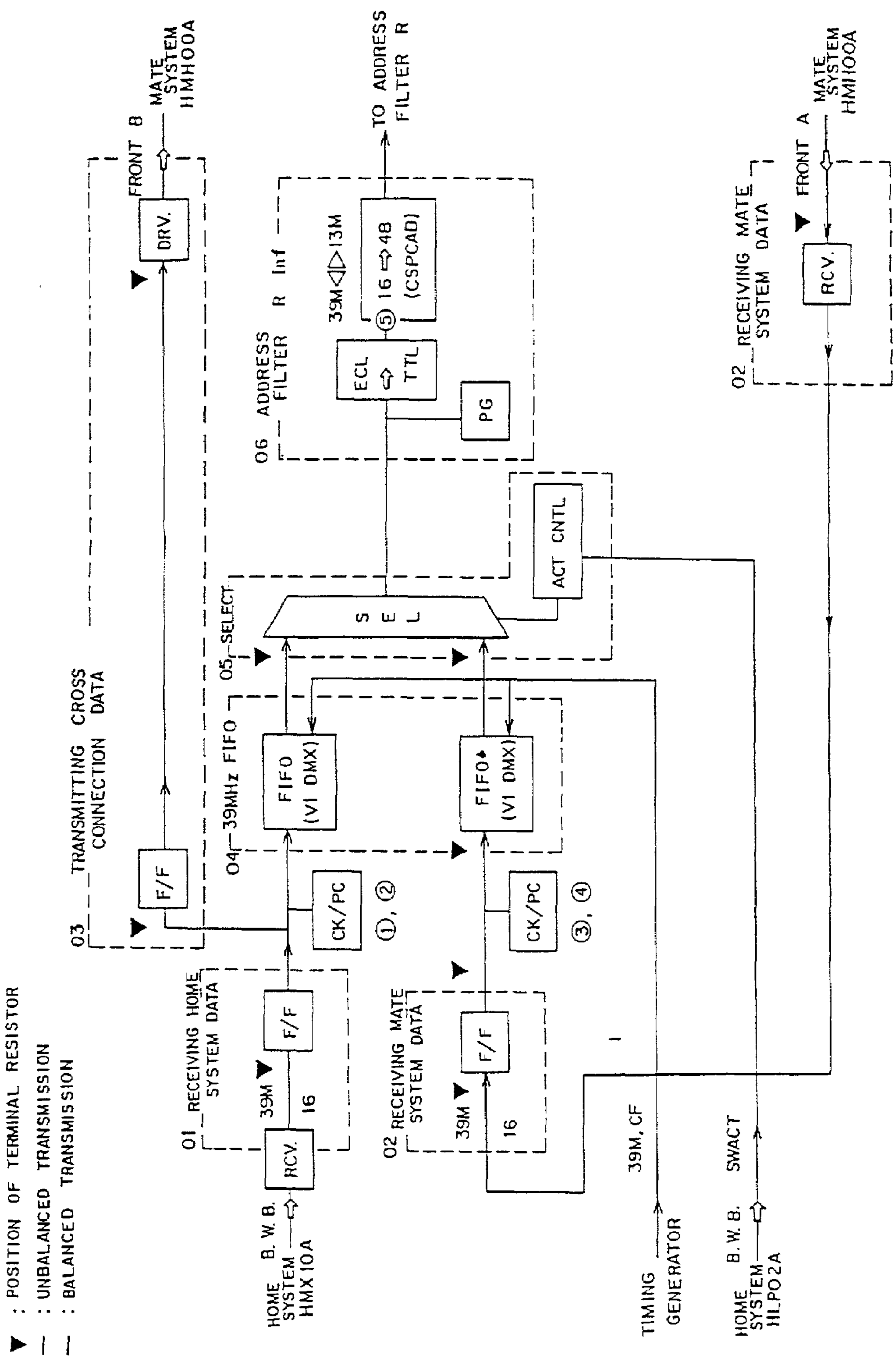

FIG. 298 shows the block diagram showing the functions of the cross-connection select R.

FIG. 299 shows the outline of the functions of each block of the cross connection select R.

Figure 300:
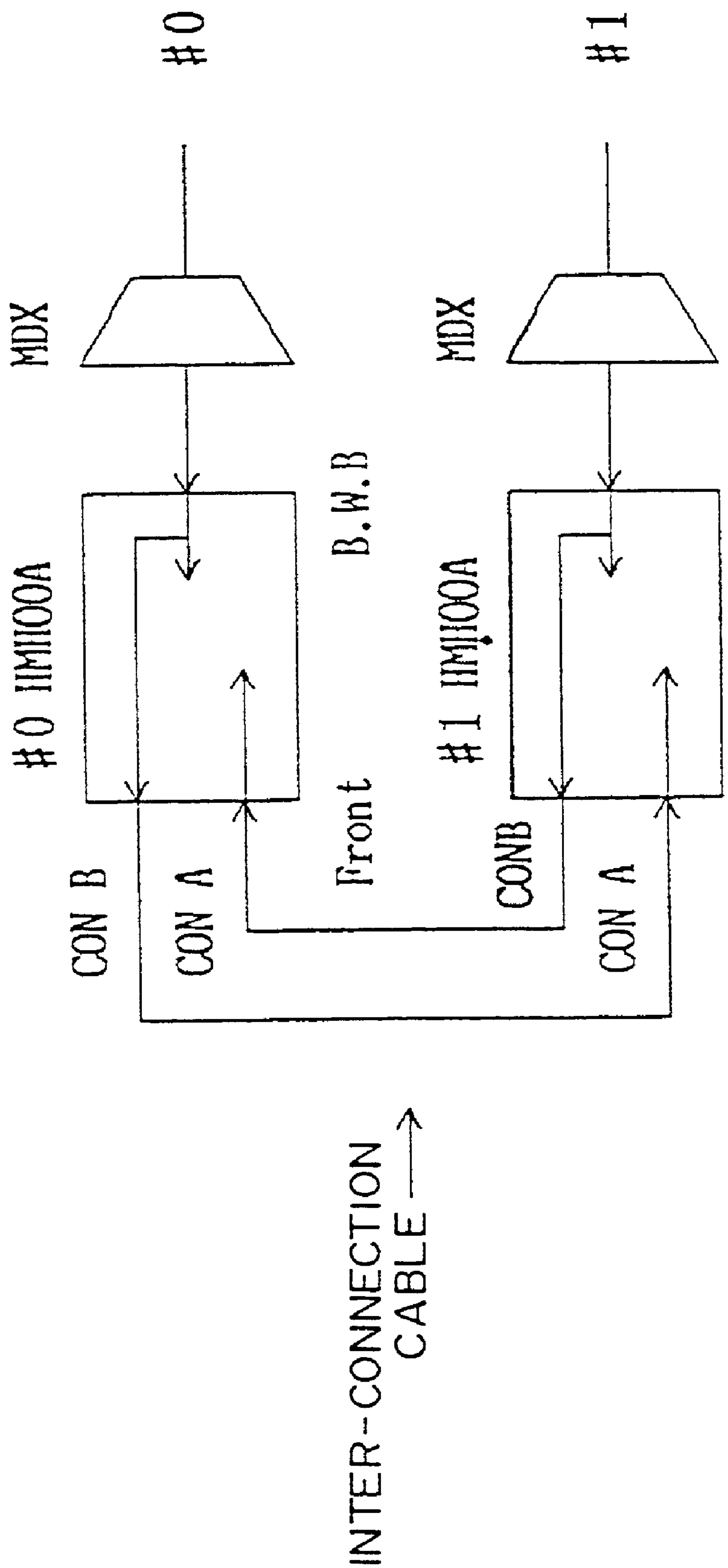

FIG. 300 shows the cross-connection of the system in the HMH00A.

Figure 301:
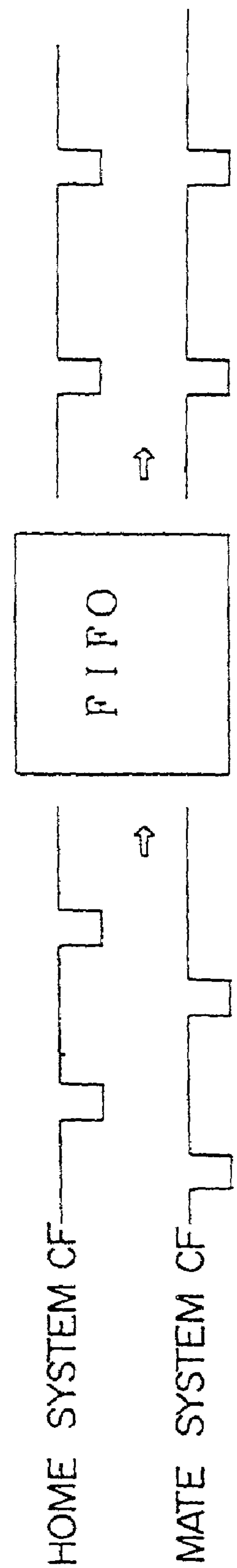

FIG. 301 shows the adjustment of the timing through the FIFO.

Figure 302:
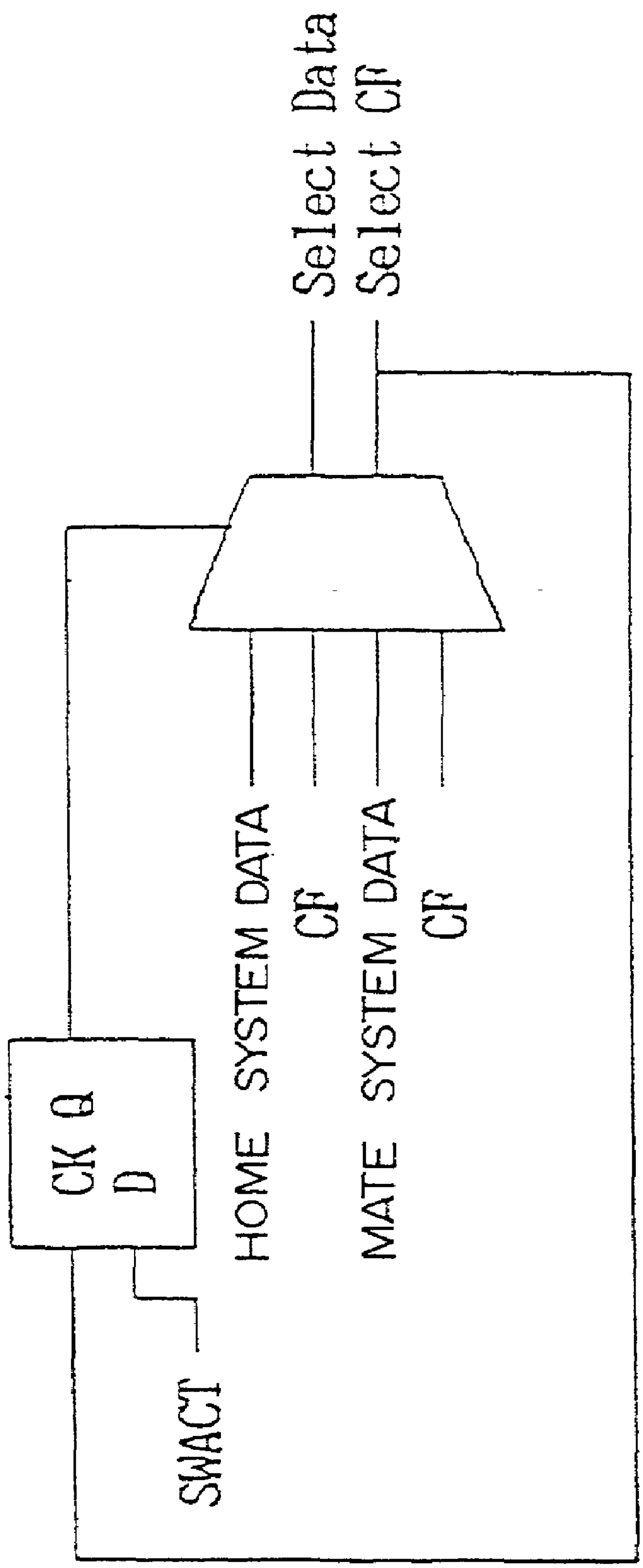

FIG. 302 shows the process of selecting cross-connection data.

FIG. 303 shows the MSCN point in the cross-connection select.

Figure 304:
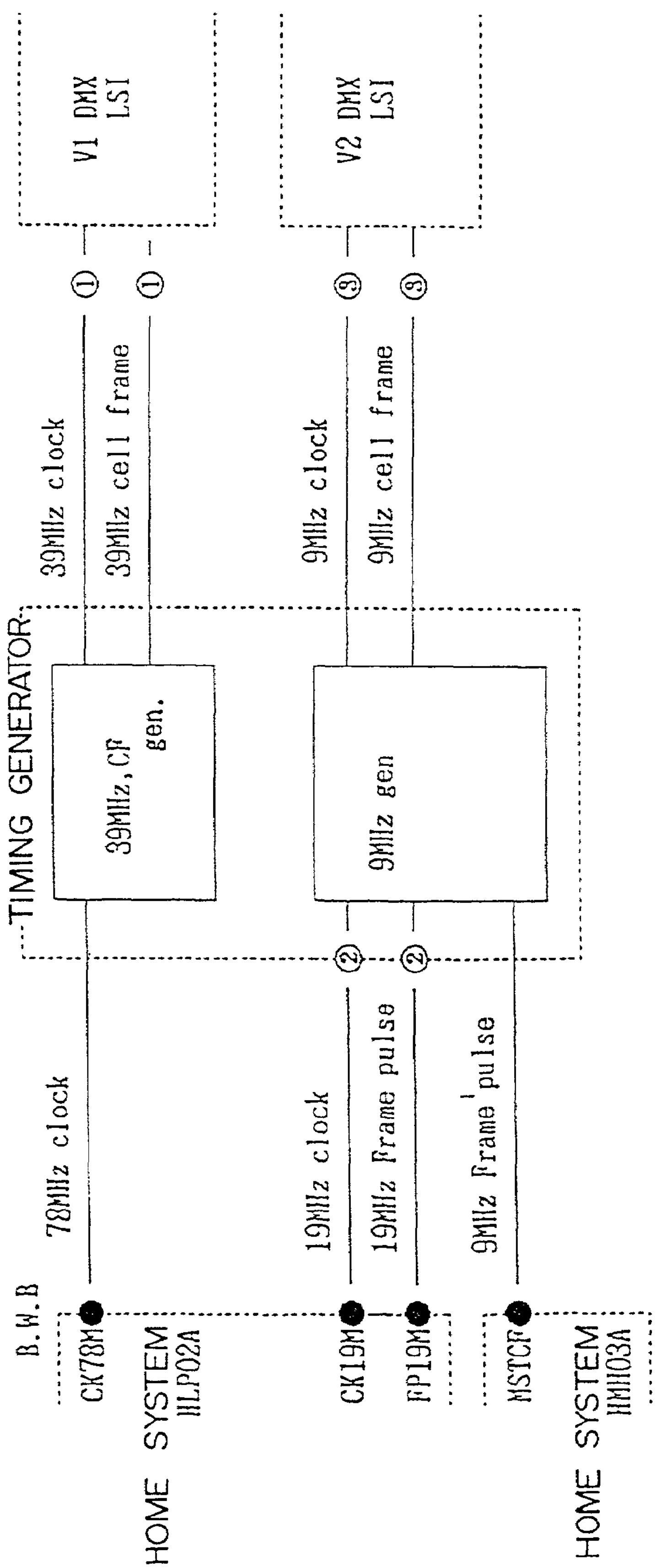

FIG. 304 is a block diagram showing the functions of the timing generator R.

FIG. 305 shows the outline of the functions of each block of the timing generator R.

Figure 306:
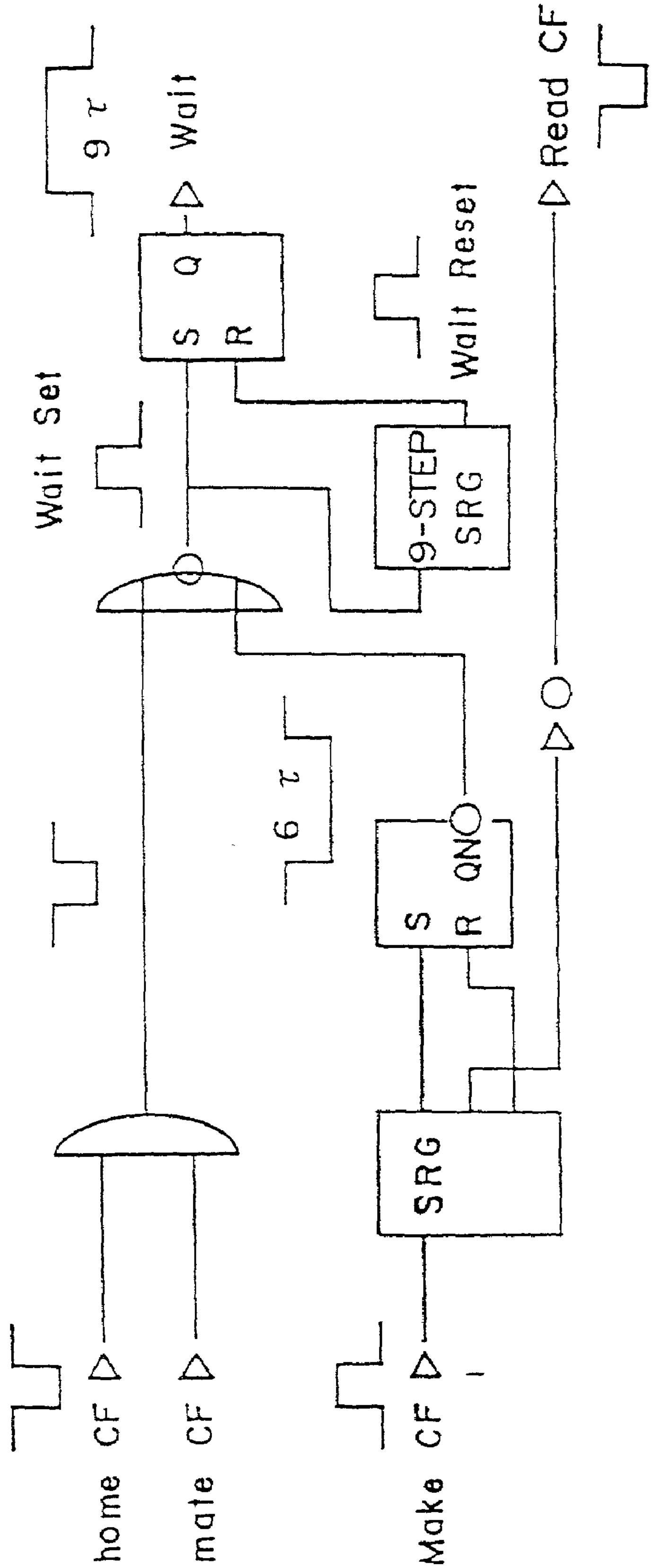

FIG. 306 shows the operation of the sell frame (CF) generator.

FIG. 307 shows the MSCN point in the timing generator.

Figure 308:
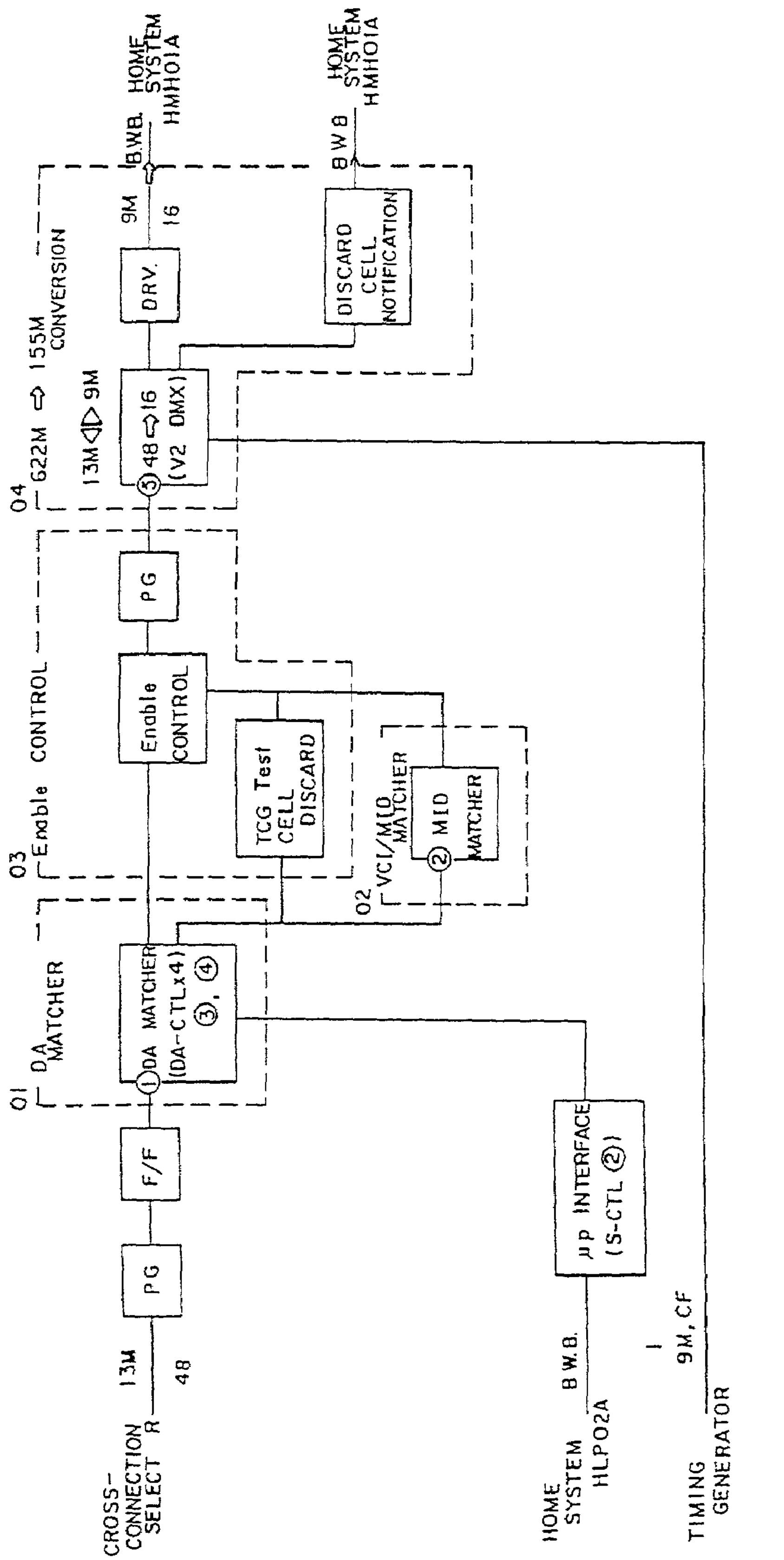

FIG. 308 is a block diagram showing the functions of the address filter R.

FIG. 309 shows the outline of the functions of each block of the address filter R.

FIG. 310 shows the outline of the VCI/MID matcher conditions.

FIG. 311 shows the MSCN point in the address filter R.

Figure 312:
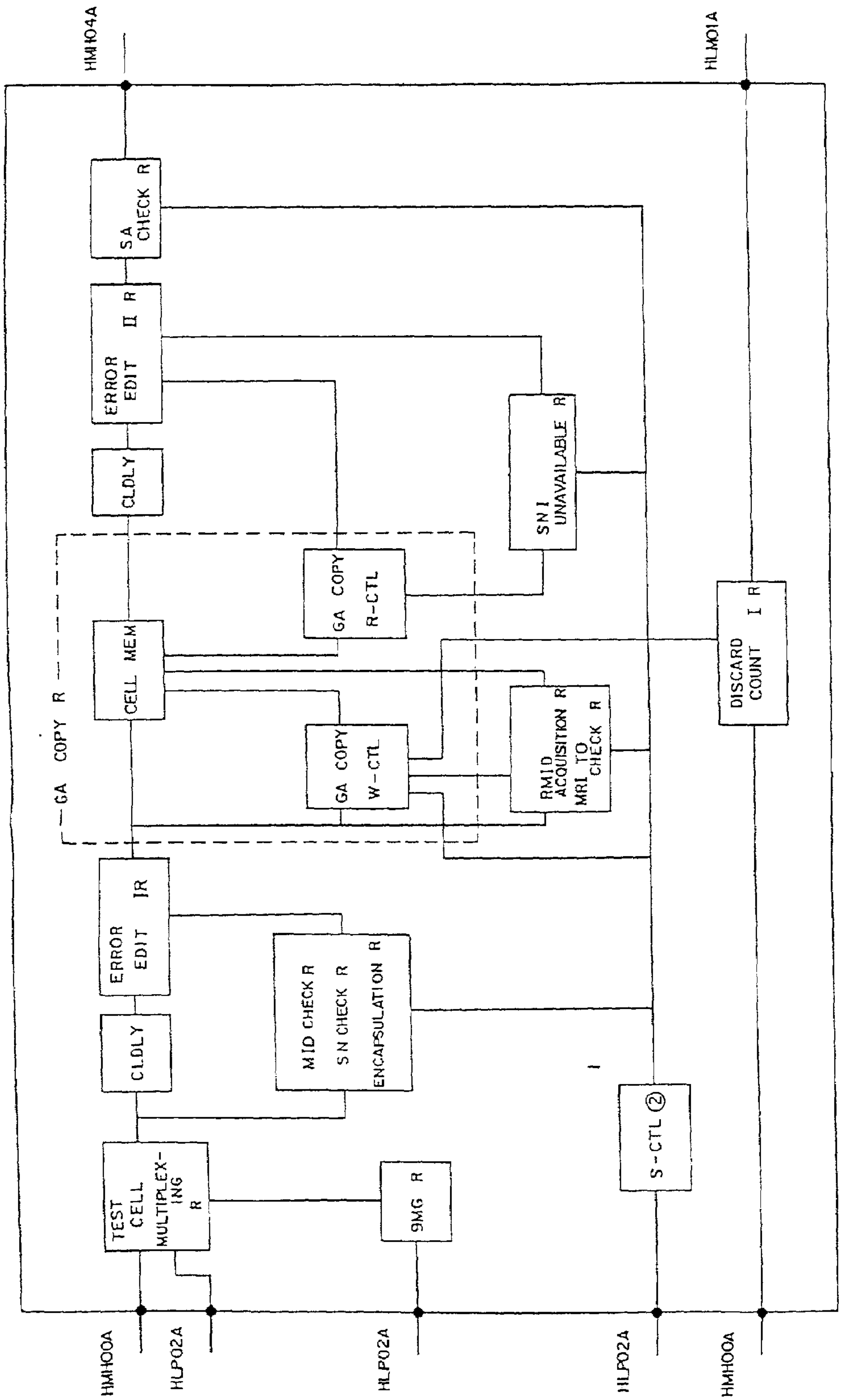

FIG. 312 is a block diagram showing the functions of the HMH01A.

FIG. 313 shows the outline of the functions of each block of the HMH01A.

FIG. 314 is a block diagram showing the functions of the test cell multiplexing R and 9MG R.

FIG. 315 shows the MSCN point in the test cell multiplexing R and 9MG R.

Figure 316:
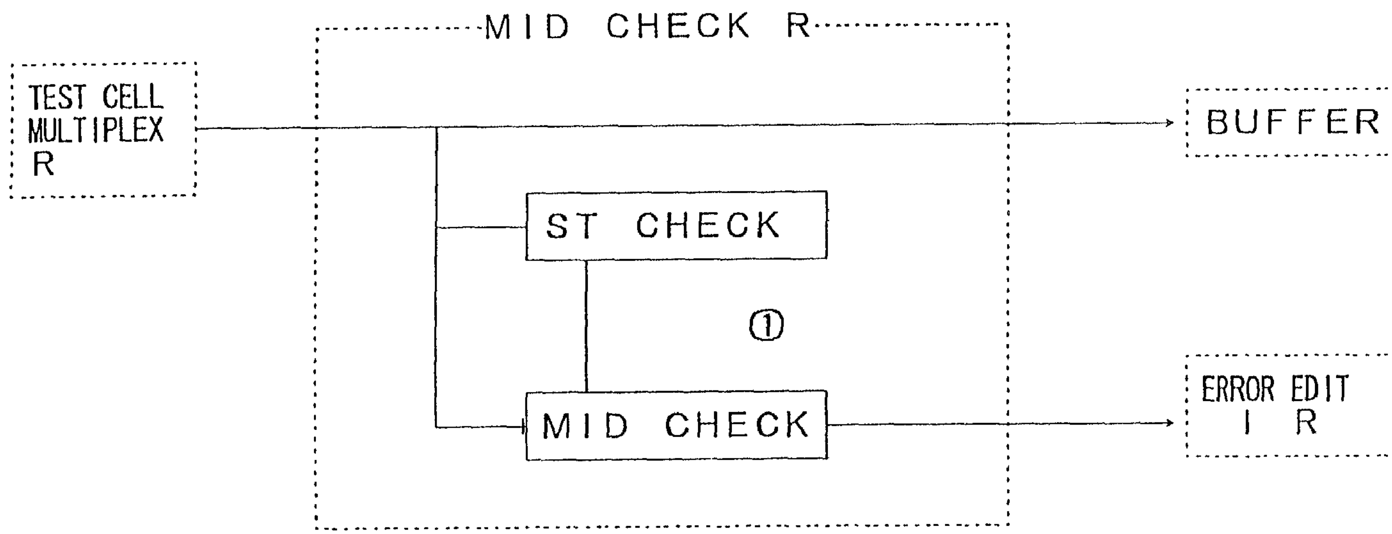

FIG. 316 is a block diagram showing the functions of the MID check R.

FIG. 317 shows the process related to the MID check.

FIG. 318 shows the error flag in the MID check.

FIG. 319 shows the MSCN point in the MID check R.

FIG. 320 is a block diagram showing the functions of the SN check R.

FIG. 321 shows an error flag in the SN check R.

FIG. 322 shows the MSCN point in the SN check R.

Figure 323:
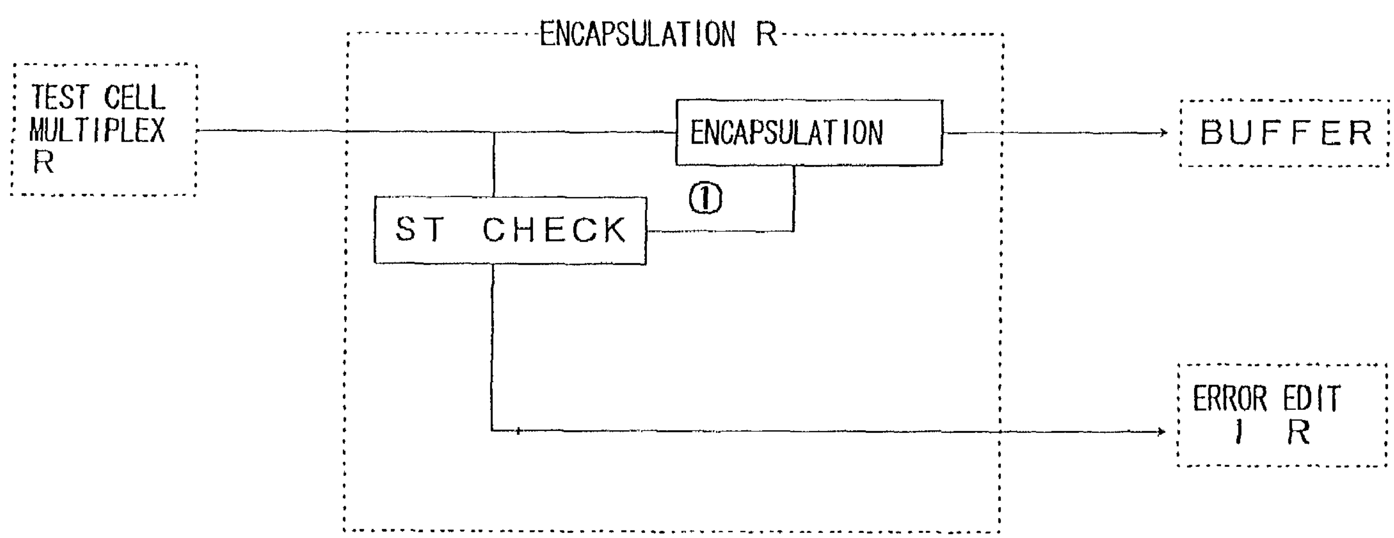

FIG. 323 is a block diagram showing the functions of the encapsulation unit.

FIG. 324 shows the error flag in the encapsulation unit.

FIG. 325 shows the MSCN point in the encapsulation unit.

Figure 326:
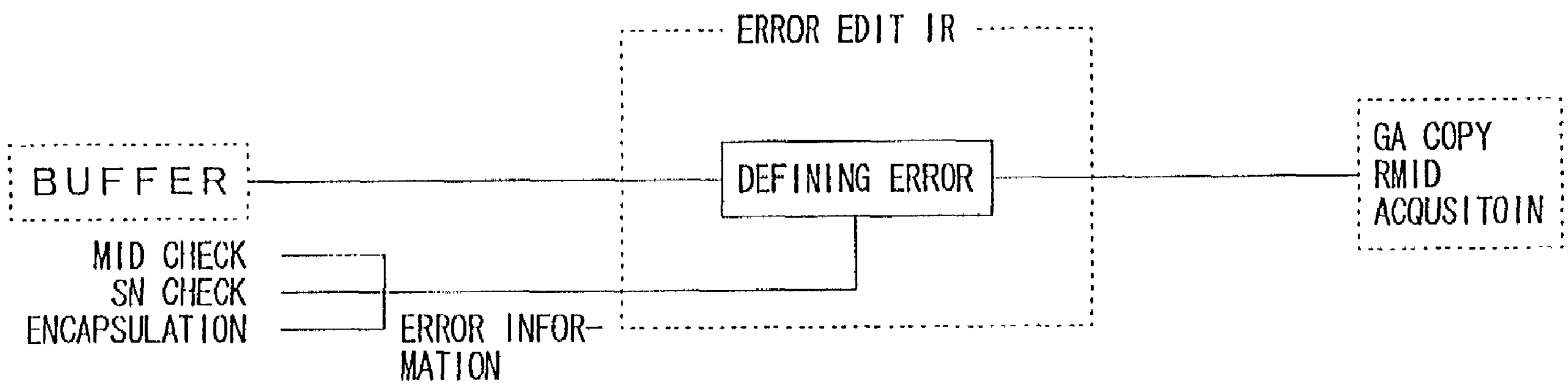

FIG. 326 is a block diagram showing the functions of the error edit IR.

Figure 327:
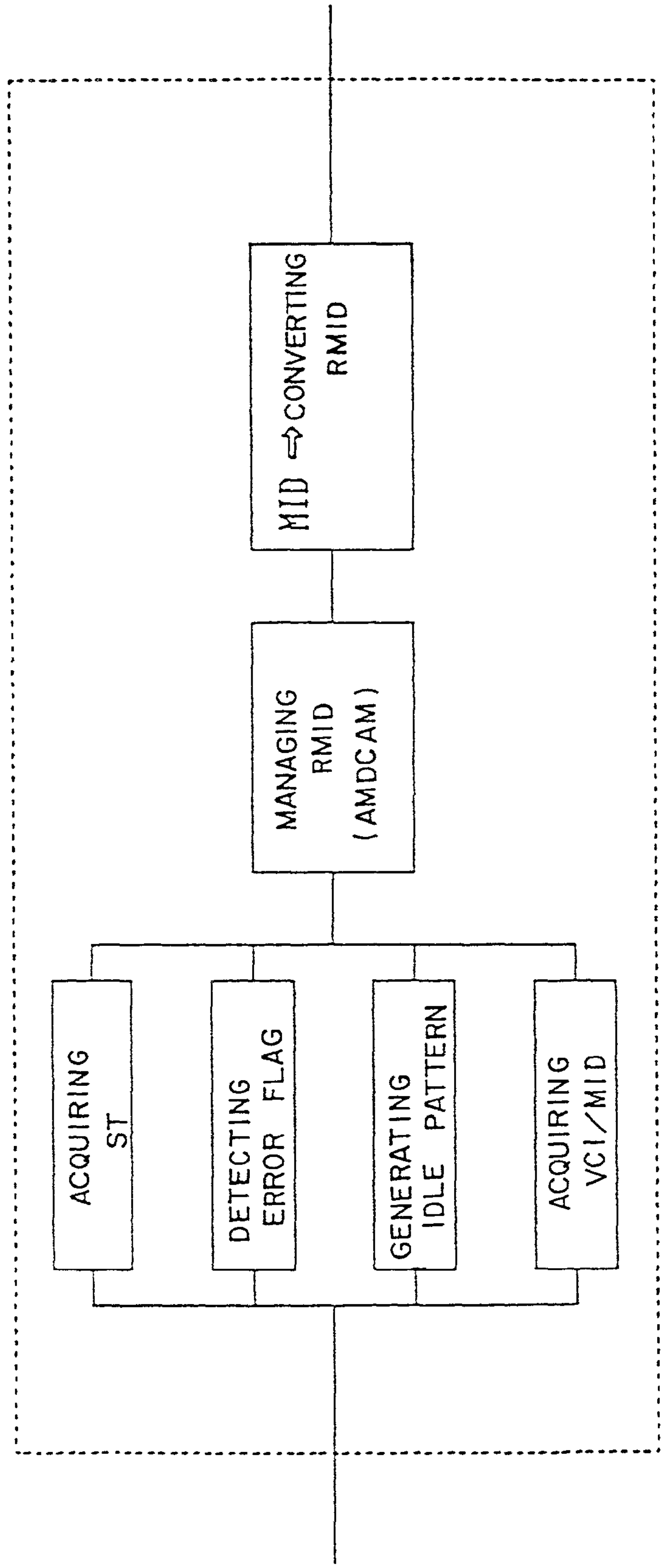

FIG. 327 is a block diagram showing the functions of the RMID acquisition R.

FIG. 328 shows the outline of the functions of each block of the RMID acquisition R.

FIG. 329 shows the error flag in the RMID acquisition R unit.

Figure 330:
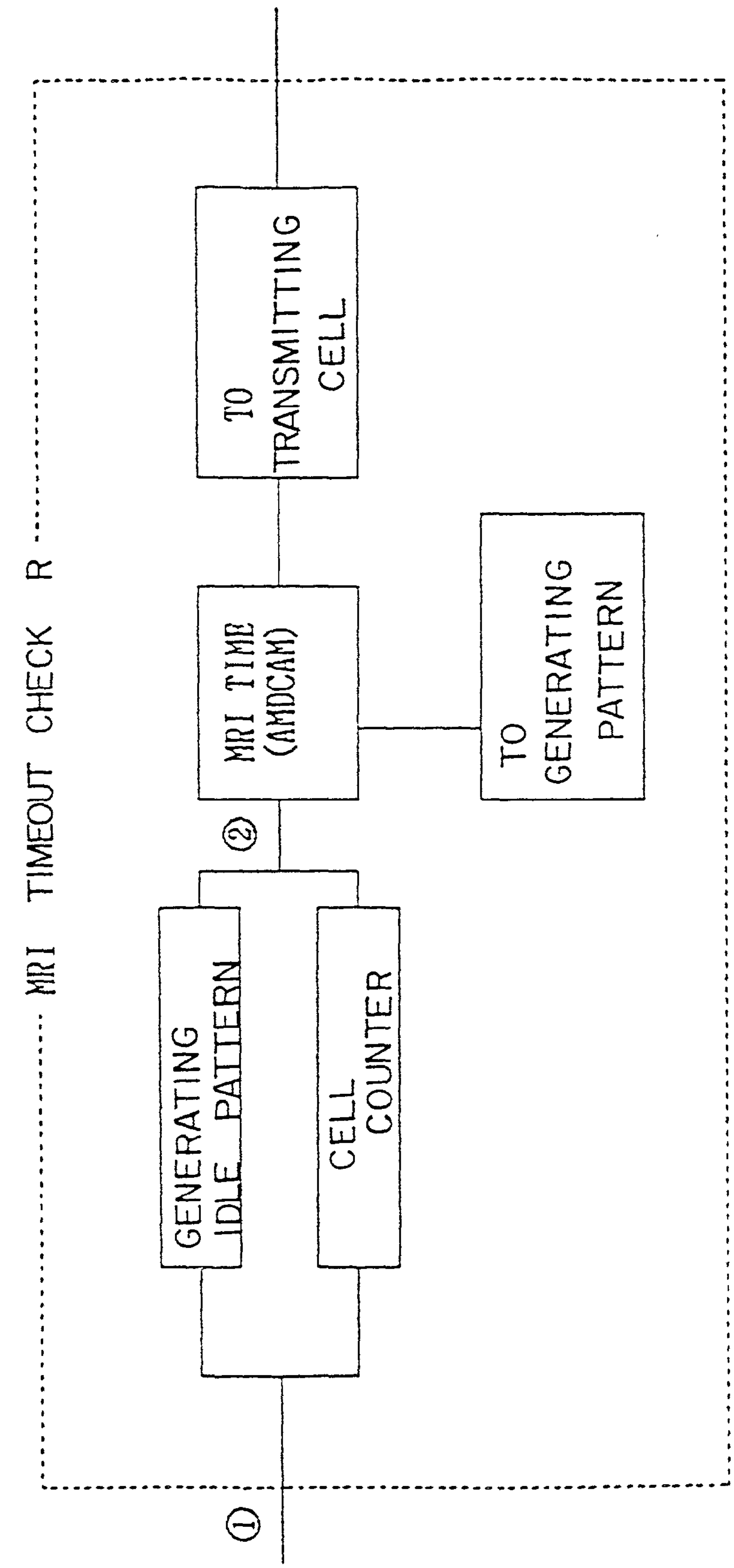

FIG. 330 is a block diagram showing the functions of the MRI timeout check R.

FIG. 331 shows the outline of the functions of each block of the MRI timeout check R.

Figure 332:
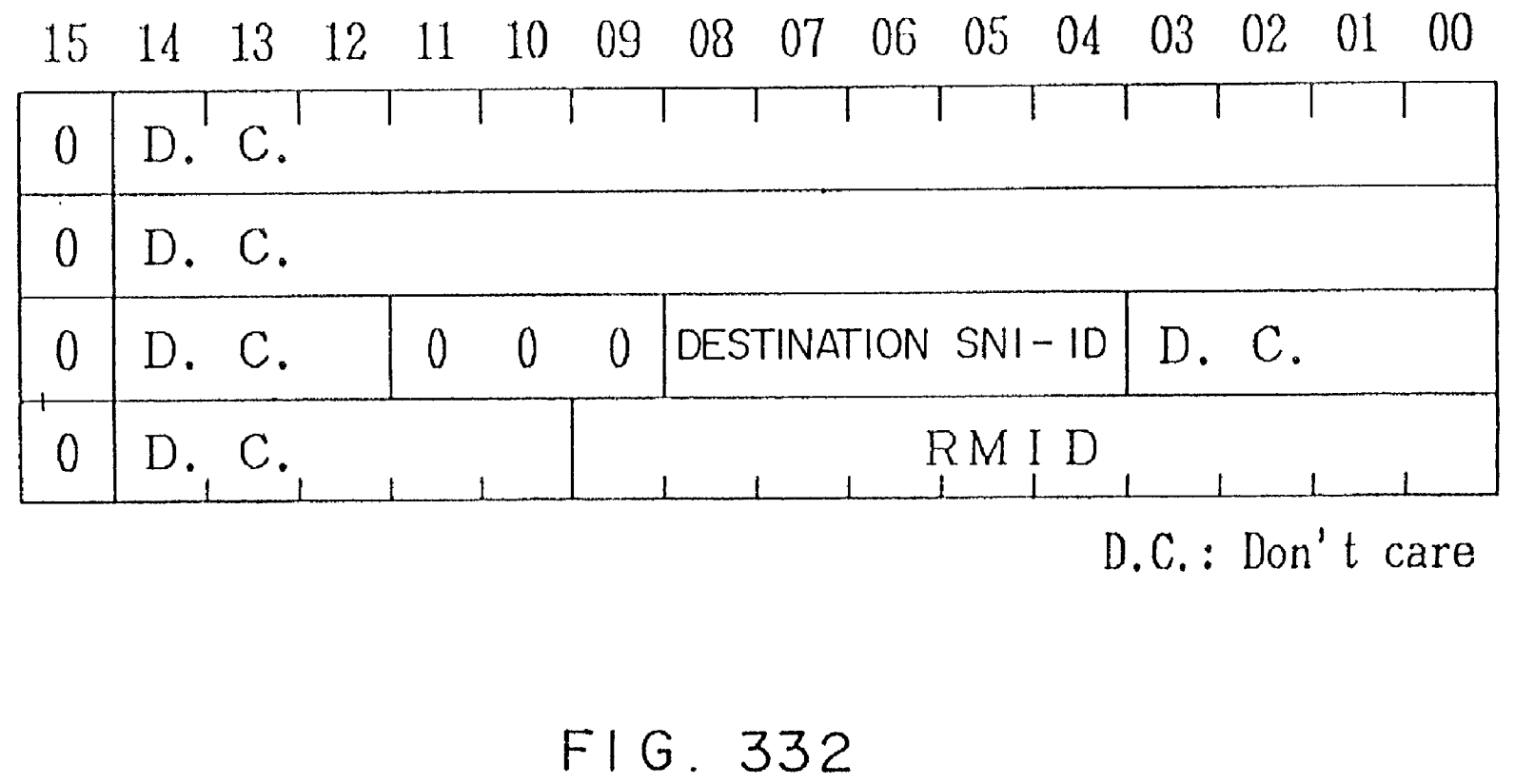

FIG. 332 shows the header format of the TO cell (timeout cell).

FIG. 333 shows the error flag in the MRI timeout check unit.

Figure 334:
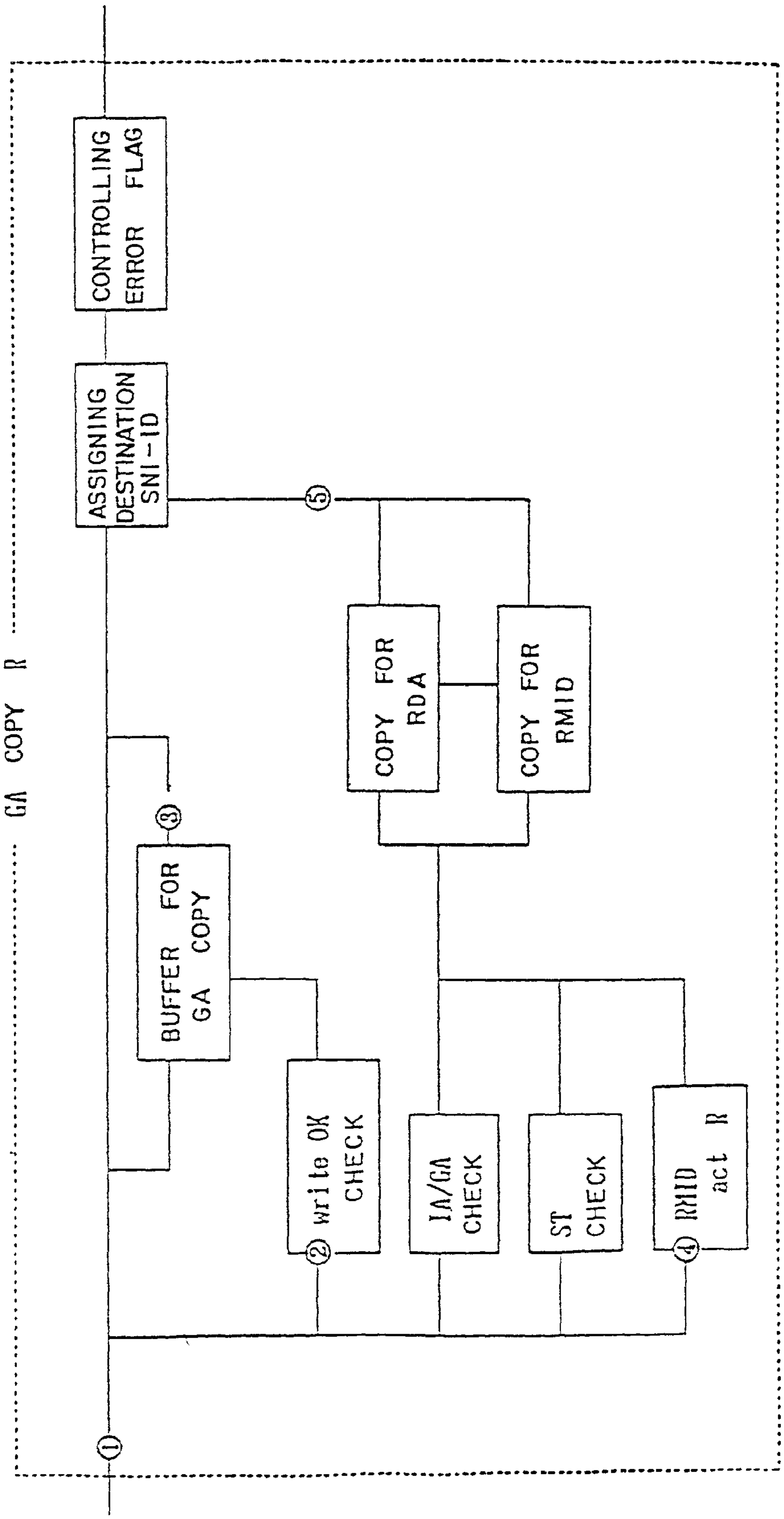

FIG. 334 is a block diagram showing the functions of the GA copy R.

FIG. 335 shows the outline of the functions of each block of the GA copy R.

FIG. 336 shows the error flag in the GA copy unit.

FIG. 337 shows the MSCN point in the GA copy unit.

Figure 338:
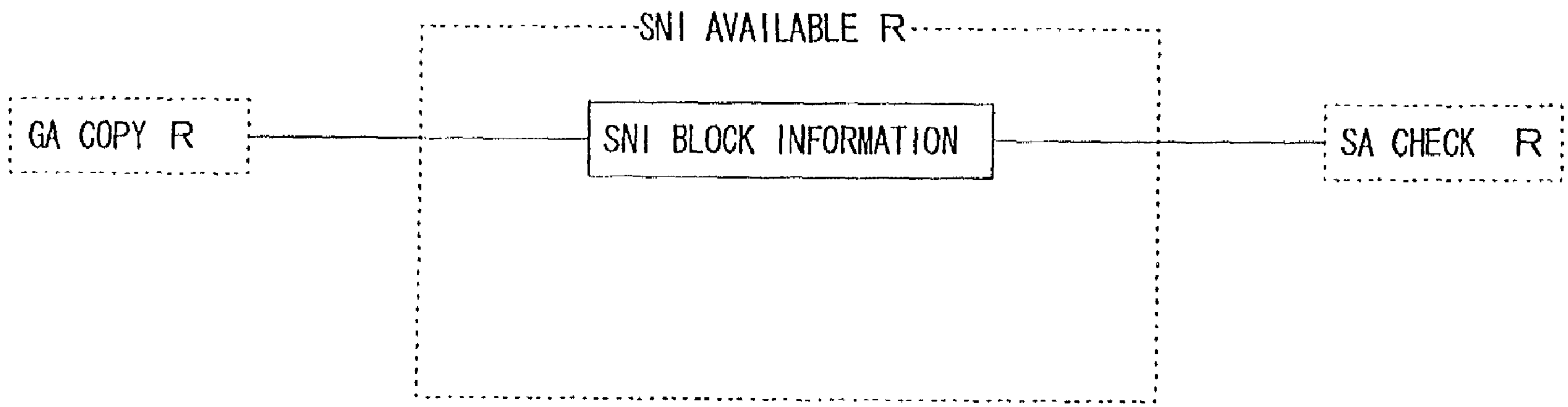

FIG. 338 is a block diagram showing the functions of the SNI available R.

FIG. 339 shows the error flag in the SNI available unit.

FIG. 340 shows the MSCN point in the SNI available unit.

FIG. 341 is a block diagram showing the functions of the error edit II R and shows the outline of the functions of their blocks.

FIG. 342 is a block diagram showing the functions of the SA check R and shows the outline of the functions of their blocks.

FIG. 343 shows the error flag in the MID check.

FIG. 344 shows the MSCN point in the SA check unit.

FIG. 345 shows the matching with the SC attribute in the SA screening R.

Figure 346:
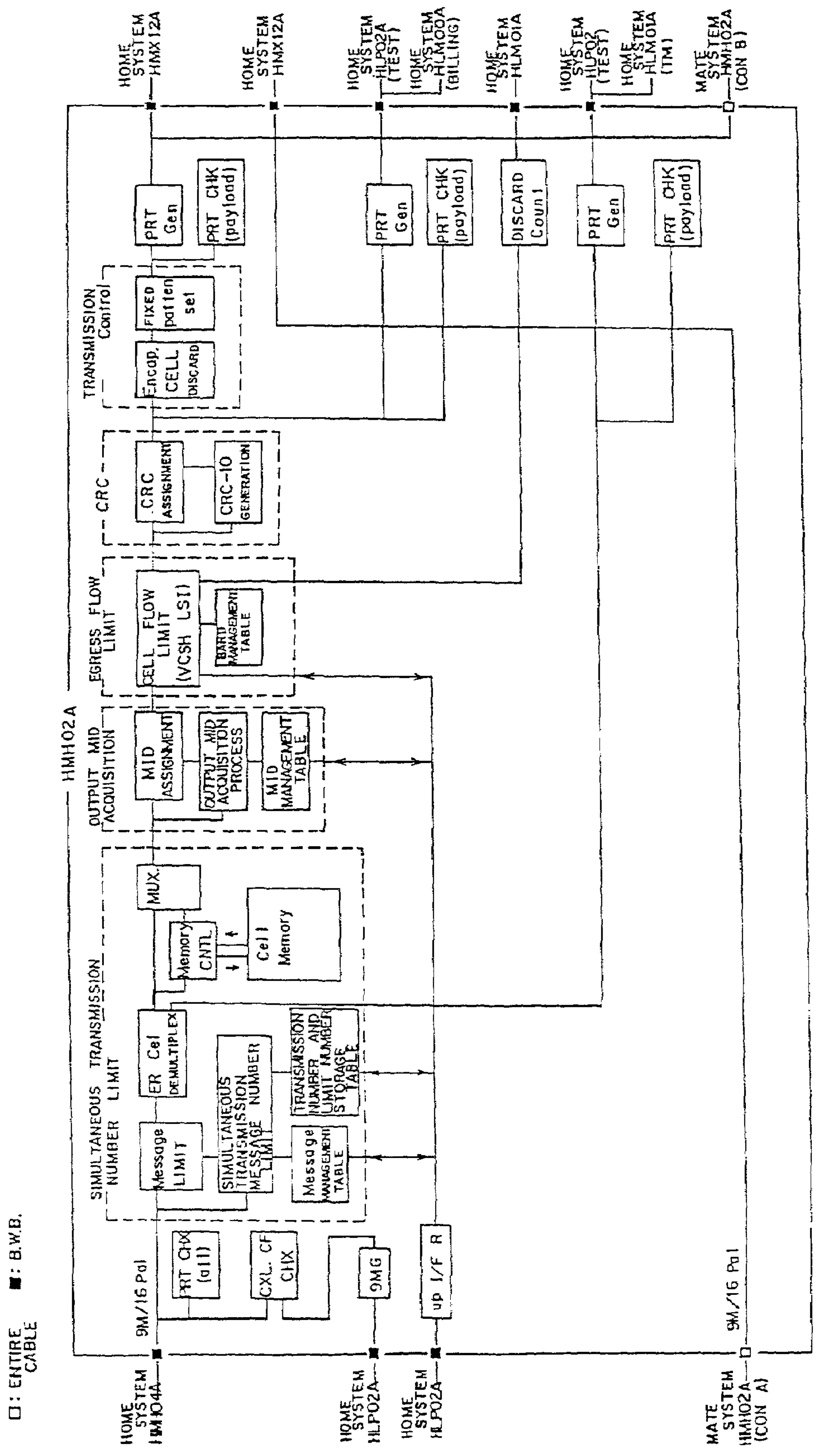

FIG. 346 is a block diagram showing the entire configuration of the HMH02A.

Figure 347:
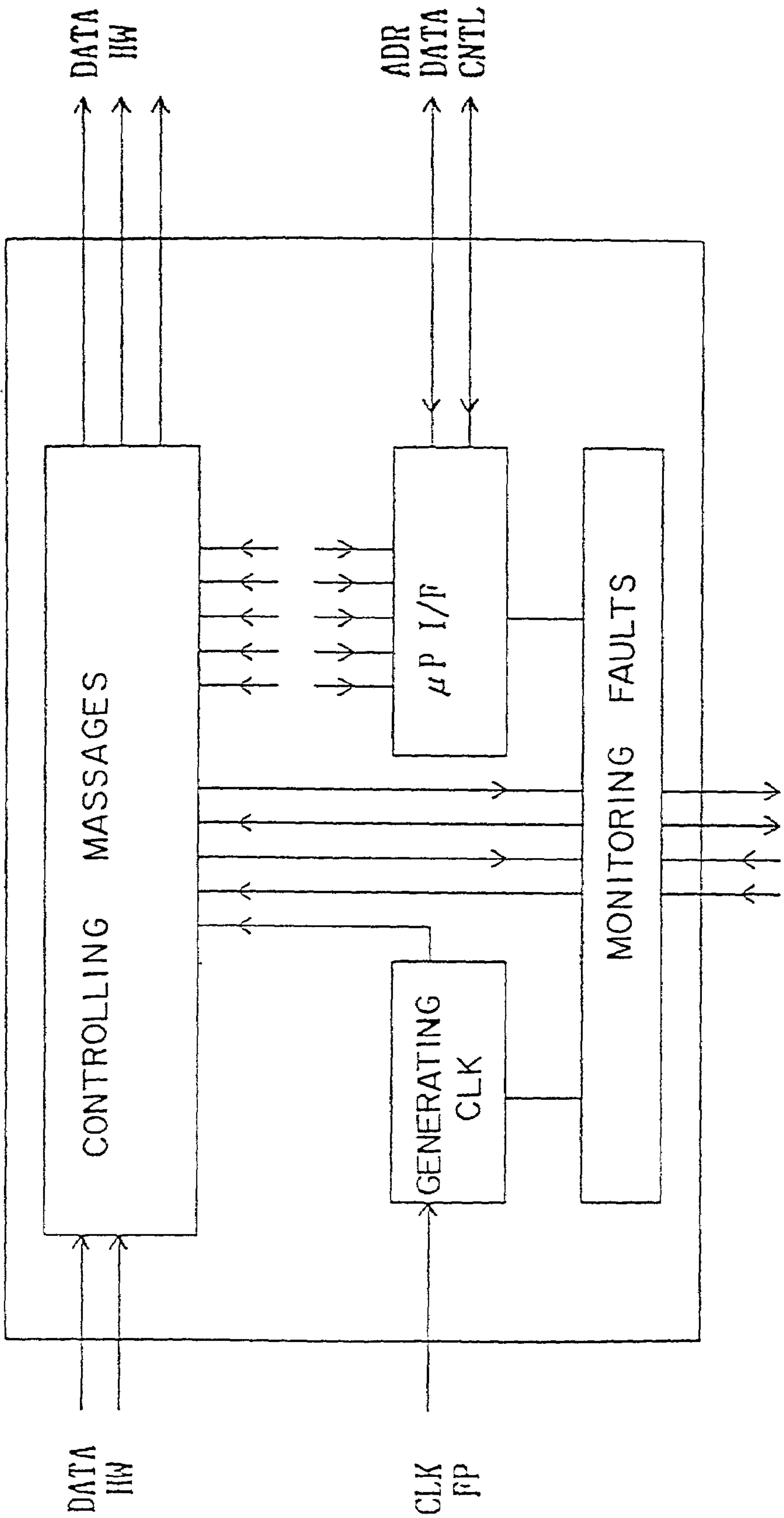

FIG. 347 is a block diagram showing the functions of the HMH02A.

FIG. 348 shows the outline of the functions of each block shown in FIG. 347.

Figure 349:
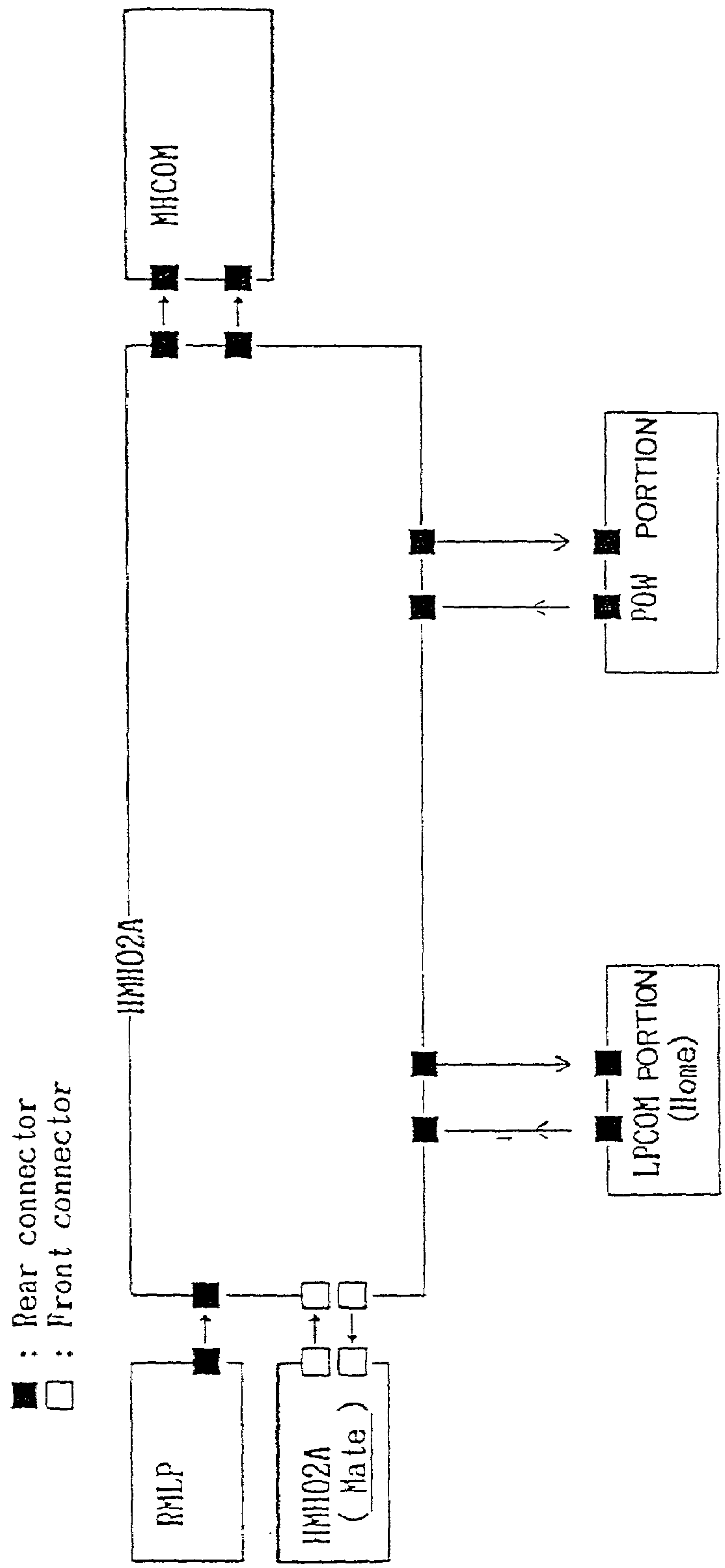

FIG. 349 shows the interface I/F state of the HMH02A.

FIG. 350 is a table showing the contents of the message control in the HMH02A.

Figure 351:
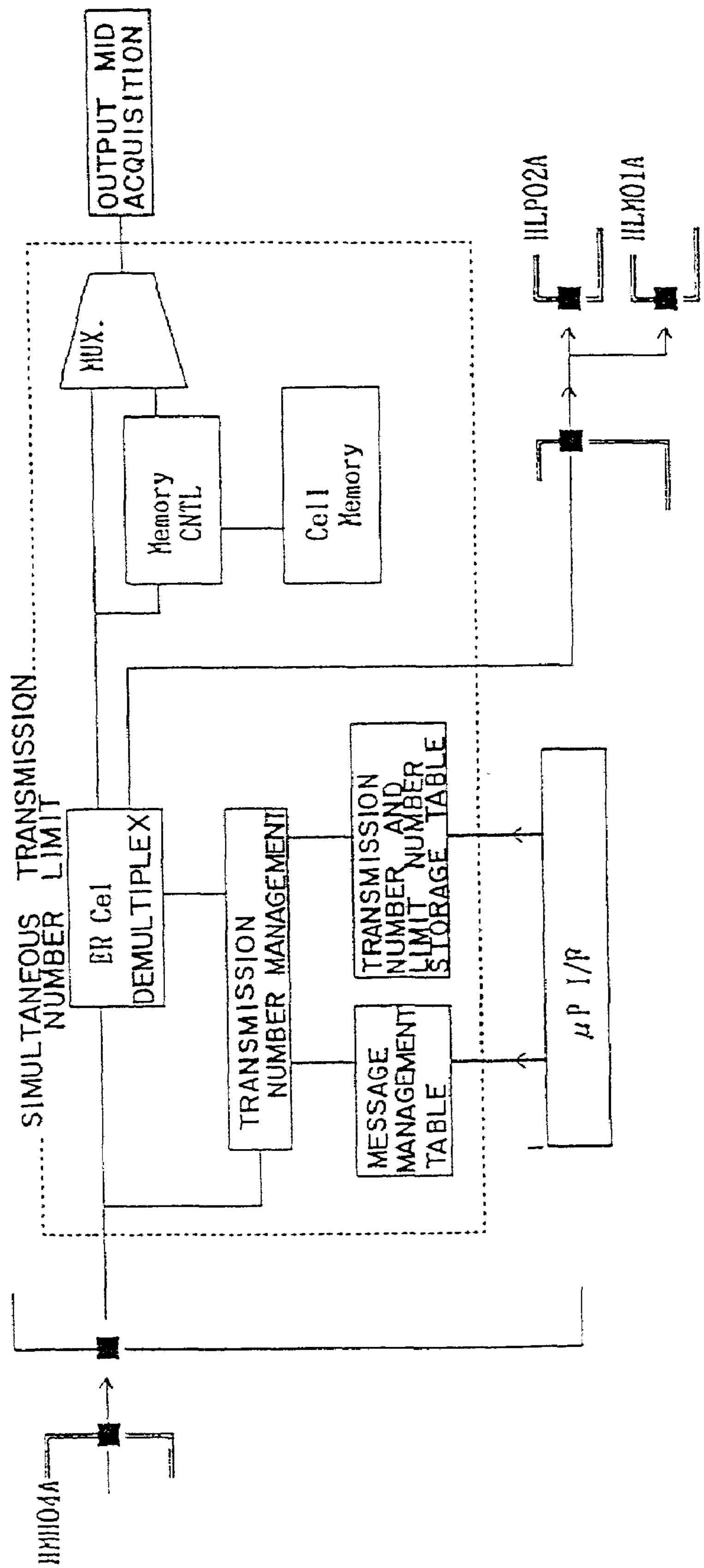

FIG. 351 is a detailed block diagram showing the simultaneous transmission number limiting unit.

FIG. 352 shows the management of the message transmission number for a specific SNI.

Figure 353:
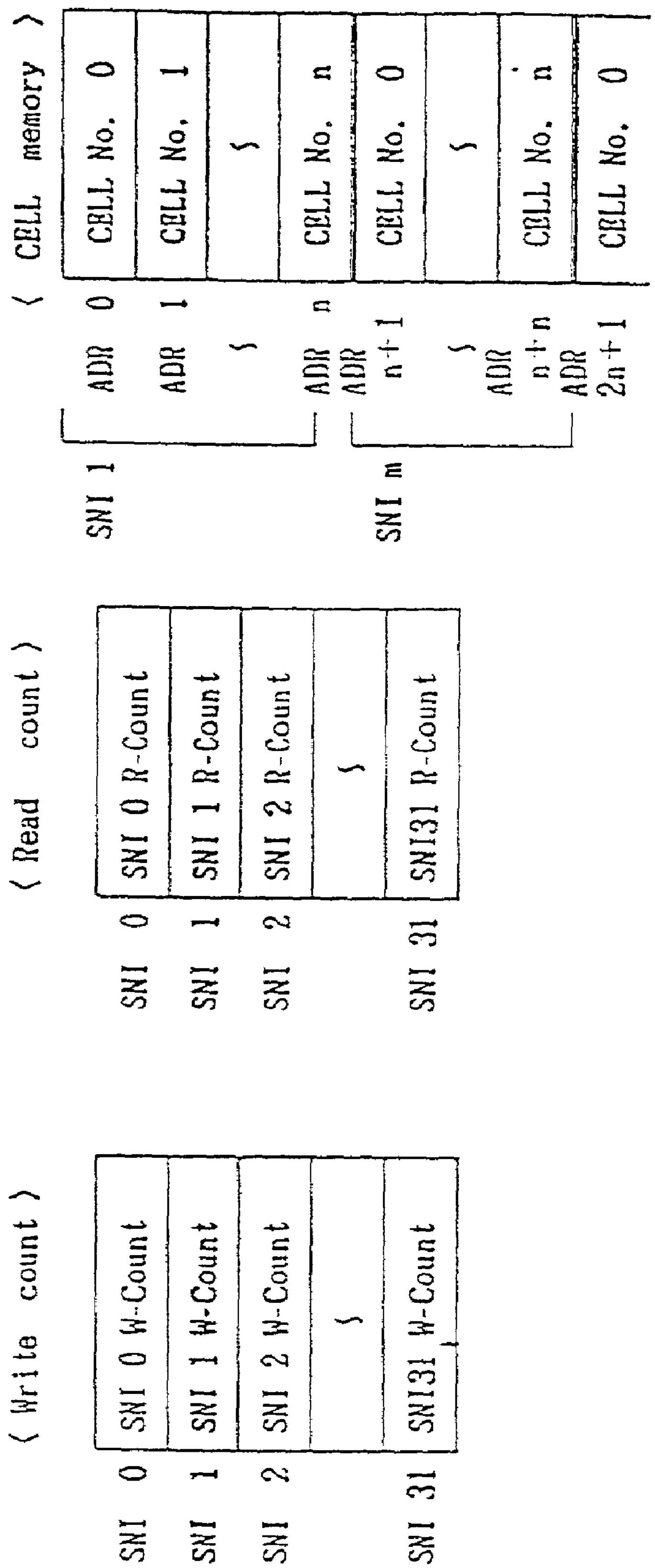

FIG. 353 shows the concept of the buffering management.

Figure 354:
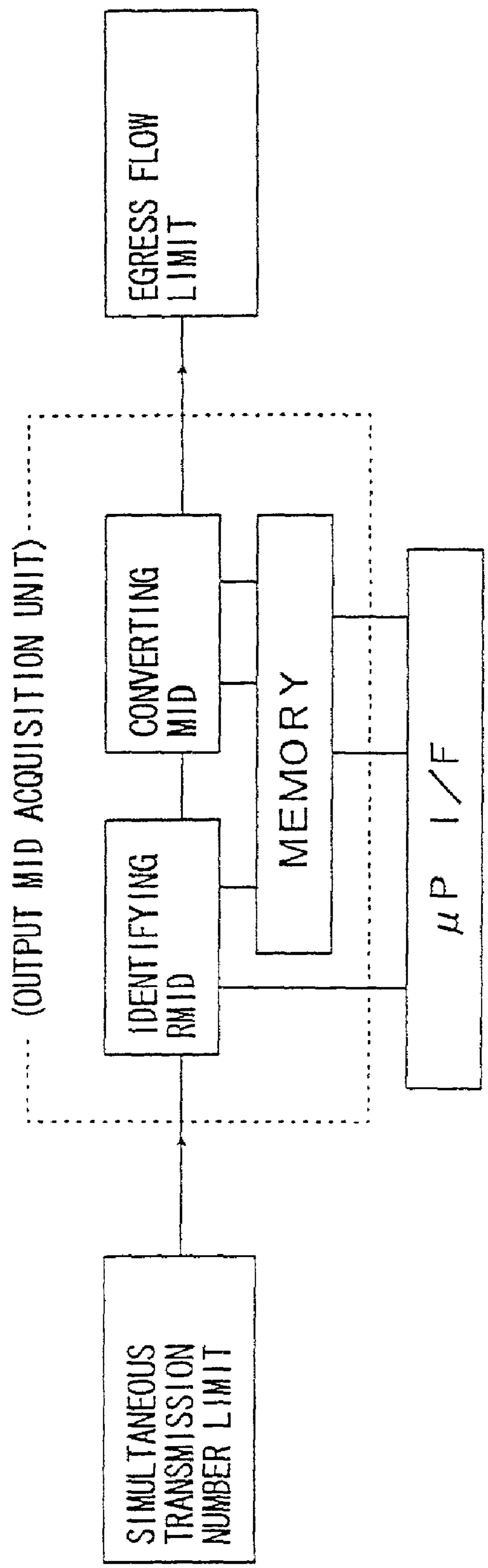

FIG. 354 is a block diagram showing the output MID acquiring unit.

Figure 355:
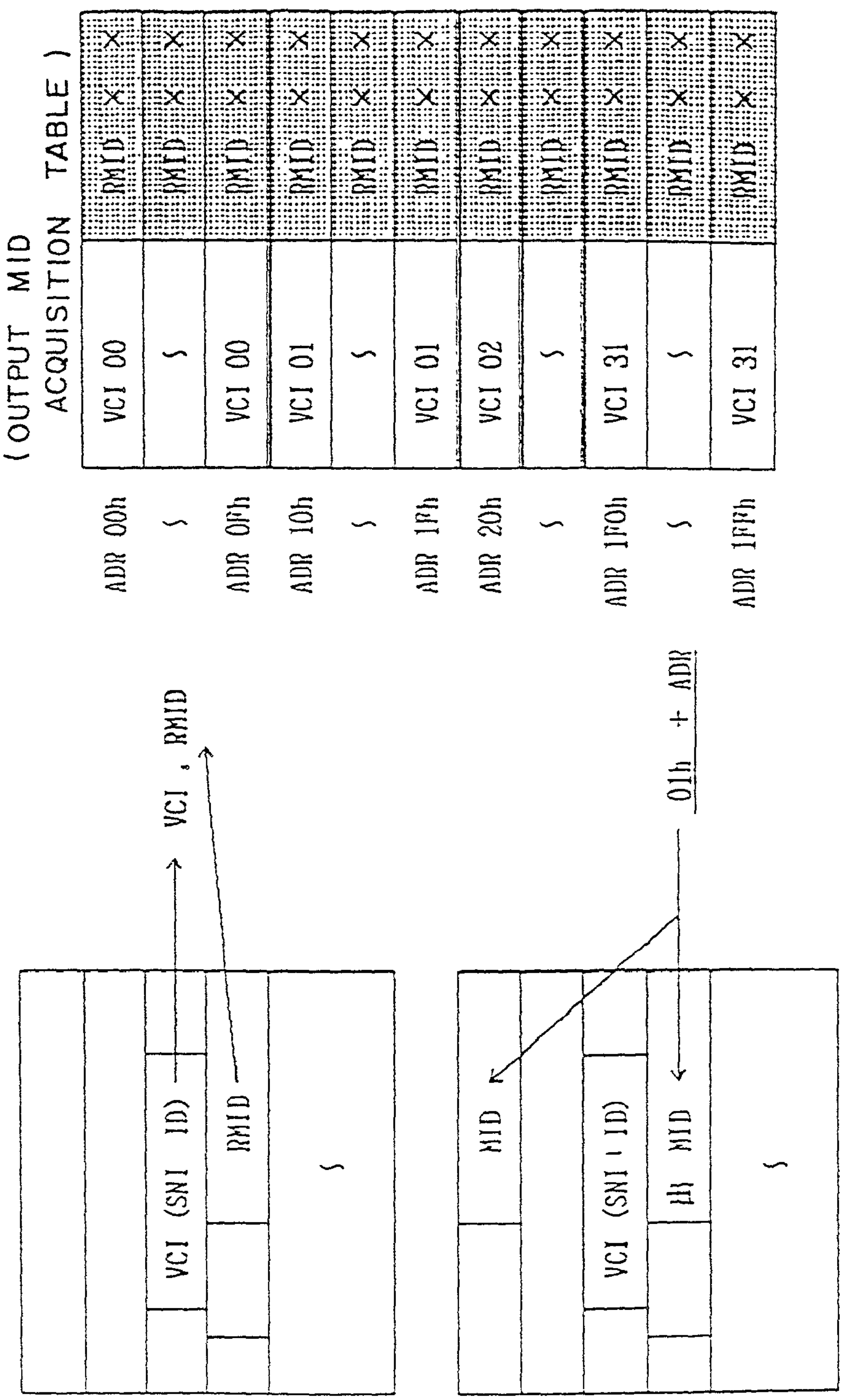

FIG. 355 shows the process of acquiring an output MID.

Figure 356:
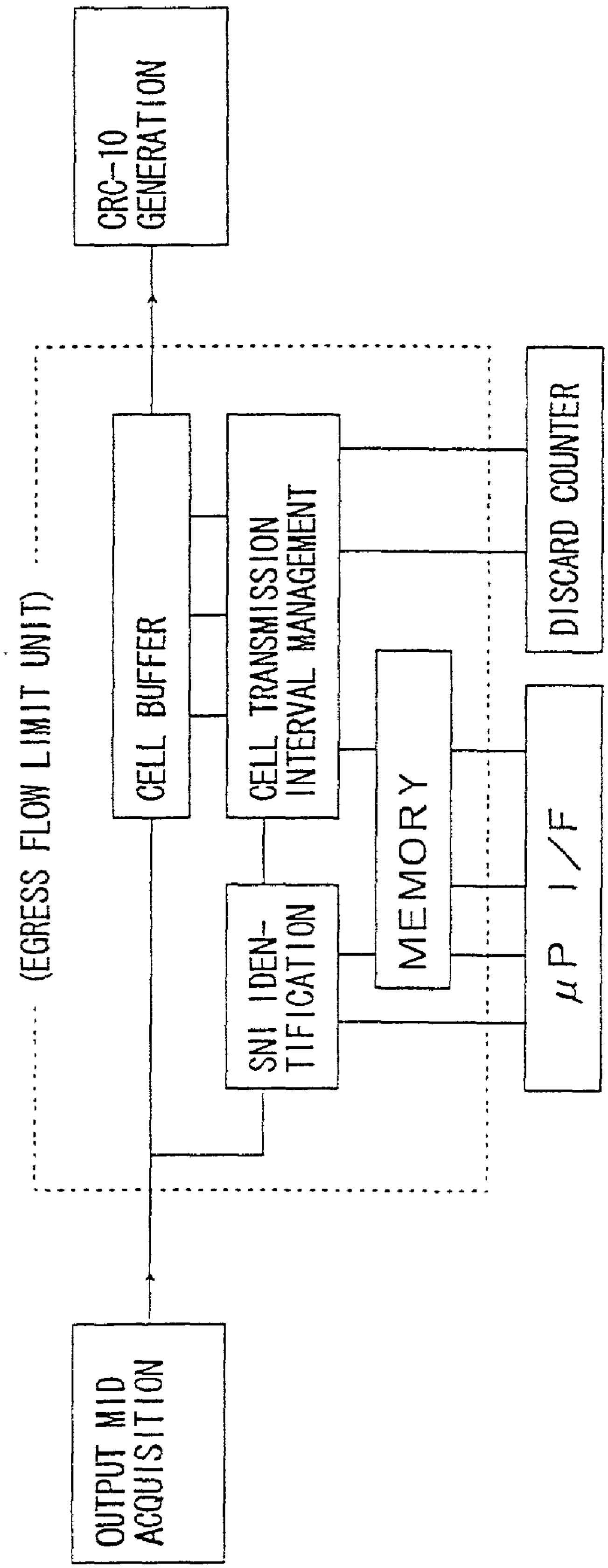

FIG. 356 is a block diagram showing the egress flow limiting unit.

Figure 357:
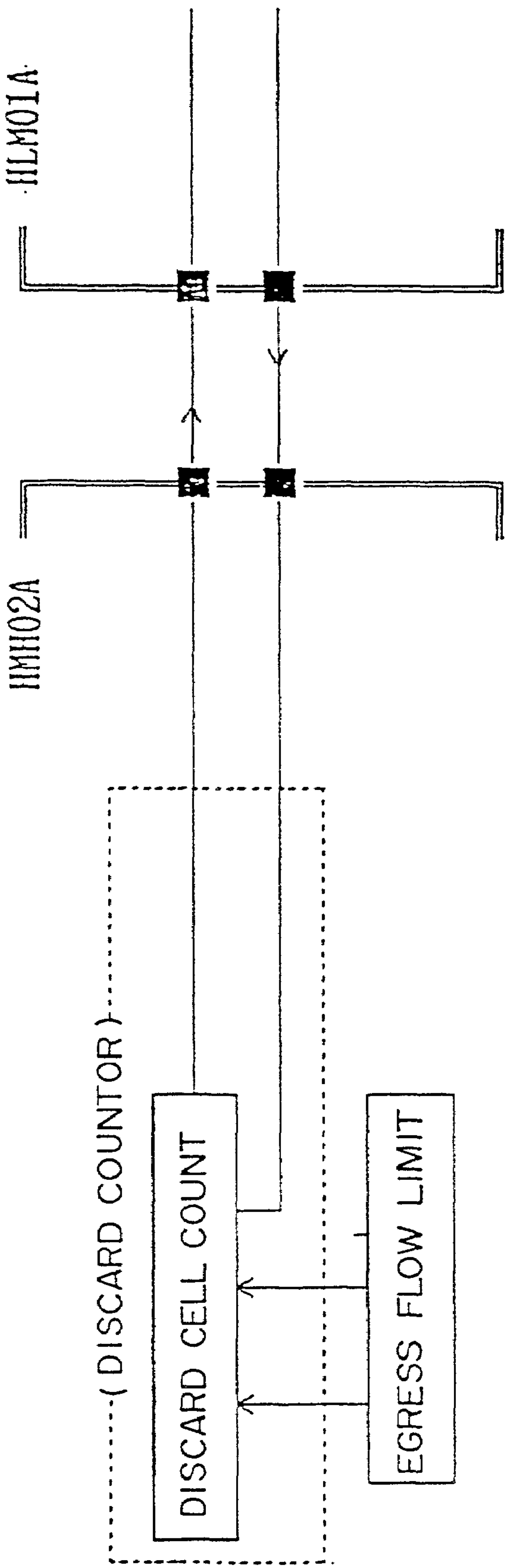

FIG. 357 is a block diagram showing the discard counter unit

Figure 358:
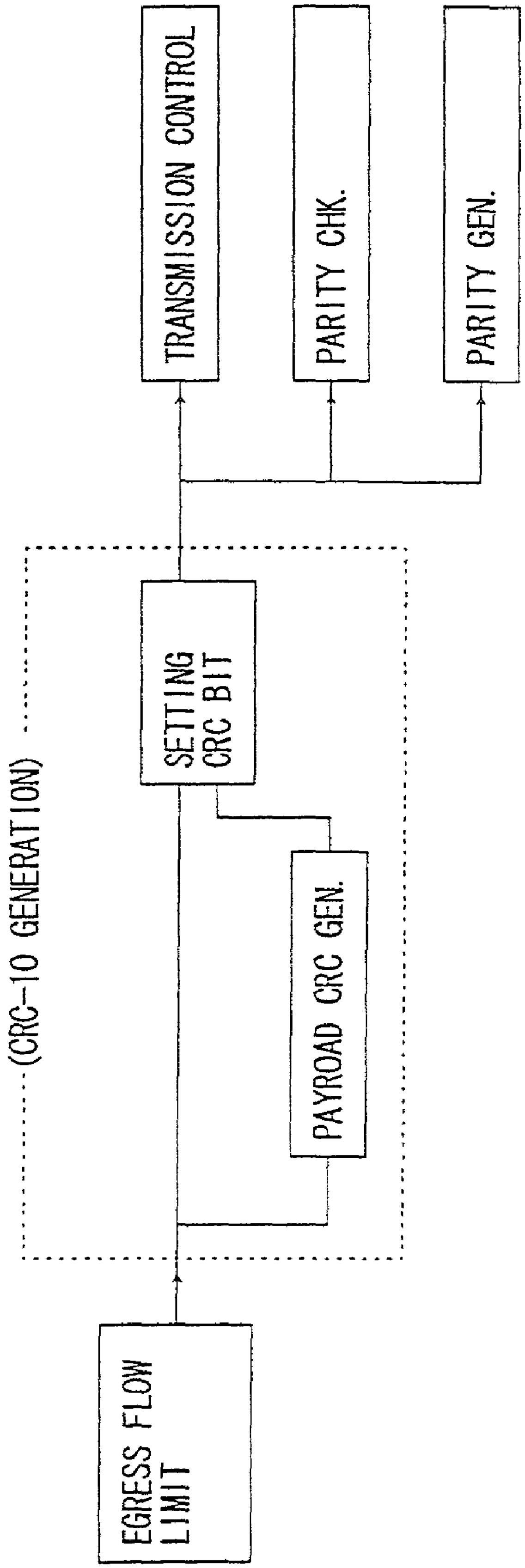

FIG. 358 is a block diagram showing the CRC-10 generating unit.

Figure 359:
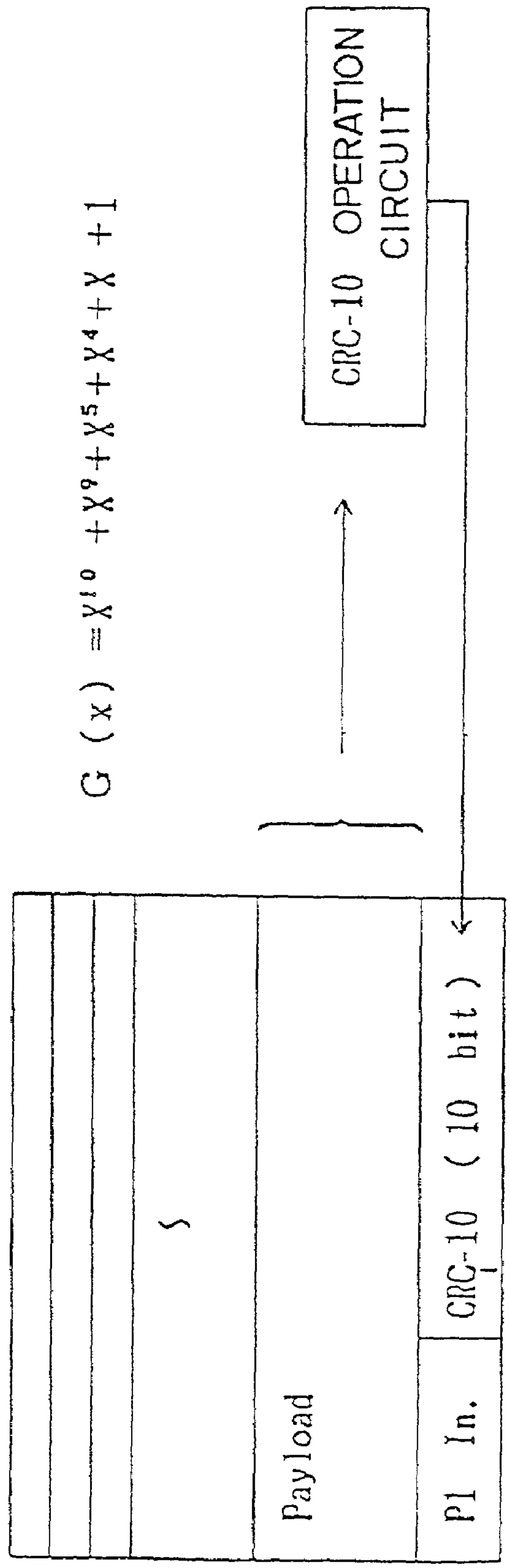

FIG. 359 shows the position in the cell of the CRC-10 polynomial cell generated by the CRC-10 generating unit.

Figure 360:
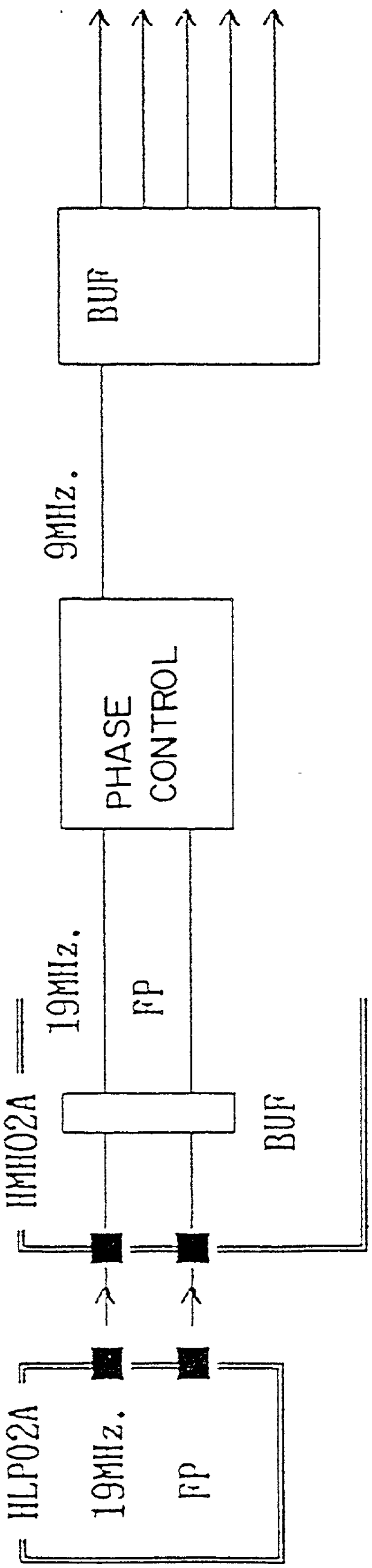

FIG. 360 is a block diagram showing the clock generating unit

Figure 361:
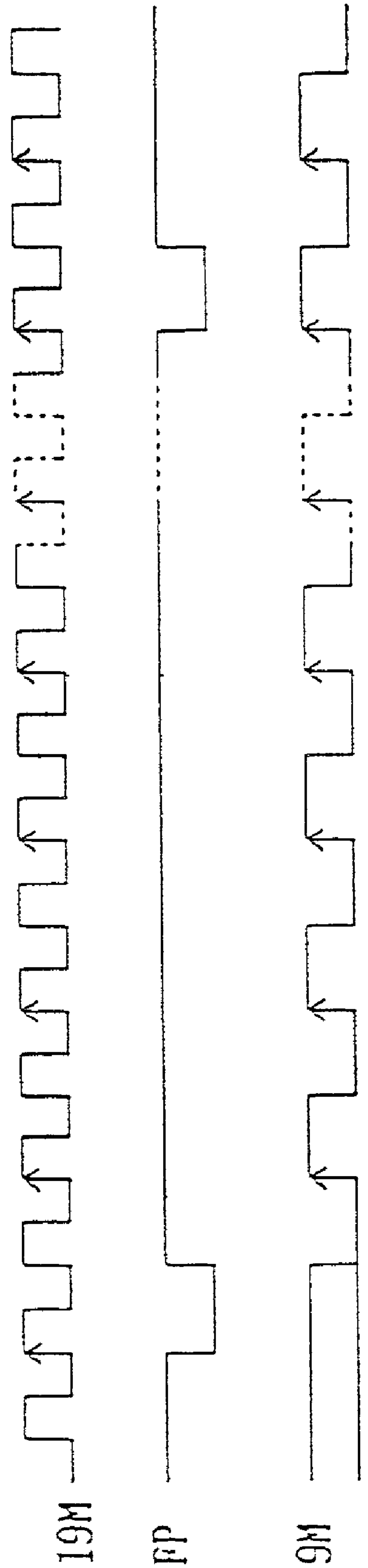

FIG. 361 shows the method of generating a clock in the clock generating unit.

FIG. 362 is a table showing the contents of μP I/F.

FIG. 363 shows the function of the four PWCBs forming parts of the MH-COM.

Figure 364:
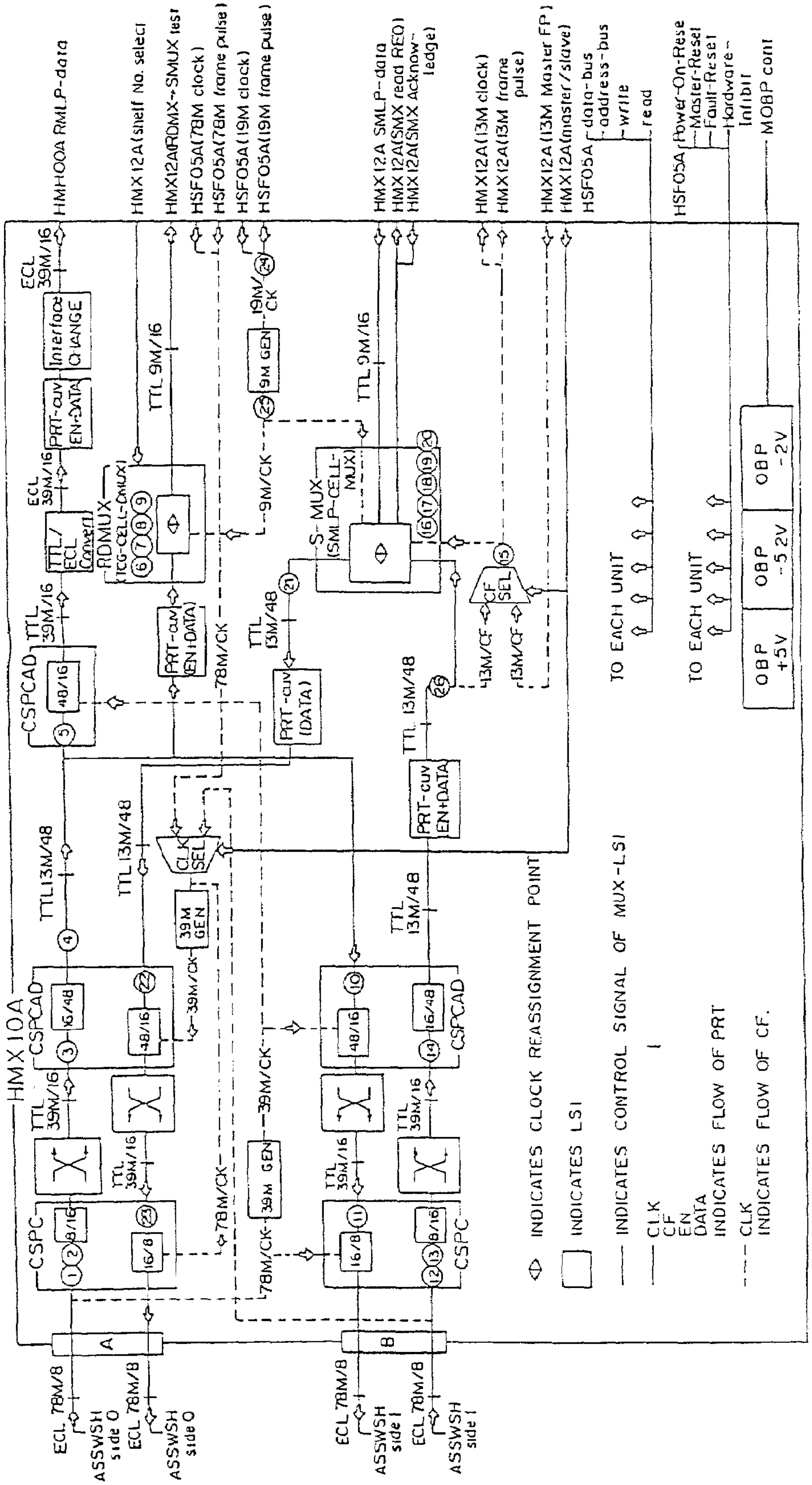

FIG. 364 is a block diagram showing the HMX10A PWCB.

FIG. 365 shows the monitor items (1) of the HMX10A PWCB.

FIG. 366 shows the monitor items (2) of the HMX10A PWCB.

Figure 367:
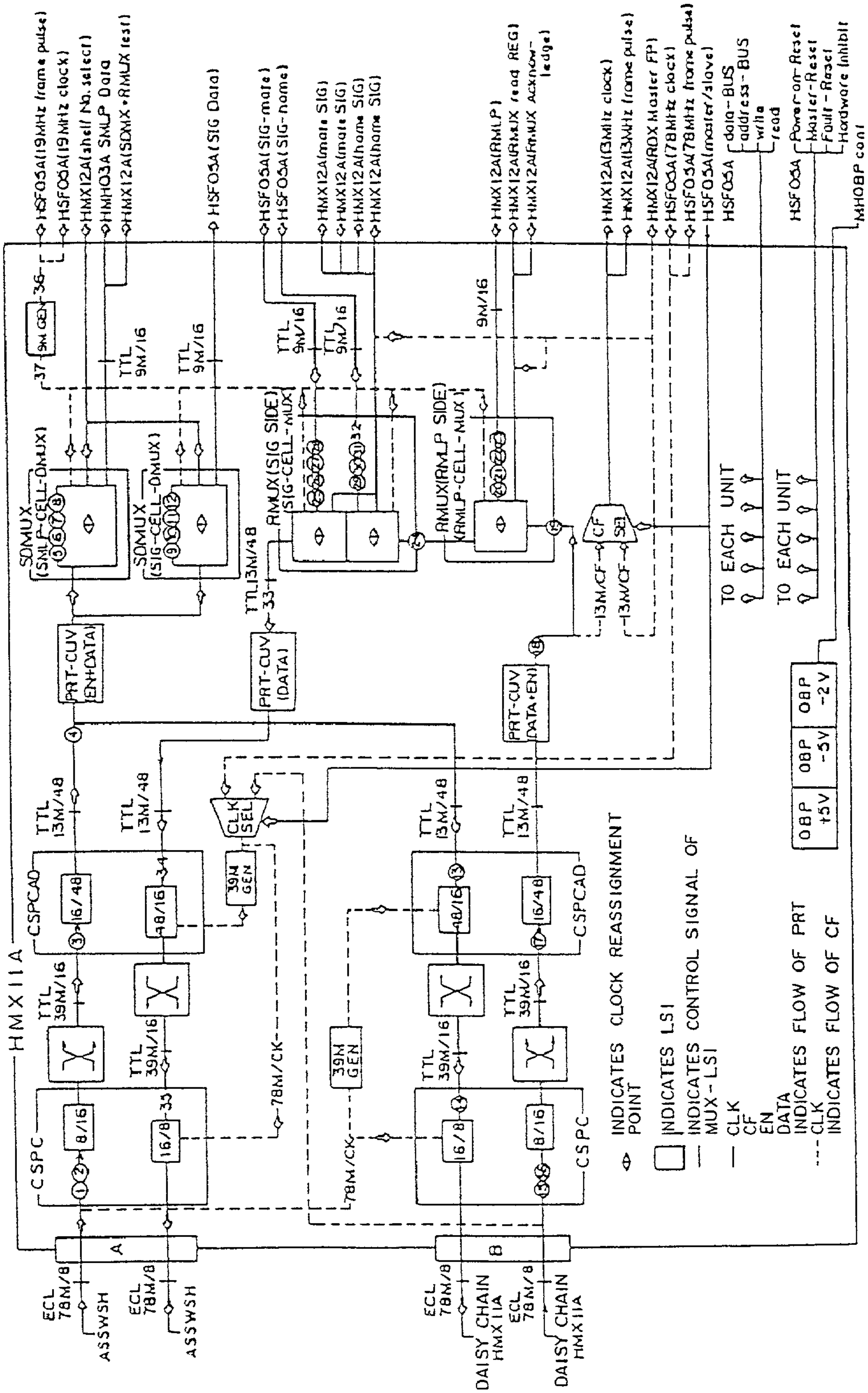

FIG. 367 is a block diagram showing the HMX11A PWCB.

FIG. 368 shows the monitor items (1) of the HMX11A PWCB.

FIG. 369 shows the monitor items (2) of the HMX11A PWCB.

FIG. 370 shows the monitor items (3) of the HMX11A PWCB.

Figure 371:
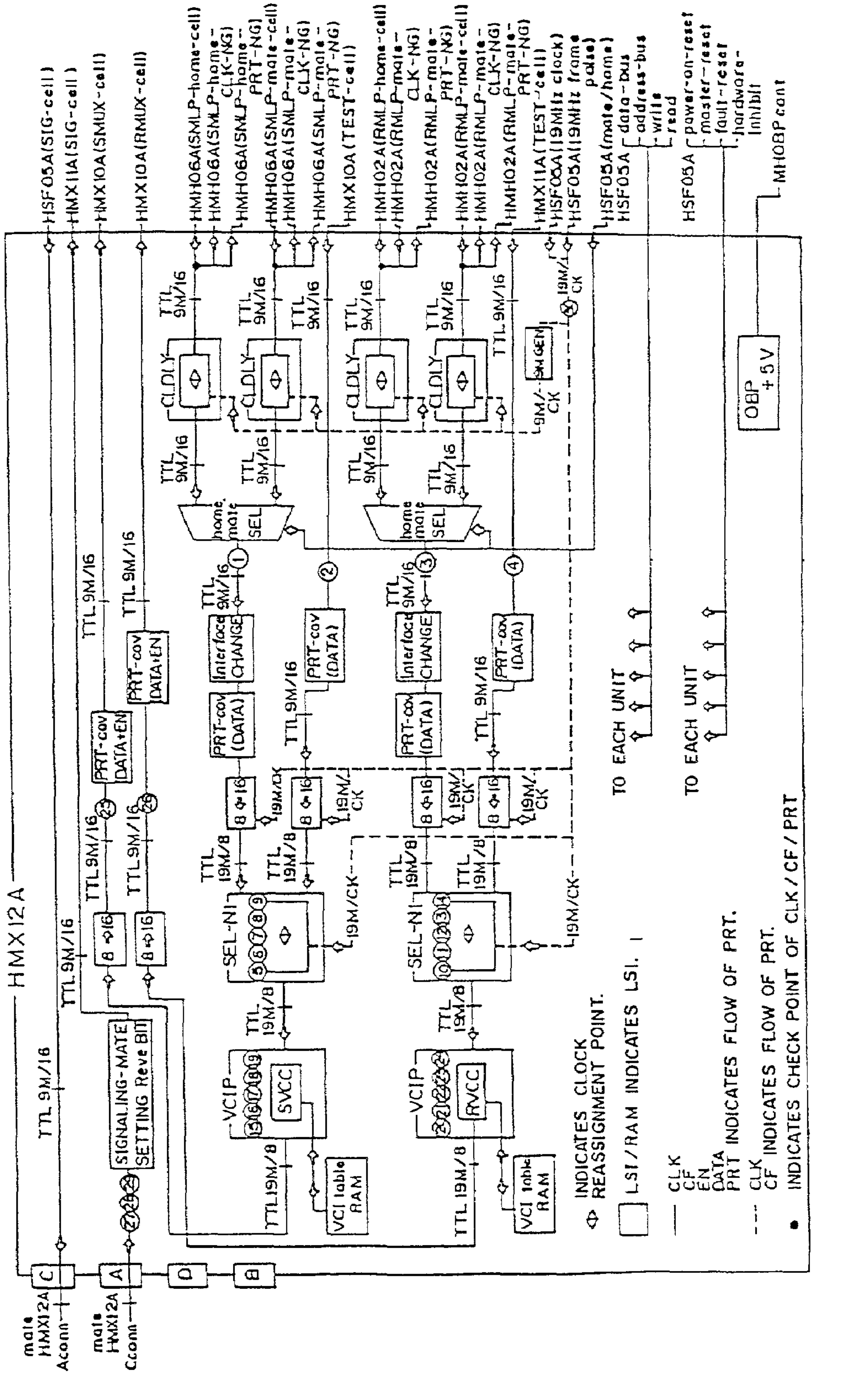

FIG. 371 is a block diagram mainly showing the VCC function of the HMX12A PWCB.

Figure 372A:
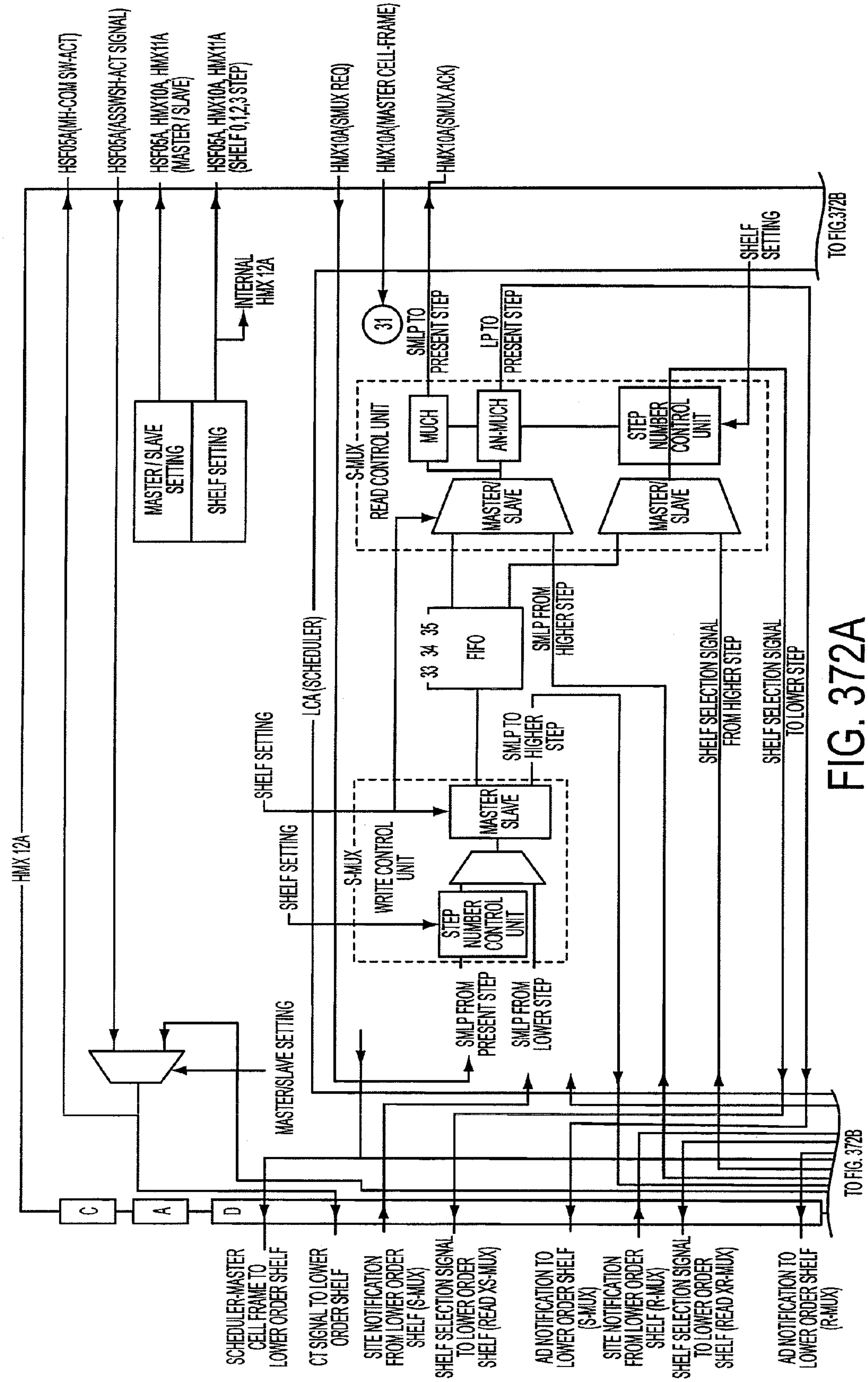

FIGS. 372A and B are block diagrams mainly showing the scheduler function of the HMX12A PWCB.

FIG. 373 shows the monitor items (1) related to the fault correcting process of the HMX12A PWCB.

FIG. 374 shows the monitor items (2) related to the fault correcting process of the HMX12A PWCB.

FIG. 375 shows the monitor items (3) related to the fault correcting process of the HMX12A PWCB.

Figure 376:
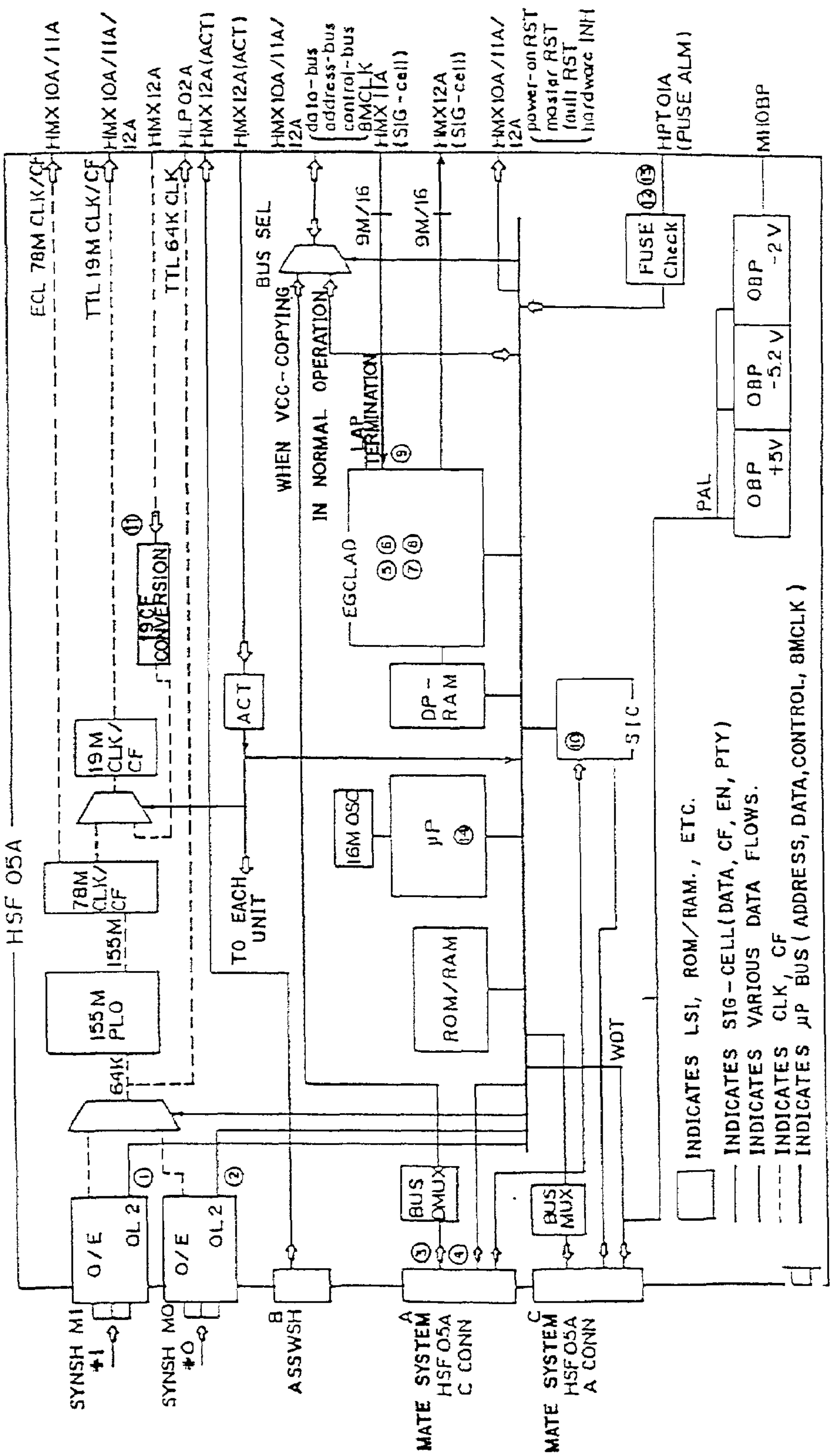

FIG. 376 is a block diagram showing the functions of the HSF05A.

FIG. 377 shows the monitor items related to the fault correcting process of the HSF05A PWCB.

Figure 378:
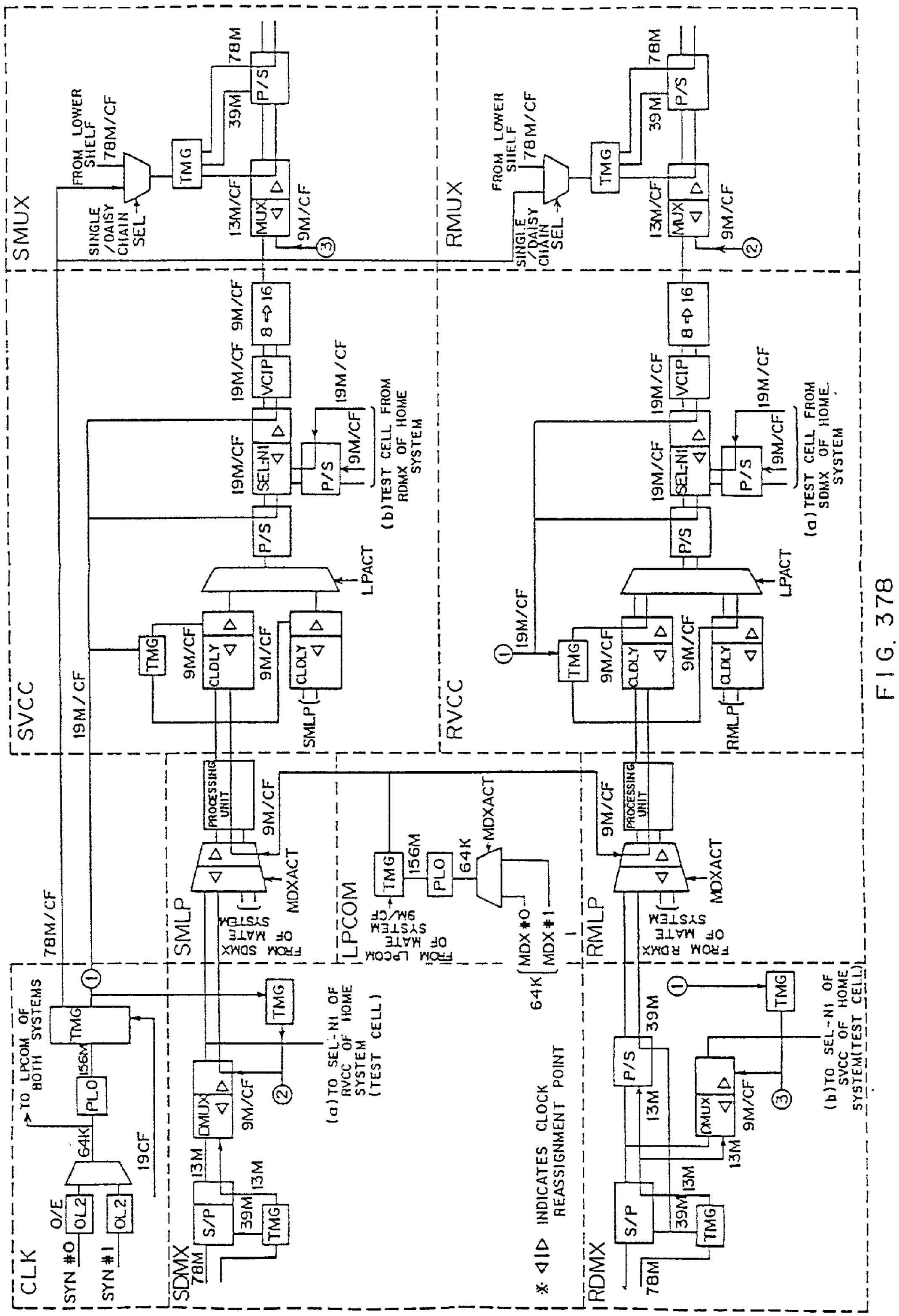

FIG. 378 is a system diagram of the SBMESH clock.

Figure 379:
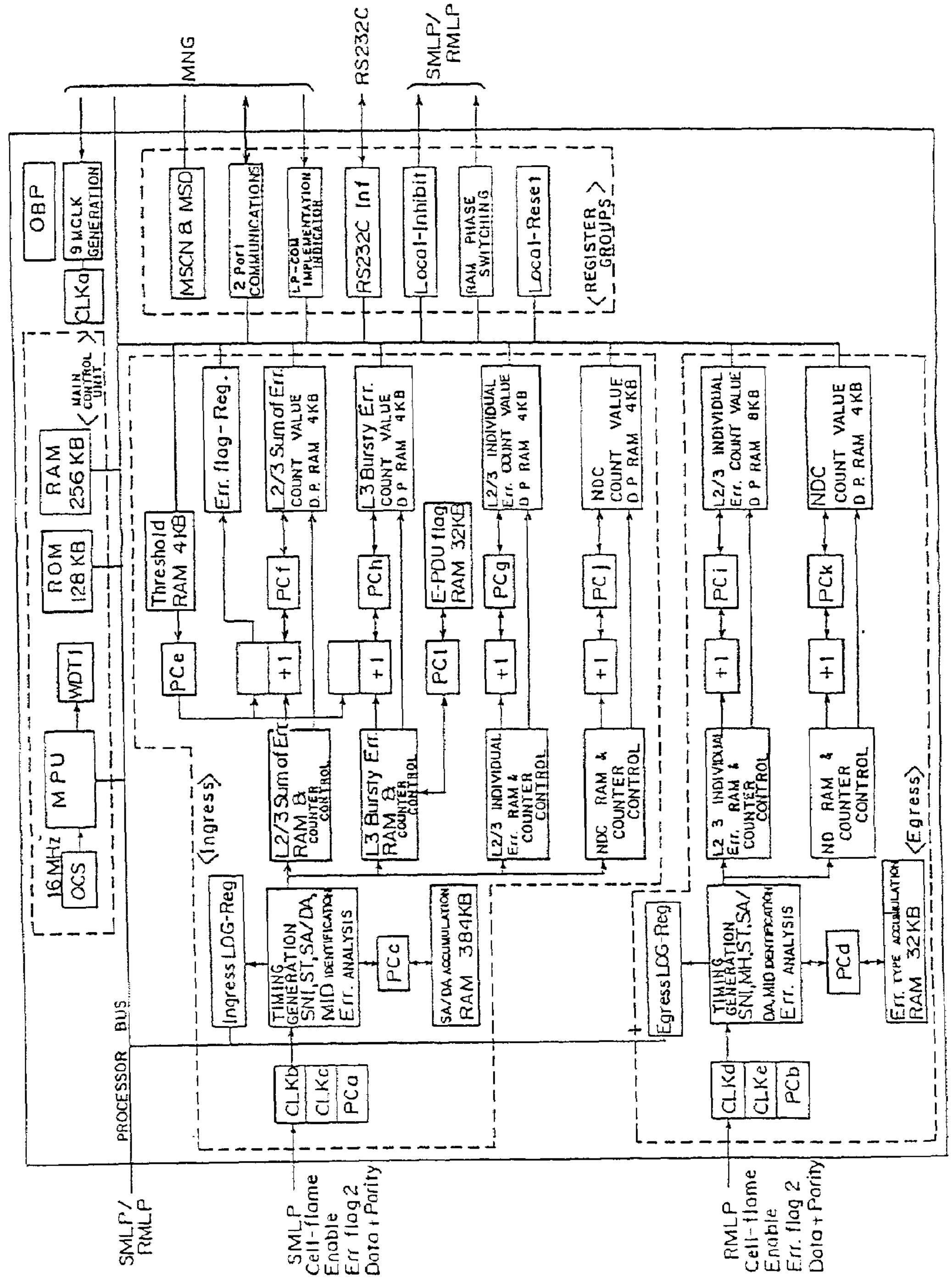

FIG. 379 is a block diagram showing the functions of the HLM01A PWCB.

FIG. 380 shows the outline (1) of the functions of each block of the HLM01A PWCB.

FIG. 381 shows the outline (2) of the functions of each block of the HLM01A PWCB.

FIG. 382 is a list (1) of checks made in the HLM01A PWCB.

FIG. 383 is a list (2) of checks made in the HLM01A PWCB.

FIG. 384 shows the check items and process of the protocol performance monitor in the ingress unit.

Figure 385:
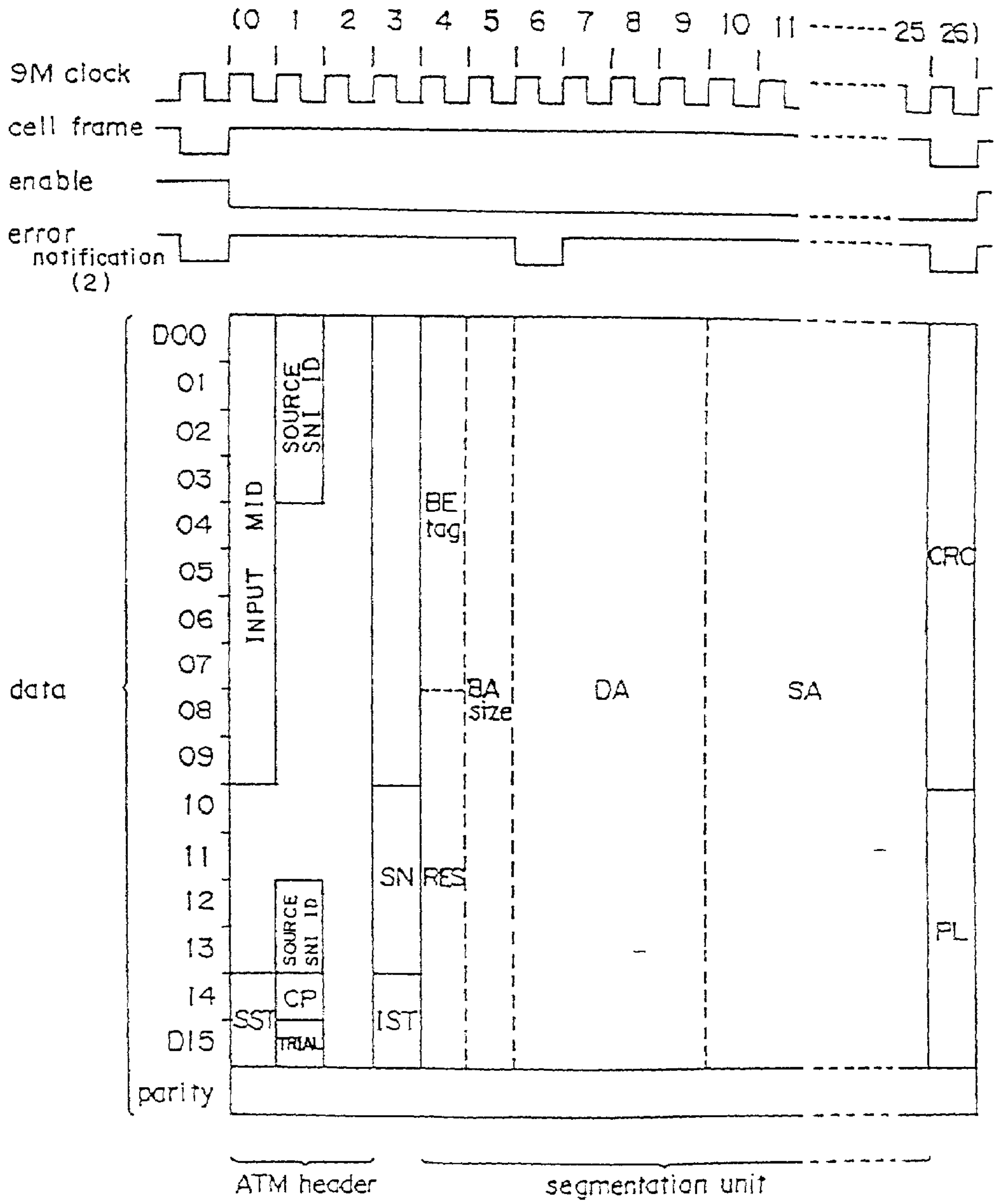

FIG. 385 is a time chart showing the timing of error information.

FIG. 386 shows each signal in the timechart.

FIG. 387 shows the method of identifying the cell segment type in the ST identification block.

Figure 388:
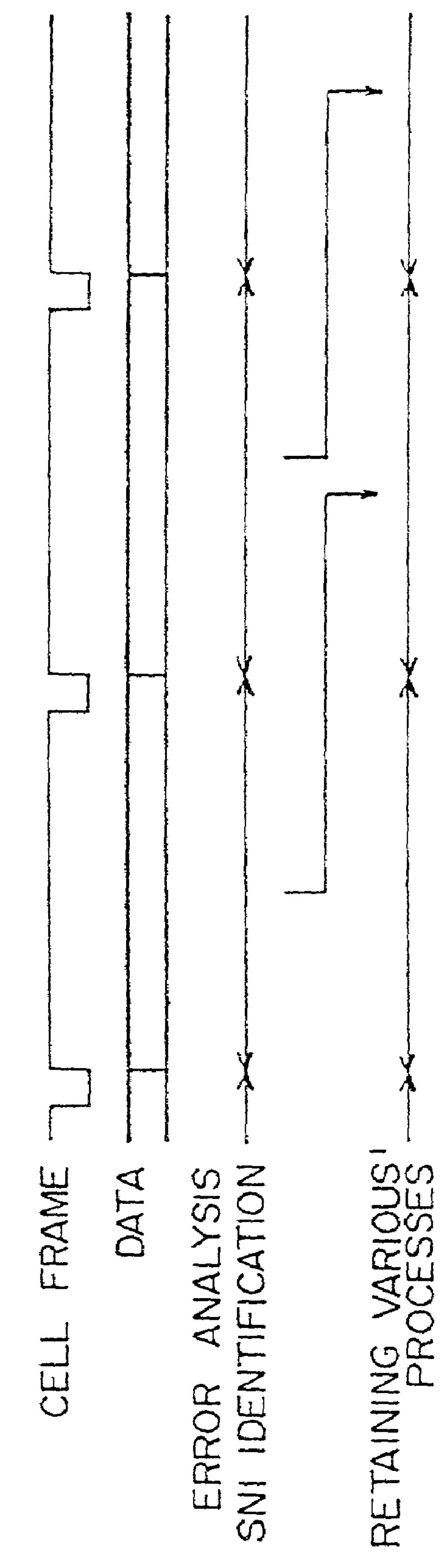

FIG. 388 is a timechart showing the processes to be performed when an error occurs.

Figure 389:
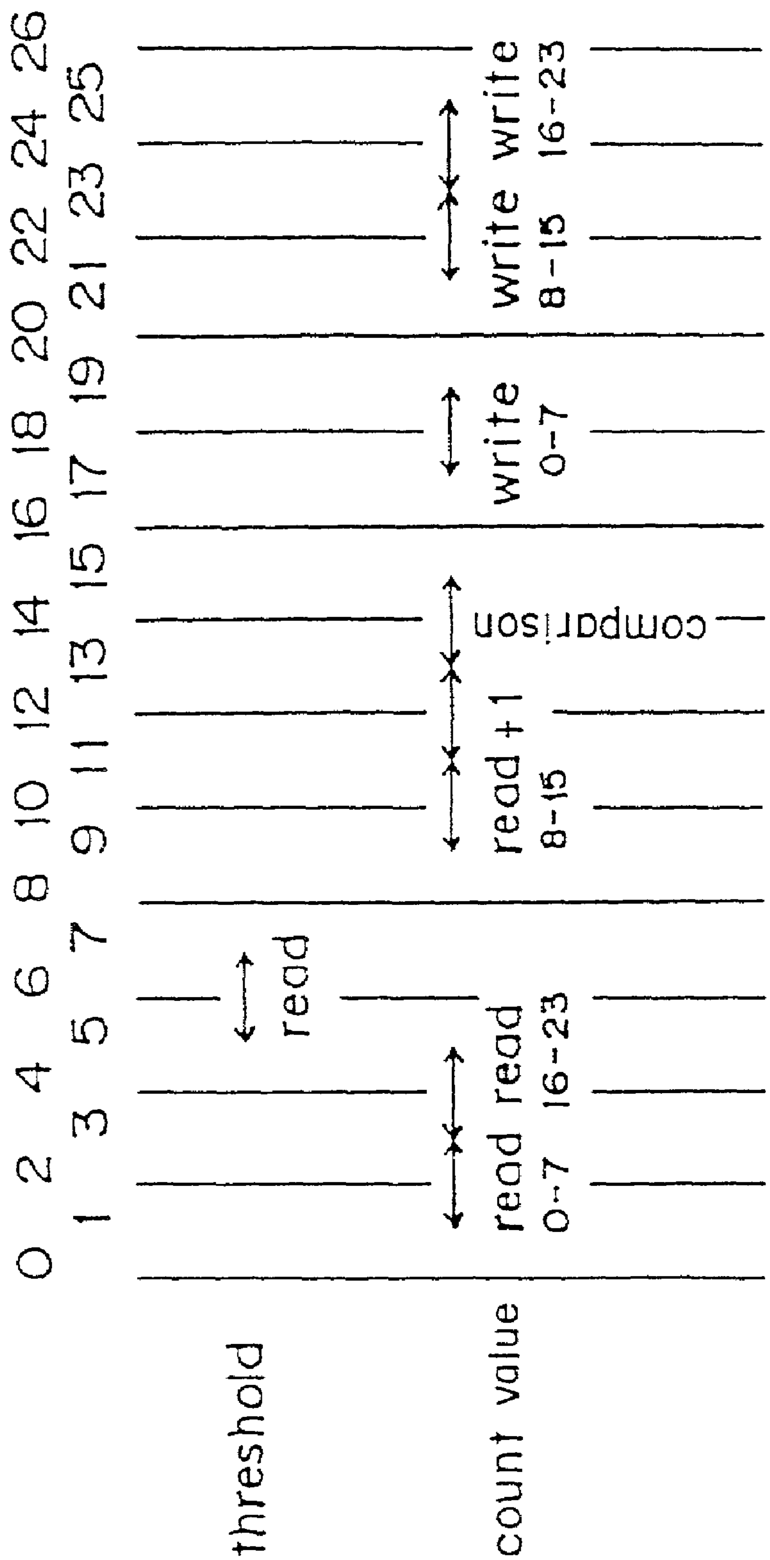

FIG. 389 is a timechart showing the access timing of the threshold and count value in the sum of error count process.

Figure 390:
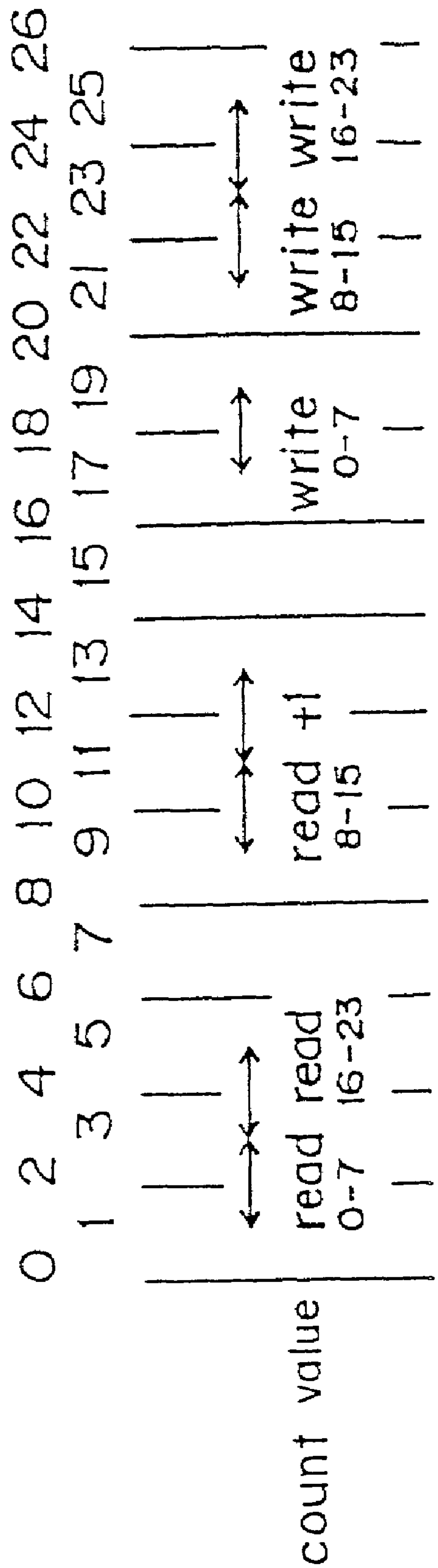

FIG. 390 is a timechart showing the L2/3 individual error counting process.

Figure 391:
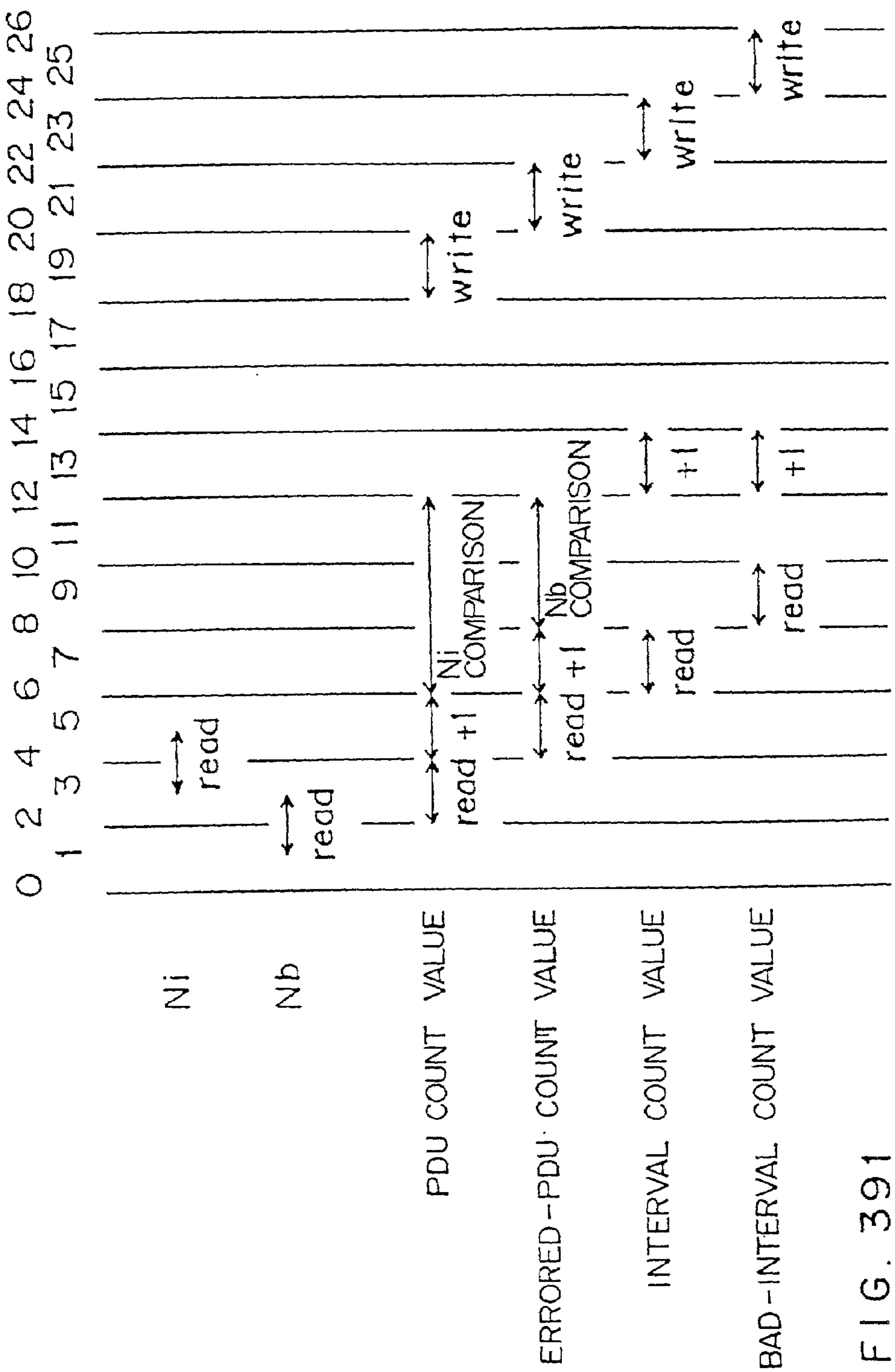

FIG. 391 is a timechart showing the layer 3 Bursty error process.

Figure 392:
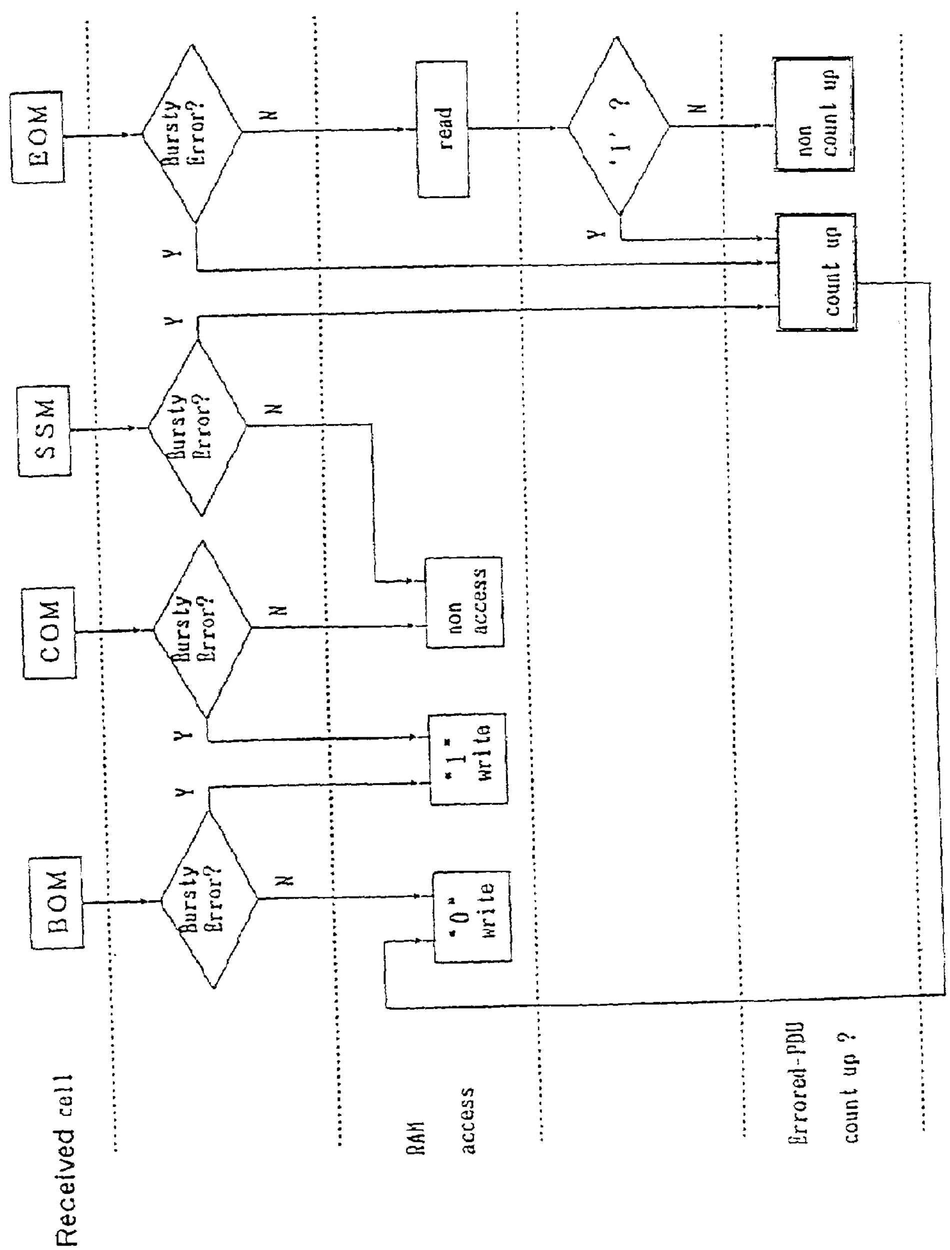

FIG. 392 is a flowchart showing the method of accessing the E-PDU flag RAM.

FIG. 393 shows the check items in the egress unit, and the procedure for actions and checks when an NG is detected.

Figure 394:
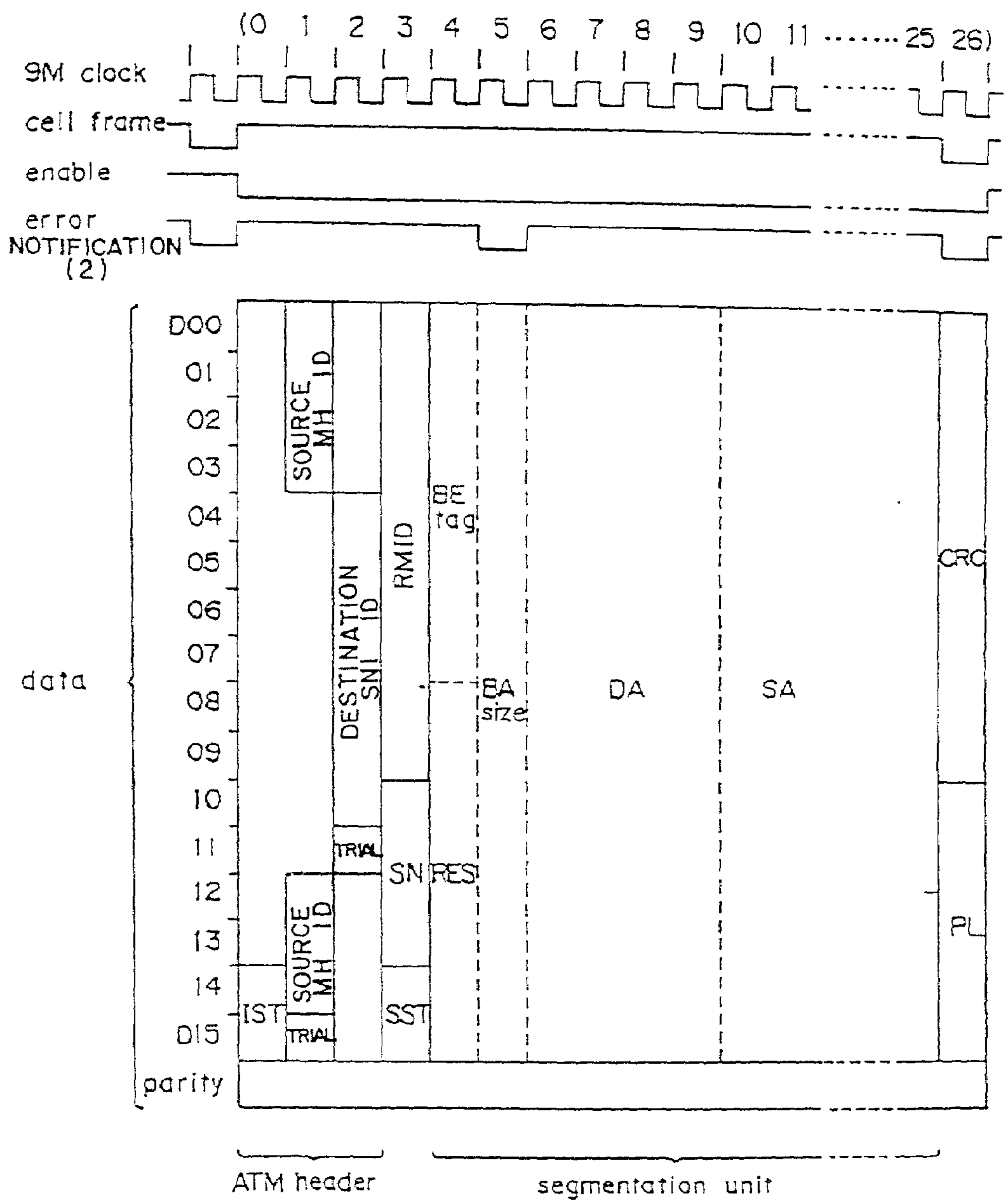

FIG. 394 is a timechart showing the process of the protocol performance monitor in the egress unit.

FIG. 395 shows each signal in the timechart.

FIG. 396 shows the method of identifying the segment type of cell.

Figure 397:
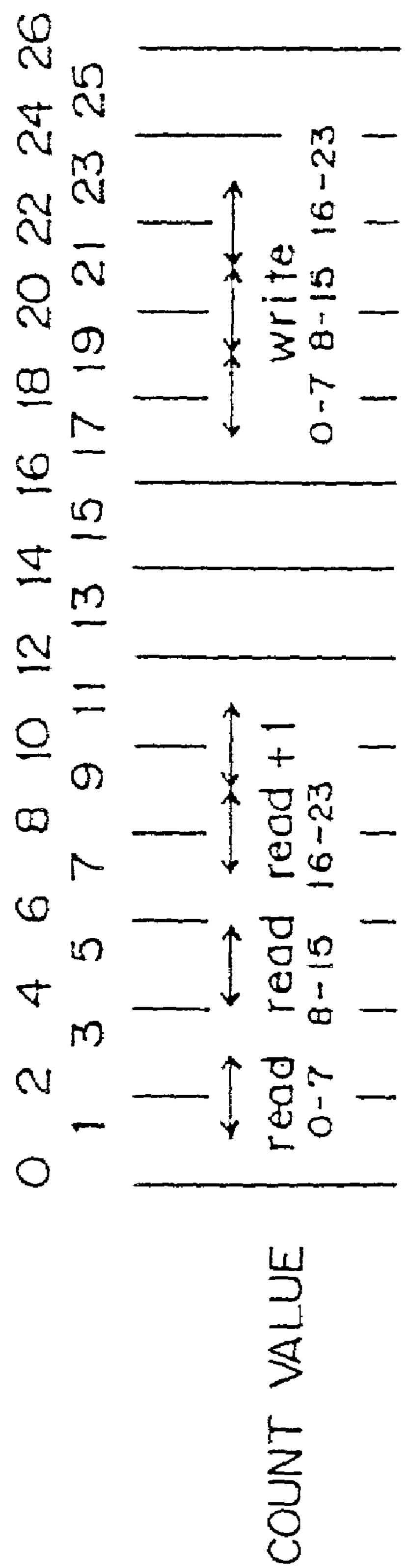

FIG. 397 is a timechart showing the L2/3 individual error count process in the Ingress unit.

Figure 398:
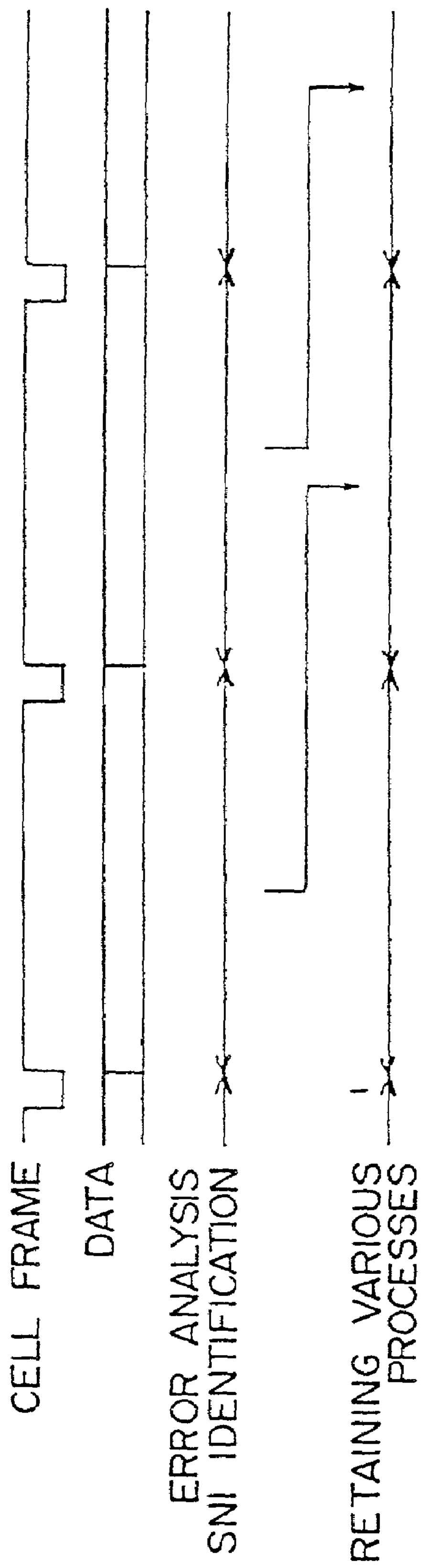

FIG. 398 is a timechart showing the network data collection in the ingress unit.

Figure 399:
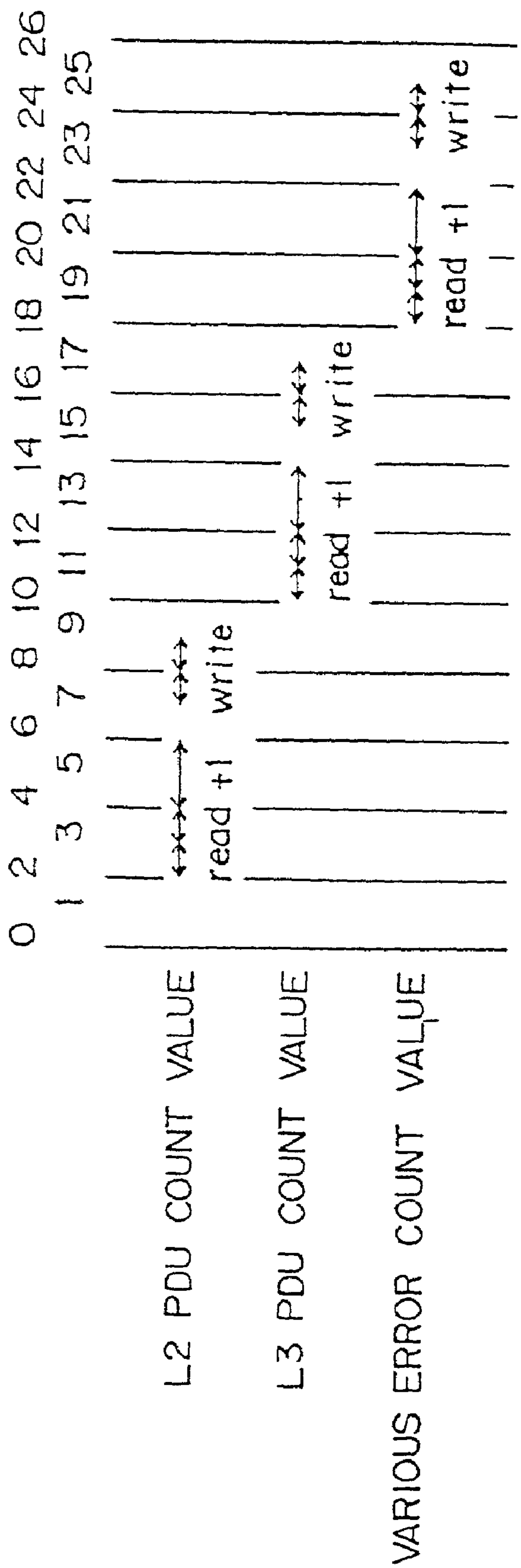

FIG. 399 is a timechart showing the data collection process in the ingress unit.

Figure 400:
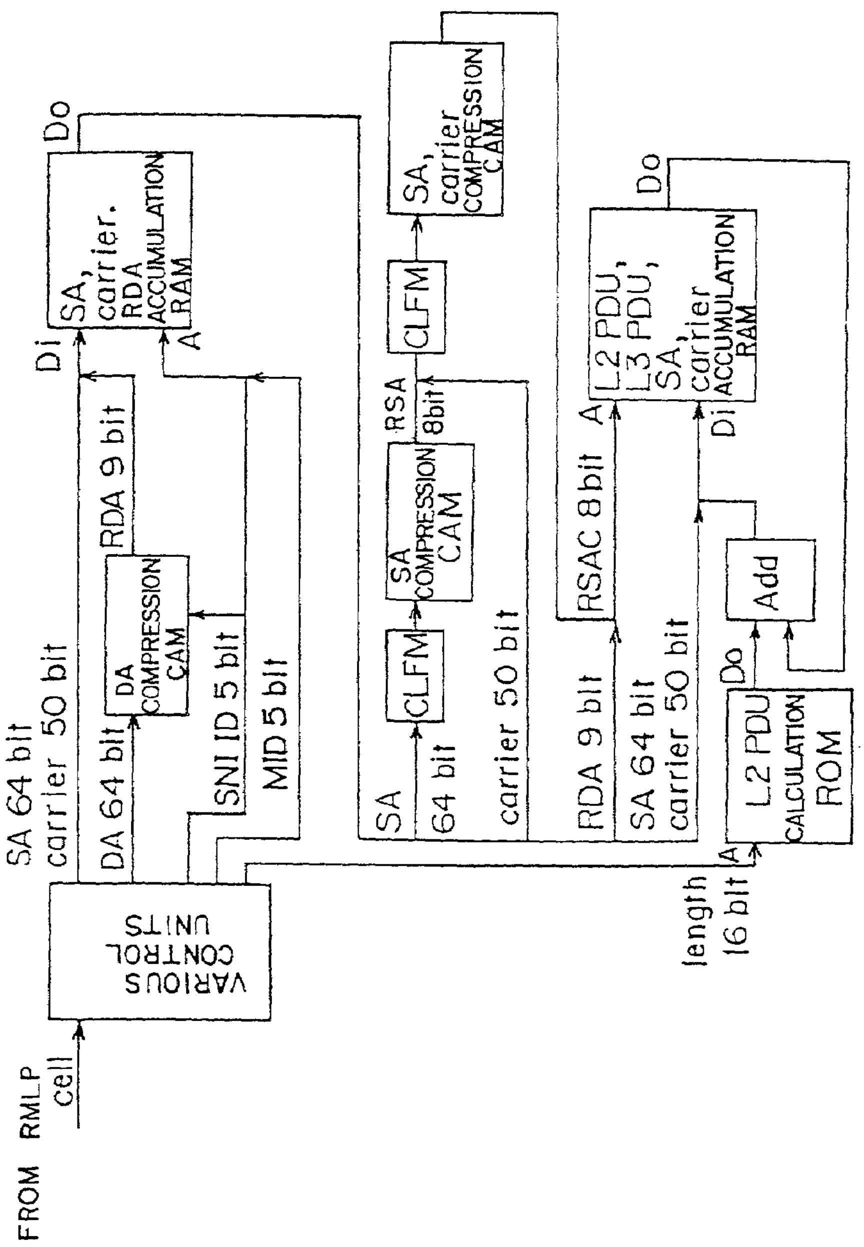

FIG. 400 is a block diagram showing the billing unit.

Figure 401:
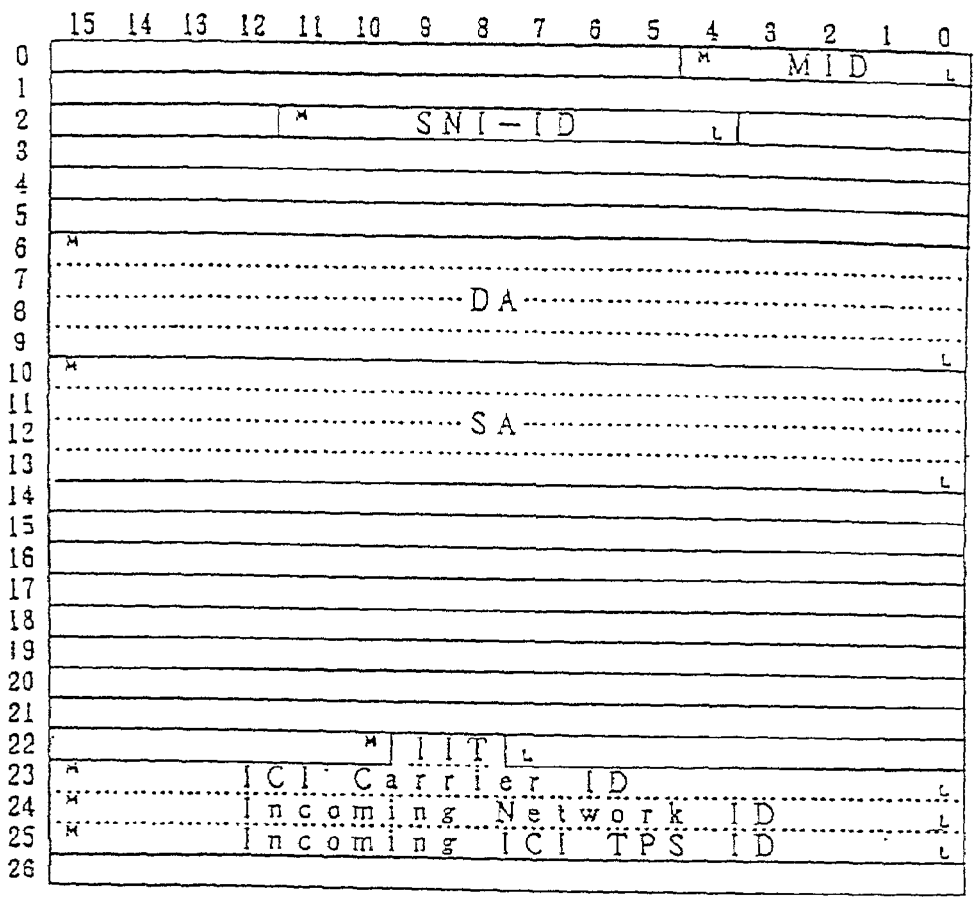

FIG. 401 shows the format of the cell input from the RMLP.

Figure 402:
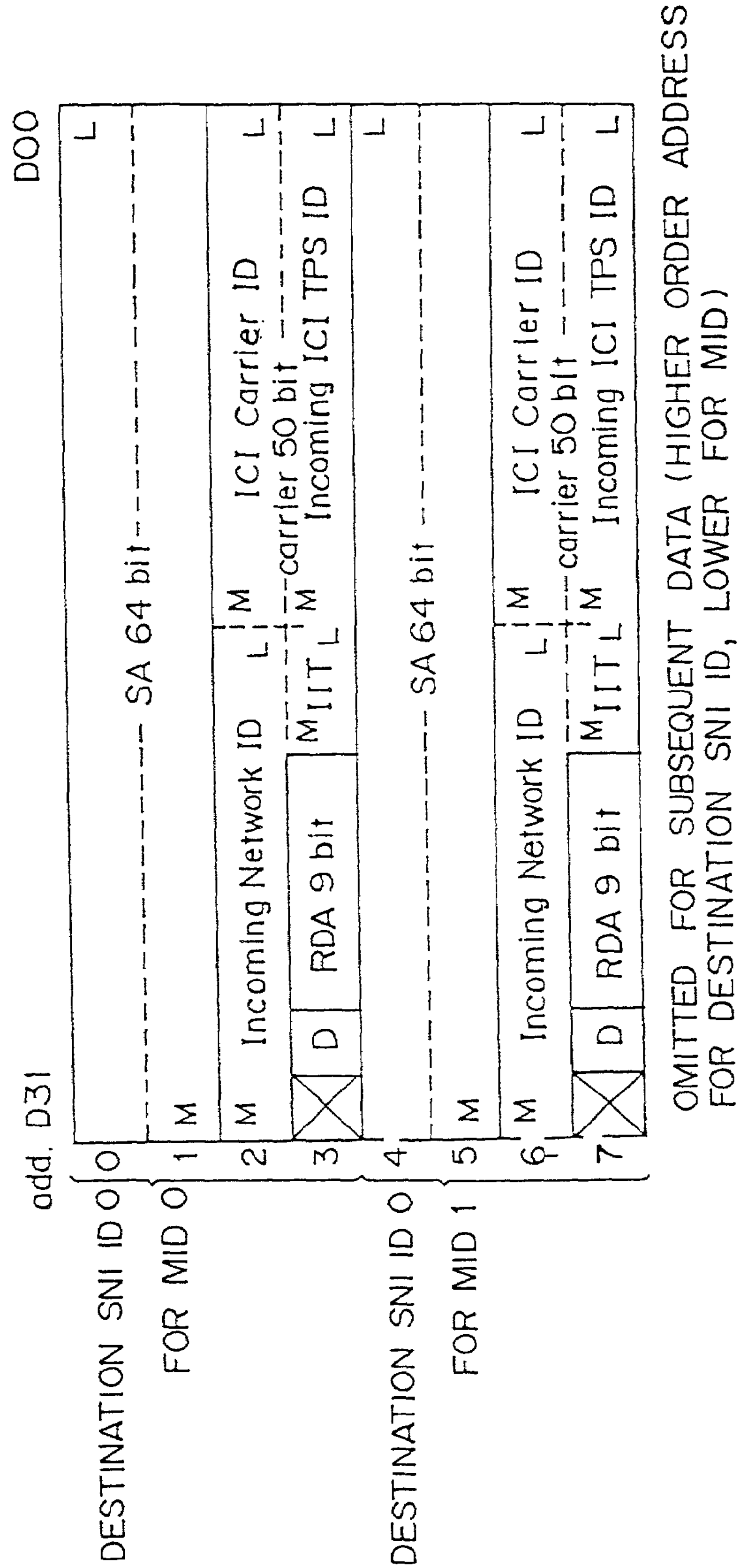

FIG. 402 shows the data at the SA, carrier, and stored in the RDA accumulation RAM.

Figure 403:
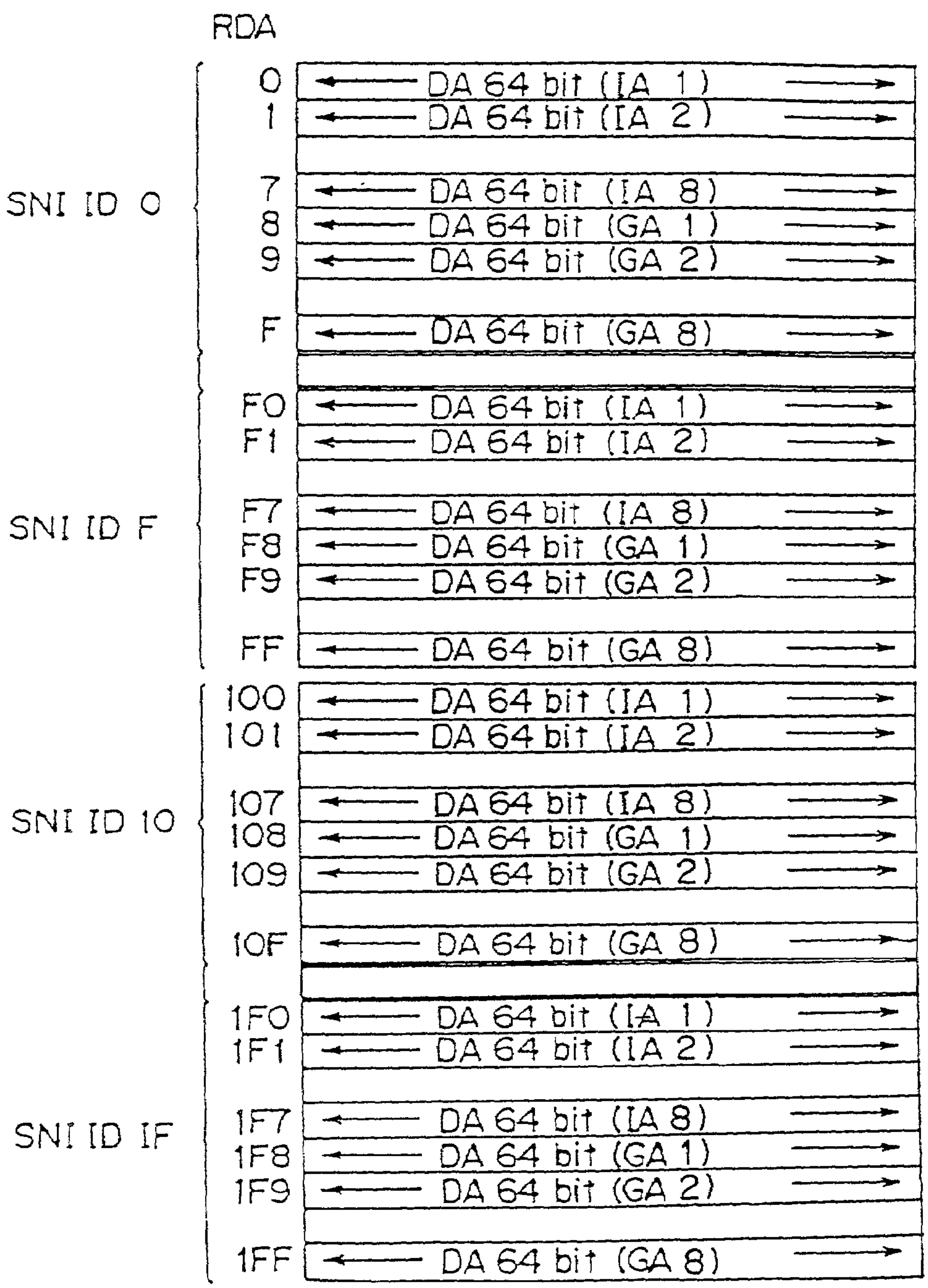

FIG. 403 shows the inside of the DA compression CAM.

Figure 404:
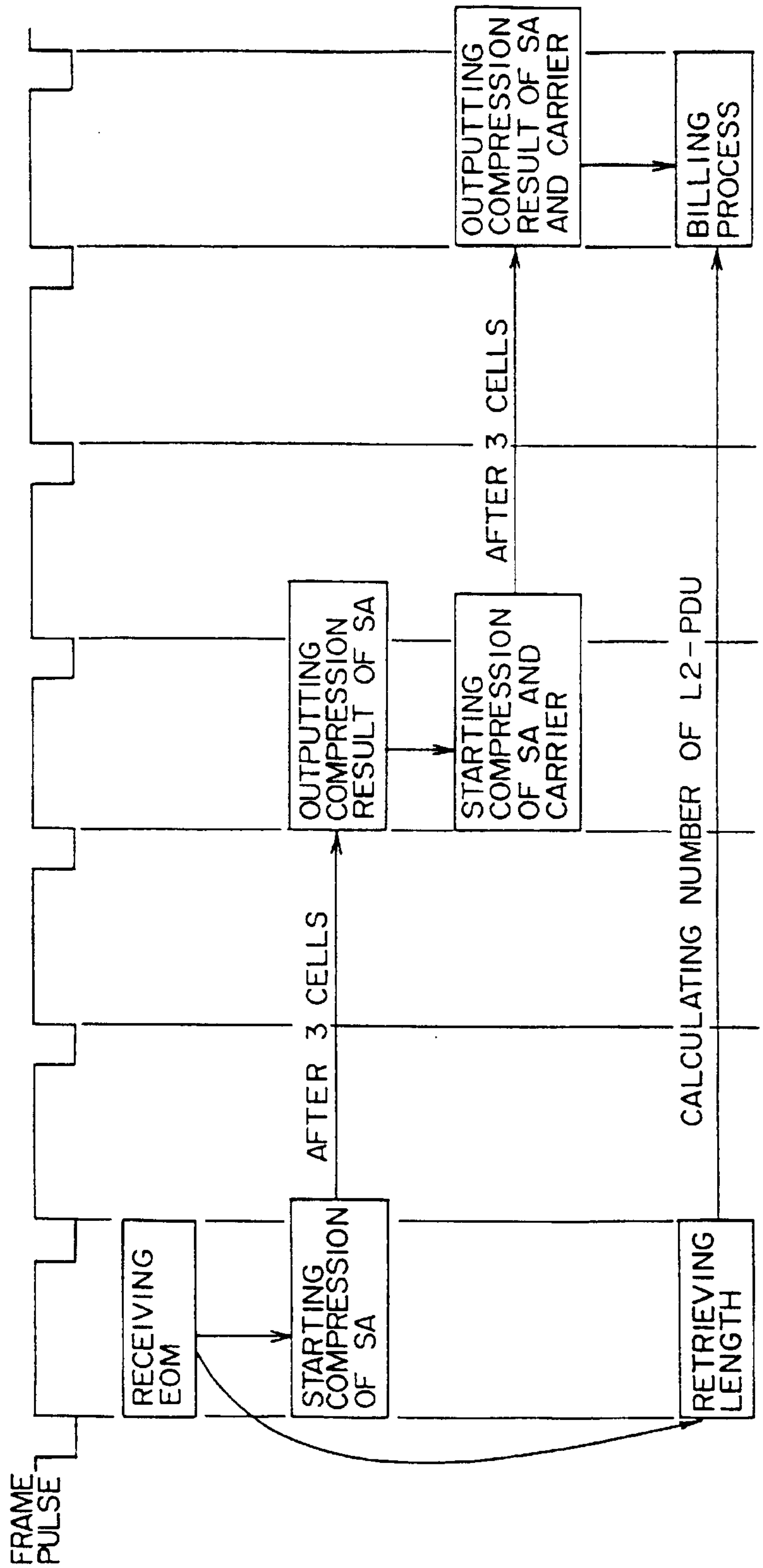

FIG. 404 is a time chart showing the operations performed when an EOM is entered in the billing process.

Figure 405:
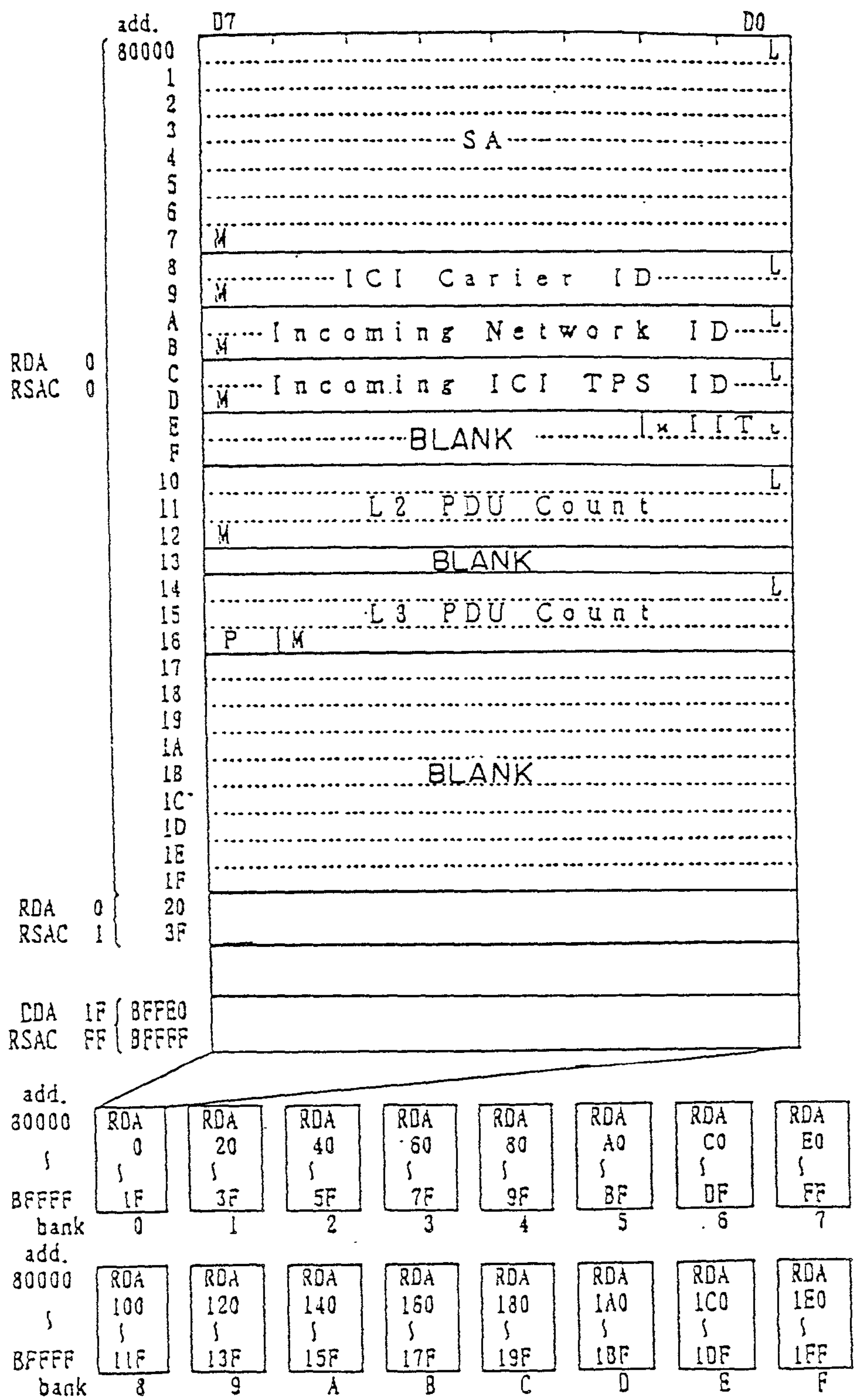

FIG. 405 shows the information stored in the RAM storing the data related to the billing process.

Figure 406:
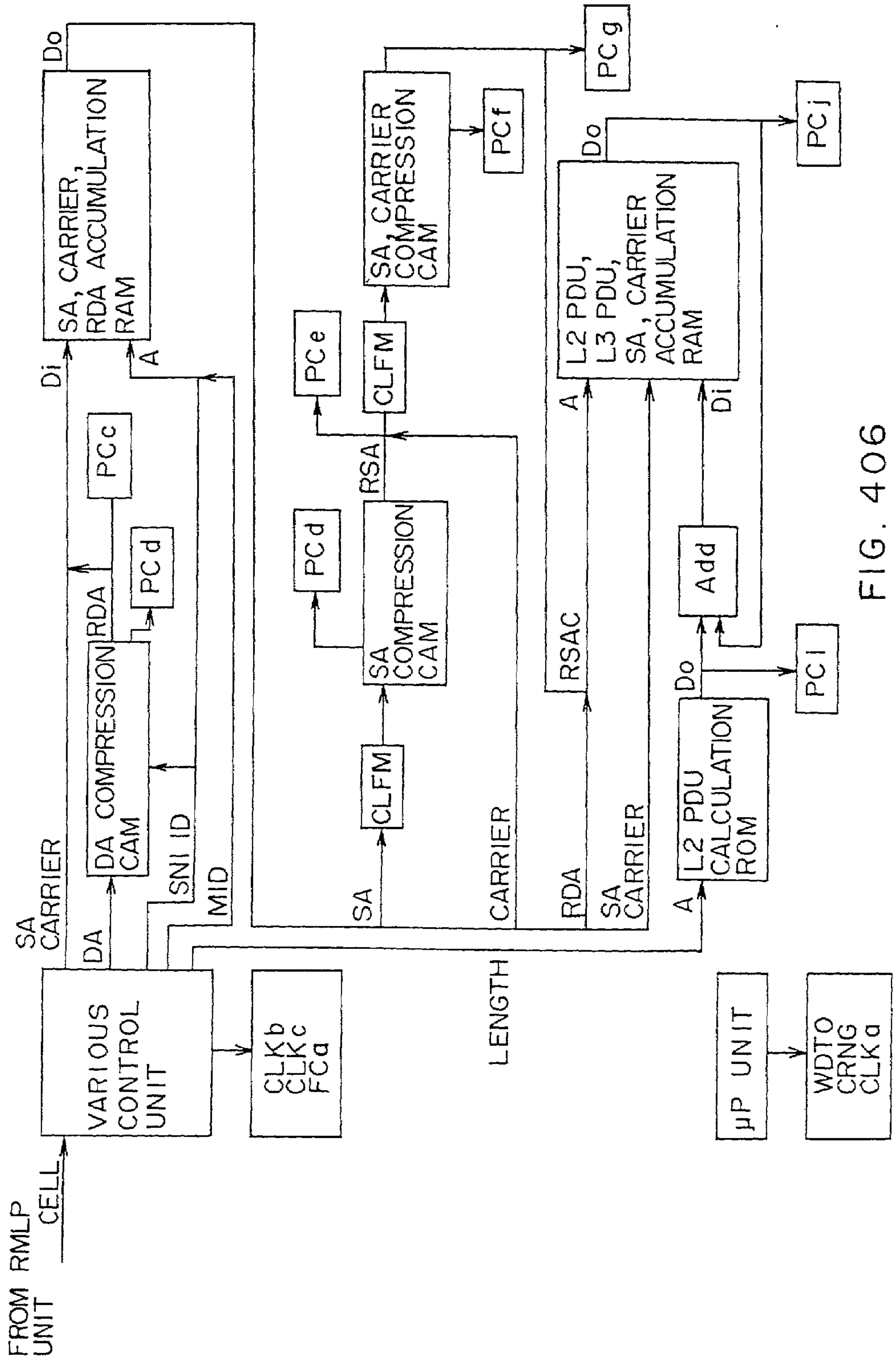

FIG. 406 is a block diagram showing the portion for checking the billing unit.

Figure 407:
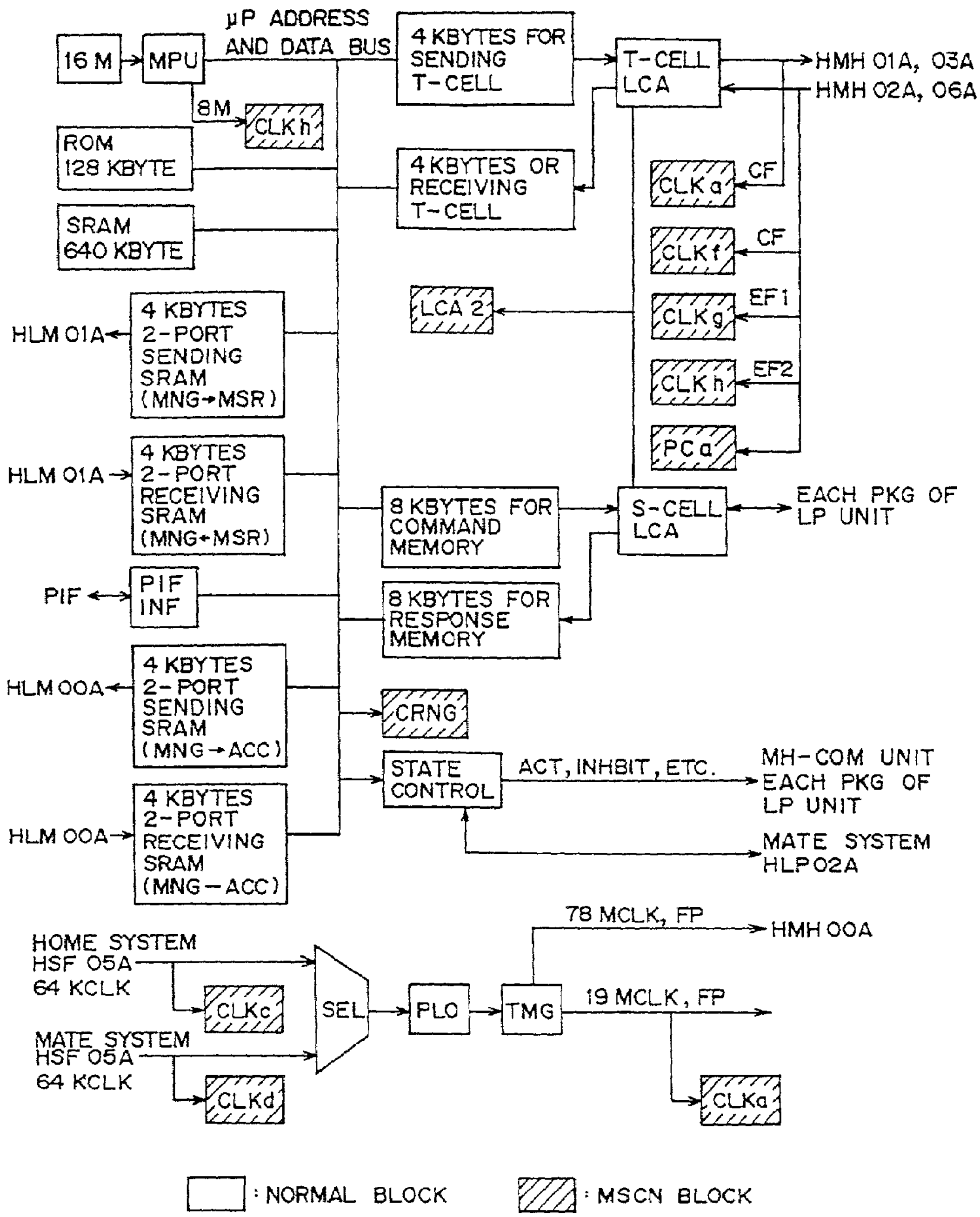

FIG. 407 is a block diagram showing the HLP02A of the LP-COM.

FIG. 408 shows the outline (1) of the functions of each block of the HLP02A.

FIG. 409 shows the outline (2) of the functions of each block of the HLP02A.

Figure 410:
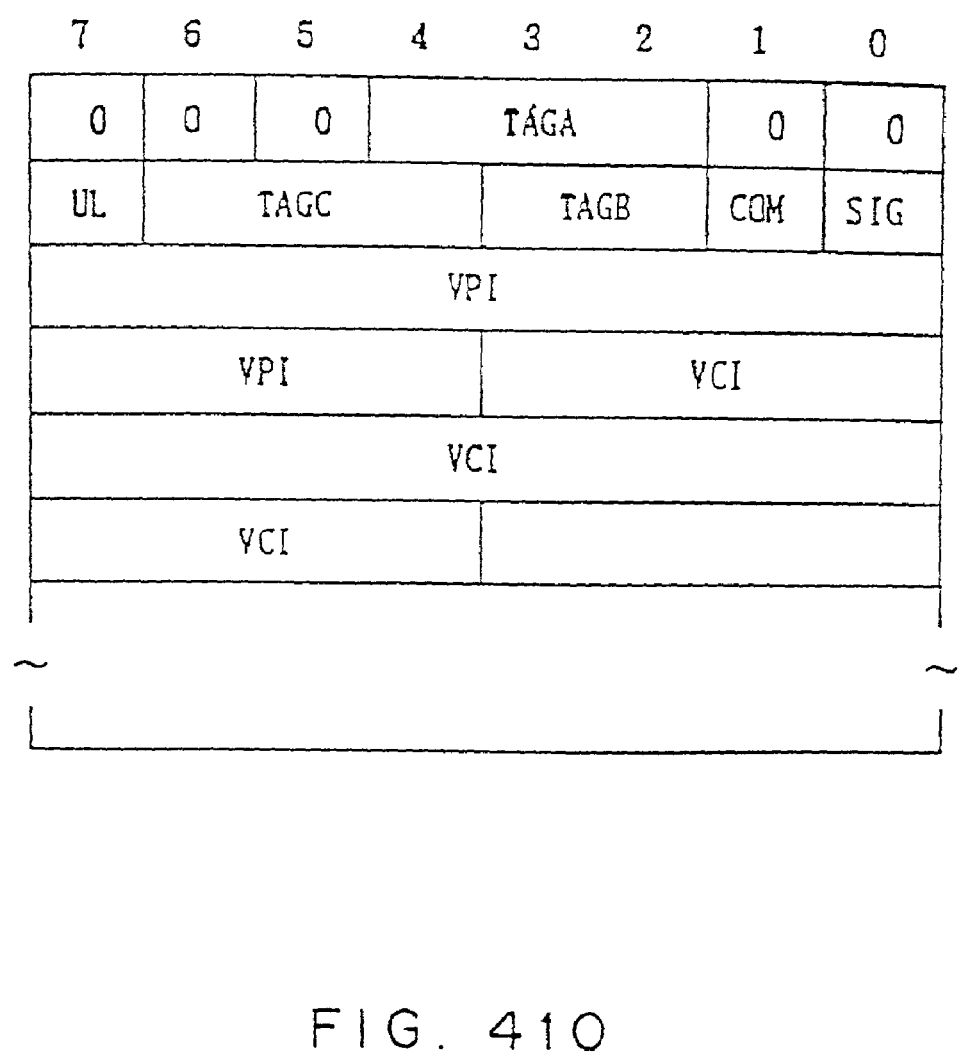

FIG. 410 shows the format of the cell input from the ASSW to the SDMUX.

Figure 411:
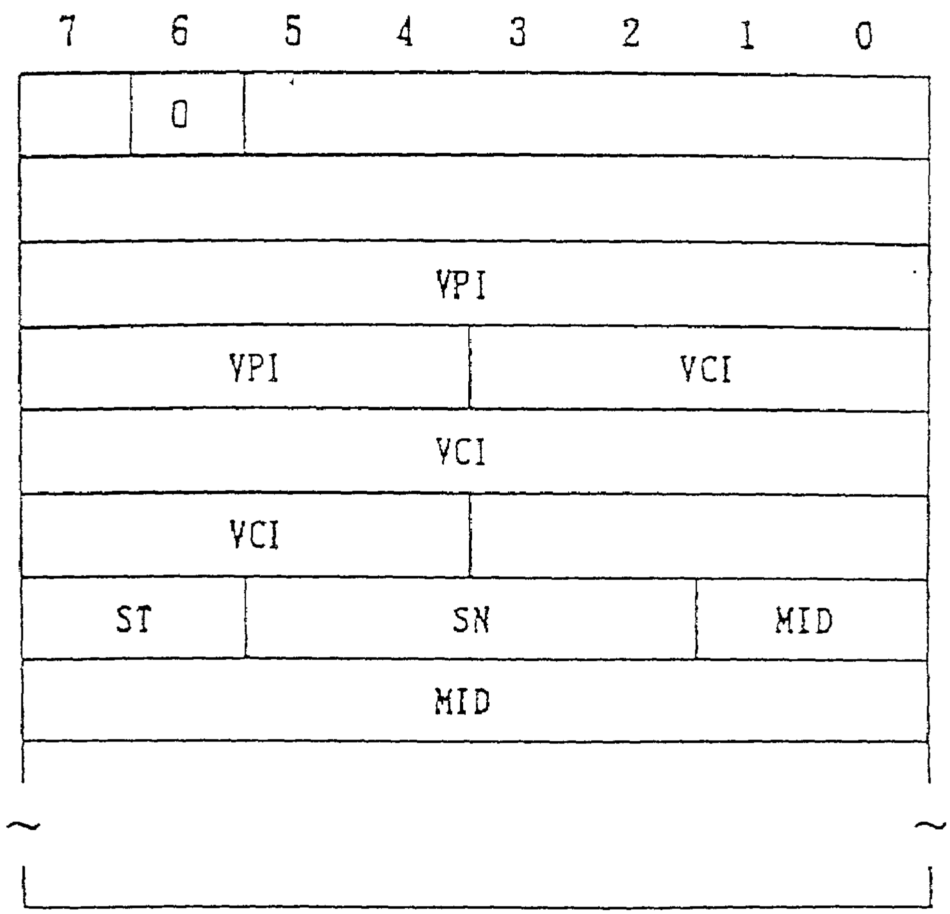

FIG. 411 shows the format of the cell input from the SDMUX to the SMLP(a).

Figure 412:
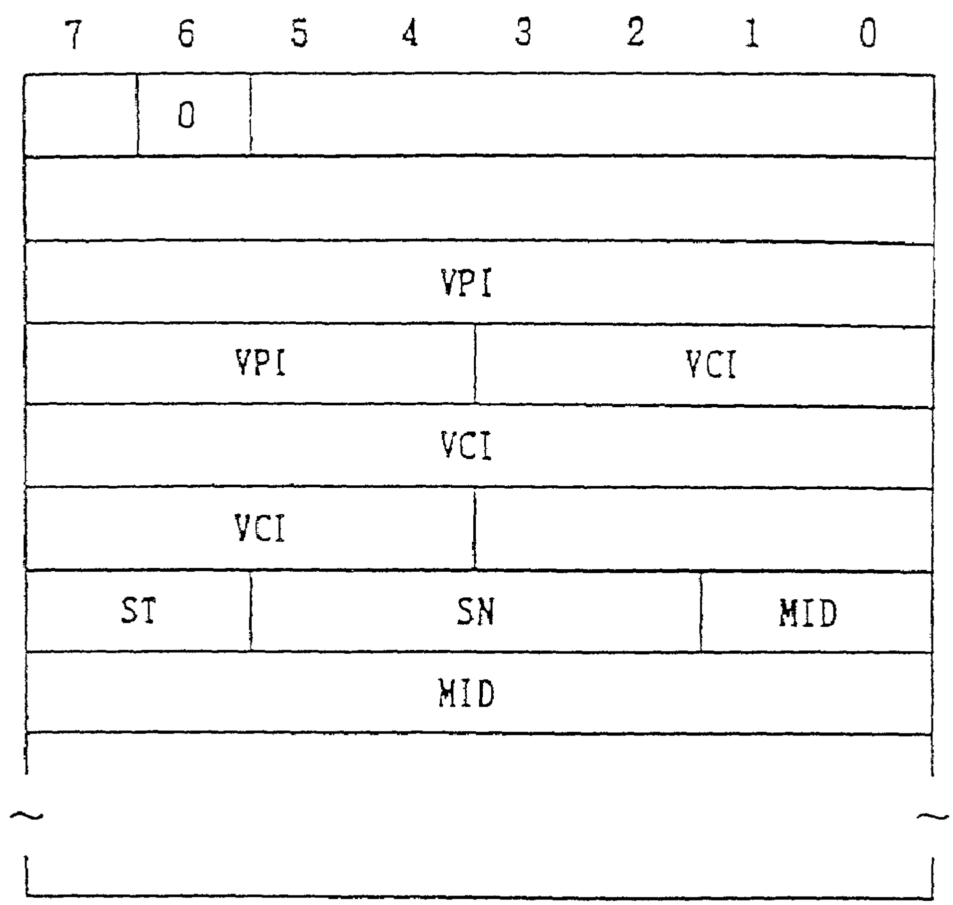

FIG. 412 shows the format of the cell input from the LP-COM to the SMLP(a).

Figure 413:
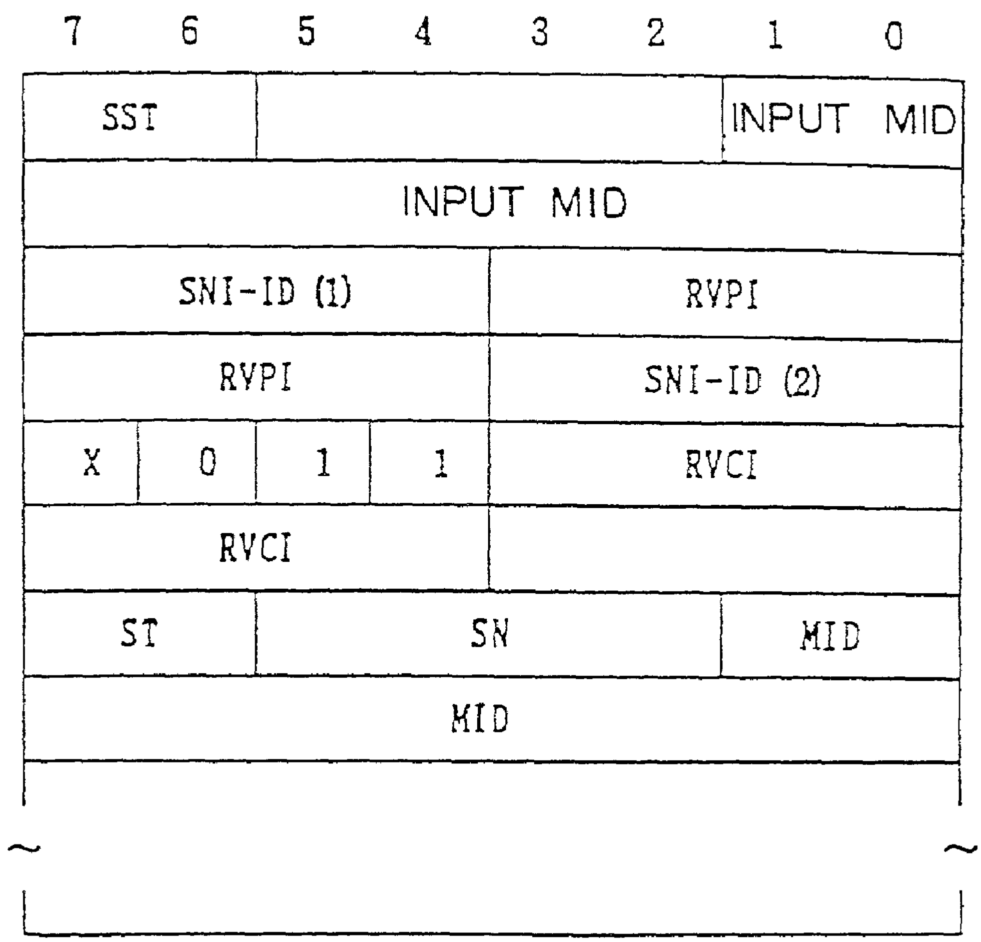

FIG. 413 shows the format of the cell input from the SMLP (a) (HMH03A) to the SMLP(b) (HMH04A).

Figure 414:
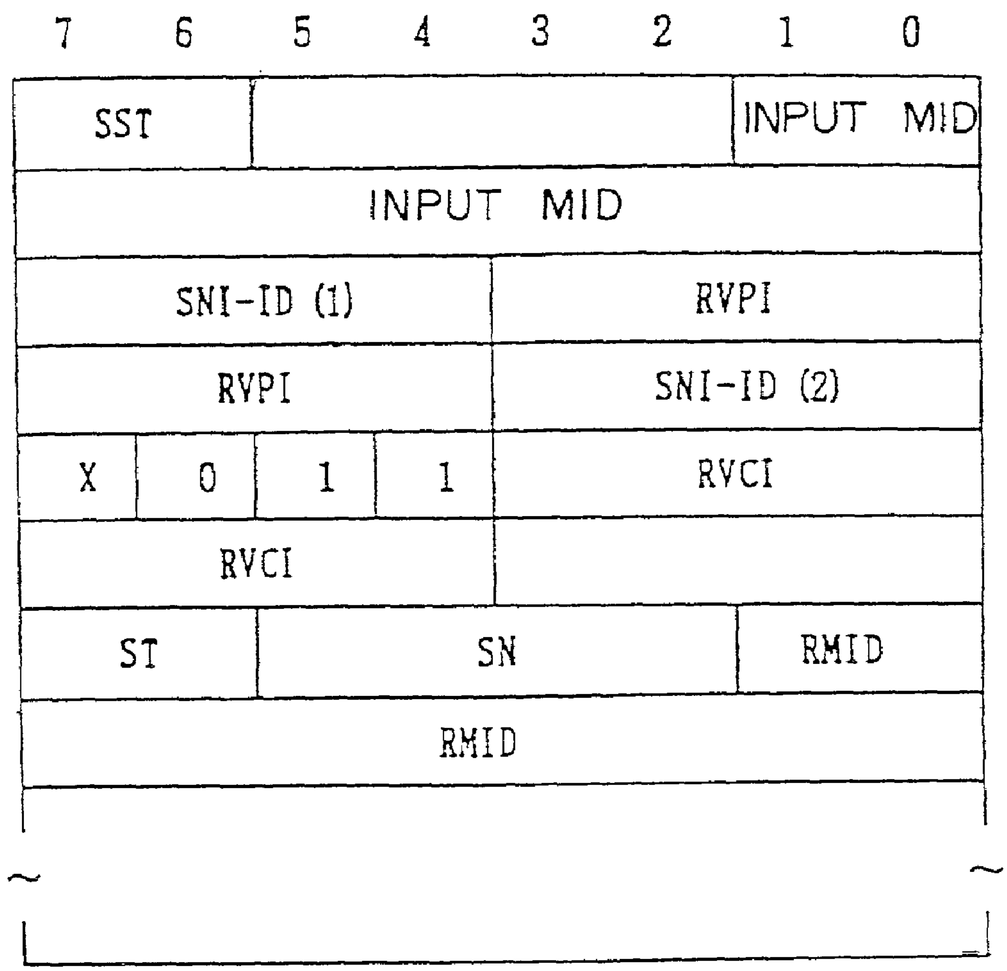

FIG. 414 shows the format of the cell input from the SMLP (b) (HMH04A) to the SMLP(c) (HMH05A).

Figure 415:
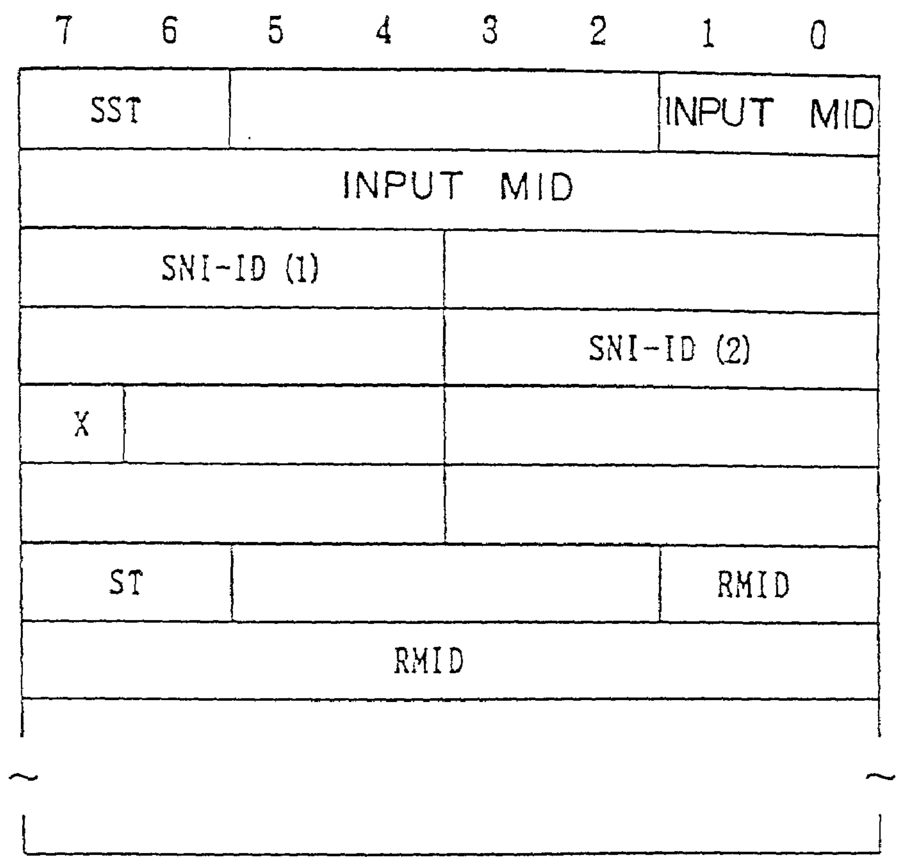

FIG. 415 shows the format of the timeout dummy cell input from the SMLP(b) (HMH04A) to the SMLP (HMH05A).

Figure 416:
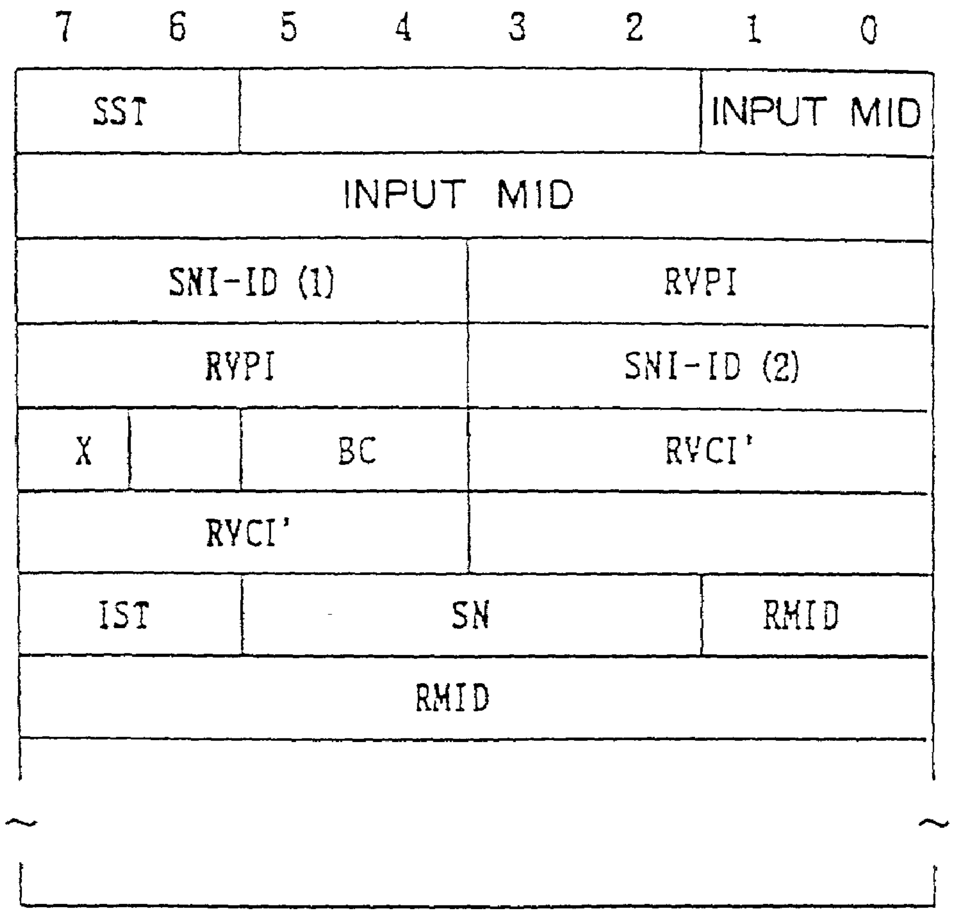

FIG. 416 shows the format of the cell input from the SMLP (c) (HMH05A) to the SMLP(d) (HMH06A).

FIG. 417 shows the format of the I-BOM cell input from the SMLP(c) (HMH05A) to the SMLP(d) (HMH06A).

Figure 418:
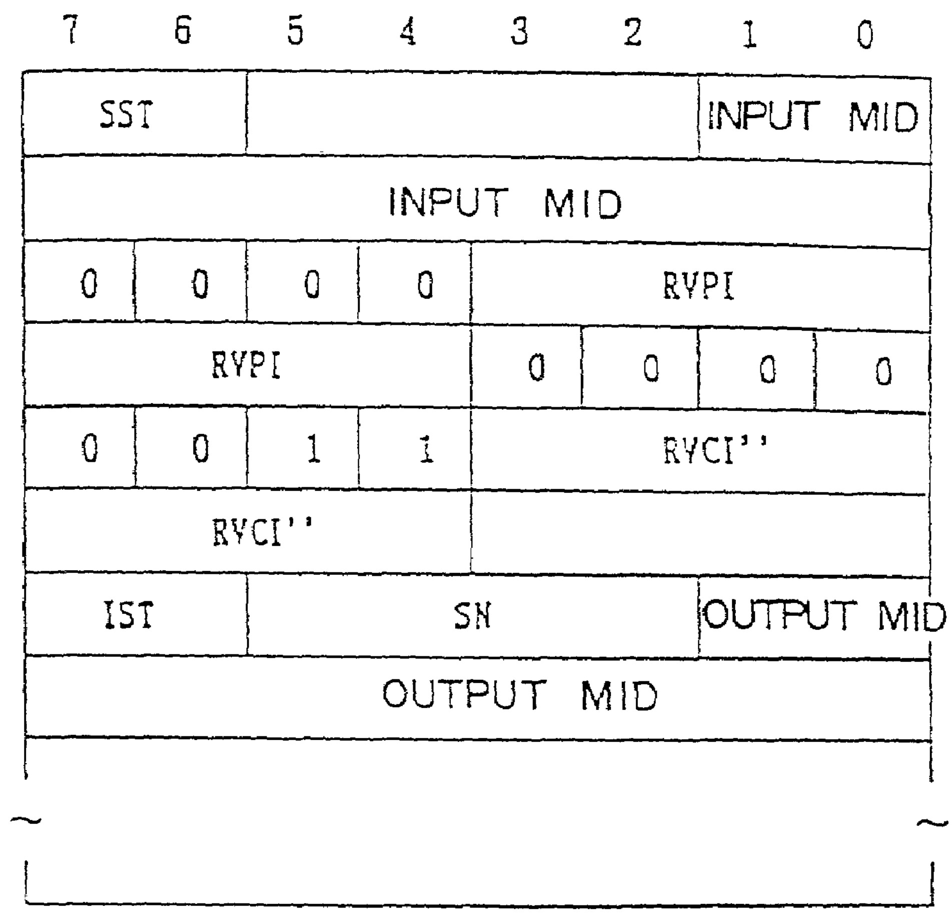

FIG. 418 shows the format of the cell input from the SMLP (d) (HMH06A) to the SMUX(HMX12A).

FIG. 419 shows the format of the cell input from the SMLP (d) (HMH06A) to the LP-COM(HLP02A, HLM01A).

FIG. 420 shows the format of the cell output from the SMUX to the ASSW.

Figure 421:
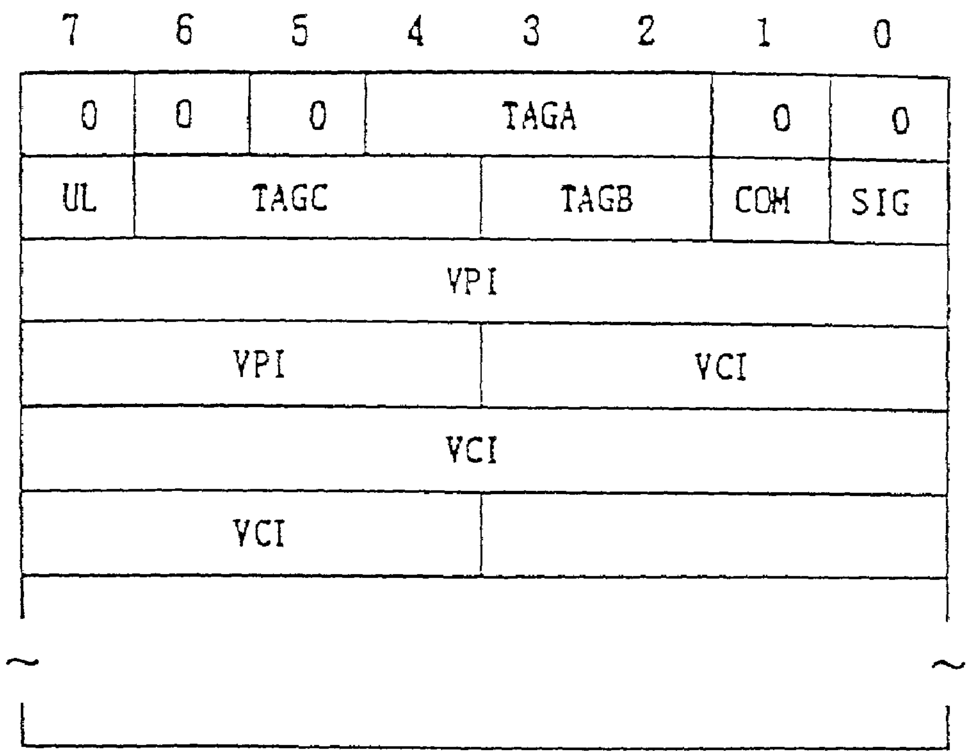

FIG. 421 shows the format of the cell input from the ASSW to the RDMUX.

Figure 422:
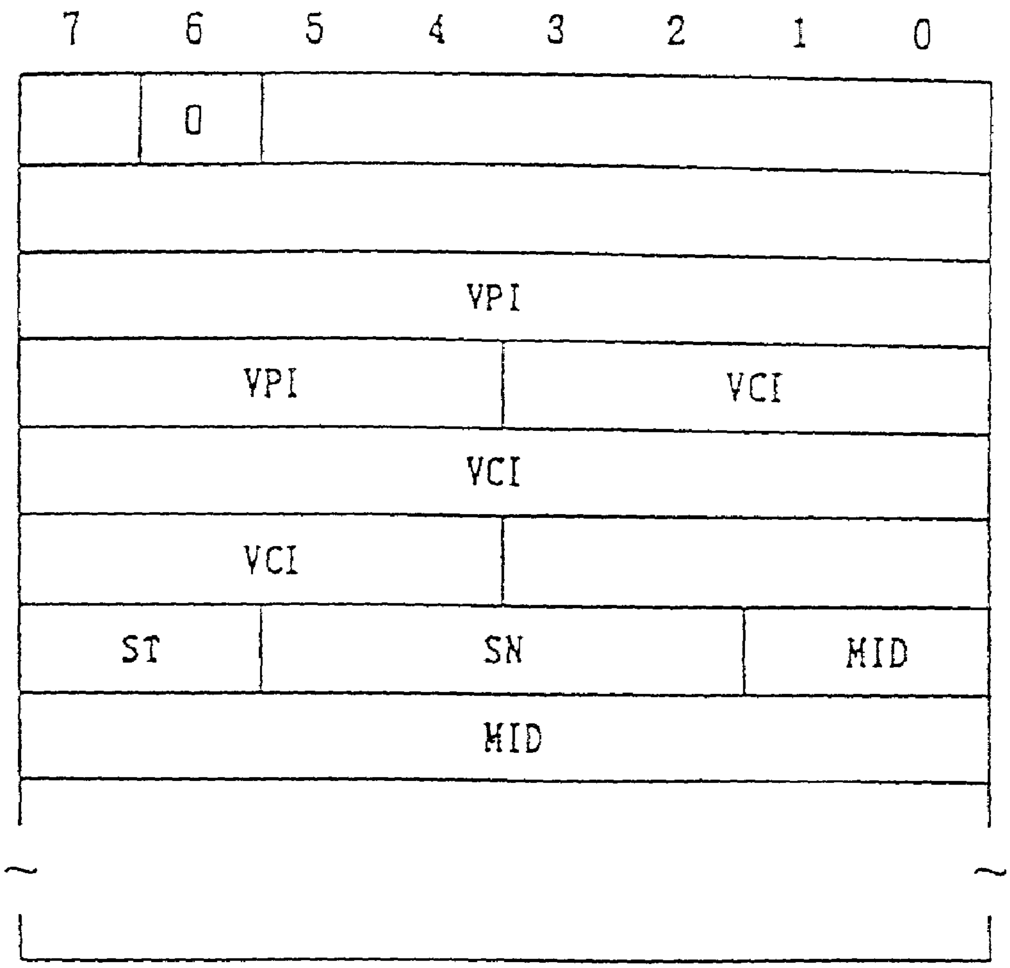

FIG. 422 shows the format of the cell input from the RDMUX(HMX10A) to the RMLP(a) (HMH00A).

Figure 423:
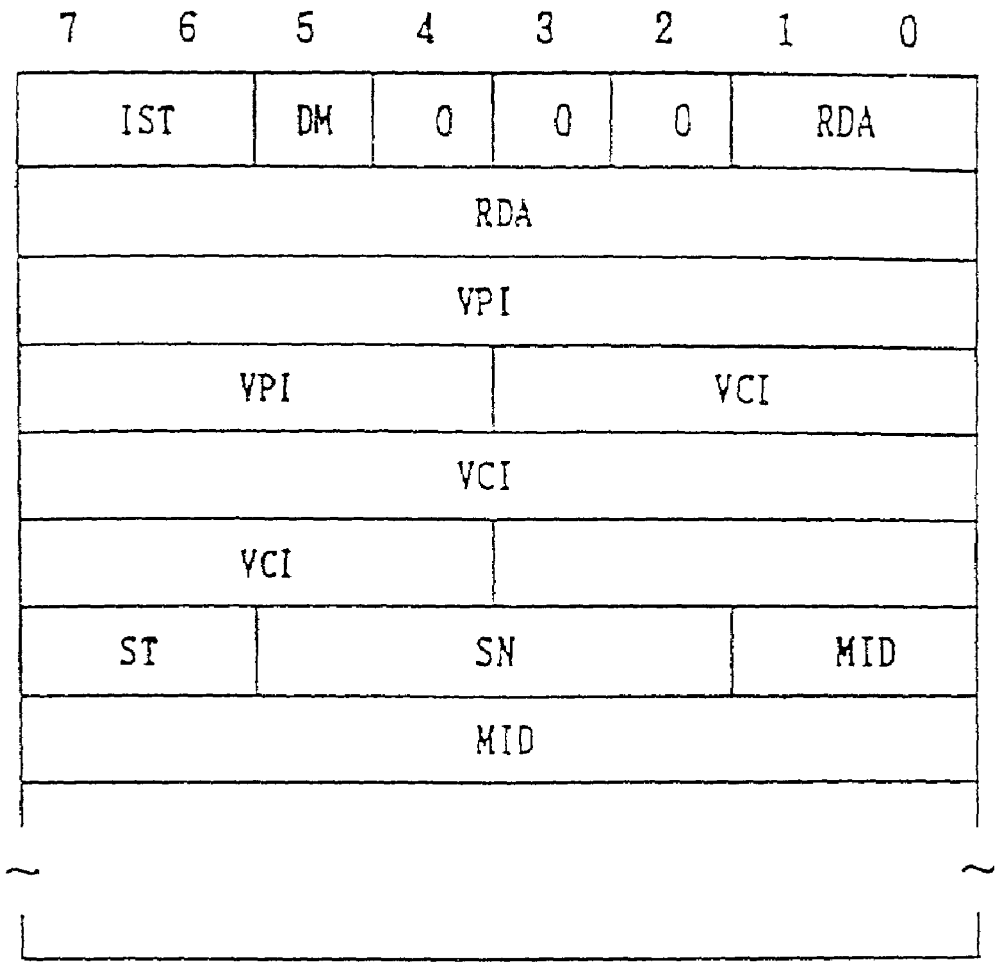

FIG. 423 shows the format of the cell input from the RMLP (a) (HMH00A) to the RMLP(b) (HMH01A).

Figure 424:
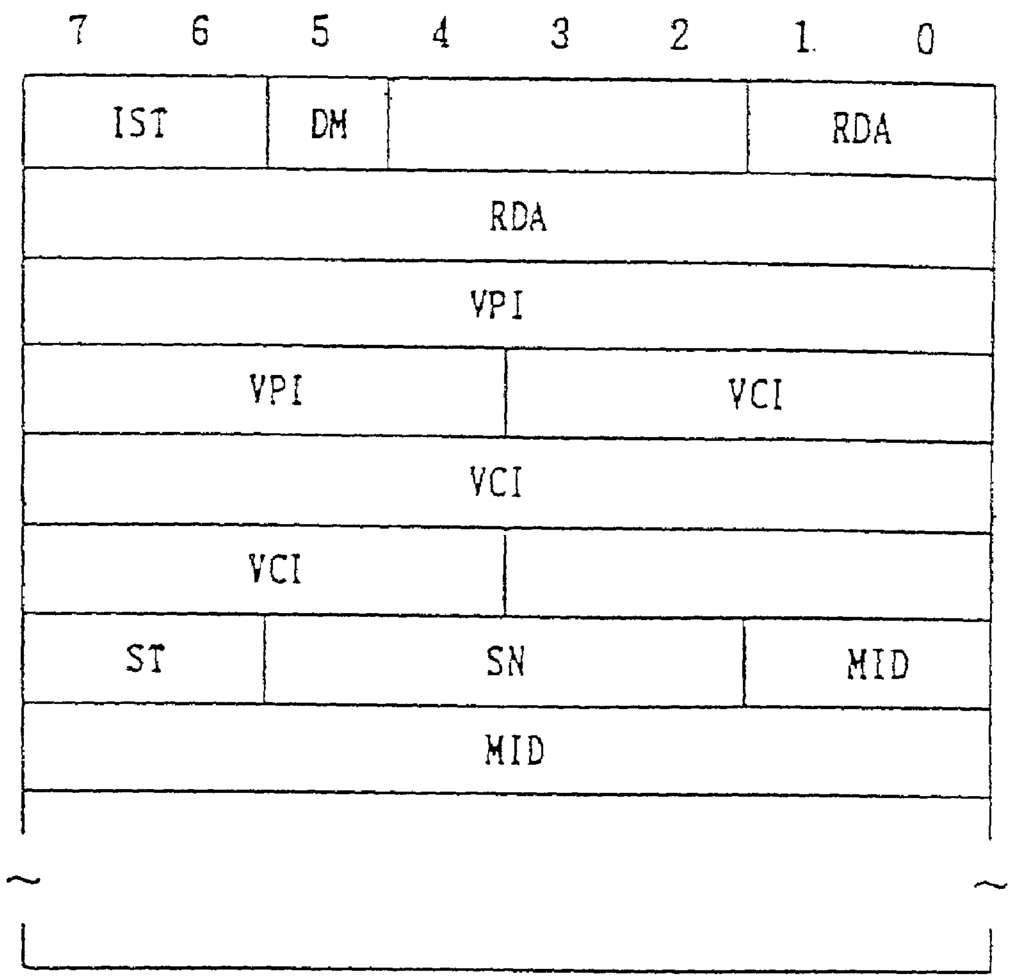

FIG. 424 shows the format of the cell input from the LP-COM(HLP02A) to the RMLP(b)(HMH01A)

Figure 425:
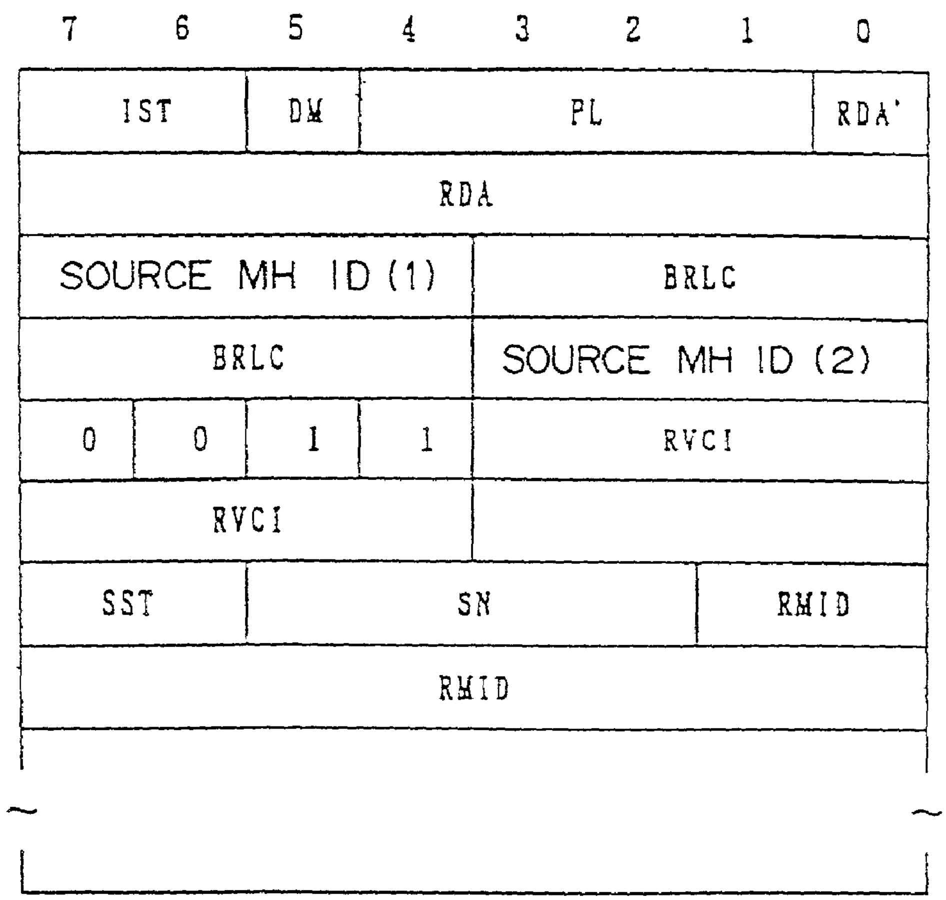

FIG. 425 shows the format of the cell input from the RMLP (b) (HMH01A) to the RMLP(c) (HMH04A).

Figure 426:
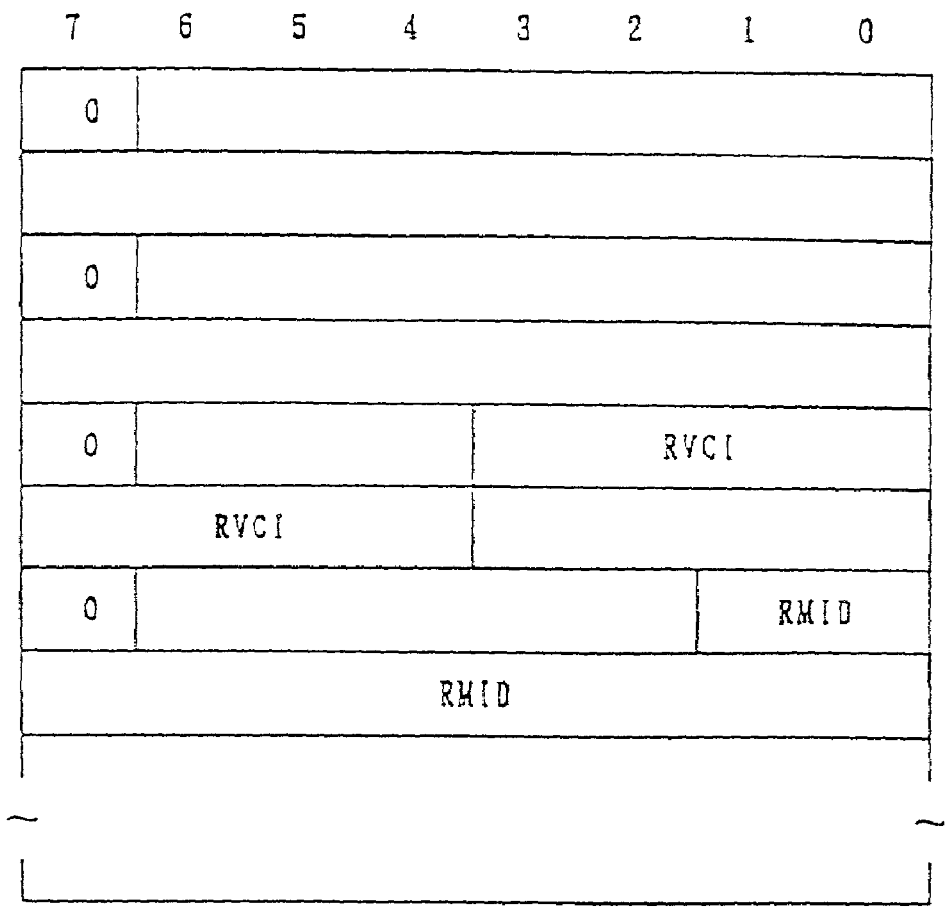

FIG. 426 shows the format of the timeout dummy cell input from the RMLP(b) (HMH01A) to the RMLP(c)(HMH04A)

Figure 427:
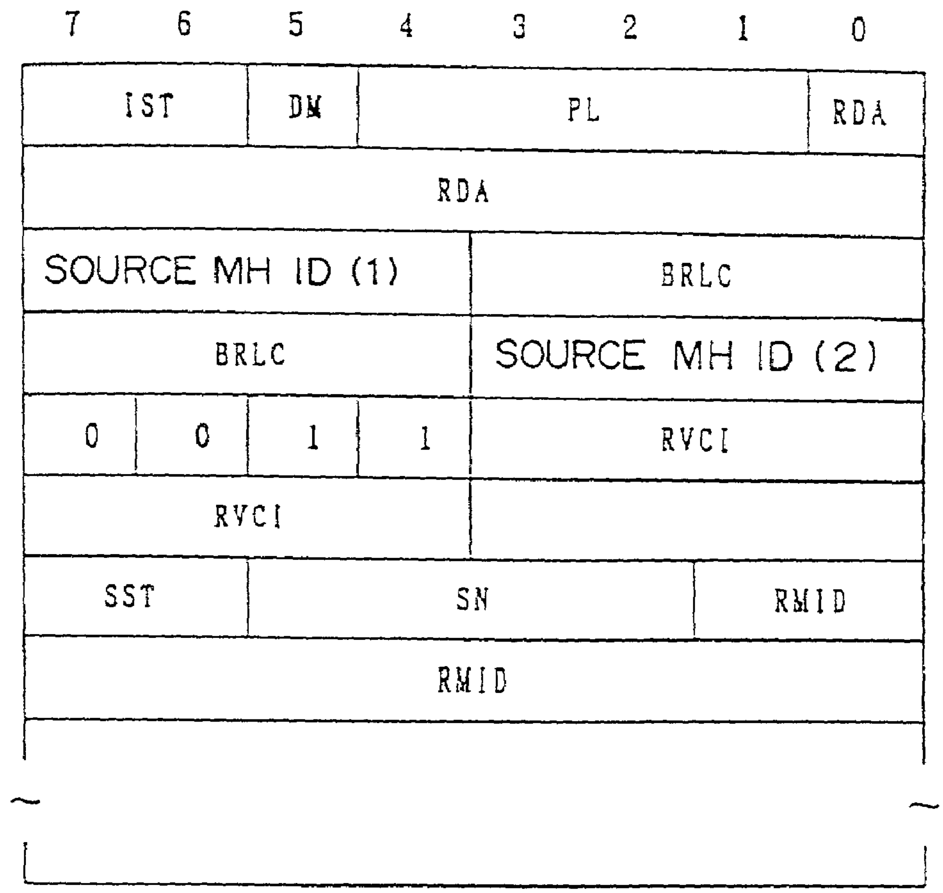

FIG. 427 shows the format of the cell input from the RMLP (c) (HMH04A) to the RMLP(d) (HMH02A).

Figure 428:
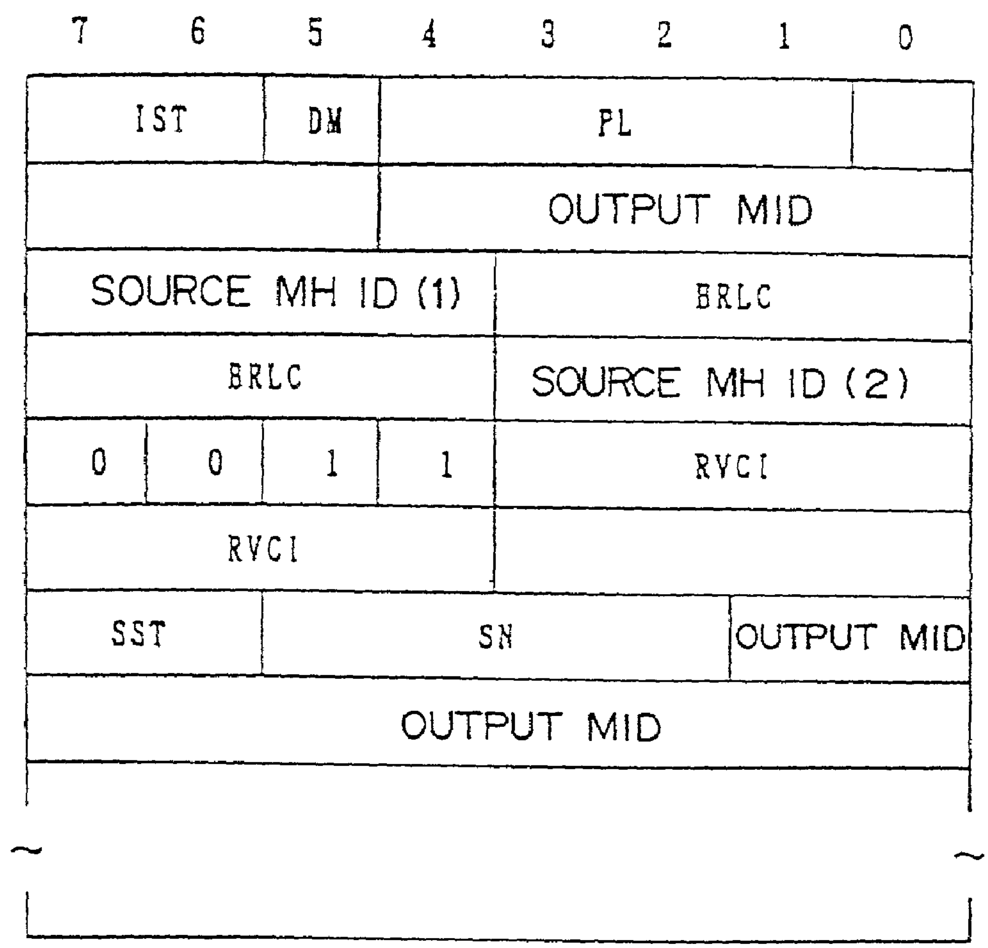

FIG. 428 shows the format of the cell input from the RMLP (d) (HMH02A) to the LP-COM(HLP02A, HLM00A).

Figure 429:
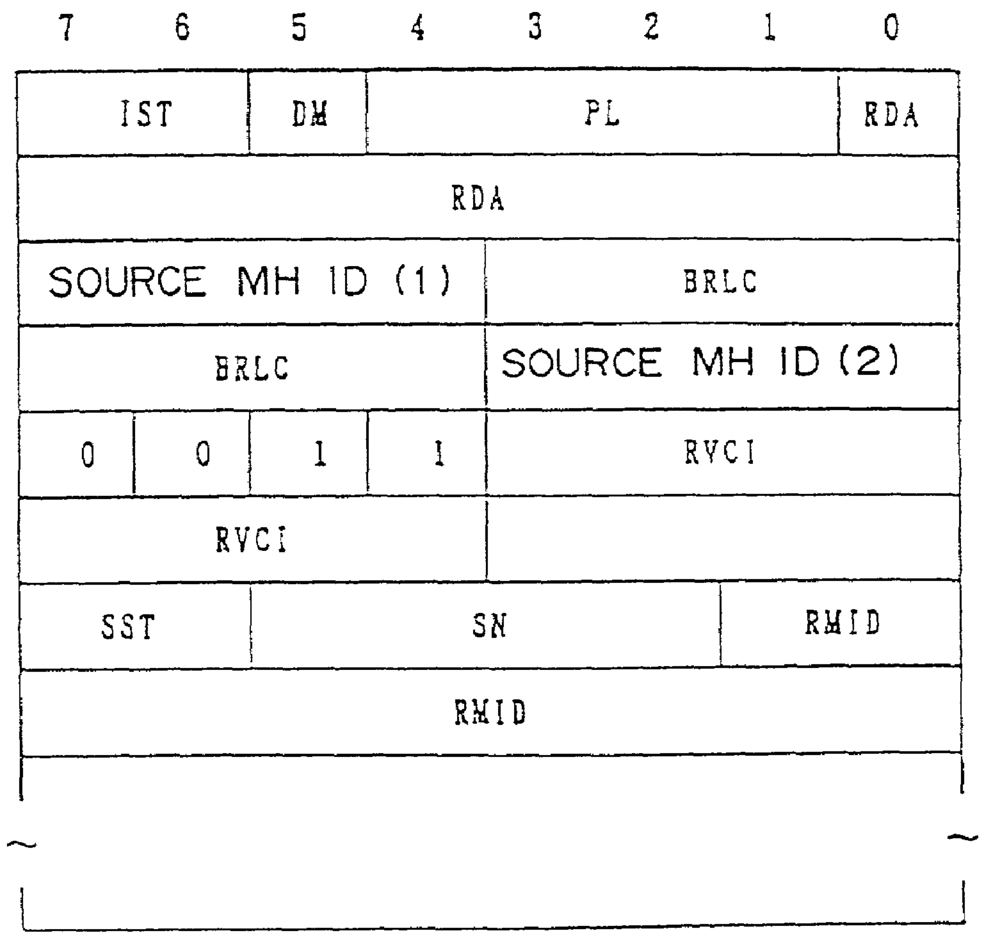

FIG. 429 shows the format of the cell input from the RMLP (d) (HMH02A) to the LP-COM(HLP02A, HLM01A).

Figure 430:
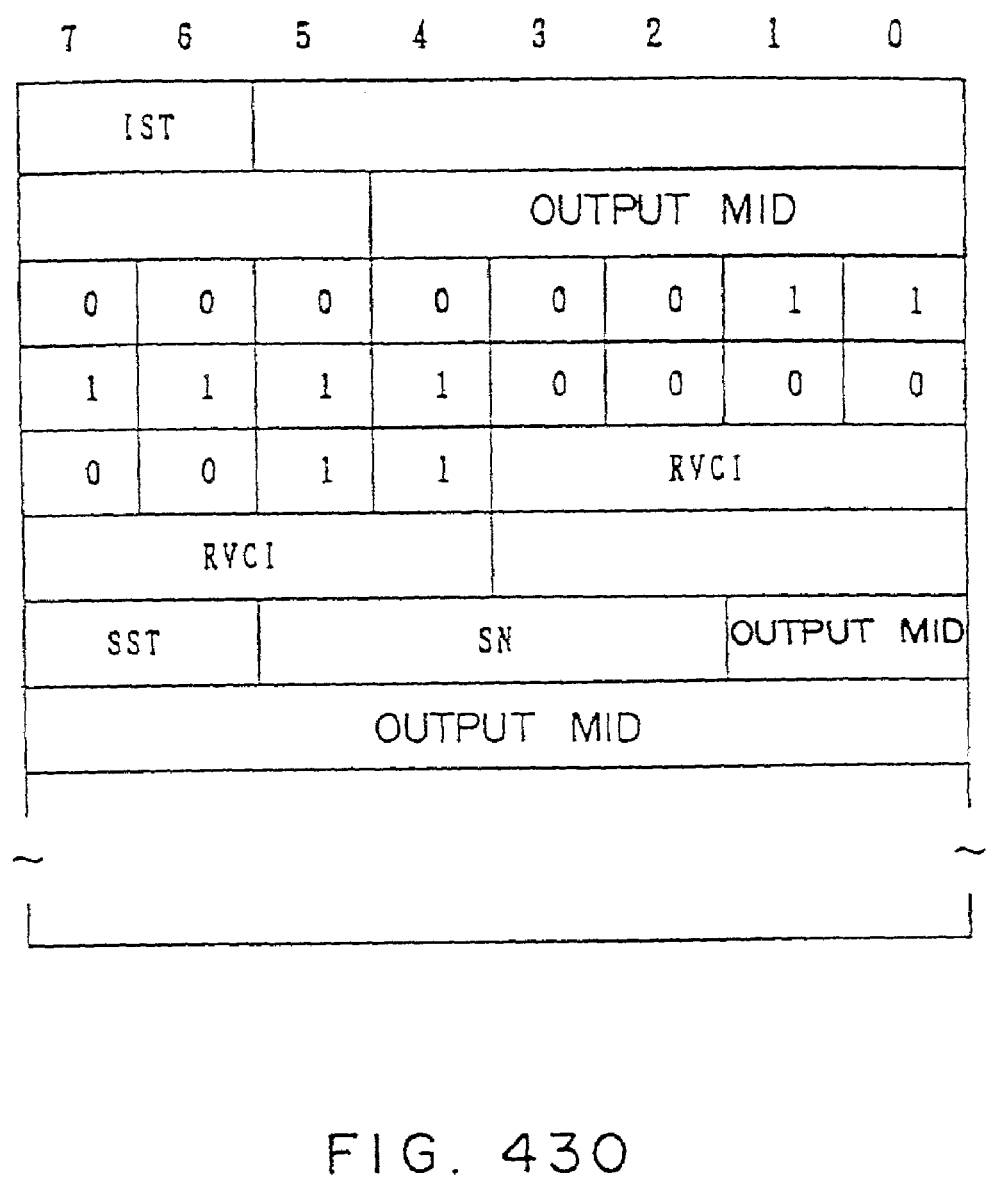

FIG. 430 shows the format of the cell input from the RMLP (HMH02) to the RMUX(HMX12A).

Figure 431:
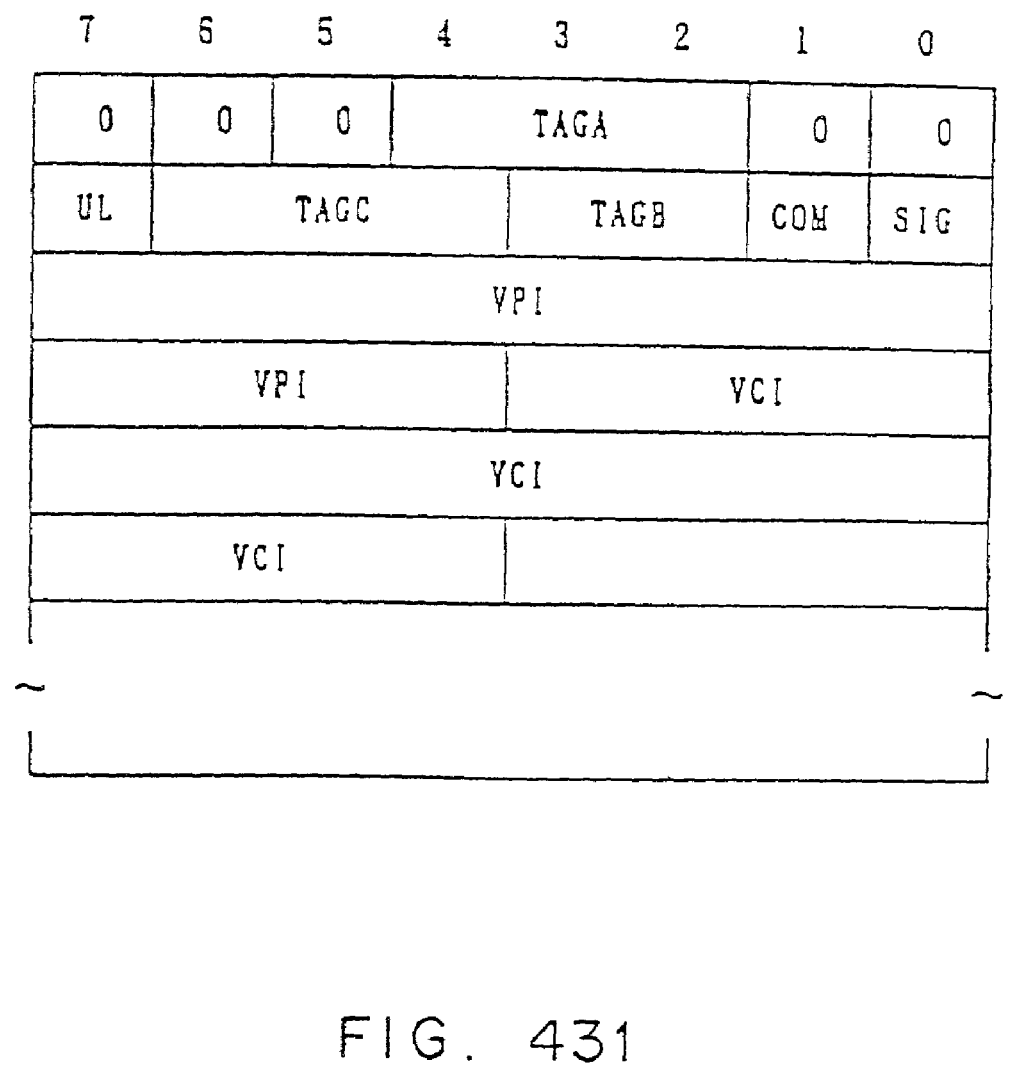

FIG. 431 shows the format of the cell input from the RMIX (HMX12A) to the ASSW.

FIG. 432 shows the error flag at the SMLP.

FIG. 433 shows the error flag at the RMLP.

FIG. 434 shows the initialization of the MH-COM.

Figure 435:
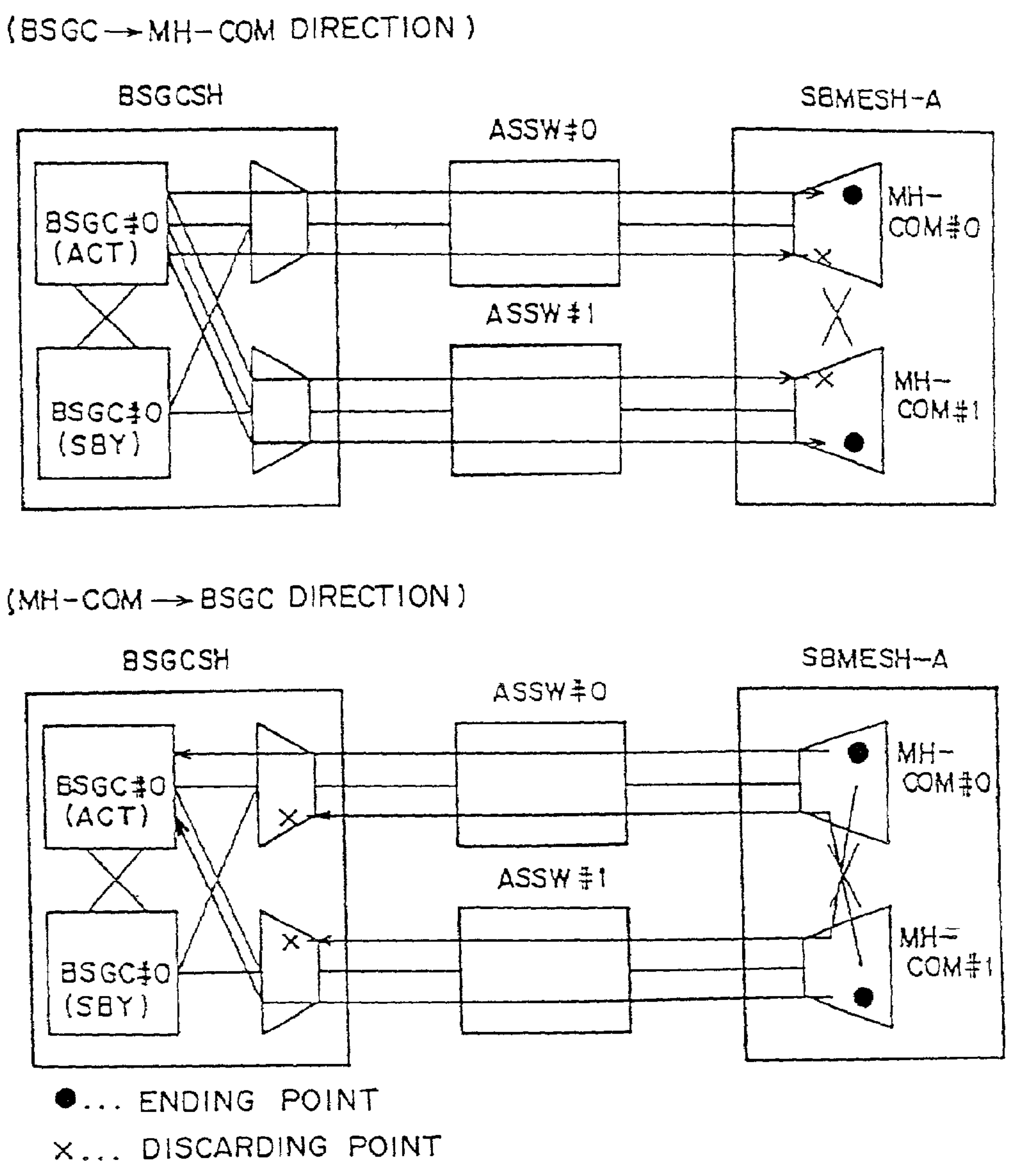

FIG. 435 shows the flow of the cell in the intra-station communications

FIG. 436 shows an example of the VPI/VCI value of the intra-station communications cell.

Figure 437:
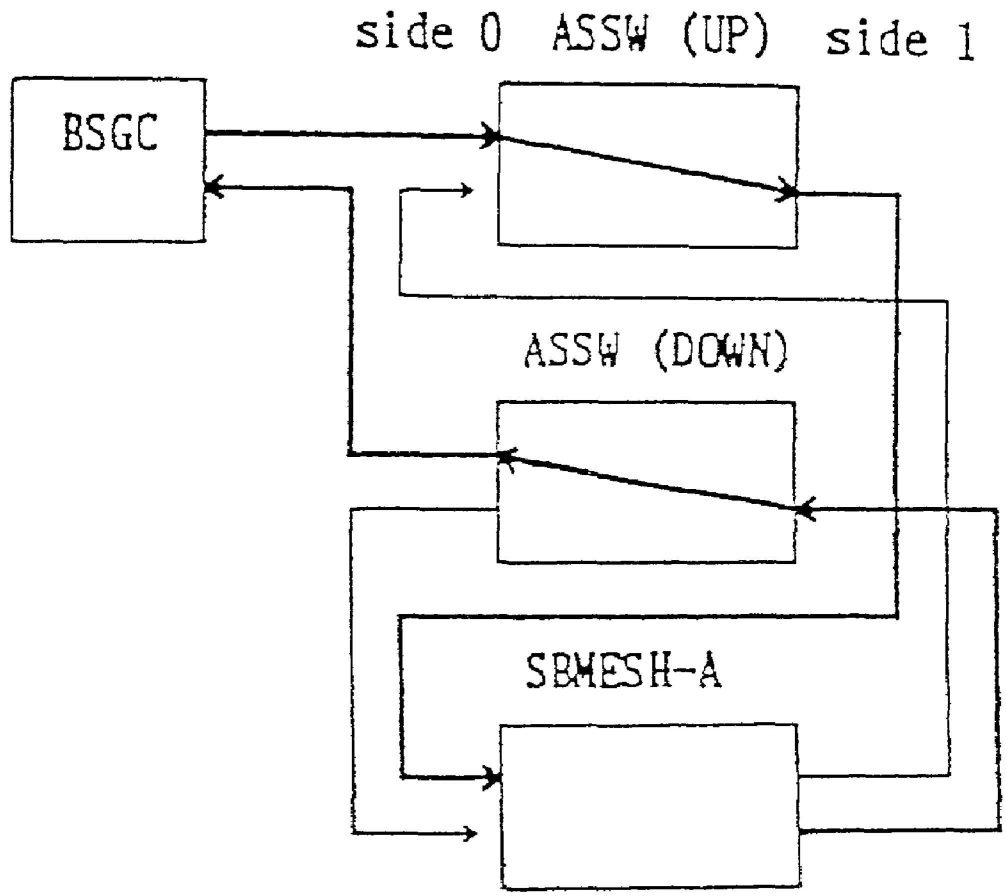

FIG. 437 shows the intra-station communications link between the BSGC and SBMESH.

Figure 438:
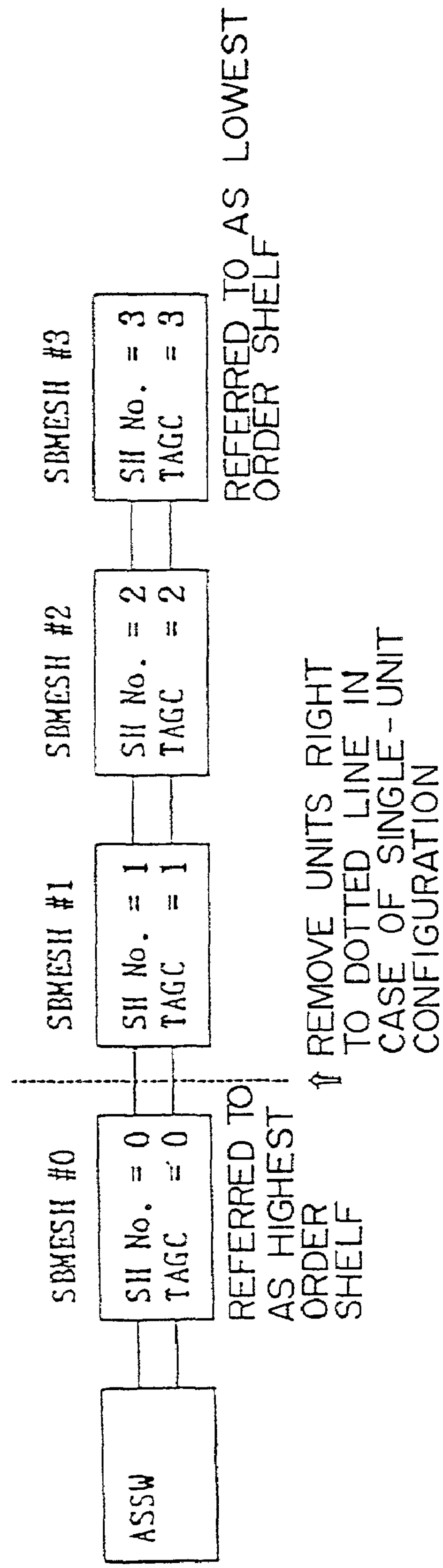

FIG. 438 show the relationship between the shelf number of the SBMESH and the value of the tag.

FIG. 439 shows the tag field of the cell specifying a particular SBMESH.

FIG. 440 shows the tag field of the cell specifying a particular SBMH.

Figure 441:
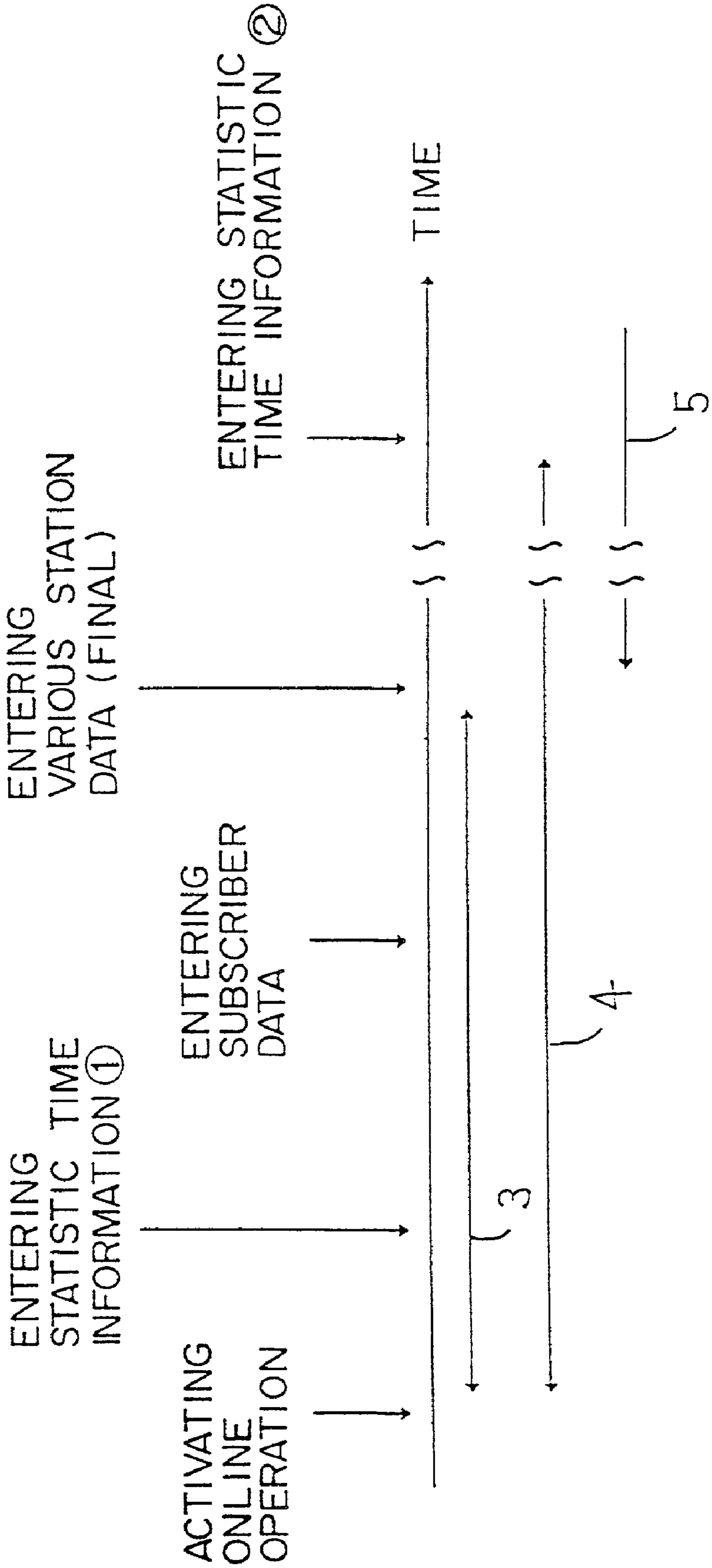

FIG. 441 shows the process of preventing an error which may occur at the initialization of the LP unit.

Figure 442:
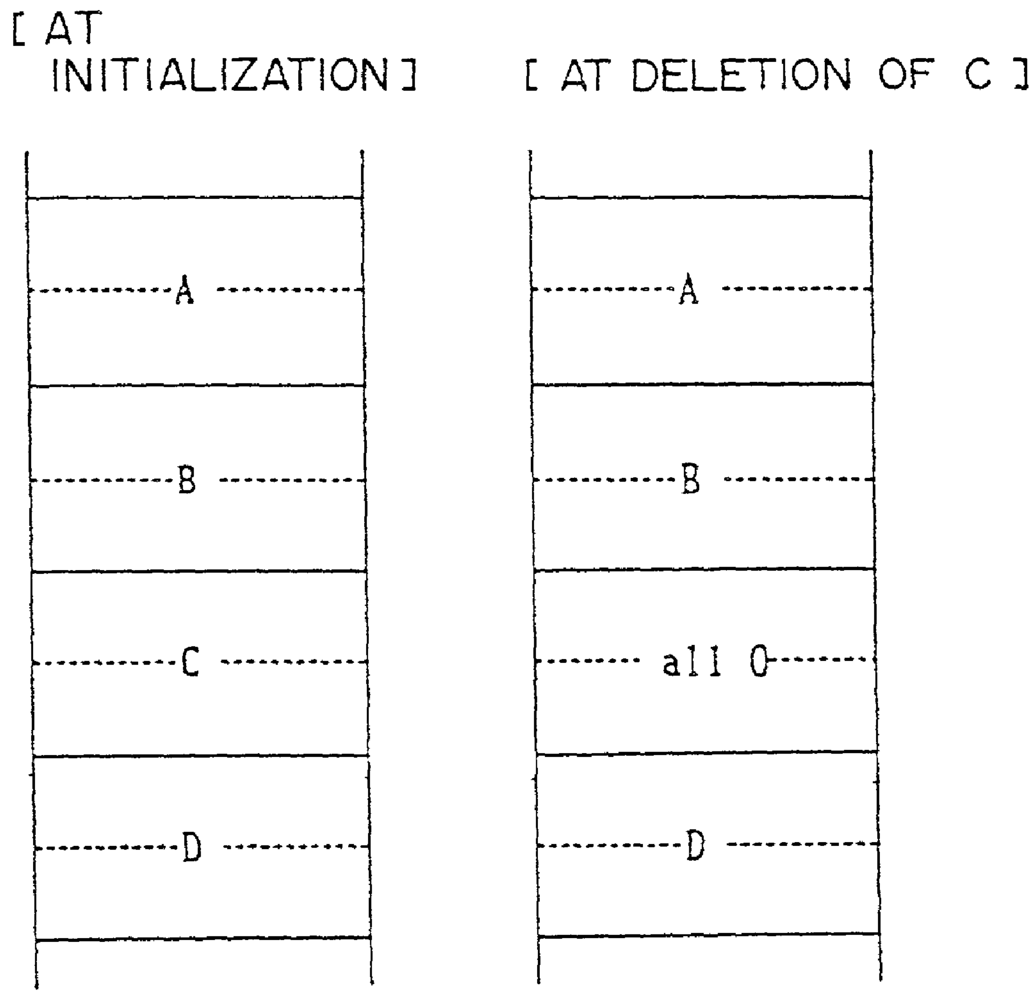

FIG. 442 shows an example of changing a parameter in the subscriber data entry.

Figure 443:
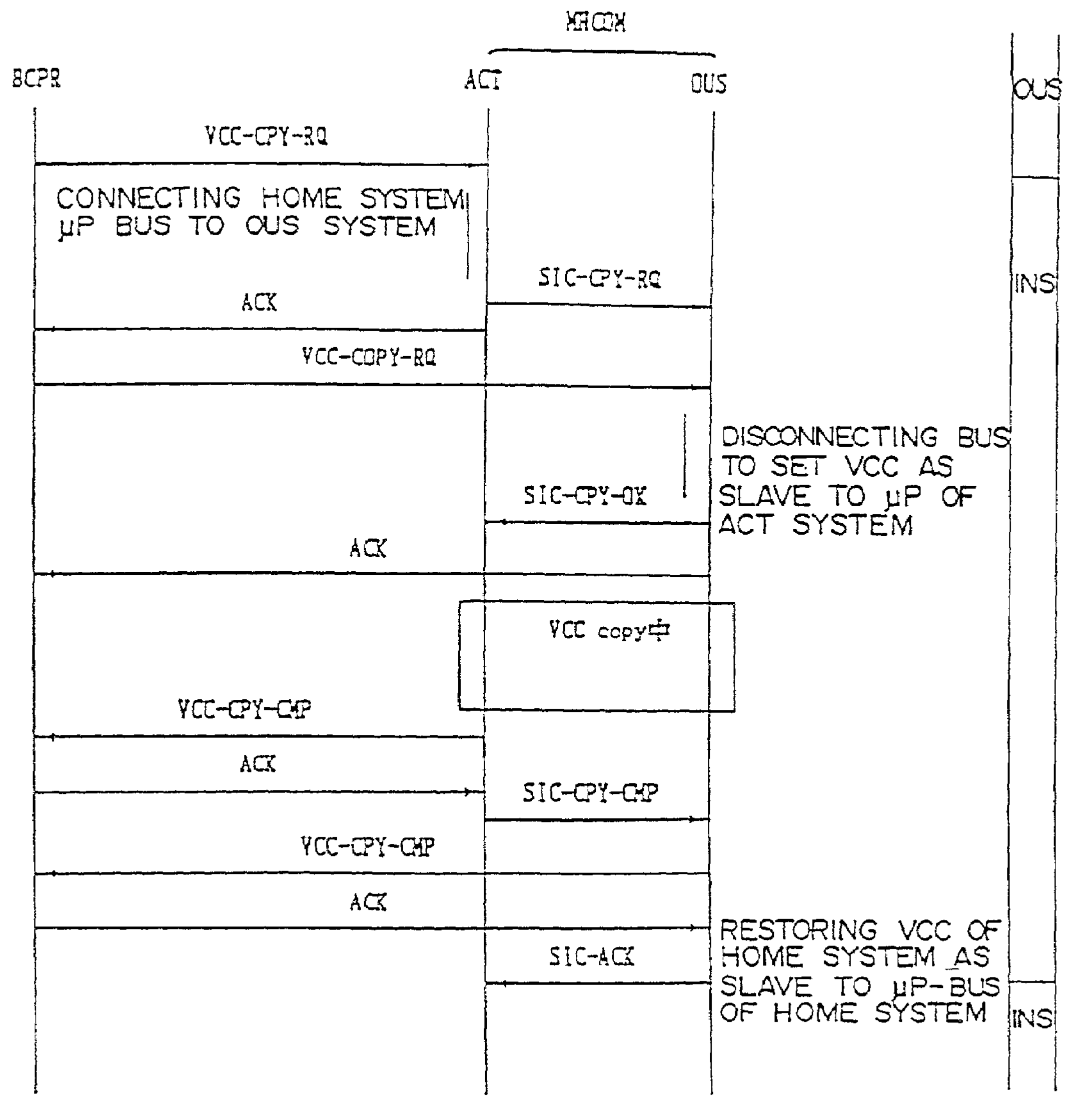

FIG. 443 shows the INS process of the MH-COM.

FIG. 444 shows the outline of the operations performed when an MH-COM fault occurs.

FIG. 445 shows the sequence of a fault which is reported by the E-MSCN in the home system and occurs in the standby system.

FIG. 446 shows the sequence of a fault which is reported by the E-MSCN in the home system and occurs in the active system FIG. 447 shows the sequence of a fault which is reported by the E-MSCN in the mate system and occurs in the standby system.

FIG. 448 shows the sequence of a fault which is reported by the E-MSCN in the mate system and occurs in the active system.

Figure 449:
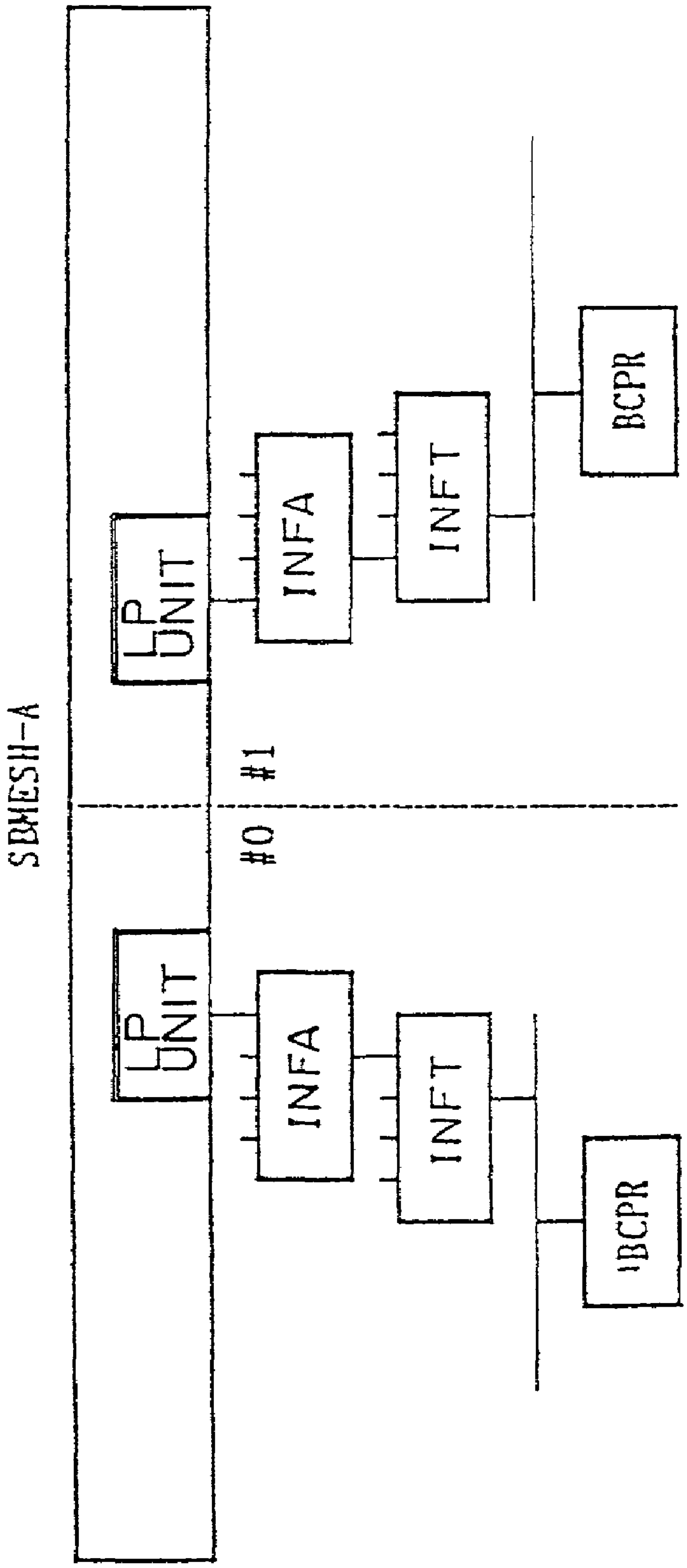

FIG. 449 shows the interface between the SBMESH and the BCPR.

FIG. 450 shows the INF MSCN 32 bits.

Figure 451:
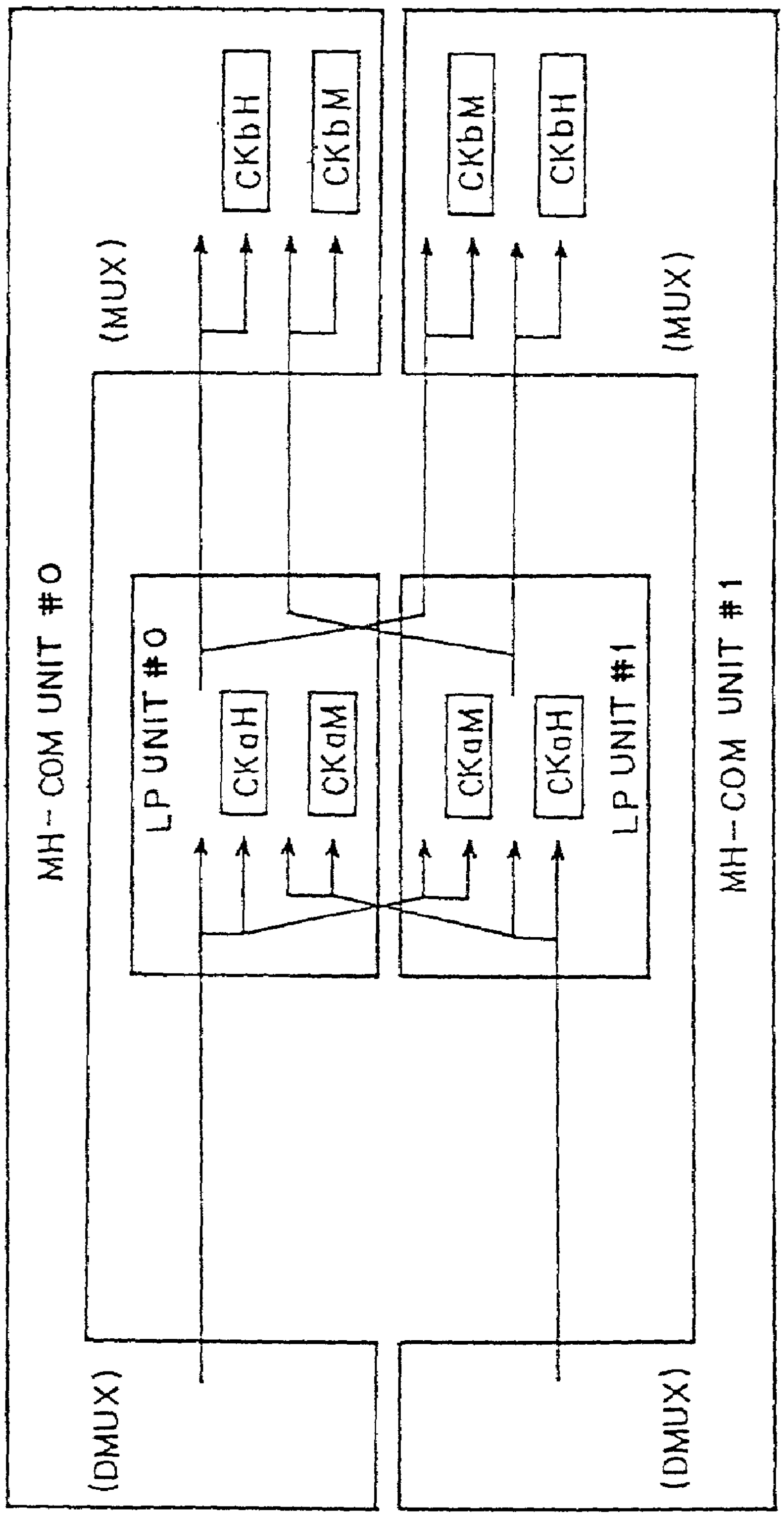

FIG. 451 shows the concept of checking the MSCN point related to the inter-system cross-connection of the MH-COM and LP.

Figure 452:
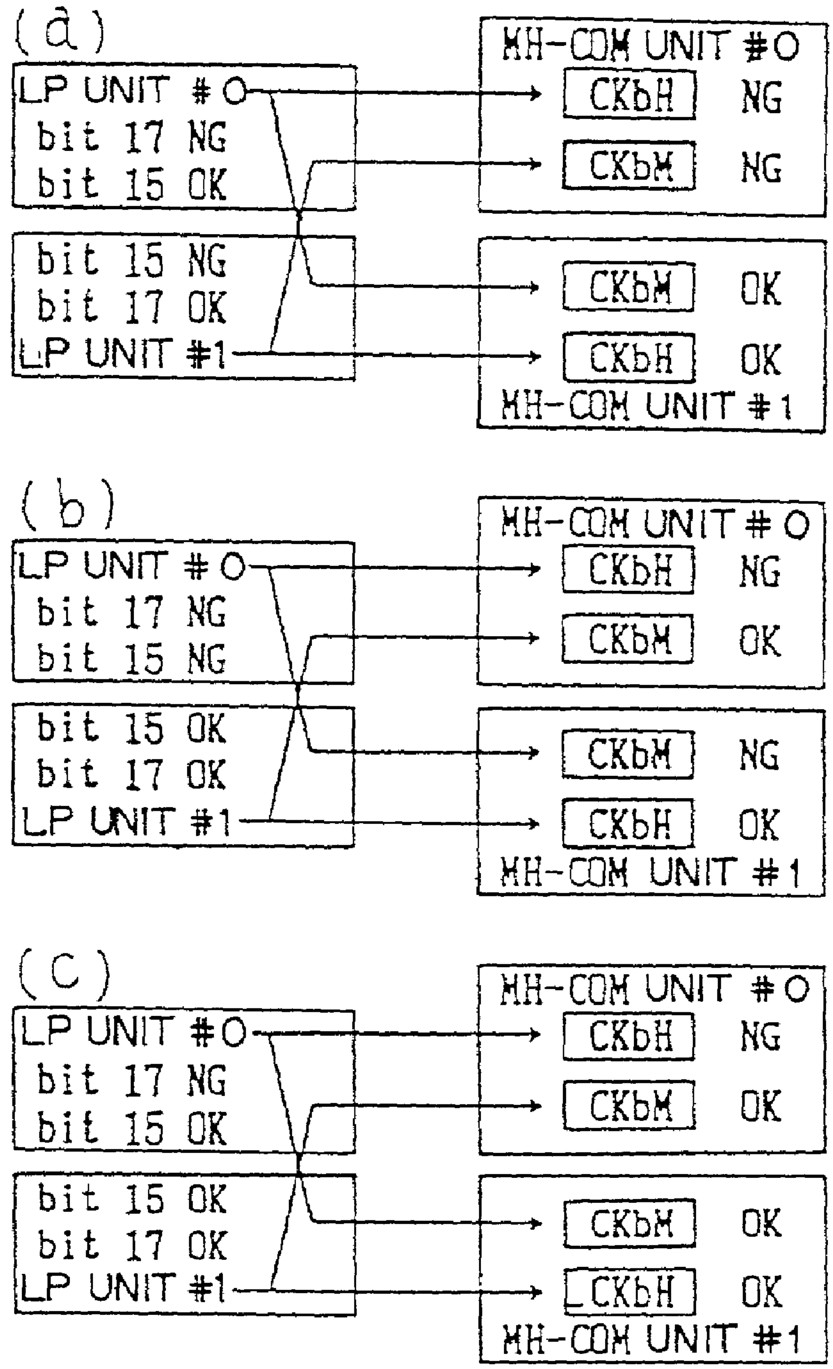

FIG. 452 shows the relationship (1) between the states of 15 and 17 bits and the fault in the INF MSCN.

Figure 453:
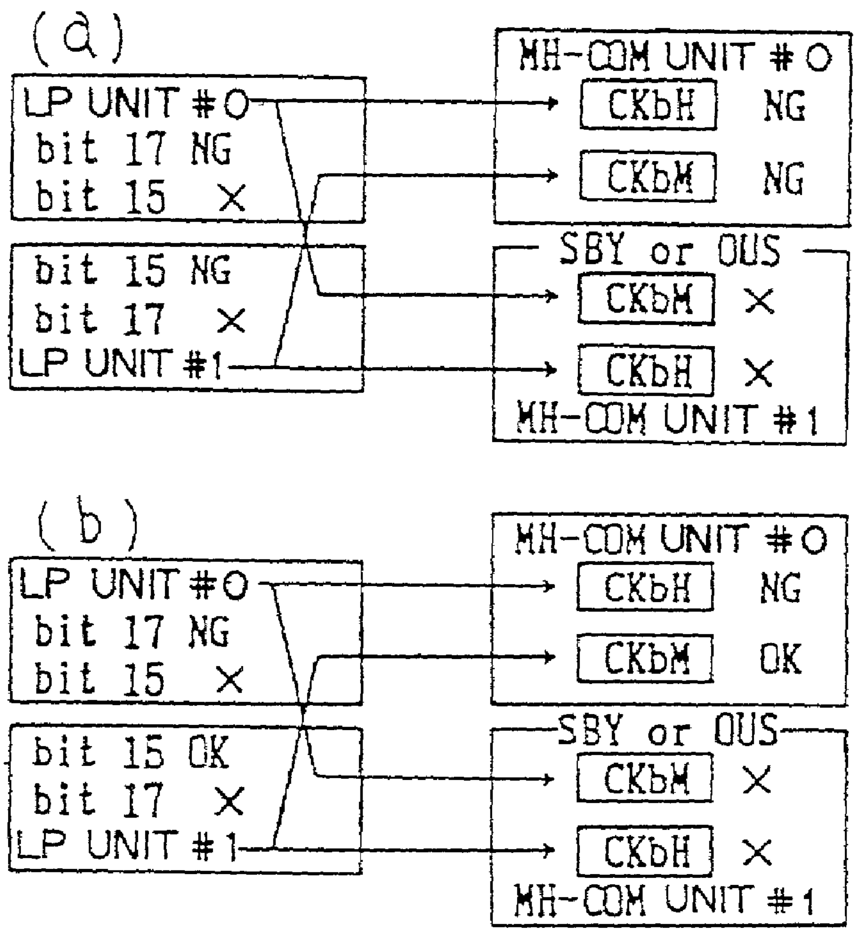

FIG. 453 shows the relationship (2) between the states of 15 and 17 bits and the fault in the INF MSCN.

Figure 454:
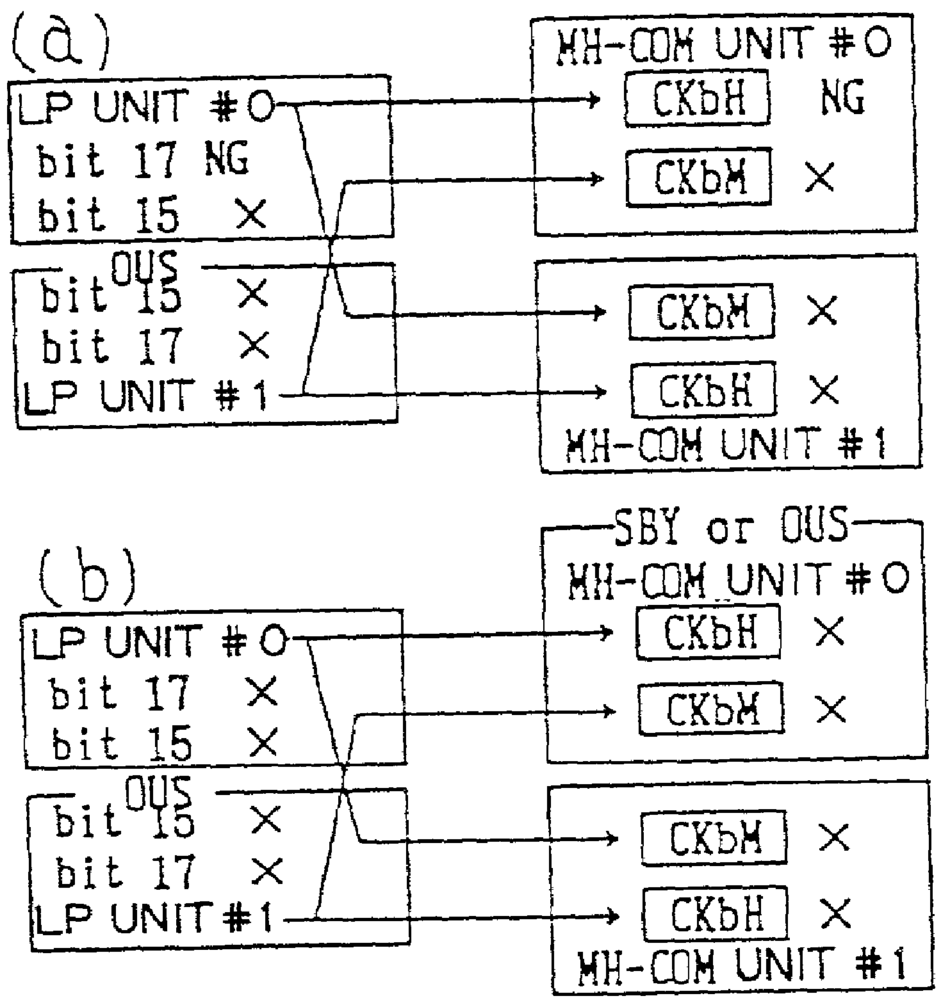

FIG. 454 shows the relationship (3) between the states of 15 and 17 bits and the fault in the INF MSCN.

Figure 455:
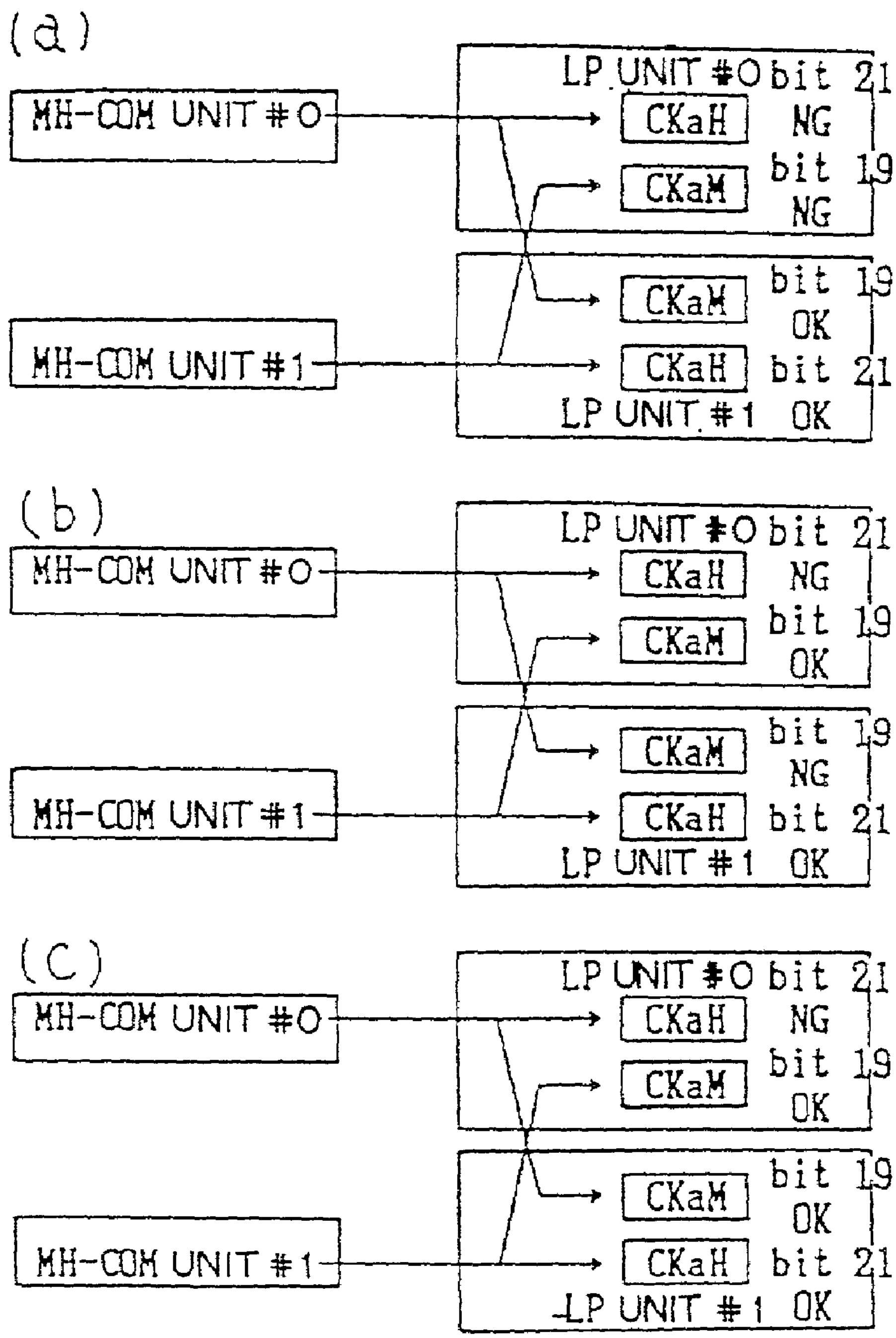

FIG. 455 shows the relationship (1) between the states of 19 and 21 bits and the fault in the INF MSCN.

Figure 456:
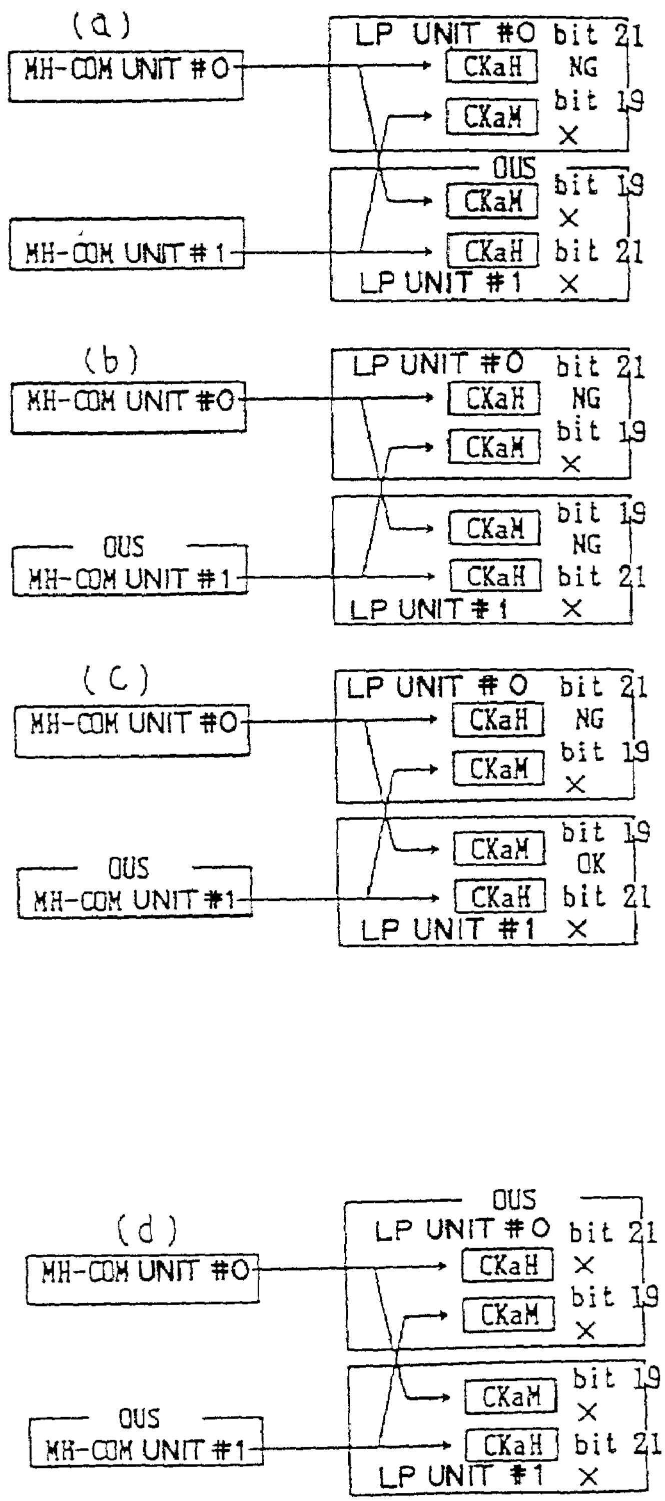

FIG. 456 shows the relationship (2) between the states of 19 and 21 bits and the fault in the INF MSCN.

Figure 457:
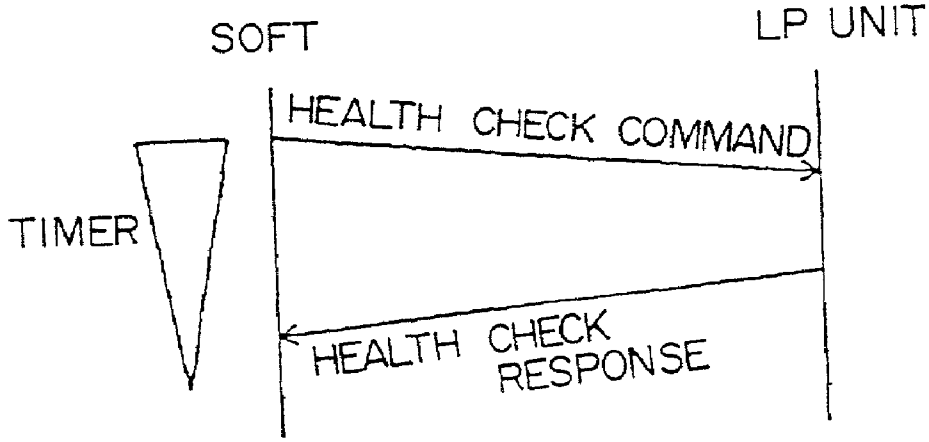

FIG. 457 shows the concept of a health check of the LP.

FIG. 458 shows the ACT signal process in switching system in the MH-COM.

Figure 459:
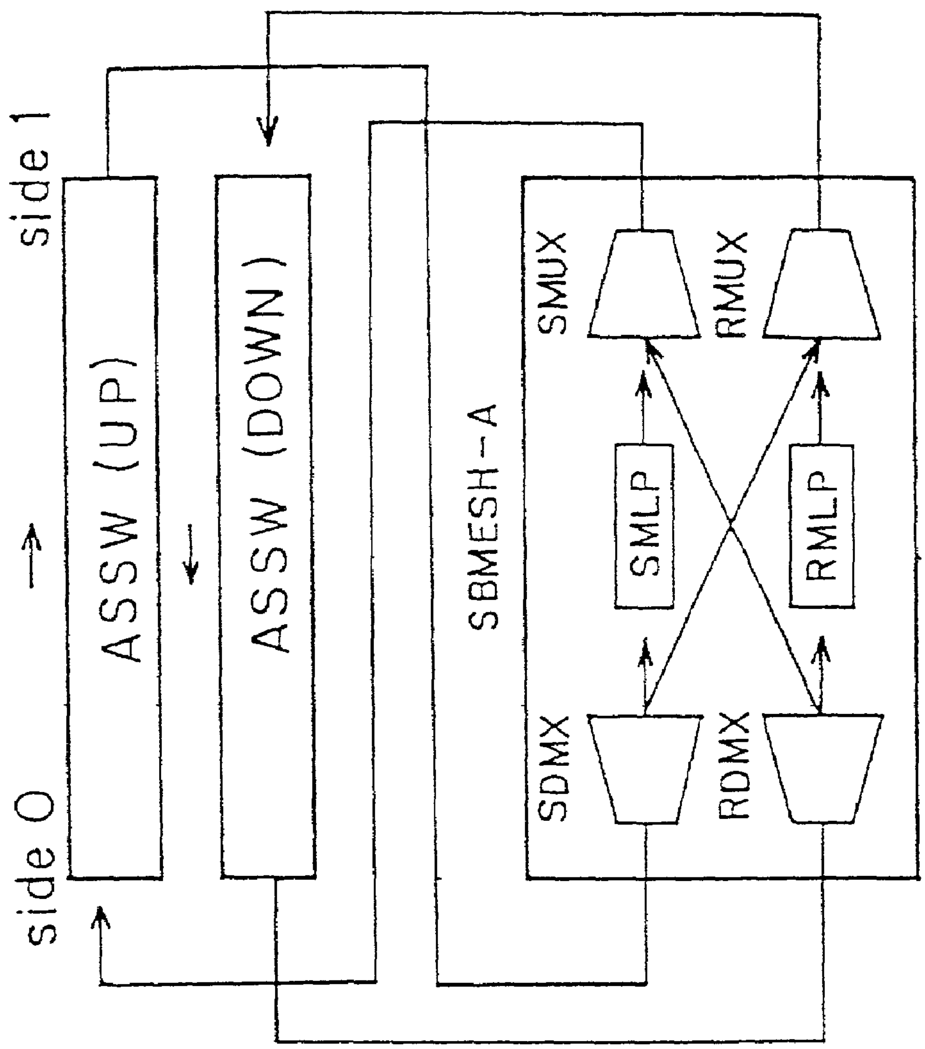

FIG. 459 shows the loopback test of the SBMESH using the TCG.

Figure 460:
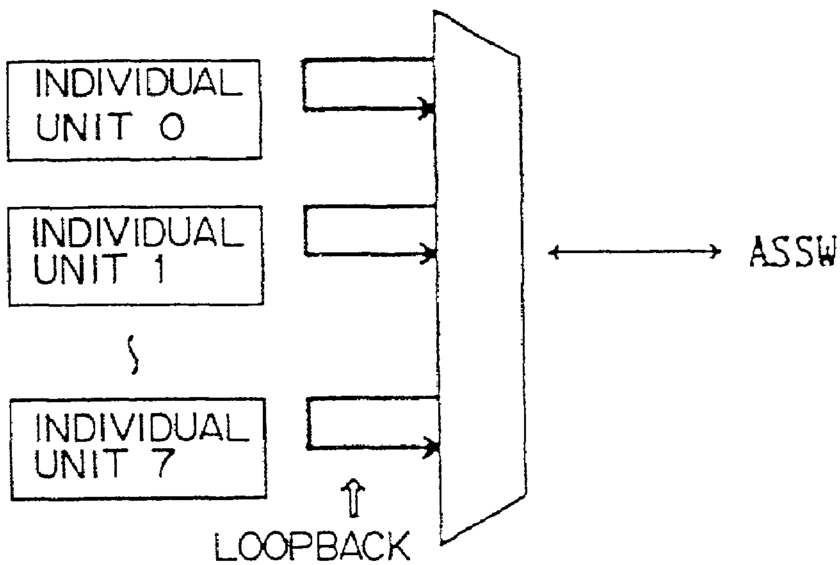

FIG. 460 shows the loopback at the individual unit accommodated in the SIFSH.

Figure 461:
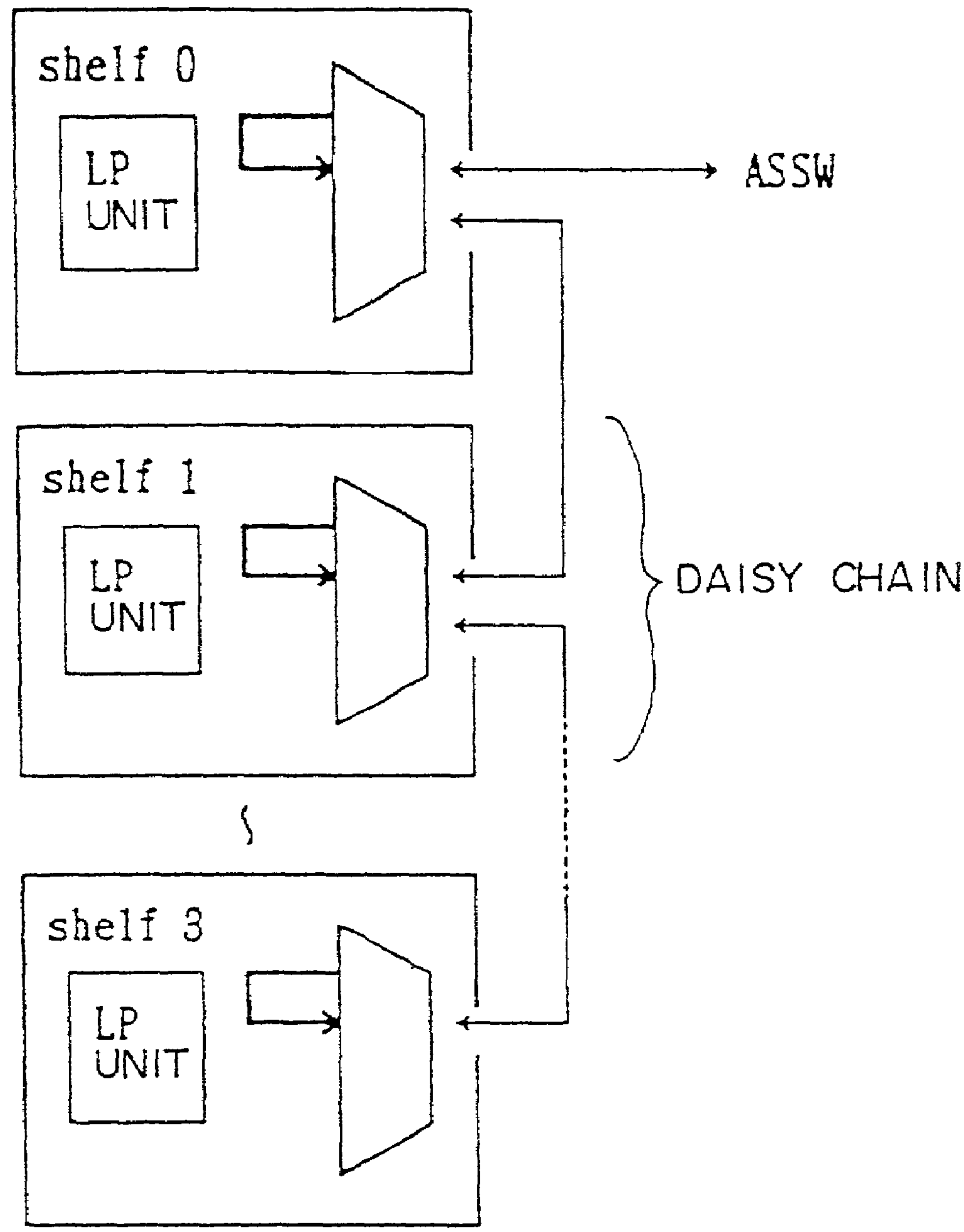

FIG. 461 shows the loopback at the LP of each SBMESH.

FIG. 462 shows an example of the tag information of a test cell transmitted from the TCG to the SBMESH.

Figure 463:
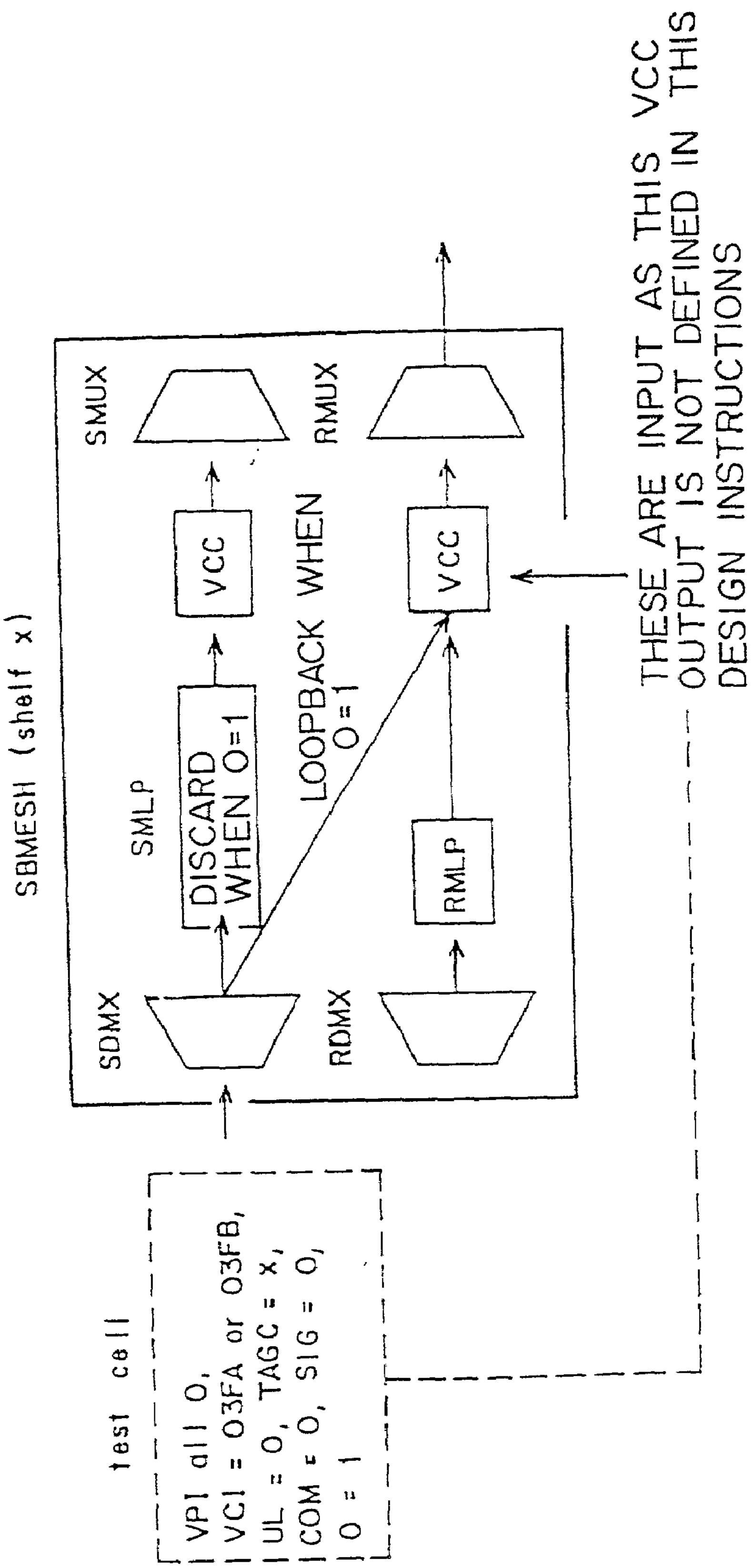

FIG. 463 shows the process performed on a test cell input to the SBMESH.

Figure 464:
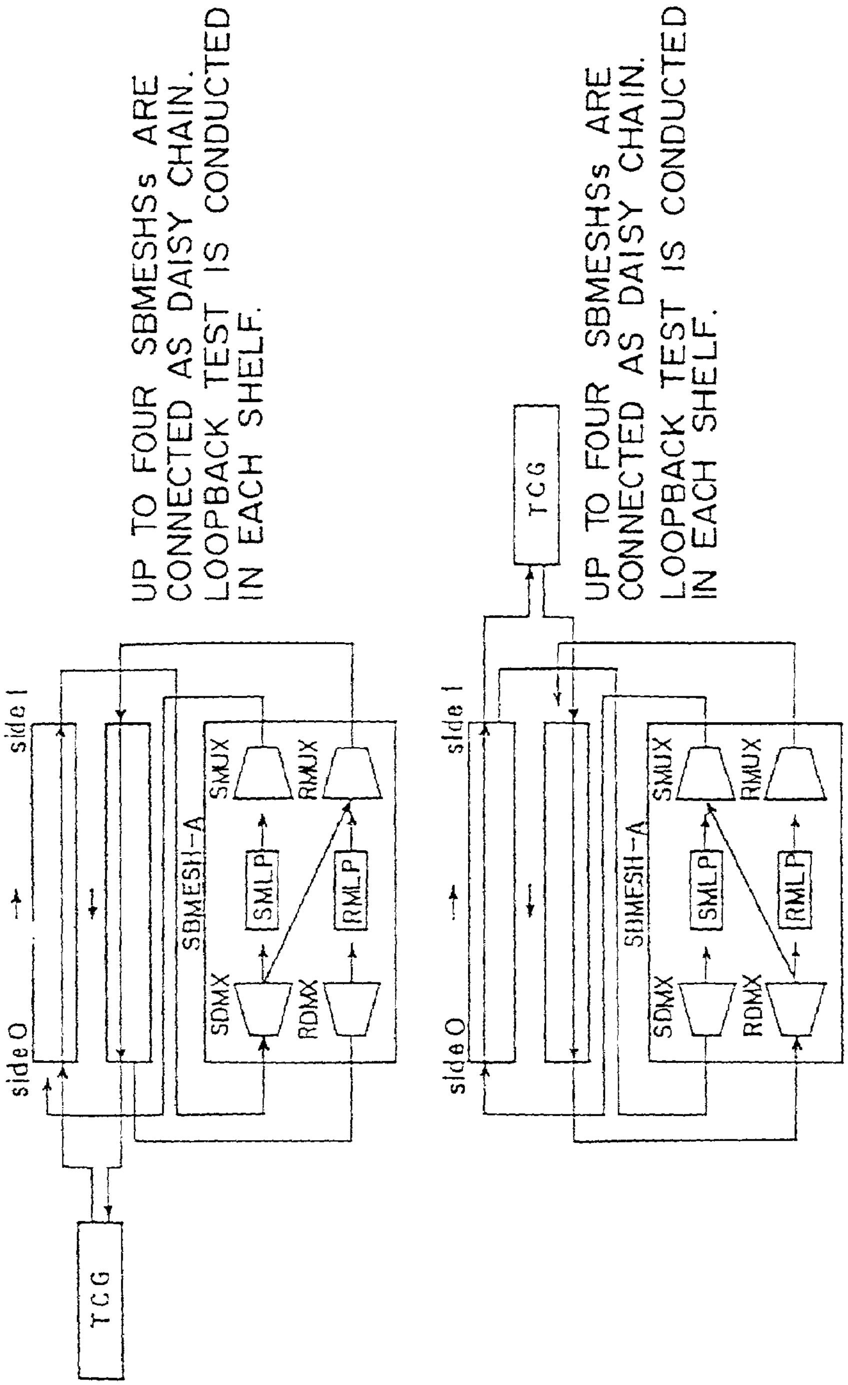

FIG. 464 shows the test for confirming the DMUX and MUX functions of the SBMESH.

Figure 465:
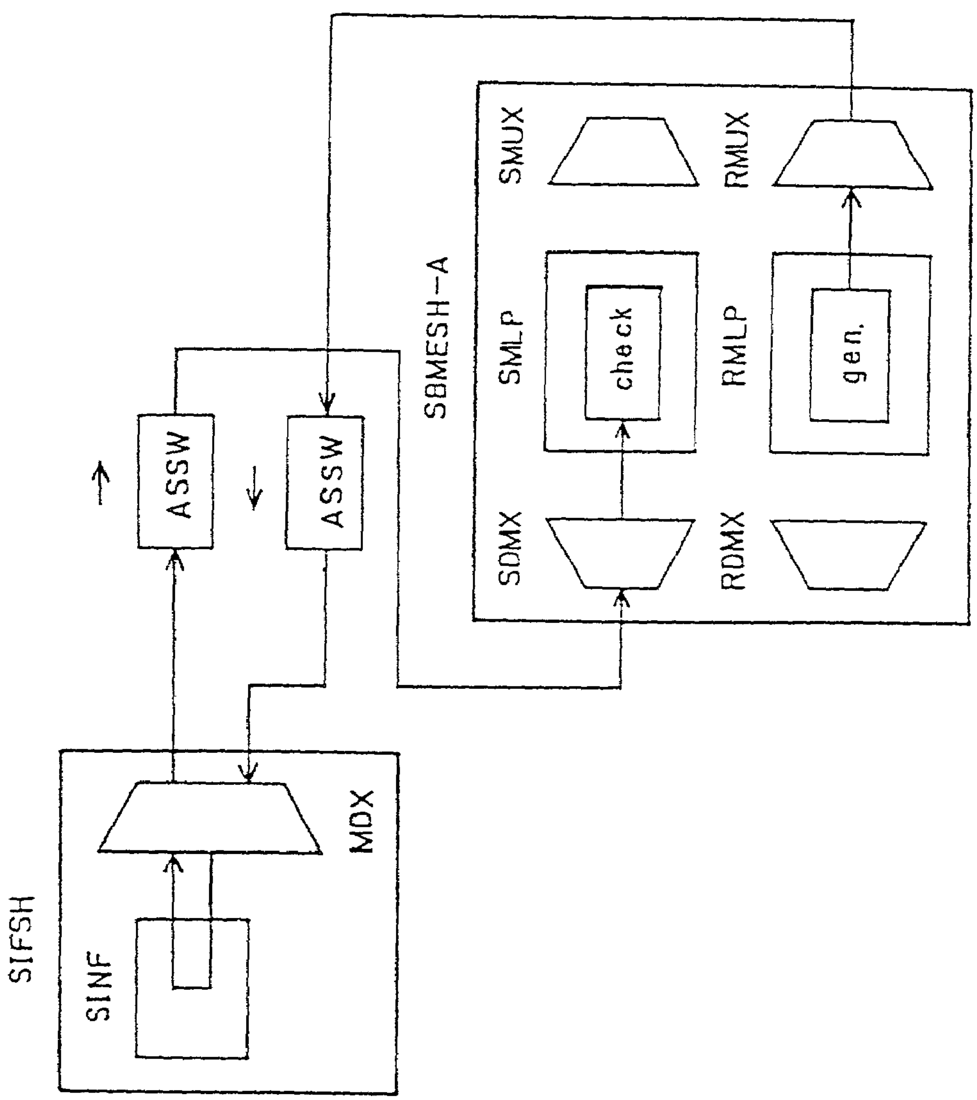

FIG. 465 shows the SNI-SBMESH-A PVC test.

FIG. 466 shows the existence of a block in the SINF and DT, and a loopback method.

Figure 467:
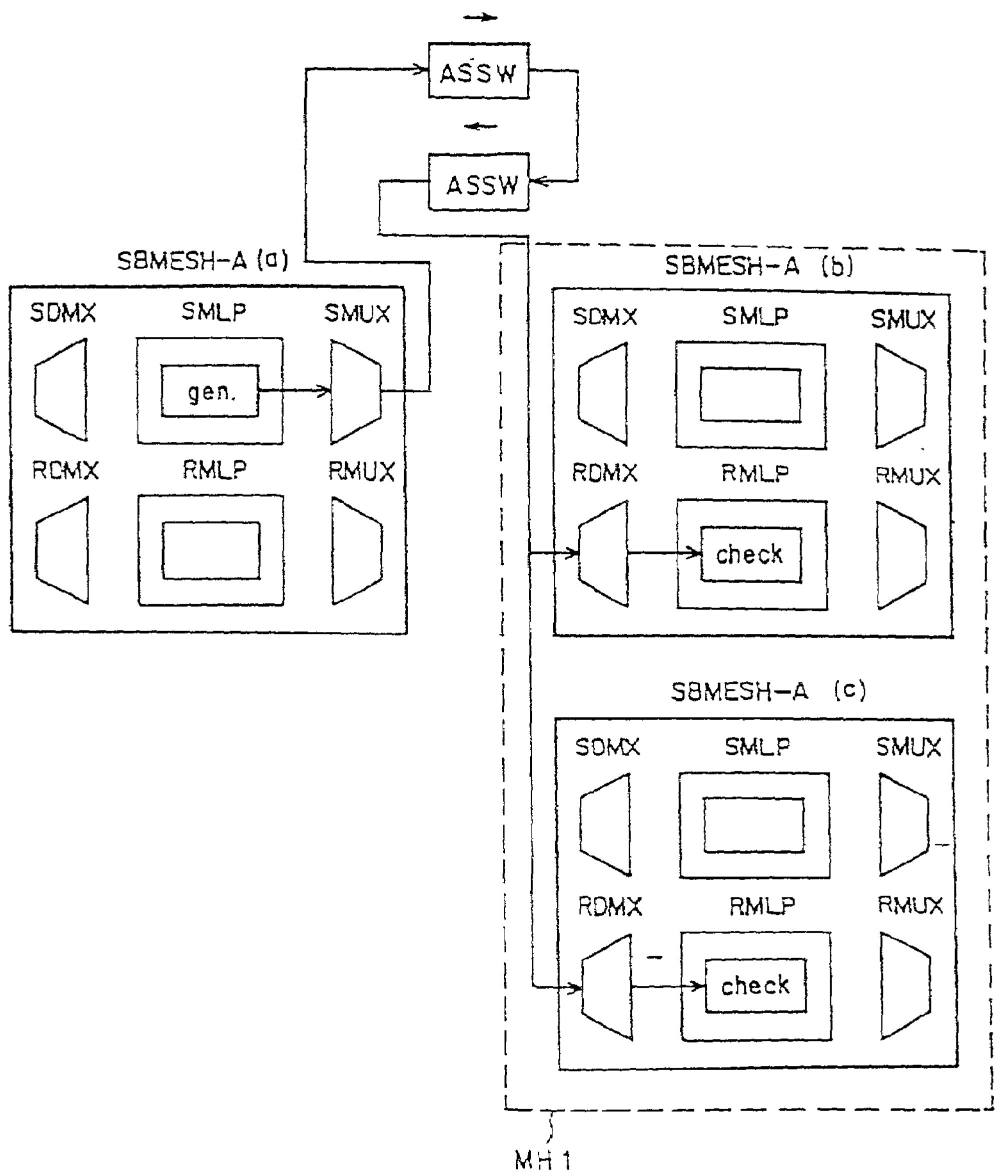

FIG. 467 shows the MESH-MH PVC test.

Figure 468:
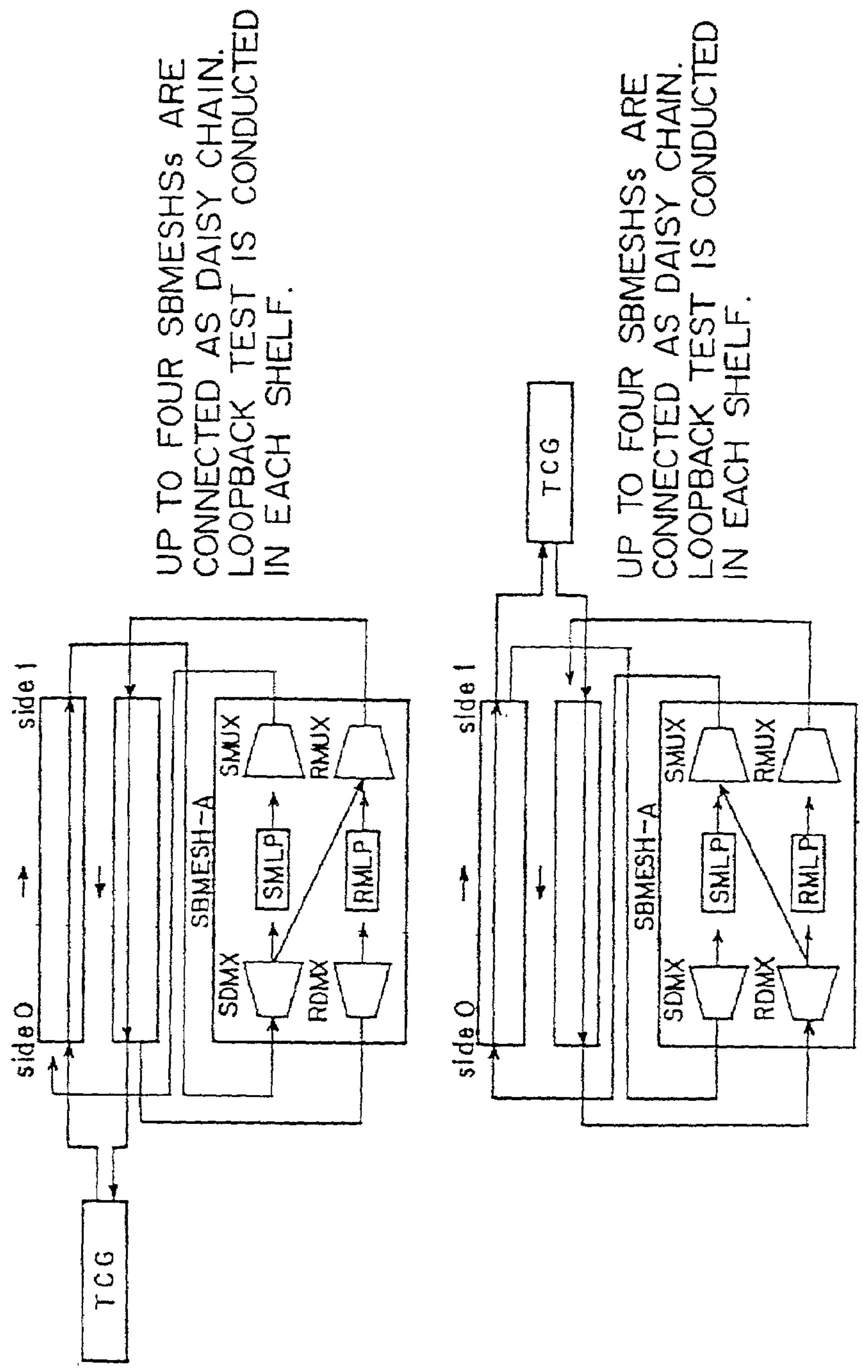

FIG. 468 shows the outline of the method of specifying a DA and the test in specifying the type in the MESH-MH PVC test.

FIG. 469 shows the result of the PVC test contained in the status as a response to the PVC test result request command.

Figure 470:
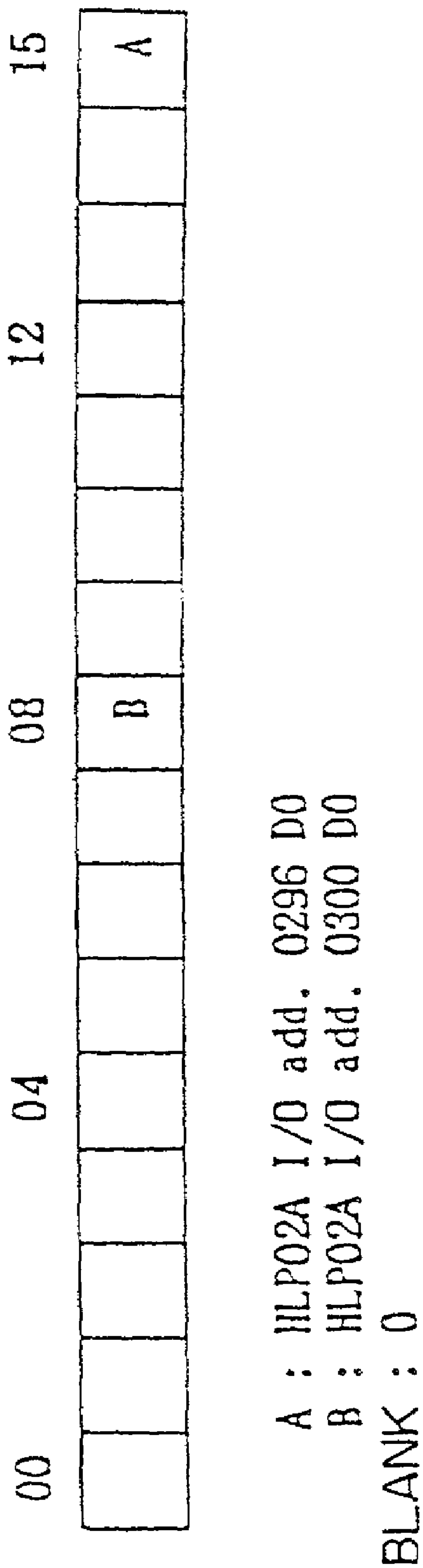

FIG. 470 shows an example of the test cell transmission unit fault indicator area.

Figure 471:
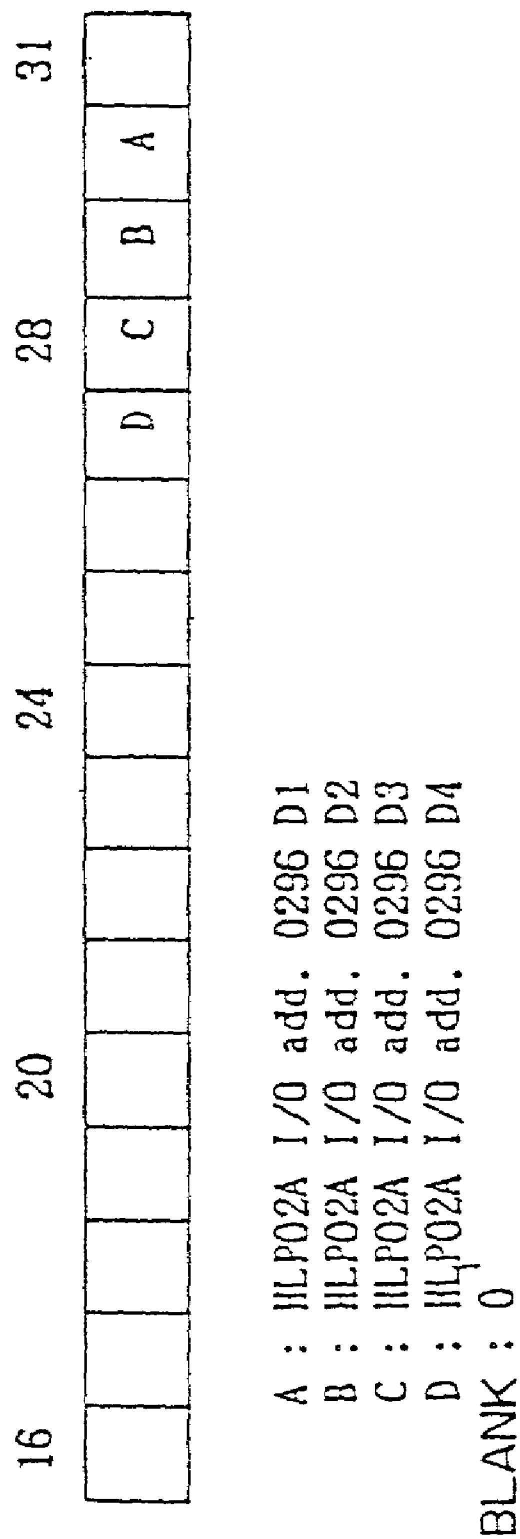

FIG. 471 shows an example of the test cell receiving unit fault indicator area.

Figure 472:
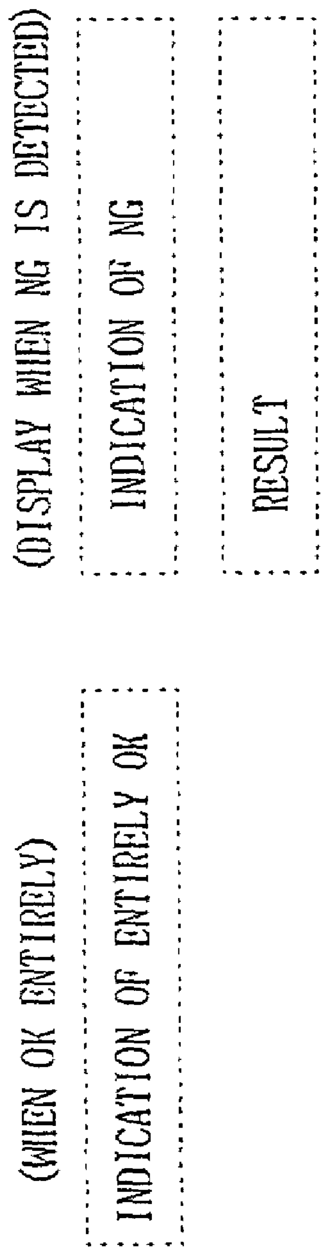

FIG. 472 shows the printout result of the SNI-SBMESH PVC test.

Figure 473:
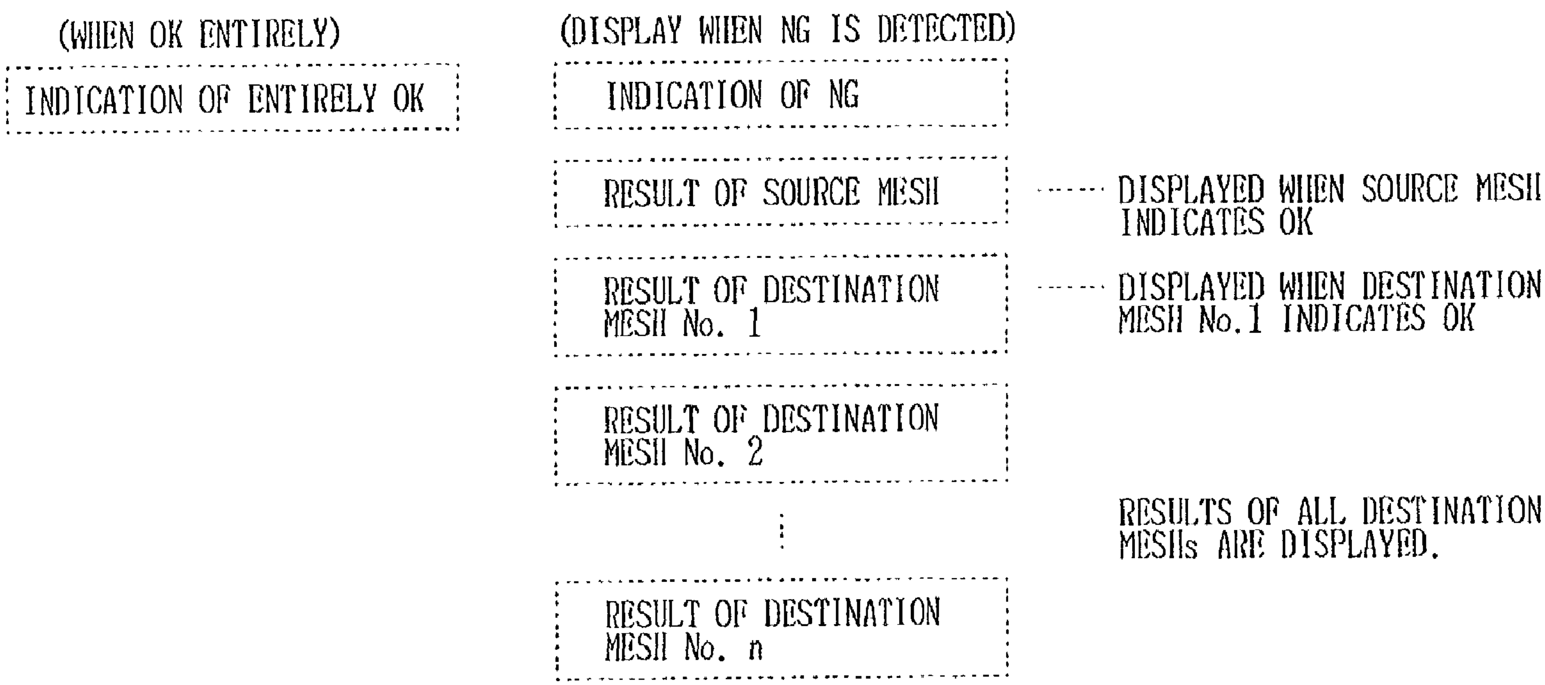

FIG. 473 shows the printout result of the MESH-MH PVC test (using a specific test DA).

Figure 474:
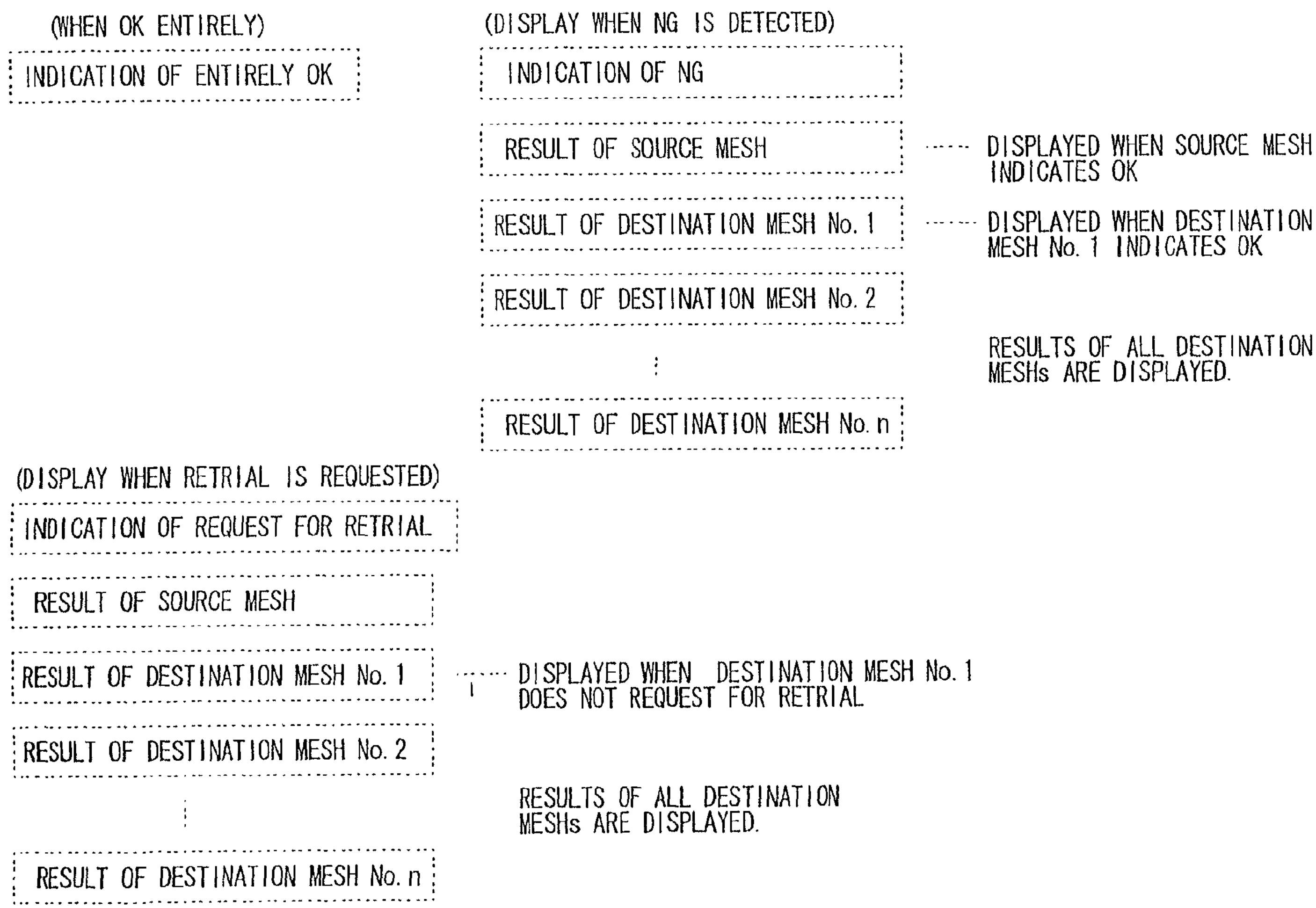

FIG. 474 shows the printout result of the MESH-MH PVC test (using an allocated DA).

FIG. 475 shows the outline of the MH-COM diagnostics.

Figure 476:
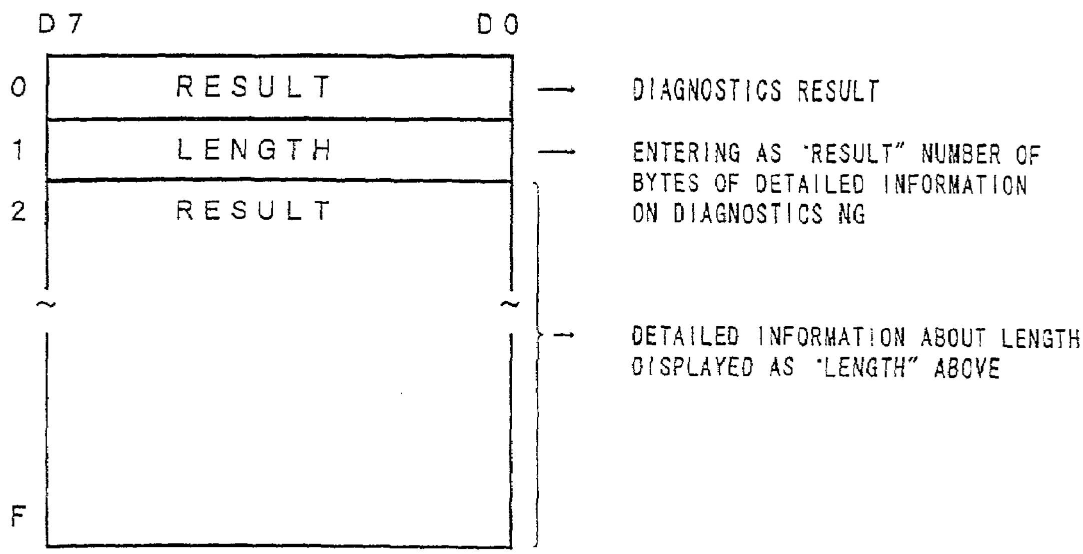

FIG. 476 shows an example of performing the DP as one of the MH-COM diagnostics.

FIG. 477 shows the details of the RESULT information of the above described performance of the DP.

Figure 478:
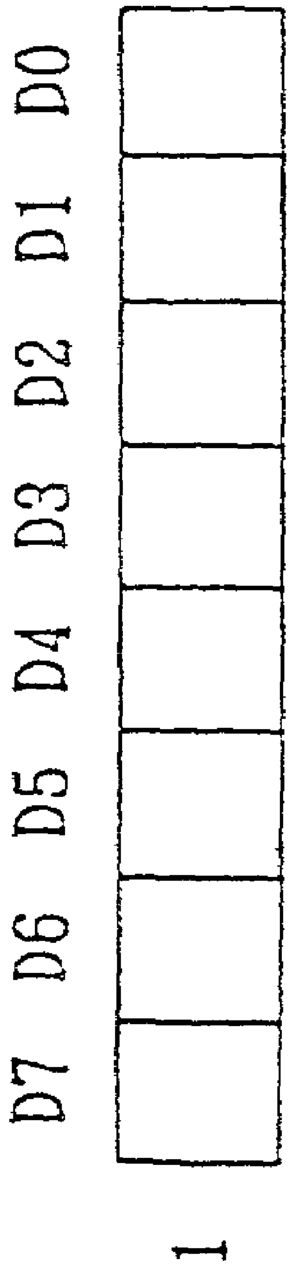

FIG. 478 shows the details of the length information of the above described performance of the DP.

FIG. 479 shows the details of the result information of the above described performance of the DP.

FIG. 480 shows the details of the diagnostics result notification status of a function test of the LP.

FIG. 481 shows the format of the E-MSCN of the MH-COM.

Figure 482:
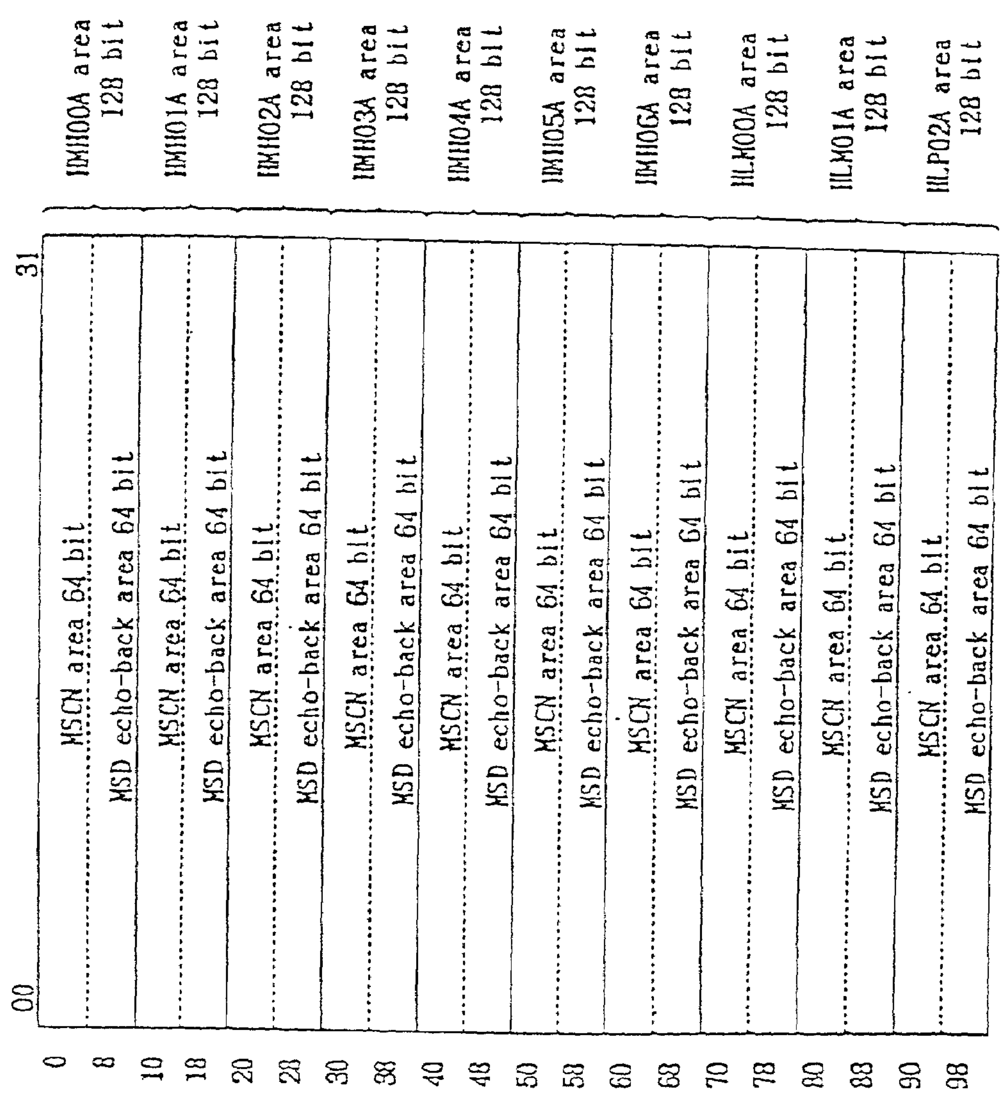

FIG. 482 shows the concept of accommodating the detailed MSCN.

FIG. 483 shows the format of the E-MSD of the MH-COM.

FIG. 484 shows the accommodation of the MH-COM control E-MSD area.

FIG. 485 shows the contents (1) of each point in the MH-COM control E-MSD.

FIG. 486 shows the contents (2) of each point in the MH-COM control E-MSD.

FIG. 487 shows the accommodation of the statistic threshold design area.

FIG. 488 shows the contents (1) of each point in the statistic threshold design area.

FIG. 489 shows the contents (2) of each point in the statistic threshold design area.

FIG. 490 shows the accommodation of the COM-E-MSCN mask pattern setting area.

Figure 492:
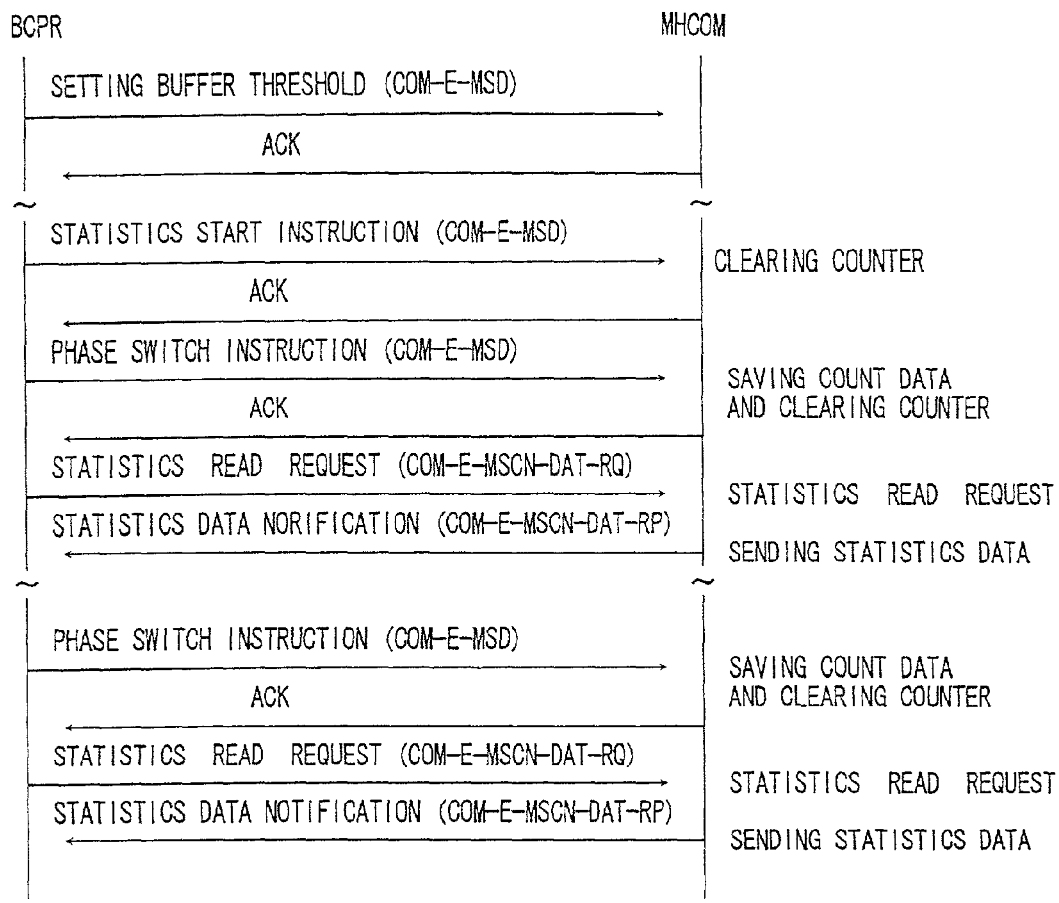

FIG. 491 shows the contents of the mask specification point of the COM-E-MSCN mask pattern setting area FIG. 492 shows the sequence of the statistic process of the MH-COM.

Figure 493:
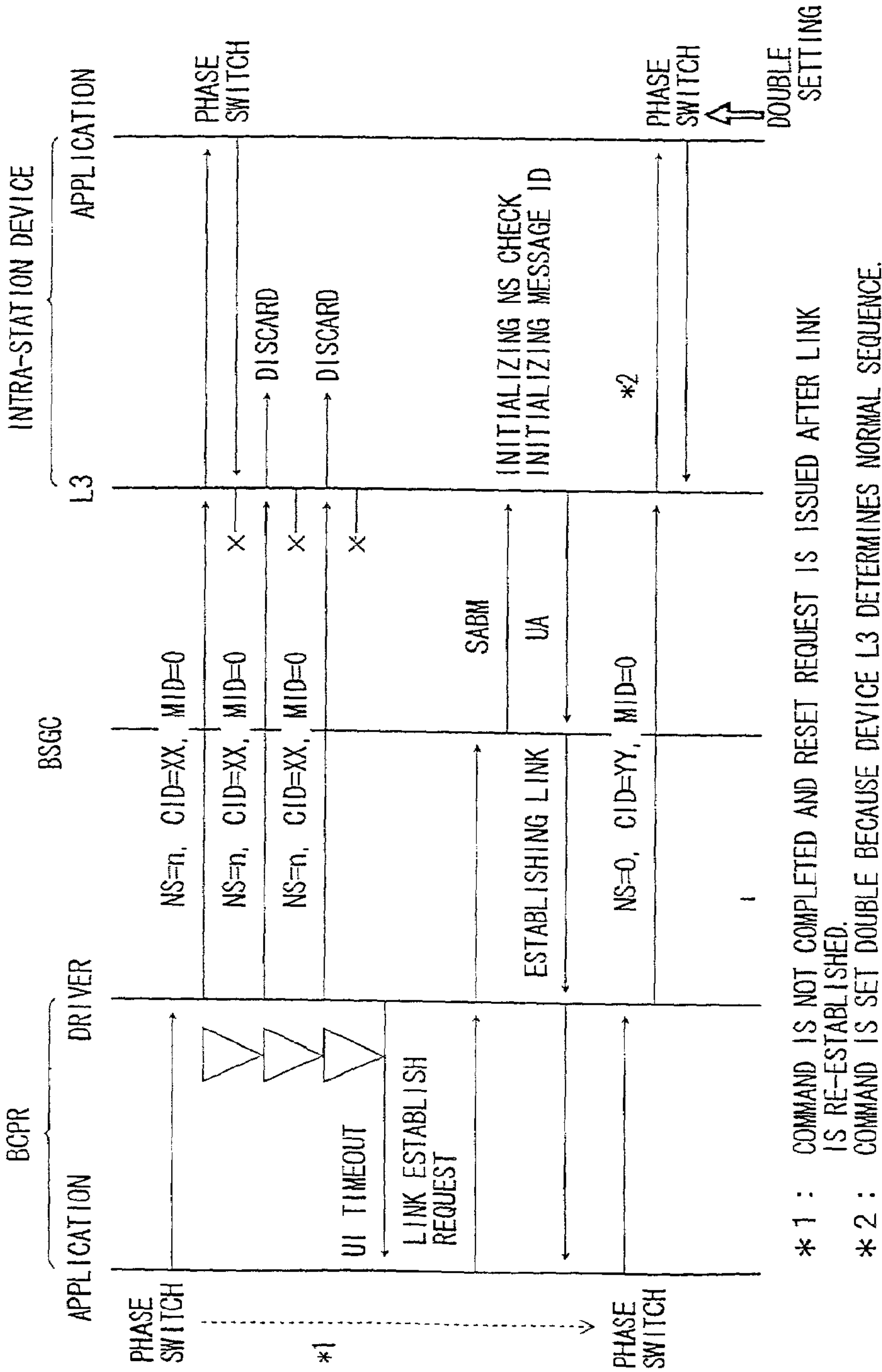

FIG. 493 shows an example of an abnormal collection in the MH-COM statistic process.

FIG. 494 shows the sequence of the abnormal statistic process in the MH-COM.

Figure 495:
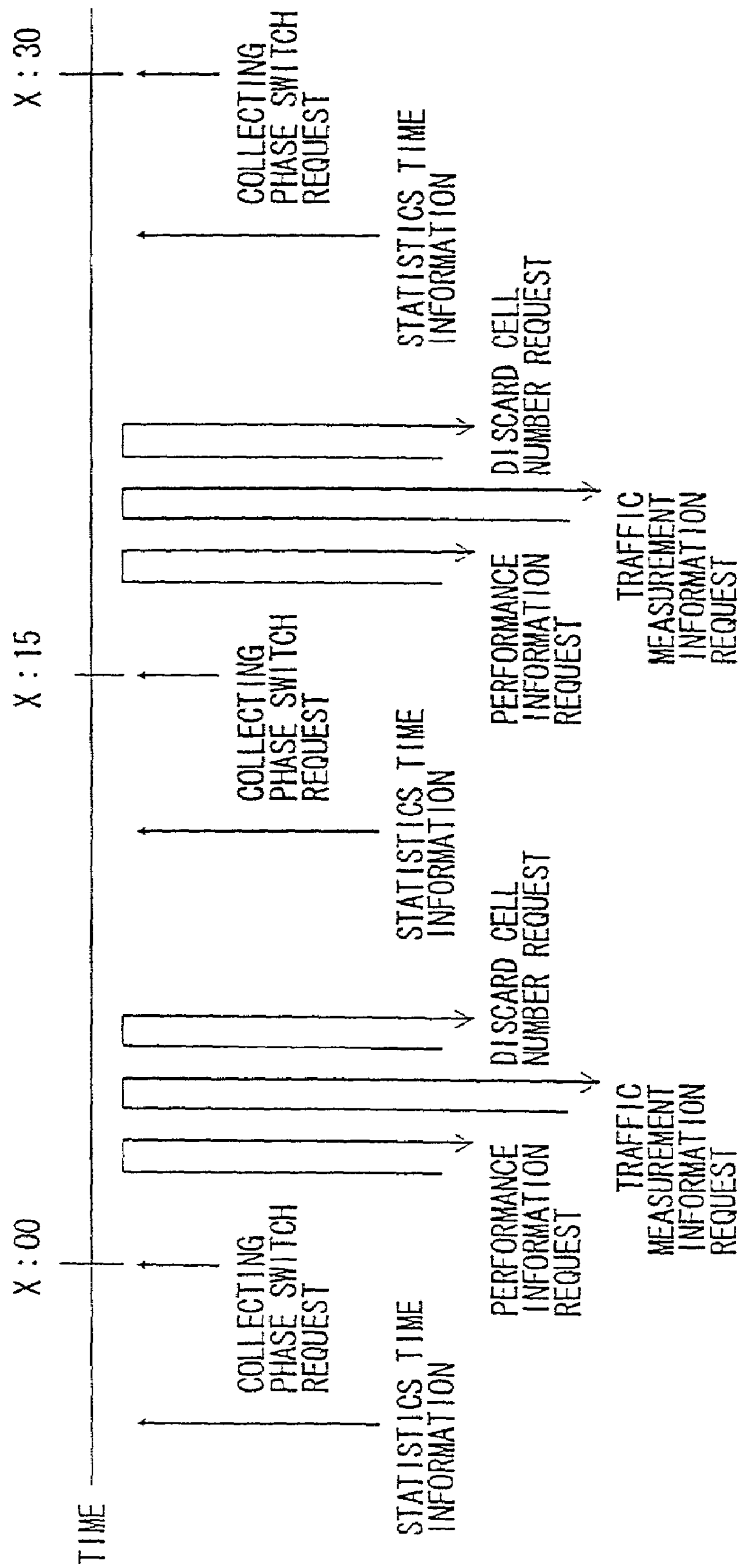

FIG. 495 shows the sequence of each proces of the LP.

Figure 496:
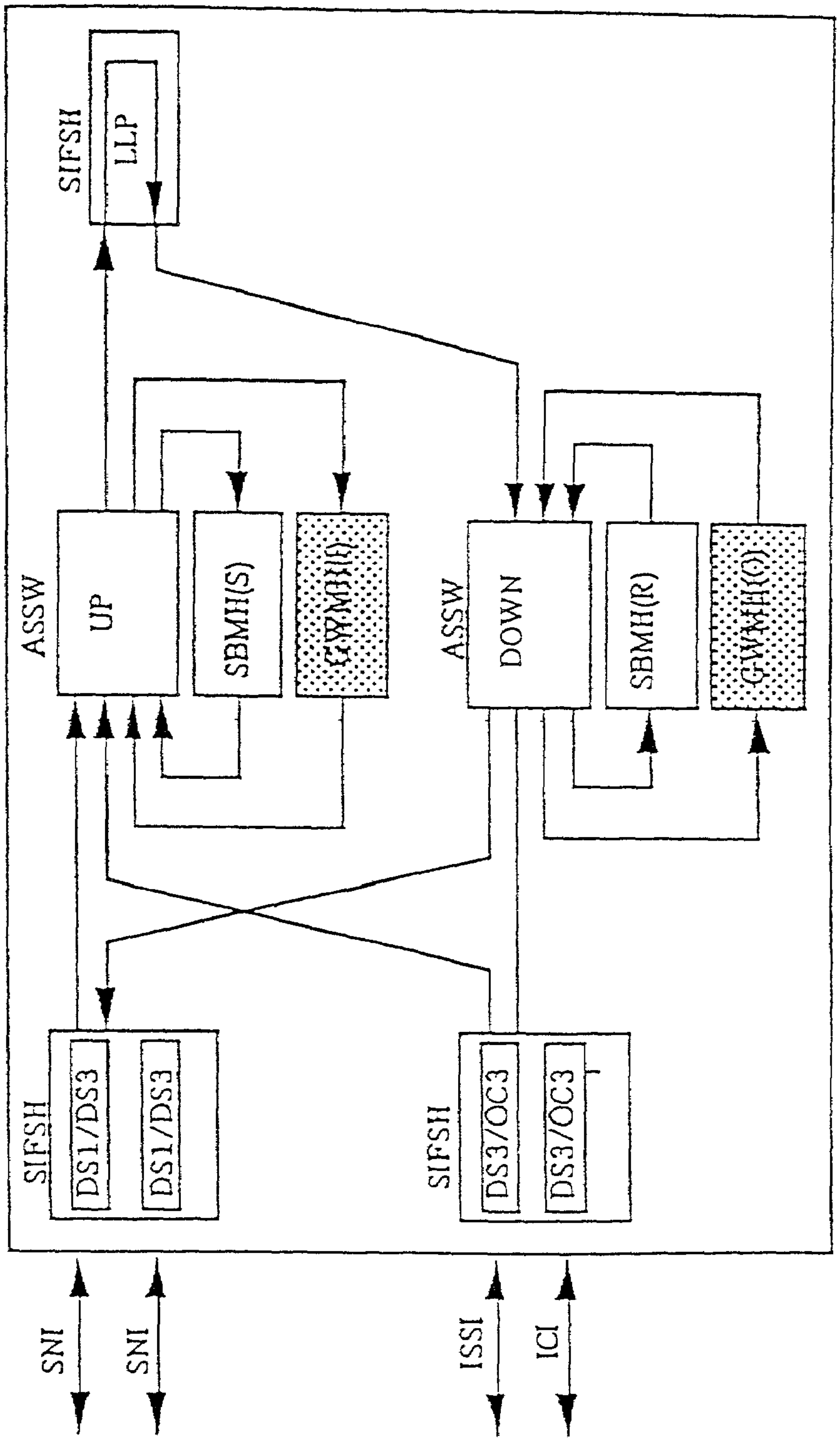

FIG. 496 shows the position of the gateway message handler (GWMESH) in the system.

Figure 497:
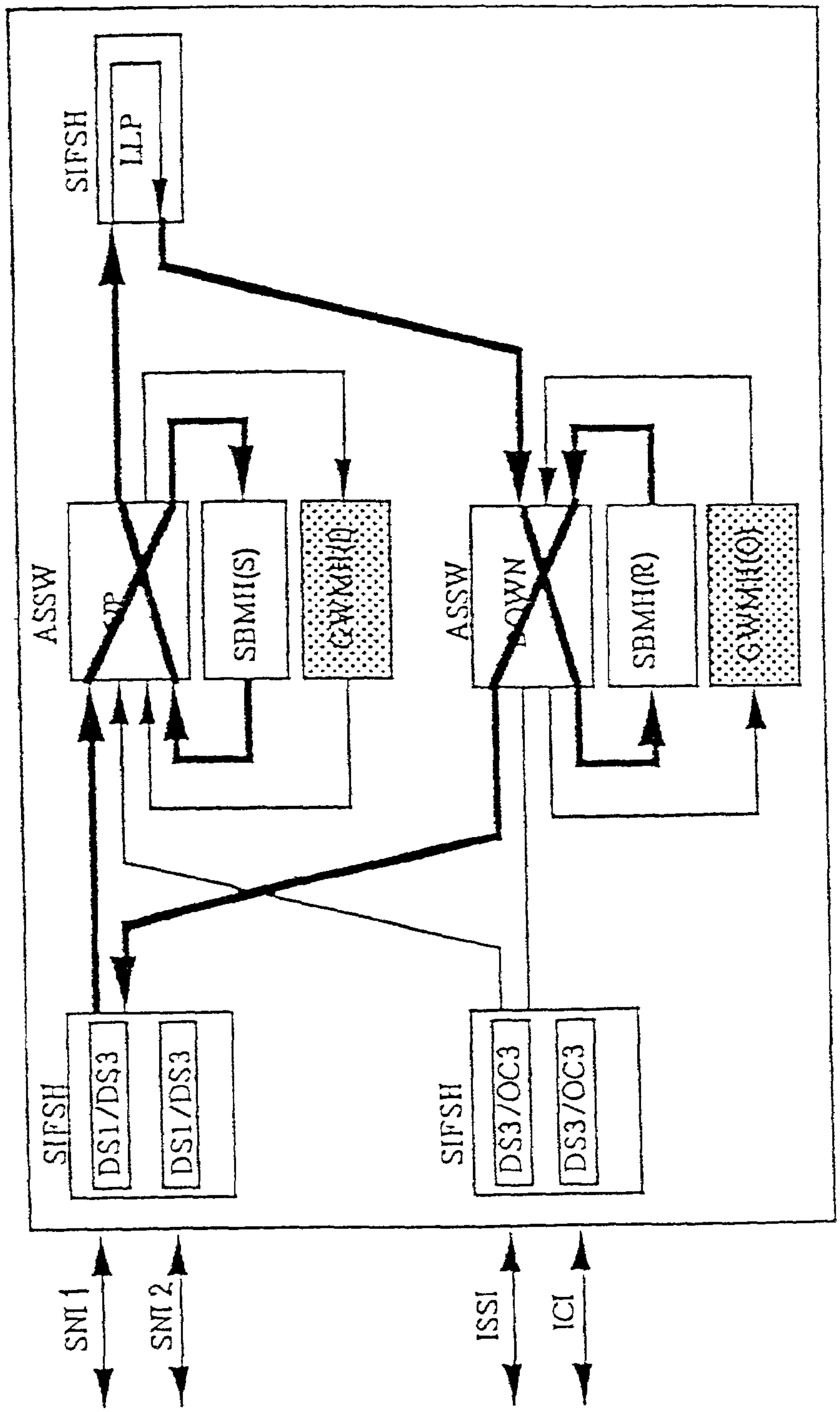

FIG. 497 shows the process of the SMDS data between SNIs.

Figure 498:
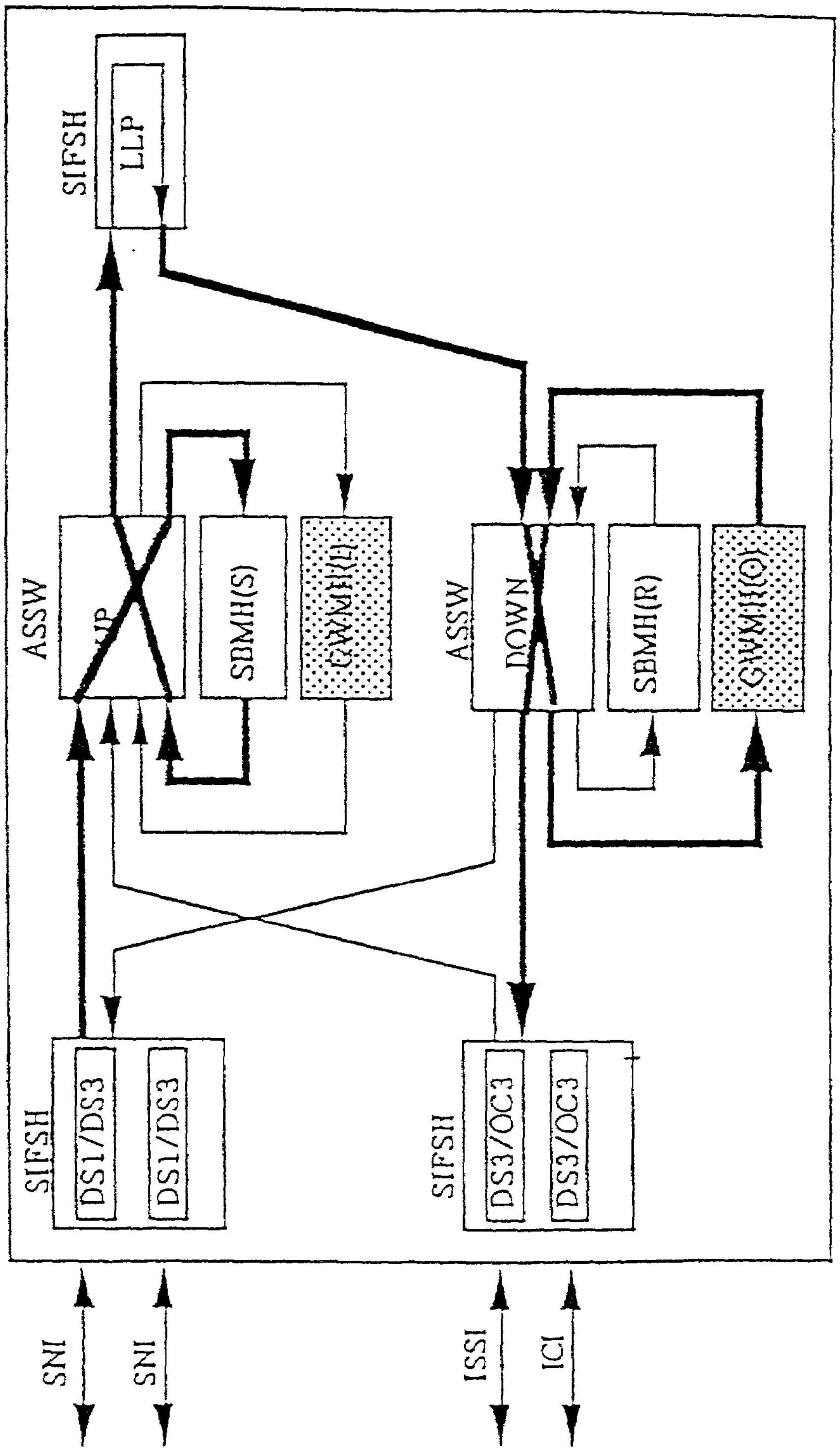

FIG. 498 shows the process of the SMDS data for SNI→ISSI or ICI.

Figure 499:
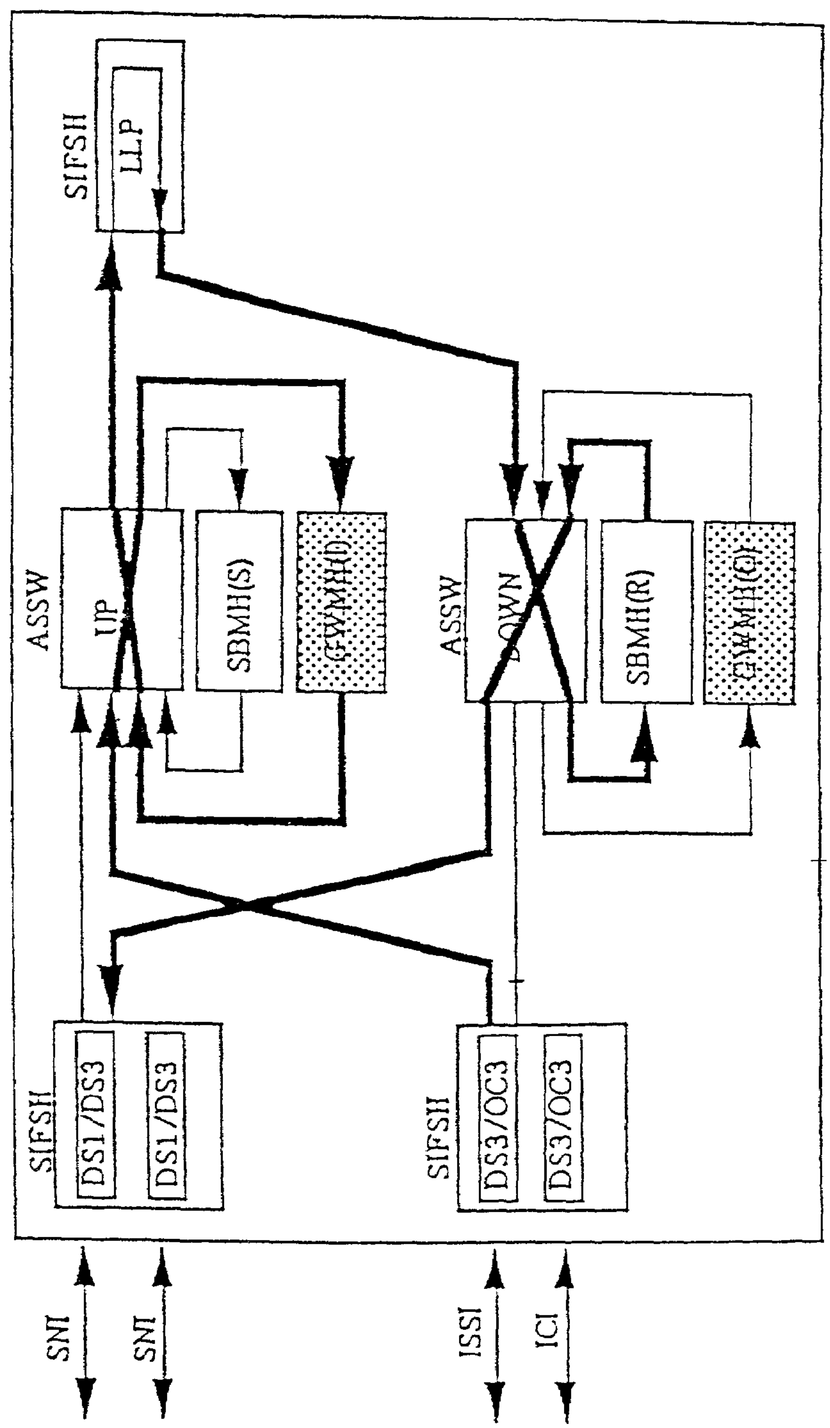

FIG. 499 shows the process of the SMDS data for ISSI or ICI→SNI.

Figure 500:
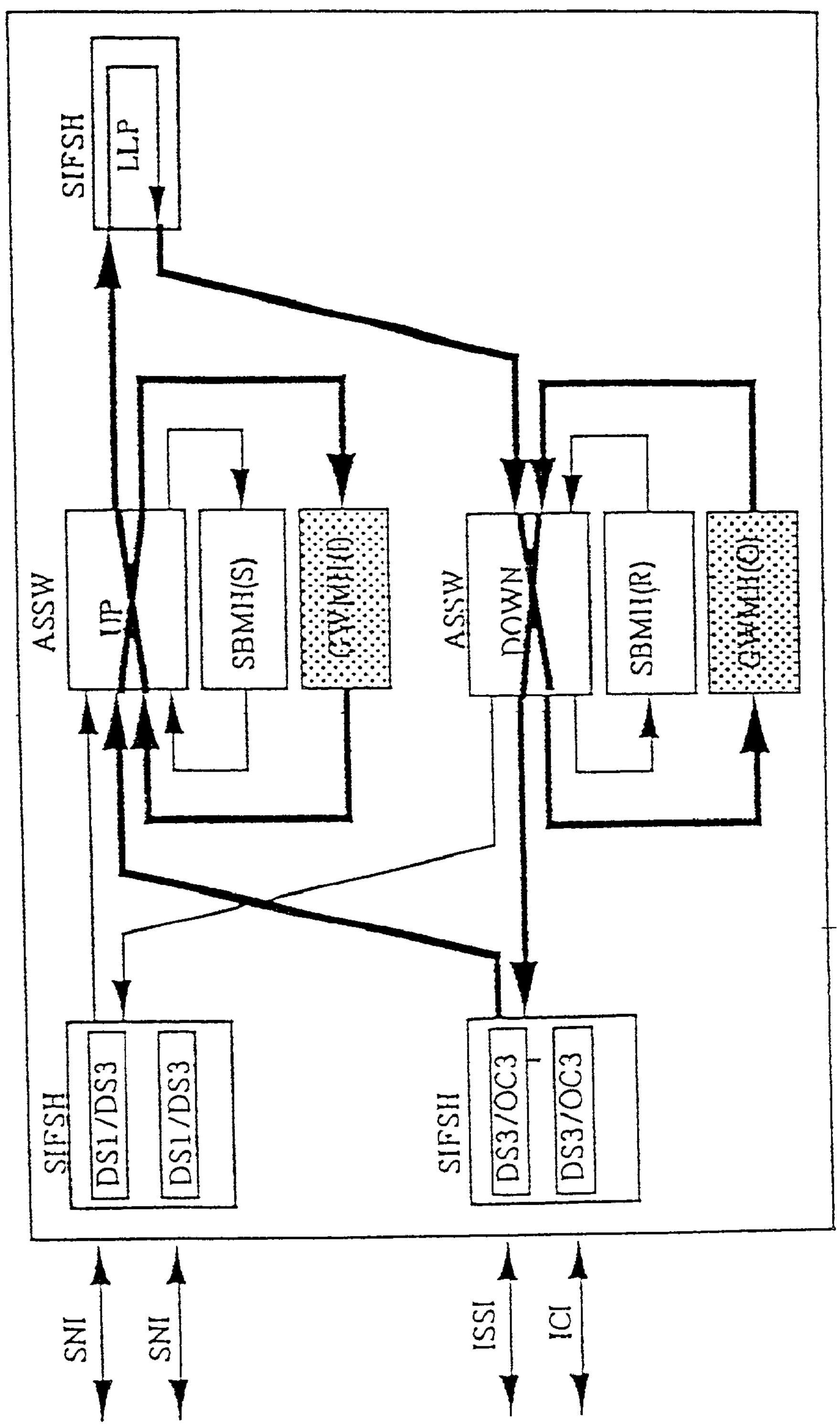

FIG. 500 shows the process of the SMDS data for ISSI or ICI→ISSI or SNI.

Figure 501:
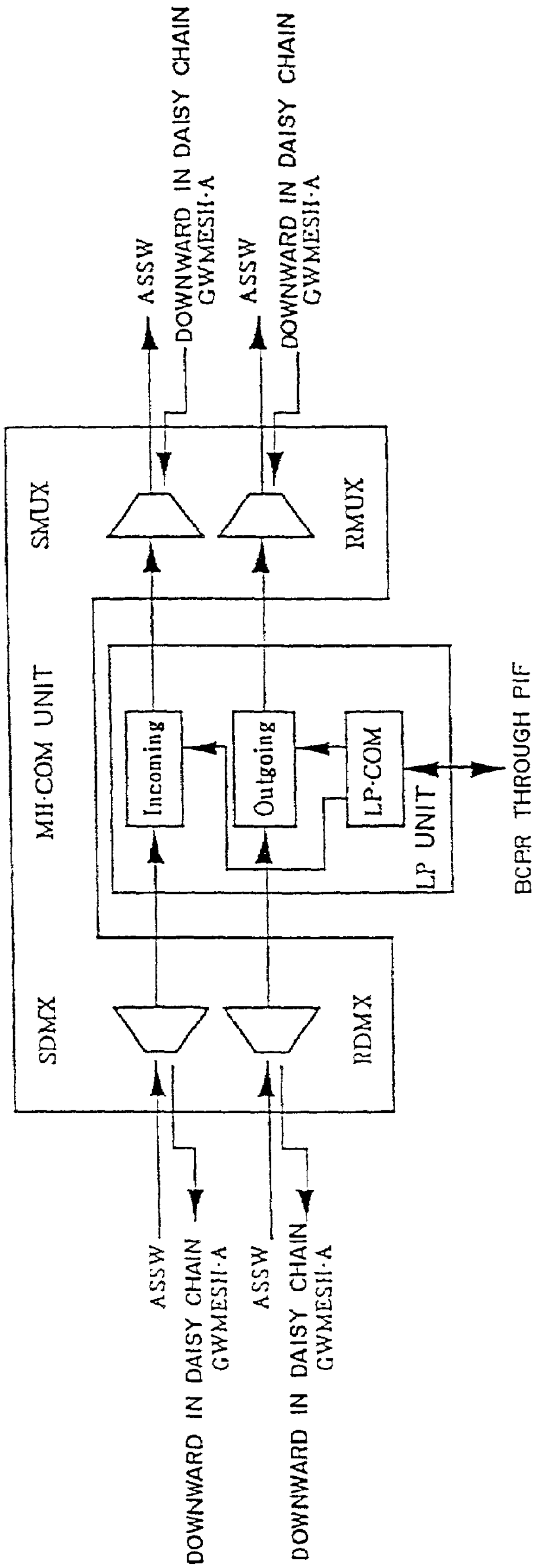

FIG. 501 is a block diagram showing the configuration of the GWMESH.

Figure 502:
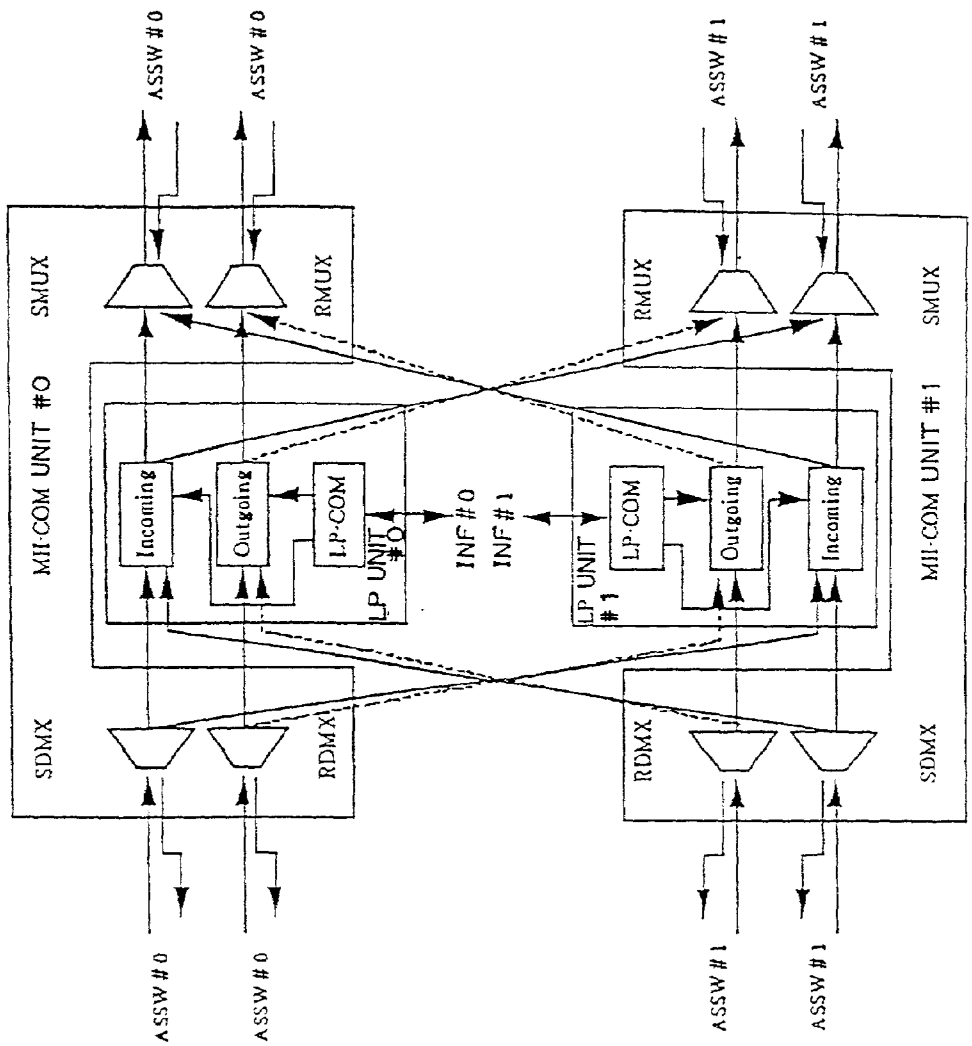

FIG. 502 is a block diagram showing the redundant configuration (duplex configuration) of the GWMESH.

Figure 503:
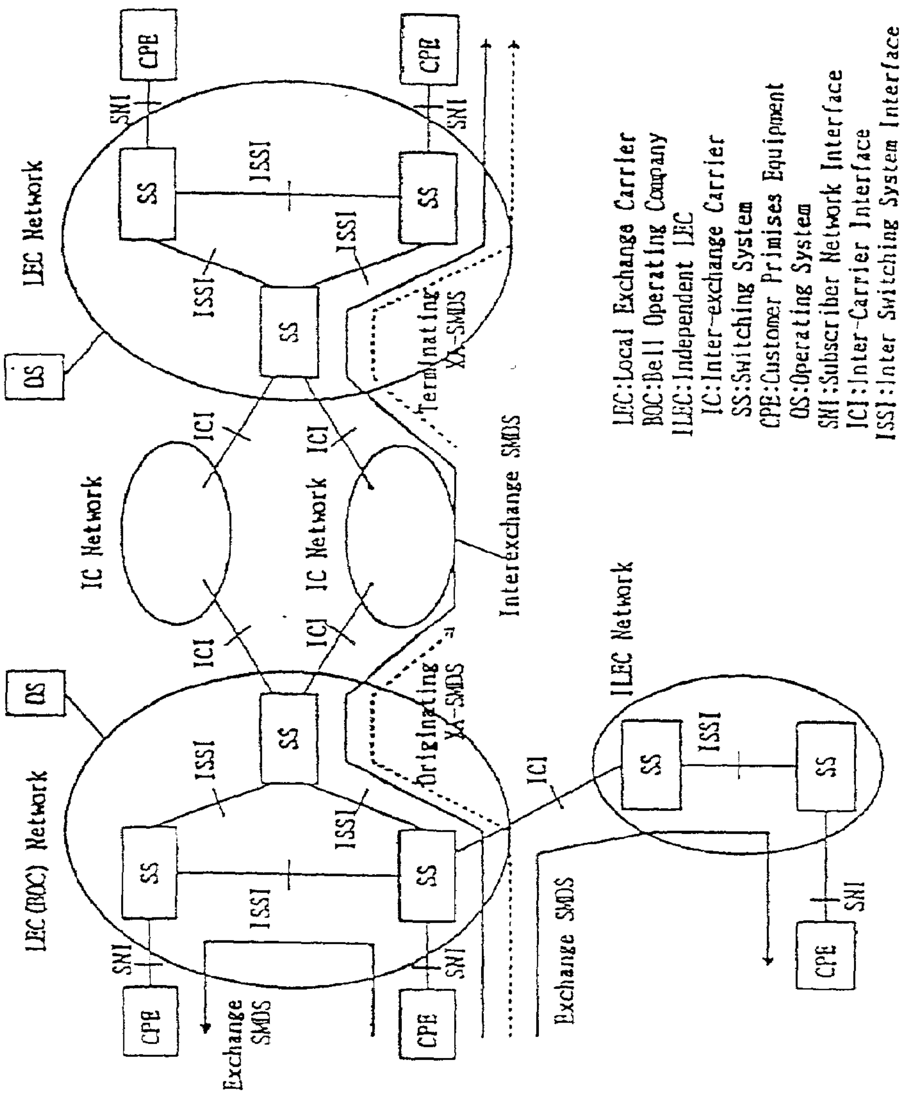

FIG. 503 shows an example of the configuration of the SMDS network.

Figure 504:
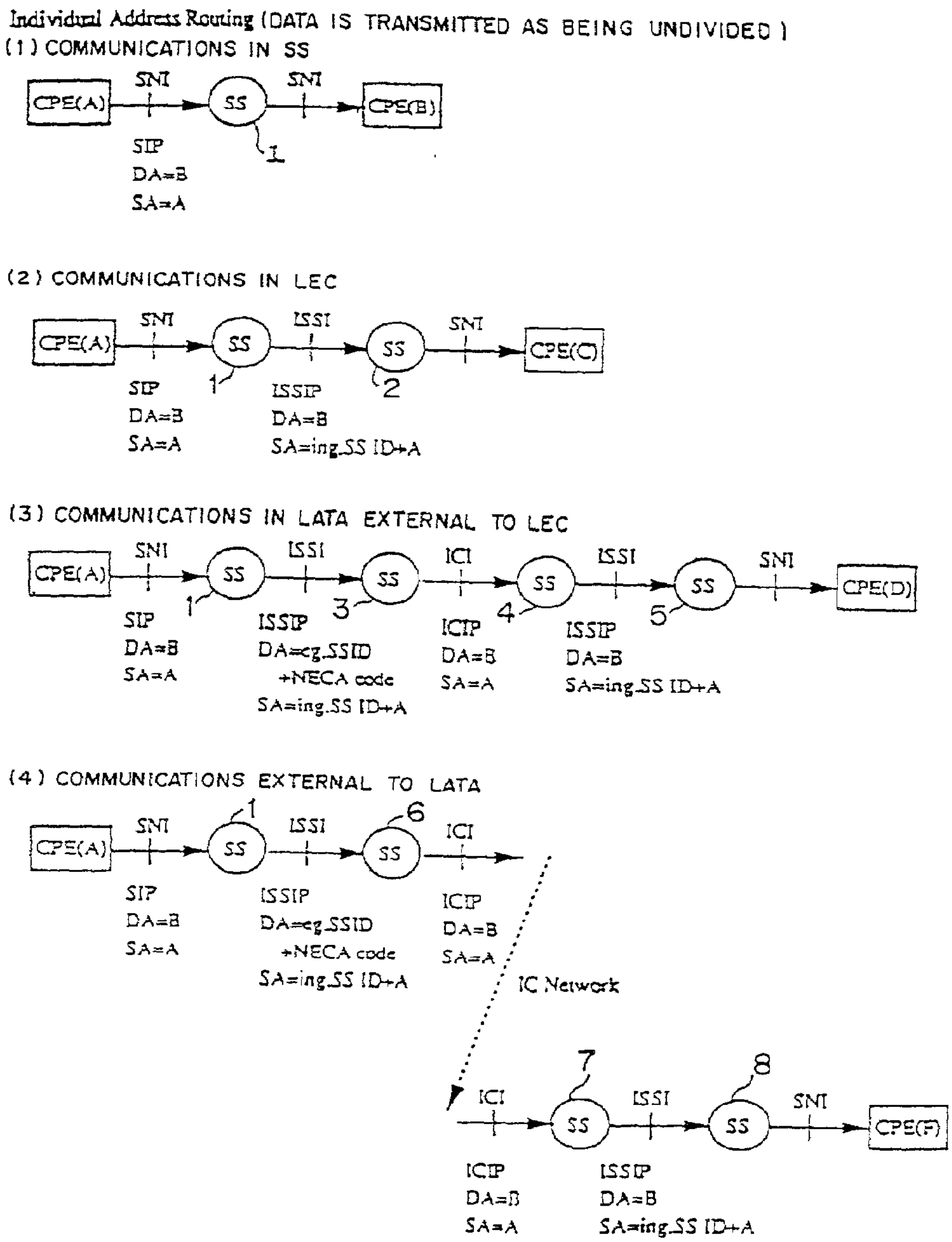

FIG. 504 shows an example of the routing process performed when data is transferred using an individual address.

Figure 505:
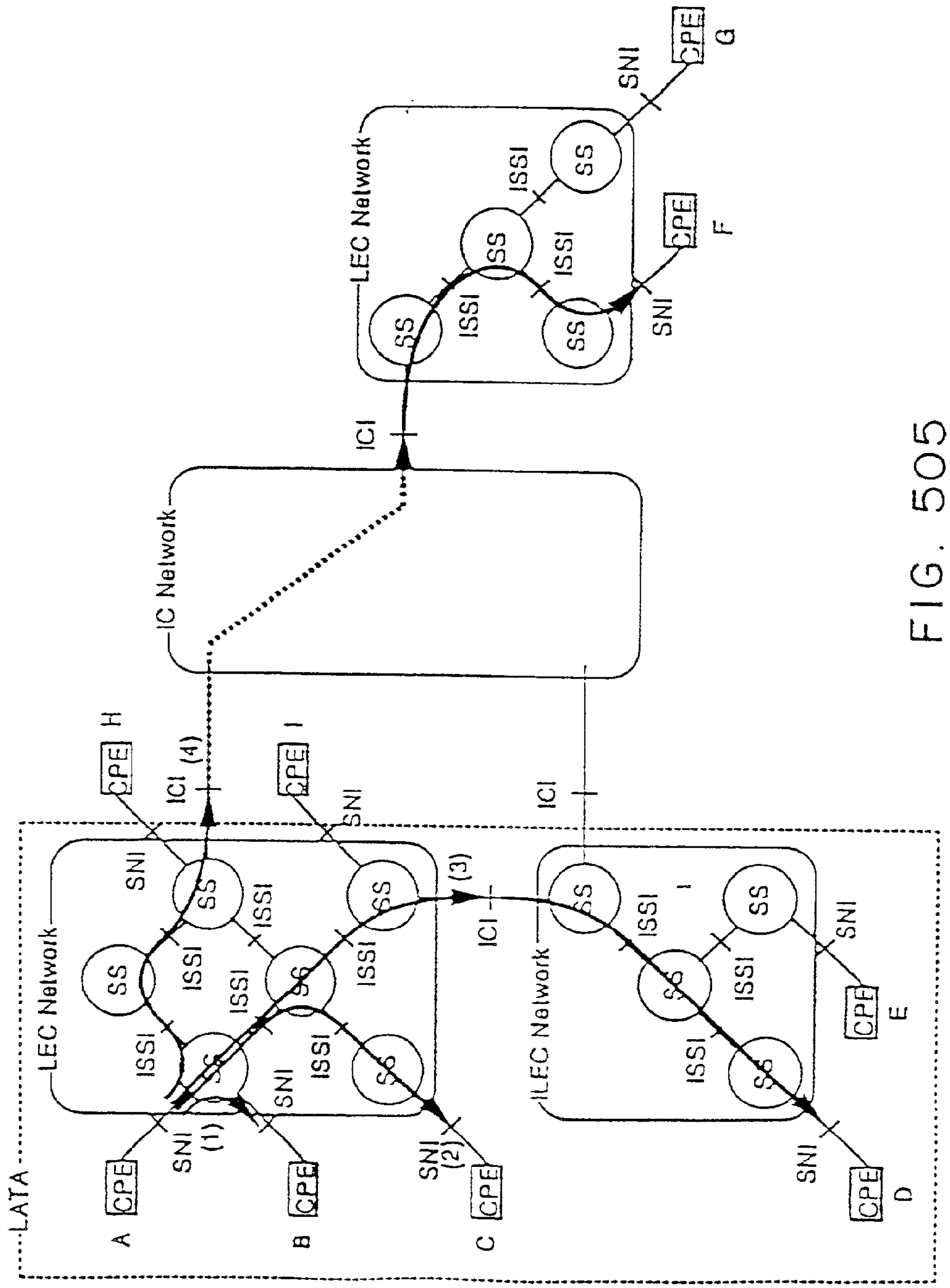

FIG. 505 shows an example of the routing process shown in FIG. 504 in a network.

Figure 506:
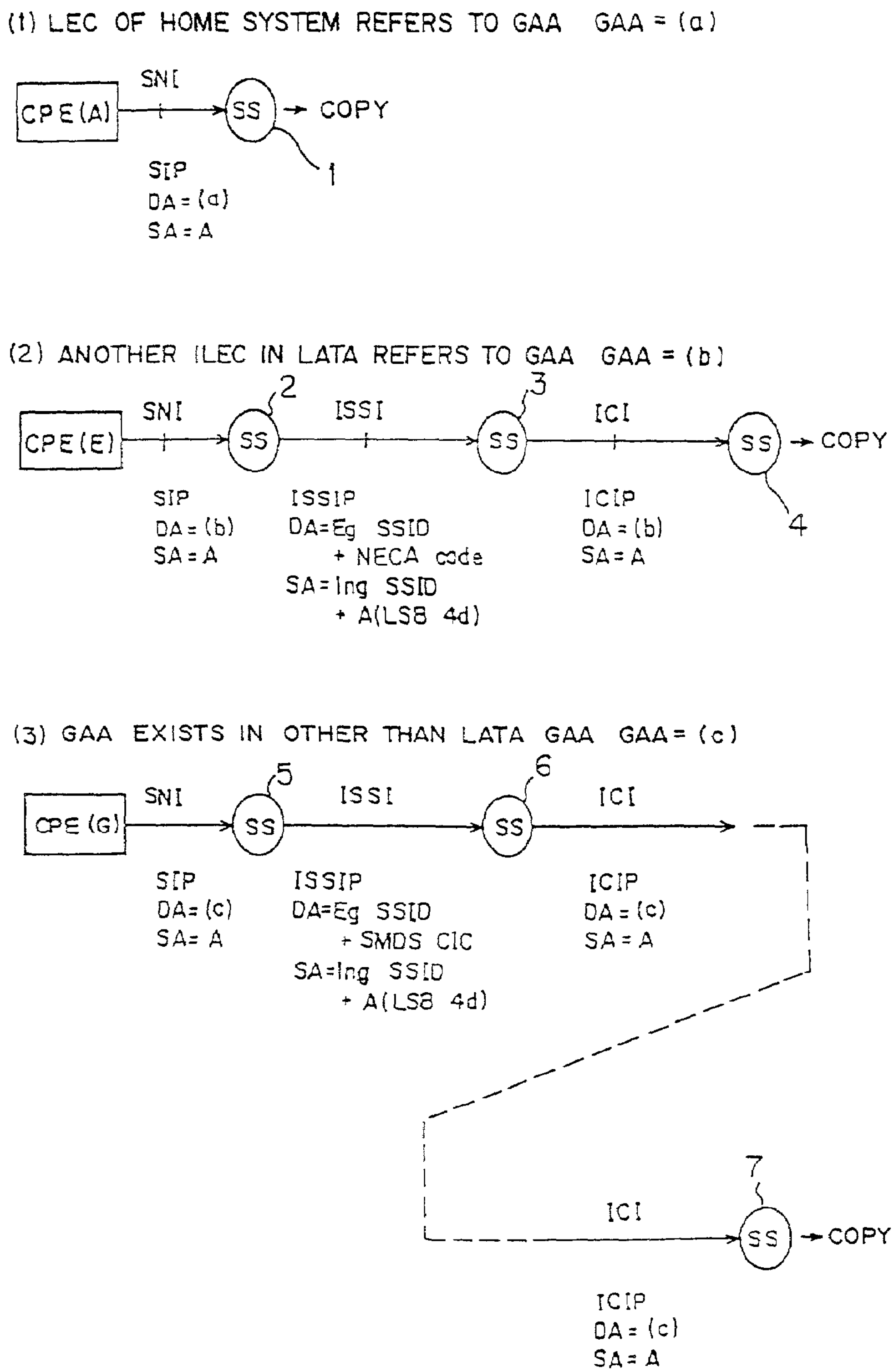

FIG. 506 shows an example of the routing process performed when data is transferred using a group address.

Figure 507:
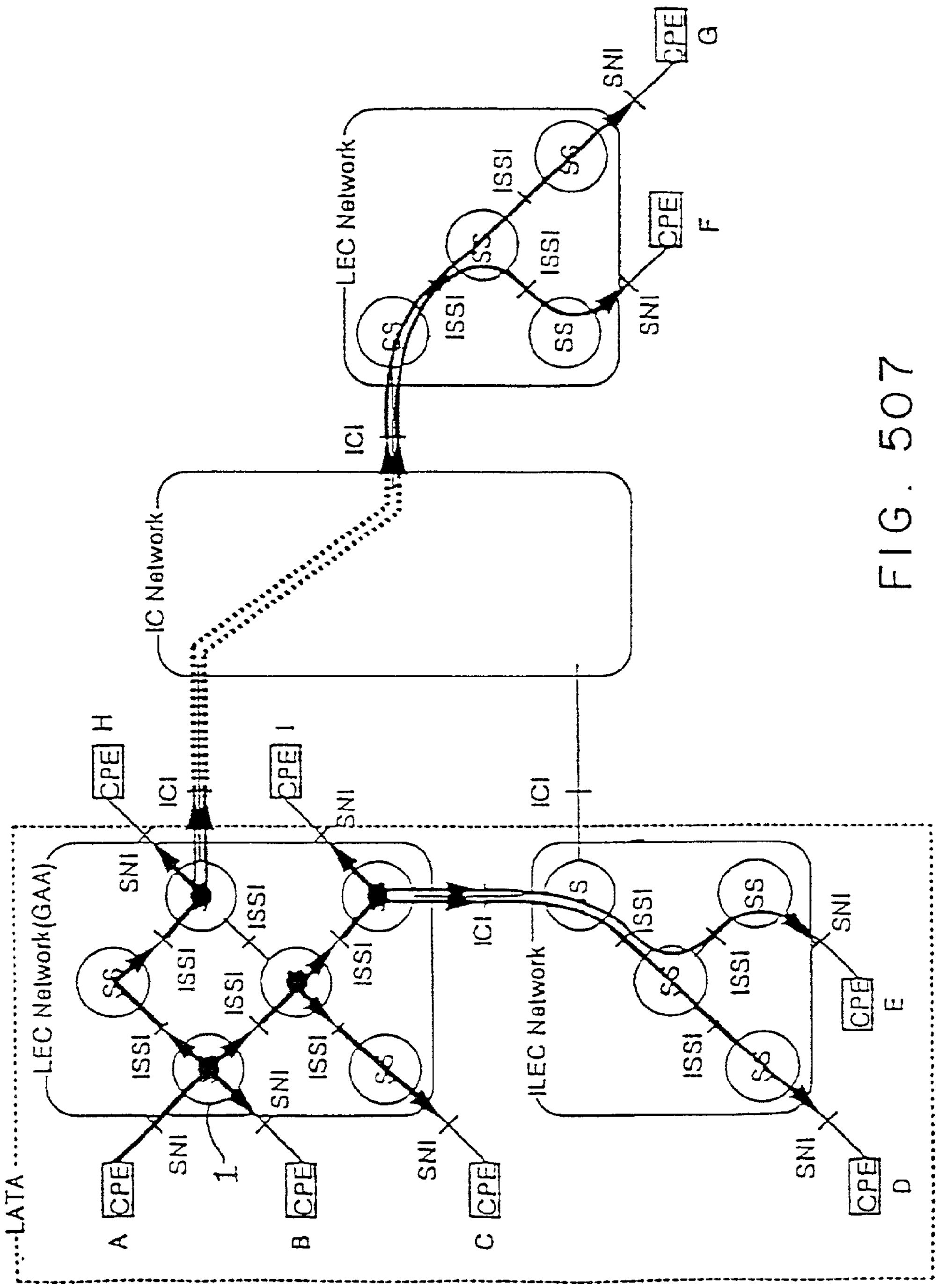

FIG. 507 shows a method of transferring data when the source of the data is in the area specified by a group address.

Figure 508:
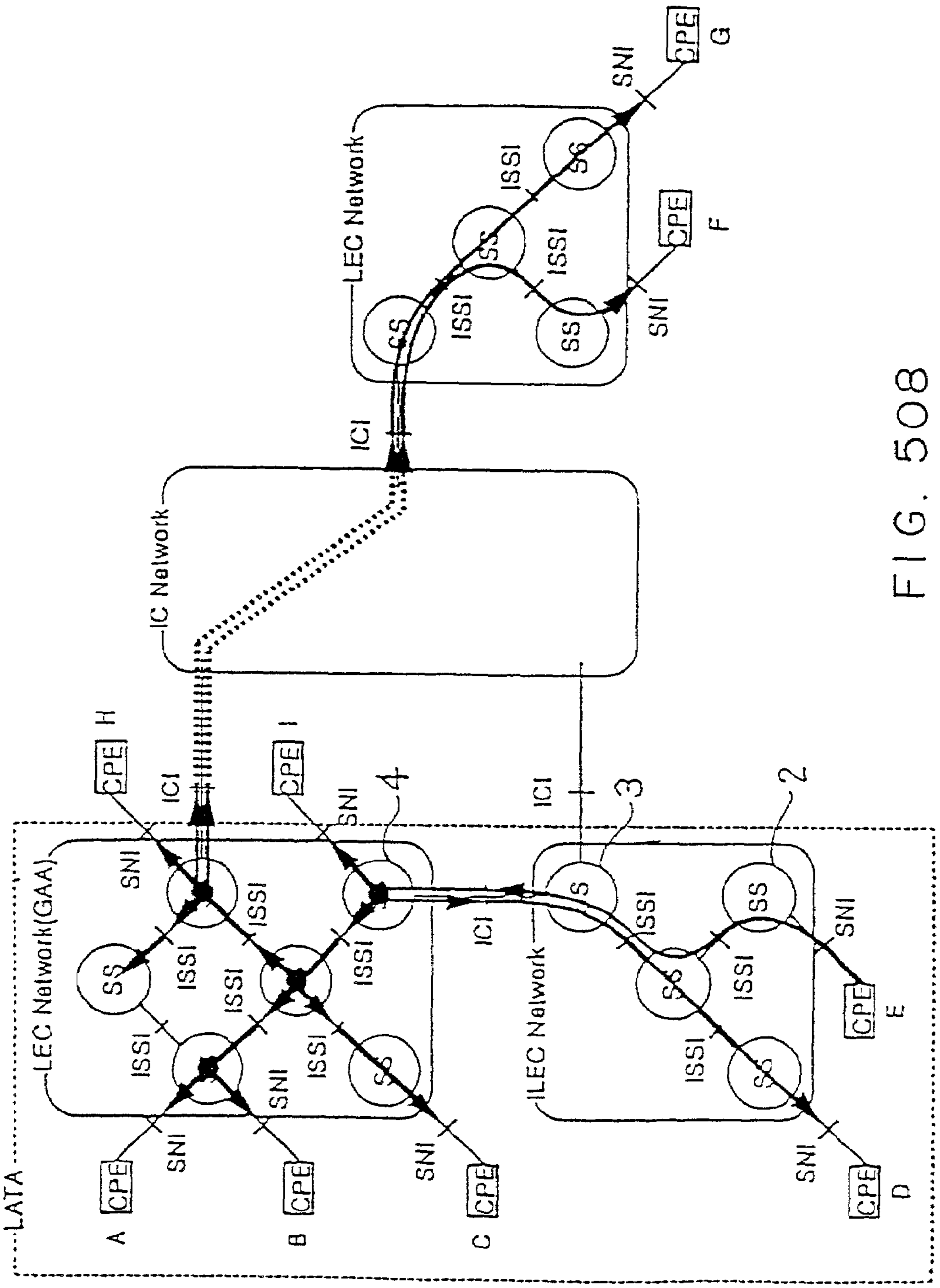

FIG. 508 shows a method of transferring data when a group-address-specified area is in another local carrier in the LATA for the data transfer source.

Figure 509:
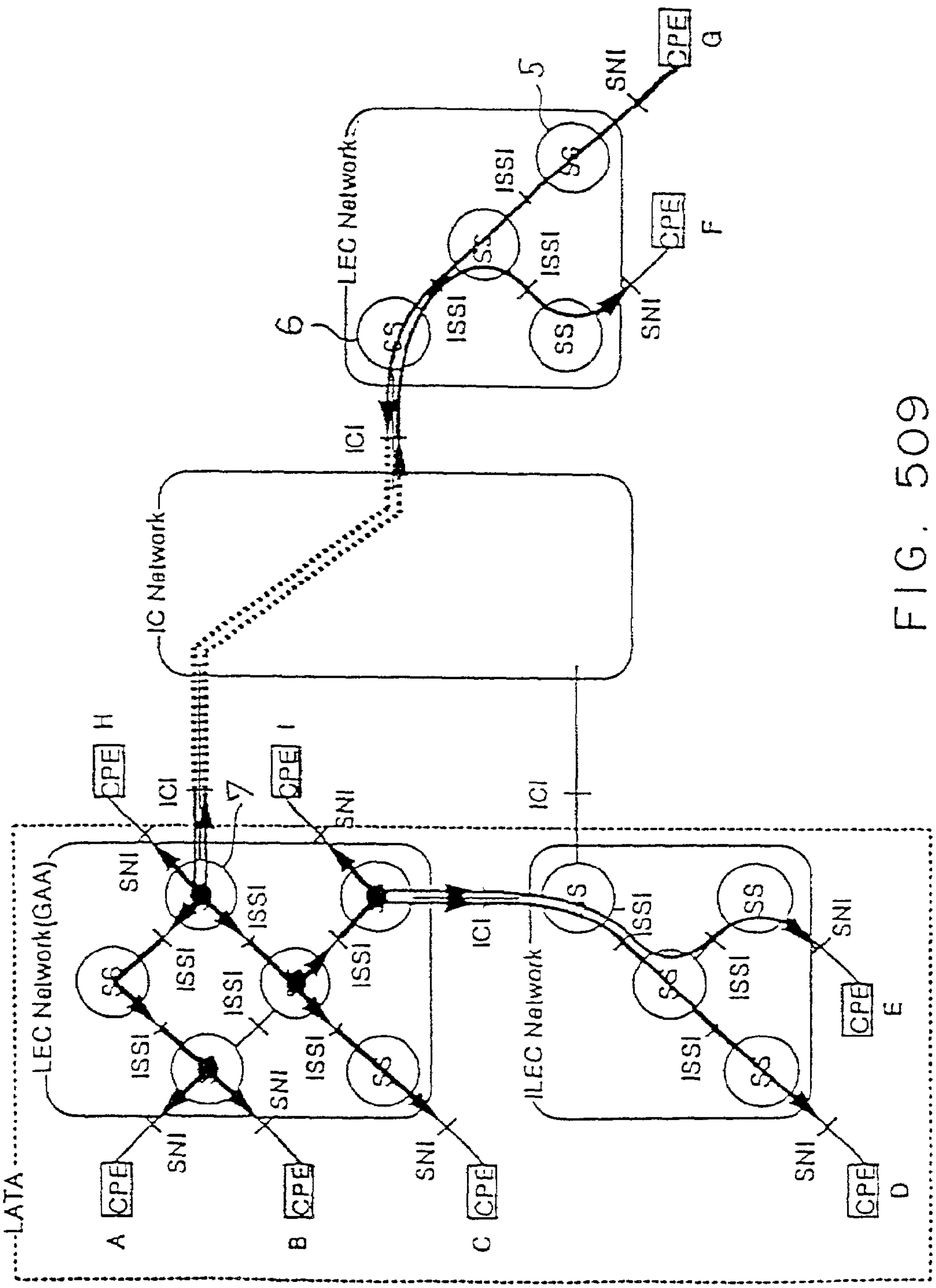

FIG. 509 shows a method of transferring data when a group-address-specified area is in another local carrier external to the LATA for the data transfer source.

Figure 510:
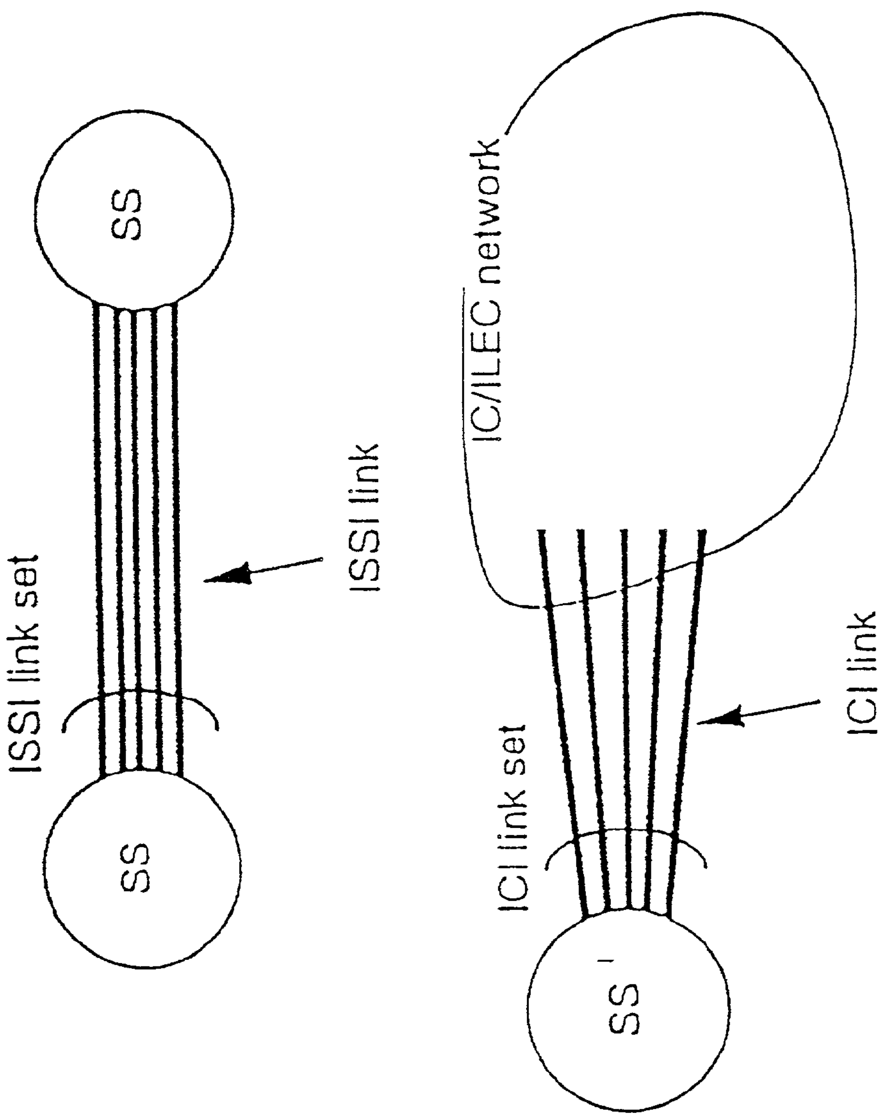

FIG. 510 shows the link between switching systems or between a switching system and another carrier.

Figure 511:
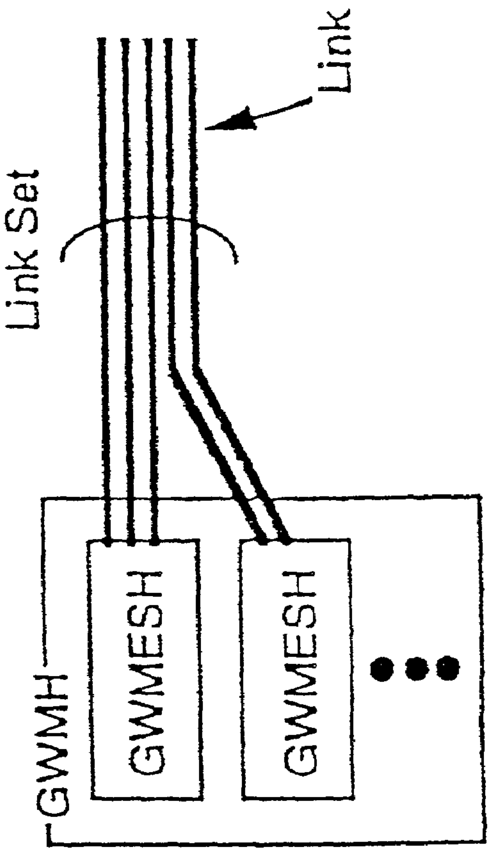

FIG. 511 shows the accommodation conditions for a link set.

Figure 512:
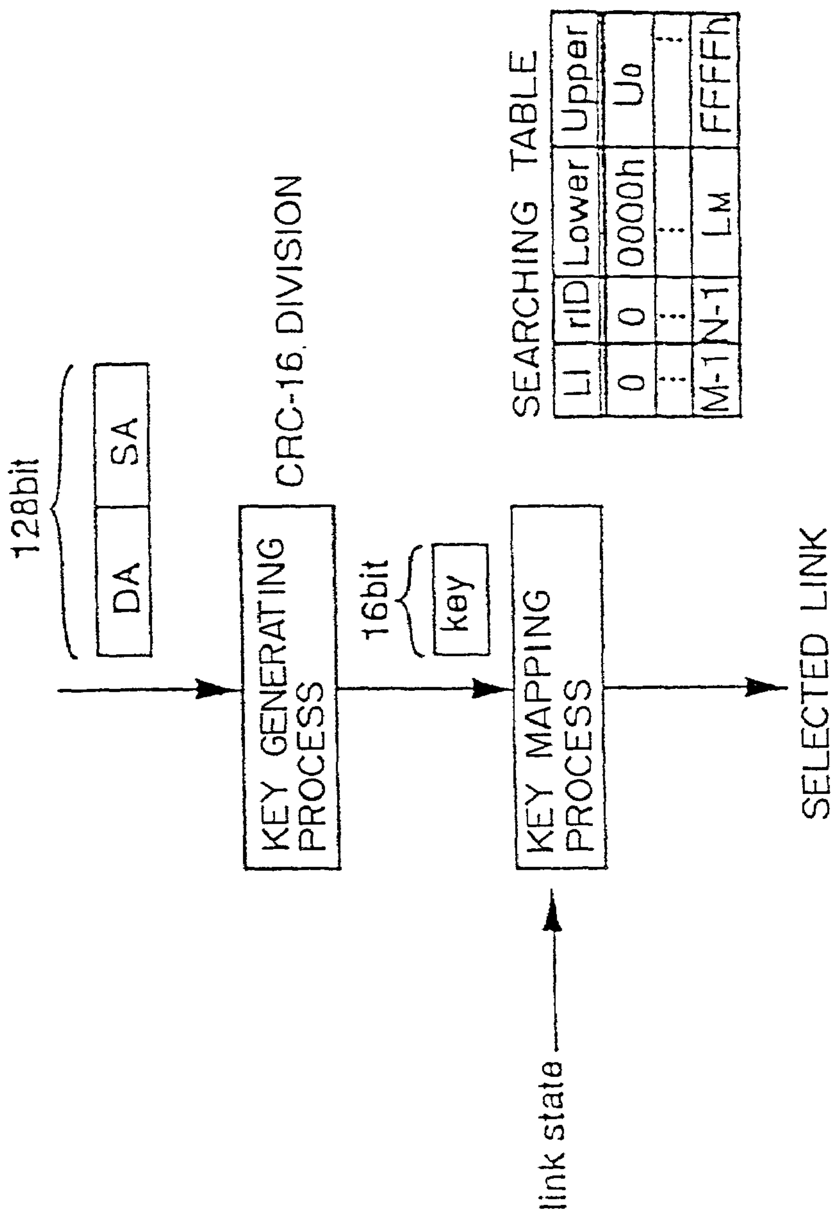

FIG. 512 shows the load splitting algorithm

Figure 513:
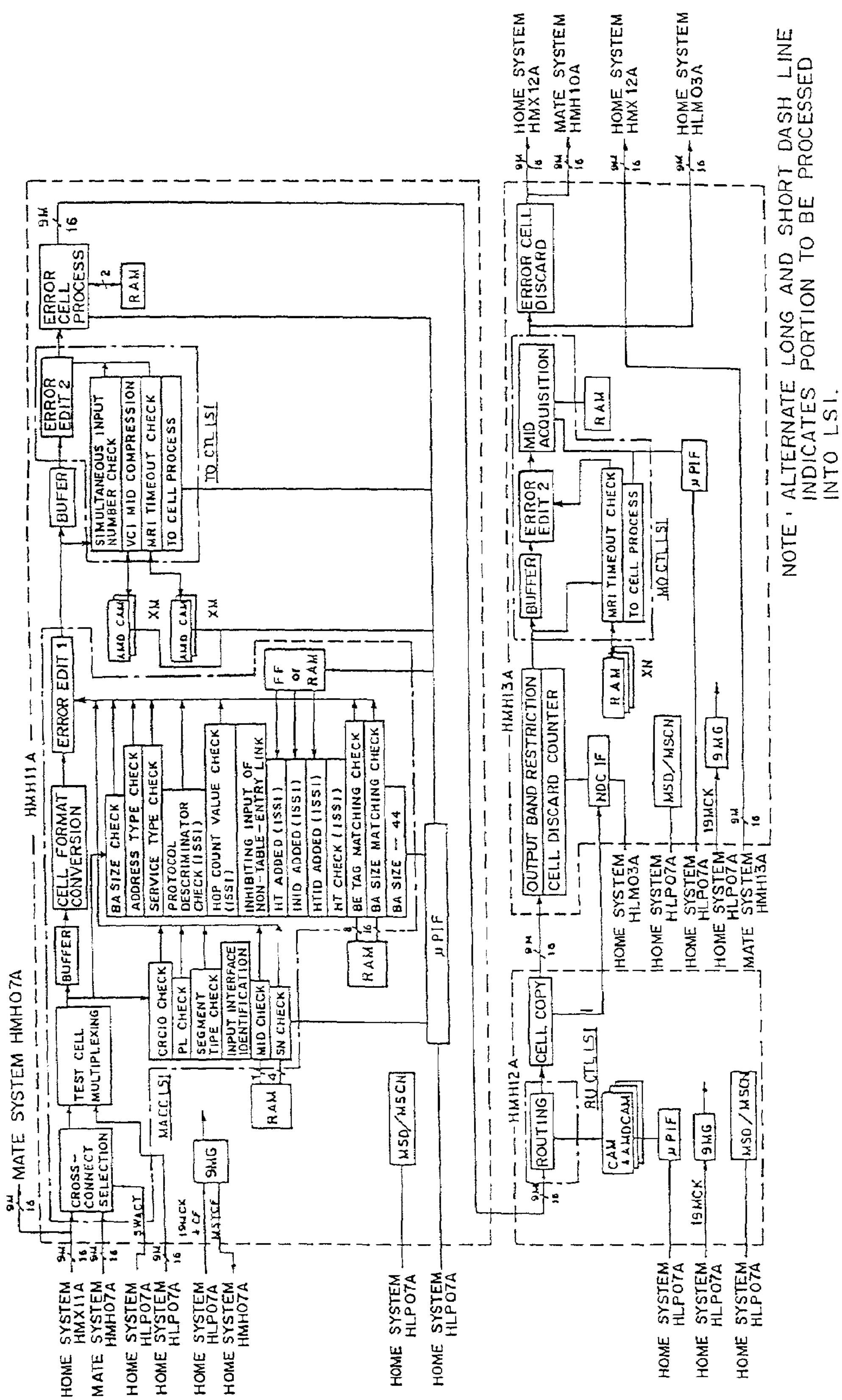

FIG. 513 is a block diagram showing the entire configuration of the ICLP of the GWMESH.

FIG. 514 shows the functions of each block of the ICLP.

FIG. 515 shows the correspondence between each function of the ICLP and an error flag (1).

FIG. 516 shows the correspondence between each function of the ICLP and an error flag (2).

FIG. 517 shows the format (MH-COM→ICLP (ISSIP-BOM)) of a cell input to the ICLP.

FIG. 518 shows the format (MH-COM→ICLP (ICIP-BOM)) of a cell input to the ICLP.

FIG. 519 shows the format (MH-COM→ICLP (SIP-SSM)) of a cell input to the ICLP. 1

FIG. 520 shows the format (MH-COM→ICLP (SIP-BOM)) of a cell input to the ICLP.

FIG. 521 shows the format (MH-COM→ICLP (COM)) of a cell input to the ICLP.

FIG. 522 shows the format (MH-COM→ICLP (EOM)) of a cell input to the ICLP.

Figure 523:
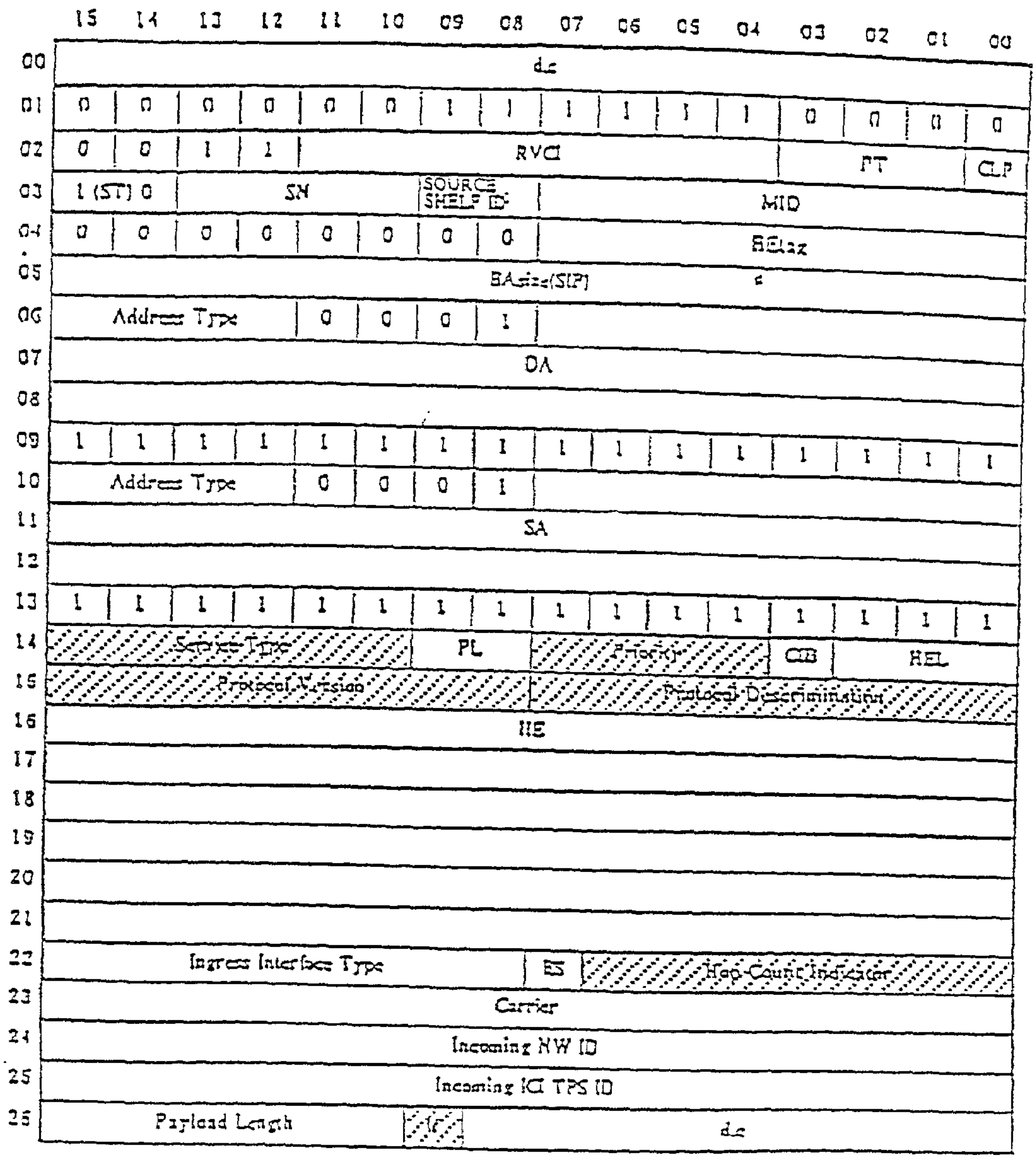

FIG. 523 shows the format (ICLP→MH-COM (ISSIP-BOM)) of a cell output from the ICLP.

FIG. 524 shows the format (ICLP→MH-COM (ICIP-BOM)) of a cell output from the ICLP.

FIG. 525 shows the format (ICLP→MH-COM (SIP-SSM)) of a cell output from the ICLP.

Figure 526:
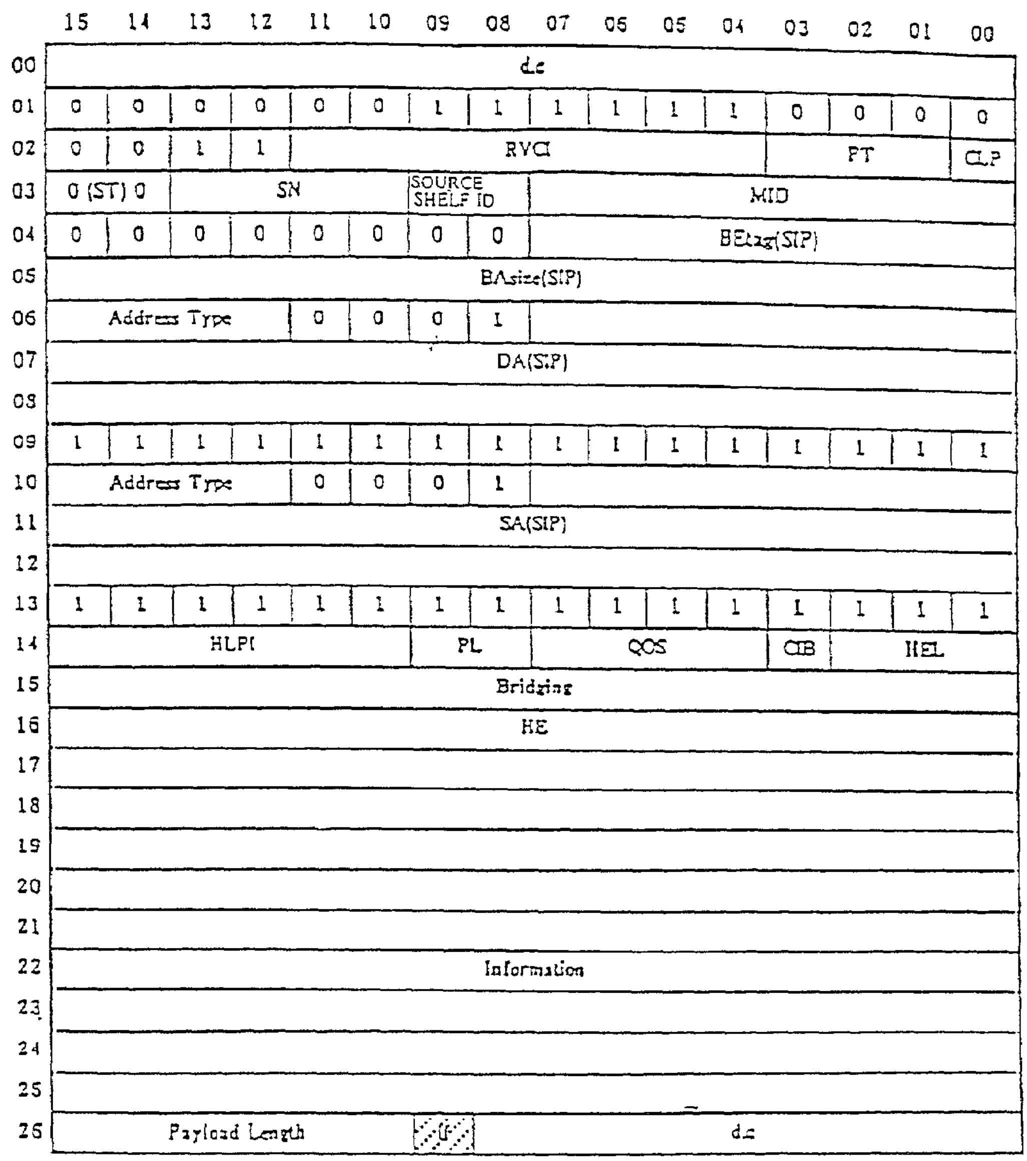

FIG. 526 shows the format (ICLP→MH-COM (SIP-BOM)) of a cell output from the ICLP.

Figure 527:
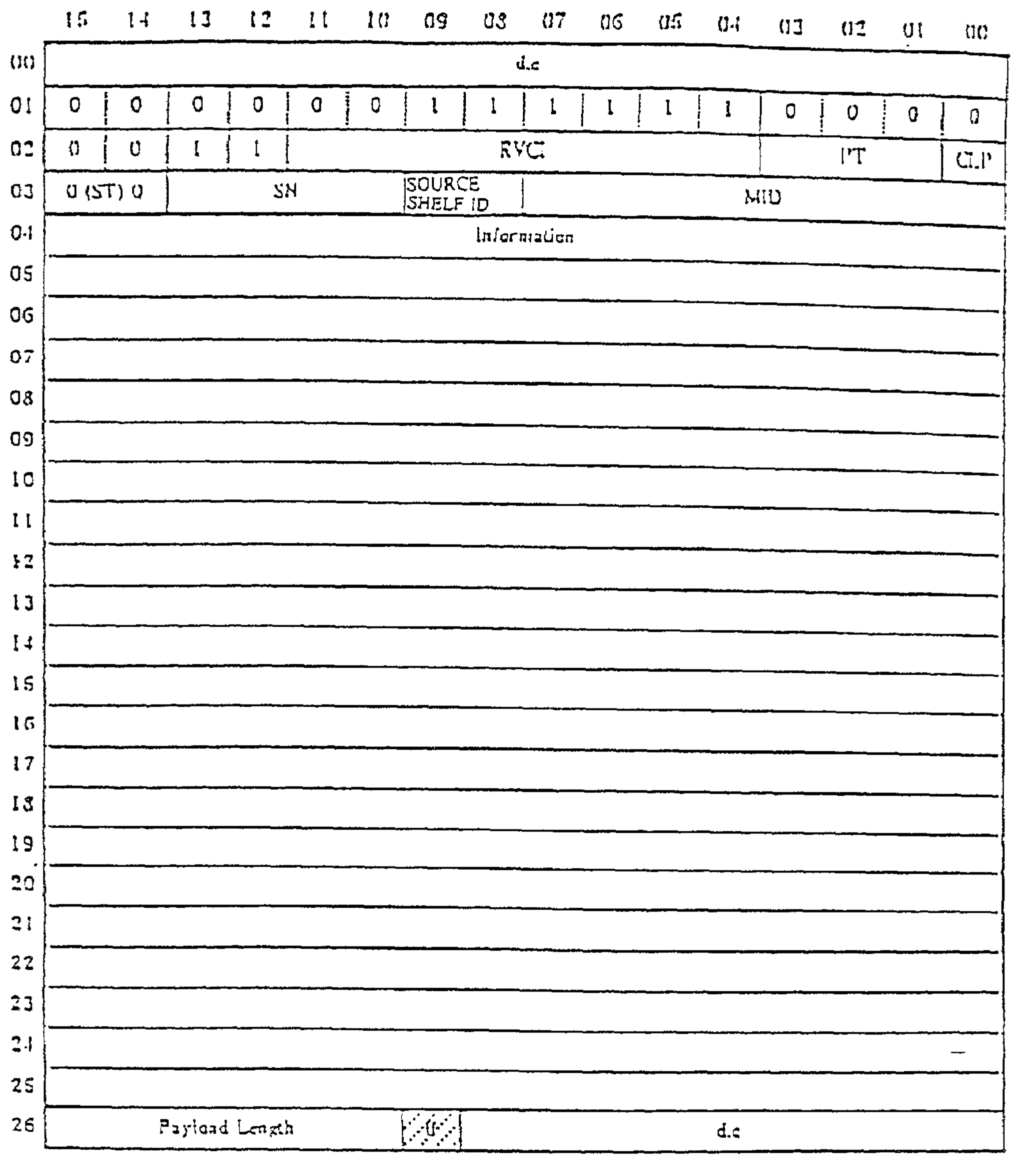

FIG. 527 shows the format (ICLP→MH-COM (COM)) of a cell output from the ICLP FIG. 528 shows the format (ICLP→MH-COM (EOM)) of a cell output from the ICLP.

Figure 529:
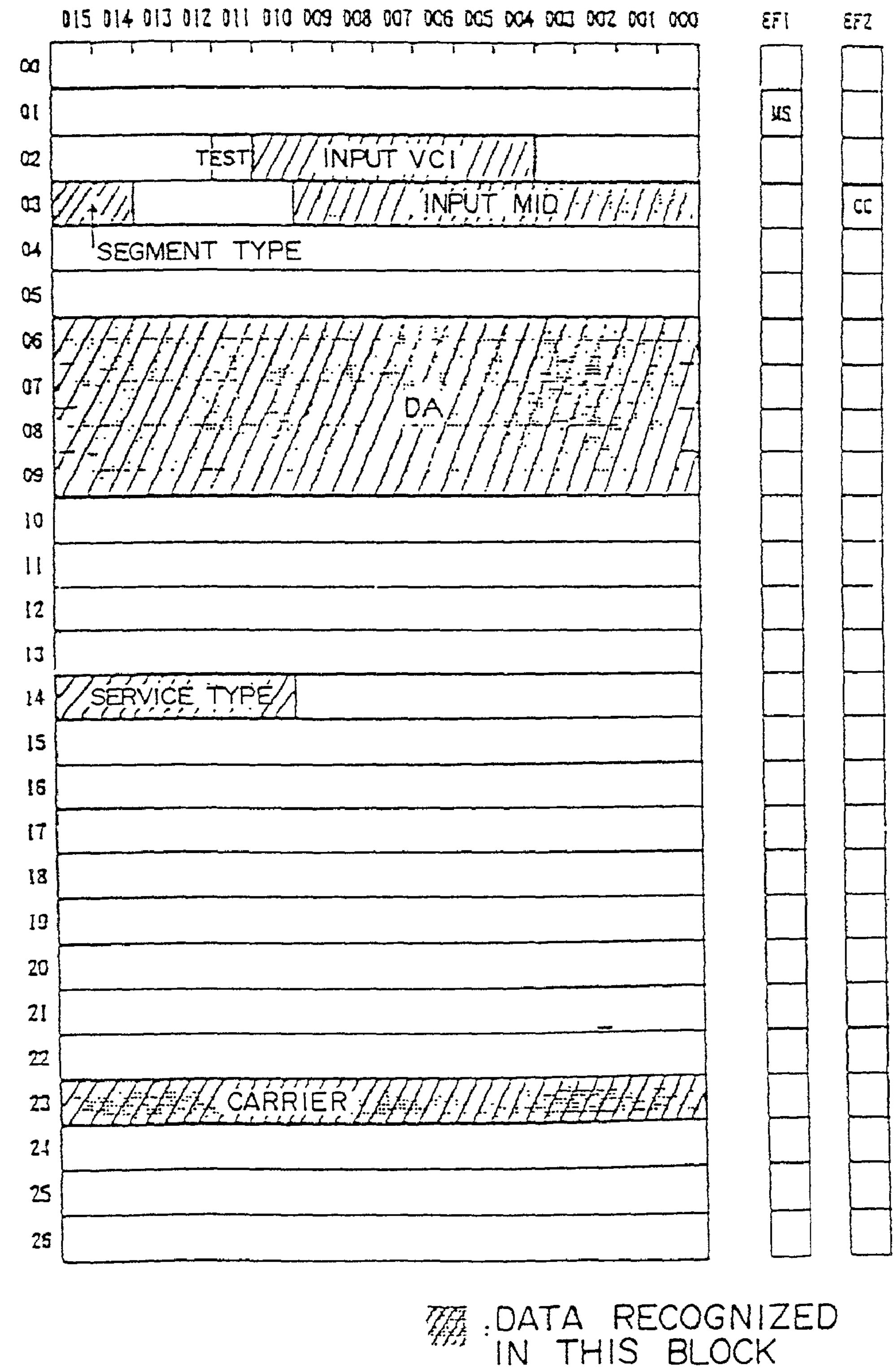

FIG. 529 shows the format of a cell input to the HMH12A of the ICLP.

Figure 530:
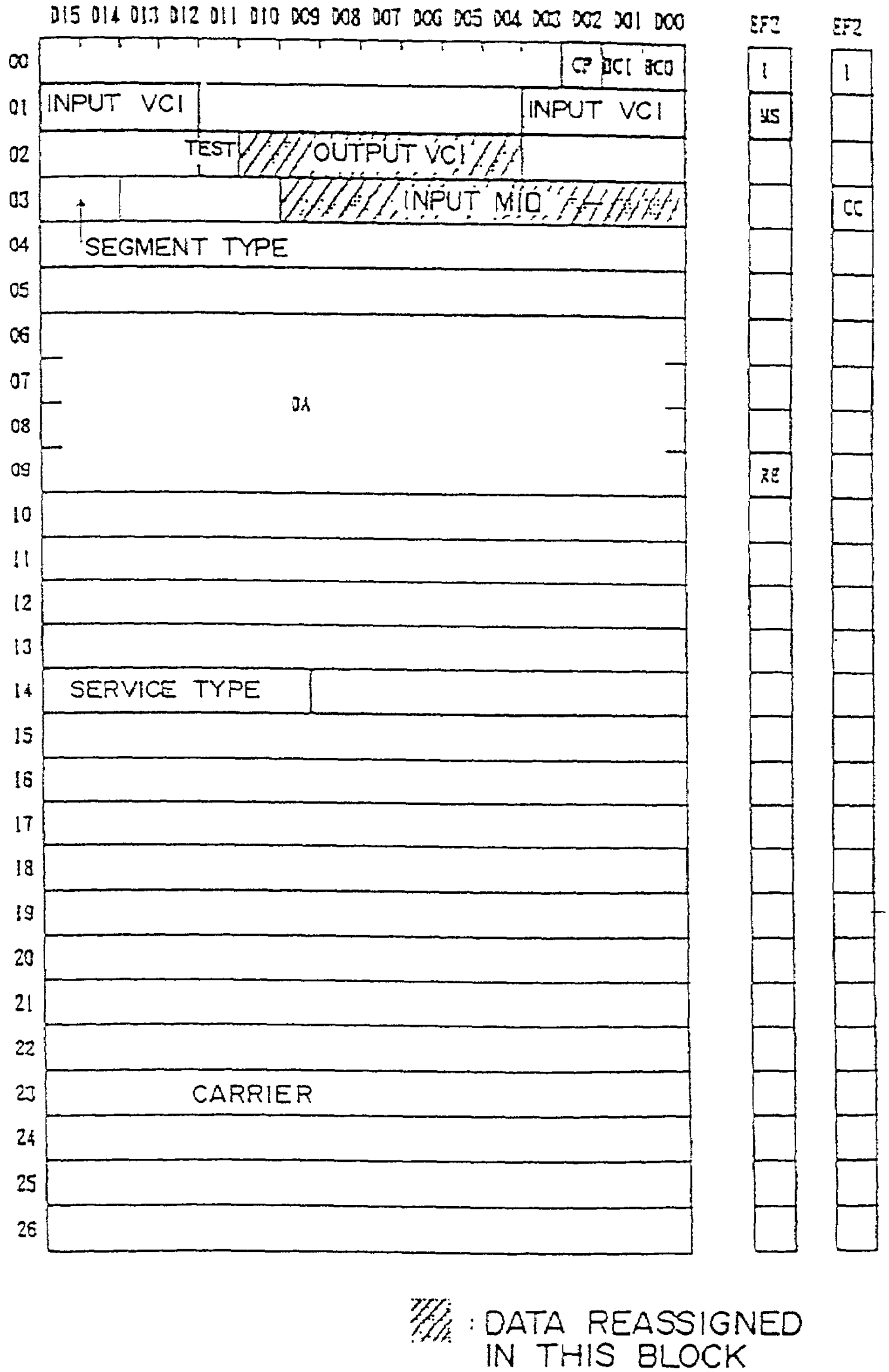

FIG. 530 shows the format of a cell output from the HMH12A of the ICLP.

Figure 531:
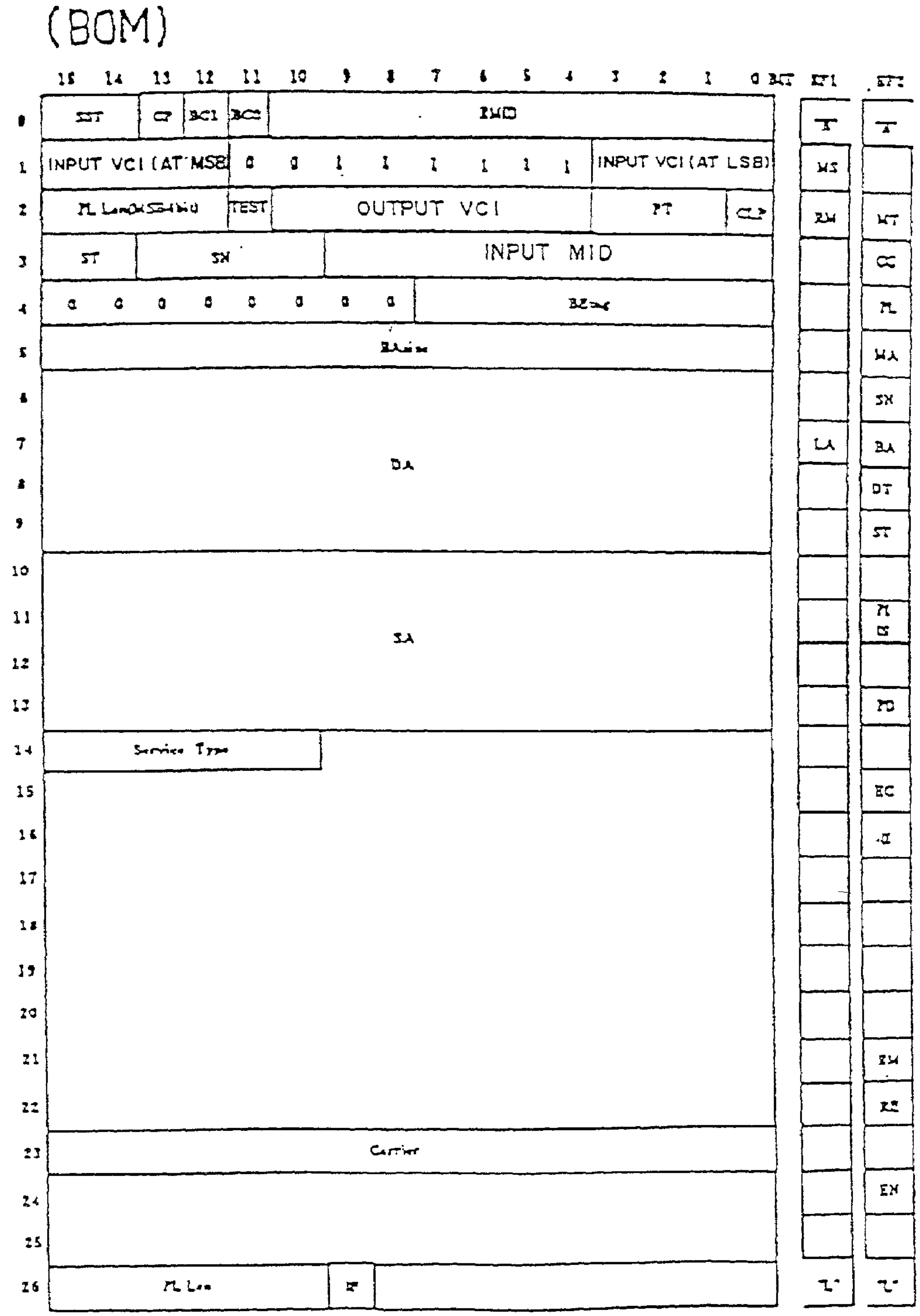

FIG. 531 shows the format (BOM) of a cell input to the HMH13A of the ICLP.

Figure 532:
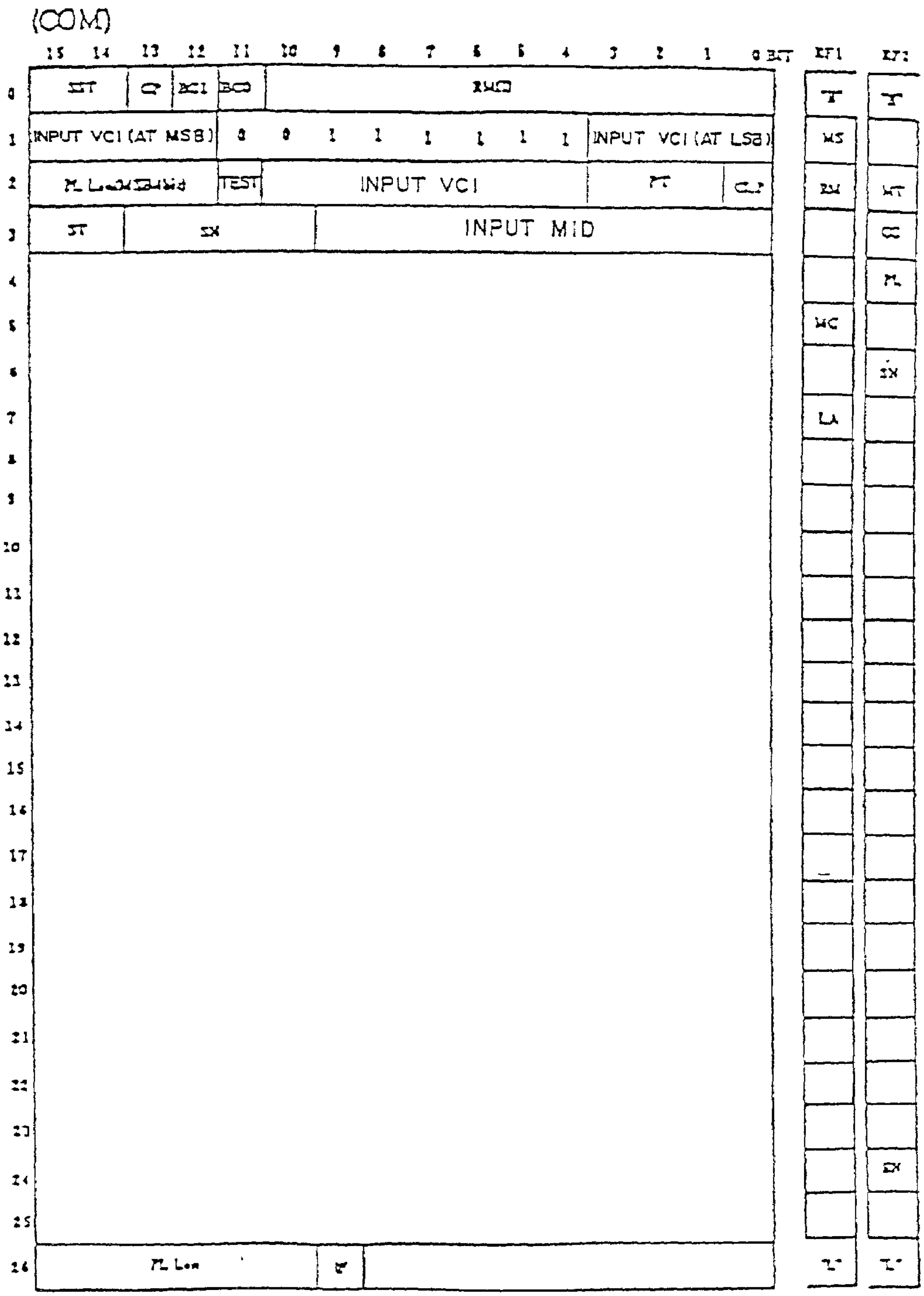

FIG. 532 shows the format (COM) of a cell input to the HMH13A of the ICLP.

Figure 533:
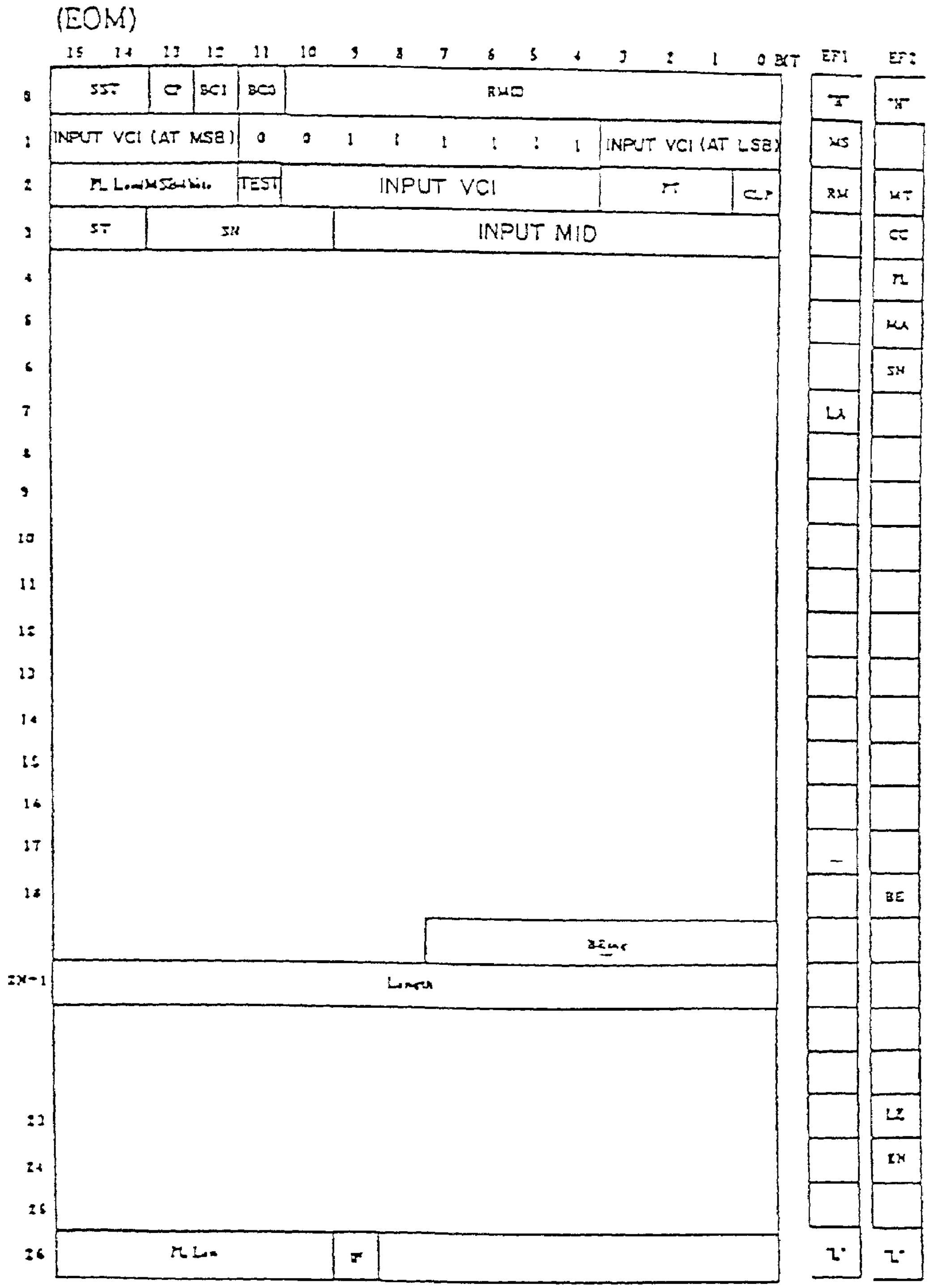

FIG. 533 shows the format (EOM) of a cell input to the HMH13A of the ICLP.

FIG. 534 shows the error flags shown in FIGS. 531 through 533.

Figure 535:
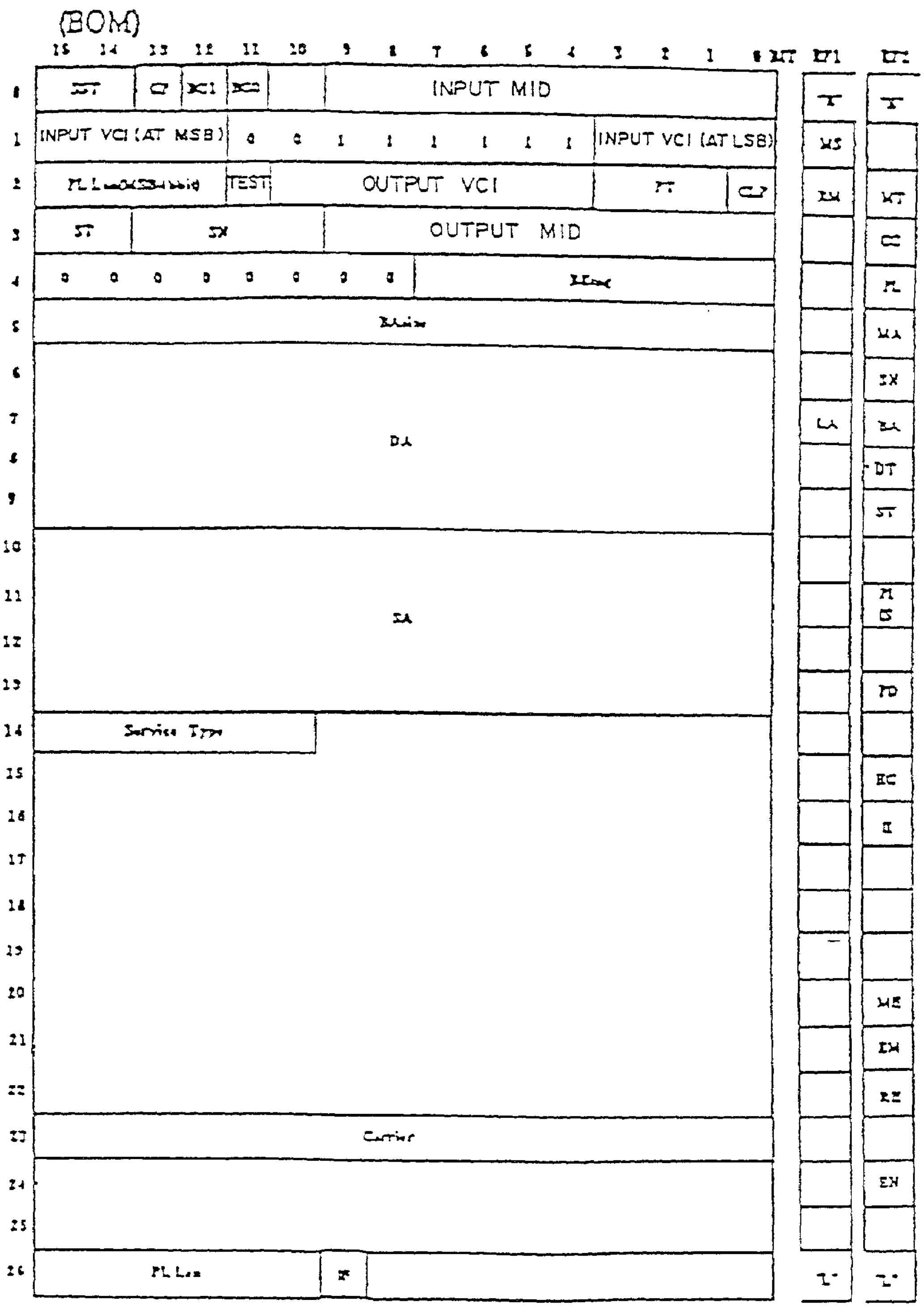

FIG. 535 shows the format (BOM) of a cell output to the HMH13A→HLP03A and HLP07A of the ICLP.

Figure 536:
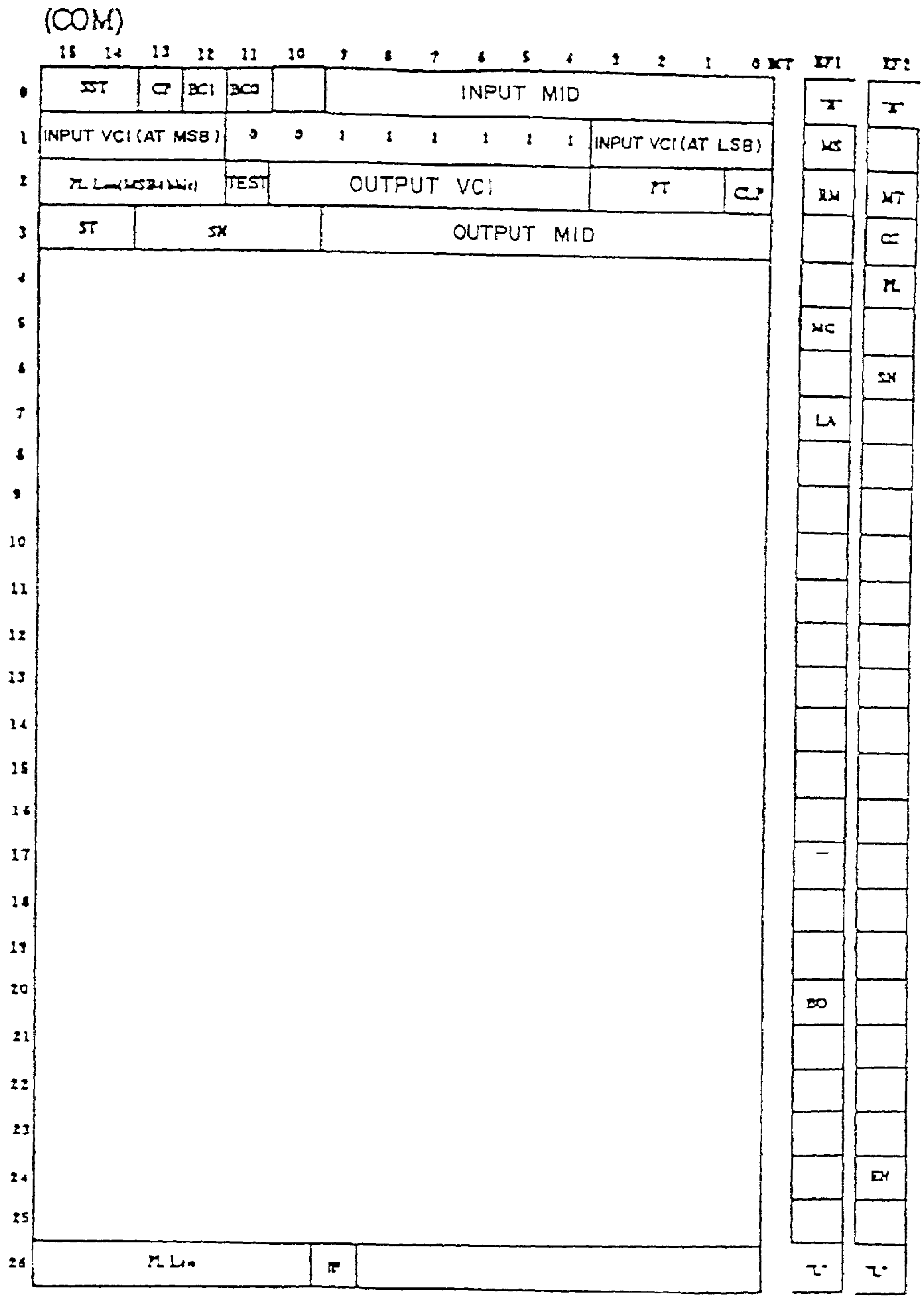

FIG. 536 shows the format (COM) of a cell output to the HMH13A→HLP03A and HLP07A of the ICLP.

Figure 537:
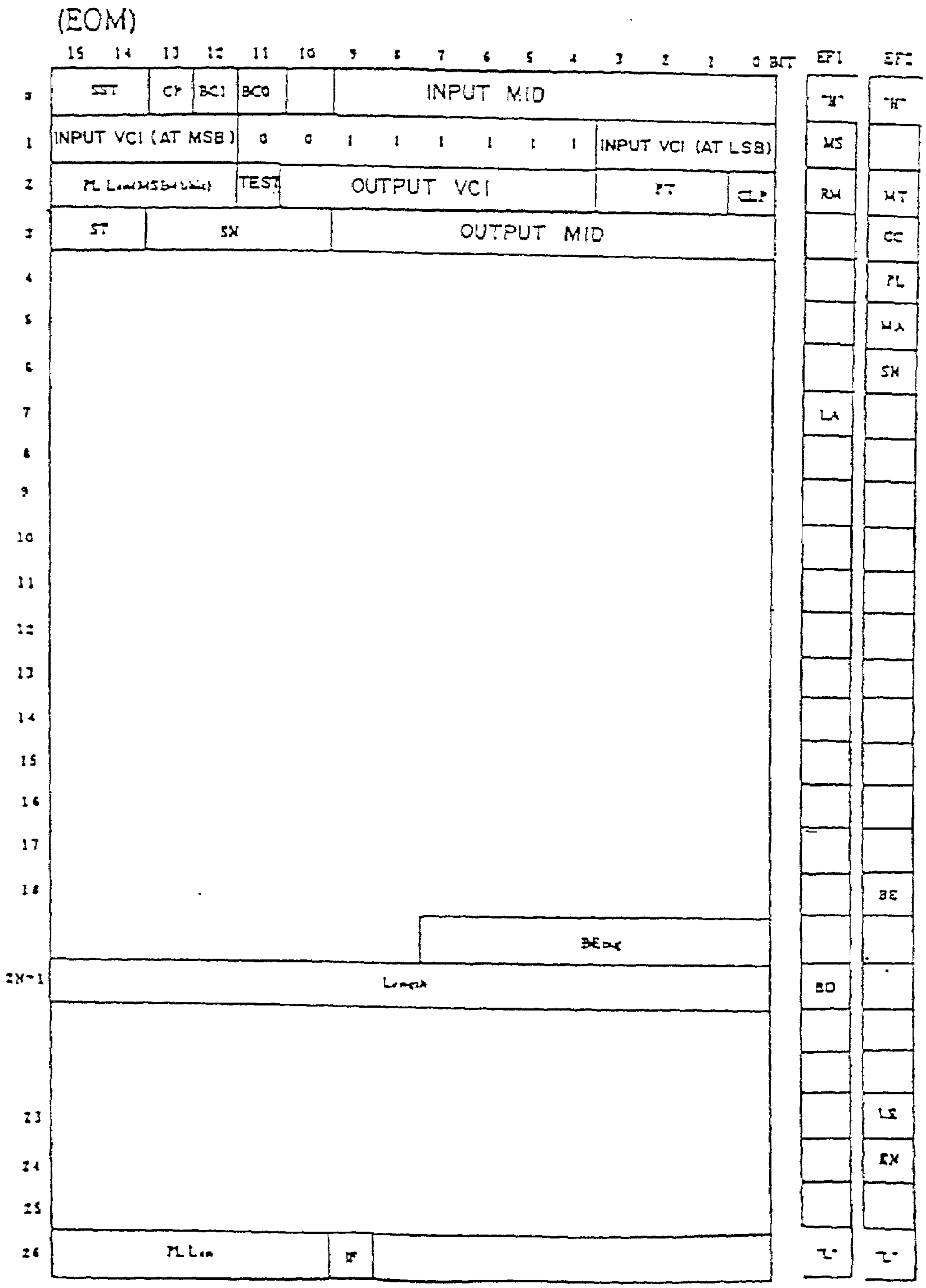

FIG. 537 shows the format (EOM) of a cell output to the HMH13A→HLP03A and HLP07A of the ICLP.

FIG. 538 shows the error flags shown in FIGS. 535 through 537.

Figure 539:
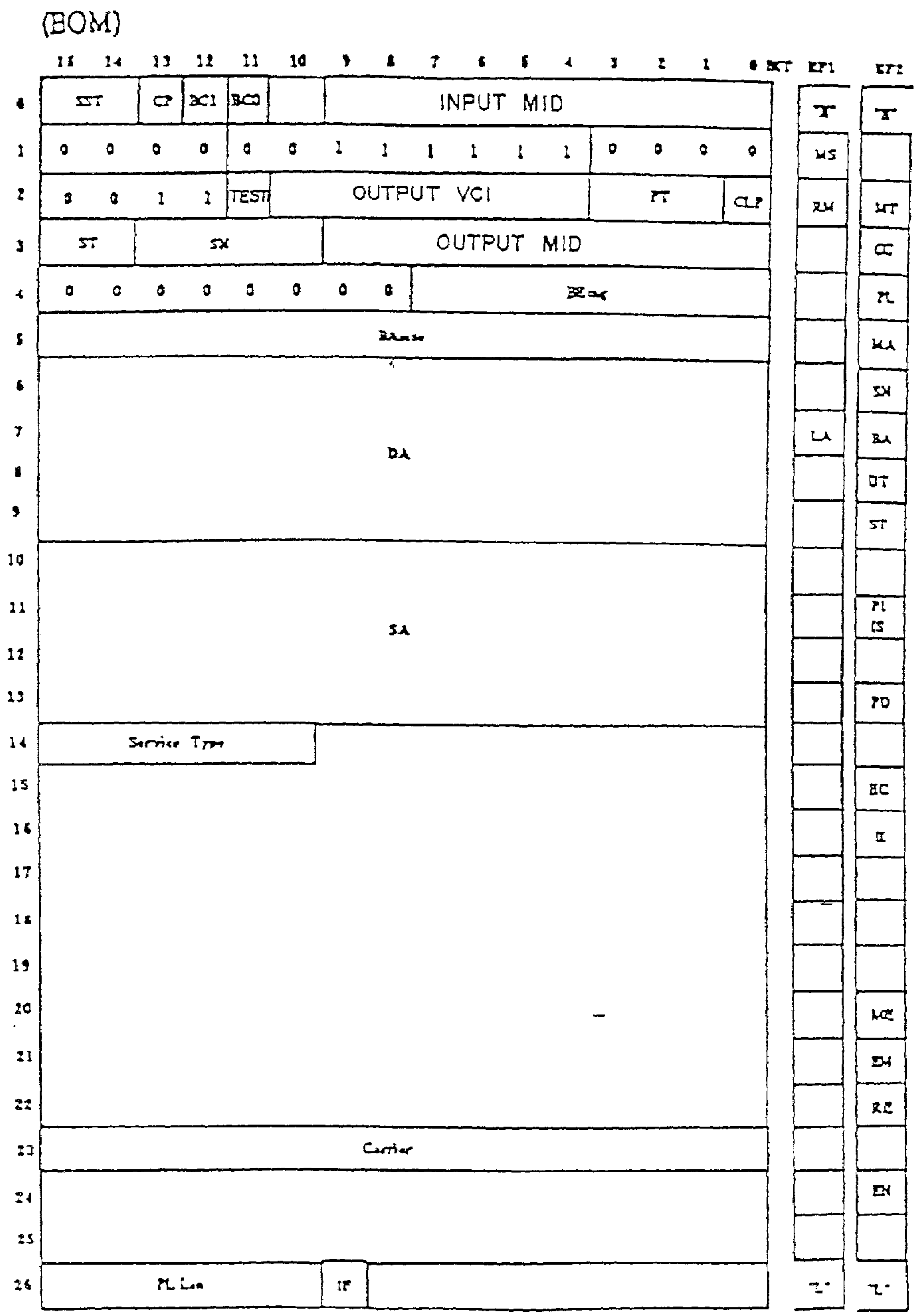

FIG. 539 shows the format (BOM) of a cell output to the HMH13A→HMX12A of the ICLP.

Figure 540:
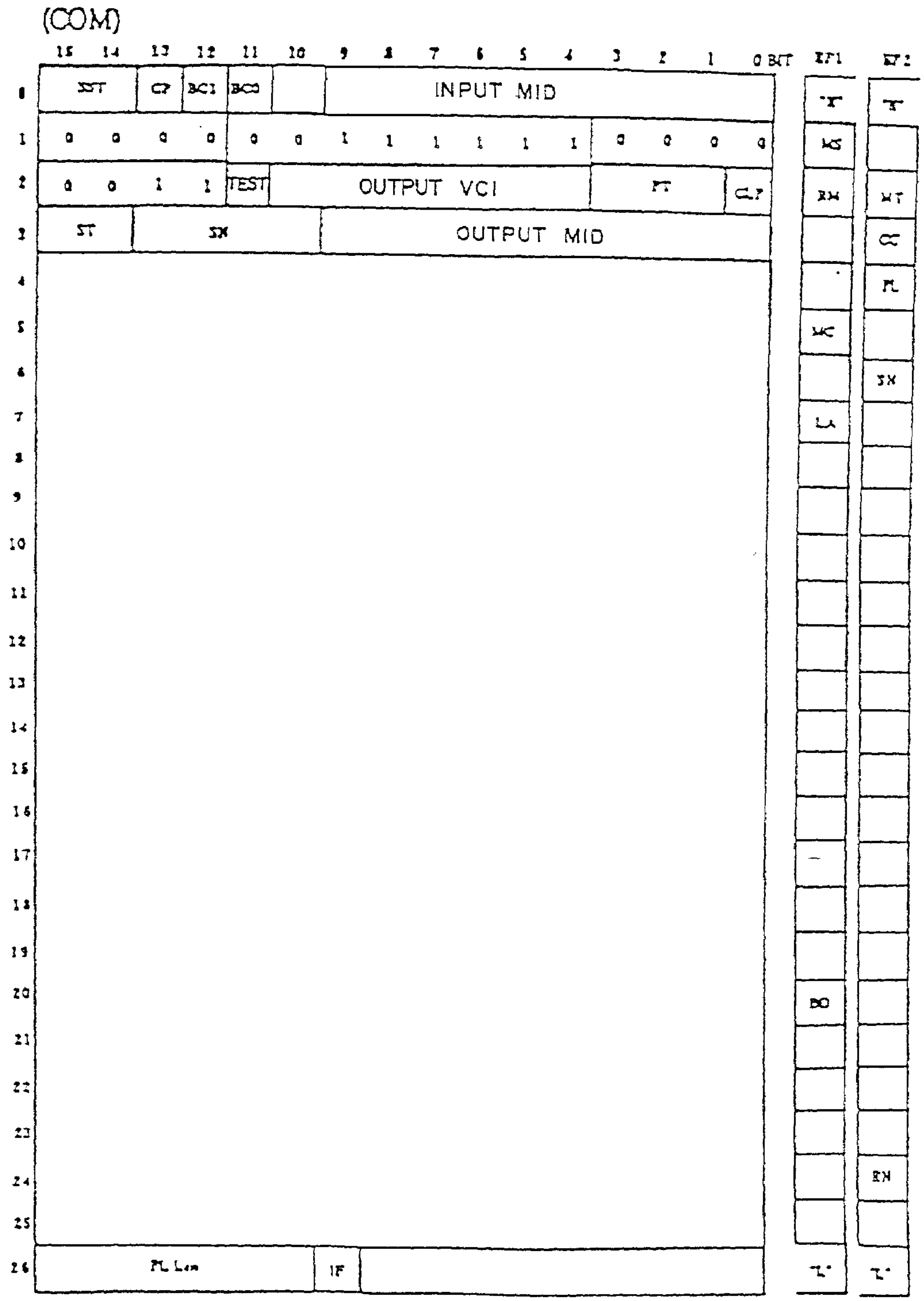

FIG. 540 shows the format (COM) of a cell output to the HMH13A→HMX12A of the ICLP.

Figure 541:
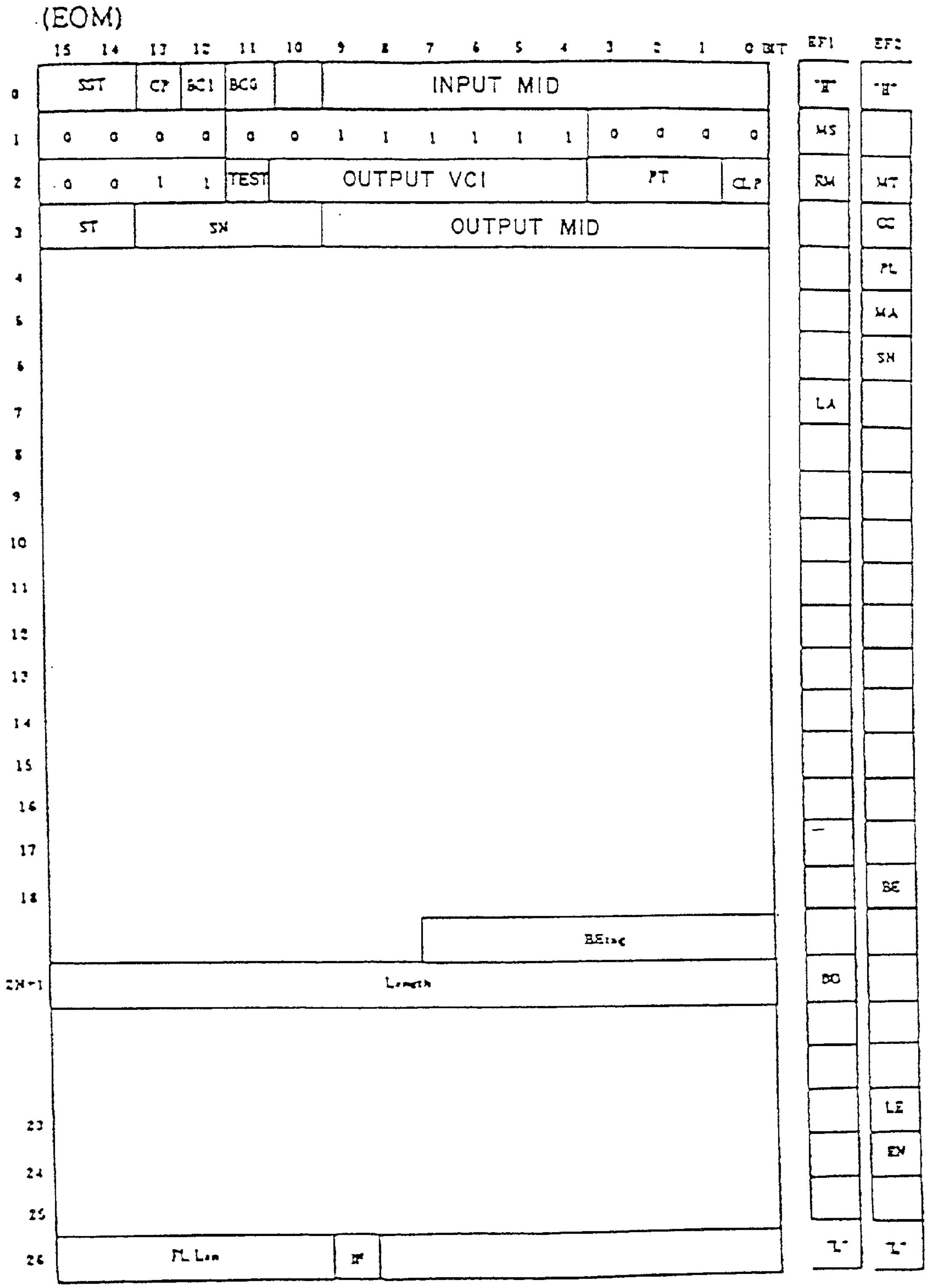

FIG. 541 shows the format (EOM) of a cell output to the HMH13A→HMX12A of the ICLP.

FIG. 542 shows the error flags shown in FIGS. 539 through 541.

Figure 543:
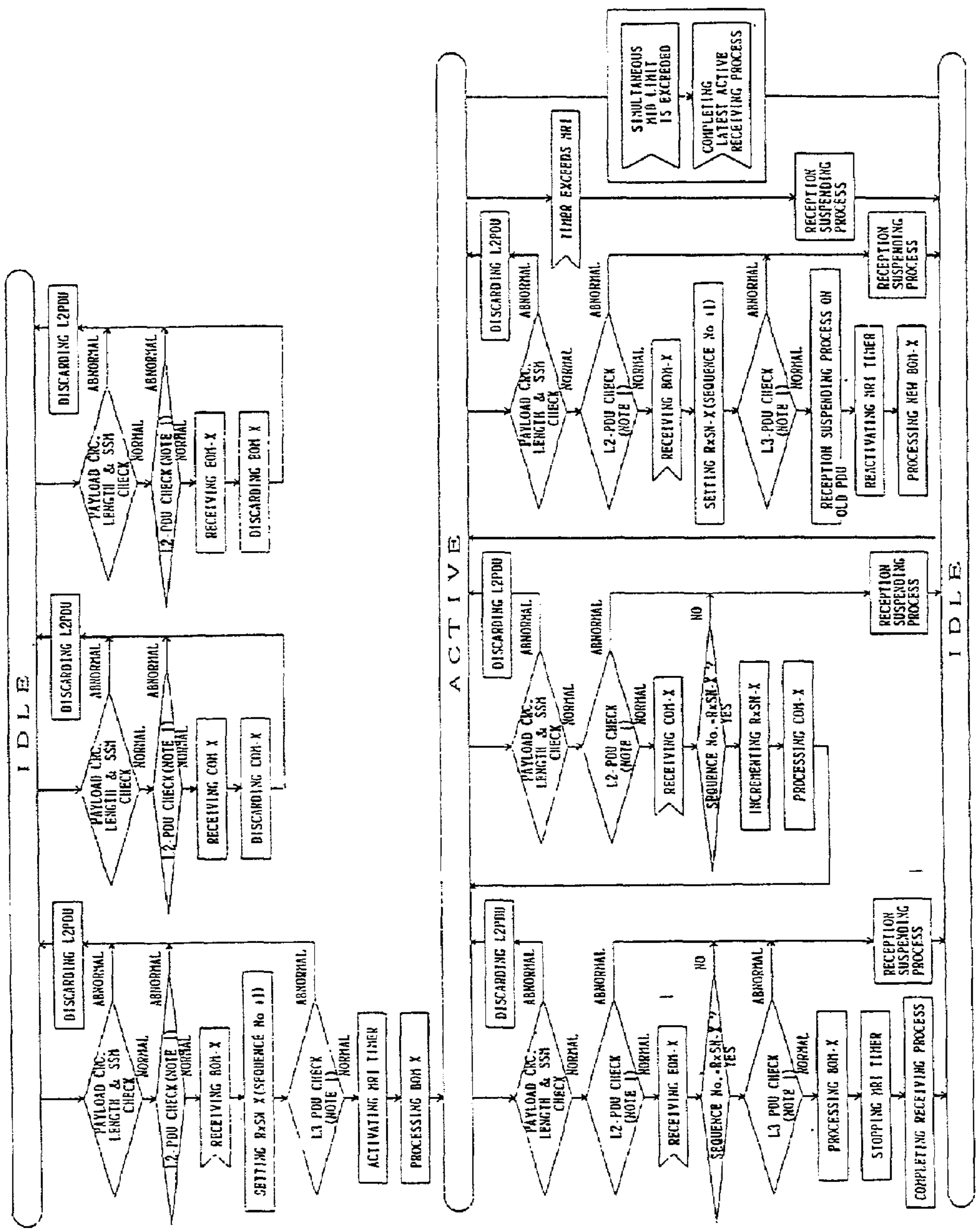

FIG. 543 is a flowchart showing the check made when the ICLP receives a message.

Figure 544:
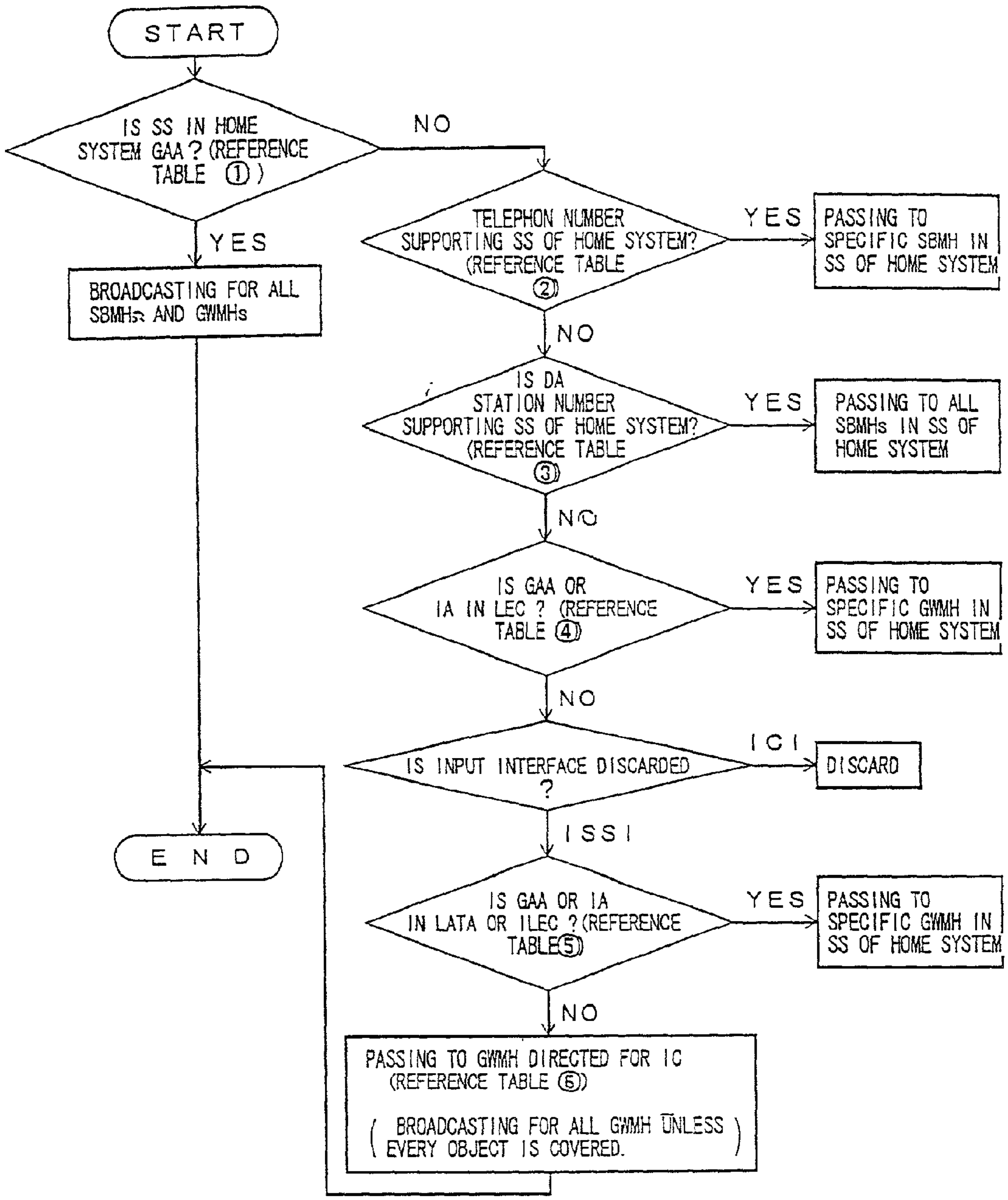

FIG. 544 is a flowchart showing the message routing process in the ICLP.

FIG. 545 supplementarily describes the flowchart of the message routing process.

Figure 546:
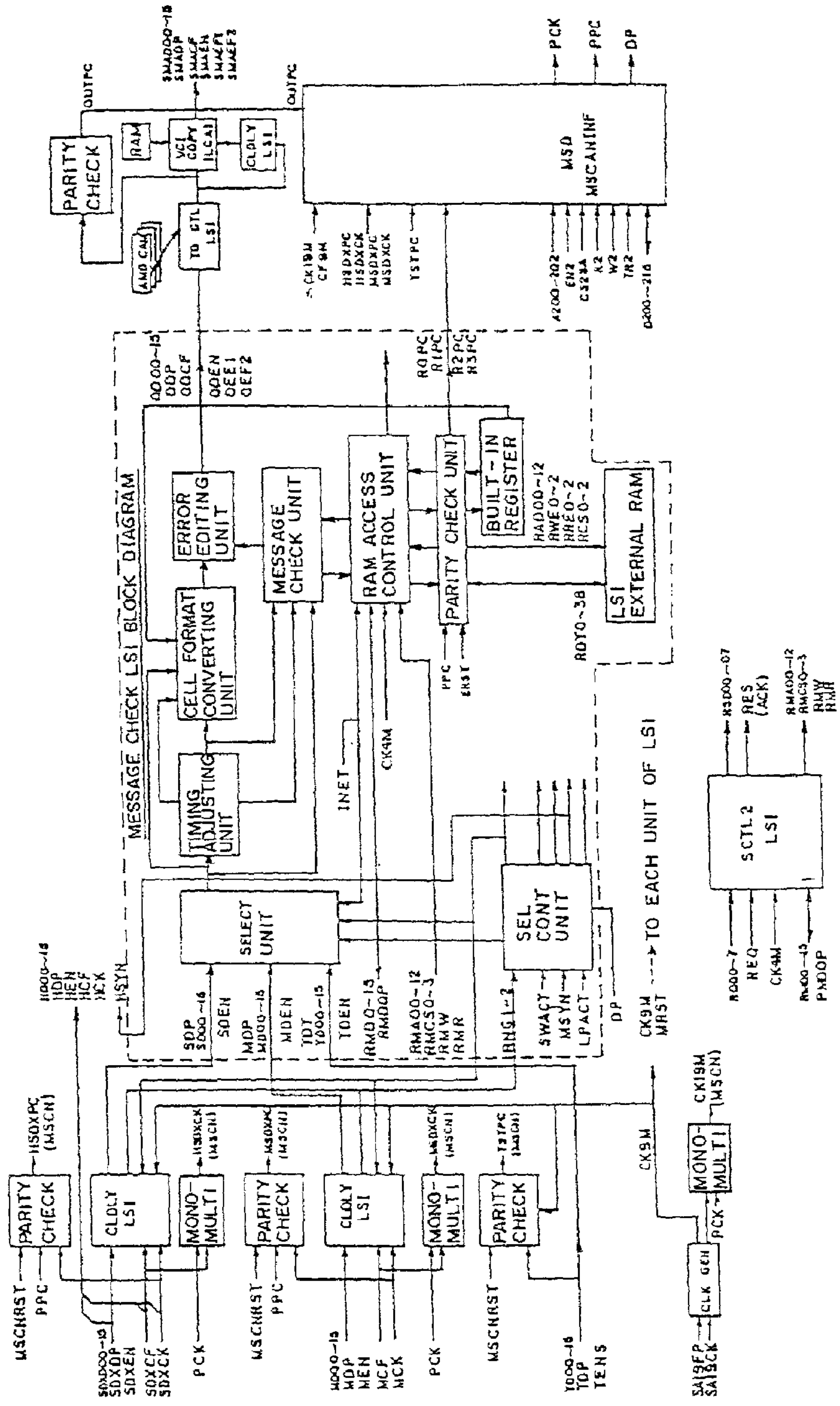

FIG. 546 is a block diagram showing the HMH11A.

FIG. 547 shows the external terminal unit of the HMH11A.

Figure 548:
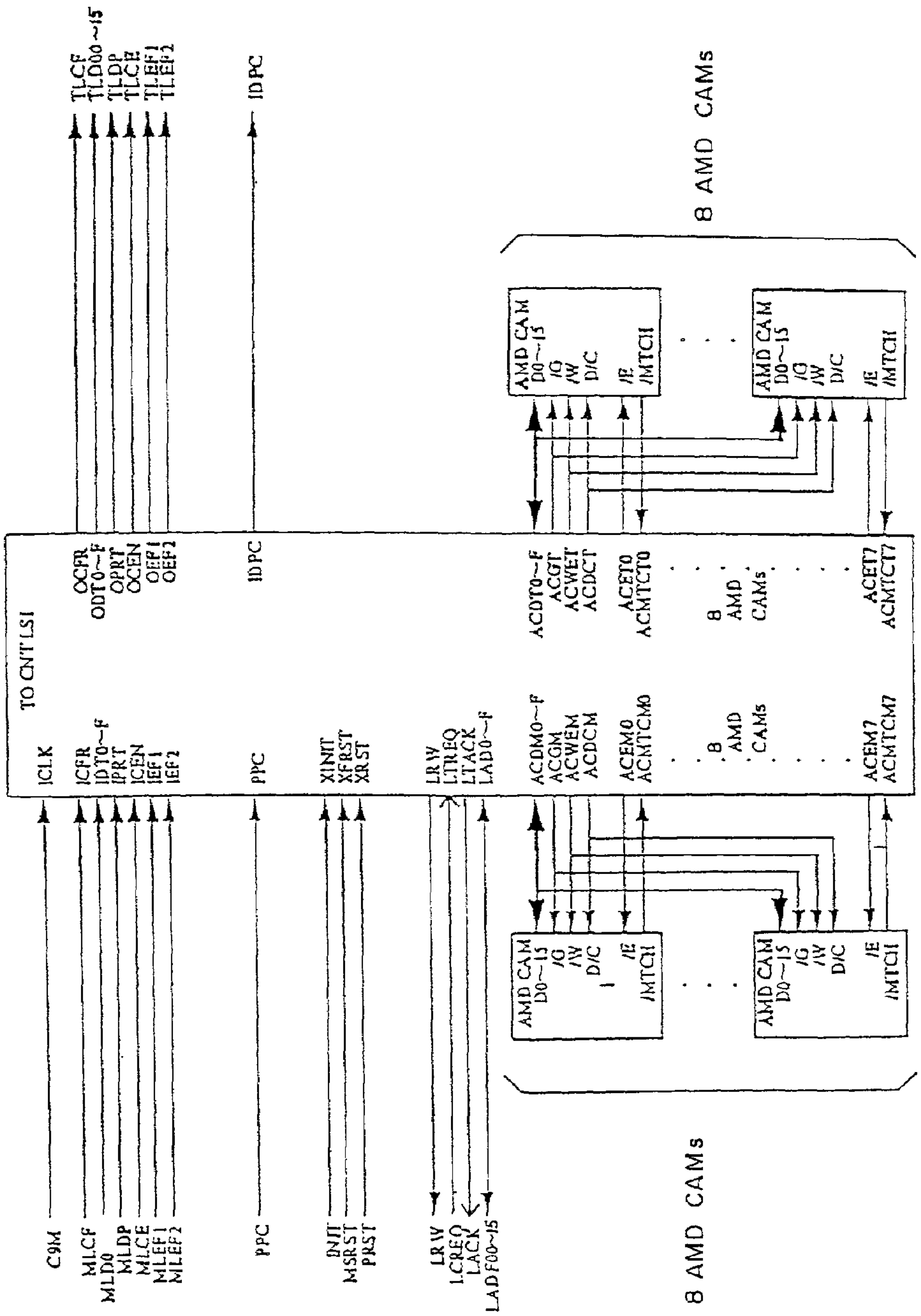

FIG. 548 shows the circuit (1) of the important part of the HMH11A.

Figure 549:
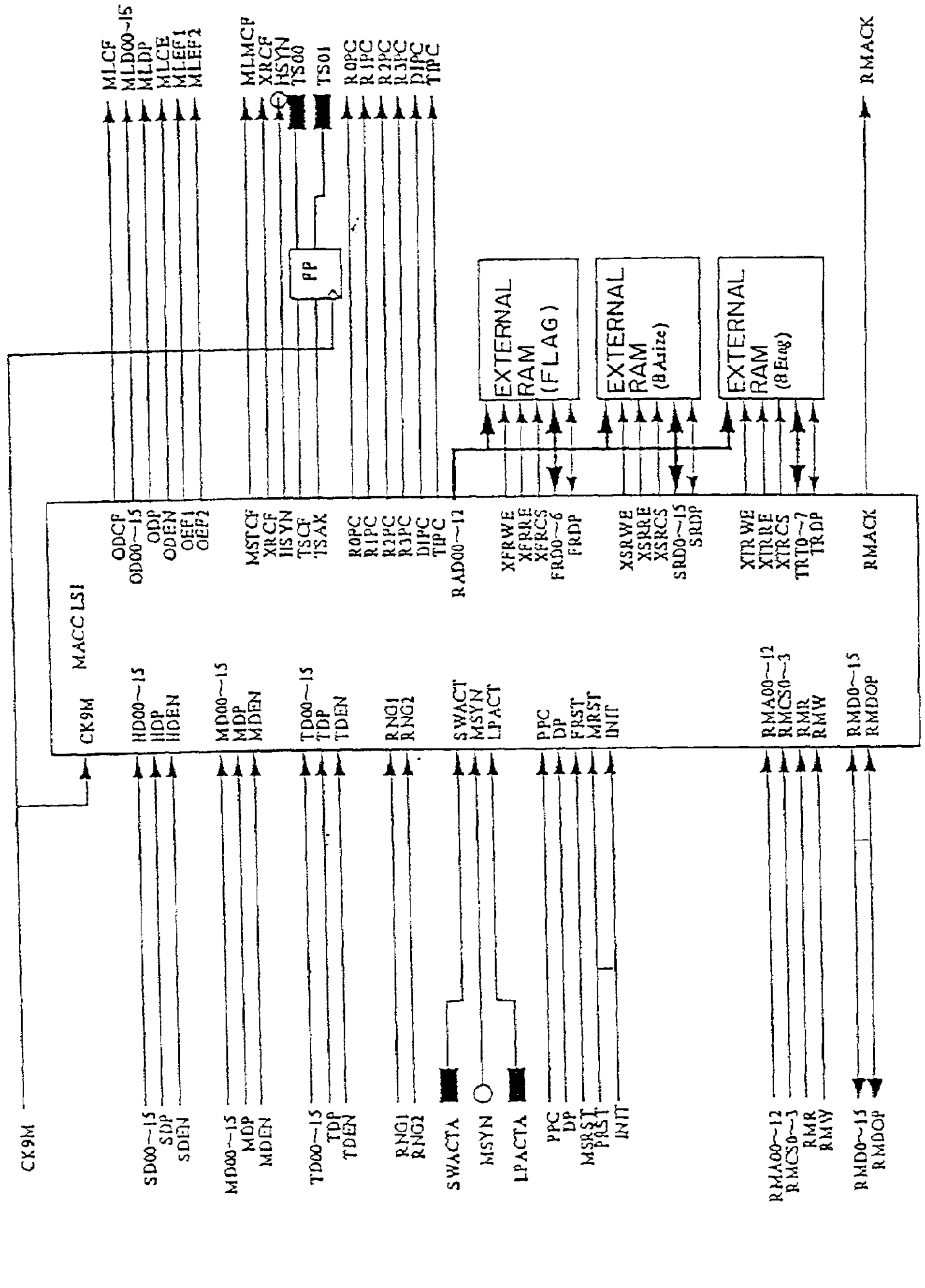

FIG. 549 shows the circuit (2) of the important part of the HMH11A.

Figure 550:
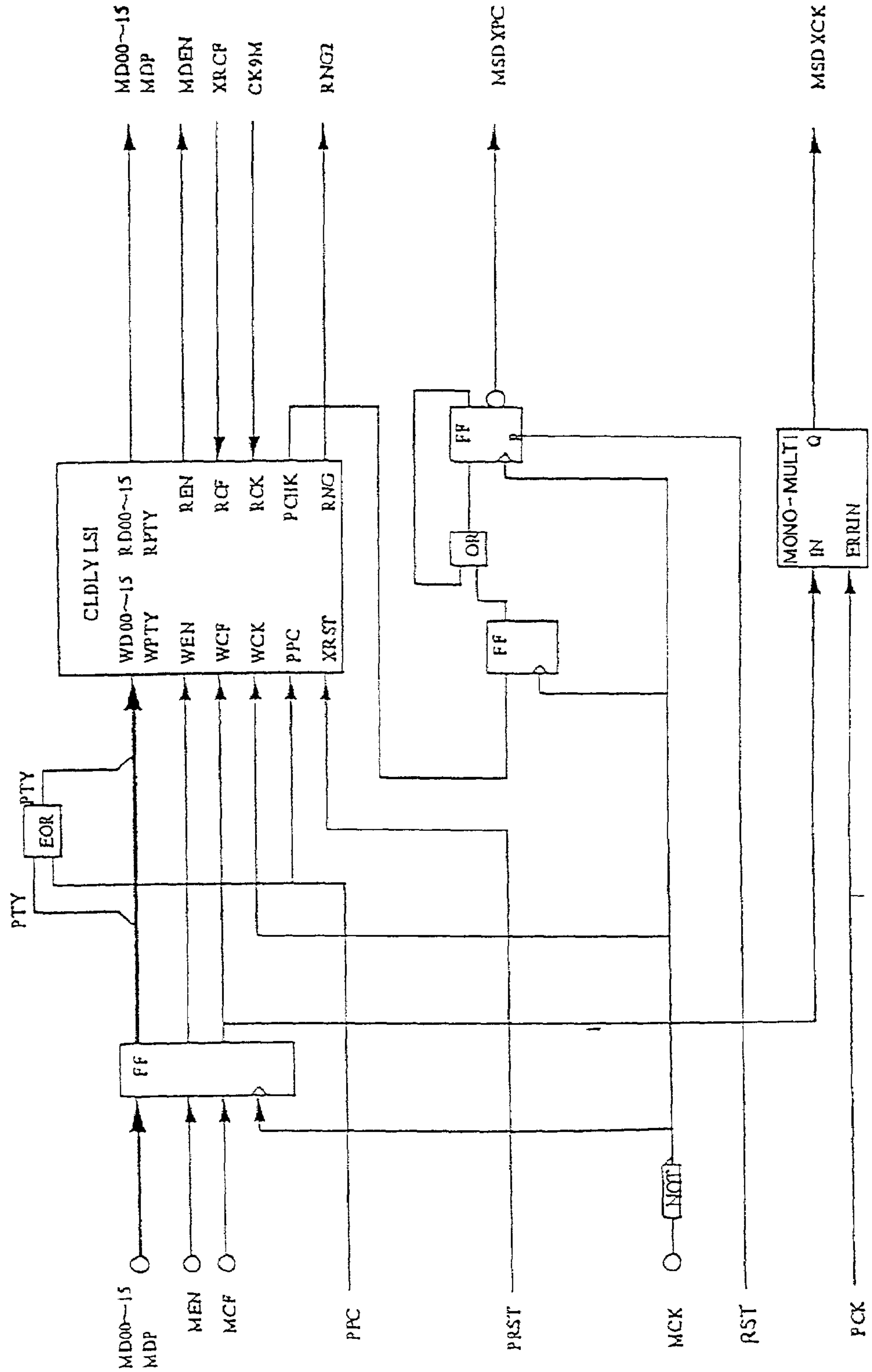

FIG. 550 shows the circuit (3) of the important part of the HMH11A.

Figure 551:
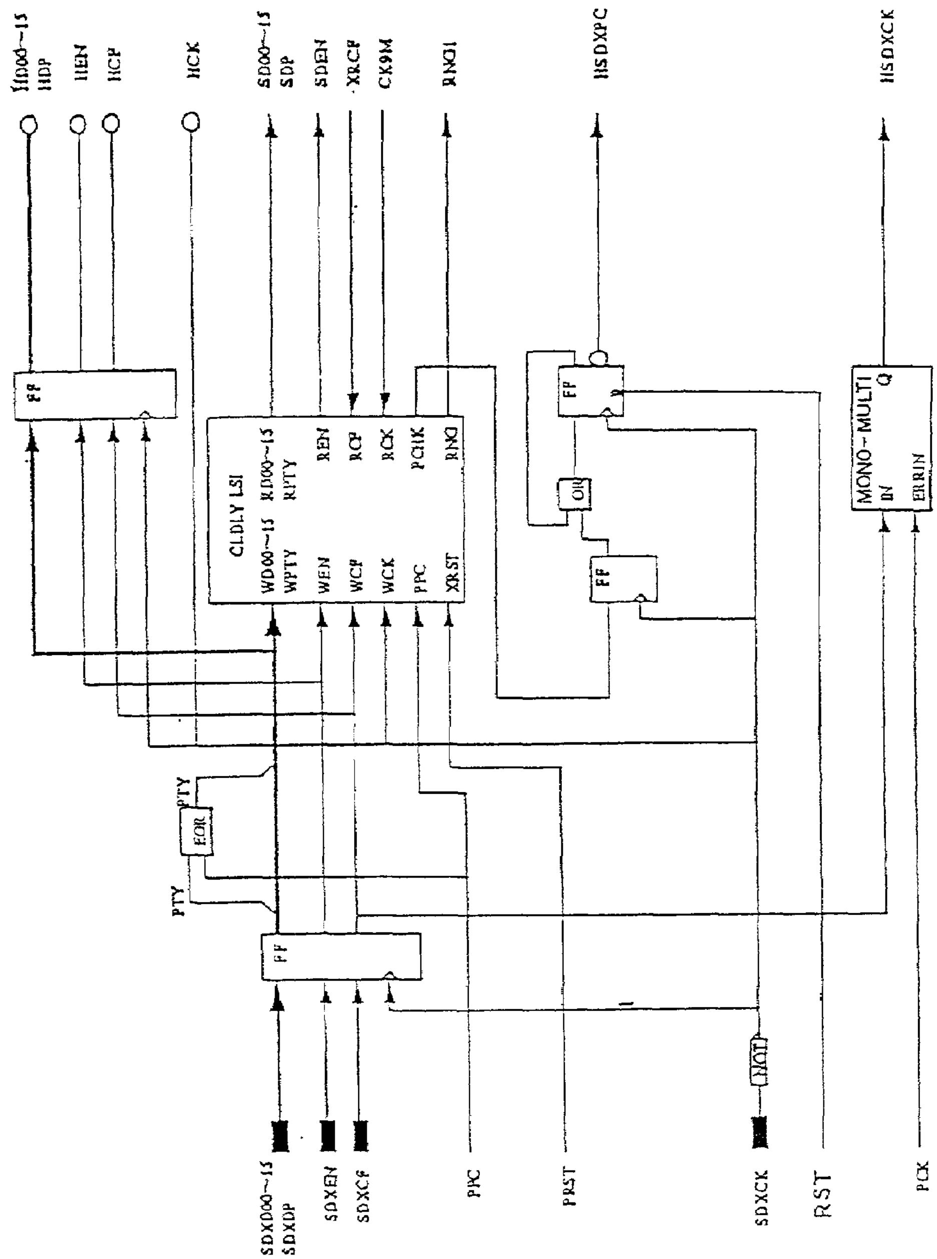

FIG. 551 shows the circuit (4) of the important part of the HMH11A.

Figure 552:
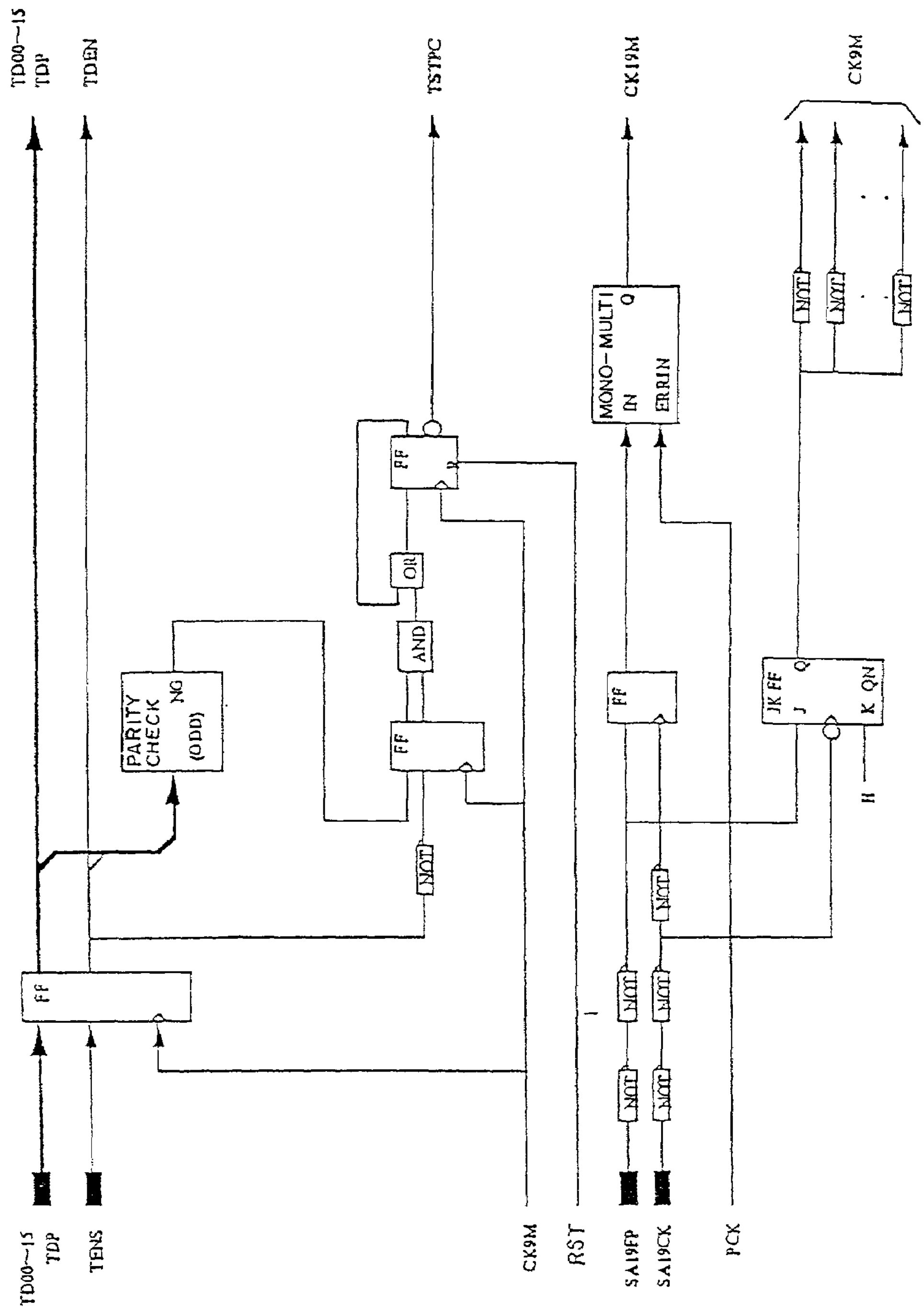

FIG. 552 shows the circuit (5) of the important part of the HMH11A.

Figure 553:
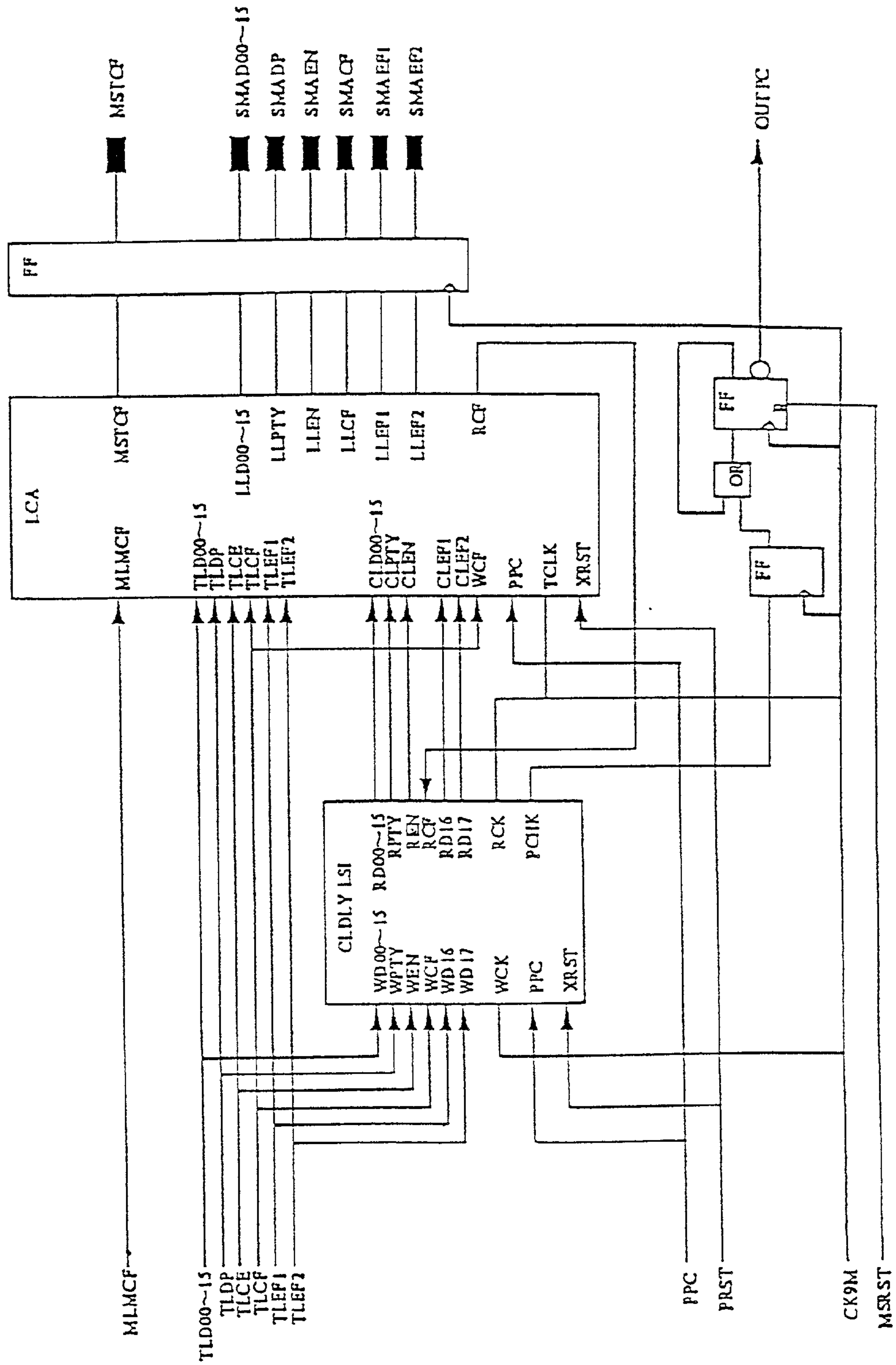

FIG. 553 shows the circuit (6) of the important part of the HMH11A.

Figure 554:
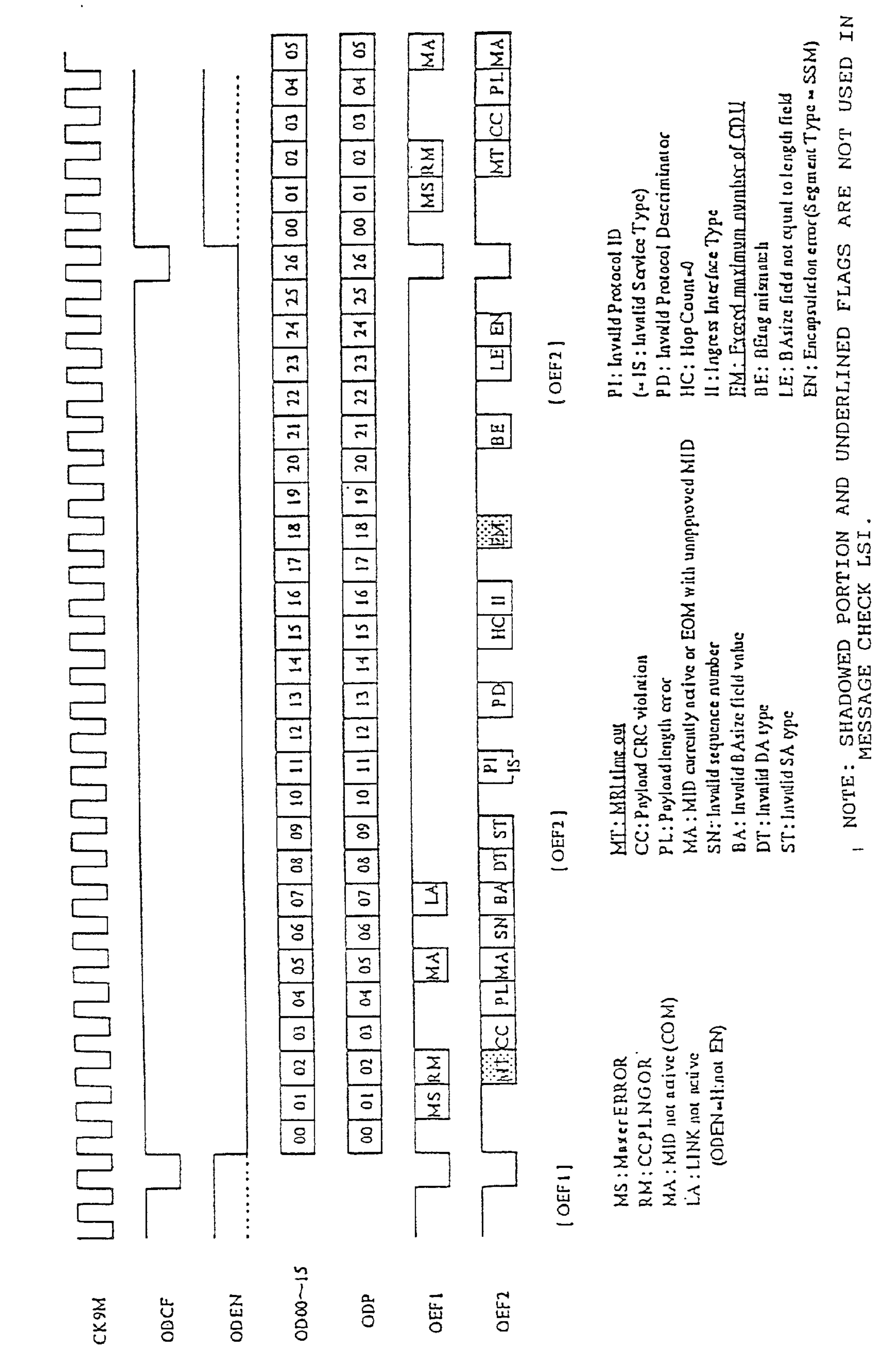

FIG. 554 shows the output timing of a main signal of the message check LSI of the HMH11A.

Figure 555:
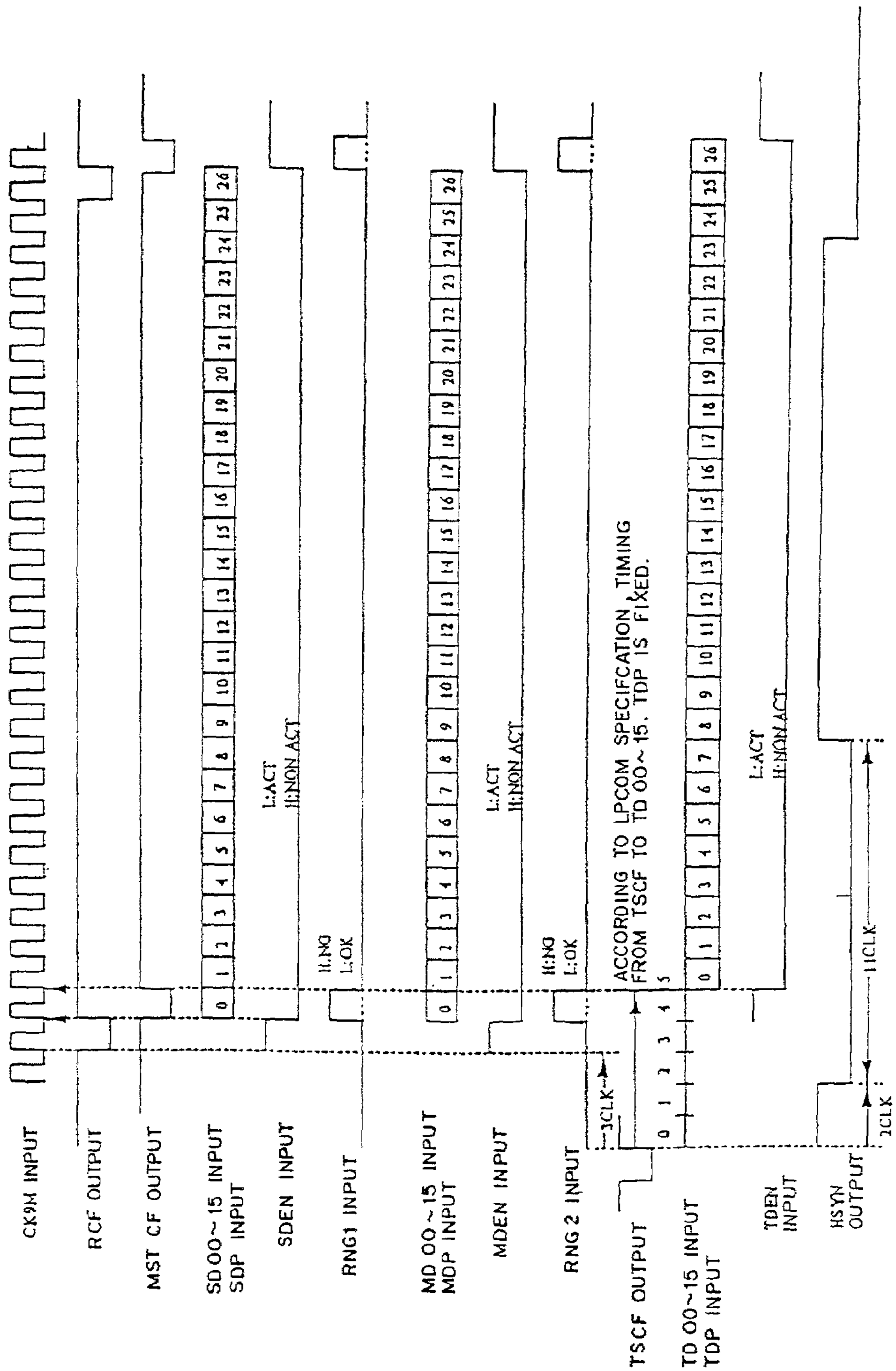

FIG. 555 shows the input/output timing of the cell data of the message check LSI of the HMH11A.

Figure 556:
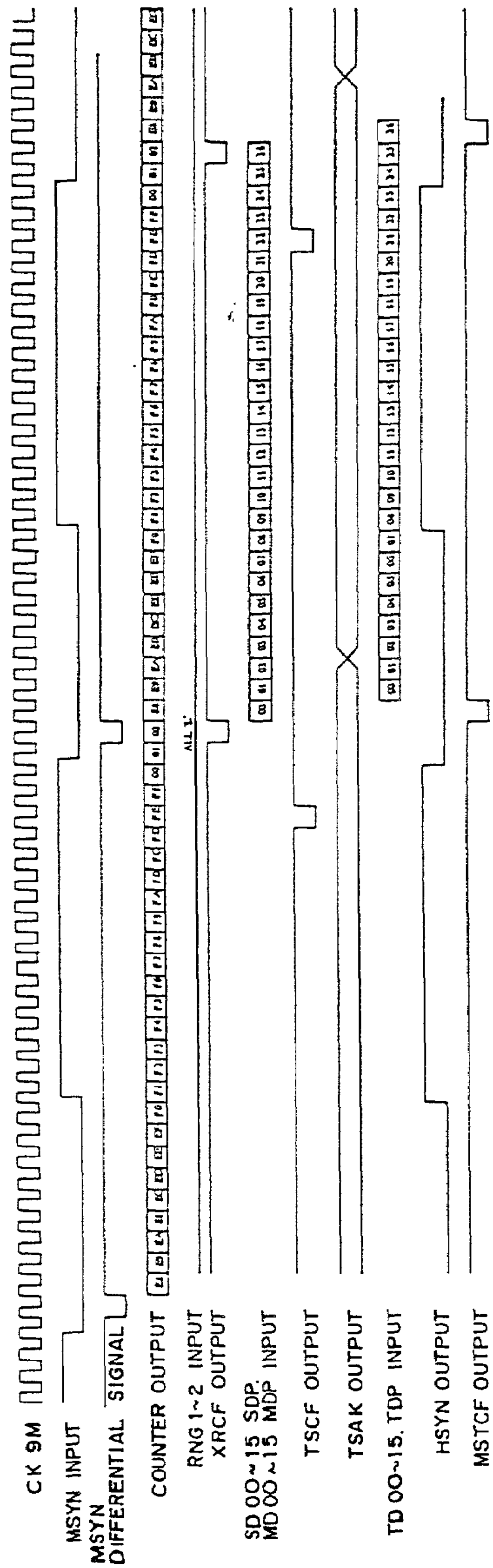

FIG. 556 shows the timing related to the cross-connection of systems (between NON ACT and RING 1, 2 OFF) in the message check LSI of the HMH11A.

Figure 557:
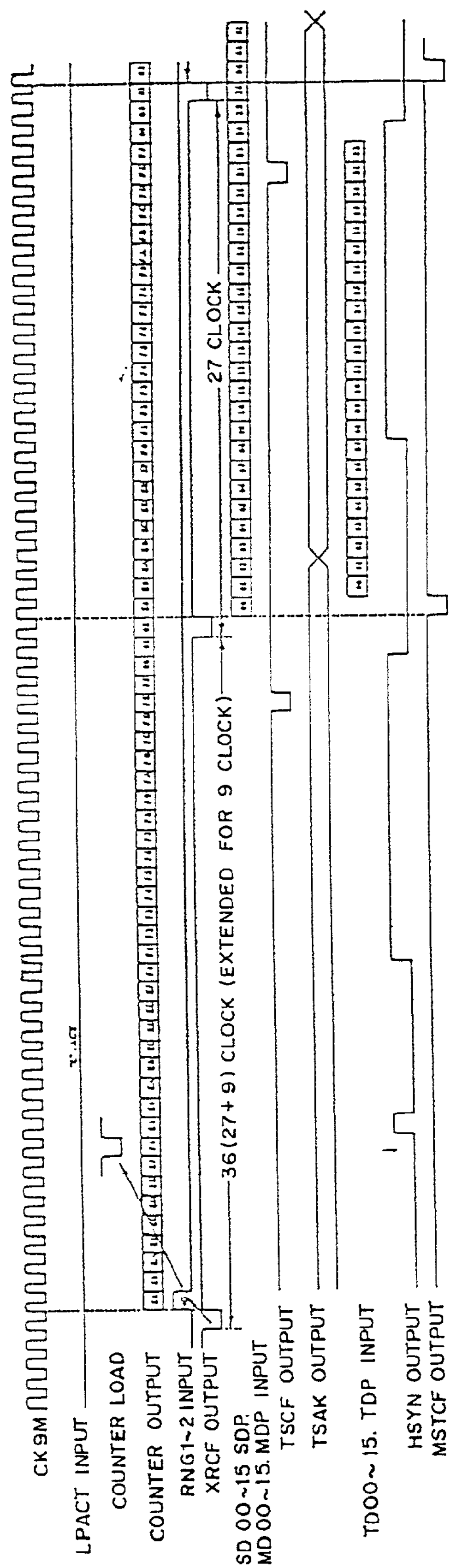

FIG. 557 shows the timing related to the cross-connection of systems (between NON ACT and RING 1, 2 ON) in the message check LSI of the HMH11A.

Figure 558:
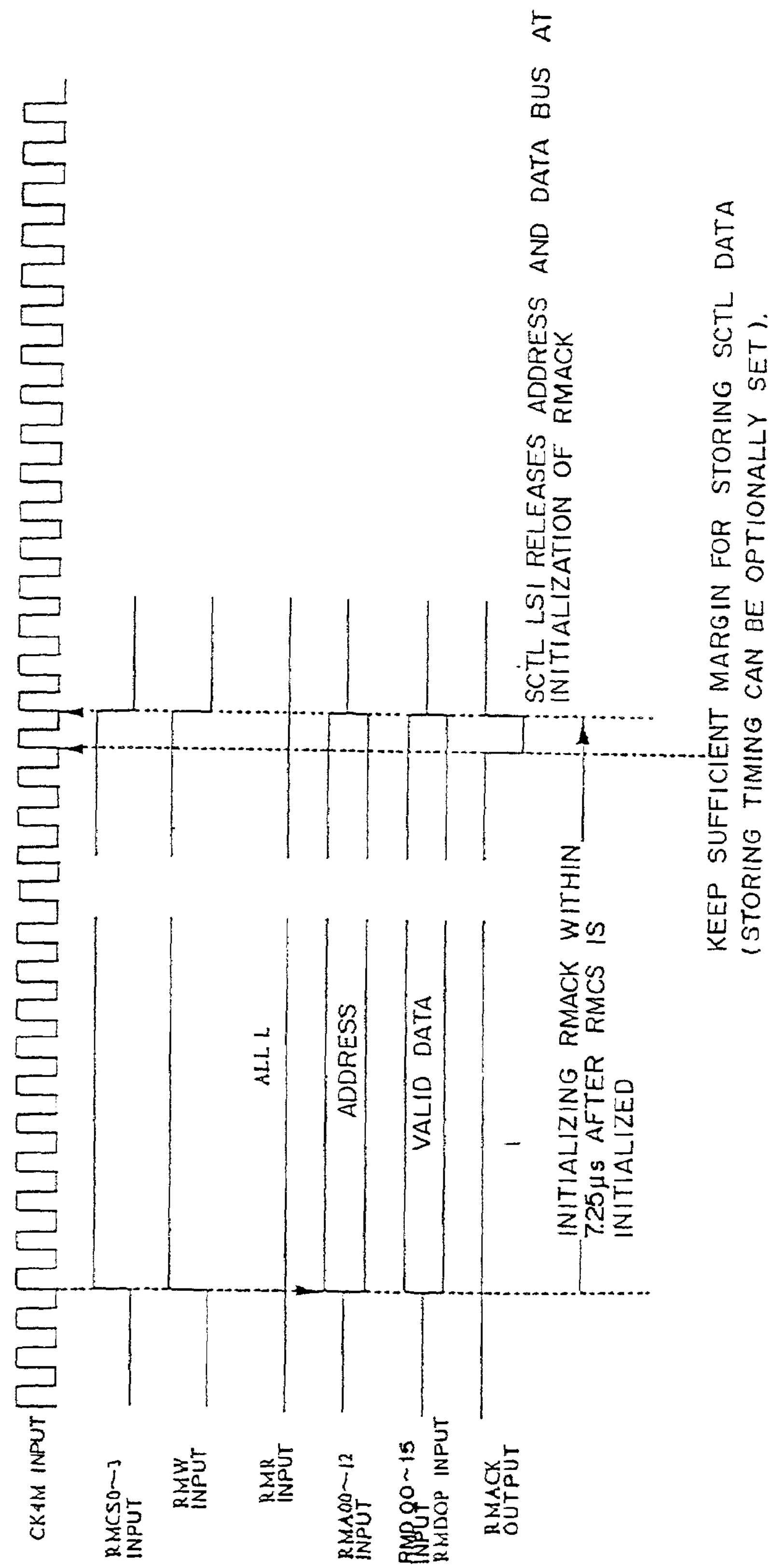

FIG. 558 shows the timing of transmitting data from the SCTL to the message check LSI.

Figure 559:
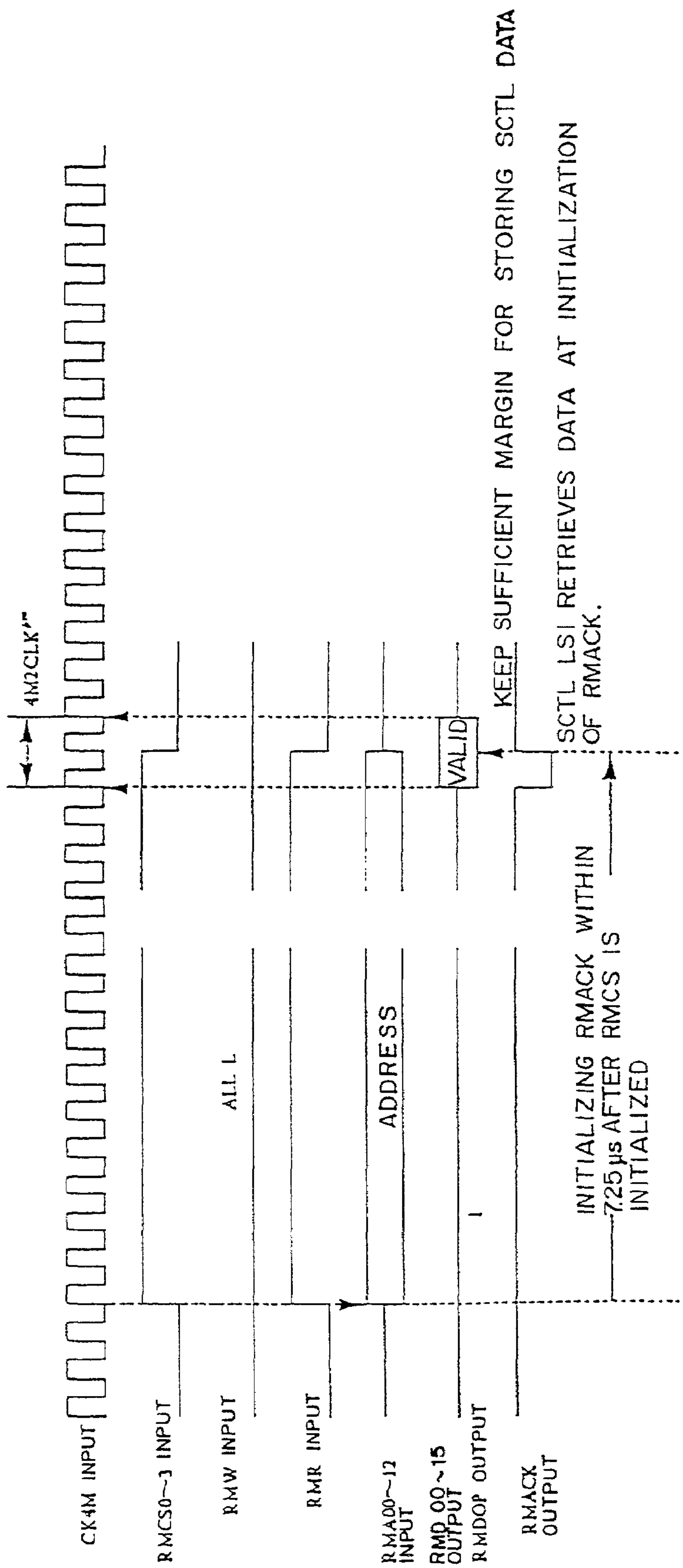

FIG. 559 shows the timing of transmitting data from the message check LSI to the SCTL.

Figure 560:
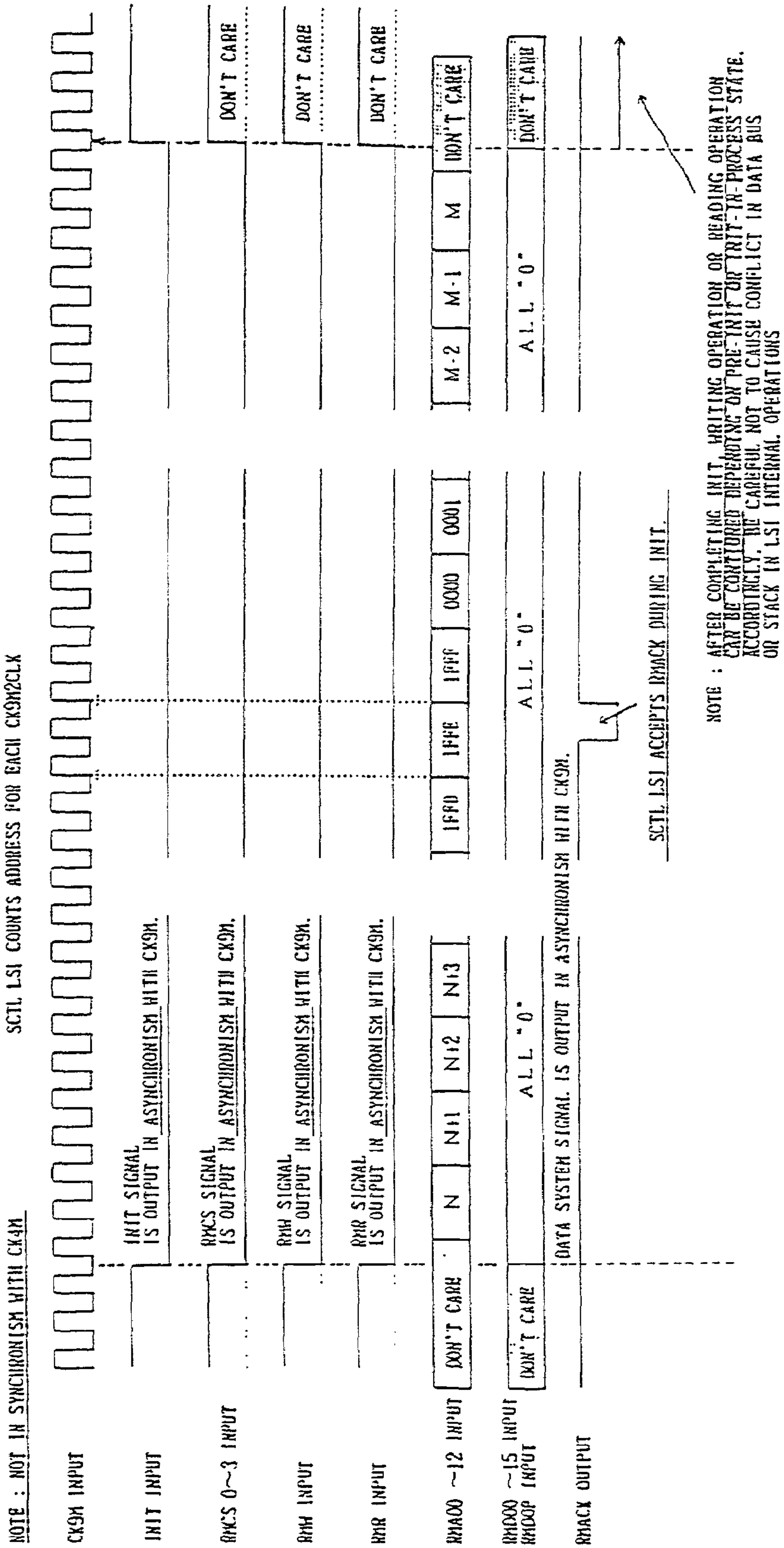

FIG. 560 shows the initialization timing from the SCTL to the message check LSI.

Figure 561:
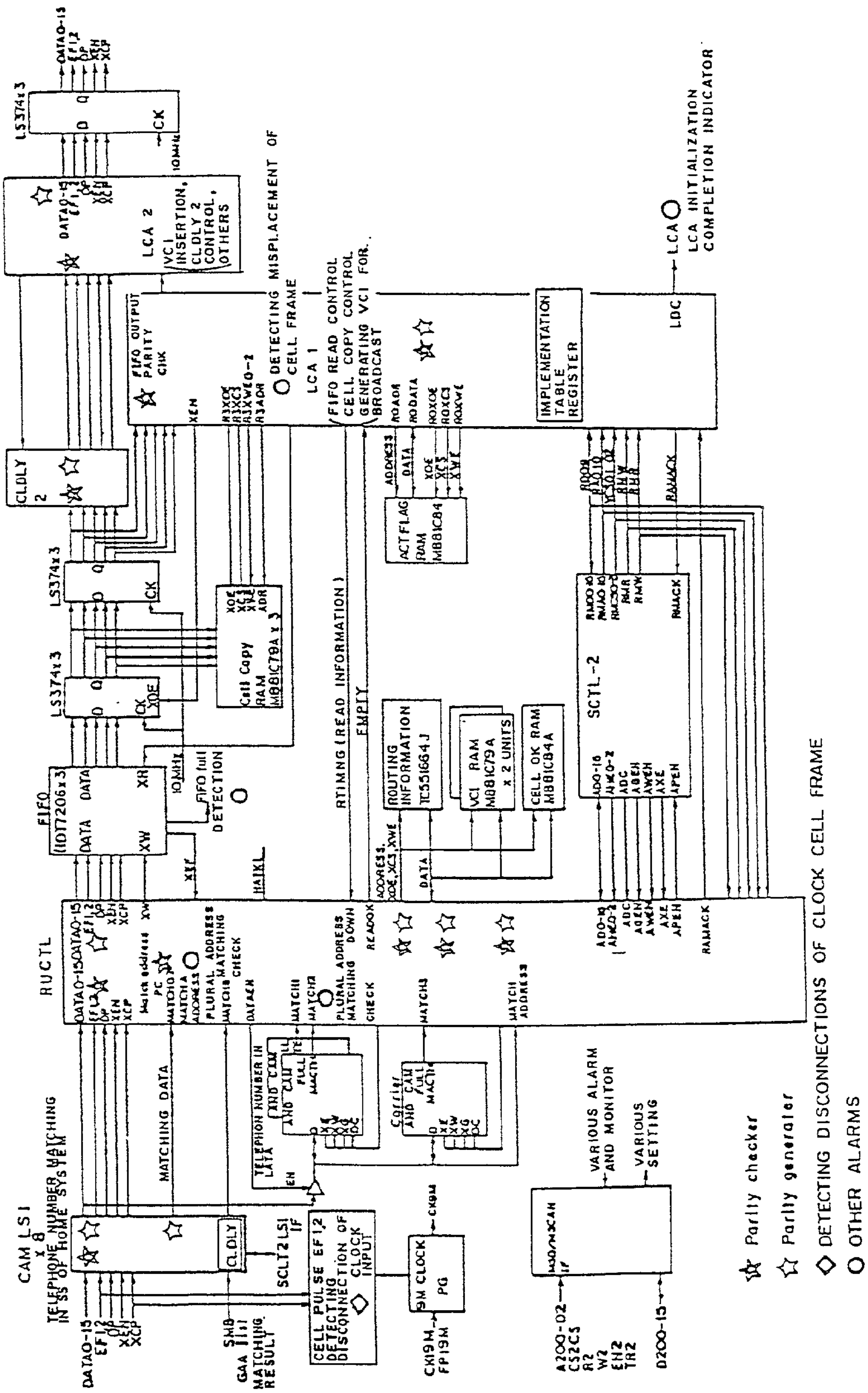

FIG. 561 is a block diagram showing the HMH12A.

Figure 562:
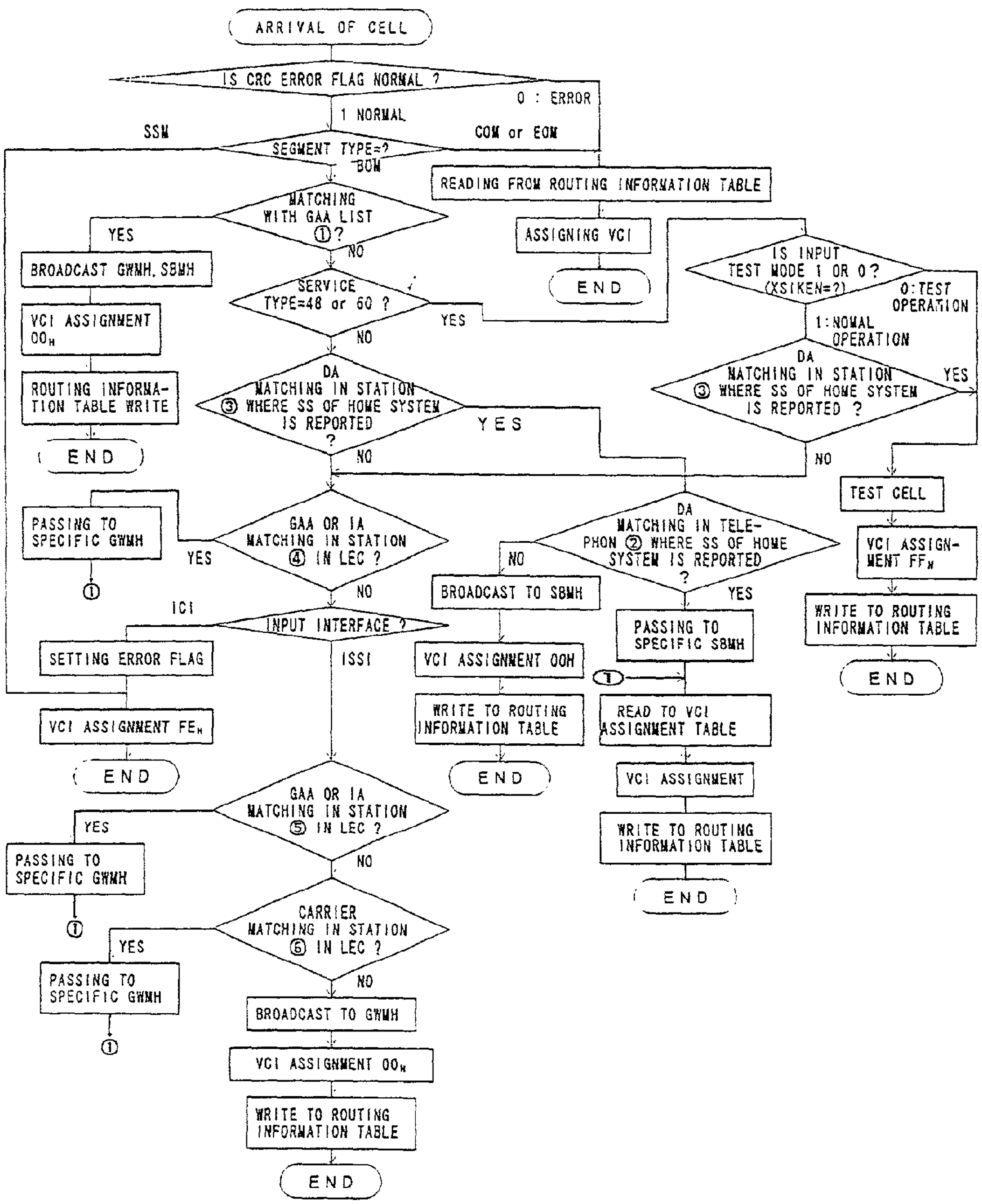

FIG. 562 is a flowchart showning the routing process of the HMH12A.

FIG. 563 is a flowchart showning the broadcast process of the HMH12A.

FIG. 564 is a flowchart (1) showing the copy control process of the HMH12A.

Figure 565:
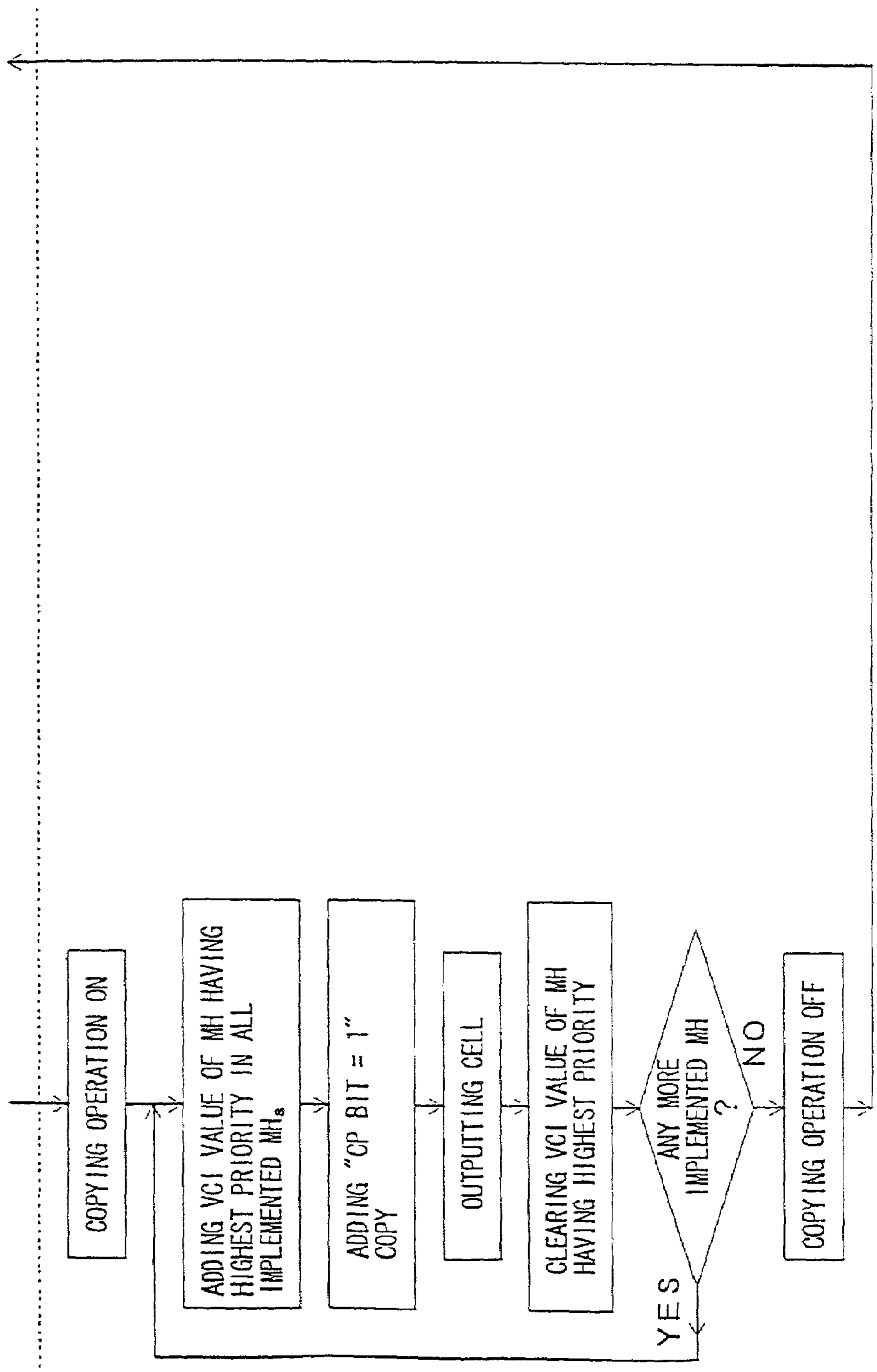

FIG. 565 is a flowchart (2) showing the copy control process of the HMH12A.

FIG. 566 is a flowchart showing the process of sending a pseudo EOM in the HMH12A.

Figure 567:
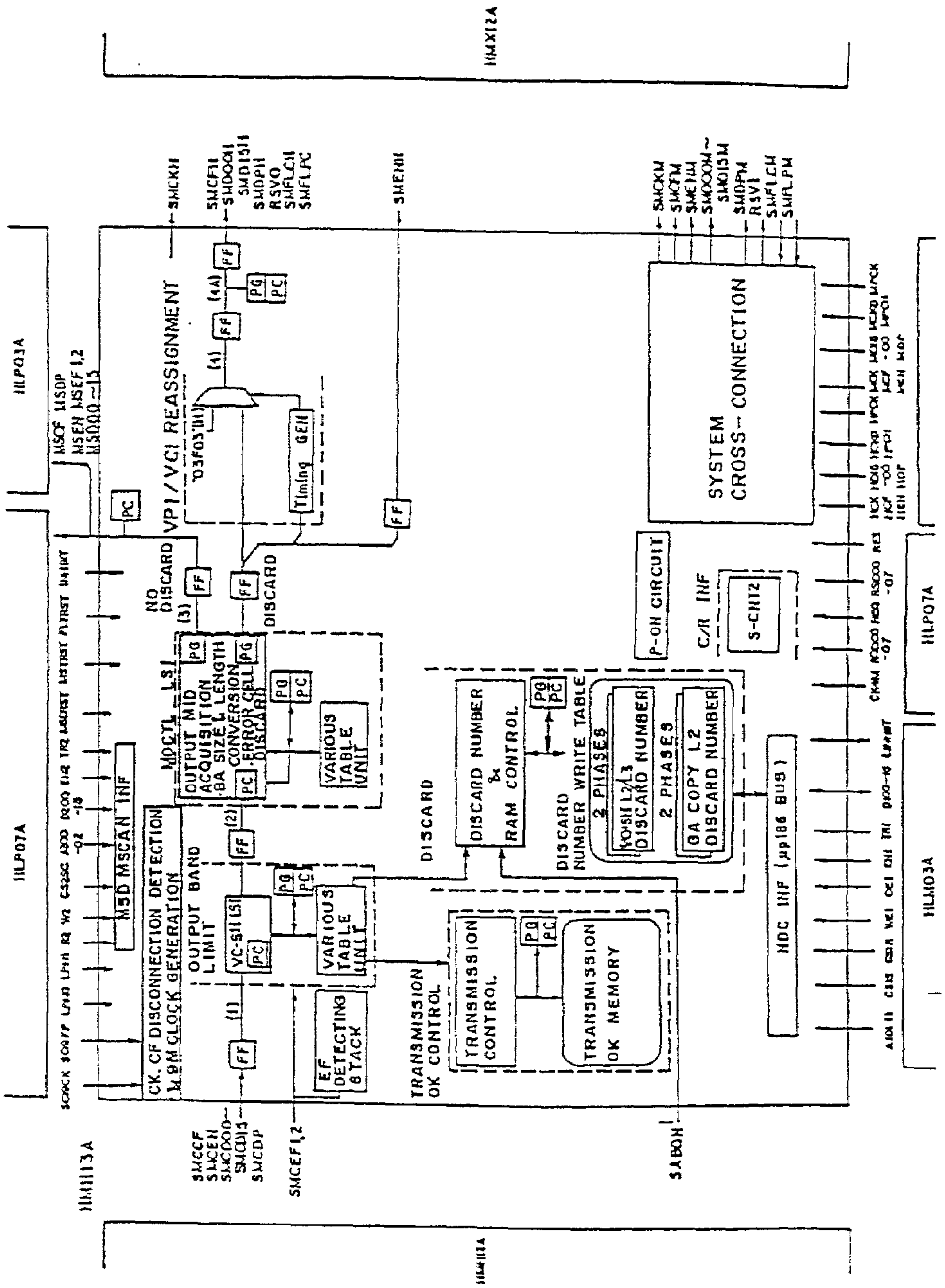

FIG. 567 is a block diagram showing the HMH13A.

Figure 568:
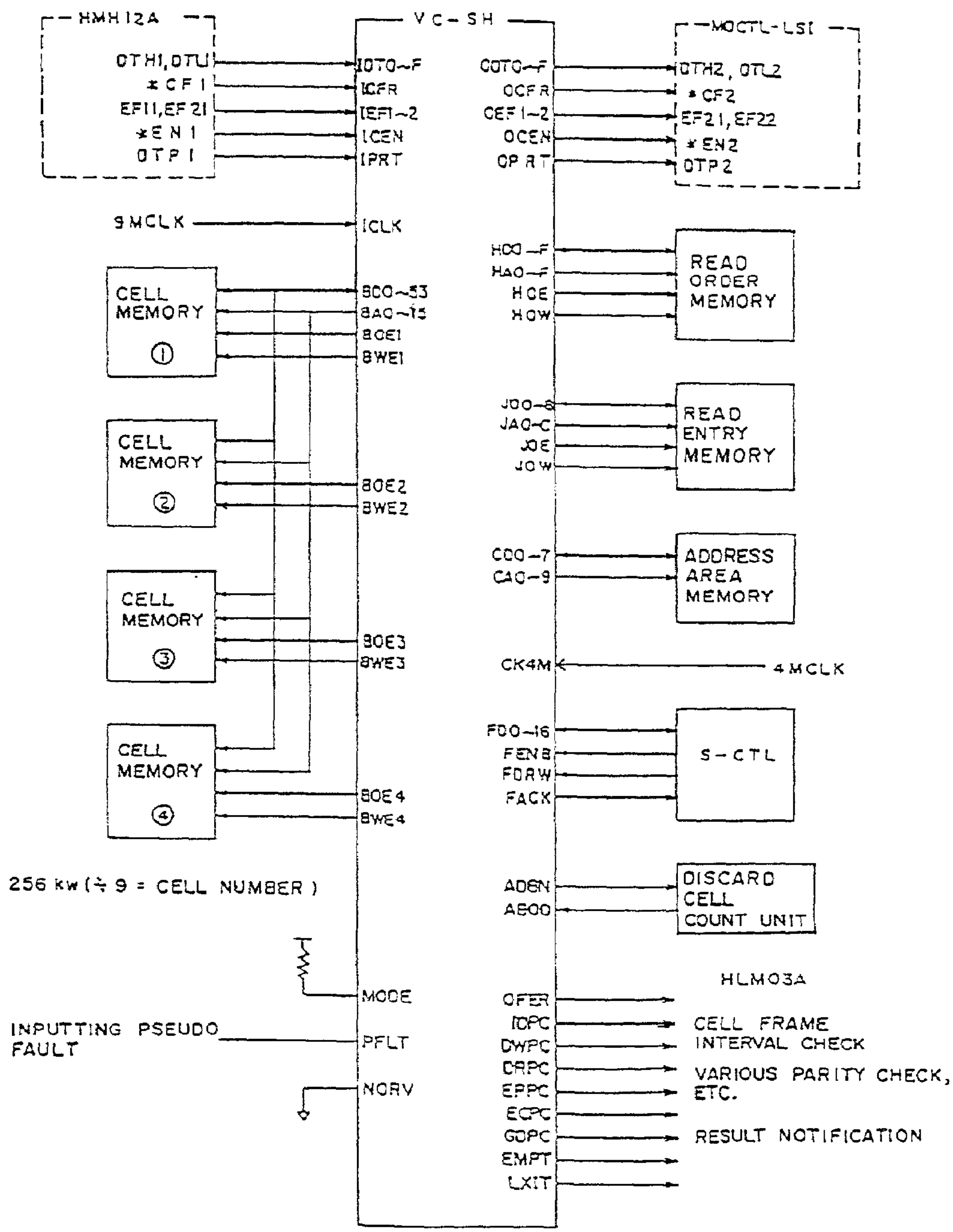

FIG. 568 shows the VC-SH LSI for controlling an output band and the circuit configuration near the LSI.

Figure 569:
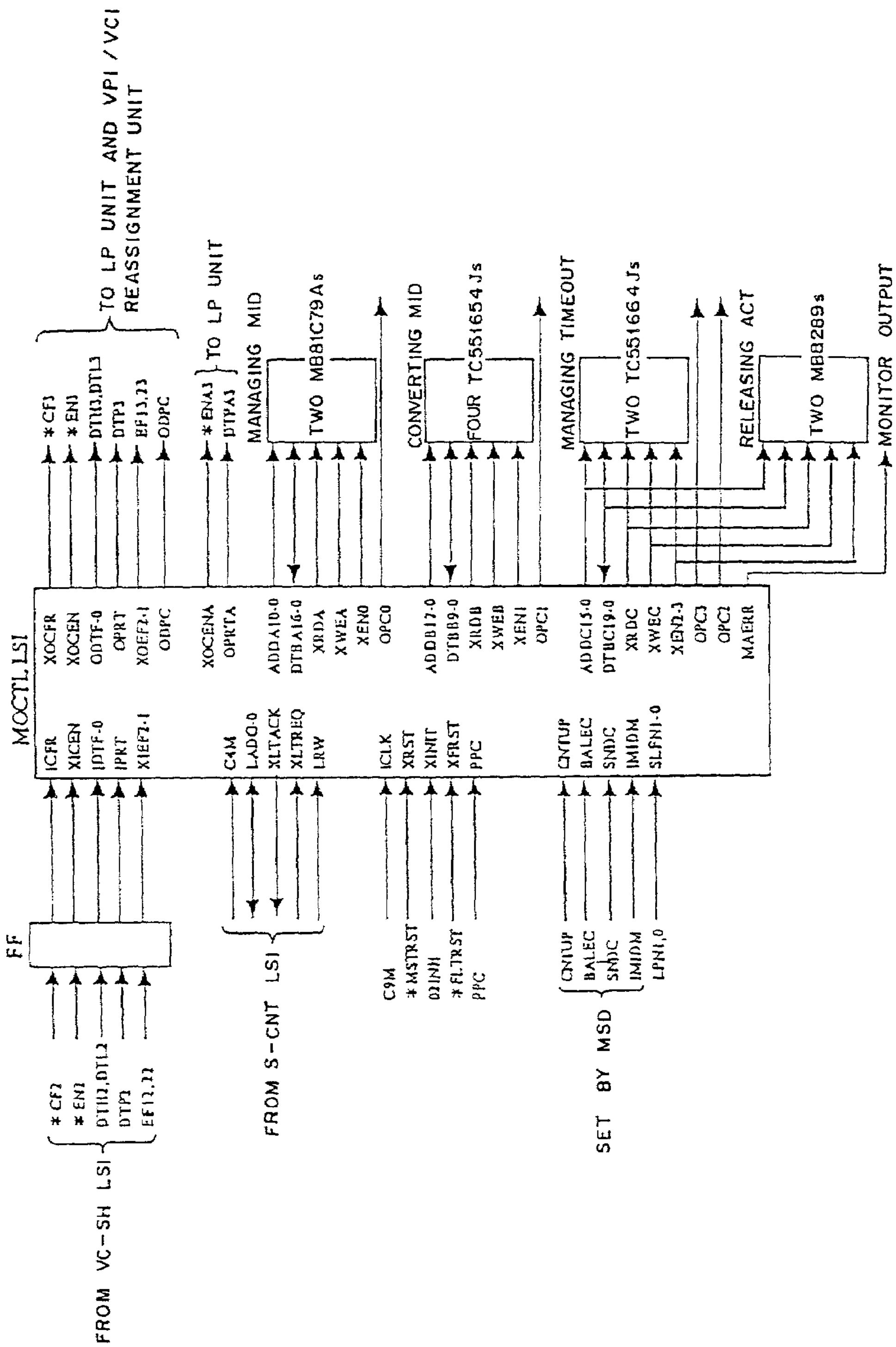

FIG. 569 shows the circuit configuration of the output MID acquiring unit.

Figure 570:
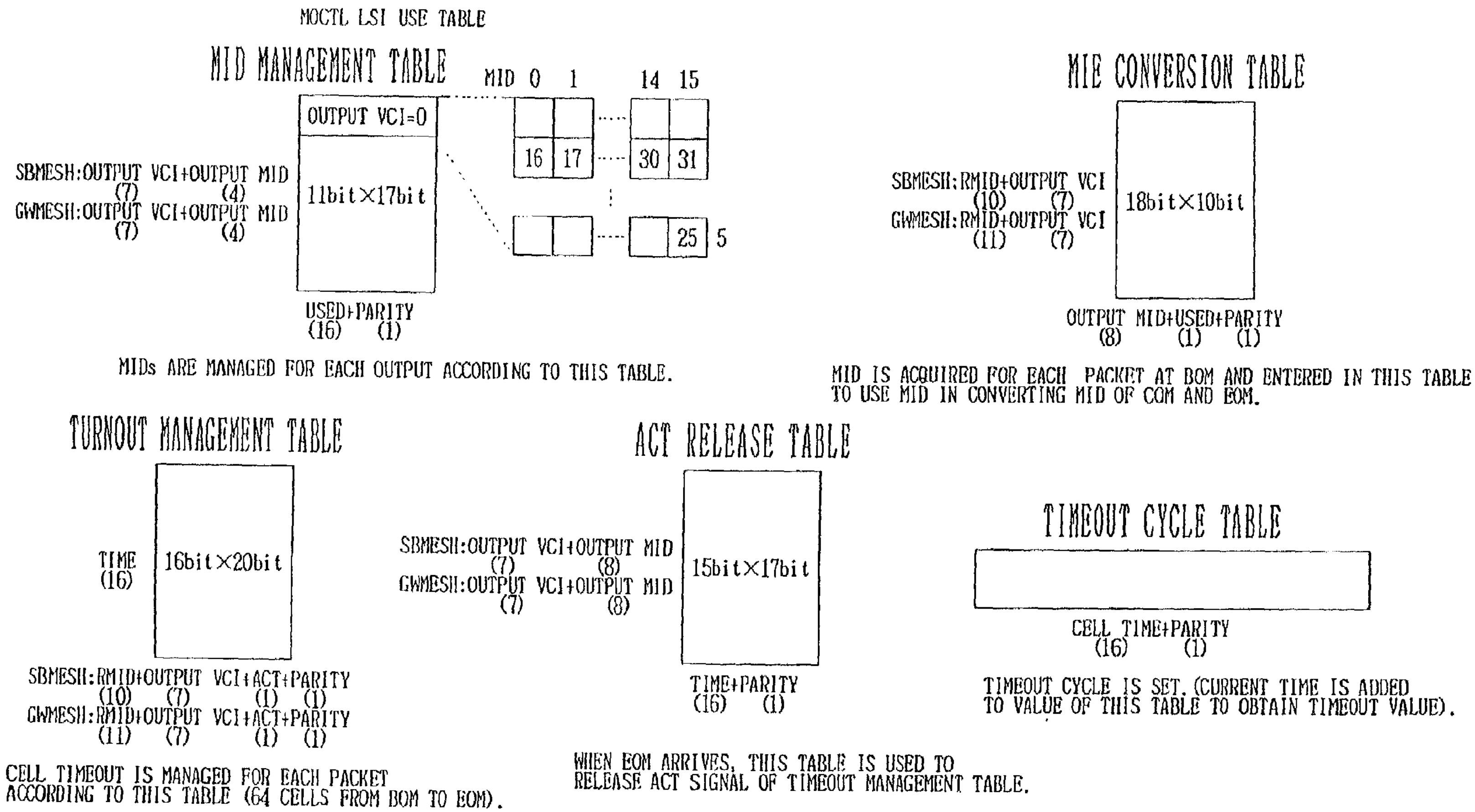

FIG. 570 shows the configuration of the table used in an output MID acquisition process.

Figure 571:
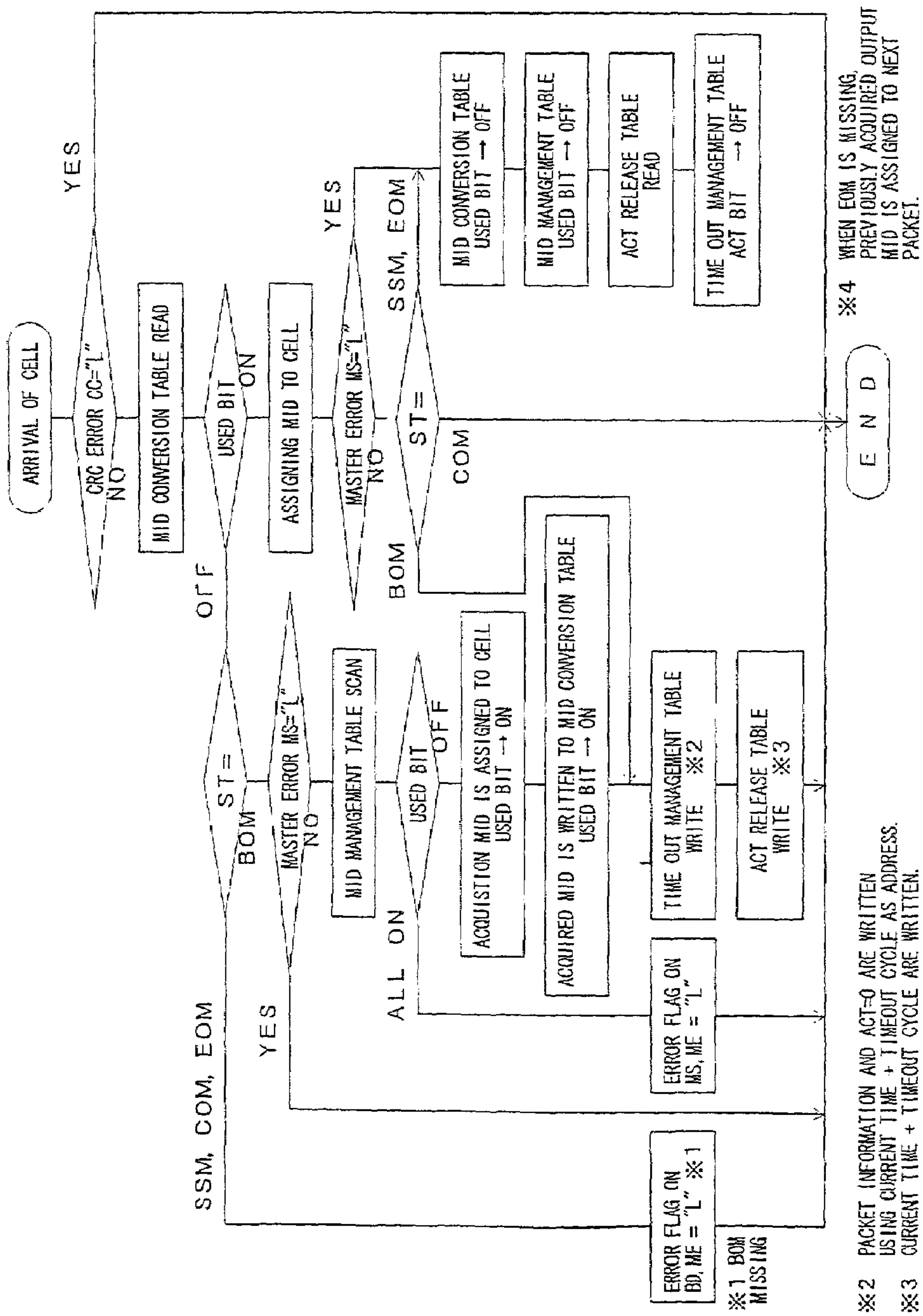

FIG. 571 is a flowchart showing the process of reserving an output VIC in the output MID acquisition unit.

Figure 572:
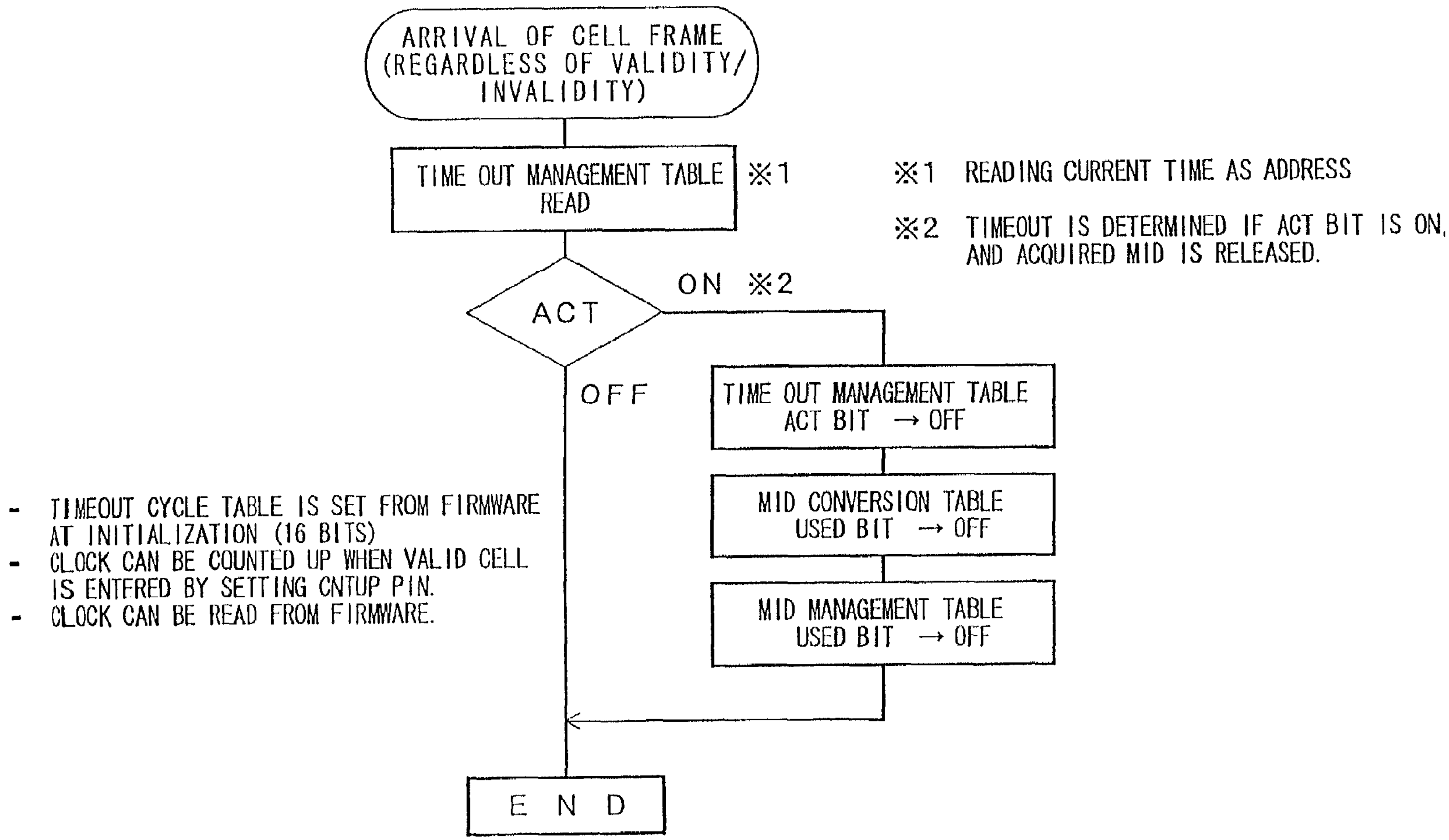

FIG. 572 is a flowchart showing the timeout monitor process in the output MID acquisition unit.

FIG. 573 shows the format of reassigning a VPI/VCI in the HMH13A.

Figure 574:
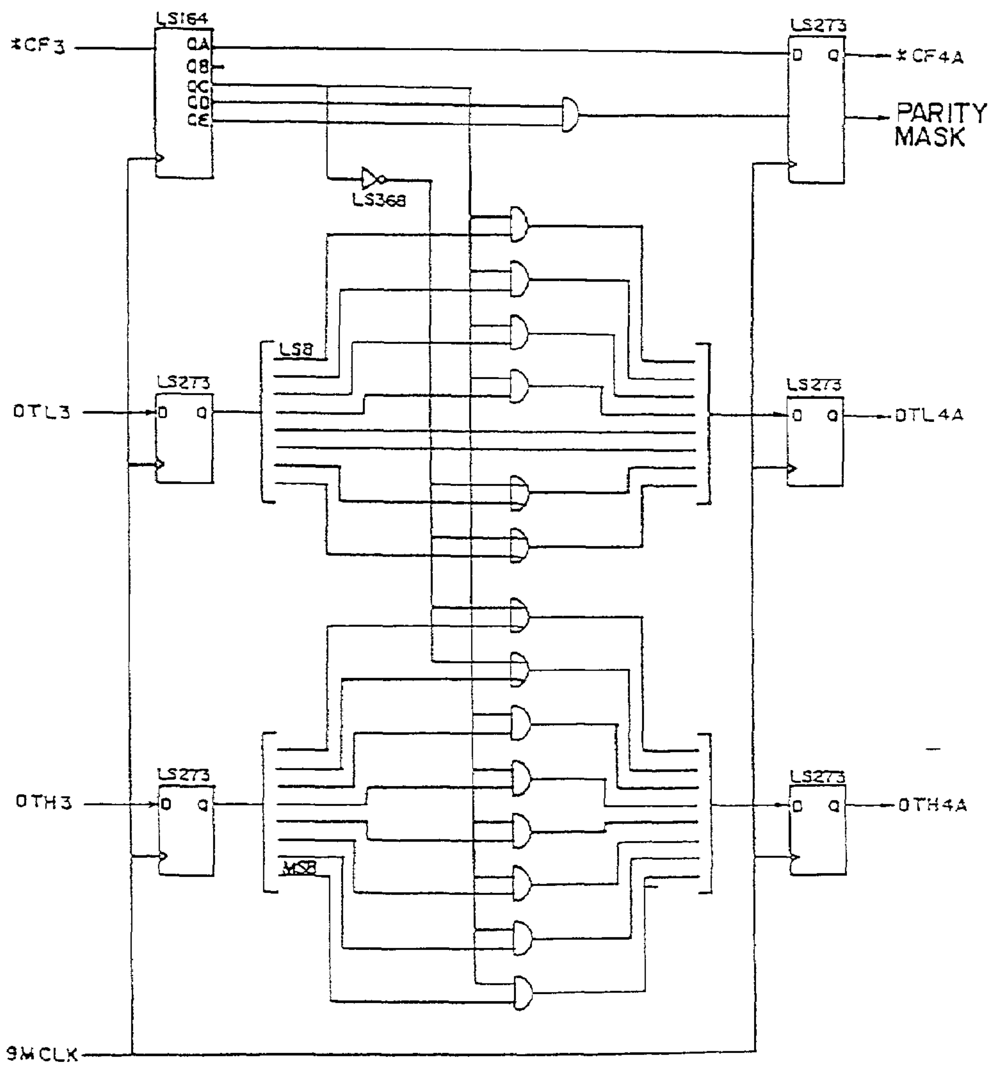

FIG. 574 shows the configuration of the hardware for executing the reassignment of a VPI/VCI in the HMH13A.

Figure 575:
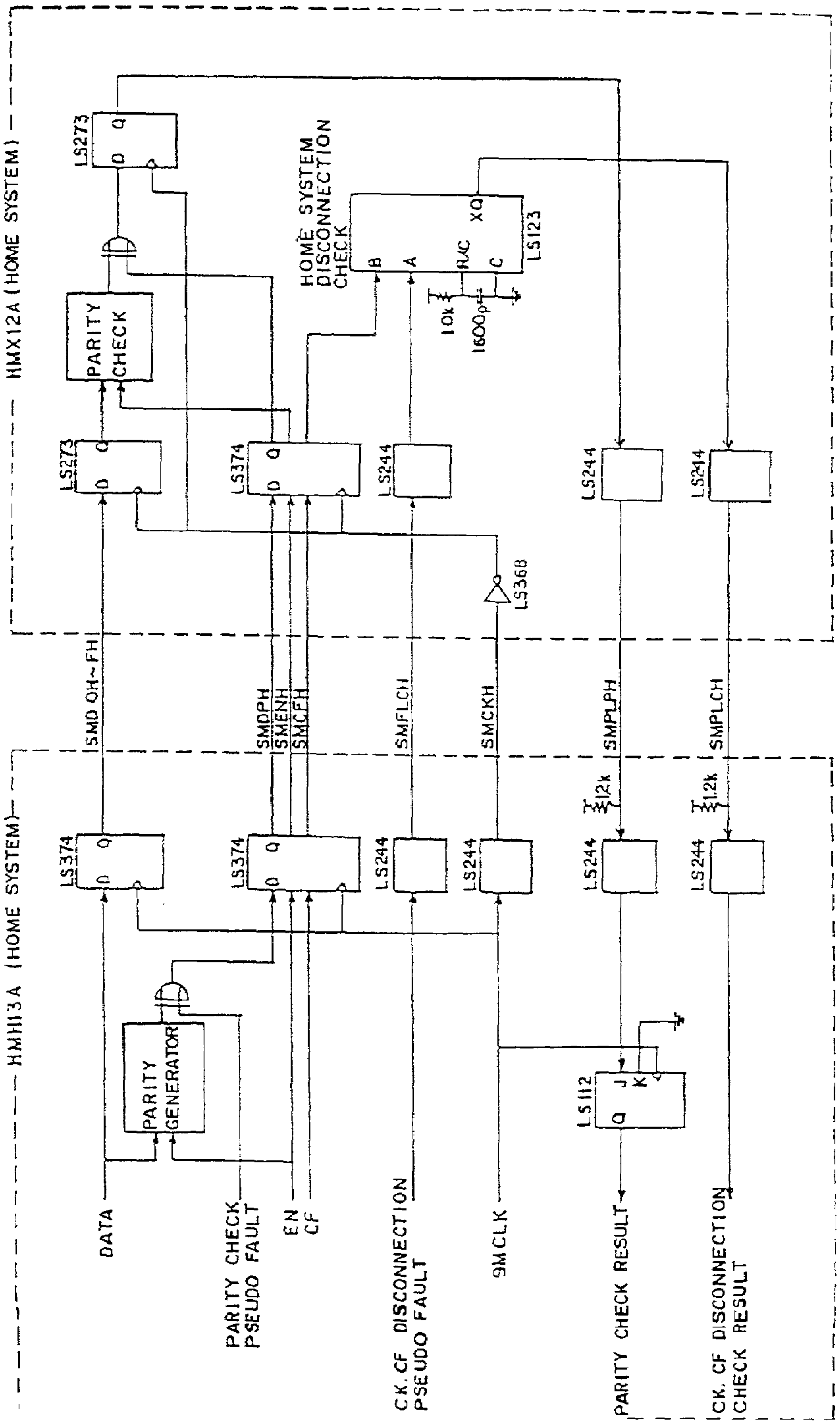

FIG. 575 shows the configuration of the circuit in the HMH13A for monitoring a fault between the circuit and the home system MH-COM.

Figure 576:
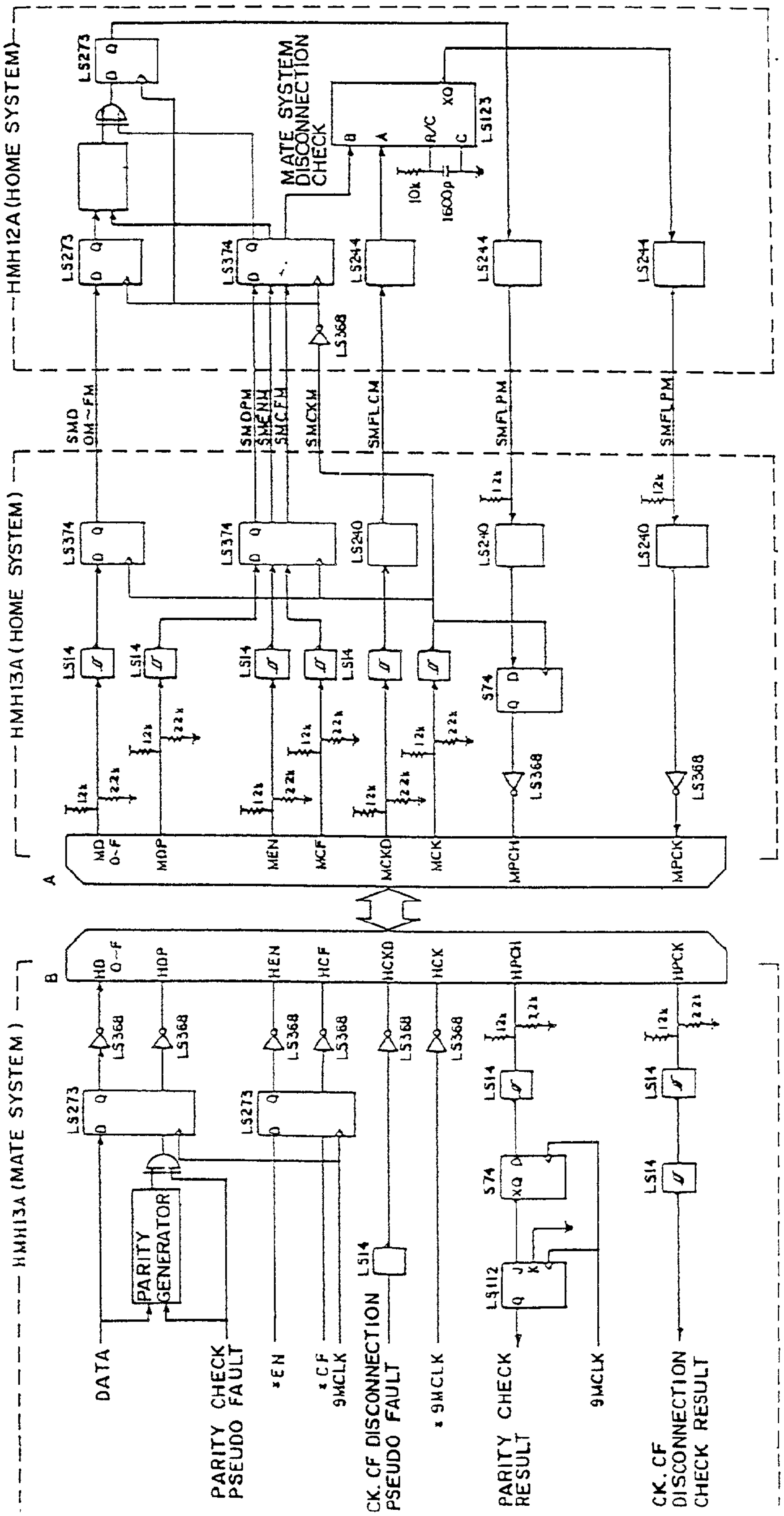

FIG. 576 shows the configuration of the circuit in the HMH13A for monitoring a fault between the circuit and the mate system MH-COM.

Figure 577:
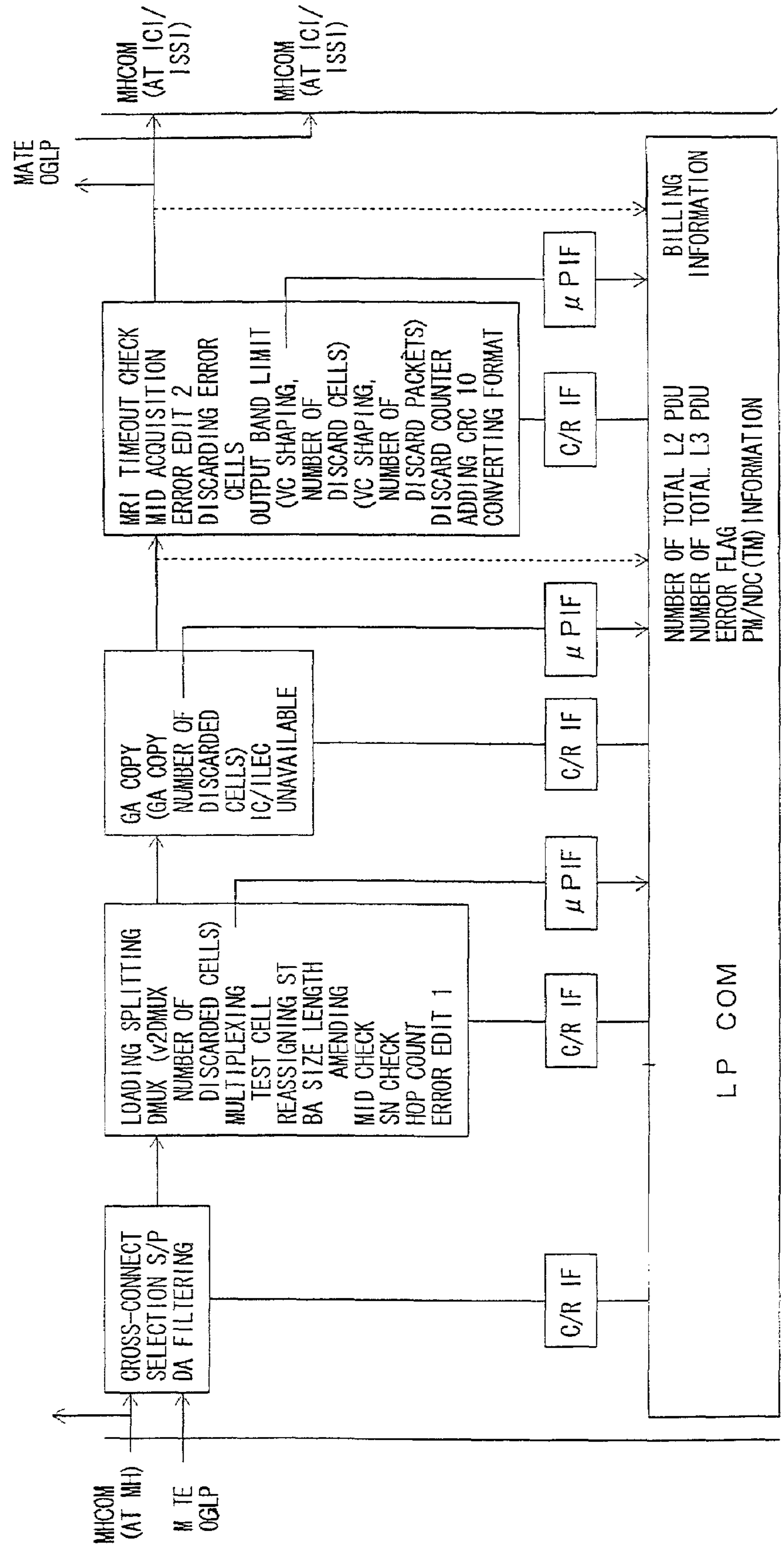

FIG. 577 is a block diagram showing the outline of the function of the OGLP.

Figure 578:
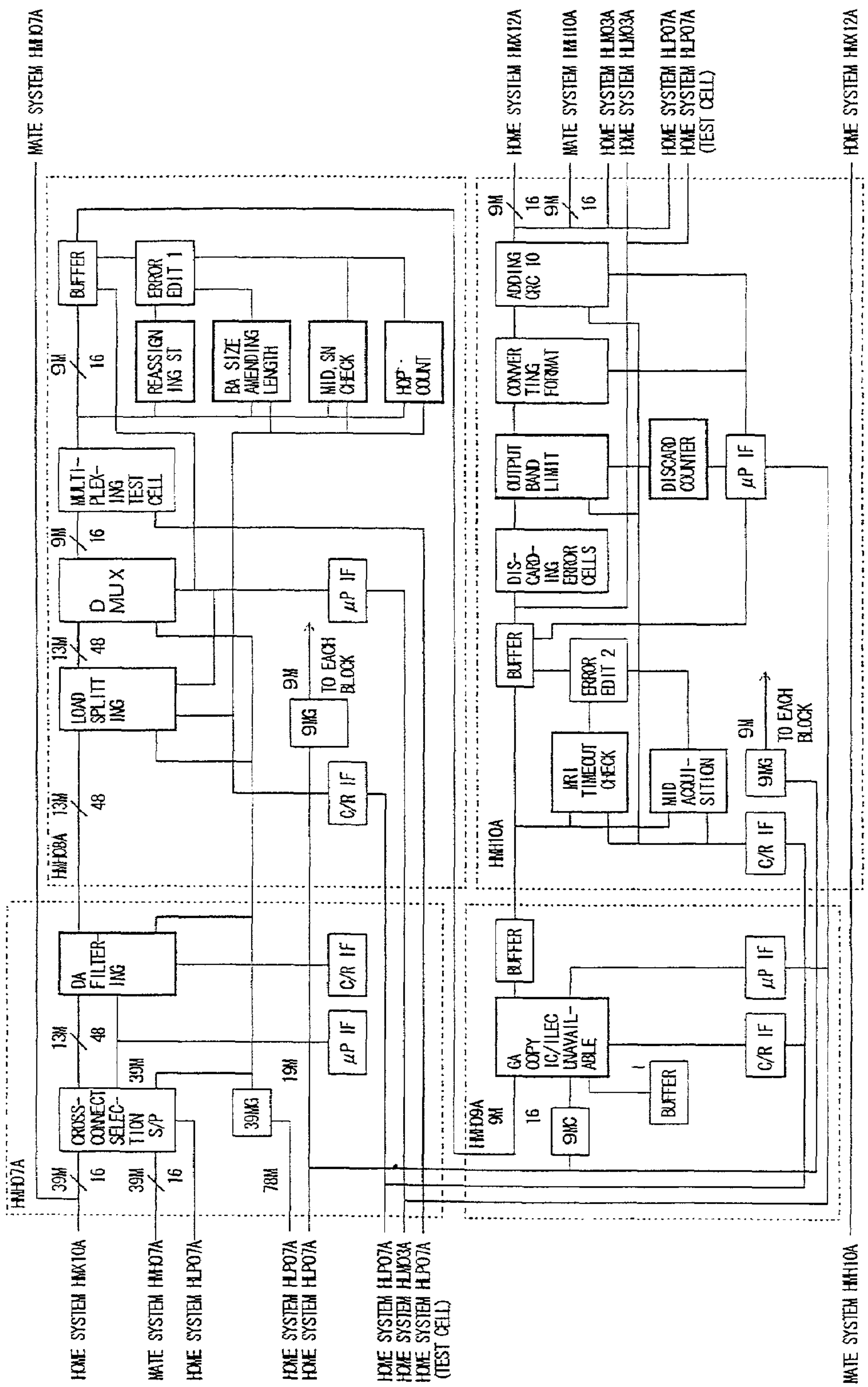

FIG. 578 is a block diagram showing the detailed function of the OGLP.

Figure 579:
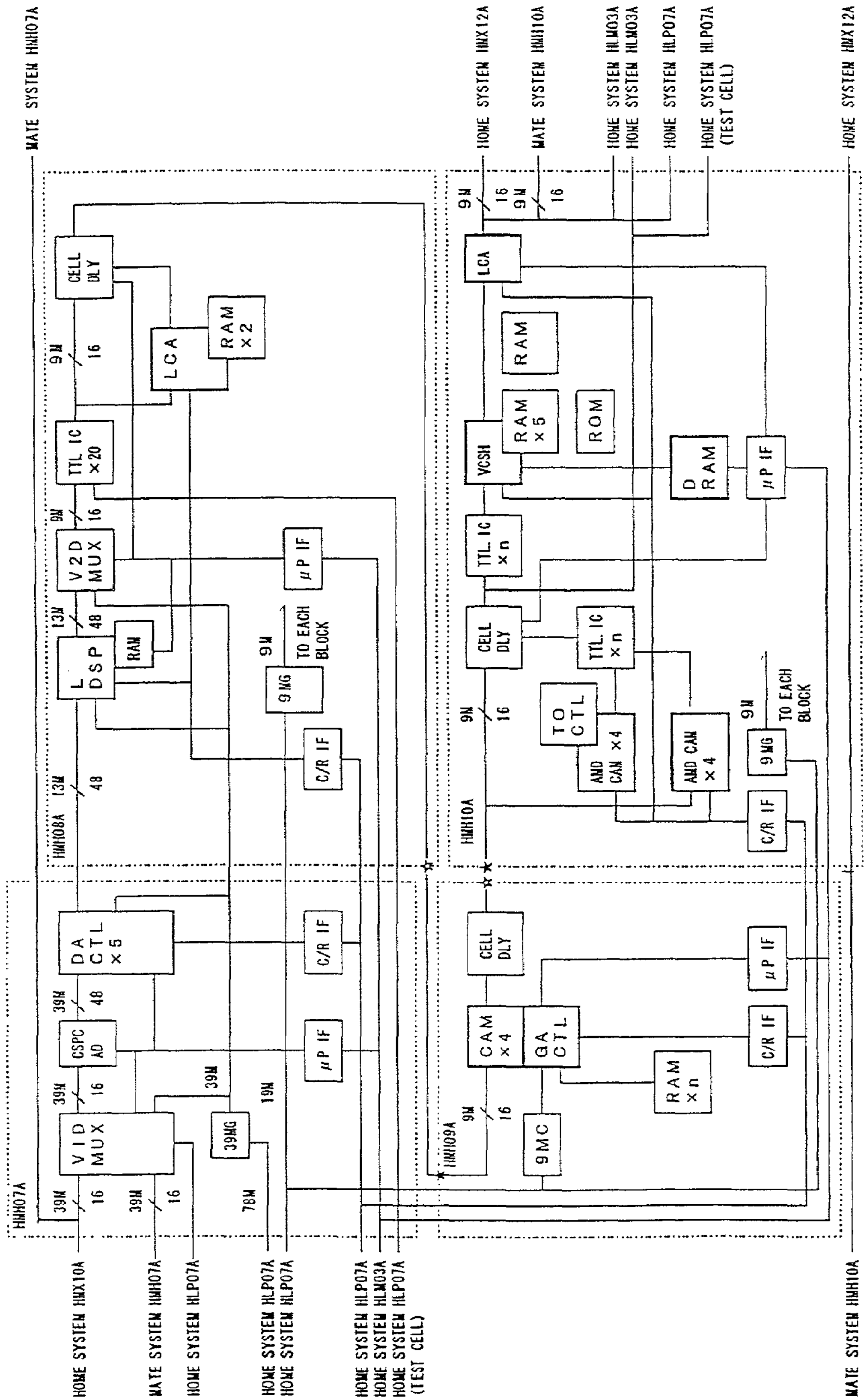

FIG. 579 is a block diagram showing the arrangement of the IC of the OGLP.

FIG. 580 shows the outline of the function of each block of the OGLP and the relationship between the OGLP and an error cell and maintenance cell.

FIG. 581 shows the error flag (FF) operated for each function block of the OGLP.

FIG. 582 shows the format of an input cell (BOM between MHs) from the SBMH to the HMH07A.

FIG. 583 shows the format of an input cell (BOM between SSMs) from the SBMH to the HMH07A.

Figure 584:
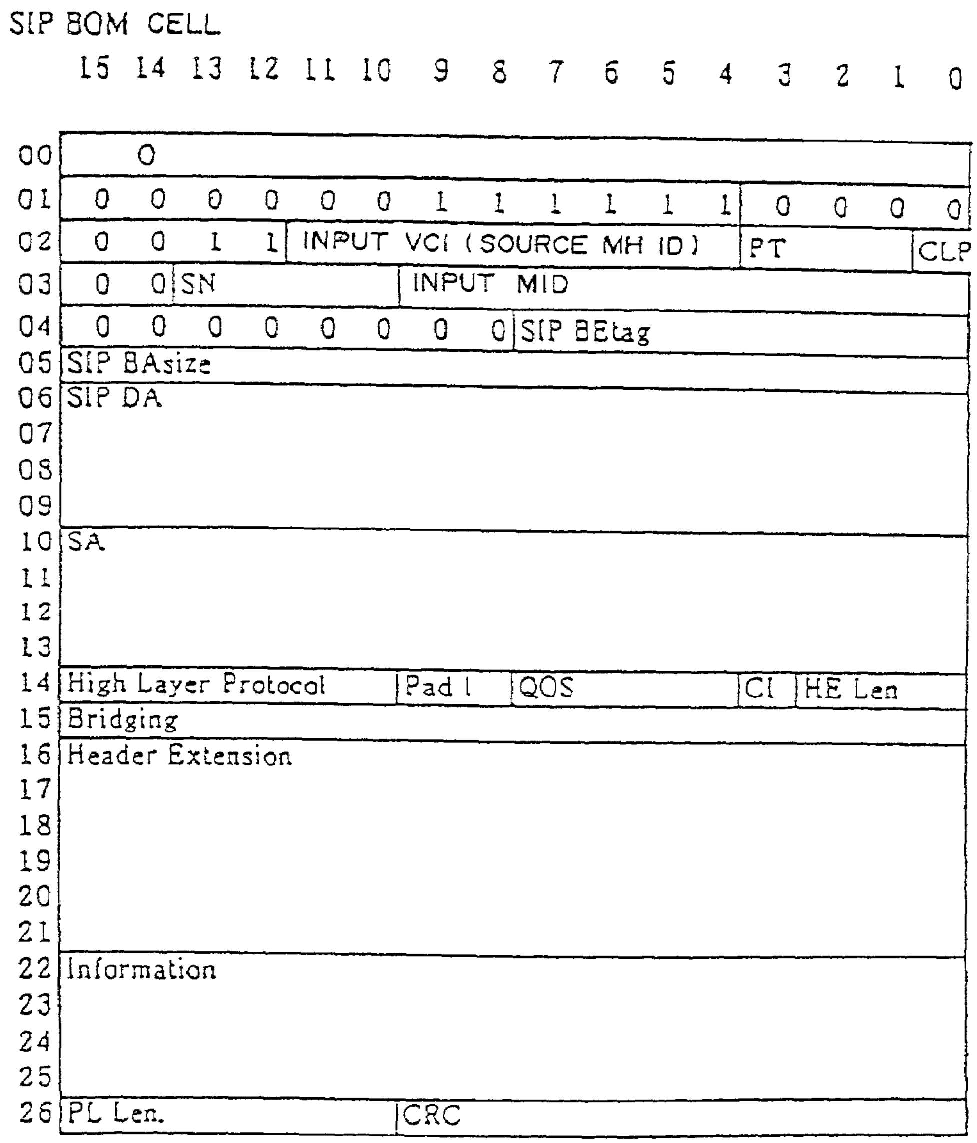

FIG. 584 shows the format of an input cell (SIP BOM) from the SBMH to the HMH07A.

Figure 585:
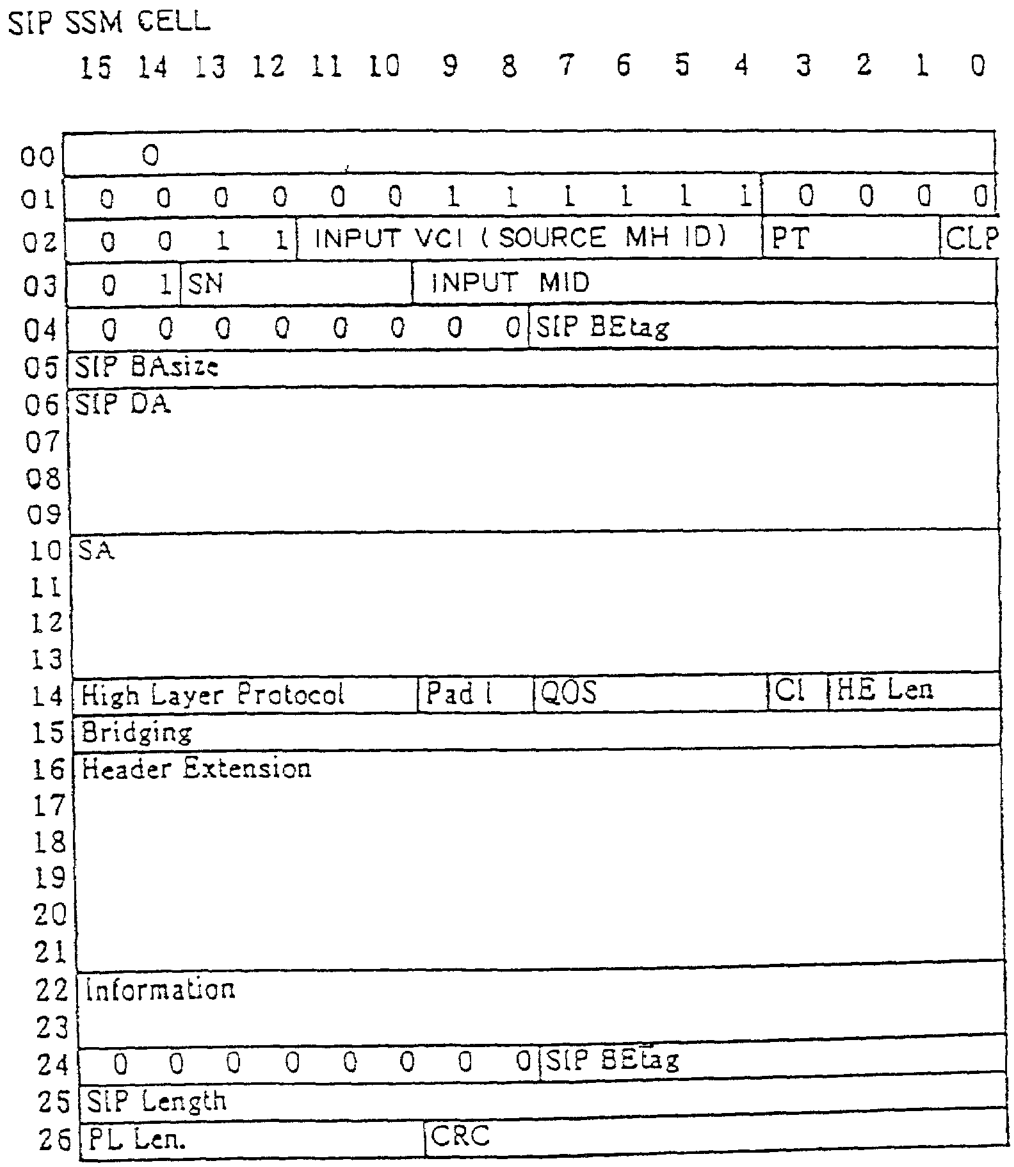

FIG. 585 shows the format of an input cell (SIP SSM) from the SBMH to the HMH07A.

FIG. 586 shows the format of an input cell (SIP COM) from the SBMH to the HMH07A.

Figure 587:
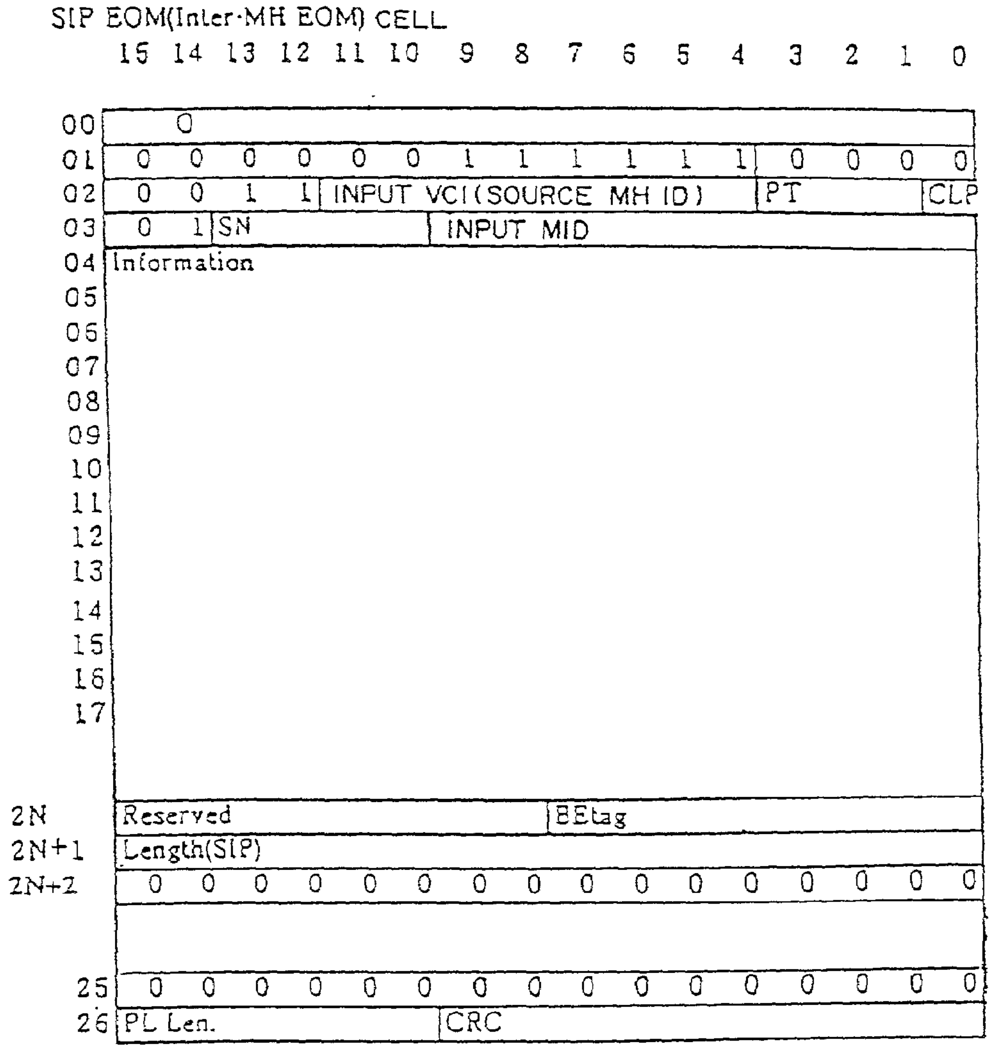

FIG. 587 shows the format of an input cell (SIP EOM, EOM BETWEEN MHs) from the SBMH to the HMH07A.

FIG. 588 shows the format of an input cell (BOM between MHs) from another GWMH to the HMH07A.

FIG. 589 shows the format of an input cell (SSM between MHs) from another GWMH to the HMH07A.

Figure 590:
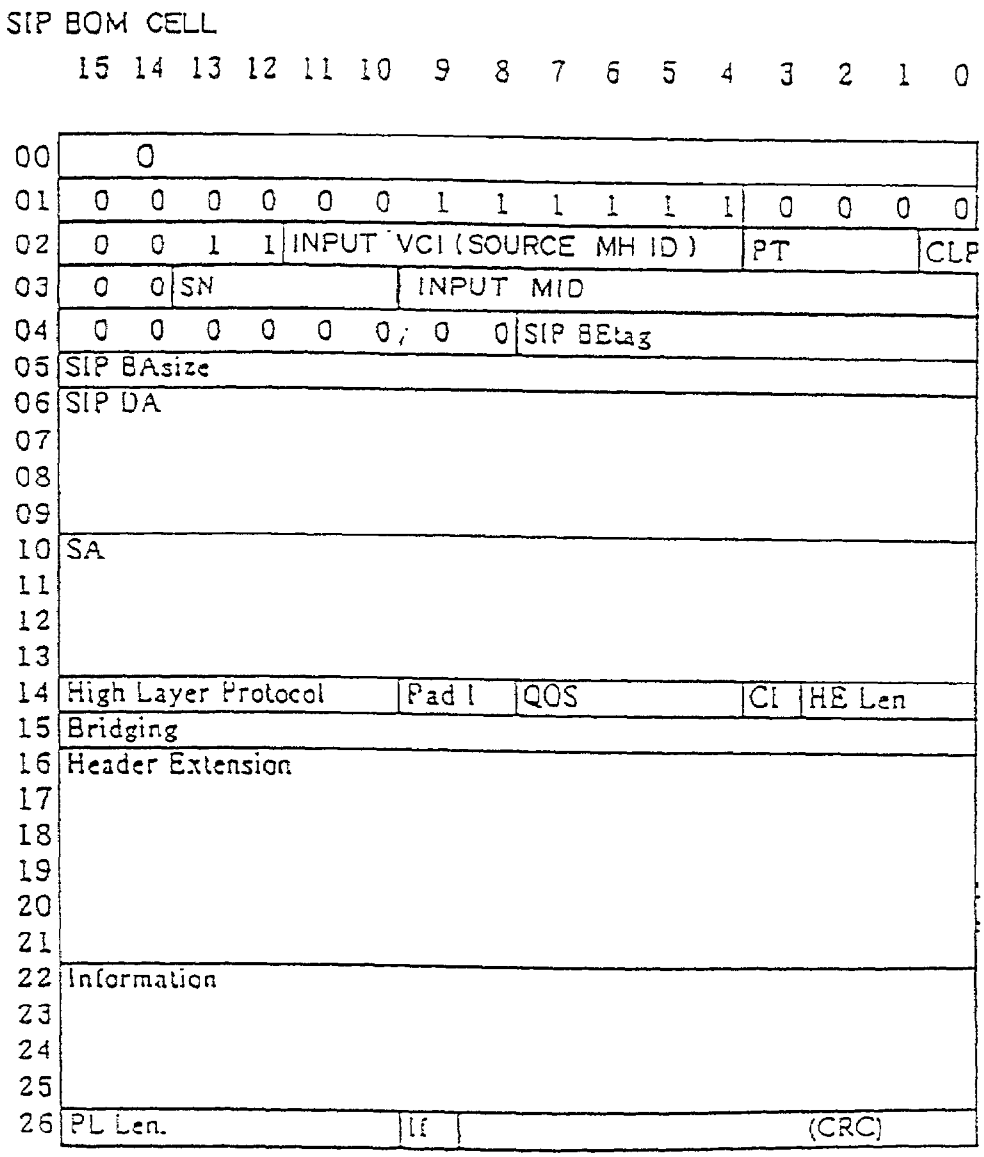

FIG. 590 shows the format of an input cell (SIP BOM) from another GWMH to the HMH07A.

FIG. 591 shows the format of an input cell (SIP SSM) from another GWMH to the HMH07A.

Figure 592:
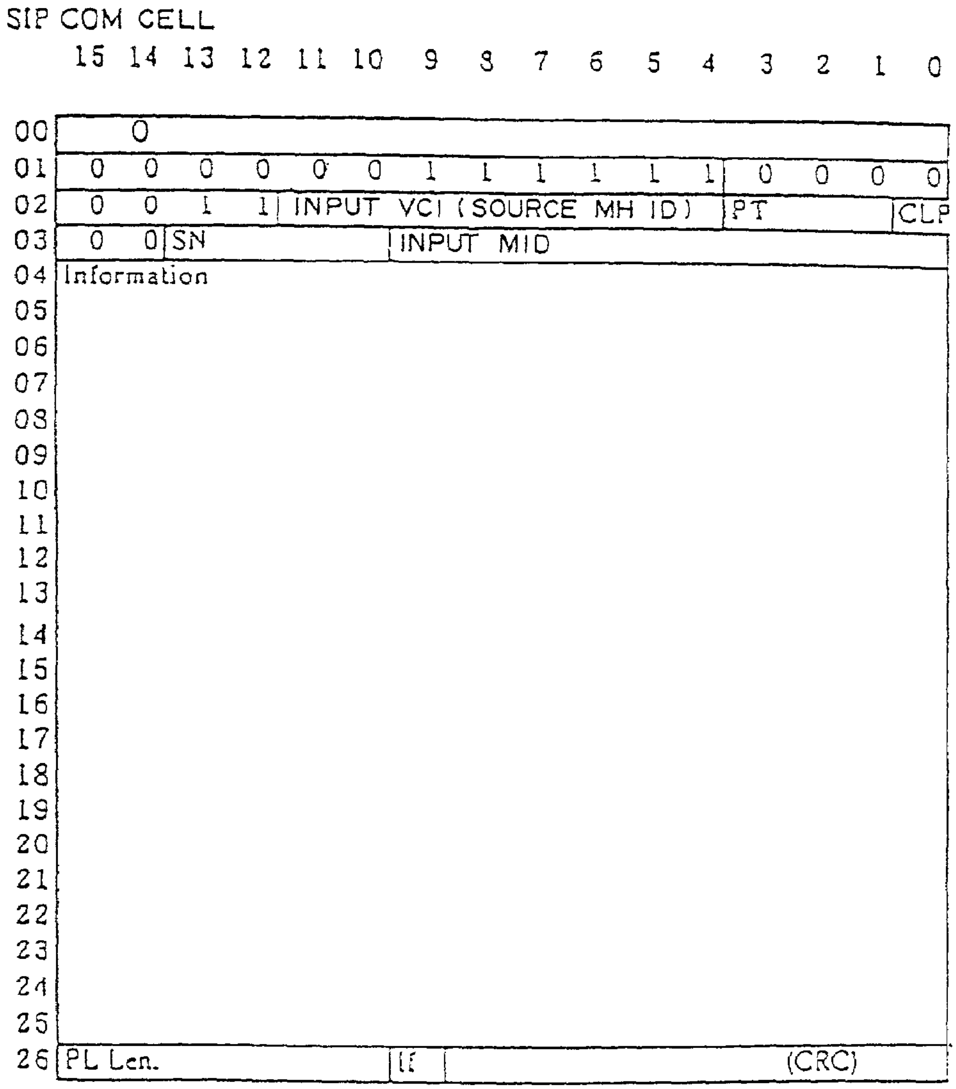

FIG. 592 shows the format of an input cell (SIP COM) from another GWMH to the HMH07A.

Figure 593:
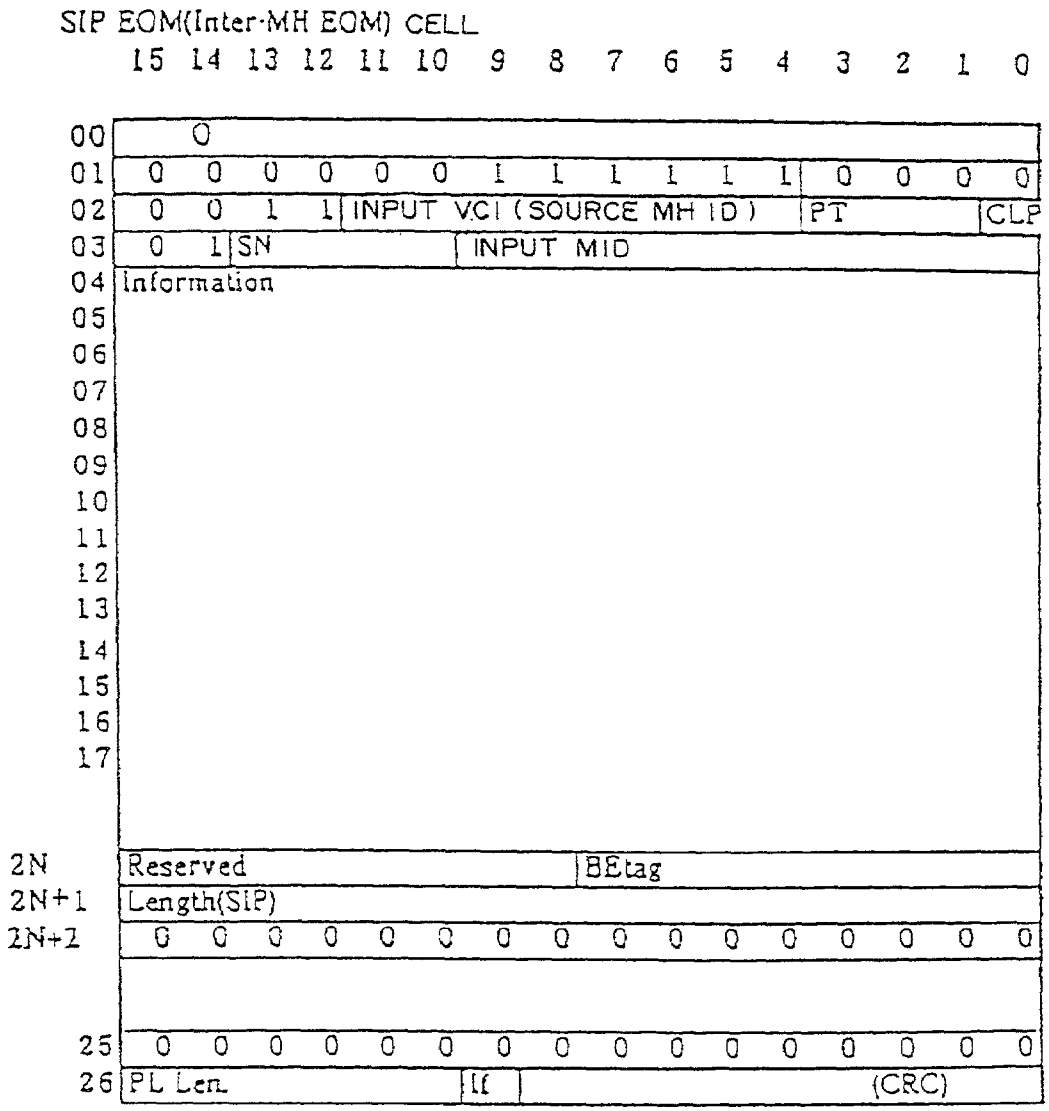

FIG. 593 shows the format of an input cell (SIP EOM, EOM between MHs) from another GWMH to the HMH07A.

FIG. 594 shows the format of an input cell (BOM between MHs) from another GWMH to the HMH08A.

FIG. 595 shows the format of an input cell (SSM between MHs) from another GWMH to the HMH08A.

Figure 596:
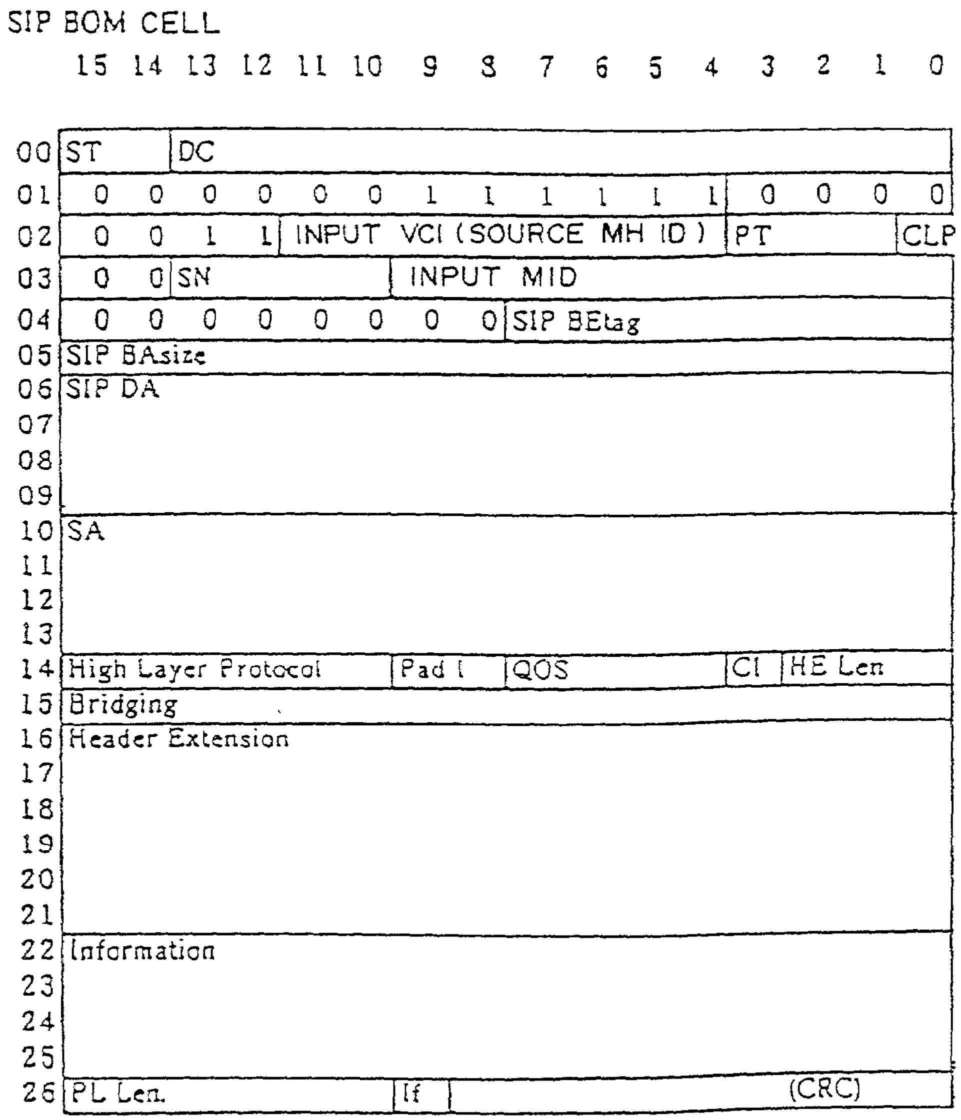

FIG. 596 shows the format of an input cell (SIP BOM) from another GWMH to the HMHOSA.

FIG. 597 shows the format of an input cell (SIP SSM) from another GWMH to the HMH08A.

FIG. 598 shows the format of an input cell (SIP COM) from another GWMH to the HMH08A.

FIG. 599 shows the format of an input cell (SIP EOM, EOM between MHs) from another GWMH to the HMH08A.

Figure 600:
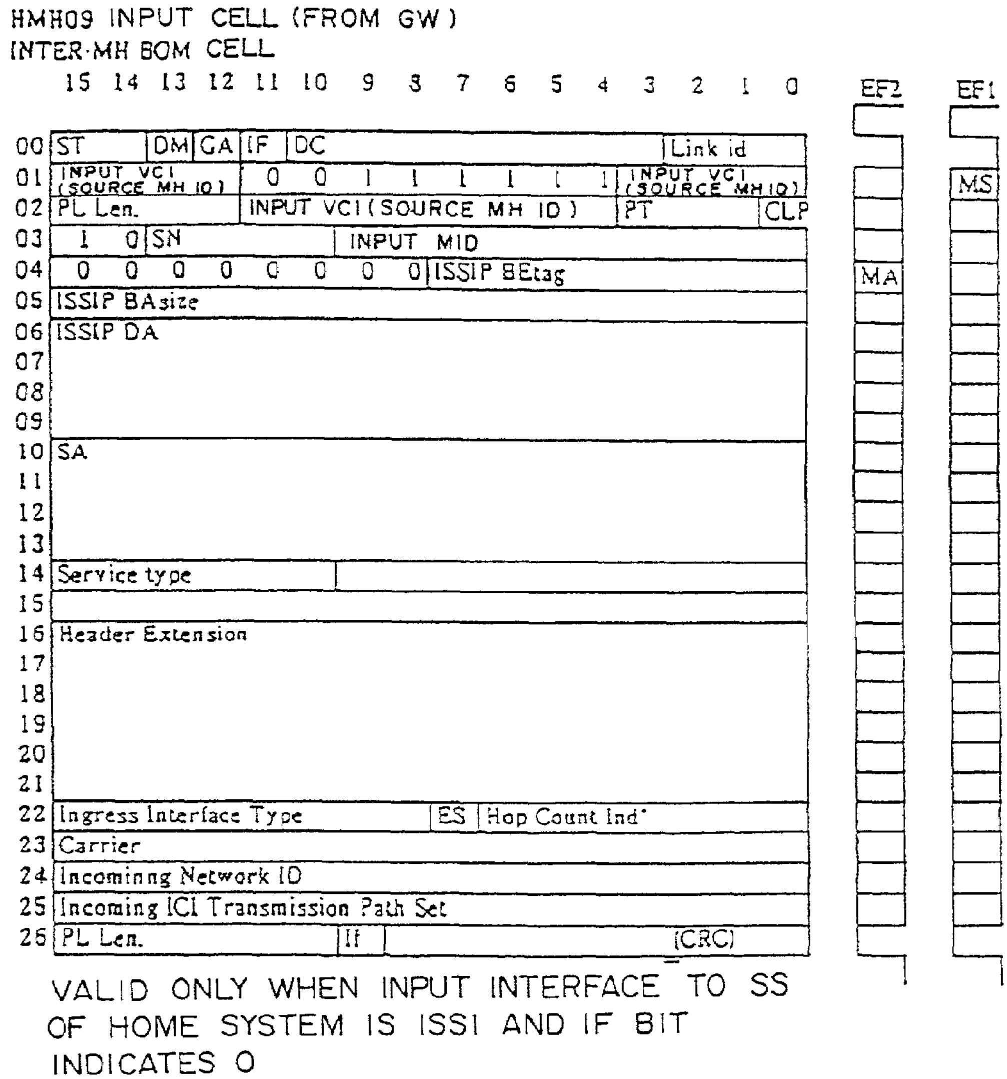

FIG. 600 shows the format of an input cell (BOM between MHs) from another GWMH to the HMH09A.

Figure 601:
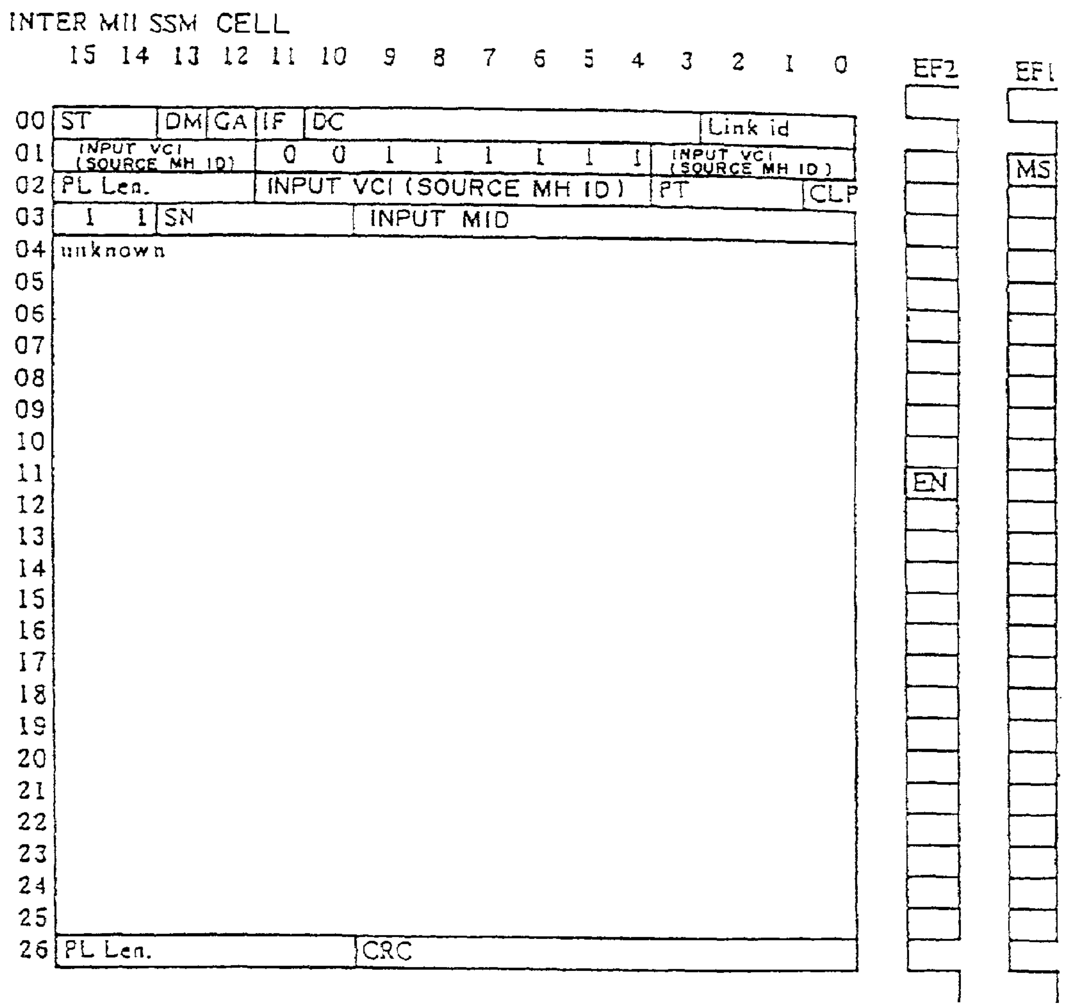

FIG. 601 shows the format of an input cell (SSM between MHs) from another GWMH to the HMH09A.

Figure 602:
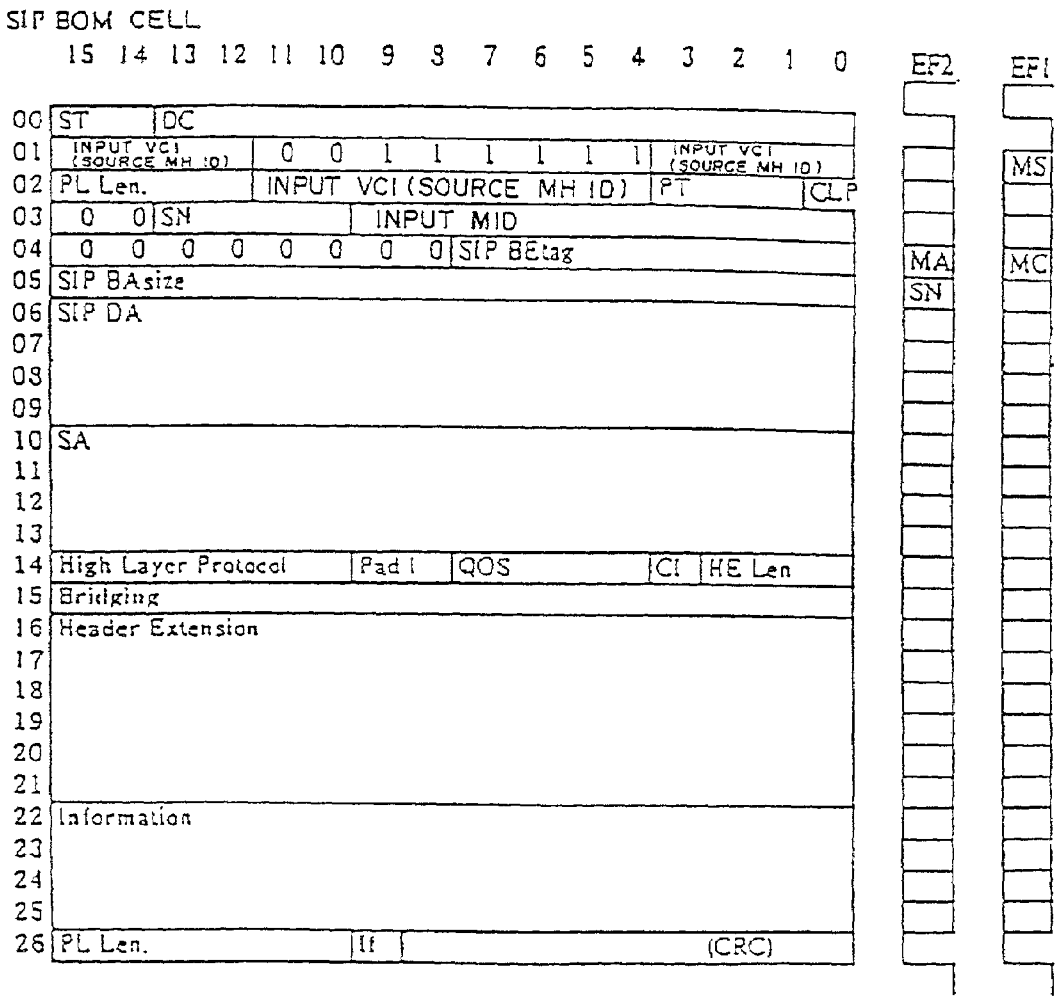

FIG. 602 shows the format of an input cell (SIP BOM) from another GWMH to the HMH09A.

Figure 603:
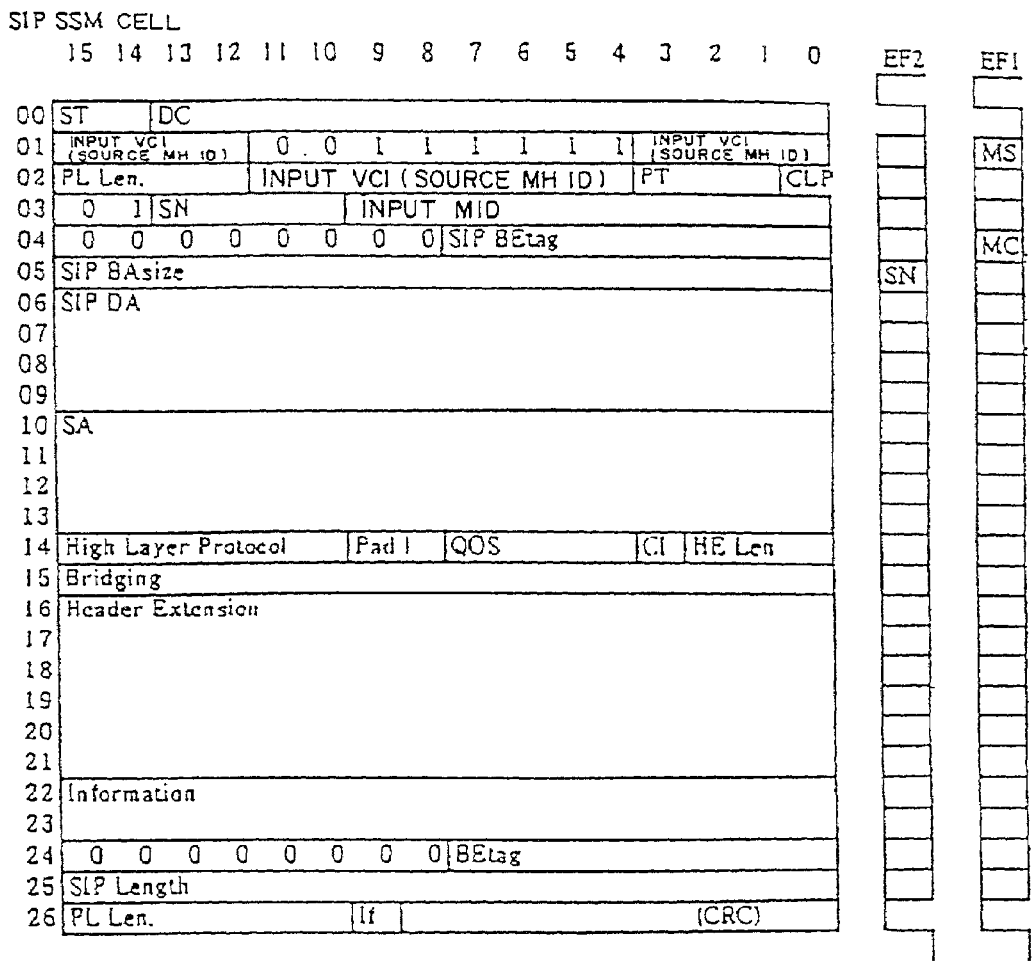

FIG. 603 shows the format of an input cell (SIP SSM) from another GWMH to the HMH09A.

Figure 604:
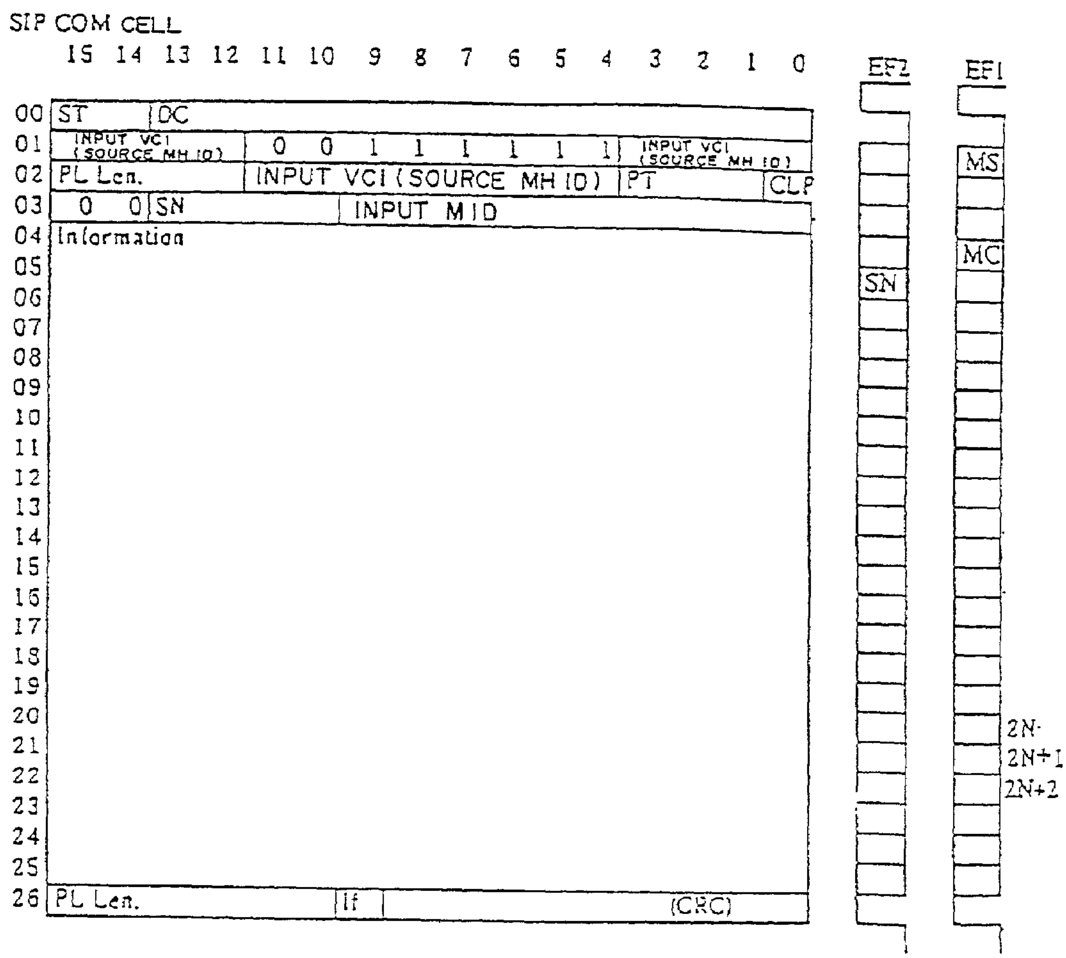

FIG. 604 shows the format of an input cell (SIP COM) from another GWMH to the HMH09A.

Figure 605:
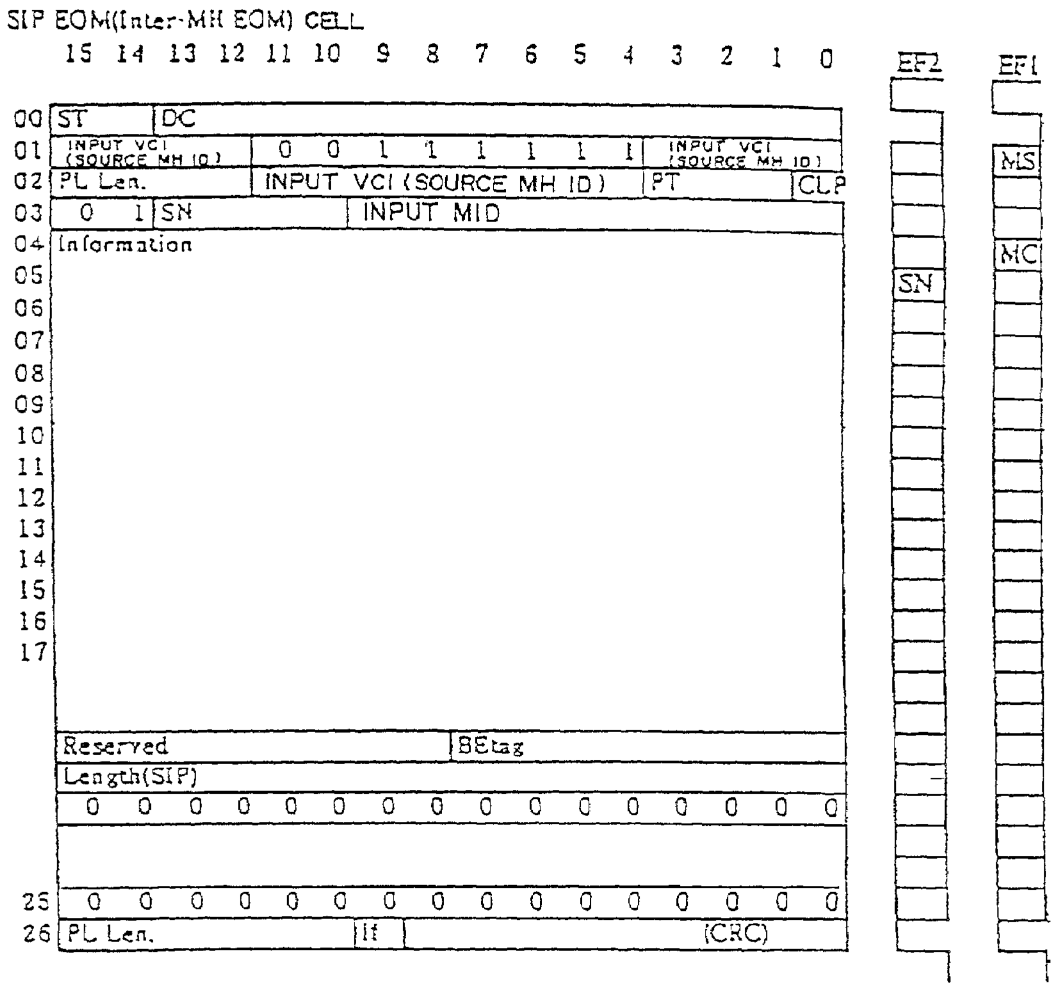

FIG. 605 shows the format of an input cell (SIP EOM, EOM between MHs) from another GWMH to the HMH09A.

Figure 606:
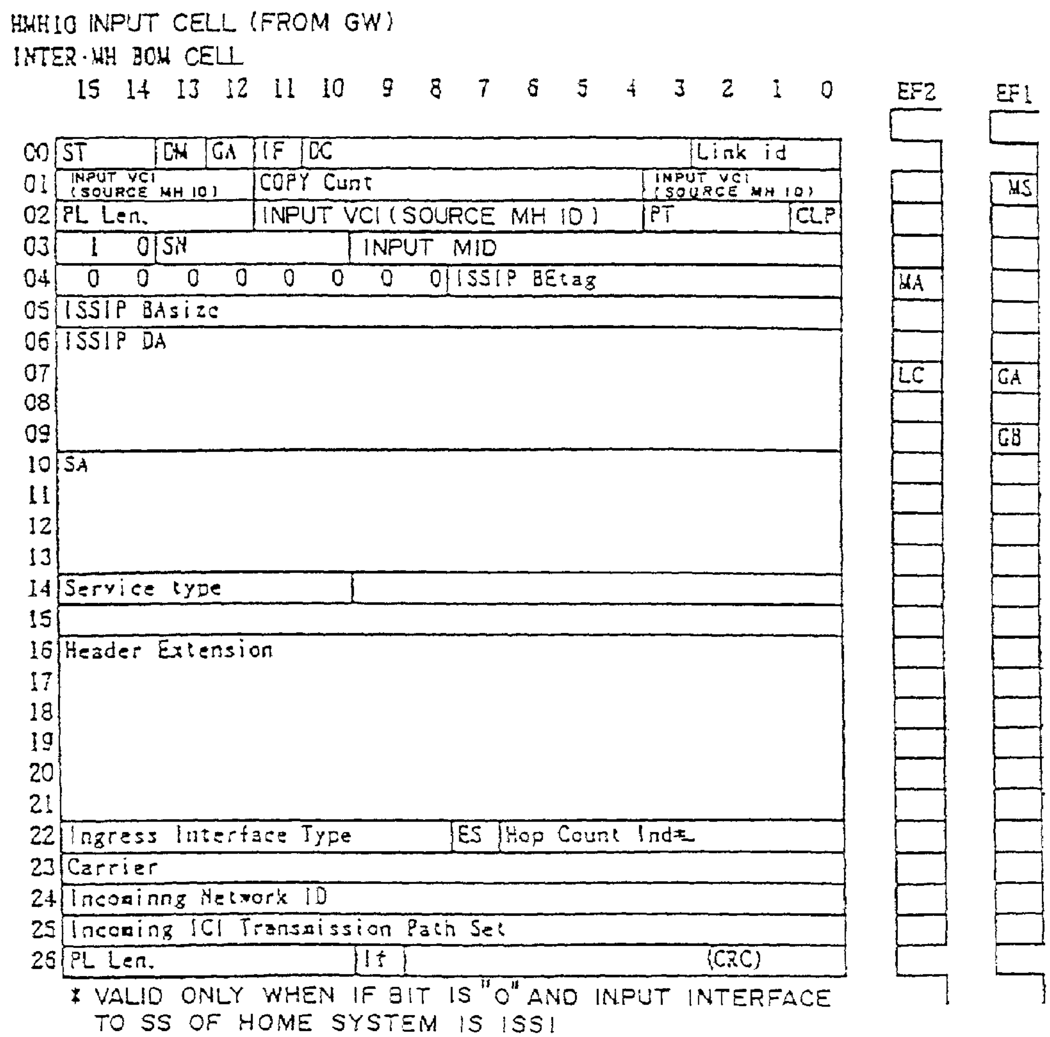

FIG. 606 shows the format of an input cell (BOM between MHs) from another GWMH to the HMH10A.

Figure 607:
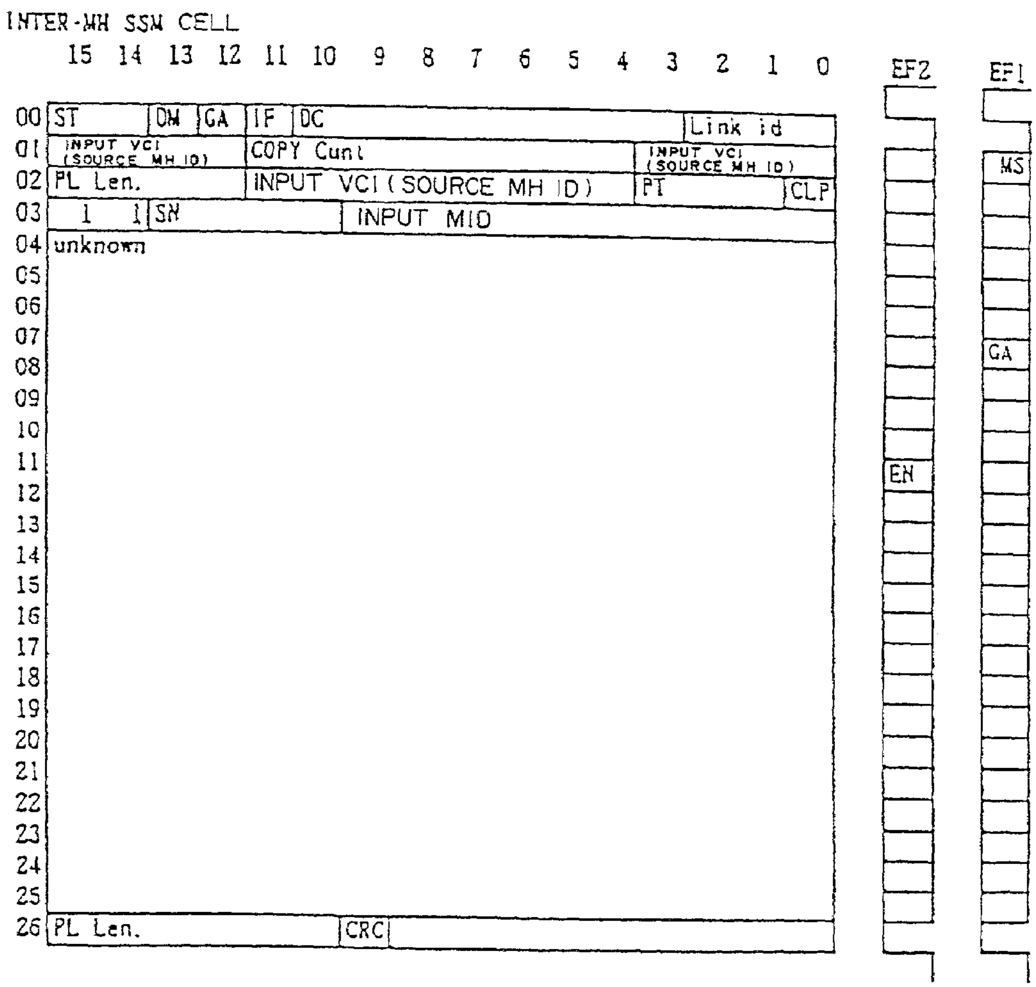

FIG. 607 shows the format of an input cell (SSM between MHs) from another GWMH to the HMH10A.

Figure 608:
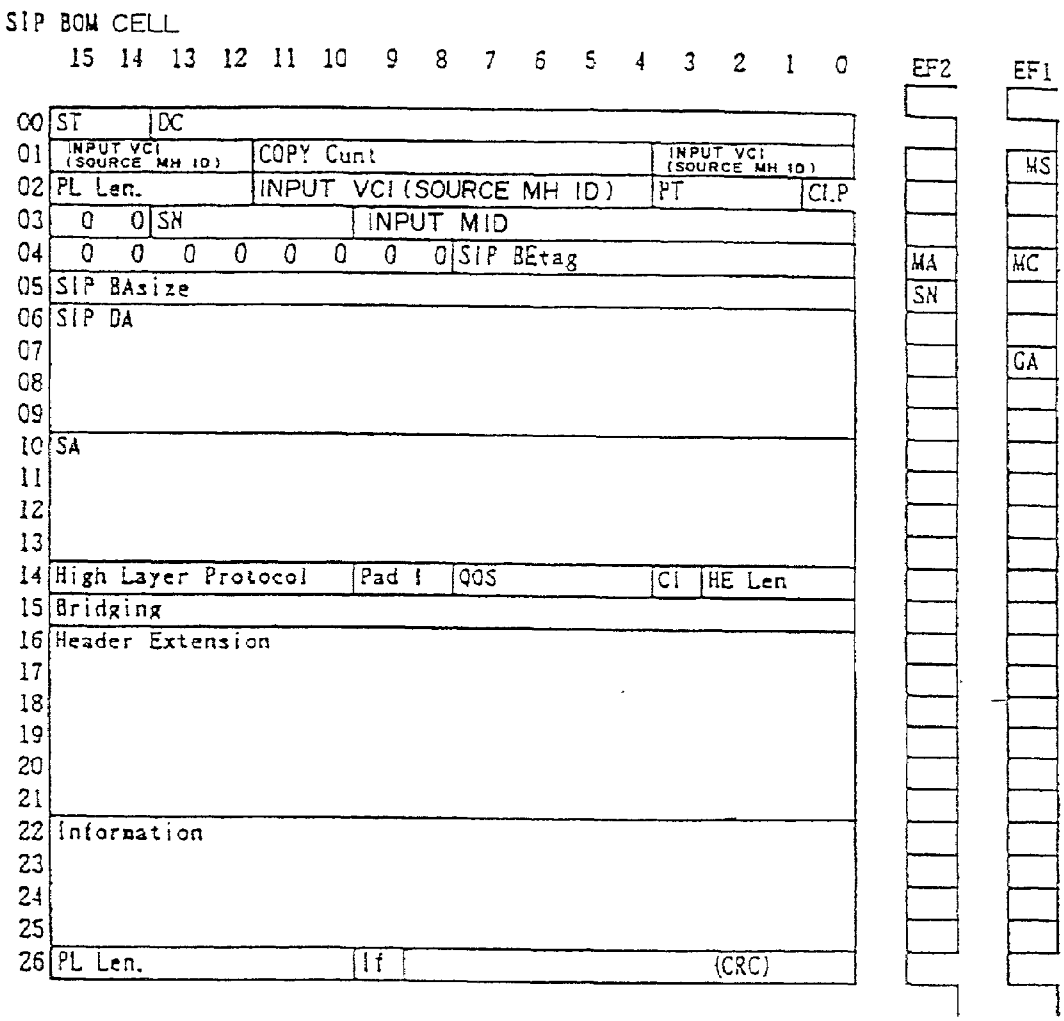

FIG. 608 shows the format of an input cell (SIP BOM) from another GWMH to the HMH10A.

Figure 609:
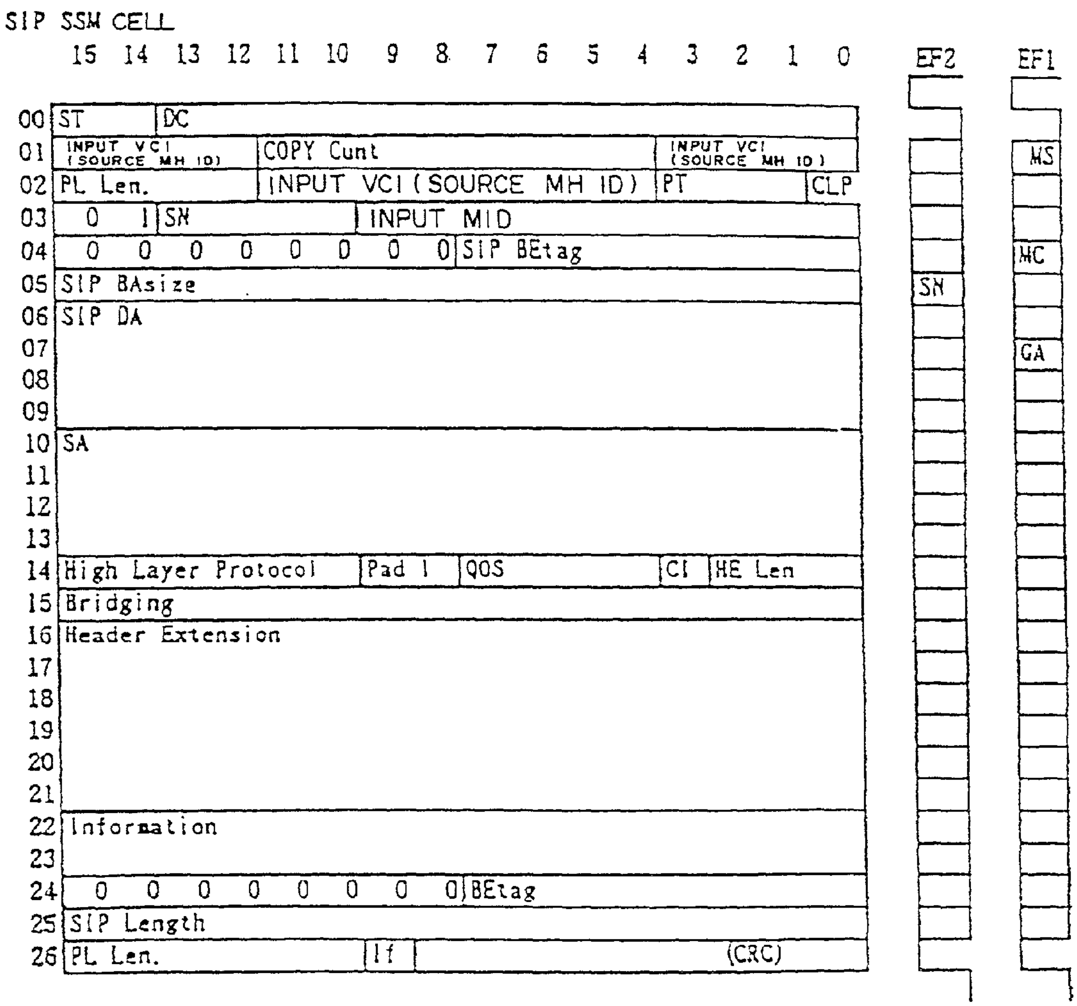

FIG. 609 shows the format of an input cell (SIP SSM) from another GWMH to the HMH10A.

Figure 610:
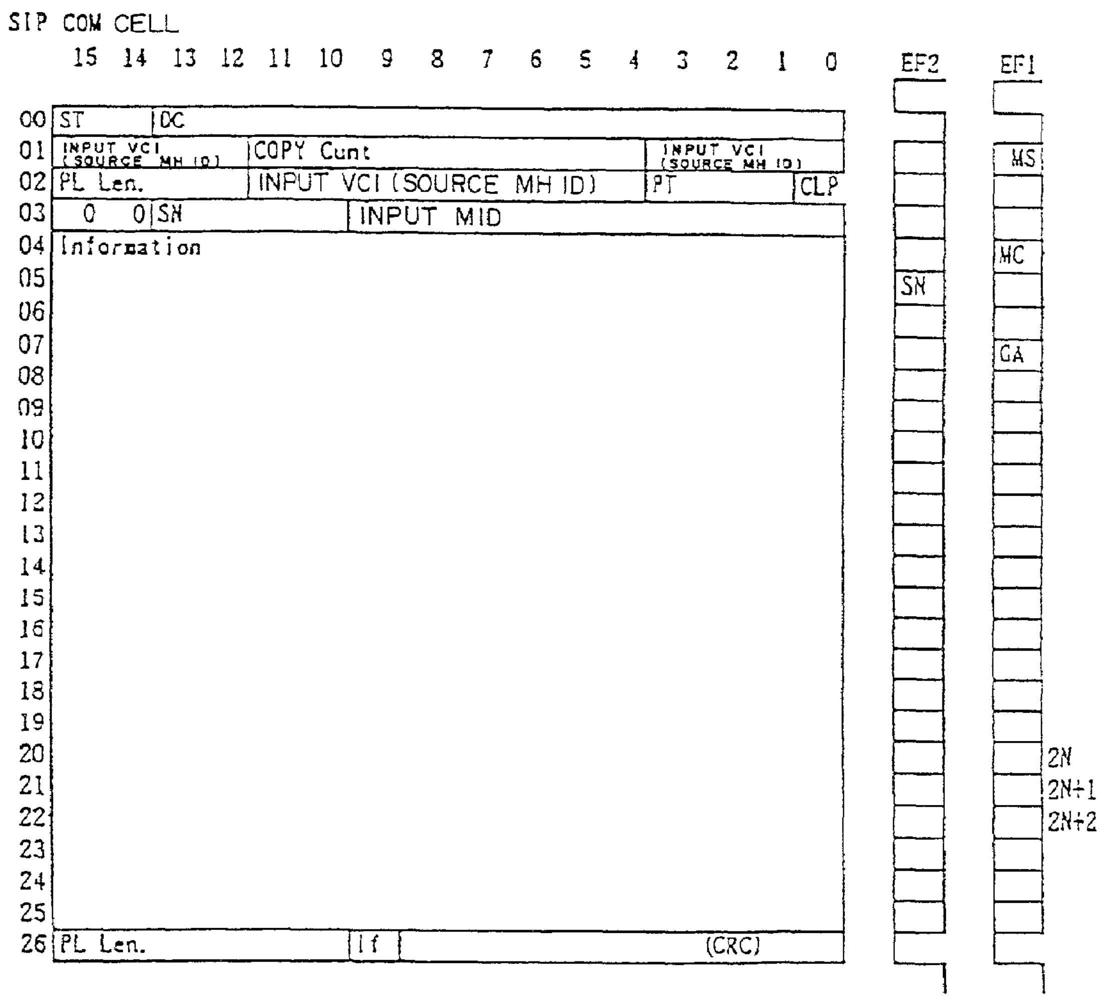

FIG. 610 shows the format of an input cell (SIP COM) from another GWMH to the HMH10A.

Figure 611:
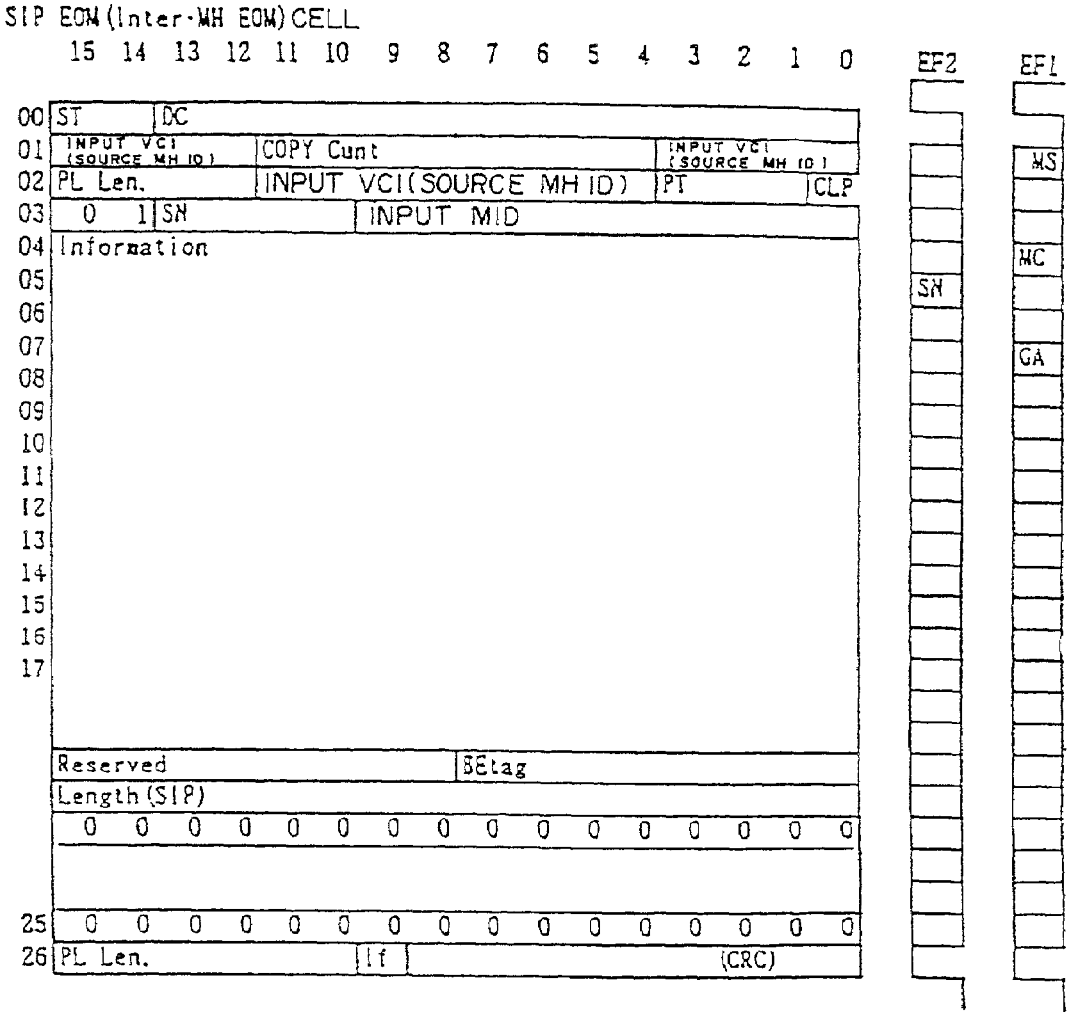

FIG. 611 shows the format of an input cell (SIP EOM, EOM between MHs) from another GWMH to the HMH10A.

Figure 612:
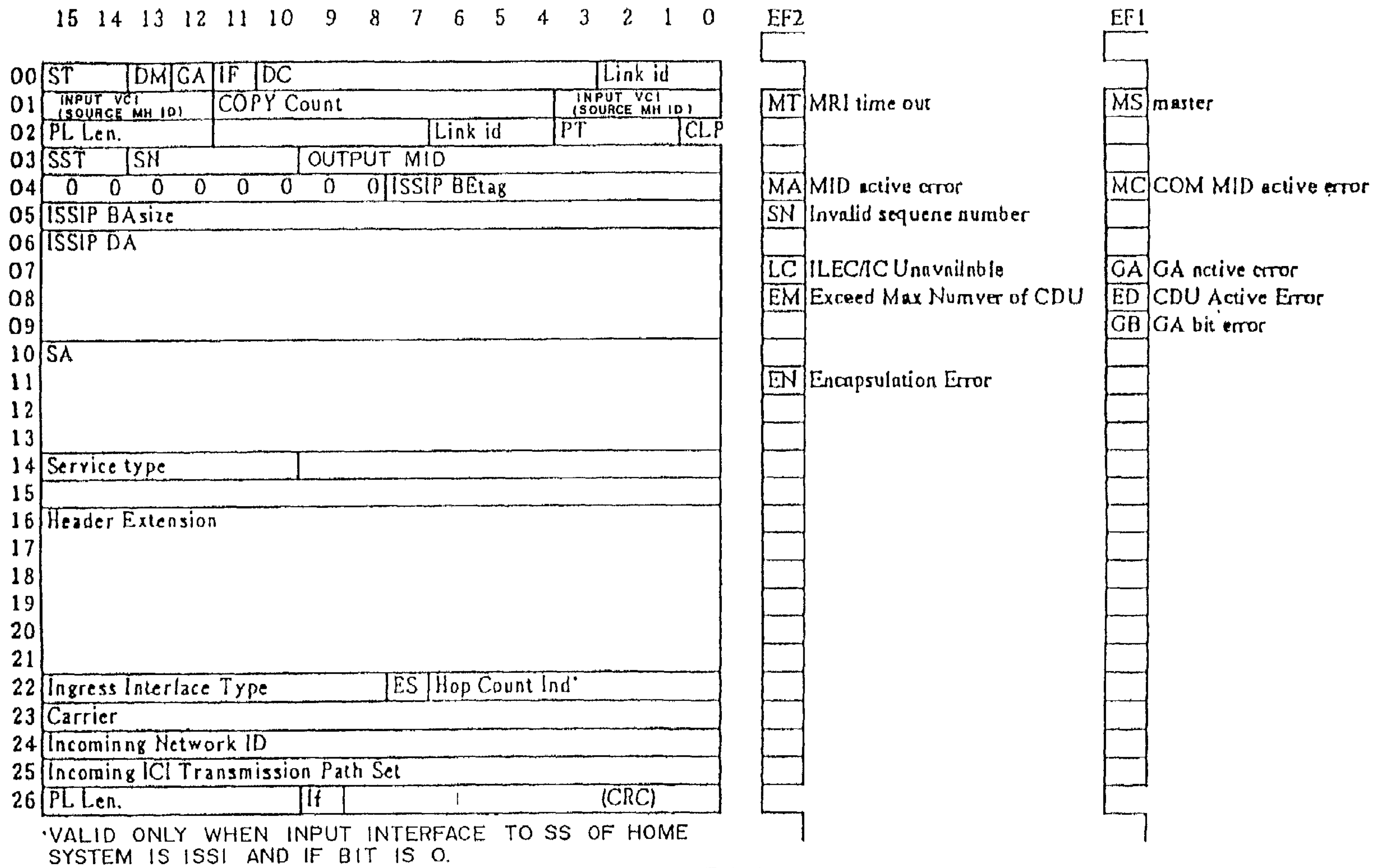

FIG. 612 shows the data interface between the OGLP and LP-COM.

Figure 613:
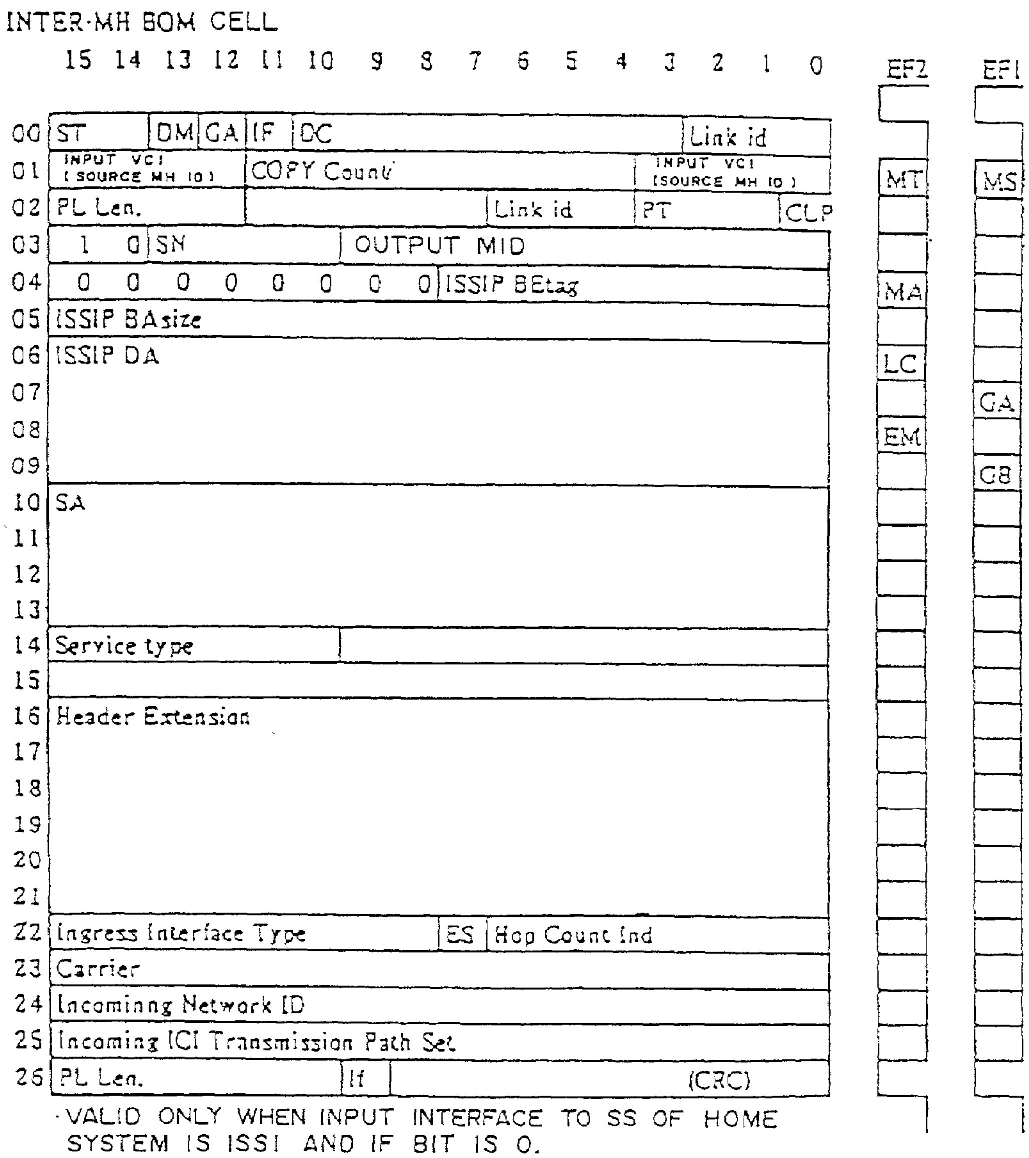

FIG. 613 shows the format of the cell (BOM between the MHs) for the interface with the LP-COM.

Figure 614:
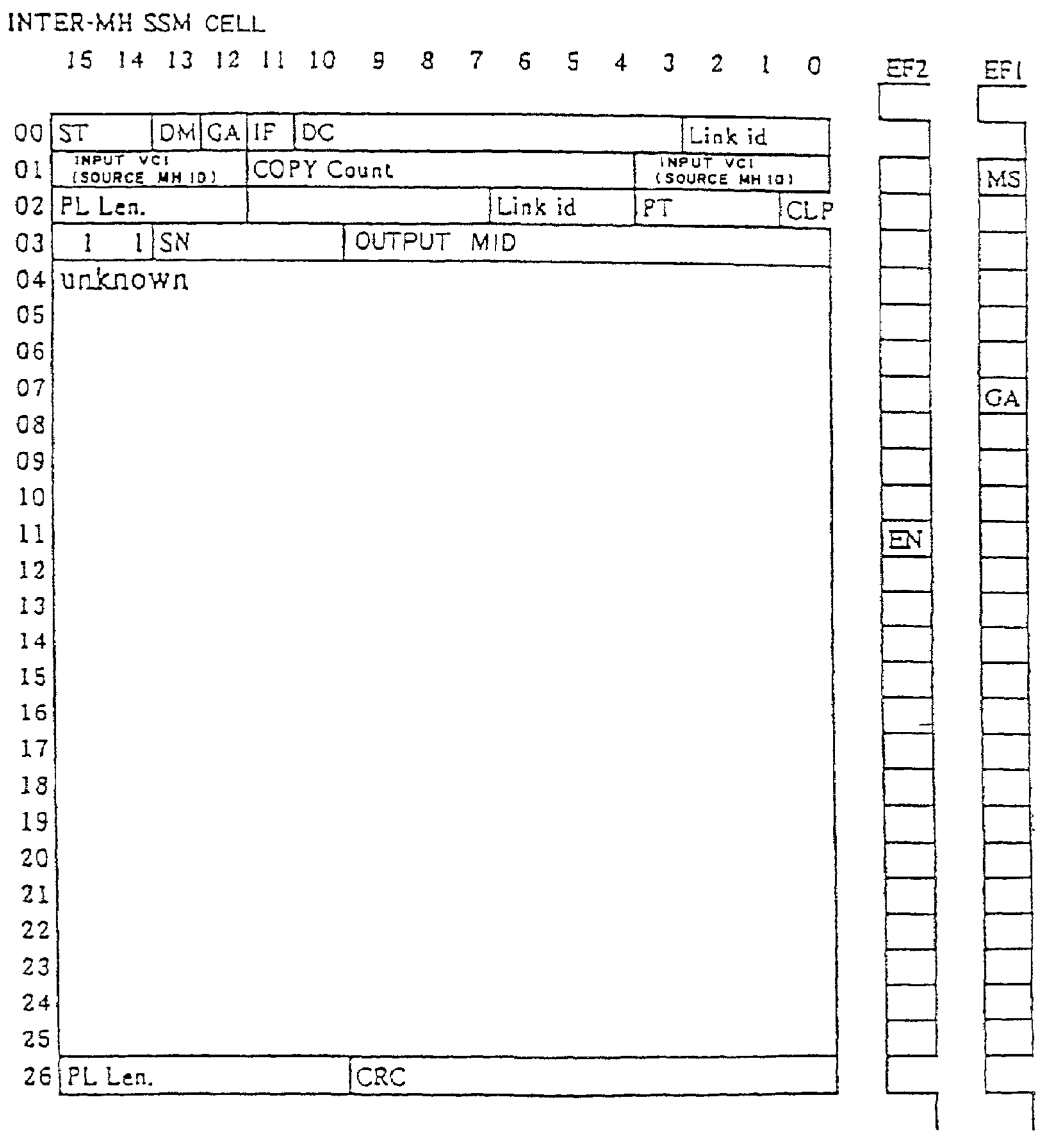

FIG. 614 shows the format of the cell (SSM between MHs) for the interface with the LP-COM.

Figure 615:
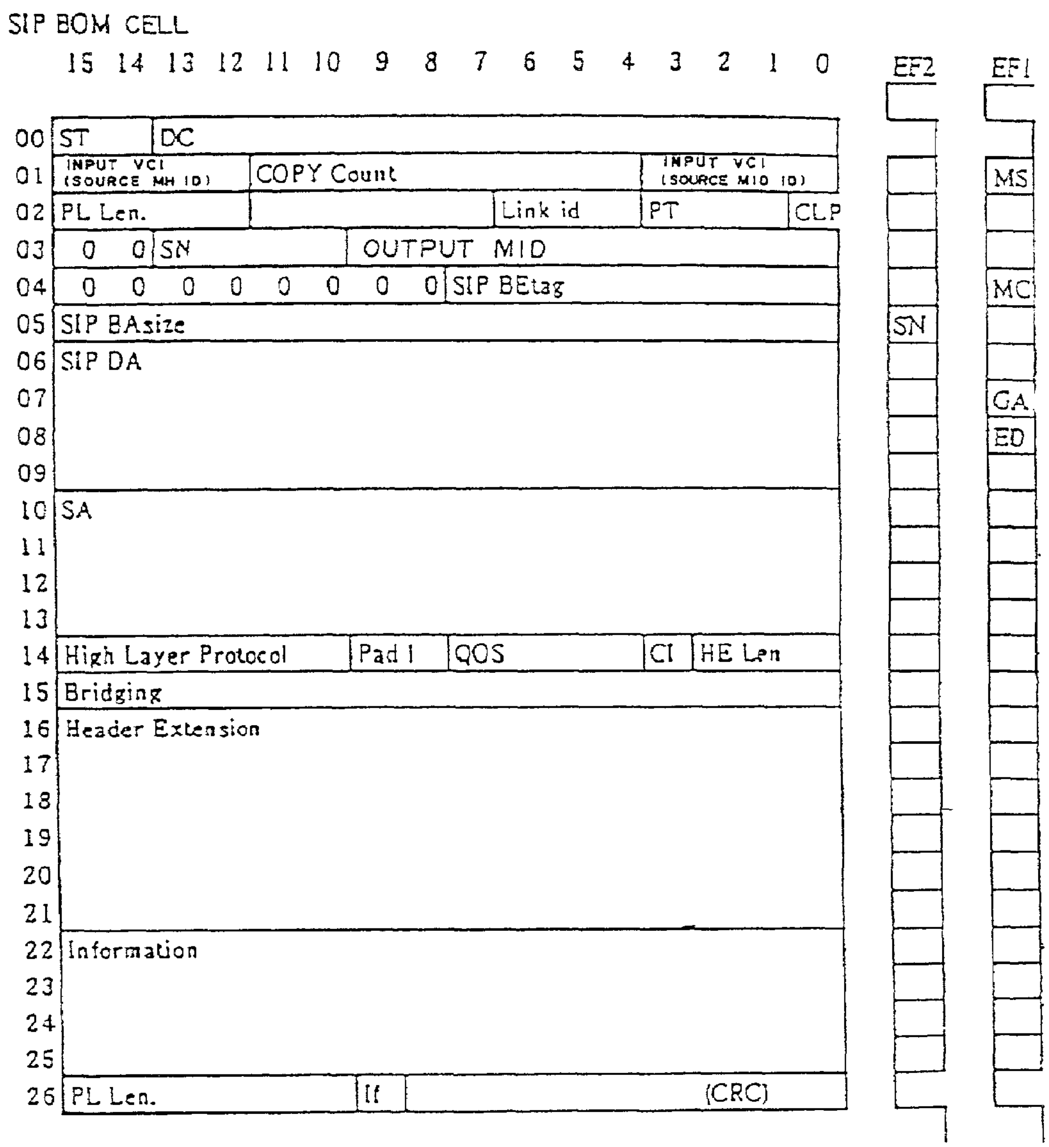

FIG. 615 shows the format of the cell (SIP BOM) for the interface with the LP-COM.

Figure 616:
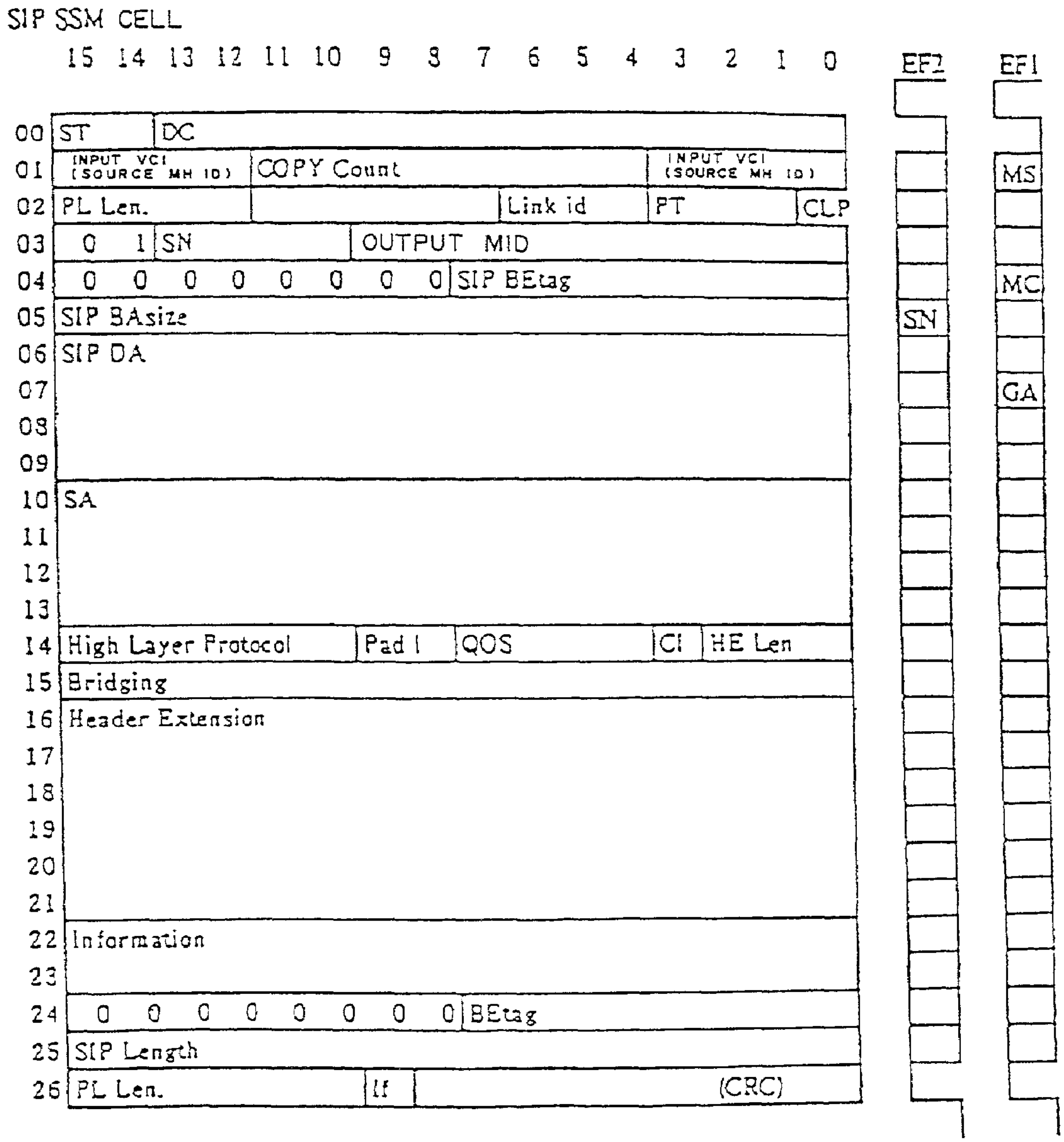

FIG. 616 shows the format of the cell (SIP SSM) for the interface with the LP-COM.

Figure 617:
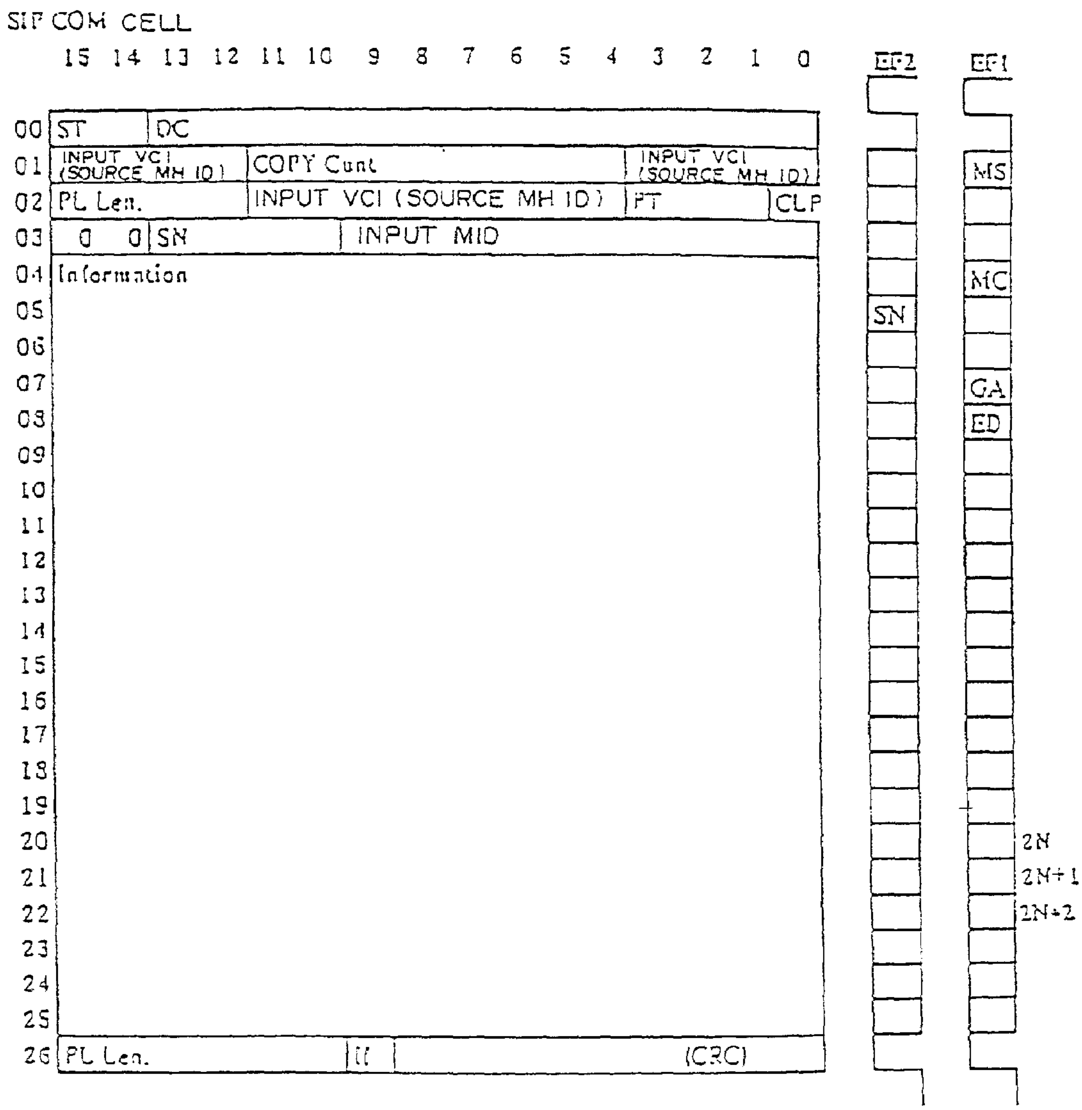

FIG. 617 shows the format of the cell (SIP COM) for the interface with the LP-COM.

Figure 618:
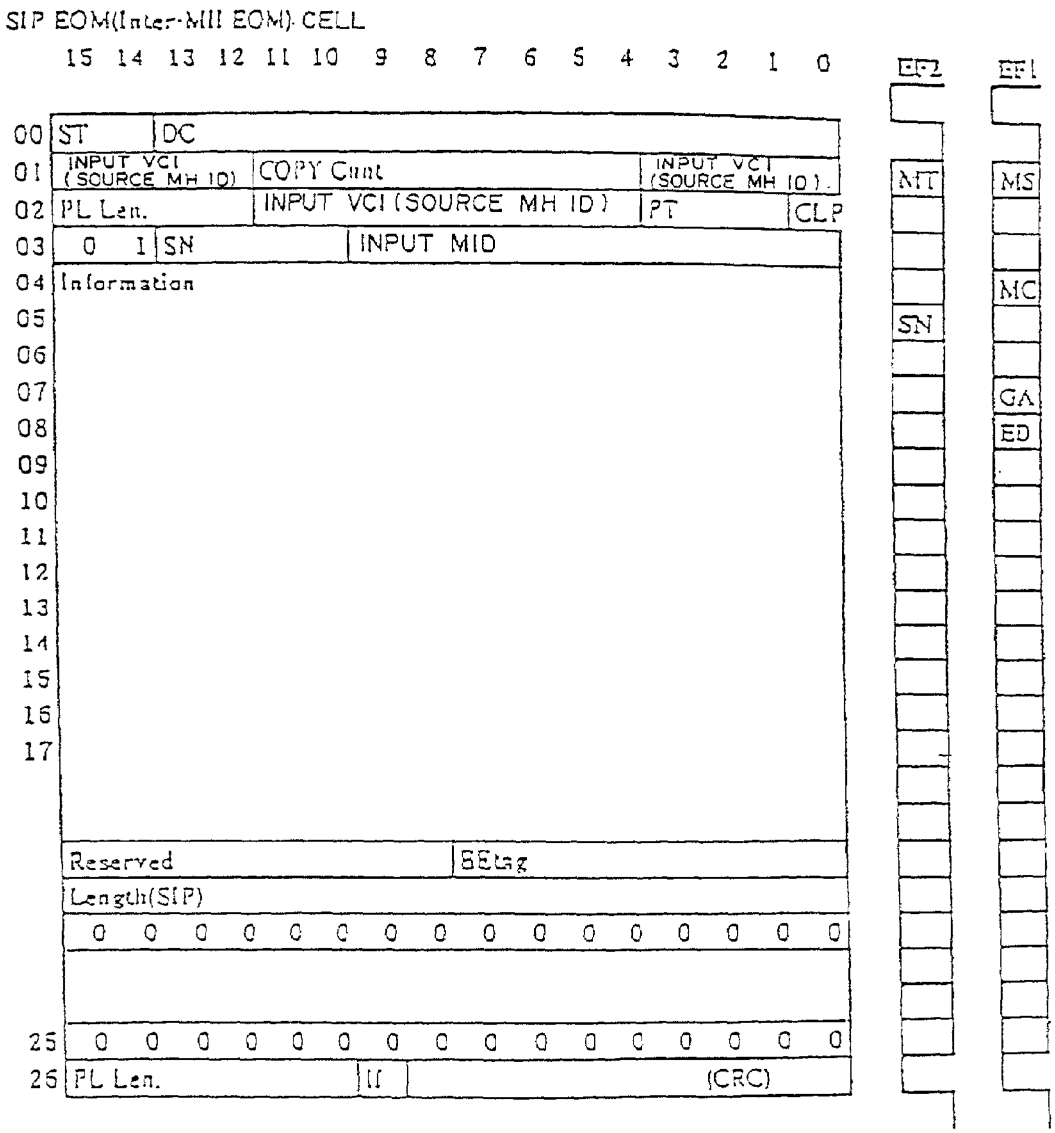

FIG. 618 shows the format of the cell (SIP EOM, EOM between MHs) for the interface with the LP-COM.

FIG. 619 shows the format of the output cell (SOM between MHs) from the HMH10A to the ICI.

Figure 620:
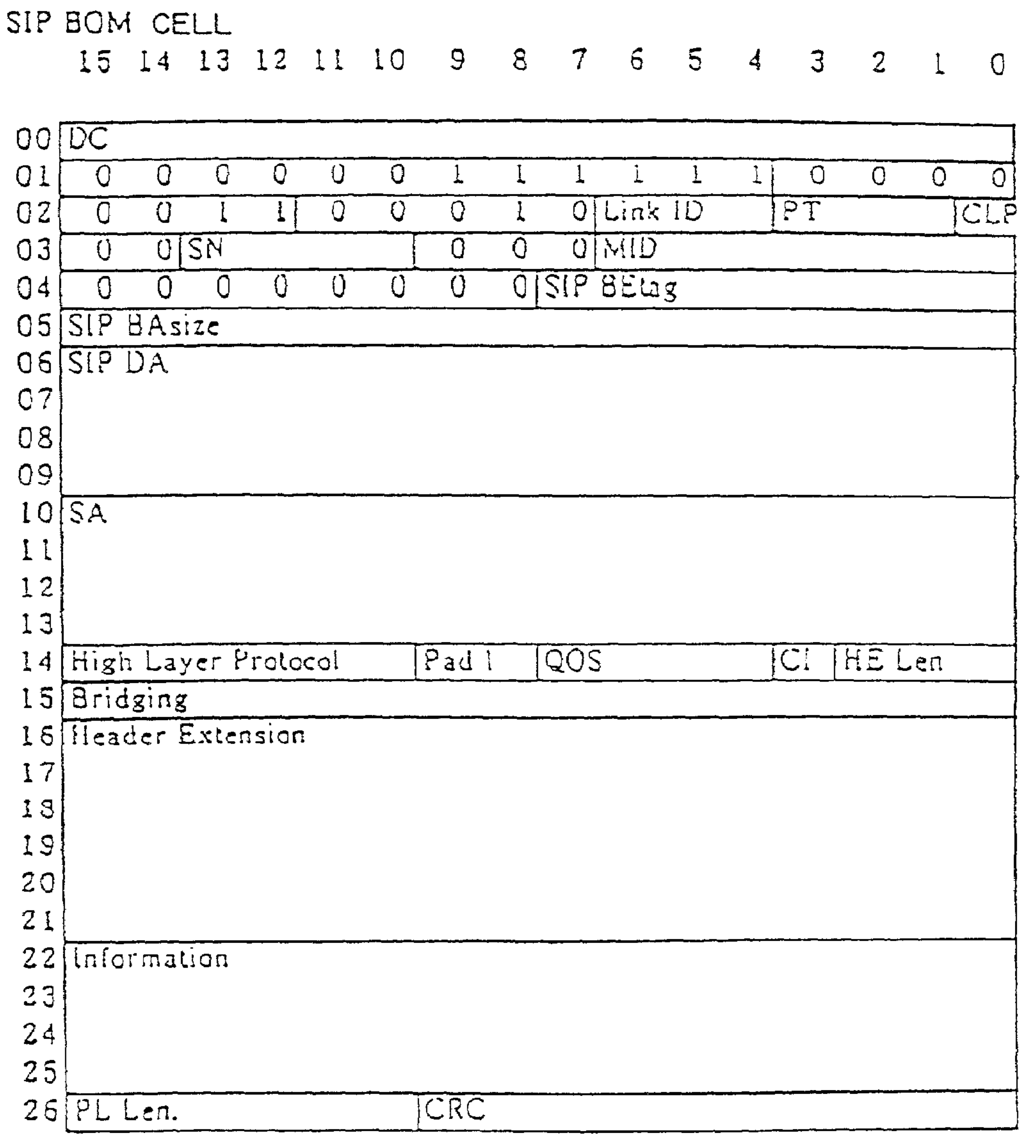

FIG. 620 shows the format of the output cell (SIP BOM) from the HMH10A to the ICI.

FIG. 621 shows the format of the output cell (BOM between MHs) from the HMH10A to the ICI.

FIG. 622 shows the format of the output cell (SIP COM) from the HMH10A to the ICI.

FIG. 623 shows the format of the output cell (SIP EOM, EOM between MHs) from the HMH10A to the ICI.

FIG. 624 shows the format of the output cell (BOM between MHs) from the HMH10A to the ISSI.

FIG. 625 shows the format of the output cell (SIP BOM) from the HMH10A to the ISSI.

Figure 626:
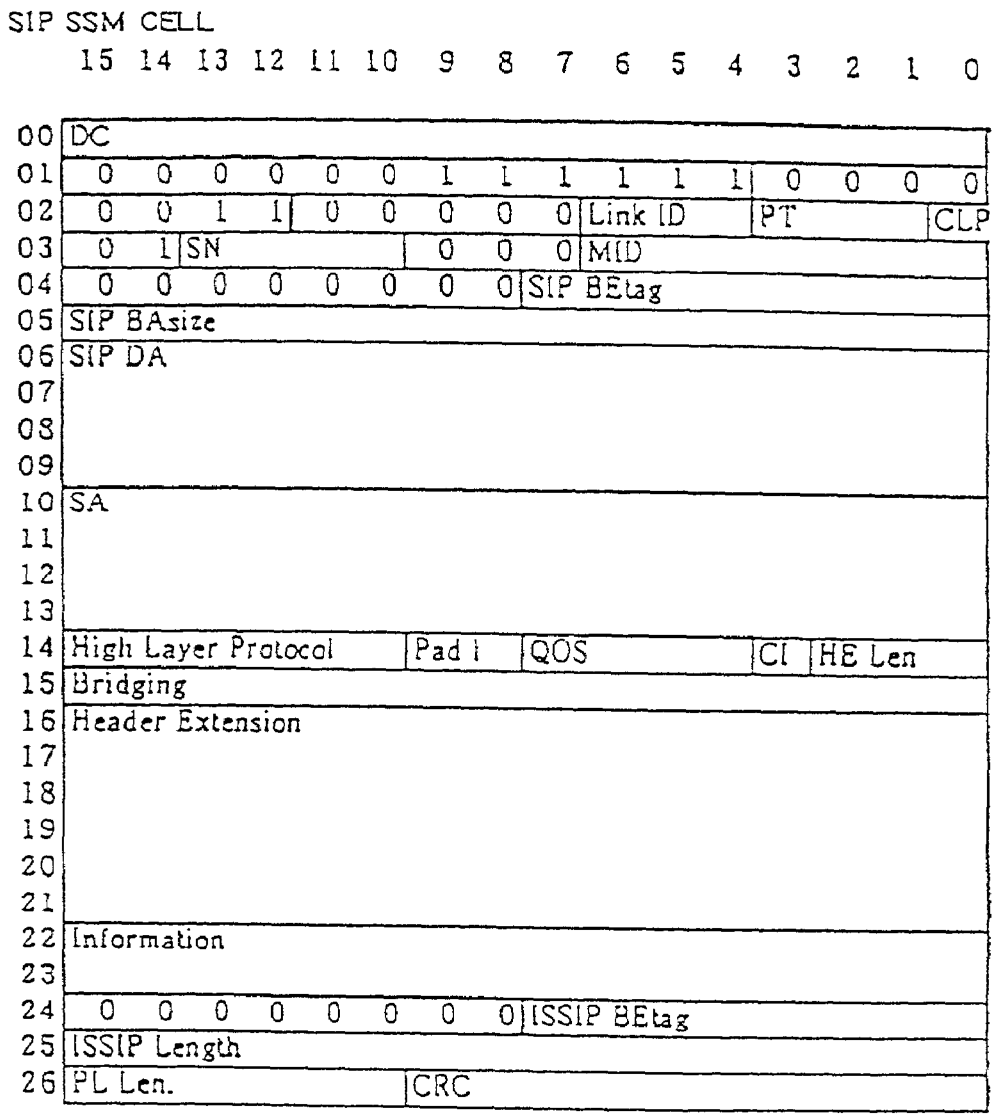

FIG. 626 shows the format of the output cell (SIP SSM) from the HMH10A to the ISSI.

FIG. 627 shows the format of the output cell (SIP COM) from the HMH10A to the ISSI.

FIG. 628 shows the format of the output cell (SIP EOM, EOM between MHs) from the HMH10A to the ISSI.

Figure 629:
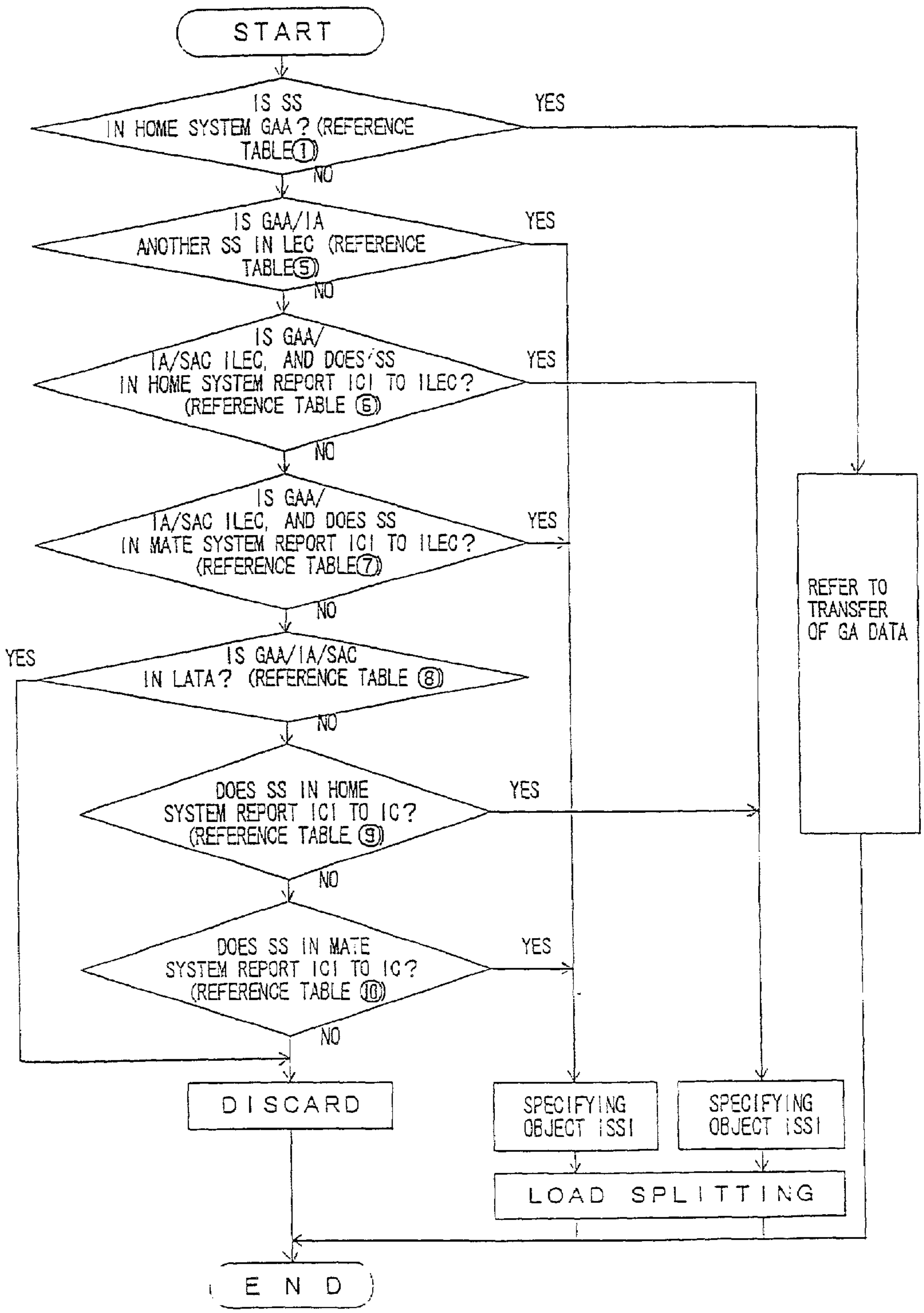

FIG. 629 is a flowchart showing the outgoing routing process in the GWMESH.

Figure 630:
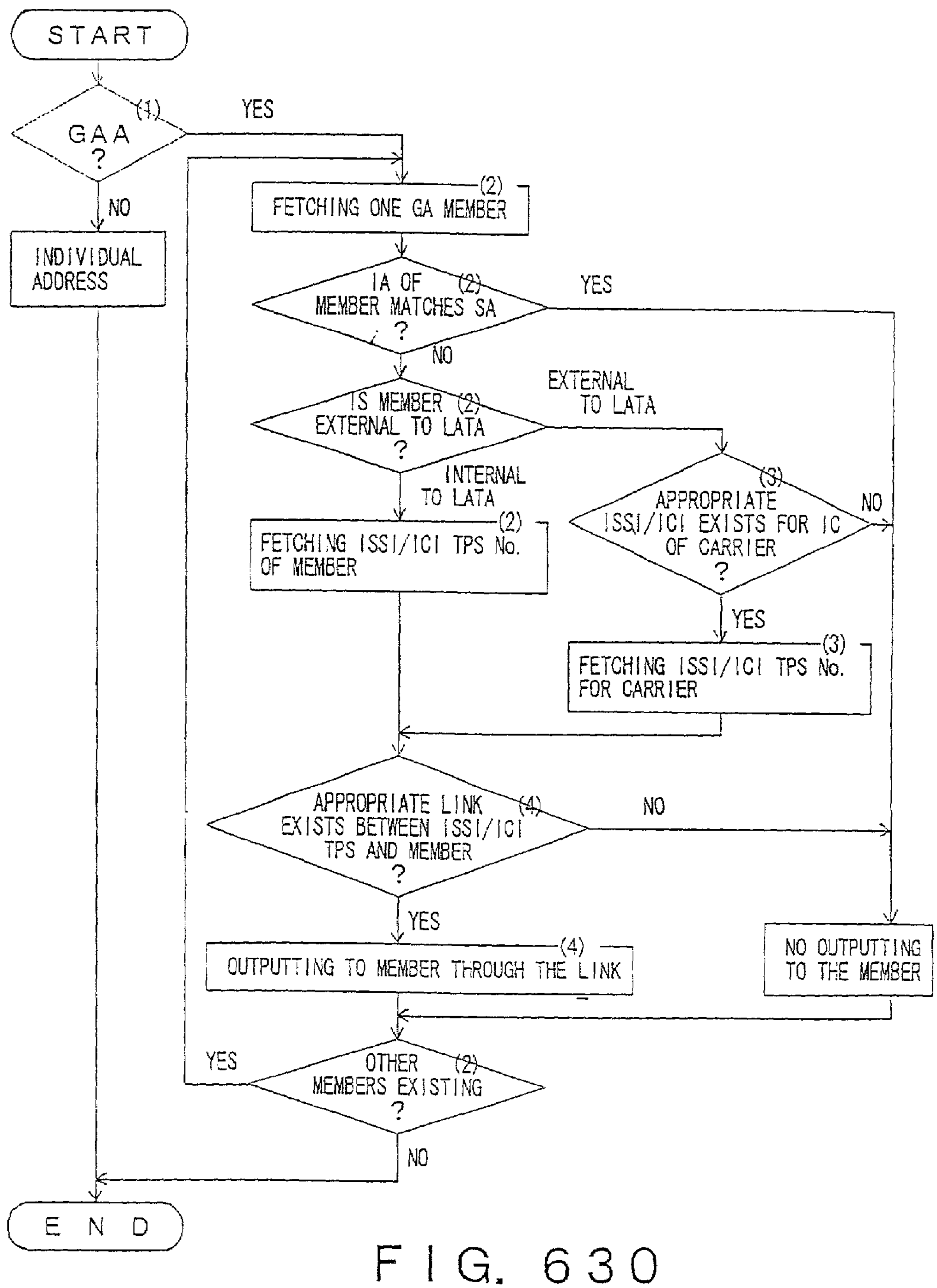

FIG. 630 is a flowchart showing the GA data transfer in the outgoing routing process in the GWMESH.

FIG. 631 shows an example (1) of a table used in each step of the flowcharts shown in FIGS. 629 and 630.

FIG. 632 shows an example (2) of a table used in each step of the flowcharts shown in FIGS. 629 and 630.

FIG. 633 shows an example (3) of a table used in each step of the flowcharts shown in FIGS. 629 and 630.

Figure 634:
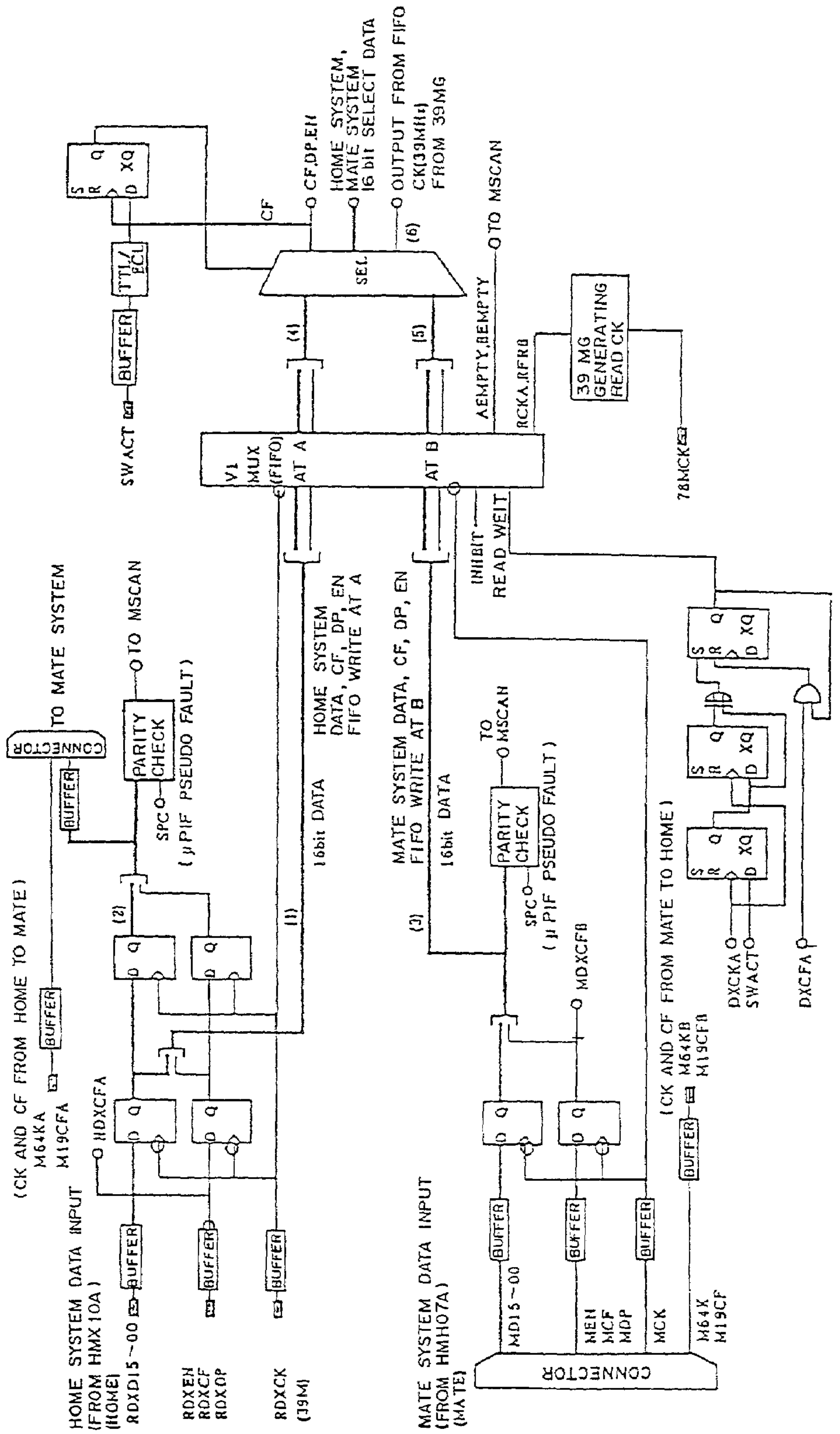

FIG. 634 shows the configuration (1) of the circuit of the HMH07A.

Figure 635:
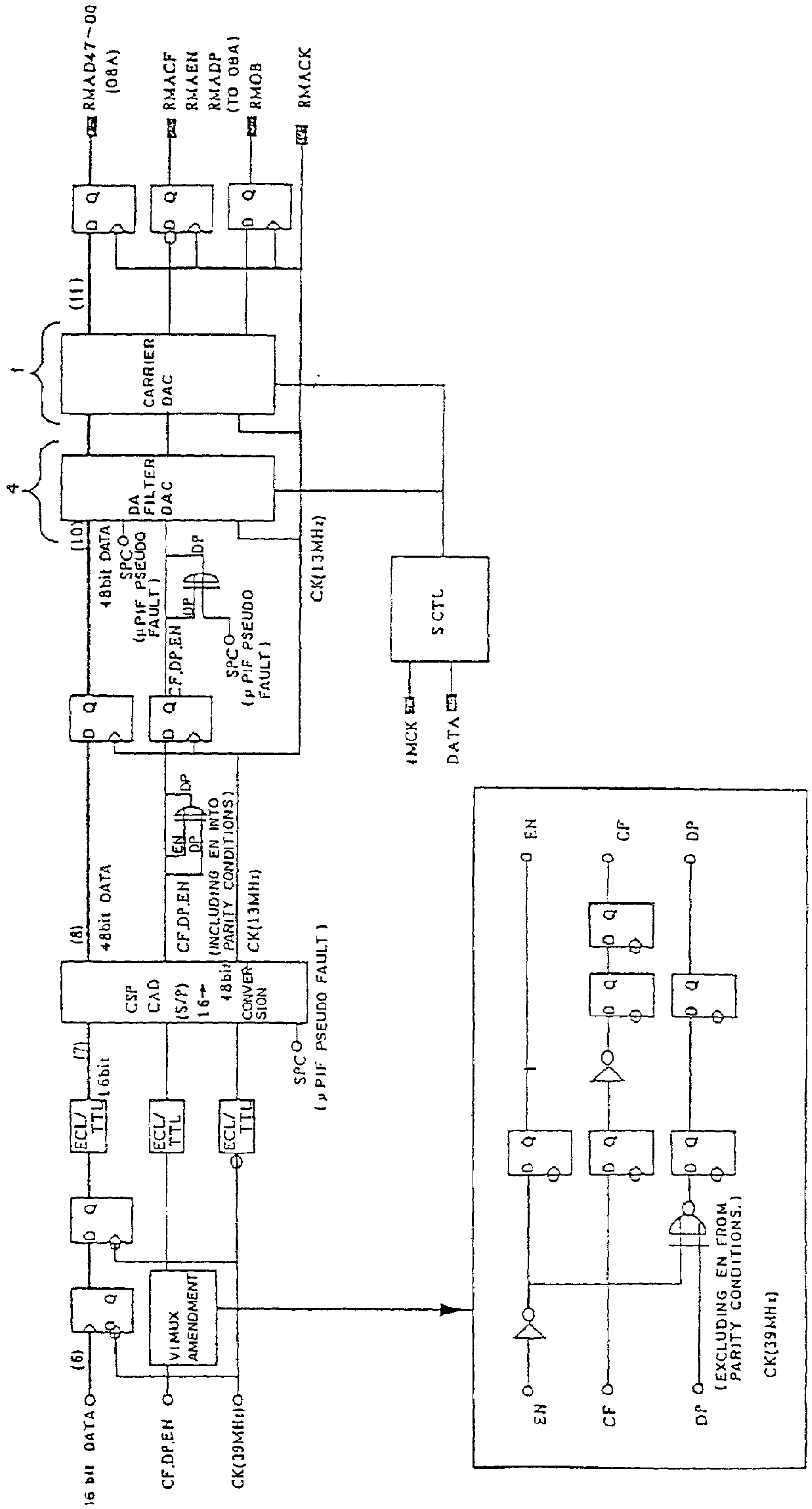

FIG. 635 shows the configuration (2) of the circuit of the HMH07A.

Figure 636:
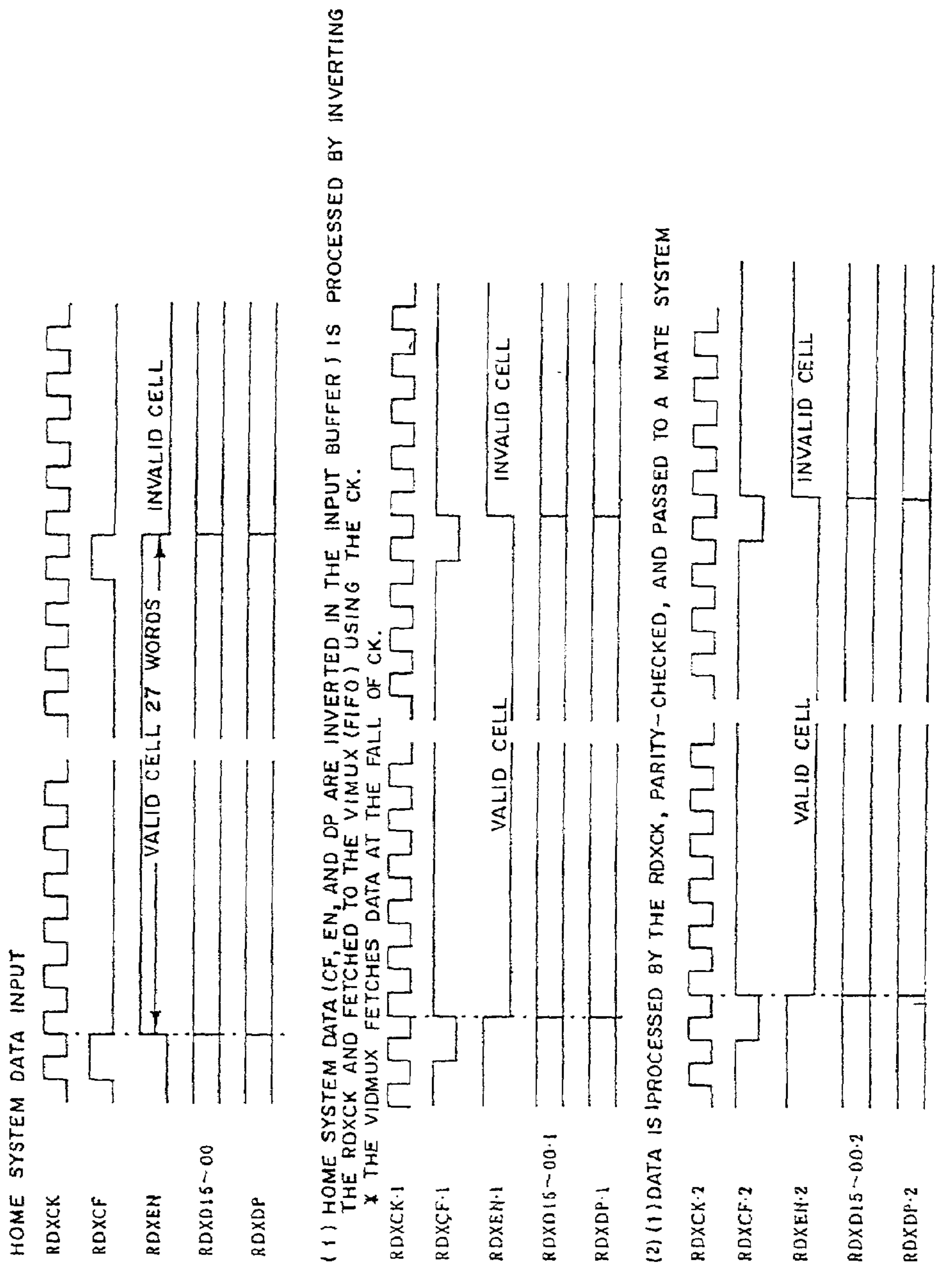

FIG. 636 shows the timing (1) of writing to the FIFO in the HMH07A.

Figure 637:
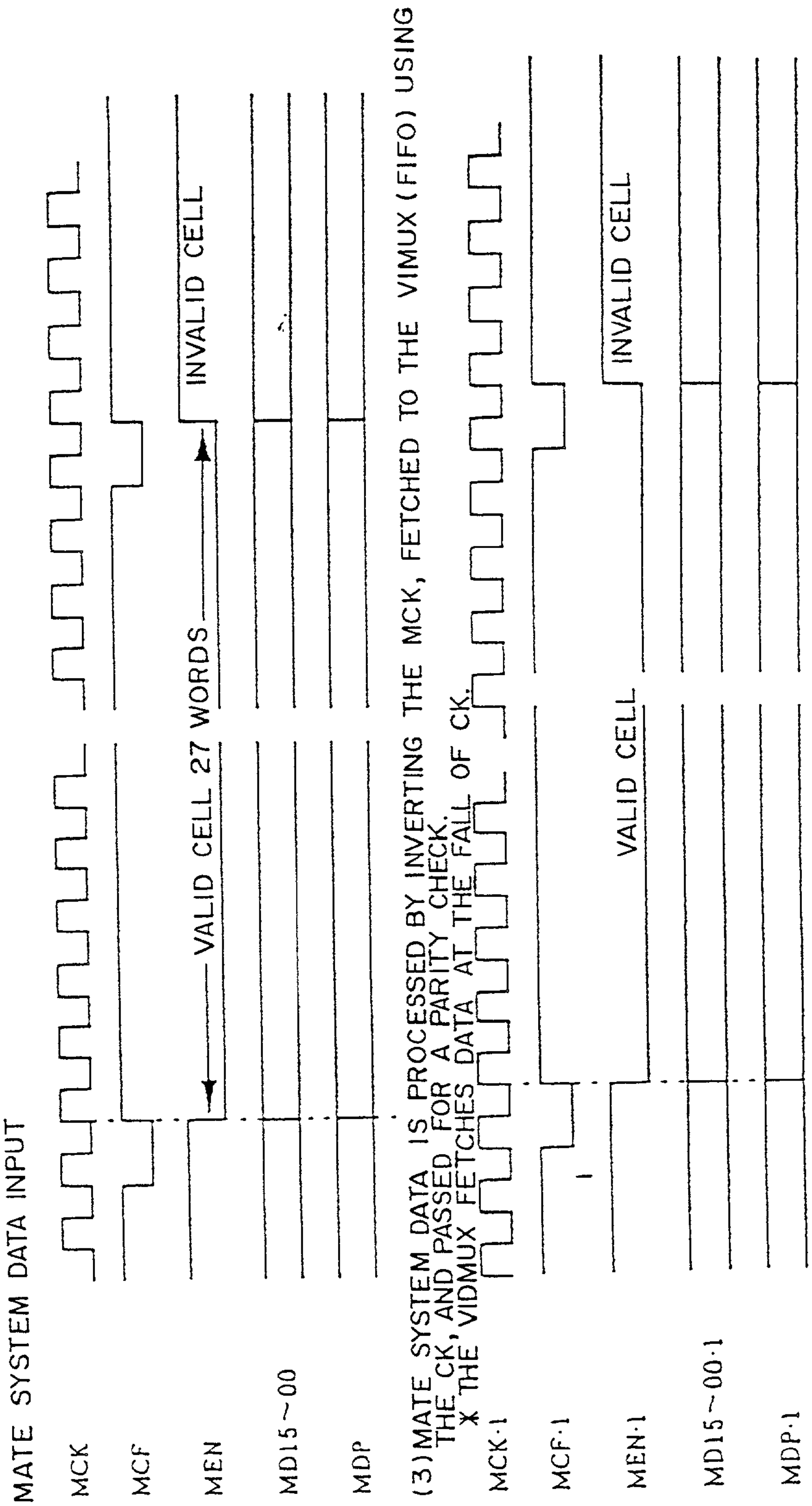

FIG. 637 shows the timing (2) of writing to the FIFO in the HMH07A.

Figure 638:
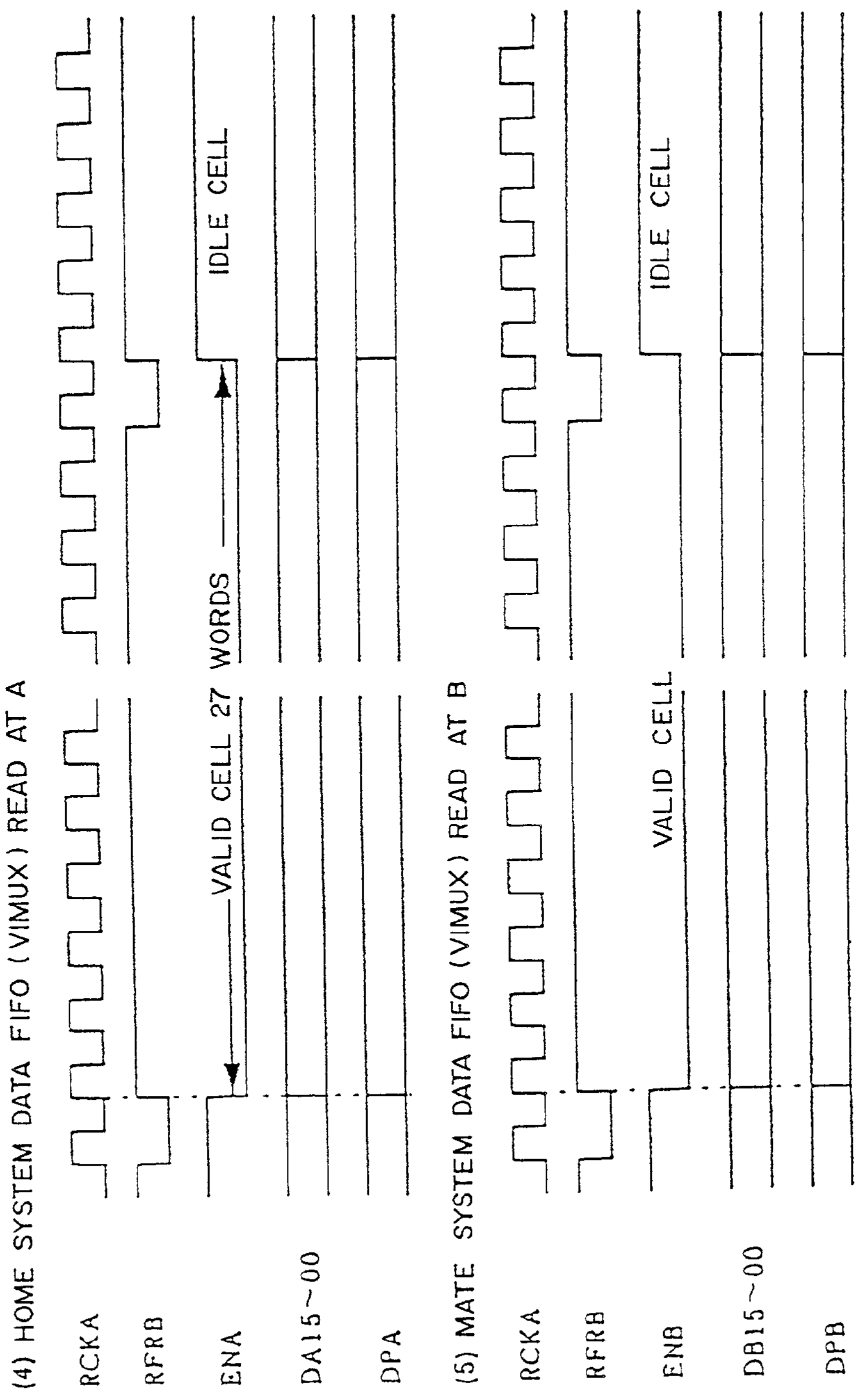

FIG. 638 is a time chart (1) of the signal processed by the HMH07A.

Figure 639:
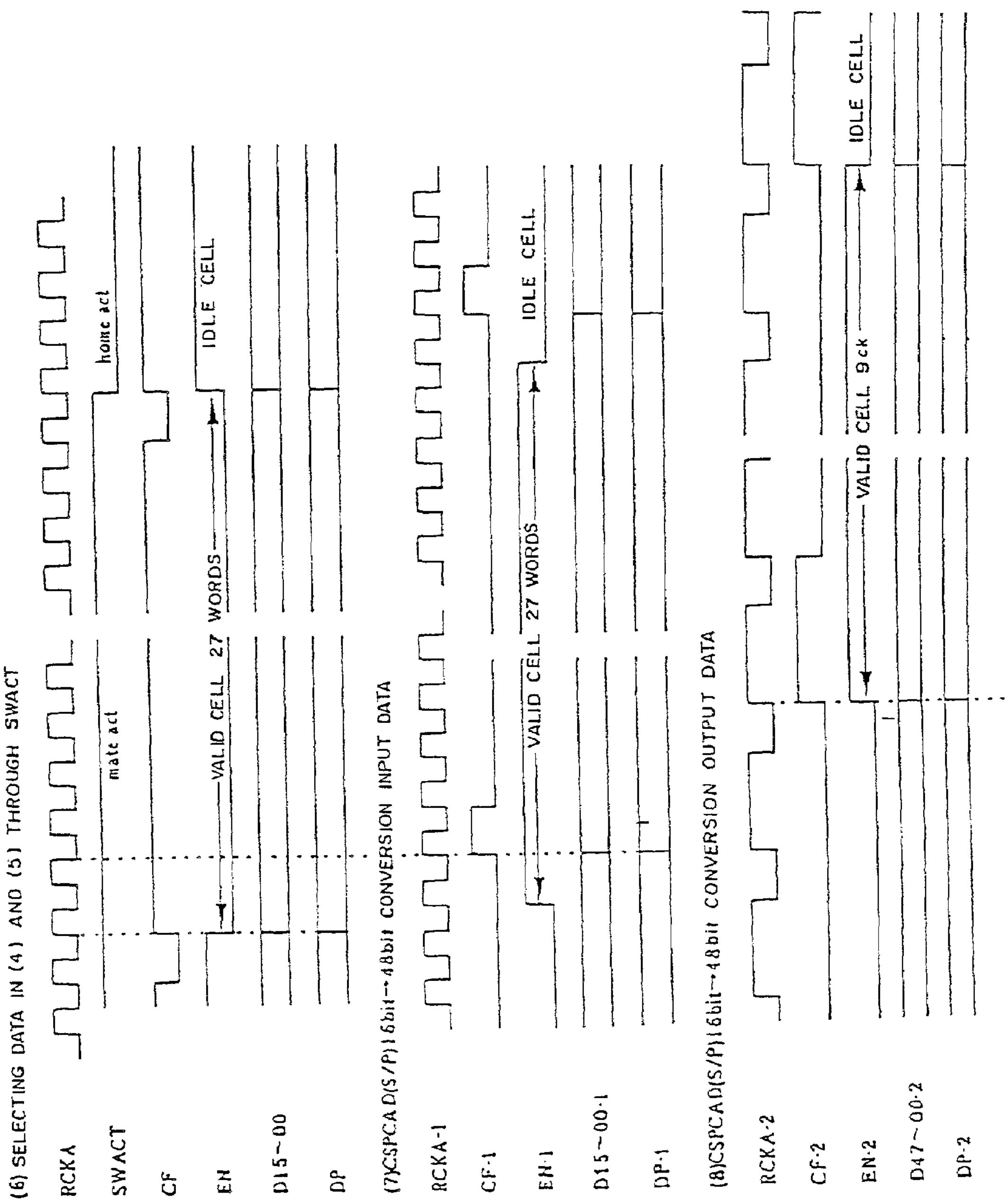

FIG. 639 is a time chart (2) of the signal processed by the HMH07A.

Figure 640:
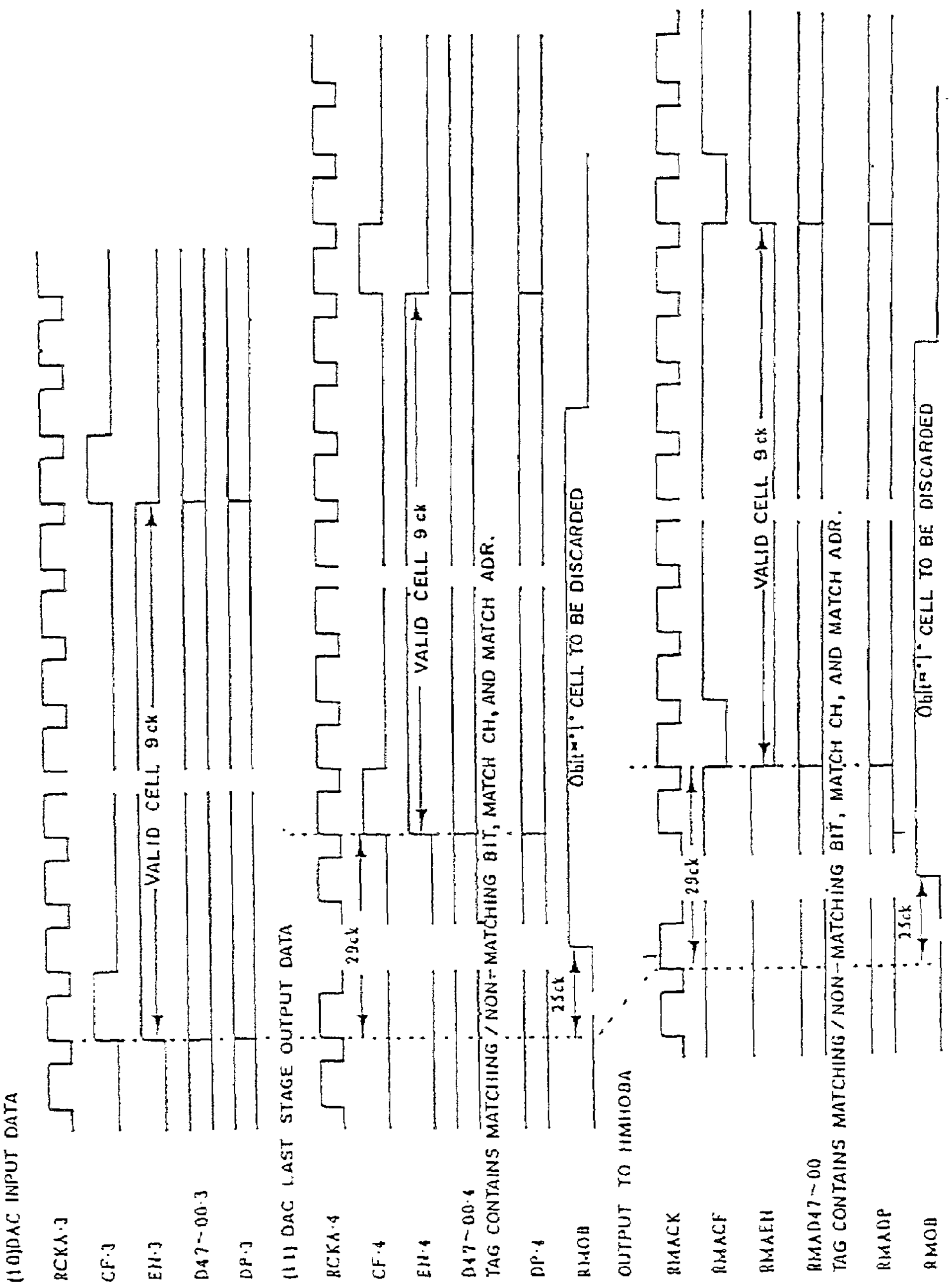

FIG. 640 is a time chart (3) of the signal processed by the HMH07A.

Figure 641:
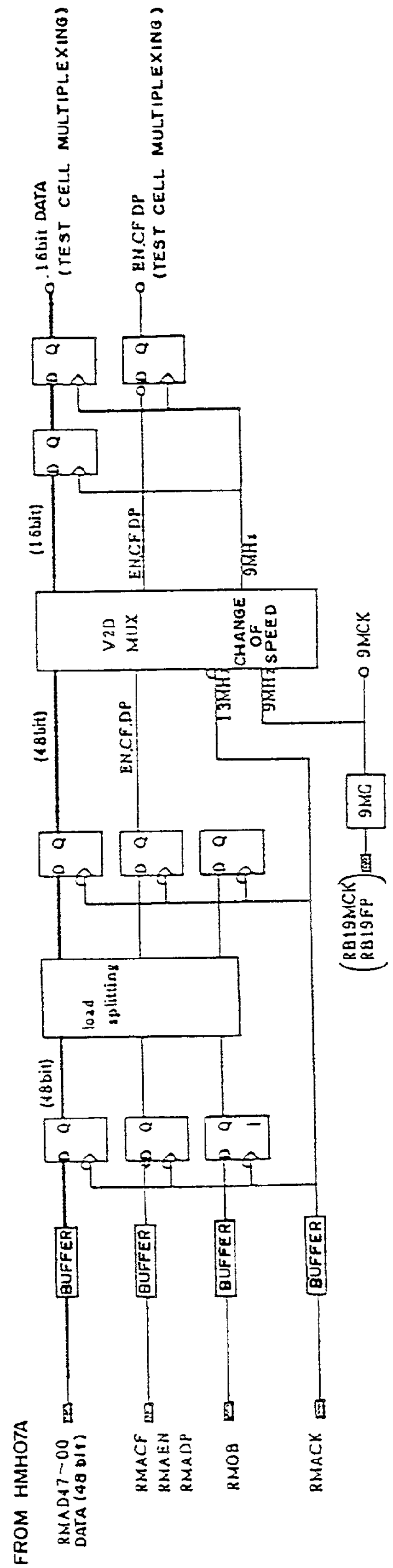

FIG. 641 shows the configuration (1) of the circuit of the HMH08A.

Figure 642:
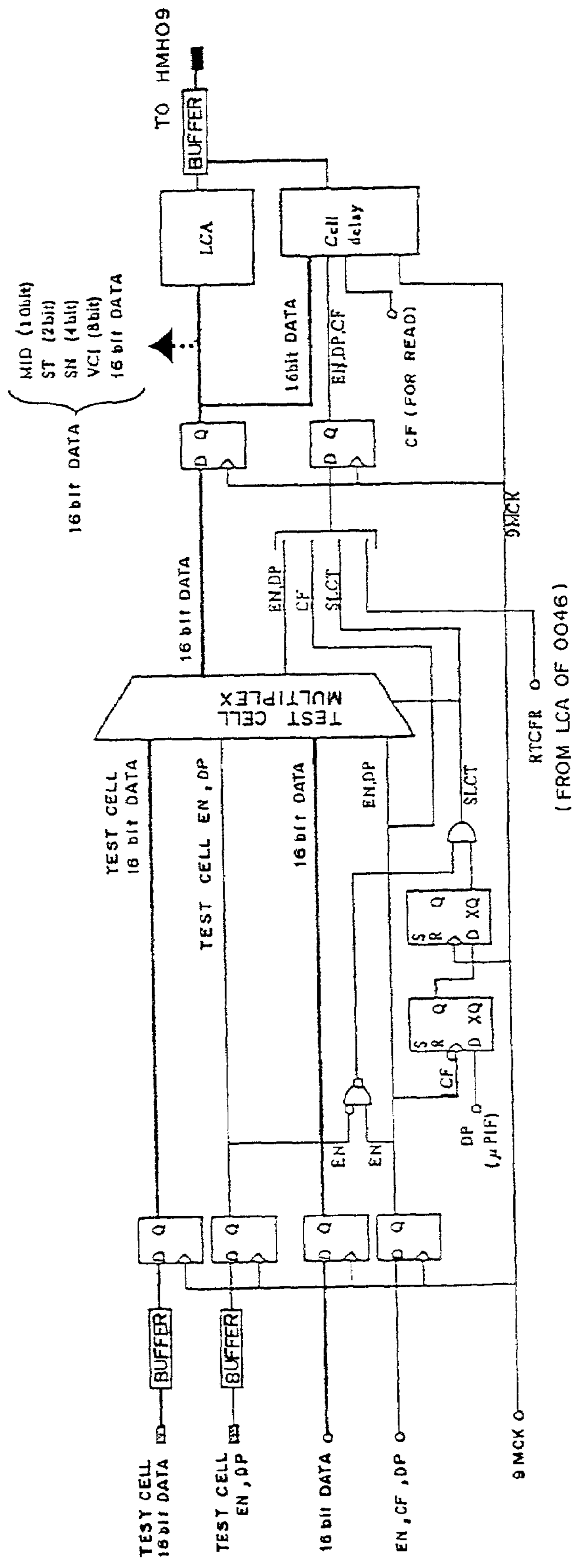

FIG. 642 shows the configuration (2) of the circuit of the HMH08A.

Figure 643:
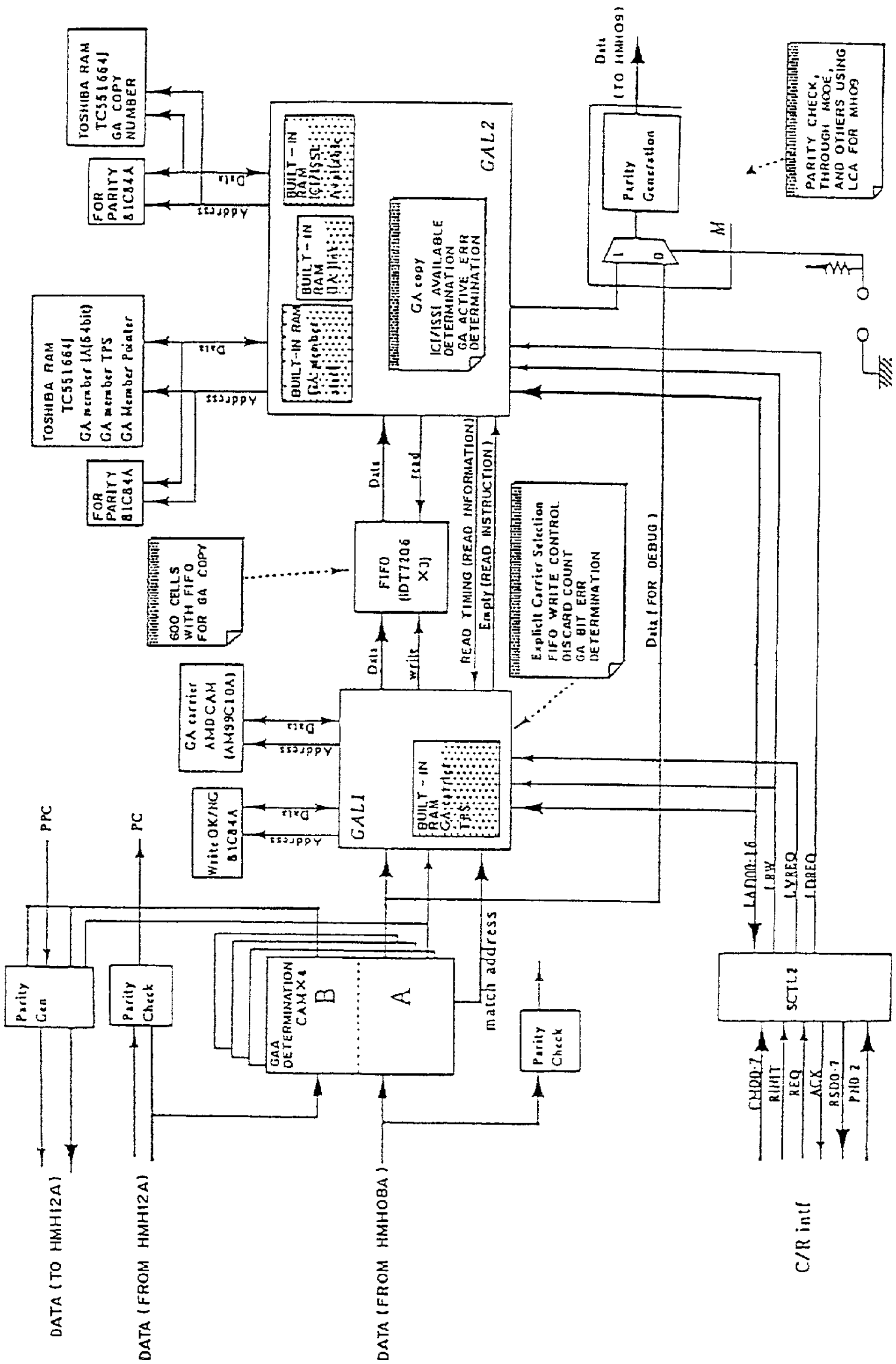

FIG. 643 shows the configuration of the circuit of the HMH09A.

Figure 644:
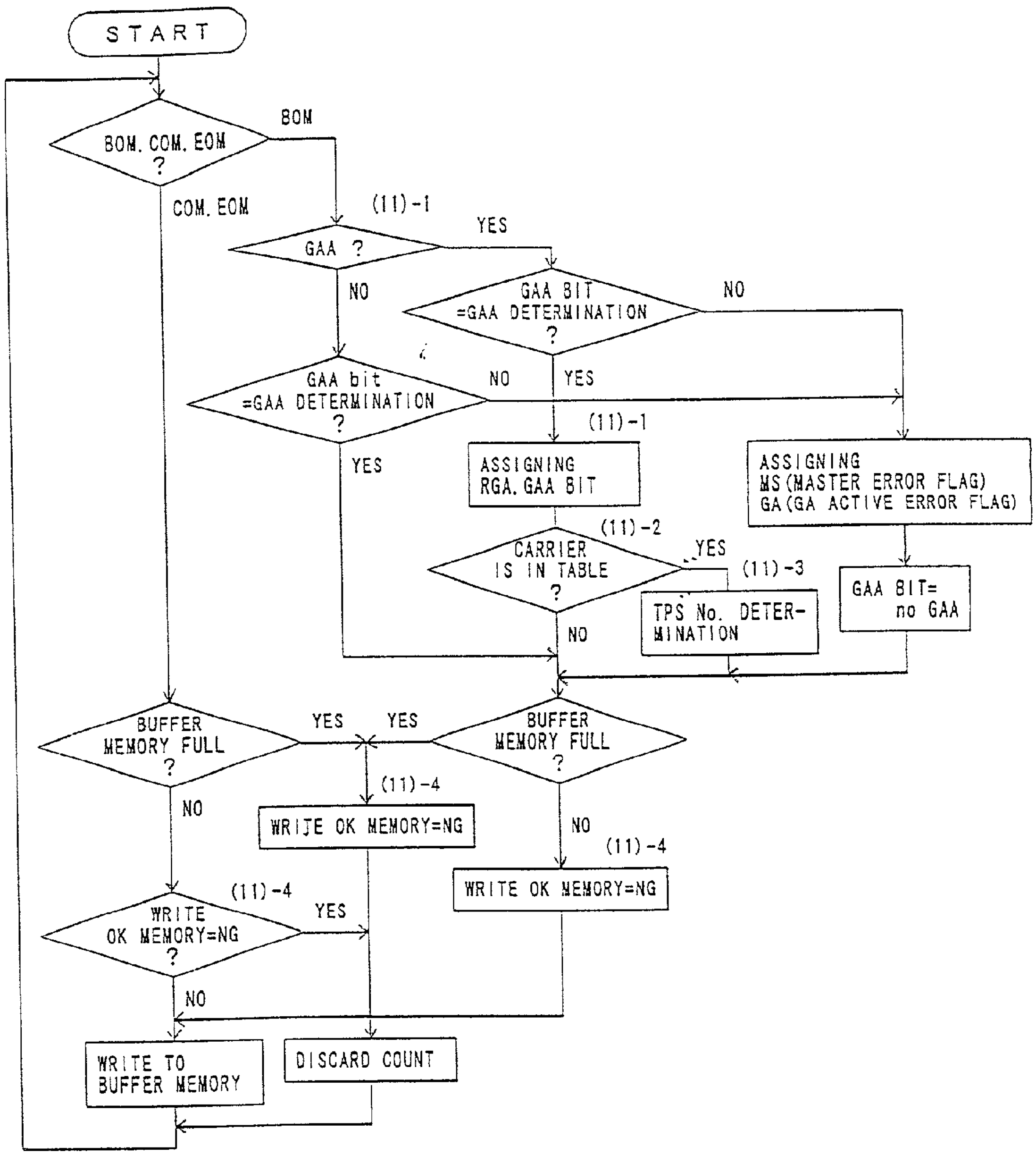

FIG. 644 is a flowchart (write control) of the GA copy process in the HMH09A.

FIG. 645 is a flowchart (read control) of the GA copy process in the HMH09A.

Figure 646:
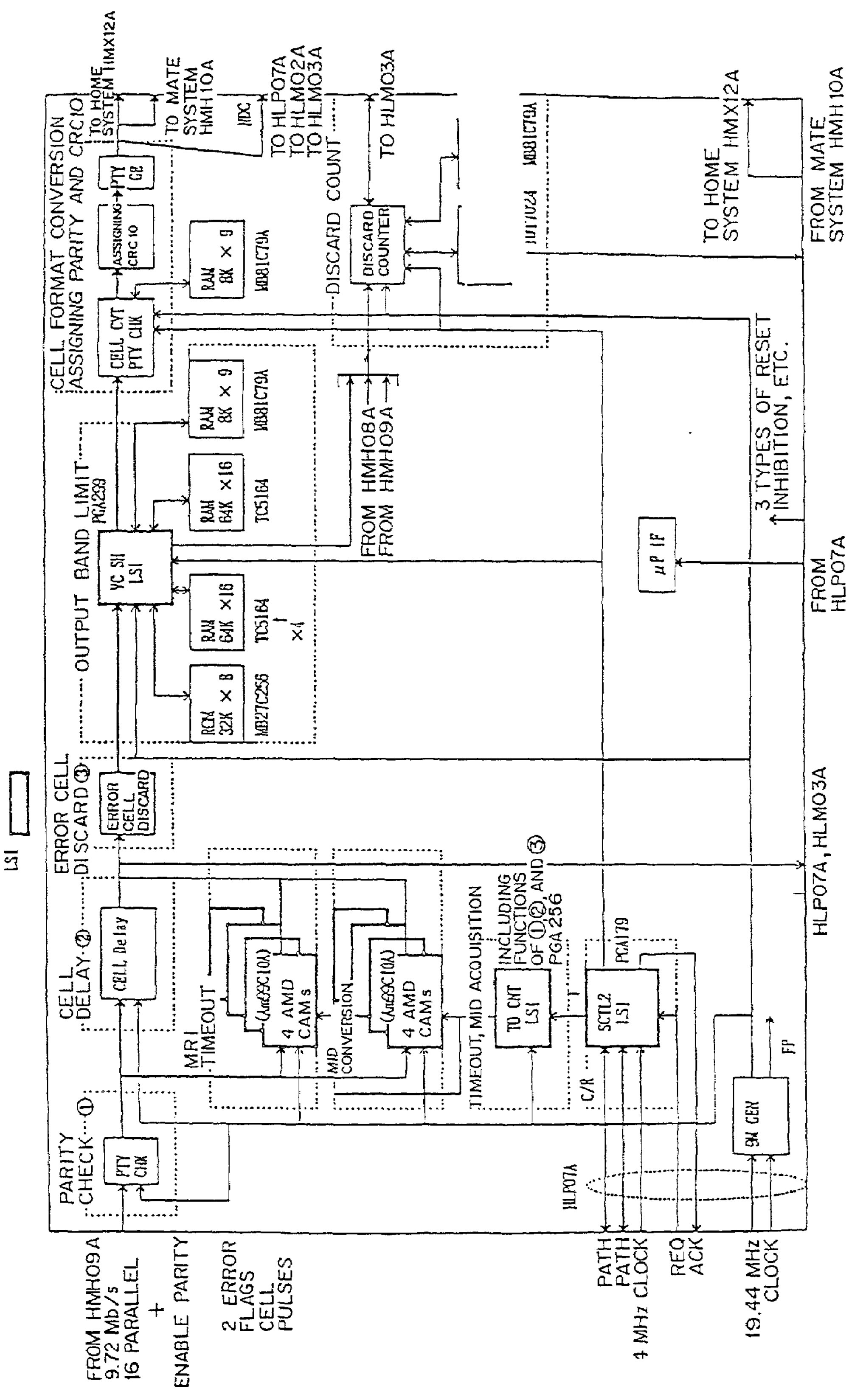

FIG. 646 shows the configuration of the circuit of the HMH10A.

FIG. 647 shows the functions of each block of the HMH10A.

Figure 648:
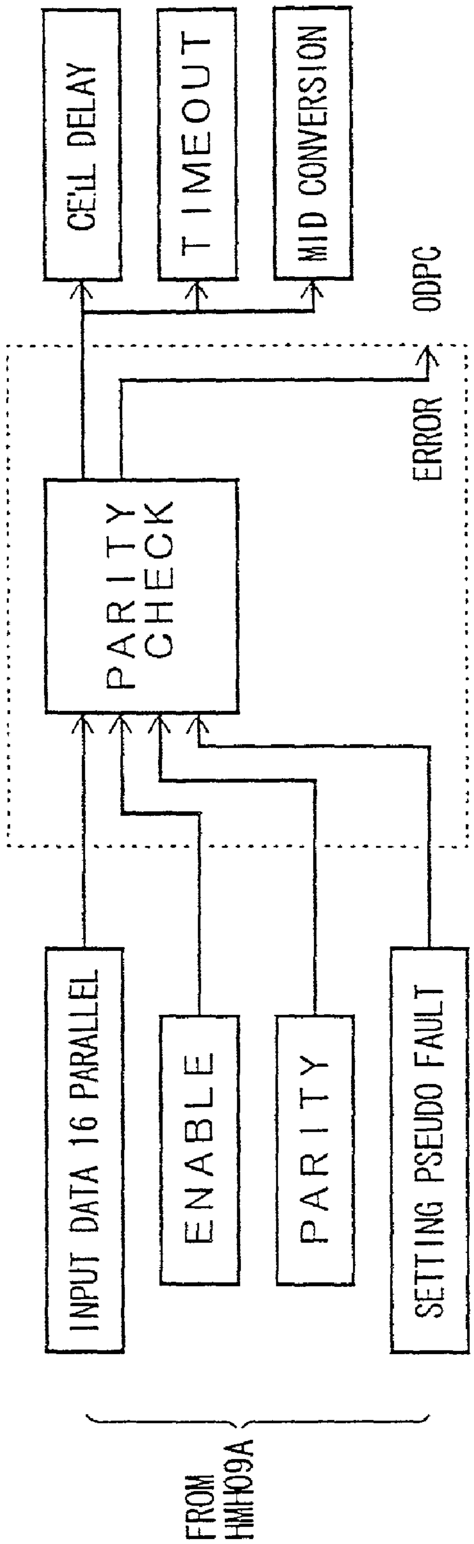

FIG. 648 is a block diagram showing the functions of connecting the parity check unit of the HMH10A to the units near the parity check unit.

Figure 649:
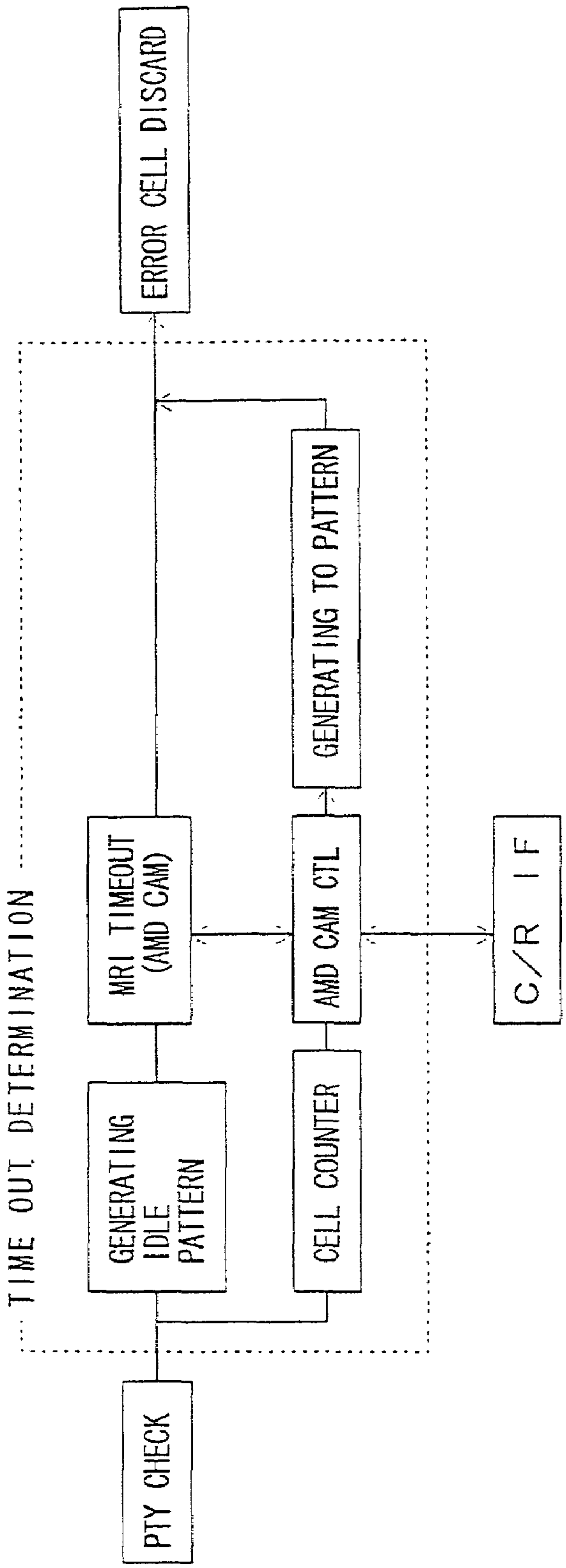

FIG. 649 is a block diagram showing the functions of the MRI timeout unit of the HMH10A.

Figure 650:
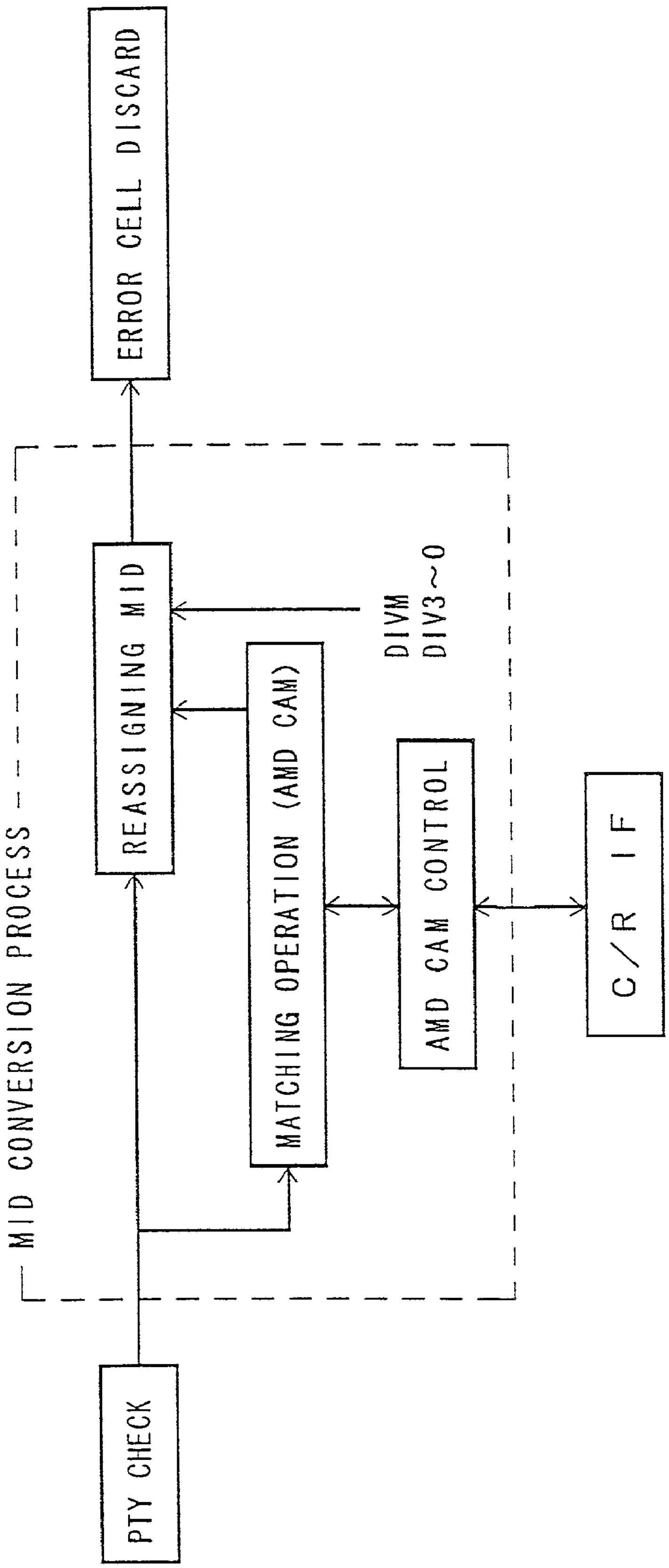

FIG. 650 is a block diagram showing the functions of the MID converting unit of the HMH10A.

Figure 651:
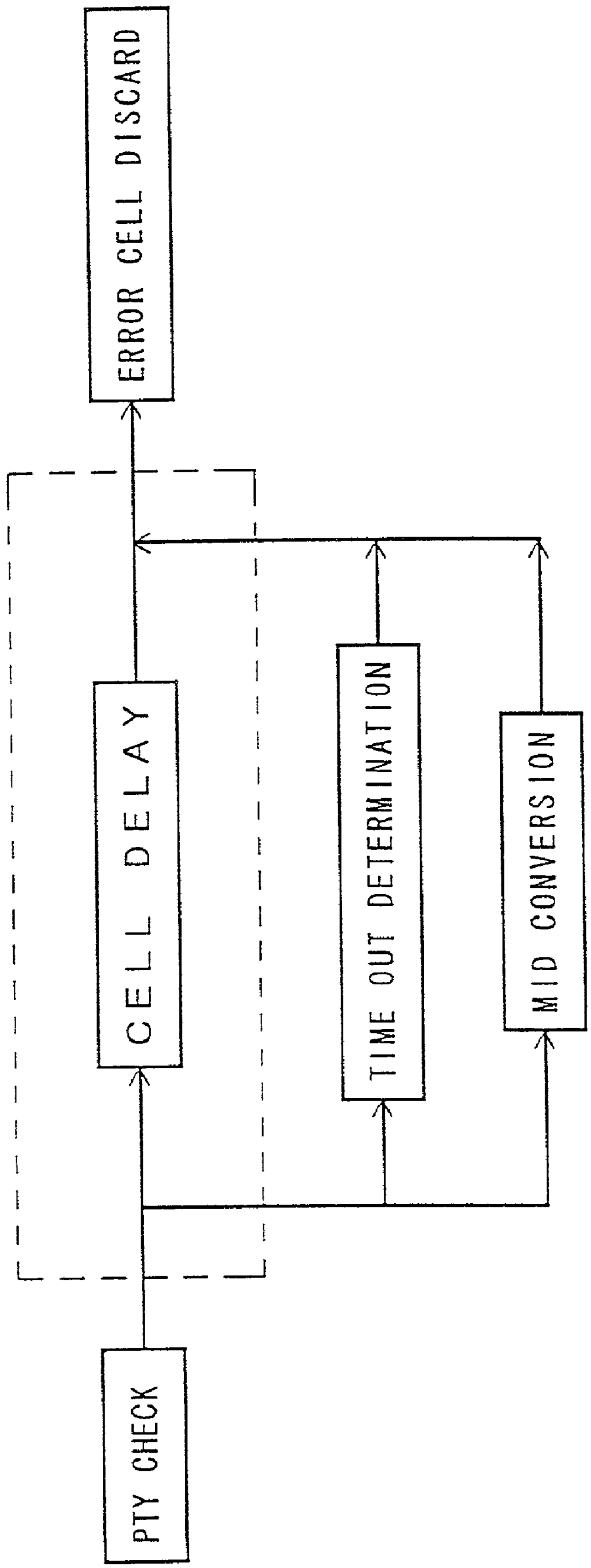

FIG. 651 is a block diagram showing the functions of the cell delay unit of the HMH10A.

Figure 652:
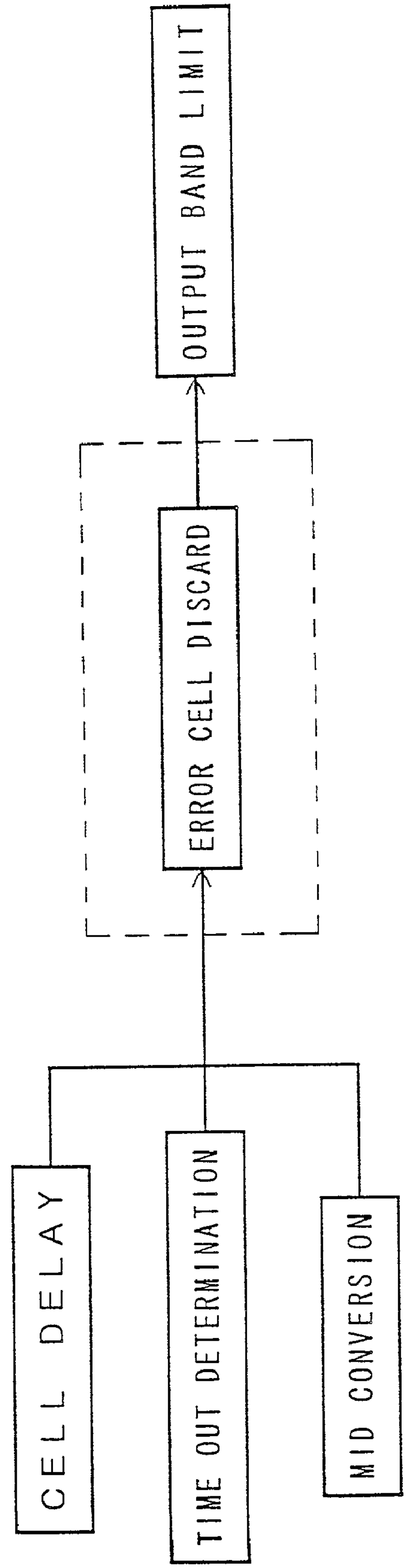

FIG. 652 is a block diagram showing the functions of the error cell discard unit of the HMH10A.

Figure 653:
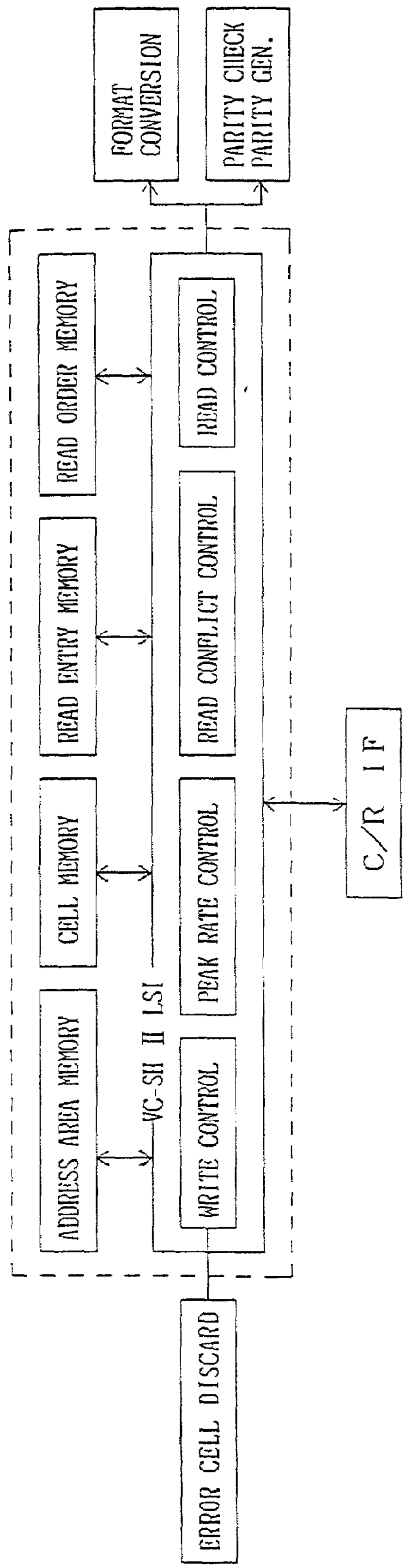

FIG. 653 is a block diagram showing the functions of the output band control unit of the HMH10A.

Figure 654:
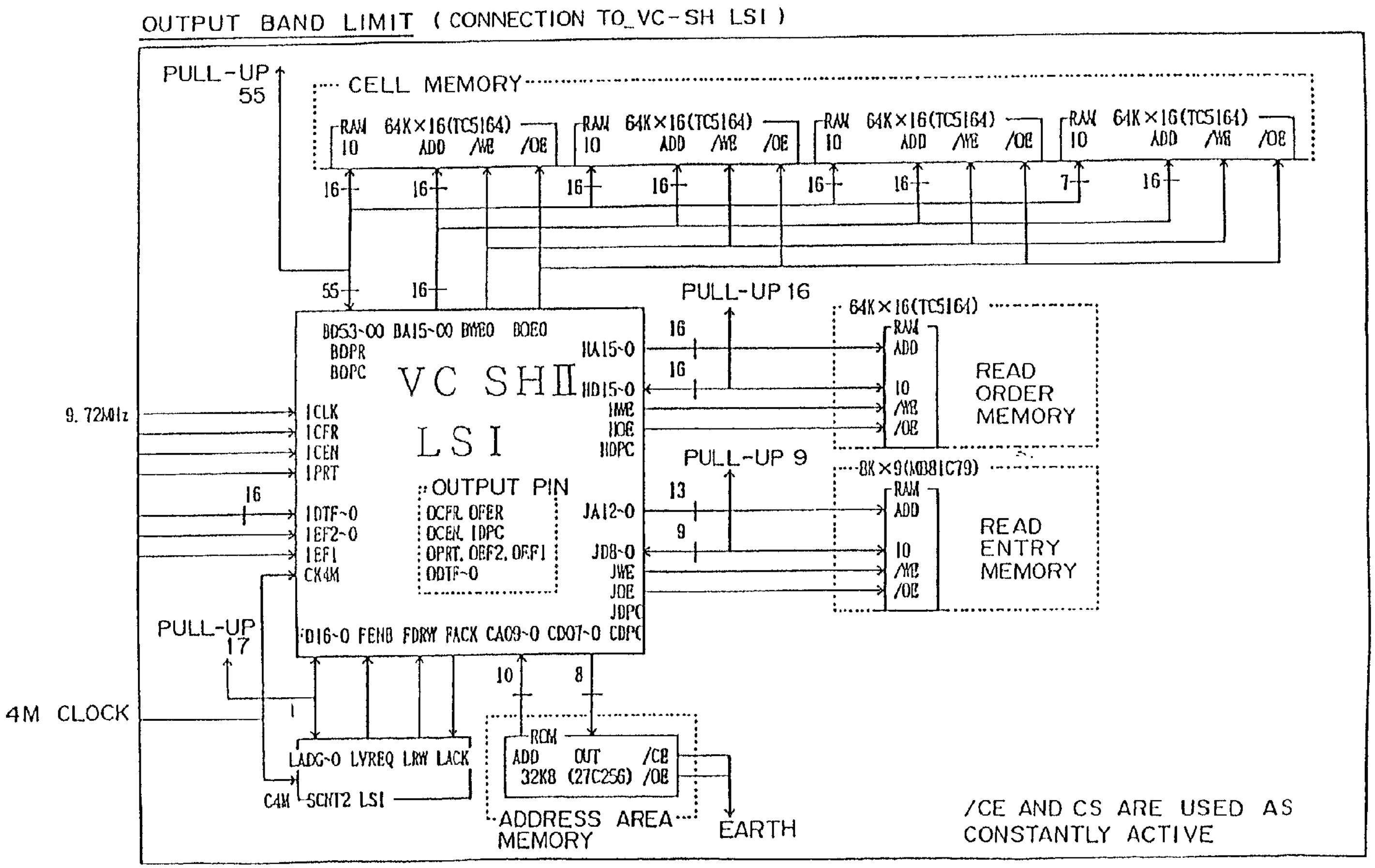

FIG. 654 shows the configuration of the curcuit of the VC-SH LSI for restricting the output band and the configuration of the circuits of the unit near the VC-SH LSI.

Figure 655:
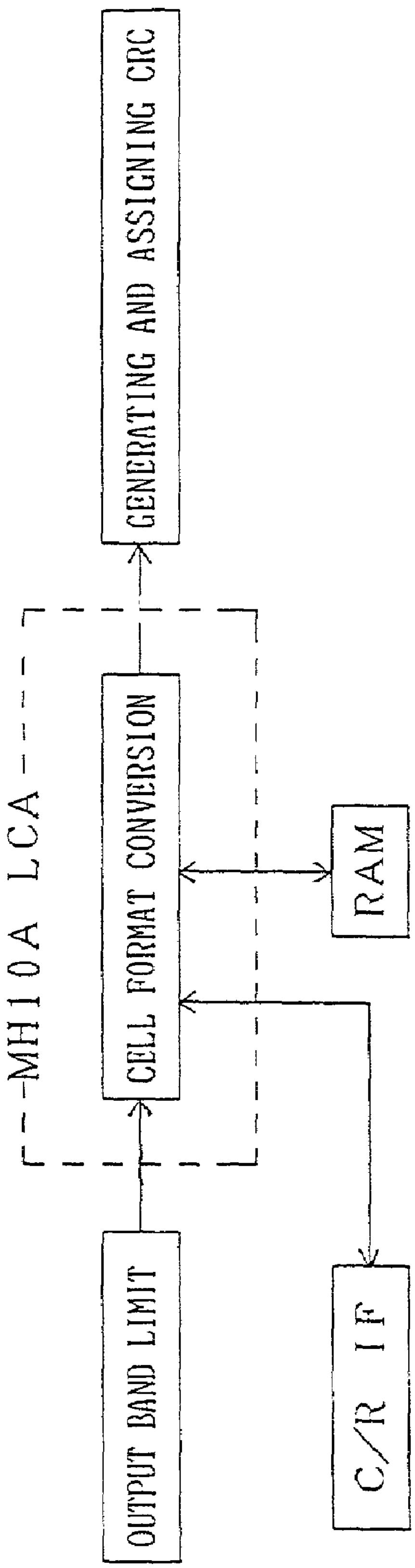

FIG. 655 is a block diagram showing the functions of the format converting unit of the HMH10A FIG. 656 shows the process performed by the converting unit.

Figure 657:
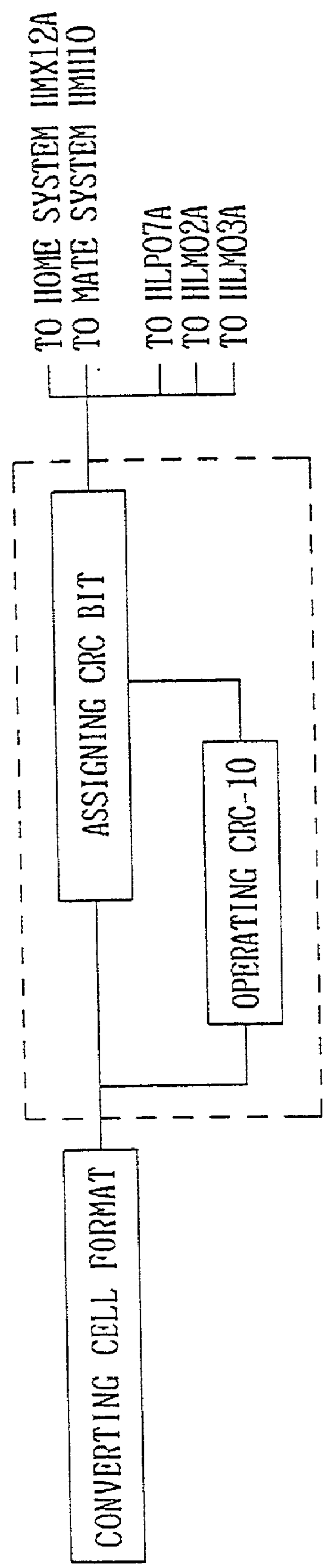

FIG. 657 is a block diagram showing the functions of the CRC-10 generating any assigning unit of the HMH10A.

Figure 658:
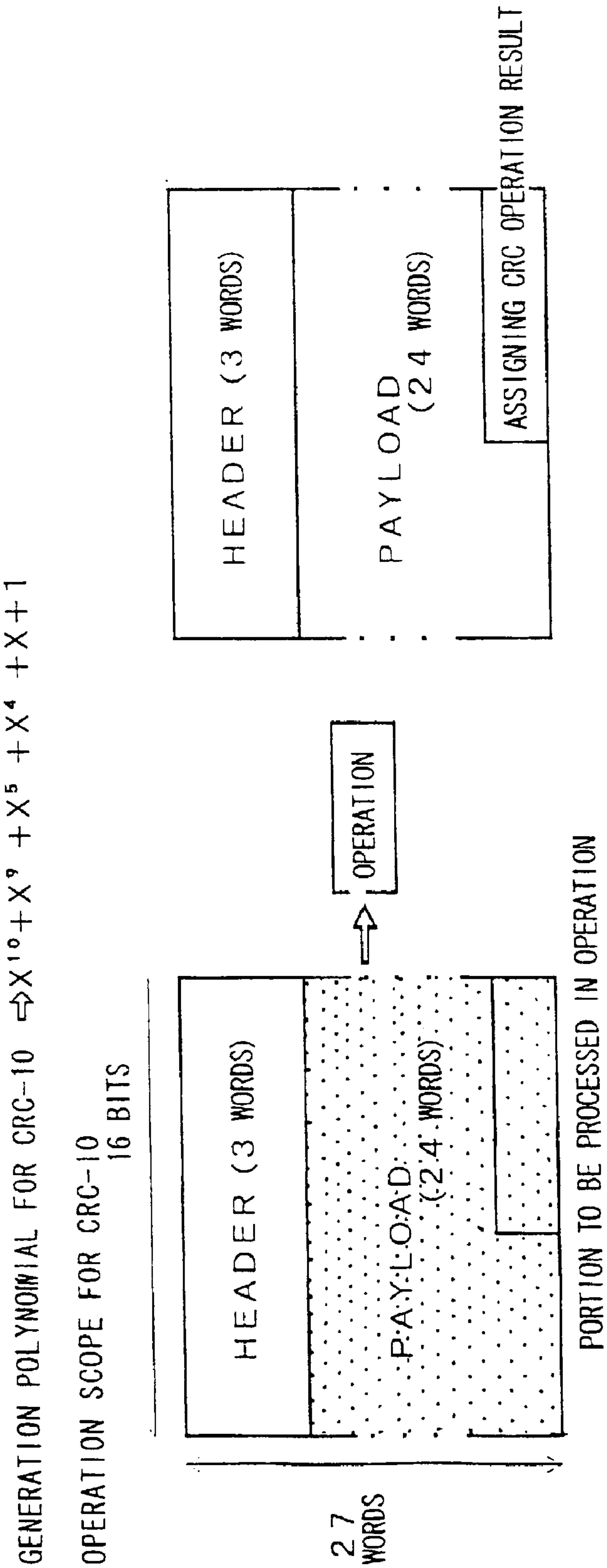

FIG. 658 shows the operation of the CRC-10.

Figure 659:
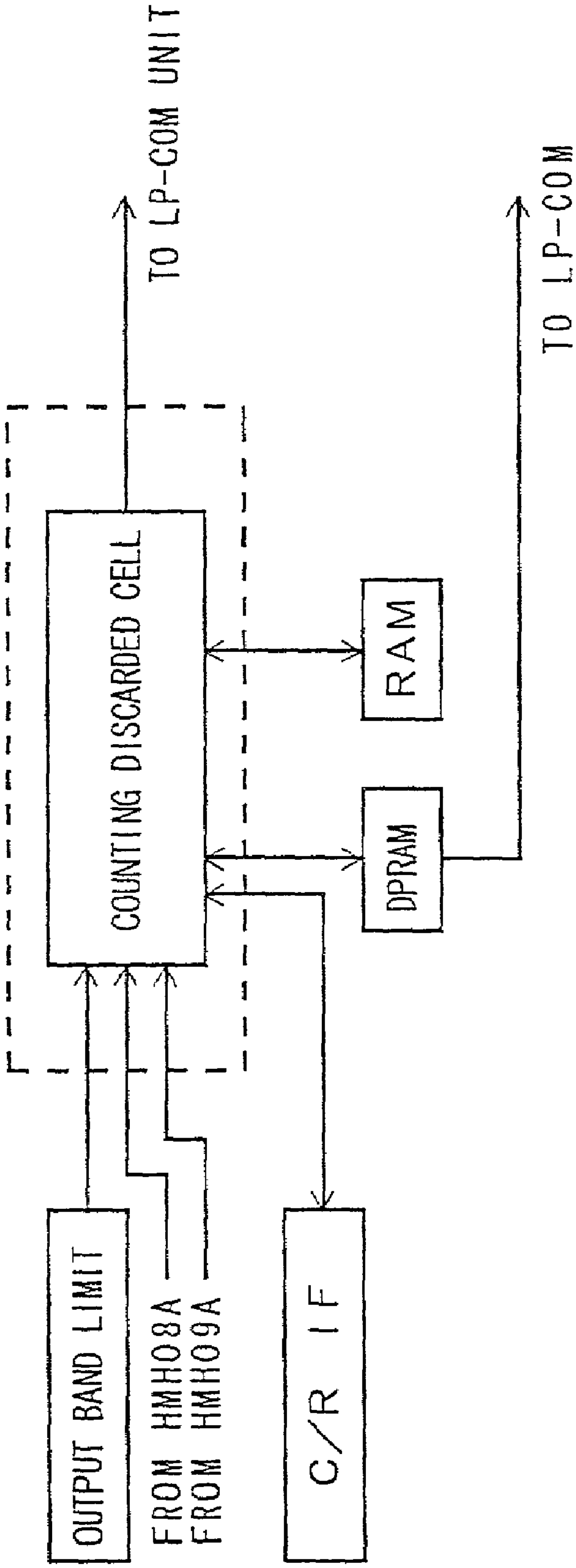

FIG. 659 is a block diagram showing the functions of the discard count unit of the HMH10A.

Figure 660:
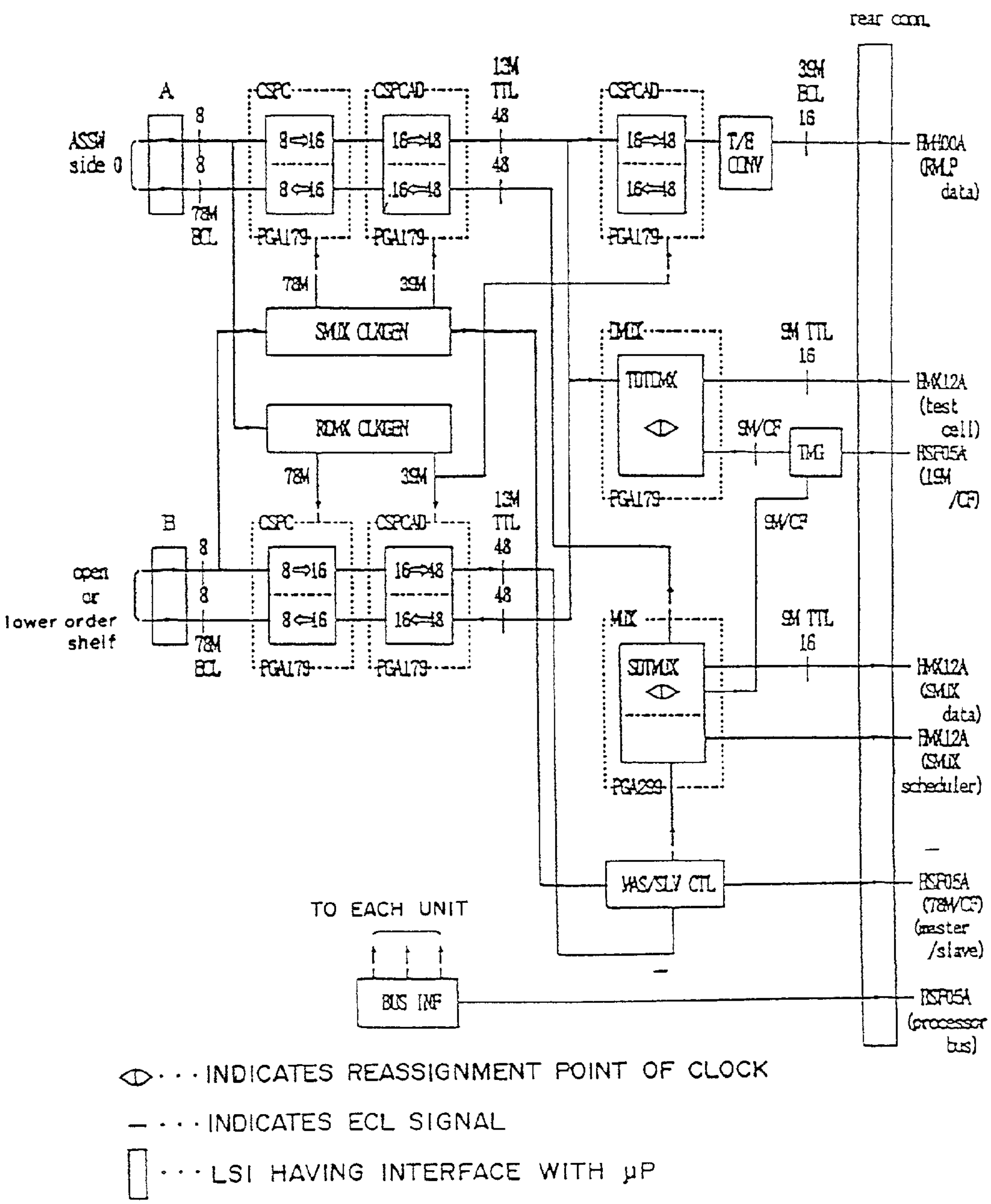

FIG. 660 is a block diagram of the HMX10A (EDMX/SMUX).

Figure 661:
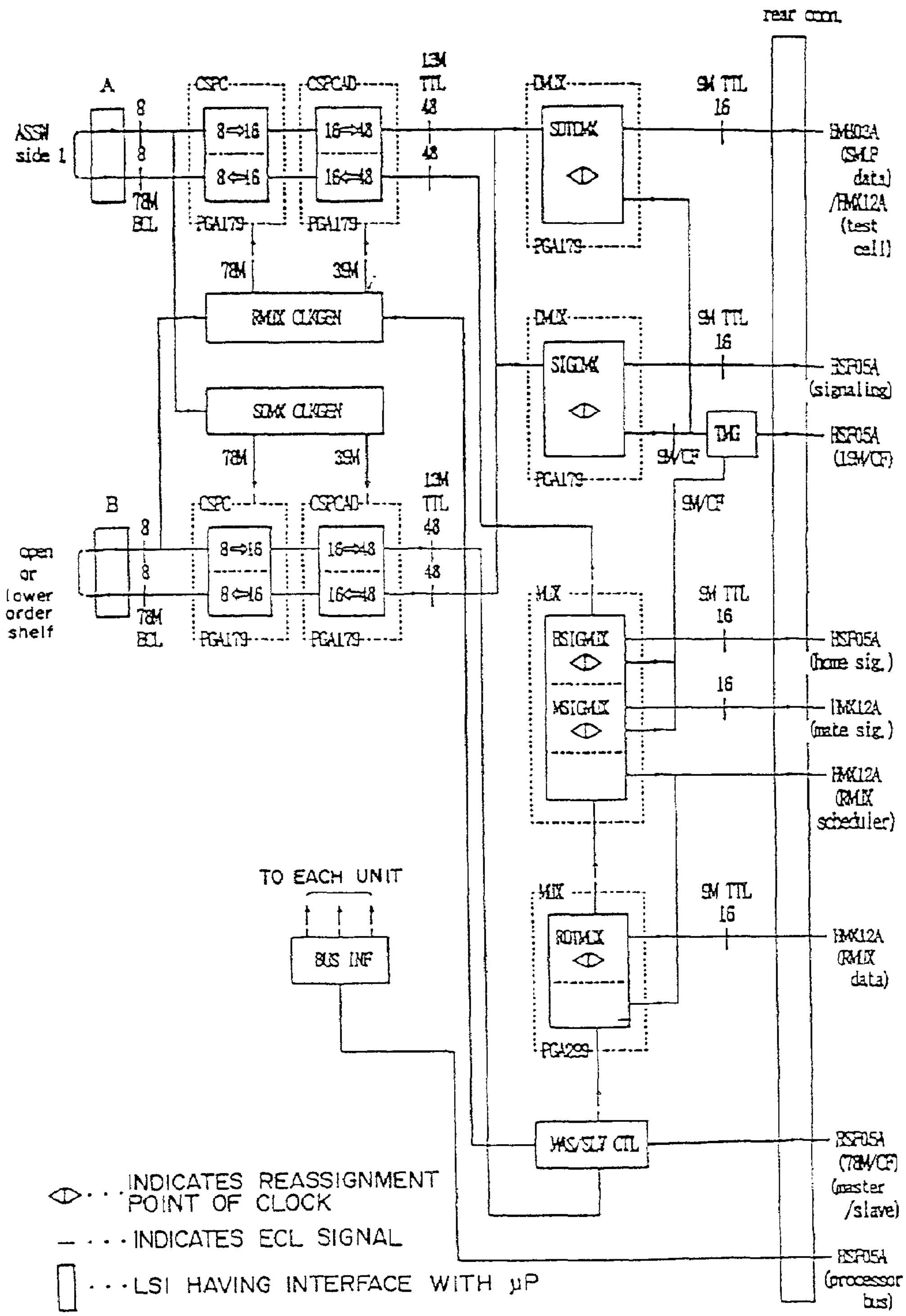

FIG. 661 is a block diagram of the HMX11A (SDMX/RMUX).

Figure 662:
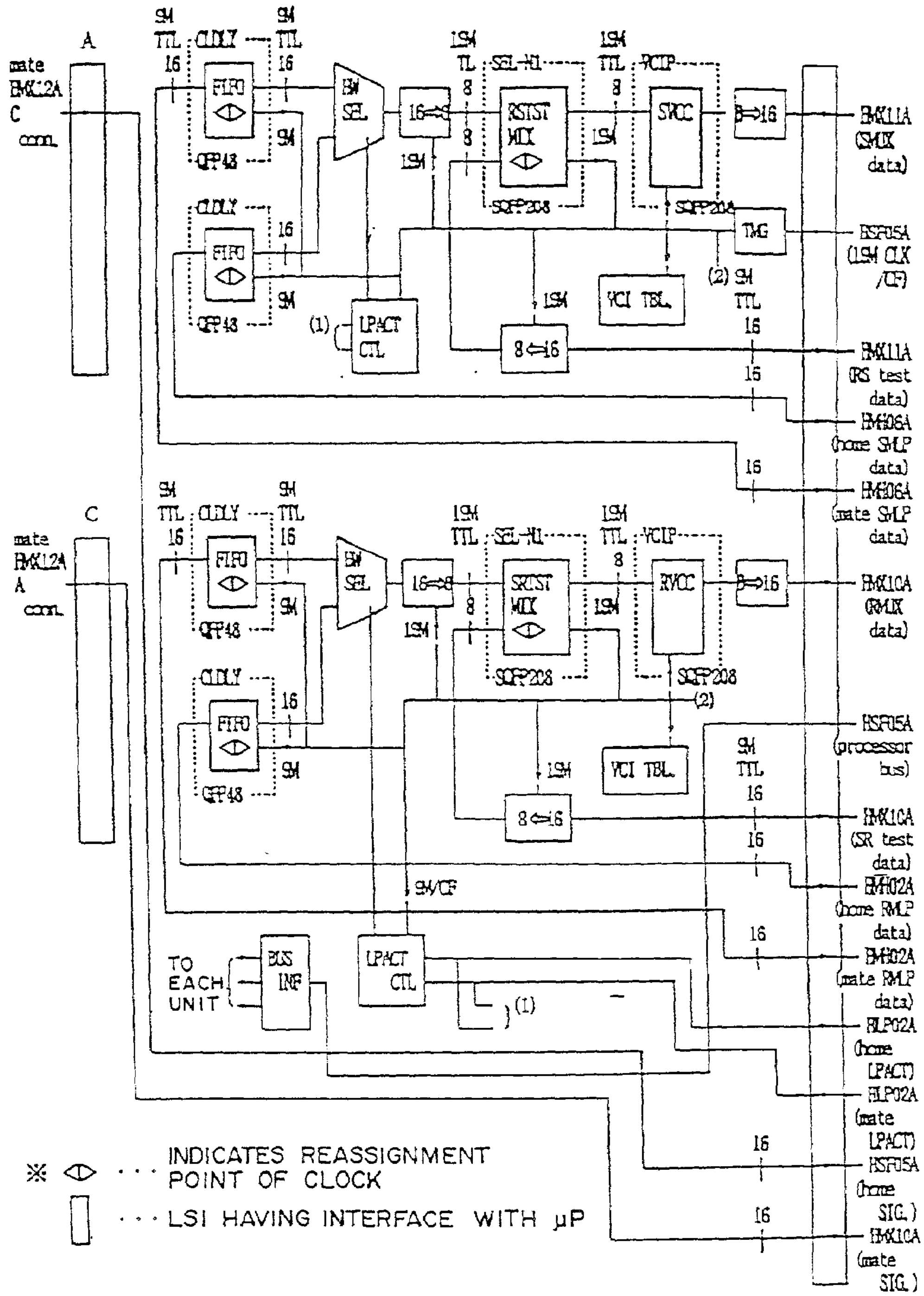

FIG. 662 is a block diagram of the HMX12A (VCC unit).

FIG. 663 is a block diagram of the HMX12A (scheduler unit).

Figure 664:
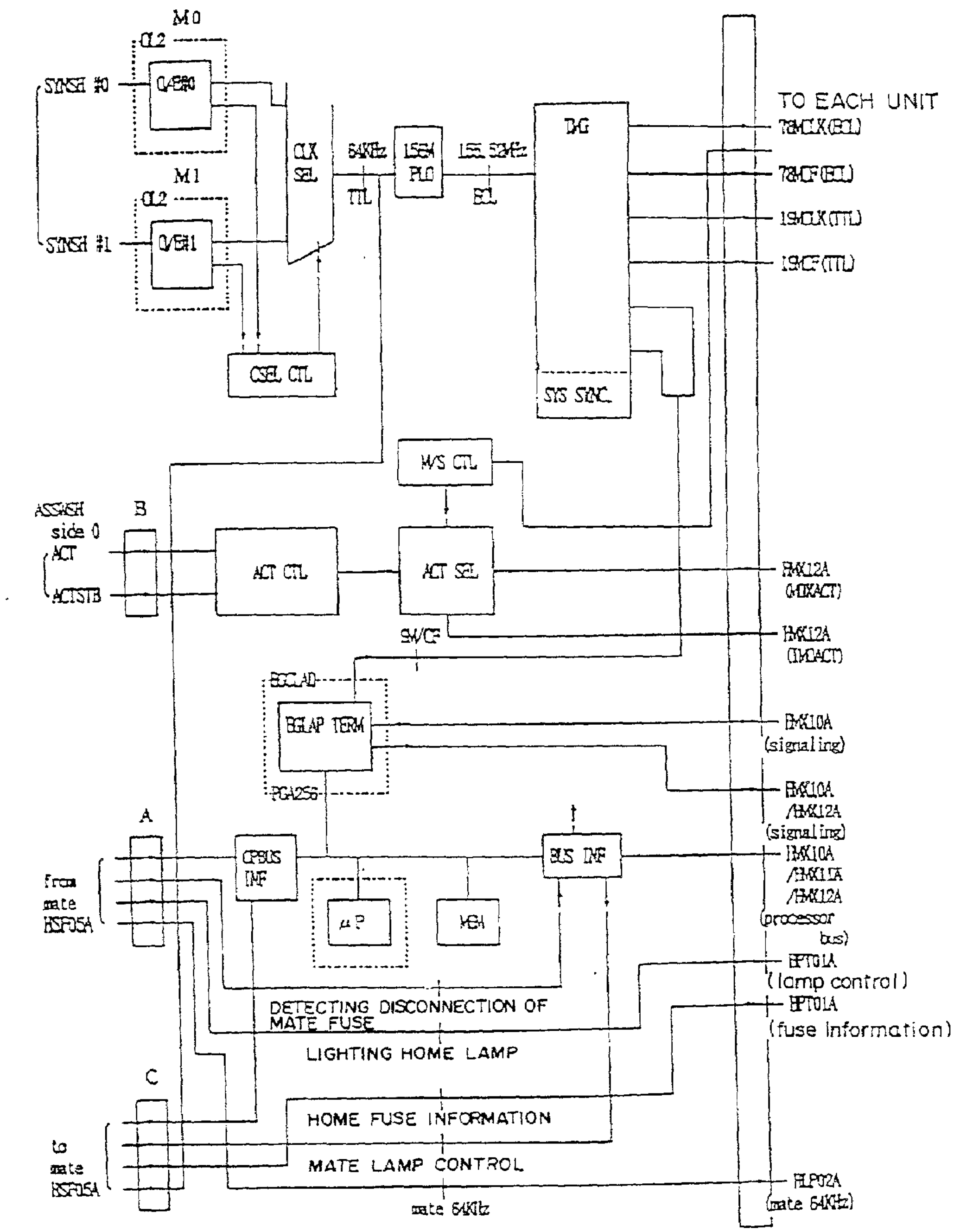

FIG. 664 is a block diagram of the HSF05A.

Figure 665:
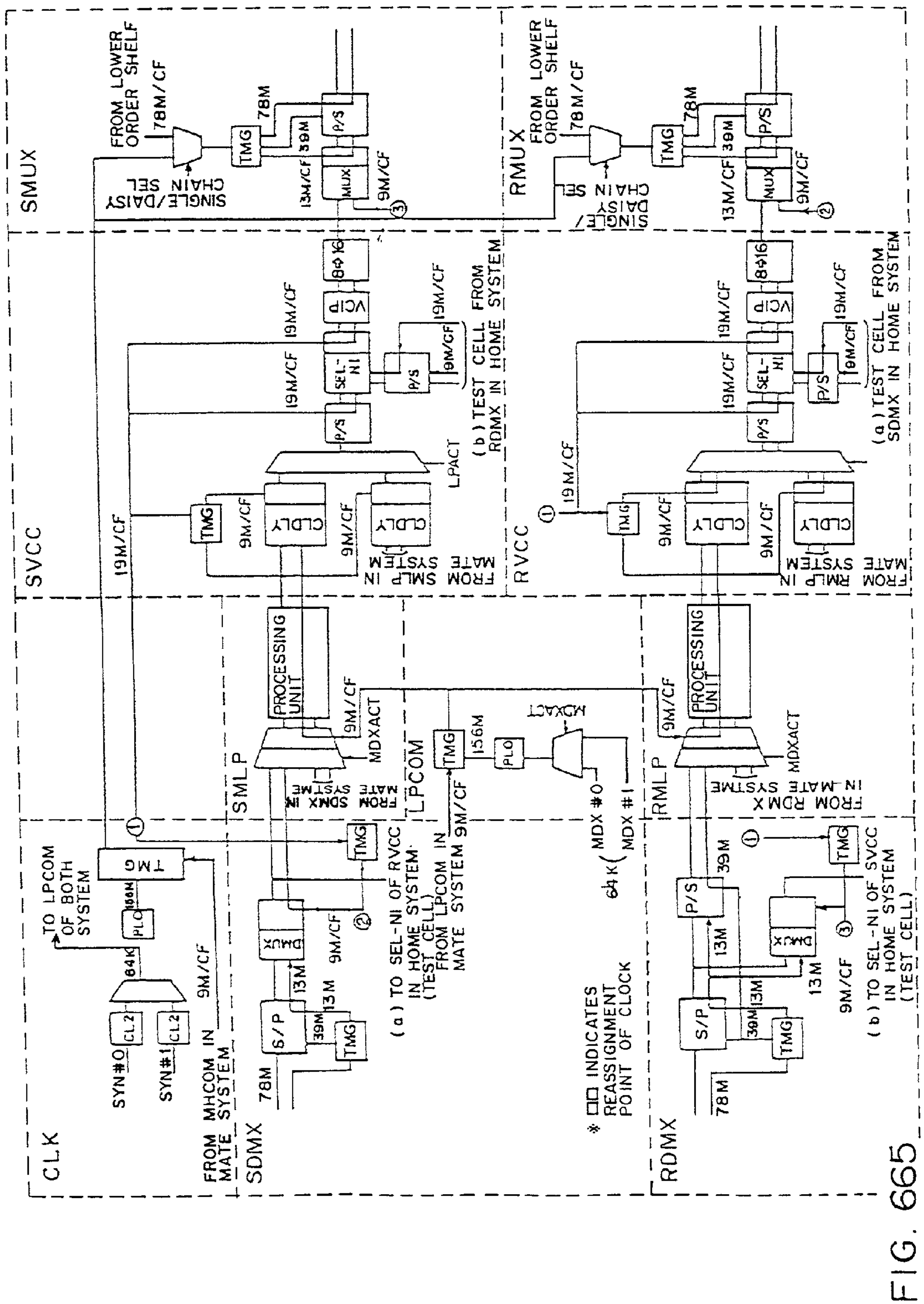

FIG. 665 shows the clock system of the SBMESH.

Figure 666:
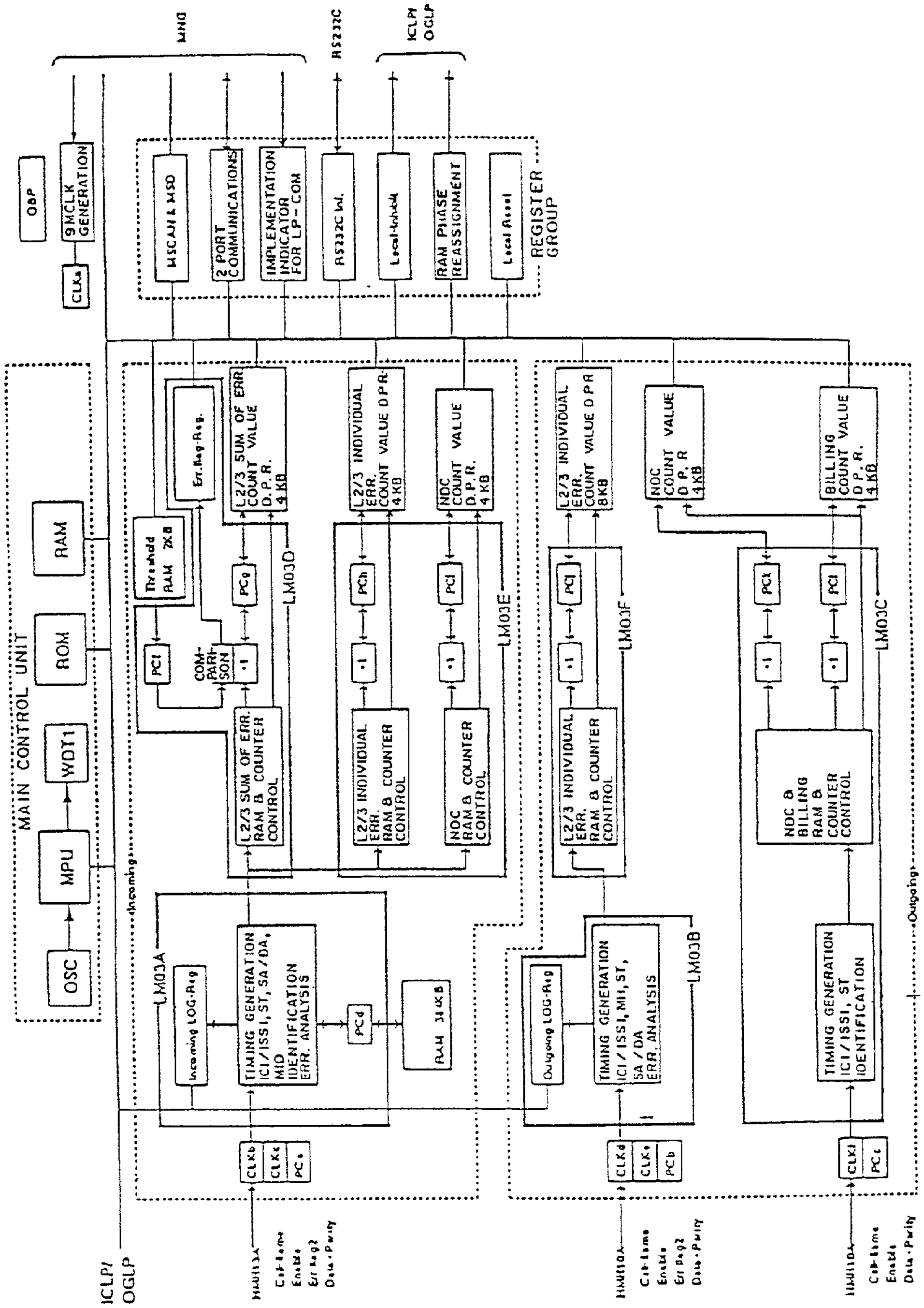

FIG. 666 is a block diagram showing the functions of the HLM03A.

FIG. 667 shows the functions (1) of each block of the HLM03A.

FIG. 668 shows the functions (2) of each block of the HLM03A.

FIG. 669 shows the check made in the HLM03A.

FIG. 670 shows the conditions under which the checks are made in the HLM03A.

FIG. 671 shows the check items of the performance protocol monitor in the incoming unit and the process performed when an error occurs.

Figure 672:
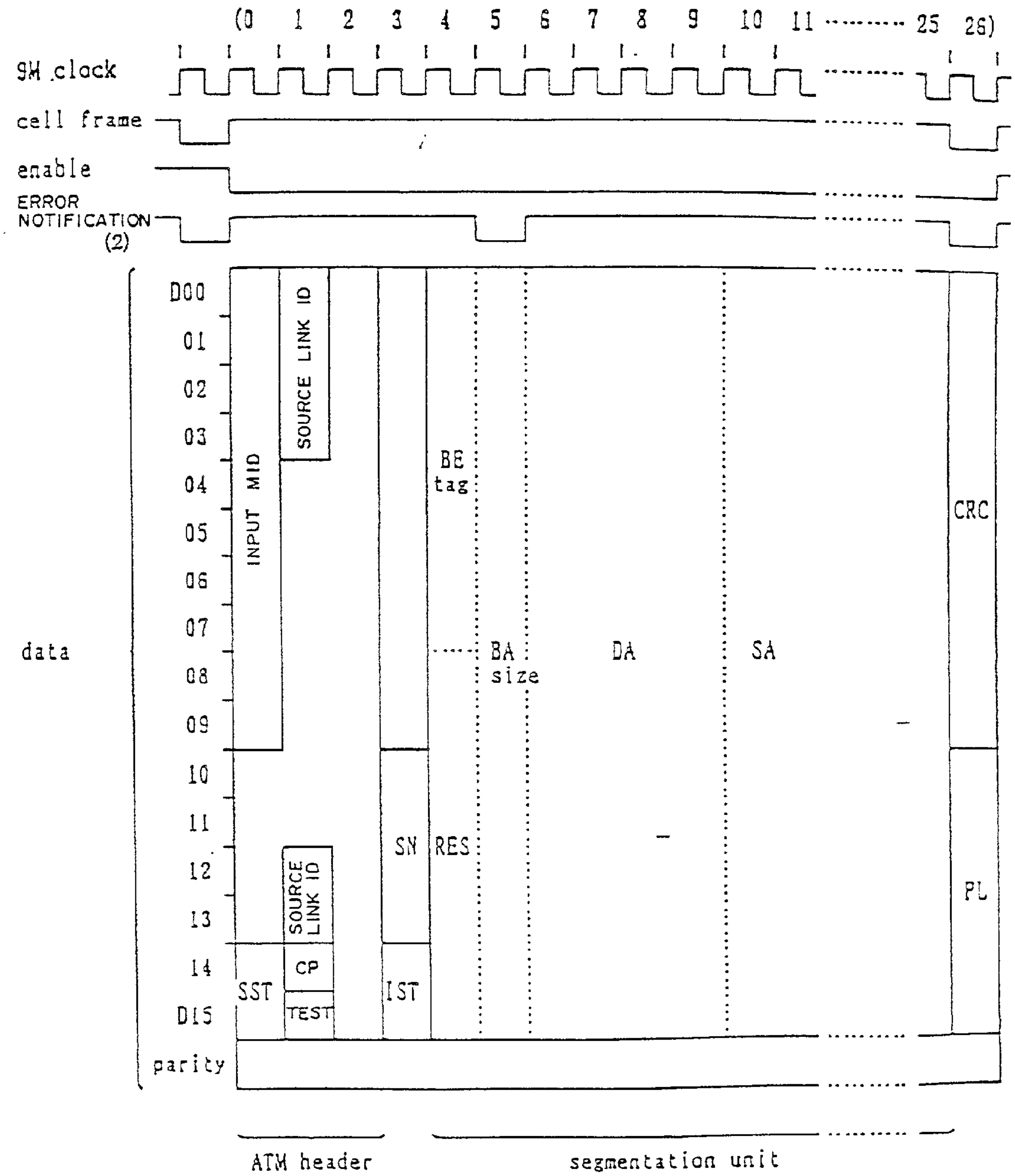

FIG. 672 is a time chart relating to the error notification in the incoming unit.

FIG. 673 shows each signal on the time chart shown in FIG. 672.

FIG. 674 shows the identification of segment types.

Figure 675:
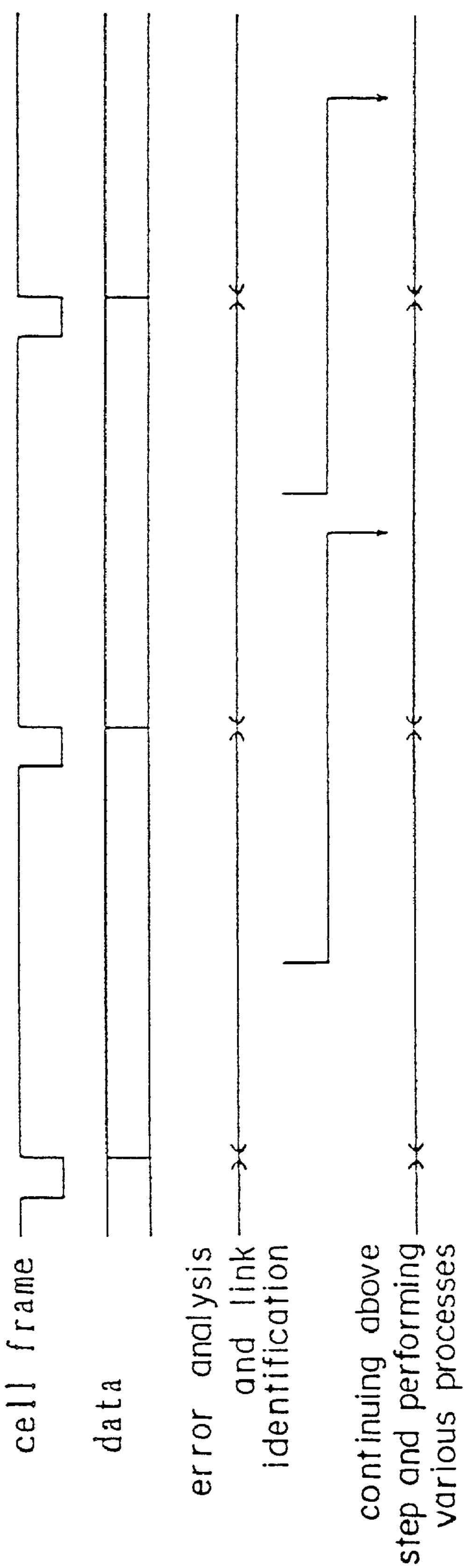

FIG. 675 is a time chart showing the process of an error analysis block.

FIG. 676 shows the check items of the performance protocol monitor in the outgoing unit and the process performed when an error occurs.

Figure 677:
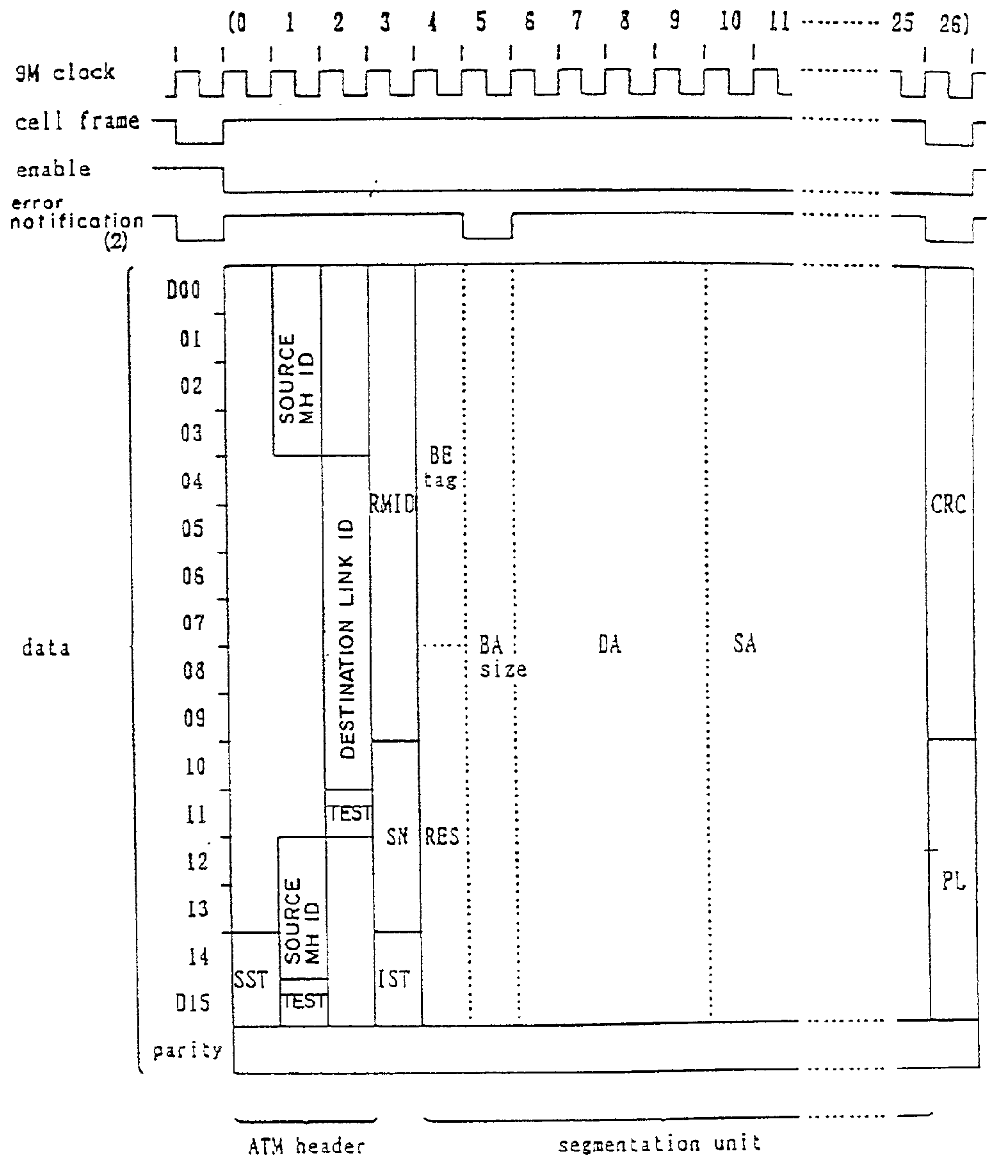

FIG. 677 is a time chart relating to the error notification in the outgoing unit.

Figure 678:
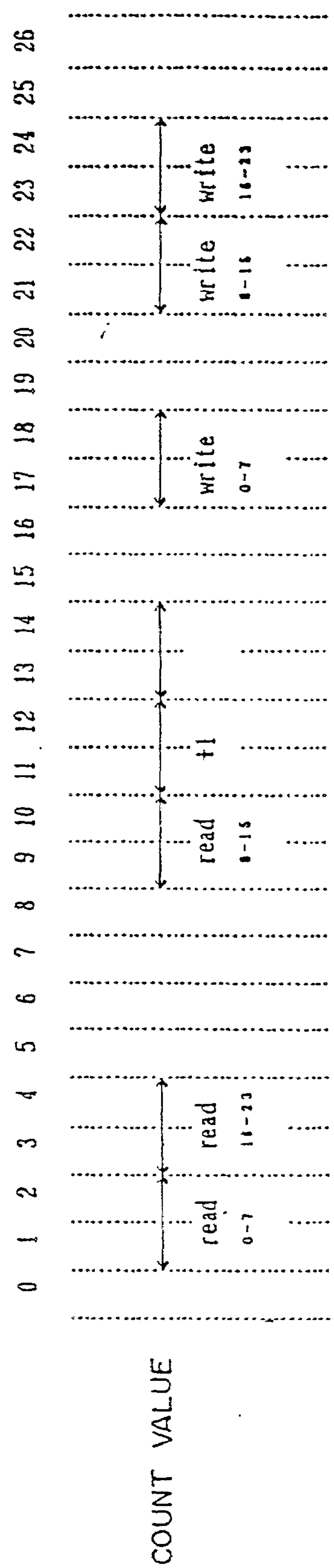

FIG. 678 is a time chart showing the L2/3 individual error count process in the outgoing unit.

Figure 679:
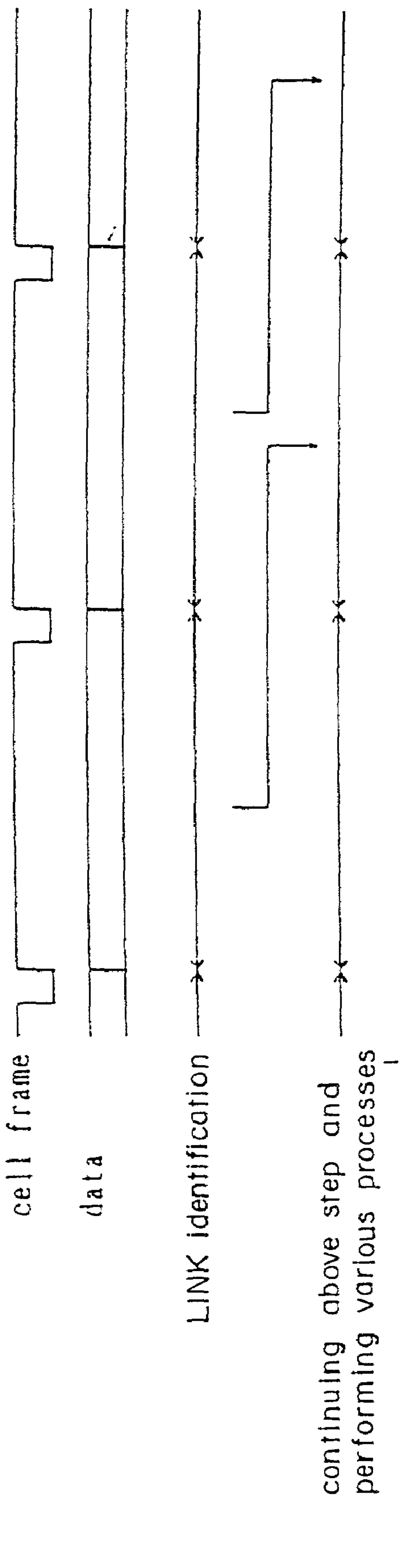

FIG. 679 is a time chart relating to the network data collection in the incoming unit.

Figure 680:
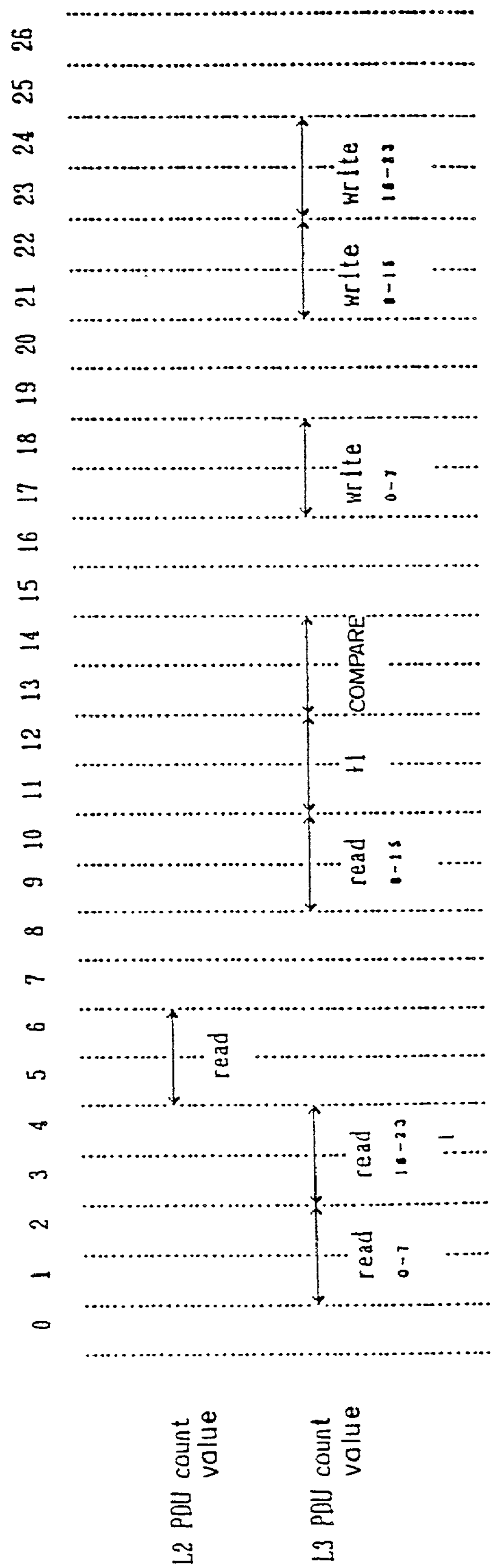

FIG. 680 is a time chart showing the count value read/write relating to the network data collection in the incoming unit of the GWMESH.

Figure 681:
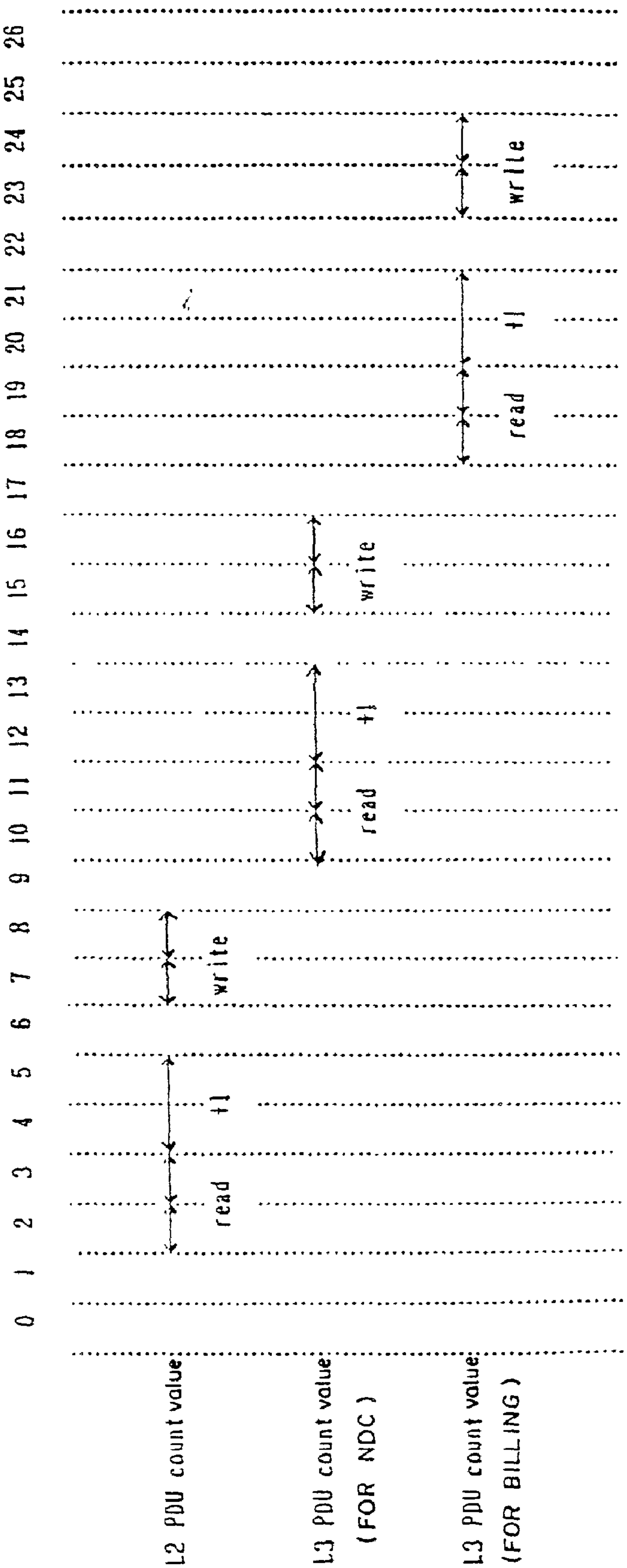

FIG. 681 is a time chart showing the count value read/write relating to the network data collection in the outgoing unit of the GWMESH.

FIG. 682 shows the classification and procedure of the billing functions.

Figure 683:
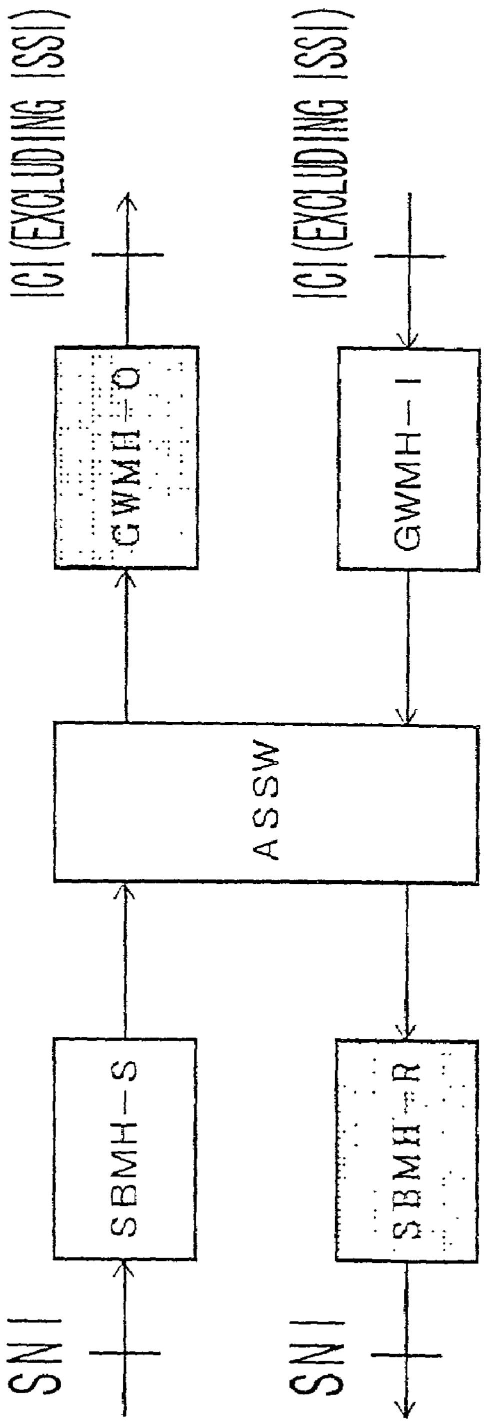

FIG. 683 shows the configuration and billing point of the switching system.

FIG. 684 shows the usage information generated in the LEC network relating to the SMDS between carriers.

FIG. 685 shows the SA, DA (SIP), DA (ICIP), and compressed carrier information memory of the billing unit of the GWMESH.

Figure 686:
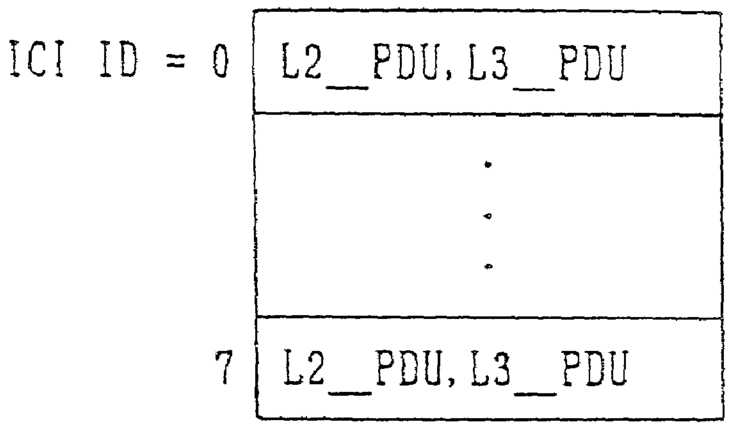

FIG. 686 shows the simplified billing memory.

Figure 687:
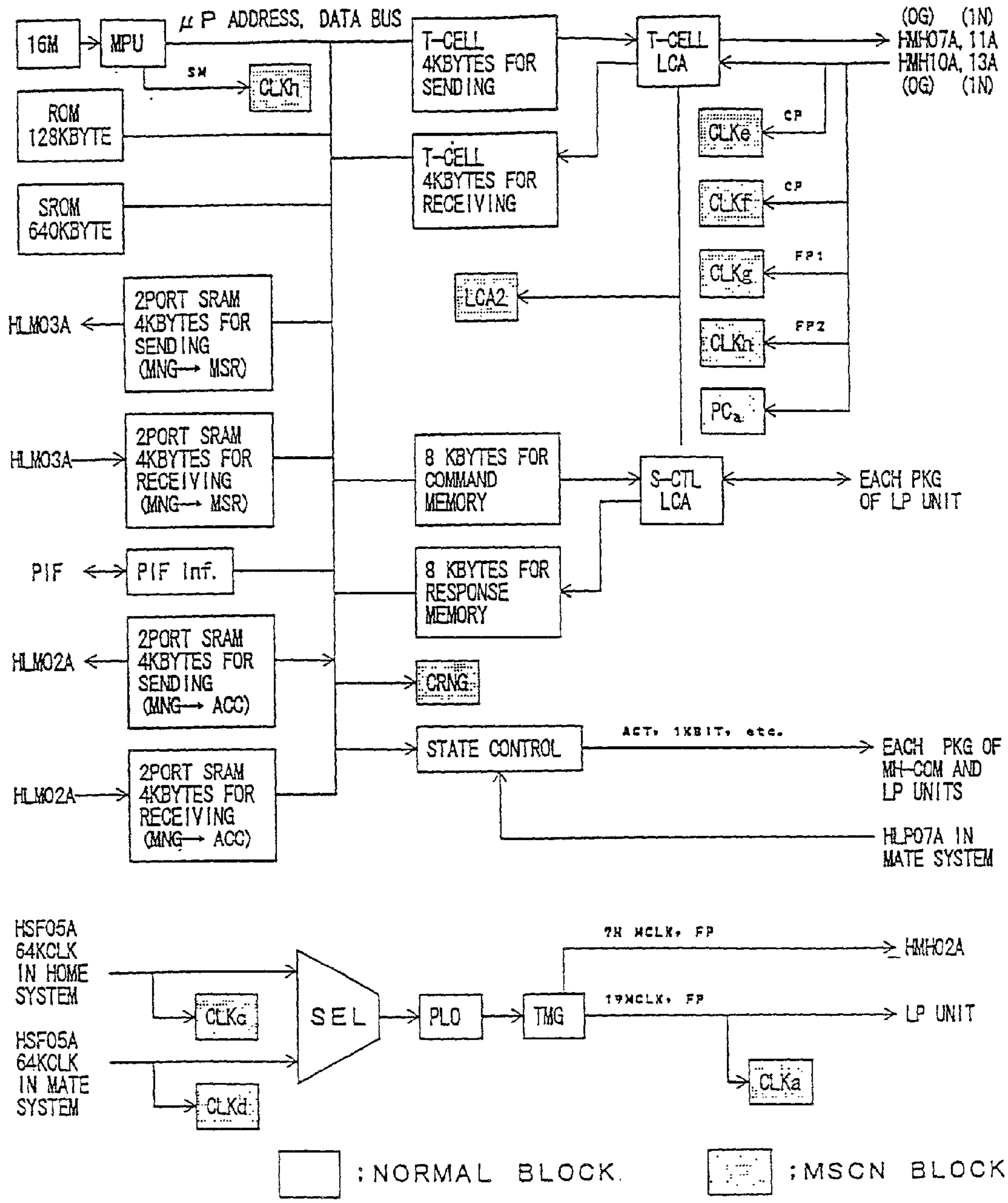

FIG. 687 is a block diagram showing the functions of the HLP07A.

FIG. 688 shows the functions (1) of each block of the HLP07A.

FIG. 689 shows the functions (2) of each block of the HLP07A.

FIG. 690 shows the VPI/VCI of the intra-station communications cell.

FIG. 691 shows the operations performed when a fault is monitored in the MH-COM unit.

FIG. 692 shows the information in the header field of the cell output from the test cell generator TCG.

FIG. 693 shows an example (1) of a loopback test conducted using the test cell output from the test cell generator TCG.

FIG. 694 shows an example (2) of a loopback test conducted using the test cell output from the test cell generator TCG.

Figure 695:
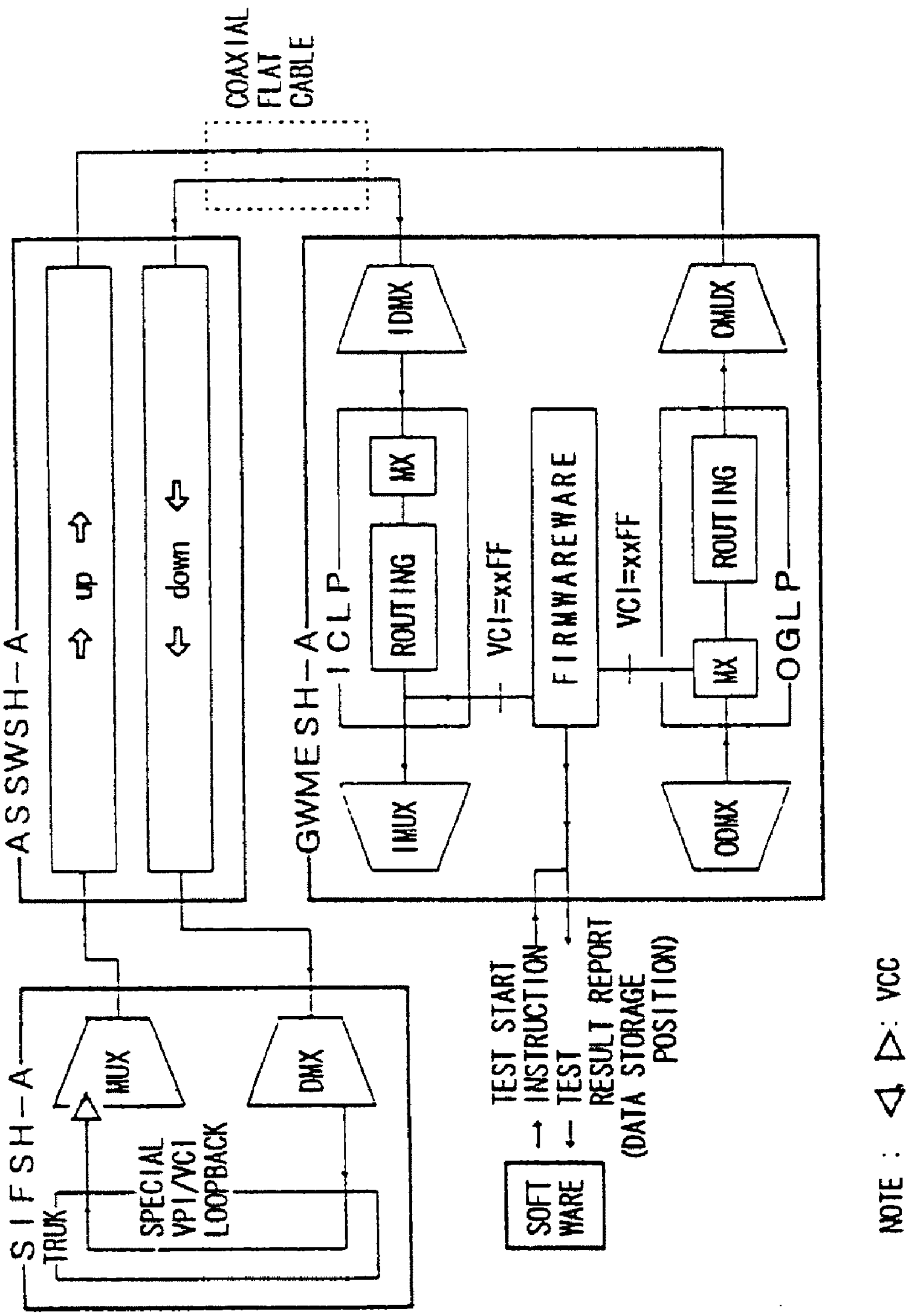

FIG. 695 shows the PVC test between the ICI/ISSI and GWMESH.

FIG. 696 shows the PVC test between the GWMESH and GWMESH/SBMESH.

FIG. 697 shows the PVC test between stations.

Figure 698:
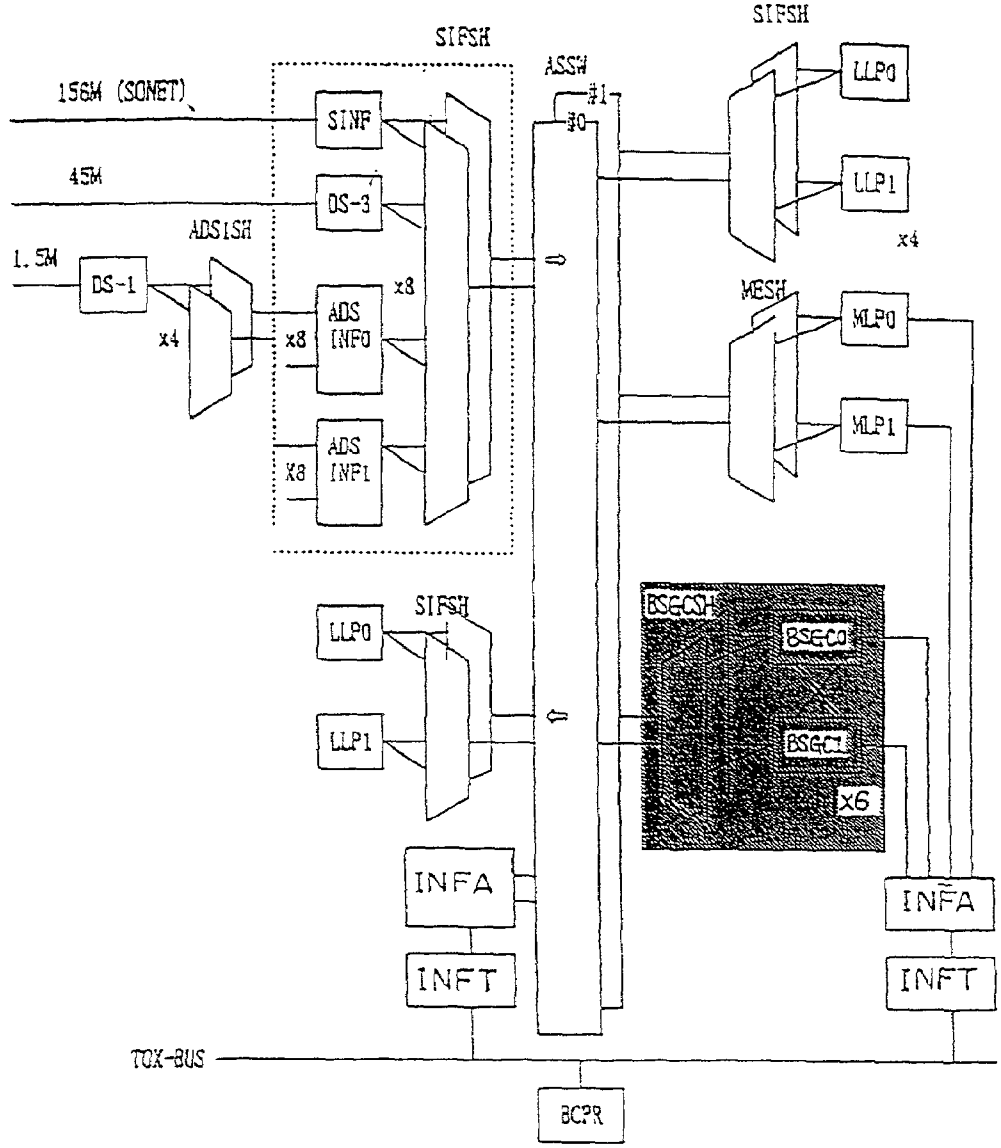

FIG. 698 shows the position of the BSGCSH and BSGC in the switching system according to the present invention.

Figure 699:
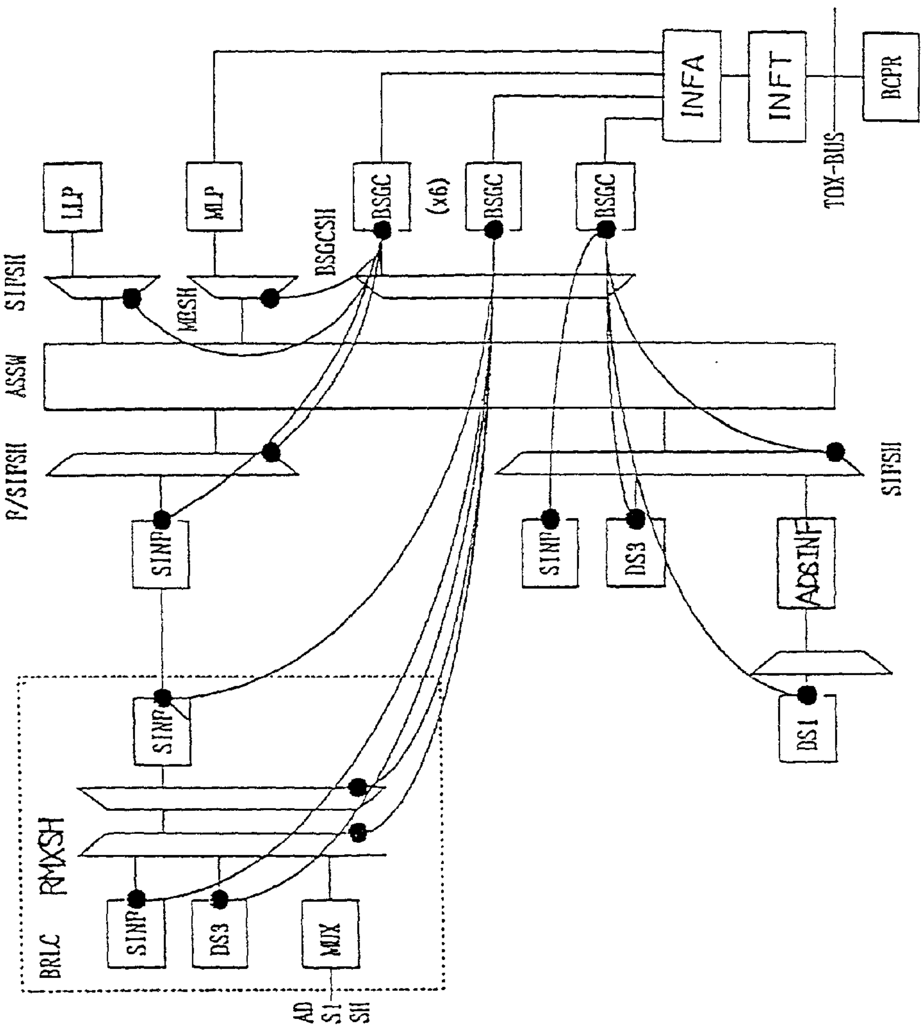

FIG. 699 shows the terminal point of the intra-station LAPD communications.

Figure 700:
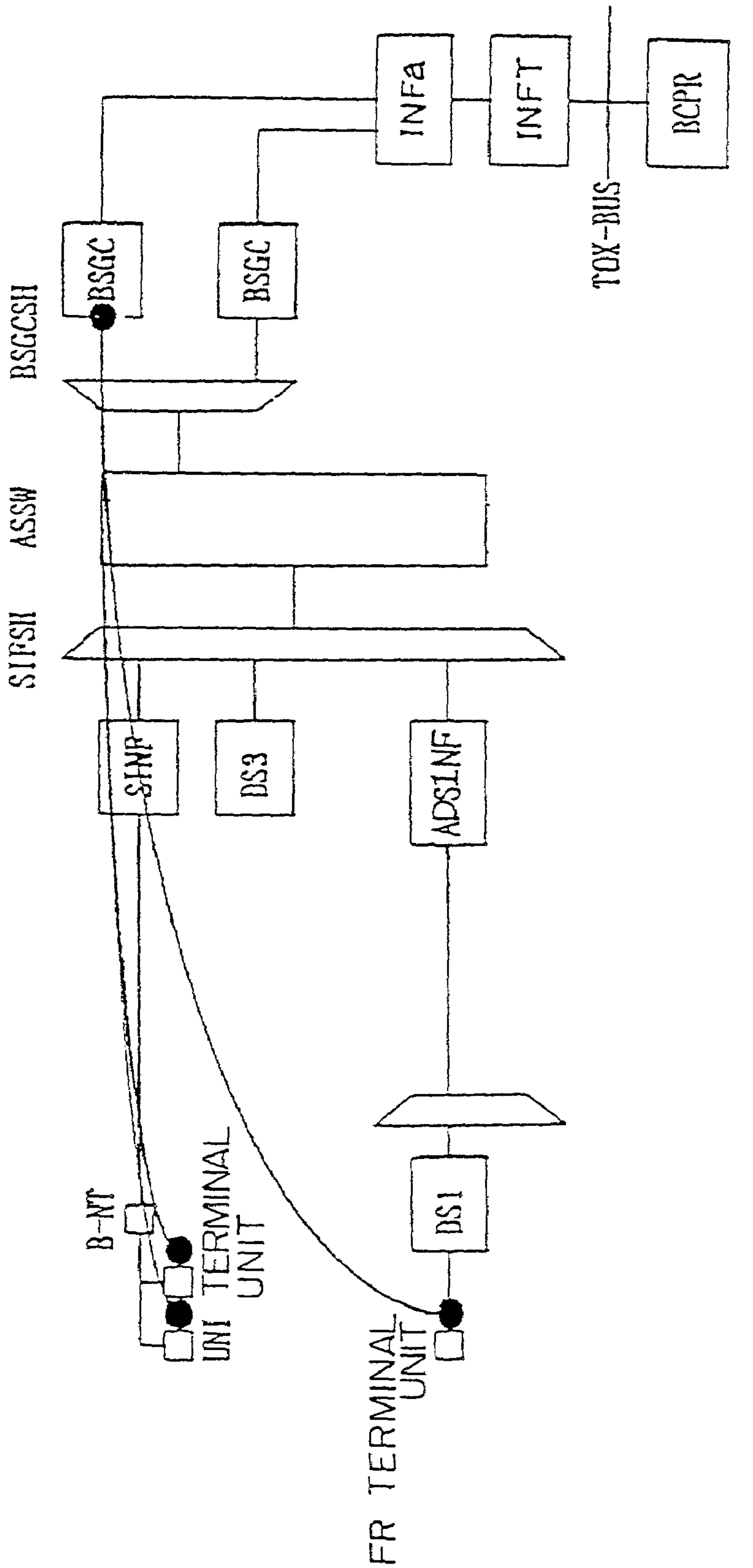

FIG. 700 shows the terminal point of the subscriber LAPD communications.

FIG. 701 shows the outline of the functions of the BSGCSH.

Figure 702:
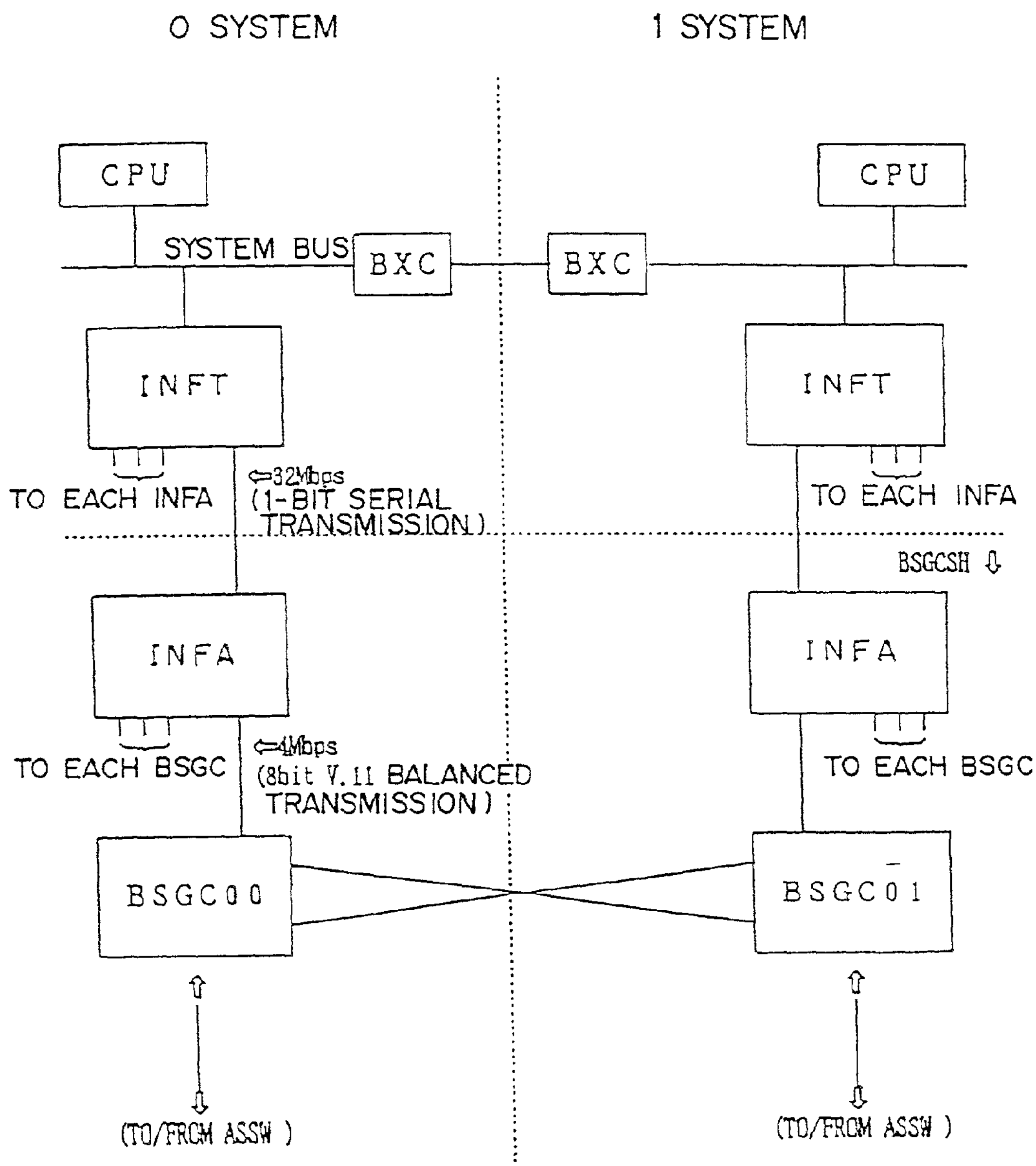

FIG. 702 shows the connection of the hardware between the BCPR-INF-BSGC.

Figure 703:
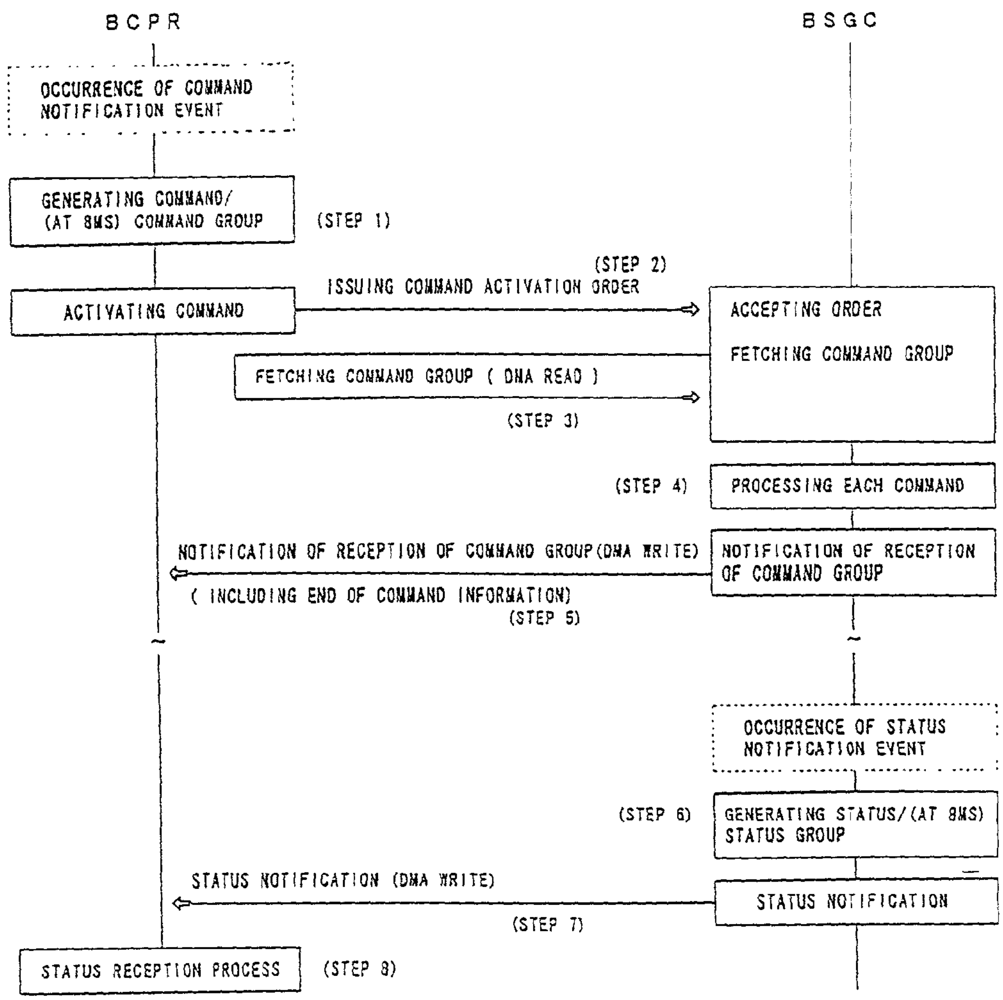

FIG. 703 shows the control sequence between the BSGC and BCPR.

Figure 704:
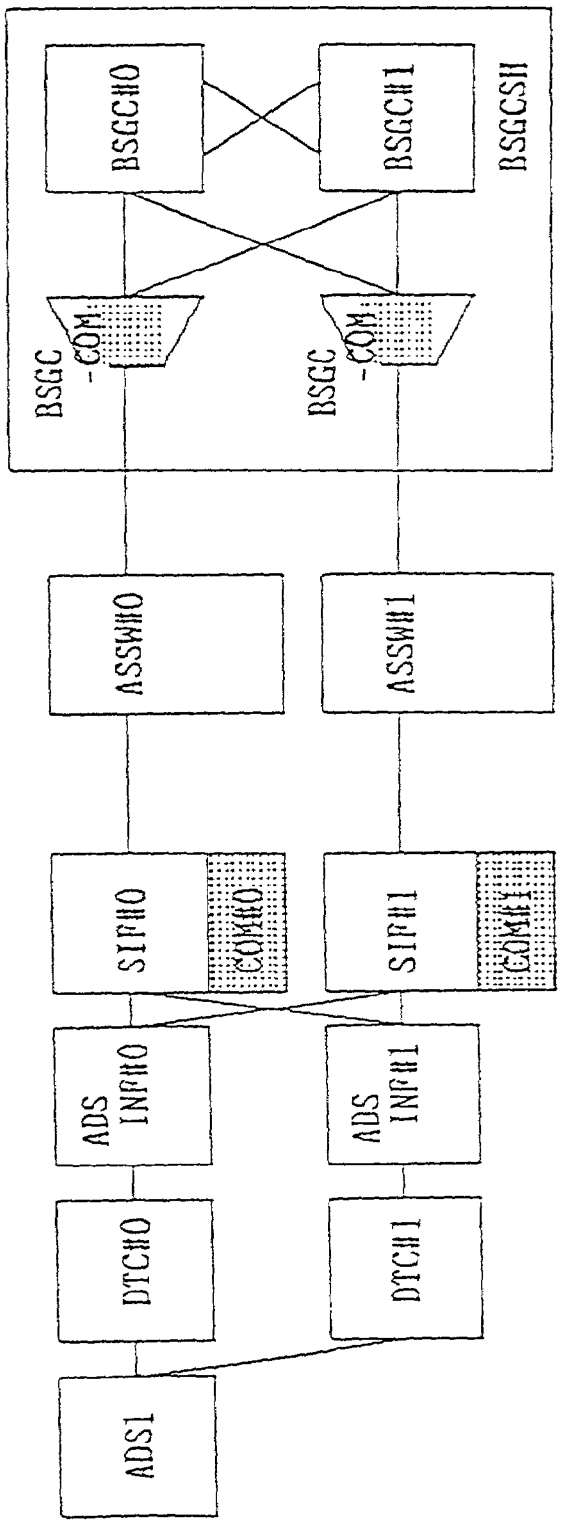

FIG. 704 shows the configuration of the intra-switch duplex device control hardware.

Figure 705:
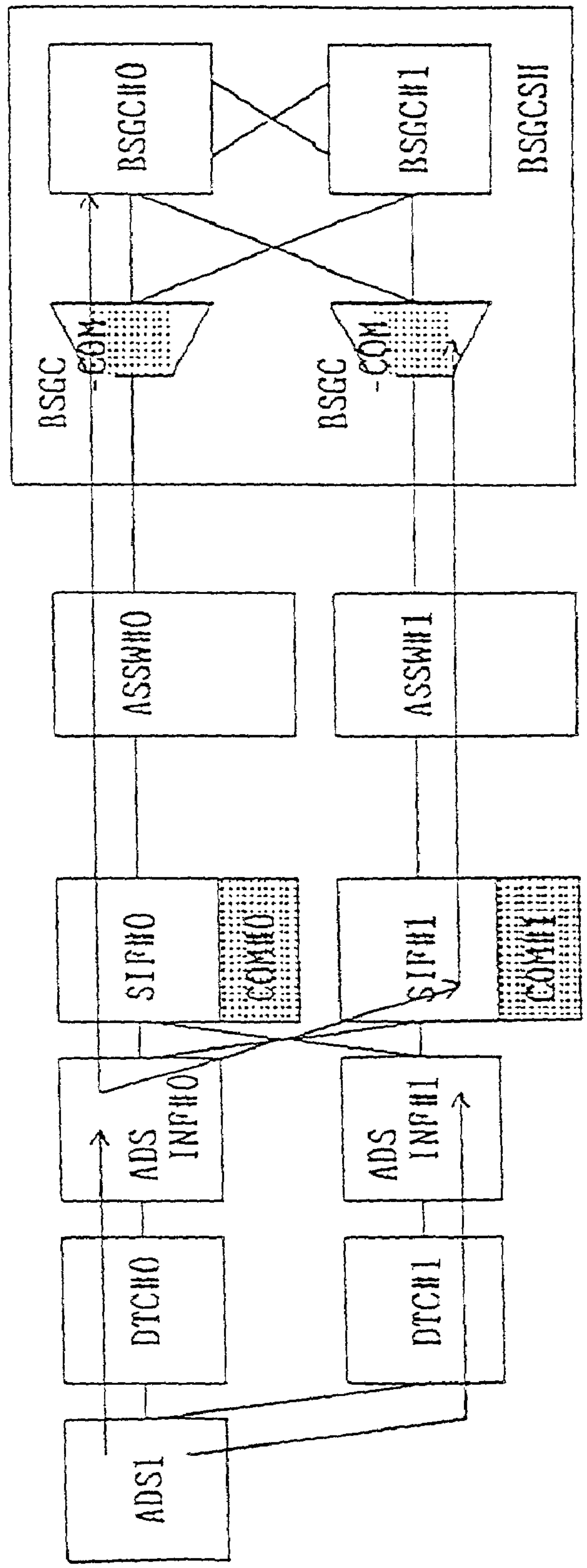

FIG. 705 shows the control model for the signaling signal transmitted from the terminal unit to the switch.

Figure 706:
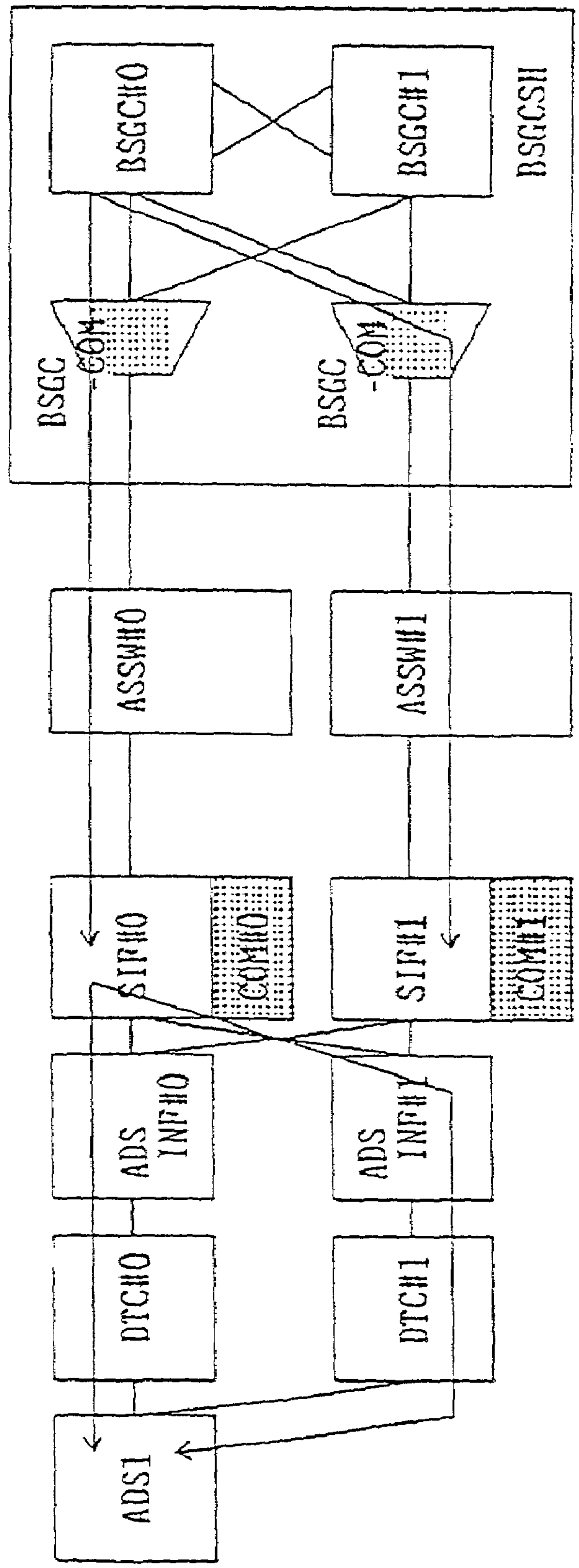

FIG. 706 shows the control model of the signaling signal transmitted from the switch to the terminal unit.

Figure 707:
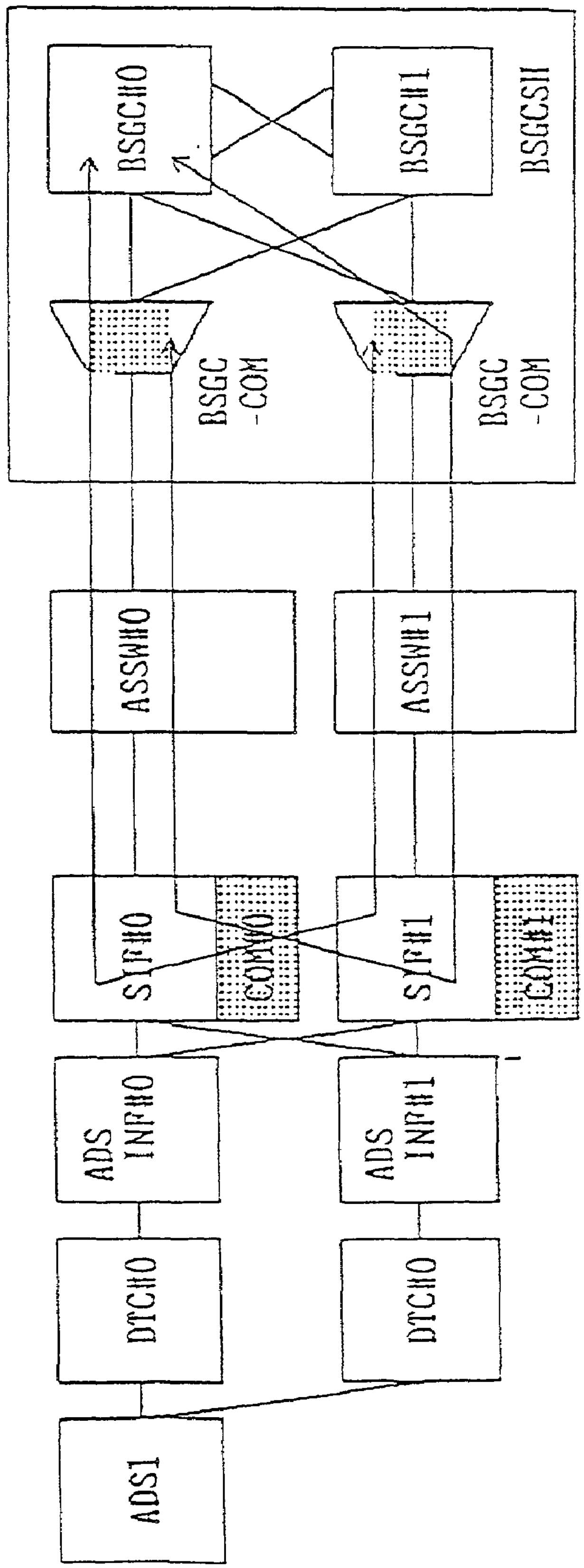

FIG. 707 shows the control model of the duplex device signal transmitted from the terminal unit to the switch.

Figure 708:
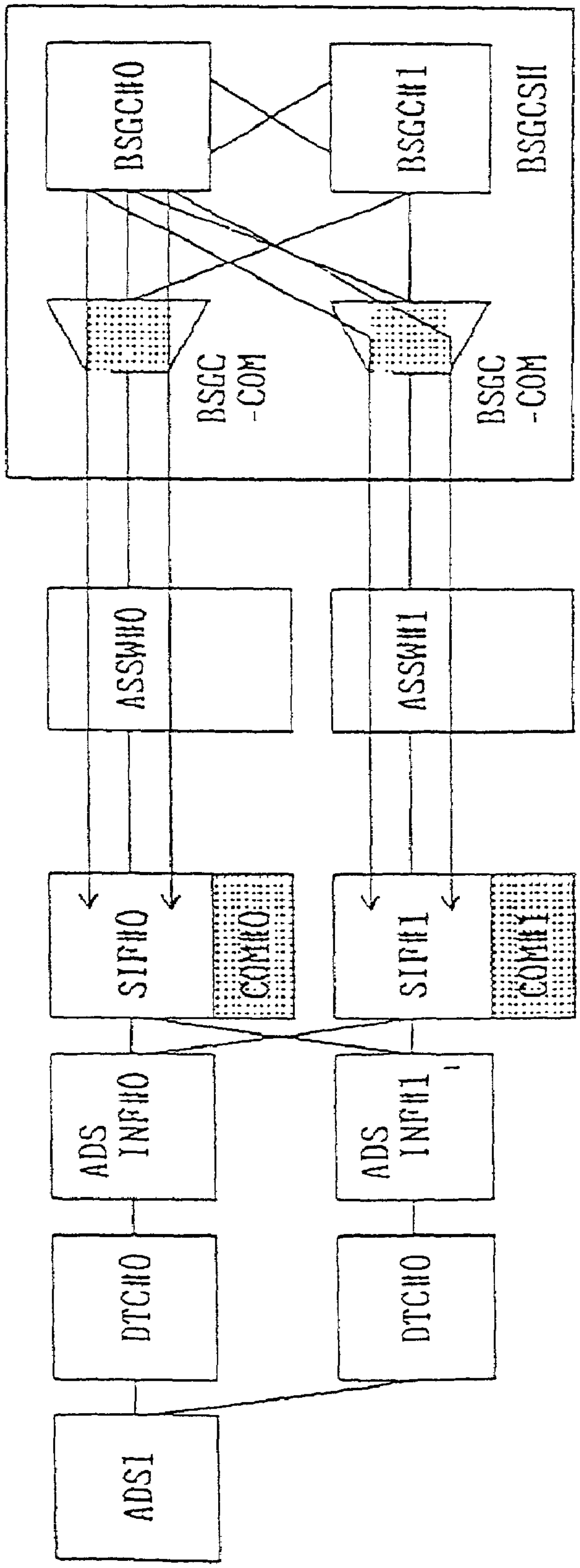

FIG. 708 shows the control model of the duplex device signal transmitted from the switch to the terminal unit.

Figure 709:
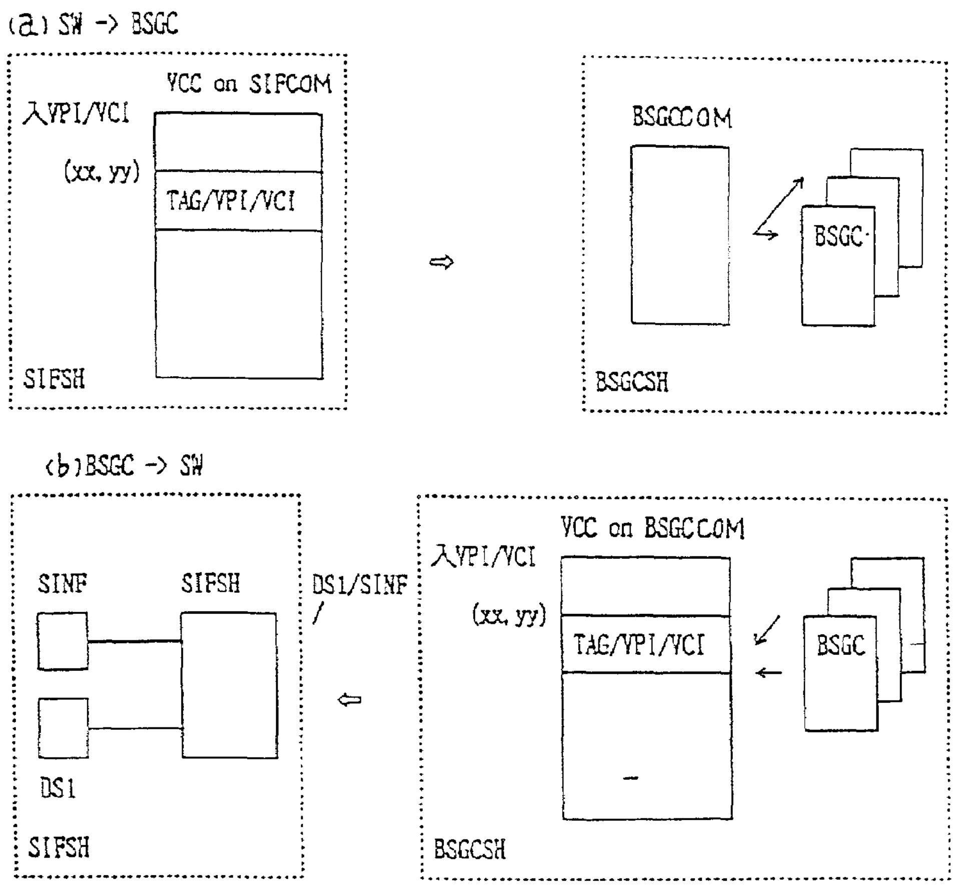

FIG. 709 shows the control model of the VPI/VCI.

FIG. 710 shows a list of assigning a VPI/VCI.

Figure 711:
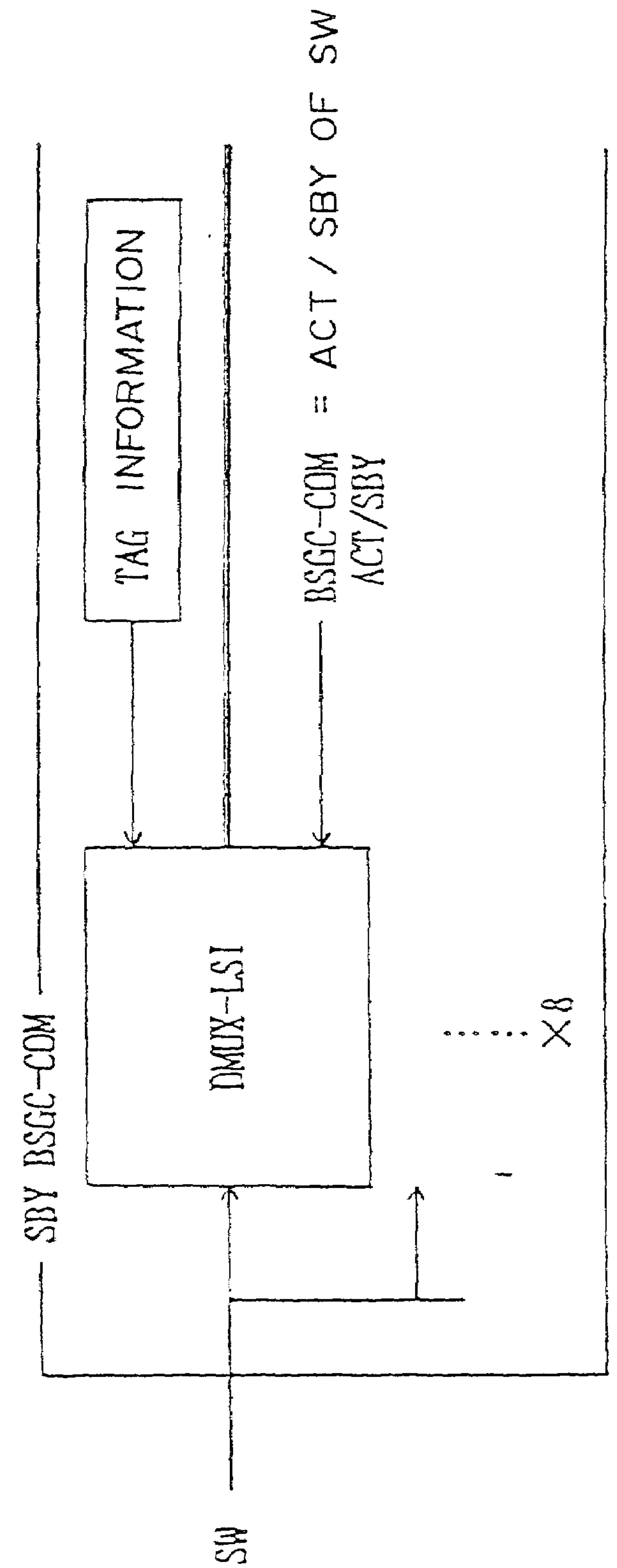

FIG. 711 shows the cell discarding function in the BSGC-COM.

Figure 712:
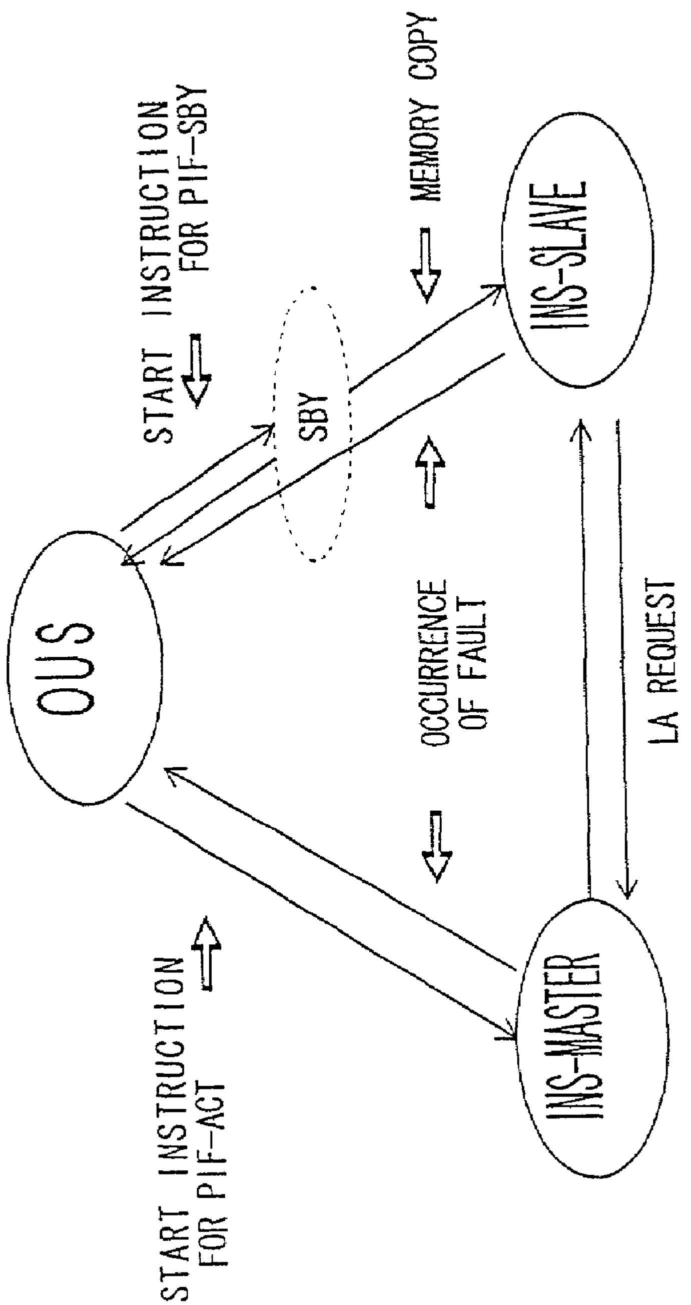

FIG. 712 shows the state of the device of the BSGC.

Figure 713:
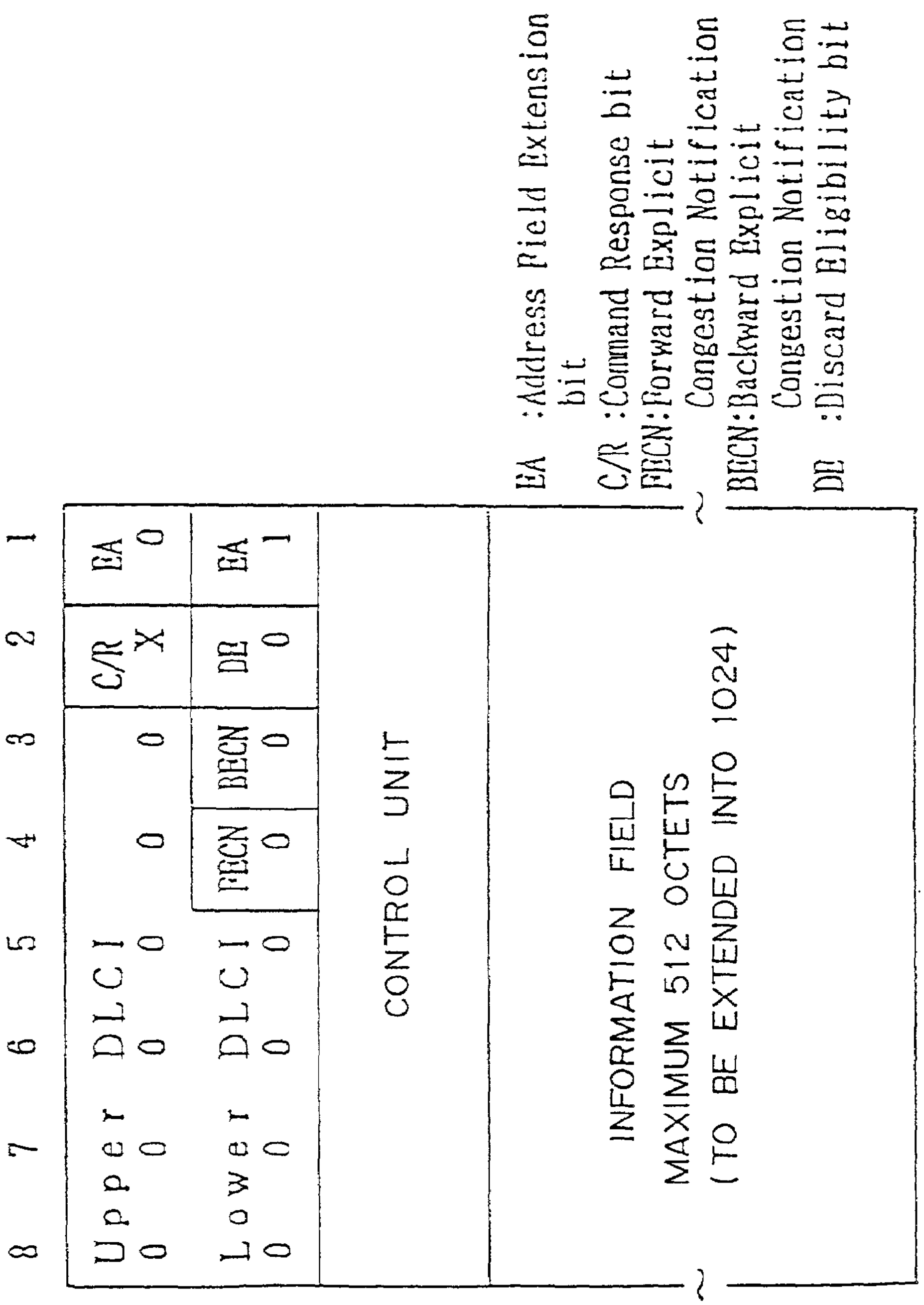

FIG. 713 shows the frame format used in the LAPD communications to the subscriber terminal unit.

FIG. 714 shows the establishing procedure of the intra-station control communications link.

Figure 715:
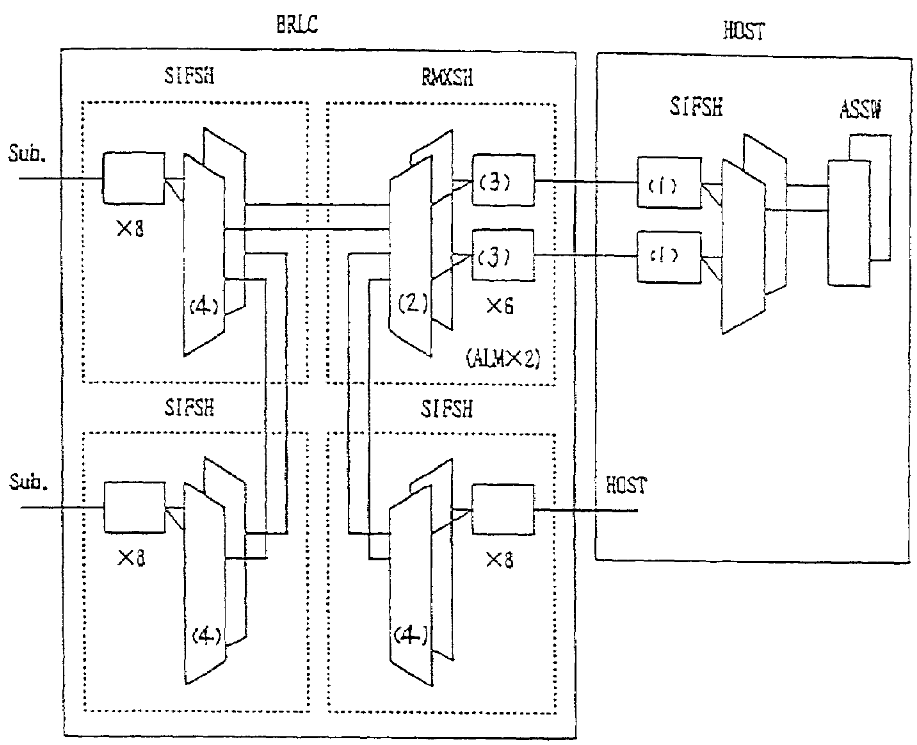

FIG. 715 shows the establishing procedure of the intra-station control communications link relating to the BRLC.

Figure 716:
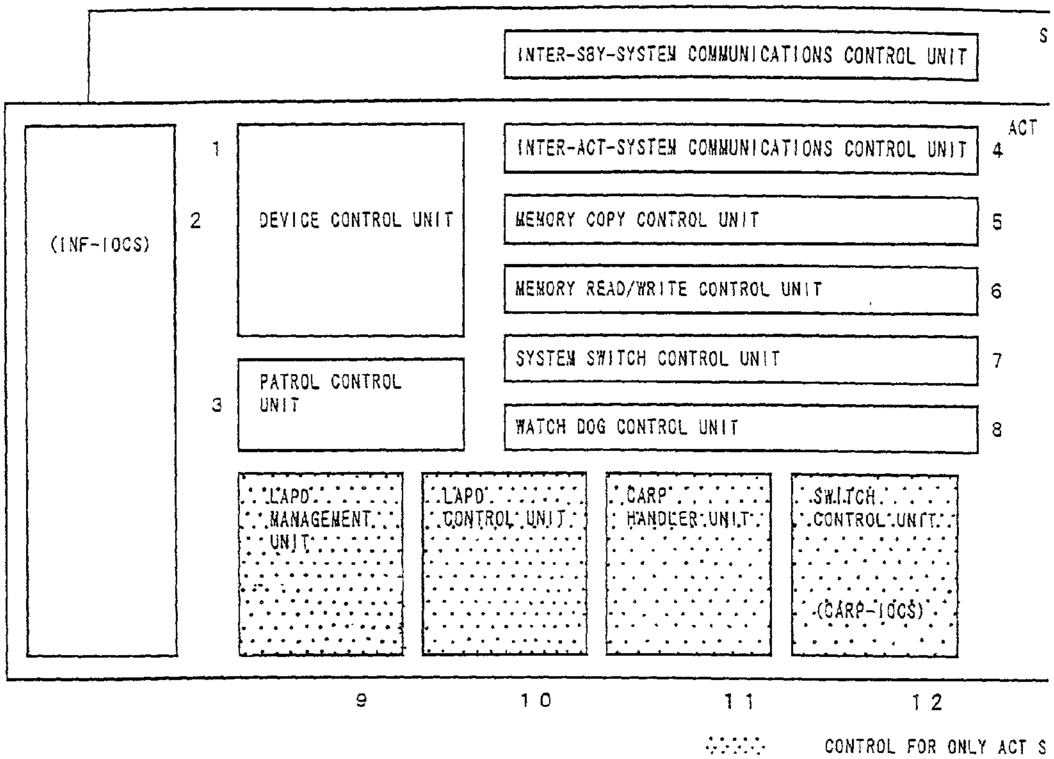

FIG. 716 shows the configuration of the program module in the BSGC.

Figure 717:
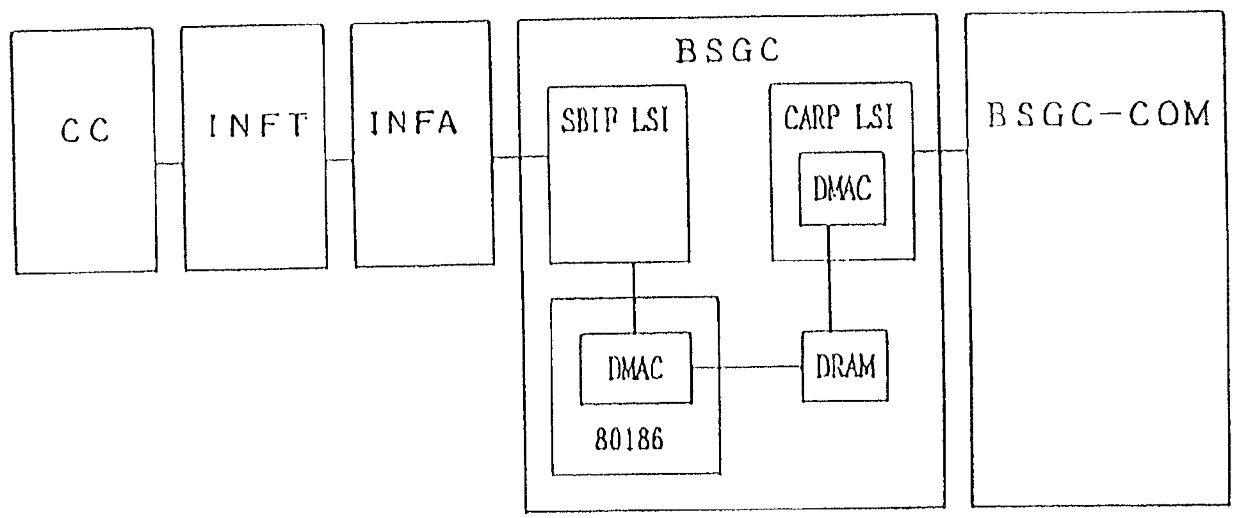

FIG. 717 shows the configuration of the hardware relating to the INF.

Figure 718:
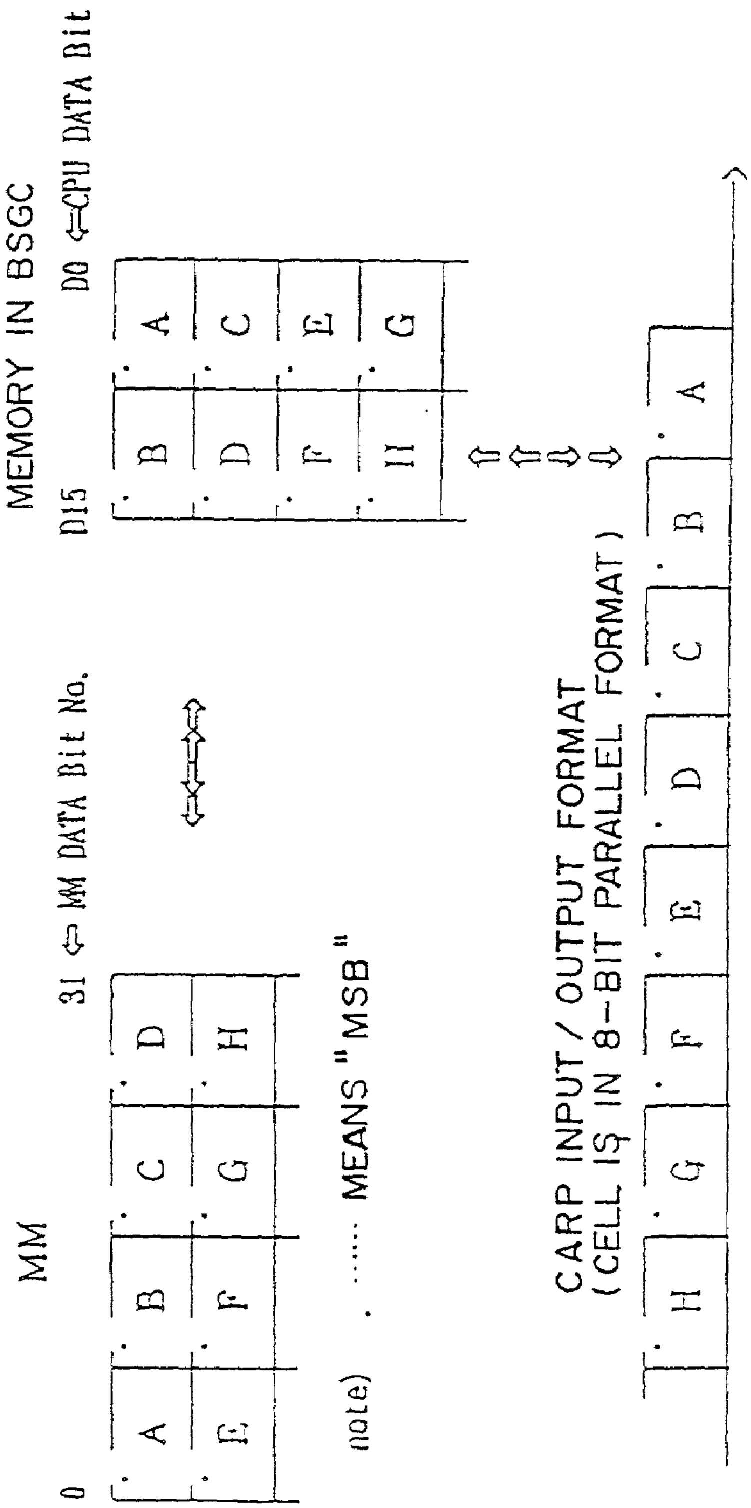

FIG. 718 shows the bit configuration between the MM (main memory) and BSGC of the data DMA-transferred.

FIG. 719 shows the congestion control of the receiving system.

Figure 720:
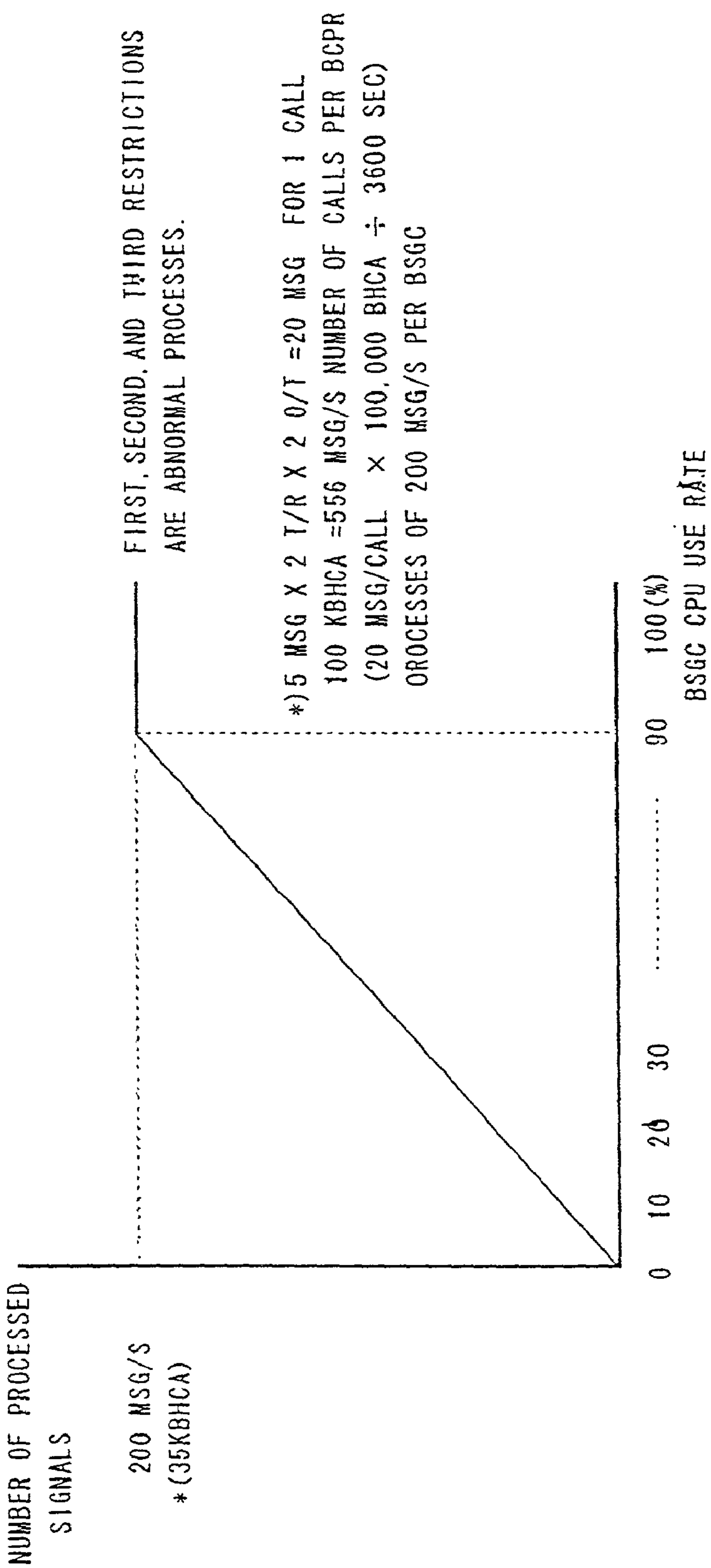

FIG. 720 shows a model of the number of signals processed in the BSGC.

FIG. 721 shows the initialize command and the format of the INF initial information setting table.

FIG. 722 shows the usage of a tag SIG/UL/TAGC in the communications in the SIFSH from the BSGC to the SIFSH.

FIG. 723 shows the usage of a tag SIG/UL/ADS1BLK/ADS1SEL in the communications in the SIFSH from the BSGC to the RMXSH.

FIG. 724 shows the usage of a tag SIG/UL/TAGC by the SIFSH in the communications from the BSGC to the SIFSH.

FIG. 725 shows the usage of a tag SIG/UL/TAGC by the BSGCSH in the communications from the ASSW to the BSGC.

Figure 726:
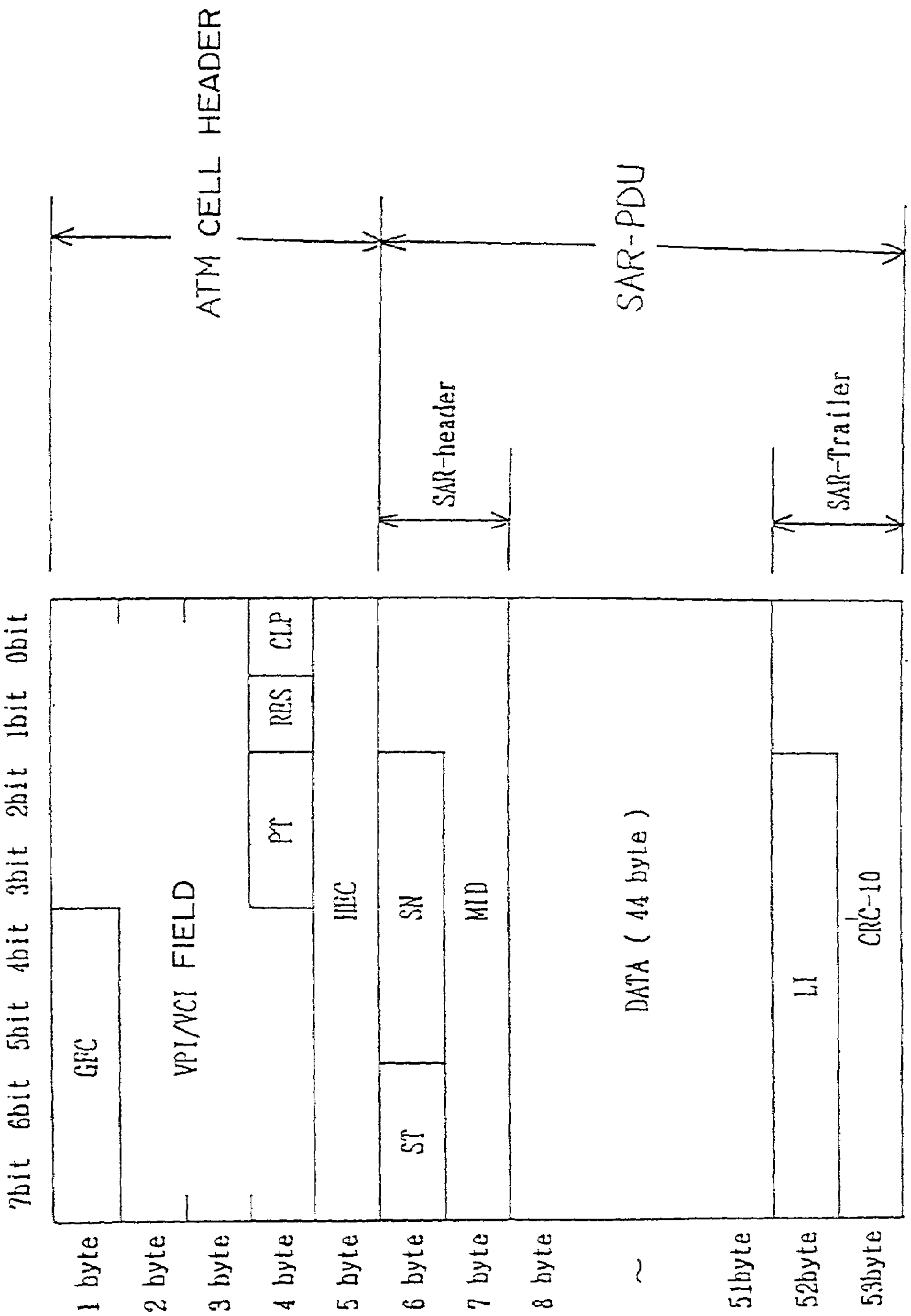

FIG. 726 shows the configuration of the SAR-PDU of the protocol type 3 and the header field of the ATM cell storing the SAR-PDU.

Figure 727:
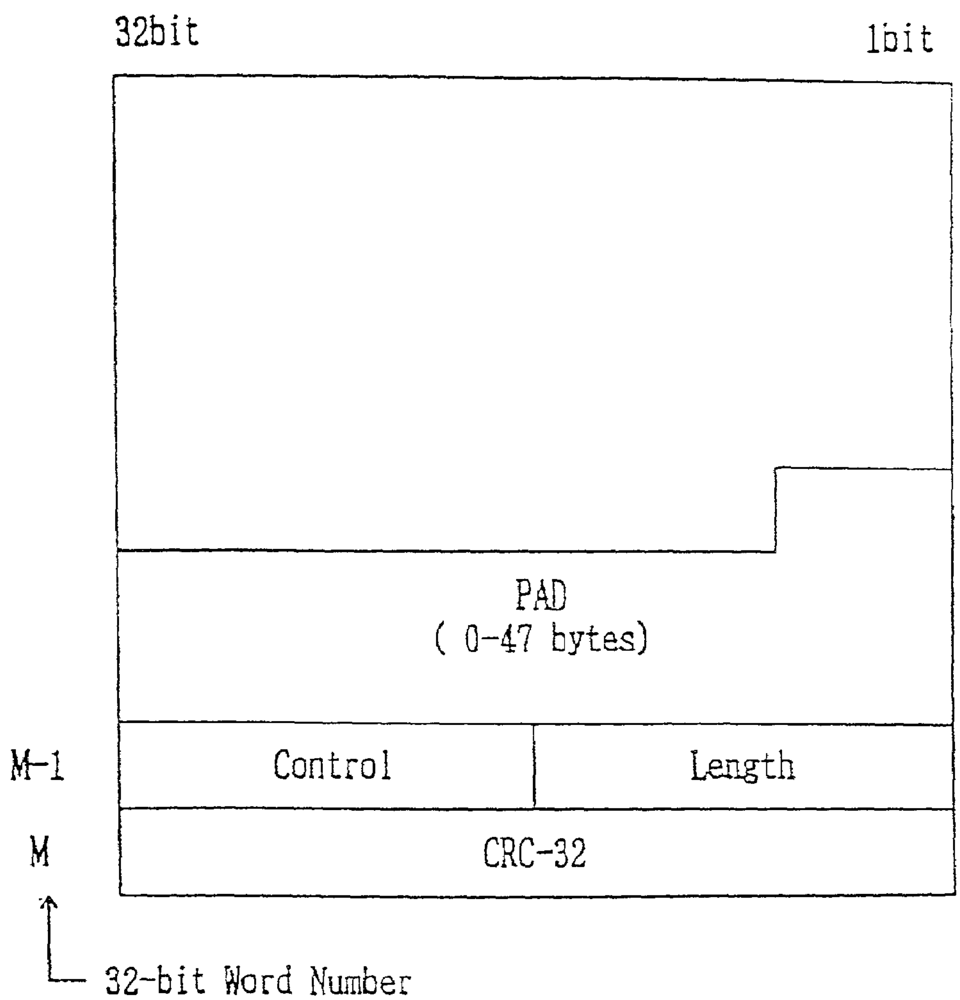

FIG. 727 shows the SAR-PDU (CPAAL5-PDU) of the protocol type 5.

Figure 728:
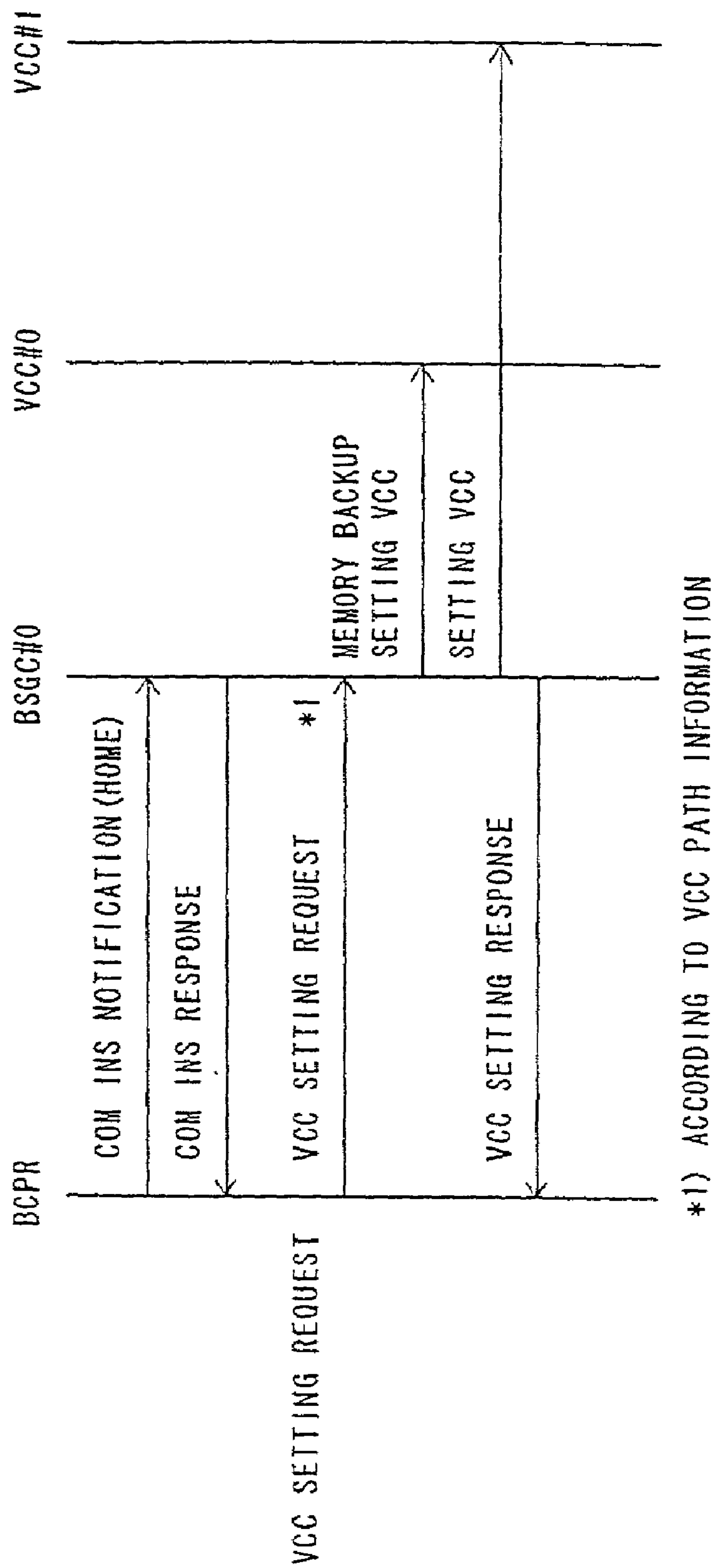

FIG. 728 shows the procedure of setting a VCC.

Figure 729:
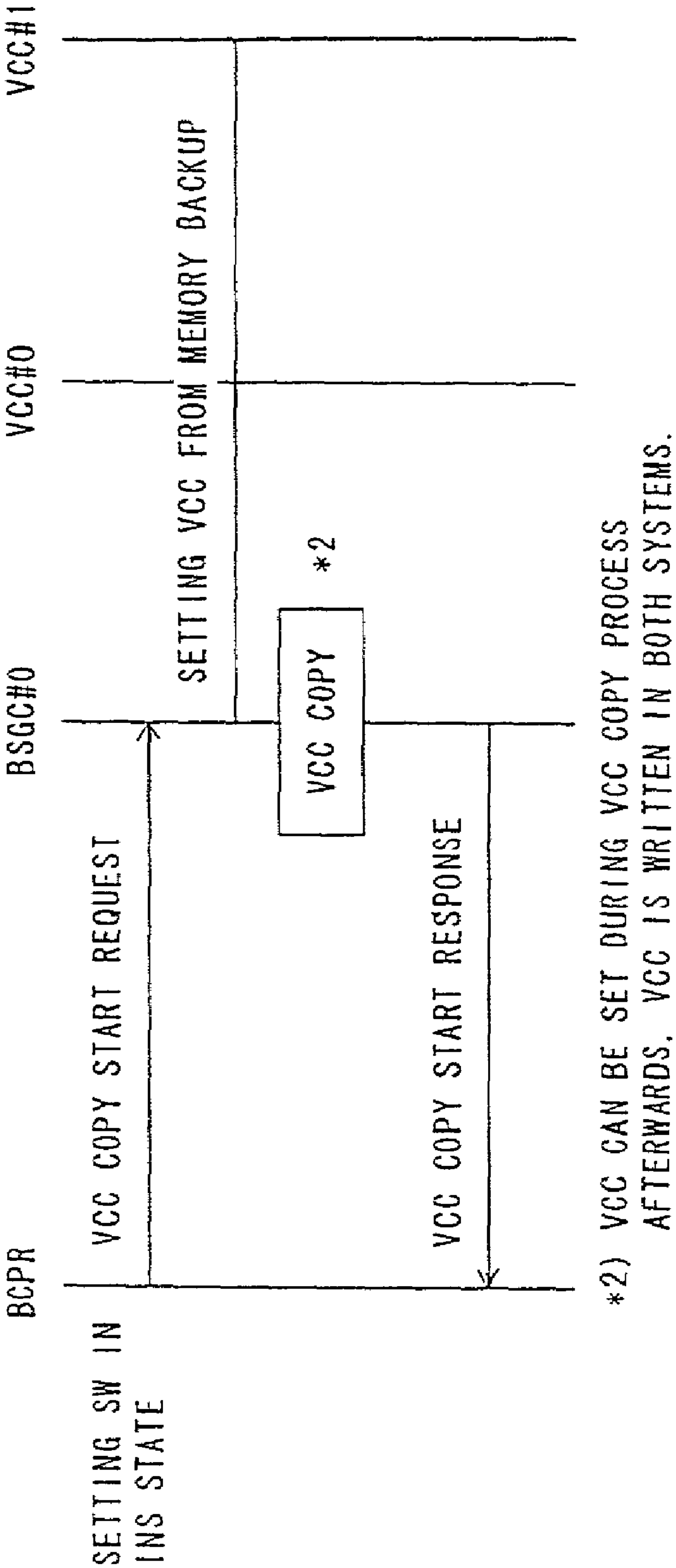

FIG. 729 shows the procedure of starting VCC copy.

Figure 730:

FIG. 730 shows the procedure of stopping VCC copy.

Figure 731:
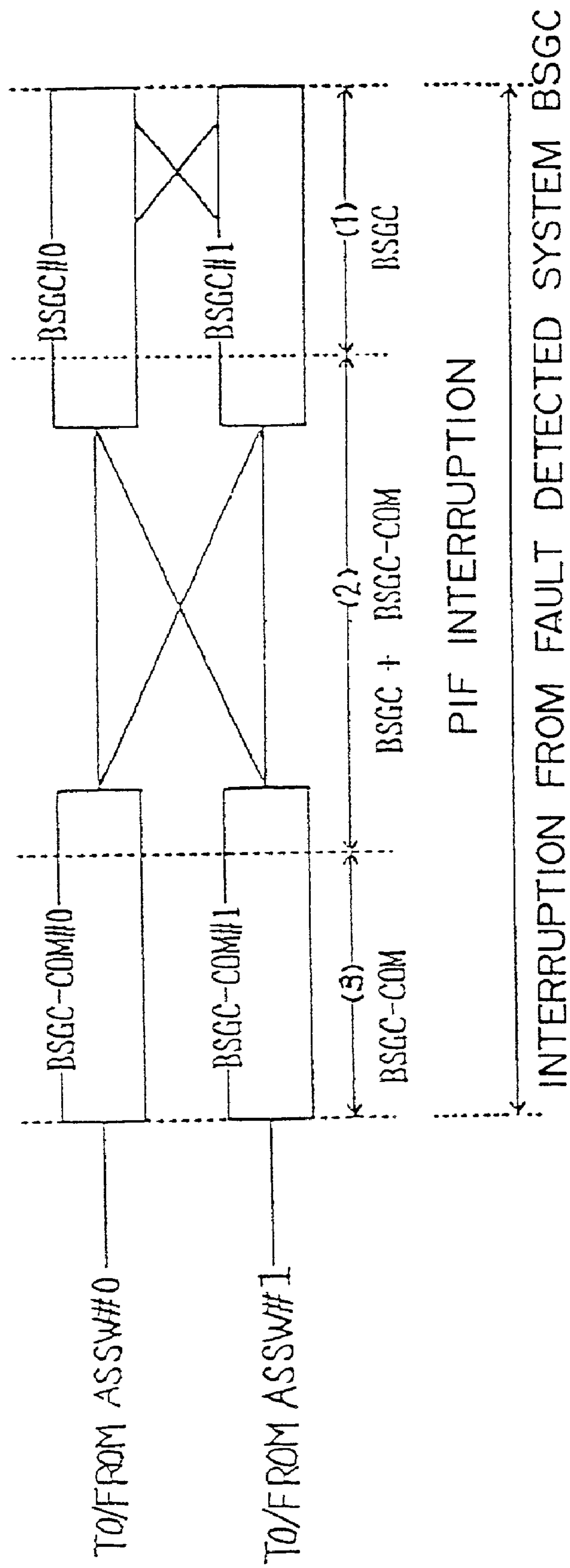

FIG. 731 shows the fault range model.

Figure 732:
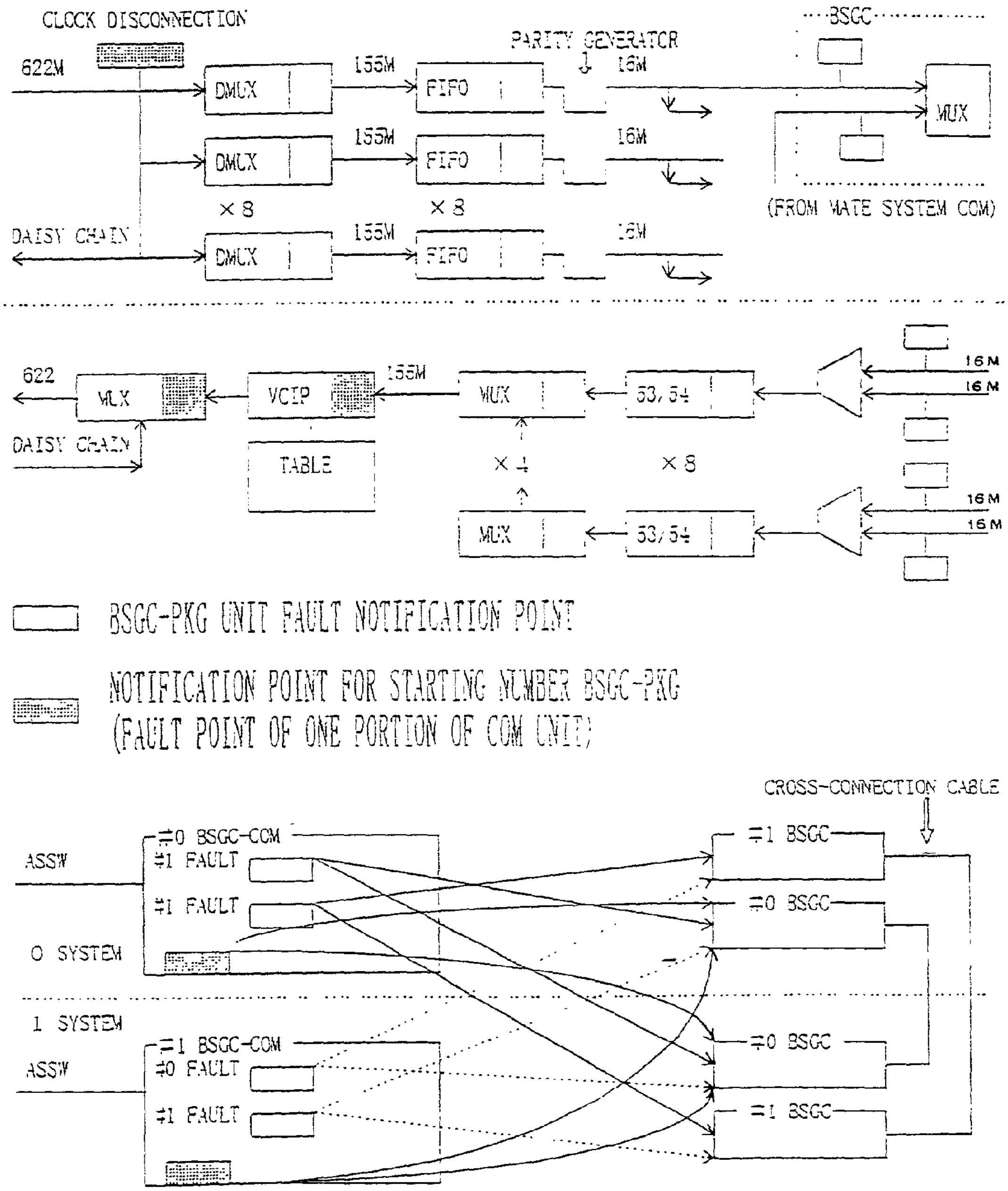

FIG. 732 shows the method of detecting a BSGCSH-COM fault by the BSGC and of notifying the switching software of the fault.

Figure 733:
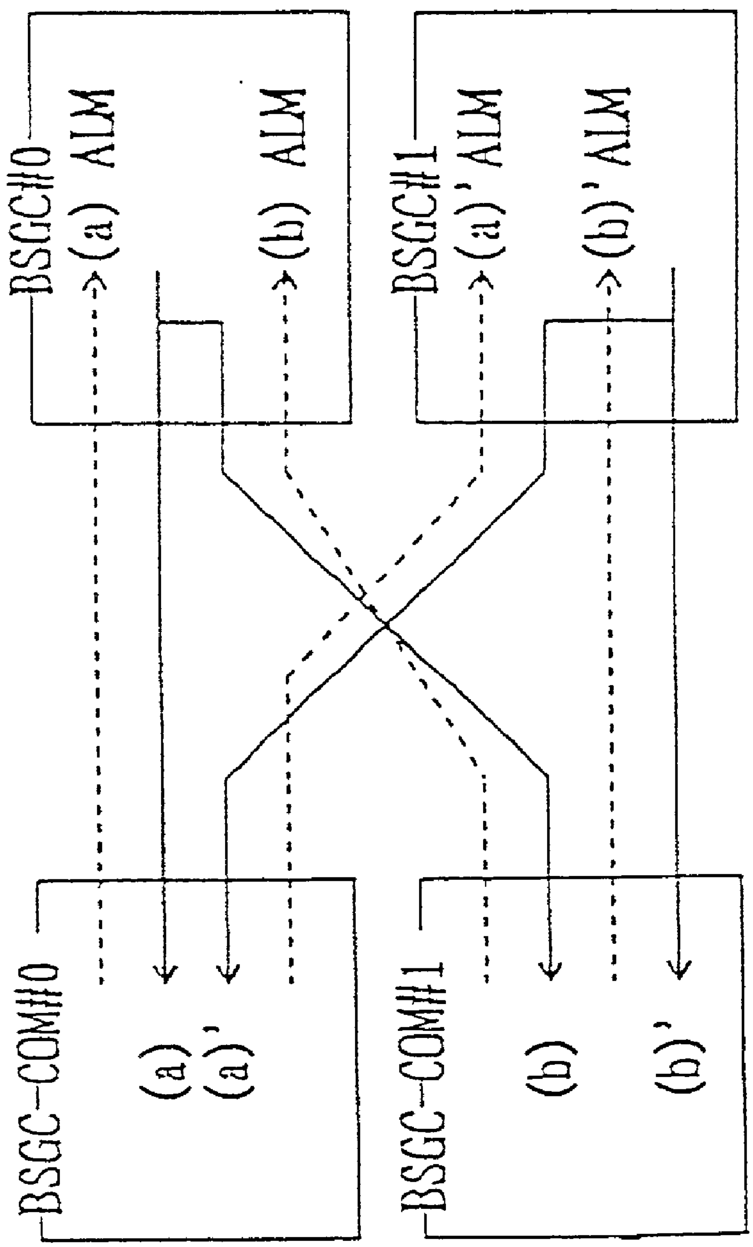

FIG. 733 shows the detection point of a fault detected by the checker in the BSGC-COM in transmitting data from the BSGC to the BSGC-COM.

FIG. 734 shows the state in which a fault is detected in one of the fault points (a), (a)', (b), and (b)' shown in FIG. 733.

FIG. 735 shows the state in which a fault is detected in two of the fault points (a), (a)', (b), and (b)' shown in FIG. 733.

FIG. 736 shows the case in which a fault of a checker in the BSGC-COM is determined after the fault described in note 1 in FIG. 735 and the diagnostics is made.

FIG. 737 shows the case in which a fault of a checker in the BSGC-COM is determined after the fault described in note 2 in FIG. 735 and the diagnostics is made.

Figure 738:
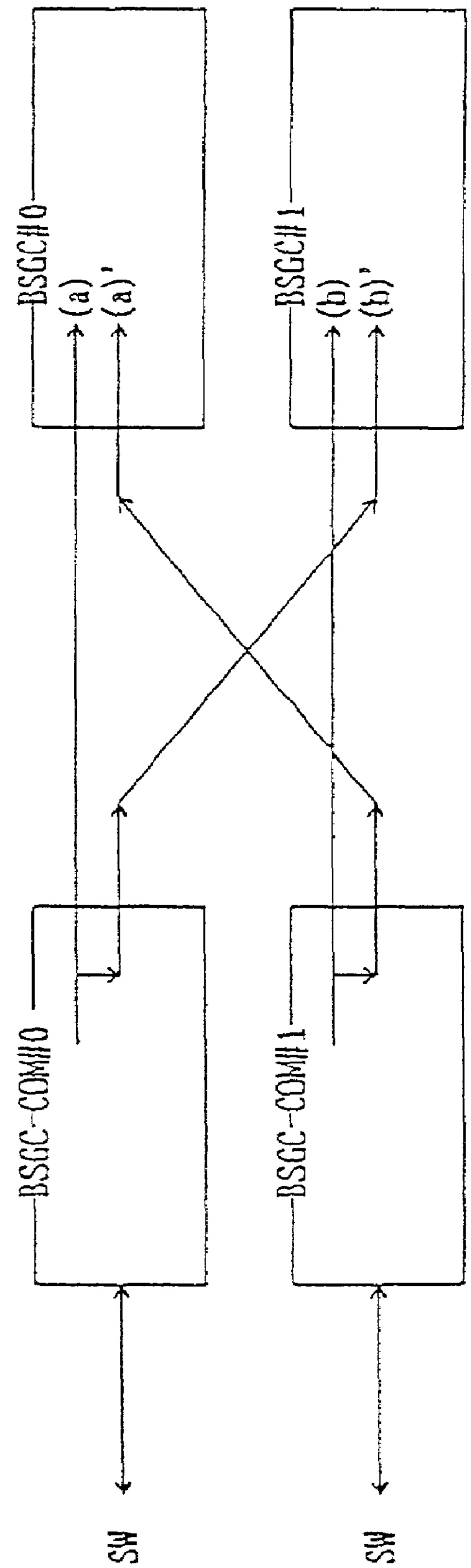

FIG. 738 shows the detection point of faults detected by the checker in the BSGC when data is transmitted from the BSGC-COM to the BSGC.

FIG. 739 shows the state in which a fault is detected in one of the fault points (a), (a)', (b), and (b)' shown in FIG. 733.

FIG. 740 shows the fault notification model.

FIG. 741 shows the case in which a fault of a checker in the BSGC-COM is determined after the fault described in note 3 in FIG. 740 and the diagnostics is made.

FIG. 742 shows the case in which a fault of a checker in the BSGC-COM is determined after the fault described in note 4 in FIG. 740 and the diagnostics is made.

FIG. 743 shows the fault notification model.

FIG. 744 shows the detailed fault factors.

FIG. 745 shows the accommodation of the BSGC MSCN.

FIG. 746 shows the detailed factors of the BSGC faults reported to the BCPR by the TM save.

FIG. 747 shows the detailed factors of the BSGC-COM faults reported by an MSCN detail read command.

Figure 748:
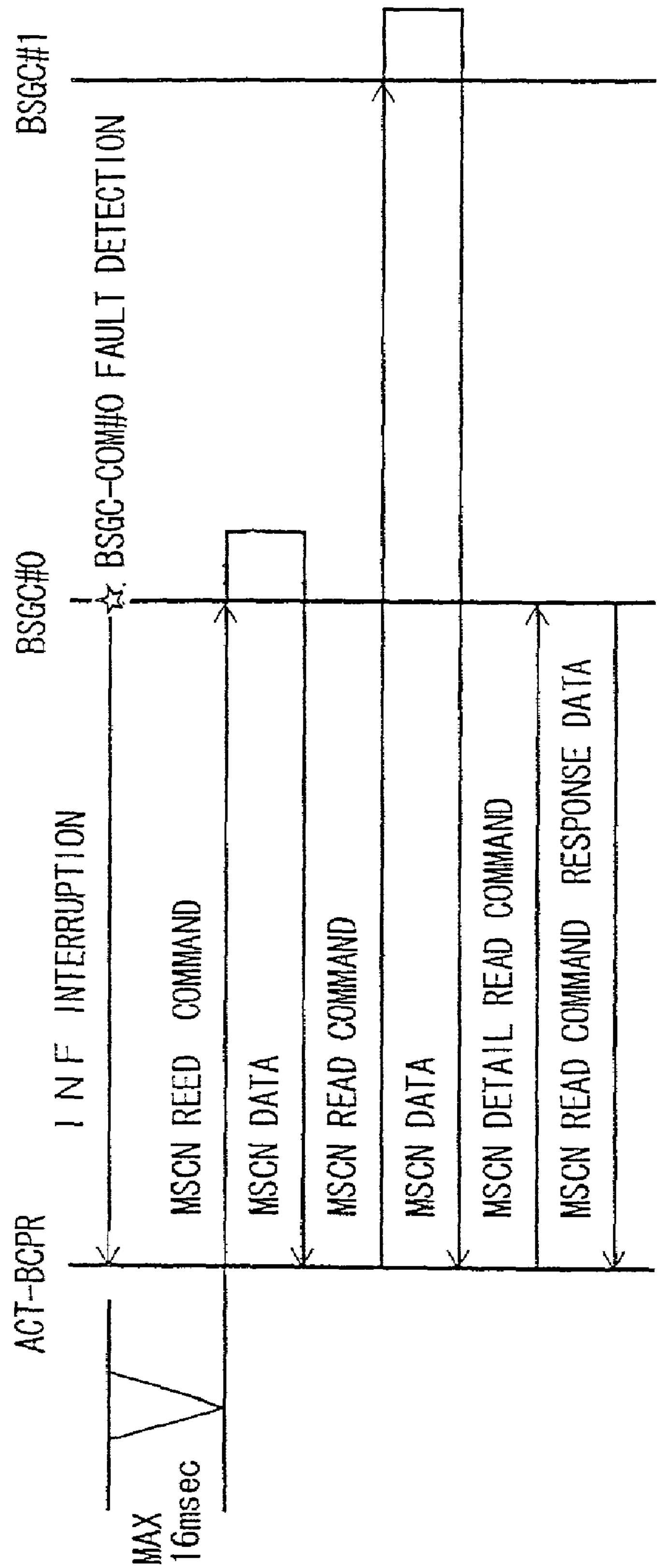

FIG. 748 shows the sequence of detecting the faults in the BSGC-COM.

Figure 749:
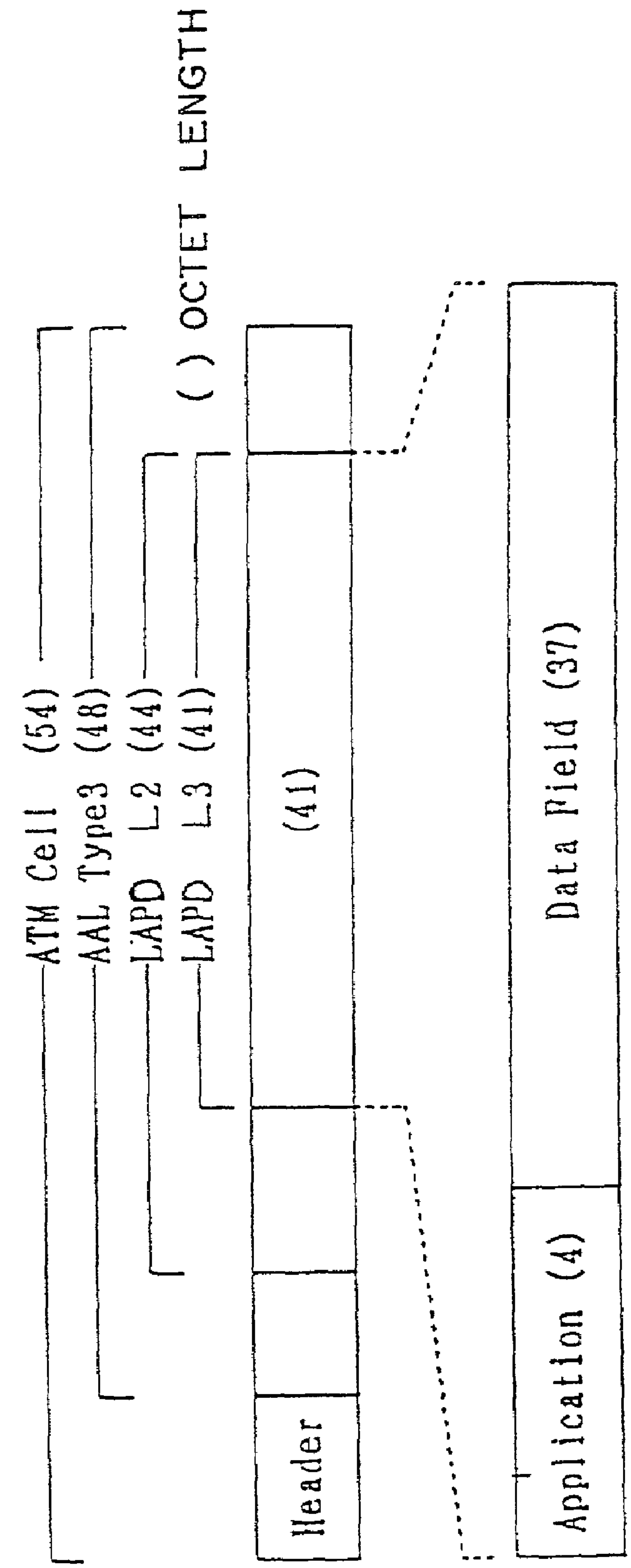

FIG. 749 shows the signaling cell format used when an I field is transferred as signaling information.

Figure 750:
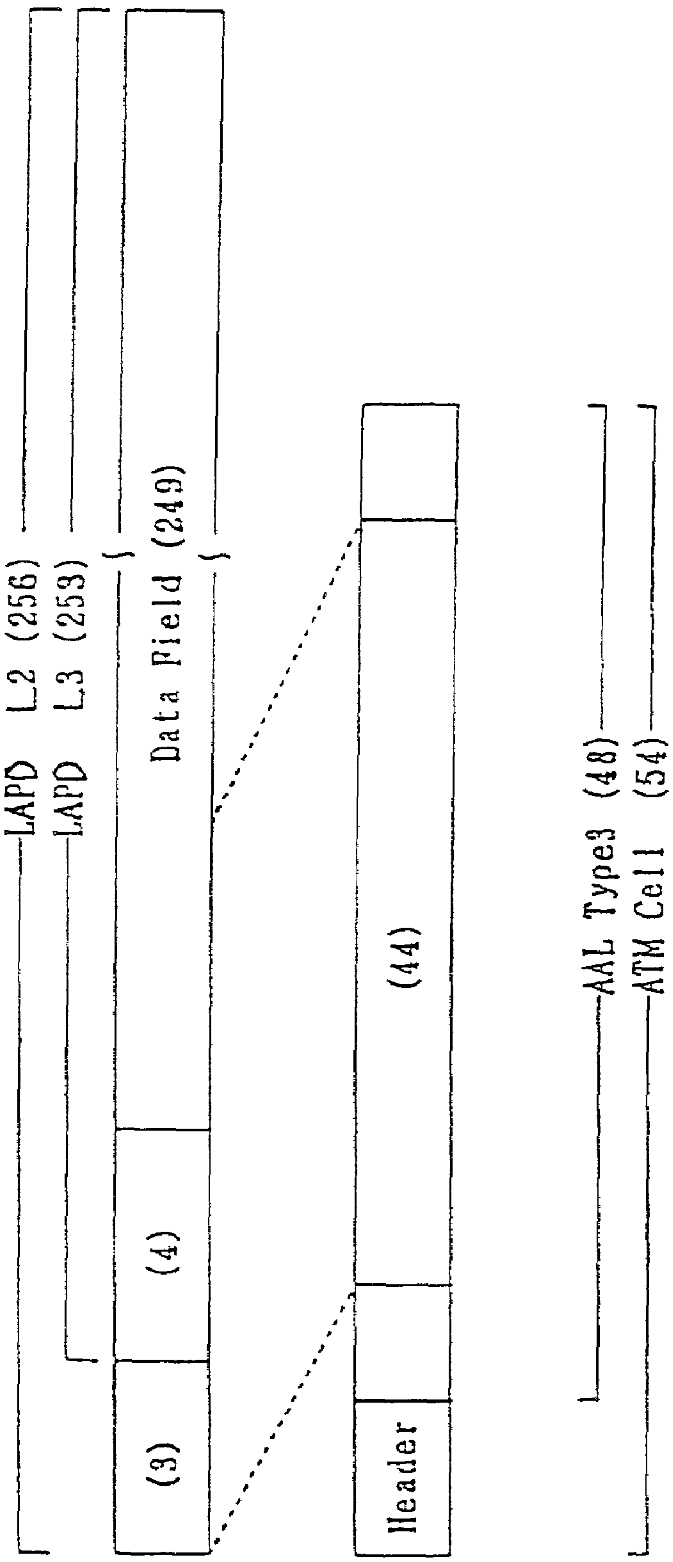

FIG. 750 shows the signaling cell format used when an MSD/MSCN is transferred as signaling information.

Figure 751:
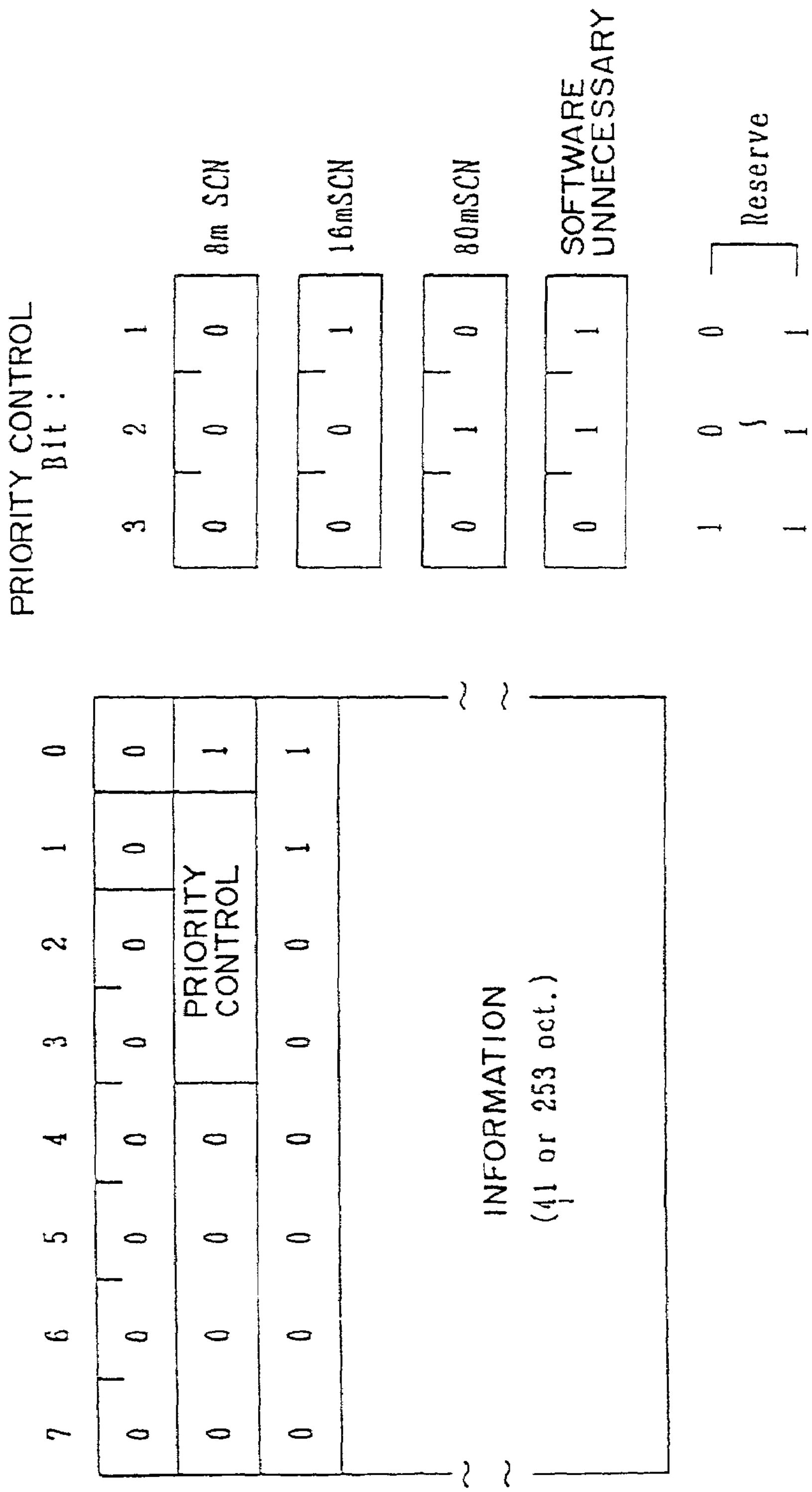

FIG. 751 shows the UI format.

FIG. 752 shows the definition of a common field in each device.

Figure 753:
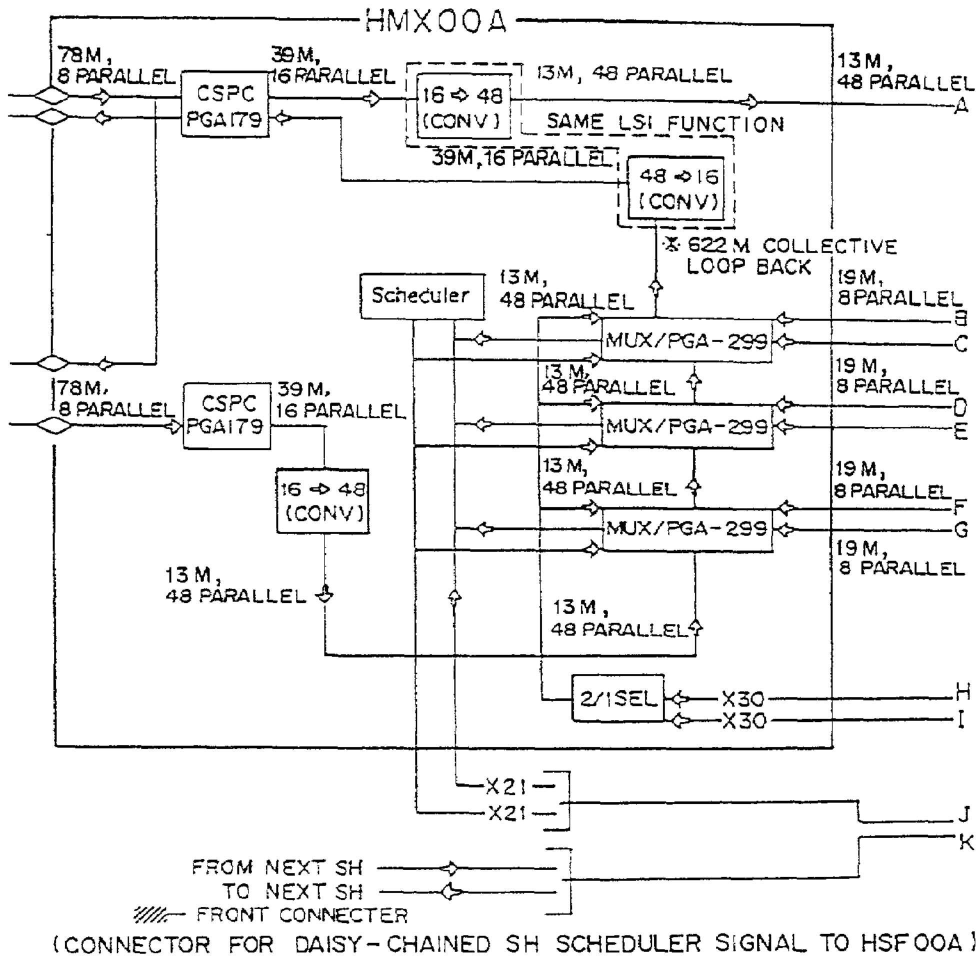

FIG. 753 is a block diagram (1) showing the functions of the BSGC-COM hardware.

Figure 754:
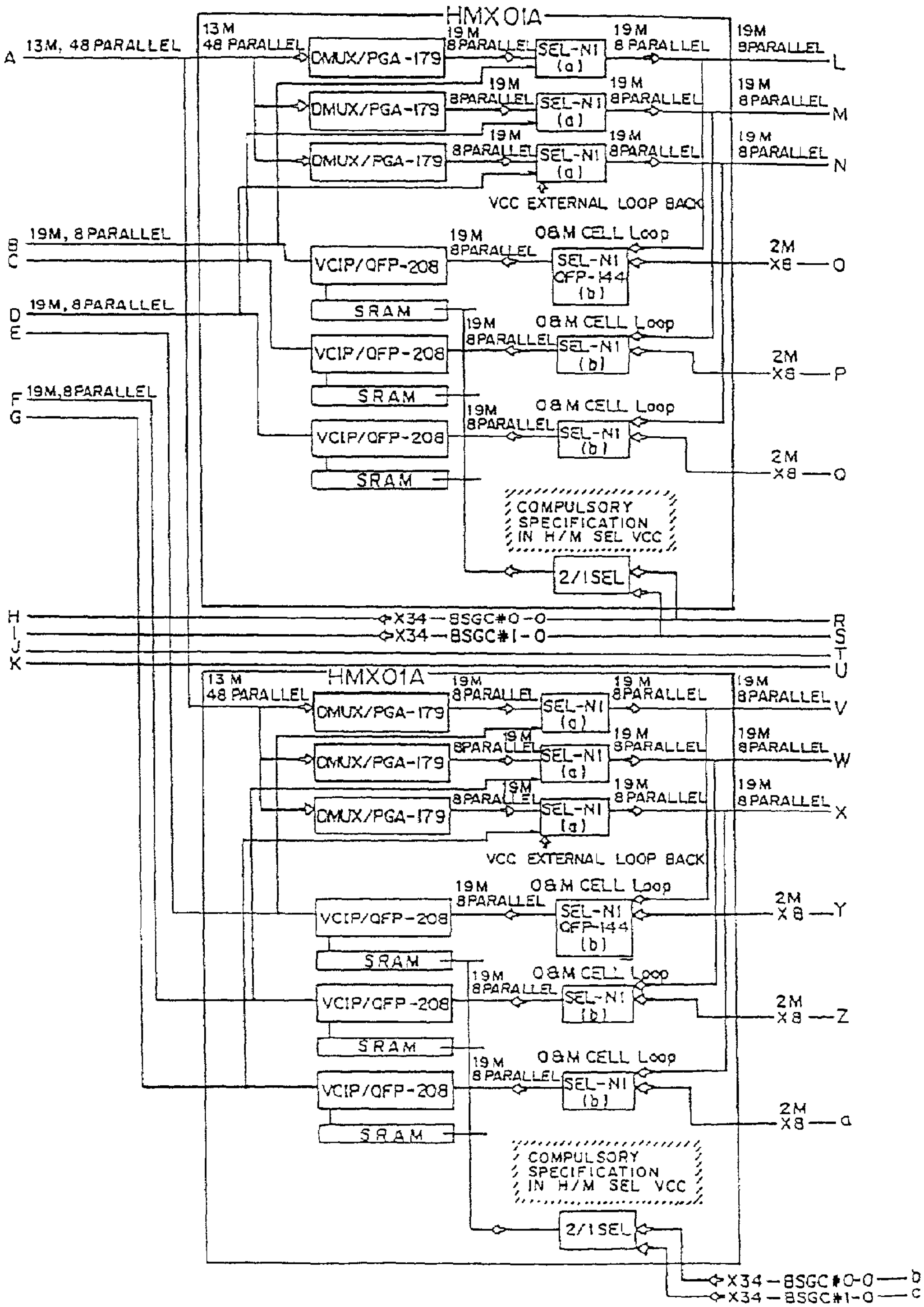

FIG. 754 is a block diagram (1) showing the functions of the BSGC-COM hardware.

Figure 755:
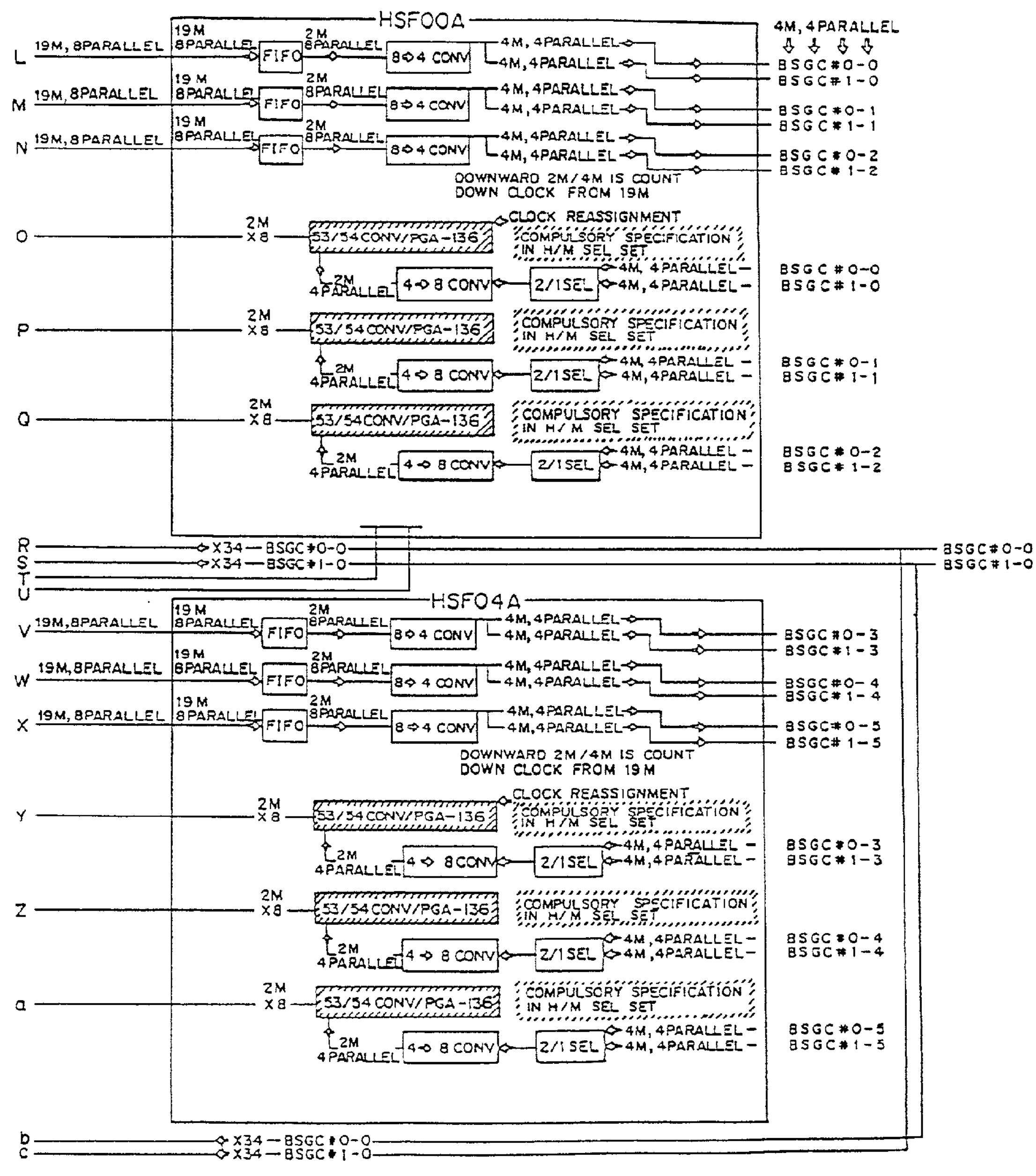

FIG. 755 is a block diagram (1) showing the functions of the BSGC-COM hardware:

FIG. 756 shows the functions of the package of the HMX00A in the BSGC-COM.

FIG. 757 shows the functions of the package of the HMX01A in the BSGC-COM.

FIG. 758 shows the functions of the package of the HSF00A/HSF04A in the BSGC-COM.

FIG. 759 shows the interface between the HMX00A package in the BSGC-COM and the SWMDX (HMX03A) package in the ASSWSH.

FIG. 760 shows the interface to the signal transferred from the SWMDX (HMX03A) in the ASSWSH to the HMX00A package in the BSGC-COM.

FIG. 761 shows the interface of a signal transferred between the HSF04A package in the BSGC-COM and the SWTIF (HNC00A) package in the ASSWSH.

Figure 762:
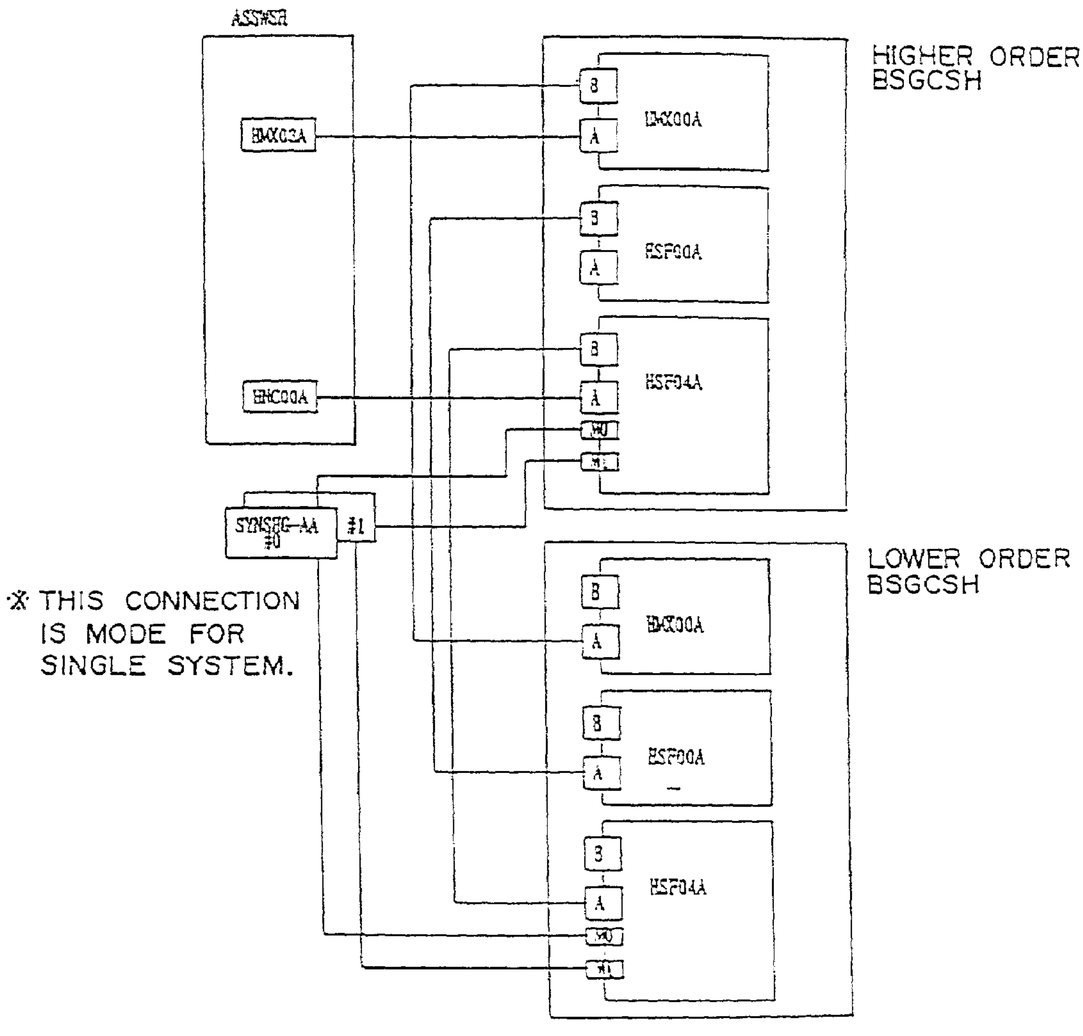

FIG. 762 shows the daisy-chain connection of the BSGCSH.

Figure 763:
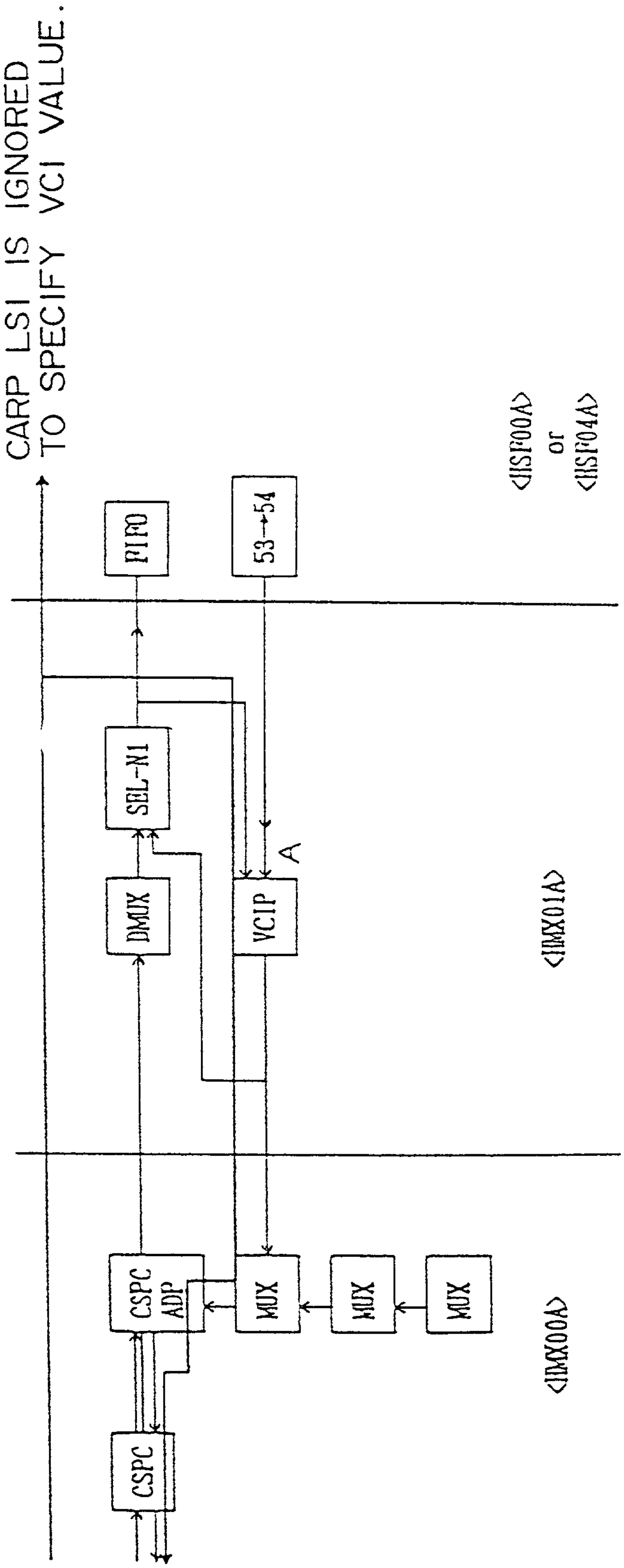

FIG. 763 shows the configuration of the O & M cell loopback in the INS state of the BSGC and BSGC-COM.

Figure 764:
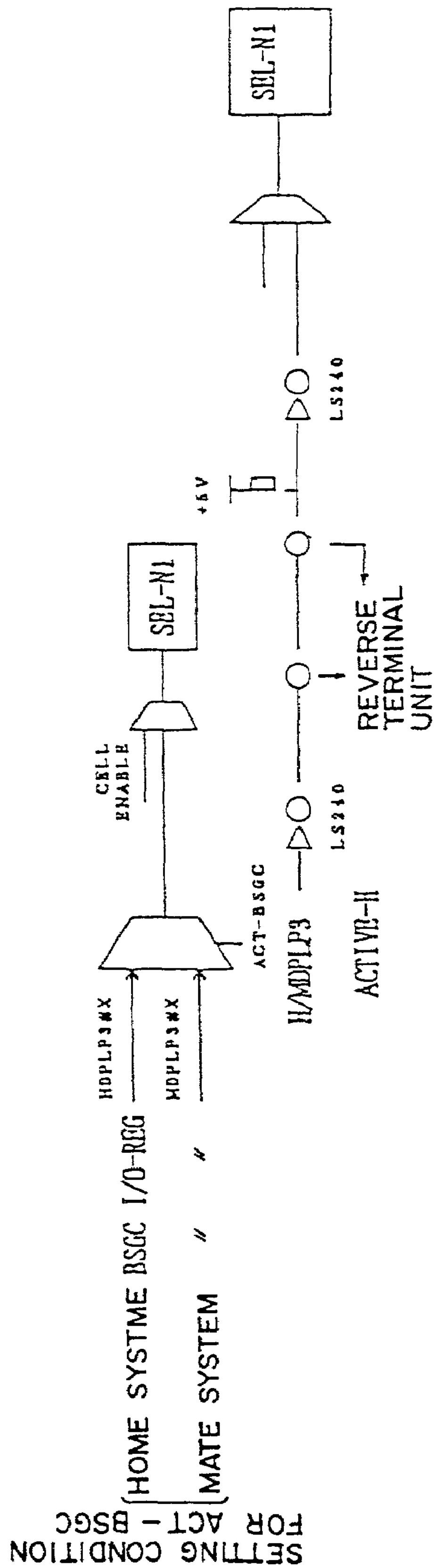

FIG. 764 shows the logic of setting the loopback corresponding to the loopback configuration related to FIG. 763.

Figure 765:
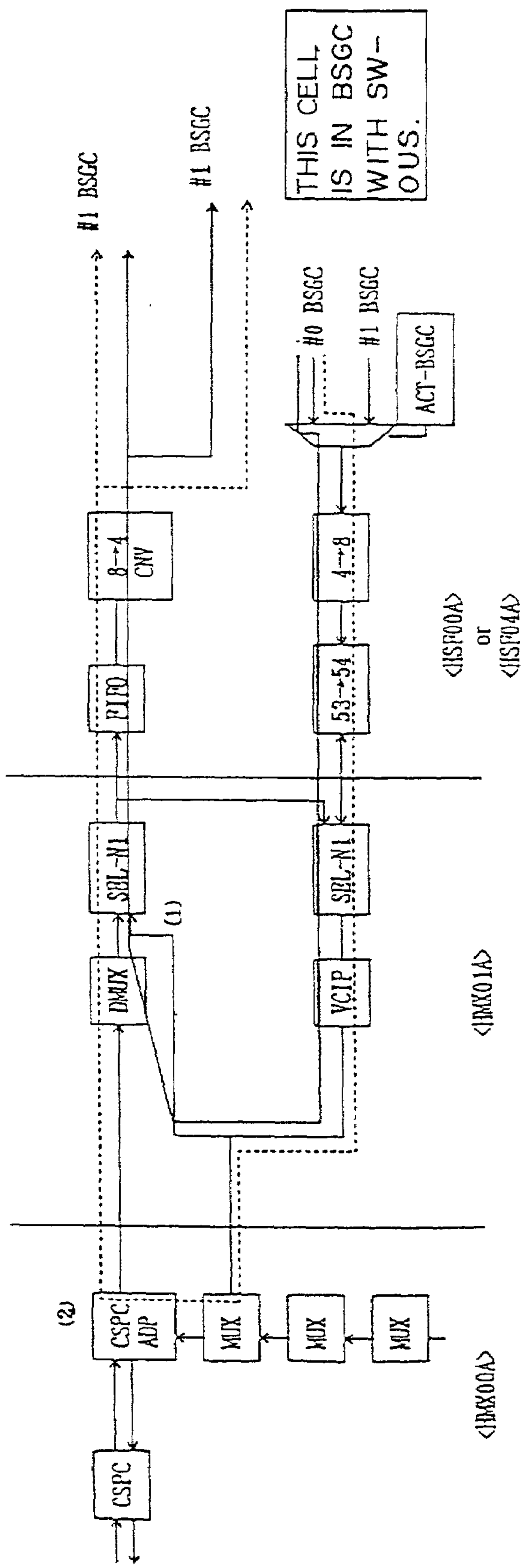

FIG. 765 shows the cell loopback configuration in the OUS state of the BSGC and BSGC-COM.

Figure 766:
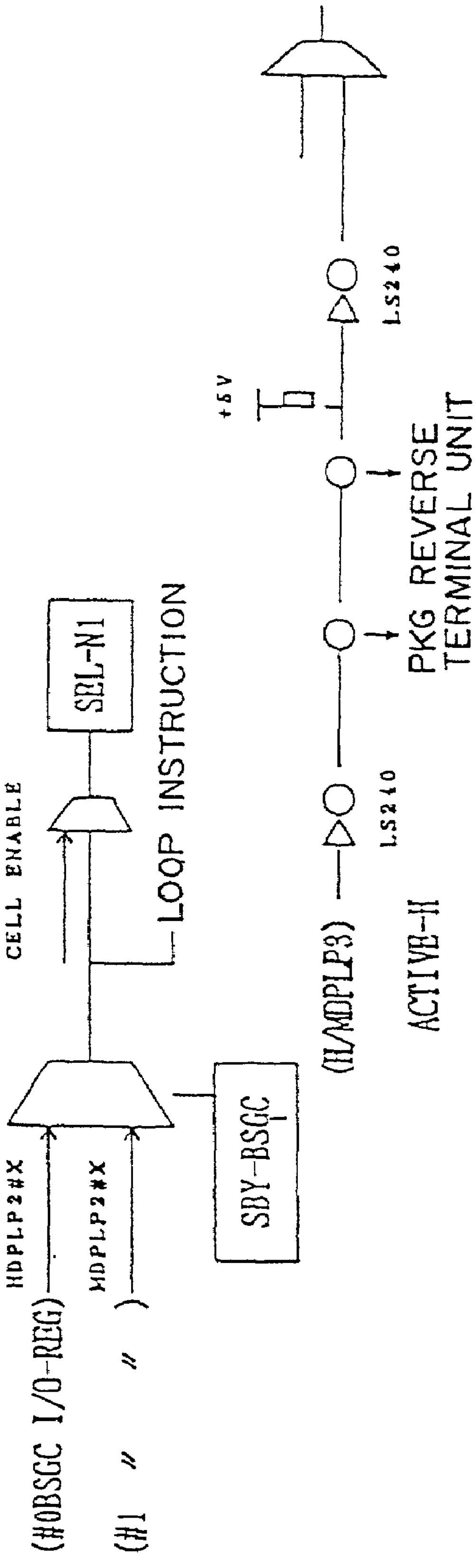

FIG. 766 shows the logic of setting the loopback corresponding to the loopback configuration at the loop point (1) shown in FIG. 765.

Figure 767:
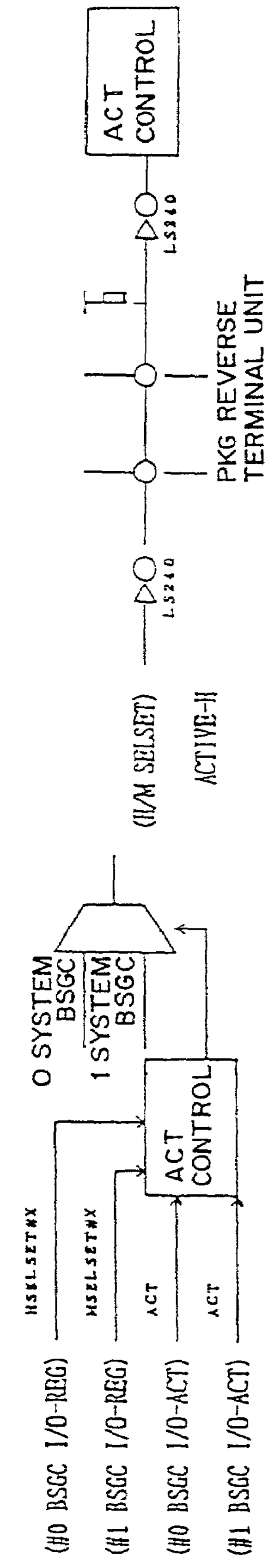

FIG. 767 shows the logic of setting the cell route when the cell is looped back at the loop point (1).

Figure 768:
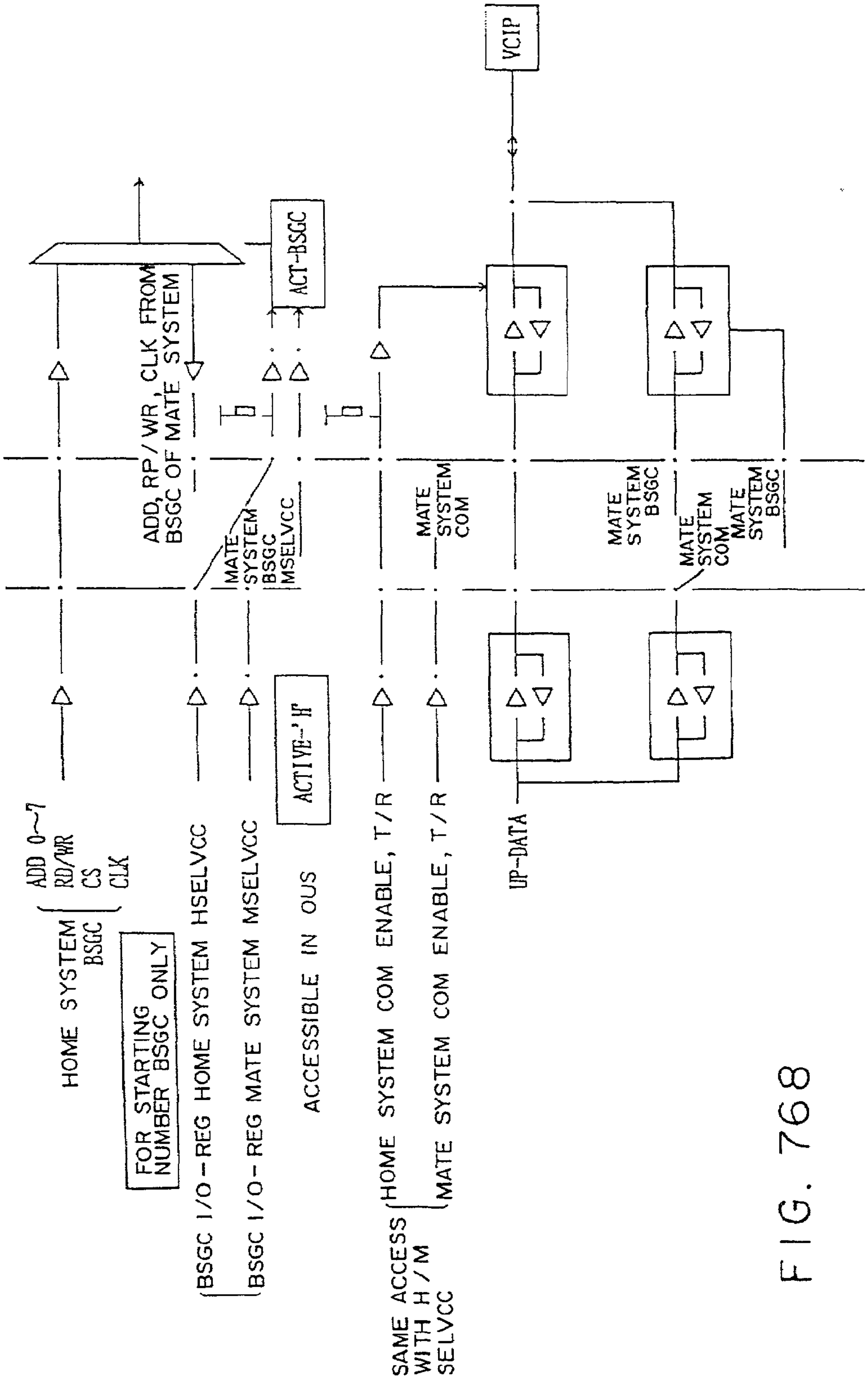

FIG. 768 shows the logic of setting the VCC when the cell is looped back at the loop point (1).

Figure 769:
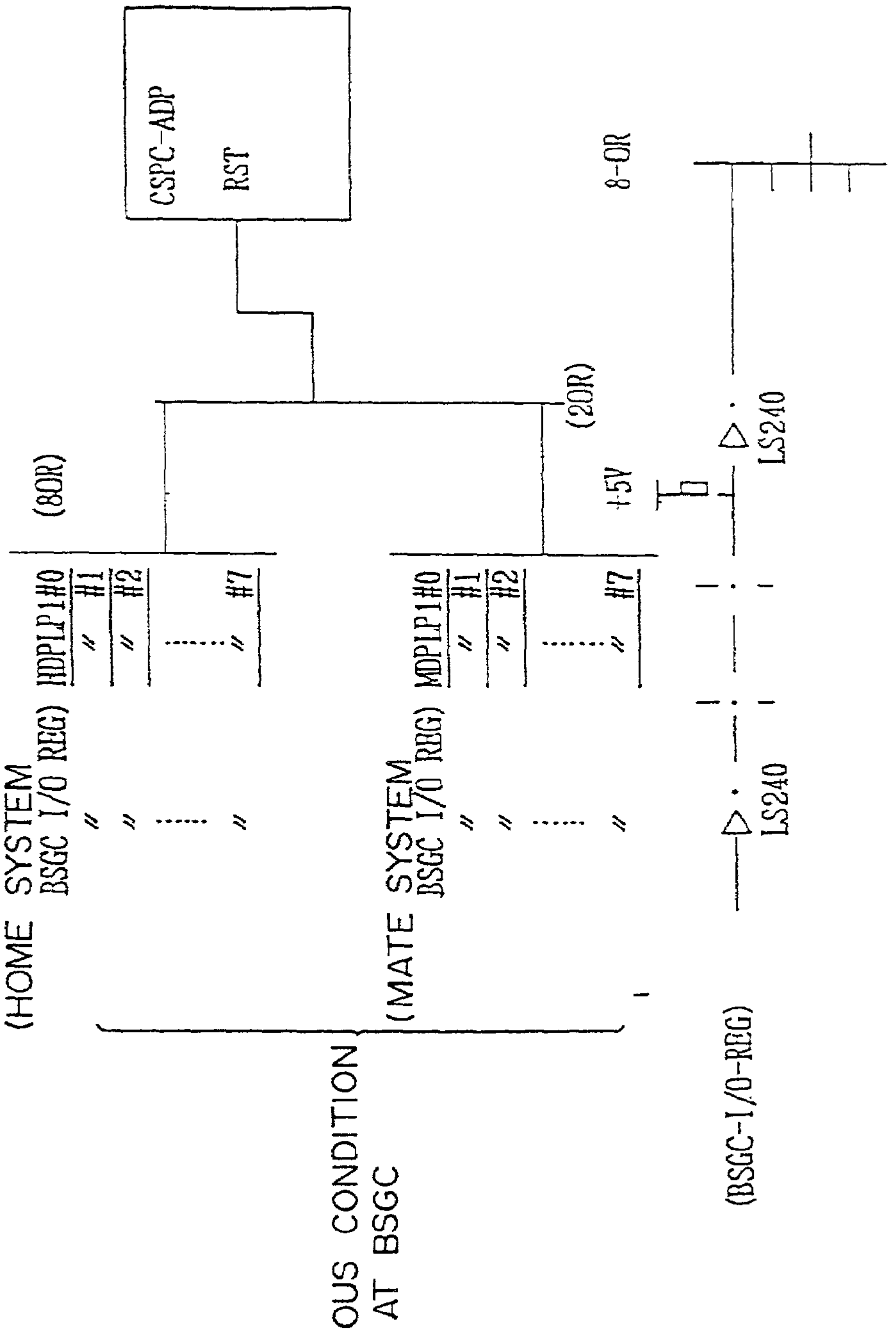

FIG. 769 shows the logic of setting the loopback corresponding to the loopback configuration at the loop point (2) shown in FIG. 765.

Figure 770:
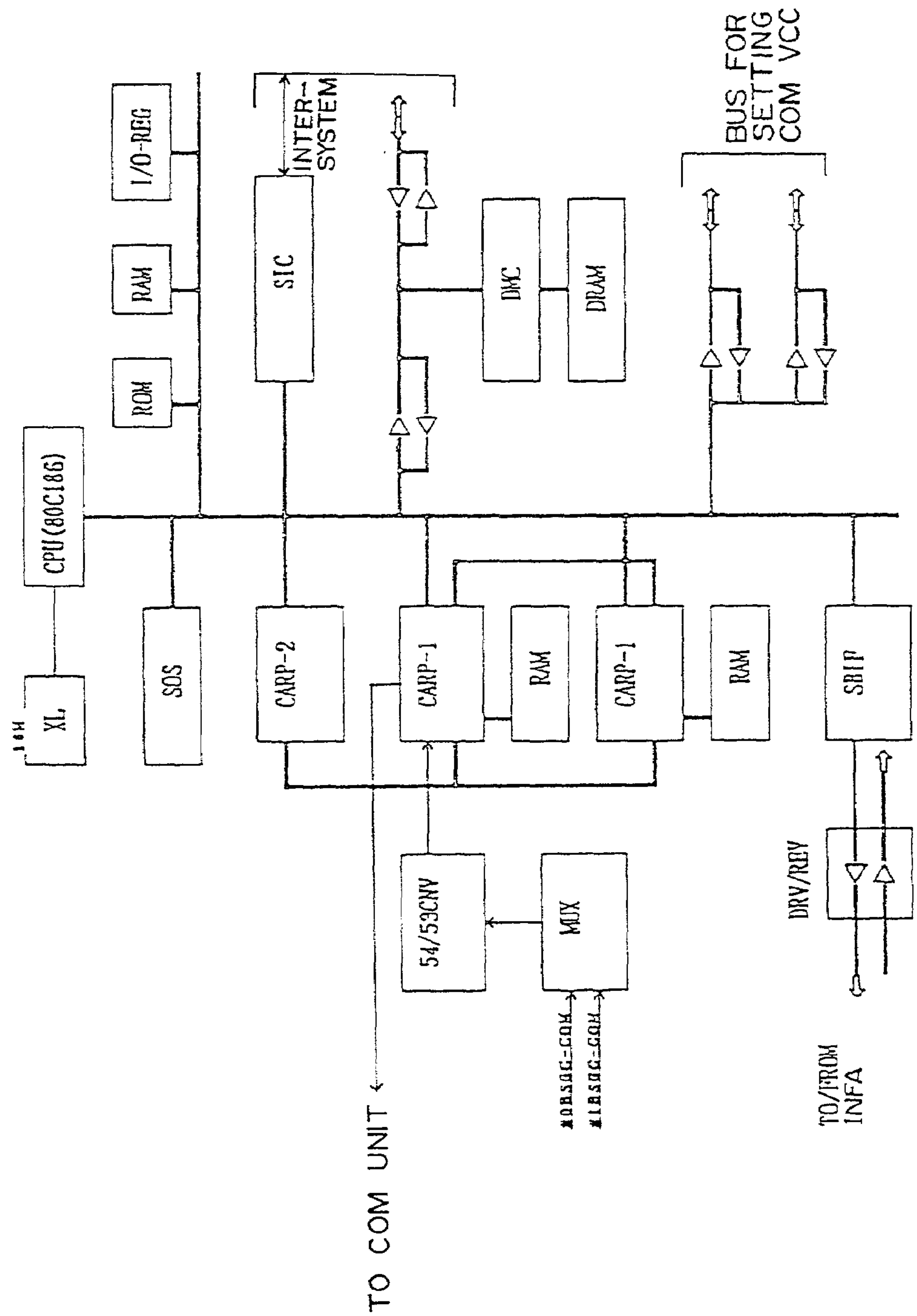

FIG. 770 shows the configuration of the hardware of the BSGC.

FIG. 771 shows the outline of the hardware of the BSGC.

Figure 772:
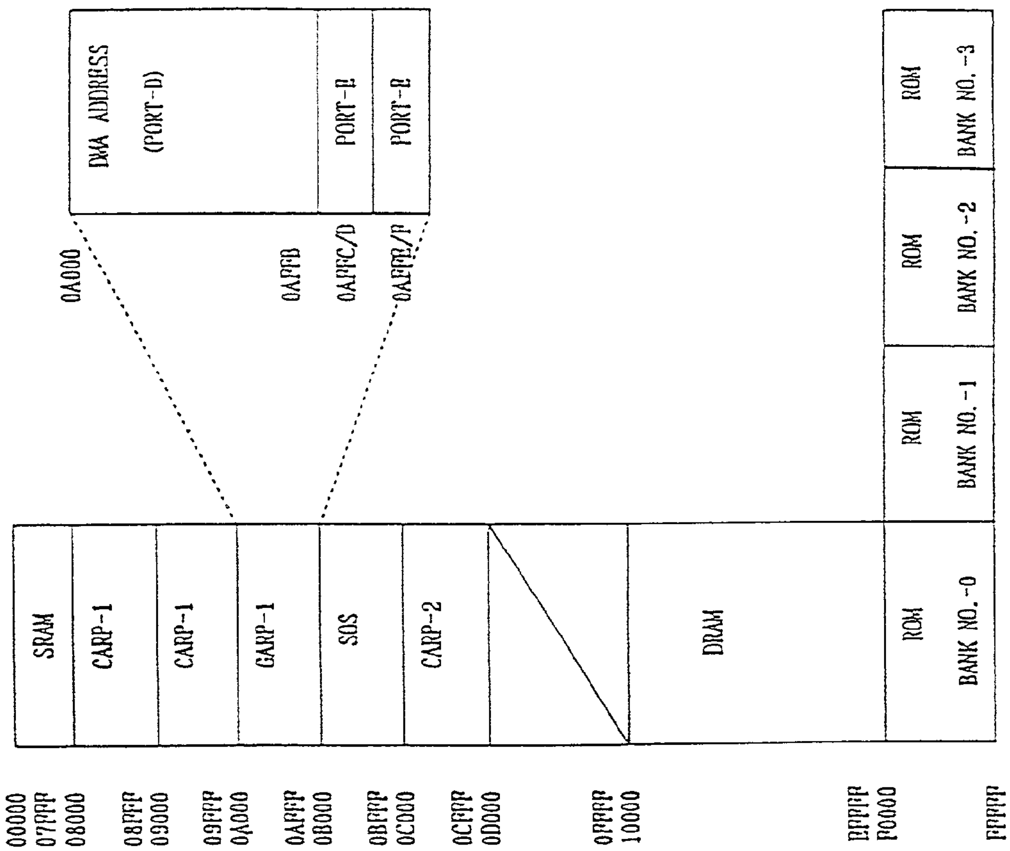

FIG. 772 shows the memory map of the BSGC.

Figure 773:
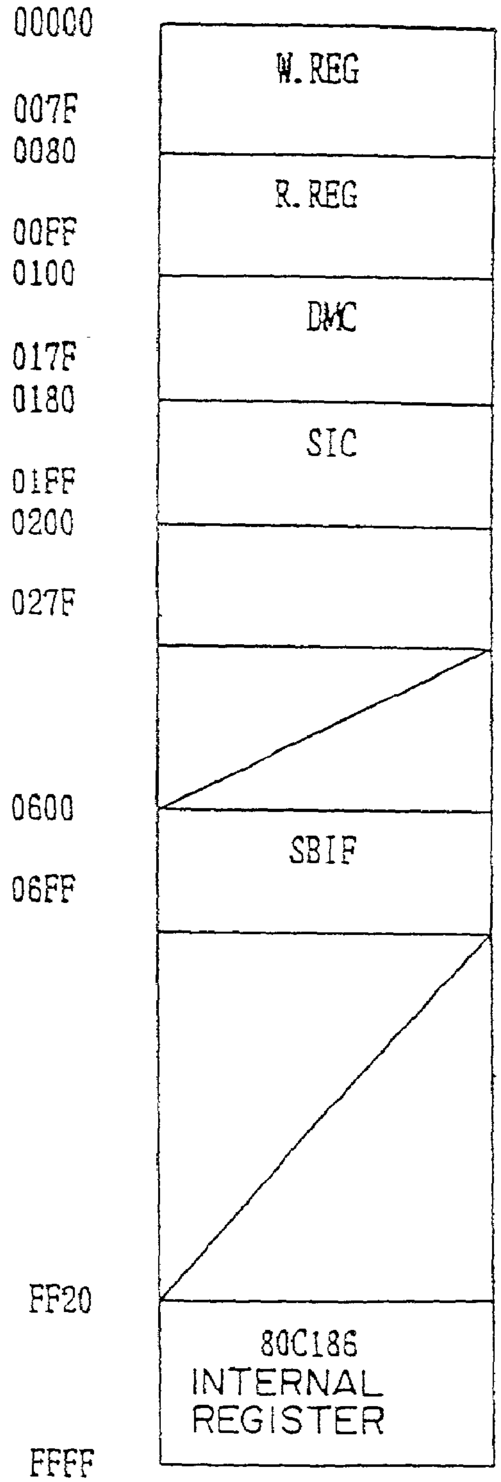

FIG. 773 shows the I/O map of the BSGC.

FIG. 774 shows the BCPR access read/write.

Figure 775:
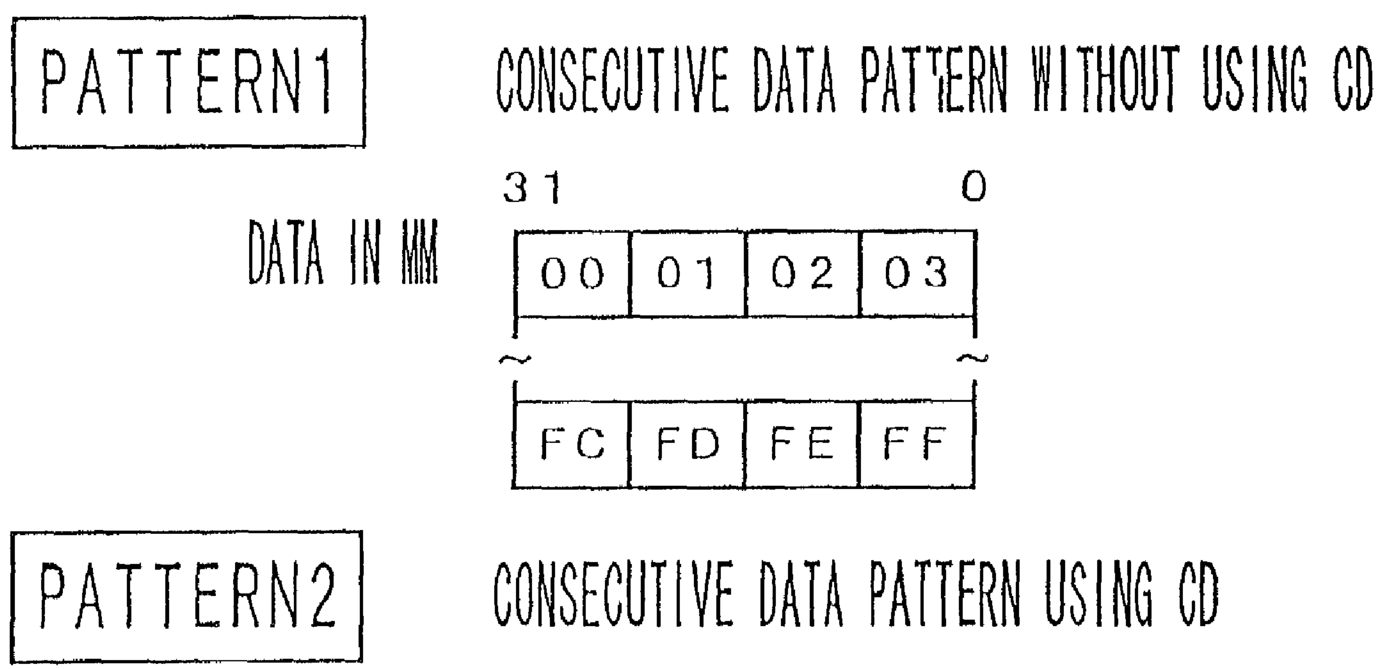

FIG. 775 shows the transfer data pattern.

Figure 776:
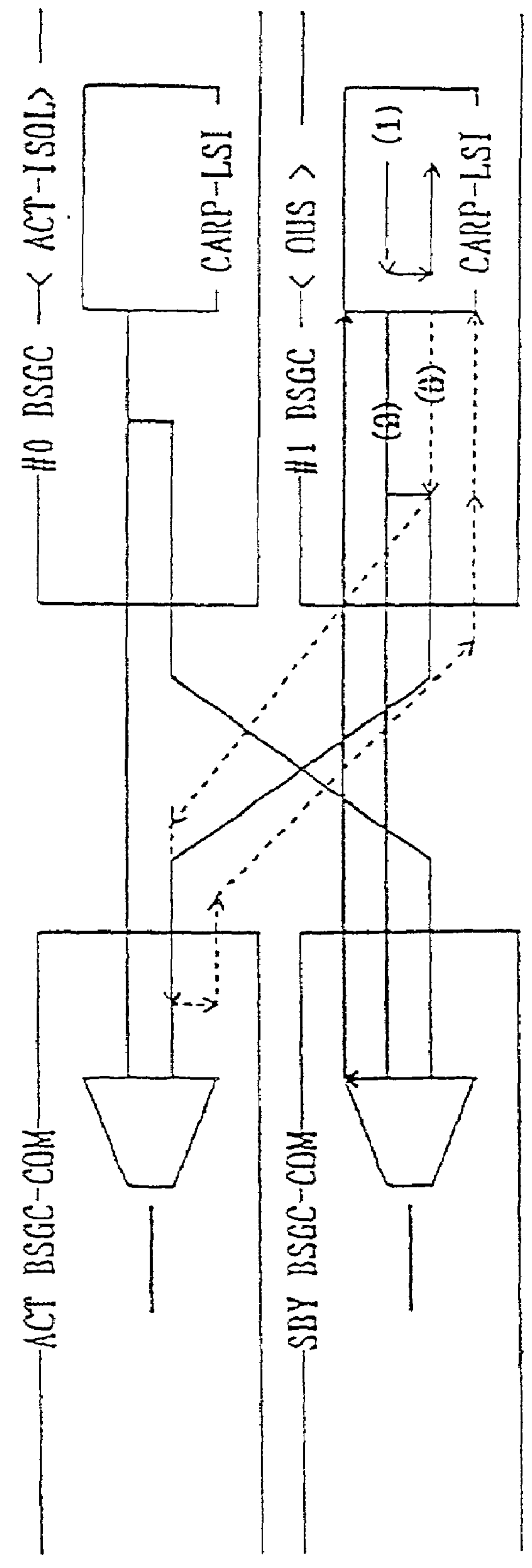

FIG. 776 shows the loop position in the diagnostics between the BSGC and BSGC-COM.

Figure 777:
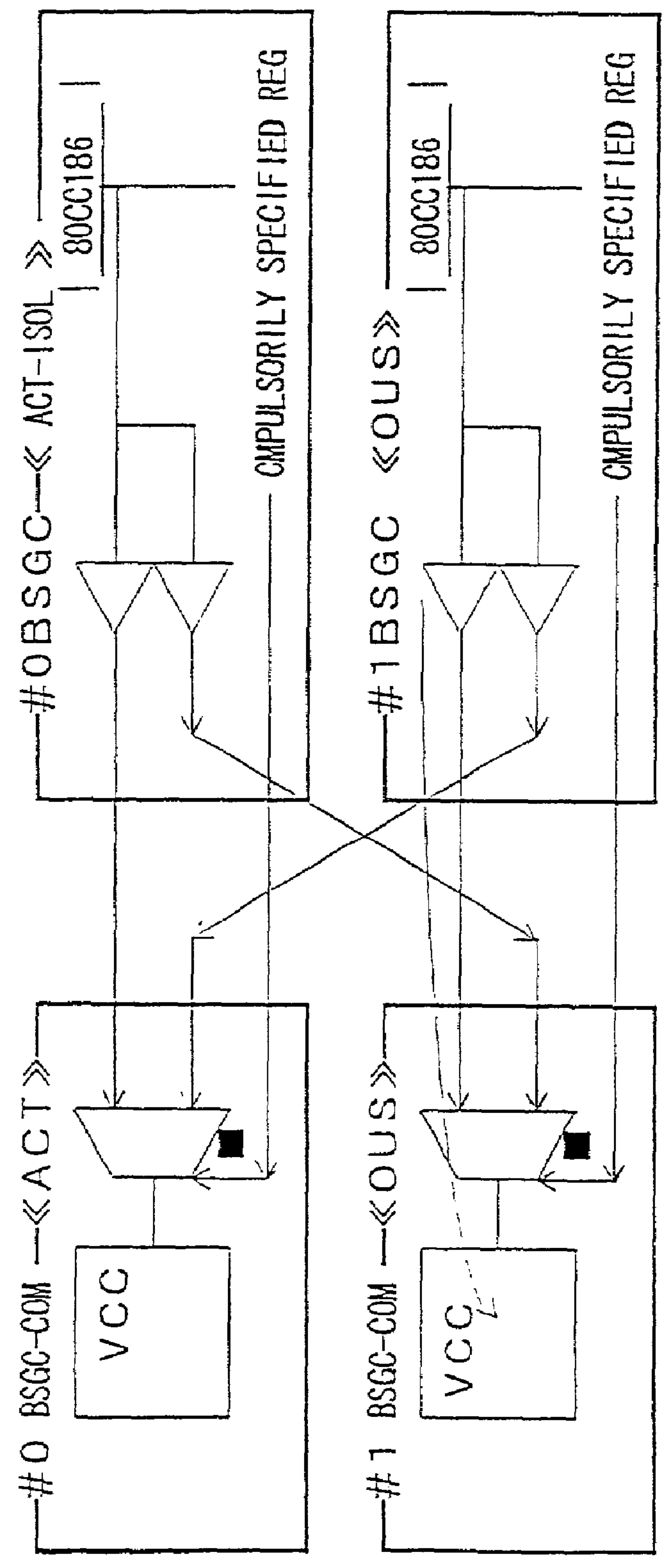

FIG. 777 shows the VCC read/write test state in the diagnostics made in the OUS state of the #1 system BSGC.

FIG. 778 shows the basic policy of the continuity test in the active system/standby system/OUS state in the BSGCSH.

Figure 779:
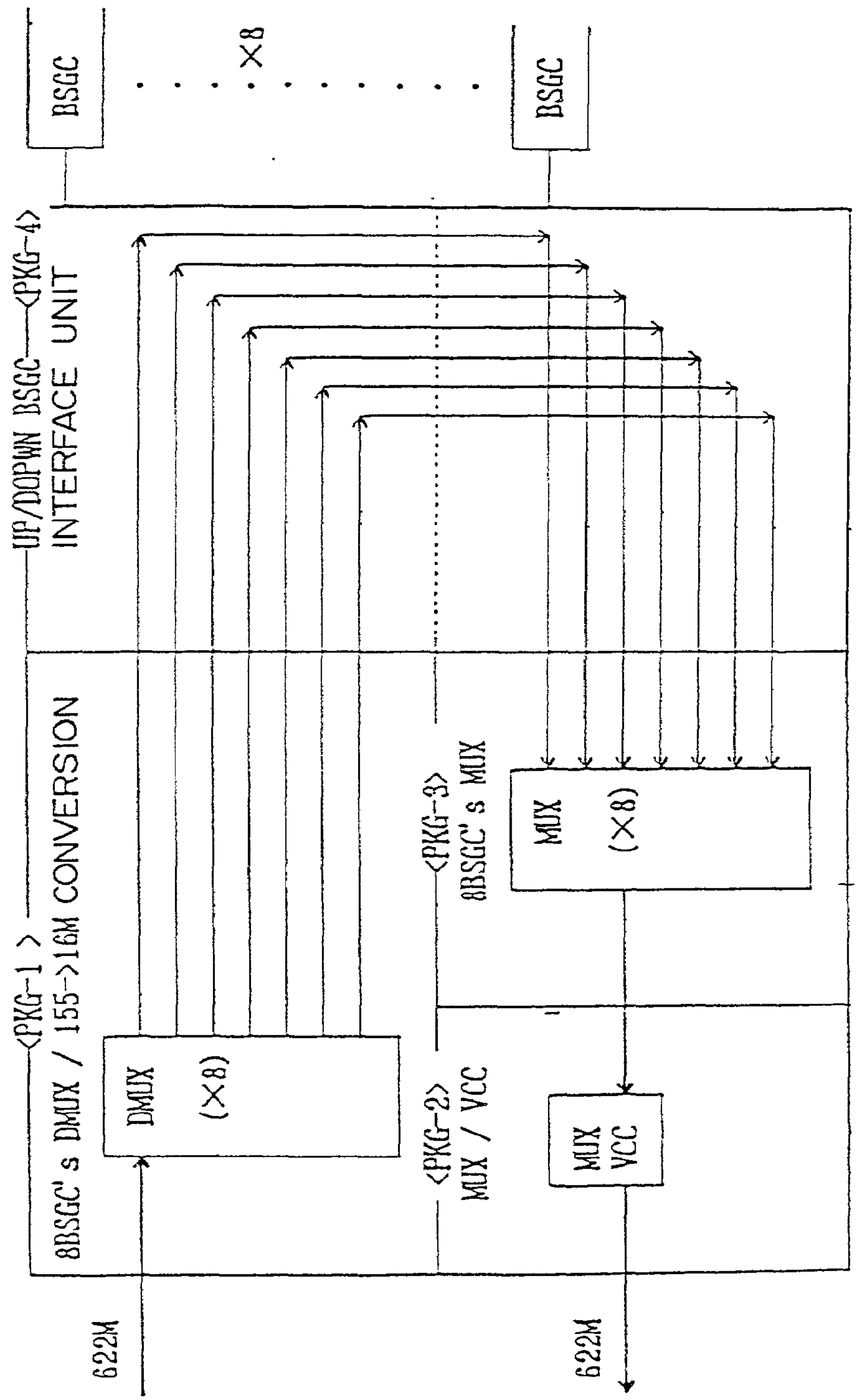

FIG. 779 shows the cell-by-cell loopback position in the BSGCSH-COM.

Figure 780:
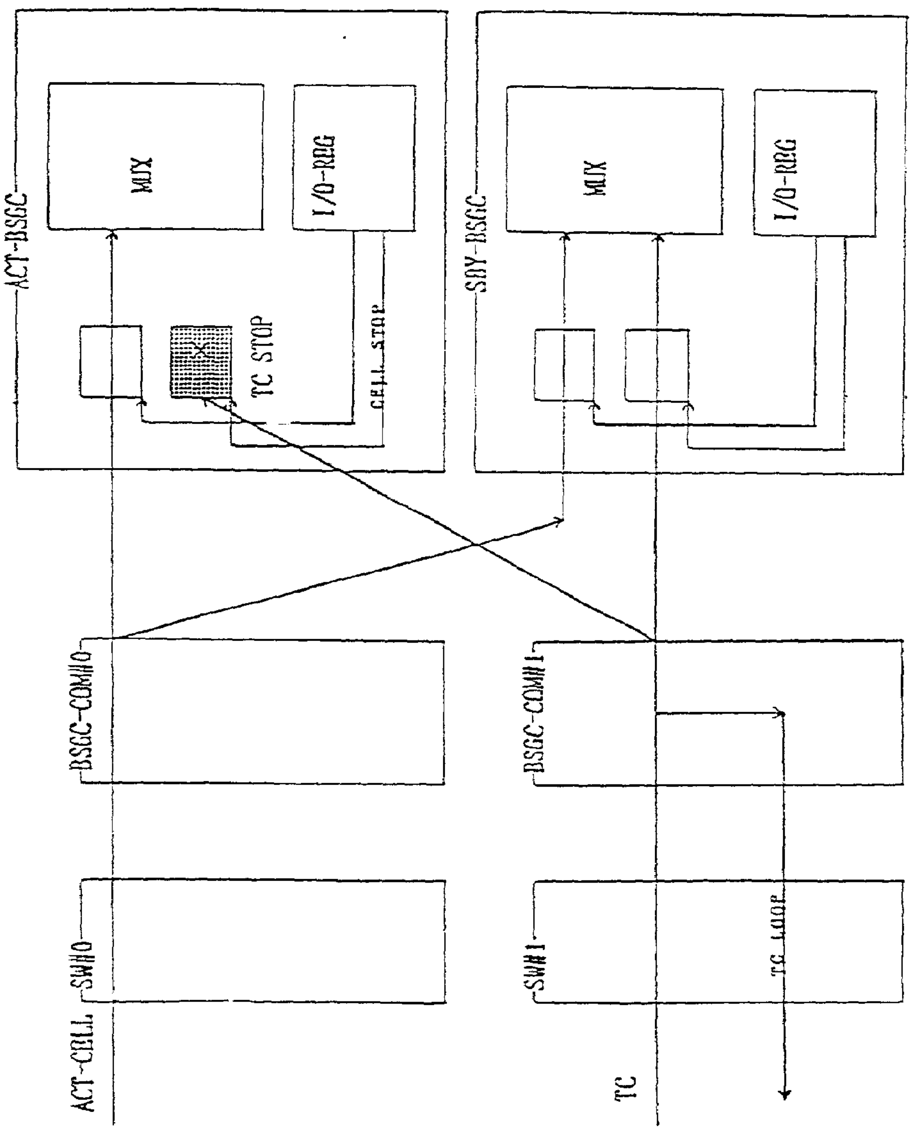

FIG. 780 shows the configuration of the hardware of the TC stop function in the BSGC of the active system during the test.

Figure 781:
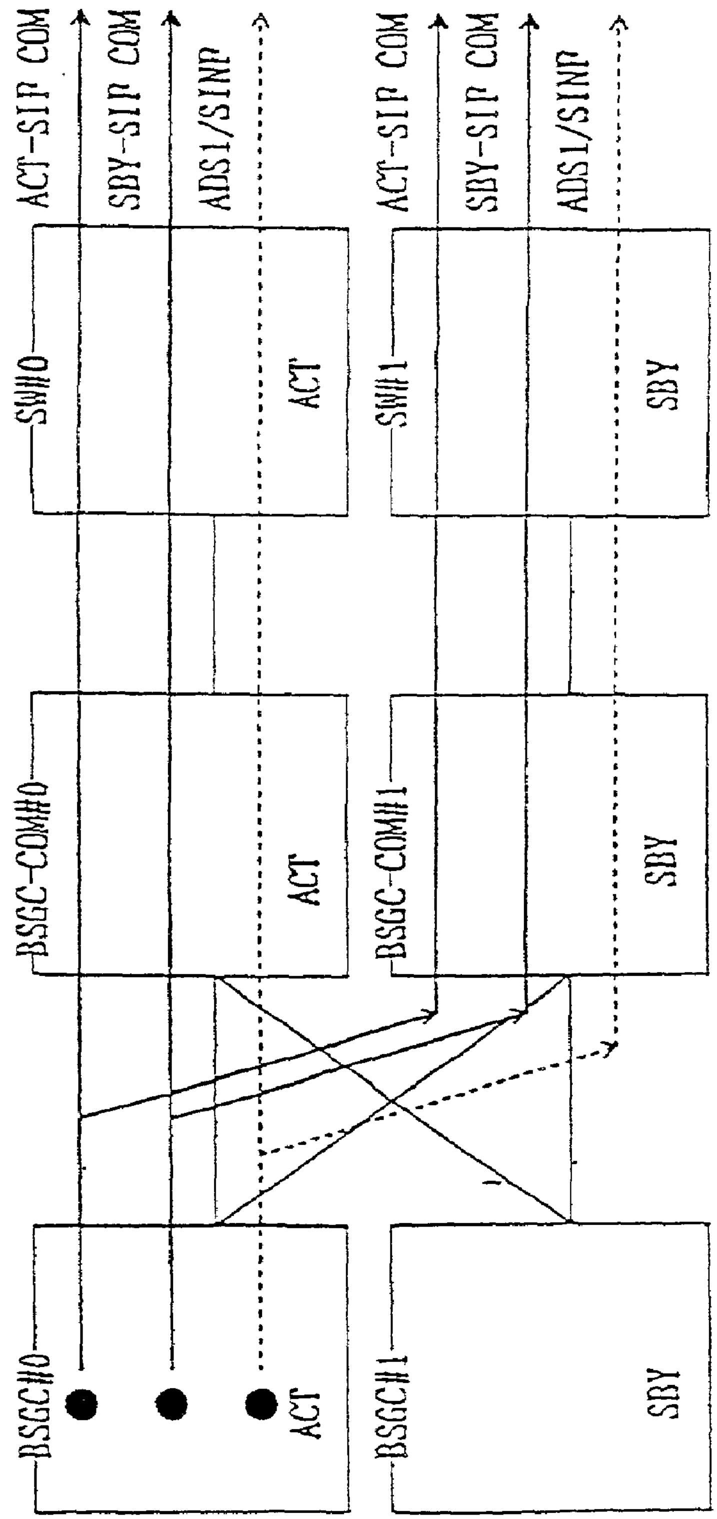

FIG. 781 shows the signal transmission route from the BSGC to the duplex or simplex device.

Figure 782:
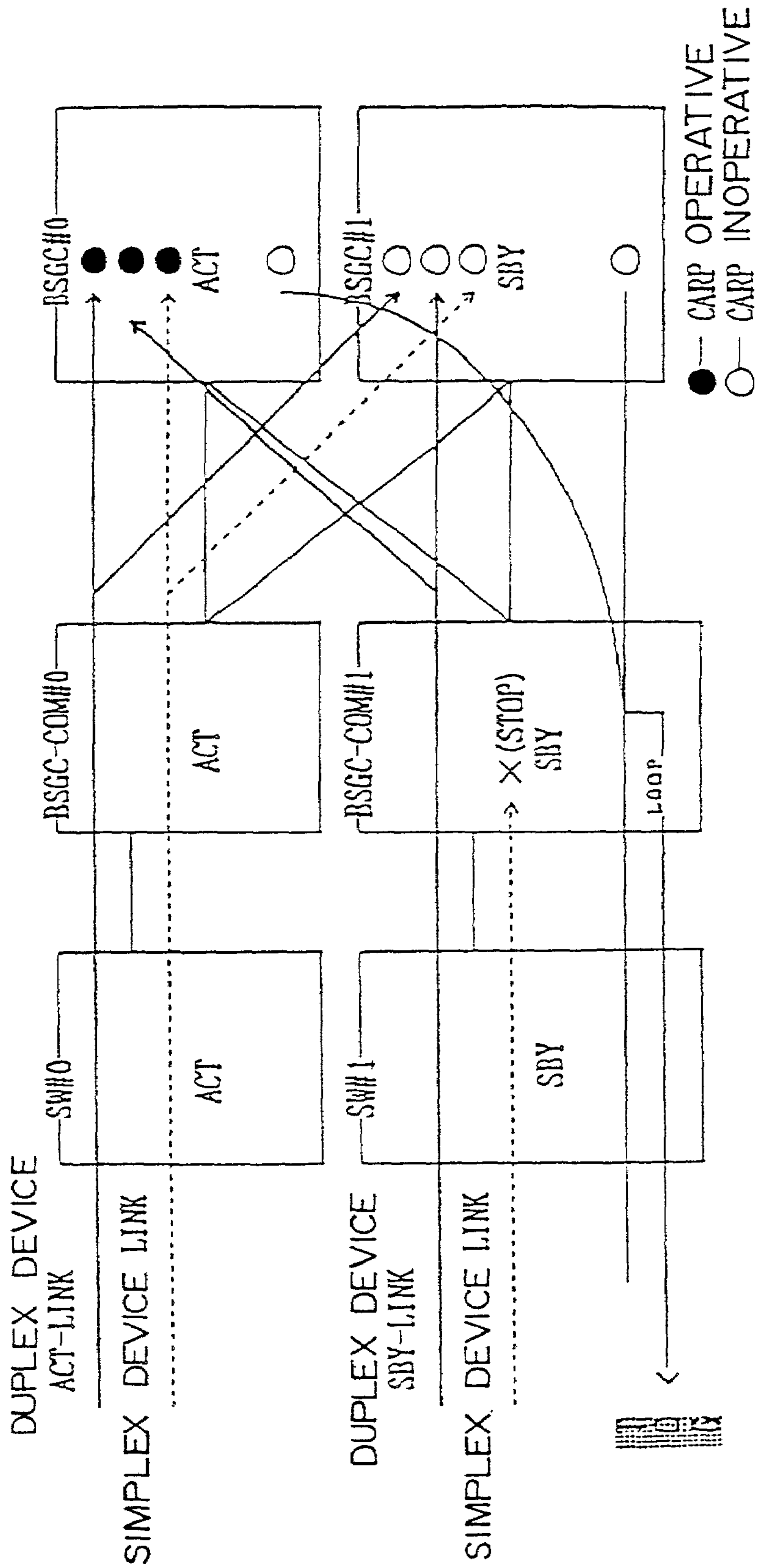

FIG. 782 shows the signal receiving route from the duplex or simplex device to the BSGC.

Figure 783:
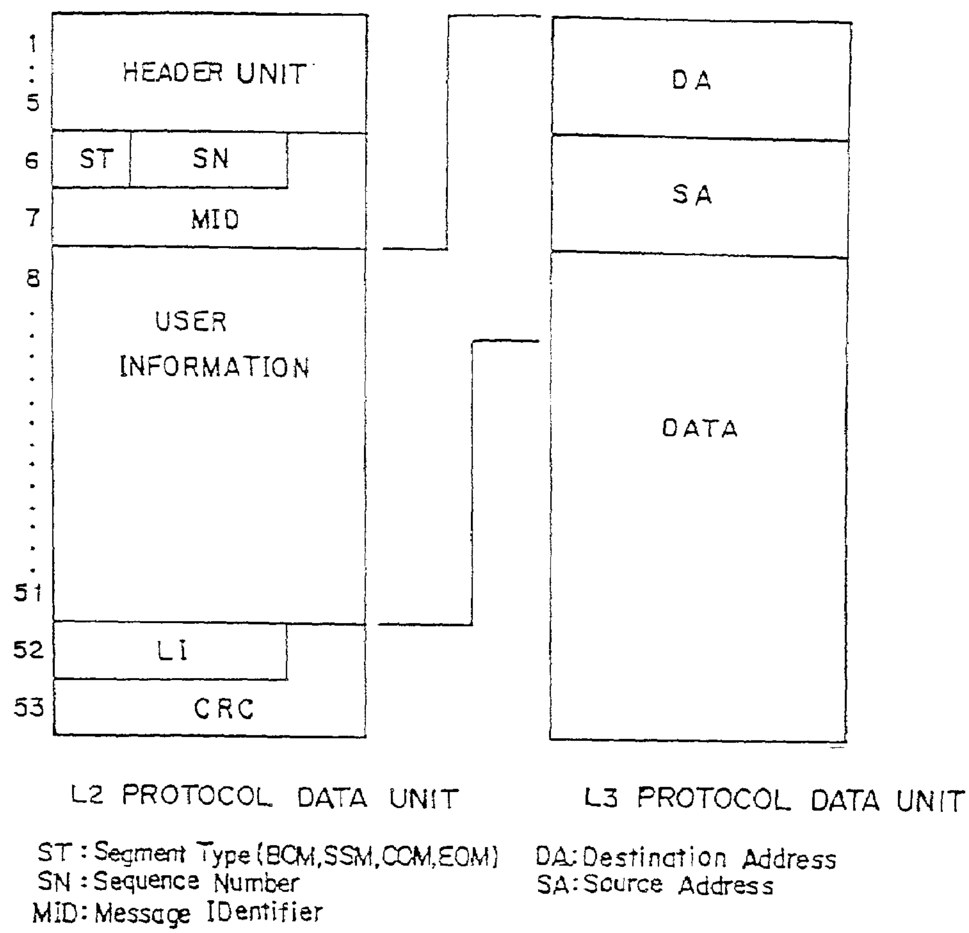

FIG. 783 shows the format of the L2-PDU and L3-PDU.

Figure 784:
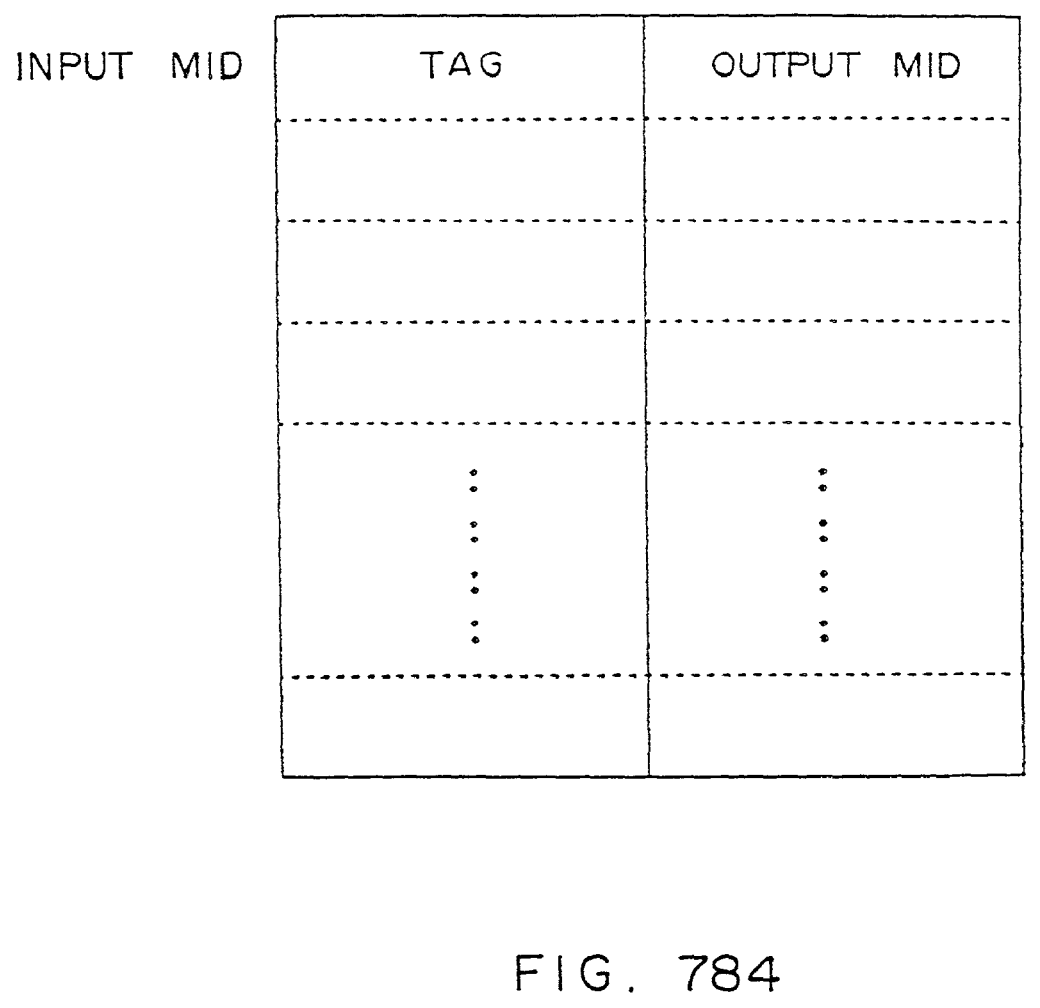

FIG. 784 shows the table storing tag information and output MID using an input MID as a key.

Figure 785:
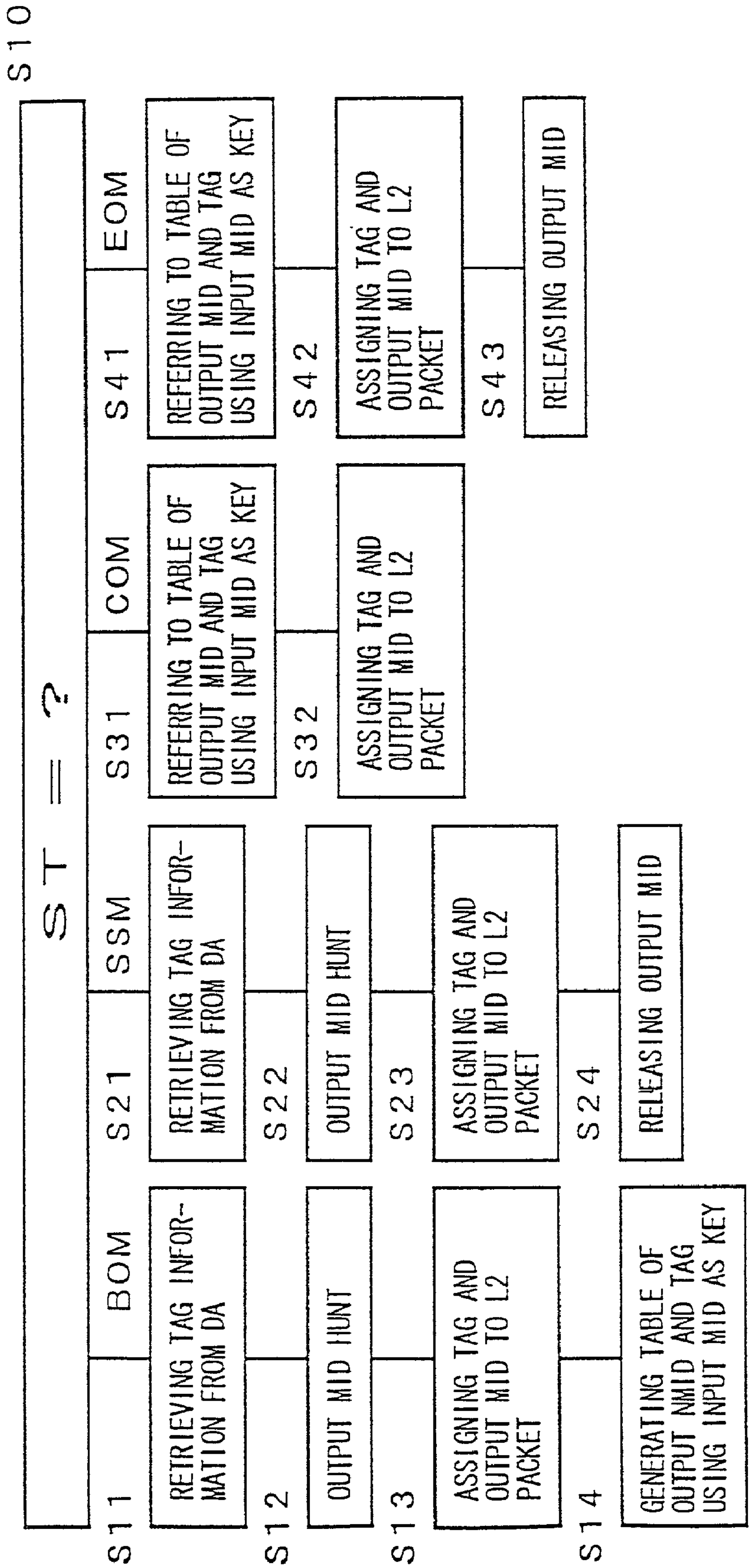

FIG. 785 is a flowchart showing the process of retrieving tag information and output MID using an input MID as a key.

Figure 786:
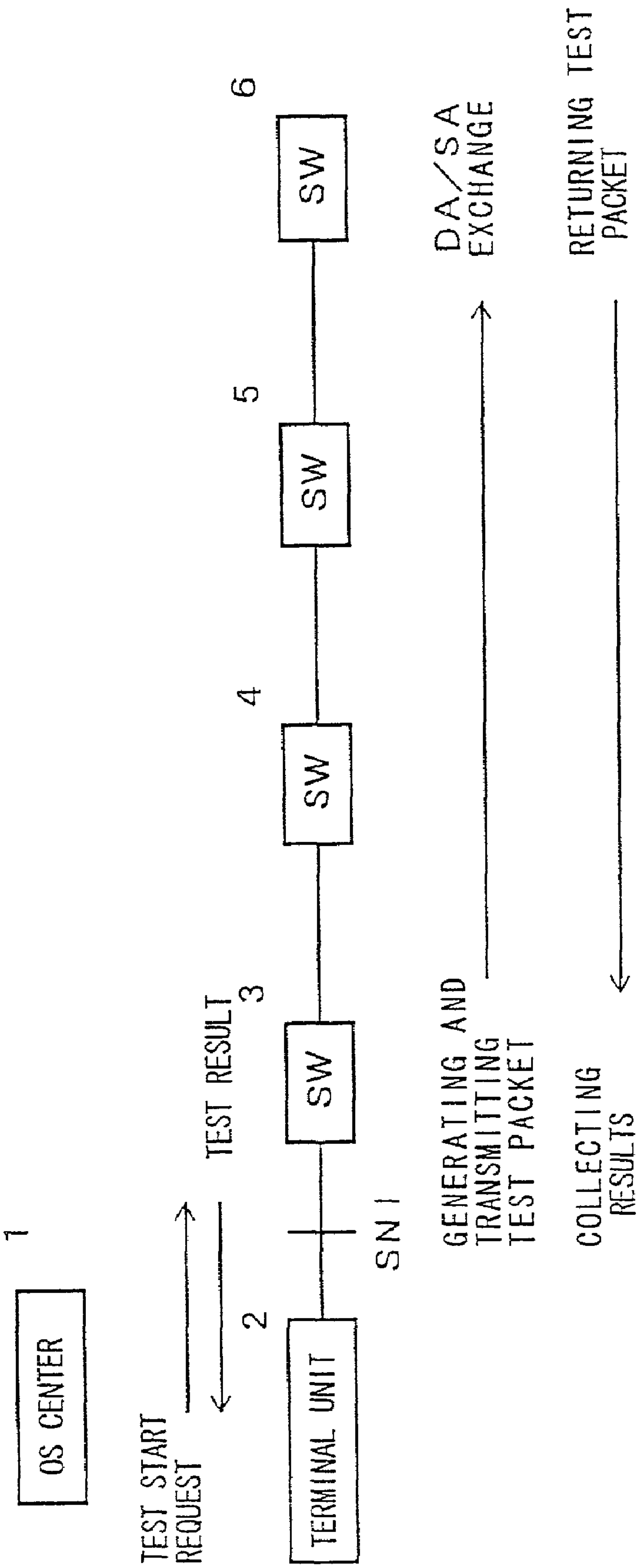

FIG. 786 shows the method of testing a loopback between stations according to the present invention.

Figure 787:
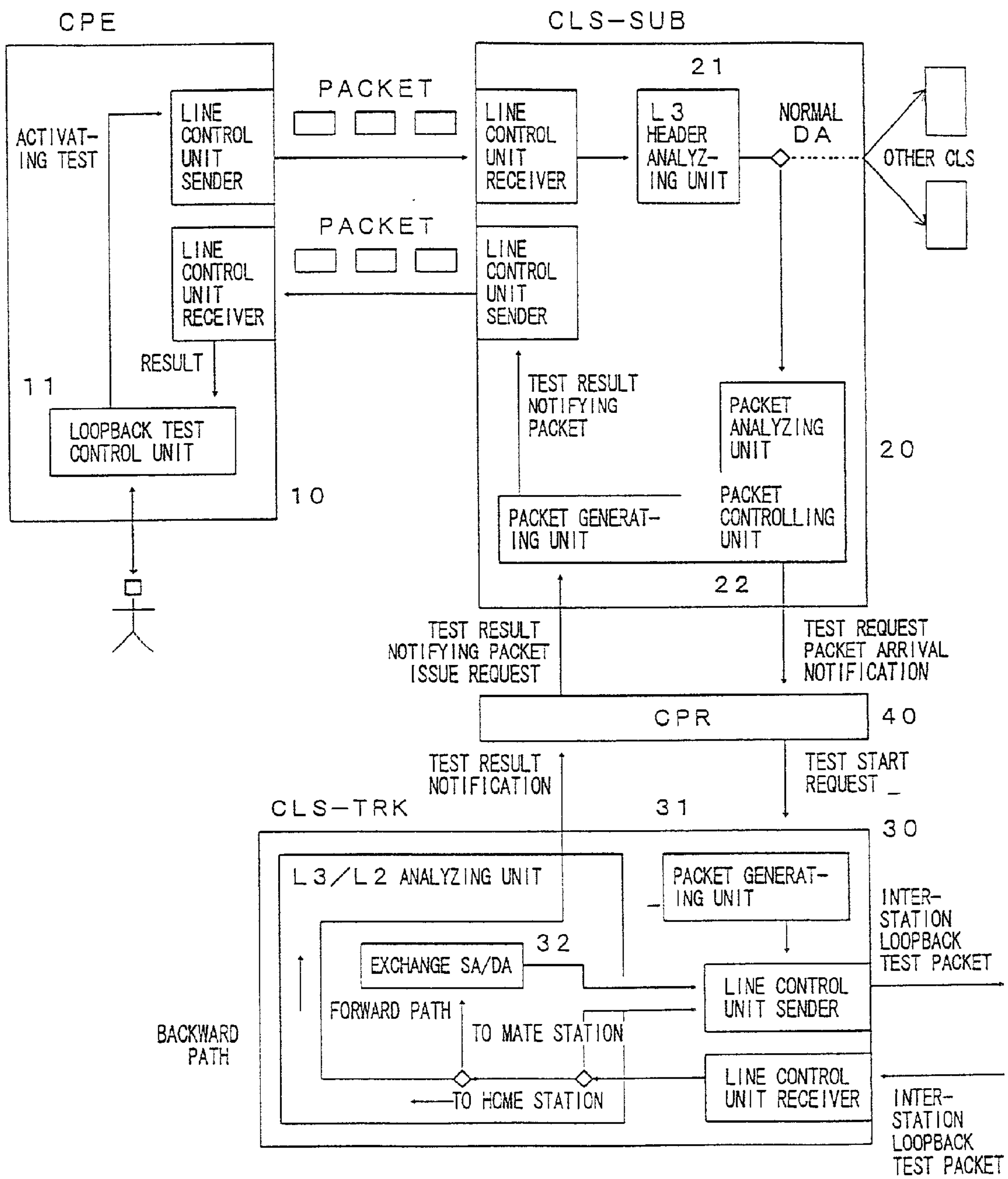

FIG. 787 is a block diagram showing the configuration with which an inter-station loopback test shown in FIG. 786 is conducted.

Figure 788:
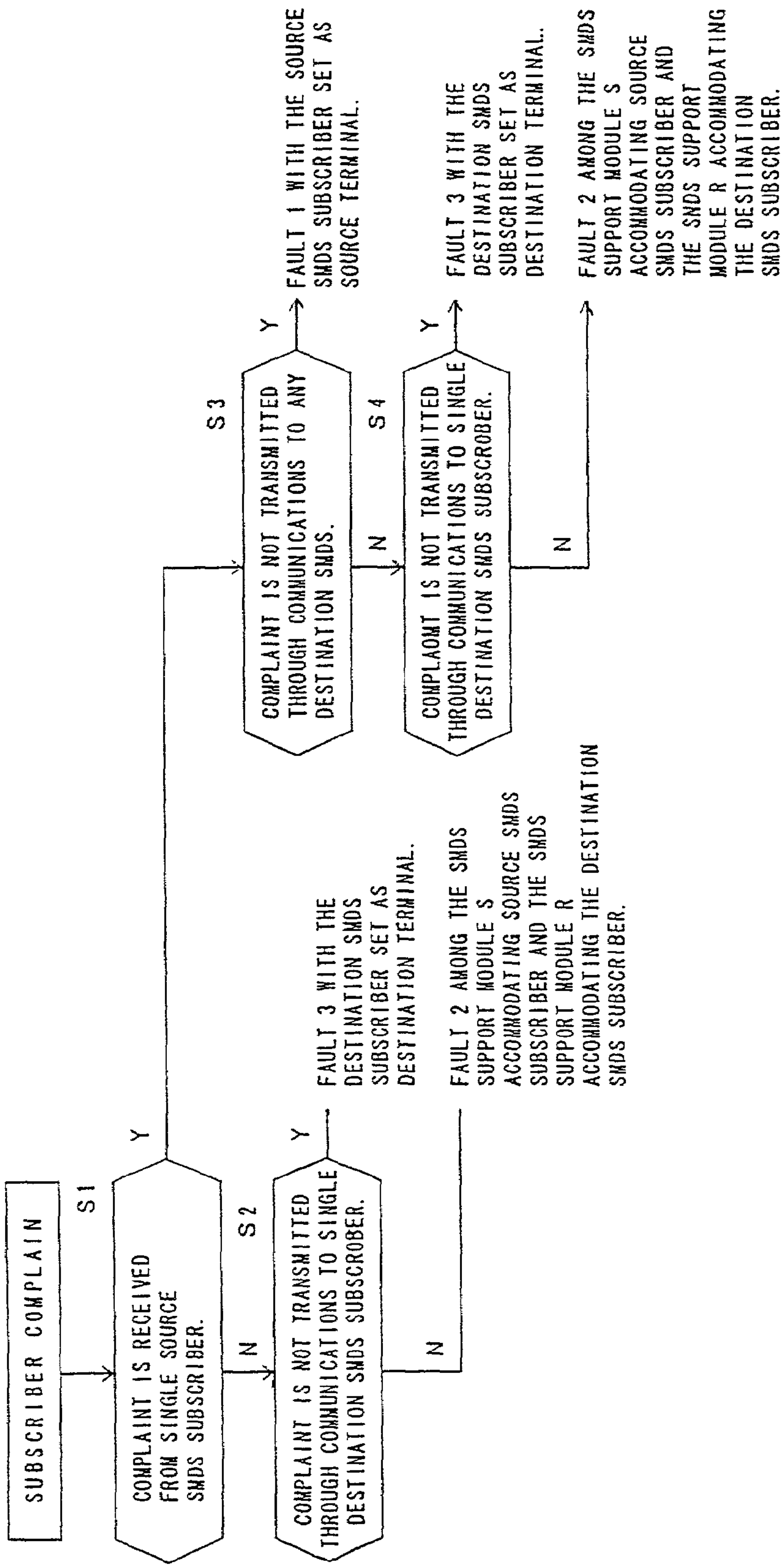

FIG. 788 is a flowchart showing the algorithm limiting the faulty point according to the complaint from the subscriber.

Figure 789:
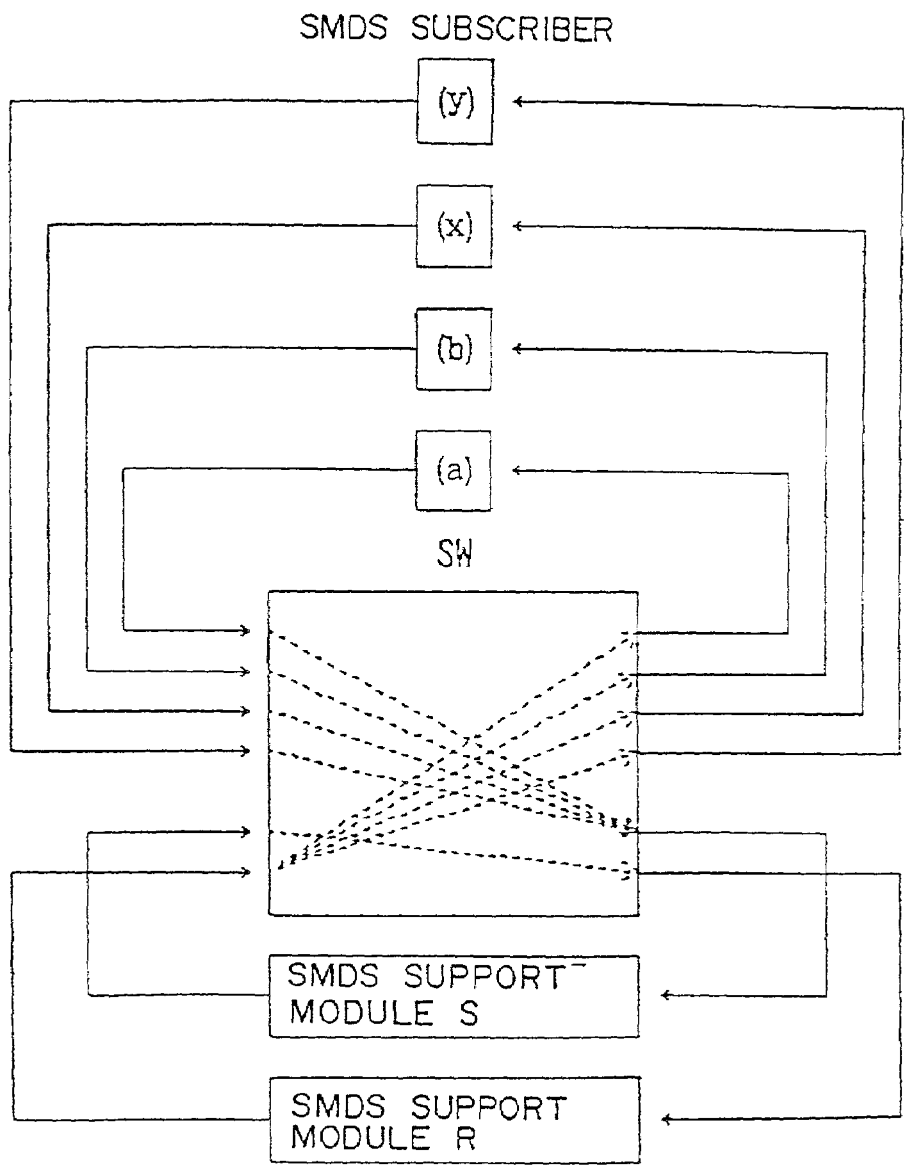

FIG. 789 shows the configuration of the system using the SMDS.

Figure 790:
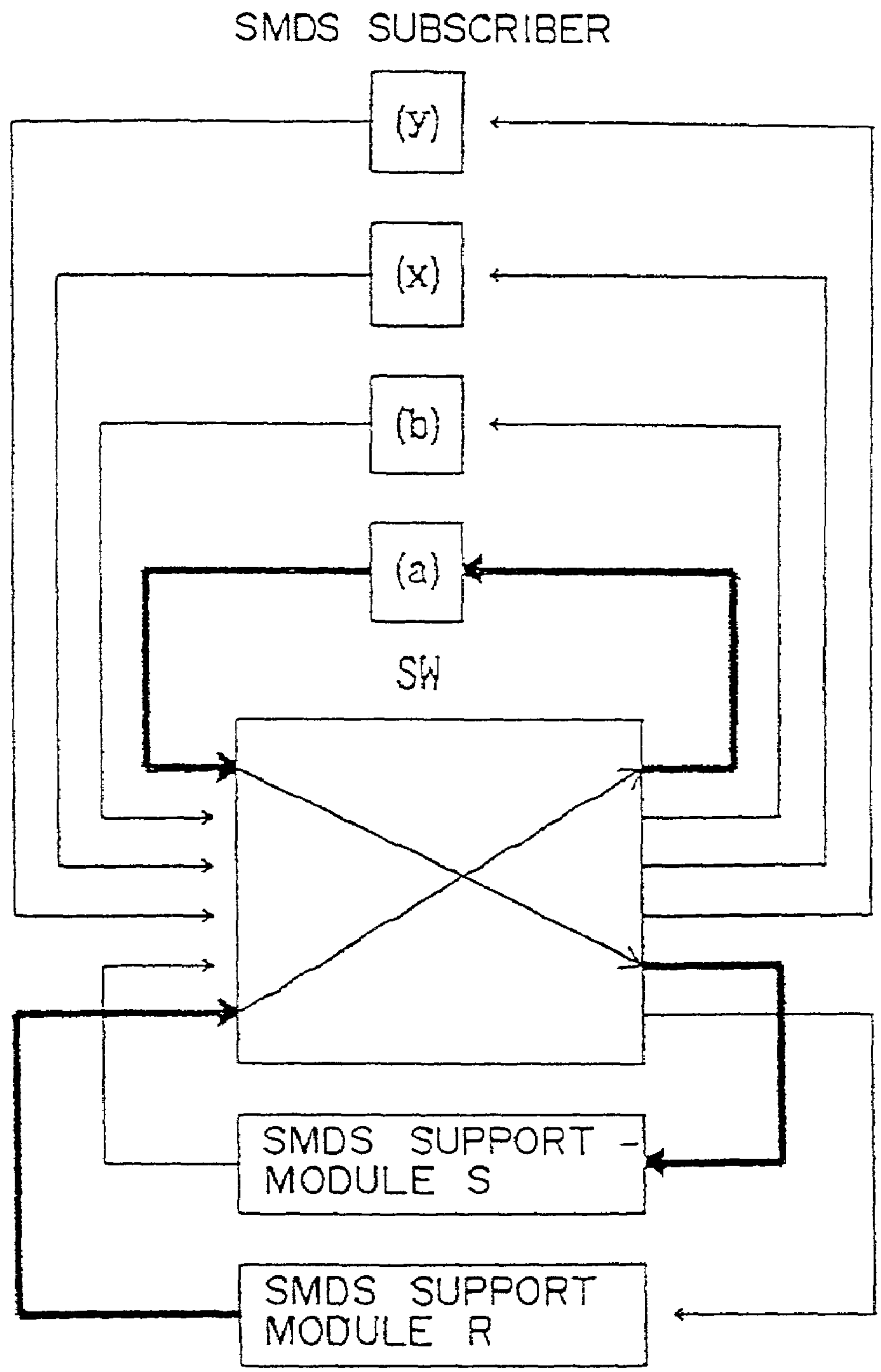

FIG. 790 shows the transfer route (1) of the test message transmitted at the PVC test between the subscriber and the SMDS support module.

Figure 791:
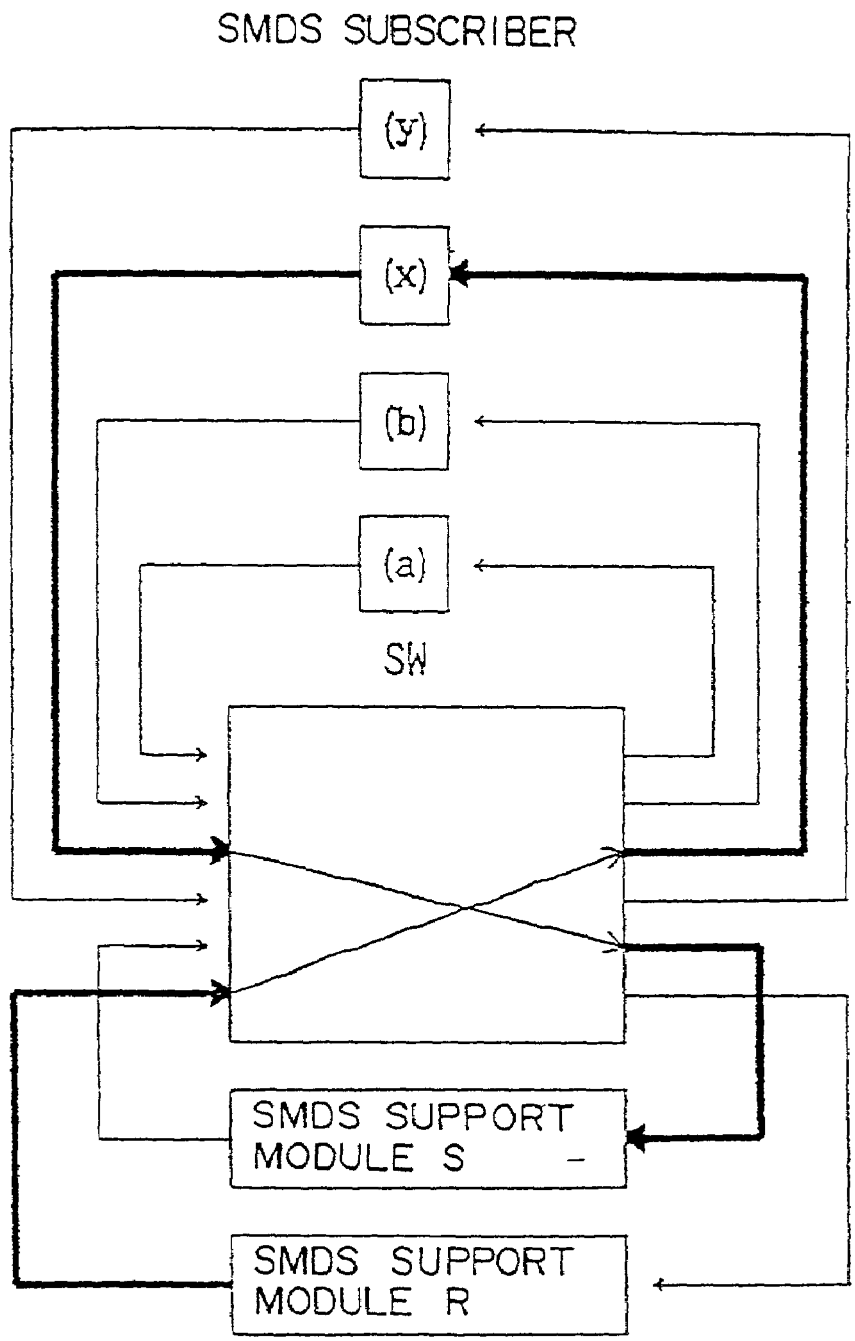

FIG. 791 shows the transfer route (2) of the test message transmitted at the PVC test between the subscriber and the SMDS support module.

Figure 792:
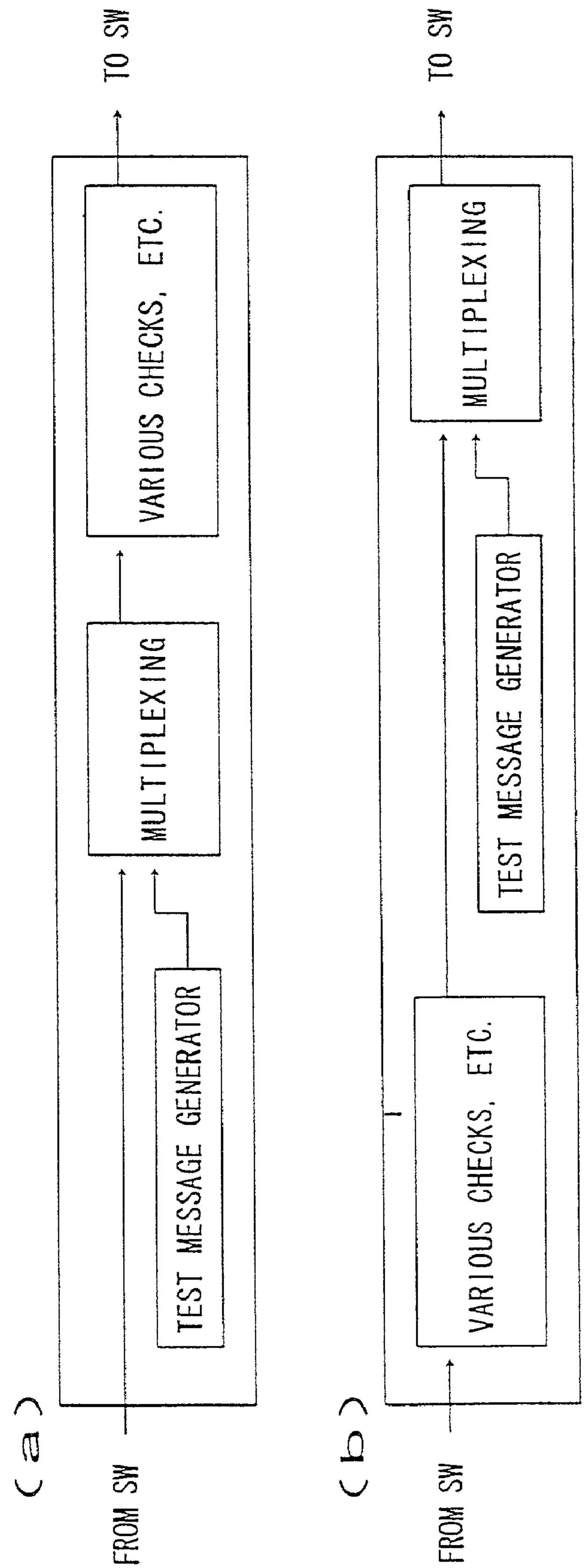

FIG. 792 shows the position at which a test message is multiplexed in the SMDS support module.

Figure 793:
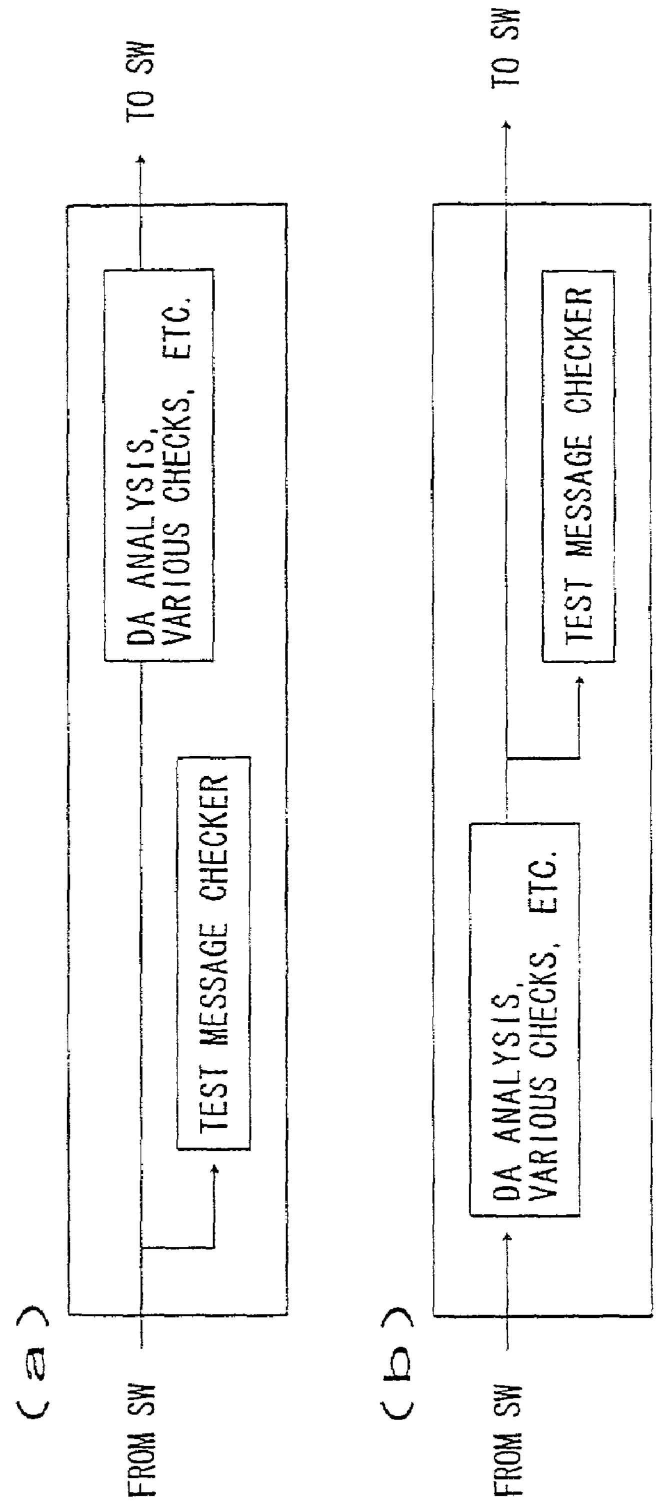

FIG. 793 shows the position at which a test message is checked in the SMDS support module.

Figure 794:
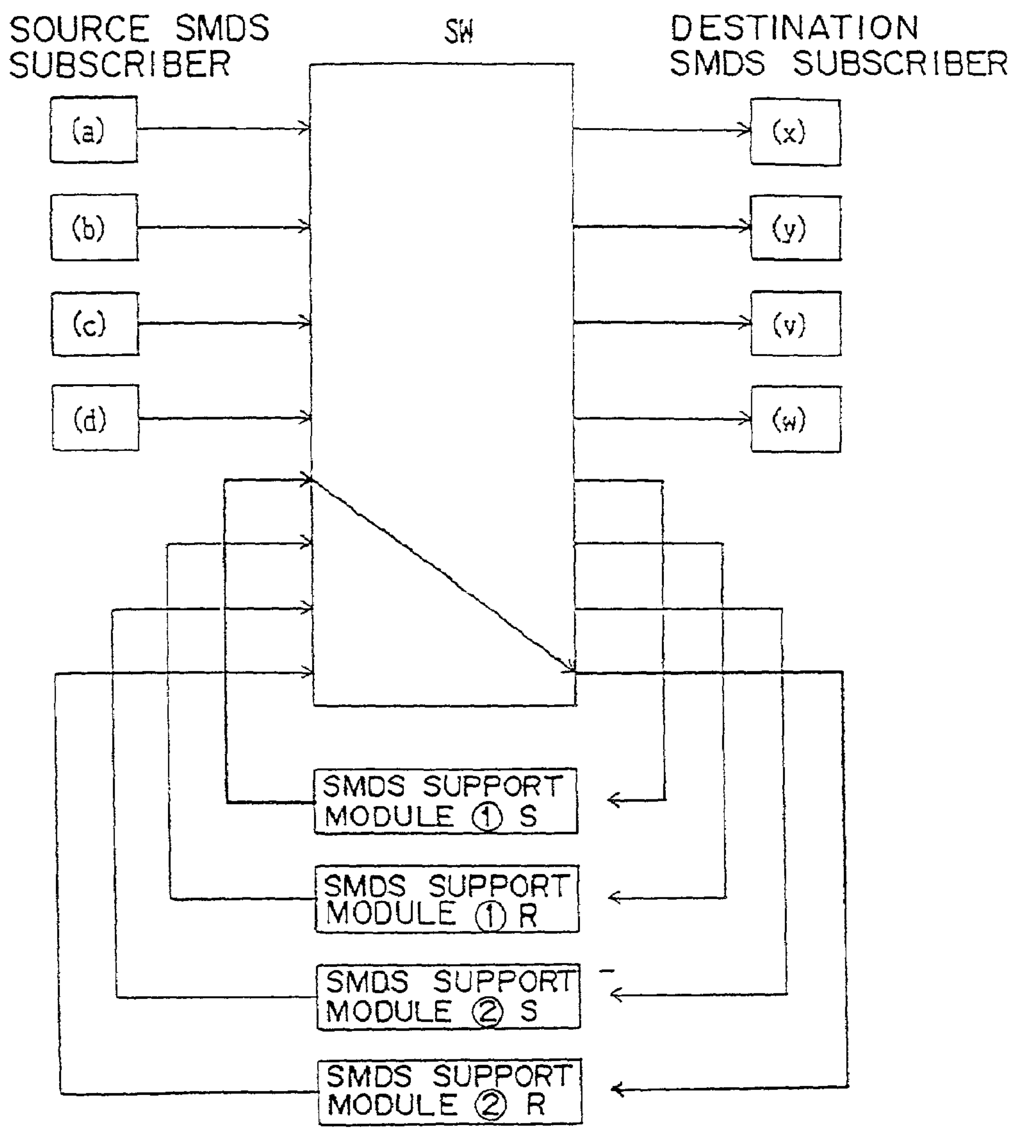

FIG. 794 shows the transfer route of a test message transmitted in the PVC test between SMDS support modules.

Figure 795:
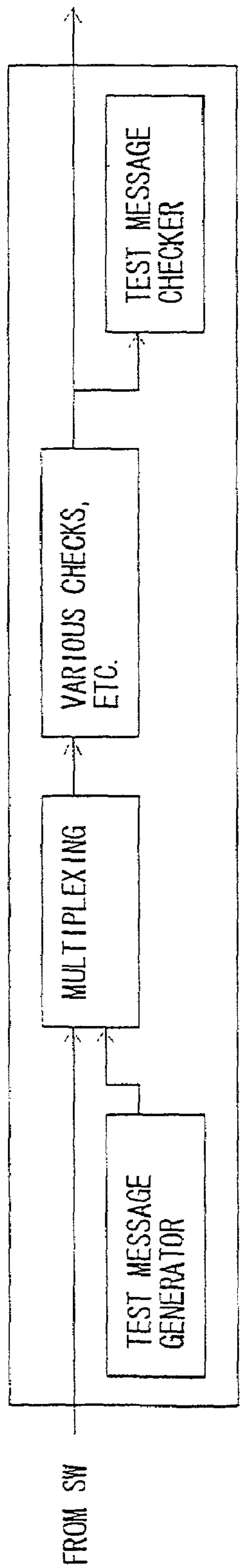

FIG. 795 is a block diagram showing the configuration of the SMDS support module provided with the test message generating unit and test message check unit.

Figure 796:
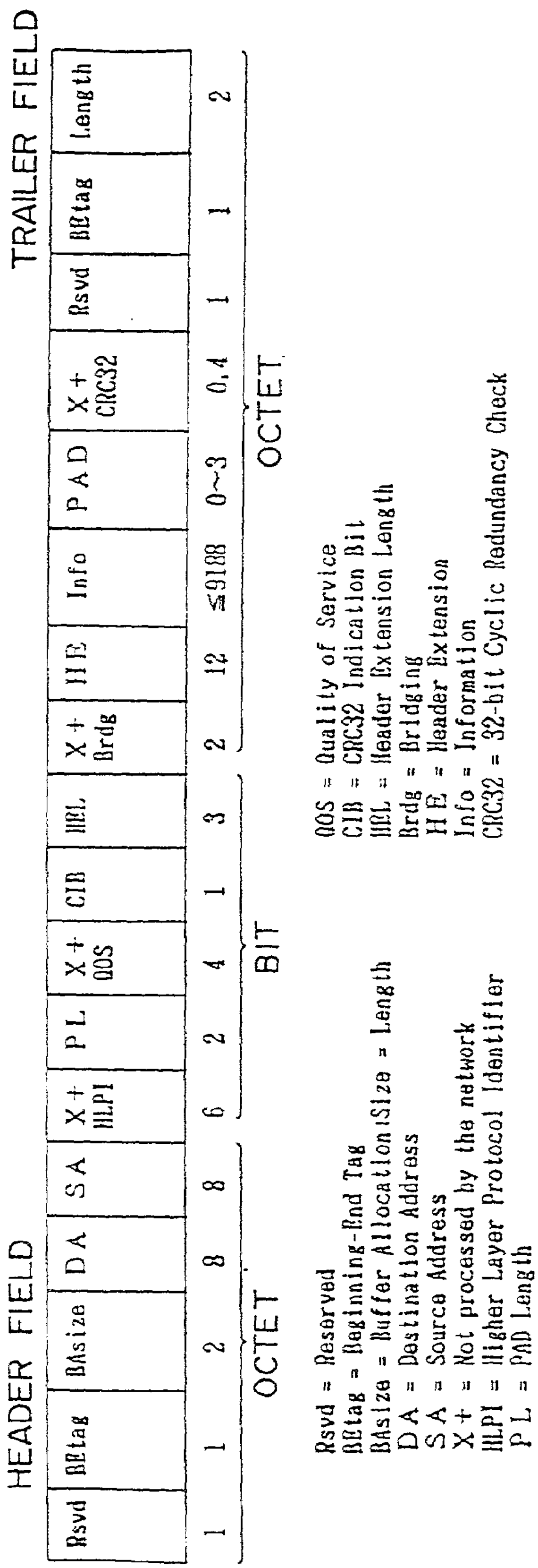

FIG. 796 shows the format of the L3-PDU.

Figure 797:
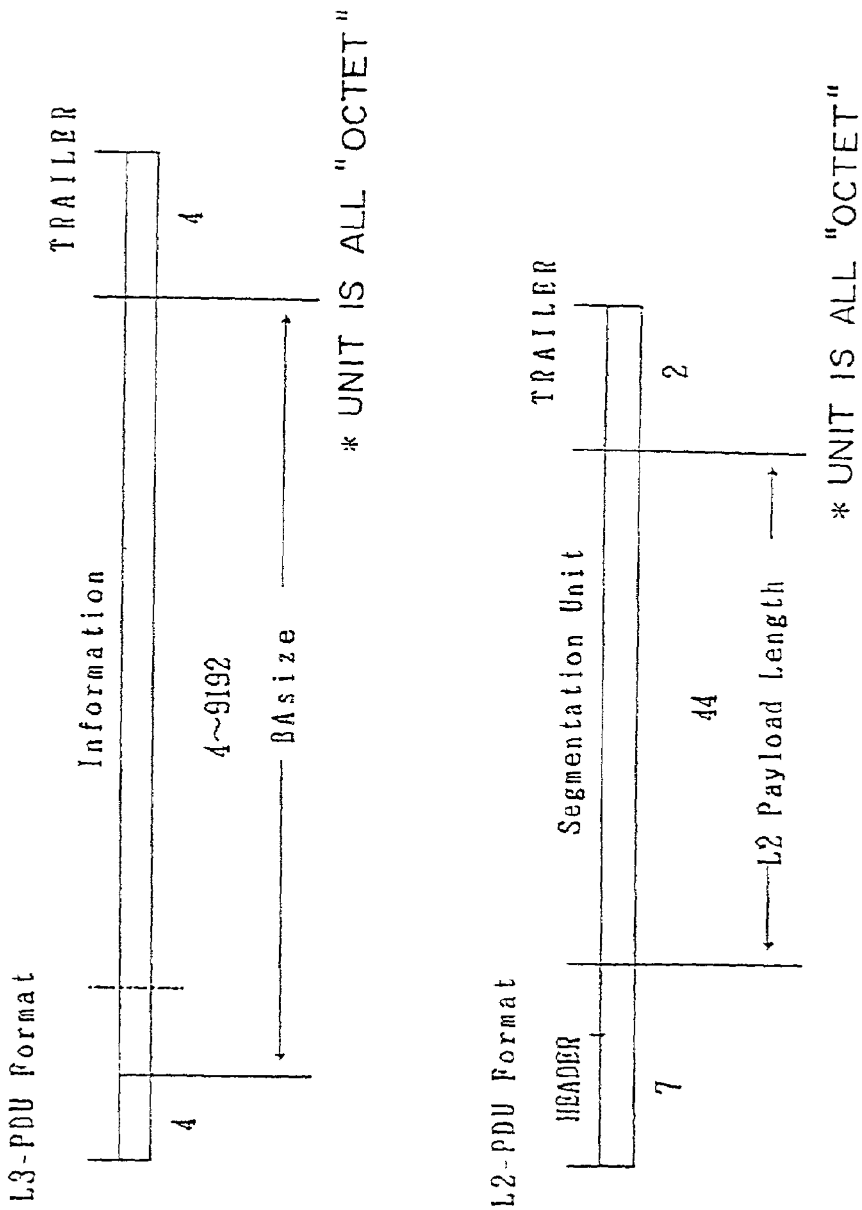

FIG. 797 shows the relationship between the L2-PDU and L3-PDU.

FIG. 798 is a flowchart of checking the payload length of the L2-PDU.

Figure 799:
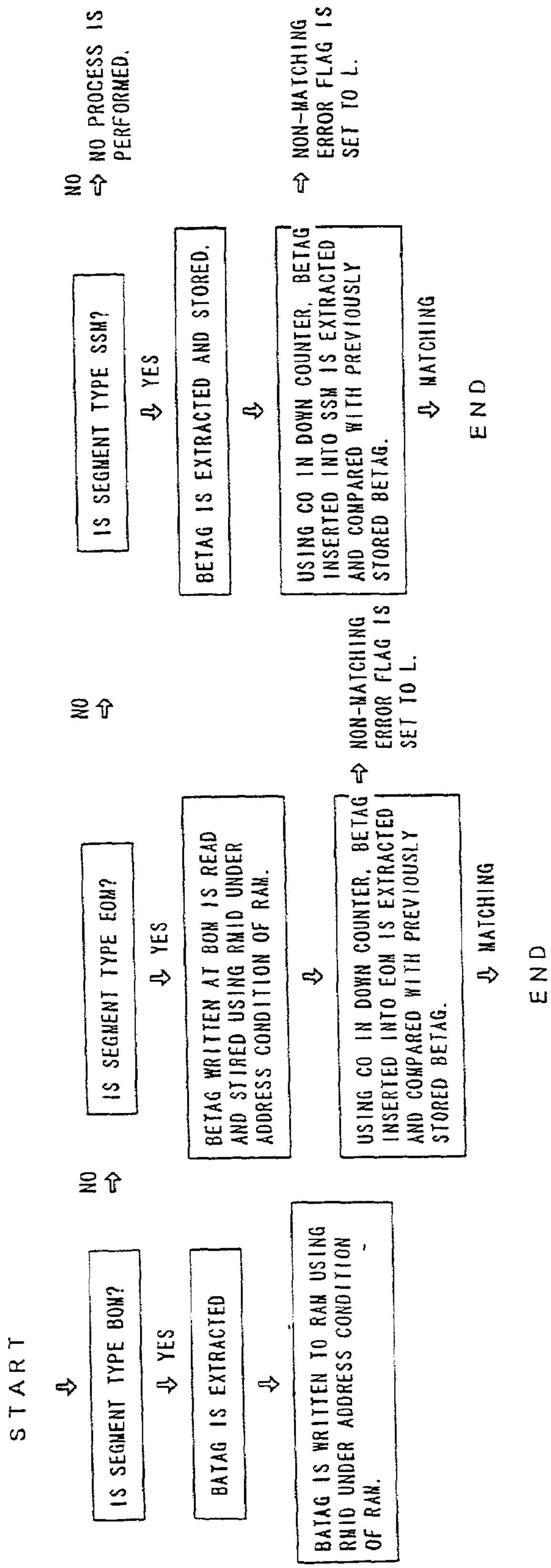

FIG. 799 is a flowchart of the BEtag check of the L3-PDU.

Figure 800:
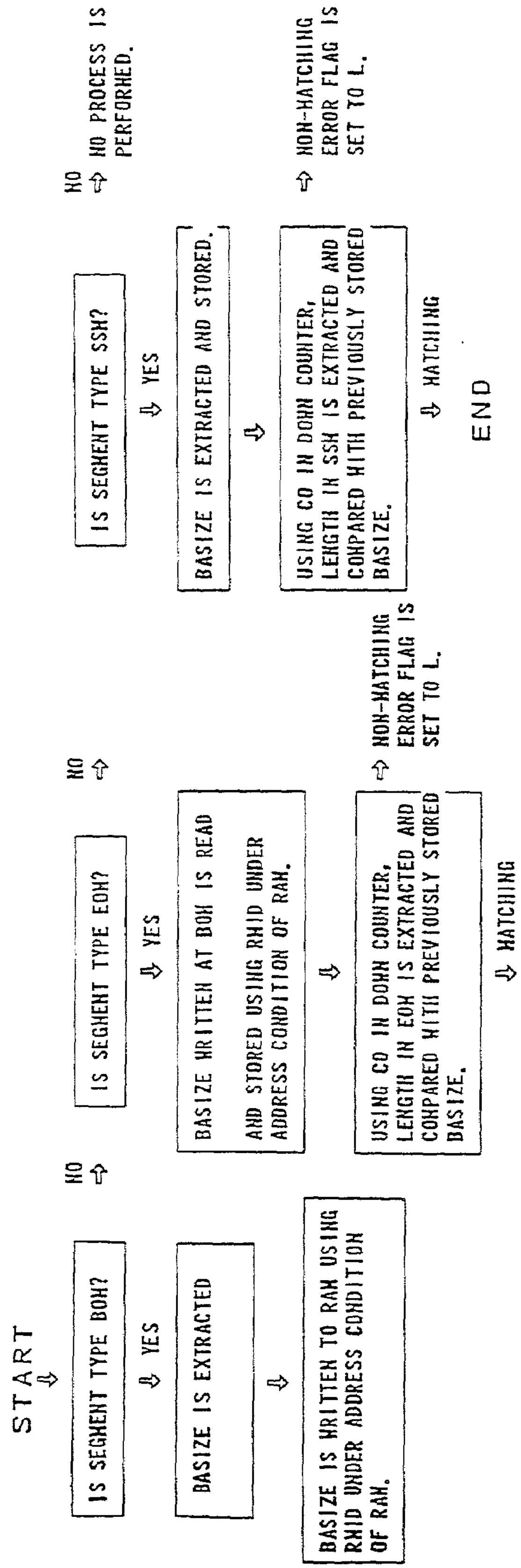

FIG. 800 is a flowchart of the BAsize check of the L3-PDU.

Figure 801:
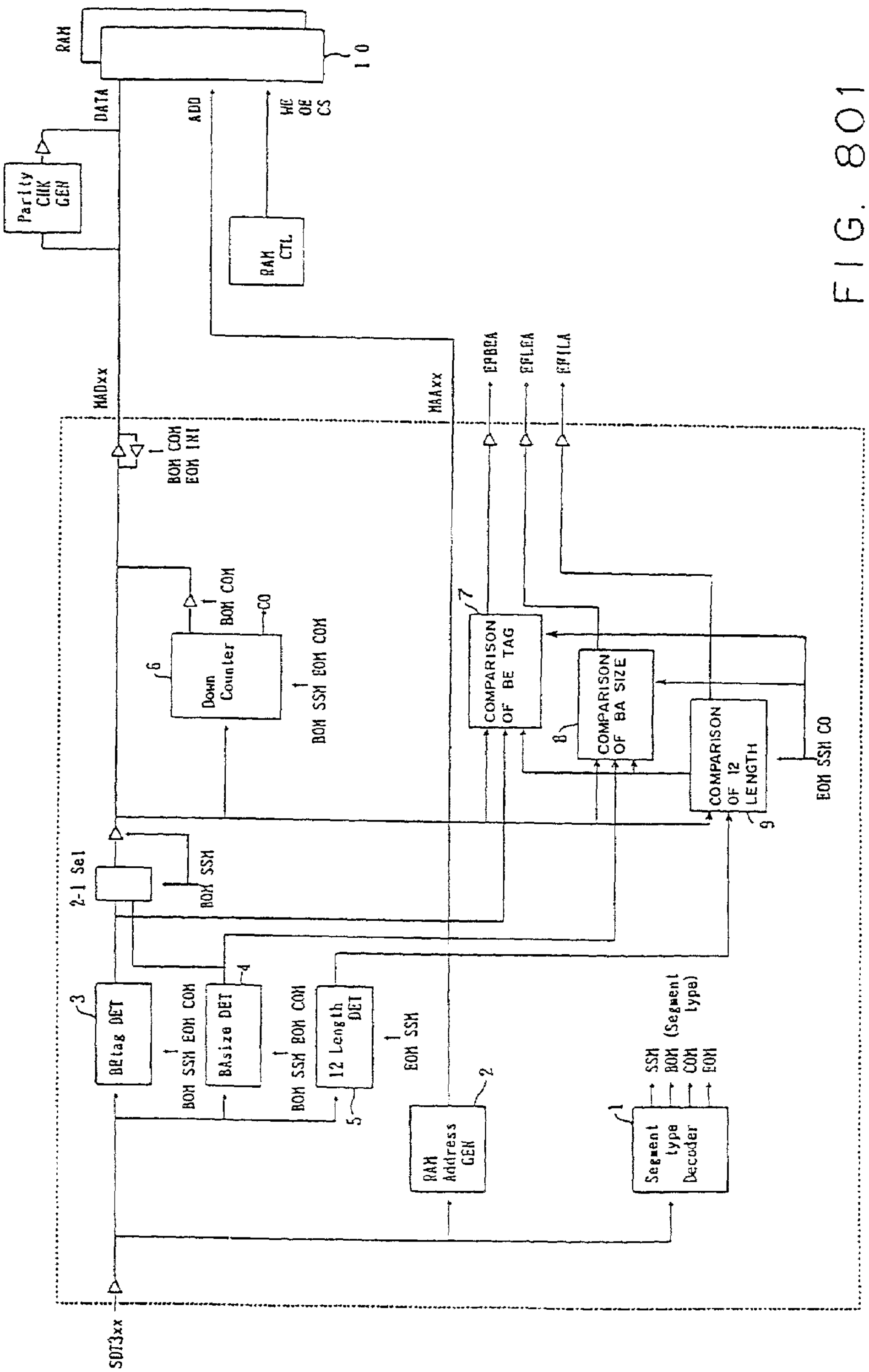

FIG. 801 shows the configuration of the circuit for making the L2-PDU payload length check, L3-PDU BEtag check, and L3-PDU BAsize check.

Figure 802:
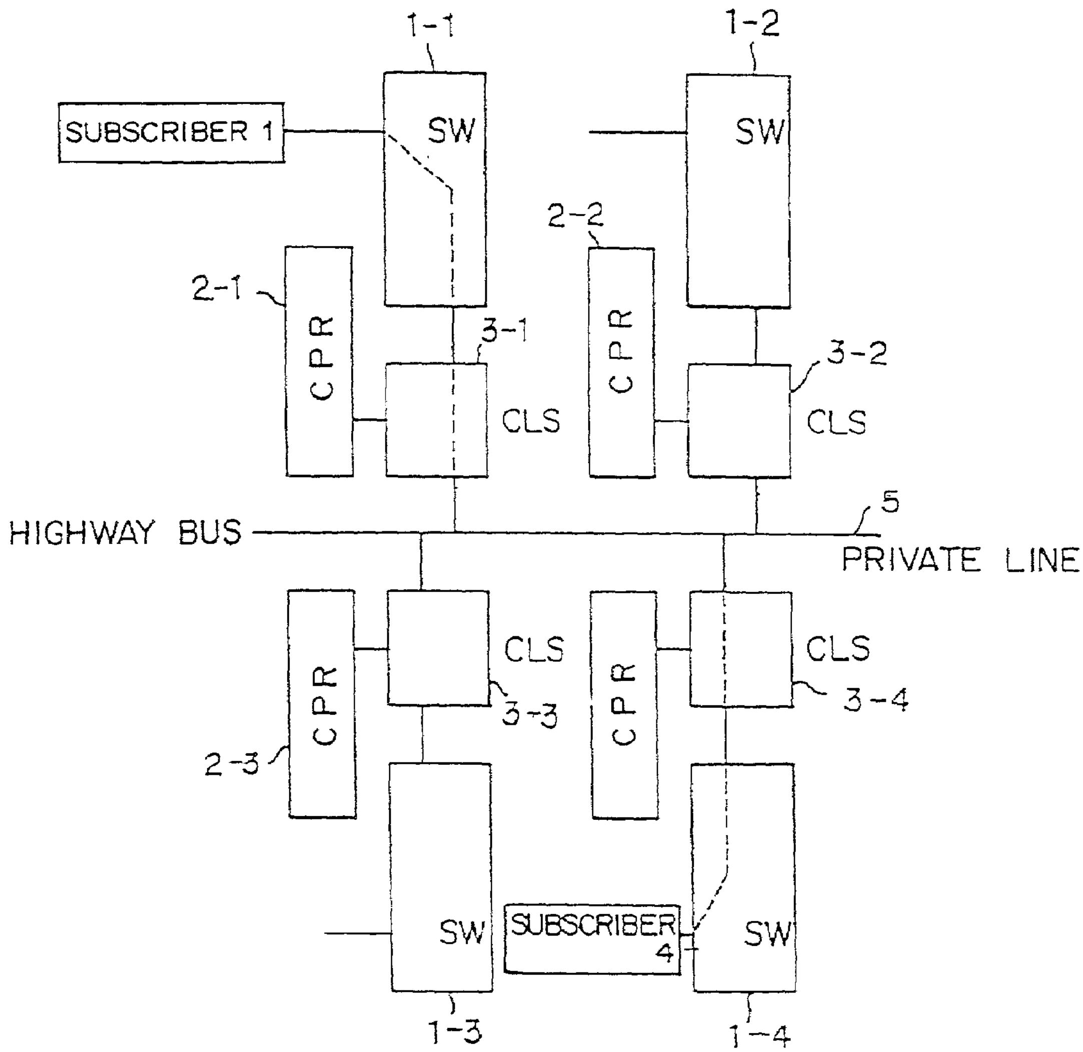

FIG. 802 shows the configuration of the system connected through a private line between connectionless processing servers.

FIG. 803 is a block diagram showing the function of the connectionless processing servers shown in FIG. 802 and the call processor used by the servers.

FIG. 804 shows the table managed by the connectionless processing servers shown in FIG. 802.

Figure 805:
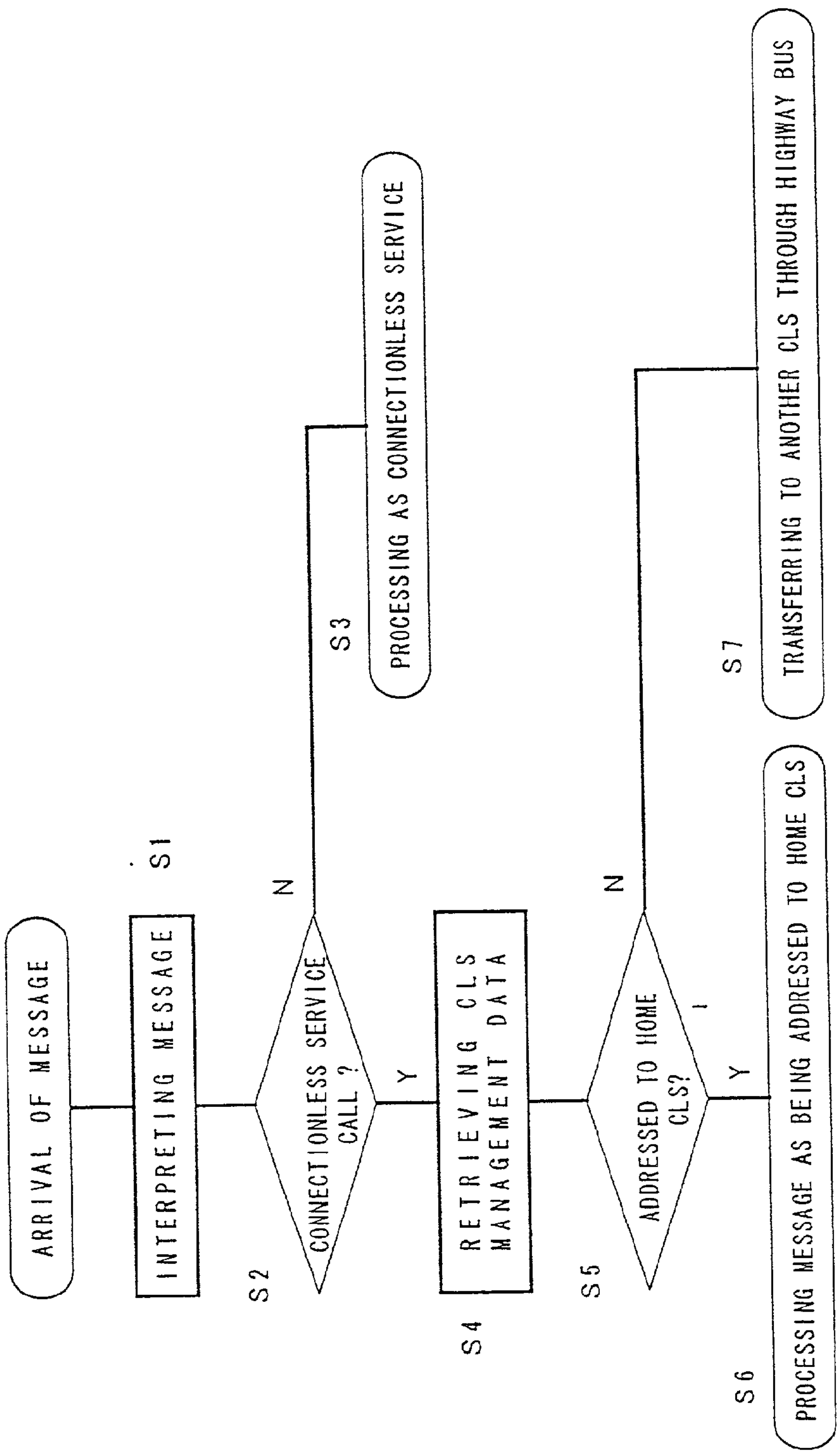

FIG. 805 is a flowchart showing the process of the system connected through the private line between the connectionless processing servers.

Figure 806:
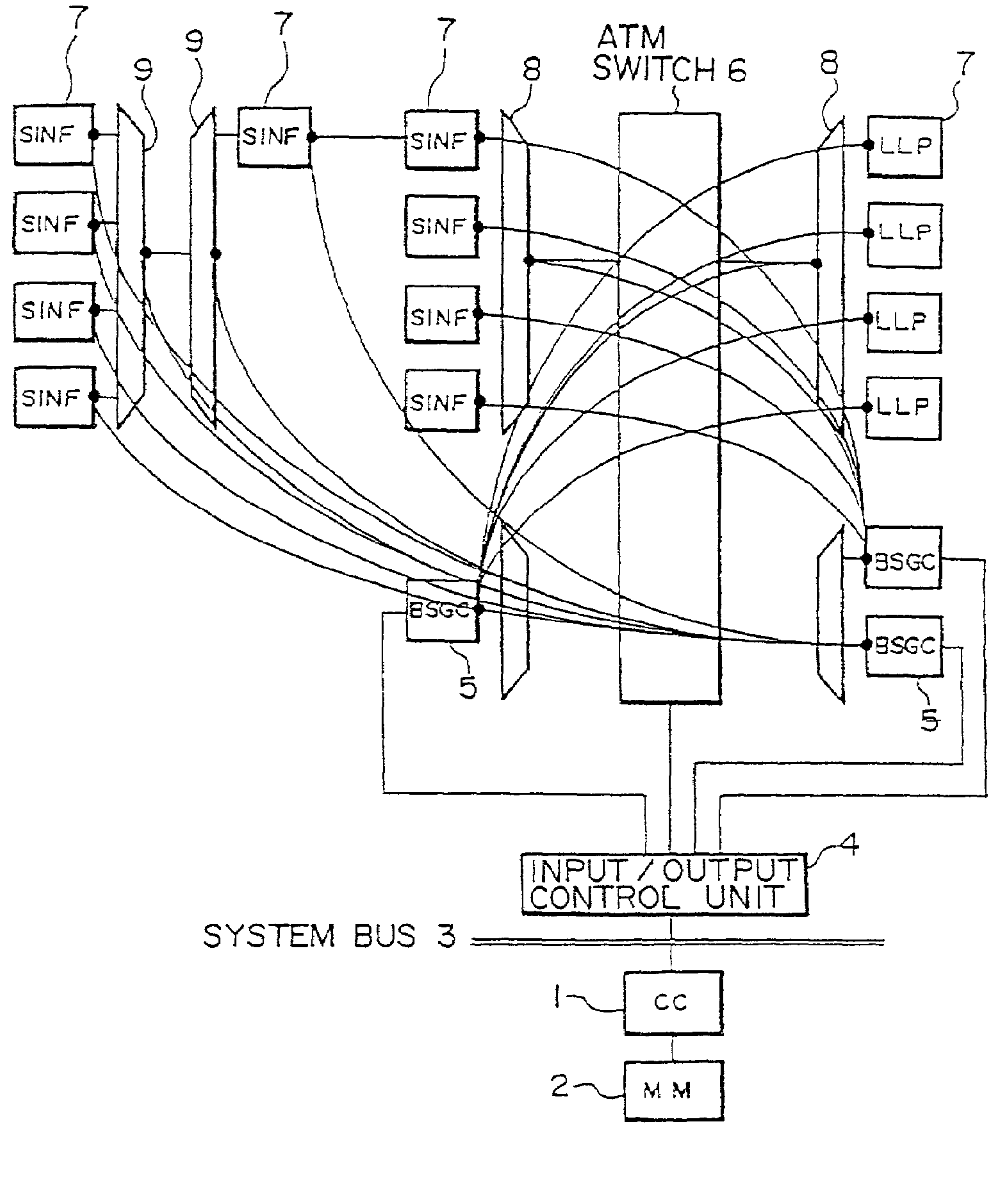

FIG. 806 shows another characteristic configuration according to the present invention.

Figure 807:
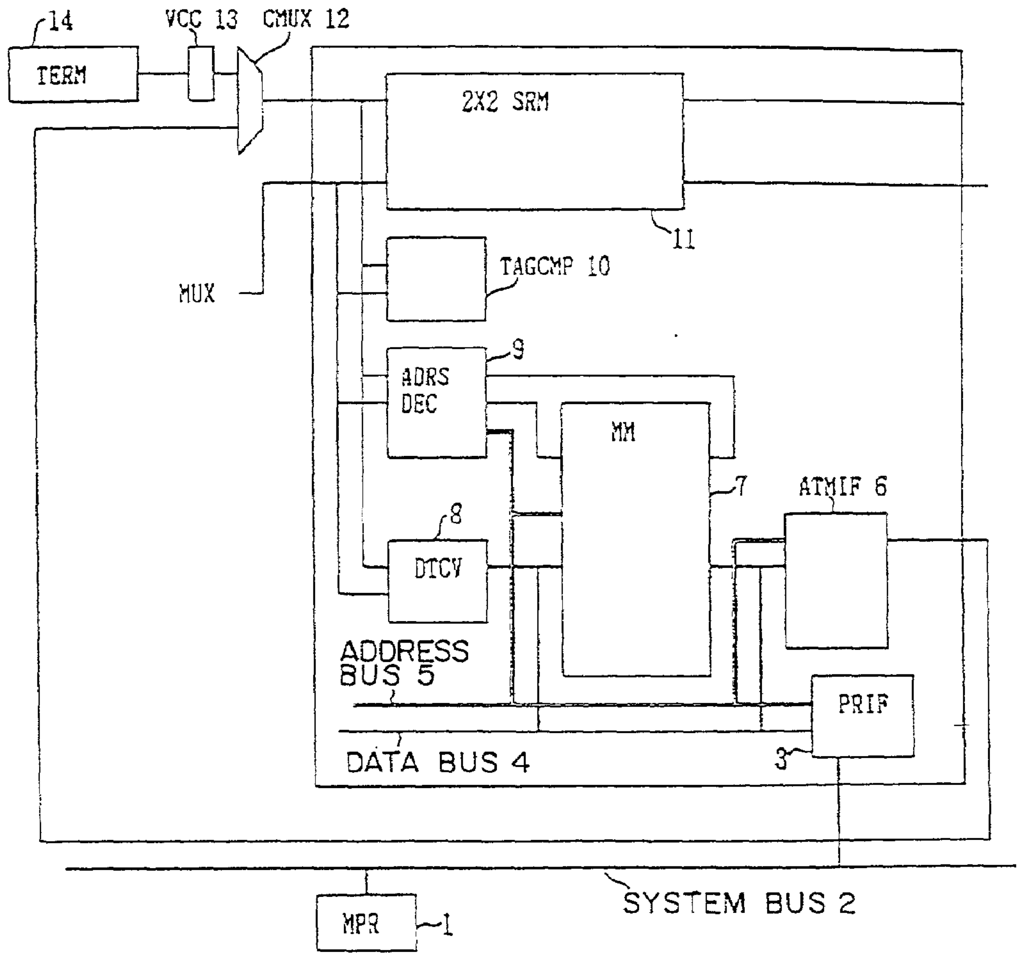

FIG. 807 shows another characteristic configuration according to the present invention.

Figure 808:
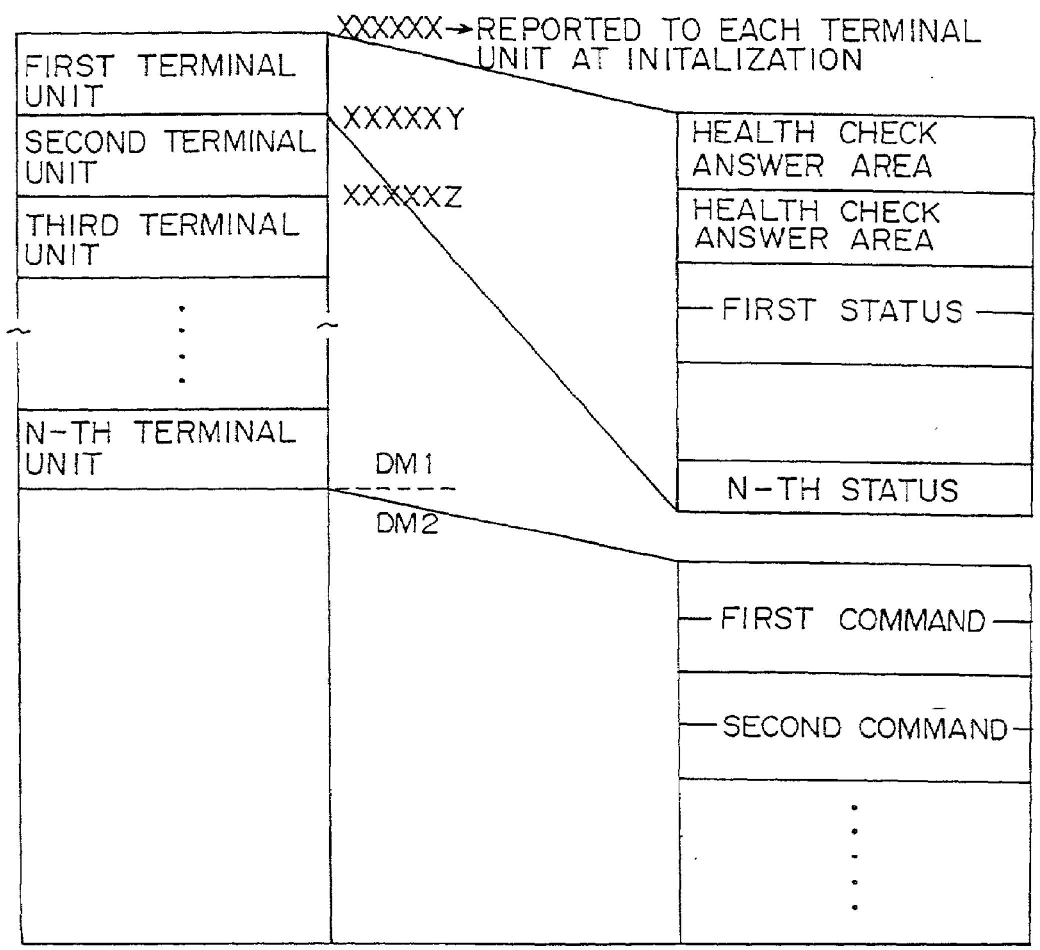

FIG. 808 shows the division of the main storage device and the control information format.

Figure 809:
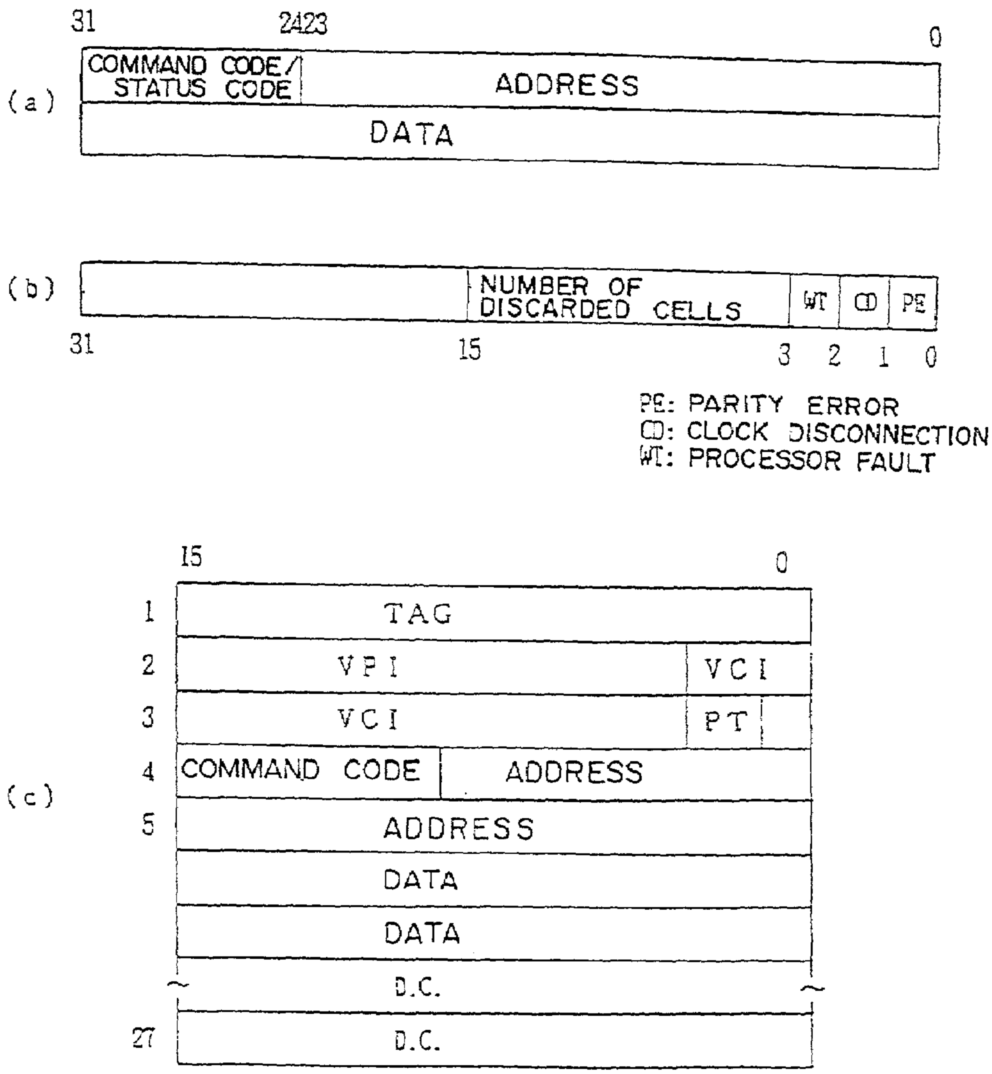

FIG. 809 shows the control information format.

Figure 810:
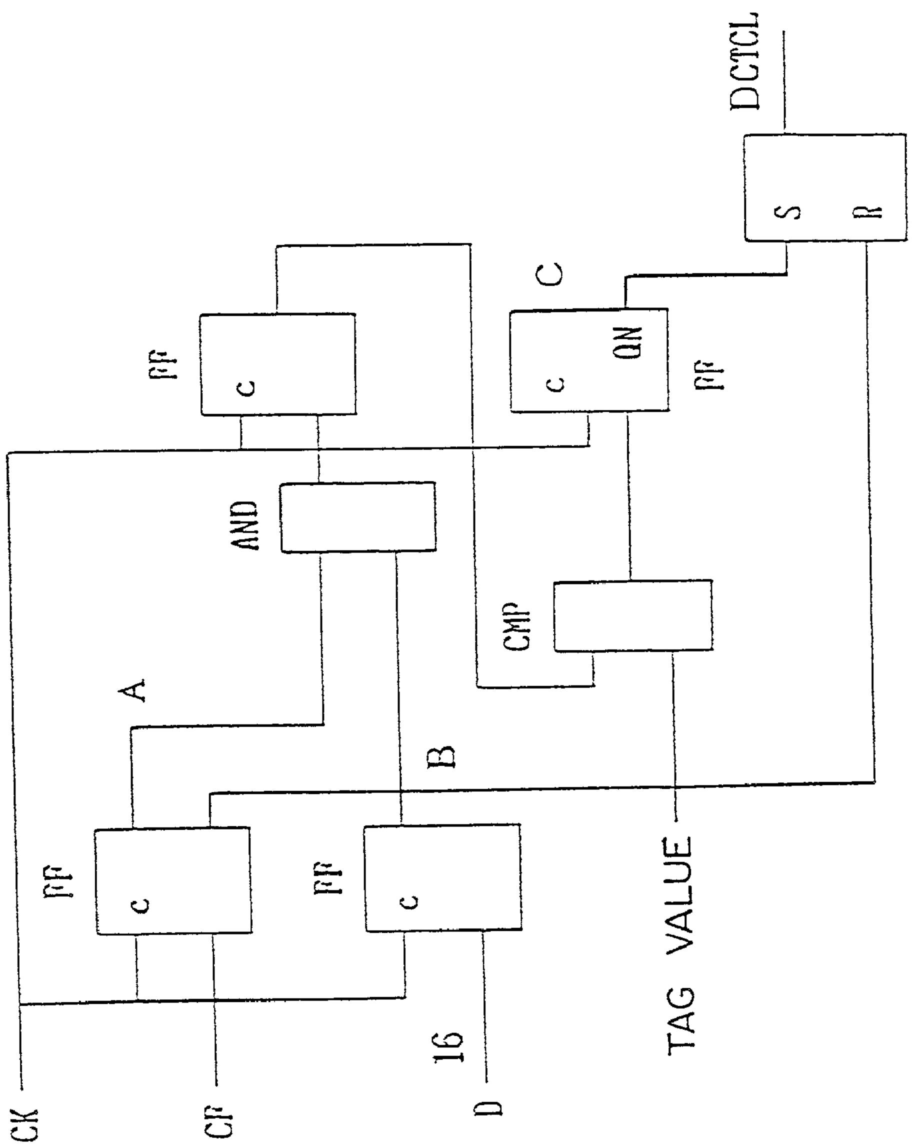

FIG. 810 shows the configuration of the circuit of the TAGCMP 10 shown in FIG. 807.

Figure 811:
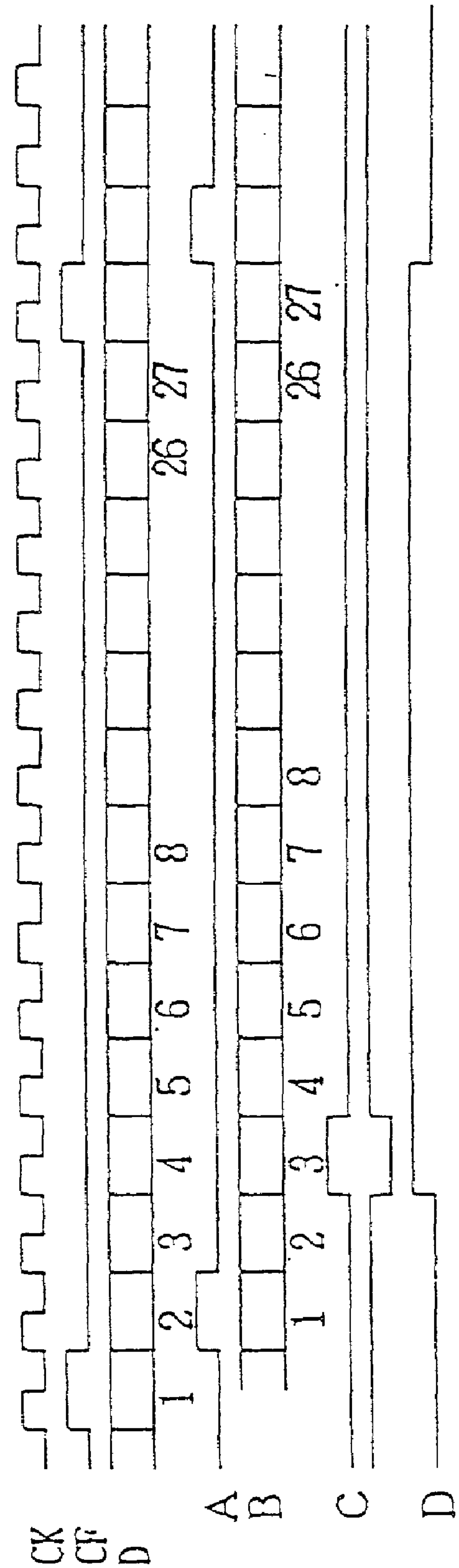

FIG. 811 is a timing chart showing the operation of the TAGCMP 10.

Figure 812:
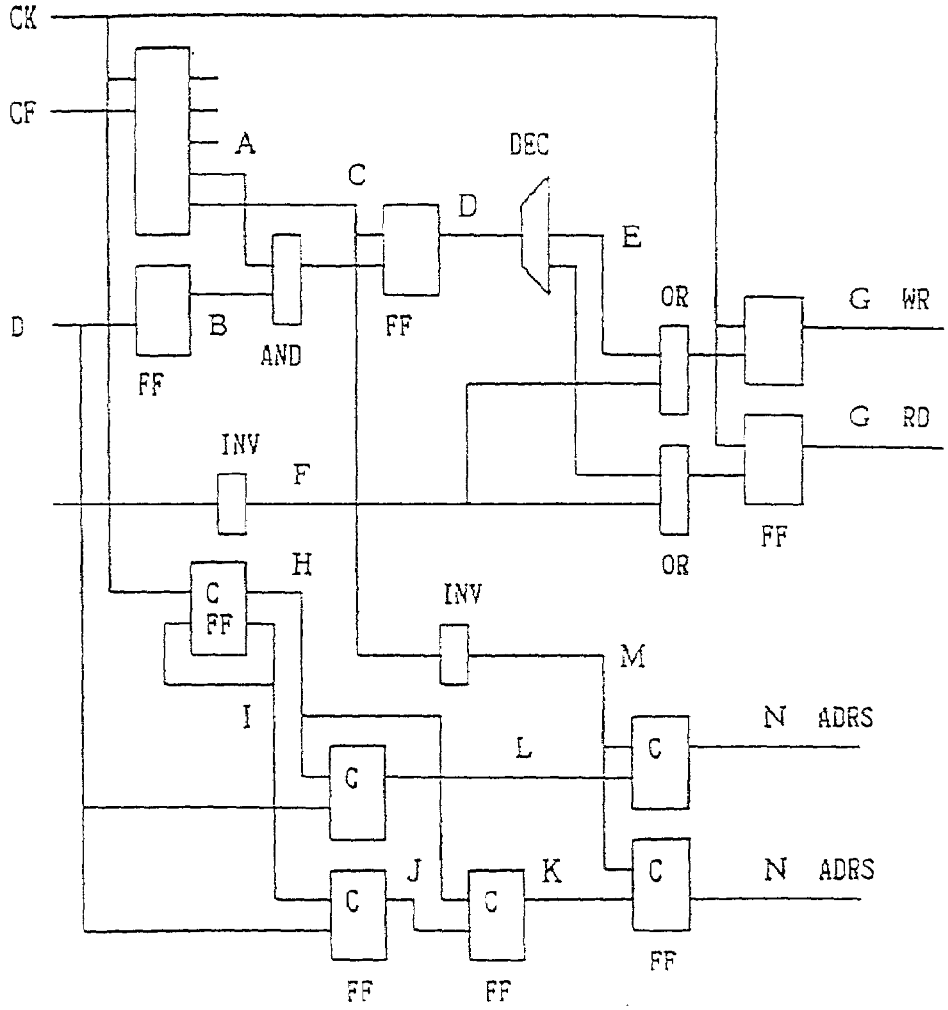

FIG. 812 shows the configuration of the circuit of the ADRSDEC 9 shown in FIG. 807.

Figure 813:
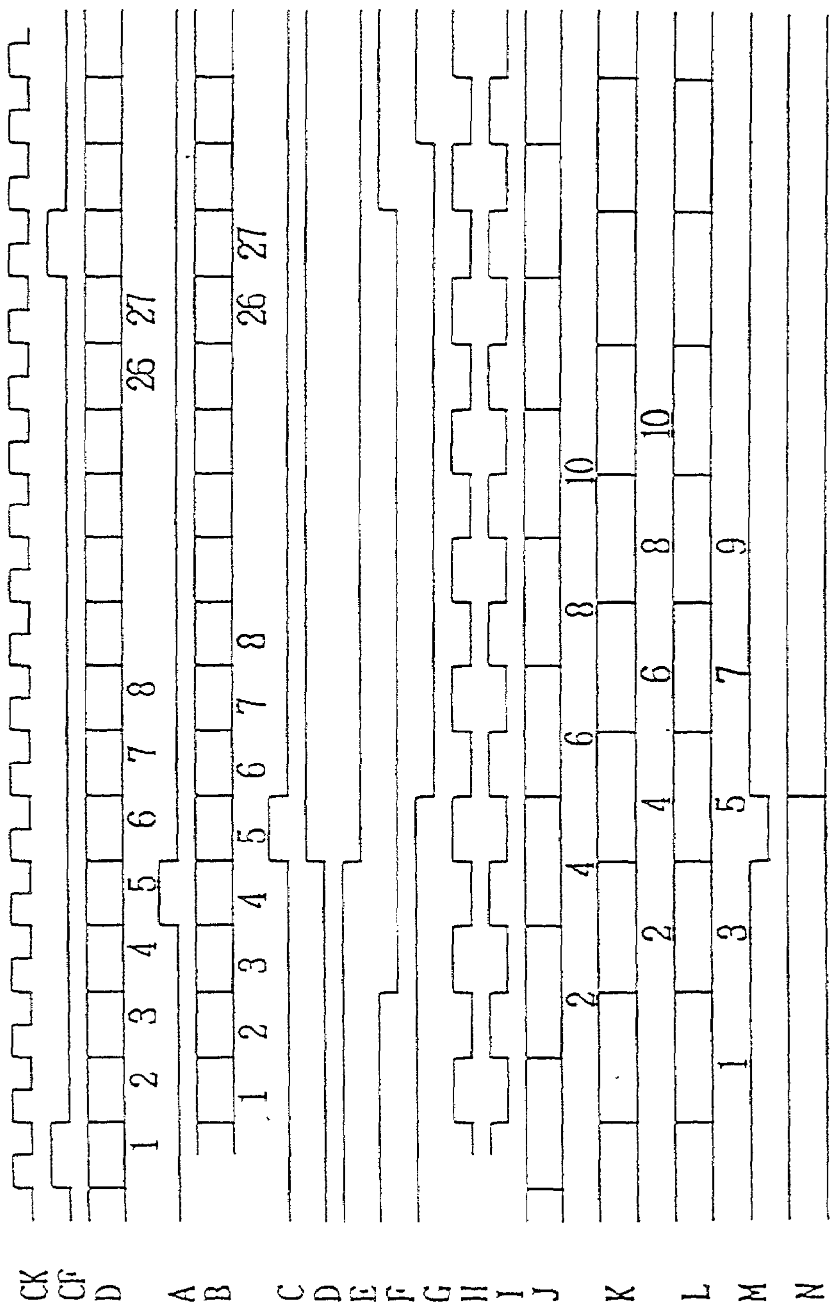

FIG. 813 is a timing chart showing the operation of the ADRSDEC 9.

Figure 814:
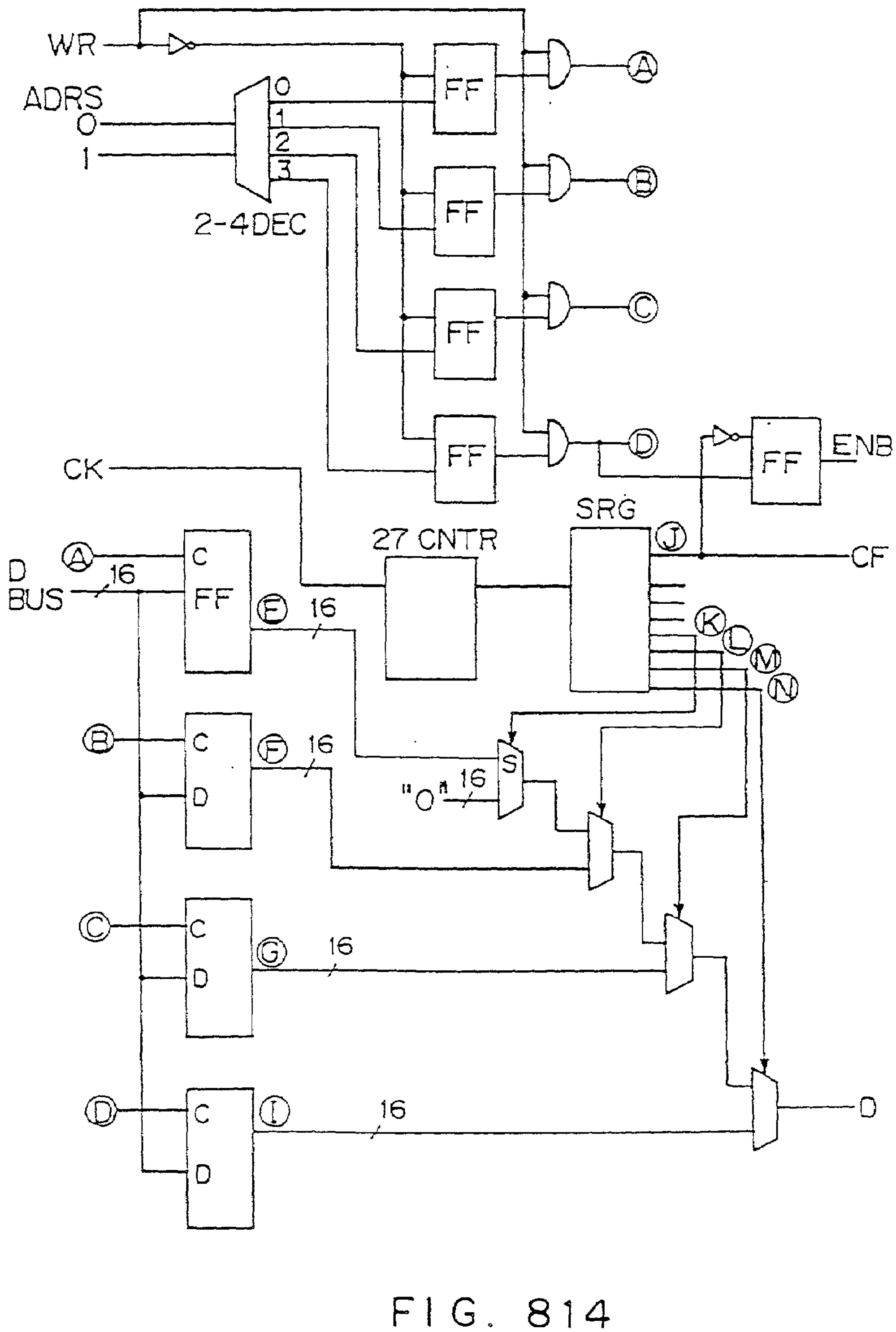

FIG. 814 shows the configuration of the circuit of the ATMIF 6 shown in FIG. 807.

Figure 815:
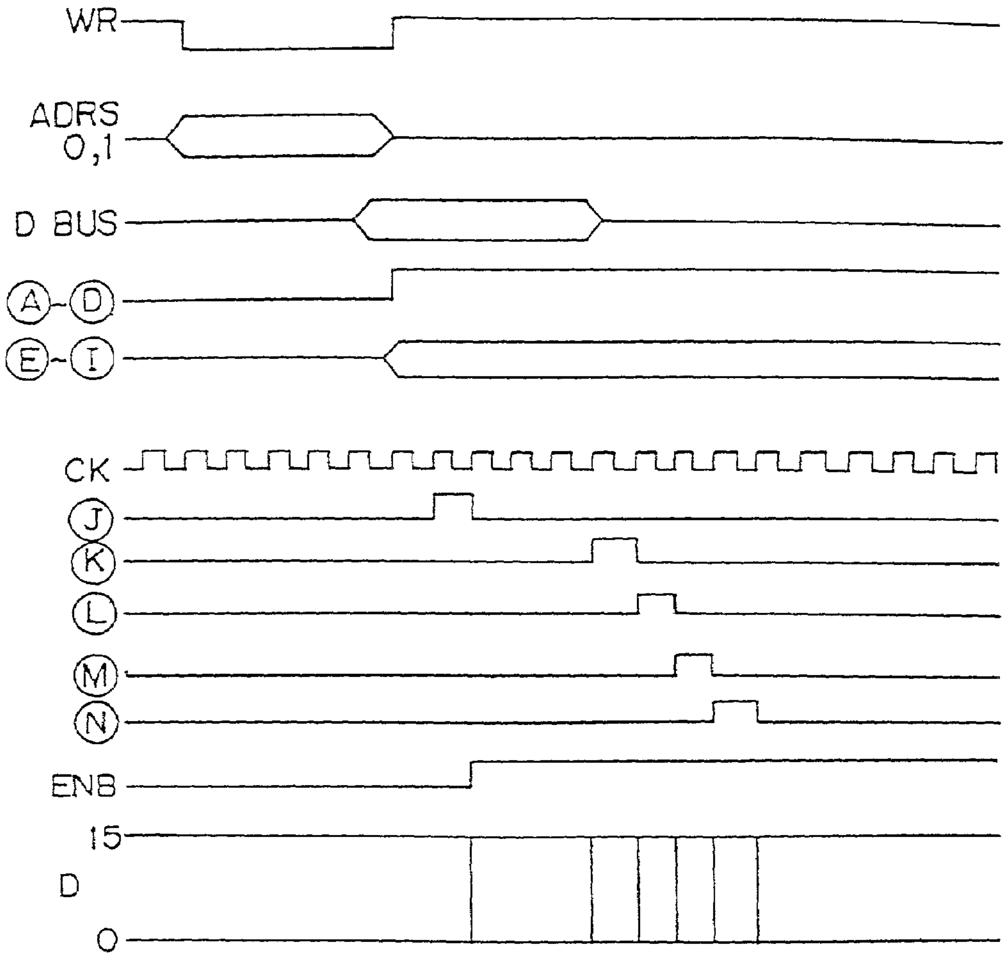

FIG. 815 is a timing chart showing the operation of the ATMIF 6.

Figure 816:
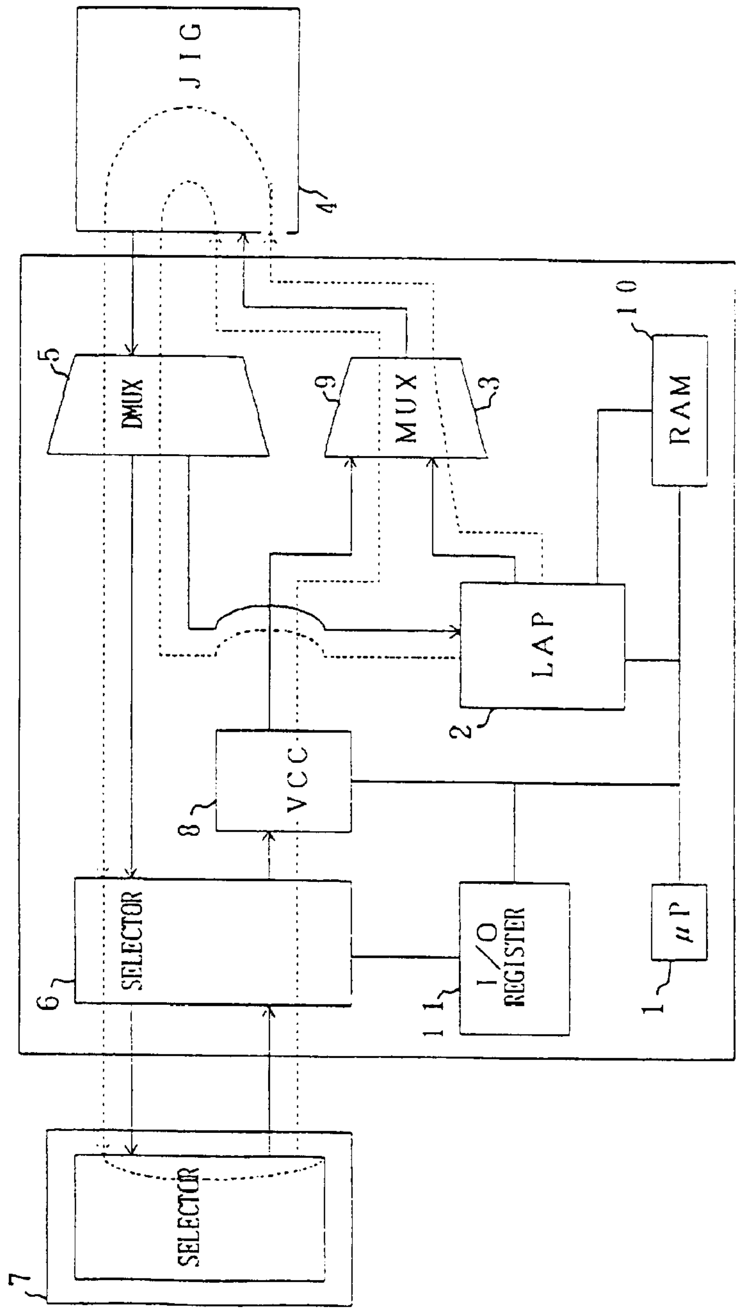

FIG. 816 shows another characteristic configuration according to the present invention.

Figure 817:
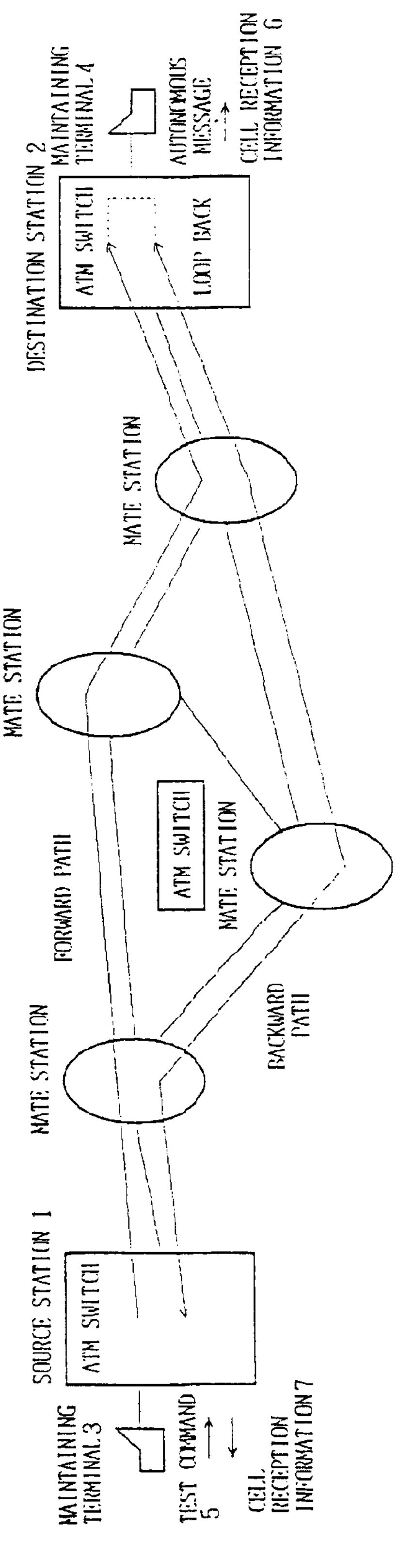

FIG. 817 shows another characteristic configuration (1) according to the present invention.

Figure 818:
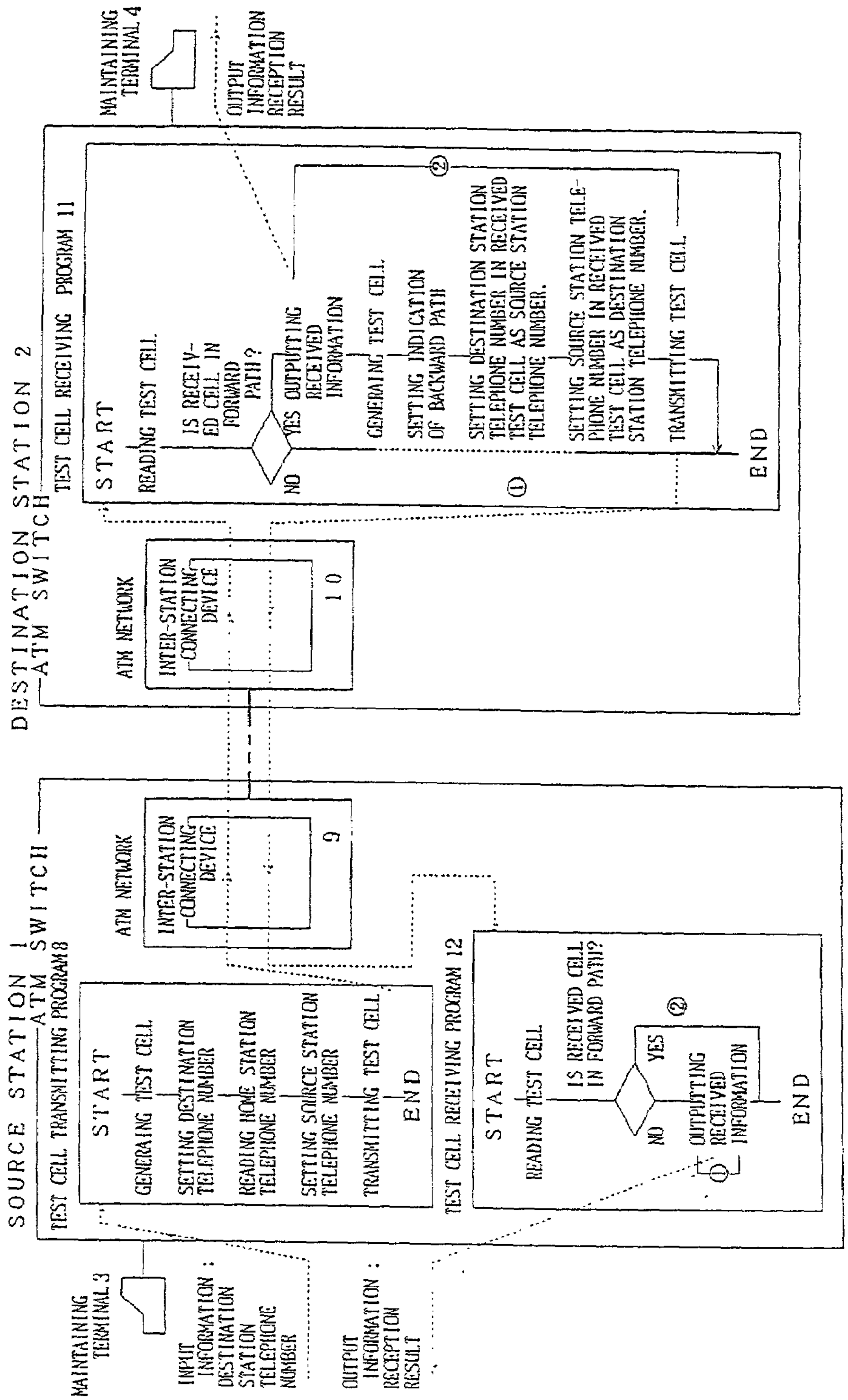

FIG. 818 shows another characteristic configuration (2) according to the present invention.

Figure 819:
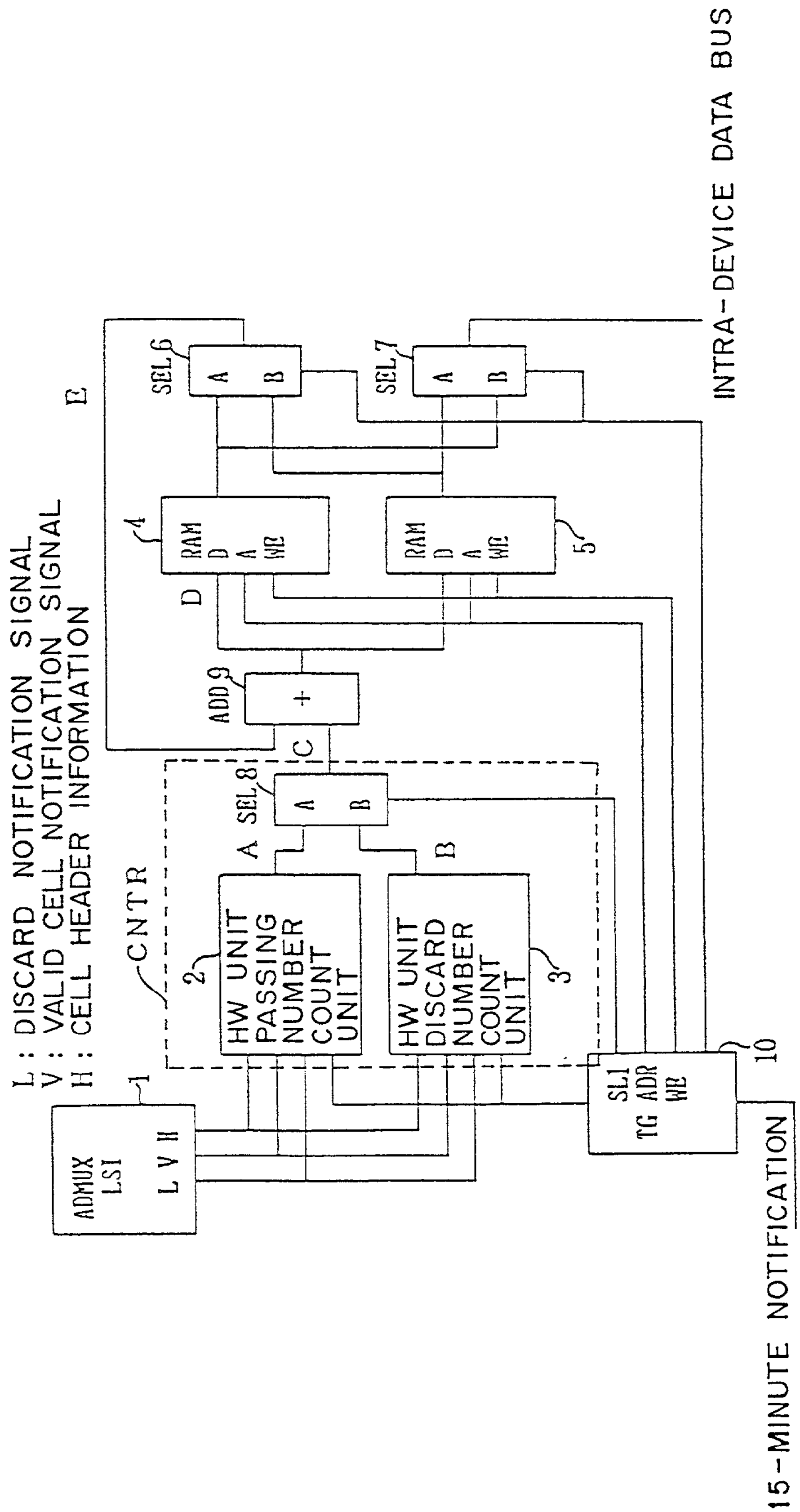

FIG. 819 shows another characteristic configuration according to the present invention.

FIG. 820 shows the memory map in the RAM 4 and 5

Figure 821:
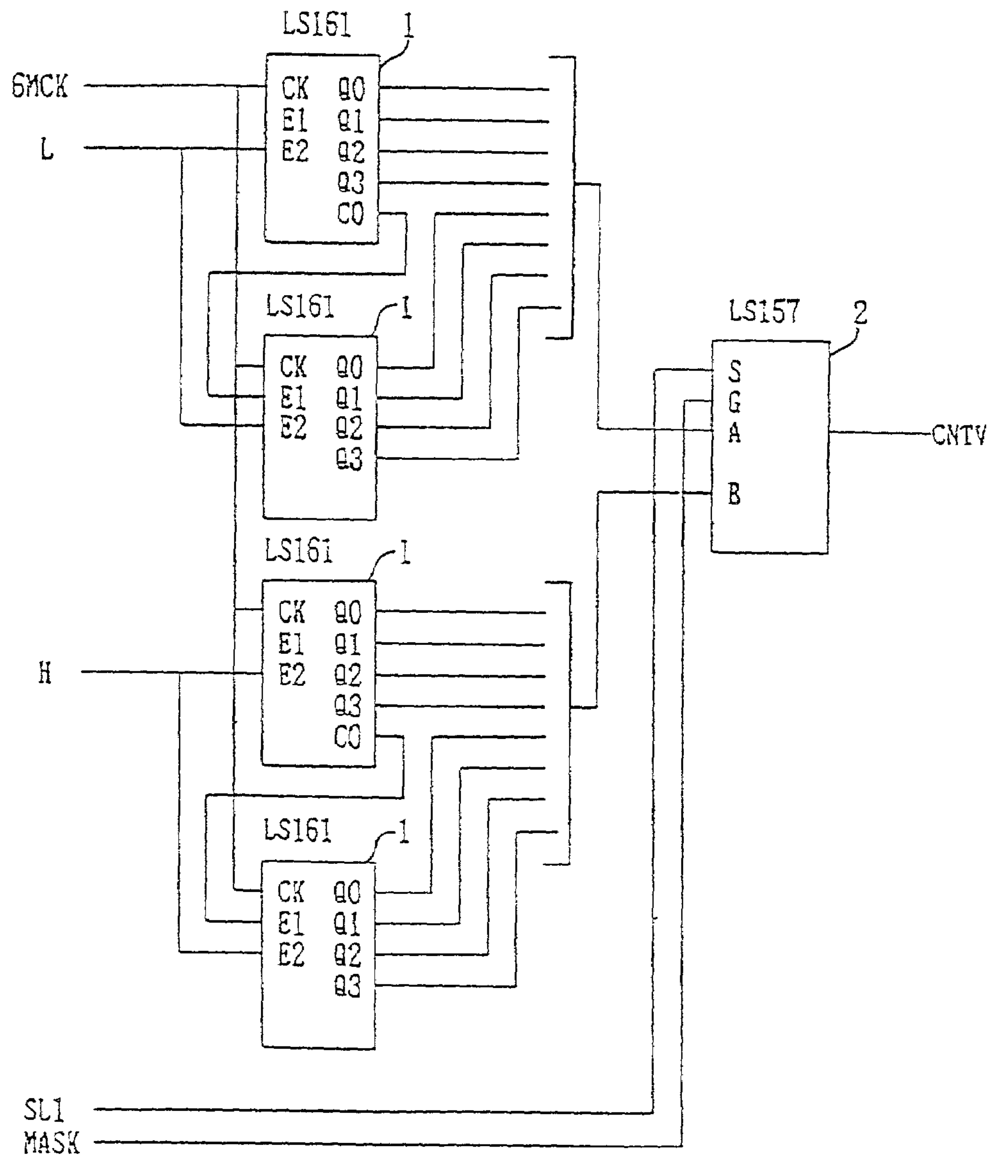

FIG. 821 shows the configuration of the circuit of the CNTR unit shown in FIG. 819.

Figure 822:
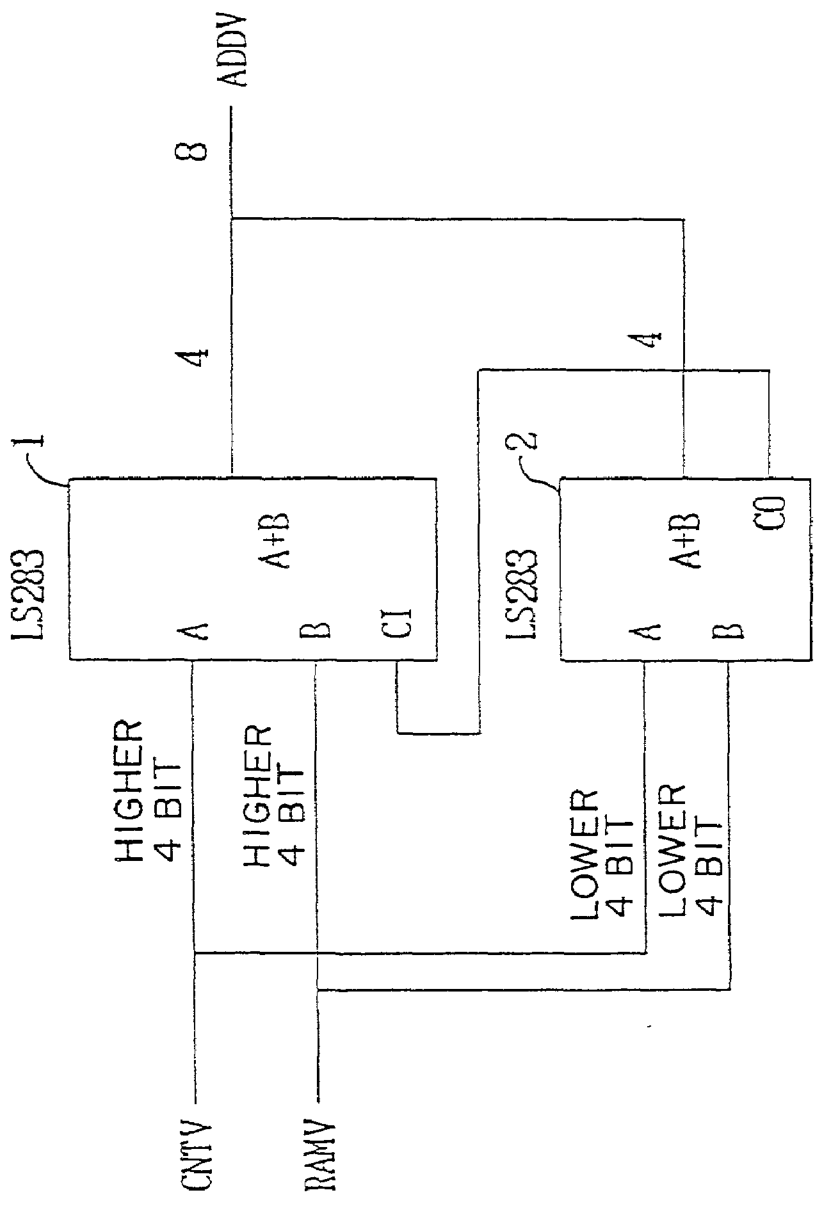

FIG. 822 shows the configuration of the circuit of the ADD 9.

Figure 823:
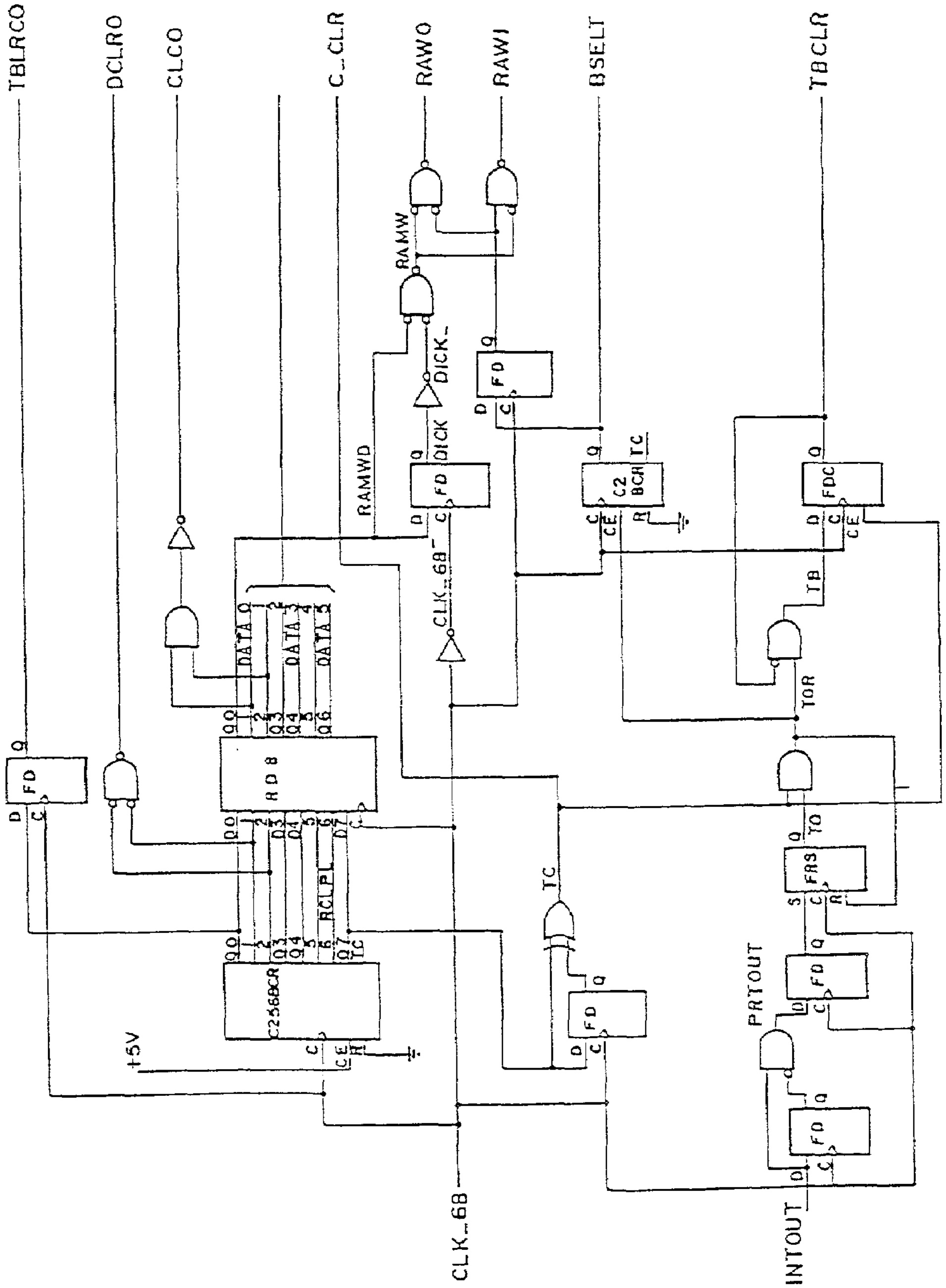

FIG. 823 shows the configuration of the TG10 shown in FIG. 819.

Figure 824:
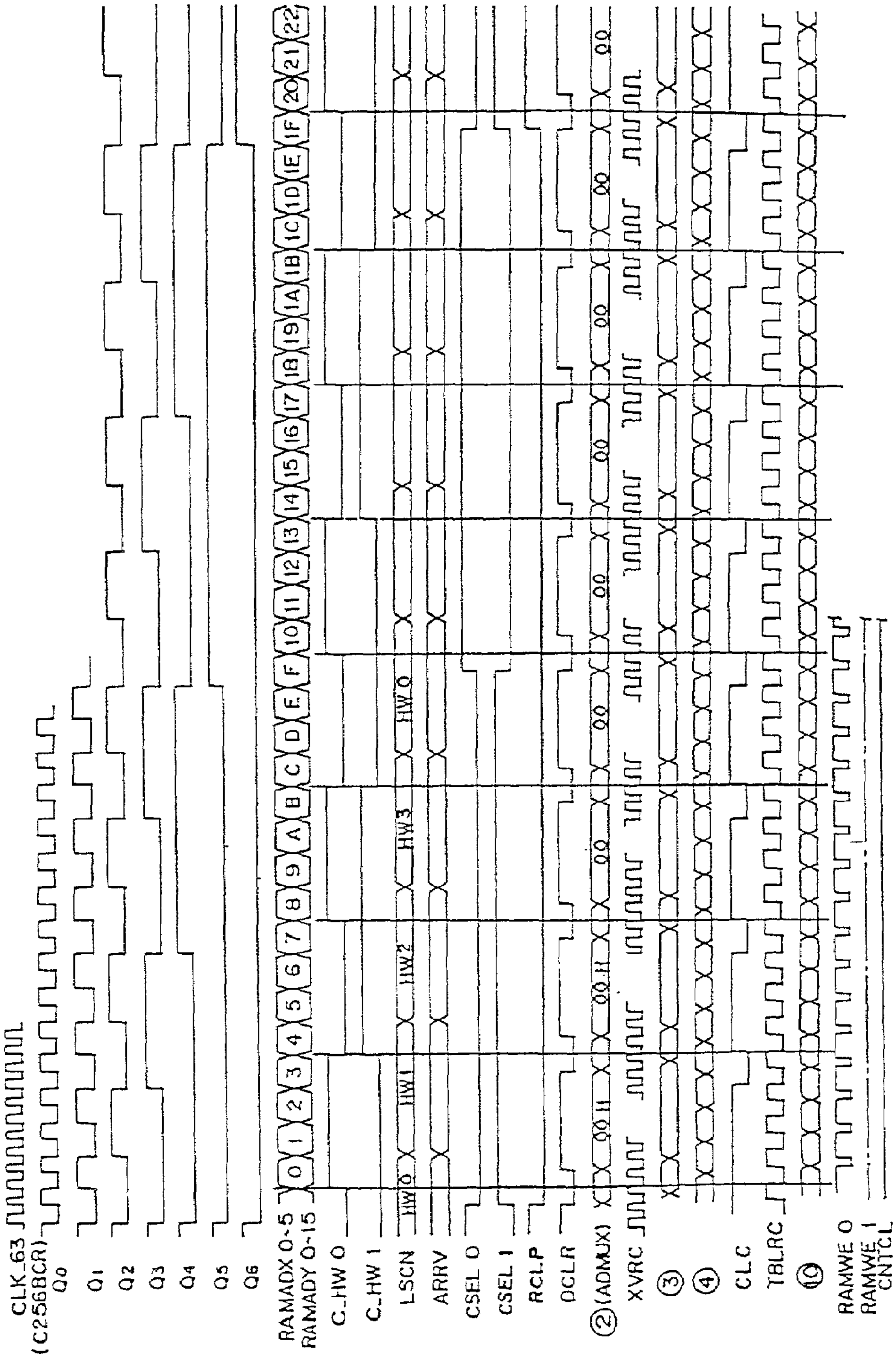

FIG. 824 is a timing chart of the TG10.

Figure 825:
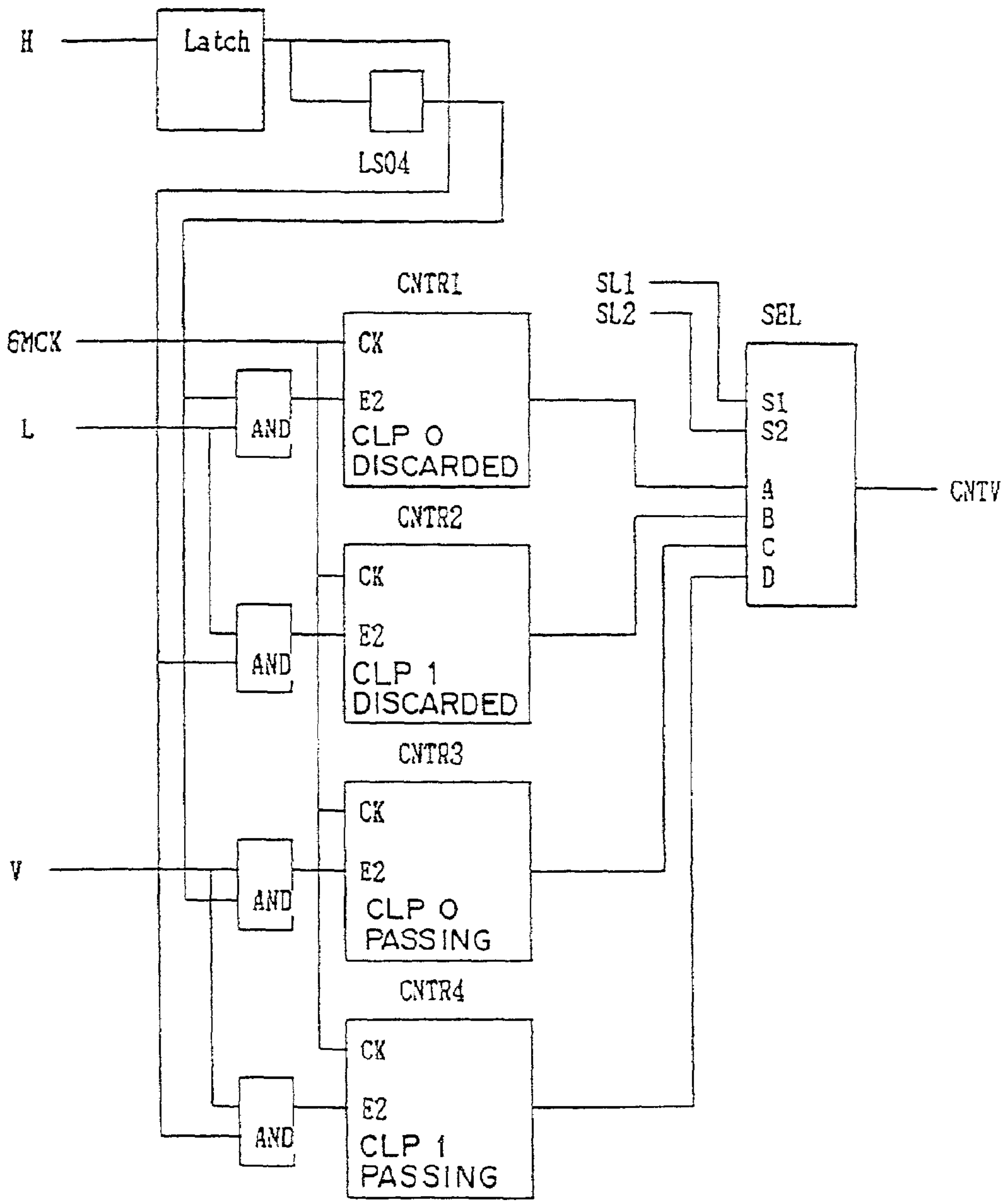

FIG. 825 shows the configuration of the CNTR unit for processing priority levels.

Figure 826:
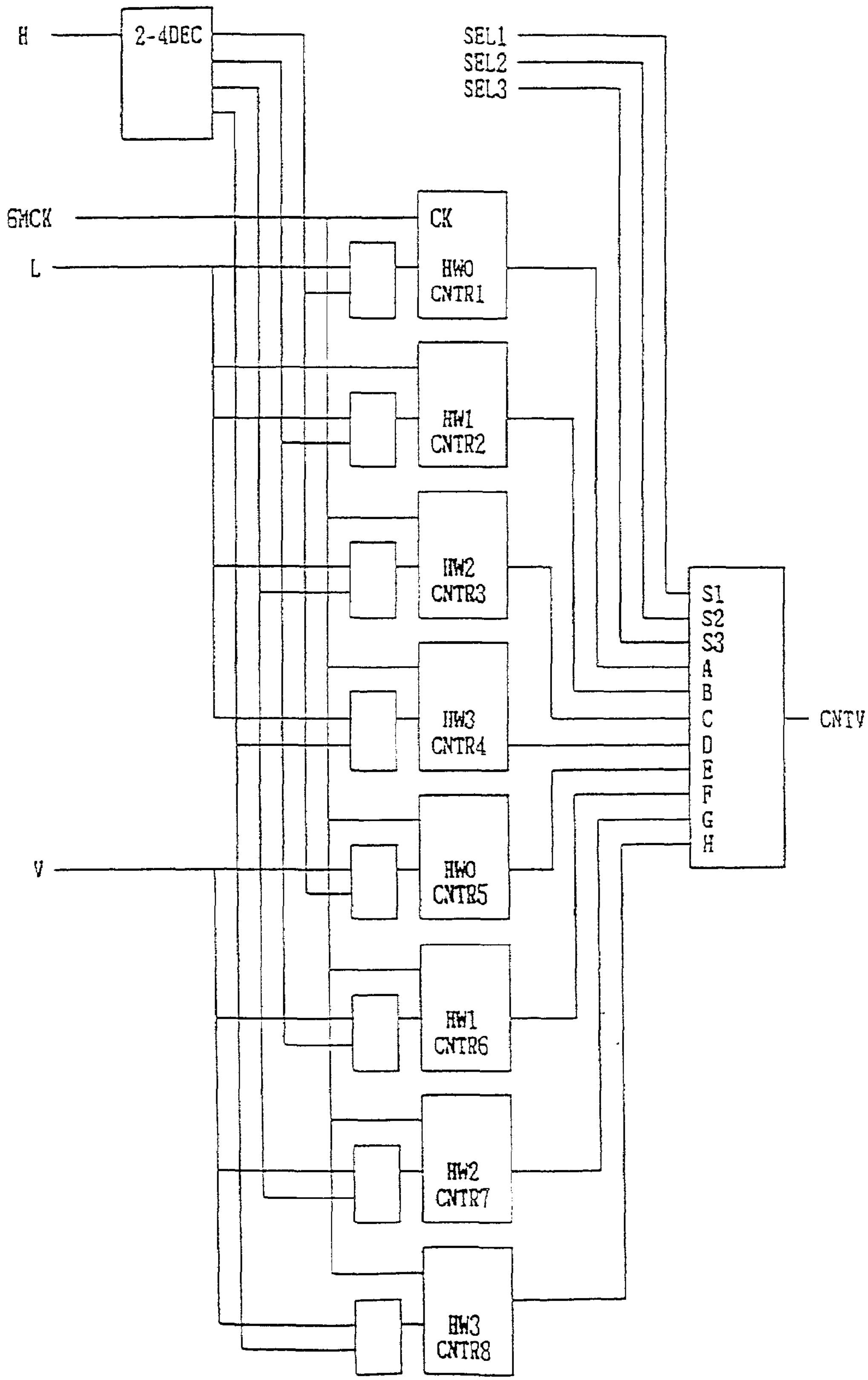

FIG. 826 shows the configuration of the CNTR unit (shown in FIG. 819) for the DMUX unit.

Figure 827:
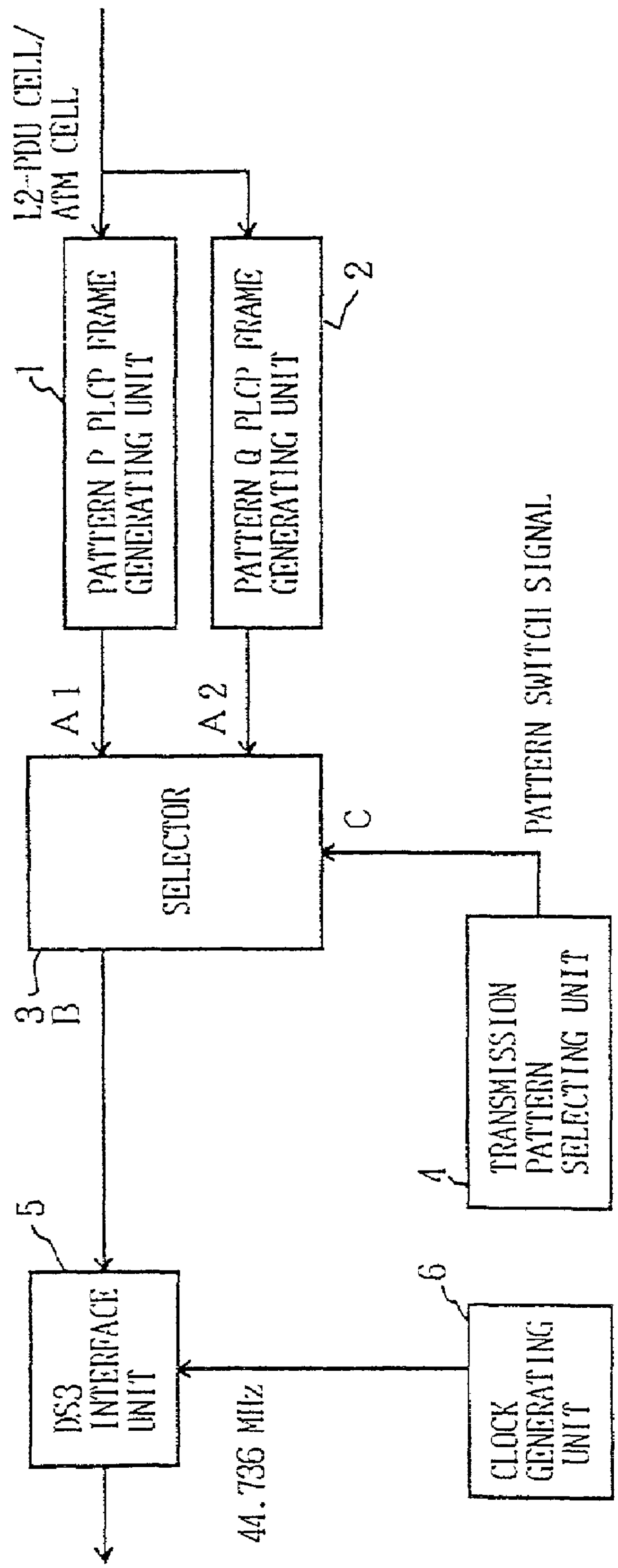

FIG. 827 shows another characteristic configuration according to the present invention.

Figure 828:
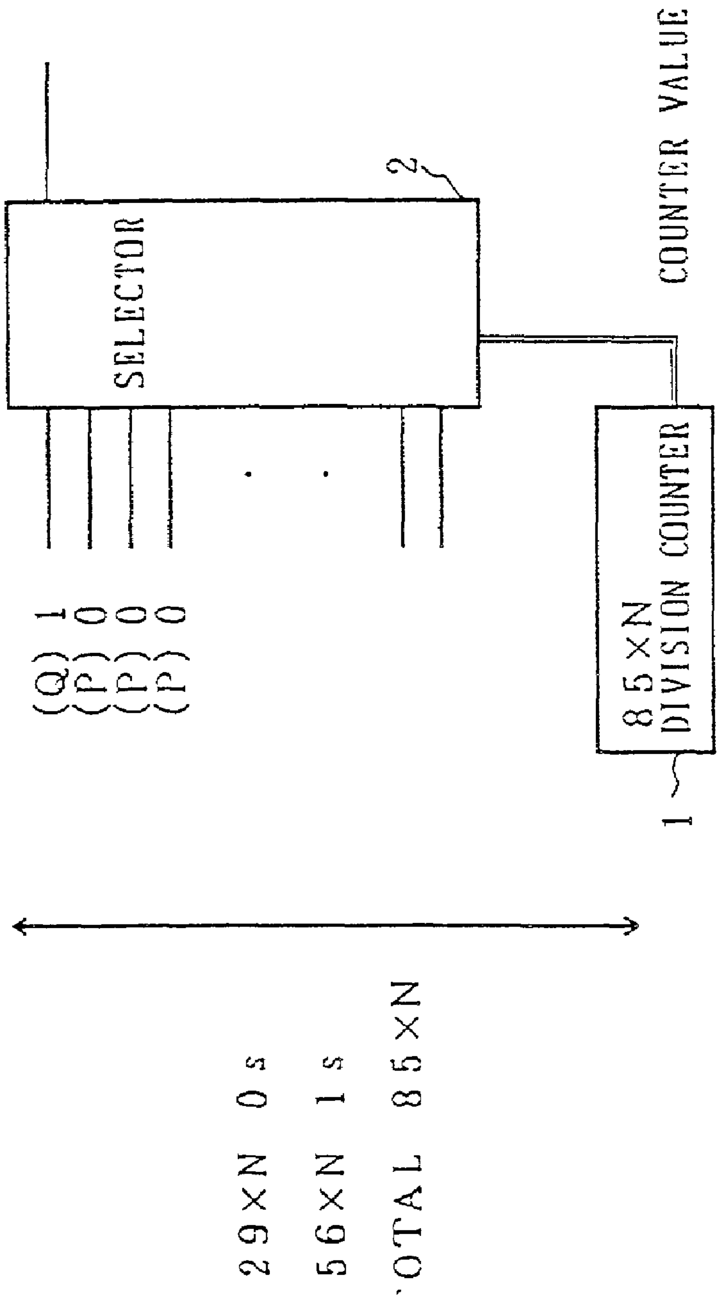

FIG. 828 shows the configuration (1) of the sending pattern selecting unit 4 shown in FIG. 827.

Figure 829:
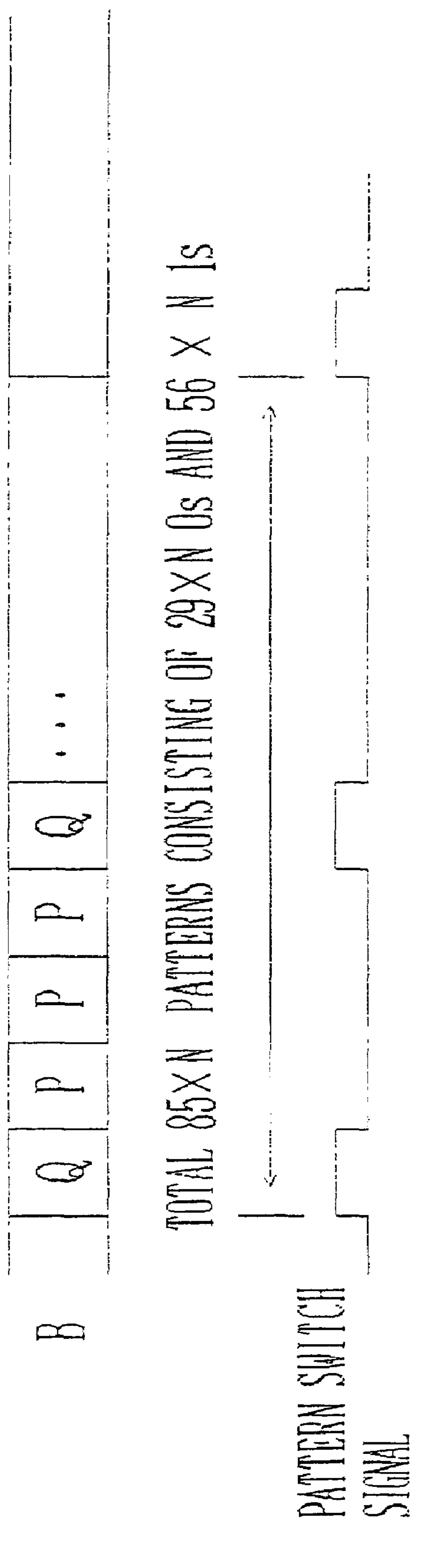

FIG. 829 shows the operations according to the embodiments shown in FIGS. 827 and 828.

FIG. 830 shows the configuration (2) of the sending pattern selecting unit 4 shown in FIG. 827.

Figure 831:
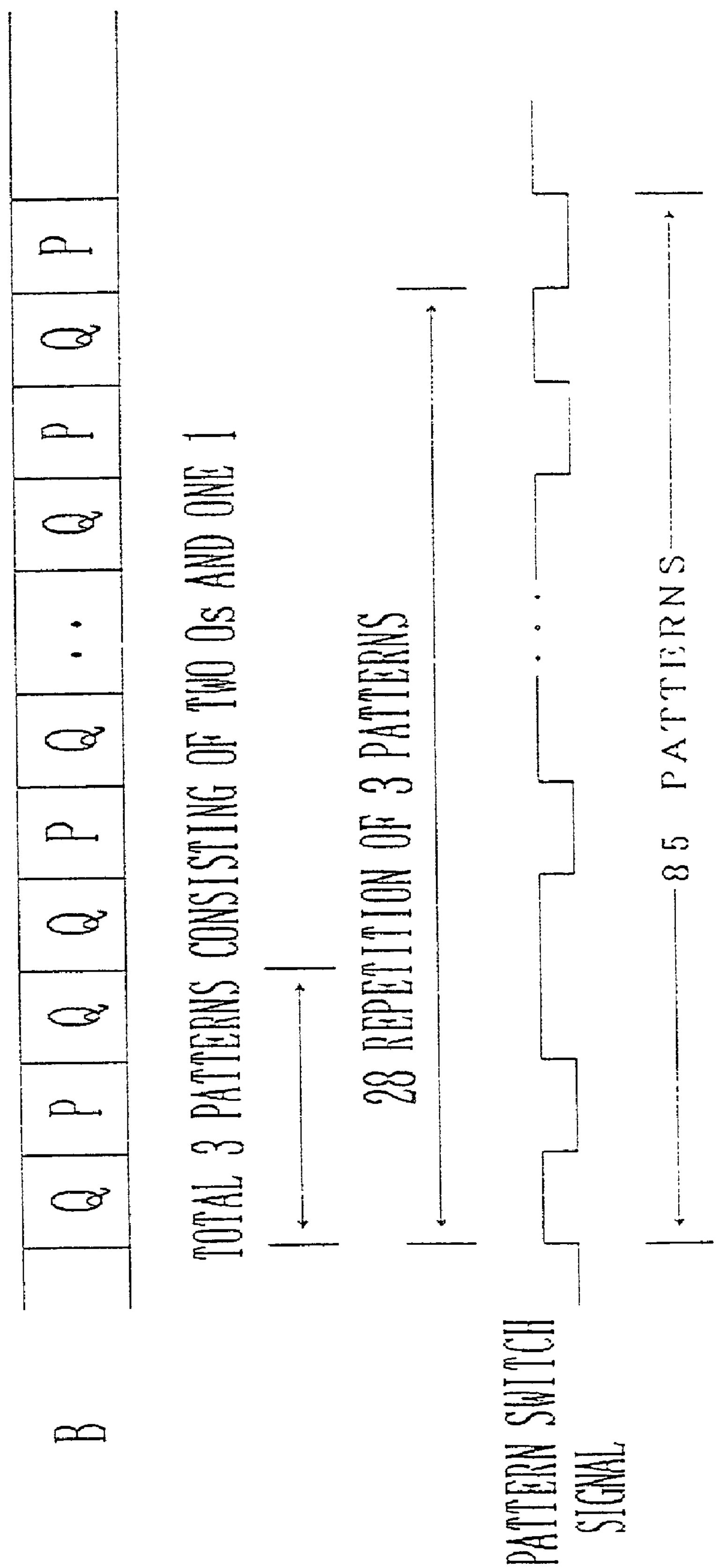

FIG. 831 shows the operations according to the embodiments shown in FIGS. 827 and 830.

Figure 832:
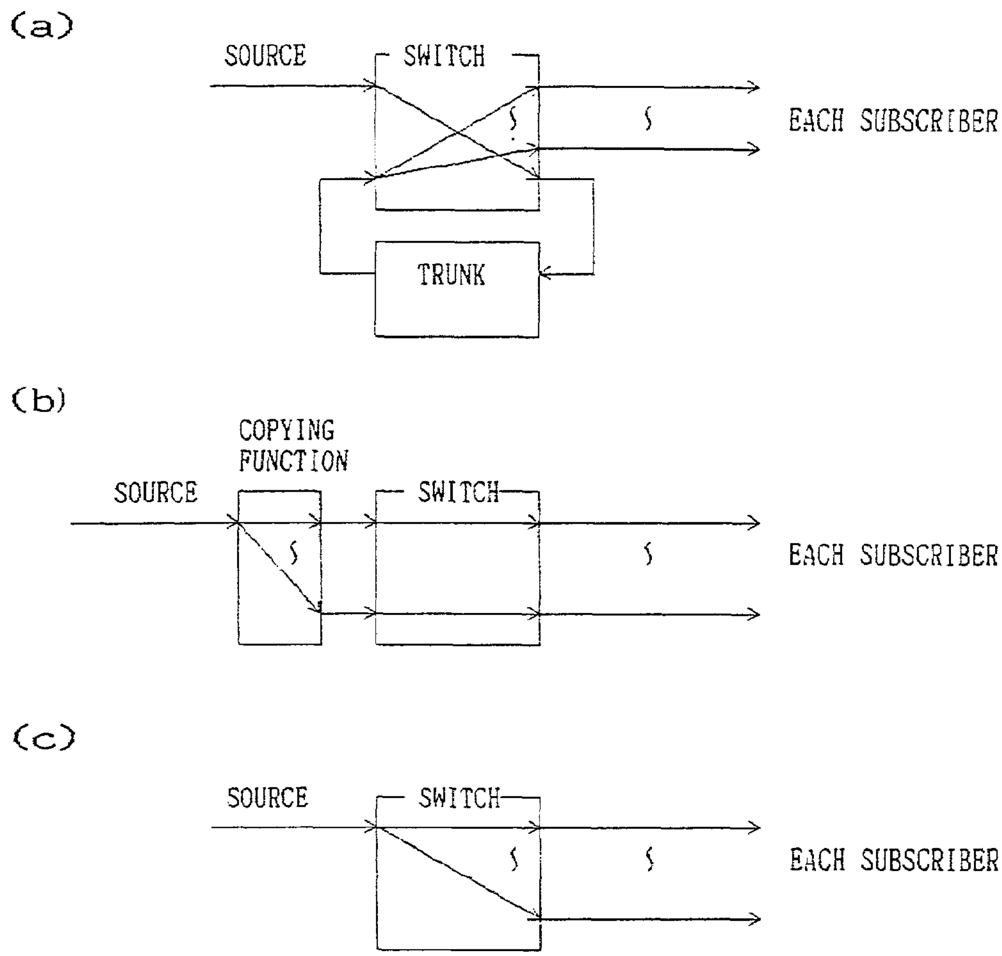

FIG. 832 shows the configuration of the switch for realizing the point-to-multipoint function. (a) indicated a trunk system; (b) indicates an input unit copy system; and (c) indicates an internal copy system.

FIG. 833 is a table showing the features of the three systems shown in FIG. 832.

FIG. 834 shows the configuration for realizing the point-to-multipoint connection using the internal copy system.

FIG. 835 shows the system or realizing the above described bit map without extending the cell length.

FIG. 836 shows the VPI/VCI decoding circuit.

FIG. 837 shows the configuration of a point-to-multipoint connection.

FIG. 838 shows the configuration of the buffer and output unit VCCT provided for each output line.

FIG. 839 is a table of the contents of the output unit VCCT set by the firmware according to the software settings.

FIG. 840 shows an example of a table on which an output VPI/VCI is set.

Figure 841:
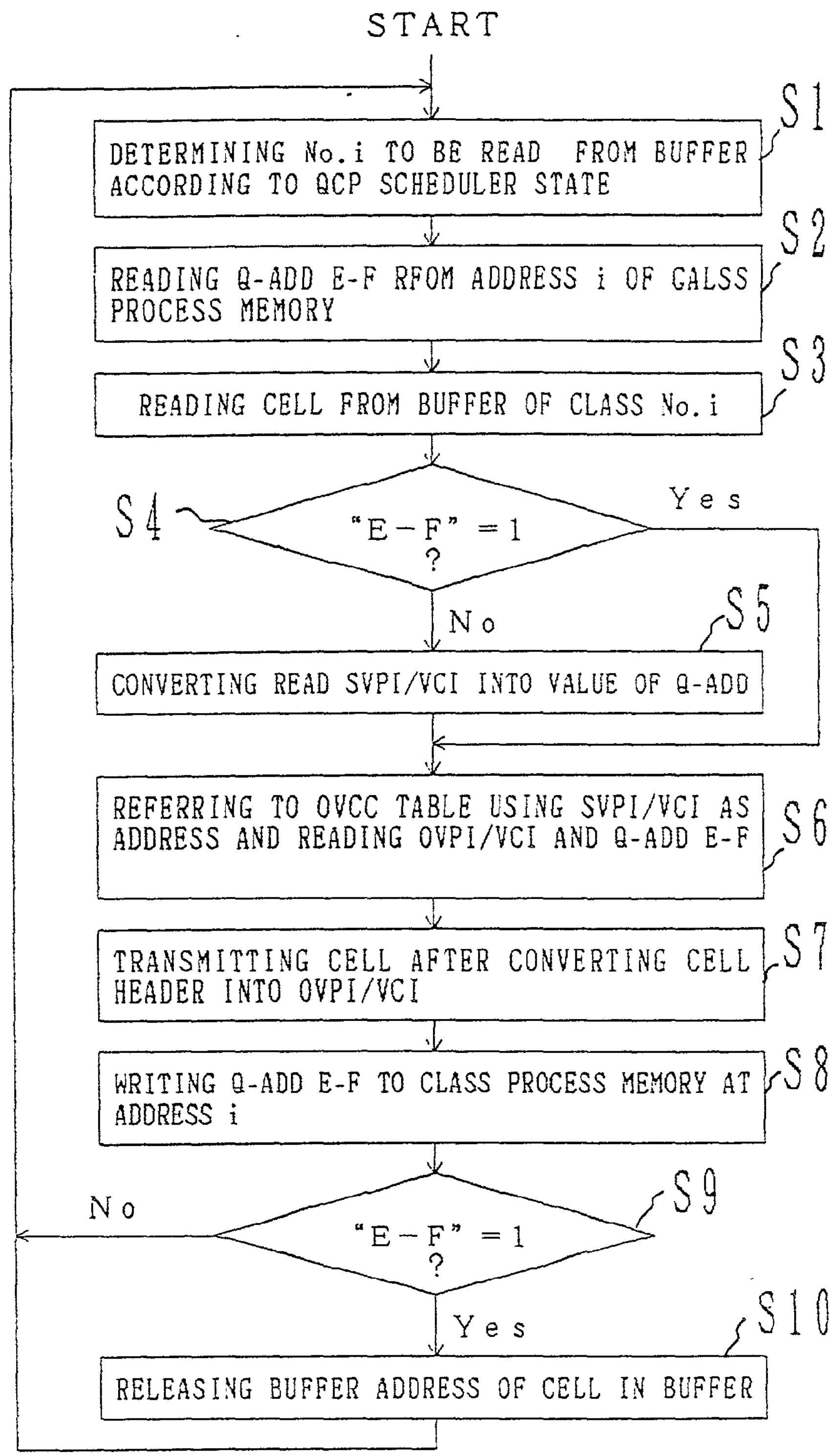

FIG. 841 is a flowchart explaining the process of the VCCT of the output unit.

Figure 842:
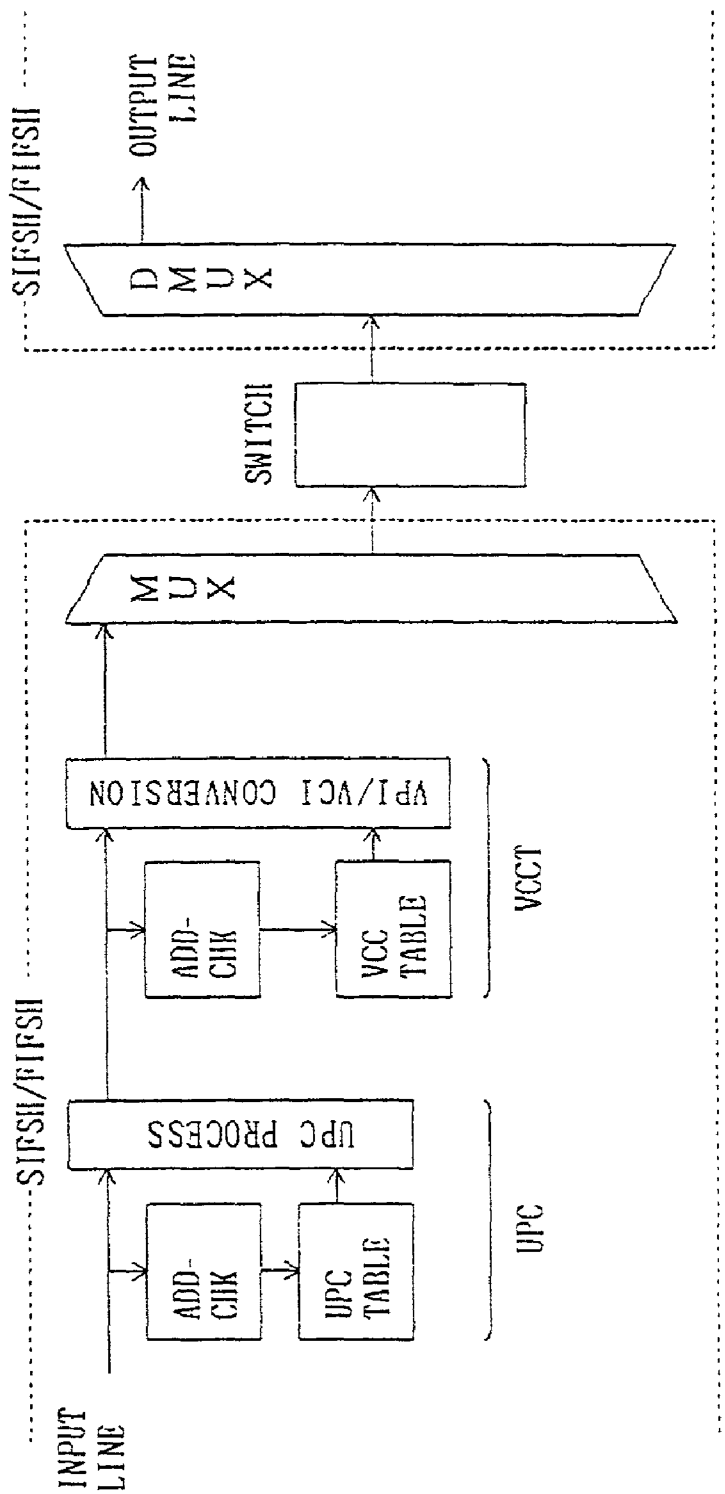

FIG. 842 shows the configuration of the switching system whose switch is equipped with a VCCT at its entry point.

Figure 843:
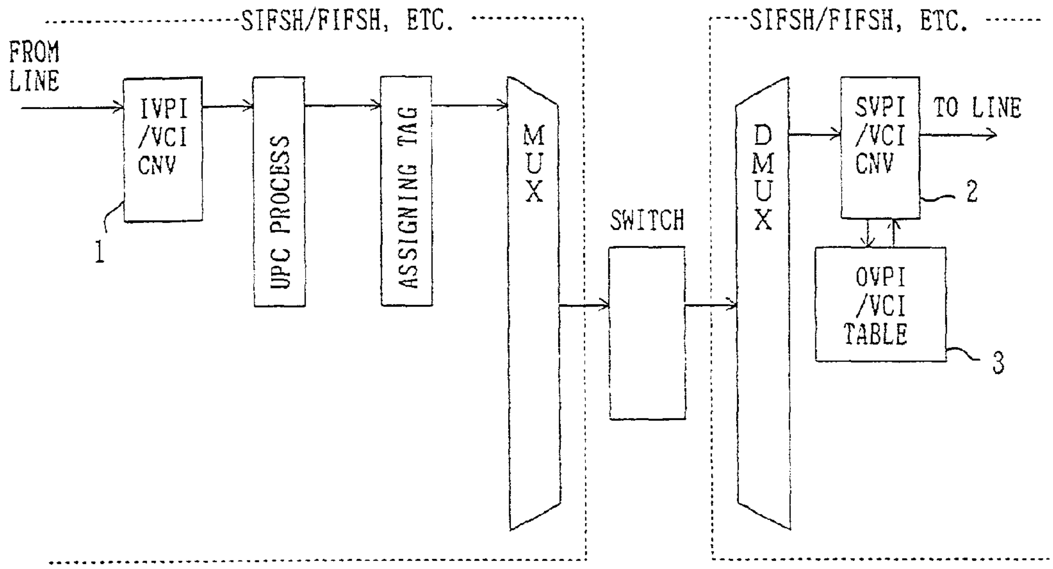

FIG. 843 shows the configuration of the switching system according to the present embodiment.

Figure 844:
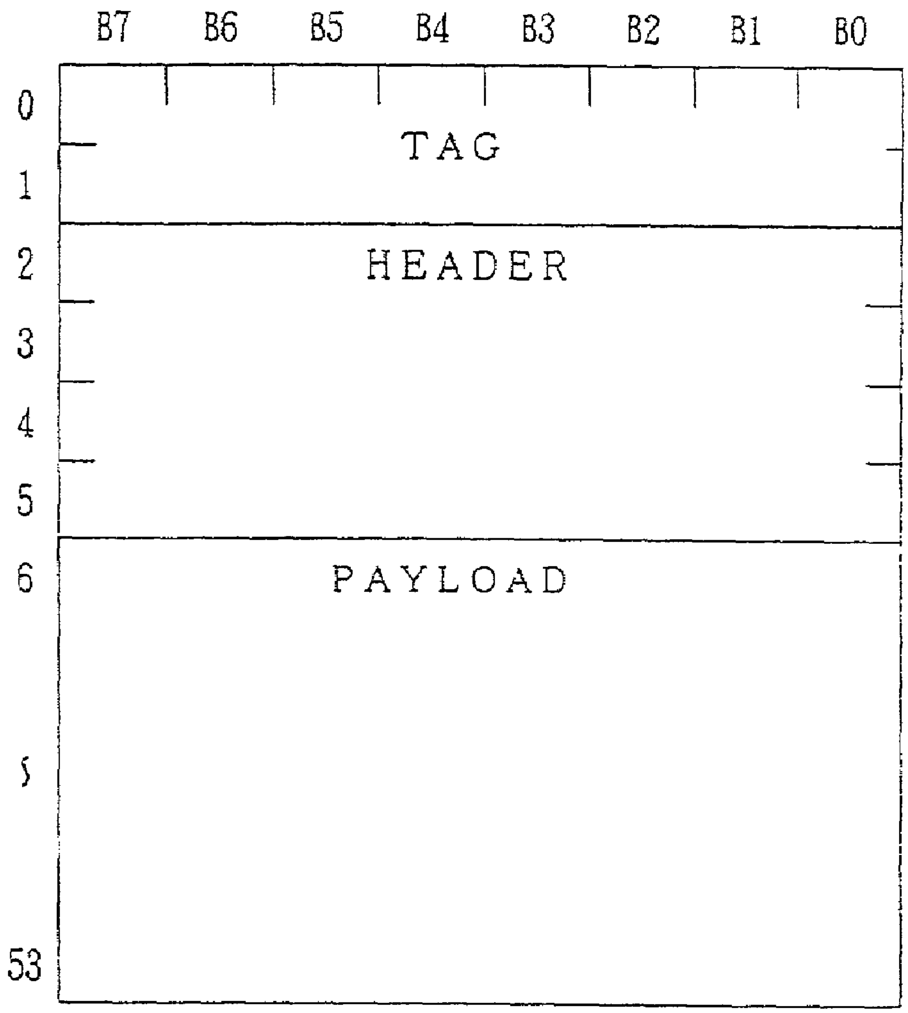

FIG. 844 shows the format of a cell in the switch.

FIG. 845 shows the configuration of the exchange station according to the present embodiment.

FIG. 846 shows an example of the configuration of the control information for a point-to-multipoint connection.

Figure 847:
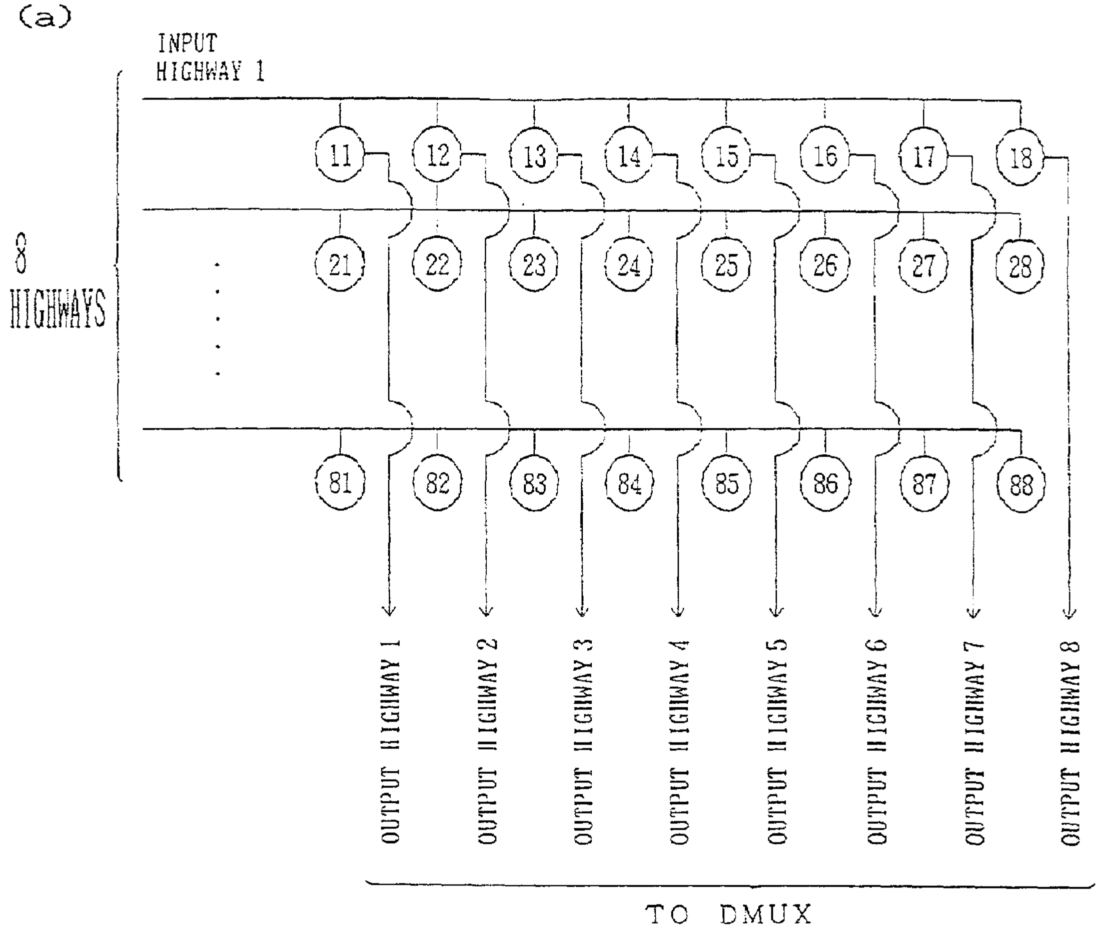

FIG. 847A shows the configuration of the buffer of a switch.

FIG. 847B shows an example of the switching bit map in the point-to-multipoint connection control information.

FIG. 848 shows another characteristic configuration of the present invention.

Figure 849:
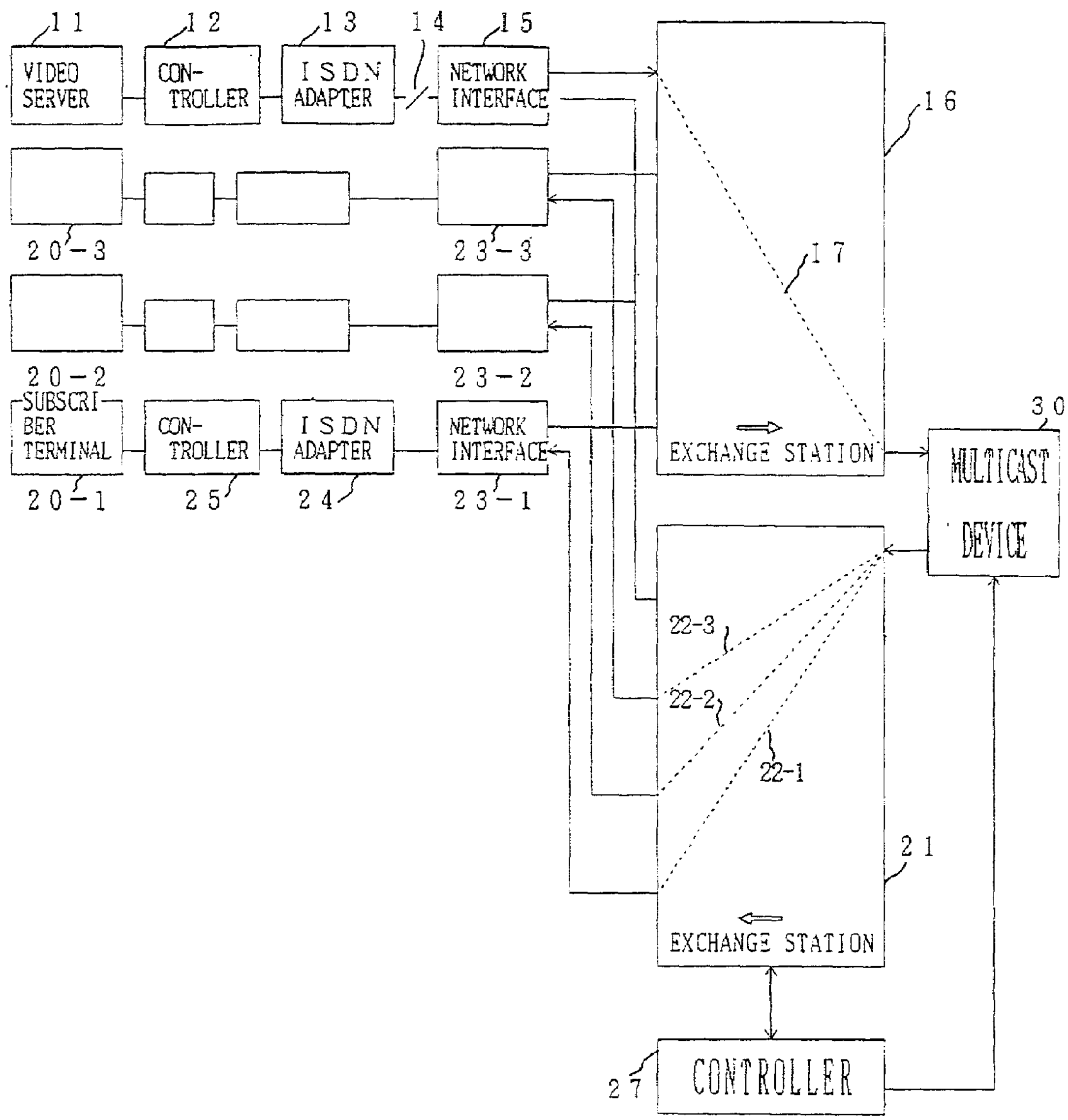

FIG. 849 shows an example in which the multicast function of the present embodiment is applied to the video distribution service.

Figure 850:
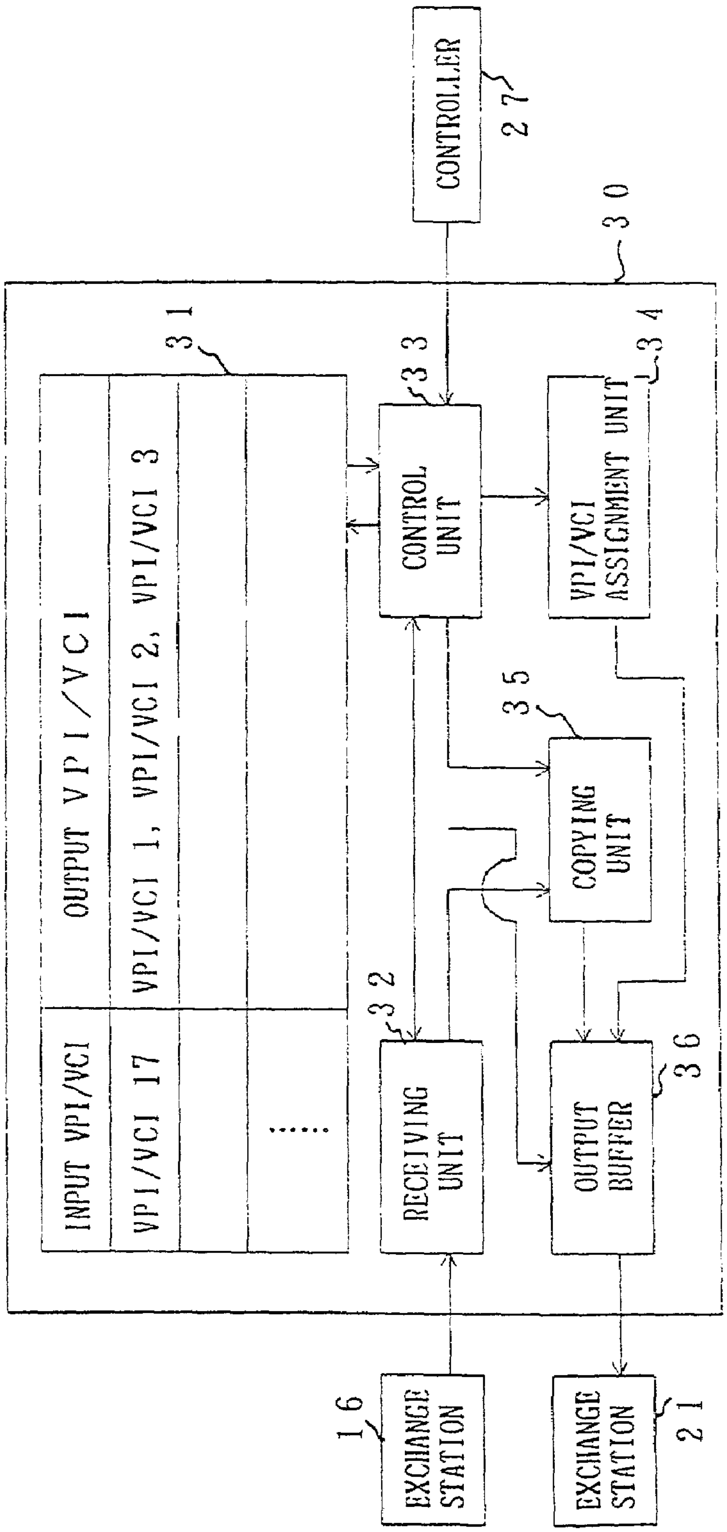

FIG. 850 shows the configuration of the multicast device 30.

Figure 851:
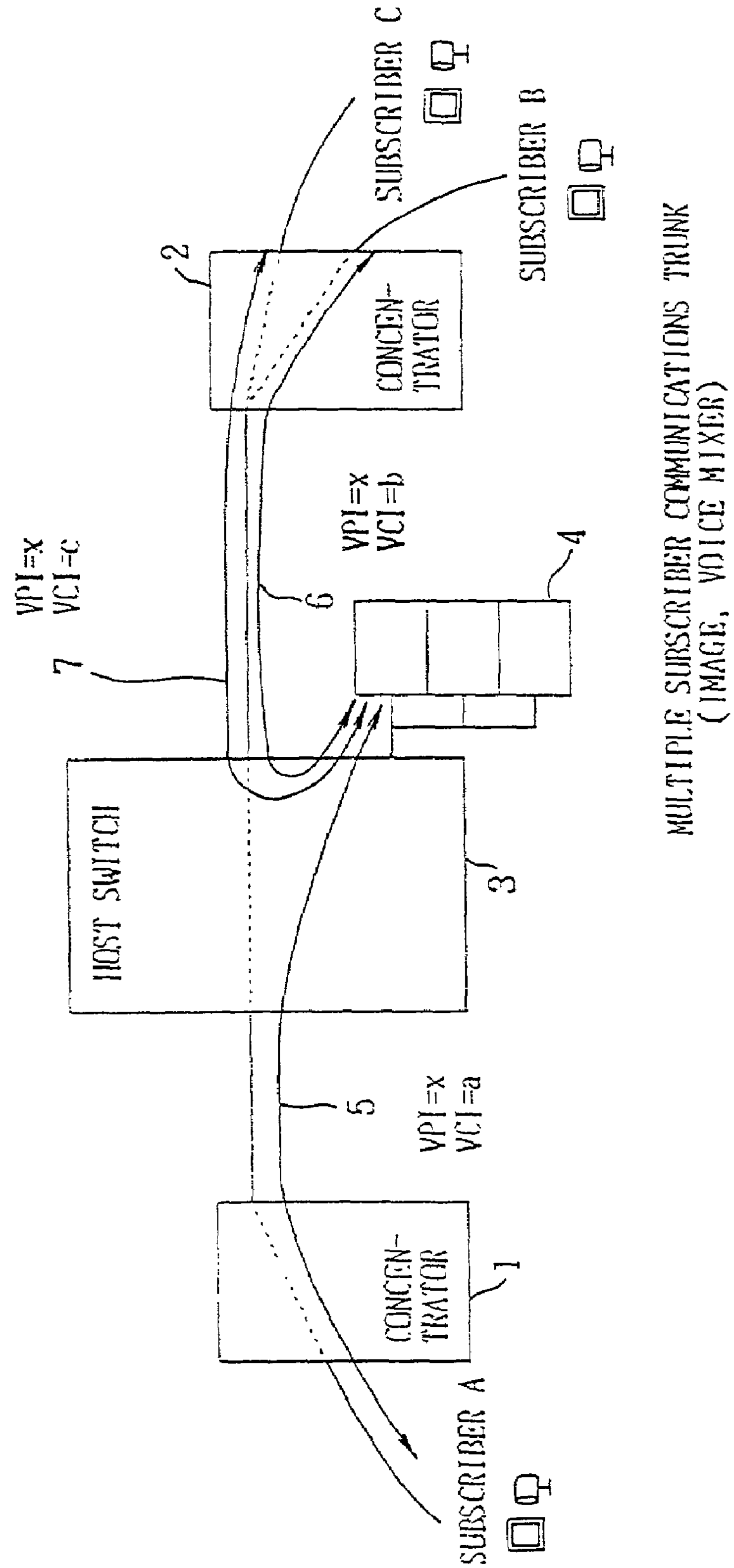

FIG. 851 shows the configuration of the system for communications among a plurality of communicators through a multiple communications trunk built in the exchange station.

Figure 852:
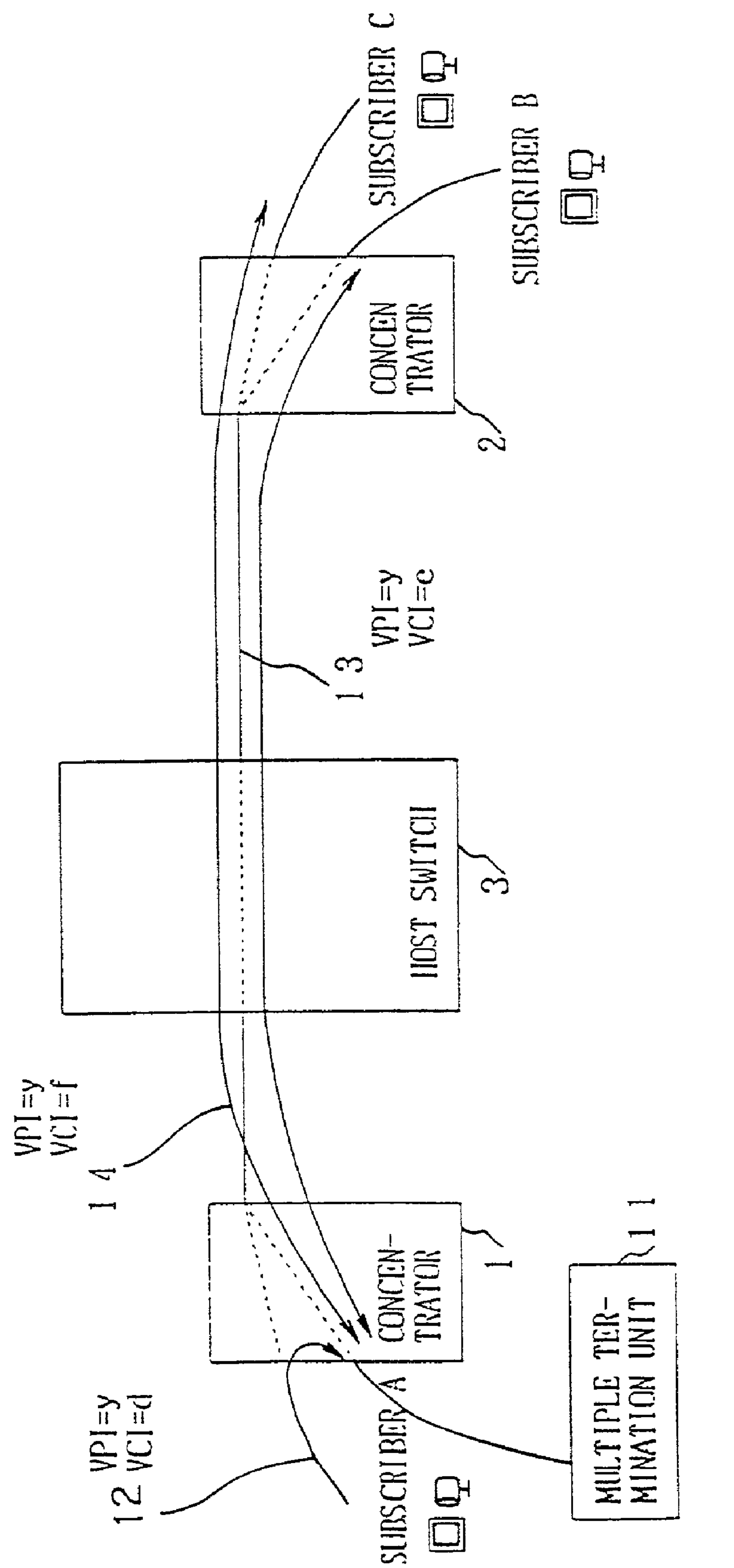

FIG. 852 shows the configuration of the system for multiple subscriber communications using a multiple termination unit in the subscriber line.

FIG. 853 is a process flowchart showing the 3-subscriber communications service in the system shown in FIG. 851.

FIG. 854 is a flowchart showing the process of the multiple subscriber communications service in the system shown in FIG. 851.

Figure 855:
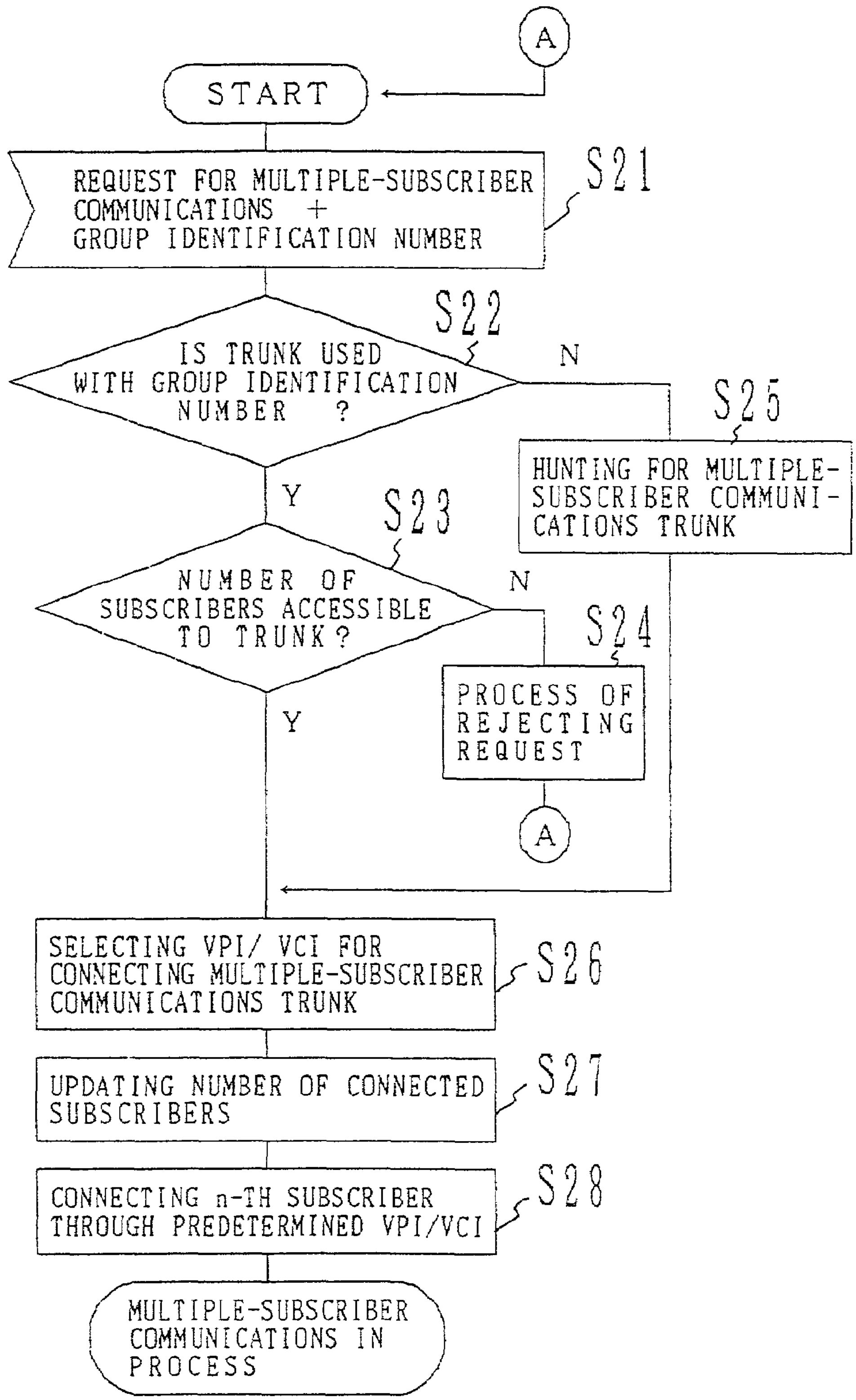

FIG. 855 is a flowchart showing the process of the multiple subscriber communications service using a group identification number.

Figure 856:
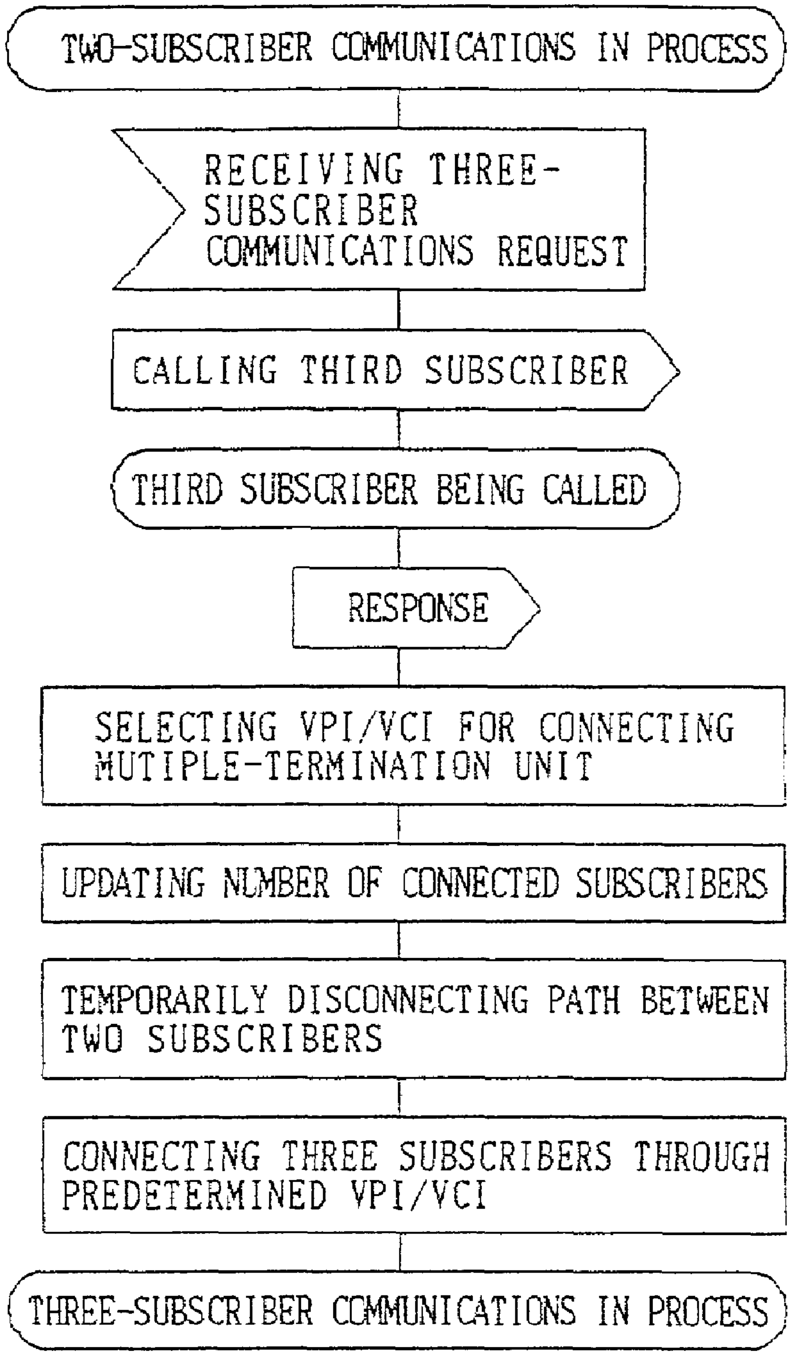

FIG. 856 shows the flowchart of the process in the 3-subscriber communications service in the system shown in FIG. 852.

Figure 857:
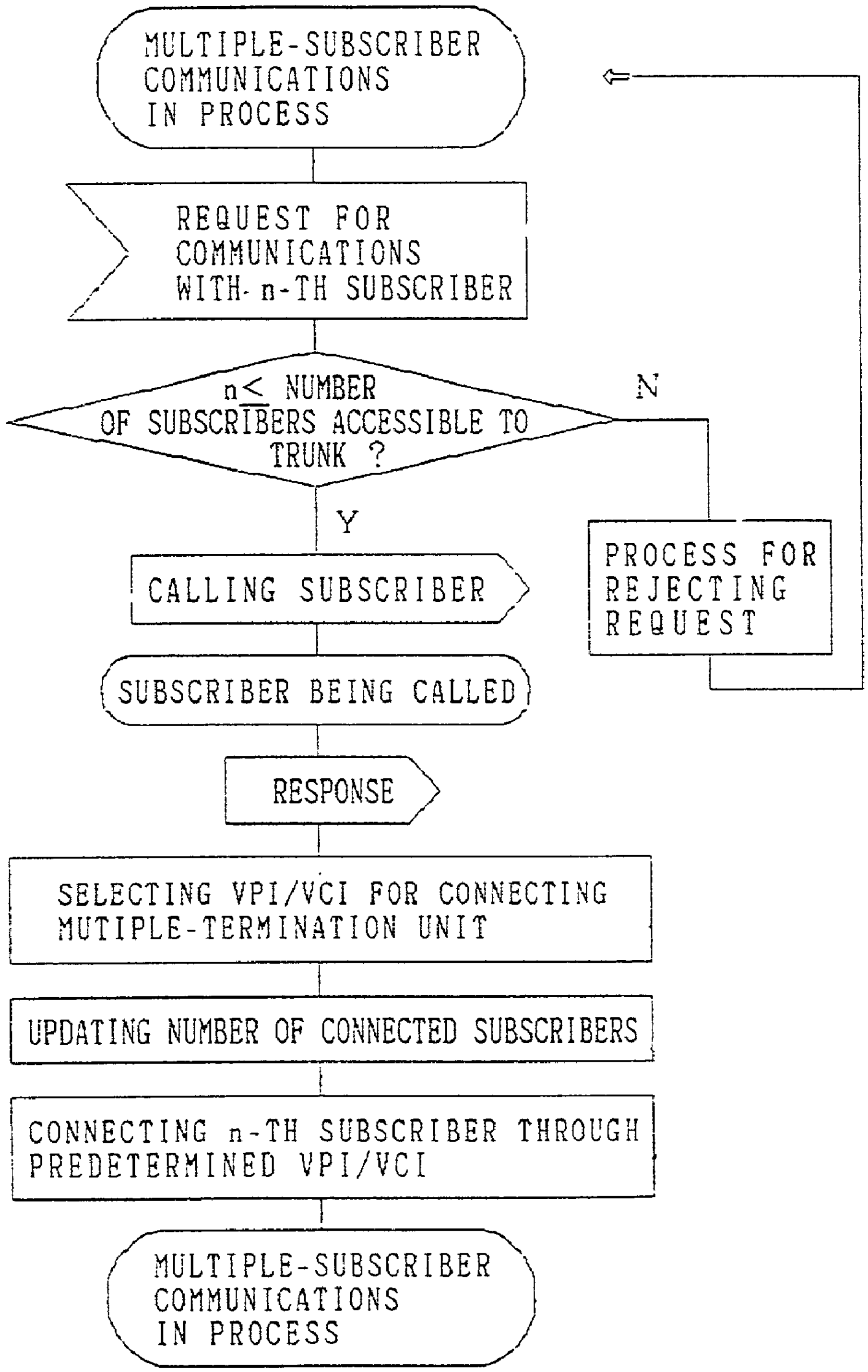

FIG. 857 is a flowchart showing the multiple subscriber communications service in the system shown in FIG. 852.

Figure 858:
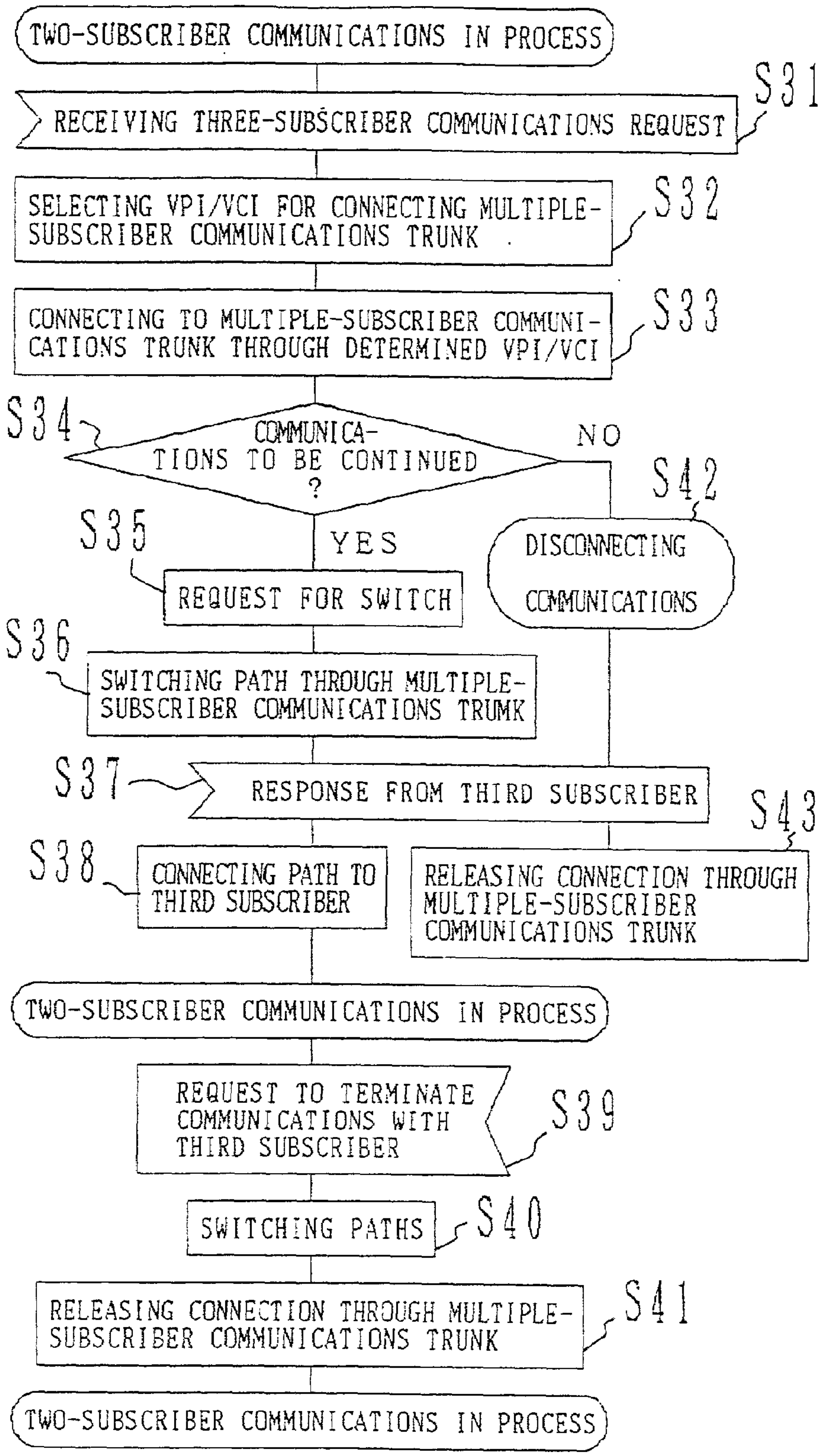

FIG. 858 is a flowchart of the call waiting service in the system shown in FIG. 851.

Figure 859:
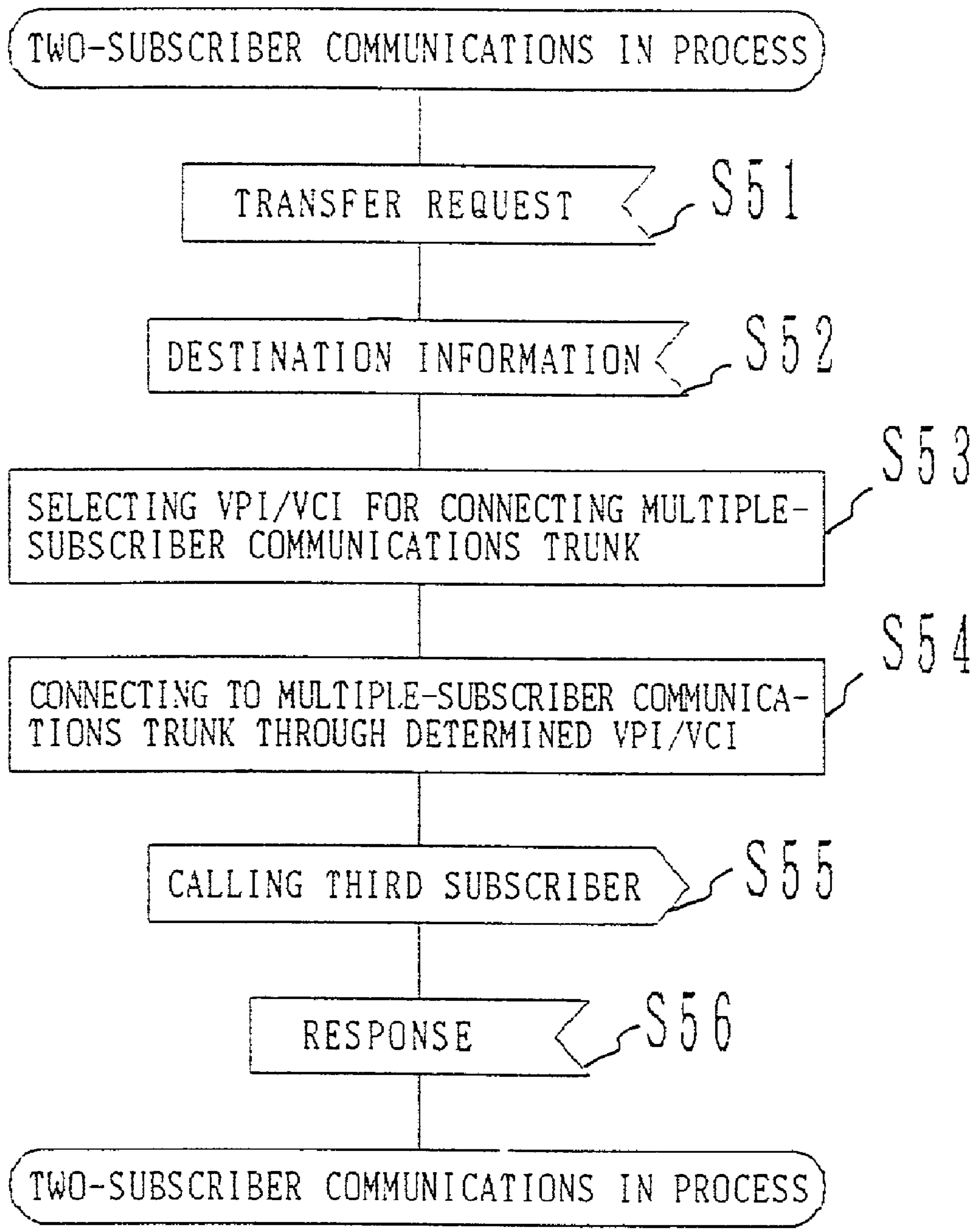

FIG. 859 is a flowchart (1) of a call transfer service in the system shown in FIG. 851.

Figure 860:
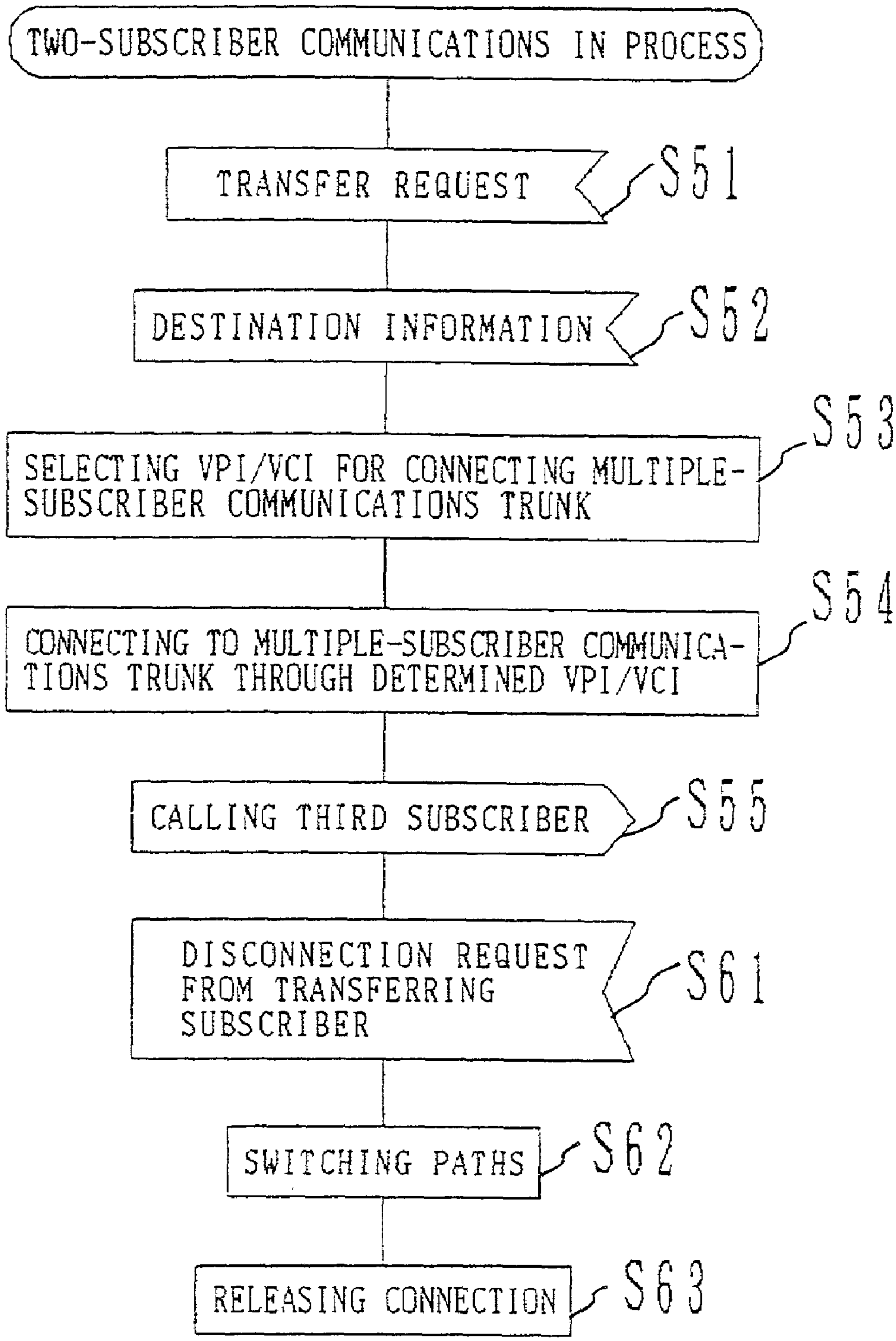

FIG. 860 is a flowchart (2) of a call transfer service in the system shown in FIG. 851.

Figure 861:
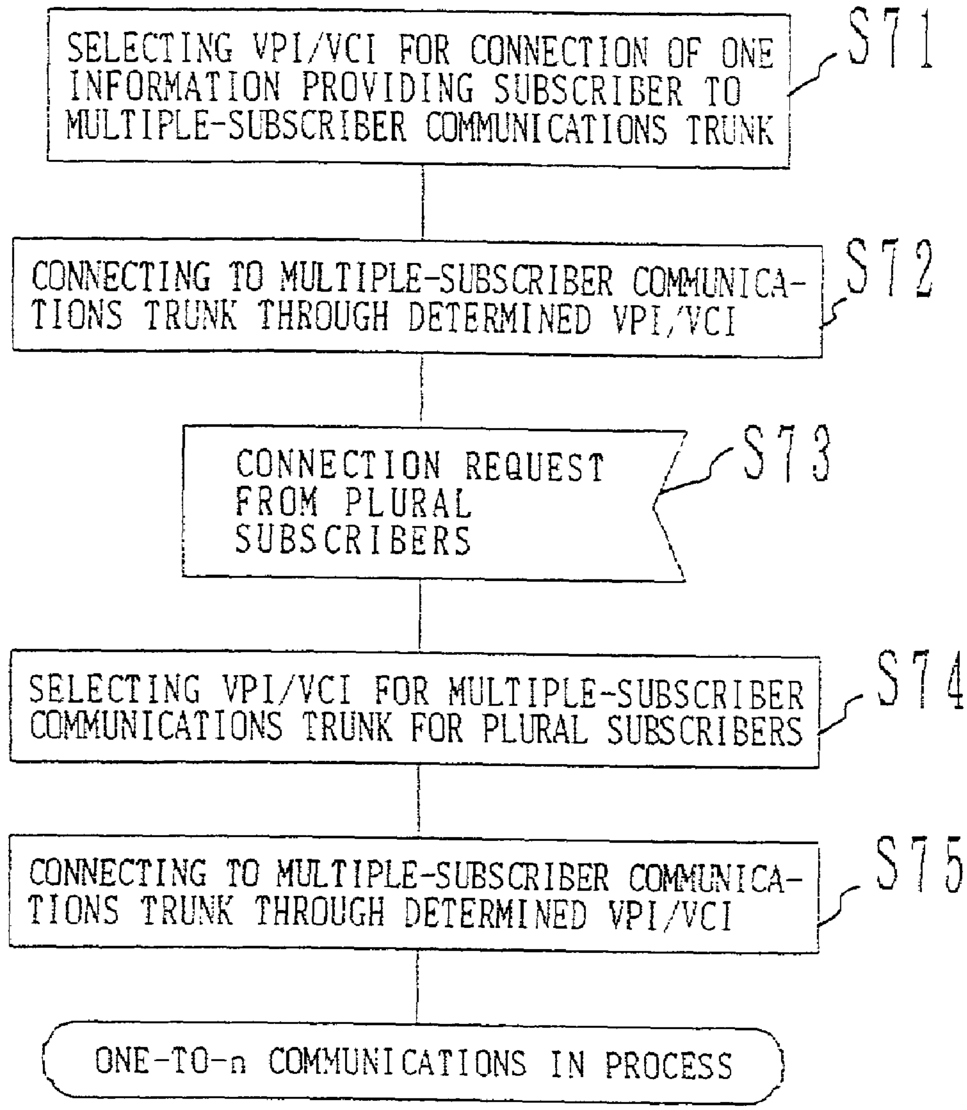

FIG. 861 is a flowchart showing the point-to-multipoint connection service in the system shown in FIG. 851.

FIG. 862 is a flowchart of the call waiting service provided by the system shown in FIGS. 852.

Figure 863:
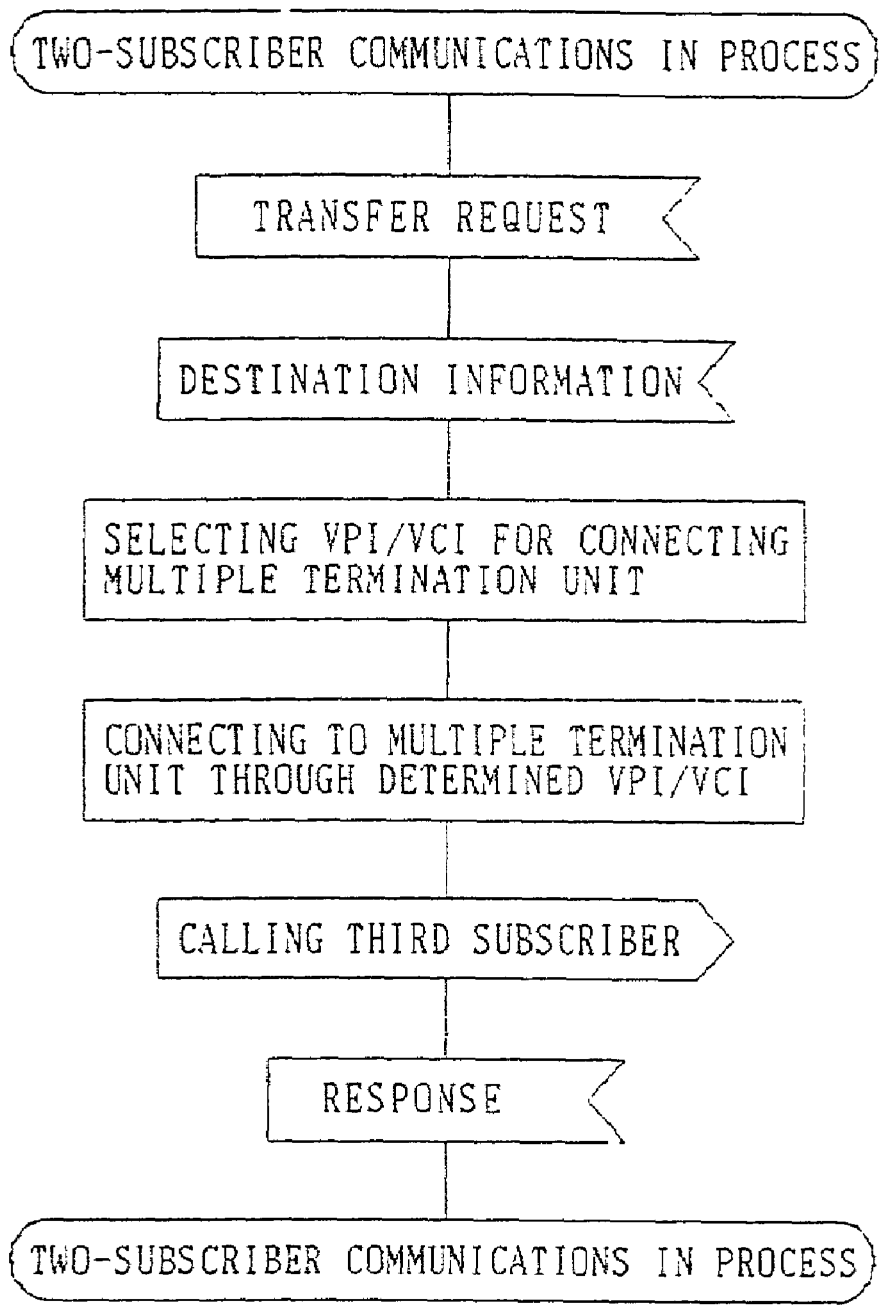

FIG. 863 is a flowchart (1) of the call transfer service provided by the system shown in FIGS. 852.

Figure 864:
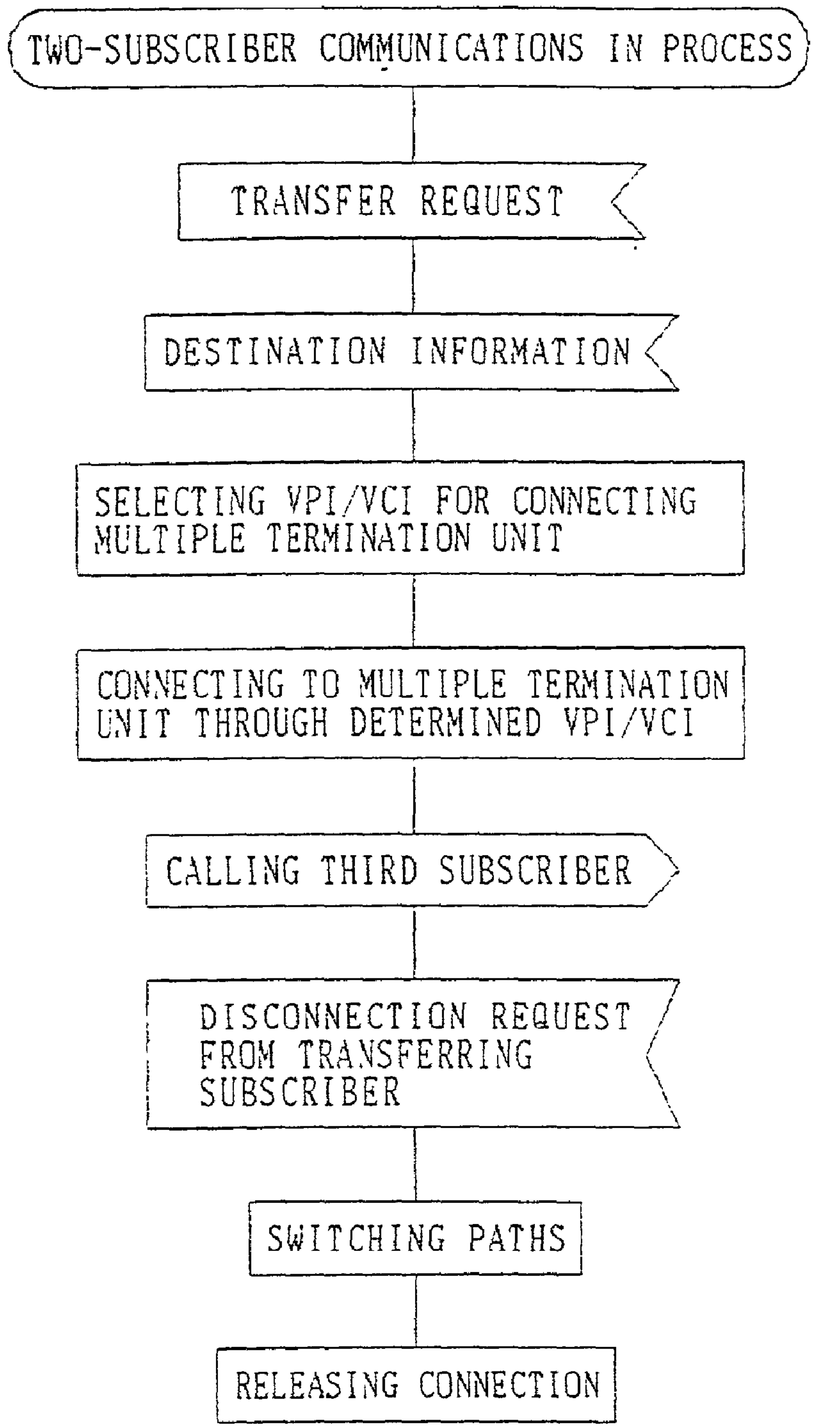

FIG. 864 is a flowchart (2) of the call transfer service provided by the system shown in FIGS. 852.

FIG. 865 is a flowchart of the point-to-multipoint connection service provided by the system shown in FIGS. 852.

Figure 866:
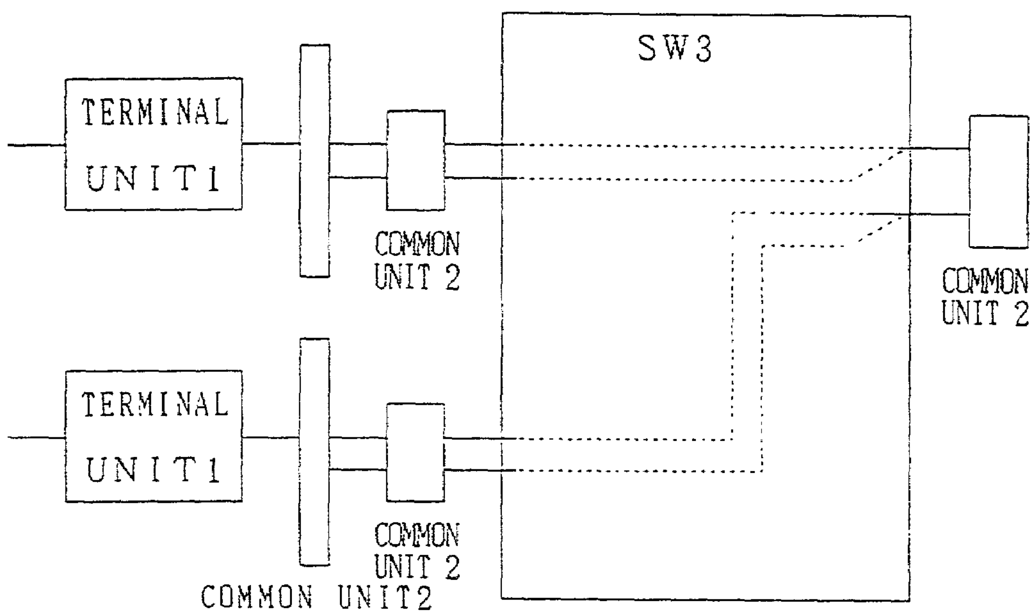

FIG. 866 shows the configuration of the ATM switch related to the present invention to solve the 18th problem.

FIG. 867 shows the characteristic configuration related to the present invention to solve the 18th problems.

Figure 868:
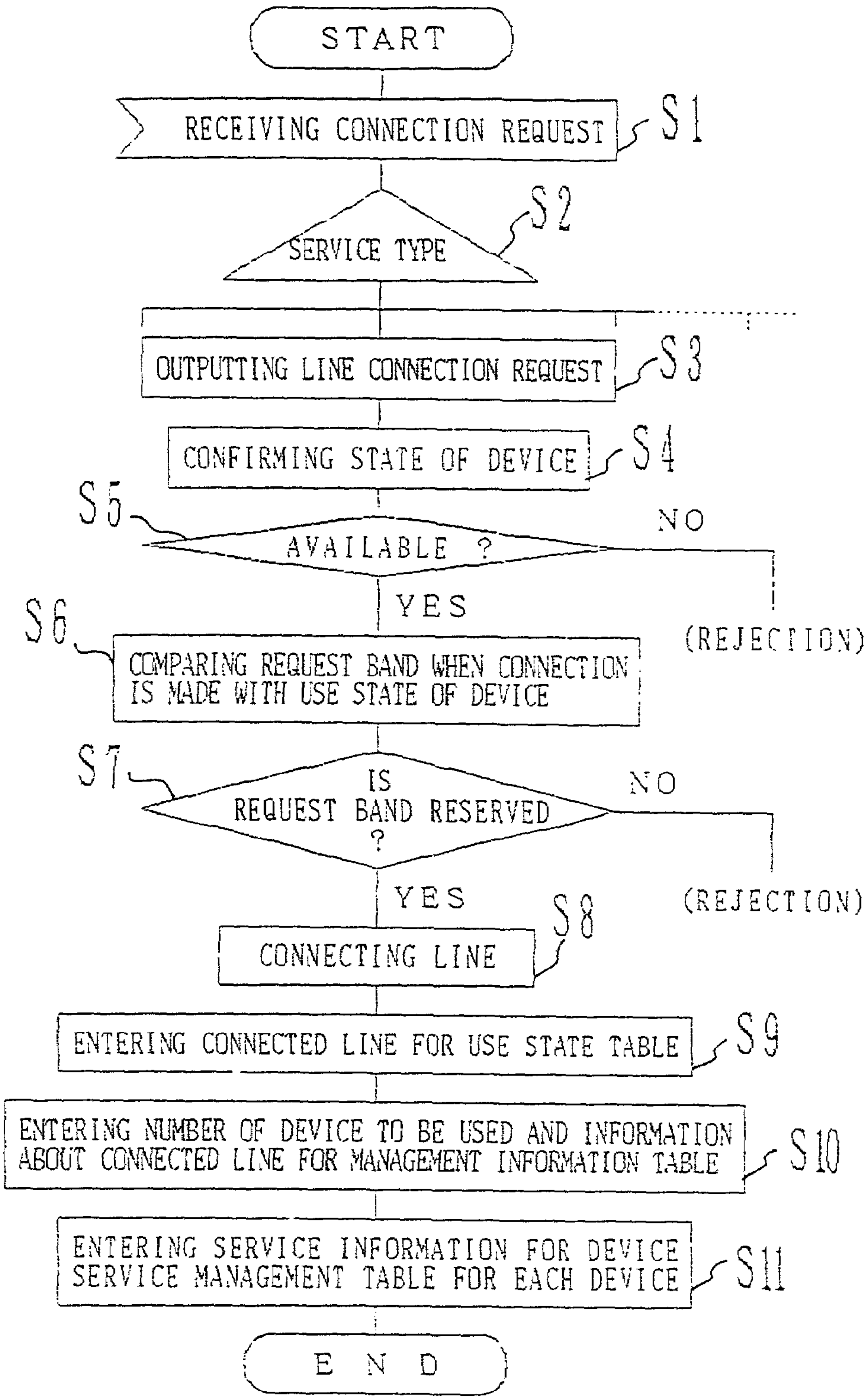

FIG. 868 is a flowchart showing the normal line connecting process with the characteristic configuration related to the present invention to solve the 18th problems.

Figure 869:
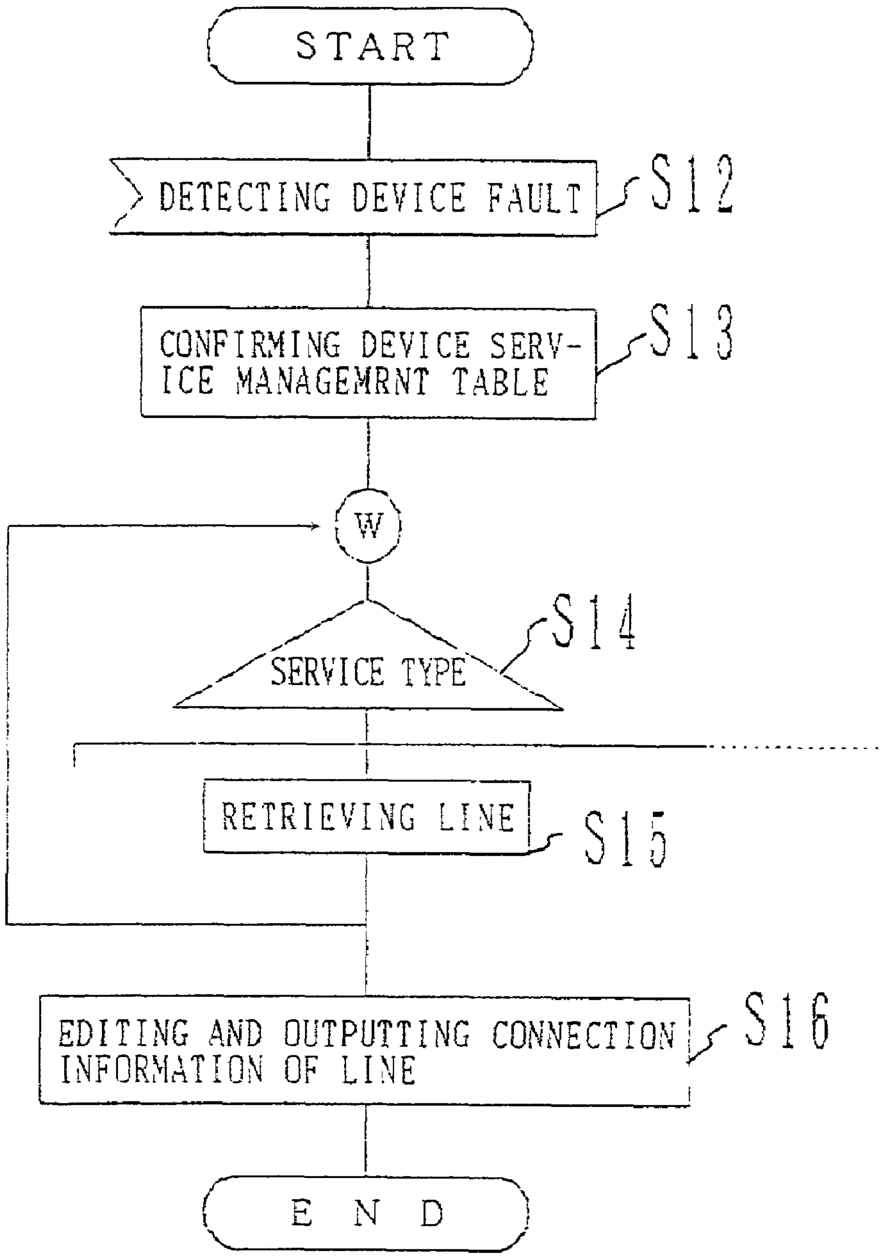

FIG. 869 is a flowchart showing the operations of the notifying process in the event of a failure on a device with the characteristic configuration related to the present invention to solve the 18th problems.

Figure 870:
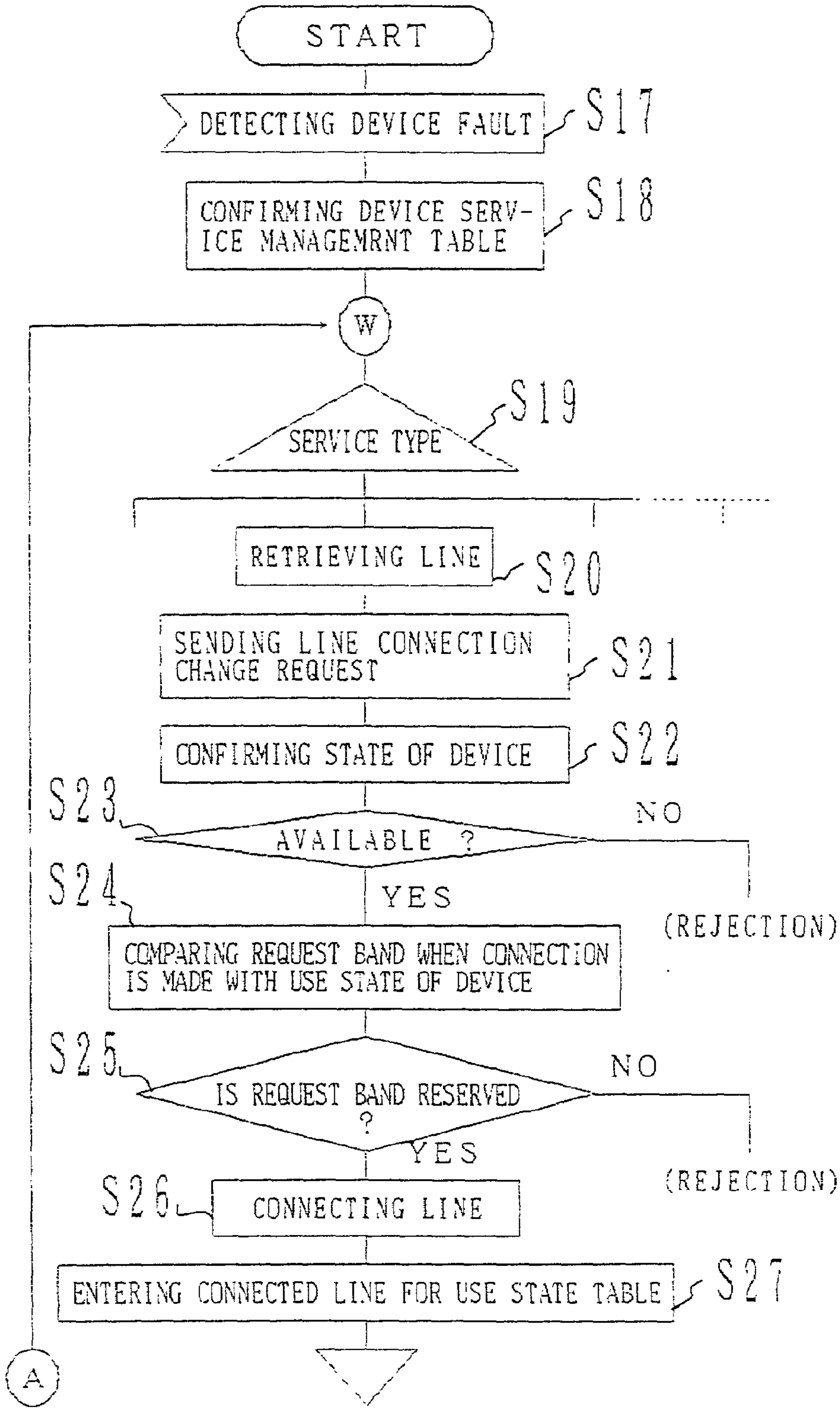
Figure 871:
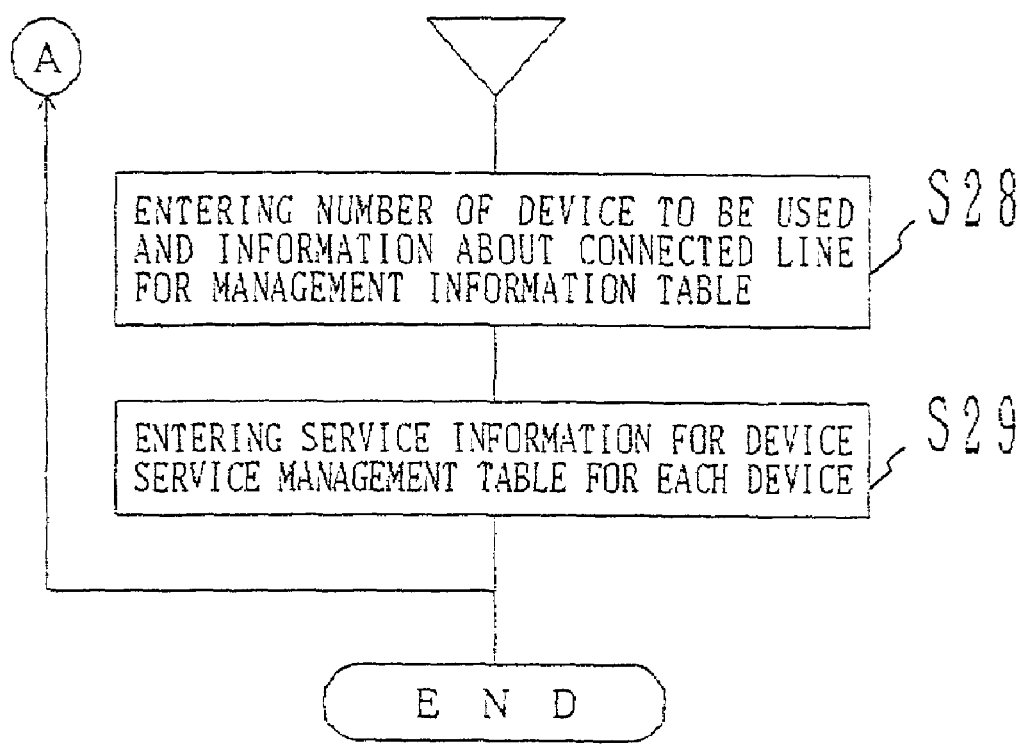

FIG. 870 is a flowchart (1) showing the-operations of the automatic line connection switching process in the event of a failure on a device with the characteristic configuration related to the present invention to solve the 18th problems FIG. 871 is a flowchart (2) showing the operations of the automatic line connection switching process in the event of a failure on a device with the characteristic configuration related to the present invention to solve the 18th problems.

Figure 872:
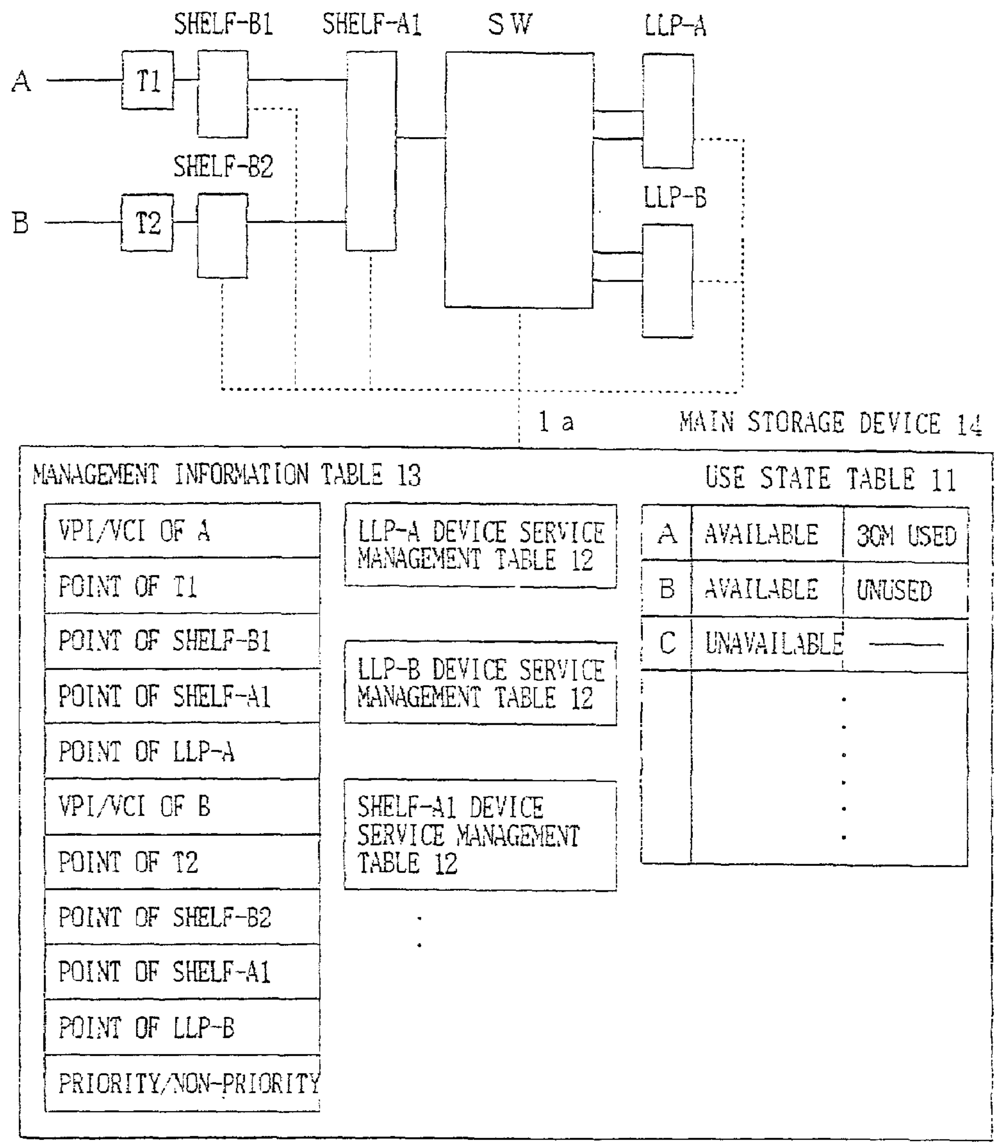

FIG. 872 shows practical examples of use state table 11, device service management table 12, and management information table 13.

Figure 873:
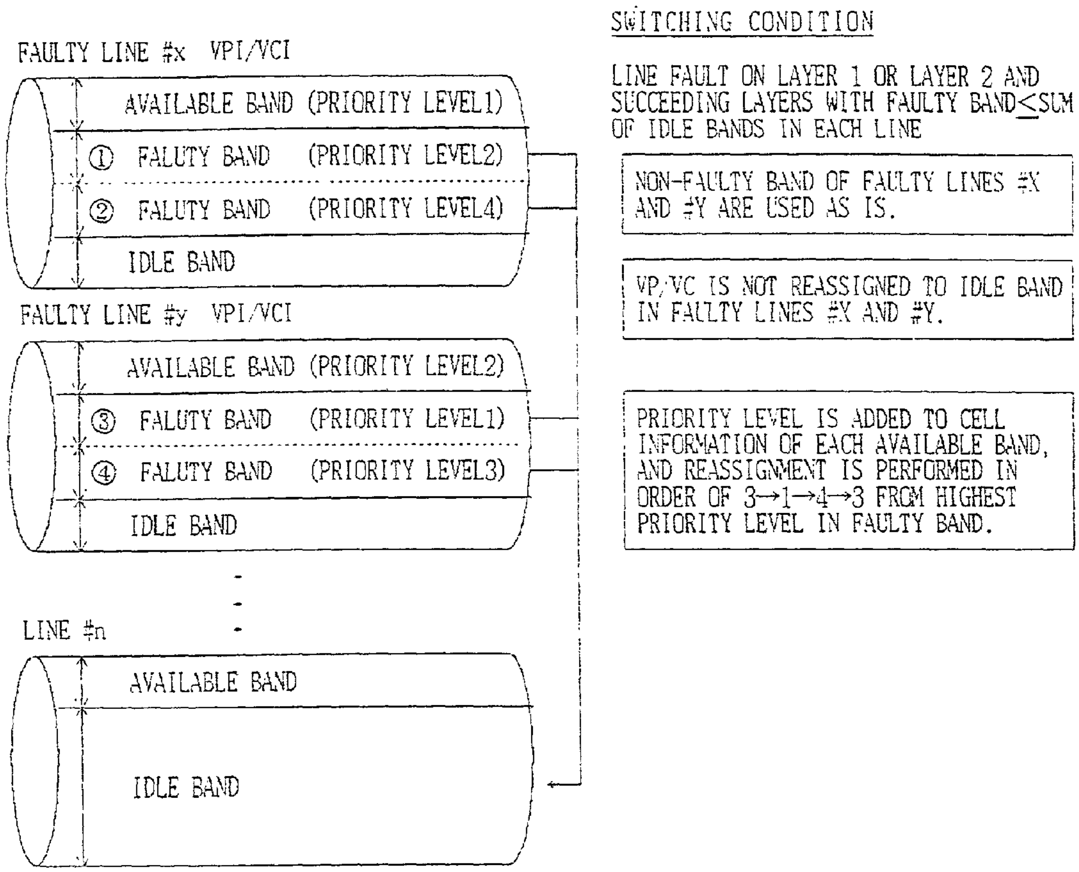

FIG. 873 shows the operations of reassigning an idle band in a non-faulty line to a faulty band.

Figure 874:
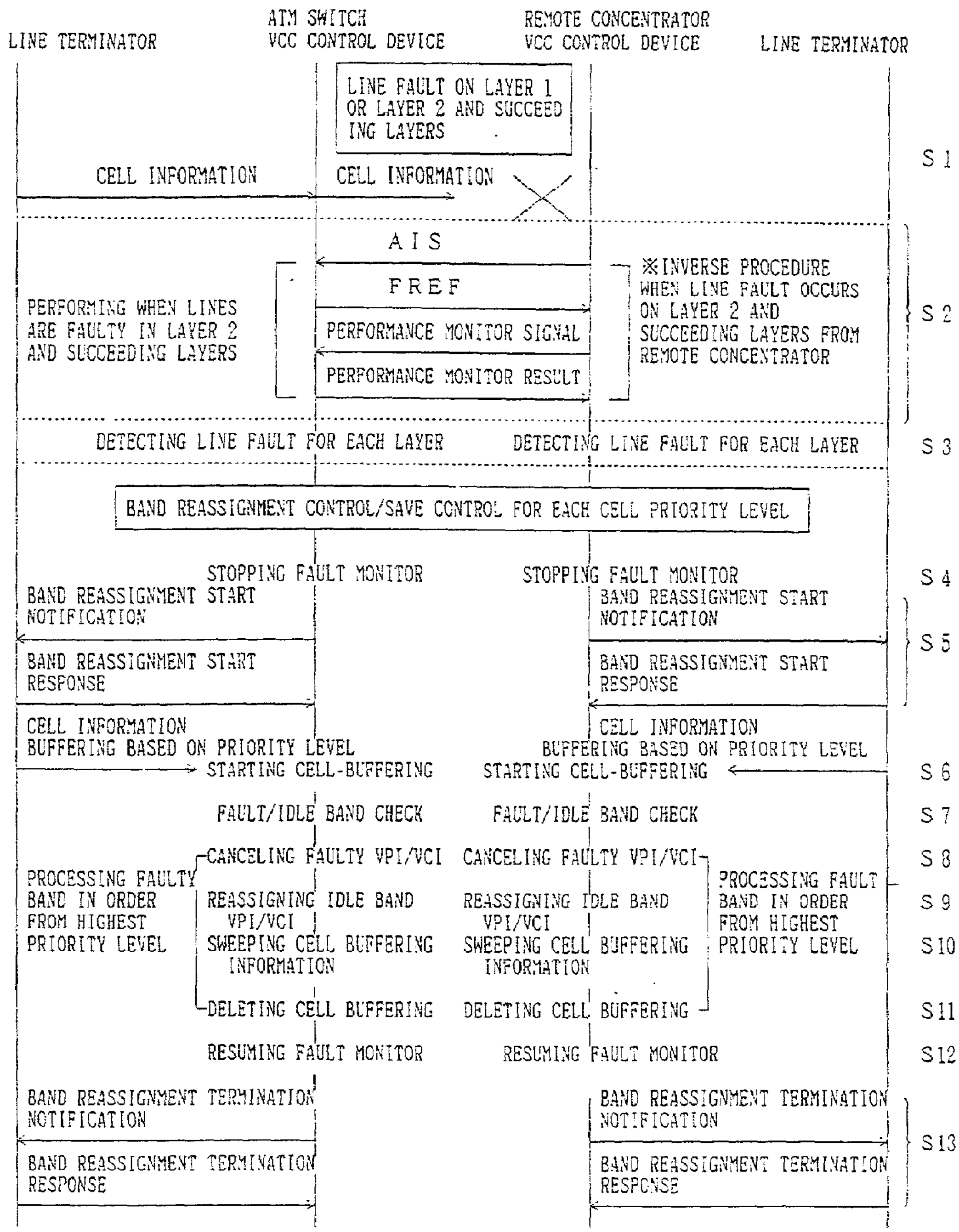

FIG. 874 shows the sequence of the processes of reassigning an idle band in a non-faulty line to a faulty band.

Figure 875:
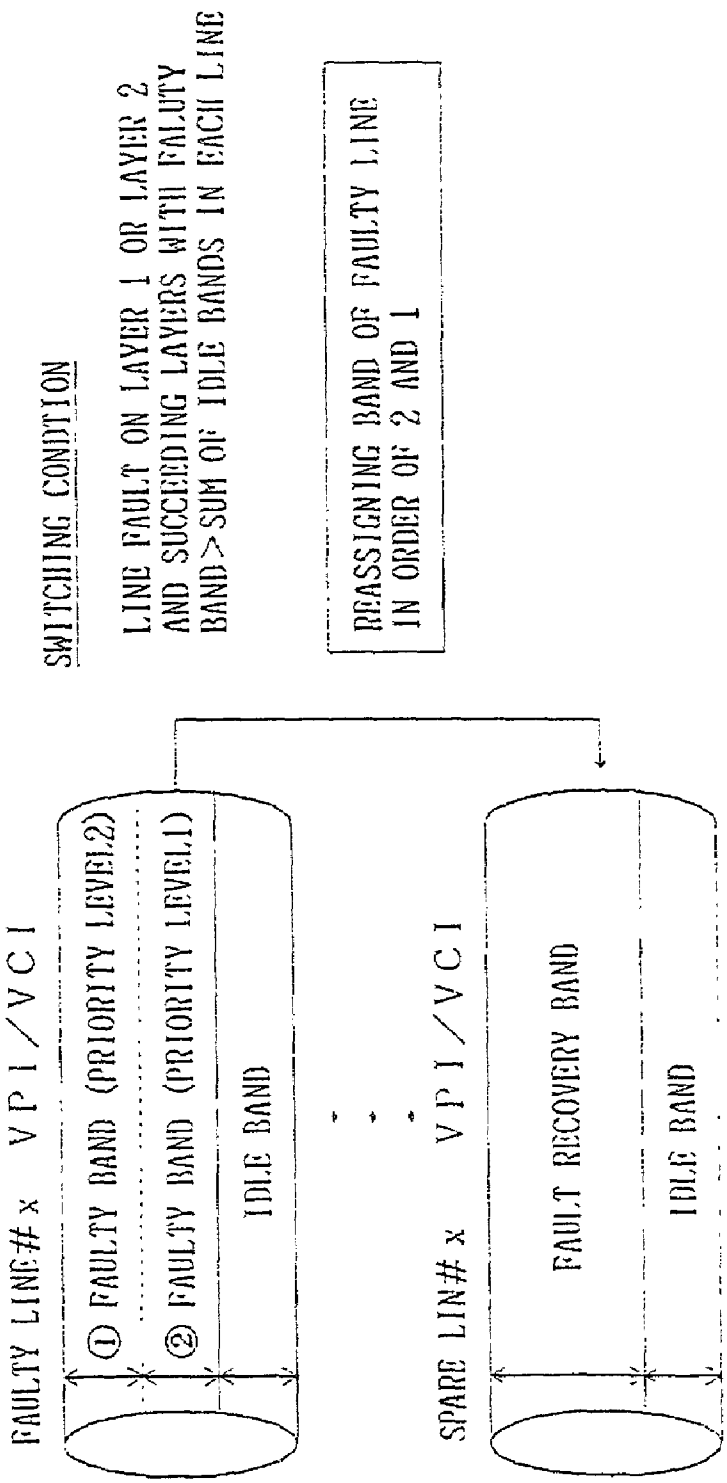

FIG. 875 shows the operations of physically switching a physical line containing a faulty band to a spare line.

Figure 876:
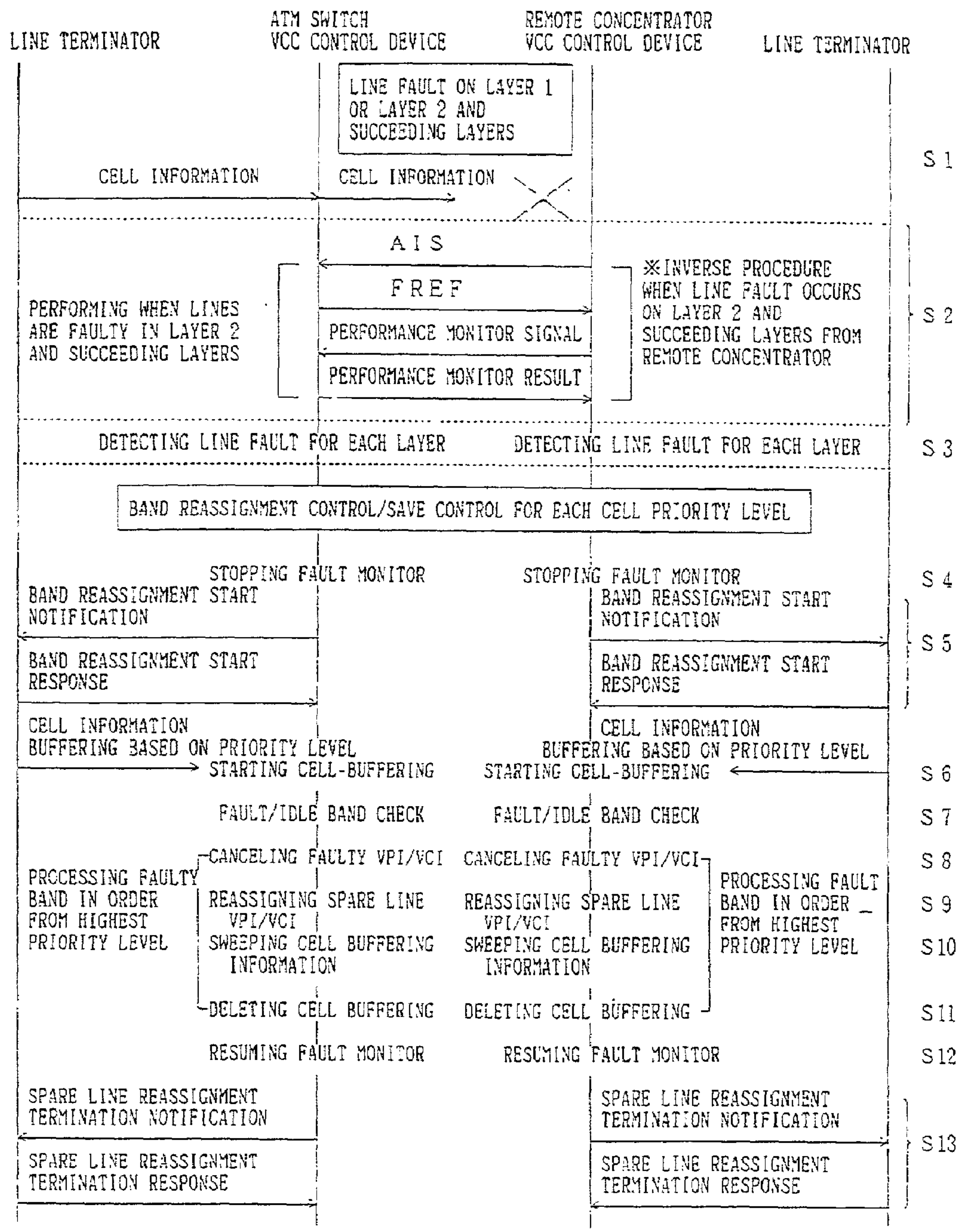

FIG. 876 shows the sequence of the process of physically switching a physical line containing a faulty band to a spare line.

Figure 877:
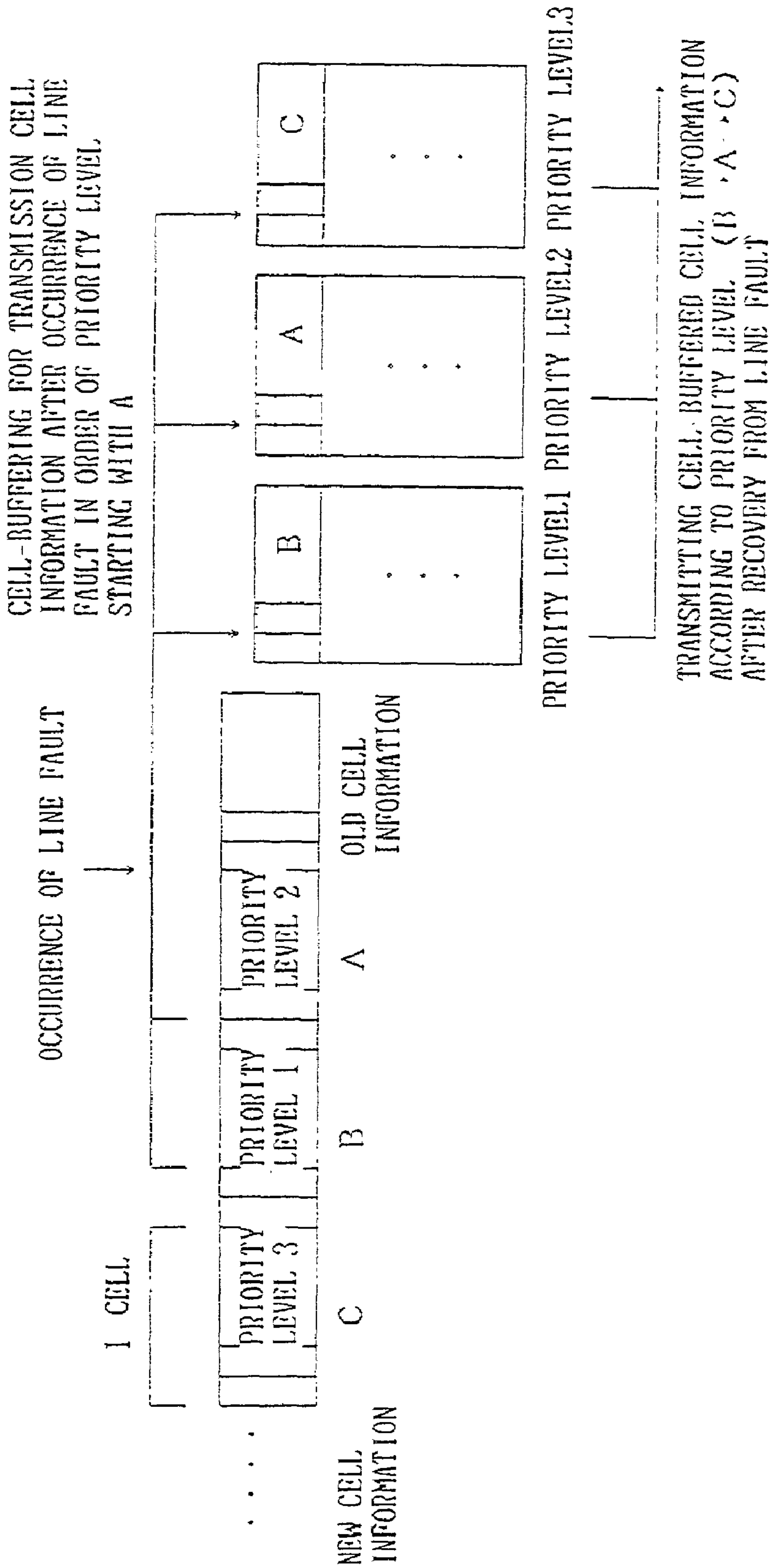

FIG. 877 shows the process of buffering the ATM cells in order of priority levels.

FIG. 878 shows an example of assigning priority levels.

FIG. 879 shows the configuration of the system in which a remote concentrator 1 is connected to a host switch 2 as the basic components of the present embodiment.

Figure 880:
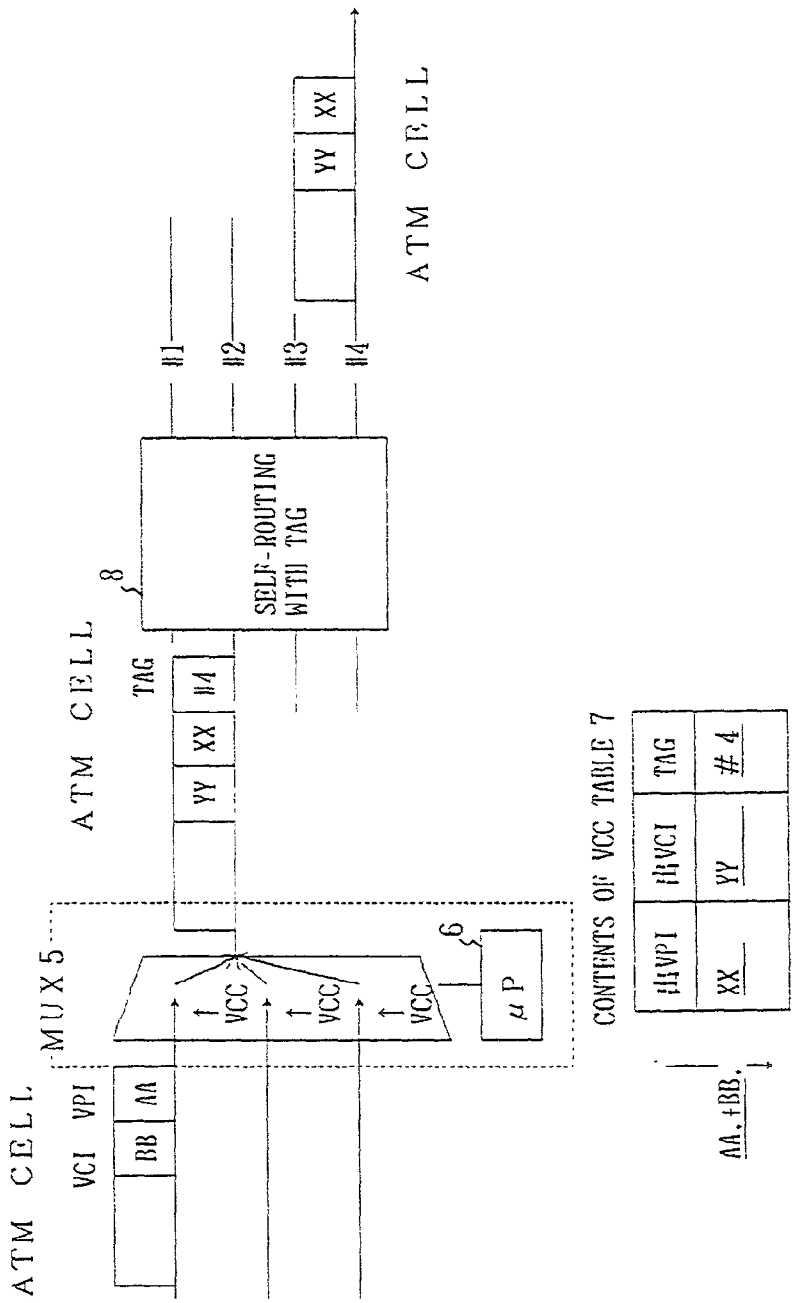

FIG. 880 shows the common principle of the ATM switch system related to the present embodiment.

Figure 881:
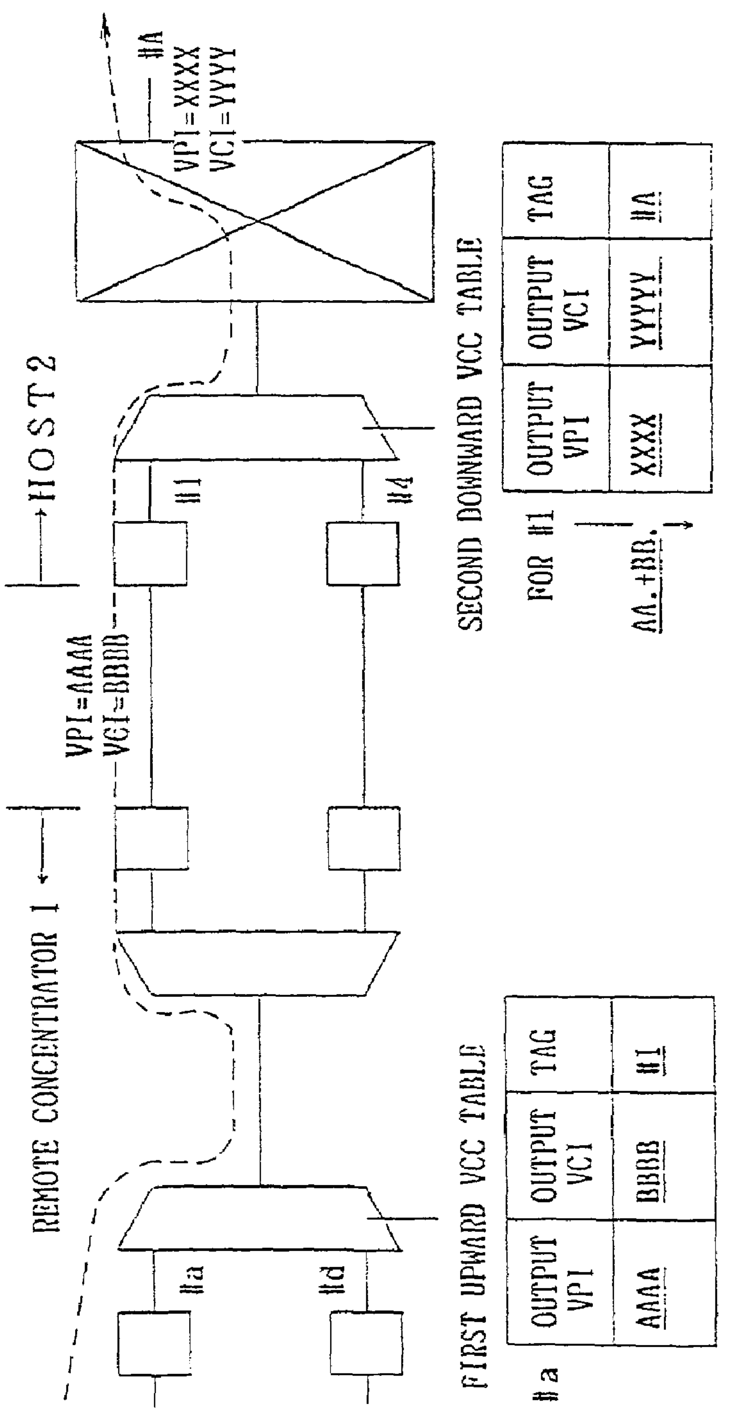

FIG. 881 shows the position where the VCC table is accommodated for use by the upward path from the remote concentrator 1 to the host switch 2 in the system in which the remote concentrator 1 is connected to the host switch 2 (HOST 2) shown in FIG. 879.

Figure 882:
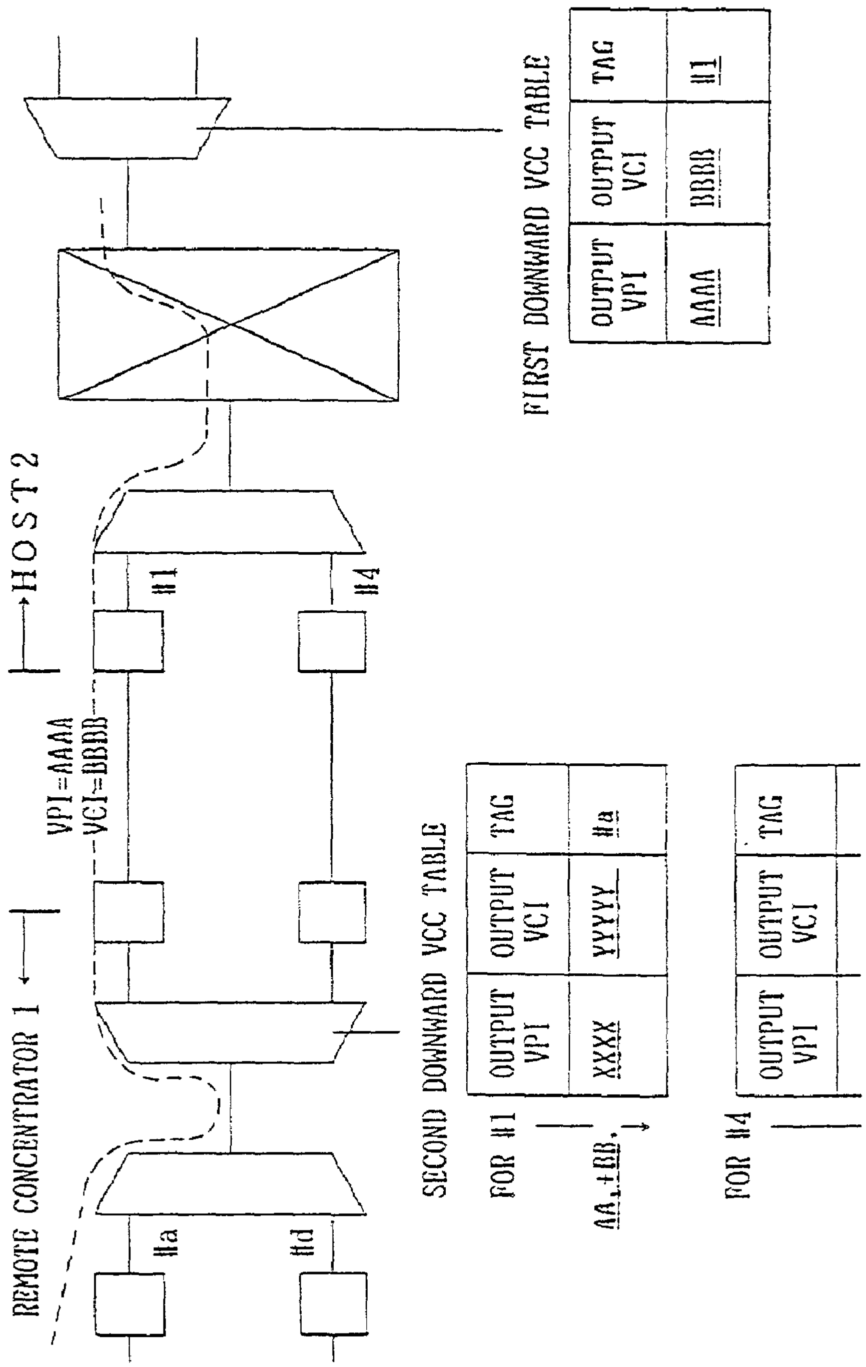

FIG. 882 shows the position where the VCC table is accommodated for use by the downward path from the host switch 2 (HOST 2) to the remote concentrator 1 in the system in which the remote concentrator 1 is connected to the host switch 2 (HOST 2) shown in FIG. 879.

FIG. 883 is a flowchart showing the process of connecting a path contained in the first process example according to the embodiment based on the configuration shown in FIGS. 879, 881, and 882.

FIG. 884 shows examples of the normal VCC table and reassignment VCC table.

Figure 885:
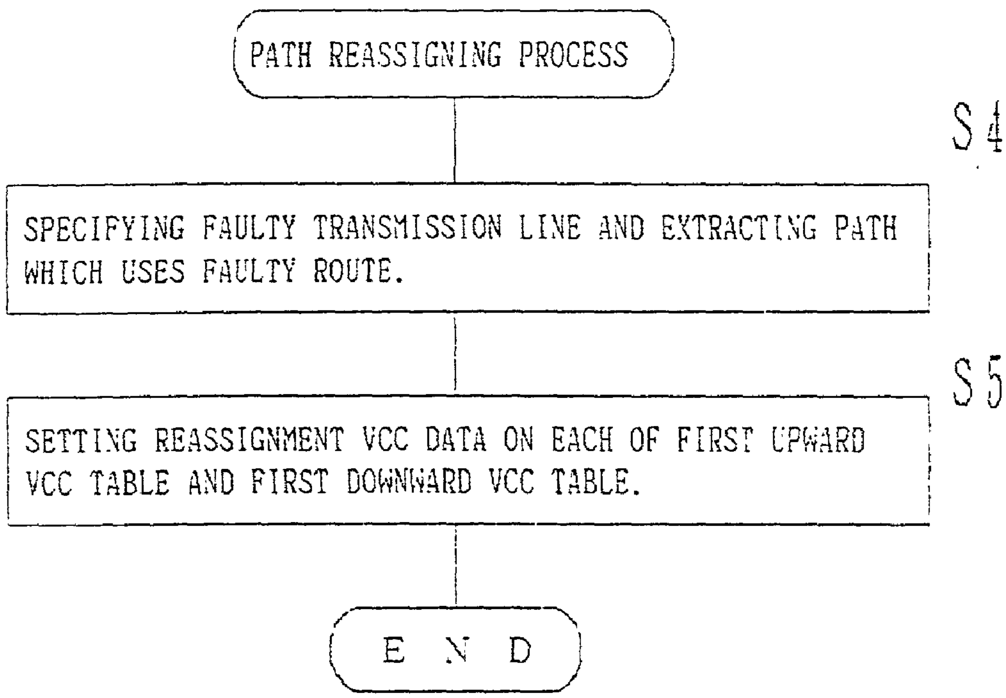

FIG. 885 is a flowchart showing the process of reassigning a path in the event of a failure contained in the first process example according to the embodiment based on the configuration shown in FIGS. 879, 881, and 882.

Figure 886:
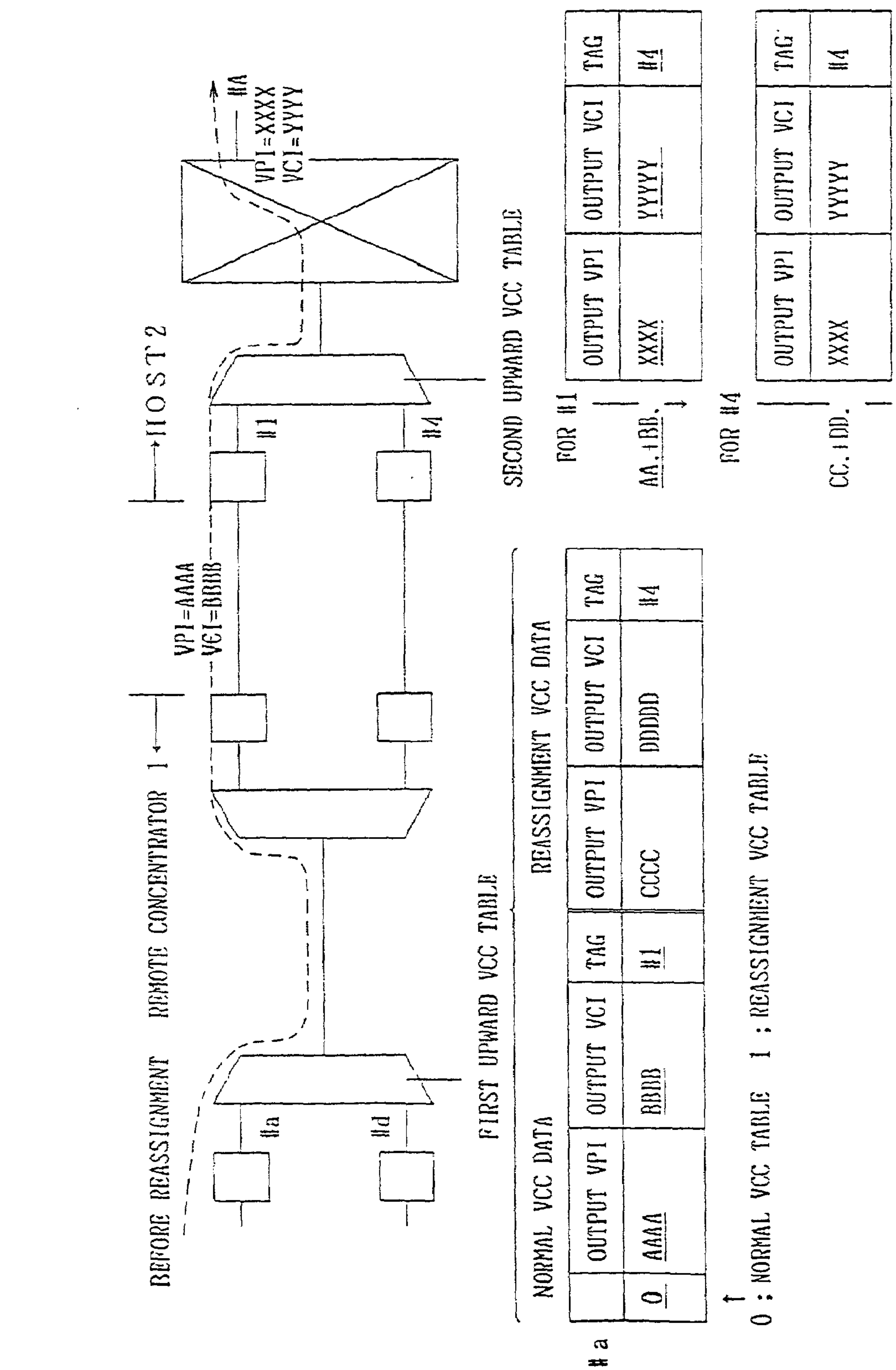

FIG. 886 shows the second process example (upward, before reassigning a path) of the path reassigning process in the event of a failure according to the embodiment based on the configuration shown in FIGS. 879, 881, and 882.

Figure 887:
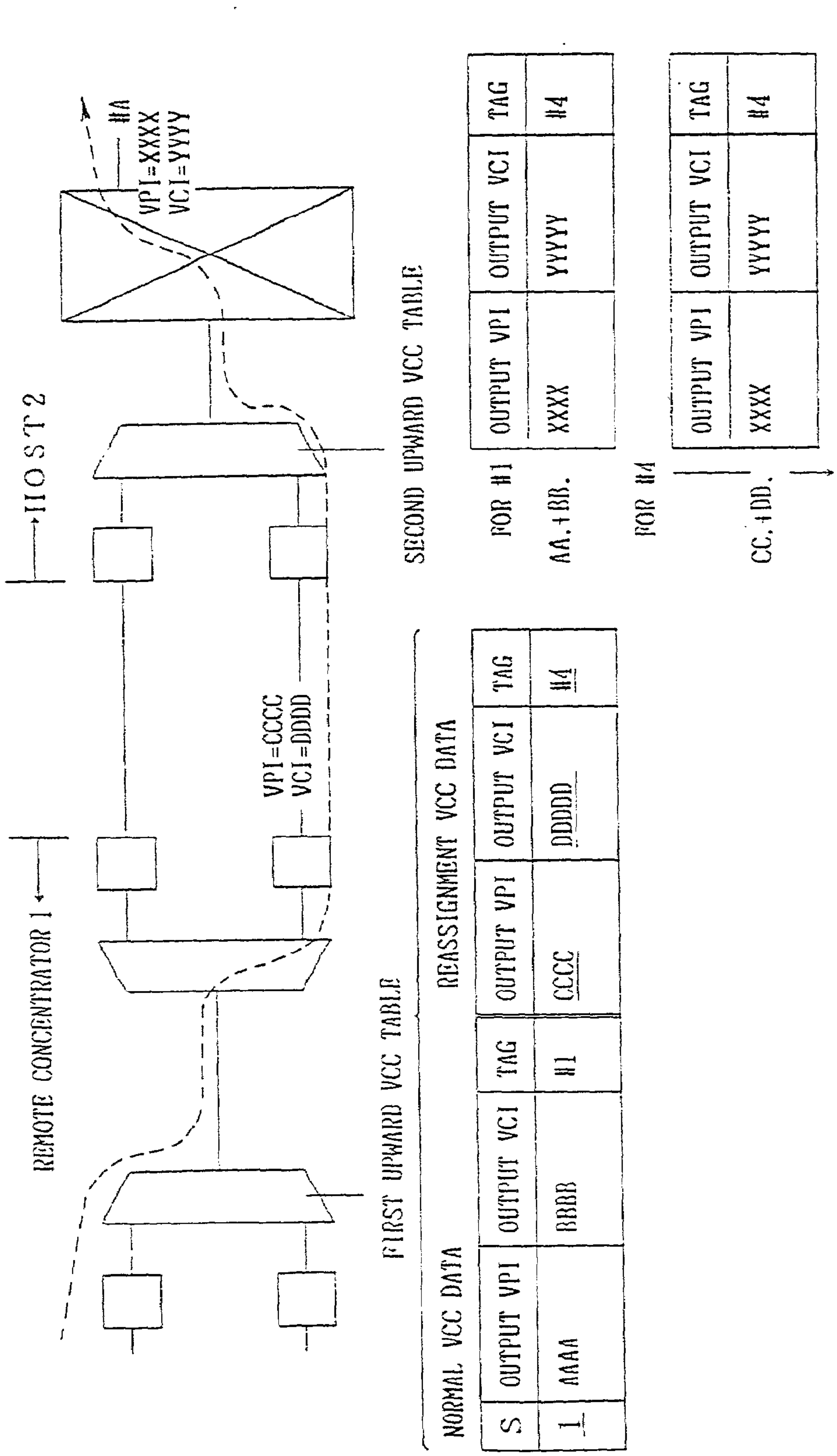

FIG. 887 shows the second process example (upward, after reassigning a path) of the path reassigning process in the event of a failure according to the embodiment based on the configuration shown in FIGS. 879, 881, and 882.

Figure 888:
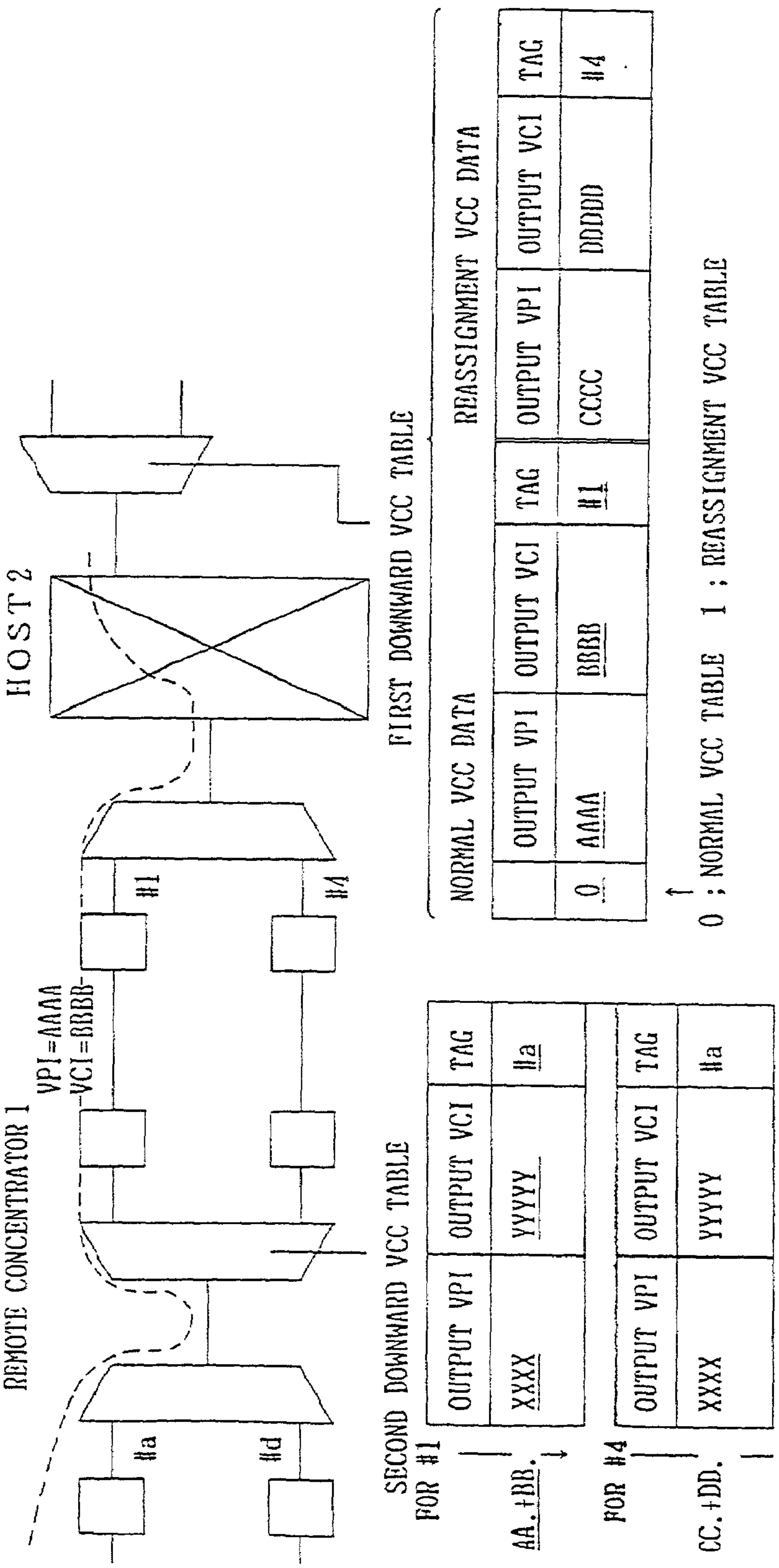

FIG. 888 the second process example (downward, before reassigning a path) of the path reassigning process in the event of a failure according to the embodiment based on the configuration shown in FIGS. 879, 881, and 882.

Figure 889:
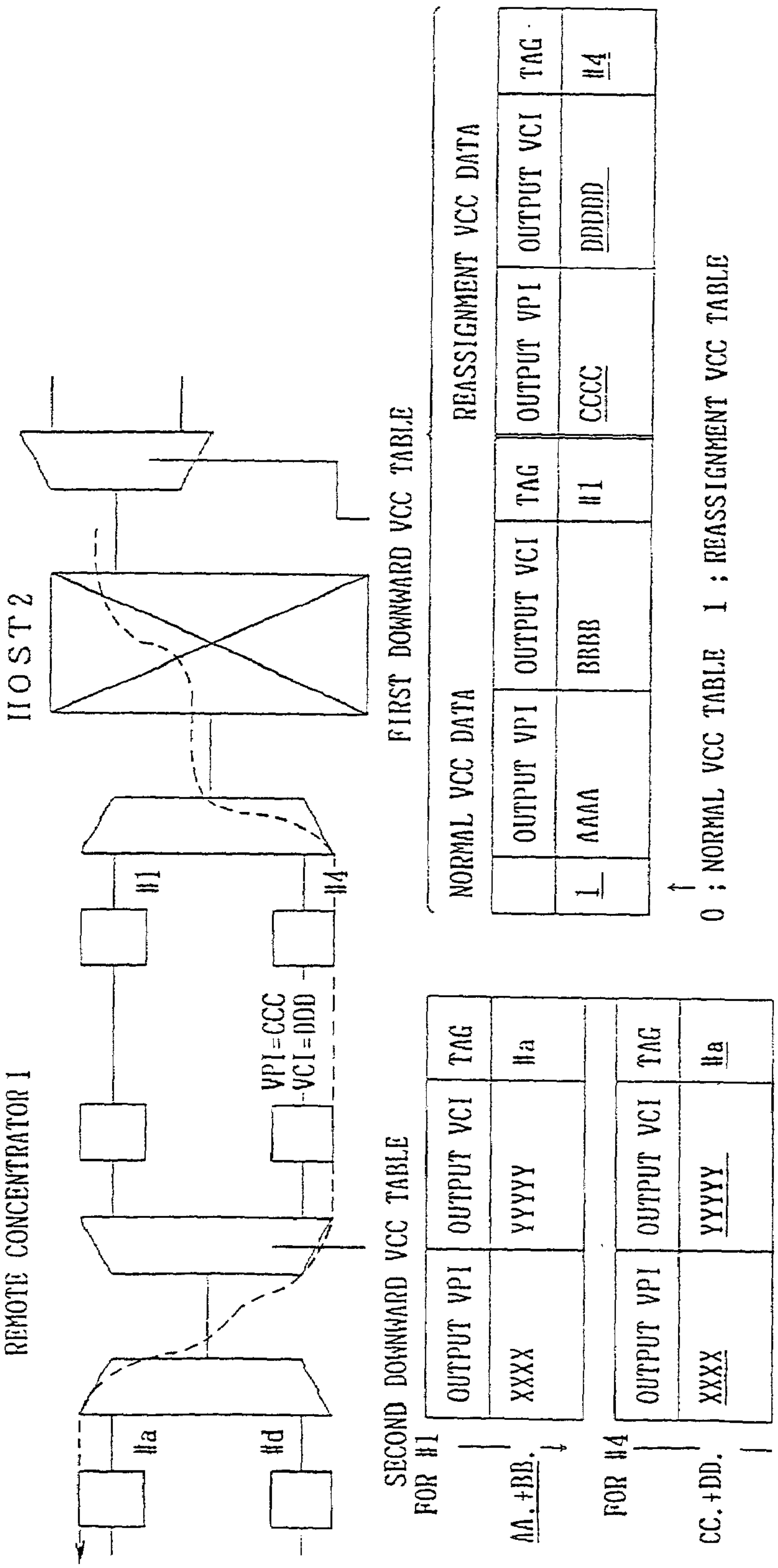

FIG. 889 the second process example (downward, after reassigning a path) of the path reassigning process in the event of a failure according to the embodiment based on the configuration shown in FIGS. 879, 881, and 882.

Figure 890:
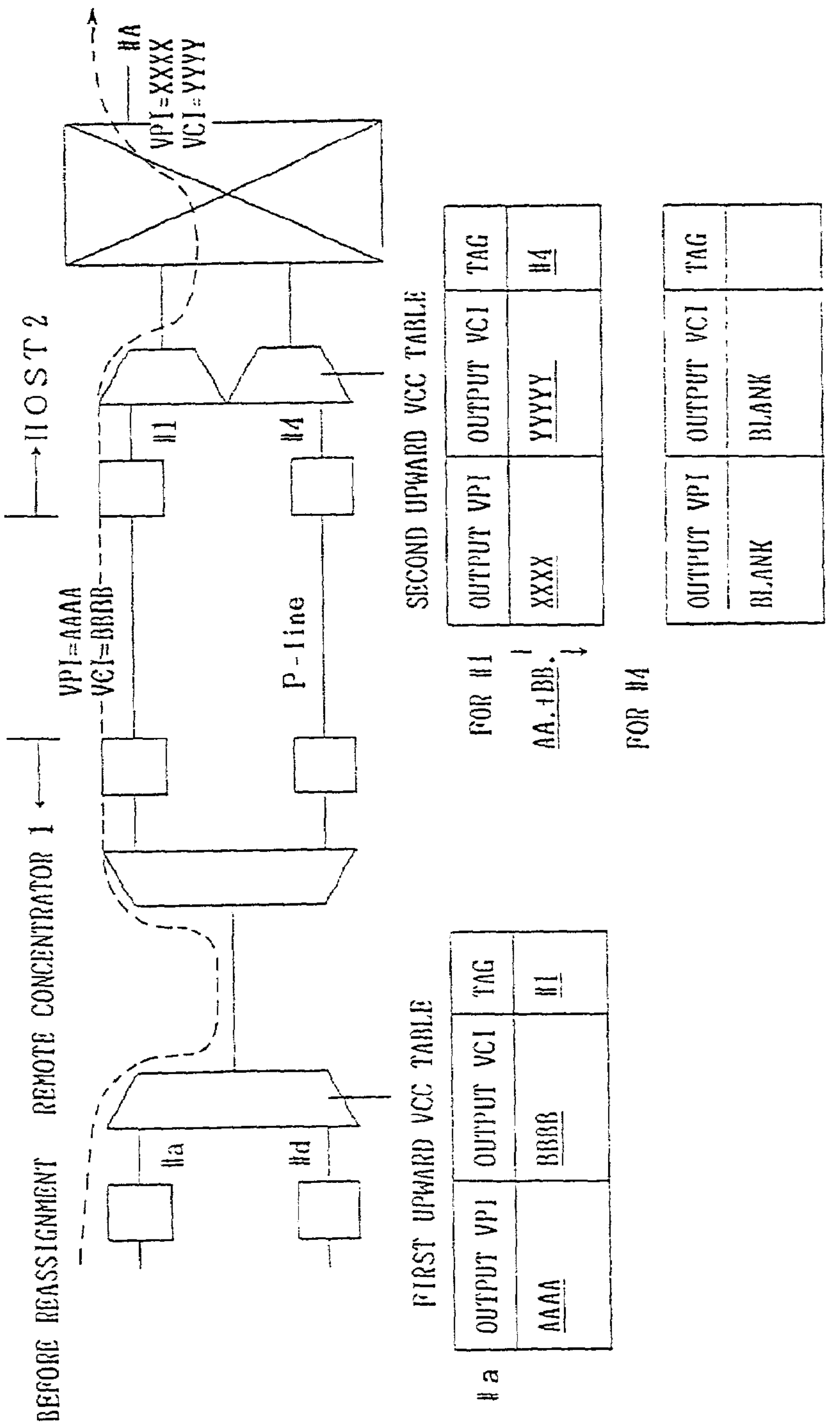

FIG. 890 shows the third process example (upward, before reassigning a path) of the path reassigning process in the event of a failure according to the embodiment based on the configuration shown in FIGS. 879, 881, and 882.

Figure 891:
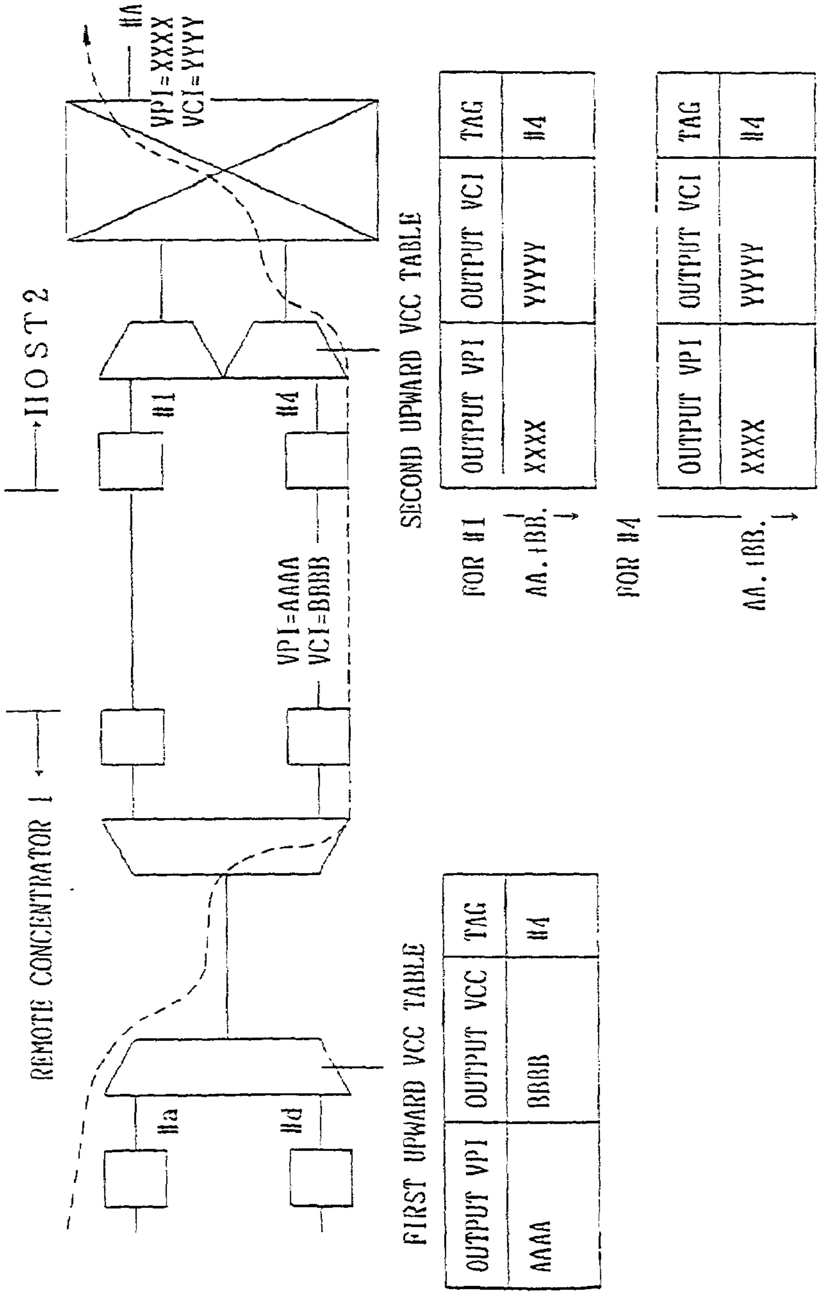

FIG. 891 shows the third process example (upward, after reassigning a path) of the path reassigning process in the event of a failure according to the embodiment based on the configuration shown in FIGS. 879, 881, and 882.

Figure 892:
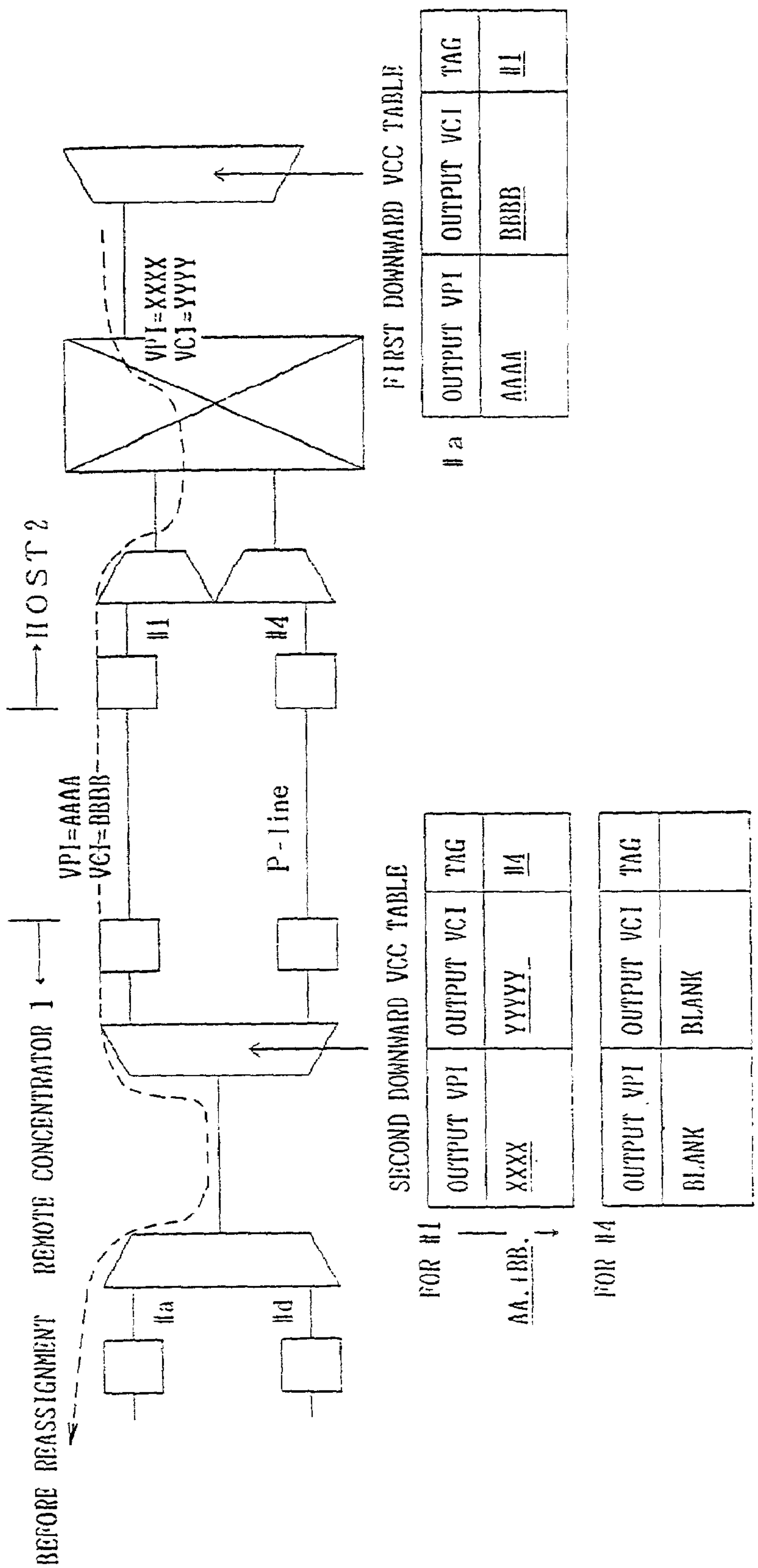

FIG. 892 shows the third process example (downward, before reassigning a path) of the path reassigning process in the event of a failure according to the embodiment based on the configuration shown in FIGS. 879, 881, and 882.

Figure 893:
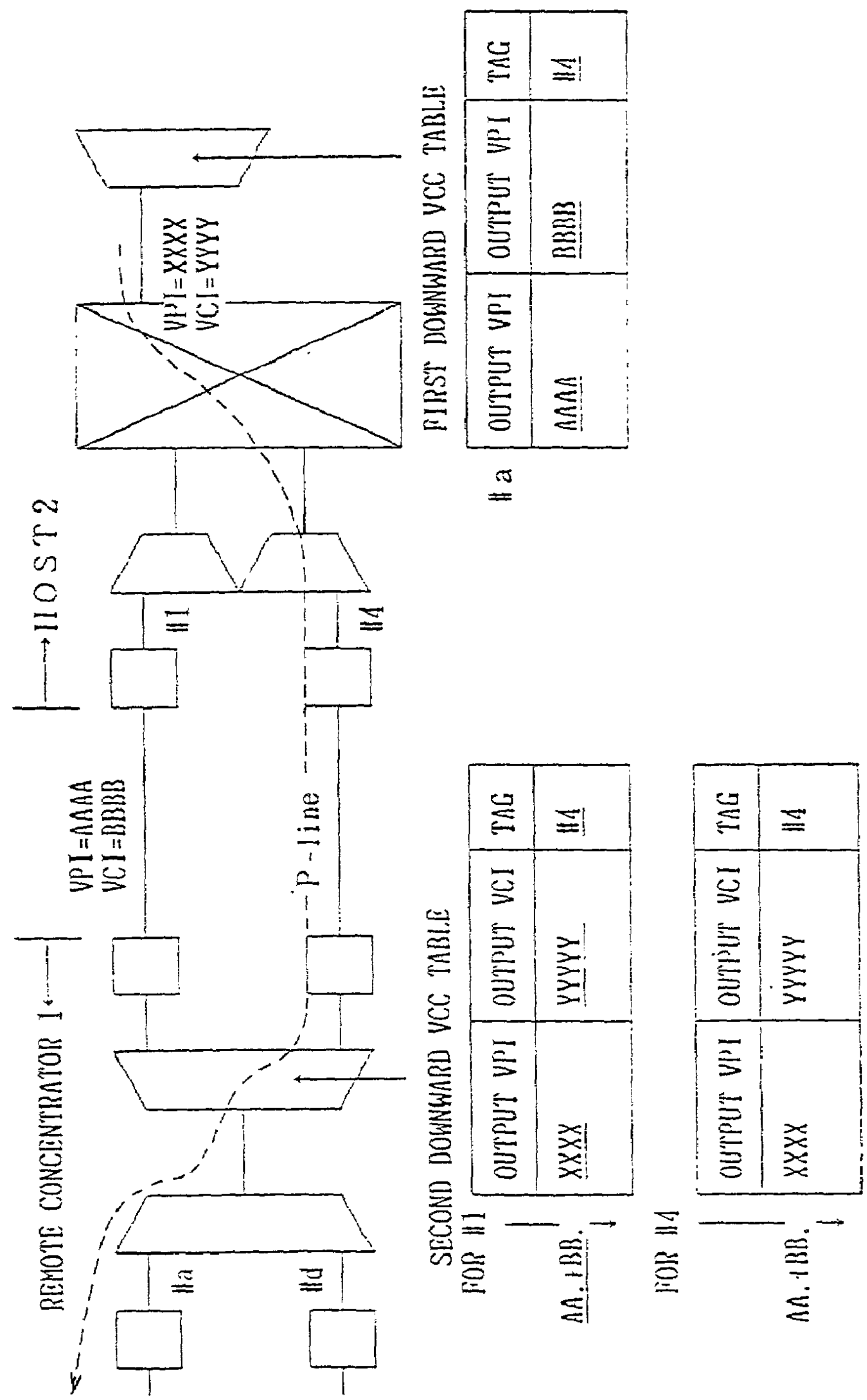

FIG. 893 shows the third process example (downward, after reassigning a path) of the path reassigning process in the event of a failure according to the embodiment based on the configuration shown in FIGS. 879, 881, and 882.

Figure 894:
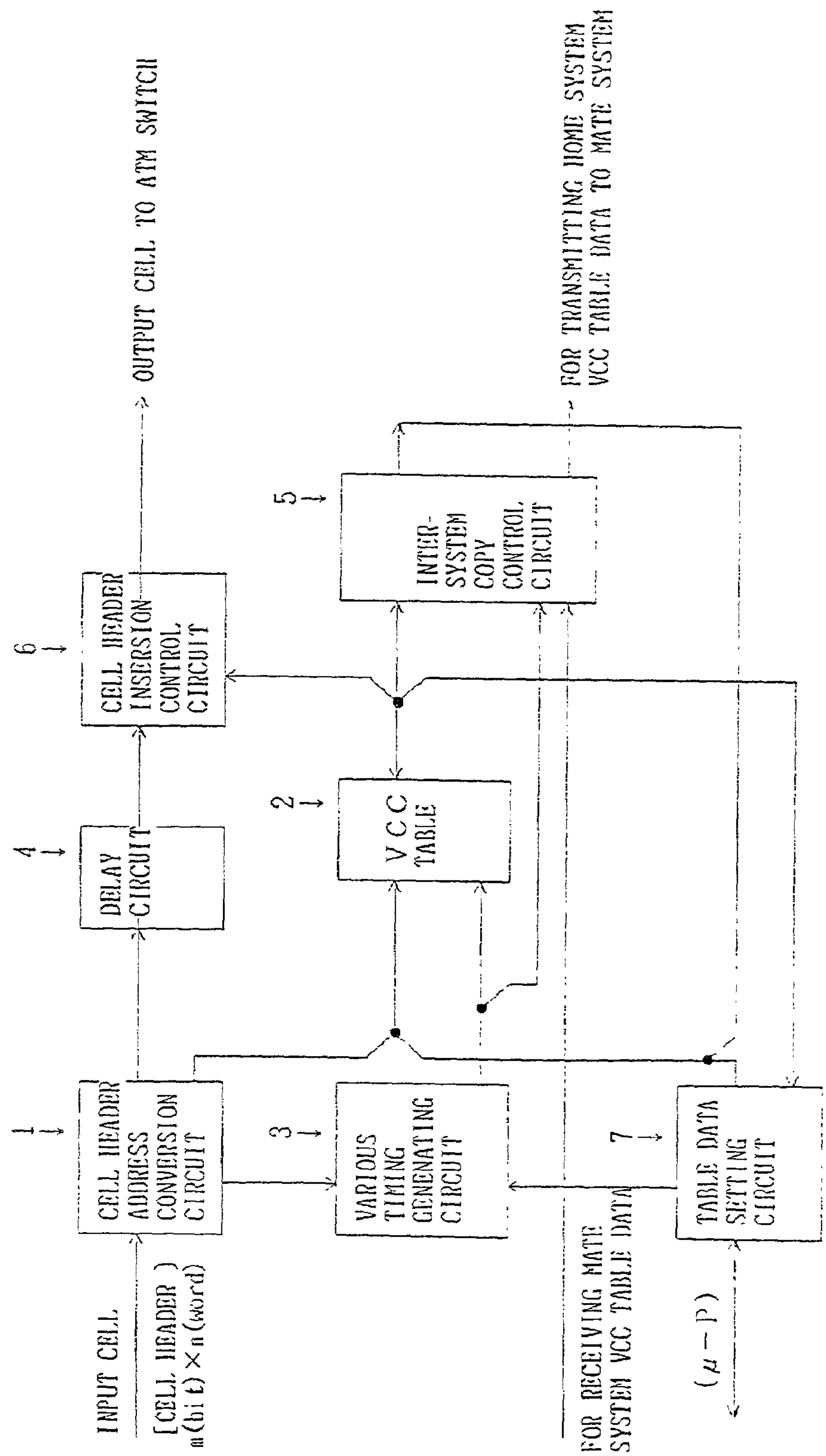

FIG. 894 shows the configuration of the embodiment of the VCC control device capable of quickly transferring VCC table data.

Figure 895:
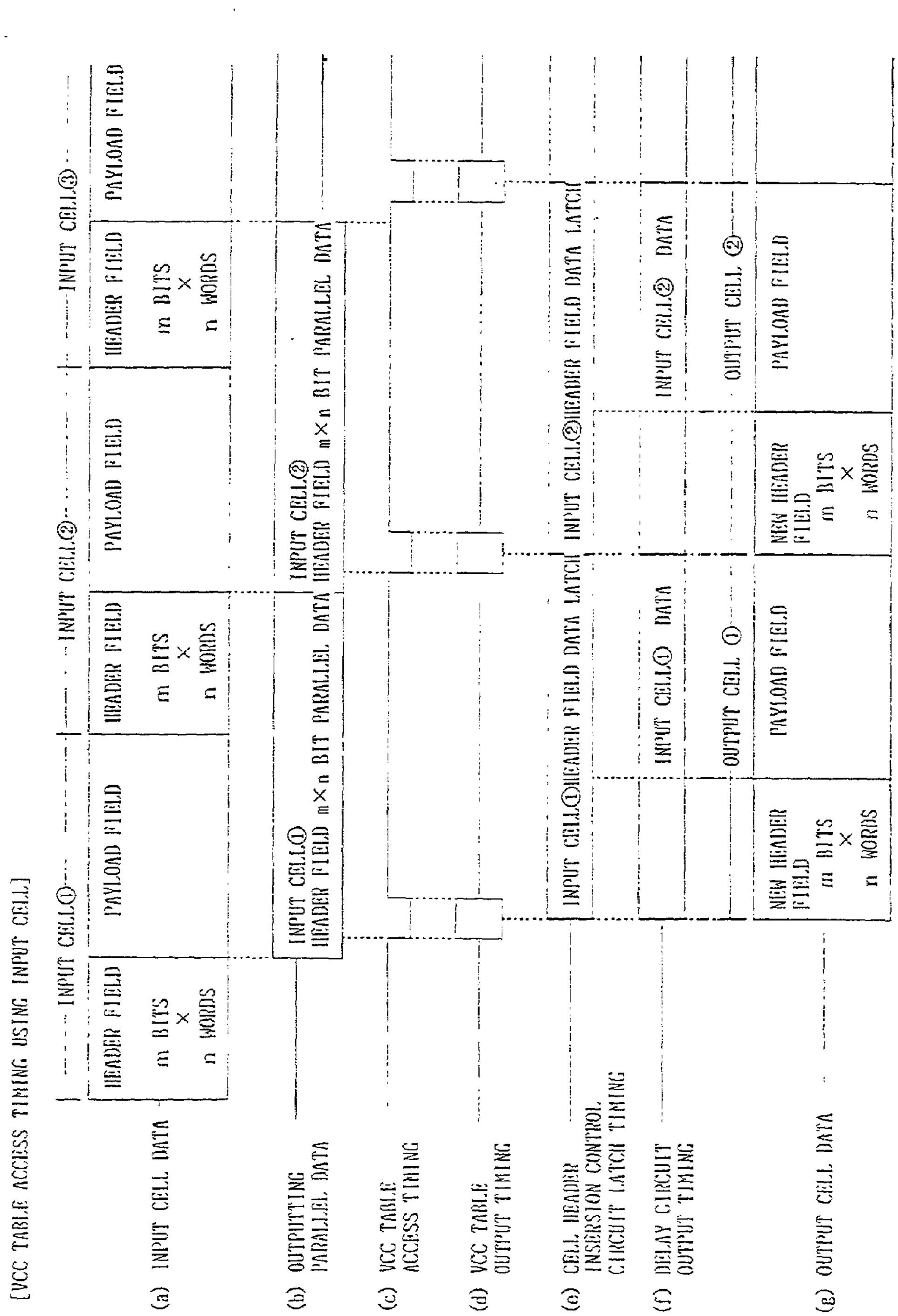

FIG. 895 shows the timing of accessing the VCC table through an input cell.

Figure 896A:
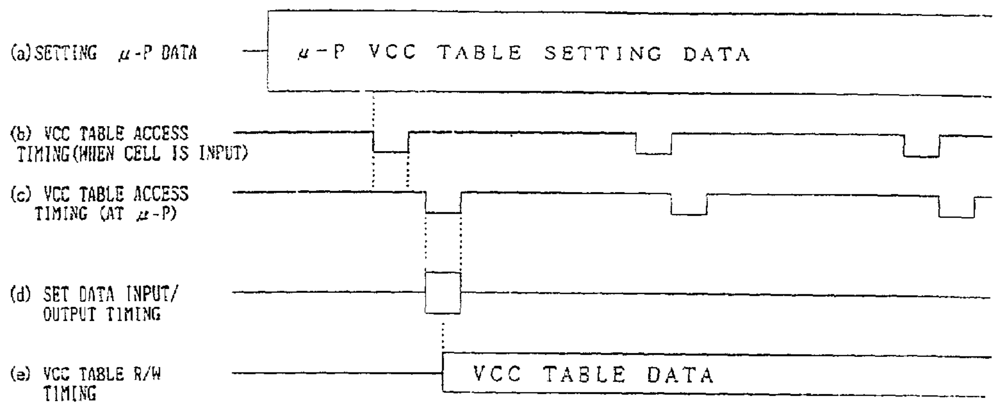

FIG. 896A shows the timing of accessing the VCC table through a VCC table

Figure 896B:
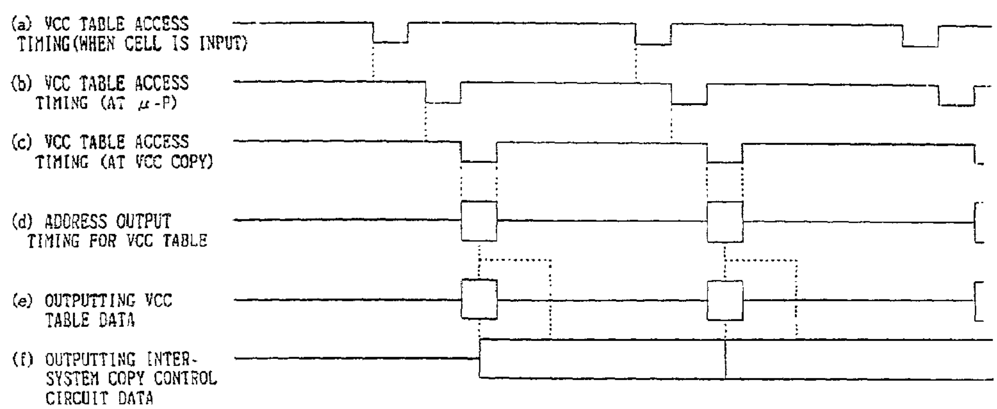

FIG. 896B shows the timing of copying VCC table data between systems.

Figure 897:
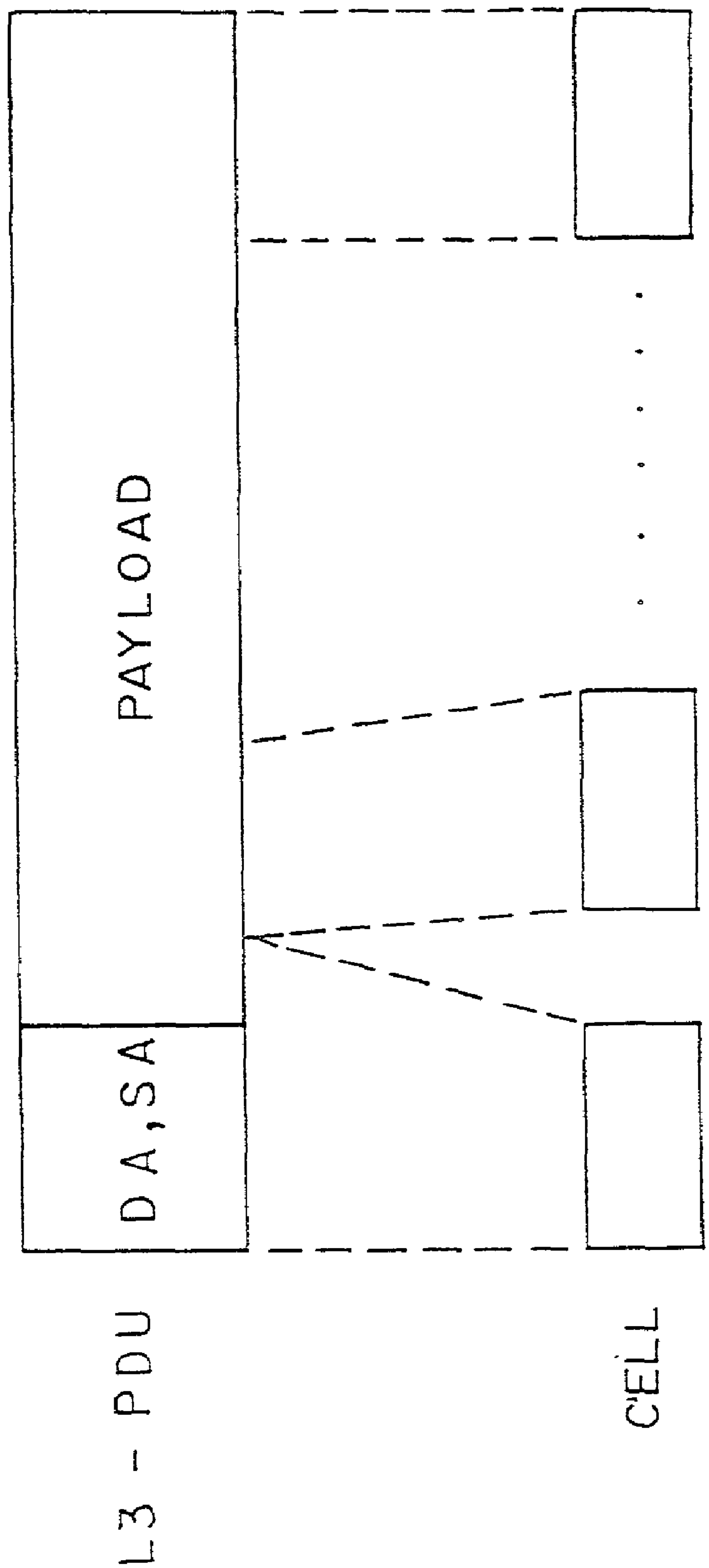

FIG. 897 shows the relationship between the L3-PDU and a cell.

Figure 898:
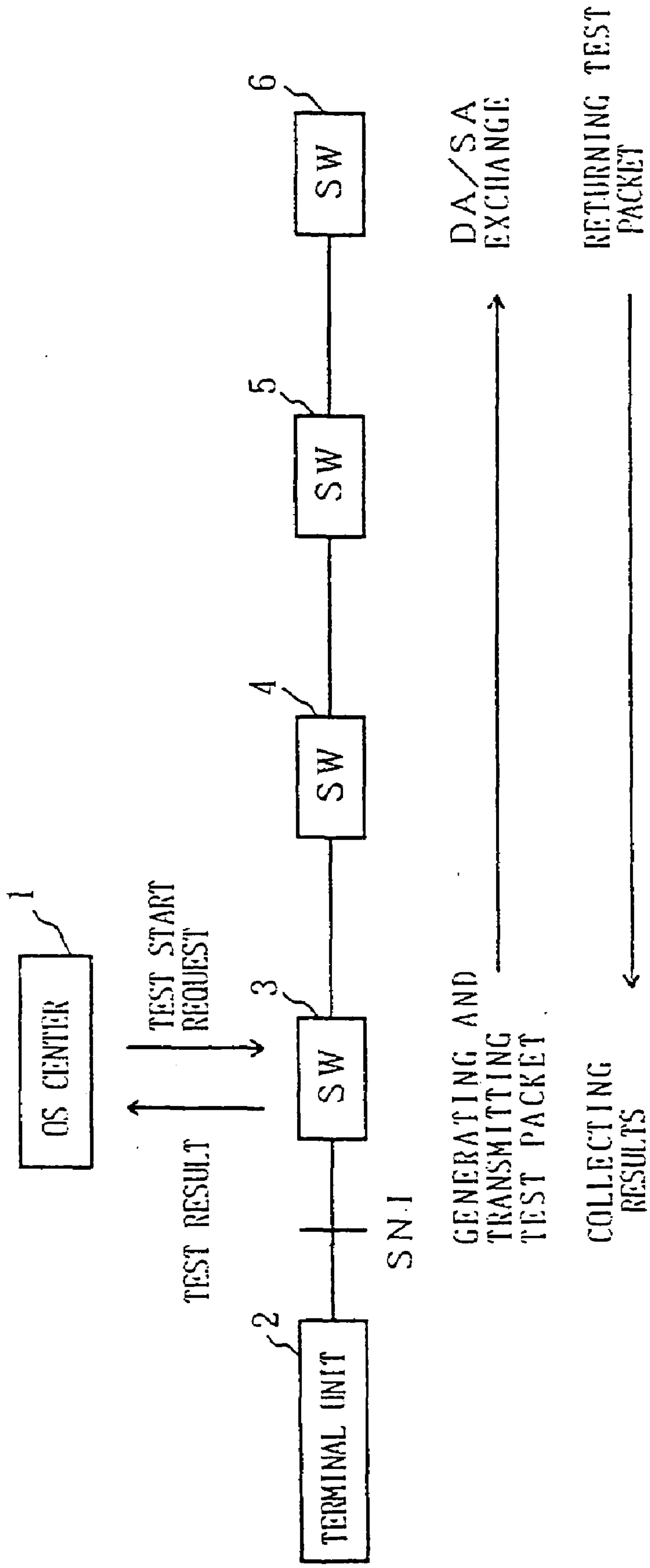

FIG. 898 shows the conventional inter-station loopback test method.

Figure 899:
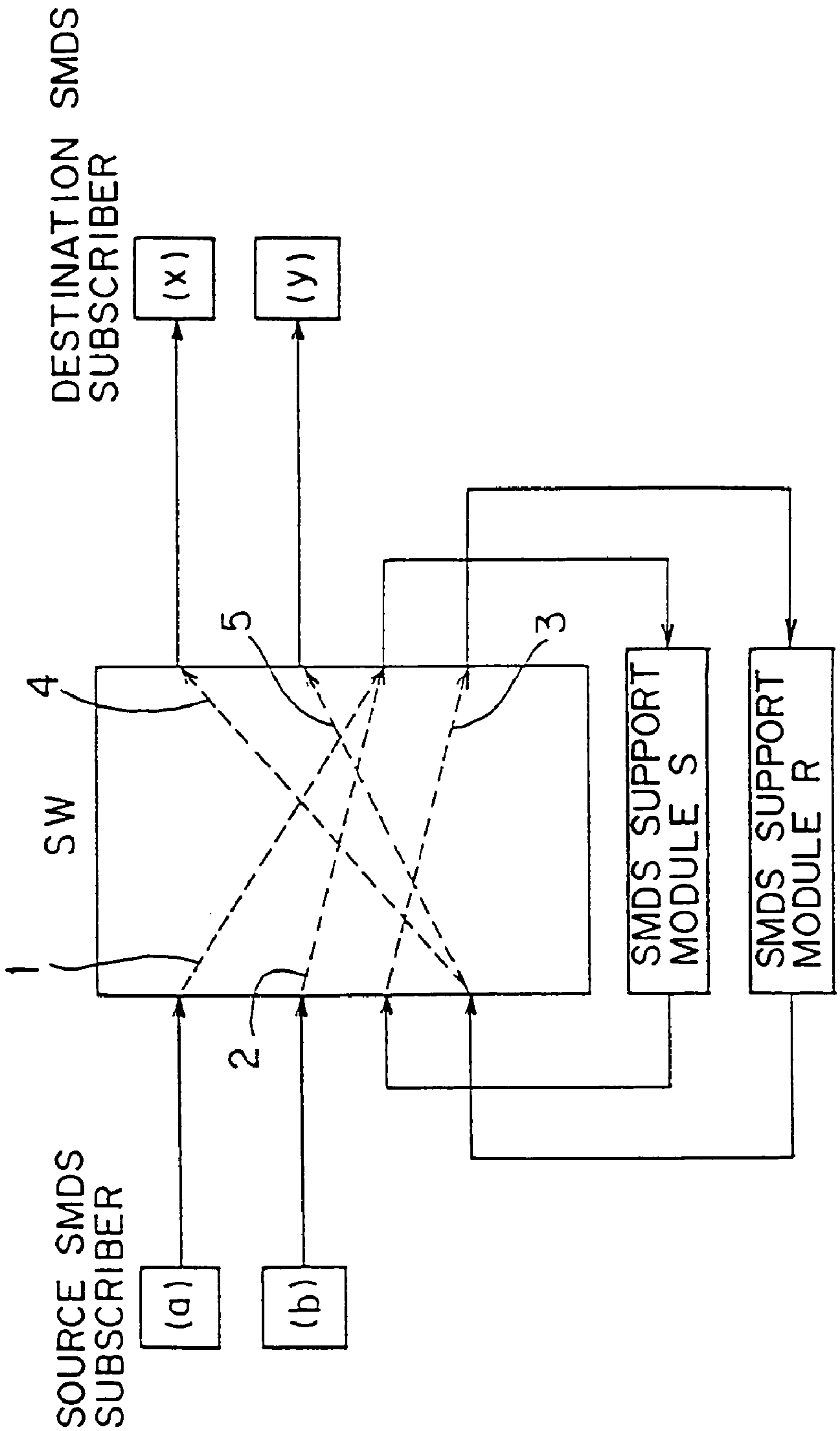

FIG. 899 shows the configuration (1) of a common SMDS system.

Figure 900:
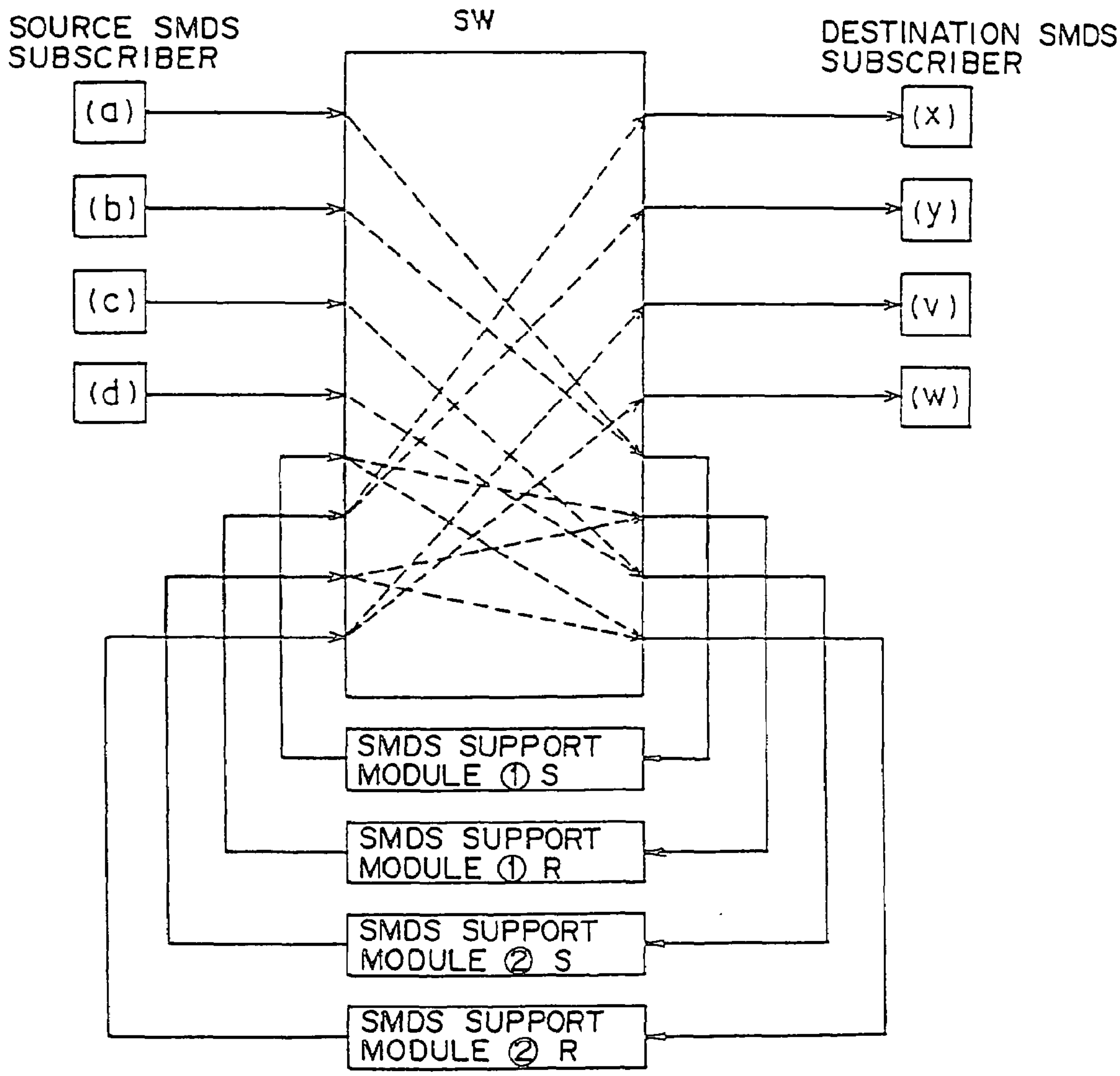

FIG. 900 shows the configuration (2) of a common SMDS system.

Figure 901:
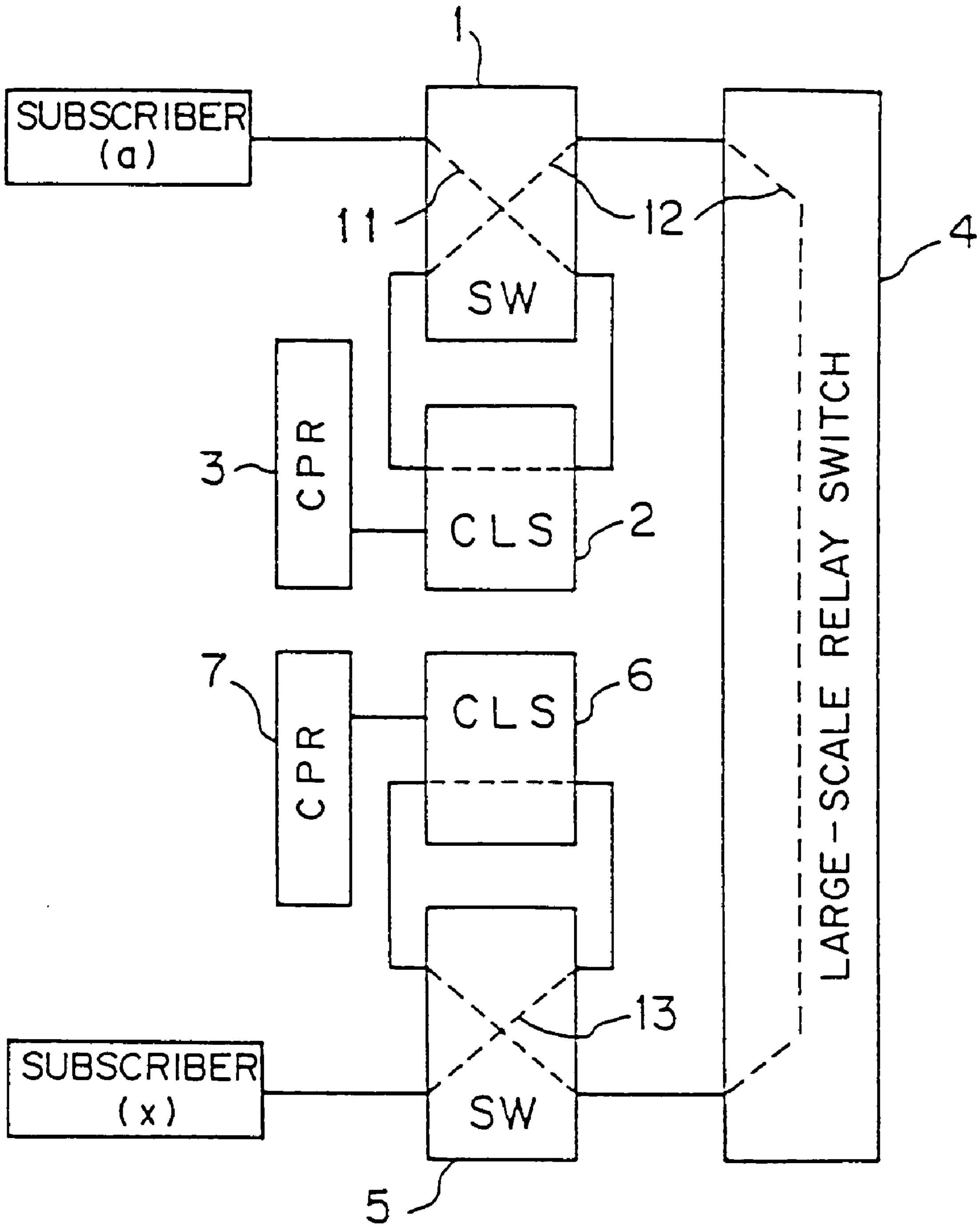

FIG. 901 shows the method of realizing the conventional connectionless service.

Figure 902:
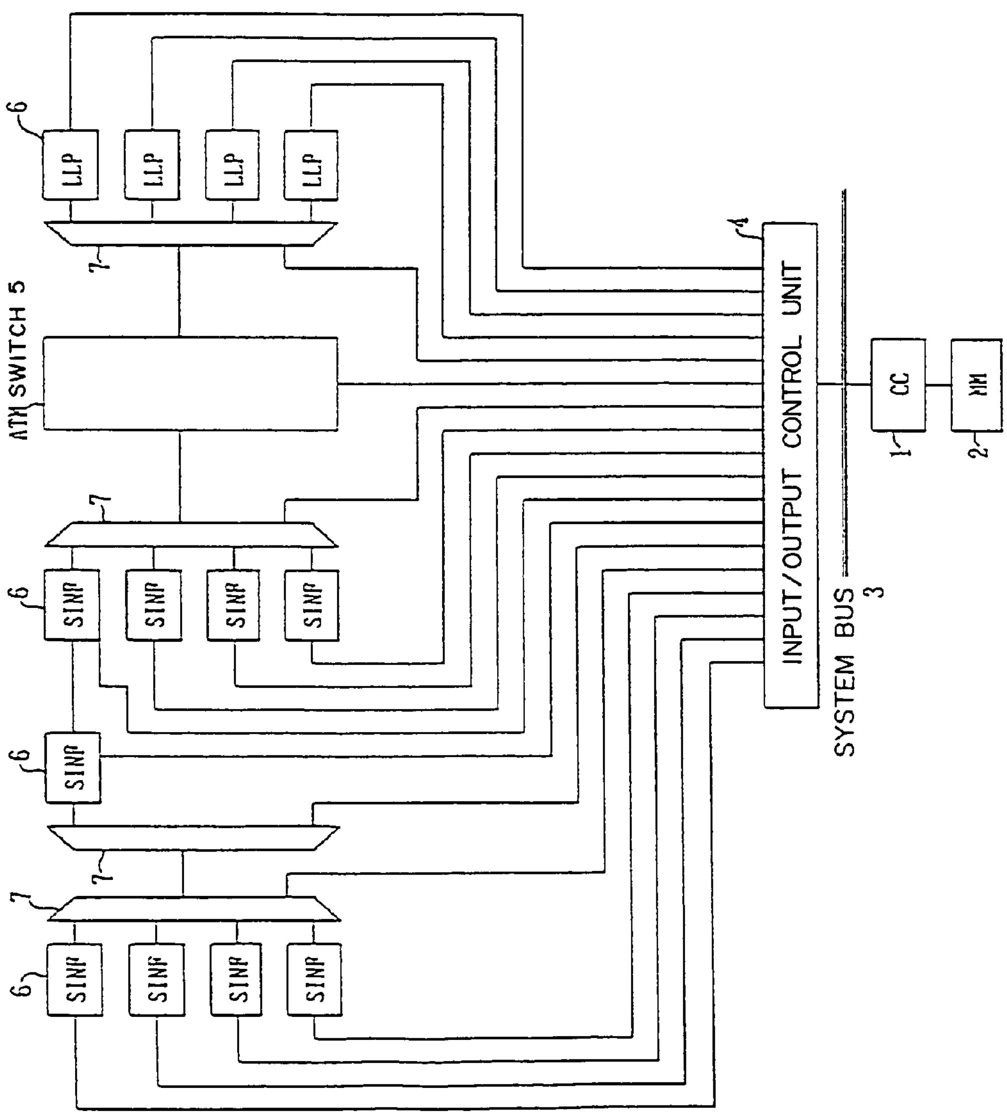

FIG. 902 shows another conventional technology.

Figure 903:
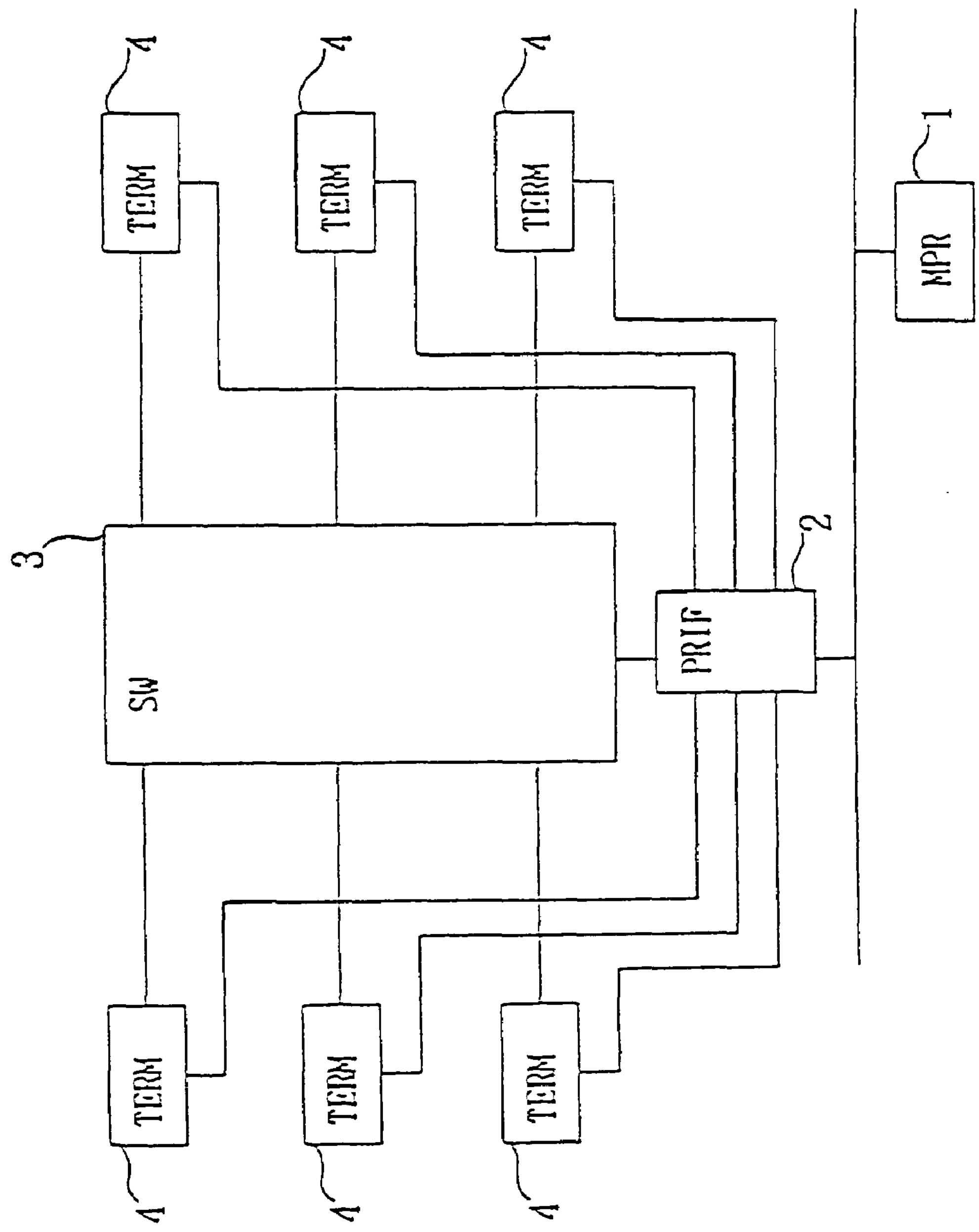

FIG. 903 shows another conventional technology.

Figure 904:
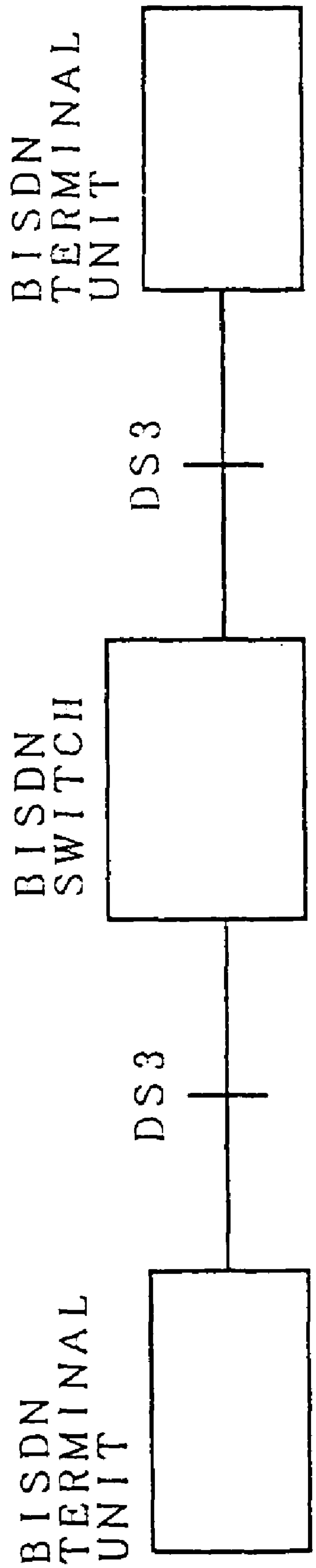

FIG. 904 shows the configuration in which the BISDN terminal unit is connected to the BISDN switch.

Figure 905:
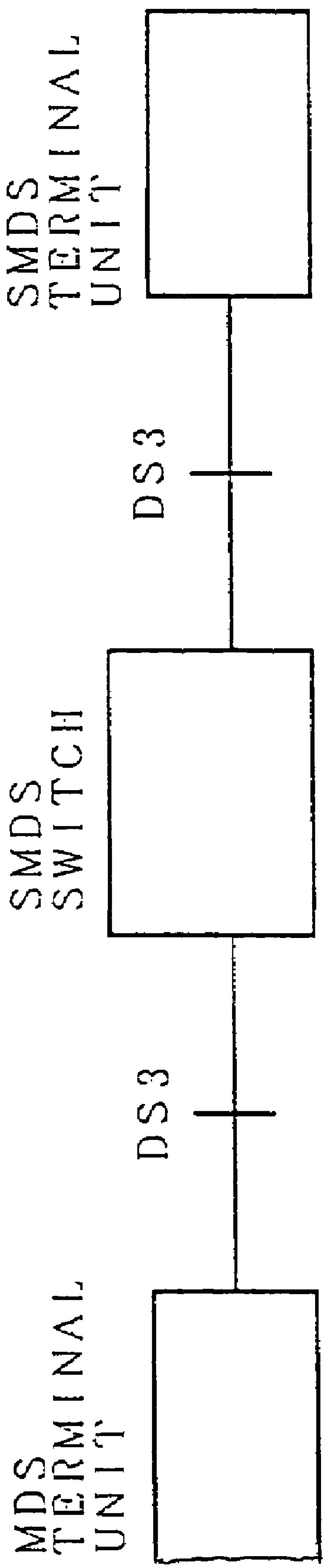

FIG. 905 shows the configuration in which the SMDS terminal unit is connected to the SMDS switch.

Figure 906:
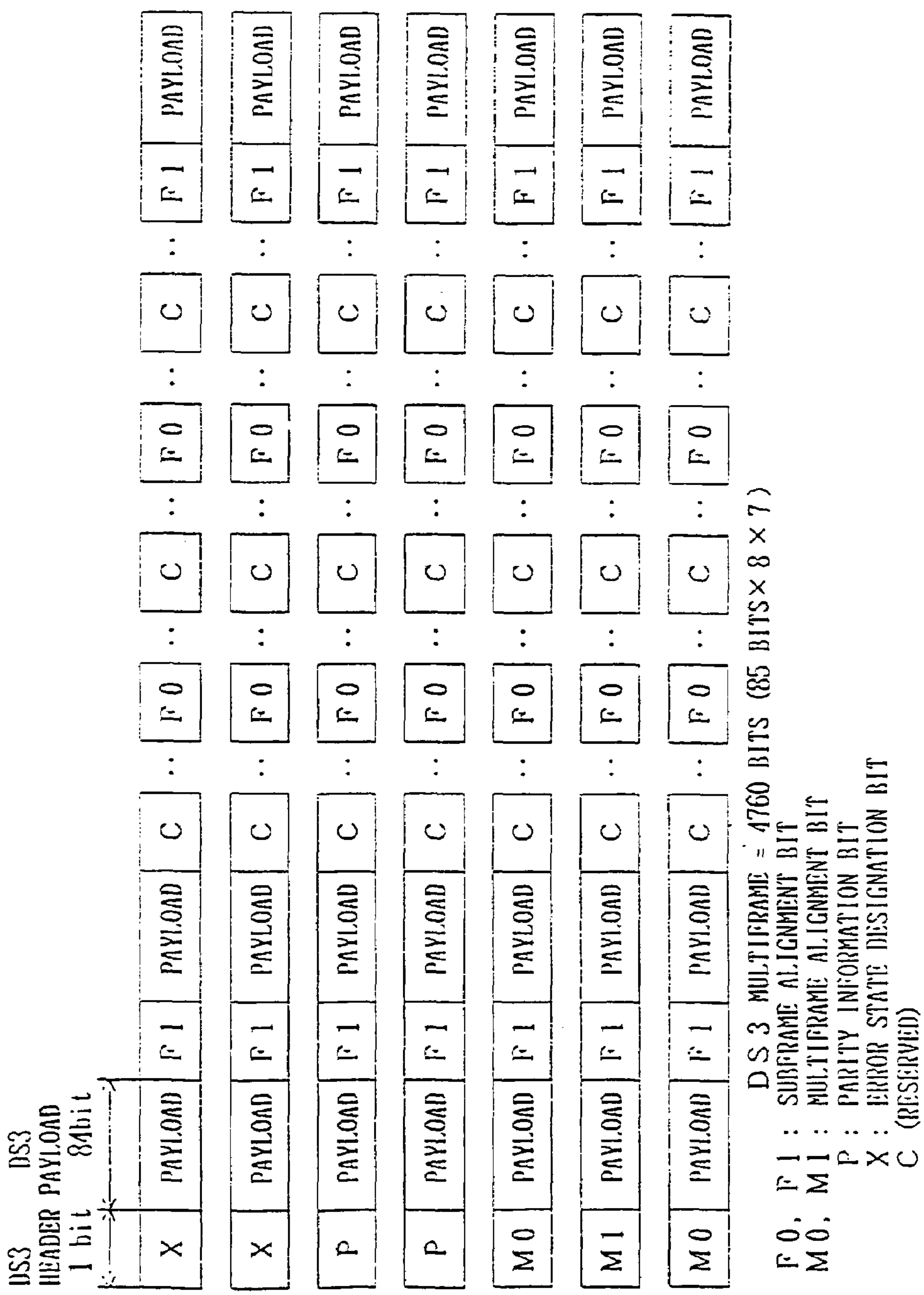

FIG. 906 shows the configuration of the DS3 multiframe.

FIG. 907 shows the configuration of the ATM cell and L2-PDU cell.

FIG. 908 shows the configuration of the PLCP frame interfaced in the DS3 format.

FIG. 909 shows the restrictions related to the cycle stuff counter.

Figure 910:
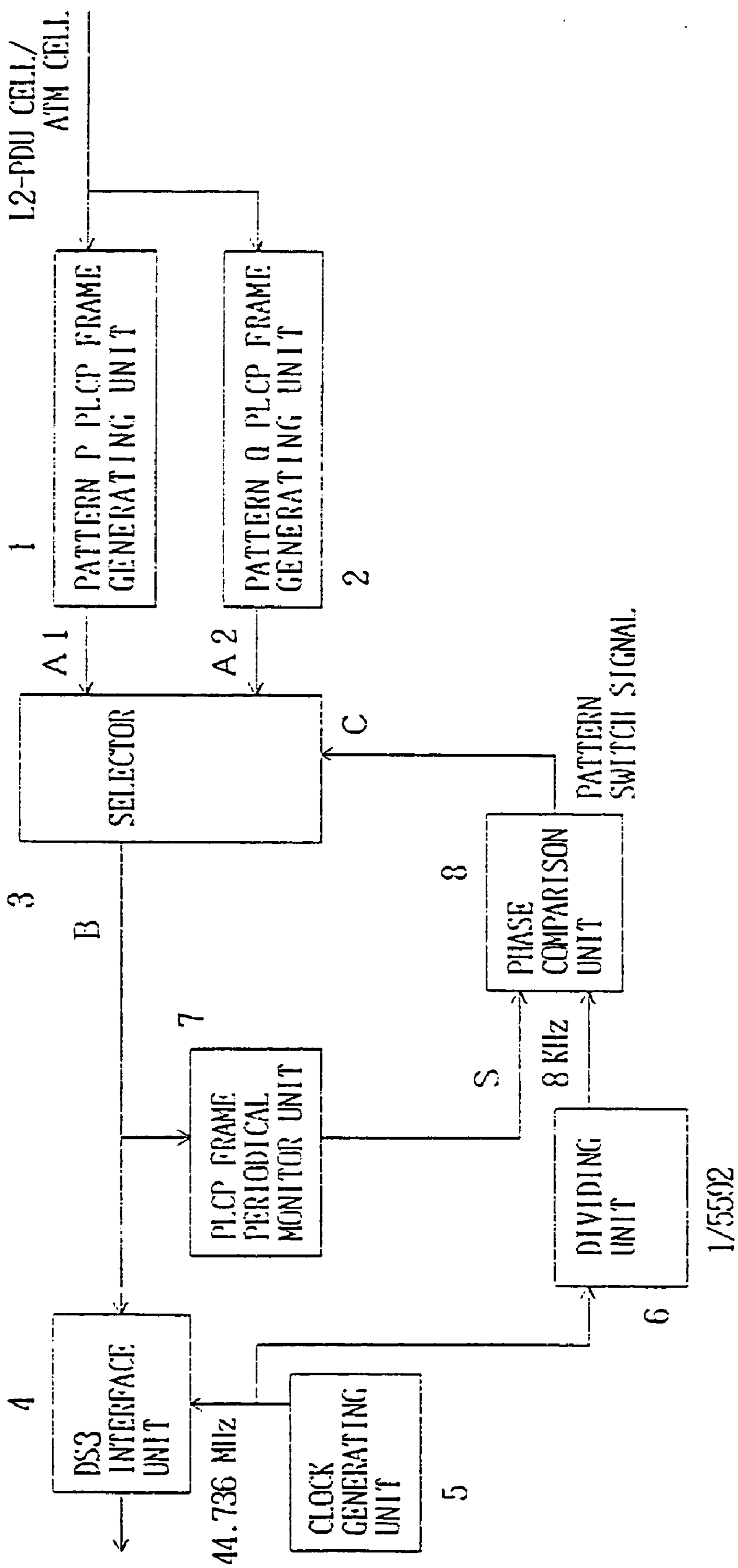

FIG. 910 shows the conventional circuit for transmitting a PLCP multiframe.

Figure 911:
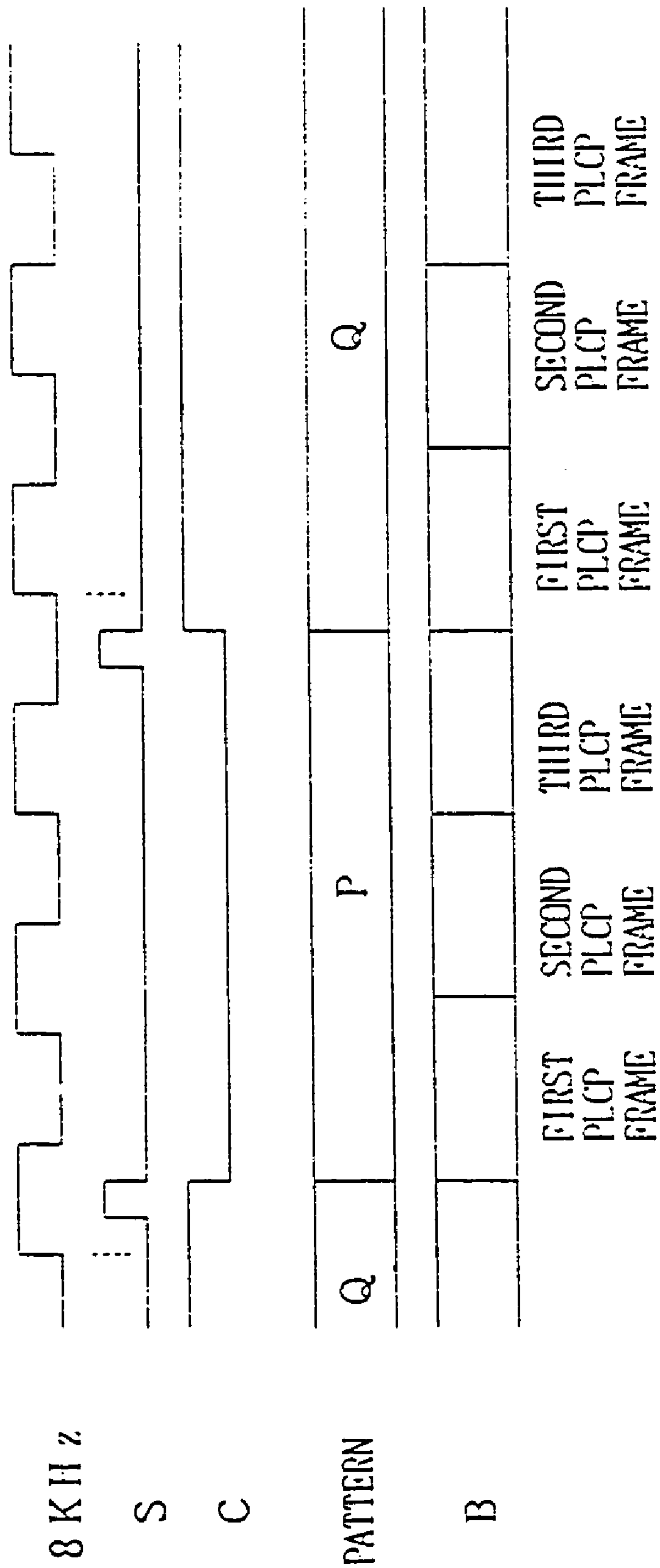
Figure 9:
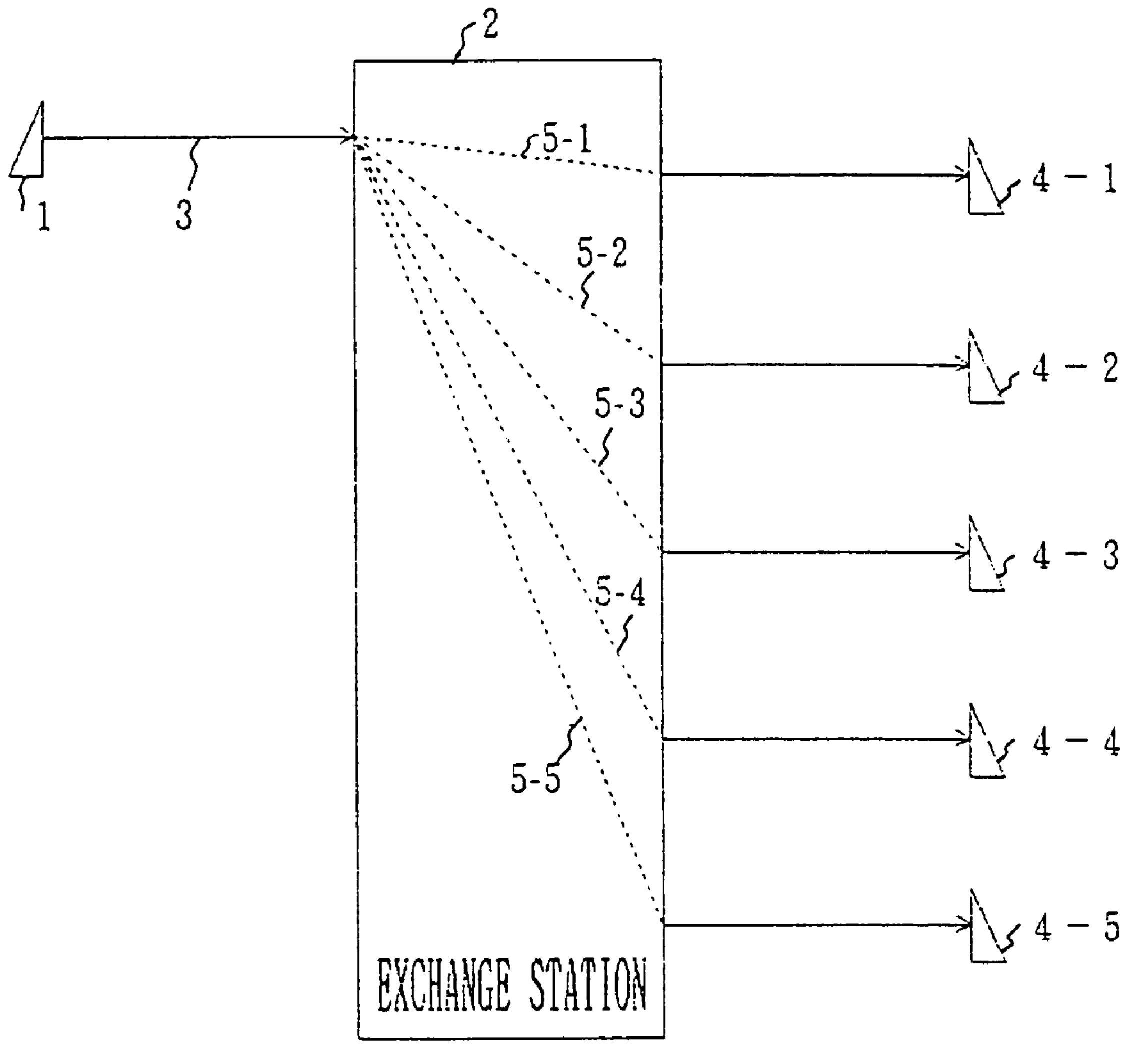

FIG. 911 is a timing chart showing the operation of the conventional transmission circuit of a PLCP multiframe.

FIG. 912 shows the configuration of a conventional multicast connection.

Figure 913:
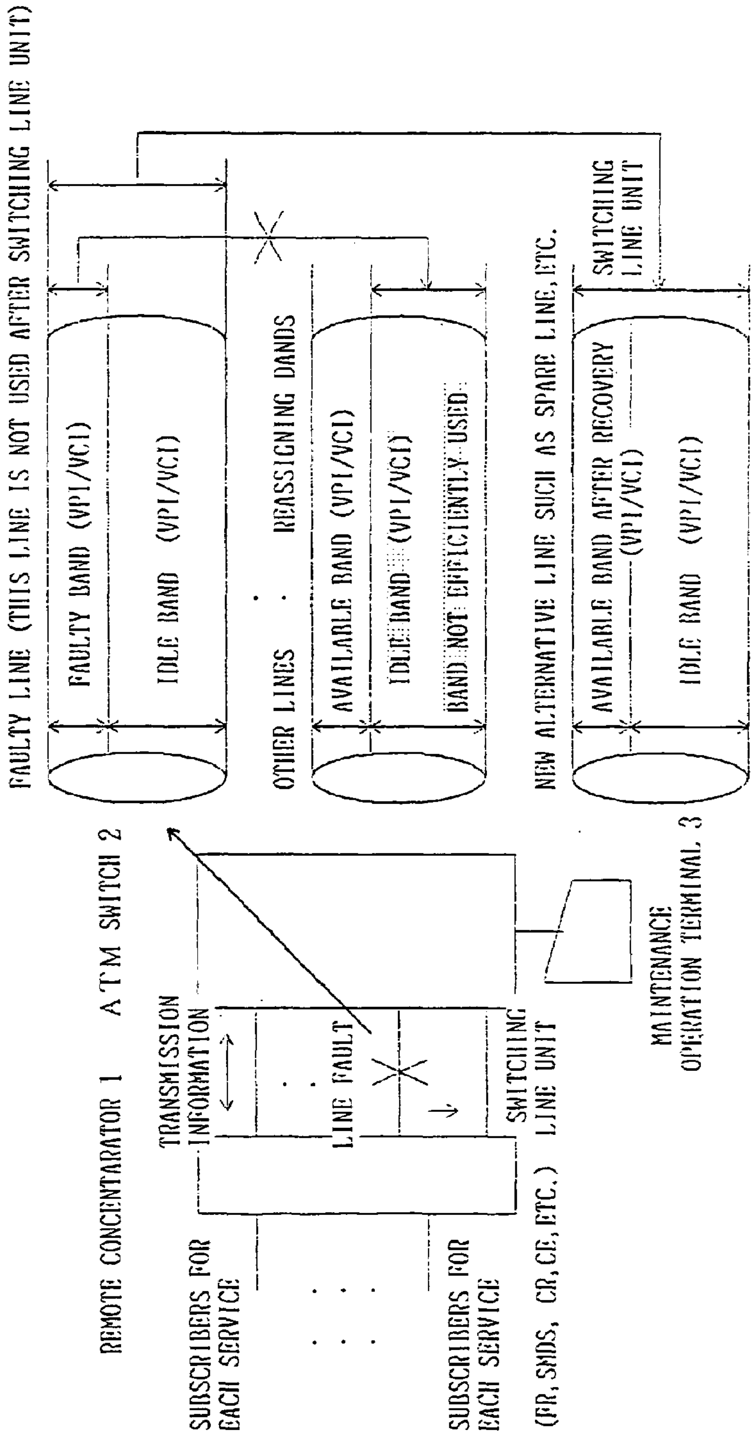

FIG. 913 shows the problems of the conventional technology in which lines are switched in physical line units when a failure occurs on the line itself.

EMBODIMENTS

Contents of the Embodiments

<Part 1> General Descriptions of Embodiments
1. Outline of the system according to the present embodiment
1.1. General Description
1.2. Interface and Service provided by the present embodiment
1.2.1. Subscriber Interfaces
1.2.1.1. Optical Fiber Interface
1.2.1.2. Metallic Interface
1.2.2. Network Interface
1.2.3 Services
1.3. System Configuration
1.3.1 Broadband Switch Architecture
1.3.2. Switched Multi-megabit Data Service (SMDS)
2. Explanation of Hardware according to the present embodiment
2.1. ATM Network for small host
2.1.1. ATM Subscriber Switch (ASSW)
2.1.2. ASSW Subscriber and Network Interface
2.1.2.1. Subscriber Interface Shelf (SIFSH)
2.1.2.2. ATM DS-1 Shelf (ADS1SH)
2.1.2.3. Fiber Interface Shelf (FIFSH)
2.1.3. ASSW ATM Switch Module
2.1.3.1. ATM Switching Shelf (ASSWSH)
2.1.3.2. Daisy Chaining
2.1.4. ASSW Other ATM Network Support Equipment and Test Cell Generation
2.1.4.1. Subscriber Interface Shelf (SIFSH) for Loopback
2.1.4.2. Subscriber Interface Shelf for Test Cell Generator Adapters
2.1.5. ASSW Signaling Equipment
2.1.6. SMDS Message Handler
2.1.6.1. Subscriber Message Handler Shelf (SBMESH)
2.1.6.2. Gateway Message Handler Shelf (GWMESH)
2.2. Broadband Remote Switching Unit (BRSU)
2.3. Broadband Remote Line Concentrator (BRLC)
2.3.1. Subscriber Input Ports
2.3.2. Umbilical Equipment
2.3.3. Network Equipment
3. Functions according to the Embodiment
3.1. General Descriptions
3.2. Host Switch
3.3. ATM subscriber switch (ASSW)
3.3.1. ATM Switch Module (ASM)
3.3.2. Subscriber/Network Interface
3.3.3. Broadband Signaling Controller (BSGC)
3.3.4. Message Handler (SMDS)
3.3.5. Broadband Call Processor (BCPR)
3.3.6. Maintenance and Operation System (MOS)
3.3.7. Operation and Maintenance Processor (OMP)
3.3.8. System Integration Processor (SIP)
3.4. Broadband Remote Line Concentrator (BRLC)
3.5. Broadband Remote Switching Unit (BRSU)
3.6. SMDS Implementation
3.7. Traffic Control
3.7.1. Call Acceptance Control
3.7.2. User Parameter Control (UPC)
3.7.3. Priority for Cell Routing
3.8. Data Collection
4. Others <Part 2> DS3-SMDS Interface
1. General Descriptions
2. Explanation of Line Interface
2.1. DS3 Line Interface
2.1.1. Payload Mapping
2.1.2. DS3 Frame Format
3. PLCP Frame Format
3.1. DS3 PLCP Frame format
4. DS3-SMDS Interface L2-PDU Format
4.1. DS3-SMDS L2-PDU Format
4.2. Network Control Information
4.3. Segment Type
4.4. Message Identifier
4.5. Segmentation Unit
4.6. Payload Length
4.7. Payload CRC
5. Relationship between L2-PDU and ATM Cell
6. DS3 Umbilical Link Format
7. Hardware Configuration
7.1. General Descriptions
7.2. DS3 layer terminating function
7.2.1. Process for line faults
7.2.2. Detection and Recovery Condition of each alarm
7.3. DS3-SMDS Layer Terminating Function
7.3.1. Process for line faults
7.3.2. Detection and Recovery Condition of each alarm
7.4. L2-PDU Header Checking Function (HCS)
7.5. L2-PDU Header Pattern Generating Function
7.6. Distributed Queue Dual Bus (DQDB) Sequence Function
7.7. DS3 Layer/PLCP Layer Performance Monitoring Function
7.7.1. DS3 Layer
7.7.2. DS3-PLCP Layer
7.8. Received L2-PDU Data Converting Function (45 Mbps→156 Mbps)
7.9. Transmitted L2-PDU Data Bit Rate Converting Function (156 Mbps→45 Mbps)
7.10. Interfacing Function to SIFSH Common
7.11. LAP Terminating Function of MSD/MSCN Information
7.12. Multiplexing Function of DS3-SMDS L2-PDU Cell and LAP Cell 7.13. Demultiplexing Function of DS3-SMDS L2-PDU Cell and LAP Cell
7.14 Loopback Function of specified VPI/VCI
7.14.1 Loopback Function of Cell provided with "0" bit
7.14.2 Loopback Function of Cell provided with specific VCI/VCI
7.15 MSCN Data Multiplexing Function
7.16 MSD Data Dropper Function
8. Maintenance Signal Driver (MSD) Interface
8.1. MSD Information
8.1.1. E-MSD Hardware Interface
8.1.2. E-MSD Accommodation List of DS3-SMDS Interface
8.2. Detailed Explanation of the E-MSD
8.2.1. Hardware Reset
8.2.2. Loopback
8.2.3. Pseudo-fault Point
8.2.4. AIS Transmission Point
9. Maintenance Scanner (MSCN) Interface
9.1.1. Hardware Interface for E-MSCN
9.1.2. Detailed Explanation of E-MSCN
9.2. E-MSCN Process in DS3-SMDS Interface
9.2.1. SIFSH Common Interface Fault
9.2.2. DS3-SMDS Interface Hardware Fault
9.2.3. DS3-SMDS Interface Hardware Fault
9.2.4. Faults in Microprocessor
9.2.5. Fault in Timer
9.2.6. DS3 Layer Alarm
9.2.7. Performance Monitor Threshold Crossing Alert
9.2.8. Cell Discards in the DS3-SMDS interface
9.2.9. Diagnostic Result Report
10. Simple LAP-D Protocol of DS3-SMDS interface
10.1. Software Interface
10.2. Hardware Interface
10.3. Setting VPI/VCI
10.4 Error Monitor
10.5. AAL Interface
10.5.1. SAR-PDU Format
10.6. Function of AAL
10.7 Error Monitor
10.8. L2 Interface
10.8.1. Functions of L2
10.8.2. Frame Format
10.8.3. Connection Setting Procedure
10.8.4. Monitor of Link State
10.8.5. Confirmation Procedure
10.8.6. Monitor of Faults
10.9. L3 Interface
10.9.1. L3 frame Format
10.9.2. Communications Procedure
10.9.3. Control of Errors
11. Management of the state of DS3-SMDS interface
11.1. Initialization
11.2. Blocking
11.3. Setting In-Service
11.4. Non-implementation
11.5. Processes for faults
11.5.1. Monitor of Faults
11.5.2. Detection of faults
11.5.3. Specifying a fault
11.5.4. Monitor of Recovery
11.6 Various Process Sequence
12. Congestion Control of DS3-SMDS Interface Buffer
13. Test and Maintenance
13.1. Loopback Function of DS3-SMDS Interface
13.1.1. Loopback Function of a cell with 0 bit added at tag area
13.1.2. Loopback Function of All Cells
13.1.3. Loopback Function of Cell having specific VPI/VCI
13.1.4. Line Loopback Function
13.2. Test Method
13.2.1. DS3-SMDS Line Loopback Test
13.2.1.1 Line loopback test at DSX-3
13.2.1.2 Line loopback test at RLC
13.2.2. Active system on-demand test
13.2.3. PVC Path Circuit Test
13.2.4. Tests and Diagnostics of DS3-SMDS interface
13.2.4.1. ATM Cell Acceptability Test in DS3-SMDS interface
13.2.4.2 Hardware normality confirmation test
14. Fault Correction
14.1. Fault detection point and notification system
14.1.1. Contents of Faults
14.1.2 OBP Fault
14.1.3. OBP Fault in Individual Unit (DS3-SMDS interface)
14.1.3.1. +5V OBP Fault
14.1.3.2. −5.2V OBP Fault
14.1.4. Package Missing Fault
14.1.5. Fuse Disconnection Fault
14.1.6. Package Error Insertion Fault
14.1.7. DS3-SMDS Interface Individual Unit Package Fault
15. Functions of each PCB
15.1. Functions of each PCB
15.1.1. Functions of HAF00A
15.1.1.1. LAP Terminating Function for MSD/MSCN information
15.1.1.2. Interfacing Function with SIFSH Common
15.1.1.3. Multiplexing/demultiplexing function for DS3-SMDS L2-PDU cell and LAP cell
15.1.1.4. Loopback Function for Cell assigned Specific VPI/VCI
15.1.1.5. Multiplexing Function for MSCN Data
15.1.1.6. MSD Data Dropper Function
15.1.1.7. Active Control Function
15.1.1.8. Microprocessor Interface Function
15.1.2. Functions of HLP01A
15.1.2.1. 156 Mbps 45 Mbps Data Conversion Function
15.1.2.2. 45 Mpbs 156 Mbps Data Conversion Function
15.1.2.3. DQDB Process Function
14.1.3. Functions of HDT00A
15.1.3.1. DS3 Layer Terminating Function
15.1.3.2. DS3 PLCP Layer Terminating Function
15.1.3.3. Received L2-PDU Header Check Function (HCS)
15.1.3.4. L2-PDU Header Pattern Generating Function
16. Firmware Interface
16.1. General Descriptions
16.2. Outline of Interface between Hardware and Firmware <Part 3> SIFSH
1. General Description
1.1. Position of SIFSH in the System
1.2. Outline of Functions
2. Shelf Configuration
2.1. Configuration
2.1.1. SIFCOM
2.1.2. Individual Unit
2.2. Power Source System
2.2.1. −48V/CG
2.2.2. SAB/SABG
2.2.3. +5V/E
3. Physical Interface
3.1. Switch Interface
3.1.1. 622 Mbps Cell Highway Interface
3.1.2. System Switch Signal
3.2. SYNSH Interface 3.3. Individual Unit Interface
3.3.1. 156 Mbps cell highway interface
3.3.1.1. Upward 156 Mbps Cell Highway Interface
3.3.1.2. Downward 156 Mbps Cell Highway Interface
3.3.2. E-MSD/E-MSCN Highway Interface
3.3.2.1. System Control
3.3.2.2. Physical Specification
3.3.2.3. Logical Specification
3.3.2.3.1. Individual Unit Receiving Specification
3.3.2.3.2. Frame Synchronization
3.3.2.3.3. Pilot 0/1 Signal Check (detection of stack in EMSD highway)
3.3.2.3.4. Twice Reading Process
3.3.2.3.5. Individual Unit Sending Specification
3.3.2.3.6 Fault Detection
3.4. Clock Interface
4. Software Interface
4.1. Outline
4.2. Layer Structure in Intra-station Control Communications
4.2.1. ATM Layer Cell Format
4.2.2. SAR-PDU Format
4.2.3. LAP-D Format (layer 2)
5. Allocation of Tag
6. Functions
6.1. MUX
6.1.1. Outline
6.1.2. Configuration of MUX
6.1.3. Multiplexing Control System
6.1.4. Monitor of Buffer
6.1.5. Write Control
6.1.6. Abnormal Write Process
6.1.6.1. Too small cell length
6.1.6.2. Too long cell length
6.1.7. Read Control
6.1.8. Abnormal Read Process
6.1.9. Buffer Congestion Control
6.2. DMUX
6.2.1. Outline
6.2.2. Functions
6.2.3. Dynamic Tag Matching
6.2.4. Monitor of Buffer
6.3. VCC
6.3.1. Position of VCC
6.3.2. Capacity of VCC Memory
6.3.3. Inter-System VCC Copy
6.3.3.1. Object
6.3.3.2. Timing of Inter-system Copy
6.3.3.3. Copy Object Information
6.3.3.4. Procedure for INS process
6.3.3.5. Copy Disable Report
6.3.4. Relationship between VCC and SMDS Service
6.4. Signaling Process (EGCLAD)
6.4.1. Outline
6.4.2. Functions of EGCLAD LSI
6.4.2.1. ATM Header Check Functions
6.4.2.2. ATM Header Inserting Function
7. Test and Maintenance
7.1. Monitor of Quality of Path using MC
7.2. Circuit Test of Test Cell through TCG
8. Fault Correcting Process
8.1. Fault Detection Point and Notification System
8.1.1. Fault Mode
8.1.2. OBP Fault
8.1.2.1. Individual Unit OBP Fault
8.1.2.2. OBP Fault in SIFCOM
8.1.3. Package Missing Fault
8.1.3.1. Individual Unit Package Missing Fault
8.1.3.2. SIFCOM Package Missing Fault
8.1.3.3. Power Package Missing Fault
8.1.4. Fuse Disconnection Fault
8.1.4.1. Individual Unit Fuse Disconnection Fault
8.1.4.2. SIFCOM Fuse Disconnection Fault
8.1.5. SIFCOM Package Front Connector Missing Fault
8.1.5.1. 50-core Coaxial Flat Cable Fault
8.1.5.2. 50-core TD Bus Cable Fault
8.1.6. Erroneous Package Insertion Fault
8.1.7. Individual Unit Package Fault
8.1.8. SIFCOM Package Fault
9. Line Protection (N+1 System)
9.1. Outline of N+1 Protection System
9.2. Line Reassignment Sequence
9.3. Setting VCC in Standby Line
9.4. Switch to Standby Line
9.5. Switch Command <Part 4>
1. Outline
1.1. Summary of Function
2. Configuration of Device
2.1. Configuration of Device
3. Interface
3.1. Communication Line System
3.2. Control System
3.3. Clock System
3.4 Inter-block Interface in ASSWSH-A
4. Detailed Function
5. Traffic Control
5.1. Cell Discard Class
5.2. Congestion Control
5.2.1. Congestion Control in SWMX
5.2.2. Congestion Control in SWMDX
5.2.3. Cell Discard
5.3. Traffic Measure Process
6. Function of Firmware
6.1. INFA Interface
6.2. Intra-device hard Interface
6.3. Fault Correcting Process
6.3.1. Fault Detection
6.3.2. Message Box
6.4. Self-diagnosis
7. Maintenance
7.1. Software-hardware interface
7.2. Operations
7.2.1. State Transition
7.2.2. Loading HMX03A
7.3. Fault Correcting Process <Part 5>
1. General Descriptions
1.1. Summary
1.1.1. Positioning in System
1.1.2. Outline of SMDS Data Process
1.2. System Configuration
1.3. Redundant Configuration
2. Process Method
2.1. Configuration of Message Handler (MH) Network
2.2. Routing System
2.3. VPI/VCI and MID Assigning Method
2.3.1. VPI/VCI Assigning Method
2.3.2. MID Assigning Method
2.4. Group Address
2.5. Multiplexing
2.6. Outline of Functions
3. SMLP
3.1. Outline of Processes 3.2. Configuration
3.3. Correspondence between Each Function Block and Error Flag
3.4. Process in each Block
4. RMLP
4.1. Outline of Process
4.2. Configuration
4.2.1. PVC Test
4.2.2. MSCN
4.2.3. MSD
4.2.4. Correspondence between each Function Block and
4.2.5. Data Interface between RMLP and LPCOM
4.3. HMH00A
4.3.1. Selection of cross-connection
4.3.2. Timing Generator
4.3.3. Address Filter
4.4.1. Test Cell Multiplexing R and 9MG
4.4.2. MID Check
4.4.3. SN Check
4.4.4. Encapsulation
4.4.5. Error Edit I
4.4.6. RMID Acquisition
4.4.7. MRI Timeout Check
4.4.8. GA copy
4.4.9. SNI Available
4.4.10 Error Edit II
4.4.11 SA Check
4.5. HMH04A
4.5.1. SA Screening
4.6. HMH02A.
4.6.1. Outline of Configuration
4.6.2. Outline of Functions
4.6.3. Outline of Interface I/F
4.6.4. Detailed Explanation
5. MH-COM Unit
5.1. General Descriptions
5.2. RDMX/SMUX Function (HMX10A)
5.3. SDMX/RMUX Function (HMX11A)
5.4. VCC Function/Test Cell Multiplexing Function/Scheduling Function (HMX12A)
5.4.1. VCC Function
5.4.2. Test Cell Multiplexing Function
5.4.3. Schedule Function (multiplex-LSI control)
5.5. LAP Terminating/Starting Clock Distribution (HSF05A)
5.5.1. LAP Terminating/Starting Process
5.5.2. Distribution of Clock
6. Protocol Performance Monitor
6.1. Outline
6.2. Layer 2 Protocol Performance Monitor
6.3. Layer-3 Protocol Performance Monitor
6.4. Protocol Performance Monitor in Ingress Unit
6.4.1. Process System
6.4.2. Detailed Process
6.5. Protocol Performance Monitor in Egress Unit
6.5.1. Process System
6.5.2. Details of Processes
7. Network Data Correction
7.1. General Descriptions
7.2. Network Data Correction Parameter
7.3. Network Data Correction in Ingress Unit
7.3.1. Process System
7.3.2. Details of Processes
7.4. Network Data Correction
7.4.1. Process System
7.4.2. Explanation of Process
8. Billing Function
8.1. General Descriptions
8.2. Billing Process
8.3. Checking Function
9. LPCOM unit (INF interface unit)
9.1. General Descriptions
9.2. Outline of Functions
9.3. INF Interface Control Procedure
9.3.1. INF Interface Control
9.3.2. IPF Interface Interruption Control
9.4. SMLP/RMLP Control
10. Various interfaces
10.1. General Descriptions
11. Software Interface
11.1 Initialization
11.1.1. Initialization of MH-COM
11.1.2 Initialization of LP unit
11.2 INS Process (In-service Process)
11.2.1 INS Process of MH-COM
11.2.2. INS Process in LP
11.3 Fault Monitor and System Switch
11.3.1 Fault Monitor of MH-COM
11.3.2 MH-COM Fault Reporting and Processing Sequence
11.3.3 Fault in Communications through INF with LP
11.3.4 Fault detected in MSCN of-LP
11.3.5 Health Check of LP
11.3.6 System Switch
11.4 Test and Diagnostics
11.4.1 Test using TCG
11.4.2 Loopback Test in SBMESH
11.4.3 PVC Test between SNI-SBMESH
11.4.4 MESH-MH PVC test
11.4.5 PVC Test Result Check
11.4.6 Diagnostics of MH-COM
11.4.7 Diagnostics of LP
11.5 MSCN
11.5.1 MSCN of MH-COM
11.5.2 MSCN of LP
11.6 MSD
11.6.1 MSD of HM-COM
11.6.2 MSD of LP
11.7 Billing and Statistic Processes
11.7.1 General Descriptions
11.7.2 Billing process
11.7.3. Protocol Performance Monitor Process
11.7.4. Network Data Collection Process
11.7.5. Various Cell Number Process
<Part 6> GWMESH
1. General Descriptions
1.1 Summary
1.1.1 Position in System
1.2 System Configuration
1.3 Redundant Configuration
2. Process Method
2.1 Network Configuration
2.2 Routing system
2.3 Group Address Process
2.4. Load Splitting
2.4.1 Features of Load Splitting
2.4.2. Key Generation
2.4.3 Key Assignment
3. ICLP
3.1 Summary of Process
3.2 Configuration
3.3 Correspondence between each function block and error flag
3.4. ICLP Input/Output Format
3.5 ICLP Process Flow 3.6 PKG Block
3.6.1 HMH11A
3.6.2 HMH12A
3.6.3 HMH13A
4. OGLP
4.1 Summary of Process
4.2 Configuration
4.3 Correspondence between each function block and error flag
4.4 Cell Format
4.5 Process Flow
4.6 PKG Block
4.6.1 HMH07A
4.6.2 HMH08A
4.6.3 HMH09A
4.6.4 HMH10A
5. MH-COM unit
5.1 General Descriptions
5.2 HMX10A
5.3 HMX11A
5.4 HMX12A
5.5 HSF05A
6. Protocol Performance Monitor
6.1 General Descriptions
6.2 L2 Protocol Performance Monitor
6.3 L3 protocol performance monitor
6.4 Protocol Performance Monitor in Incoming Unit
6.4.1 Processing Method
6.4.2 Detailed Process
6.5 Protocol Performance Monitor in Outgoing Unit
6.5.1 Process Method
6.5.2 Detailed Processes
7. Network Data Collection
7.1 General Descriptions
7.2 Network Data Collection Parameter
7.3 Network Data Collection in Incoming Unit
7.3.1 Process System
7.3.2 Detailed Process
7.4 Network Data Collection in the outgoing unit
7.4.1 In the above described network data collection
7.4.2 Detailed Processes
8. Billing
8.1 Data Generation
8.2 Data Aggregation 9. LP-COM (INF)
9.1 General Descriptions
9.2 Outline of Functions
9.3 INF Interface Control Unit
9.3.1 INF Interface Control
9.3.2 INF Interface Interruption Control
9.4 Controlling ICLP/OGLP
10. Software Interface
10.1 Initialization
10.1.1 Initialization of MH-COM
10.1.2 Initialization of LP
10.2 INS Process
10.2.1 INS Process of MH-COM
10.2.2 INS Process of LP
10.3 Switching Systems
10.3.1 Switching systems in MH-COM
10.3.2 Switching systems in LP
10.4 Fault Monitor
10.4.1 Fault Monitor in MH-COM
10.4.2 Fault Monitor relating to INF Communications
10.5 Test and Diagnostics
10.5.1 Test using TCG
10.5.2 PVC Test between ICI/ISSI and GWMESH
10.5.3 SBMESH/GEMESH-GWMESH PVC Test
10.5.4 Inter-station Test
10.5.5 Test Functions of Each Unit
10.5.6 Self-diagnostics
<Part 7> BSGCSH
1. General Descriptions
1.1 Positions of BSGCSH and BSGC in Switch System
1.2 Sharing Functions of BSGC
1.2.1 Functions of INF
1.2.2 Functions of LAPD
1.2.3 Intra-station Control Communications Link
1.2.4 Interface with ATM Switch
1.2.5 Meta-signaling Communications
1.3 Number and Assignment Condition of BSGC Port
1.3.1 Maximum Number of Ports
1.3.2 Required Number of Ports
1.3.3 Transfer Speed between BSGC and Other Devices
1.3.4 Throughput of BSGC and Port Assignment Condition
2. Outline of Functions of BSGCSH
2.1 Specification
2.2 Higher Order Interface (INF interface)
2.2.1 Hardware Configuration under Control of INF
2.2.2 INF Interface Control Procedure
2.3 Switch Interface (CARP and VCC Interface)
2.3.1 Hardware Configuration for controlling intra-switch duplex device
2.3.2 Intra-switch Signal Control
2.3.2.1 Signaling Control Model (including simplex device)
2.3.2.2 Duplex Device Signal Control Model (for common unit)
2.3.3 Intra-station Control Communications VPI/VCI
2.3.4 Cell Discard System in BSGC-COM
2.4 BSGC Device Control
2.4.1 State of Device in BSGC
2.4.2 BSGC Fault Correcting Process
2.5 Communications Control
2.5.1 Difference from Q.922
2.5.2 Intra-station LAPD Communications (intra-station control communications)
2.6 Diagnostic Functions
2.6.1 Diagnosis Object Items
2.6.2 Intra-station Duplex Device Diagnostic Communications Link
2.7 Configuration of Program Module
3. INF interface
3.1 Hardware Configuration
3.2 DMA Bit Configuration
3.2.1 Bit Configuration of DMA Transfer Data
3.3 INF Control Procedure
3.3.1 Command Queue and Status Queue
3.3.2 Conflict at command activation and status activation
3.3.3 Congestion Control
3.3.3.1 Receiving System Congestion Control
3.3.3.2 Sending System Congestion Control
3.3.3.3. BSGC Congestion Control
3.4 Initializing INF
3.5 INF Priority Control
4. Switch Interface
4.1 Assigning Tag
4.1.1 Concept of Assigning Tag
4.1.2 Assigning Tag in communications from BSGC to ASSW 4.1.3 Assigning Tag in communications from ASSW to BSGC
4.2 CARP Control Procedure
4.2.1 Frame Format
4.2.2 Functions of CARP LSI
4.2.3 Statistic Functions
4.3 VCC Setting Procedure and VCC Copying Procedure
5. BSGC Device Controlling Procedure
5.1 BSGC Fault Monitor
5.1.1 Faulty portion detected in BSGCSH
5.1.2 System Management at Fault Occurrence
5.1.3 Report to BSGC
5.1.4 Recovery Monitor
5.1.4.1 Recovery monitor by BSGC
5.1.4.2 Recovery Monitor in Switch Software
5.1.5 Fault to be detected by the BSGC Hardware
5.1.6 Fault detected by BSGC Firmware
5.1.6.1 Fault in BSGC-COM (excluding faults of the BSGC)
5.1.6.2 Fault in Standby System BSGC
5.2 TM Save System
5.3 Statistic Function
6. Communications Control
6.1 Control of Intra-Station Control Communications
6.1.1 Signaling Cell Format
6.1.2 Difference from Revised LAPD
7. BSGC-COM
7.1 Hardware Configuration of BSGC-COM
7.2 Explanation of Blocks showing Functions of BSGC-COM
7.3 Switch Interface
7.4 SWTIF Interface
7.5 Configuration of Higher/Lower Shelf of BSGCSH
7.6 BSGC-COM Loopback Configuration
7.6.1 Cell Loopback of BSGC and BSGC-COM in INS State
7.6.2 Cell Loopback in OUS State for BSGC and BSGC-COM
8. Duplex Process Control
8.1 Hardware Configuration
8.1.1 BSGC Hardware Configuration
8.1.2 General Description of the BSGC Hardware
8.1.3 Memory Map
8.1.4 I/O Map
9. Maintenance and Operation
9.1 Diagnostics Functions
9.1.1 Diagnostics Object Items
9.1.2 Details
9.1.2.1 INF Interface→BCPR Access Read/Write Diagnosis
9.1.2.2 INF Interface→DMA Transfer Read/Write Diagnosis
9.1.2.3 Diagnostics of Functions in BSGC
9.1.2.4 Diagnostics between BSGC and BSGC-COM
9.1.2.5 VCC Memory Test
9.1.2.6 LAP Link Establishment Test between BSGC and another Device
9.2 TC Function
9.2.1 Basic Policy
9.2.2 Cell-by-Cell Loopback (OUS state)
9.2.3 Cell-by-Cell Loopback Position
9.2.4 TC Stop Function in Active System BSGC during OUS Test
<Part 8> Configuration and Function, etc. Relating to Present Invention

DESCRIPTION OF THE PREFERRED EMBODIMENTS

The embodiments of the present invention are described below in detail by referring to the attached drawings.

<Part 1>

The general configuration and function of the present embodiment is described in Part 1.

Figure 1:
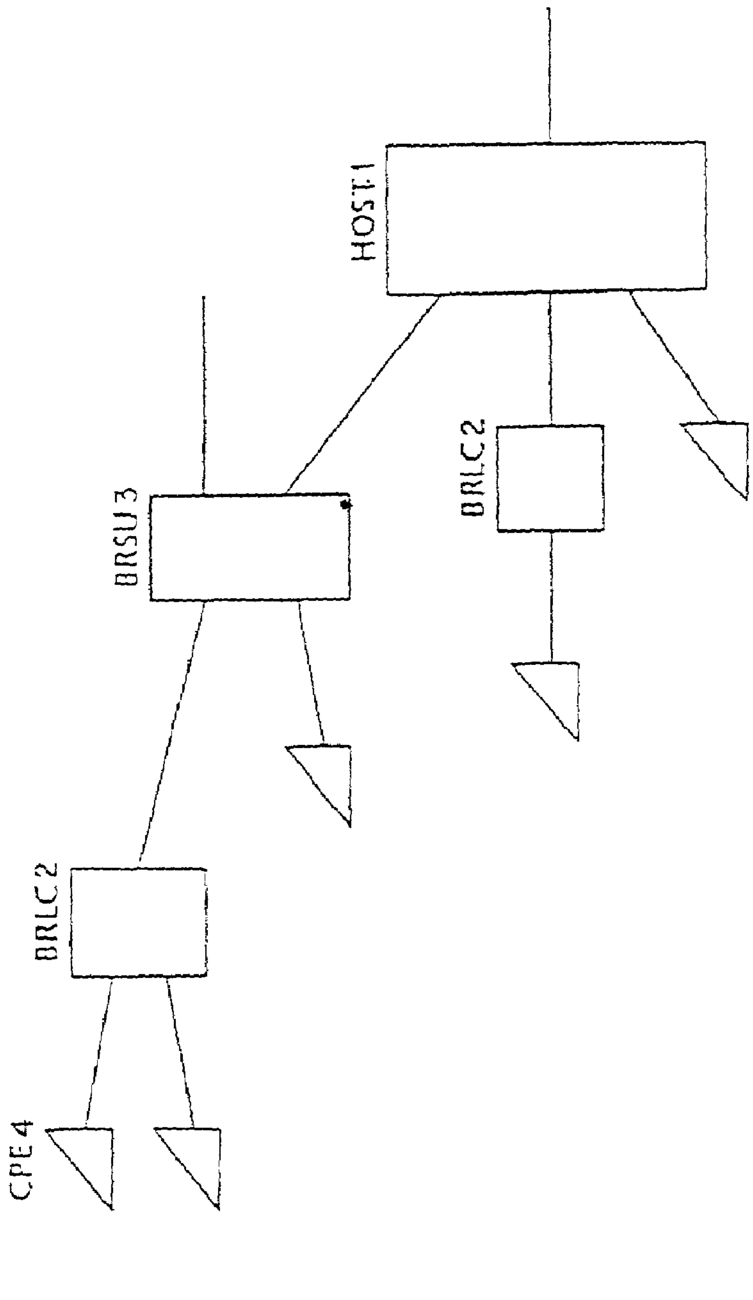
FIG. 1 shows the configuration of the broadband network for which the present invention functions effectively.

1. Outline of the System According to the Present Embodiment 1.1. General Description FIG. 1 shows the configuration of the entire broadband switching system according to the present embodiment. Connected to a broadband host switch 1 are a subscriber terminal equipment, a broadband remote line concentrator 2, a broadband remote switching unit 3, and the like. A customer premises equipment 4 is connected to these units. With this configuration, structured is an economical broadband switching system.

1.2. Interface and Service Provided by the Present Embodiment

Listed below are various interfaces according to the present embodiment.

1.2.1. Subscriber Interfaces 1.2.1.1. Optical Fiber Interface

156 Mbps interface for providing a user network interface (UNI) of a broadband service integrated digital network (B-ISDN)

622 Mbps interface for providing an UNI of the B-ISDN 1.2.1.2. Metallic Interface 1.5 Mbps Interface for providing a subscriber network interface (SNI) of switched multi-megabit data services (SMDS), frame relay, circuit emulation, etc.

45 Mbps interface for providing an UNI of a B-ISDN, SNIs of an SMDS, frame relay, circuit emulation, etc.

1.2.2. Network Interface

622 Mbps optical fiber interface for providing a network node interface (NNI) of a B-ISDN 156 Mbps optical fiber interface for providing an NNI of a B-ISDN 45 Mbps metallic interface for providing an NNI of a B-ISDN, SMDS, frame relay, etc.

1.5 Mbps metallic interface for providing an NNI of a frame relay 1.2.3. Services A broadband switching system according to the present embodiment provides the following services.

Connected ATM High-speed Data Service

Connectionless High-speed Data Service based on the switched multimegabit data service (SMDS)

Frame relay service

Circuit Emulation Service 1.3. System Configuration

Figure 2:
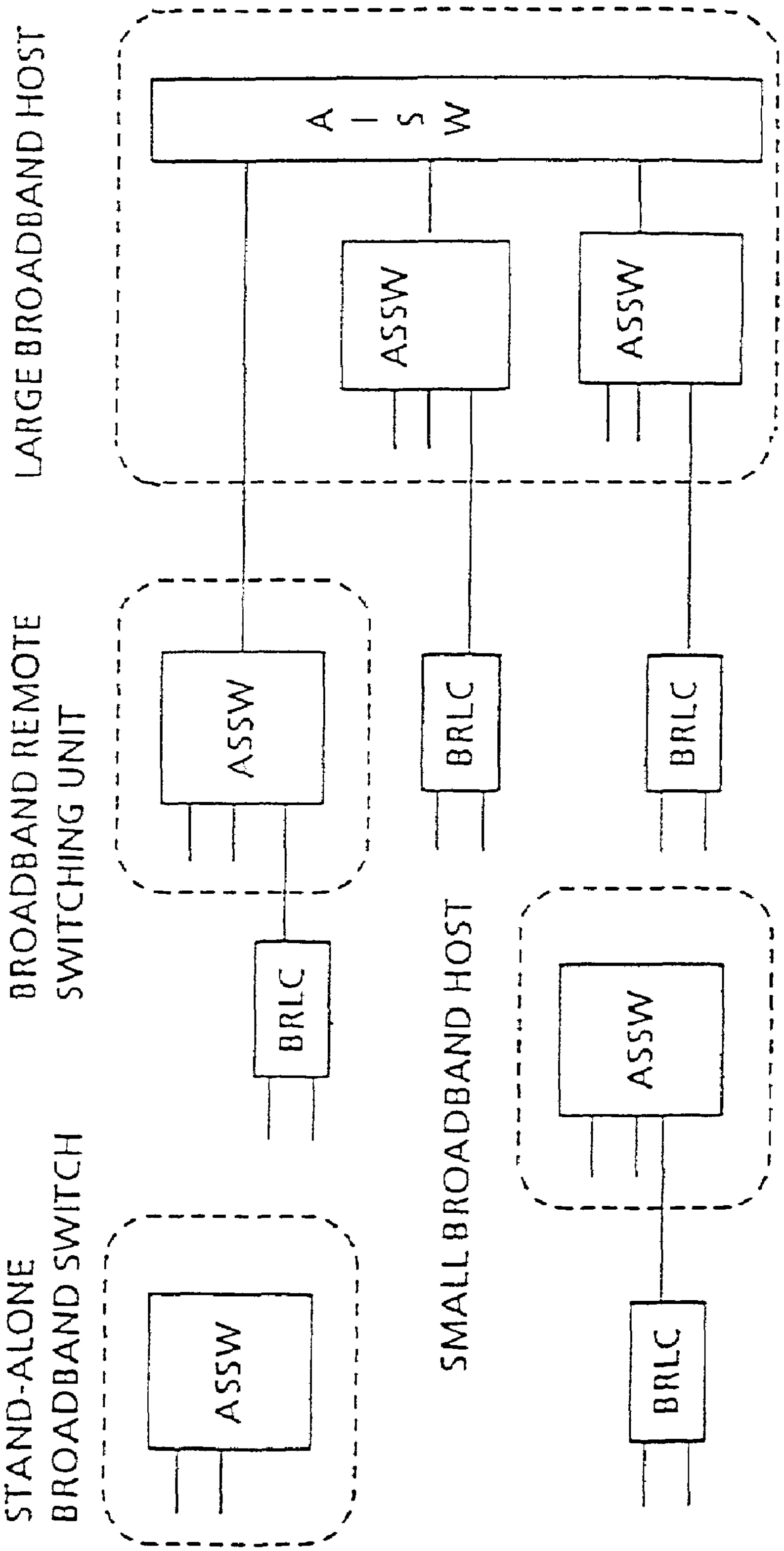
FIG. 2 shows the architecture of the broadband system for which the present invention functions effectively.

Described below is the system configuration according to the present embodiment 1.3.1 Broadband Switch Architecture FIG. 2 shows a variation of the broadband switching system according to the present embodiment.

The basic configuration of the broadband switch refers to an ATM subscriber switch (ASSW) module. The ASSW module comprises a 10 Gbps (gigabit/second) ATM switching module having a redundant configuration; a duplex switch processor; various subscriber interfaces; and network interfaces. A single ASSW module can be assigned as a standalone broadband switch.

An ATM interconnection switch (AISW) is effective as a large capacity switch provided with the capacity larger than that of a single ASSW. To configure a large-scale office, a number of ASSW modules are interconnected through an AISW so that a capacity of 160 Gbps can be realized. With a large-scale configuration in which a number of ASSW modules are interconnected through an AISW, one or more ASSWs can be located remotely to make it function as broadband remote switching device (BRSU) capable of providing complete services.

The ASSW can also function as host switch to a broadband remote line concentrator (BRLC).

1.3.2. Switched Multi-Megabit Data Service (SMDS)

Figure 3:
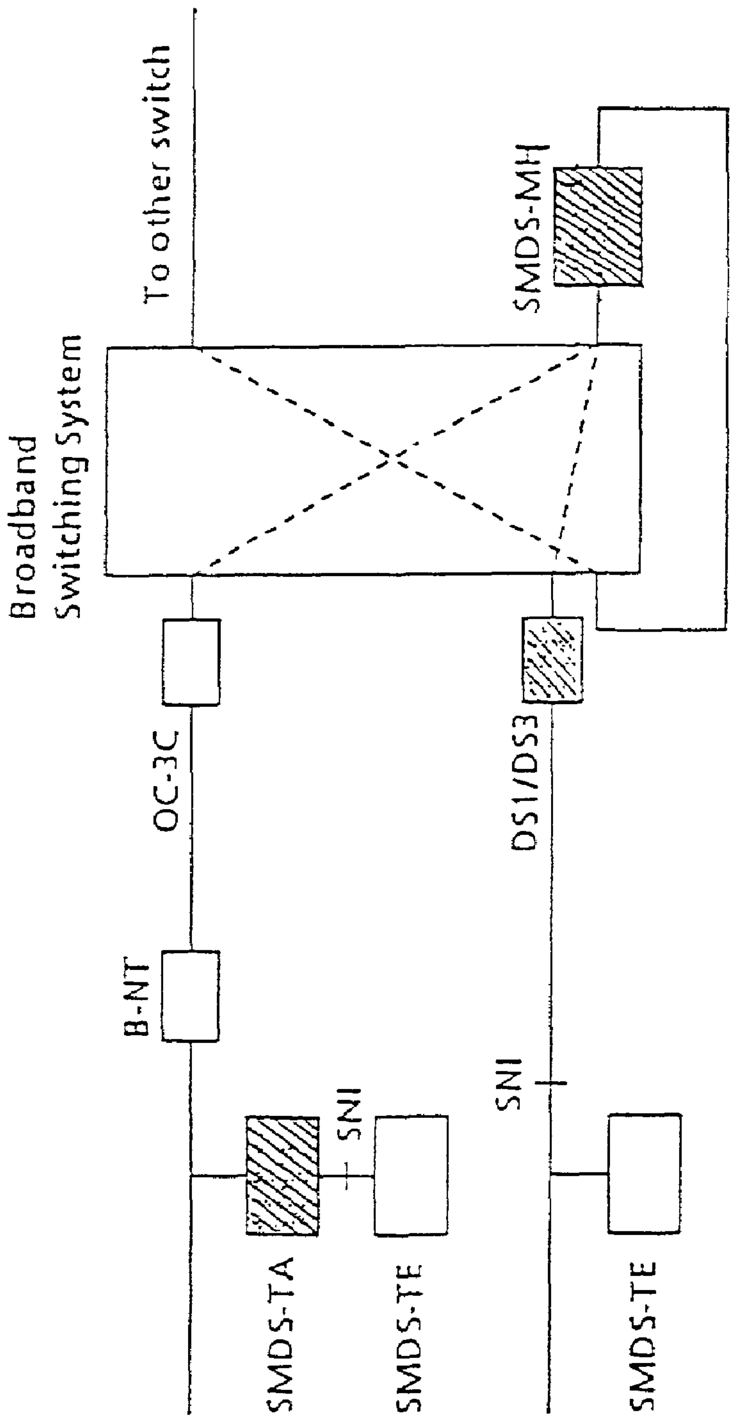
FIG. 3 shows the system of realizing the SMDS in the broadband switch.

FIG. 3 shows a system for realizing an SMDS using a broadband switch according to the present embodiment.

Two typical types of interfaces OC-3C and DSI/DS3—can be used as subscriber network interfaces (SNI). The OC-3C is a 156-Mbps optical fiber interface while the DSI/DS3 is a 1.5-Mbps/45 Mbps metallic interface. The optical fiber interface allows the subscriber line to be shared between the SMDS subscriber equipment and other B-ISDN equipments. The metallic interface is designed to be dedicated to the SMDS. The broadband switching system according to the present embodiment can directly support an SMDS subscriber network interface.

Although the SMDS is well applicable to the ATM (the cell format of the SMDS is similar to that of the ATM), the SMDS uses a special message handler called an SMDS message handler (SMDS-MH). The SMDS-MH provides various SMDS-oriented services, e.g., address screening, message routing, group addressing (point to multi-point connection), illegal message checking, etc. Since the SMDS is a connectionless service, the SMDS-MH provides various services for each message and for each cell. Because it is featured by its high-speed process, most services are provided through hardware rather than software.

Figure 4:
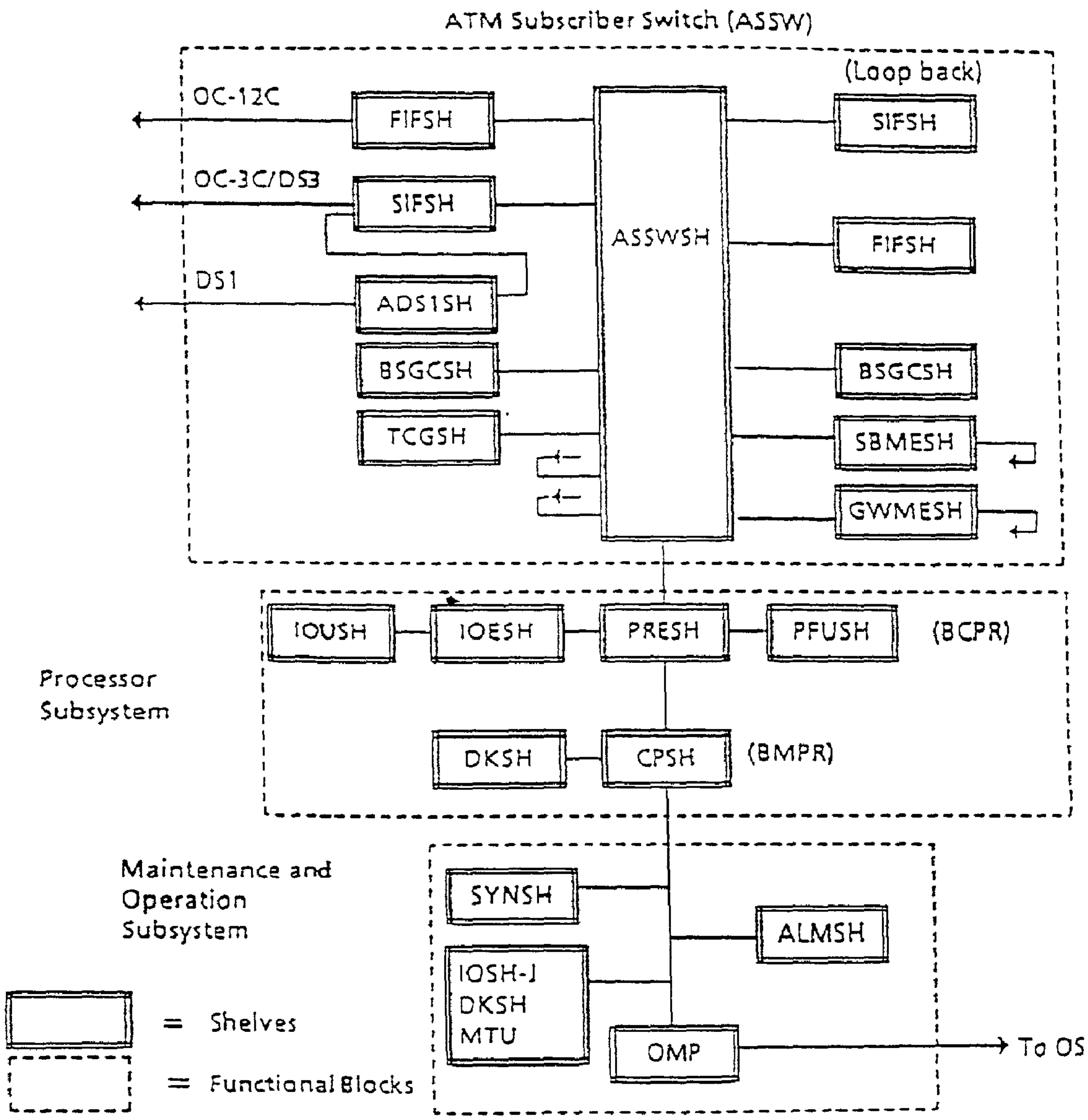
FIG. 4 shows a typical hardware configuration of the broadband switching system for which the present invention functions effectively.

2. Explanation of Hardware According to the Present Embodiment 2.1. ATM Network for Small Host FIG. 4 shows the configuration of the typical hardware of the broadband switching system according to the present embodiment. FIG. 4 actually shows an ATM network for a small host.

2.1.1. ATM Subscriber Switch (ASSW)

The ASSW provides ports (subscriber interfaces) for various types of subscribers and network interfaces. The subscriber interfaces include subscriber-network interfaces (SNI) in the SMDS, user network interfaces (UNI) in the frame relay, and B-ISDN ATM UNI. The network interfaces include network-network interfaces (NNI) in the frame relays, SMDS, and B-ISDN, and the interexchange carrier interface (ICI) and interswiching system interface (ISSI) in the SMDS. The subscriber interface can also be applied to a circuit emulation.

Figure 5:
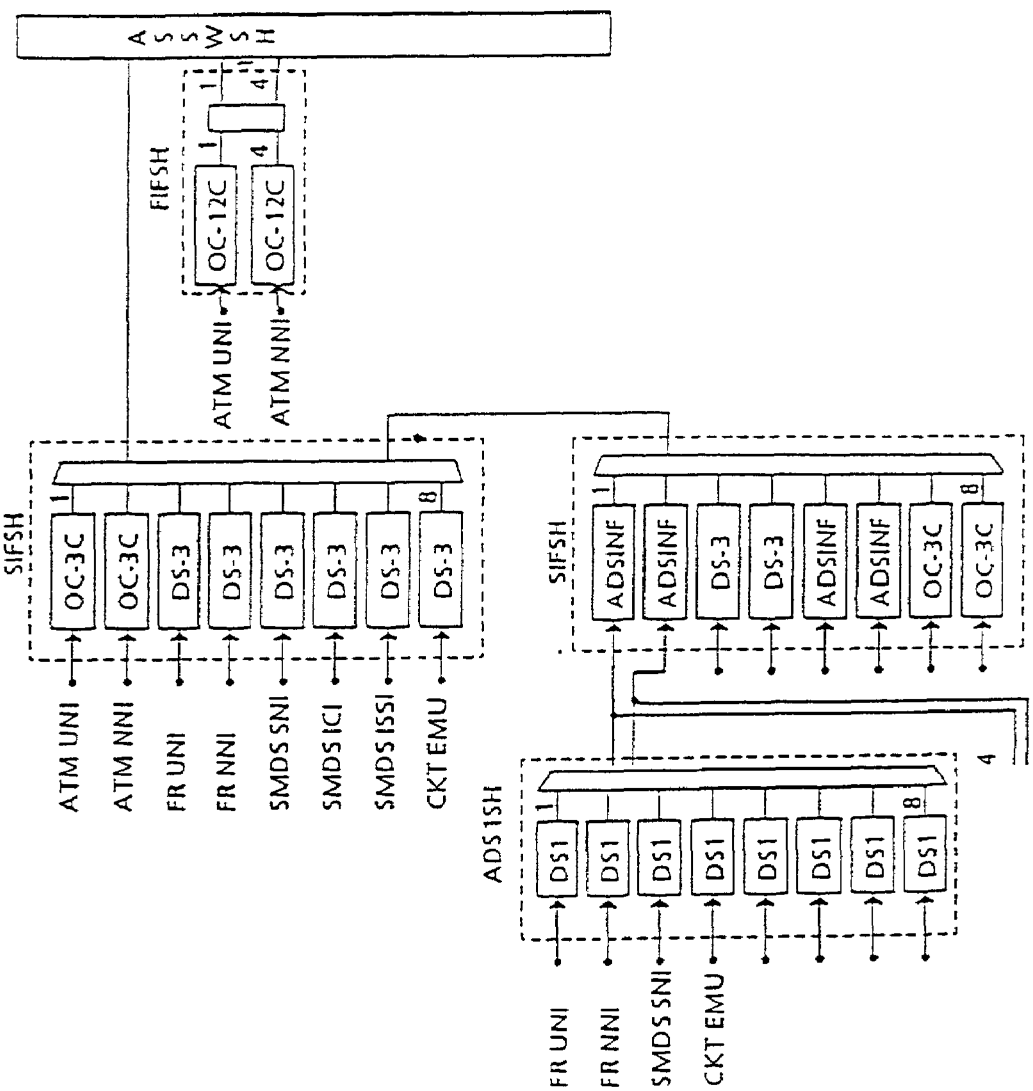
FIG. 5 shows the configuration of a port in the ASSW.

FIG. 5 shows the configuration of a port.

2.1.2. ASSW Subscriber and Network Interface

The subscriber and network interfaces are configured and provided in several types of equipment shelves. The shelves include the ATM DS-I shelf (ADSISH), the subscriber interface shelf (SIFSH), and the fiber interface Shelf (FIFSH)

2.1.2.1. Subscriber Interface Shelf (SIFSH)

Figure 6:
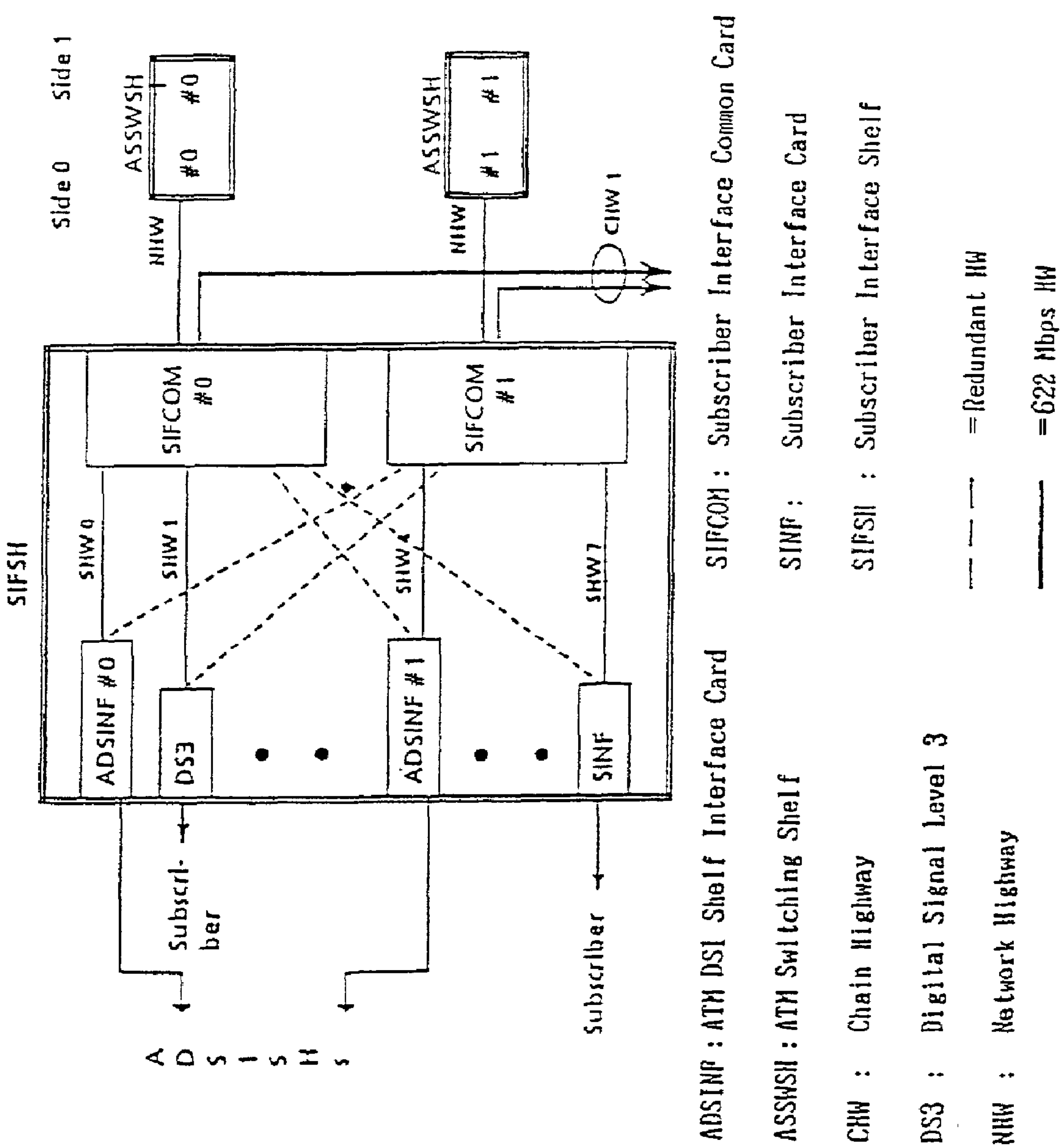
FIG. 6 shows the configuration of the subscriber interface shelf (SIFSH).

FIG. 6 shows the configuration of the subscriber interface shelf (SIFSH).

The subscriber interface shelf (SIFSH) provides necessary power supplies, common cards, and mounting slots to accept up to eight DS3 or OC-3C interface cards of various types. These includes the ATM OC-3C card group (OC3CPG), the ATM DS-3 card group (ADS3PG), the frame relay DS-3 card group (FDS3PG), the circuit emulation DS-3 card group (CDS3PG), and the ADS1SH interface card (ADSINF). The ATM DS-3 card provides both ATM and SMDS interface.

The ATM OC-3C card group (OC3CPG) provides for ATM cell-switching of information received from ATM facilities via B-ISDN UNI.

The DS-3 card groups are similar in function to the DS-1 card groups for use in the ADS1SH, except that they provide for operation at the DS-3 rate, rather than the DS-1 rate.

The SIFSH is also capable of handling the ADS1SH interface card (ADSINF). Each pair of ADSINF cards interface with 4 ADS1SH shelves. A total of 16 ADS1SH shelves may be interfaced per SIFSH. Since each of these ADS1SHs handles 8 DS-1 ports, and 2 ADS1SH shelves can be daisy-chained as described later, 256 DS-1 cards may be handles by a port serving a pair of SIFSHs.

2.1.2.2. ATM DS-1 Shelf (ADS1SH)

Figure 7:
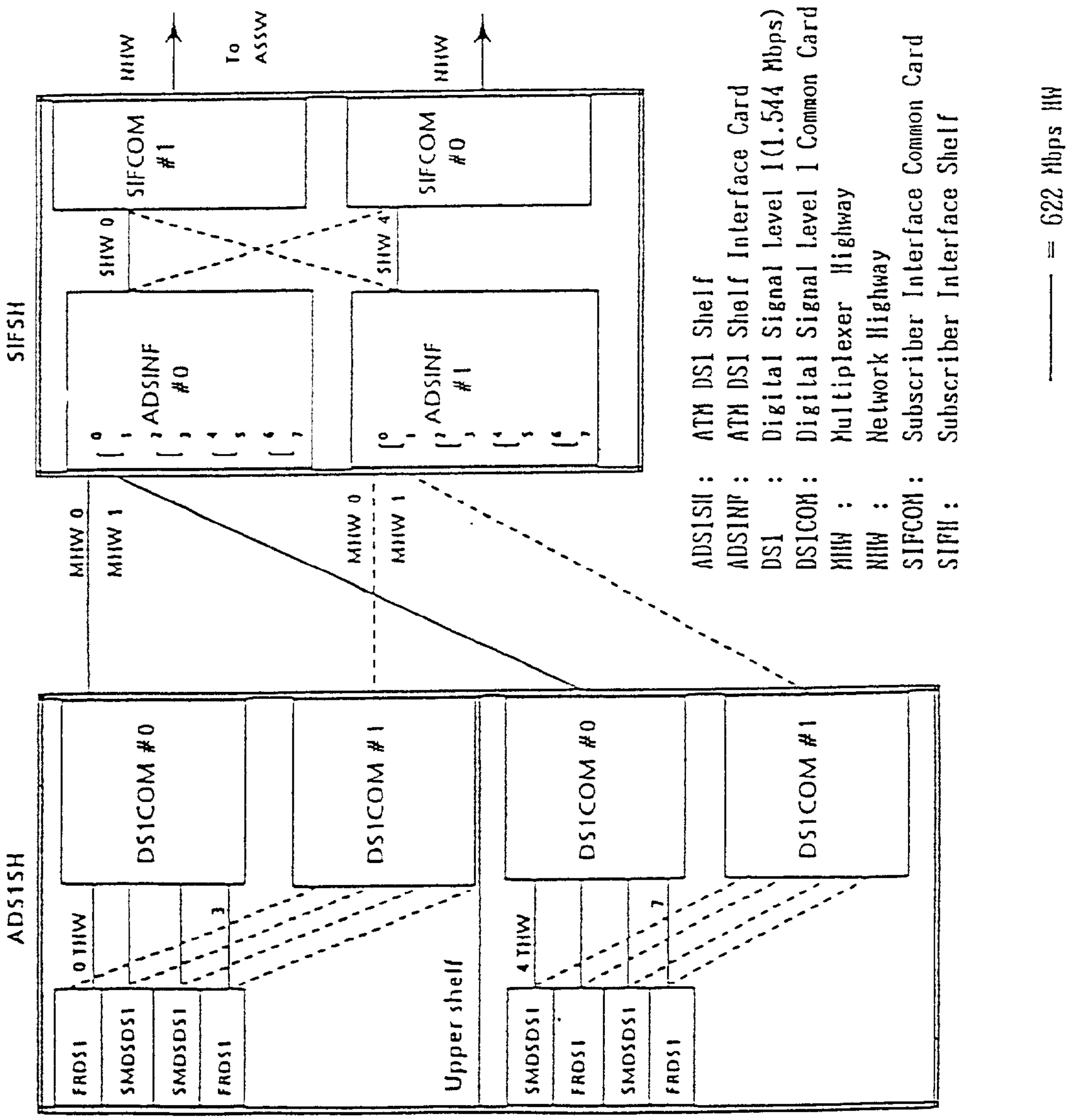
FIG. 7 shows the connection of the ADS1SH connected to the SIFSH.

FIG. 7 shows the connection of the ADS1SH to the SIFSH.

The ATM DS-1 shelf (ADS1SH) accommodates a variety of DS-1 interface cards. These include a frame relay DS-1 card group (FDSIPG), an SMDS DS-1 card group (SDS1PG), and a circuit emulation DS-1 card group (CDS1PG).

The frame relay DS-1 card group provides for segmenting a long frame relay message into individual ATM cells and associating a virtual call identifier with each cell along with the necessary tags associated with cell switching. The card group also receives cells from the ATM fabric and reassembles them into a frame relay format. This adaptation process is referred to as segmentation and reassembly. It permits ATM cell switching techniques to be applied to frame relay traffic.

The SMDS DS-1 card group provides similar functions. The task provides data as a series of cell-sized data units.

The circuit emulation DS-1 card group provides for continuous cell adaptation to accept the information from a channel used for full-period traffic. It also breaks it into a series of ATM cells to prepare it for switching through the ATM network. The circuit emulation card group also provides for timing recovery where the signal leaves the network.

The ADS1SH shelf provides necessary power supplies, common cards, and mounting slots to accept any mix of up to 8 of the 3 DS-1 card types. The output from the shelf is extended to the ADSLSH interface cards (ADSINF) mounted on the subscriber interface shelf (SIFSH). (Refer to FIG. 7).

2.1.2.3. Fiber Interface Shelf (FIFSH)

The fiber interface shelf (FIFSH) provides necessary power supplies and mounting slits to accept up to four OC-12C interfaces. Each interface consists of an ATM OC-12C card group (OC12PG) and a pair of fiber interface card groups (FIFCPG).

2.1.3. ASSW ATM Switch Module

Figure 8:
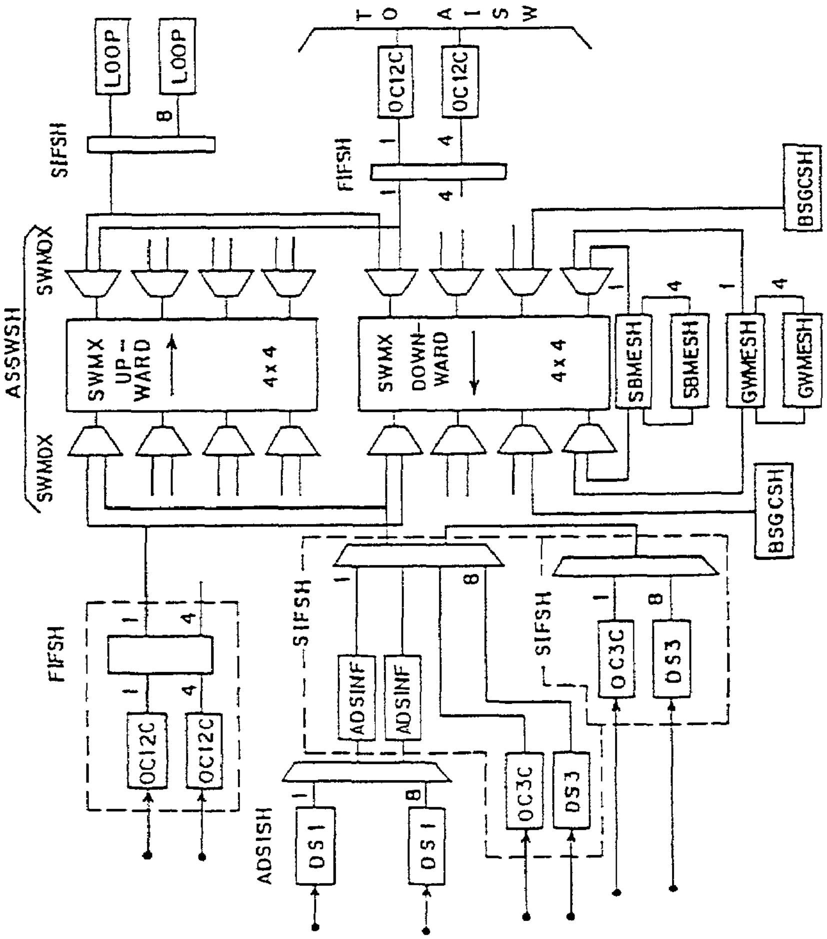
FIG. 8 shows the configuration of the network based on the ASSW.

The ATM switch module is implemented as a fabric with a maximum capability of 10 Gbps. It provides for up to 16 ports for ingress and egress of traffic. The switching fabric is implemented in 2 separate portions for upward and downward switching. The forward traffic from subscriber and network ports is presented to the 16 ports on the network provided for upward directed traffic. The return traffic is received from the various subscriber and network interfaces to the ASSW. Some of the network ports are used by the service circuits, providing support to common signaling to the network and message handling for SMDS. FIG. 8 shows an example of the configuration of the network based on the ASSW.

2.1.3.1. ATM Switching Shelf (ASSWSH)

The ATM switching shelf (ASSWSH) houses the entire ATM switching network and its associated power supplies. The switching network is implemented as a 4×4 non-blocking switch providing 10 Gbps. Each of the four 2.5 Gbps ports on the network has 4 associated cell routing multiplexer cards. This provides a total of sixteen 622 Mbps inputs to the network.

The ATM switch module is always implemented in the same 4×4 size.

Pairs of multiplexer cards to support each of the 4 network ports may be equipped individually. Each pair of multiplexer cards provides for 4 network ports.

The shelf also contains 2 pairs of common cards, a pair of cell clock generator cards (CELCLK) for timing, and a pair of parallel ATM interface cards (PIAINF) for connection to the processing equipment.

2.1.3.2. Daisy Chaining

The above described shelves serving subscriber and network interfaces can be connected to the ATM switching network with a single shelf connected to each of the 16 ports on the switch. If a shelf does not provide a full load of 622 Mbps, then it can be daisy-chained to another shelf to develop the load. Daisy-chaining is the process of connecting the first shelf to the switch port, then connecting a second shelf to the first. Two SIFSH shelves may be daisy-chained as shown in FIGS. 3-2. These arrangements permit up to 32 shelves to be connected to the 16 input ports to the network.

2.1.4. ASSW Other ATM Network Support Equipment and Test Cell Generation

The traffic from the upward switch fabric may be connected to the downward switch in one of two ways. This can be done with loop-back circuits or by connection to an ATM Interconnection switch (AISW). The loop-back arrangement supports any intra-ASSW connections. Inter-ASSW connections are supported by connections through the AISW.

2.1.4.1. Subscriber Interface Shelf (SIFSH) for Loopback

Figure 9:
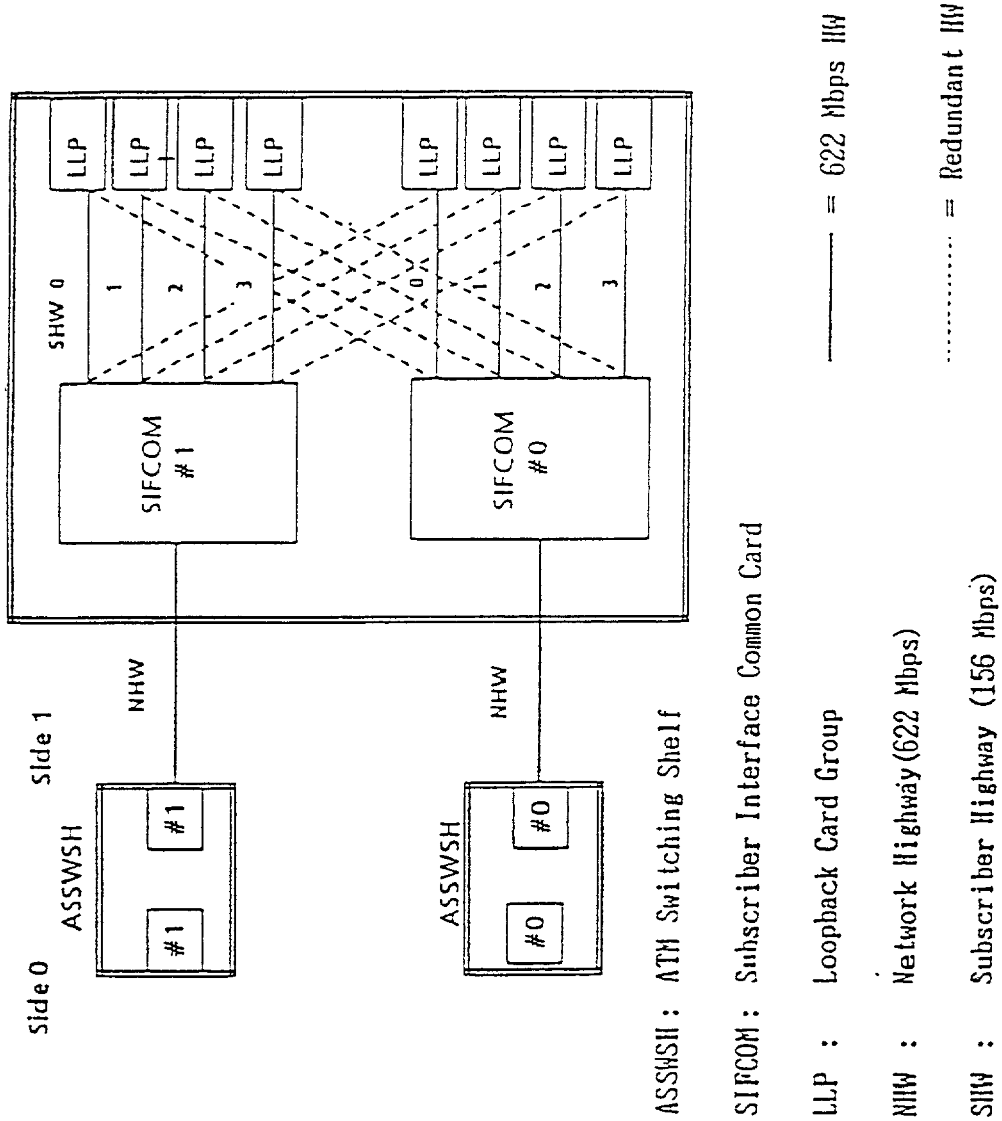
FIG. 9 shows the loopback configuration in the SIFSH.

FIG. 9 shows the configuration of the loop-back of the SIFSH.

The SIFSH contains up to 8 loop-back card groups (LOOPPGA) to connect up to eight 156 Mbps outlets from the upward network to 8 of the 156 Mbps inlets on the downward network. The shelf also includes the necessary power equipment to support the loop-back cards. Loop-back card group of 622 Mb/s is also available in the future. This may be necessary if a service with bandwidth of larger than 156 Mb/s is introduced.

2.1.4.2. Subscriber Interface Shelf for Test Cell Generator Adapters

Figure 10:
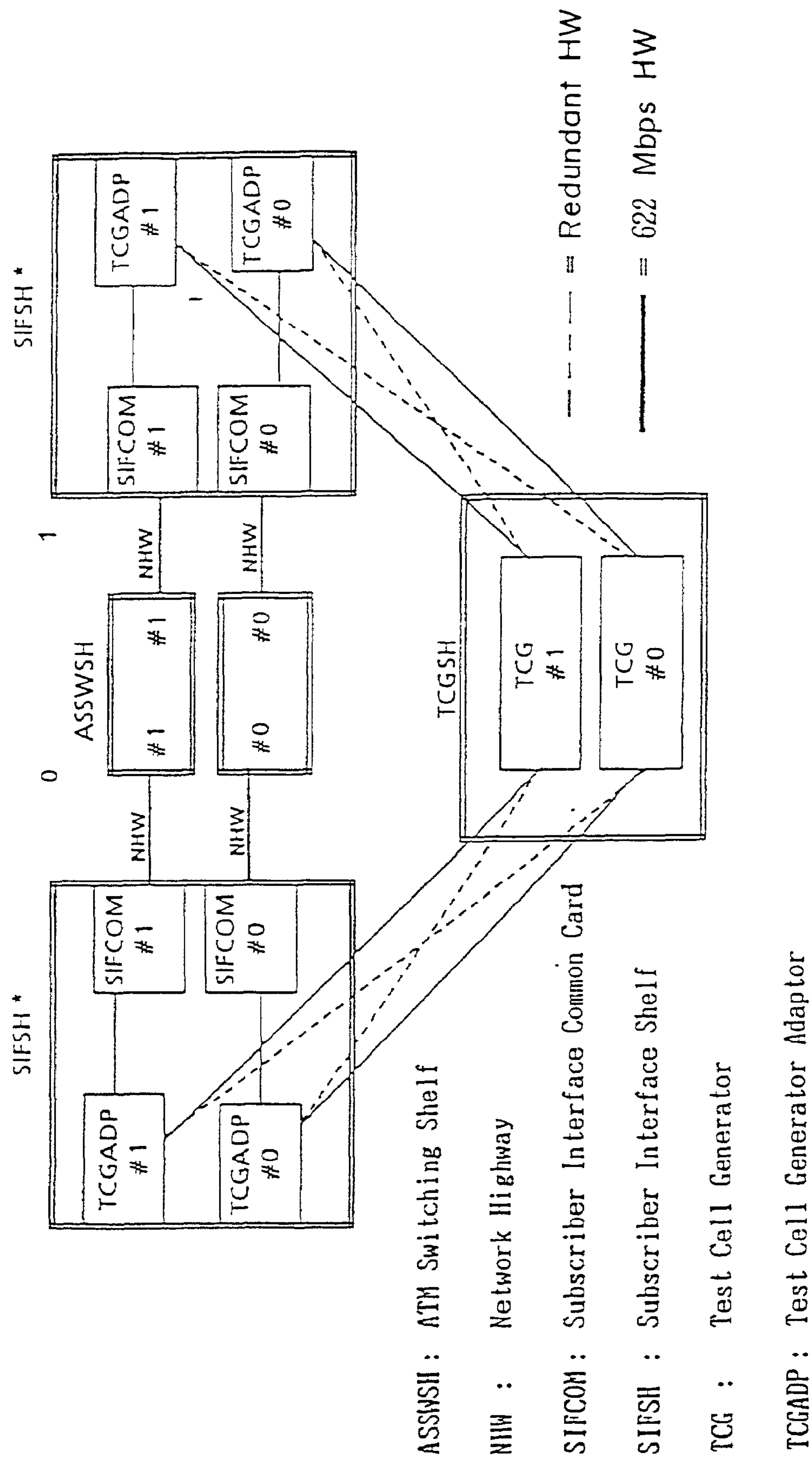
FIG. 10 shows the configuration of the test generator connected to the SIFSH.

FIG. 10 shows the configuration of the test cell generator connected to the SIFSH.

As shown in FIG. 10, the SIFSHs can also contain test cell generator adapters (TCGADPs) that are used for testing. These TCGADPs are contained in SIFSHs that are located on both ingress and egress The SIFSH of the ASSW. The test cell generator (TCG) is located in the test cell generator shelf (TCGSH) as shown in FIG. 10.

2.1.5. ASSW Signaling Equipment

Each of the port equipment shelves on the system has an associated microprocessor. The broadband signaling controller shelf (BSGCSH) provides for signaling between the broadband call processor (BCPR), various network port microprocessors and for B-ISDN UNI signaling.

Figure 11:
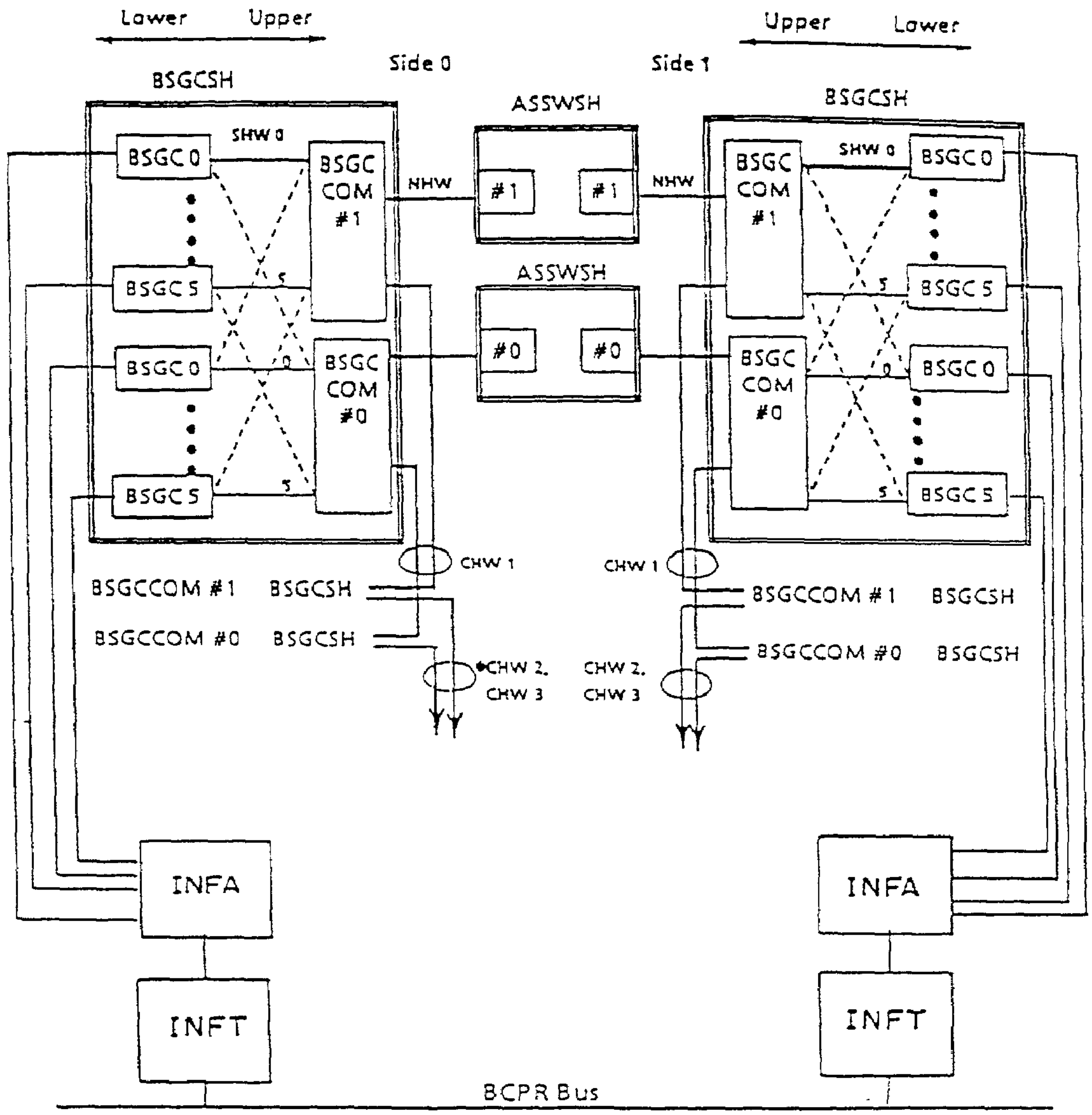
FIG. 11 shows the configuration of the BSGCSH.

FIG. 11 shows the configuration of the BSGCSH. This shelf is always provided. It provides power supplies, common cards and mounting slots of up to 6 broadband signaling controller card groups (BSGCPGA). The BSGC in the BSGCSH is connected, through an periodical interface type A (INFA) and a periodical interface type T (INFT), to the system bus (BCPR bus) to which the BCPR is connected.

2.1.6. SMDS Message Handler

There are two different types of SMDS message handling equipment, one to support the signaling requirements for subscriber SNI ports, and another to support the signaling for ICI and ISSI trunk ports.

2.1.6.1. Subscriber Message Handler Shelf (SBMESH)

The subscriber message handler shelf (SBMESH) provides for message handling from the SMDS subscriber SNI ports. The shelf is provided whenever any SMDS subscriber SNIs exist as ports on the ASSW or any of the associated BRLCs, or when SMDS traffic is carried over ATM UNI facilities from customer-located terminal adapters.

Each SBMESH shelf can serve a mixture of DS-1 and DS-3 facilities, up to the capacity of the shelf. The shelf can handle an SMDS information rate of 102 Mbps, where the maximum information rate for DS-3 is 1.17 Mbps. A shelf also can handle up to 32 SNIs. On this basis, a given shelf can handle up to 3 DS-3s or 32 DS-1s. In addition to these restrictions, a switching network is limited to 622 of traffic per port.

The system permits up to 4 SBMESH shelves to be daisy-chained to a network inlet. If the network is exclusively loaded with SMDS DS-1s, then a network port equipped with 4 daisy-chained SBMESHs can handle up to 12 DS-3s or 128 DS-1s, or a mixture of these two types. If the SMDS ports and traffic for the ASSW exceeds the capacity of a single message handler group, then another port, or several ports, can be chosen to provide more message handling equipment.

2.1.6.2. Gateway Message Handler Shelf (GWMESH)

The gateway message handler shelf (GWMESH) provides message processing and signaling functions for SMDS ICI and ISSI ports on the ASSW.

Each GWMESH is subject to the same limitations as for the SBMESH shelf. When the SMDS ICI or ISSI are equipped as DS-3s, running at full capacity, then the practical limitation for a GWMESH is 3 DS-3 ICIs and/or ISSIS. When the SMDS ICI or ISSI are equipped as fully utilized OC-3Cs, a message handler shelf must be dedicated to serving the single OC-3C. The system permits up to 4 GWMESH shelves to be daisy-chained to the same inlet. If the requirement exceeds the capability for a single message handler group, then an additional port or ports may be similarly equipped.

In an office with a small requirement for SMDS, one or more SBMESHs can be daisy-chained with one or more GWMESHS, as long as the per-shelf limits are not exceeded, and the overall traffic does not exceed 622 Mbps. This sort of engineering arrangement is useful in minimizing the port usage for this function.

2.2. Broadband Remote Switching Unit (BRSU)

Figure 12:
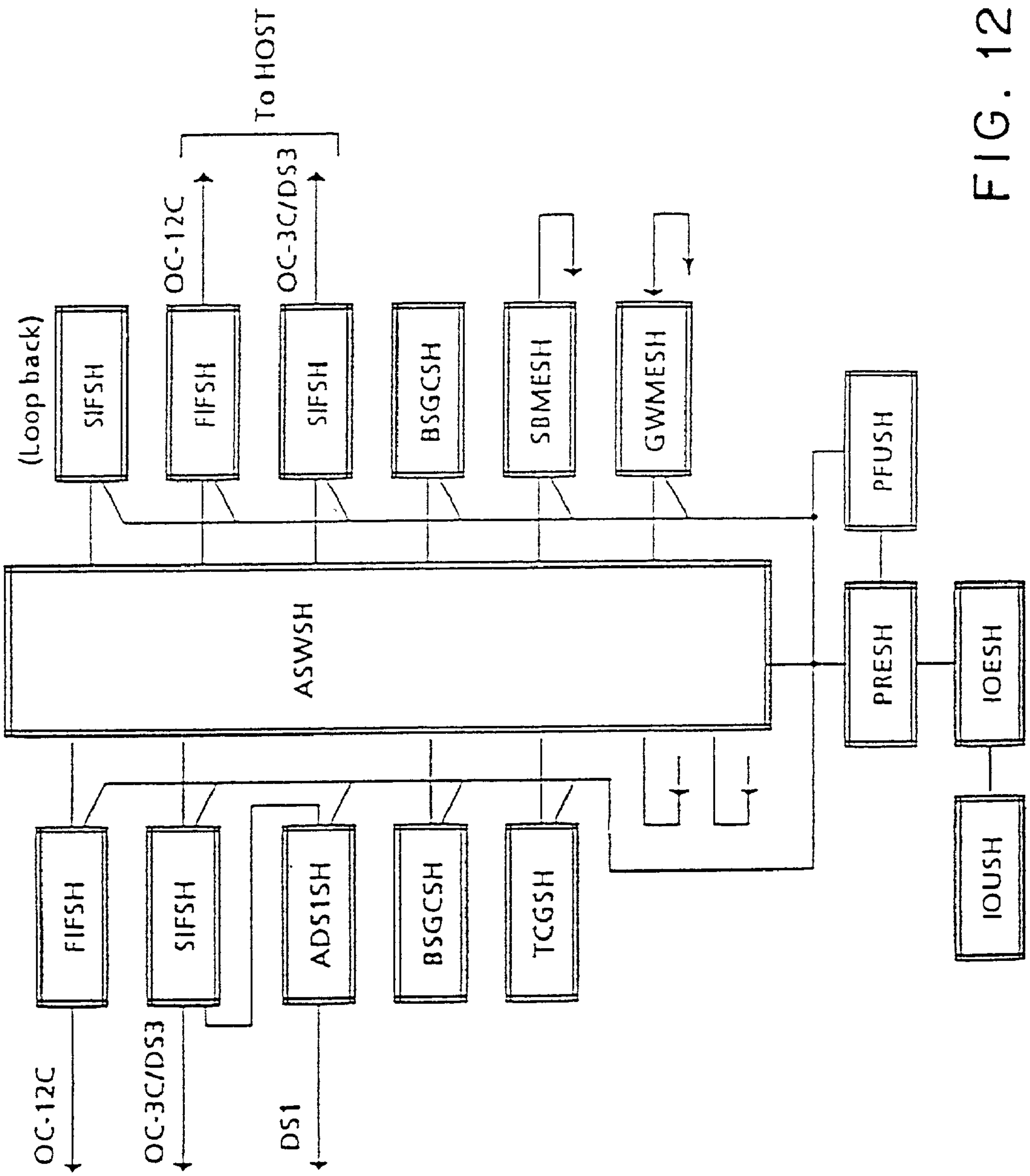
FIG. 12 shows the important hardware components of the BRSU.

FIG. 12 shows the major hardware components of a BRSU. The components of the BRSU are the same as those of the ASSW in the host switch.

2.3. Broadband Remote Line Concentrator (BRLC)

Figure 13:
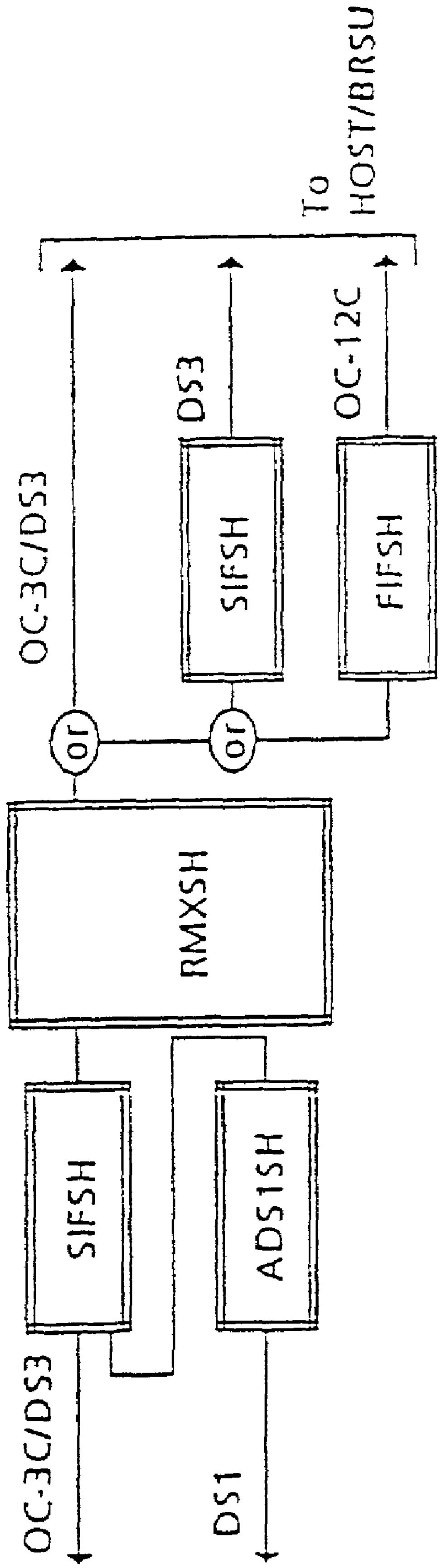
FIG. 13 shows the important hardware components of the BRLC.

FIG. 13 shows the major hardware components of a BRLC.

When it is necessary to provide subscriber interfaces at a location remote from an ASSW, a broadband remote line concentrator (BRLC) can be used. The BRLC subtends from the ASSW and is where switching functions are performed.

The BRLC essentially aggregates the traffic from a cluster of customers and delivers it to the ASSW (where it is connected via one or more umbilicals). The BRLC can either be engineered for full availability or traffic can be concentrated.

The BRLC consists of the same type of subscriber and network connecting input port equipments as the ASSW. There is no call processor, but there is some common equipment to replace the network between the ports and the umbilicals.

Figure 14:
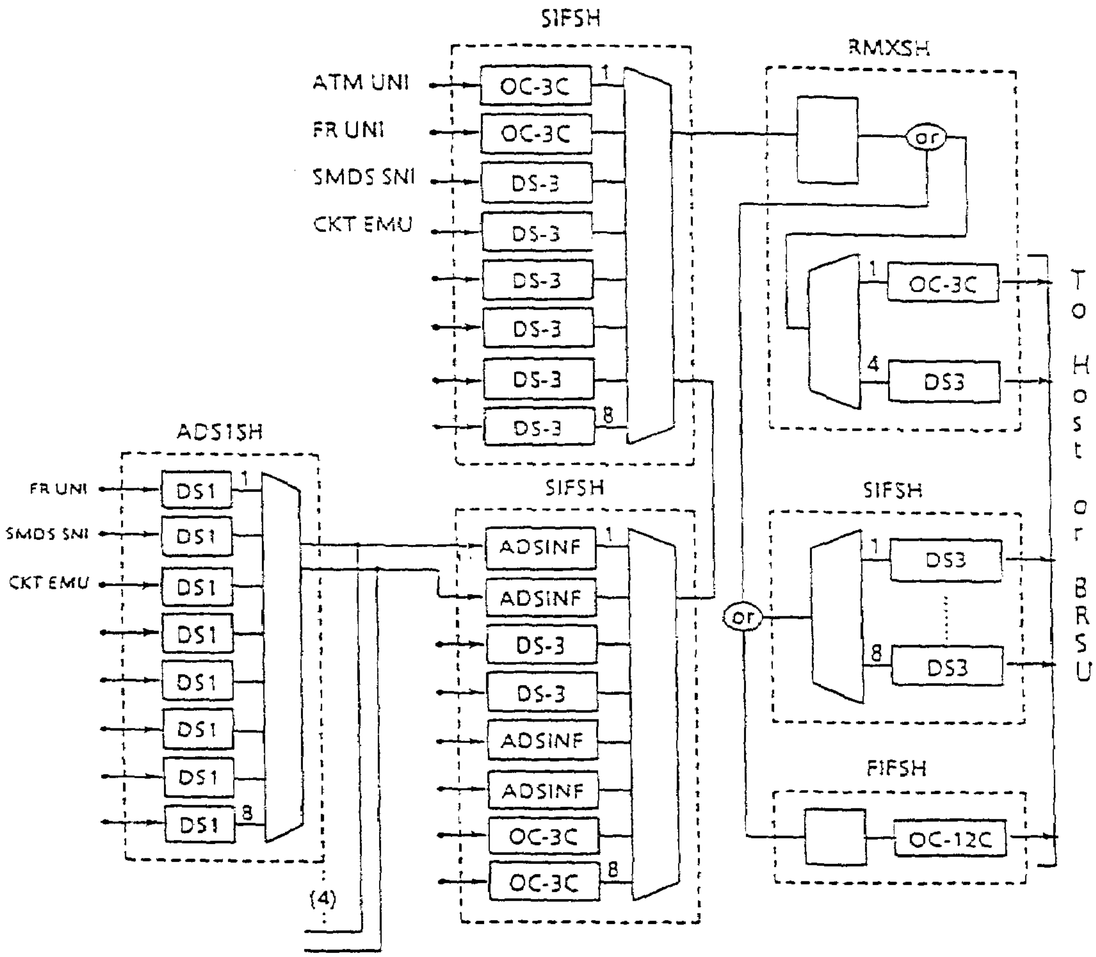
FIG. 14 shows the configuration of the connections in the BRLC.

FIG. 14 shows the connections in the BRLC.

2.3.1. Subscriber Input Ports

The subscriber interfaces are connected to the ports on the BRLC. These ports are implemented by means of several types of equipment shelves. They include the same ATM DS-1 shelf (ADS1SH), and the subscriber interface shelf (SIFSH), that are implemented in the ASSW. The fiber interface shelf (FIFSH) is not used in the BRLC because the maximum capacity of the entire BRLC is 622 Bbps.

The ATM DS-1 shelf (ADSLSH) houses various types of DS-1 interface card groups. These include a frame relay DS-1 card group (FDSIPG), an SMDS DS-1 card group (SDS1PG), and a circuit emulation card group (CDS1PG). The ADS1SH is described in 2.1.2.2.

The subscriber interface shelf (SIFSH) houses various network interface cards. The SIFSH accepts ATM OC-3C card groups, various DS-3 cards, or ATM DS-1 shelf interface cards (ADSINF). The SIFSH is described in 2.1.2.1.

2.3.2. Umbilical Equipment

The umbilicals between the BRLC and its serving ASSW can be equipped as DS-3 facilities using ADS3PGA card groups or as OC-3Cs using OC3PGA card groups. The umbilical can also be provided as a single OC-12C using an OC12PGA card group. Since the BRLC is limited to 622 Mbps, the maximum requirement is for 1 OC-12C, or 4 OC-3Cs. The maximum arrangement for DS-3s provides 12 DS-3 facilities and handles nearly 611 Mbps. All of the umbilicals from any given BRLC must be connected to the same ASSW.

When DS-3 or OC-3 cards are used, the first 4 cards can be mounted in reserved slots in the RMXSH as a minimum cost arrangement. If the number exceeds 4, then a SIFSH can be added to mount an additional 8 cards. If an OC-12C is desired, then a FIFSH shelf can be used. The SIFSH and FIFSH are described above.

2.3.3. Network Equipment

The BRLC does not have a network or the ASSW. As a result, network switching shelves and synchronization shelves are not required. However, various equipment shelves serving subscriber ports and umbilicals expect to interface to a network equipment and expect certain functions in the network equipment. For this reason, the BRLC requires a shelf of equipment to stand in place of the network. This function is performed by the RMXSH shelf.

The remote multiplex shelf (RMXSH) provides network substitution and also functions as multiplexer. It accepts the ATM from the subscriber interface shelves and multiplexes it to various umbilicals that have been provided. The shelf also established and handles the timing for the multiplexing function.

The RMXSH shelf provides the clock circuits and multiplex equipment to perform these functions. The shelf is always equipped with a pair of remote multiplex timing generator card group (RMXTPG), a pair of remote multiplex highway card groups (RMXHPG), and a pair of remote multiplex controller card groups (RMXCPG).

3. Functions According to the Embodiment 3.1. General Descriptions

In this section, the functionality of the broadband switching system components are explained. These components are classified into the following four categories.

Host switch
Broadband remote switching unit (BRSU)
Broadband remote line concentrator (BRLC)
Customer premises equipment 3.2. Host Switch The host switch is composed of the following components.

ATM subscriber switch (ASSW)
ATM interconnection switch (AISW)
Broadband main processor (BMPR)
Maintenance and operation subsystem (MOS)
Optical ring bus The host switch is further classified into the following two types.

Small host switch
Large host switch

Figure 15:
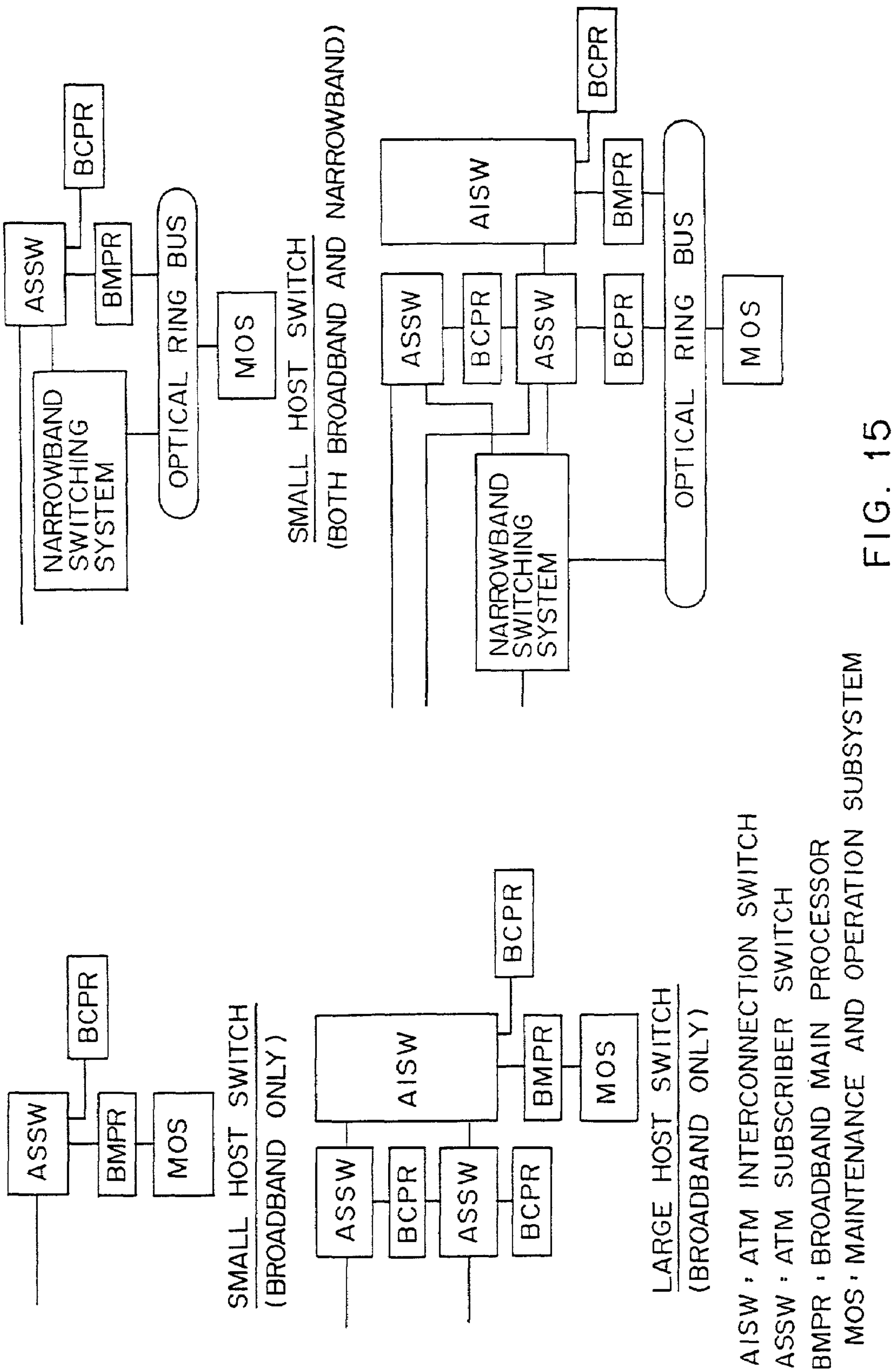
FIG. 15 shows the configurations of the small host switch and large host switch.

FIG. 15 shows the configuration of a small host switch and a large host switch. The ASSW is the basic building block of the broadband host switch. The small host switch is composed of one ASSW, BMPR, and MOS. The large host switch is composed of multiple ASSWs, an AISW, BMPR, and an MOS. The AISW interconnects multiple ASSWs in the large host switch. Migration from the small host switch to the large host switch is possible without interruption of service.

The optical ring bus is used when a broadband switching system and a narrowband switching system are integrated into a single system.

The present embodiment mainly relates to small host switches.

3.3. ATM Subscriber Switch (ASSW)

Figure 16:
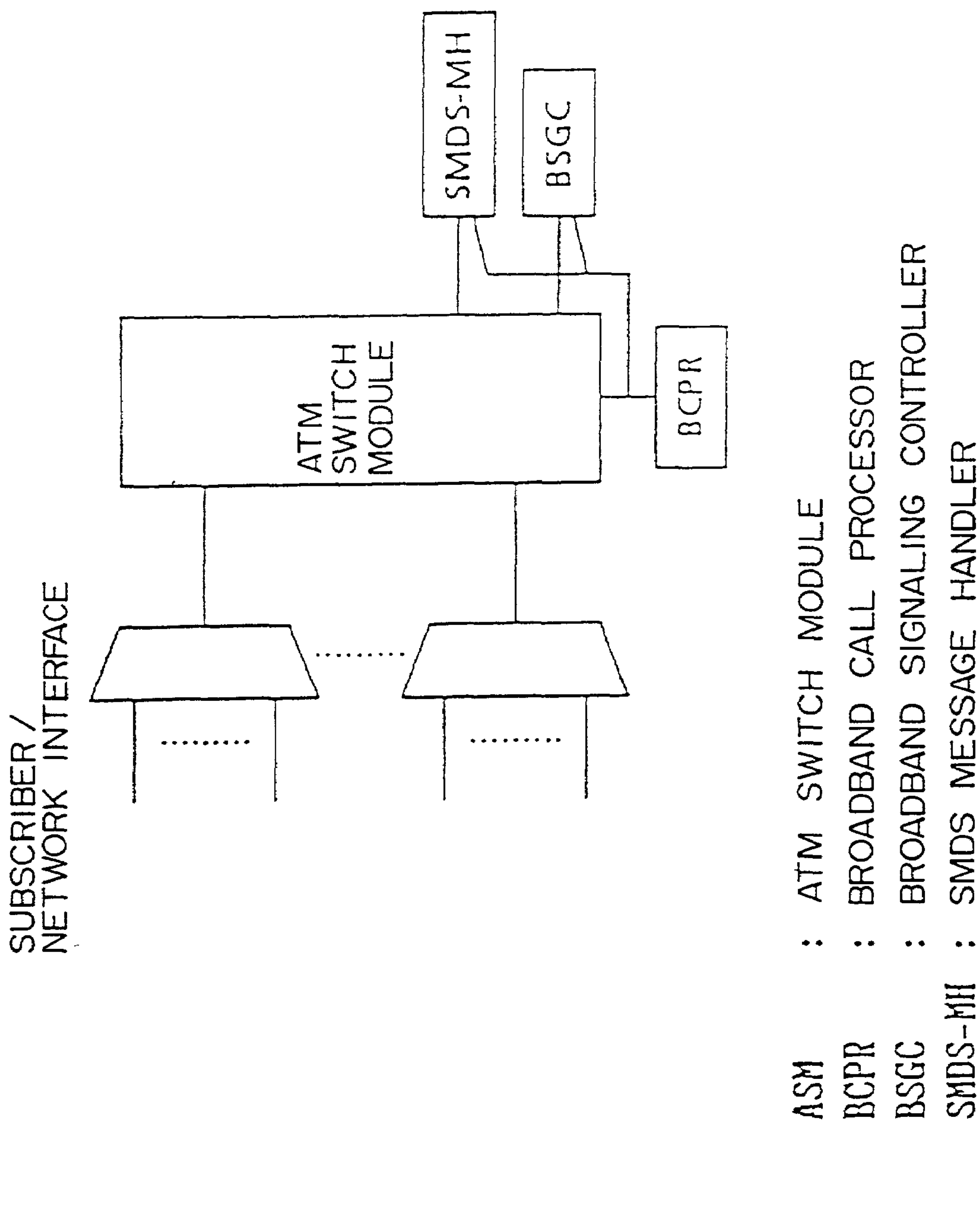
FIG. 16 shows the configuration of the ASSW.

An ATM switch (ASSW) is a basic component of a broadband switching system. FIG. 16 shows the configuration of the ASSW. The ASSW a throughput capacity of 10 Gbps and is composed of the following components.

ATM switch module (ASM)
Subscriber/network interface
Broadband signaling controller (BSGC)
SMDS message handler (SMDS-MH)
Broadband call processor (BCPR)

3.3.1. ATM Switch Module (ASM)

Figure 17:
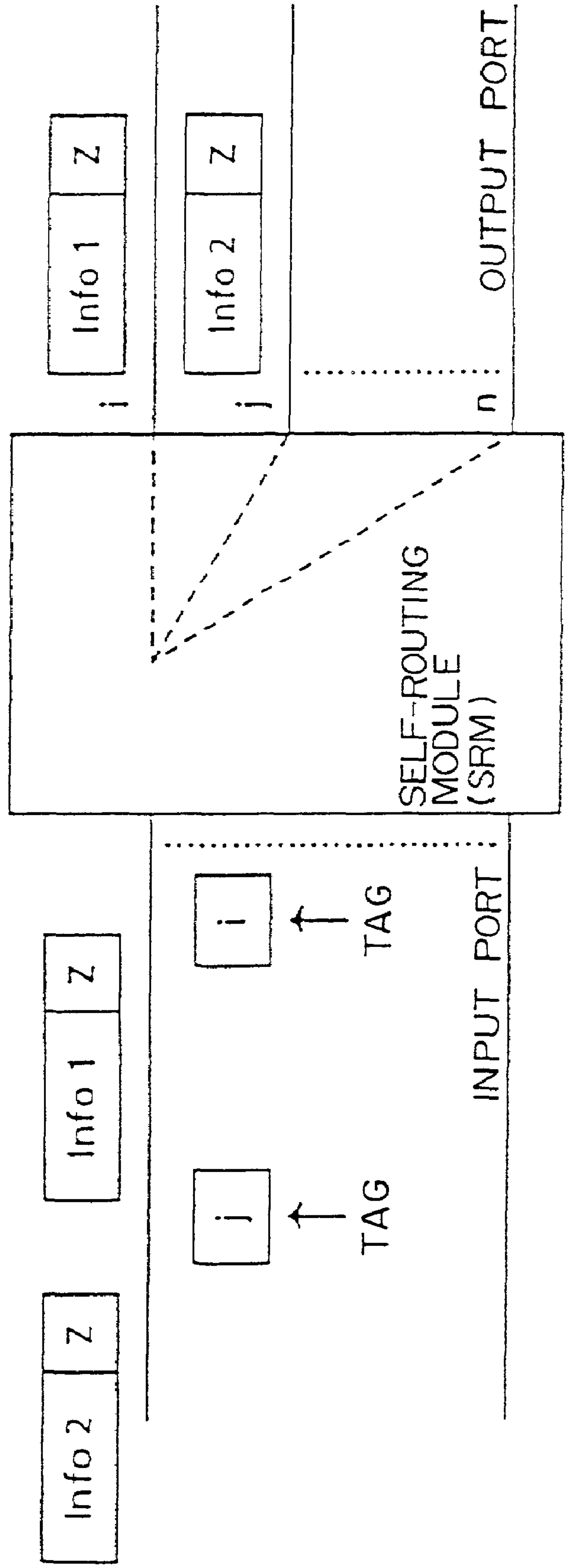
FIG. 17 shows the principle of the SRM.

The ATM switch module (ASM) of a broadband switch is composed of a one-stage or multi-stage self-routing module (SRM). The SRM is composed of an N×N switching matrix with a link speed of 2.5 Gb/s. FIG. 17 shows the principle of the SRM. The ATM cell fed into the SRM is routed to an output port according to the tag attached to each cell.

Figure 18:
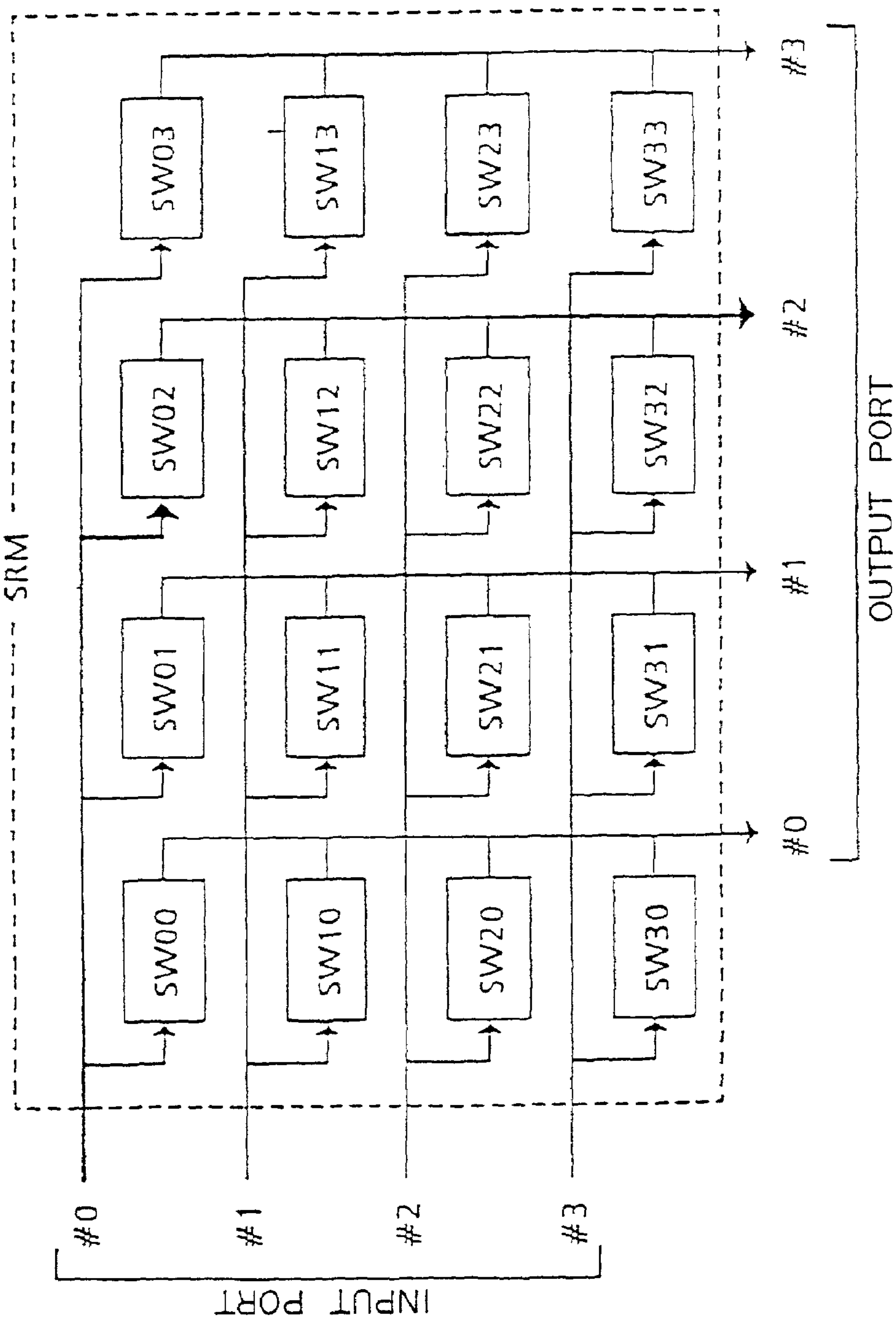
FIG. 18 shows the configuration of the SRM of 4×4 used in the ASSW.

FIG. 18 shows the configuration of a 4×4 SRM used in the ASSW. in the 4×4 SRM, cells are switched between four input ports and four output ports. The SRM is composed of a specially designed Bi-CMOS very large scale integrated circuit (VLSI) which includes the use of a 2×2 switch matrix. Each cross point has 2.5 Gb/s cell switching capability.

The principle of cell switching is explained as follows by referring to an example of cell switching from input HW0 to output HW2.

Each cell is attached with a tag.

Assume that a cell entering from HW0 is attached with a tag 2. Each switching element checks the tag value and switches only the cell with a tag value equal to the output port number (in this example, only SW02). If multiple cells are to be output to one output port, an access control mechanism avoids the conflict of cells by using a buffer in each cross point.

Figure 19:
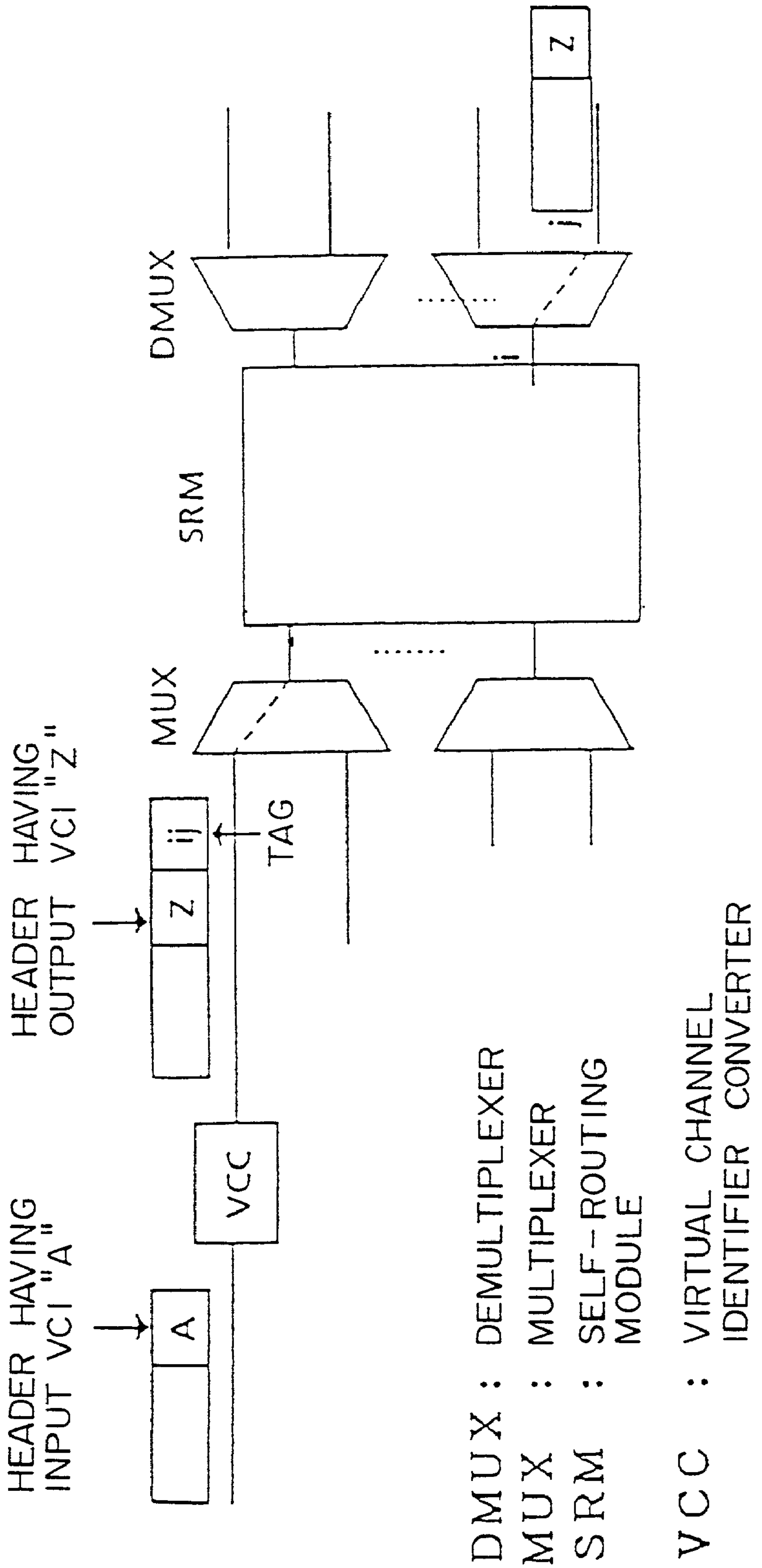
FIG. 19 shows the position of the virtual channel identifier converter (VCC).

FIG. 19 shows the position of a virtual channel identifier converter (VCC). A tag is attached to a cell by the VCC located in a peripheral equipment such as a subscriber/network interface. The VCC specifies a tag value for each cell. Tag values are set according to the software table at the call set up phase of a switched connection, or the set up phase of a semi-permanent connection.

Tag information is also used in a demultiplexer. The tag specifies the output port of the demultiplexer in the ATM switch module and the peripheral equipment.

Figure 20:
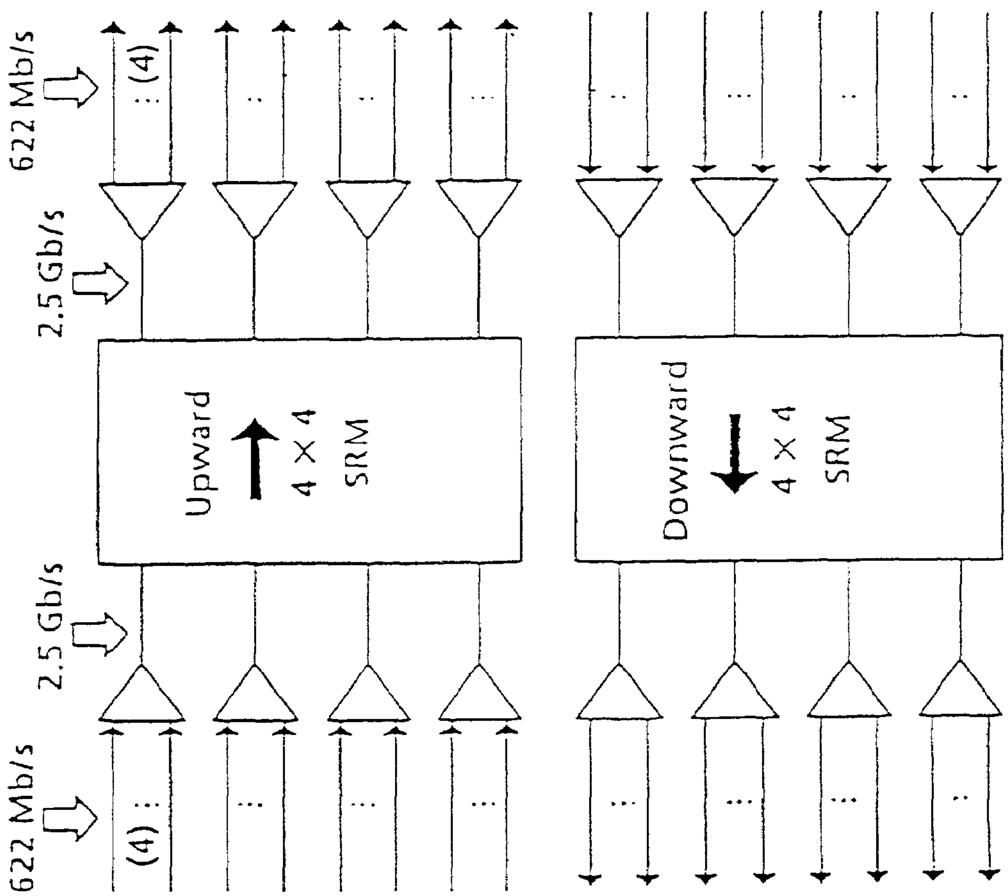
FIG. 20 shows the configuration of the ATM switch module of the ASSW.

FIG. 20 shows the configuration of the ATM switch module of the ASSW. The ATM switch module of ASSW is composed of two separate 4×4 SRMs for upward and downward switching. The interface with peripheral equipment, e.g. subscriber/network interface, broadband signaling controller (BSGC), SMDS message handler (SMDS-MH), etc. is 622 Mb/s. All subscriber/network interfaces are accommodated in one side of the ATM switch module. On the other side of the ATM switch module are the loopback links, which route the intra-ASSW traffic. When the AISW is introduced, the interface with AISW replaces the loopback link.

3.3.2. Subscriber/Network Interface

Figure 21:
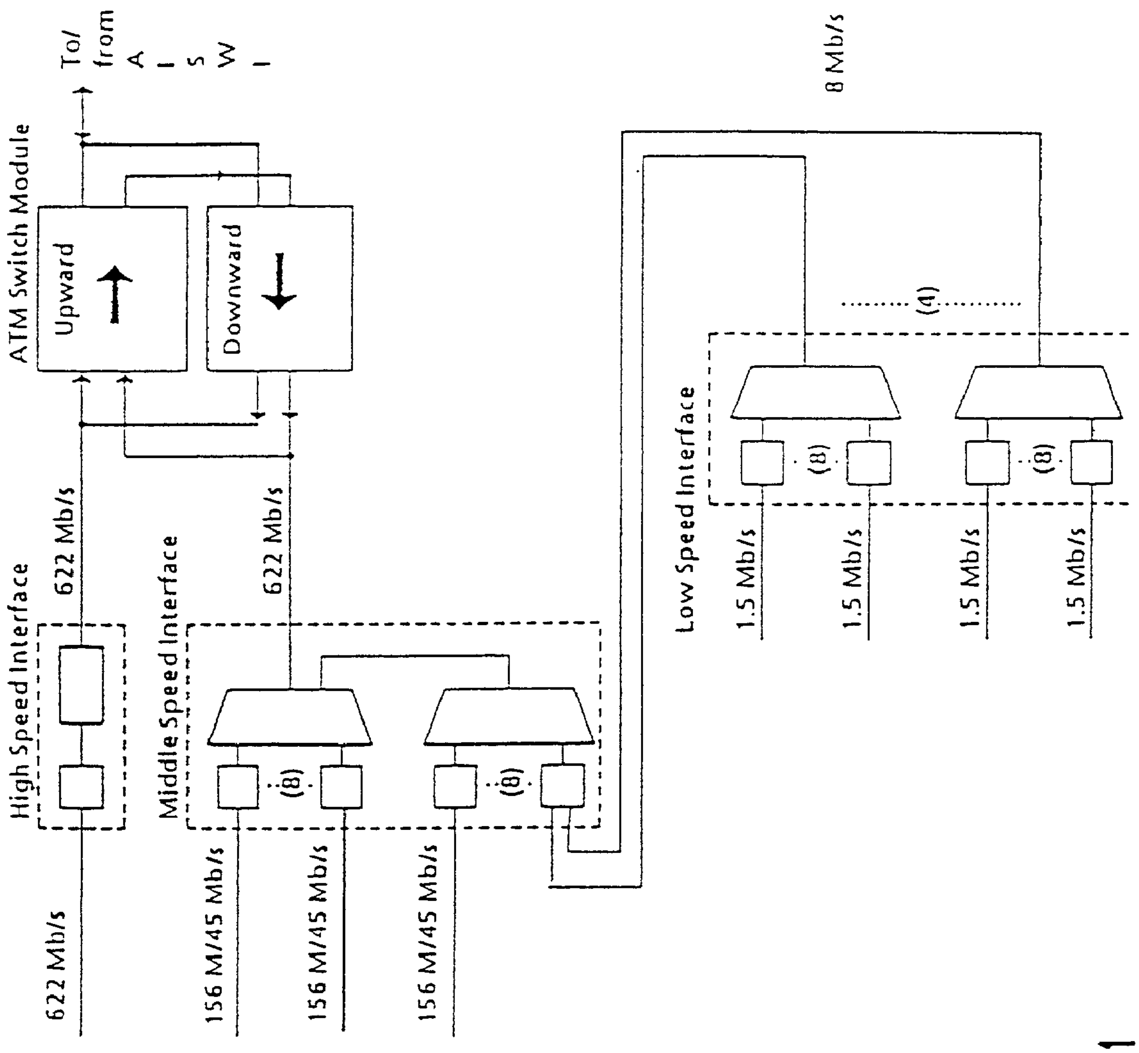
FIG. 21 shows the subscriber interface/network interface according to the present invention.

FIG. 21 shows the configuration of the subscriber interface (SNI) and network interface (ICI/ISSI) of the present embodiment. As shown in FIG. 21, the subscriber/network interfaces are classified depending on the interface speed.

High speed: 622 Mbps optical interface

Middle speed: 156 Mbps optical interface and 45 Mbps metallic interface

Low speed: 1.5 Mbps metallic interface

A different shelf is used for each of the above 3 interfaces. The low speed interface is multiplexed once onto an 8 Mbps link and then accommodated in the middle speed shelf. In the case of a middle speed shelf, up to two shelves can be daisy-chained for traffic congestion. The shelf for subscriber interface and network interface is common, so both interfaces can be accommodated in the same shelf. However, since these shelves perform traffic concentration, separate shelves must be used for subscriber and network interfaces if the subscriber/network interfaces require different grades of services.

The subscriber/network interface is classified into the following four types of services.

B-ISDN (ATM)

SMDS

Frame relay

Circuit emulation

A different interface card is used for each of these services, but the shelf is common for all services. The cards for the subscriber side and the network side are also different except circuit emulation.

3.3.3. Broadband Signaling Controller (BSGC)

Figure 22:
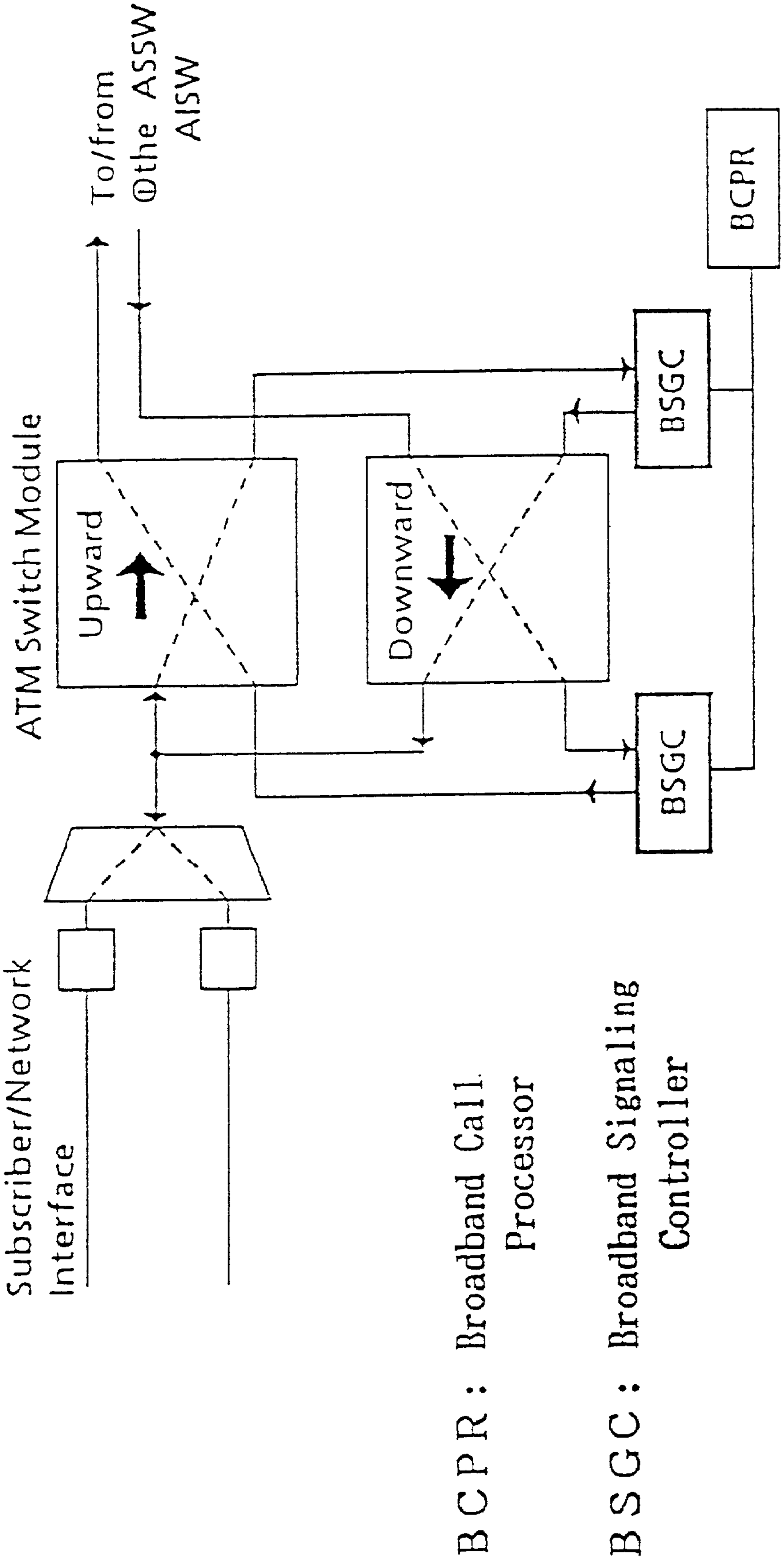
FIG. 22 shows the position of the broadband signaling controller (BSGC) in the ATM switch.

The broadband signaling controller (BSGC) is a high level data link procedure (HDLC) handler with the ATM interface. FIG. 22 shows the position of the BSGC in the ASSW. The BSGC is controlled by a broadband call processor (BCPR) through an interface (INF) and provides a link access procedure D-channel (LAPD) or a CCS7 signaling. The BSGC controls the communications between the BCPR and the broadband remote line concentrator (BRLC), and also controls the internal communications between the BCPR and the SNI interface.

3.3.4. Message Handler (SMDS)

Figure 23:
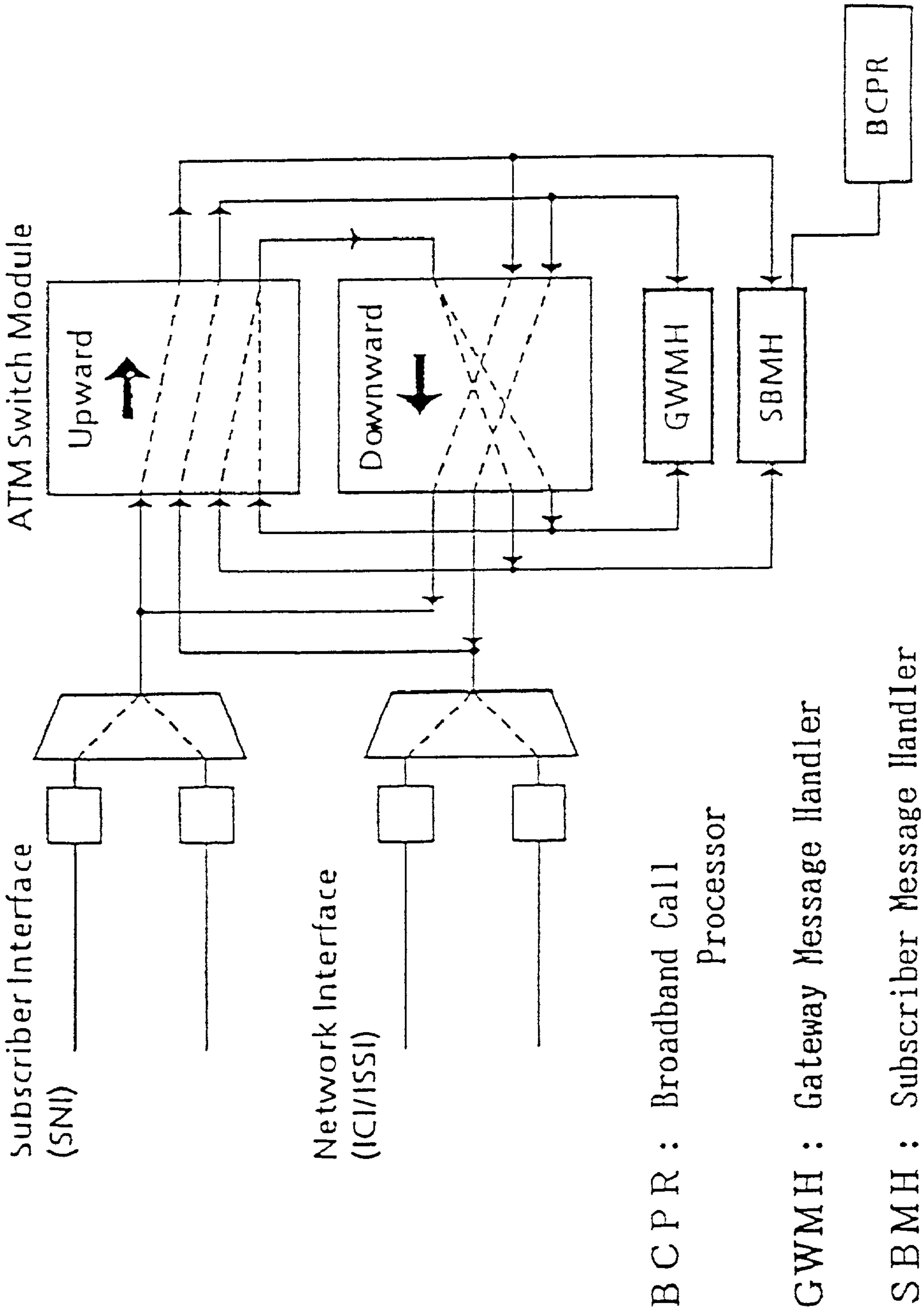
FIG. 23 shows the position of the SMDS message handler in the ATM switch.

The SMDS message handler (SMDS-MH) provides various SMDS-oriented functions such as address screening, message routing, group addressing (point to point communications), illegal message checking, billing, data collection, etc. FIG. 23 shows the position of the SMDS-MH in the ASSW. The following two types of message handlers are used in the present embodiment.

Subscriber message handler (SBMH)

Gateway message handler (GWMH)

The SBMH processes messages for the SNI. The GWMH processes messages for the inter-switch interface of the ICI and ISSI.

3.3.5. Broadband Call Processor (BCPR)

Figure 24:
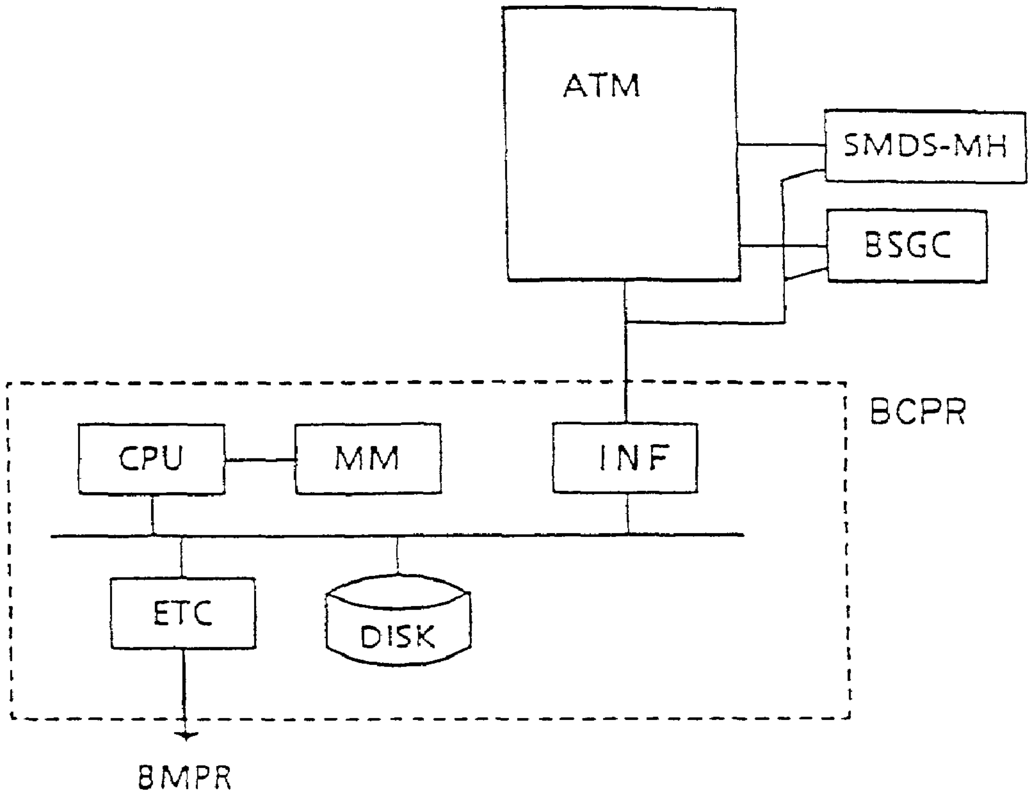
FIG. 24 shows the configuration of the broadband call processor (BCPR).

FIG. 24 shows the configuration of a broadband call processor (BCPR). The BCPR controls calls for all SNIs. The BCPR includes each of the following units.

CPU

Main memory

Ethernet interface

INF

The Ethernet interface is used for communications between the BCPR and the broadband main processor (BMPR). The INF provides an interface between each of various equipments in the ASSW such as the ATM switch module, BSGC, SMDS-MH, etc. and the BCPR.

3.3.6. Maintenance and Operation System (MOS)

A maintenance and operation system (MOS) performs various maintenance and operation tasks. FIG. 25 shows the configuration of the MOS. The MOD includes the following units.

Alarm panel unit

Alarm control unit

Operation and Maintenance processor

In the system with only the broadband switching capability, the MOS is directly connected to the BMPR through the Ethernet interface, and provides operation and maintenance functions in cooperation with the BMPR. In the system with both narrowband and broadband switching capabilities, the MOS is connected to the broadband switching system and narrowband switching system through the optical ring bus and provides operation and maintenance functions in cooperation with the BMPR of the broadband switching system and the MPR of the narrowband switching system.

3.3.7. Operation and Maintenance Processor (OMP)

Figure 26:
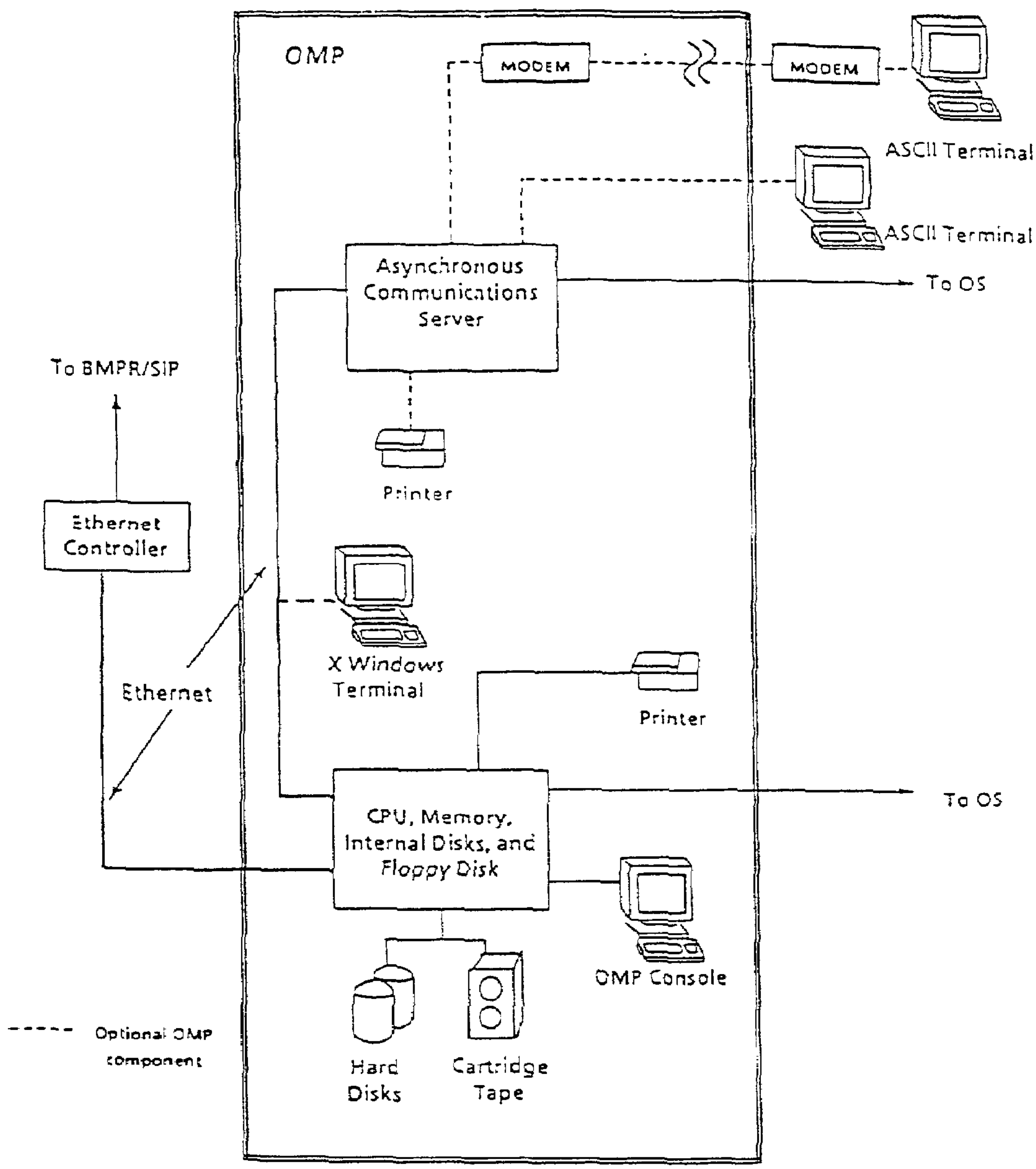
FIG. 26 shows the hardware configuration of the operation and maintenance processor (OMP).

An Operations and maintenance processor (OMP) is a front-end processor according to the present embodiment. In addition to providing system supervision/control and testing of lines and trunks, the OMP connects some of the operations systems (OS) to the present system. The OMP hardware components (refer to FIG. 26) are as follows.

CPU (including memory), disk drives, and a floppy disk drive

CRT display (used as a graphical user interface (GUI)

Keyboard

Mouse

Hard disk

Cartridge tape drive

Asynchronous communications server

Printer

X.25 interface 3.3.8. System Integration Processor (SIP)

A system integration processor (SIP) is used when connecting an operations and maintenance processor (OMP) to an optical ring bus. When connected to the optical ring bus through the SIP, the OMP can be used to maintain different applications (narrowband, broadband, etc.).

3.4. Broadband Remote Line Concentrator (BRLC)

Figure 27:
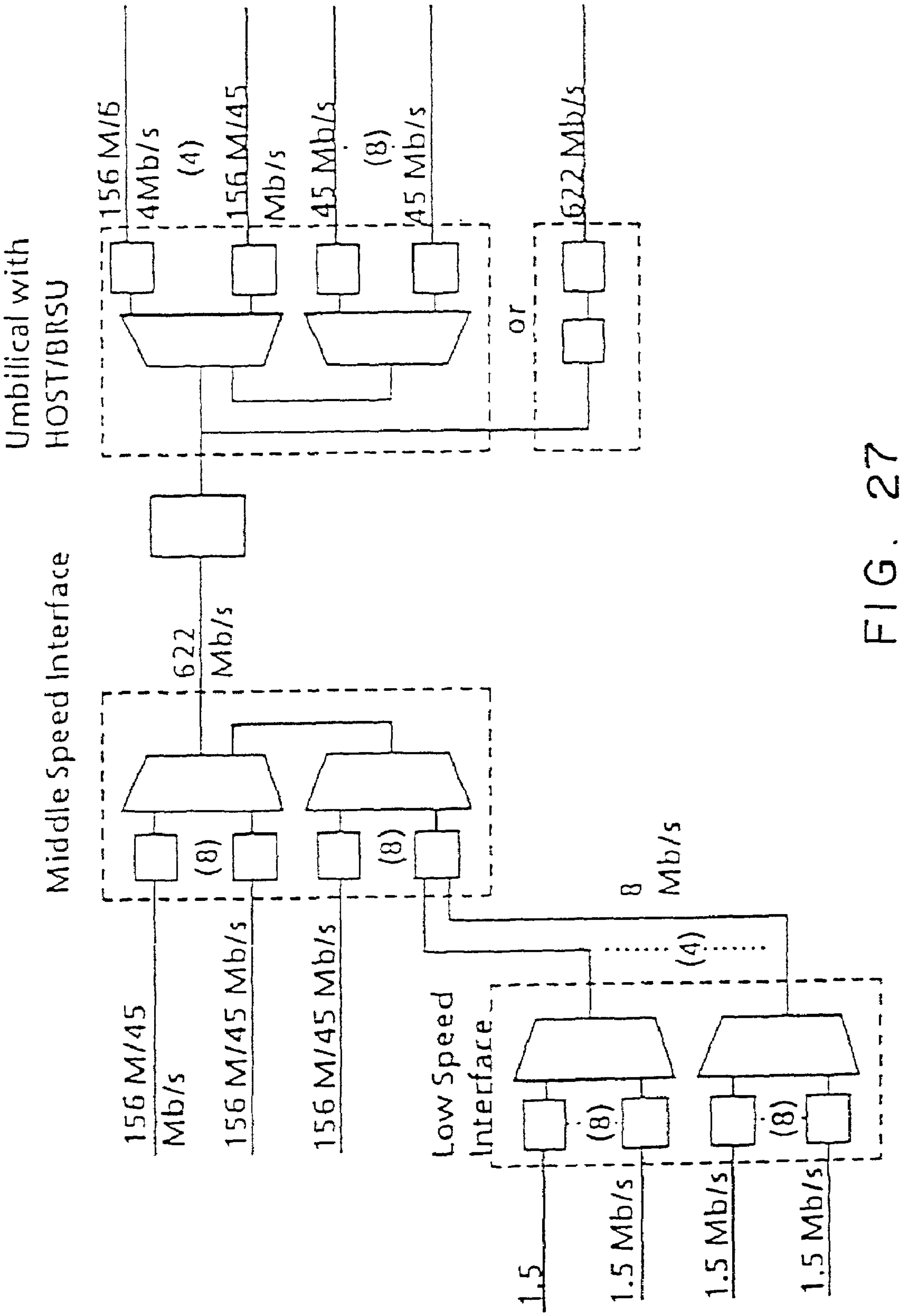
FIG. 27 shows the configuration of the broadband remote concentrator.

FIG. 27 shows the configuration of the broadband remote line concentrator (BRLC). The BRLC is used to provide subscriber interface at a location remote from the host switch The BRLC provides traffic concentration only; local switching is not provided. The network interface consists of the umbilical with host switch. Note that the BRLC does not provide standalone (SA) capability if the umbilical is cut.

3.5. Broadband Remote Switching Unit (BRSU)

Figure 28:
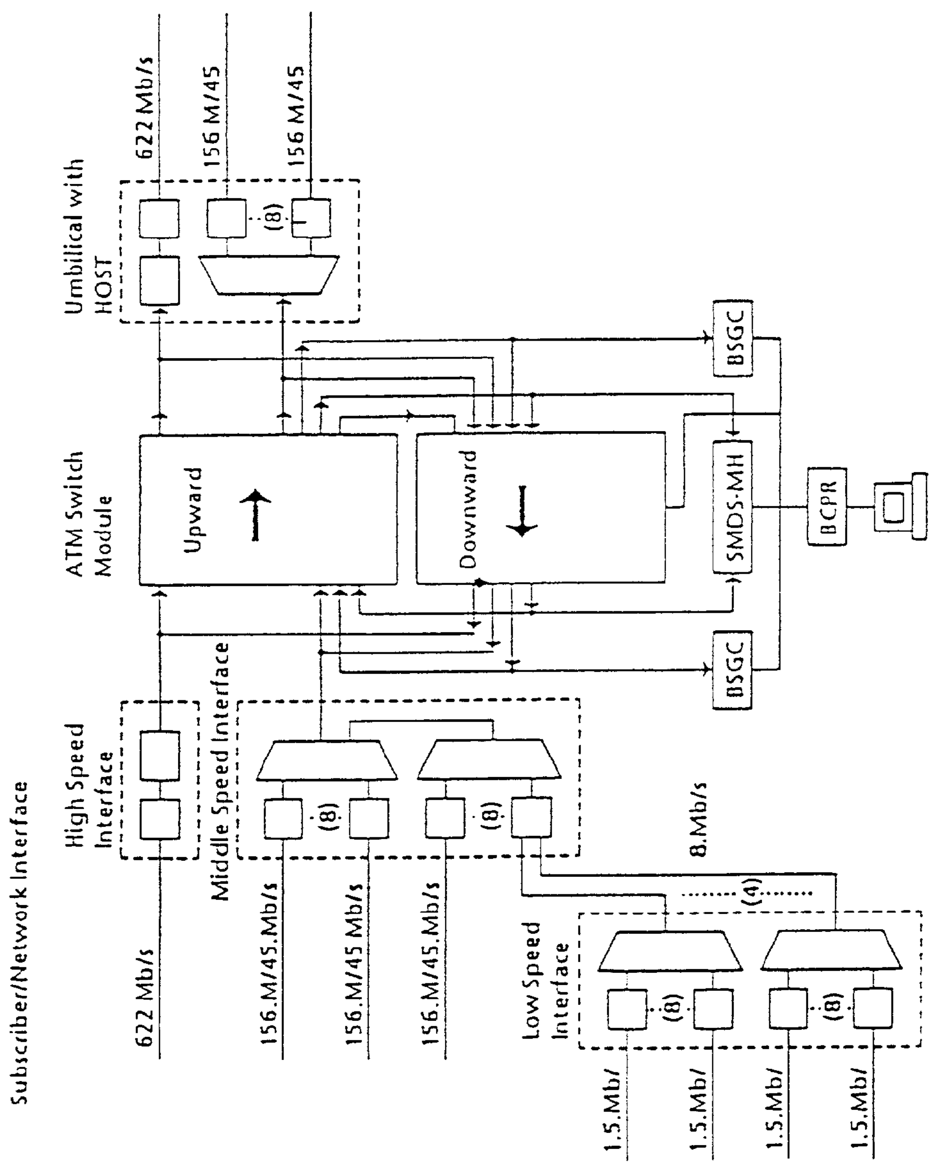
FIG. 28 shows the configuration of the broadband remote switch unit (BRSU).

FIG. 28 shows the configuration of the broadband remote switching unit (BRSU). The BRSU provides the subscriber interface, network interface, and switching functions at a location remote from the host switch. The BRSU can be controlled only from the large size host switch with the ATM interconnection switch (AISW). The operation and maintenance functions are mainly provided by the host switch, but limited functions are also provided locally. The BRSU provides the same subscriber/network interface as the host switch. The umbilical to the host is similar to the BRLC. However, if the umbilical is cut, the BRSU can operate as a standalone unit and continue to provide intra-switching services.

3.6. SMDS Implementation

Figure 29:
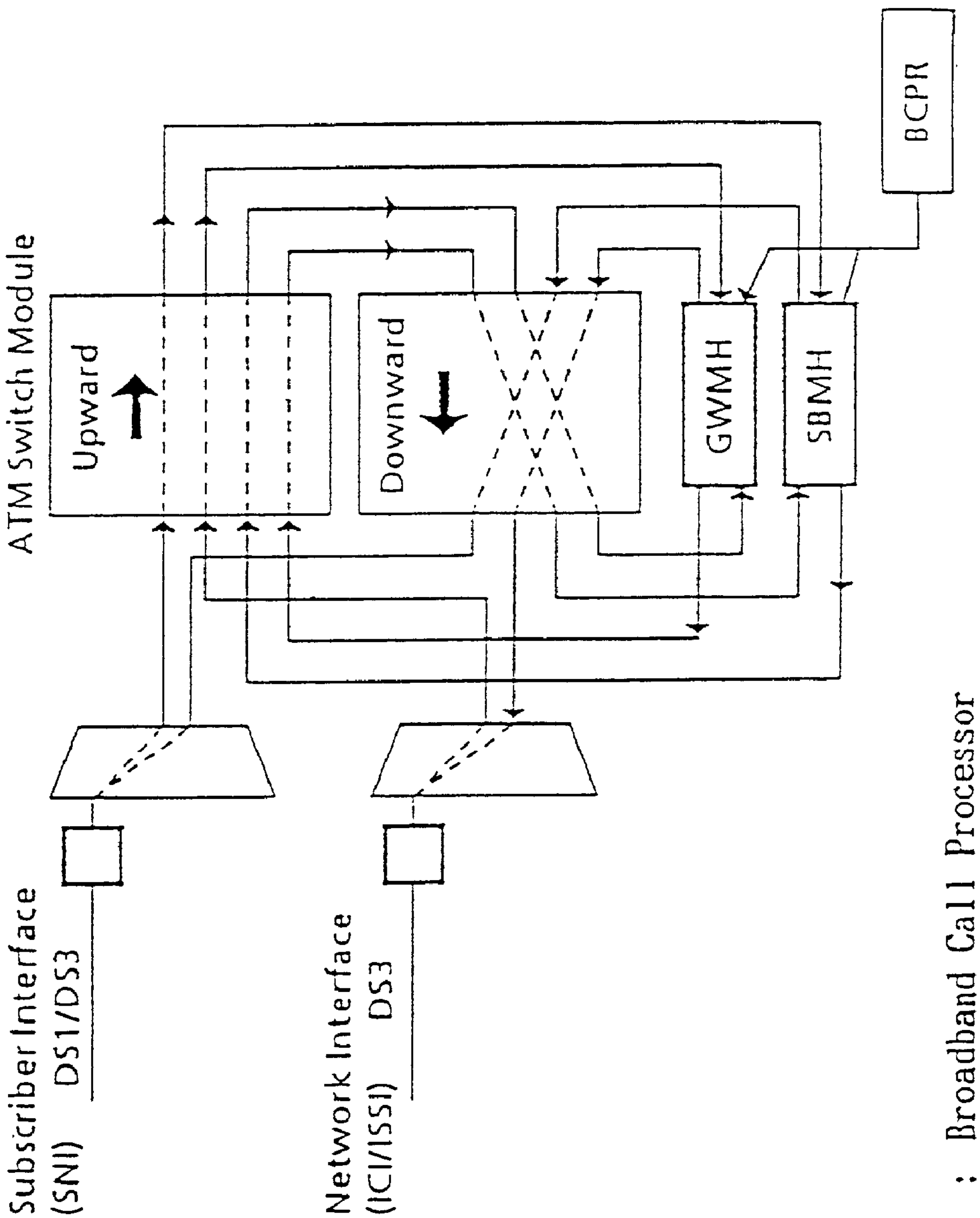
FIG. 29 shows the configuration of the SMDS device.

A switched multi-megabit data service (SMDS) is a connectionless high-speed packet data service. FIG. 29 shows the equipment relating to the SMDS. The SMDS traffic is processed by the DS1/DS3 interface unit and the SMDS message handler unit.

DS1/DS3 Interface Unit

- Termination of level 1 (physical layer) of subscriber interface/network interface
- Termination of ATM layer of SNI level 2
- Performance monitor Message Handler

- Termination of SAR of SNI level 2
- SNI level 3 functions (format check, address screening, routing, flow control)
- Data collection (Network traffic management, network data collection, billing)

The SMDS can be also provided over the B-ISDN (ATM) subscriber interface through the terminal adapter. In this case, the functions of the DS1/DS2 interface are provided by the terminal adapter.

Figure 30:
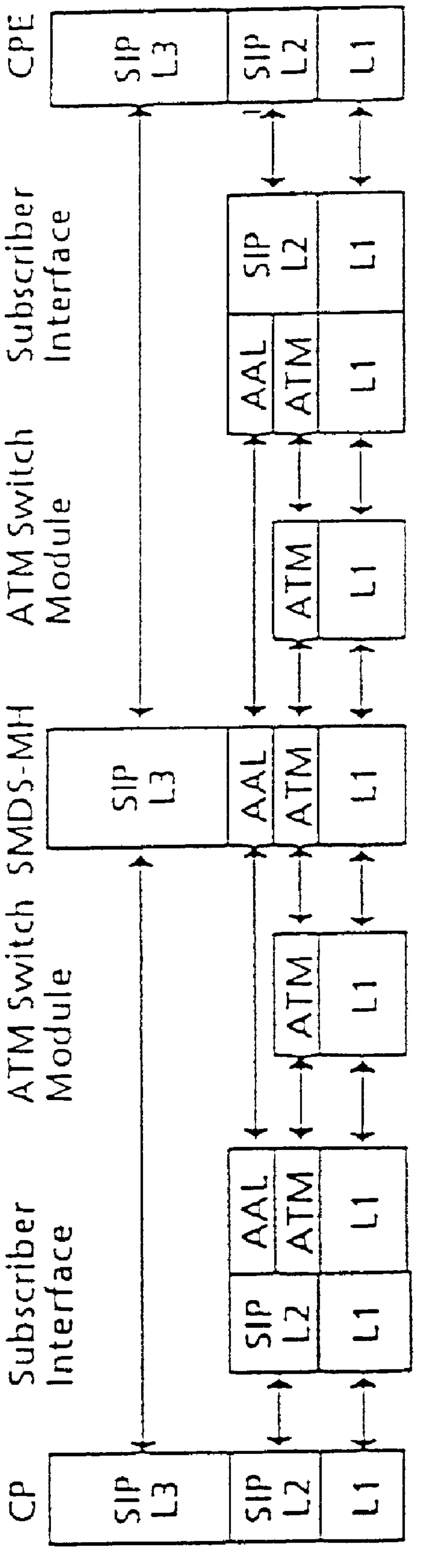
FIG. 30 shows the protocol of the SNI in the layer structure.
Figure 31:
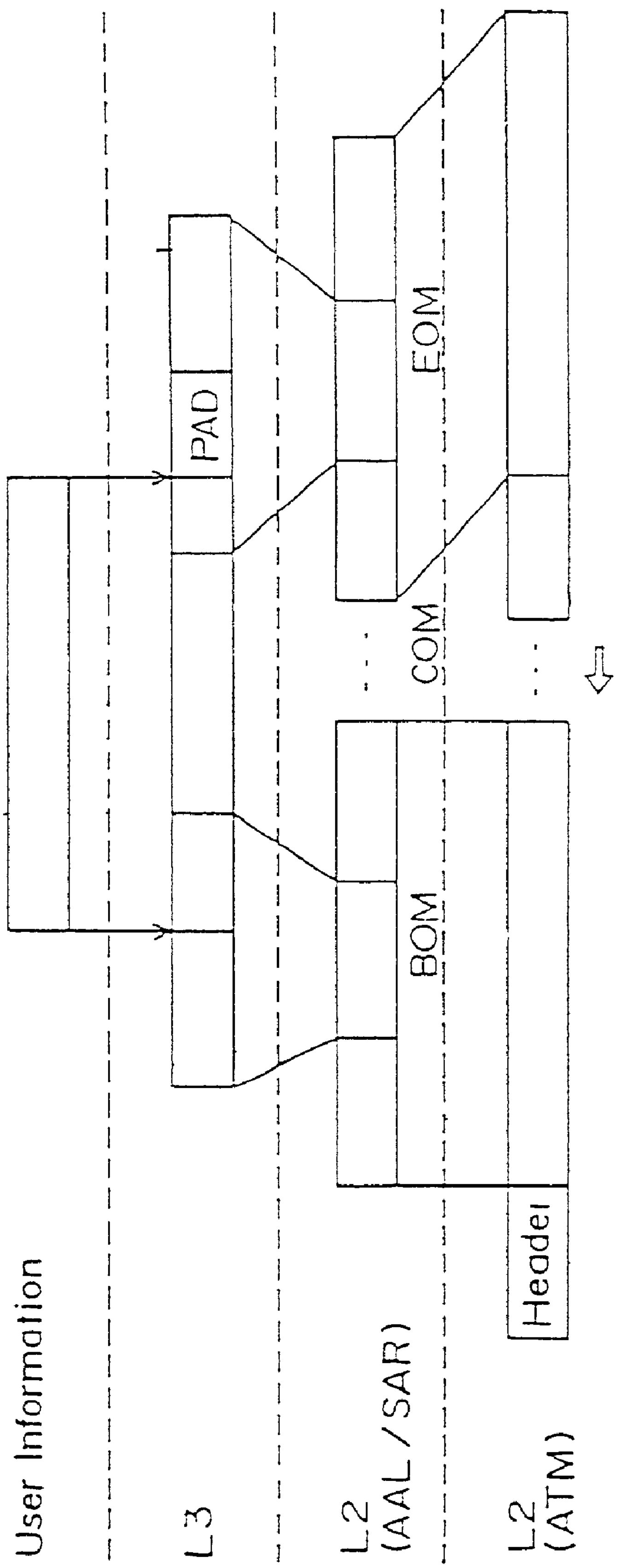
FIG. 31 shows the configuration of the layer applied to the SMDS according to the present embodiment.

FIG. 30 shows the protocol of the layer-structure SNI. The SMDS adopts the layer structure shown in FIG. 31. FIG. 32 shows the routing of cells in an SMDS system.

The flow control is carried out in the following two points.

User parameter control (UPC) in the DS1/DS3 interface unit

Traffic shaping at the gateway message handler (GWMH)

3.7. Traffic Control

Traffic control is realized by the following mechanism.

Call acceptance control

Usage control

Priority in cell routing 3.7.1. Call Acceptance Control

To assure the required quality of a service, such as cell loss and cell delay, the system manages the bandwidth and checks the bandwidth required by each call at the call acceptance stage. The call is processed by peak rate and average rate of the call and the required quality of the service.

The bandwidth in the system is managed for each virtual path at the following three points.

Subscriber interface

Network interface

622 Mbps in the system

The capacity of the above described virtual path is managed in the following two areas.

Band for each call class (W1): band assigned and managed for each call class Common band (W2): band assigned and managed independently of call class The W2 area is used for the calls overflowed from W1 and the calls not covered by the W1.

3.7.2. User Parameter Control (UPC)

The user parameter control (UPC) manages the actual traffic of each call. If cells violating the declared rate are detected, then the system discards them or attaches a violation tag.

The UPC is carried out for a virtual channel (VC), virtual path (VP) or both of them. A For subscriber lines, the UPC is carried out for each VC at the subscriber interface part. For the cells violating the declared value, the following action is taken.

B-ISDN: assigning a tag indicating discard or violation of a declared value

SMDS: discarding

In the network equipment (i.e. interface with another switch or BRSU/BRLC), the UPC is carried out for each VP (or VC) at the network interface part.

3.7.3. Priority for Cell Routing

Priority control of cell routing is carried out in various buffers of the multiplexer/demultiplexer and ATM switch module in the system. The control is realized in one queue using two thresholds as follows.

Threshold for discarding unimportant subscriber's cell

Threshold for discarding cells with CLP (cell loss priority)= 1

3.8. Data Collection

The system according to the present embodiment collects the following data.

Automatic Message Accounting (AMA) data

Performance monitoring data

Network traffic management data

Network data collection (NDC) data

For example, the AMD data is stored in the storage device in the BMPR or SIP and transferred to the OS.

The performance monitoring data is collected at intervals of 15 minutes or 24 hours. The data is stored in the storage device and transferred to the OS through the OMP at a request from the OS.

Network traffic data is used for detection and notification of congestion, and is collected if the congestion level exceeds a predetermined threshold level. It is also collected at predetermined intervals (5-minute intervals) and transmitted to the OS at real time through the OMP.

The NDC data is used for a long-term prediction. The data is stored in the storage unit of the BMPR through the OMP when required by the OS.

4. Others

The following parts 2 through 7 in the general configuration of the above described present embodiment describe in detail the DS3-SMDS interface (DS3), SIFSH, ASSWSH, SBMESH, GWMESH, and BSGCSH. Part 8 describes the configuration and functions particularly related to the present invention. The DS1-SMDS interface (DS1) is similar to the DS3-SMDS interface in basic functions, only different in transmission speed. Therefore, the detail descriptions are omitted here.

<Part 2>

In part 2, the DS3-SMDS is described in detail.

1. General Descriptions

The DS3-SMDS interface is used as a circuit interface in providing SMDS services via a DS3 transmission line. It is also used as an interface in providing an umbilical link by connecting a broadband remote line concentrator (BRLC).

A switched megabit data service (SMDS) is a kind of high-speed connectionless data service, and is to be processed as a service of exchanging data by connecting LANs.

Figure 33:
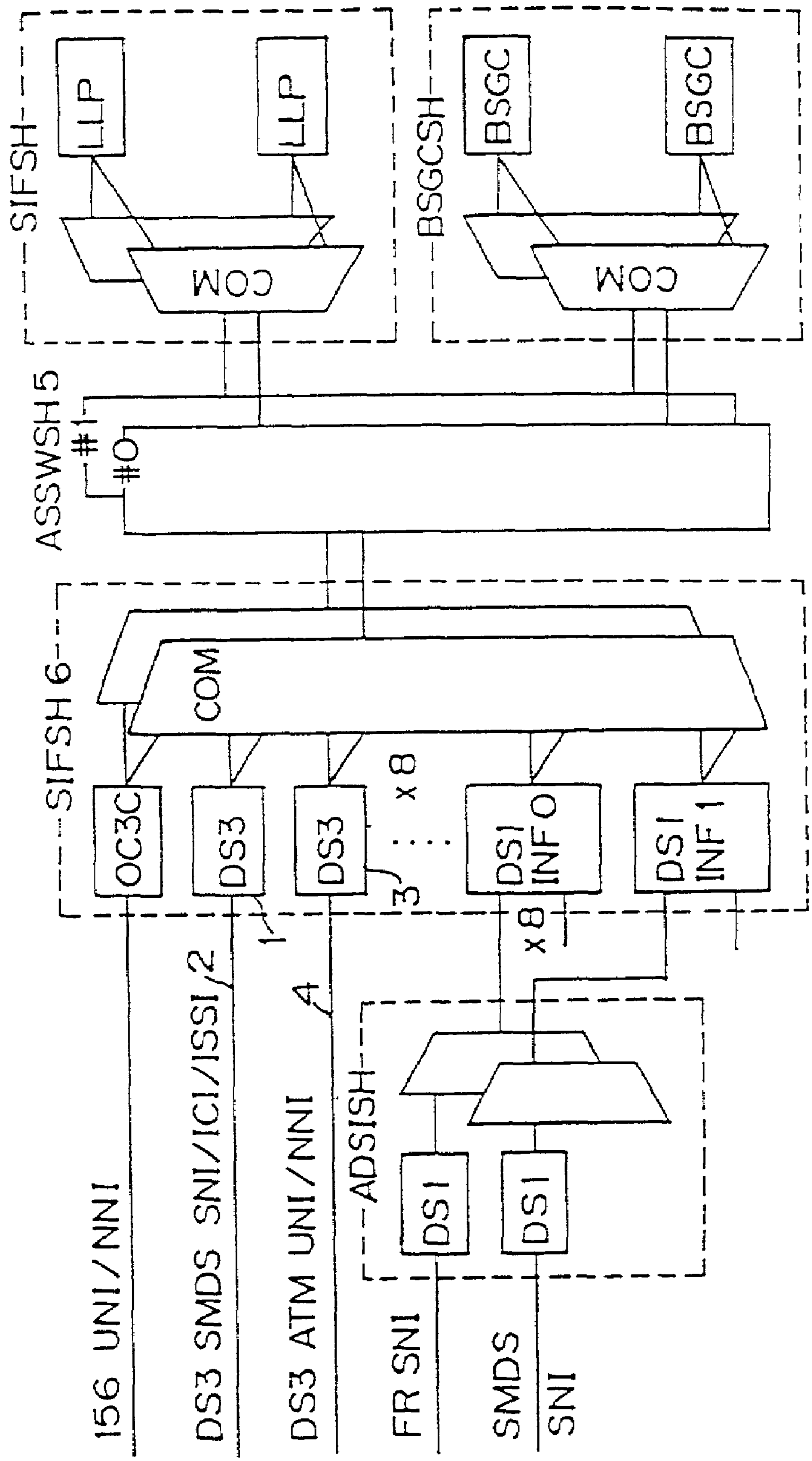
FIG. 33 shows the outline (1) of the system configuration of the DS3-DMDS interface.
Figure 34:
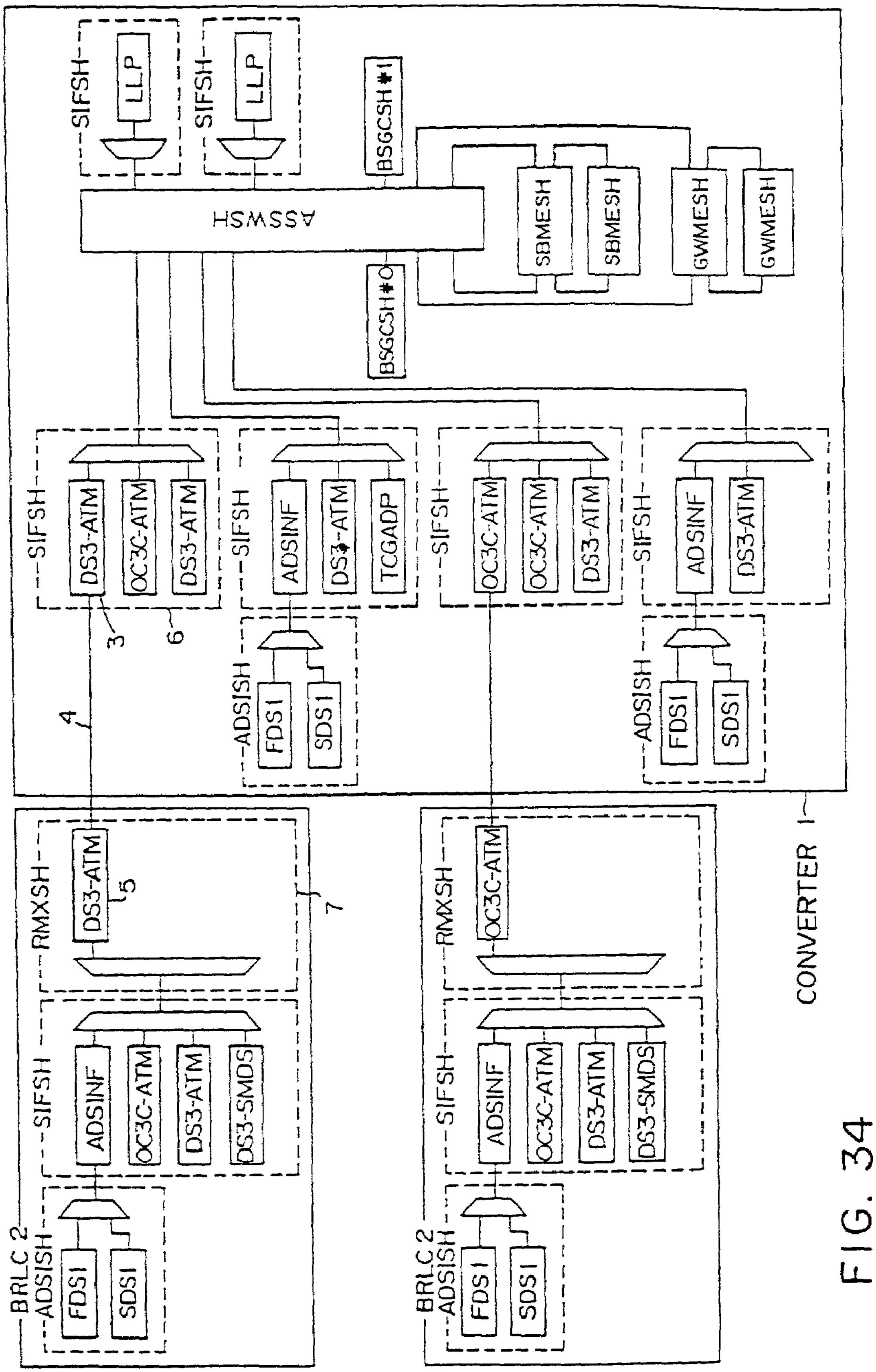
FIG. 34 shows the outline (2) of the system configuration of the DS3-DMDS interface.

FIG. 33 shows an outline of the configuration of the system mainly comprising the DS3-SMDS interface. FIG. 34 shows the configuration in which a BRLC 2 is connected to a switch 1.

DS3-SMDS interfaces 1 and 3 shown in FIG. 33 are loaded to a subscriber interface shelf (SIFSH) 6. The DS3-SMDS interface 3 (described as DS#-ATM in FIG. 34) is loaded to an SIFSH 7 in the switch 1 or a remote multiplexer shelf (RMXSH)-7 in the BRLC 2. When the DS3-SMDS interface is loaded to an SIFSH, it can be loaded for up to 8 links. The SIFSH comprises a SIFSH common unit having a duplex configuration which is an interface with an ATM switch, and a line individual unit having a simplex configuration. The DS3-SMDS interface is loaded to the line individual unit. Up to two SIFSHs are cascade-connected and line concentration is conducted at a ratio of 4 to 1.

In FIG. 33, the DS3-SMDS interface 1 terminates a DS3 layer in a transmission line 2 to provide an SMDS service to receive a frame of the PLCP layer accommodated in the information payload field of the DS3 frame input from the DS3 transmission line 2. The DS3-SMDS interface 1 extracts an L2 protocol data unit (L2-PDU) from the frame of the received PLCP layer. After HCS (HEC)-checking the header of the L2-PDU, it converts 53-octet L2-PDU to 54-octet ATM cell (53/54 octet conversion) to be processed in an ATM switch 5, multiplexes the ATM cell to high-speed upward highways each having a transmission speed of 622 Mbps to transmit it to an ATM switch 3.

By contrast, the DS3-SMDS interface 1 assembles ATM cells demultiplexed from high-speed downward highways extended from the ATM switch 3 into a DS3 frame in the reverse order of the procedure above. Then it transmits the frame to the DS3 transmission line 2.

As shown in FIG. 34, when a broadband remote line concentrator (BRLC) is connected to a DS3 transmission line 4, the DS3-SMDS interface 3 realizes an umbilical link. In this case, the DS3-SMDS interface 3 in the switch 1 is connected to the DS3-DMDS interface 5 in the BRLC 2 through the DS3 transmission line 4 as shown in FIG. 34.

2. Explanation of Line Interface 2.1. DS3 Line Interface 2.1.1. Payload Mapping

Figure 35:
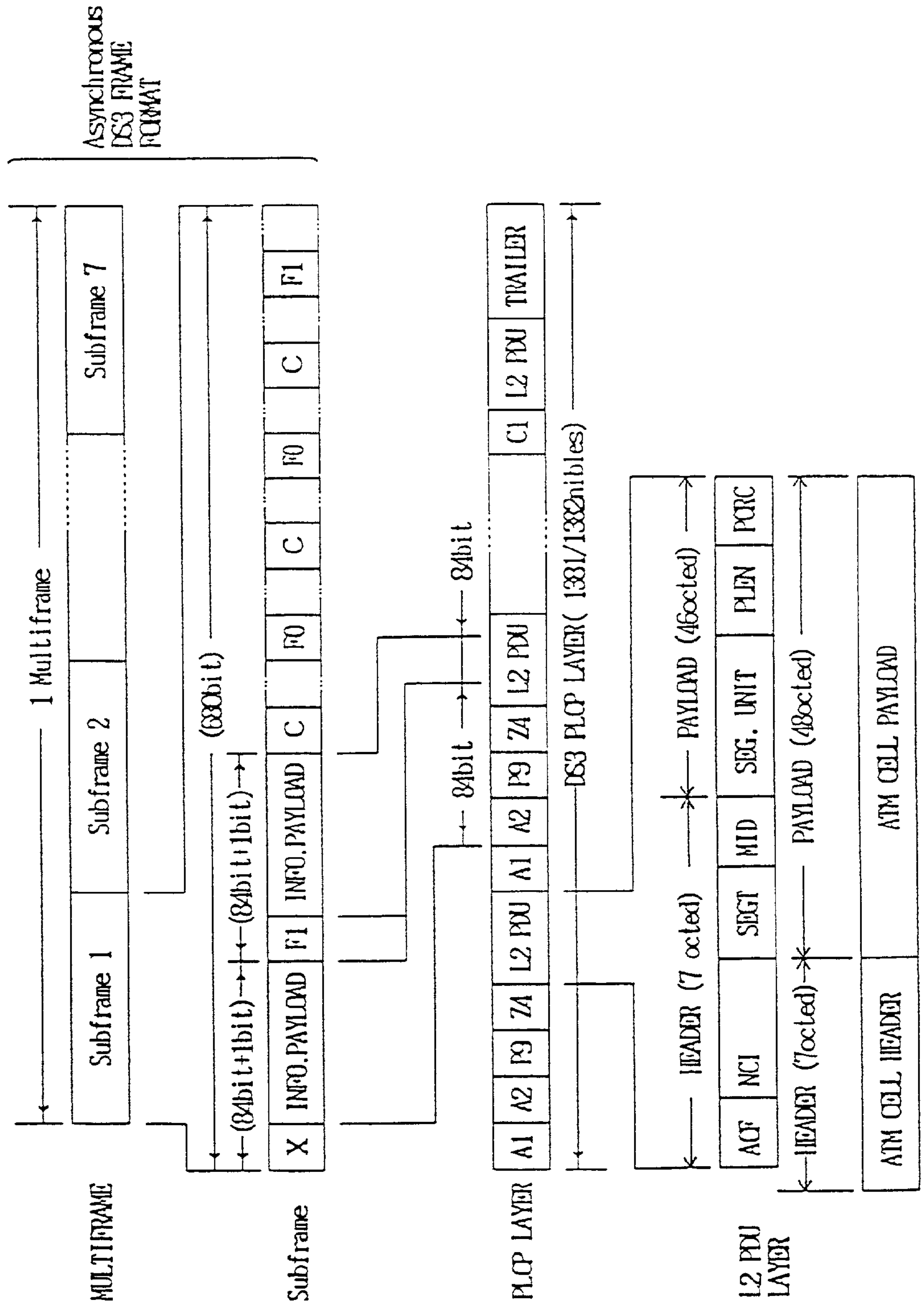
FIG. 35 shows the mapping from the payload of the ATM cell to the DS3 format.

FIG. 35 shows the mapping between the ATM cell in the data format of the ATM switch and the DS3 format of the transmission line in the DS3 line interface.

2.1.2. DS3 Frame Format

In FIG. 33, the DS3-SMDS interface 1 terminates the asynchronous DS3 frame format (F13 format) shown in FIG. 35 as the frame format in the DS3 transmission line 2. FIG. 36 shows the detailed configuration of the frame format.

A multiframe consists of 7 subframes. A subframe consists of eight 85-bit blocks. In the 85-bit block, the first 1 bit is a DS3 overhead unit and the remaining 84 bits form an information payload field (INFO.PAYLOAD).

In the DS3 line interface, one multiframe is transmitted at a bit rate of 44.736 MHz on a cycle of 106.4 μsec (microsecond).

3. PLCP Frame Format 3.1. DS3 PLCP Frame format

FIG. 37 shows the format of the DS3 PLCP frame of the PLCP layer shown in FIG. 35. The DS3 PLCP frame is transmitted using the information payload (INFO.PAYLOAD) in the subframe in the asynchronous DS3 frame format shown in FIG. 35. In this case, each octet in the frame is sequentially transmitted in 4-bit nibble units. The head of the multiframe or subframe in the DS3 frame format shown in FIG. 35 does not have to synchronize with the head of the DS3 PLCP frame.

4. DS3-SMDS Interface L2-PDU Format 4.1. DS3-SMDS L2-PDU Format

Figure 38:
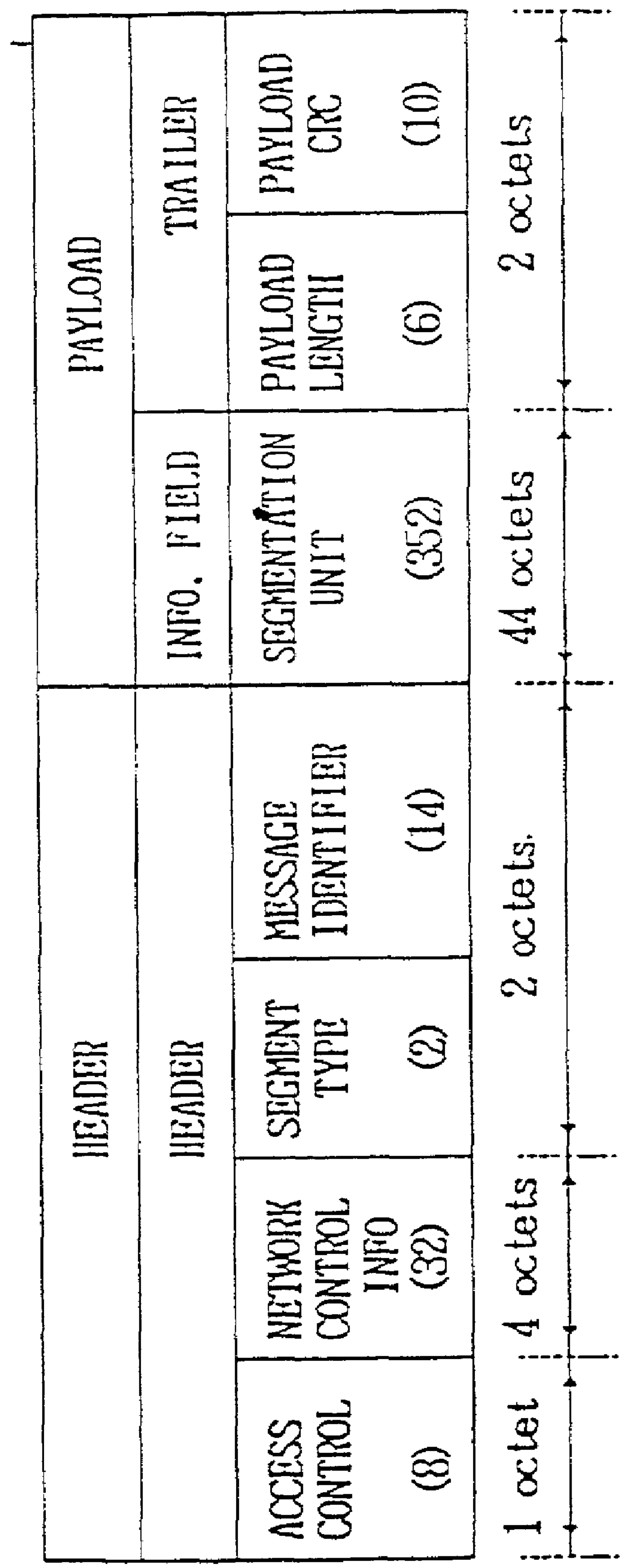
FIG. 38 shows the format of the DS3-SMDS L2-PDU.

FIG. 38 shows the format of the DS3-SMDS L2 protocol data unit (L2-PDU) inserted in the PLCP frame shown in FIG. 35 or 37. As shown in FIG. 38 or 35, the DS3-SMDS L2-PDU consists of a 7-octet header, a 44-octet information field (INFO.FIELD), and a 2-octet trailer field (TRAILER).

Figure 39:
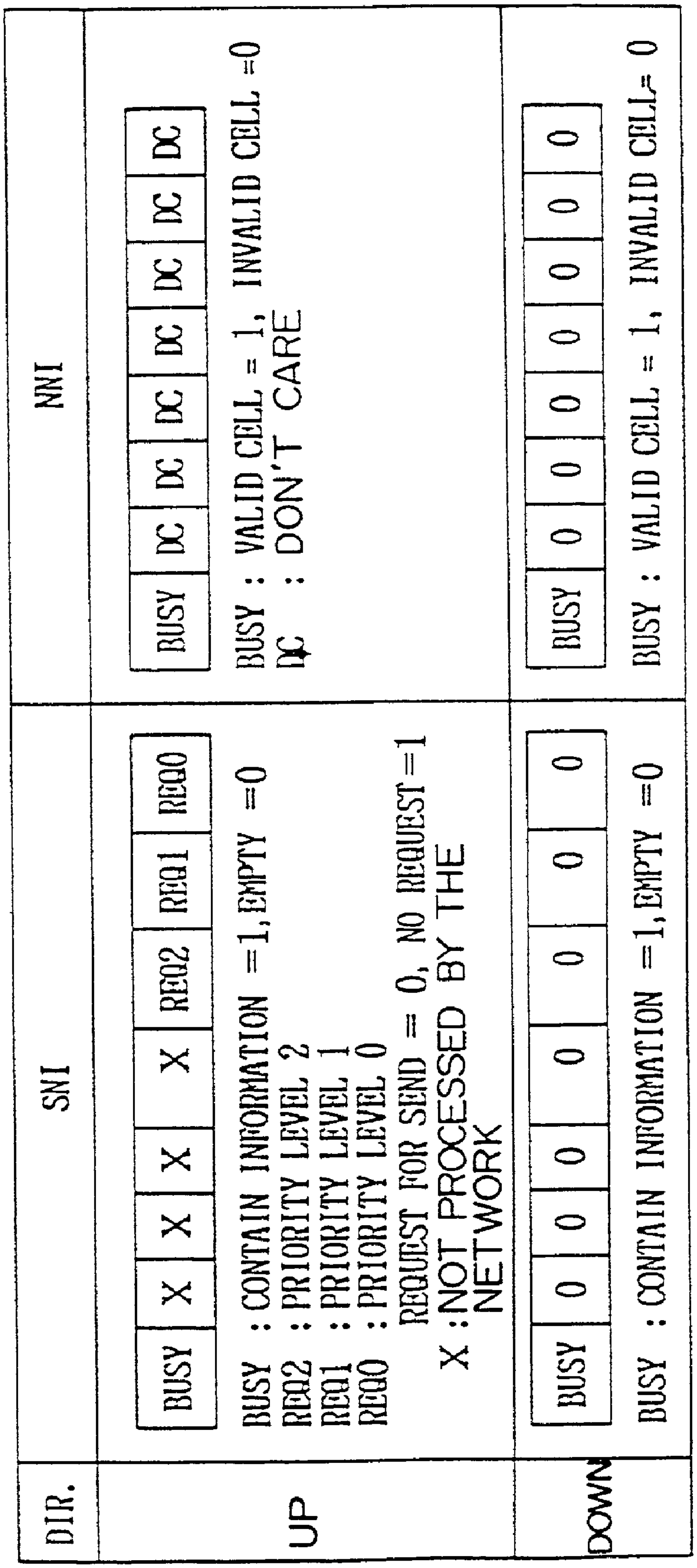
FIG. 39 shows the contents of the access control field.

An access control field (Access Control or ACF shown in FIG. 35) in the header (HEADER) shown in FIG. 38 is used in detecting a transmission state of the L2-PDU in the transmission line terminating the DS3-SMDS interface. FIG. 39 shows the contents of the access control fields in each of the upward and downward transmission lines in each of the cases when the transmission line in which the DS3-SMDS interface terminates is a subscriber/network interface (SNI), for example, the transmission line 2 shown in FIG. 33 and when it is a network node interface (NNI), for example, the transmission line 4 shown in FIG. 33.

In FIG. 39, if the transmission line in which the DS3-SMDS interface terminates is an SNI, then a BUSY bit indicates whether or not the L2-PDU containing the bit carries information. If the transmission line terminating the DS3-SMDS interface is an SNI and the transmission line is an upward transmission line (entering the ATM switch), then each bit of RQ0, REQ1, and REQ2 indicates a priority level. If the transmission line terminating the DS3-SMDS interface is an NNI, then the BUSY bit indicates whether or not the L2-PDU containing the bit is valid.

4.2. Network Control Information

The network control information field (NETWORK CONTROL INFO or NCI shown in FIG. 35) in the header field shown in FIG. 38 is 32-bit data and consists of a 2-bit PT, a 2-bit SP, and an 8-bit HCS as shown in FIG. 40. As shown in FIG. 40, a virtual channel identifier (VCI) is all 1 if the L2-PDU contains information, and all 0 if the L2-PDU contains no information. A payload type (PT) and a segment priority (SP) are to be used in the future in the subscriber network interface (DS3-SMDS SNI), and both contain 00 at present.

A header check sequence (HCS) is a value obtained by the calculation performed by the generative polynomial $G(x)=X^8+X^2+X+1$ for the 3-octet data field consisting of the VCI, PT, and SP in the network control information field. Using the calculated value, the network control information field is checked for errors. The three octets consisting of the VCI, PT, and SP have two types of fixed values as shown in FIG. 40. Accordingly, the HCS contains 001000010 if the L2-PDU contains information, and otherwise 00000000.

4.3. Segment Type

FIG. 41 shows the combination of the segment types (SEGMENT TYPE, or SEGT shown in FIG. 35) in the header field shown in FIG. 38. The segment type indicates a 2-bit value 00, 01, 10, or 11 depending on the type of the L2-PDU among COM (CONTINUATION MESSAGE), EOM (END OF MESSAGE), BOM (BEGINNING OF MESSAGE), and SSM (SINGLE SEGMENT MESSAGE).

4.4. Message Identifier

The message identifier (MESSAGE IDENTIFIER or MID shown in FIG. 35) in the header field shown in FIG. 38 refers to data related to the L3-PDU, and is described later.

4.5. Segmentation Unit

In FIG. 38, the segmentation unit (SEGMENTATION UNIT or SEG.UNIT shown in FIG. 35), which is an information field (INFO.FIELD) stores an L3 protocol data unit (L3-PDU) in the SMDS service (refer to FIG. 42 described later).

4.6. Payload Length

The payload length (PAYLOAD LENGTH, or PLEN shown in FIG. 35) stores the length of valid data contained in the segmentation unit. If the L2-PDU is a BOM or COM, then PAYLOAD LENGTH=44. If the L2-PDU is an EOM or SSM, then PAYLOAD LENGTGH<44. If the L2-PDU does not contain information, then PAYLOAD LENGTH=00.

4.7. Payload CRC

The payload CRC (PAYLOAD CRC or PCRC shown in FIG. 35) shown in FIG. 38 is a value calculated by the generative polynomial $G(x)=X^{10}+X^9+X^5+X^4+X+1$ for the 48-octet data field consisting of SEGMENT TYPE, MESSAGE IDENTIFIER, SEGMENTATION UNIT, PAYLOAD LENGTH, and PAYLOAD CRC shown in FIG. 5. Using the value, the 48-octet data field is checked for errors. If the L2-PDU contains no information, then PAYLOAD CRC=00.

5. Relationship between L2-PDU and ATM Cell

The DS3-SMDS interface 1 shown in FIG. 33 HCS (HEC)-checks the header of the L2-PDU input from the transmission line 2, and converts the 53-octet L2-PDU into the 54-octet ATM cell to be processed in the ATM switch 5 as described in 4.2. In this case, the segment type (SEGT) and message identifier (MID) in the header field of the L2-PDU, and the segmentation unit (SEG.UNIT), payload length (PLEN), and payload CRC (PCRC) in the payload field of the L2-PDU are stored in the payload field of the ATM cell (ATM CELL PAYLOAD) as shown in FIG. 35. The VCI indicating 1 for all bits (20 bits) in the network control information field (NCI) in the header of the L2-PDU is converted into the values VPI=3F, and VCI=03FF defined as the interface between the DS3-SMDS interface and the SIFSH Common. The VPI/VCI are added to the header field of the ATM cell.

As described above, the DS3-SMDS interface shown in FIG. 33 converts data between the DS3 format in the transmission line 1 and the ATM cell format to be processed in the common process (COM) shown in SIFTH 6. In this case, the L3 protocol data unit (L3-PDU) transmitting user data in the SMDS service is stored in the segmentation unit in the L2-PDU payload field to be transmitted in both formats.

Figure 42:
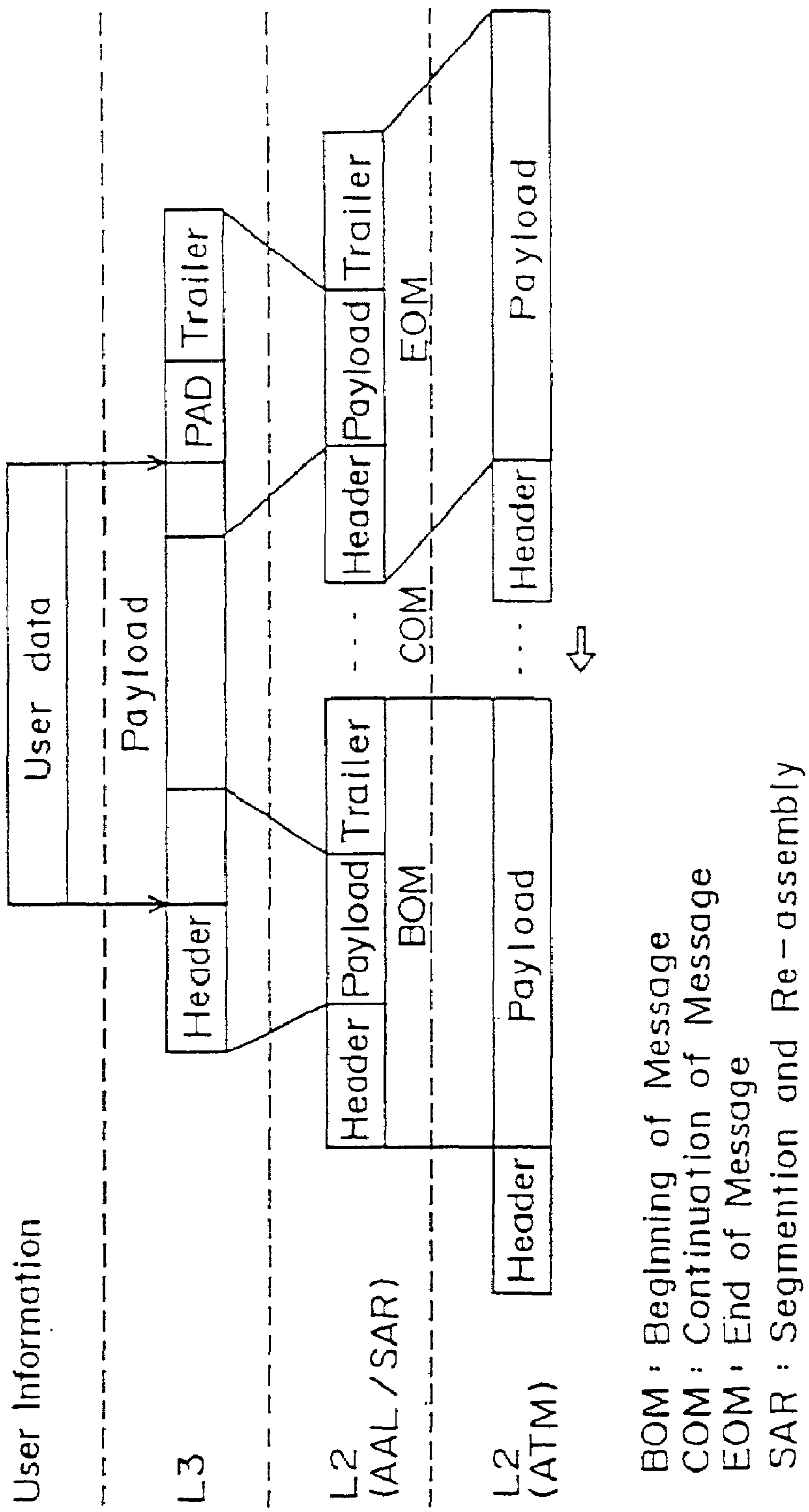
FIG. 42 shows the hierarchy of the layers in the SMDS service.

That is, as shown in FIG. 42, communication data (user data) is stored in the L3-PDU payload field defined in the SMDS service in the transmitting user terminal unit which communicates through the DS3 transmission line. Then, in the transmitting user terminal unit, the L3-PDU is divided into one or more 44-octet segments. Then, produced are one or more L2-PDUs each containing the segmentation unit in each payload field containing one or more segments. In this case, one or more L2-PDUs generated by one L3-PDU are assigned identifiers (shown in FIGS. 35 and 38) which are called an MID (message identifier or multiplexing identification) and have the same value. This information is required when a subscriber message handler shelf (SBMESH) shown in FIG. 8 which provides SMDS services and is described later does not recognize the L3-PDU, but recognizes on real time only the header field of the L2-PDU to process SMDS data. The user can simultaneously use 16 different MID values in a single subscriber network interface (SNI). That is, the user can simultaneously communicate 16 different SMDS messages in a single SNI. Then, in the transmitting user terminal unit, the L2-PDUs are assembled into PLCP frames, into subframes of DS3 frames, and finally into multiframes of DS3 frames (refer to FIG. 35). Thus, the DS3 frames assembled in the transmitting user terminal unit are transmitted to the DS3 transmission line. Then, the DS3-SMDS interface extracts the PLCP frame from the DS3 frame as described above, extracts the L2-PDU from the PLCP, converts the L2-PDU into an ATM cell, and transmits the cell to the SIFSH common. Thus, the DS3-SMDS interface need not recognize the L3-PDU in the SMDS services.

When specifying the permanent virtual circuit (PVC) between the SIFSH common and the SBMESH (shown in FIG. 8) based on the values VPI=3F and VCI=03FF added by the DS3-SMDS interface, the SIFSH common replaces the value VPI/VCI added to the header field of the ATM cell containing the L2-PDU of the SMDS service in the payload field input by the DS3-SMDS interface with the value VPI/VCI specifying the SNI which is a DS3 transmission line terminating the DS3-SMDS interface which transmitted the ATM cell. Therefore, the PVC between the SIFSH common and the SBMESH is assigned the value VPI/VCI of the number corresponding to the number of the SNIs terminated by the individual unit such as the DS3-SMDS interface connected to the SIFSH common and used in the SMDS service. The SIFSH common adds a tag to the head of the ATM cell. The tag indicates the transfer of the ATM cell to the SBMESH after being autonomously switched in the ATM switch.

The SBMESH (described later and shown in FIG. 8) which is connected to the ATM switch (ASSWSH) and provides SMDS services receives, among the ATM cells to be input through the ATM switch, the ATM cell assigned at the header field a specific VPI/VCI value for the PVC used in the SMDS service. It processes the L2-PDU stored in the payload field of the ATM cell. The ATM cell has a protocol hierarchy of ATM layers in layer 2 (L2), and the L2-PDU has the protocol hierarchy of segmentation and reassembly sublayers (SAR) in the ATM adaptation layer (AAL) of layer 2 (L2). In this case, the SBMESH has a protocol hierarchy of layer 3 (L3) as described later in part 5, etc. It does not recognize the L3-PDU (shown in FIG. 42) which user data in the SMDS service is actually stored and transmitted, but recognizes on real time only the header field of the ATM cell and the header field of the L2-PDU to process SMDS data. Practically, the SBMESH processes as the data related to the same L3-PDU the L2-PDUs having the same SNI determined according to the VPI/VCIs assigned to the headers of the ATM cells and having the same value of MID assigned to the header field of the L2-PDUs. As a result, the SMDS services can be provided as connectionless services without disturbing the real time operations specific to the ATM system.

In a receiving user terminal unit communicating via the DS3 transmission line, a PLCP frame is extracted from the DS3 frame received from the DS3 transmission line, and the L2-PDU is extracted from the PLCP frame. Then, the contents of the segmentation unit in the payload field of the L2-PDU are extracted, and assembled into the L3-PDU according to the MID added to the header field of the L2-PDU. Finally, extracted is the communication data (user data) from the payload field of the L3-PDU.

6. DS3 Umbilical Link Format

As shown in FIG. 34, is the broadband remote line concentrator (BRLC) is connected to the DS3 transmission line 4, then the DS3-SMDS interface 3 realizes an umbilical link.

Figure 43:
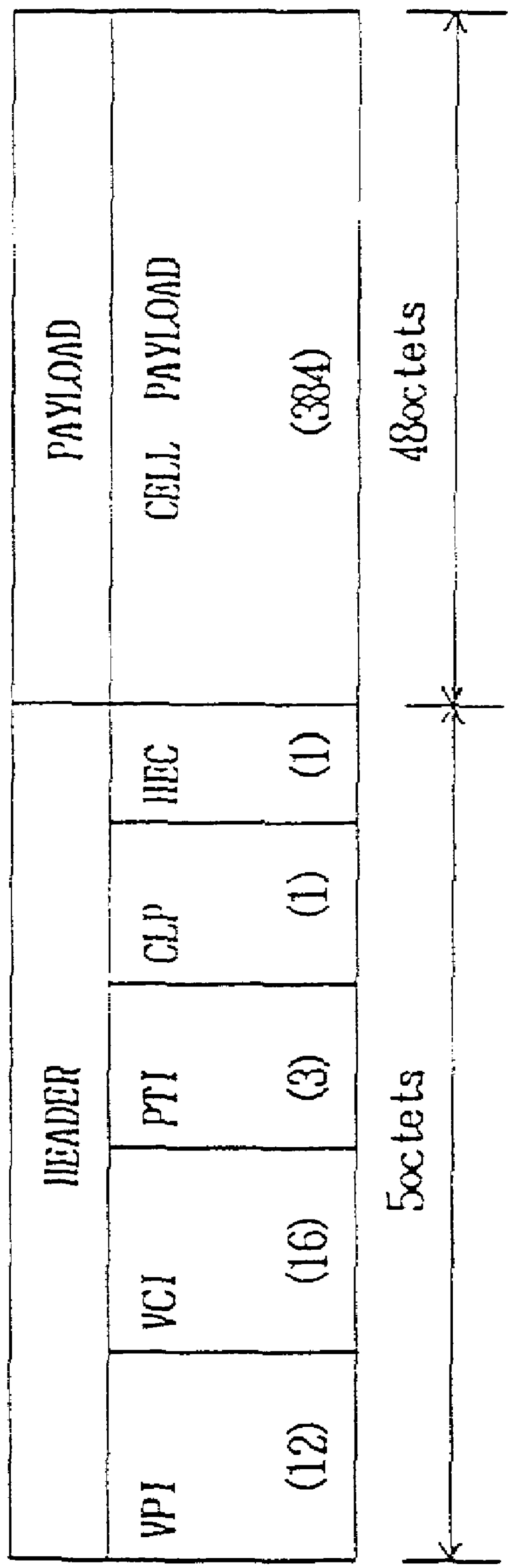
FIG. 43 shows the format of the DS3 umbilical link.

In this case, the data in the transmission line 4 is transmitted in the 53-octet data format as shown in FIG. 43. That is, the data in the transmission line 4 is transmitted as normal ATM cells.

As shown in FIG. 43, a header field (HEADER) contains 5-octet data consisting of a virtual pass identifier (VPI), a virtual channel identifier (VCI), a payload type (PTI), a cell loss priority (CLP), and a header error check (HED).

The header error check (HEC) field contains a value calculated by the generative polynomial $G(x)=X^8+X^2+X+1$ for the header field. Using the value, the header field is checked for errors.

If the result of the check outputs no error, then it is determined whether or not the values of the VIP and VCI are all 0 as shown in FIG. 44 to determine whether the ATM cell to be processed is an unassigned cell or an assigned cell.

If a 1-bit error is detected as a result of the error check, it is corrected. If an error of two or more bits is detected, then the error is not corrected but is detected only.

The DS3-SMDS interface 3 converts the 53-octet ATM cell received from the transmission line 4 into a 54-octet ATM cell to be processed in the ATM switch by removing the 1-octet HEC in the header field and adding a 2-octet tag to the header.

In this case, the L2-PDU in the SMDS service is stored in the payload field (PAYLOAD) in the ATM cell shown in FIG. 43.

7. Hardware Configuration 7.1. General Descriptions

The thus explained DS3-SMDS functions are realized by the DS3-SMDS interfaces 1 and 3 shown in FIG. 33 and the subscriber message handler shelf (SBMESH) and the gateway message handler shelf (GWMESH) shown in FIG. 8.

The functions of each of the units are as follows.

Figure 45:
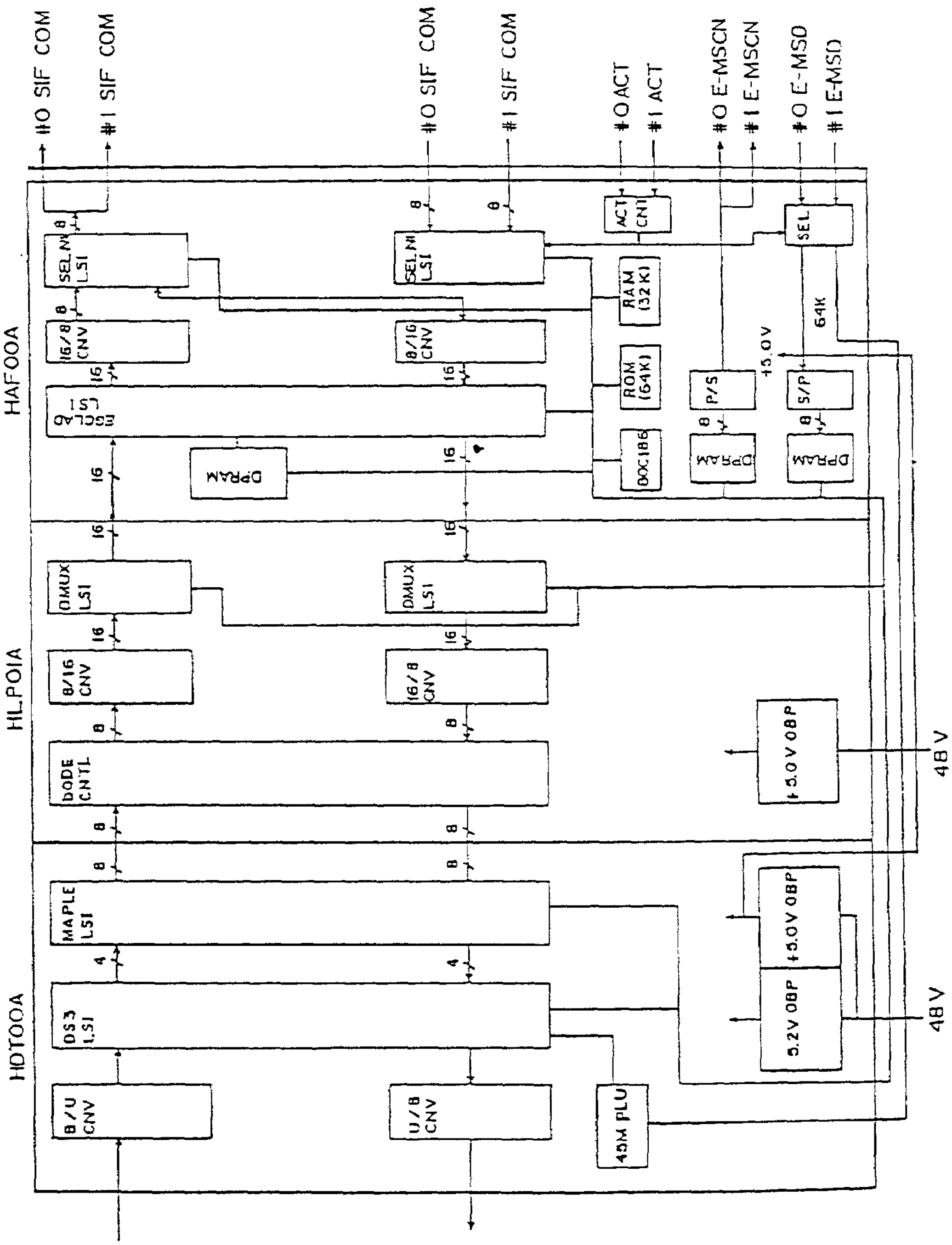
FIG. 45 is the block diagram showing the functional configuration of the DS3-SMDS interface.

1. DS3-SMDS interface unit
   a. DS3 layer terminating function
   b. L2-PDU header terminating function
2. SBMESH/GWMESH interface unit
   a. L2-PDU payload terminating function
   b. L3-PDU terminating function Listed below in detail are the functions loaded to the DS3-SMDS interface unit.

a. DS3 layer terminating function
b. DS# PLCP layer terminating function
c. Received L2-PDU header checking function (HCS)
d. L2-PDU header pattern generating function
e. Distributed queue dual bus (DQDB) sequence function (REQ bit processing function)
f. DS3 layer performance monitor function
g. PLCP layer performance monitor function
h. Reception L2-PDU data converting function (45 Mbps→156 Mbps)
i. Transmitted L2-PDU data bit rate converting function (156 Mbps→45 Mbps)
j. MSD/MSCN information LAP terminating function
k. Interfacing function (53-octet 8-bit parallel—54-octet 16-bit parallel) for SIFSH common
l. Multiplexing/demultiplexing function for DS3-SMDS L2-PDU cells and LAP cells
m. Loopback function for specific VPI/VCI
n. MSCN data multiplexing function
o. MSD data dropper function FIG. 45 is a block diagram showing the functional configuration of the DS3-SMDS interface.

7.2. DS3 Layer Terminating Function

The DS3 layer terminating function is one of the capabilities loaded to the DS3-SMDS interface, and terminates the DS3 frame format described in 2.1.2. by referring to FIG. 35.

Practically, the following processes are performed.

A. At a Receiving Equipment a. Illegality monitoring and error counting for PCM line code (B3ZS code)

b. Synchronization establishing and error counting for framing bit (F0/F1/M0/M1: refer to FIG. 36)

c. Confirming and error counting for P bit (parity bit: refer to FIG. 36)

d. Confirming AIS pattern (refer to FIG. 36)

e. Confirming yellow alarm bit (X bit: refer to FIG. 36)

b. At a Sending Equipment a. Generating framing bit (F0/F1/M0/M1: refer to FIG. 36)

b. Generating P bit (parity bit: refer to FIG. 36)

c. Generating AIS pattern (refer to FIG. 36) (when the loopback is specified)

d. Setting yellow alarm bit (X bit: refer to FIG. 39) at red CGA alarm e. Converting PCM line code (B3ZS code)

7.2.1. Process for Line Faults

The DS3-SMDS interface monitors a line fault and notifies the switching system of a fault when generated. The fault notification is automatically followed by a notification of a normal operation if the fault has been removed. If a plurality of faults are detected during the fault monitoring process, then the process is performed only on the most serious fault, and is not performed on the other faults.

Figure 46:
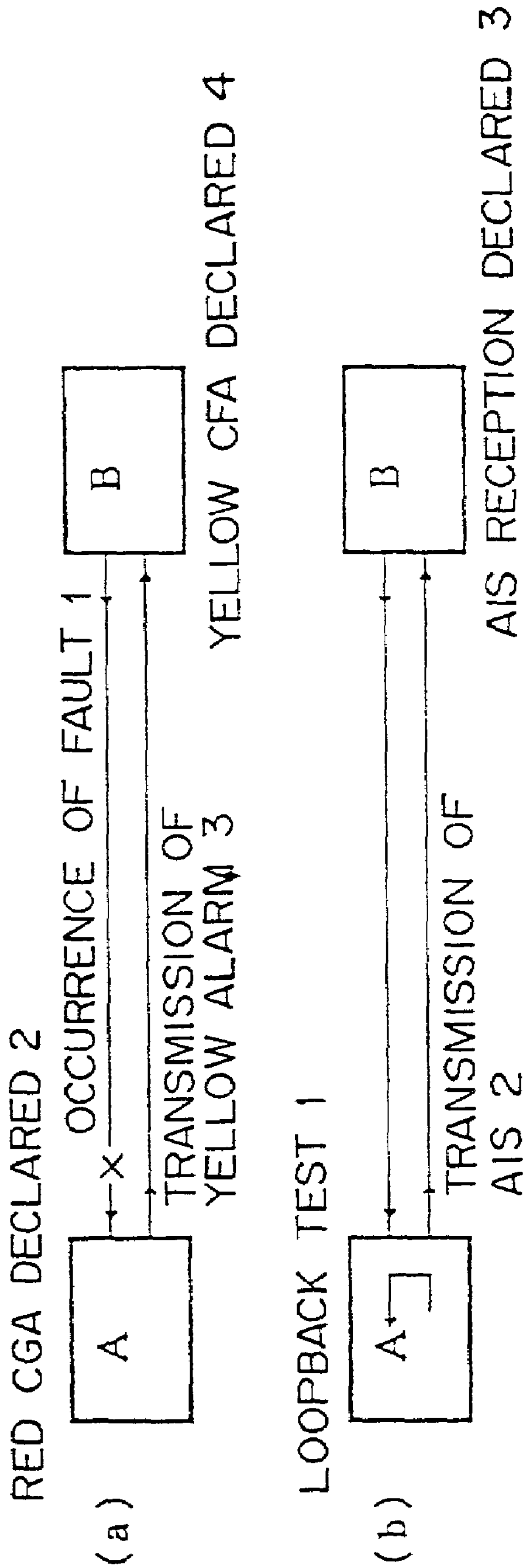
FIG. 46 shows the sequence of the alarm in the DS3 layer.

FIG. 46 shows the sequence of the alarm in the DS3 layer. First, if a fault occurs in a transmission line (1.) in (a) in FIG. 46, the DS3-SMDS interface A declares a red carrier group alarm (CGA) (2.) and then transmits a yellow alarm (3). As a result, the DS3-SMDS interface B declares a yellow carrier failure alarm (CFA) (4). Then, in (b) in FIG. 46, the DS3-SMDS interface A transmits an alarm indication signal (AIS) (2.) when a loopback test is conducted (1.). As a result, the DS3-SMDS interface B declares reception of an AIS.

FIG. 47 shows the priority level of the alarm in the DS3 layer. For example, if a loss of signal (LOS) has been detected, then each of the alarm indication signal (AIS), out of frame (OOF), yellow signal (YEL), PLCP out of frame (POOF), and PLCP yellow signal (PYEL) is masked.

7.2.2. Detection and Recovery Condition of Each Alarm

Figure 49:
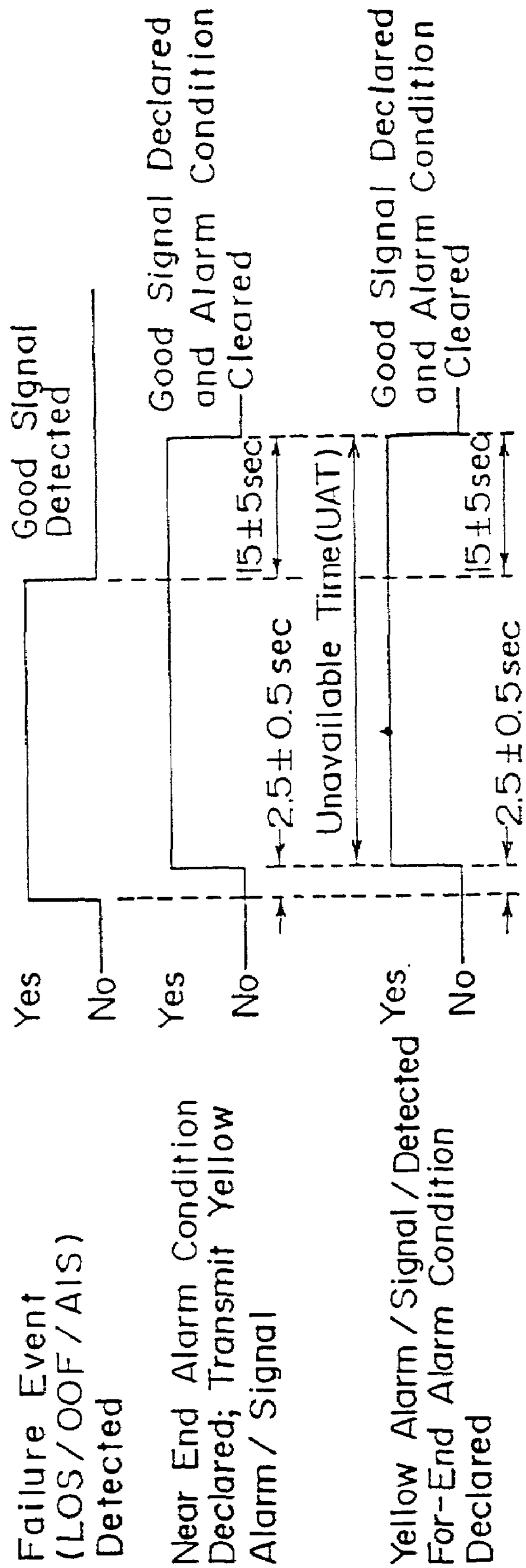
FIG. 49 shows the timing at which an alarm is declared.

FIG. 48 shows the detection and recovery condition of each alarm. FIG. 49 shows the timing of the declaration of an alarm.

7.3. DS3-SMDS Layer Terminating Function

The DS3 layer terminating function is one of the capabilities loaded to the DS3-SMDS interface, and terminates the DS3 PLCP frame format described in 3.1. by referring to FIG. 37.

Practically, the following processes are performed.

A. At a Receiving Equipment a. Synchronization establishing and error counting for framing bit (A1/A2: refer to FIG. 37)

b. Confirming and error counting for PLCP BIP-8 (B1: refer to FIG. 37)

c. Confirming and error counting for PLCP path status (G1: refer to FIG. 37)

b. At a Sending Equipment a. Generating framing bit (A1/A2: refer to FIG. 37)

b. Generating PLCP BIP-8 (B1: refer to FIG. 37)

c. Generating PLCP path status (G1: refer to FIG. 37)

d. Generating cycle staff counter (C1: refer to FIG. 37)

e. Generating SIP level 1-control information (M1/M2: refer to FIG. 37)

7.3.1. Process for Line Faults

The DS3-SMDS interface monitors a line fault and notifies the switching system of a fault when generated. The fault notification is automatically followed by a notification of a normal operation if the fault has been removed. If a plurality of faults are detected during the fault monitoring process, then the process is performed only on the most serious fault, and is not performed on the other faults.

Figure 50:
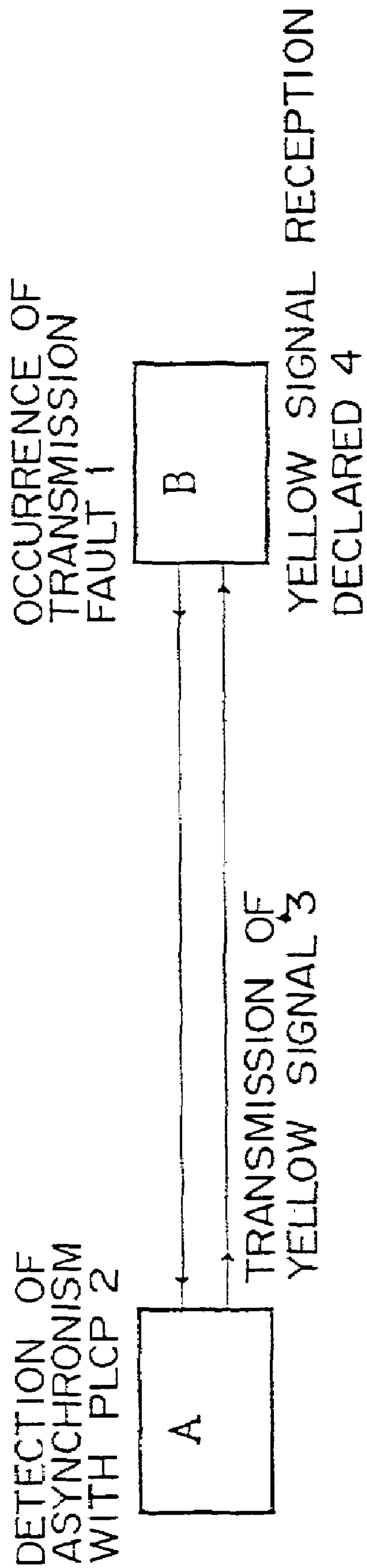
FIG. 50 shows the sequence of the alarm in the DS3 PLCP layer.

FIG. 50 shows the sequence of the alarm in the DS3 PLCP layer. In FIG. 50, if a PLCP frame is transmitted in fault (1.) with the PLCP frame in the DS3-SMDS interface B, then the DS3-SMDS interface A detects asynchronization of the PLCP frame and transmits a yellow signal. As a result, the DS3-SMDS interface B declares the reception of the yellow signal.

7.3.2. Detection and Recovery Condition of Each Alarm

Figure 52:
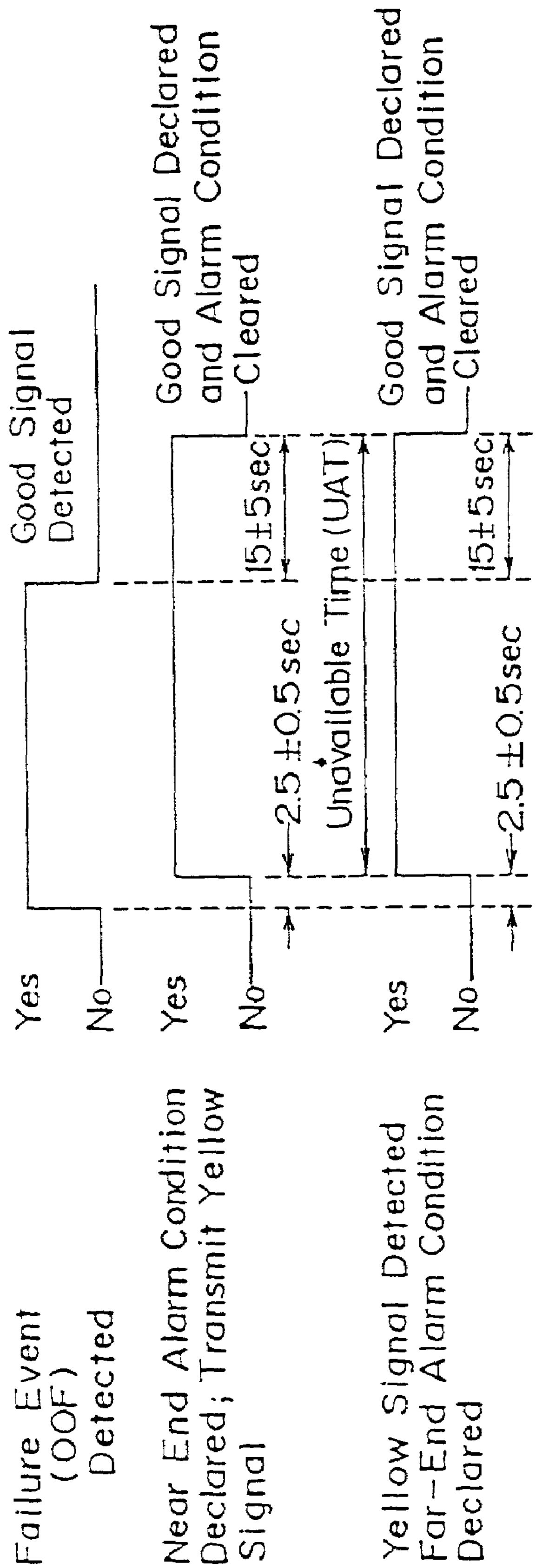
FIG. 52 shows the timing at which an alarm is declared.

FIG. 51 shows the detection and recovery condition of each alarm. FIG. 52 shows the timing of the declaration of an alarm.

7.4. L2-PDU Header Checking Function (HCS)

As shown in FIG. 33, if the DS3-SMDS interface 1 terminates the DS3 layer in the DS3 transmission line 2 to provide an SMDS service, the DS3-SMDS interface 1 fetches a frame of the PLCP layer accommodated in the information payload field of the DS3 frame input through the DS3 transmission line 2. Then, the DS3-SMDS interface 1 extracts an L2 protocol data unit (L2-PDU) from the frame in the extracted PLCP layer (FIG. 35). Then, the DS3-SMDS interface 1 determines whether the L2-PDU can be a valid cell or an invalid cell by referring to a BUSY bit contained in the access control field (ACF: refer to FIGS. 38, 39, and 35 in the header of the L2-PDU. If the L2-PDU can be a valid cell, then the DS3-SMDS interface 1 determines whether the value of the network control information field (NCI: refer to FIGS. 38 and 35) in the header of the L2-PDU indicates 11111111 11111111 11110000 00100010 or all zero as shown in FIG. 40. If the value of the NCI indicates 11111111 11111111 11110000 00100010, then the DS3-SMDS interface 1 processes as a truly valid cess the L2-PDU to be processed. If the value of the NCI is all zero, then the DS3-SMDS interface 1 increments the count value of the HCS error and performs the protocol monitor process.

On the other hand, if the BRLC is connected to the DS3 transmission line 4 as shown in FIG. 34, and the DS3-SMDS interface 3 realizes an umbilical link, then the DS3-SMDS interface 3 calculates the HEC (FIG. 43) of the ATM header field. If it determines that no error has arisen in the ATM header field, then it determined whether or not the object ATM cell is a valid cell after checking whether or not the object ATM cell is a free cell. If the DS3-SMDS interface 3 determines as a result of the calculation that an error has arisen at the header field, then it increments the count value of the HEC error and performs a protocol monitor process.

7.5. L2-PDU Header Pattern Generating Function

As shown in FIG. 33, if the DS3-SMDS interface 1 terminates the DS3 layer in the DS3 transmission line 2 to provide an SMDS service and if the ATM cell transferred from the ATM switch (ASSWSH) 5 shown in FIG. 33 is a valid cell, then the DS3-SMDS interface 1 adds a network control information field (NCI) (refer to FIG. 40) containing the values 11111111 11111111 11110000 00100010 to the beginning of the information contained in the payload field of the ATM cell as shown in FIG. 35, and further adds to the beginning of the field an access control field (ACF) to form an L2-PDU. If the ATM cell transferred from the ATM switch (ASSWSH) 5 is an invalid cell, then the DS3-SMDS interface 1 adds an NCI (FIG. 40), that is, all zero, to the beginning of the information contained in the payload field of the ATM cell as shown in FIG. 35, and further adds to the beginning of the information an access control field (ACF) to form an L2-PDU. Thus, if the ATM cell is converted into an L2-PDU, then the header information (VPI/VCI, etc.) of the ATM cell is discarded. Then, as shown in FIG. 35, a frame of the PLCP layer is generated based on the thus generated L2-PDU, then a DS3 frame is generated based on the frame of the PLCP layer, and the DS3 frame is sent to the DS3 transmission line 2 shown in FIG. 33.

If the BRLC is connected to the DS3 transmission line 4 and the DS3-SMDS interface 3 realizes an umbilical link as shown in FIG. 34, then the DS3-SMDS interface 3 does not replace the header field for the ATM cell transferred from the ATM switch (ASSWSH), but calculates the HEC for the header field, adds to the header the HEC (FIG. 43) obtained as a result of the calculation, and transmits the ATM cell to the transmission line 4 shown in FIG. 34.

7.6. Distributed Queue Dual Bus (DQDB) Sequence Function

If the DS3-SMDS interface 1 terminates the DS3 layer in the DS3 transmission line 2 for providing an SMDS service and if a customer premise equipment (CPE), which is a user terminal unit, connected to the DS3 transmission line 2 is, for example, a multi CPE connected to the LAN as shown in FIG. 33, then is subject to the following control. That is, if the CPE cannot capture a blank cell, then the CPE requests for a blank cell by setting to ON the bits of REQ-0 through REQ-2 (FIG. 39) in the access control field (ACR: refer to FIGS. 38 and 35) in the header of the L2-PDU in the transmission line. Then, the DS3-SMDS interface shown in FIG. 33 sends a blank cell when it receives the request bit from the CPE.

7.7. DS3 Layer/PLCP Layer Performance Monitoring Function

The DS3-SMDS interface monitors the performance of lines and notifies the switching system of the multiplication for each performance parameter and the threshold alarm for the resultant product.

Even if the switching system receives a notification of a threshold alarm, it does not block the line corresponding to the alarm but processes the alarm as a simple warning and includes the fact in the subsequent maintenance plan.

Performance parameters are classified into those related to the DS3 layer and those to the PLCP layer. The parameters related to the DS3 layer are further classified into the information about lines and the information about paths.

The information about the line in the DS3 layer includes the observation of the following three parameters.

1. Line code violation
2. Line errorred second
3. Line severly errorred second

The information about the path in the layer includes the values of the following 6 parameters.

4. CV: P-bit parity code violation
5. ES: Errored second
6. SES: Severly errorred second
7. SFFS: Severly errorred second
8. UAS: Unavailable second
9. AISS: Alarm indication signal second The information about the PLCP layer includes the values of the following 5 parameters.

10. PLCP CV: PLCP code violation
11. PLCP ES: PLCP errorred second
12. PLCP SES: PLCP severly errorred second
13. PLCP OOF: PLCP out of frame
14. PLCP UAS: PLCP unavailable second The DS3-SMDS interface holds the last value obtained every 15 minutes. The obtained result is read every 15 minutes for the switching system. The switching system holds 32 values sequentially obtained every 15 minutes per day (for 8 hours), and thus holds a 7-day record.

Provided is a FAR END performance monitor unit using a far end block error (FEBE) transmitted through G1 bits (FIG. 37) in the PLCP frame format. The threshold of the function is a default optionally defined by the user.

7.7.1. DS3 Layer

FIG. 53 shows the type of performance parameter about the DS3 layer and the count-up condition of the multiplication for each parameter.

7.7.2. DS3-PLCP Layer

FIG. 54 shows the types of performance parameters of the DS3-PLCP layer, the count-up conditions of the product for each parameter, and the alarm threshold for the product of each parameter.

7.8. Received L2-PDU Data Converting Function (45 Mbps→156 Mbps)

If it is determined that no error has arisen in the L2-PDU and that the L2-PDU is a valid cell as a result of the L2-PDU header check described in 7.4. above, then the ATM cell obtained by converting the L2-PDU is sent to the ATM switch (ASSWSH) through the SIFSH common (FIG. 8). In this case, if valid cells are consecutively sent from the user equipment, then data to be processed in the ATM switch is subject to higher possibility of burst, thereby probably causing congestion in the ATM switch and undesirably losing cells in the ATM switch. Therefore, if the L2-PDU received from the DS3 transmission line having the bit rate of 45 Mbps is multiplexed to the highway in a switch which has the bit rate of 156 Mbps and is terminated by the SIFSH common, then the DS3-SMDS interface performs a shaping process using a buffer such that the ratio of the valid cells to invalid cells multiplexed.

7.9. Transmitted L2-PDU Data Bit Rate Converting Function (156 Mbps→45 Mbps)

The bit rate of the L2-PDU transmitted from the SIFSH common is 156 Mbps. Therefore, the data having the bit rate of 156 Mbps is converted into the bit rate of the DS3 layer, that is, 45 Mpbs.

7.10. Interfacing Function to SIFSH Common

The cell length of the DS3-SMDS L2-PDU is 53 octet, and the cell length of the ATM cell processed by the SIFSH common (SIFSH COM: refer to FIG. 33) is 54 octet. Therefore, the interface between the DS3-SMDS interface and the SIFSH common is required to have the function of converting data length.

When the L2-PDU is transferred from the DS3-SMDS interface to the SIFSH common, the DS3-SMDS interface checks the HCS (HEC) of the header of the L2-PDU input via the transmission line and then converts the 53-octet L2-PDU to the 54-octet ATM cell to be processed in the ATM switch 5. In this case, stored in the payload field (ATM cell payload) are the segment type (SEGT) and message identifier (MID) in the header field of the L2-PDU, and the segmentation unit (SEG-.UNIT), payload length (PLEN), and payload CRC (PCRC) in the payload field of the L2-PDU as shown in FIG. 35. A CVI having "1" in all bits in the network control information field (NCI) in the header field of the L2-PDU is converted into the values, that is, VPI=3F and VCI=03FF, assigned as the interface between the DS3 interface and the SIFSH common. Then, the VPI and VCI are added to the header field of the ATM cell. The header field of the ATM cell is provided with a 2-octet tag indicating the autonomous switching in various multiplexing units and the ATM switch.

If an ATM cell is transferred from the SIFSH common to the DS3-SMDS interface, then the DS3-SMDS interface checks the leading tag in the ATM cell and deletes the tag if the cell is to be output by the DS3-SMDS interface. Then, the DS3-SMDS interface converts the 54-octet ATM cell into the 53-octet L2-PDU by performing in the reverse order the operation of the transfer of the L2-PDU from the DS3-SMDS interface to the SIFSH common.

Figure 55:
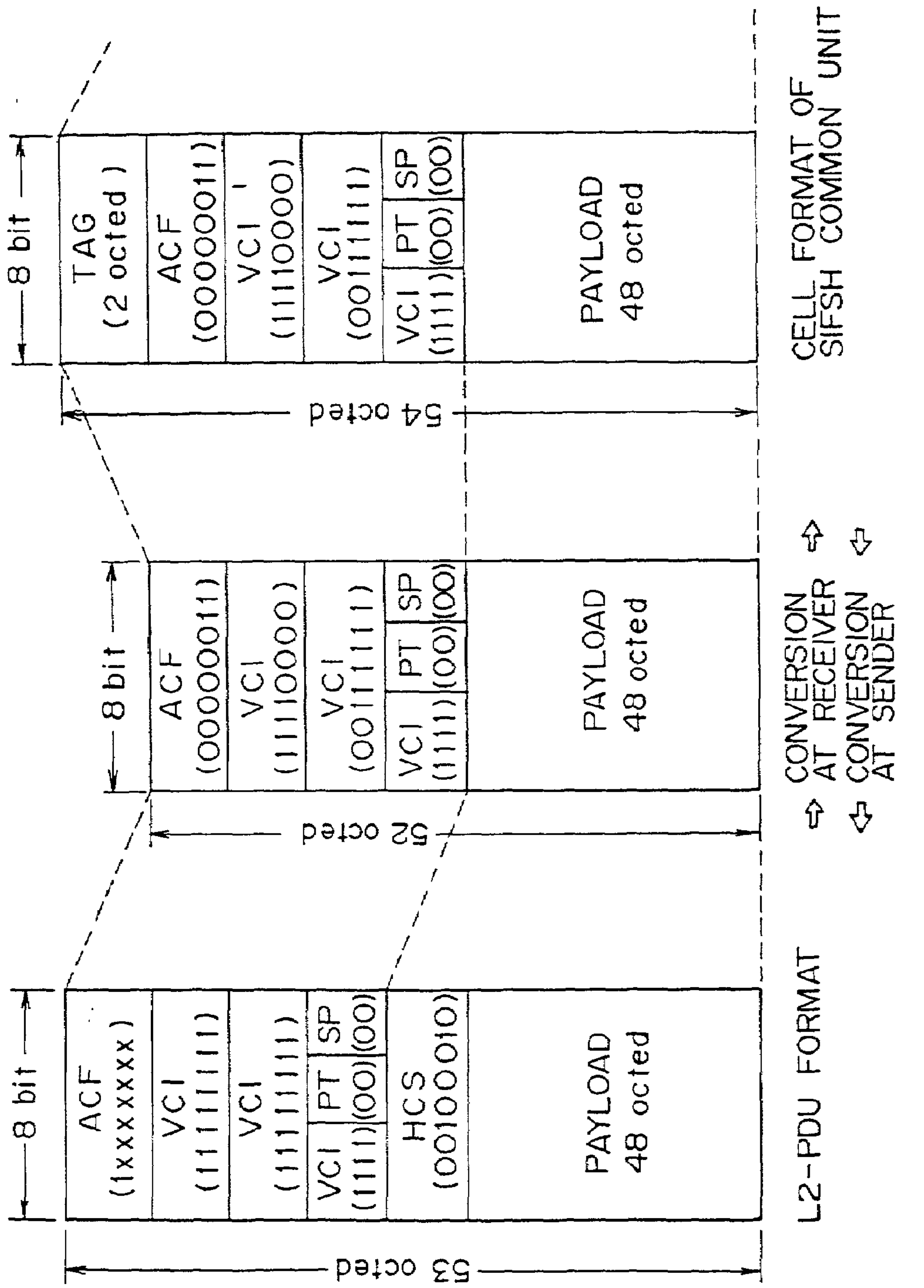
FIG. 55 shows the data converting process between the DS3-SMDS interface and SIFSH common unit.

FIG. 55 shows the outline of the above explained converting process. An access control field (ACF: refer to FIGS. 35 and 38) is also converted as shown in FIG. 55. The payload type (PT) and segment priority (SP) (both shown in FIG. 40) having all "0" are transferred as is.

If the DS3-SMDS interface realizes an umbilical link, then the DS3-SMDS interface converts the 53-octet ATM cell in the transmission line 4 into the 54-octet ATM cell to be processed in the ATM switch by removing from the ATM cell received via the transmission line the 1-octet HEC of the header field and adding the 2-octet tag, and then transmits the converted ATM cell to the SIFSH common. That is, no VPI/VCI conversion is made. If the ATM cell is transferred from the SIFSH common to the DS3-SMDS interface, then the above described operation is performed in the reverse order.

7.11. LAP Terminating Function of MSD/MSCN Information

Transmitted through the link access protocol (LAPD) are the control information (MDS information) transferred from the switching system to the DS3-SMDS interface and the DS3 layer/PLCP layer fault information (MSCN) transferred from the DS3-SMDS interface to the switching system such as a performance monitor threshold crossing alert, performance monitor counter value, etc. The LAPD is mapped to the ATM cell using the ATM adaptation layer (AAL) protocol type of type 3 or 4. As a result, the above described information is transmitted as an ATM cell between the DS3-SMDS interface and the broadband signaling group controller shelf (BSGC-SH)(FIG. 8) through the ATM switch (ASSWSH).

The hardware fault (such as parity errors) of the DS3-SMDS interface is transmitted by the SIFSH common to the switching system through the LAPD. The determination as to whether the data transferred in a switch refers to the L2-PDU data or the LAPD data can be made according to the value of the bit specified in the tag area of the header field of the ATM cell. FIG. 56 shows the format of the ATM cell transferred in the ATM cell. The determination as to whether the data transferred in a switch refers to the L2-PDU data or the LAPD data can be made according to the value of the SIG bit in the 2-octet tag area added to the head of the ATM.

Thus, since the DS3-SMDS interface and SIFSH common need not be directly connected to the system bus of the switching system, the load on the system bus can be successfully reduced.

7.12. Multiplexing Function of DS3-SMDS L2-PDU Cell and LAP Cell

For the ATM cell to be transferred to the SIFSH common, the DS3-SMDS interface multiplexes the MSCN LAPD cell for the L2-PDU data. As for the multiplexing timing of the MSCN LAPD cell, the MSCN LAPD cells are multiplexed for the L2-PDU data when the switching system issues a request for the performance monitor information, etc. using the MSD LAPD cell from the switching system.

7.13. Demultiplexing Function of DS3-SMDS L2-PDU Cell and LAP Cell

In the ATM cell is transferred from the SIFSH common to the DS3-SMDS interface, then the MSD LAPD cell if multiplexed for the L2-PDU data. Therefore, the DS3-SMDS interface should demultiplex the MSD LAPD cell to process the MSD LAPD information. The demultiplexing process is performed after determining the value of the SIG bit in the tag area of the ATM cell shown in FIG. 56.

7.14 Loopback Function of specified VPI/VCI 7.14.1 Loopback Function of Cell Provided With "0" Bit The DS3-SMDS interface is loaded with the maintenance function of looping back a specified cell having a 0 bit at the head of the tag area of the ATM cell shown in FIG. 56.

7.14.2 Loopback Function of Cell Provided With Specific VCI/VCI

The DS3-SMDS interface is loaded with the maintenance function of looping back a cell having a specified VPI/VCI notified of through a simple LAP. The loopback is notified of in a simple LAP format and then activated according to the EMSD information. However, this loopback function and the function of looping back the cell having the "0" bit as described in 7.14.1. are not simultaneously activated because of the configuration of the hardware.

7.15 MSCN Data Multiplexing Function

The hardware fault (for example, a parity error) information of the DS3-SMDS interface, which cannot be notified of from the DS3-SMDS interface using the MSCN LAPD cell, can be notified of by the SIFSH common to the switching system using a LAPD cell. Therefore, the fault information from the DS3-SMDS interface is transmitted as serial data of 1 Mbps.

7.16 MSD Data Dropper Function

Common information transferred to the line interface loaded in the SIFSH is terminated in the SIFSH. Therefore, the information to be transferred to the DS3-SMDS interface is transferred as serial data of 1 Mbps as explained in 7.15. above. The DS3-SMDS interface processes thus transferred MDS data.

8. Maintenance Signal Driver (MSD) Interface 8.1. MSD Information

The following information provided for the DS3-SMDS interface from the software of the switching system is first transferred from the software of the switching system to the SIFSH common by way of the BSGCSH (shown in FIG. 8) through the intra-station control communications. Then, the SIFSH common notifies the DS3-SMDS interface of the information in the software process. Such information is referred to as the E-MSD.

1. Each type of reset signal
2. DS3-SMDS interface state control information
3. Pseudo-fault setting information of software fault detecting circuit
4. Information simultaneously provided by SIFSH common for each of the individual units, for example, the DS3-SMDS interface.

The E-MSD information is received by both systems of duplex SIFSH common. The DS3-SMDS interface fetches the D-MSD information transferred from the active SIFSH common. The restrictions on the hardware do not allow the E-MSD information to be supported by a unit for detecting data other than bit stuck. Therefore, the DS3-SMDS interface performs a protecting process on the received E-MSD information to counteract the disturbance of the clock frame pulses at the switch of the SIFSH common systems. That is, only when the DS3-SMDS interface receives simultaneously and consecutively 2 frames of the same information from the SIFSH common, then it processes the information as valid data.

8.1.1. E-MSD Hardware Interface

Figure 57:
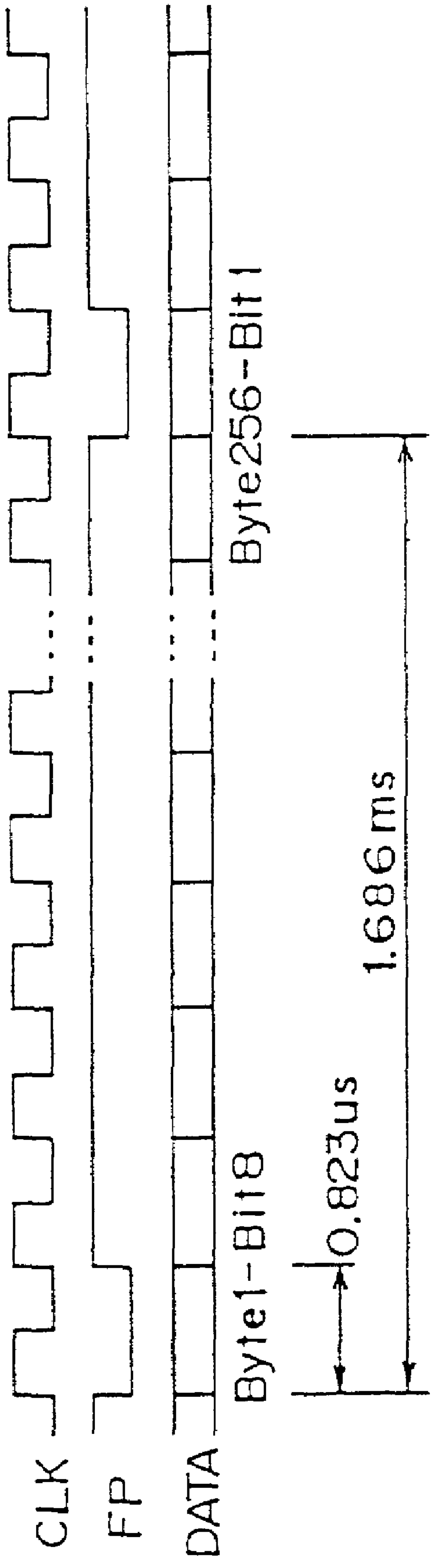
FIG. 57 is the timing chart of the E-SD signal.

The interface between the SIFSH common and The DS3-SMDS interface is restricted on its three elements of data, that is, clock (1.215 MHz), FP (frame pulse), and data. The data length of the E-MSD is 256 bits. FIG. 57 is a timing chart of the E-MSD signal.

8.1.2. E-MSD Accommodation List of DS3-SMDS Interface

FIG. 58 shows the list indicating the state of the accommodation of the E-MSD information transferred between the DS3-SMDS interface and the SIFSH common. In this list, each row indicates a byte position and each column indicates the position of the bit in each byte position. The E-MSD data transferred from the SIFSH common is serially received by the DS3-SMDS interface from the D0th bit of the 000th byte to the D7th bit of the 255th byte. In this format, since the area of the 000th byte is generated by the SIFSH common, it actually is the leading data of the 001th byte.

Since the DS3-SMDS interface does not automatically release various reset signals including the hardware reset signal, the reset signals should always be released after being properly set.

FIG. 59 shows the contents of each bit of the E-MSD information.

8.2. Detailed Explanation of the E-MSD 8.2.1. Hardware Reset

In the DS3-SMDS interface, the following two reset points are defined as the reset timings at the occurrence of a hardware fault.

1. SDFRST (hardware fault reset)
2. μPRST (microprocessor reset)

Since the resettings are not automatically released by hardware, "1" should be set as the setting and "0" should be set as the resetting.

8.2.2. Loopback

In the DS3-SMDS interface, defined are the following three loopback activation points for all cells and the loopback activation points for each cell.

1. LOOP-1 (Loopback instruction for all cells at DS3-SMDS interface input unit (at the terminal close to the ASSW)
2. LOOP-2 (Loopback instruction for all cells at DS3-SMDS interface output unit (at the terminal connected to the line)
3. LOOP-3 (Line loopback instruction to the output DS3 transmission line for all cells from the input DS3 transmission line)
4. LOOP-4 (Loopback instruction for a cell assigned "0" bit)
5. LOOP-5 (Loopback instruction for a cell assigned specified VPI/VCI)

8.2.3. Pseudo-fault Point

The E-MSD is received by the DS3-SMDS interface and contains a pseudo-fault point specified for a hardware checker provided in the interface. The following 5 types of pseudo-fault points are defined.

1. PF-CK (pseudo-fault points for a clock disconnection checker)
2. PF-CK (pseudo-fault points for a sell frame pulse disconnection checker)
3. PF-PTY (pseudo-fault points for a data parity checker)
4. PF-WDT (pseudo-fault points for a watch dog timer checker)
5. PTYRST (data parity error reset)

As in the case of the resettings explained in 8.2.1. above, "1" should be set as the setting and "0" should be set as the resetting. However, since a parity error information should be stored, it is to be reset by the PTYRST. Concerning the pseudo faults, all pseudo-fault points are set ON to activate all checkers in the printed circuit board (PCB) in the DS3-SMDS interface.

8.2.4. AIS Transmission Point

The DS3-SMDS interface transmits an AIS pattern (AISSND) through the DS3 transmission line under the software control to notify an object device of block information such as fault block information.

9. Maintenance Scanner (MSCN) Interface

Among the information provided for the software in the switching system from the DS3-SMDS interface, the following information is temporarily transmitted to the SIFSH common by hardware. The SIFSH common notifies the software of the switching system through the intra-station control communications by way of the BSGCSH (FIG. 8). The MSCN information of this type is referred to as extended maintenance scanner (E-MSCN) information.

1. Representative points and detailed information of fault information (parity clock loss, cell frame loss) of the signal line between the DS3-SMDS interface and the SIFSH common
2. Representative points of the hardware fault information of the DS3-SMDS interface
3. Representative points and detailed contents of the faults disabling the intra-station control communications between the DS3-SMDS interface and the BSGCSH
4. Representative points of the line fault according to the alarm monitor in the DS3 layer/PLCP layer
5. Representative points of the quality control information at the occurrence of buffer congestion in the DS3-SMDS interface
6. MSD echo-back information
7. Other maintenance and control information between the DS3-SMDS interface and the SIFSH common The same contents of the E-MSCN information are output to both systems of the SIFSH common duplicated through the DS3-SMDS interface. The clock and frame pulse used in sending the E-MSCN are provided by the active SIFSH common.

The SIFSH common notifies the software of the switching system through the intra-station control communications by way of the BSGCSH (FIG. 8) of the valid E-MSCN which was received from the DS3-SMDS interface and has been changed as being different from the latest contents of the E-MSCN information stored in the SIFSH common. The SIFSH common periodically notifies the software of the switching system through the intra-station communications by way of the BSGCSH of the E-MSCN information from each individual unit connected to the SIFSH common in addition to the E-MSCN information from the DS3-SMDS interface.

9.1.1. Hardware Interface for E-MSCN

The clock and frame pulse used in sending the E-MSCN are provided by the active SIFSH common.

Figure 60:
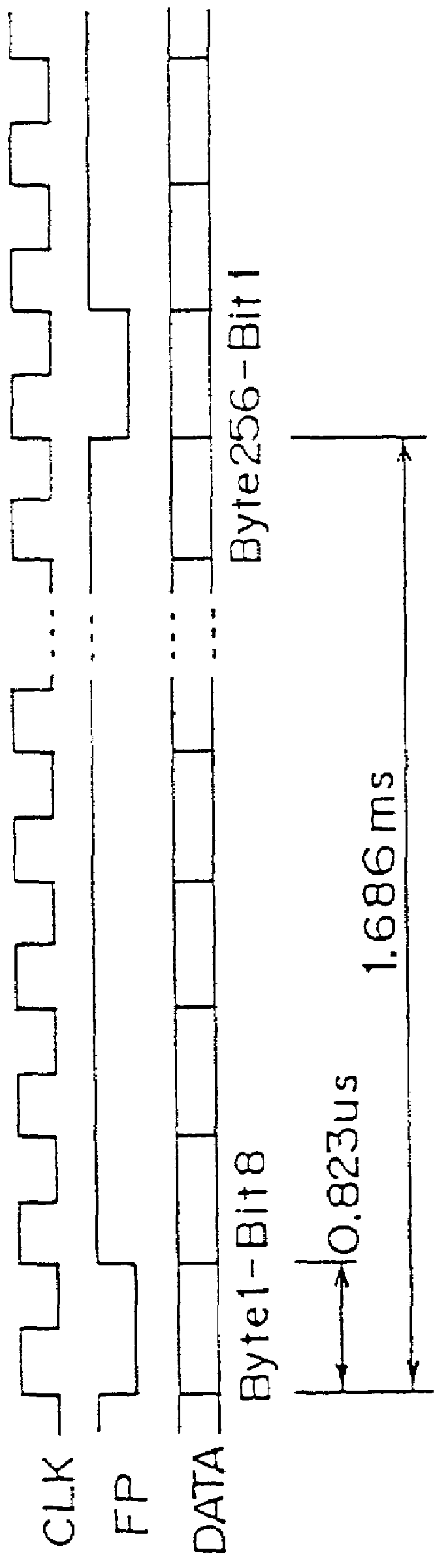
FIG. 60 is a timing chart of the signal line between the DS3-SMDS interface and SIFSH common unit.

FIG. 60 is a timing chart showing the signal line between the DS3-SMDS interface and the SIFSH common.

9.1.2. Detailed Explanation of E-MSCN

FIG. 61 is a table showing the accommodation state of the E-MSCN information transferred between the DS3-SMDS interface and the SIFSH common. In the table, each row indicates a byte position and each column indicates the position of the bit in each byte position. The E-MSCN data transferred from the DS3-SMDS interface is serially received by the SIFSH common in the order from the D0th bit of the 000th byte to the D7th bit of the 255th byte.

FIGS. 62 and 63 shows the contents of each bit of the E-MSCN information.

9.2. E-MSCN Process in DS3-SMDS Interface 9.2.1. SIFSH Common Interface Fault

The DS3-SMDS interface monitors the normality of the SIFSH common interface signal line. In the normality monitor, checked are the data parity (including cell enable), clock disconnection, and cell frame disconnection in the direction from the SIFSH common to the DS3-SMDS interface. If a fault is detected in the monitor process, the representative point PE0 (#0 system) or PE1 (#1 system) is set ON. If the representative point is set ON, the detailed information of the SIFSH common interface fault can be confirmed as the contents of the 018th byte shown in FIG. 61.

The SIFSH common interface fault can be reset according to the FRST signal input via the signal line independently connected to respective duplex SIFSH common systems. If the SIFSH common interface fault has not been corrected after resetting the fault, the above described representative point and detailed information point are set ON again.

9.2.2. DS3-SMDS Interface Hardware Fault

The DS3-SMDS interface hardware fault includes the data parity fault, clock disconnection, cell frame disconnection in the printed circuit board (PCB) and between the PCBs. If a hardware fault has arisen and can be notified of through the intra-station control communications between the DS3-SMDS interface and the BSGCSH (FIG. 8), then the representative point FERR-2 accommodated in the E-MSCN is set ON. The detailed fault information is notified of through the intra-station control communications between the DS3-SMDS interface and the BSGCSH. Refer to the 10. described later for the more detailed information.

The DS3-SMDS interface hardware fault can be reset according to the SDFRST information accommodated in the E-MSD and the HRST information provided from the SIFSH common. If the DS3-SMDS interface hardware fault has not been corrected after the reset, then the FERR-2 point is set ON again.

9.2.3. DS3-SMDS Interface Hardware Fault

The DS3-SMDS interface hardware fault disabling the intra-station communications between the DS3-SMDS interface and the BSGCSH includes the data parity fault in the direction from the DS3-SMDS interface to the SIFSH common (UHDPT), master 19M clock disconnection (UH19M), and communications control EGCLAD fault (EGPTY). If these faults have occurred, the representative point FERR-1 of the E-MSCN is set ON. Since the intra-station control communications are disabled, the detailed fault information is accommodated in the 019th byte of the E-MSCN.

These faults can be reset according to the SDFRST information accommodated in the E-MSD and the HRST information provided by the SIFSH common. If the above faults are not corrected after the reset described above, then the FERR-1 point is set ON again.

9.2.4. Faults in Microprocessor

The DS3-SMDS interface comprises a microprocessor for monitoring the performance of the DS3/PLCP layer and for performing intra-station control communications (simple LAPD). When the microprocessor becomes faulty or runs away, the MPE point of the E-MSCN is set ON.

The fault of the microprocessor can be reset according to the PPRST information in the E-MSD and the HRST information provided by the SIFSH common. If the fault of the microprocessor is not corrected after the reset, the MPE point is set ON again.

9.2.5. Fault in Timer

The DS3-SMDS interface performs processes such as the monitor of the performance of the DS3-PLCP layer based on the 15-minute or 1-day trigger input via the exclusive signal line connected to the SIFSH common. If the trigger to be input via the exclusive line is not entered at a predetermined timing, that is, if a new trigger is entered within 15 minutes+15 seconds after the preceding input timing, then static processes such as the performance monitor process, etc. cannot be performed. Therefore, if a trigger is not entered on a predetermined schedule, then the representative point RIMALM of the E-MSCN.

The fault of the timer can be reset according to the SDFRST information in the E-MSD and the HRST information provided by the SIFSH common. If the fault of the timer has not been corrected after the reset, then the TIMALM point is set ON again. Since the fault point is accommodated according to the hardware monitor, no special software process is required.

9.2.6. DS3 Layer Alarm

The DS3-SMDS interface monitors the carrier group alarm (CGA) of the DS3/PLCP layer. A plural alarms can be set ON for the CGA alarm. Accordingly, the CGA alarm is issued according to the two bits of representative points of the E-MSCN, that is, the LIALM and the LIFLG indicating the change of the alarm state.

Described below is the control method. That is, the LIALM point is set ON when the DS3/PLCP layer alarm is detected, and set OFF when the faults associated with all alarms are corrected. When the state of the DS3/PLCP layer alarm indicates a change, the LIFLG point notifies of the state change by the alteration from 0 to 1 or then to 0.

9.2.7. Performance Monitor Threshold Crossing Alert

The DS3-SMDS interface monitors the threshold crossing alert (TCA) on the header check sequence (HCS) (FIGS. 35, 38, and 40) in the network control information field of the DS3/PLCP layer and L2-PDU. The TCA is issued when the monitor detects a value exceeding a predetermined threshold in a 15-minute and 1-day cycles. Therefore, plural TCAs can be simultaneously set ON. Therefore, the TCA is issued according to the two bits of representative points of the E-MSCN, that is, the TCAALM and the TCAFLG indicating the change of the alarm state.

Described below is the control method. That is, the TCAALM point is set ON when the performance monitor of the DS3/PLCP layer exceeds a predetermined threshold, and set OFF when the state of the timer counting every 15 minutes and every day. When the TCA state of the performance monitor of the DS3/PLCP layer indicates a change, the TCAFLG point notifies of the state change by the alteration from 0 to 1 or then to 0. If the state of the timer counting every 15 minutes and every day has changed, then the TCAFLG point holds the preceding state.

9.2.8. Cell Discards in the DS3-SMDS Interface

The DS3-SMDS interface internally has a buffer of 112-cell capacity to convert the transmission rate of the ATM cells transferred from the SIFSH common from the transmission rate 156 Mbps in the SIFSH common to the transmission rate 45 Mbps of the DS3 transmission line. The occurrence of the cell congestion in the buffer is determined by checking whether or not the number of cells in the buffer has exceeded a queue length threshold set in the buffer. The buffer discards the cell input when the number of cells in the buffer exceeds the above threshold. The cell congestion state in the buffer is notified of by 2 bits, that is, CLOSAL and CLFLG indicating the change of the alarm state.

Described below is the control method. That is, the CLOSAL point is set ON when the cell congestion is detected in the buffer, and set OFF when all cell discard states are released. When the cell discard state changes, the CLFLG point notifies of the state change by the alteration from 0 to 1 or then to 0.

9.2.9. Diagnostic Result Report

The DS3-SMDS interface is loaded with the self-diagnostic function to confirm the capabilities of the hardware. The self-diagnostic functions can be activated by setting ON the DS3 DEC point in the E-MSD. The diagnostic result is provided by the representative points TSTEND and TSTIND in the E-MSCN. The TSTIND point is set to 1 when the diagnostic result indicates normality, and set to 0 when it indicates abnormality. If the diagnostic result indicates abnormality, then the phase number and test number related to the abnormality can be notified of using the 031th byte in the E-MSCN. After the diagnostics, the DS3-SMDS interface is in a reset-wait state, thereby requiring initialization in the initialization procedure.

10. Simple LAP-D Protocol of DS3-SMDS Interface 10.1. Software Interface

Figure 64:
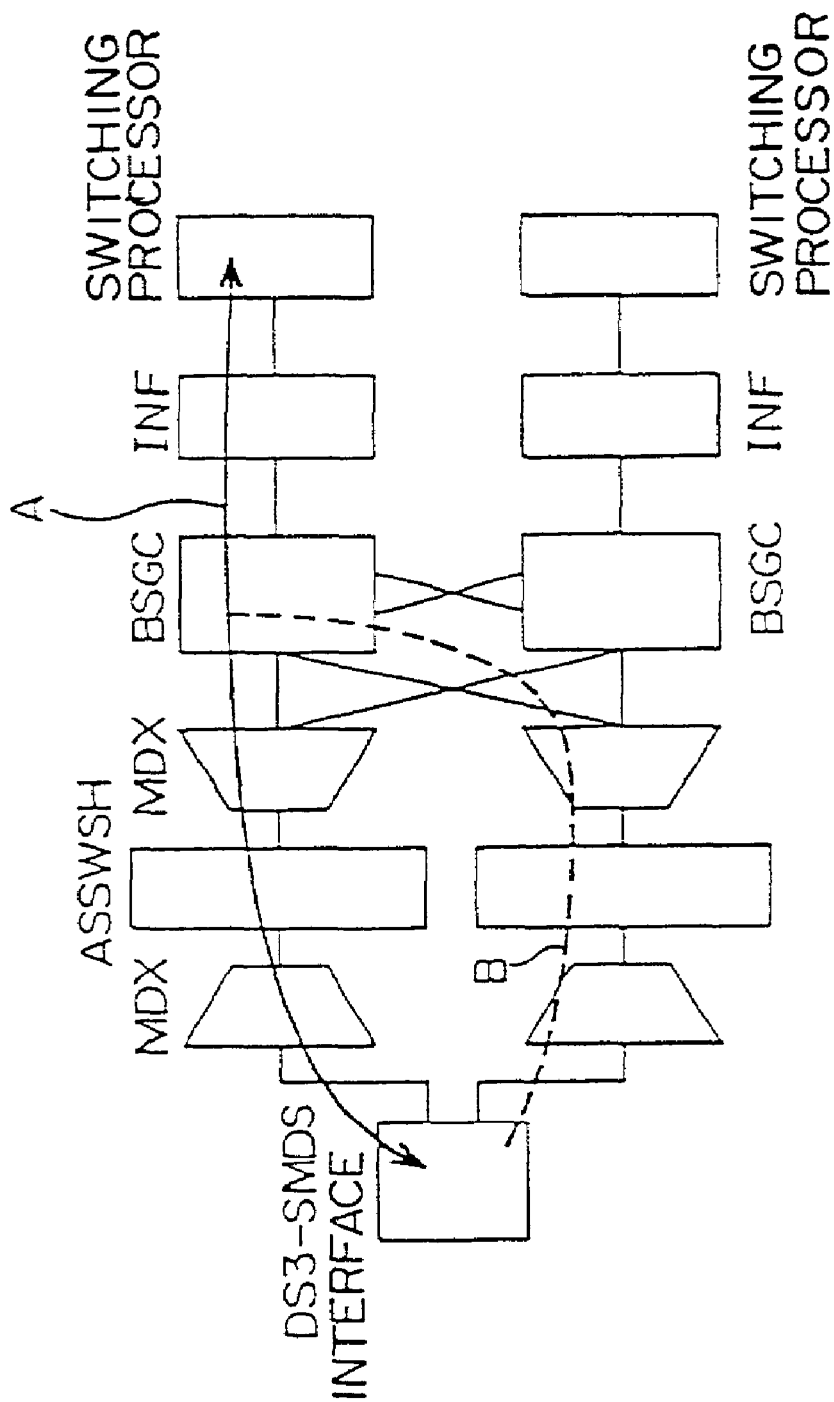
FIG. 64 shows the configuration of the connection of the interface between the DS3-SMDS interface and switch software.
Figure 65:
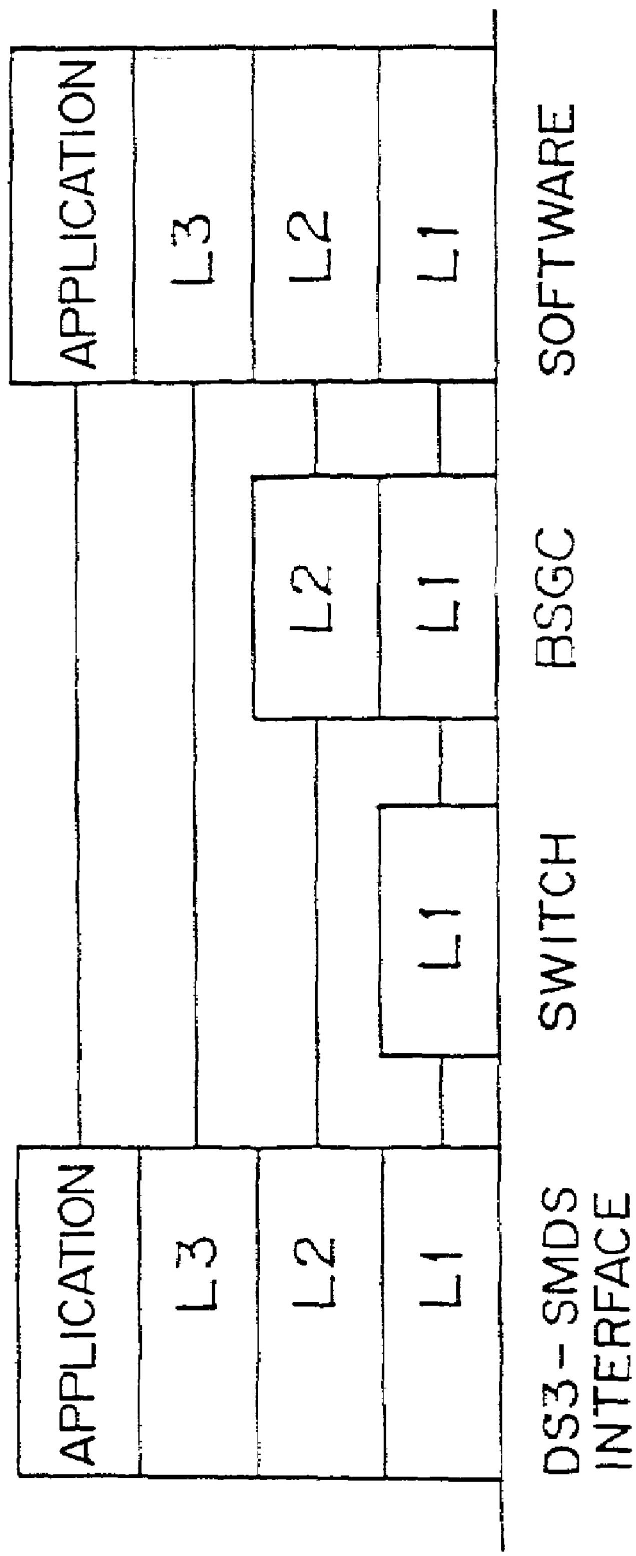
FIG. 65 shows the protocol stack between the DS3-SMDS interface and switch software.

FIG. 64 shows the connection of the interface between the DS3-SMDS interface and the switch software. FIG. 65 shows the protocol stack of the interface between the DS3-SMDS interface and the switch software. The switch software refers to the program executed by the processor which controls the processes (call process, switch control process, etc.) of the entire switch.

10.2. Hardware Interface

As shown in FIGS. 8 and 64, the DS3-SMDS interface communicates with the switch software by setting simple LAP communications with the BSGCSH through the intra-switch path by way of the MDX and ASSWSH. The BSGCSH communicates with the switch processor through an interface (INF).

The extraction/insertion of an intra-station control communications cell from/to a main signal path (intra-switch highway) and the simple LAP are terminated by the EG-CLADLSI (FIG. 45) in the DS3-SMDS interface.

There is one LAP link between the DS3-SMDS interface and the BSGCSH only for the BSGCSH of an active system through an ATM switch (ASSWSH) of the active system. As shown by A and B in FIG. 64, a path is set for the ASSWSHs of both active and standby systems. The communications data from the BSGCSH to the DS3-SMDS interface is transmitted to the ASSWSHs of both active and standby systems, and the DS3-SMDS interface selects only the communications data transmitted through the ASSWSH of the active system. Likewise, the communication data from the DS3-SMDS interface to the BSGCSH is transmitted to the ASSWSH of both active and standby systems, and the communications data transmitted through the ASSWSH of the standby system is discarded by the common unit of the BSGCSH in the standby system. The common unit of the BSGCSH in the standby system identifies an intra-office control communications cell by referring to a specified area of a tag added to the header of the received cell.

The communications link between the DS3-SMDS interface and the BSGCSH is assigned a band of 64 Kbps by default, and the band is preliminarily reserved in a switch. The band is optionally defined at the instruction of the switch software.

By default, the EG-CLADLSI (FIG. 45) shapes for 64 Kbps the band of the frame of the intra-station communications LAP comprising a plurality of cells. The EG-CLDLSI prevents an intra-station communications cell addressed to its own interface from flowing out of the station by dropping/inserting into a cell forming an intra-station communication LAP frame transferred through the main signal path (intra-switch highway). In this case, the DS3-SMDS interface performs a dropping/inserting process only on an intra-station communications cell input/output upwards (at ASSWSH). No dropping/inserting processes are performed on an intra-station communications cell input/output via the line (DS3 transmission line). If the BRLC is connected to the DS3 transmission line as shown in FIG. 34 to have the DS3-SMDS interface realize an umbilical link, then the DS3-SMDS interface loaded to the RMXSH in the BRLC performs a dropping/inserting process only on an intra-station communications cell input/output upwards (at the station), and no dropping/inserting processes are performed on an intra-station communications cell input/output via the subscriber line. Therefore, the DS3-SMDS interface passes an intra-station communications cell transferred from a downward unit to the BSGCSH.

The intra-station communications cell between the DS3-SMDS interface and the BSGC has a format shown in FIG. 56 described above.

10.3. Setting VPI/VCI

The BSGC (FIG. 8) sets an intra-station communications link to the DS3-SMDS interface using the VPI/VCI values assigned by the switch software. The VPI/VCI values are VPI=00 and VCI=03FE. These VPI/VCI values are not changed while the intra-station communications connection is maintained.

Figure 66:
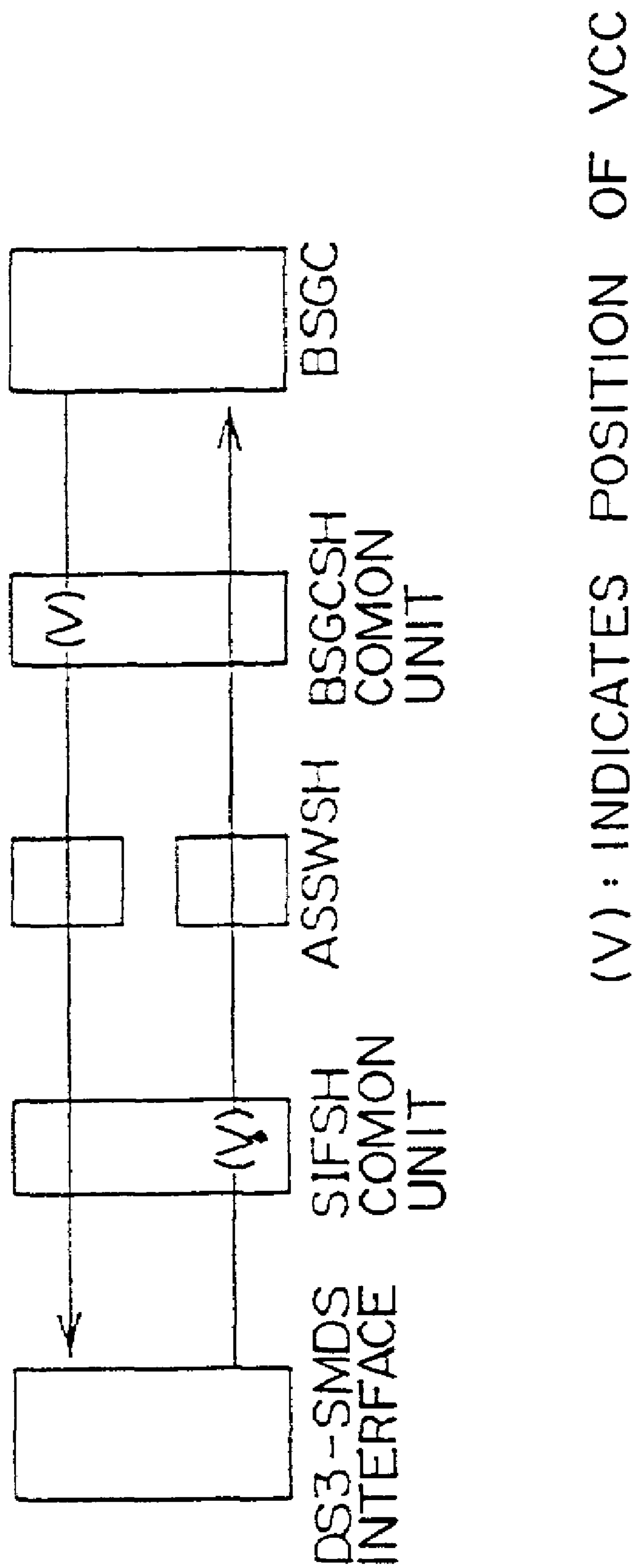
FIG. 66 shows the outline of the converting process for the VPI and VCI of an intra-station communications cell between the DS3-SMDS interface and the BSGC.

FIG. 66 shows the outline of converting the VPI/VCI of the intra-station communications cell between the DS3-SMDS interface and the BSGC. The tag information required to route the intra-station communications cell from the DS3-SMDS interface to the BSGC is added by the virtual channel converter (VCC) in the SIFSH common (FIG. 8). The tag information required to route the intra-station communications cell from the BSGC to the DS3-SMDS interface is added by the VCC in the common unit of the BSGC.

10.4 Error Monitor

The DS3-SMDS interface does not directly monitor intra-station communications cells received by the DS3-SMDS interface. Accordingly, the DS3-SMDS interface accepts a cell designating itself through its tag as a valid intra-station communications cell addressed to the interface, and then processes the cell.

10.5. AAL Interface 10.5.1. SAR-PDU Format

Figure 67:
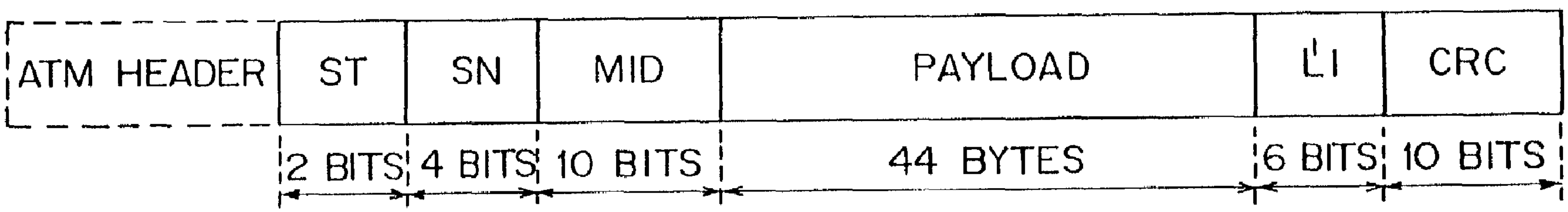
FIG. 67 shows the format of the intra-station communications SAR-PDR.

FIG. 67 shows the format of the intra-station communications SAR-PDU.

The ATM adaptation layer (AAL) of type 3 or 4 is adopted as the format of the SAR-PDU.

The SAR-PDU consisting of a segment type (ST), sequence number (SN), MID (don't care in the intra-station control communications cell), payload, payload byte length indicator (LI), and CRC (CRC-10 for ST, SN, MID, and payload) is stored in the payload of the ATM cell with the ATM header added to the head of the ATM cell.

Refer to 4. of part 3 to be described later.

10.6. Function of AAL

The L2 (layer 2) frame used in intra-station communications is mapped in the payload of the SAR-PDU through the CS-PDU (refer to the 4.2.2. and 4.2.3. in part 3). The AAL process performed by the DS3-SMDS interface has the functions of (1) decomposing/composing an L2 frame for a cell; (2) transmitting/receiving an intra-station communications cell; (3) detecting a bit error in the payload of a received cell; and (4) assigning a CRC to the payload of a transmitted cell.

10.7 Error Monitor

If a bit error is detected in the payload of a cell in the AAL process, then the cell is discarded. The error is stored in the DS3-SMDS interface and displayed as an MSCN. If an SN error or an ST sequence error is detected in the AAL process, them a series of cells determined to be erroneous are all discarded. In the AAL process, accepted as valid cells are those related to the SSM without payload errors, or a series of cells without sequence and payload errors from the beginning of a message (BOM) to the end of the message (EOM). A detected sequence error is held in the DS3-SMDS interface and displayed as an MSCN. No detected errors are corrected in the AAL process.

10.8. L2 Interface 10.8.1. Functions of L2

A simple LAP is the protocol of the L2 in the intra-station communications and has the functions of (1) establishing an L2 link; (2) transmitting and receiving the L3-PDU; and (3) monitoring the state of the L2 link.

10.8.2. Frame Format

Figure 68:
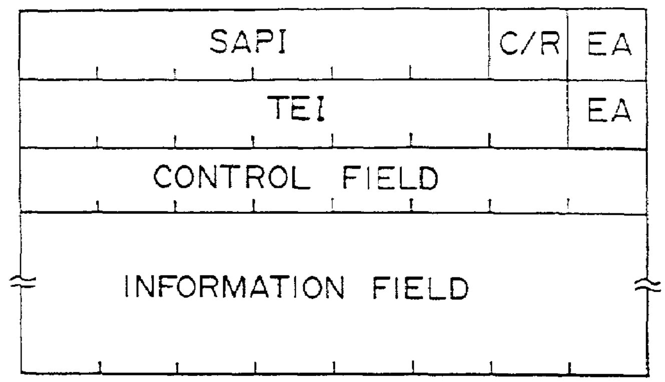
FIG. 68 shows the format of the intra-station communications L2 frame.

FIG. 68 shows the format of the intra-station communications L2 frame. The frame is transmitted as being stored in the payload of the SAR-PDU shown in FIG. 67.

10.8.3. Connection Setting Procedure

The LAP link between the DS3-SMDS interface and the BSGCSH is established when the DS3-SMDS interface is powered or reset, or the implementation of the DS3-SMDS interface to the station data is specified after powering or resetting the BSGCSH. Afterwards, the link is not disconnected by the DS3-SMDS interface or the BSGCSH regardless of the states INS and OUS of the DS3-SMDS interface. Since the connection-response VPI/VCI values are notified of in the set asynchronous balanced mode (SABM) frame transferred by the BSGCSH to the DS3-SMDS interface at the establishment of the link, the link is established at the responsibility of the BSGCSH.

10.8.4. Monitor of Link State

The BSGCSH monitors the state of a link by transmitting a receive ready (RR) frame to the DS3-SMDS interface on a predetermined cycle (every second) and confirming the return of the RR frame from the DS3-SMDS interface. The DS3-SMDS interface does not monitor the state of a link. Therefore, the DS3-SMDS interface does not recognize the disconnection of a link due to any fault.

10.8.5. Confirmation Procedure

According to the L2 protocol using the simple LAP, the L3 information is transferred in an unnumbered information (UI) frame. Therefore, the transfer of the L3 information is not confirmed in the L2, but in the L3 protocol.

10.8.6. Monitor of Faults

No errors of transferred information are detected in the simple LAP protocol.

10.9. L3 Interface 10.9.1. L3 frame Format

Figure 69:
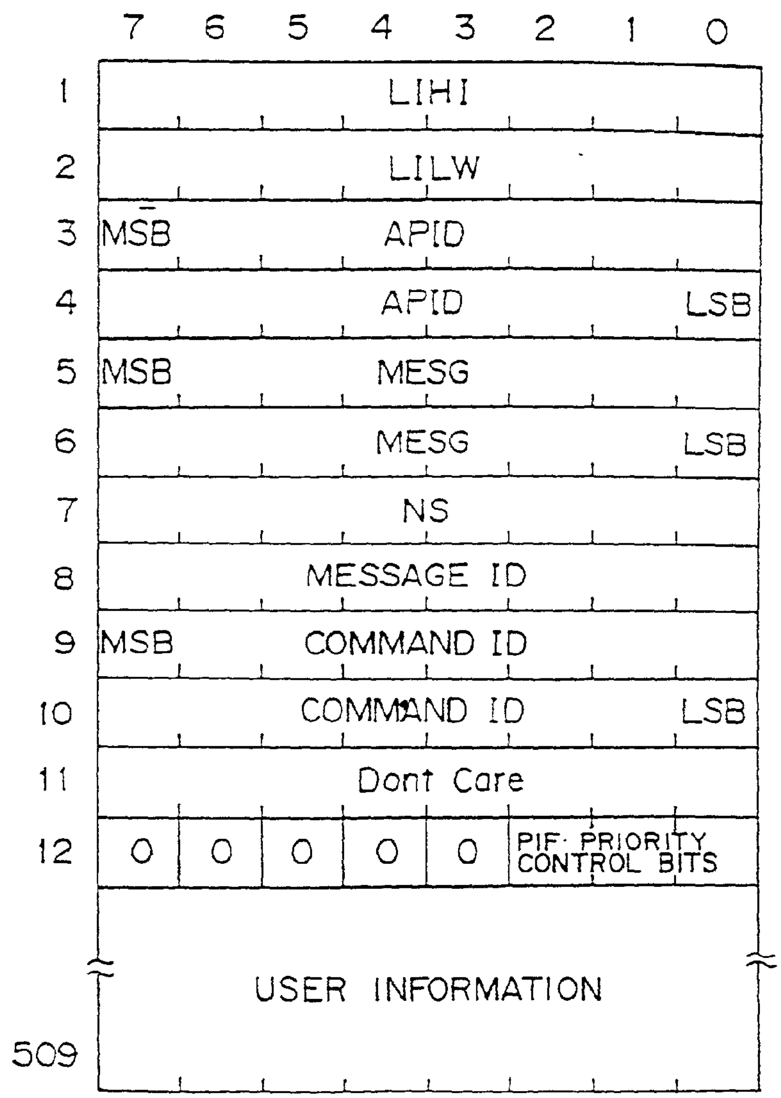
FIG. 69 shows the format of the L3 frame.
Figure 70:
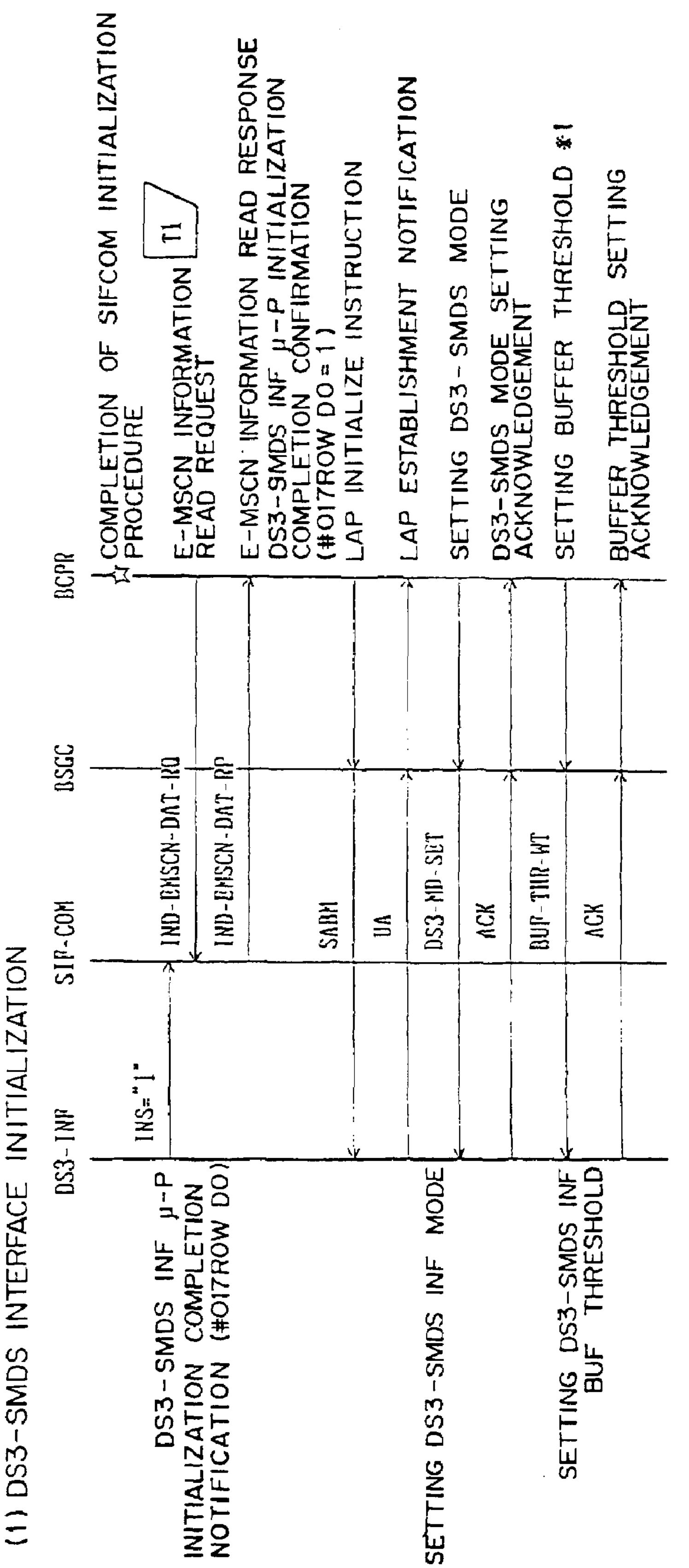
FIG. 70 shows the process sequence of the DS3-SMDS interface (initialization of the DS3-SMDS interface).
Figure 71:
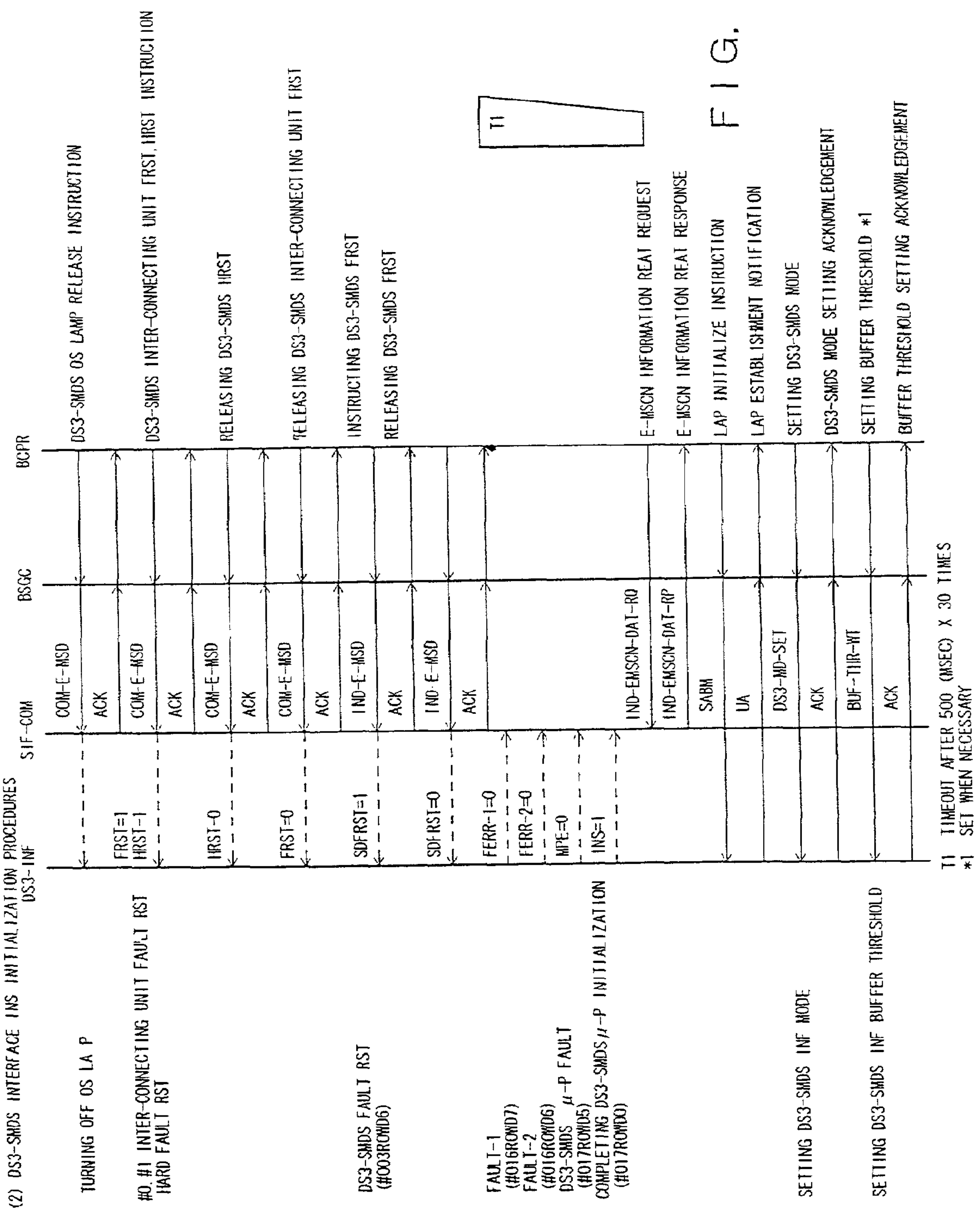
FIG. 71 shows the process sequence of the DS3-SMDS interface (INS procedure of the DS3-SMDS interface).
Figure 72:
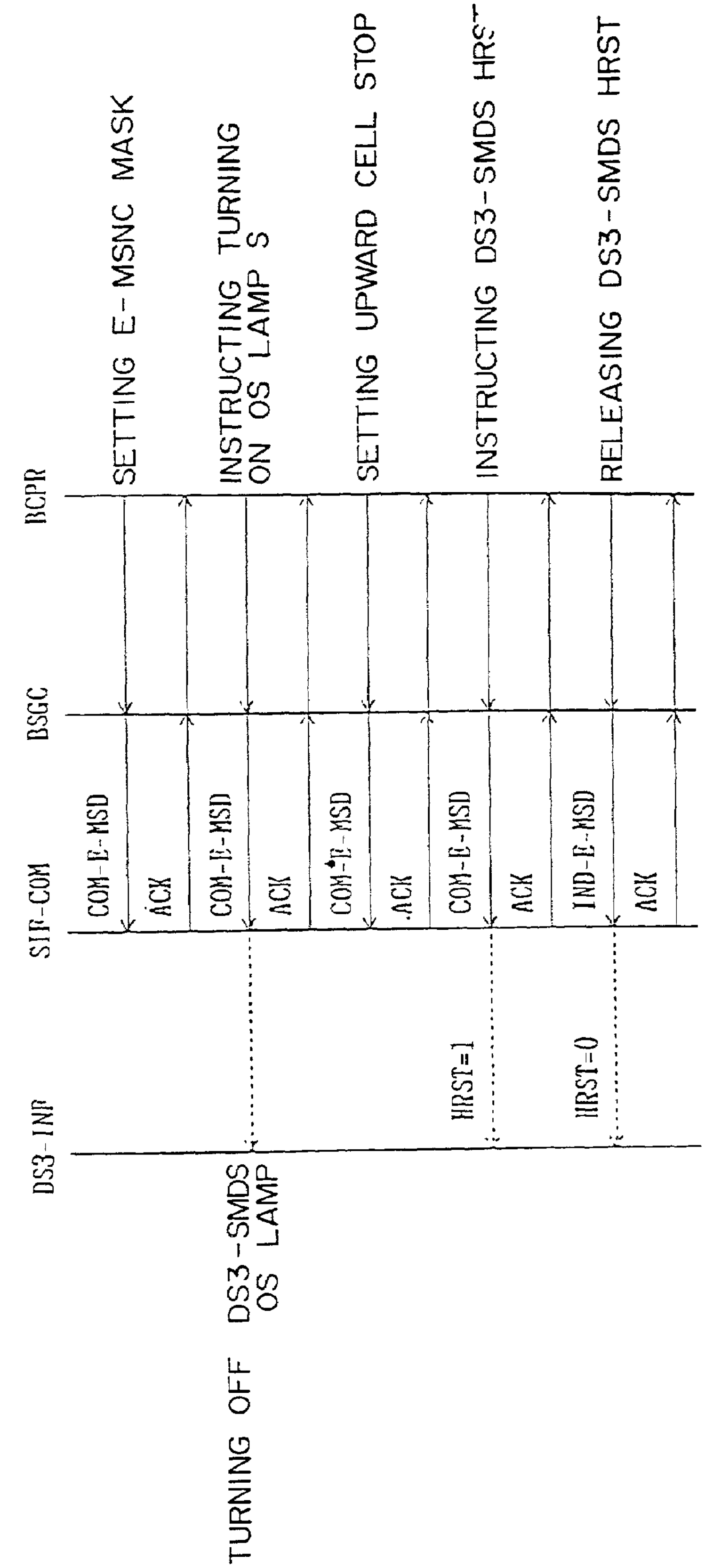
FIG. 72 shows the process sequence of the DS3-SMDS interface (OUS procedure of the DS3-SMDS interface).
Figure 73:
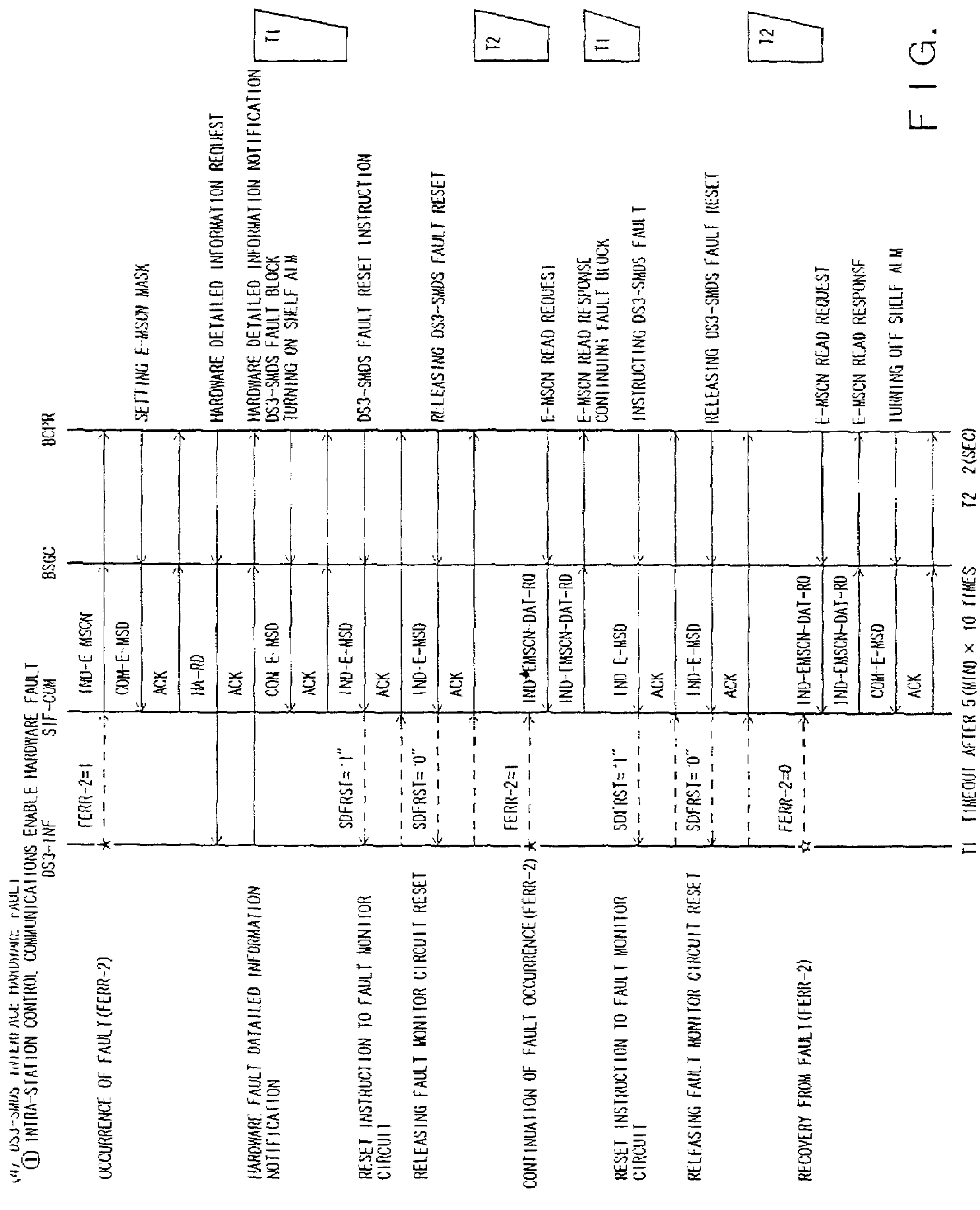
FIG. 73 shows the process sequence of the DS3-SMDS interface (hardware fault/intra-station control communicable hardware fault of the DS3-SMDS interface).
Figure 74:
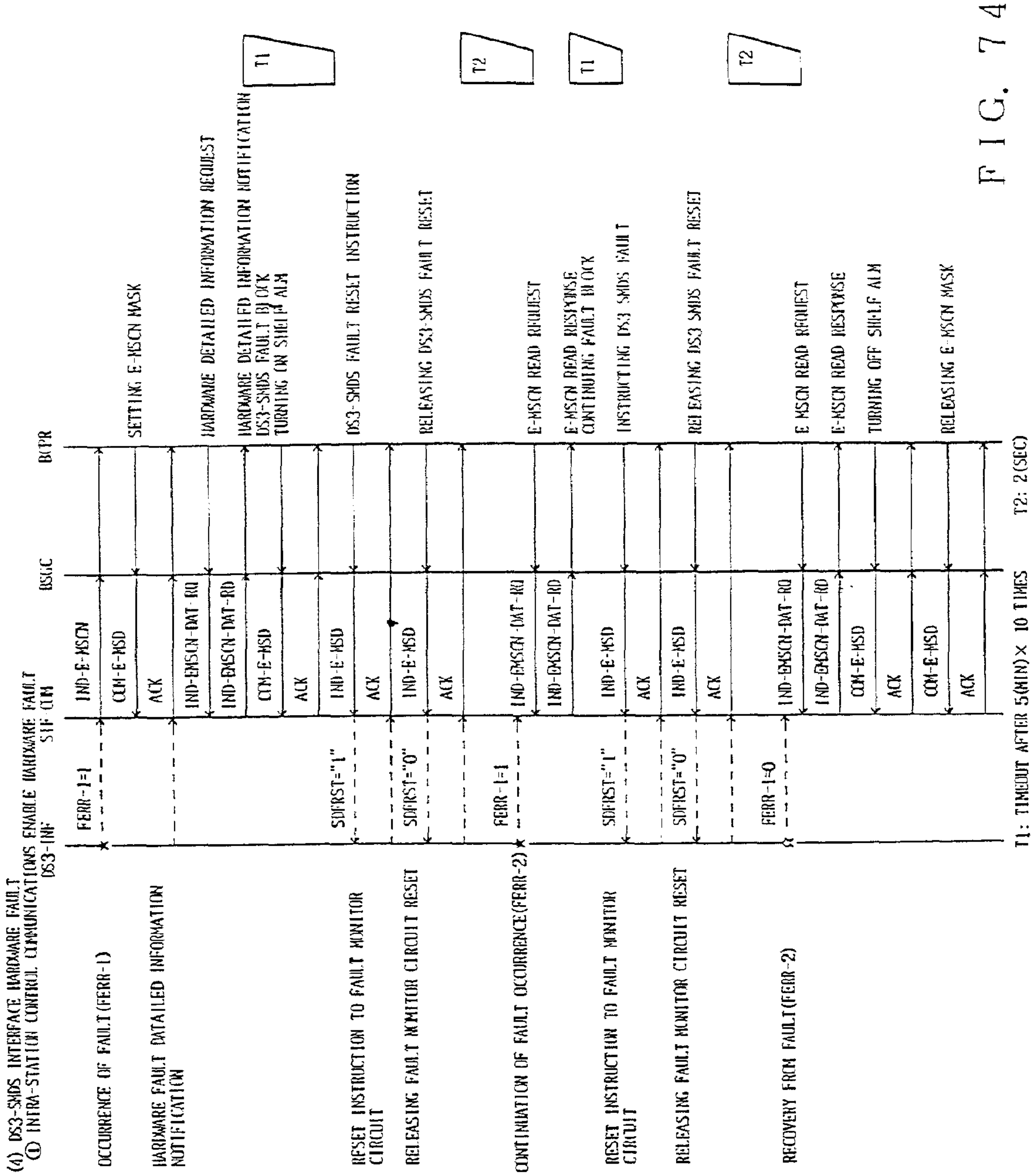
FIG. 74 shows the process sequence of the DS3-SMDS interface (hardware fault/non-intra-station control communicable hardware fault of the DS3-SMDS interface).
Figure 75:
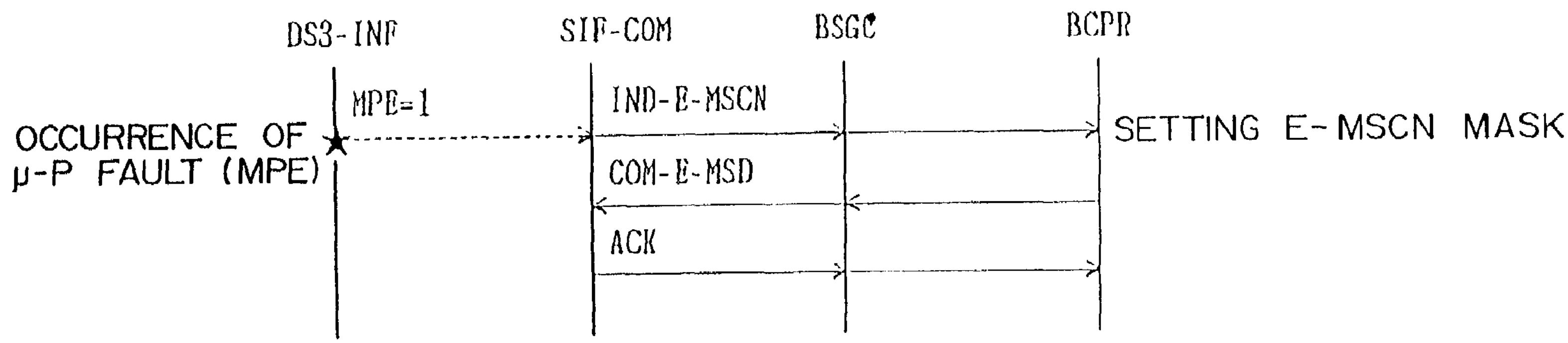
FIG. 75 shows the process sequence of the DS3-SMDS interface (hardware fault/microprocessor fault of the DS3-SMDS interface).
Figure 76:
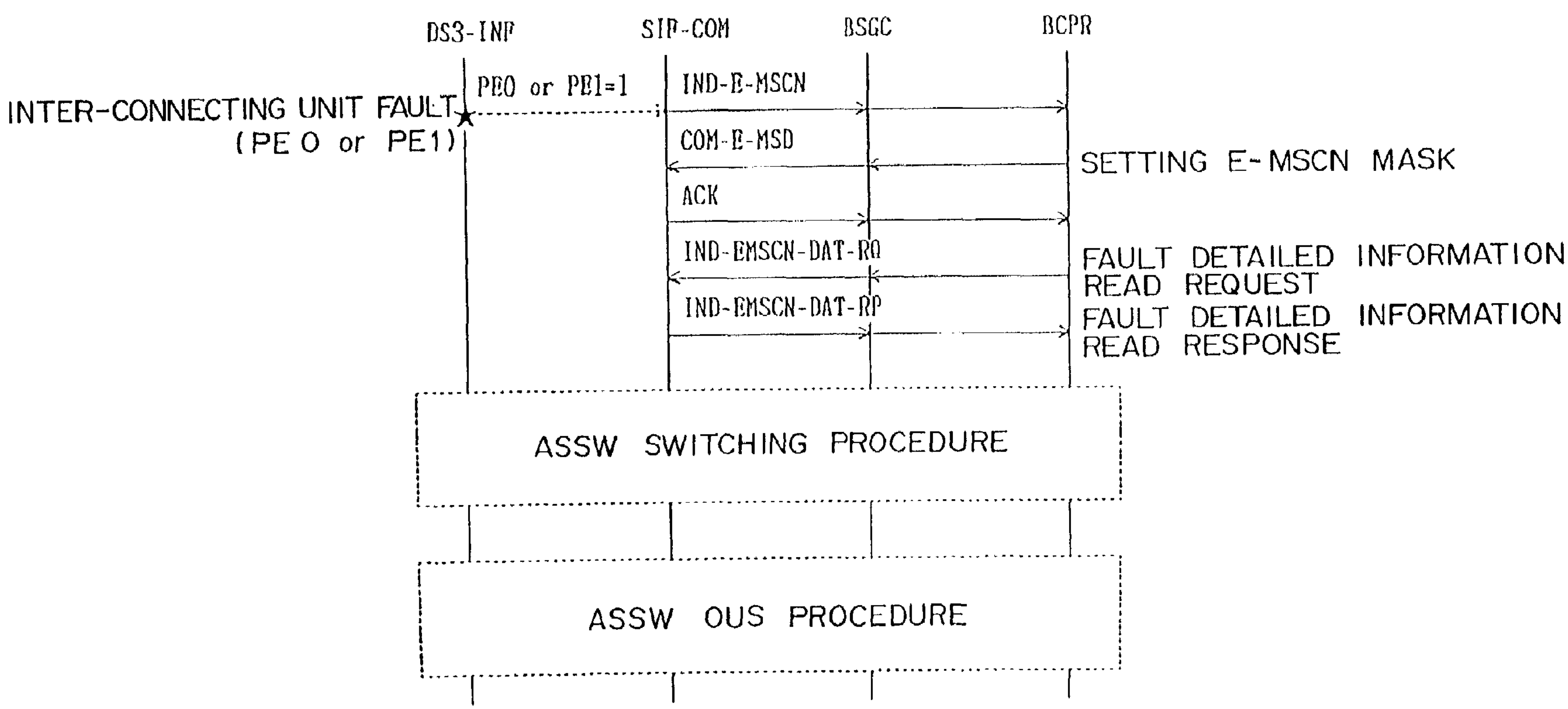
FIG. 76 shows the process sequence of the DS3-SMDS interface (hardware fault/cross-connection fault (in the active state) between the SIFSH common and DS3-SMDS interface of the DS3-SMDS interface).
Figure 77:
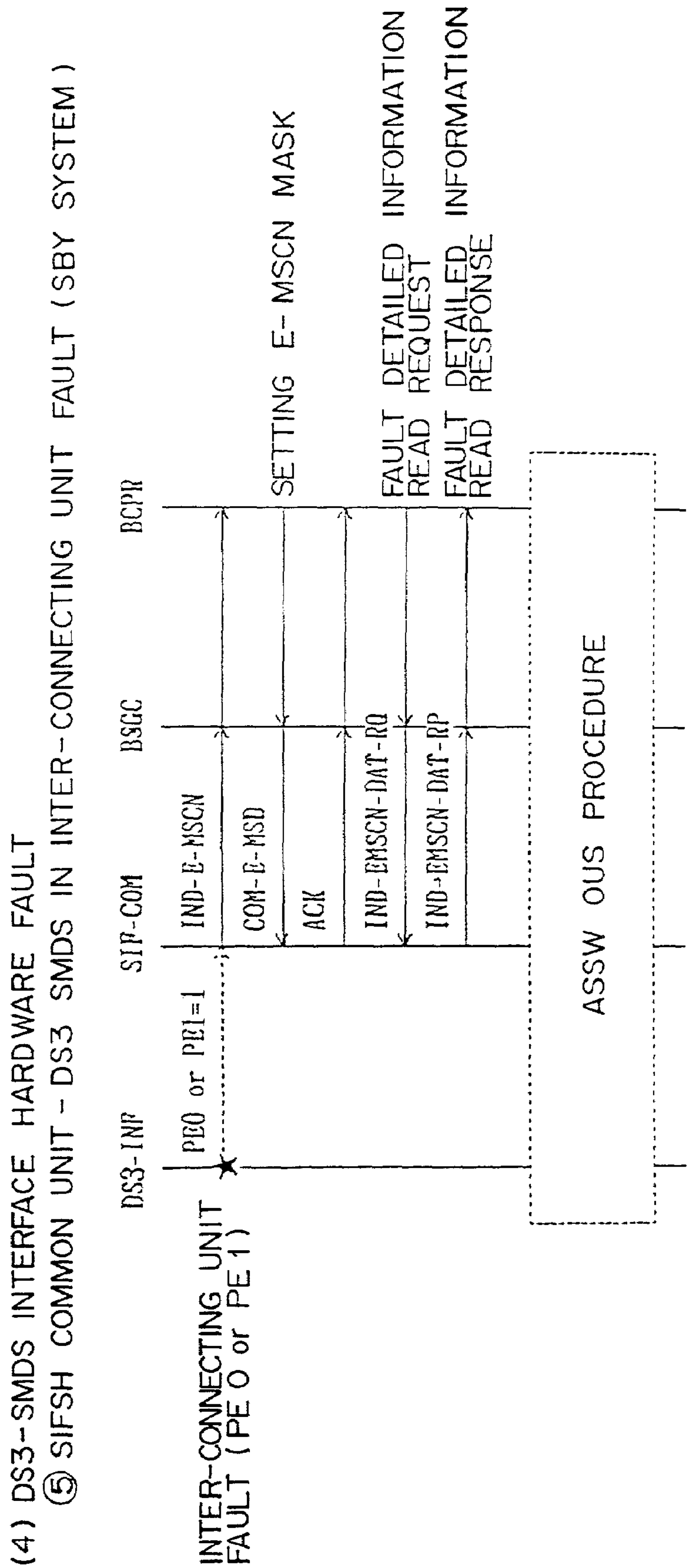
FIG. 77 shows the process sequence of the DS3-SMDS interface (hardware fault/cross-connection fault (in the standby state) between the SIFSH common and DS3-SMDS interface of the DS3-SMDS interface).
Figure 81:
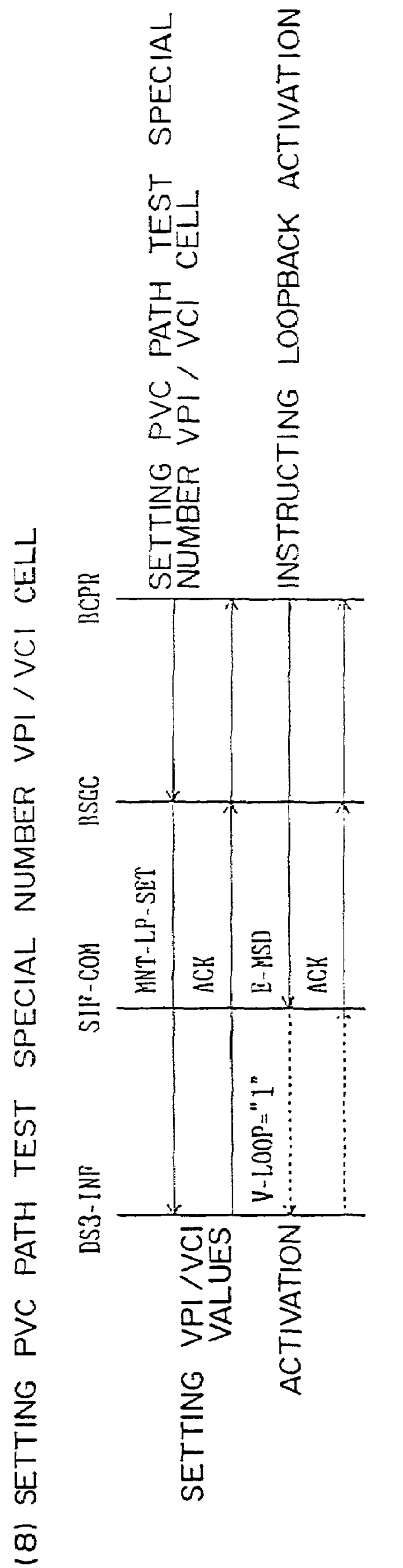
FIG. 81 shows the process sequence of the DS3-SMDS interface (setting a PVC path test special number VPI and VCI cell).

FIG. 69 shows the format of the L3 frame. The frame is transmitted as being stored in the information field of the L2 frame shown in FIG. 68.

10.9.2. Communications Procedure

The procedure of the L3 protocol is followed in a command/response format in which the switch software is a master while the DS3-SMDS interface is a slave. The switch software confirms that the DS3-SMDS interface has received a command by receiving a response to the transmitted command. The DS3-SMDS interface transmits an ACK instead of a response to a command which has no corresponding response. The DS3-SMDS interface generates the value of a transmitted ACK by adding 8000 (HEX) to the received message number. The DS3-SMDS interface does not confirm whether or not the transmitted L3 response has been received by the switch software. If information requires a positive action such as an issue of an alarm, then the information is provided by the DS3-SMDS interface to the switch software using an MSCN.

10.9.3. Control of Errors

To detect an error related to a loss/insertion of a cell in a switch, the switch software adds a sequence number to an L3 frame of each command and transmits it to the DS3-SMDS interface, and the DS3-SMDS interface returns a response corresponding to each sequence number, thereby reserving the command/response correspondence.

11. Management of the state of DS3-SMDS Interface 11.1. Initialization

The DS3-SMDS interface is initialized when the printed wiring circuit board of the DS3-SMDS interface is implemented or powered. Required are the following operations at the initialization.

(1) Setting an SMDS mode (FIG. 33) or an umbilical link mode (FIG. 34) for the DS3-SMDS interface (2) Setting the UNI mode or the ICI and ISSI modes for the DS3-SMDS interface (3) Setting the downward DMUX-LSI buffer threshold (when necessary)

11.2. Blocking

The following processes are performed.

(1) Setting Block Specification (OUS)

11.3. Setting In-Service

The following processes are performed.

(1) Resetting the block specification (OUS)

(2) Setting/resetting master reset (M-RST)

(3) Initialization (4) Confirming that an in-service completion indicator (INS) is set on the E-MSCN service (5) Transferring various initialization data 11.4. Non-Implementation The following processes are performed.

(1) Setting Block Specification (OUS)

11.5. Processes for Faults 11.5.1. Monitor of Faults

A fault of the DS3-SMDS interface is monitored by constantly monitoring both MSCNs, that is, a D-MSCN detected by the DS3-SMDS interface and provided for the switch software through the SIFSH common, and an E-MSCN detected by the SIFSH common relating to the faults of the DS3-SMDS interface. In constantly monitoring the MSCN relating to the faults of the DS3-SMDS interface itself or of the line systems, the MSCN from the SIFSH common of the active system is monitored. In constantly monitoring the MSCN relating to the faults of the DS3-SMDS interface and the faults of the interface of the SIFSH common, the MSCNs from the SIFSH common of both active and standby systems are compared with each other. In the latter case, considering the time difference in arrival of data at both systems, a detected fault in one system is made to wait for the fault information of another system for a predetermined time. The type of MSCN to be constantly monitored is notified of using a change flag of a representative NG-OR point set for each type of fault.

The types of MSCNs to be monitored for faults are listed below, and each type is assigned a representative NG-OR point. The following non-stored alarm may generate a plurality of alarms and therefore are provided with a state change flag.

(1) Hardware Fault . . . stored type 1. specified as a fault of the DS3-SMDS interface
2. specified as a fault of the SIFSH common
3. fault of the interface between the SIFSH common and the DS3-SMDS interface (2) Line System Alarm . . . not stored (3) Threshold Crossing Alert (DS3/PLCP layer) not stored (4) Cell Discard Start Alert in the DS3-SMDS buffer . . . not stored Concerning the stored fault display point, an MSD (SD-FTRST) should be set to reset the fault display on the MSCN. A non-stored fault display point is reset by the hardware corresponding to respective points on the specific condition to each point.

11.5.2. Detection of Faults

The processes to be performed when each of the representative NG-OR points is detected are listed below. At each representative NG-OR point, the detailed information indicating the factor of a fault to display a message can be fetched by referring to another area of the MSCN or by directly inquiring of the individual unit through the intra-station control communications.

(1) At the detection of a hardware fault;

1. The DS3-SMDS interface is blocked when a hardware fault possibly specified as a fault in the DS3-SMDS interface 1 is detected.

2. When a hardware fault possibly specified as a fault in the SIFSH common is detected, an active ASSWSH system is switched to a new system. If the ASSWSH system cannot be switched, then the DS3-SMDS interface for the hardware in which a fault has been detected is blocked as being inoperable for further use. If a fault exists in a new active system after the switch to the new active system, or if a new fault occurs to switch to a new ASSWSH system, then the new active system stops monitoring faults in the SIFSH common and the DS3-SMDS interface for the system is blocked as being inoperable. In this case, the ASSWSH system is not switched back to the replaced system.

3. If a hardware fault is detected in the interface for the SIFSH common, then one of the following determinations is made according to the MSCN information detected and displayed in both DS3-SMDS interface and SIFSH common, and an appropriate action is taken based on the determination.

(a) A fault which is possibly a DS3-SMDS interface fault

The DS3-SMDS interface is blocked.

(b) A fault which is possibly a SIFSH common fault

An ASSWSH system to be active is switched.

(c) A fault which is hardly determined to be a DS3-SMDS interface fault or an SIFSH common fault.

The DS3-SMDS interface is blocked.

(2) At the detection of a line system alarm;

The DS3-SMDS interface is blocked.

(3) At the detection of a threshold crossing alert and a cell discard start alert (cells are discarded in buffer)

Since the MSCN displays data based on a predetermined statistics process in the hardware, messages are displayed based on the displayed data. 11.5.3. Specifying a fault (1) When the ASSWSH is processed as OUS;

A fault is specifies by automatic diagnostics of a faulty ASSWSH system.

(2) When the DS3-SMDS interface is blocked;

Online diagnostics is conducted on the DS3-SMDS interface and a fault is specified. If no faults are confirmed by the online diagnostics, then an ASSWSH system is switched and the diagnostics is manually carried out. A series of processes are manually performed. The online diagnostics refers to the diagnostics actually performed by a A switch processor (CC) of an active system regardless of the state of the DS3-SMDS interface.

11.5.4. Monitor of Recovery (1) ASSWSH and DS3-SMDS Interface

These units are recovered when they are changed from the OUS state to the INS state. If the active system is operated in a faulty state because of the faults detected in both of duplex SIFSH common systems, then the active SIFSH common system is monitored for faults.

(2) Line System Alarm

An MSCN monitor constantly monitors the recovery of units. If no blocking factors exist at the time of recovery, a blocked DS3-SMDS interface is released.

(3) Threshold Crossing Alert (DS3/PLCP Layer)

Since an automatic recovery is made at a predetermined timing, recovery is not monitored.

(4) Cell Discard Start Alert in Buffer

Recovery is constantly monitored through the monitor of the MSCN.

11.6 Various Process Sequence

FIGS. 70 through 81 show the sequence of the following processes.

(1) Initialization of DS3-SMDS interface (2) Procedure of INS of DS3-SMDS interface (3) Procedure of OUS of DS3-SMDS interface (4) Hardware Fault of DS3-SMDS interface 1. Hardware fault which enables intra-station control communications
2. Hardware fault which disables intra-station control communications
3. Micro processor fault
4. Communications error between the SIFSH common and the DS3-SMDS interface (active system)
5. Communications error between the SIFSH common and the DS3-SMDS interface (standby system)

(5) DS3/PLCP layer alarm process (6) Notification of D/Q Timer (counting every 15 minutes and every day) at the generation of DS3/PLCP TCA (threshold crossing alert); and Collection of PM Data (7) Notification of D/Q Timer at the generation of DS3-SMDS interface buffer alarm; and Collection of Buffer Data (8) Setting PVC path test special number VPI/VCI cell 12. Congestion Control of DS3-SMDS Interface Buffer The following interfaces function at the printed wiring circuit board of the DS3-SMDS interface.

(1) DS3 SMDS User Network Interface (UNI) interface (3) DS3-SMDS inter-exchange carrier interface (ICI) interface (3) DS3-SMDS inter-switching system interface (ISSI) interface (4) DS3 umbilical link interface If the interfaces (1) through (3) among these interfaces are realized, the DS3-SMDS interface is connected to the SBMESHH and the GWMESH (FIG. 8). Therefore, since the ATM cell transmitted according to the access class of the SMDS is shaped, no overflow occurs in the buffer in which the bit rate is converted from 156 Mbps to 45 Mbps in the DS3-SMDS interface.

However, if the DS3 umbilical link interface of (4) is realized, the lines such as DSI-SMDS, DS1-frame relay, etc. are accommodated. As a result, an overflow can be caused by the input of the burst data in the buffer which is provided in the DS3-SMDS interface and converts the bit rate from 156 Mbps to 45 Mbps.

Therefore, the DS3-SMDS interface controls the congestion in the buffer in which the bit rate is converted from 156 Mbps to 45 Mbps based on the pattern of each value of the P bit and CON bit displayed in the tag area in the header of the ATM cell in the format shown in FIG. 56.

The control data of the buffer is set by the switch software as the E-MSD information through the intra-station control communications. Nine levels of threshold should be set to perform the quality control of the buffer and the priority control. Listed below are the settings of the thresholds.

(1) Q0: physical FULL (2) Q1: logical FULL (3) QA: cell discard start threshold with P bit=0, CON bit=0

(4) QB: cell discard start threshold with P bit=1, CON bit=0

(5) QC: cell discard start threshold with P bit=0, CON bit=1

(6) QD: cell discard start threshold with P bit=1, CON bit=1

(7) QA': cell discard start threshold with P bit=0 CON bit=0

(8) QB': cell discard start threshold with P bit=1, CON bit=0

(9) QC': cell discard start threshold with P bit=0, CON bit=1

(10) QD': cell discard start threshold with P bit=1, CON bit=1

Figure 82:
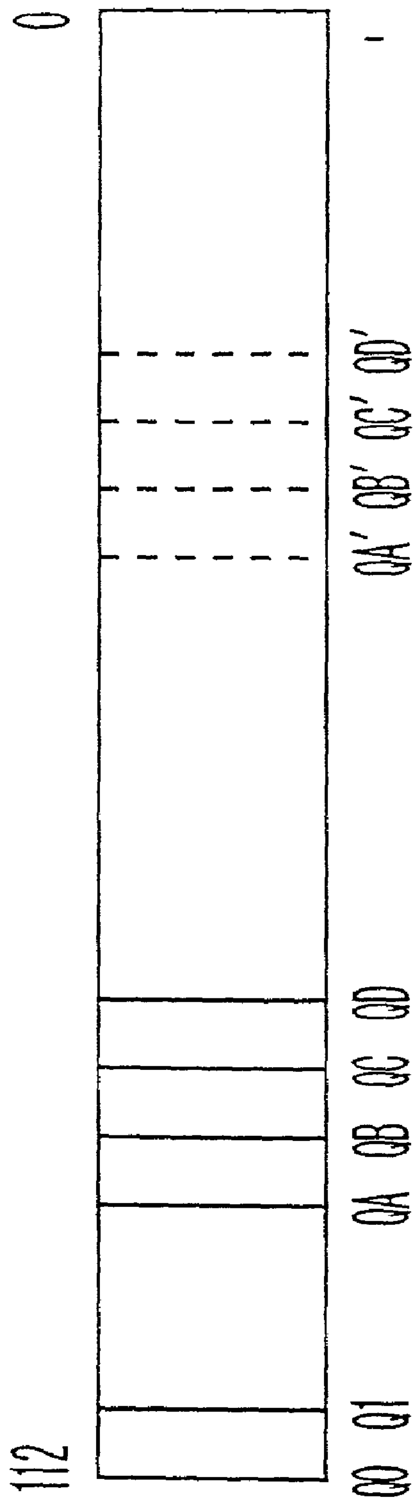
FIG. 82 shows the discard start/release threshold for the above described cell in the buffer.

FIG. 82 shows the cell discard start/release threshold of the buffer.

The thresholds Q1, QA, QB, QC, QD, QA', QB', QC', and QD' are set through the intra-station control communications, and the cell discard is set and discarded as follows.

(1) When the queue length exceeds the threshold, the state is provided for the microprocessor in the DS3-SMDS interface, thereby notifying the switch software through the intra-station control communications that the cell discard is started. At the insertion of the DS3-SMDS interface PKG and at the reset of the hardware, the cell discard start threshold is set to the value of the maximum buffer length, that is, the initial value.

(2) If the queue length has been recovered to the cell discard release value, then the state is provided for the microprocessor, thereby notifying the switch software through the intra-station control communications that the cell discard release is started.

(3) If the queue length has reached the threshold Q1, then the microprocessor is notified of the occurrence of a fault, and even a valid cell is controlled to be prevented from being written into its buffer.

(4) Each threshold should be set through the intra-station control communications with the following conditions satisfied.

Q0>Q1>QA>QA'>0 Q0>Q1>QB>QB'>0

Q0>Q1>QC>QC'>0 Q0>Q1>QD>QD'>0

13. Test and Maintenance 13.1. Loopback Function of DS3-SMDS Interface

The DS3-SMDS interface printed circuit board (PCB) has the following four loopback functions for proper sequence and maintenance operations.

Figure 83:
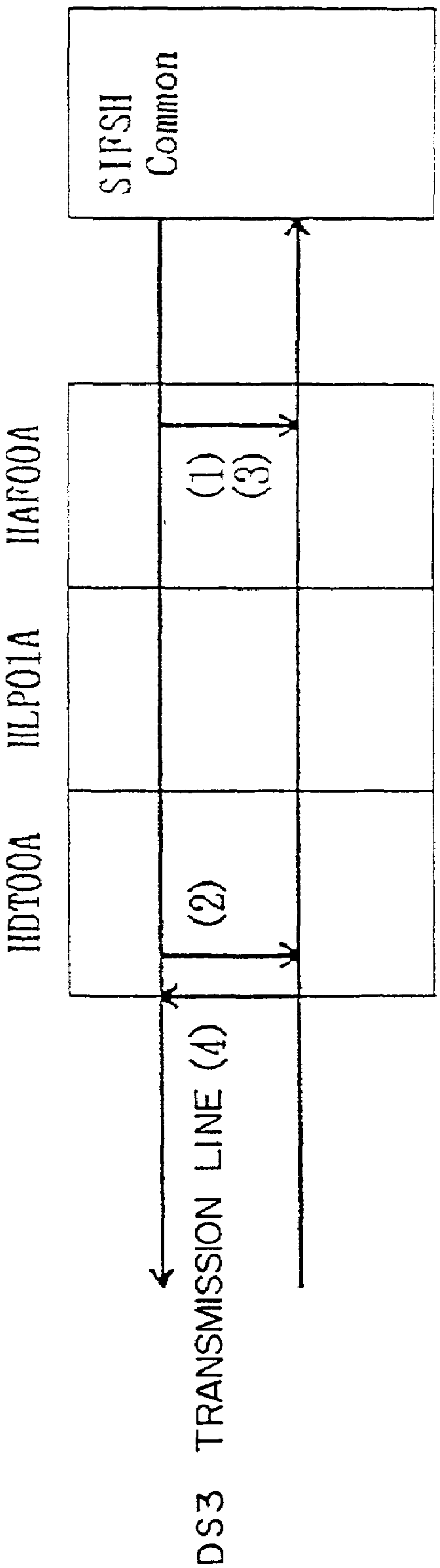
FIG. 83 shows the implementation position of the above described loopback function in the DS3-SMDS interface PCB.

(1) Loopback function of a cell with a 0 bit added to its tag area (2) Loopback function of all cells (3) Loopback function of a cell assigned a specific VPI/VCI (4) Line Loopback function FIG. 83 shows the implementation position of the loopback function in the DS3-SMDS interface (FIG. 45).

13.1.1. Loopback Function of a cell with 0 bit added at tag area

The DS3-SMDS interface has the loopback function of a cell with a 0 bit added to its tag area. The cell with a 0 bit added to its tag area is generated by a test cell generator (TCG) for a circuit test. Since the DS3-SMDS interface passes only an ATM cell of an active system, a circuit test cell is entered through the ASSWSH of the active system.

The activate and stop instruction of the loopback function is issued through the 0-LOOP bit in the E-MSD shown in FIGS. 58 and 59. However, according to the configuration of the hardware, the loopback function of a cell having the 0 bit and the loopback function of a cell having the specific VPI/VCI cannot be activated simultaneously.

13.1.2. Loopback Function of All Cells

The DS3-SMDS interface has the loopback functions of all cells at the position (HAF00A or HDT00A shown in FIG. 45) indicated as (1) or (2) in FIG. 83. The loopback function should be activated after the DS3-SMDS interface is blocked.

The loopback function activate instruction is issued through the LOOP-1 bit (for position (1)) or the LOOP-2 bit (for position (2)) shown in FIGS. 58 and 59 using the E-MSD terminating the SIFSH common.

The loopback function enables a transmission test to be performed on an ATM cell including DS3/PLCP layer data. However, if the DS3-SMDS interface is operating in a DS3-SMDS service mode (as shown in FIG. 33), then the DS3-SMDS interface passes only the ATM cell having VPI=3F and VCI=03FF (refer to FIGS. 7, 10, and 55). Therefore, the values of VPI and VCI should be set for the cell entered in the DS3-SMDS interface at the test.

13.1.3. Loopback Function of Cell Having Specific VPI/VCI

The DS3-SMDS interface has the loopback function of the cell assigned a specific VPI/VCI at the position (HAF00A shown in FIG. 45) to which a transmission line is connected from the SIFSH common shown as (3) in FIG. 83.

At the activation of the loopback function, the values of specific VPI/VCI are provided through intra-station control communications. Simultaneously looped back in this loopback function are only the ATM cells having one set of values of VPI/VCI. Therefore, to test the values of another set of VPI/VCI, the loopback function should be activated again after setting the values.

The activation and stop of the loopback function are directed by the V-LOOP bit in the E-MSD shown in FIGS. 58 and 59.

13.1.4. Line Loopback Function

Figure 84:
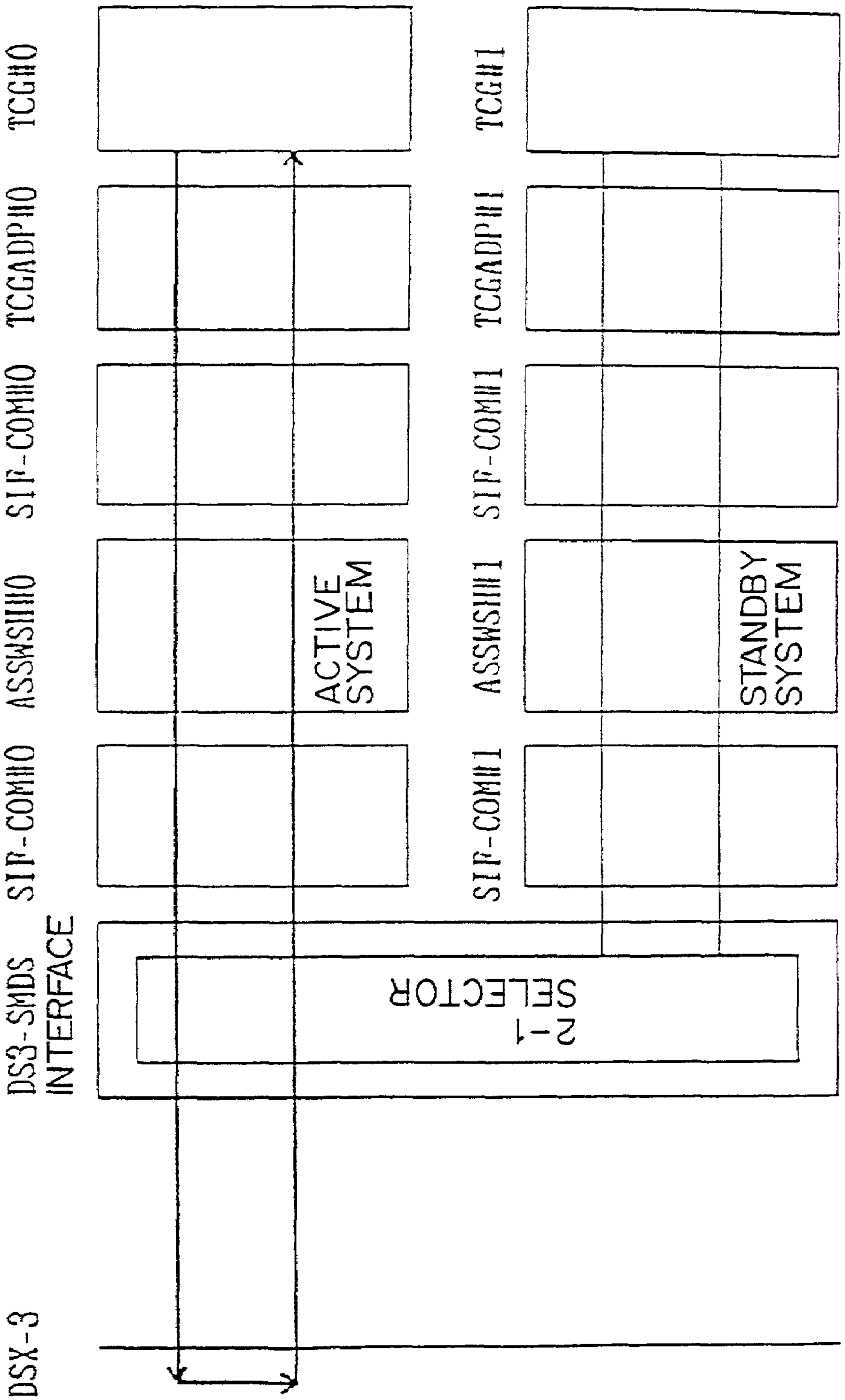
FIG. 84 shows the outline of the line loopback test in the DSX-3.

The DS3-SMDS interface has the function of looping back the signal input via the DS3 PCM line (DS3 transmission line) at the position (HDT00A shown in FIG. 45) indicated corresponding to (4) in FIG. 84.

The activation of the loopback function is directed by the LOOP-3 bit in the E-MSD shown in FIGS. 58 and 59.

The loopback function is used to confirm the normality of the DS3 PCM line in, for example, a construction test.

13.2. Test Method

Listed below are methods of testing the DS3-SMDS interface using various loopback functions explained above.

(1) DS3-SMDS line loopback test
(2) Active system on-demand test
(3) PVC path circuit test
(4) DS3-SMDS interface test and diagnostics 13.2.1. DS3-SMDS Line Loopback Test The line loopback test performed by the DS3-SMDS interface can be realized by a manual loopback test at the DSX-3 and a loopback test at the RCL.

(1) Line Loopback Test at DSX-3

In this test, an ATM cell is tested in acceptability, line quality, etc. by manually activating the loopback function at the distribution panel digital signal cross-connect (DSX)-3. To realize the test, a test cell having a random test pattern is generated at the TCG after setting a path between the test cell generator (TCG) and the DS3-SMDS interface, and the test cell is transmitted to the path.

FIG. 84 shows the outline of the line loopback test of the DSX-3.

(2) Line Loopback Test at RLC

In this test, an ATM cell is tested in acceptability, line quality, etc. by manually activating the loopback function at the remote line concentrator (RLC). To realize the test, as in the test explained in (1) above, a test cell having a random test pattern is generated at the TCG after setting a path between the TCG and the DS3-SMDS interface, and the test cell is transmitted to the path.

Figure 85:
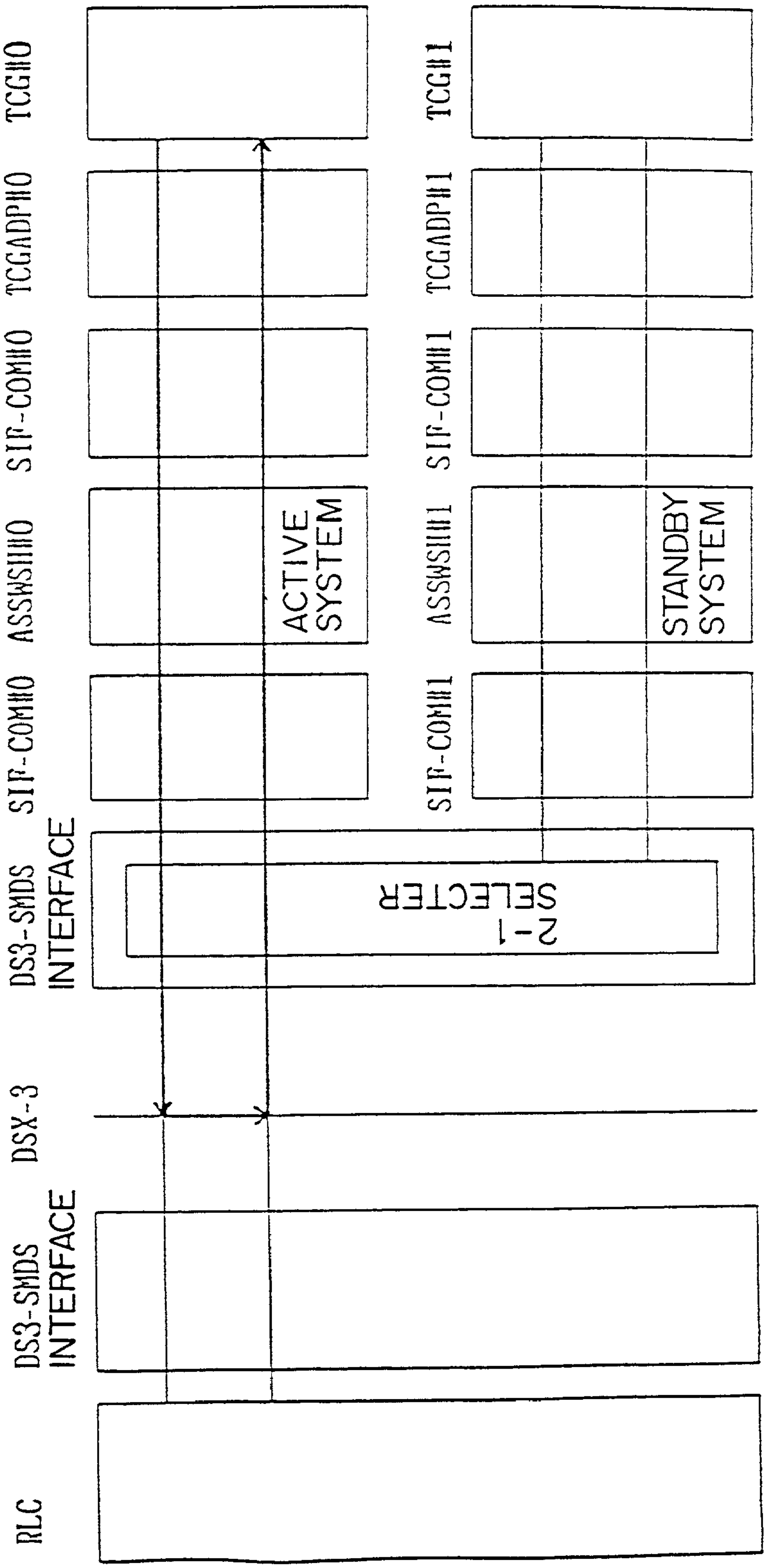
FIG. 85 shows the outline of the line loopback test in the RLC.

FIG. 85 shows the outline of the line loopback test at the RLC.

13.2.2. Active system on-demand test

The active system on-demand test is conducted at the occurrence of a fault of the DS3-SMDS interface to specify a faulty point by entering a command of a maintainer. In this case, the loopback function explained in 13.1.1. is activated, a cell is generated with a 0 bit added in the tag area in the TCG, and the DS3-SMDS interface loops back only the cells having the 0 bit. Checking this state specifies the faulty point.

13.2.3. PVC Path Circuit Test

If the DS3-SMDS interface operates in a mode of providing DS3-SMDS services (as shown in FIG. 33), then the DS3-SMDS interface is connected to the SBMESH and GWMESH through a permanent virtual circuit (PVC). To conduct a path circuit test of PVC, the DS3-SMDS interface is blocked first. Then, activated is the loopback function described in 13.1.2. by the LOOP2 bit in the E-MSD shown in FIGS. 58 and 59. Then, the SBMESH and GWMESH generate a test cell assigned the same VPI/VCI as the PVC, and transmits the cell to the DS3-SMDS interface, thereby confirming the path circuit test of the PVC.

Figure 86:
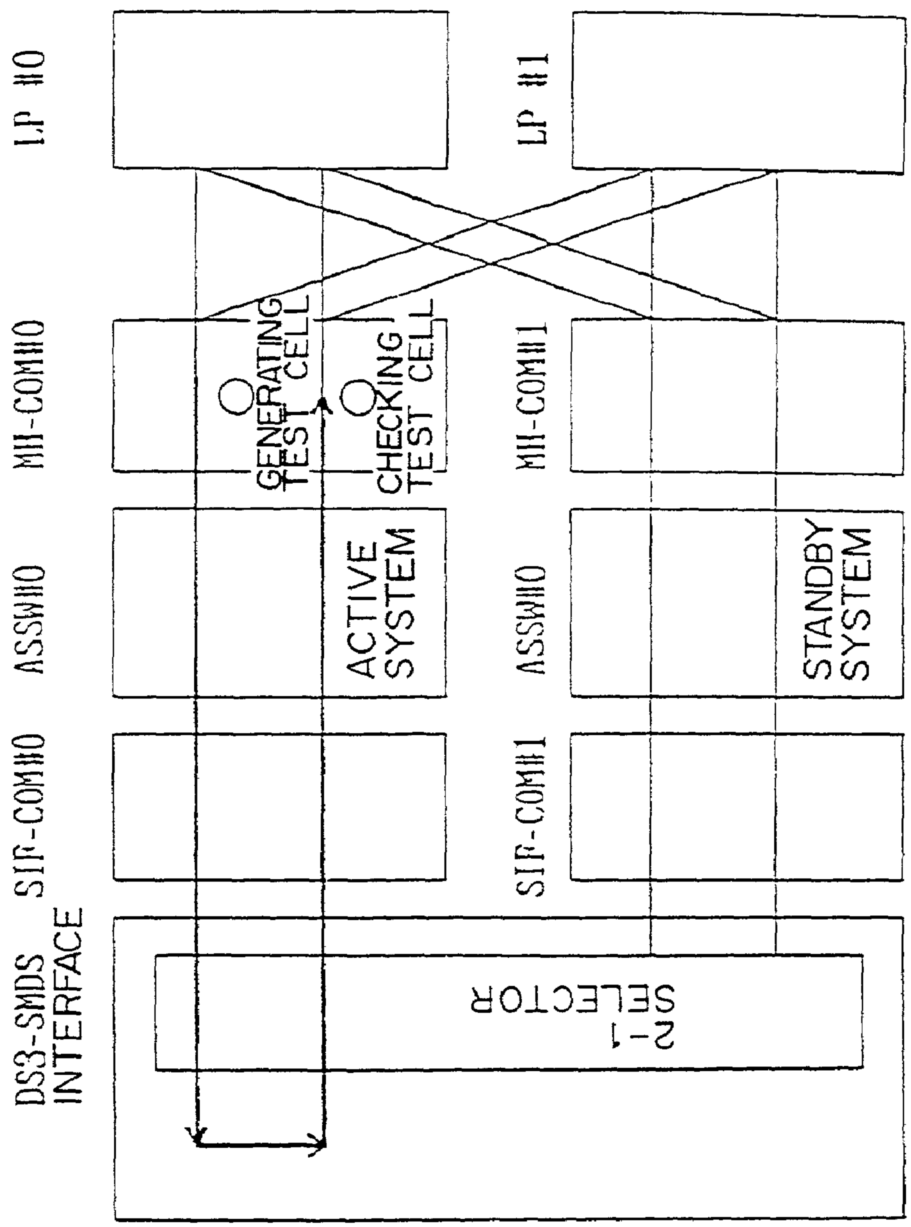
FIG. 86 shows the outline of the path continuity test of the PVC between the DS3-SMDS interface and the SBMESH and GWMESH.

FIG. 86 shows the outline of the pass circuit test of the PVC between the DS3-SMDS interface and the SBMESH and GWMESH. In FIG. 86, the MH-COM corresponds to the SBMESH or GWMESH.

13.2.4. Tests and Diagnostics of DS3-SMDS Interface

Listed below are the tests and diagnostics of the printed circuit board of the DS3-SMDS interface.

(1) ATM cell acceptability test in DS3-SMDS interface
(2) Hardware normality confirmation test in DS3-SMDS interface 13.2.4.1. ATM Cell Acceptability Test in DS3-SMDS Interface The DS3-SMDS interface is blocked first to conduct an ATM cell acceptability test in the DS3-SMDS interface PCB. Then, the loopback function explained in 13.1.2. is activated by the LOOP-1 or LOOP-2 bit in the E-MSD shown in FIGS. 58 and 59.

Listed below is the procedure of the ATM cell acceptability test in the DS3-SMDS interface.

(1) The DS3-SMDS interface PCB is blocked (OUS: out of service).
(2) The SIFSH common sets LOOP-1 or LOOP-2 in the E-MSD.
(3) Settings of LOOP-1 or LOOP-2 are confirmed.
(4) A path is set between the DS3-SMDS interface and the TCG.
(5) A cell is transmitted from the TCG.
(6) A test cell from the DS3-SMDS interface to the TCG is confirmed.
(7) LOOP-1 or LOOP-2 is released.
(8) The release of LOOP-1 or LOOP-2 is confirmed.
(9) The path between the DS3-SMDS interface and the TCG is released.

13.2.4.2 Hardware Normality Confirmation Test

The DS3-SMDS interface PCB is loaded with the self-diagnostics function to confirm the normality of its hardware. By activating the self-diagnostics function, the normality of the hardware of the simplex portion (excluding the communications unit) of the DS3-SMDS interface can be confirmed.

Listed below are the steps of the self-diagnostics of the hardware in the DS3-SMDS interface.

(1) Initialization
(2) Checking the SRAM
(3) Checking the dual port RAM (simple LAPD process)
(4) Read/write check of each LSI loaded on the DS3-SMDS interface
(5) Pseudo-fault check on each checker loaded on the DS3-SMDS interface The activation of the self-diagnostics function of the DS3-SMDS interface is directed by the DS3DEC bit in the E-MSD shown in FIGS. 58 and 59. The termination of the self-diagnostics is indicated by the TSTEND bit in the E-MDCN shown in FIGS. 61 and 63. The result of the self-diagnostics is also indicated by the TSTIND bit in the E-MSCN. After the self-diagnostics, the DS3-SMDS interface enters a wait-for-reset state, and the state is released by a hardware reset or microprocessor reset. The self-diagnostics function can be activated only by the DS3DEC bit in the E-MSD shown in FIGS. 58 and 59, but cannot be activated even if the DS3-SMDS interface is powered and reset. The self-diagnostics time of the DS3-SMDS interface requires about 12 seconds after setting the DS3DEC bit ON. Therefore, a total of about 15 seconds are required after the DS3DEC bit is set ON before the result is displayed.

14. Fault Correction 14.1. Fault Detection Point and Notification System

Listed below are the fault detection and notification system for each fault state as being associated with each fault correction process in the DS3-SMDS interface loaded in the subscriber interface shelf (SIFTH).

14.1.1. Contents of Faults (1) OBP fault (OBP fault loaded on each package)
(2) Fault of lost packages
(3) Fault of disconnected fuse
(4) Fault of erroneous insertion of package
(5) Fault of individual unit package (fault of simplex unit)

14.1.2 OBP Fault

Figure 87:
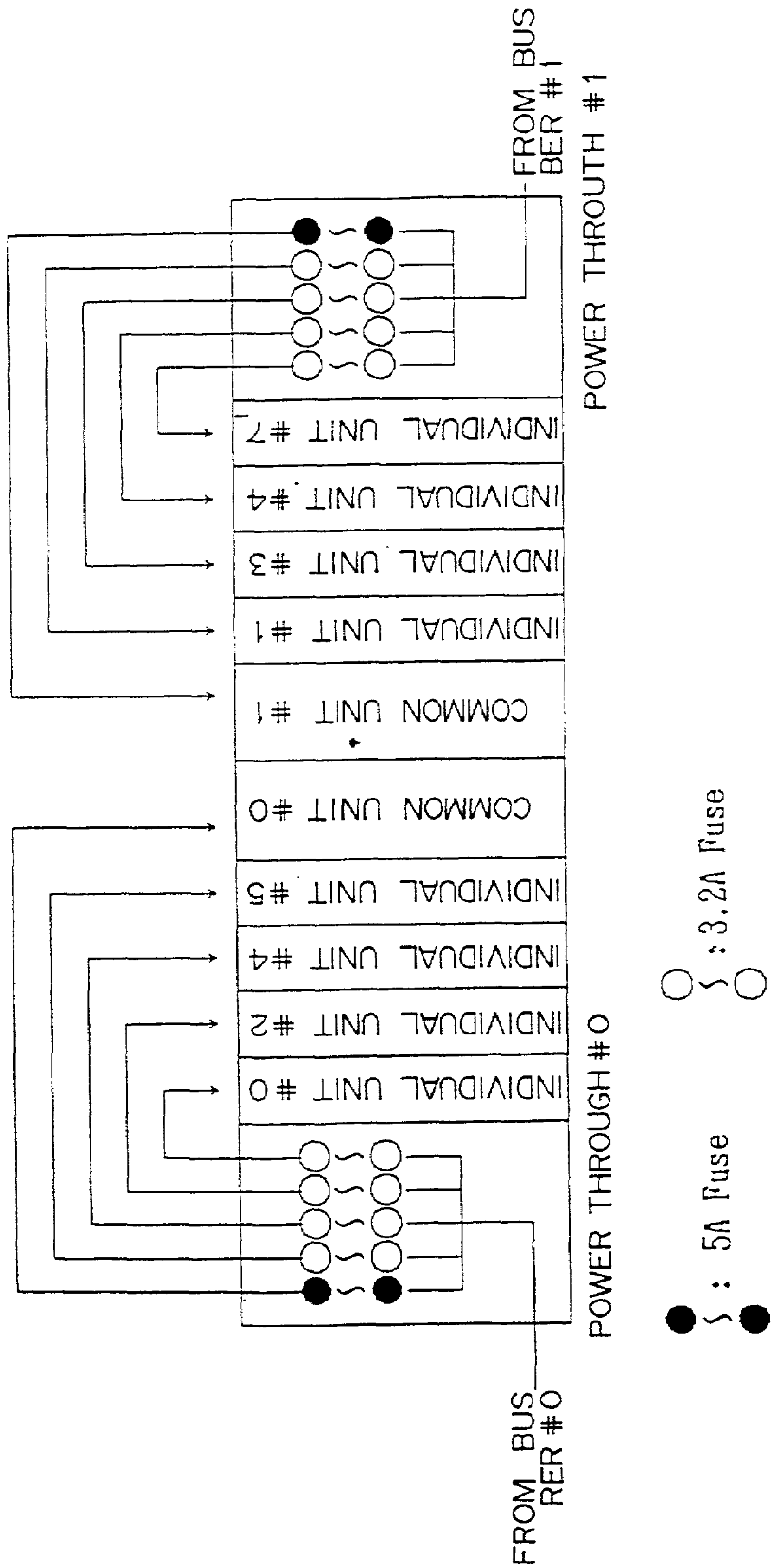
FIG. 87 shows the configuration of the SIFSH.

In the SIFSH, power-through packages are loaded separately on both sides of the shelf as shown in FIG. 87. Electric power is supplied for a half shelf independently.

14.1.3. OBP Fault in Individual Unit (DS3-SMDS Interface)

A fault of an OBP (power source) loaded on the DS3-SMDS interface 1 is detected in the SIFSH common (SIFCOM, common unit) in both active and standby systems. The fault is detected by monitoring the display of the individual unit OBP fault register in the SIFSH common and the occurrence of a stack in the E-MSCN highway.

An output of the LED output terminal unit of the OBP indicates an open state in a normal operation and a ground state in an abnormal operation. When an output of the LED terminal unit indicates the ground state, a fault value is set in the OBP fault register.

Figure 88:
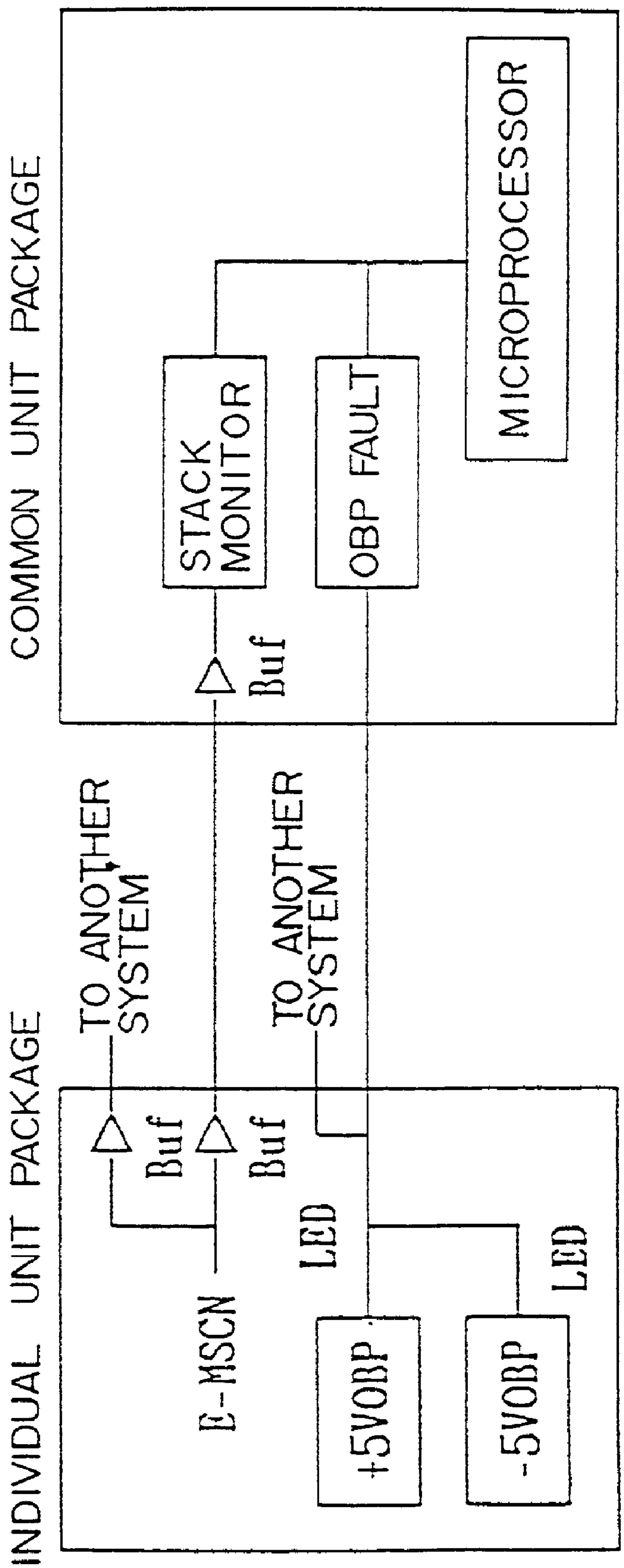
FIG. 88 shows the configuration of the OBP monitoring function of the individual unit.

FIG. 88 shows the configuration of the OBP monitoring function in the individual unit.

(1) +5V OBP Fault

If a +5V OBP fault has arisen in the DS3-SMDS interface individual unit, then a serial highway for the extended maintenance scanner (E-MSCN) information to be provided for the SIFSH common is blocked with a stack. There are representative points indicating the IDs of the individual units in the E-MSCN, and the occurrence of a stack for the points is monitored by the SIFSH common. Therefore, if the SIFSH common detects the indication of a fault through the OBP fault register and detects an occurrence of a stack in the E-MSCN highway, then a +5V OBP fault is detected.

(2) −5.2V OBP Fault

If the SIFSH common detects a fault indication through the OBP fault register and does not detect an occurrence of a stack in the E-MSCN highway, then a −5.2V OBP fault is detected.

14.1.4. Package Missing Fault

A package missing fault with a package which forms part of the DS3-SMDS interface 1 is detected by the SIFSH common of both active and standby systems. The fault is actually detected by monitoring the display of the individual unit OBP fault register in the SIFSH common and the occurrence of a stack in the E-MSCN highway. Each individual unit comprises a plurality of packages. If there is a package missing among a plurality of packages, then the +5V power source to be provided in the entire package group in the individual unit is not induced. Accordingly, the SIFSH common monitors the items indicating the ID point of the individual unit in the E-MSCN toward the SIFSH common to detect all "H" (high level) for the items. Then, the SIFSH common determines a package missing only if it receives a package missing notification from the SIFSH common of both active and standby systems. If the SIFSH common receives the package missing notification from only one of the systems, then it determines that an interface fault has occurred between the individual unit and the SIFSH common. The state is checked when the systems are switched.

Figure 89:
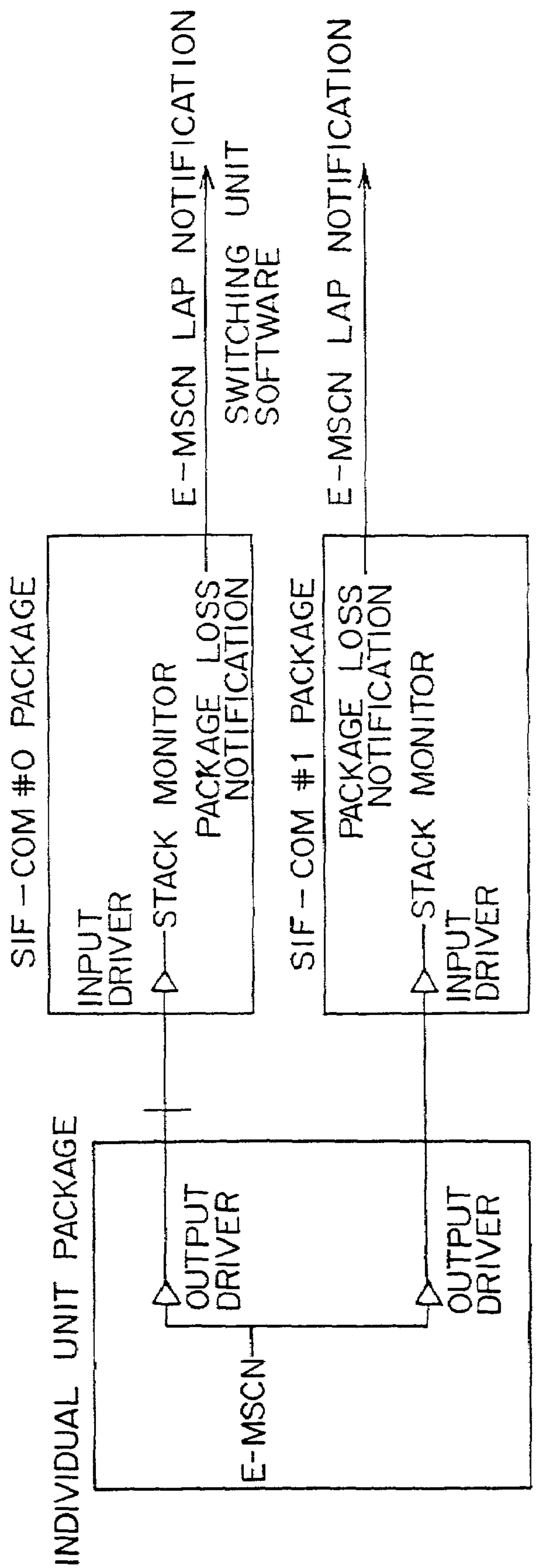
FIG. 89 shows the configuration of the function of monitoring a missing package.

FIG. 89 shows the configuration of the package missing monitoring function.

14.1.5. Fuse Disconnection Fault

The individual unit fuse provided for the power package is individually monitored in the SIFSH common of both active and standby systems. An alarm contact-point loop checked by a disconnection of the fuse is monitored in the SIFSH common of both systems.

Figure 90:
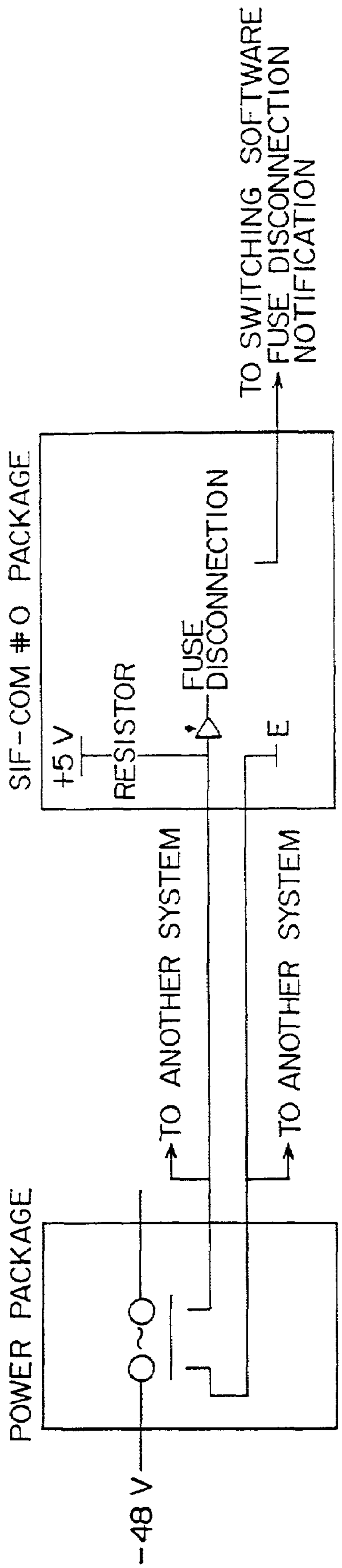
FIG. 90 shows the configuration of the function of monitoring fuse disconnection in the common unit

FIG. 90 shows the configuration of the fuse disconnection monitoring function in the SIFSH common.

The disconnection of a fuse causes a package missing fault to be detected because a highway stack simultaneously occurs in a corresponding individual unit. However, a fuse disconnection fault is detected by priority by the firmware in the SIFSH common, and the switch software is notified only of the occurrence of a fuse disconnection fault.

14.1.6. Package Error Insertion Fault

In the SIFSH, a package group comprising a plurality of packages in the individual unit and the SIFSH common can have the configuration in which the OBP can be activated only if all packages are inserted. Therefore, even if a package is erroneously inserted, the shelves are not successfully operated but the packages and their circuit elements are not destroyed.

14.1.7. DS3-SMDS Interface Individual Unit Package Fault

There are following two types of hardware faults of a package in the DS3-SMDS interface individual unit.

(1) Hardware fault notified of through the intra-office control communications using the E-MSCN from the SIFSH common
(2) Hardware fault notified of through the intra-office control communications from the DS3-SMDS interface First, listed below are the points in the C-MSCN shown in FIGS. 61 through 63 as being related to the faults defined by (1) above.

1. MPE (micro-processor fault)
2. FEER-1 (fault indicating that the intra-station control communications cannot be established by the DS3-SMDS interface)
3. UH19M (SIFSH common transmission click fault)
4. UHDPT (upward highway data parity error fault)
5. EGPTY (intra-station control communications terminal LSI fault)

Next, listed below are the points in the C-MSCN shown in FIGS. 61 through 63 as being related to the faults defined by (2) above. The DS3-SMDS interface is required to read detailed data through the intra-station control communications and notifies the switch software of the data so that the SIFSH common can notify the switch software of the NG OR condition.

1. FEER-2 (DS3-SMDS Interface PCB Hardware Fault OR Condition)

If the DS3-SMDS interface hardware fault, which is notified of by the intra-station control communications using the E-MSCN from the SIFSH common for the switch software, occurs, then the DS3-SMDS interface is blocked.

15. Functions of Each PCB 15.1. Functions of Each PCB 15.1.1. Functions of HAF00A The most important function of the HAF00A (FIG. 45) is an interfacing function with the SIFSH common. Among the functions of the DS3-SMDS interface described in 7., the following functions are loaded.

(1) LAP terminating function for MSD/MSCN Information
(2) Interfacing function to the SIFSH common (3) Multiplexing/demultiplexing function for DS3-SMDS L2-PDU cell and LAP cell
(4) Loopback function for specific VPI/VCI cell
(5) Multiplexing function for MSCN data
(6) MSD data dropper function
(7) Active control function
(8) Microprocessor interface function 15.1.1.1. LAP Terminating Function for MSD/MSCN Information This function is described in 7.11. above, and realized by the EGCLAD LSI (FIG. 45) and the firmware. The functions are shared as follows.

(1) Terminating function by EGCLAD LSI

1. Multiplexing/demultiplexing function for L2-PDU cell and LAP cell

2. Terminating function for SAR-PDU (2) Terminating function of firmware

1. Terminating function for L2 frame interface

2. Terminating function for L3 frame interface 15.1.1.2. Interfacing Function with SIFSH Common This function is described in 7.10 above.

The interface between the SIFSH common and the DS3-SMDS interface to the L2-PDU cell has 8-bit width of parallel data. The DS3-SMDS interface processes 16-bit width of parallel data at the transmission speed of 9.72 Mbps. Therefore, the HAF00A converts data having the above mentioned data width at the above mentioned transmission speed.

15.1.1.3. Multiplexing/Demultiplexing Function for DS3-SMDS L2-PDU Cell and LAP Cell These functions are explained in 7.12. and 7.13, and realized by the EGCLAD LSI.

The EGCLAD LSI sets ON the register in the EGCLAD LSI through the firmware when the LAP cell is transmitted. Thus, the EGCLADLSI multiplexes the L2-PDU cell and the LAP cell according to the LAP cell transmission clock (64 Kbps).

In demultiplexing cells, the EGCLAD LSI demultiplexes the L2-PDU and LAP cells based on the SIG bit (FIG. 56) in the tag area of the received ATM cell, and inserts a blank cell to a time slot at which the LAP cell is demultiplexed.

15.1.1.4. Loopback Function for Cell Assigned Specific VPI/VCI

The DS3-SMDS interface has the loopback functions for cells assigned a specific VPI/VCI, that is, the function of looping back a cell assigned a 0 bit in the tag area explained in 13.1.1. and a cell assigned a specific VPI/VCI explained in 13.1.3.

The functions are realized by the SEL N1 LSI (FIG. 45).

15.1.1.5. Multiplexing Function for MSCN Data

This function is explained in 7.15, and realized by the firmware and hardware. The firmware is interfaced with the hardware through the dual port RAM (FIG. 45). The bits contained in and after the 003th byte shown in FIGS. 61 through 63 are controlled by the firmware, and the control result is written to the dual port RAM. However, the MPE bit in the 017th byte is processed by the hardware.

Data are sequentially read from the dual port RAM using as an address an output, from the SIFSH common, of the counter operating according to the MSCN interface clock. The read data is assigned a control bit of the 000th and 002nd byte as shown in FIGS. 61 through 63, and the resultant data group is transmitted as the MSCN information to the SIFSH common.

15.1.1.6. MSD Data Dropper Function

This function is explained in 7.16, and realized by the firmware and hardware. The firmware is interfaced with the hardware through the dual port RAM (FIG. 45) as in the case described in 15.1.1.1. The MSD serial data transmitted from the SIFSH common is written to the dual port RAM after being converted into 8-bit parallel data. The written data is read by the firmware on a cycle of 10 ms. If the same data is read consecutively for 2 cycles, then the data is fetched in the firmware.

15.1.1.7. Active Control Function

This function allows the control shown in FIG. 91 to be executed according to the ACT information transferred from the SIFSH common of both active and standby systems.

15.1.1.8. Microprocessor Interface Function

The HAF00A PCB is loaded with the 80C186 processor and outputs processor interface signals of the HAF00A and other PCBs.

15.1.2. Functions of HLP01A

The most important function of the HLPP1A (FIG. 45) is to perform a process specific to the DS3-SMDS.

Among the DS3-SMDS interface functions described in 7., the following functions are loaded.

Figure 92:
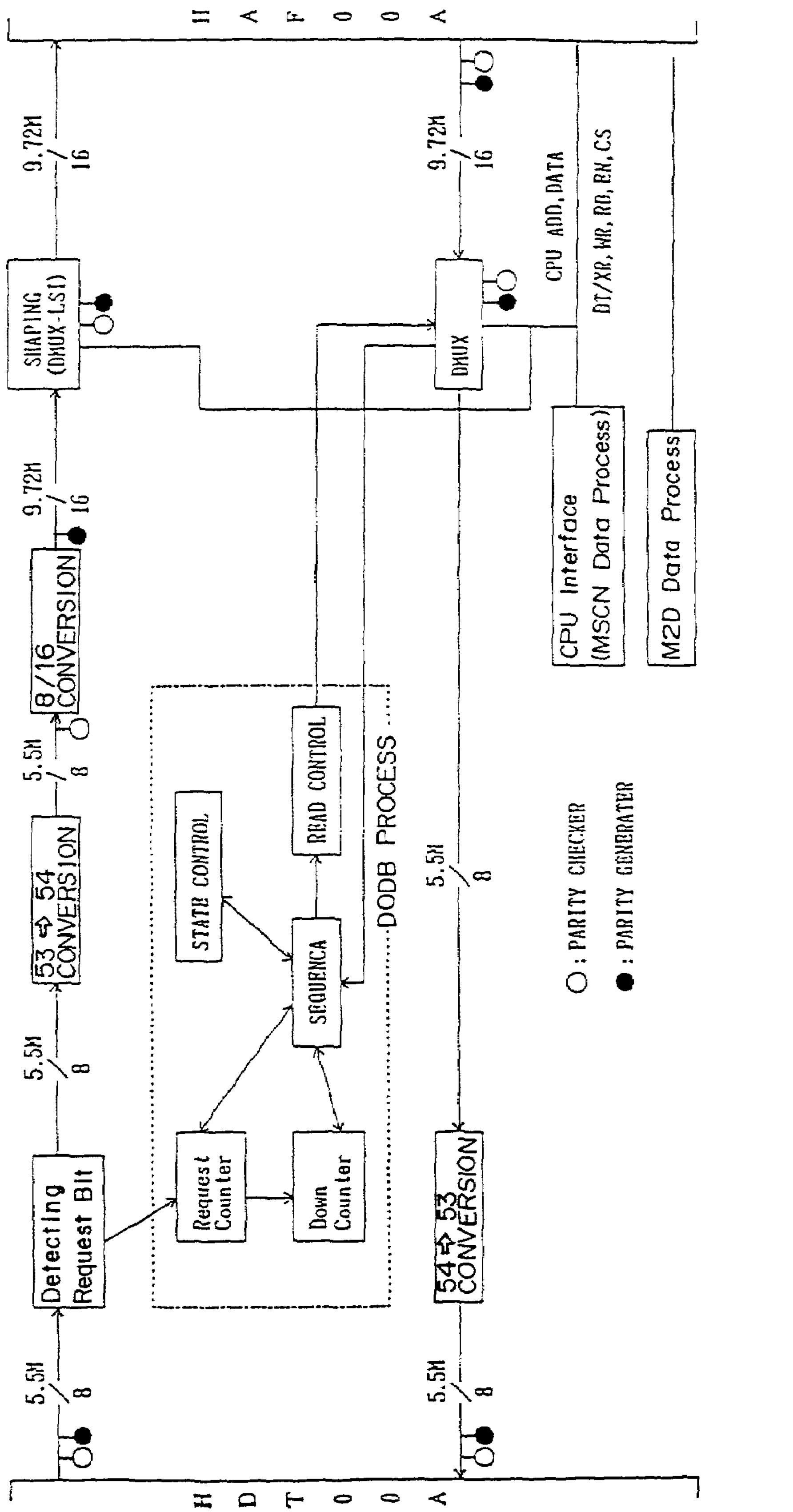
FIG. 92 shows the configuration of the HLP01A function.

(1) 156 Mbps→45 Mbps data conversion function
(2) 45 Mbps→156 Mbps data conversion function
(3) Distributed queue dual bus (DQDB) process function The outline of these functions is explained below. FIG. 92 shows the configuration of the function.

15.1.2.1. 156 Mbps→45 Mbps Data Conversion Function

This function is described in 7.9.

The L2-PDU cess from the SIFSH common is transmitted as 8-bit parallel data at a bit rate of 156 Mbps. The cell is converted in the HAF00A LSI into a cell to be transmitted as a 16-bit parallel data at a bit rate of 156 Mbps. Then, this cell is converted in the HLP01A into a cell transmitted as an 8-bit parallel data at the bit rate 45 Mbps of the DS3 layer.

The 156 Mbps→45 Mbps data conversion function is realized by the V2 FMUX LSI. The V2 FMUX LSI performs congestion control of the 156 Mbps→45 Mbps data conversion buffer when the DS3-SMDS interface realizes a DS3 umbilical link interface as described in 12. above. The conversion buffer is realized by the DMUX LSI (FIG. 45) in the HLP01A. The congestion control of this buffer is performed using 9 levels of a threshold as explained in 12. by referring to FIG. 82.

15.1.2.2. 45 Mpbs→156 Mbps Data Conversion Function

This is the function explained in 7.4. above.

The L2-PDU data from the DS3 transmission line is received at a bit rate of 45 Mbps. Then, the data is converted in the HDT00A PCB (FIG. 45) into the data transmitted as an 8-bit parallel data at a bit rate of 45 Mbps, and input to the HLP01A. Then, the data is converted in the HLP01A into the data to be transmitted as a 16-bit parallel data at a bit rate of 156 Mbps, and input to the HAF00A (FIG. 45).

The 45 Mpbs→156 Mbps data conversion function is realized by the V2 DMUX LSI.

15.1.2.3. DQDB Process Function

This function is explained in 7.6. above.

14.1.3. Functions of HDT00A

The most important function of the HDT00A (FIG. 45) is to interface with the DS3 transmission line. Among the DS3-SMDS interface functions described in 7., the following functions are loaded.

(1) DS3 layer terminating function
(2) DS3 PSCP layer terminating function
(3) Received L2-PDU header check function (HCS)
(4) L2-PDU header pattern generating function 15.1.3.1. DS3 Layer Terminating Function This function is explained in 7.2. above.

15.1.3.2. DS3 PLCP Layer Terminating Function

This function is explained in 7.3. above.

15.1.3.3. Received L2-PDU Header Check Function (HCS)

This function is explained in 7.4. above. The header check function is switched between the SMDS service and the umbilical link of the DS3-SMDS interface 1.

15.1.3.4. L2-PDU Header Pattern Generating Function

This function is explained in 7.5. above. As in the case described above of the header check function, the header check function is switched between the SMDS service and the umbilical link of the DS3-SMDS interface 1.

16. Firmware Interface 16.1. General Descriptions

The DS3-SMDS interface is loaded with the 80C186 processor to realize the following functions.

(1) DS3 layer performance monitor
(2) PLCP layer performance monitor
(3) DS3 layer carrier group alarm (CGA) declaration and release
(4) PLCP layer carrier group alarm (CGA) declaration and release
(5) DS3-SMDS interface hardware alarm
(7) Intra-station control communications (simple LAPD)

16.2. Outline of Interface between Hardware and Firmware

The interface between the hardware and the firmware in the DS3-SMDS interface is realized using the control chip select (CS) from the 80C186 processor.

Figure 93:
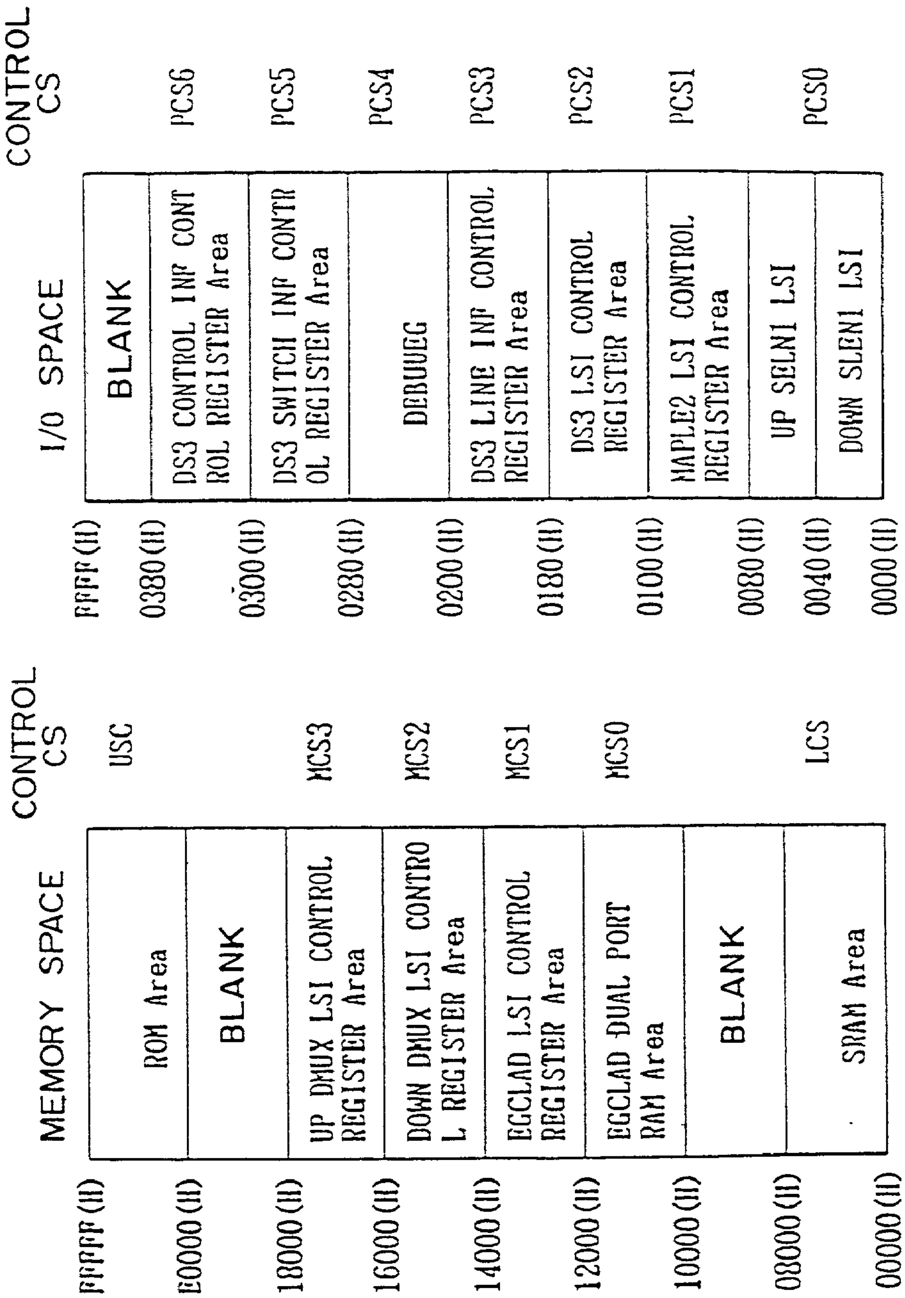
FIG. 93 shows the memory map of the DS3-SMDS interface.

The control chip select conditions in each interface are listed below, and FIG. 93 is a memory map of the DS3-SMDS interface. FIG. 45 is referred to if necessary.

(1) SRAM area: controlled by the LCS
(2) ROM area: controlled by UCS
(3) EGCLAD LSI dual port RAM area: controlled by the MCS0
(4) EGCLAD LSI control register area: controlled by the MCS1
(5) Downward DMUX LSI control register area: controlled by the MCS2
(6) Upward DMUX LSI control register area: controlled by the MCS2
(7) Downward SELN1 LSI control register area: controlled by the PCS0
(8) Upward SELN1 LSI control register area: controlled by the PCS0
(9) MAPLE2 LSI control register area: controlled by the PCS1
(10) DS3 LSI control register area: controlled by the PCS2
(11) DS3 LINE INF (HDT00A) control register area: controlled by the PCS3
(12) Debugger interface: controlled by the PCS4
(13) DS3 SWITCH INF (HAF00A) control register area: controlled by the PCS5
(14) DS3 CONTROL INF (HAF00A) control register area: controlled by the PCS6

The LCS, UCS, and MCS 0 through 3 are allocated to the memory space while the PCS 0 through 6 are allocated to the I/O space.

<Part 3>

The subscriber interface shelf (SIFSH) is explained in detail in Part 3.

1. General Description 1.1. Position of SIFSH in the System

Figure 94:
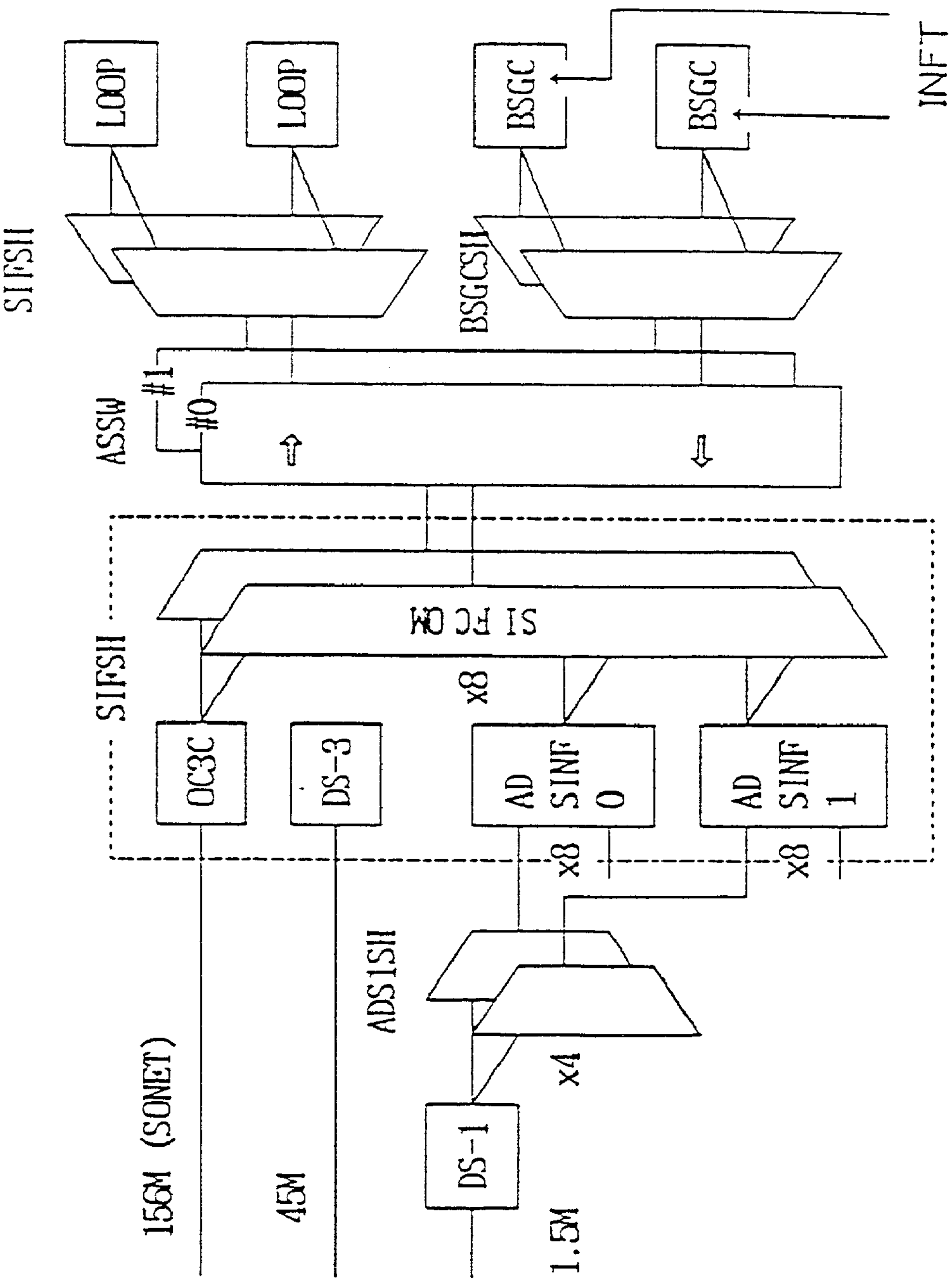
FIG. 94 shows the positioning of SIFSH-A in the system.

FIG. 94 shows the position of the SIFSH shown in FIG. 8 in the system. The SIFSH is hereinafter referred to as the SIFSH-A.

The subscriber interface shelf type A (SIFSH-A) can be loaded with up to 8 units per shelf of the individual units containing the ATM subscriber interface circuits The following 5 types of the individual units can be accommodated.

(1) OC3C (156 Mbps optical interface unit) (simplex configuration)
(2) DS-3 (45 Mbps metallic interface unit) (simplex configuration)
(DS3-SMDS interface explained in Part 2)
(3) ADSINF (ADS1SH concentrator unit) (duplex configuration)
(4) TCGADP (TCGSH adapter unit) (simplex configuration: two systems of the TCGSH are connected to a single unit)
(5) LOOP (156 Mbps loop unit) (duplex configuration)

Each unit of the OC3C, DS-3, and TCGADP has a simplex configuration. Each unit of the ADSINF and LOOP has a duplex configuration. If the units are mounted to the SIFSH-A, then a two-unit set is accommodated. Accordingly, up to 4 sets of the ADS1NF and LOOP units can be loaded per shelf.

The active/standby control for each unit of the ADS1NF and LOOP can be performed by the SIFSH common unit (hereinafter referred to as the SIFCOM).

If the SIFSH-A (SIFSH) is mounted to the right of the ASSW (ATM switch) in FIG. 94, then the SIFSH-A functions as shelf exclusive to the load of the LOOP unit. If the SIFSH-A is mounted to the left of the ASSW (ATM switch) in FIG. 94, then the SIFSH-A functions as shelf for loading the individual unit which terminates a subscriber line.

The SIFCOM in the SIFSH-A performs the intra-station signaling process to the broadband signaling group controller shelf (BSGC) connected to the ASSW through the BSGCSH. The BSGC converts the command issued by the switch software and executed by the switch processor (CC) (not shown in the drawings) by way of the interface type T (INFT) into an intra-station signaling signal, and controls the SIFCOM according to the signal. A fault detected in the SIFCOM and a response to the above described command are provided for the BSGC as intra-station signals and transmitted to the switch software through the INFT.

A simple LAP-D protocol is adopted to the intra-station signaling process. The simple LAP-D protocol is developed to minimizing the function of the hardware and firmware based on the LAP-D protocol.

Among the individual units accommodated in the SIFSH-A, each unit of the OC-3C and DS-3 communicates with the BSGC using the simple LAP-D protocol. The TCGADP, LOOP, and ADSINF do not have the simple LAP-D protocol terminating function.

The SIFCOM analyzes a command received using the simple LAP-D protocol, multiplexes in time divisions the command in an EMSD highway if the analysis result indicates a command to an individual unit, and notifies the individual unit of the result.

The SCN information from the individual unit is multiplexed in time divisions in the EMSCN highway and notified to the SIFCOM. The SIFCOM detects a change in EMSCN information in each bit, and notifies the switch software through the BSGC using the simple LAP-D protocol of the SCN information containing only the signal of a bit whose data change is detected.

The SIFCOM demultiplexes an ATM cell corresponding to each individual unit from the downward cell highway which has a transmission speed of 622 Mbps and is connected to the ASSW, and sends it to a downward cell highway which has a transmission speed of 156 Mbps and is connected to each individual unit.

The ATM cell in the 156 Mbps upward cell highway connected to each individual unit is multiplexes in the 622 Mbps cell highway connected to the ASSW. A scheduler system is adopted to a cell multiplexing system as described later in 6.1.2. The scheduler system multiplexes an upward cell from each individual unit in the arrival order such that the order can be maintained correctly in both active and standby systems. As a result, the systems can be switched in a minimum cell-loss state when the systems are switched in the ASSW and SIFCOM.

The SIFSH-A can accommodate up to 8 individual units per shelf. However, to improve the multiplexing of cells from the 156 Mbps highway to the 622 Mbps highway, two SIFSH-A can be connected serially. This daisy chain configuration enables the ATM cell in 16 cell-highways of 155 Mbps to be multiplexed in a single 622 Mbps cell-highway.

1.2. Outline of Functions

The function of the SIFSH-A is described below.

(1) Multiplexing Cells (156 Mbps Cell Highway 622 Mbps Cell Highway)

Priority control by a scheduler system

Counting the number of passing ATM cells having specified VPI/VCI for each 156 Mbps cell highway Counting the number of discarded cells for each 156 Mbps cell highway Counting the number of all passing cells for each 156 Mbps cell highway Cell buffer FIFO for 52 cells for each 156 Mbps cell highway Monitoring the volume of a cell buffer (queue length)

4 levels of congestion control for a cell buffer using P and COM bits (2) Demultiplexing Cells (622 Mbps Cell Highway 156 Mbps Cell Highway)

Demultiplexing cells by a cell header tag comparison system

Dynamic assignment of a comparison tag in consideration of protection line switching Counting the number of passing ATM cells having specified VPI/VCI for each 156 Mbps cell highway Counting the number of discarded cells for each 156 Mbps cell highway Counting the number of all passing cells for each 156 Mbps cell highway Cell buffer FIFO for 112 cells for each 156 Mbps cell highway Monitoring the volume of a cell buffer (queue length)

4 levels of hysteresis congestion control for a cell buffer using P and COM bits (3) Header Conversion Function (VCC)

VCC for each 156 Mbps cell highway

Memory space of 216 addresses×28 bits per line

Boundary control of conversion addresses of input VPI/VCI (VPI/VCI=0/16-8/8)

Collectively resetting VCC memory

Copying the contents of the VCC memory to another system when the INS is incorporated Passing/conversion variable mode of ATM cell having 0 bit (4) Individual Unit Interface Transmitting and receiving cells in a 156 Mbps cell highway Generating and checking the parity of a cell in a 156 Mbps cell highway Passing/discard control of a cell from an individual unit of a standby system (monitoring 0 bit)

Detecting an individual unit missing

Specifying the slot number of an individual unit

Specifying active/standby switching for a duplex device (MUXACTD signal)

Notifying of completion of active/standby switching from a duplex device (MUXACTU signal)

Receiving EMSCN information (256 bytes/4 msec) from an EMSCN serial highway

Transmitting EMSD information (256 bytes/4 msec) to an EMSD serial highway

Transmitting a hard reset signal

Transmitting a 64 KHz reference signal (5) Switch Interface

622 Mbps cell highway interface (78 Mbps×8 bit parallel ECL signal, 50-core coaxial flat cable)

Generating and checking the parity of a cell in a 622 Mbps cell highway

Monitoring cell frame and 78M clock disconnection (50-core coaxial flat cable)

Receiving a system switch signal (20-core cable)

Monitoring 20-core cable missing through monitoring 2.5 MHz clock (6) Daisy chain 622 Mbps cell highway interface (78 Mbps×8 bit parallel ECL signal, 50-core coaxial flat cable)

Generating and checking the parity of a cell in a 622 Mbps cell highway +

Monitoring cell frame and 78M clock disconnection from a lower order shelf by a higher order shelf (50-core coaxial flat cable)

Transmitting and receiving a system switch signal (20-core cable)

Transmitting 2.5 MHz clock from a higher order shelf to a lower order shelf (20-core cable)

Transmitting a system switch signal from a higher order shelf to a lower order shelf (20-core cable)

Transmitting and receiving a scheduler control signal (7) Intra-station Signaling Through a Simple LAP-D Terminating a simple intra-station LAP-D protocol (AAL layer type 3)

Receiving cell buffer for 11 cells

Selecting transmission shaping clock (8) Connection and Cross-Connection

Connection and cross-connection of VCC copy address data buses

Connection and cross-connection of VCC copy gate open/close control register

Communications control through SIC-LSI

Multicast transmission of an upward signaling cell to both systems (9) Clock

Extracting reference clock from the SYNSH (two systems)

(10) Test

Loopback of a test cell in a 156 Mbps cell highway (cell-by-cell/collective selection available)

Preventing a corresponding test cell from flowing to an individual unit at the loopback of a test cell Various self-diagnostics

(11) Power Source

−48V 5 system/one-way supply

Loading each SIFCOM and individual unit with an onboard power module (OBP)

Automatic power down of the SIFCOM of a corresponding system and other packages because of package missing 2. Shelf Configuration The SIFSH-A is loaded on a high power frame (HPF), and the maximum number of the SIFSH-A is 3 (steps).

2.1. Configuration

Described below are the SIFCOM and each individual unit.

2.1.1. SIFCOM

The SIFCOM is fixedly loaded on the SIFSH-A and is composed of 5 packages per system as shown in FIG. 95. The HPT01A package in the SIFCOM provides each unit in a single system with a −48V power source. Each of the systems on the right and left of the center of the shelf is power-supplied separately.

2.1.2. Individual Unit

Up to 8 individual units can be loaded on the SIFSH-A.

Each individual unit is composed of 3 packages per unit. The names of slots accommodating these packages are slots A, B, and C from left to right.

2.2. Power Source System

The power sources of the SIFSH-A are three types, that is, −48V/CG, SAB/SABG, and +5V/E. However, CG and E are completely separated, and the earth (E) is connected to the signal earth (SG).

2.2.1.48V/CG

Systems 0 and 1 are separated at the center of the shelf. −48V/CG is power-supplied independently from the power through package to each individual unit and SIFCOM. The power through package is loaded with a maintainer fuse corresponding to each individual unit and SIFCOM. The CG is independently connected to each of the systems on the right and left of the center of the shelf.

2.2.2. SAB/SABG

Systems 0 and 1 are separated at the center of the shelf.

The SABG is connected to the ALMSH through a misk plate.

2.2.3. +5V/E

+5V is provided in each of the individual units. The earth E is shared among systems 0 and 1.

The power sources −48V/CG and SAB/SABG of the present shelf are provided by the power through package.

3. Physical Interface

Described below are the interface and signal timing between the SIFSH-A and other units.

3.1. Switch Interface

Figure 96:
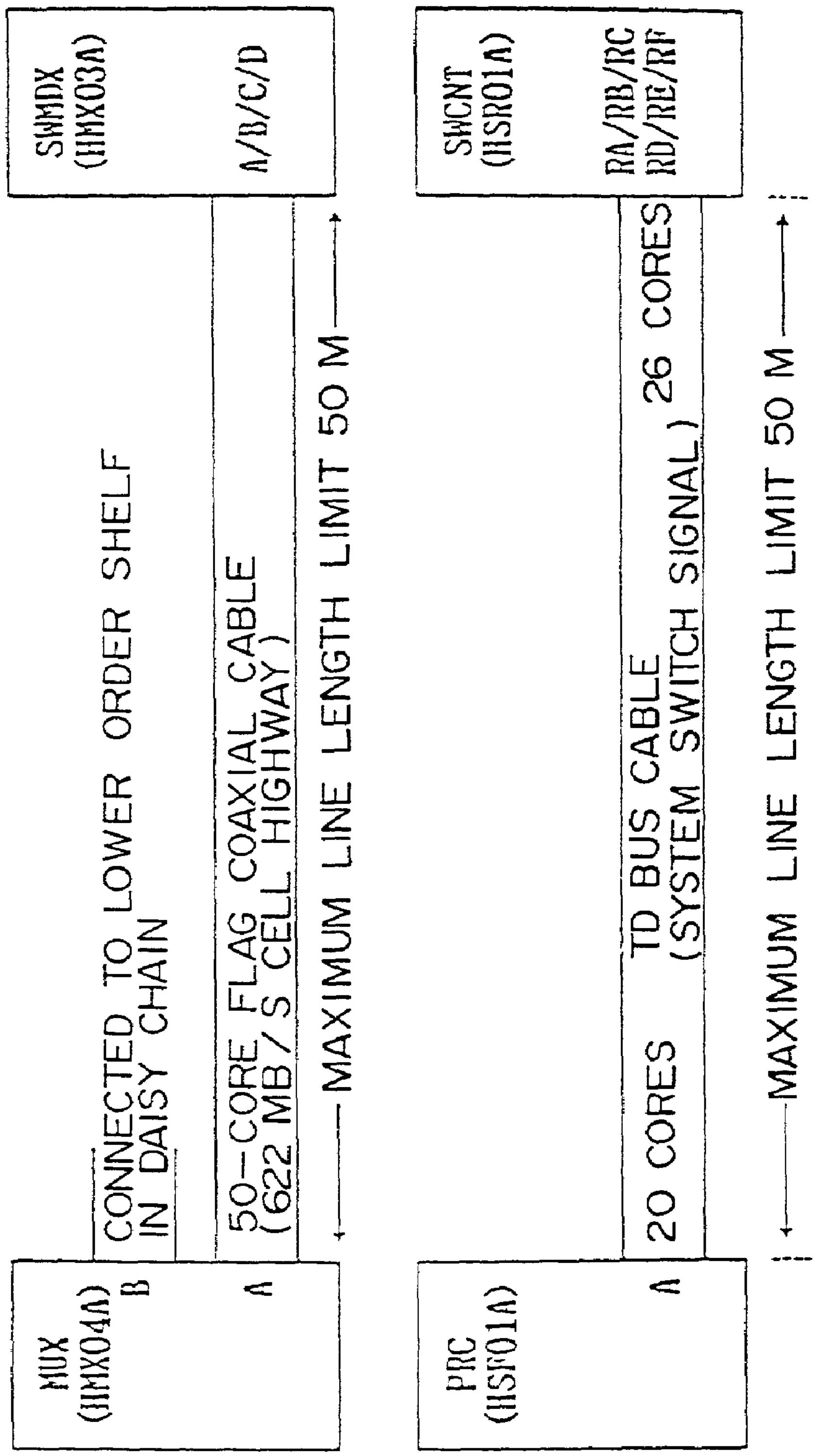
FIG. 96 shows the interface between the SIFSH-A and ATM switch (ASSW).
Figure 97:
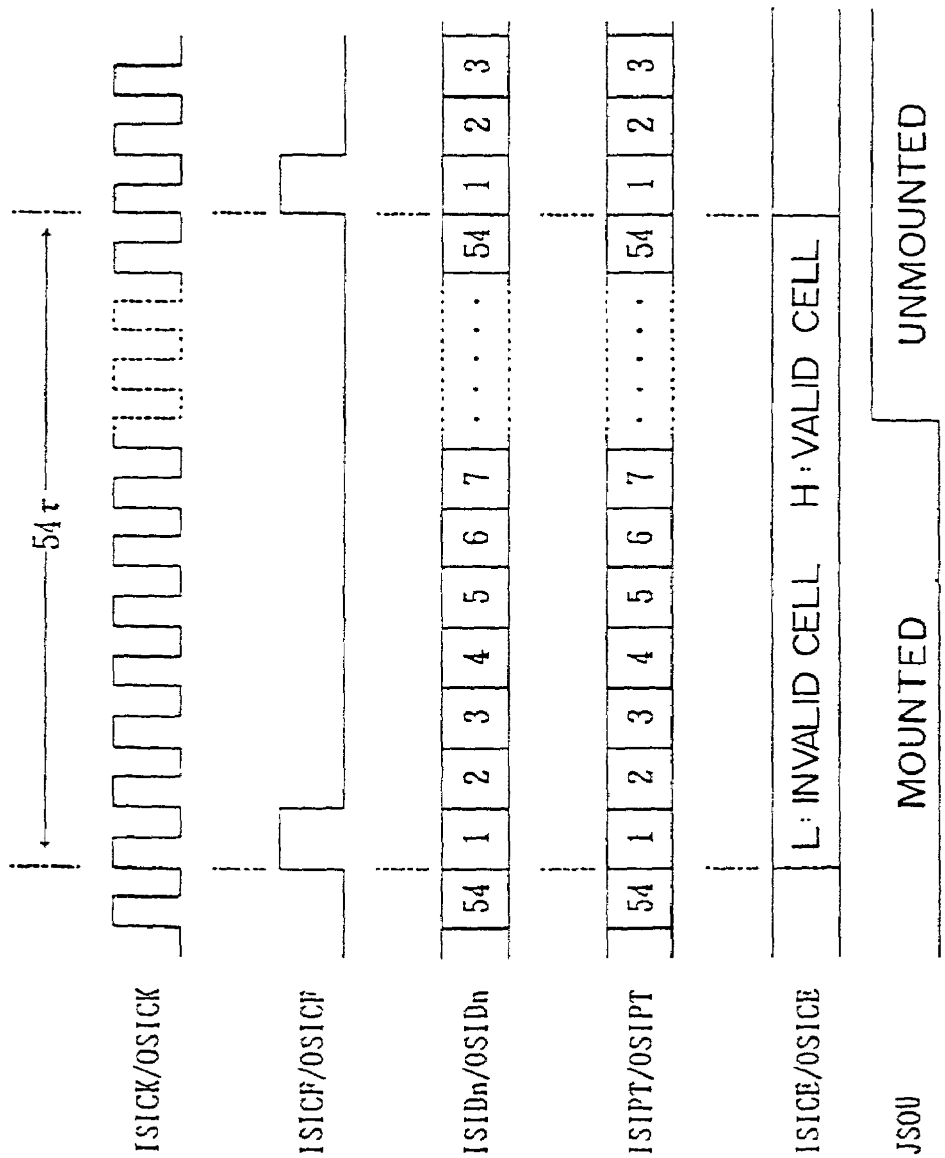
FIG. 97 shows the interface timing for the 622 Mbps cell highway in the 50-core flat coaxial cable.

The SIFSH-A comprises a 622 Mbps cell highway and an interface of a system switch signal line to the ATM switch (ASSW). As shown in FIG. 96, an interface of the 622 Mbps cell highway is established using a 50-core flat coaxial cable between the MUX package (HMX04A) in the SIFSH-A and the SWMDX (HMX03A shown in FIG. 246) in the ASSW. An interface of a system switch signal is established using a TD bus cable between the PRC package (HSF01A) in the SIFSH-A and one of the SWTIF, SWMDX, SWCNT, and SWMX in the ASSW. The TD bus cable consists of 20 cores at the SIFSH-A and 26 cores at the ASSW. A 3.1.1. 622 Mbps Cell Highway Interface FIG. 97 shows an interface timing for the 622 Mbps cell highway in the 50-core flat coaxial cable. The parity of the ISIPT and OSIPT is a vertical odd-number parity for 8-bit data excluding an enable signal.

3.1.2. System Switch Signal

Figure 98:
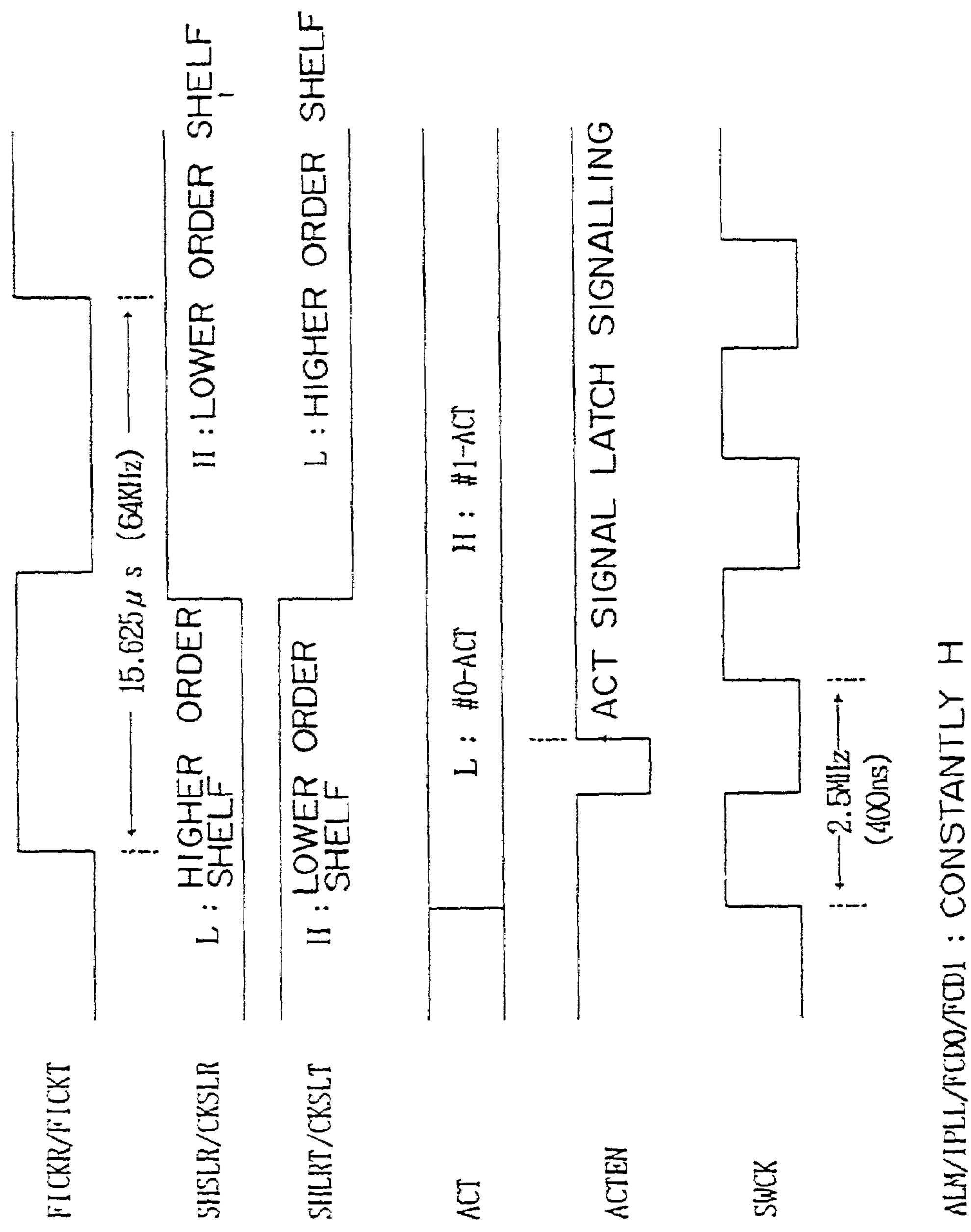
FIG. 98 shows the interface timing for the system switch signal in the 20-core TD bus cable.

FIG. 98 shows the interface timing for the system switch signal in the 20-core bus cable.

FIG. 99 shows the relation between the system switch signal and the active system selection state in the SIFSH-A.

3.2. SYNSH Interface

The SIFSH-A receives a reference clock from the SYNSH through an optical link.

Figure 100:
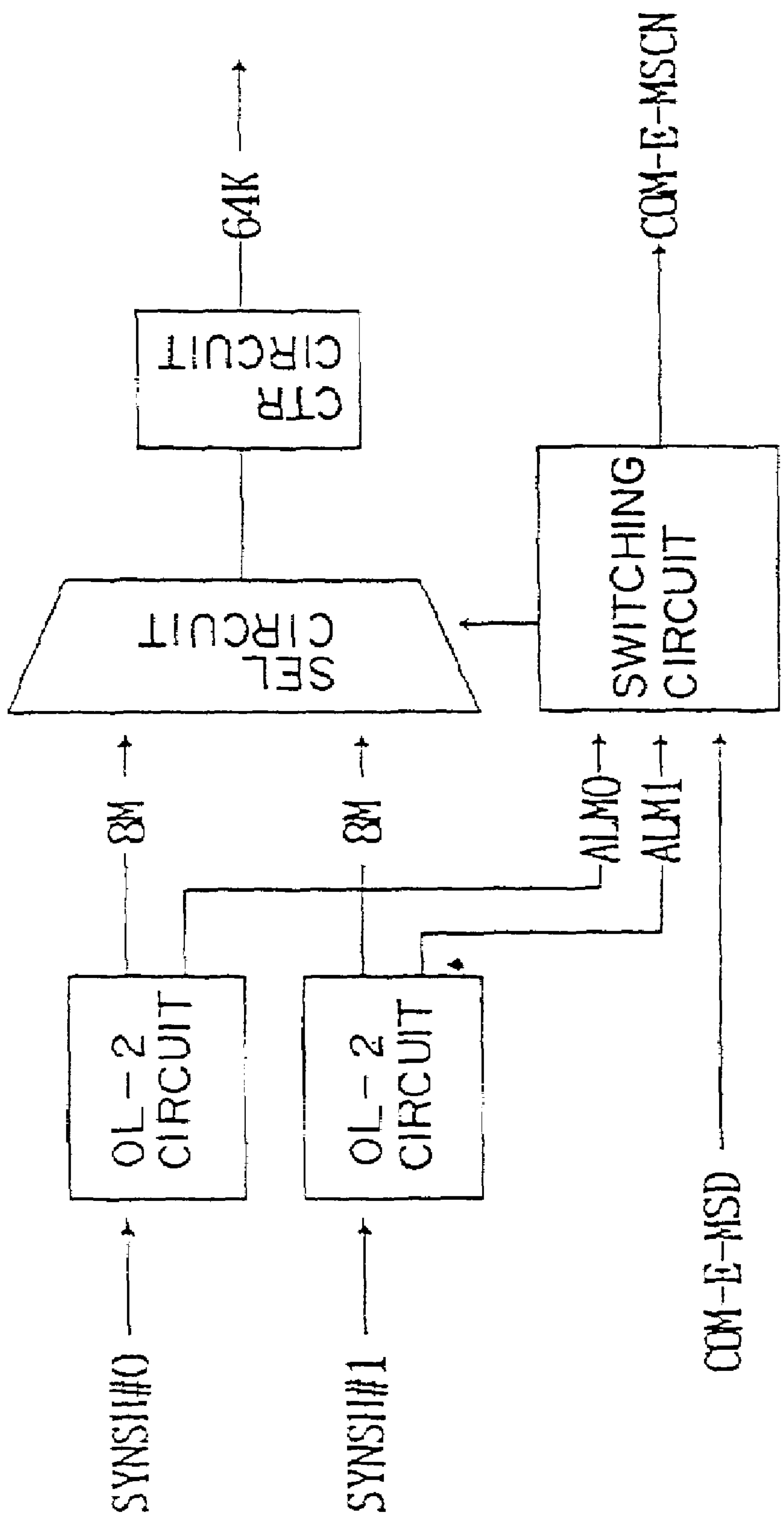
FIG. 100 shows the configuration of the circuit in the SIFSH-A for selecting a reference clock from the SYNSH.

The PRC package in the SIFCOM fetches an 8 Mbps clock from the SYNSH of both systems #0 and #1 through the optical link as shown in FIG. 100, and selects an 8 MHz clock from system #0 or #1 according to the alarm information from the OL-2 circuit. If a fault has arisen in any of the 8 MHZ clock, then selection systems are autonomously switched. Furthermore, a selection system can be specified using a COM-E-MSD command from the switch software. A selected system is notified of for the switch software according to the COM-E-MSCN information.

FIG. 101 shows the relation among a COM-E-MSD command instruction state, an alarm state, and a selected system state in each system.

3.3. Individual Unit Interface

Described below are the interface and signal timing between the SIFCOM and individual unit loaded on the SIFSH-A through the back-wiring board (BWB). All interface points between the SIFCOM and individual units explained below are defined according to the polarity and timing in the BWB.

3.3.1. 156 Mbps cell highway interface

The interface of the 156 Mbps cell highways between the common unit and the individual unit is explained below.

Figure 102:
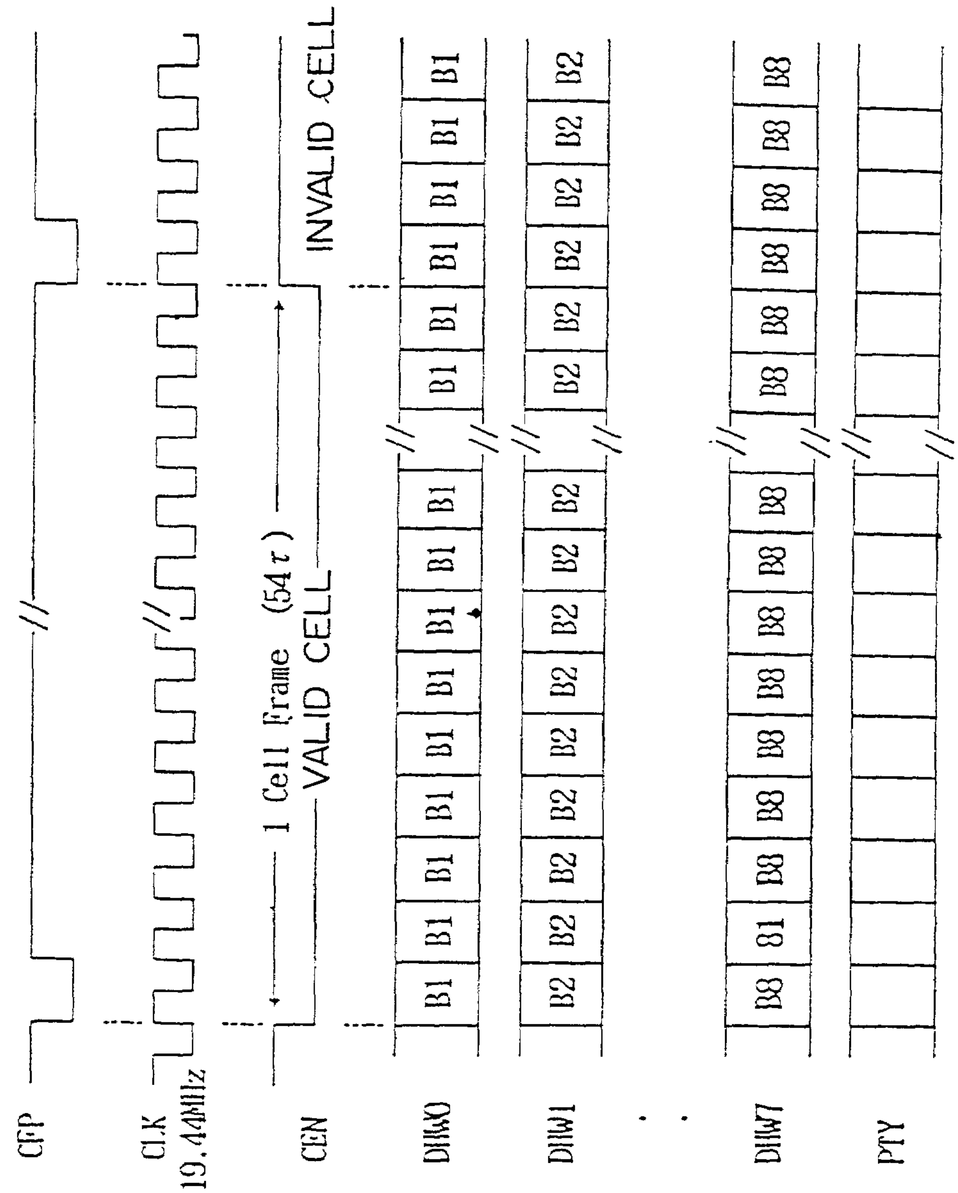
FIG. 102 shows the interface timing of the 156 Mbps cell highway.

As shown in FIG. 102, the ATM cell in the 156 Mbps low-speed highway is transmitted in the form of TTL level/8-bit parallel. The following 5 types of signals are required as a 156 Mbps cell highway interface.

(1) clock (CLK: 19.4 Mbps, duty: 50%)

(2) cell frame pulse (CFP: cell leading identification negative pulse)

(3) cell enable (CEN: “L” for valid cells, and “H” for invalid cells)

(4) data bus (DB0~7)

(5) parity bit (PB:DB0~7 and odd-number parity for the CEN)

3.3.1.1. Upward 156 Mbps Cell Highway Interface

Figure 103:
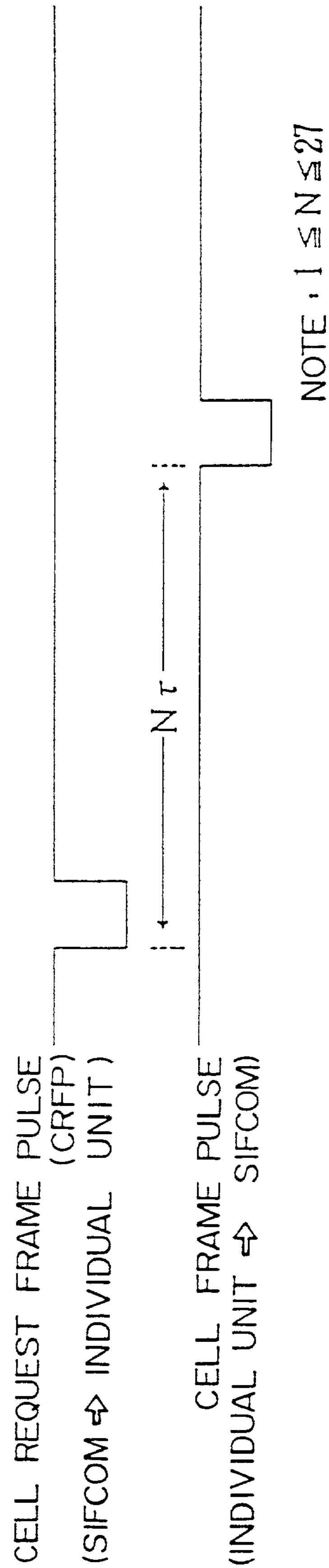
FIG. 103 shows the receiving timing of an ATM cell in the upward cell highway from the individual unit to the SIFCOM.

FIG. 103 shows the timing of receiving an ATM cell from the upward cell highway from the individual unit to the SIFCOM. The individual unit transmits an upward cell by receiving a cell request signal from the SIFCOM because the management through the scheduler at the SIFCOM requires the upward cells from each circuit to be synchronized.

3.3.1.2. Downward 156 Mbps Cell Highway Interface

Figure 104:
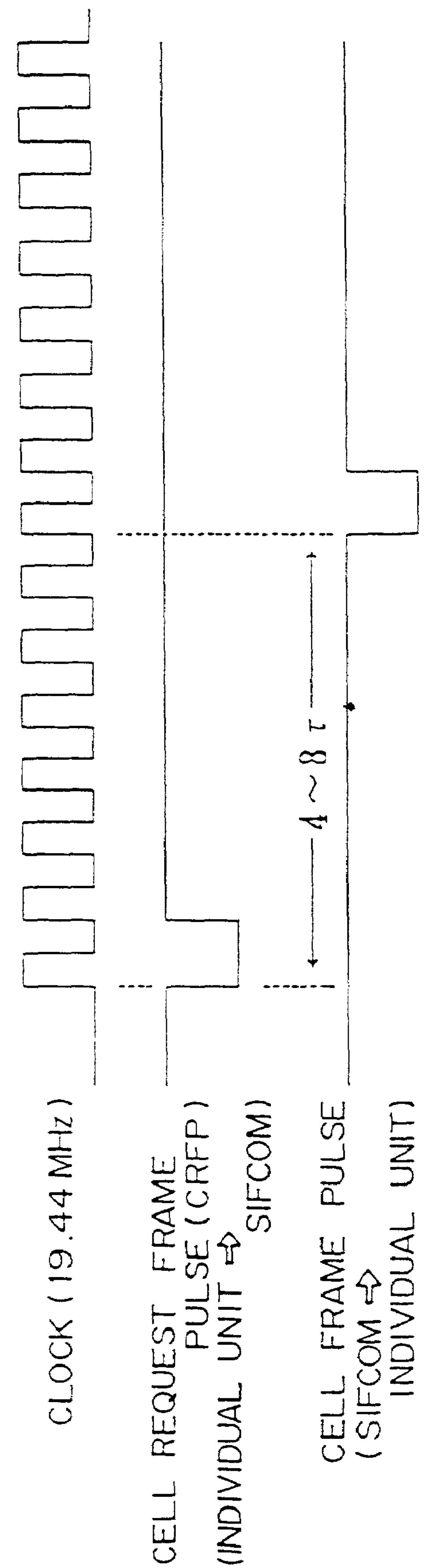
FIG. 104 shows the receiving timing of an ATM cell in the downward cell highway from the SIFCOM to the individual unit.

FIG. 104 shows the timing of receiving an ATM cell from the downward cell highway from the SIFCOM to the individual unit. The SIFCOM transmits a downward cell by receiving a cell request signal from the individual unit so that the downward cell frame can be synchronized in the SIFCOM of both systems to prevent the generation of duplicate or missing cells in fetching a downward cell in each individual unit in a downward cell fetching process.

3.3.2. E-MSD/E-MSCN Highway Interface

The physical and logical specifications are described below for the EMSD/EMSCN highway between the SIFCOM and individual unit.

The downward (SIFCOM→individual unit) data highway is defined as an EMSD highway. The EMSD is transferred to the SIFCOM through the BSGC (refer to FIG. 94) from the switch software using the simple LAP-D, multiplexed in the EMSD highway, and serially transferred to the individual unit.

The upward (individual unit→common unit) data highway is defined as an EMSCN highway. The EMSCN is an echo-back (EMSD normally received at the individual unit and looped back to the EMSCN highway) to the EMSD, and fault status information in the individual unit. The EMSCN is multiplexed in the EMSCN highway and serially transferred to the SIFCOM. A change in each bit of the EMSCN is detected in the SIFCOM, and only the signal of the bit whose change has been detected is notified of to the switch software by way of the BSGC through the simple LAP-D communications.

3.3.2.1. System Control

Figure 105:
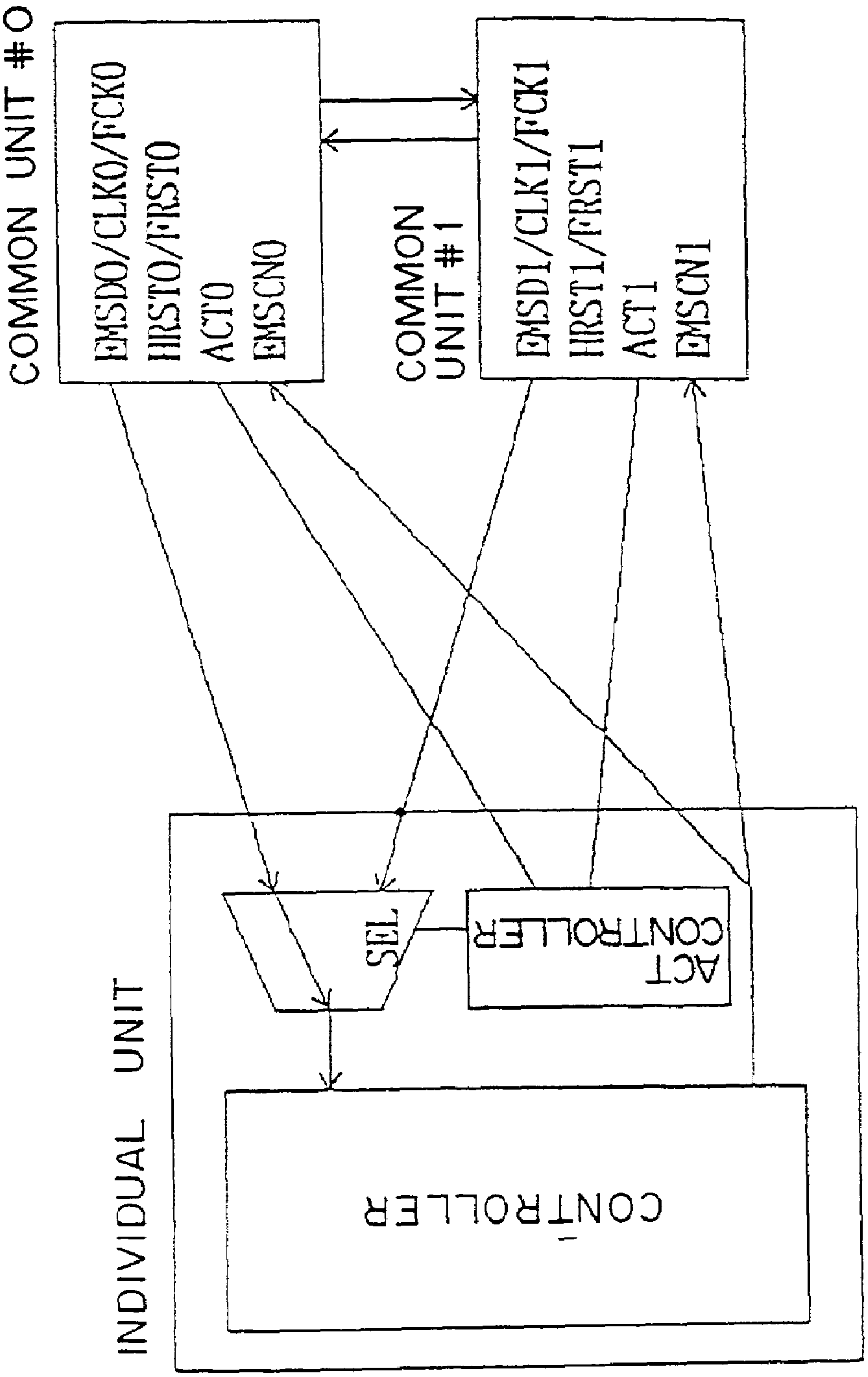
FIG. 105 shows the system control when the SIFCOM of system #0 is an active system.

An internal circuit in the individual unit operates according to the EMSD, CLK, and FCK from the SIFCOM of an active system. The EXSCN is transmitted to the SIFCOM of both systems in synchronism with the clock from a selected active system. FIG. 105 shows the system control when the SIFCOM of the #0 system is an active system.

Figure 107:
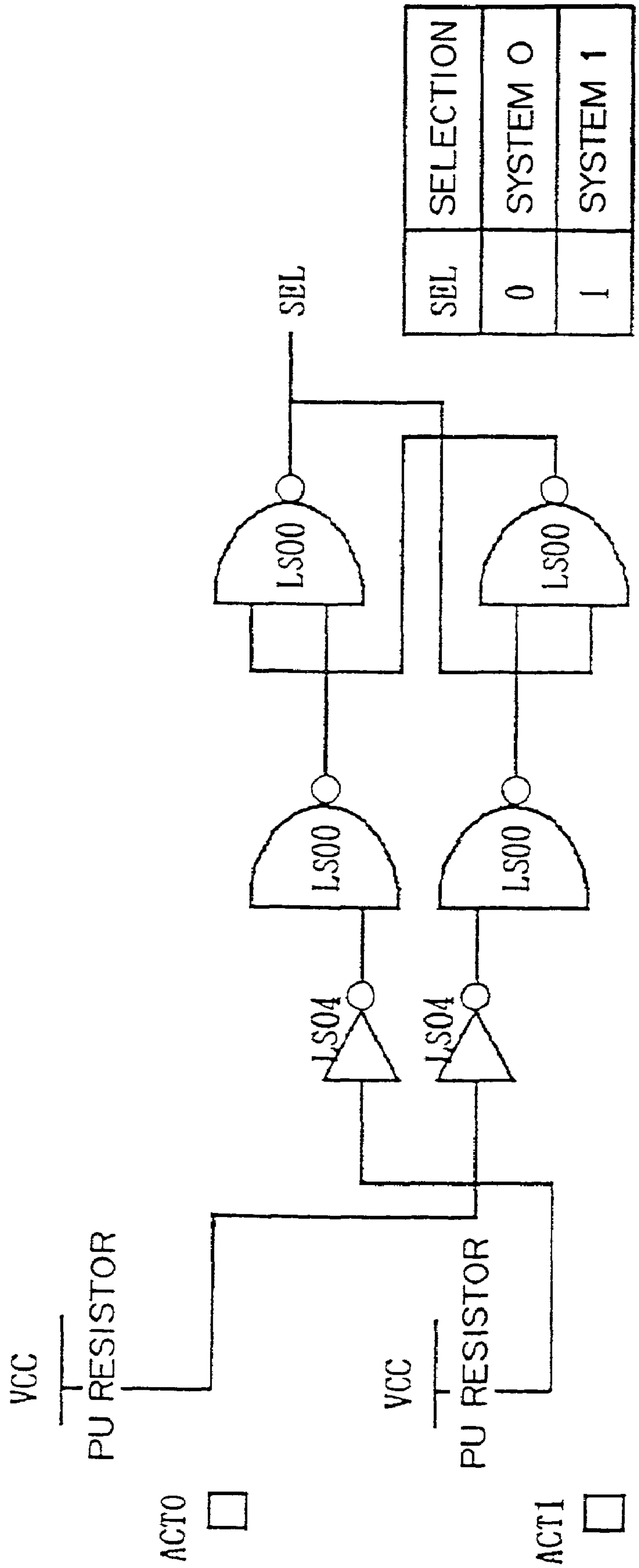
FIG. 107 shows an example of the circuit configuration of the ACT controller

The active control through an ATC controller is performed based on the logic shown in FIG. 106. FIG. 107 shows an example of the configuration of the circuit of an ACT controller. The circuit which receives an ACT0/ACT1 in the individual unit is necessarily pulled up so that an "L" active control can be performed in both ACT0 and ACT1.

3.3.2.2. Physical Specification

Listed below are the physical specifications of the E-MSD/E-MSCN highway interface.

(1) Bit rate: 512 Kbps (2) Frame length: 256 bytes/frame (4 msec/frame)

(3) Transmission format: Synchronous serial communications (4) Transmission order: MSB (D7 bit/000th byte)→LSB (D0 bit/255th byte)

(5) Downward transmission signal: clock (CLK): 512 KHz

Frame clock pulse (FCK): 4 msec cycle, 512 KHz, 1-bit width negative pulse

EMSD data serial highway (6) Upward transmission signal: EMSCN data serial highway (in bit/frame synchronism with END serial highway)

The bit data in each byte is transmitted in the order from MSB to LSB in the highway, and each byte is transmitted in the ascending order. Bits are numbered from 0 (D0:LSB) to 7 (D7:MSB). Bytes are numbered from 000 to 255 (refer to FIGS. 58 and 61).

Figure 108:
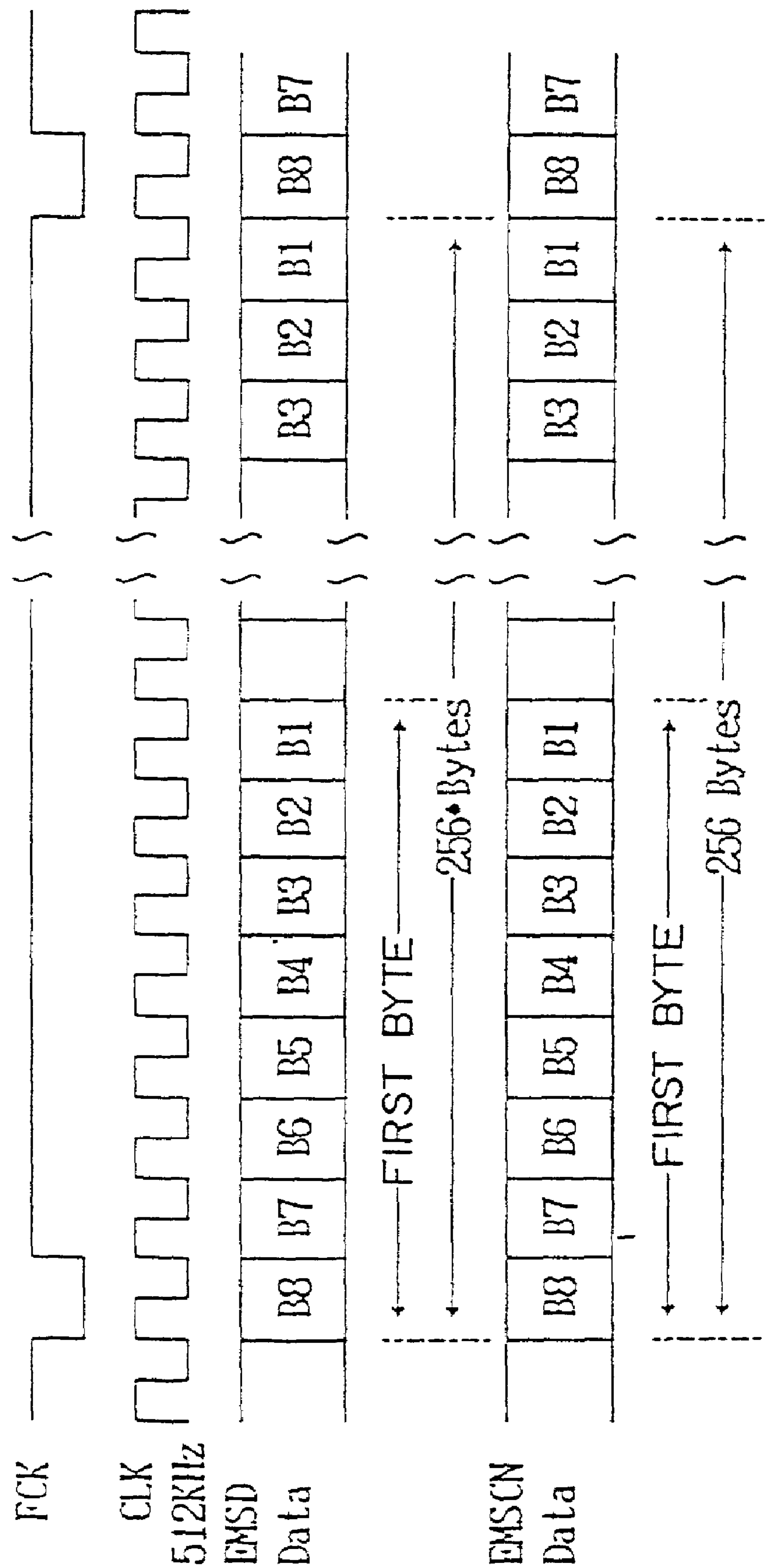
FIG. 108 shows the phase relationship between the FCK and CLK and the EMSD data and EMSCN data.

FIG. 108 shows the relationship in phase among the FCK, CLK, EMSD data, and EMSCN data. The specification of each data and the specification of the resettings are shown below.

Frame clock (FCK): negative logic on the backboard, khz, 1-bit width, 1.95 μsec, generating a negative pulse at 000th byte/D7 bit (head of frame)

Clock (CLK): 512 KHz, duty: 50%, the phase relating to the FCK/data being in synchronism with rise edge Data: in the order from MSB to LSB; the downward EMSD data highway and the upward EMSCN data highway are synchronized in bit and byte position Hard reset (HRST): individual unit hard reset signal; reset with "1" in the BWB and output asynchronously Fault reset (FRST): individual unit fault reset signal; reset with "1" in the BWB and output asynchronously 3.3.2.3. Logical Specification 3.3.2.3.1. Individual Unit Receiving Specification Described below is the logical specification of the EMSD receiving process in the individual unit.

The receiving terminal is protected against SIFCOM interface fault (noises of the EMSD, etc., stack fault, etc.) by frame synchronization, checking a pilot signal, and twice reading processes.

Figure 112:
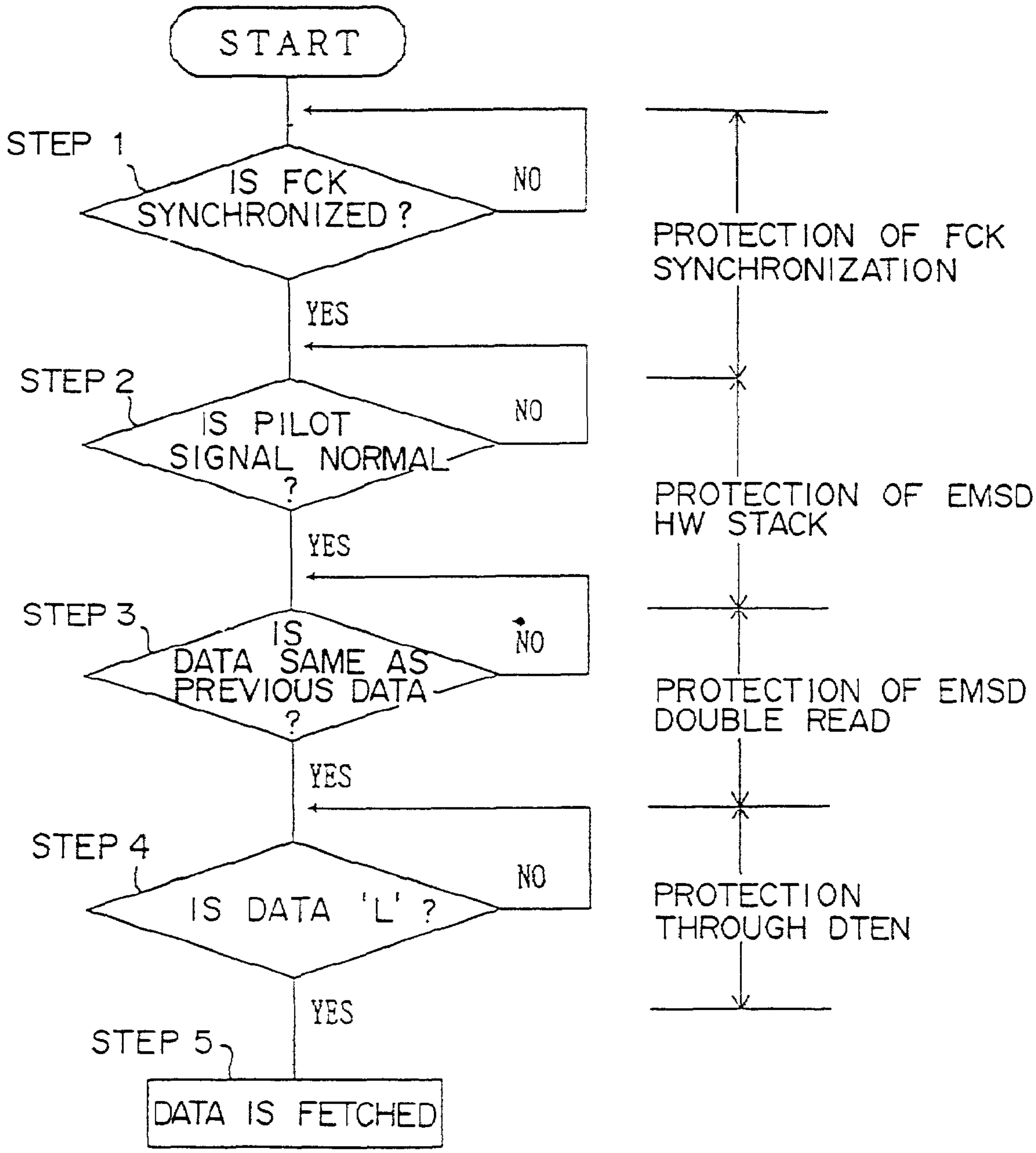
FIG. 112 is a flowchart showing a series of processes of fetching data described in 3.3.2.3.2, 3.3.2.3.3, and 3.3.1.3.4.
Figure 113:
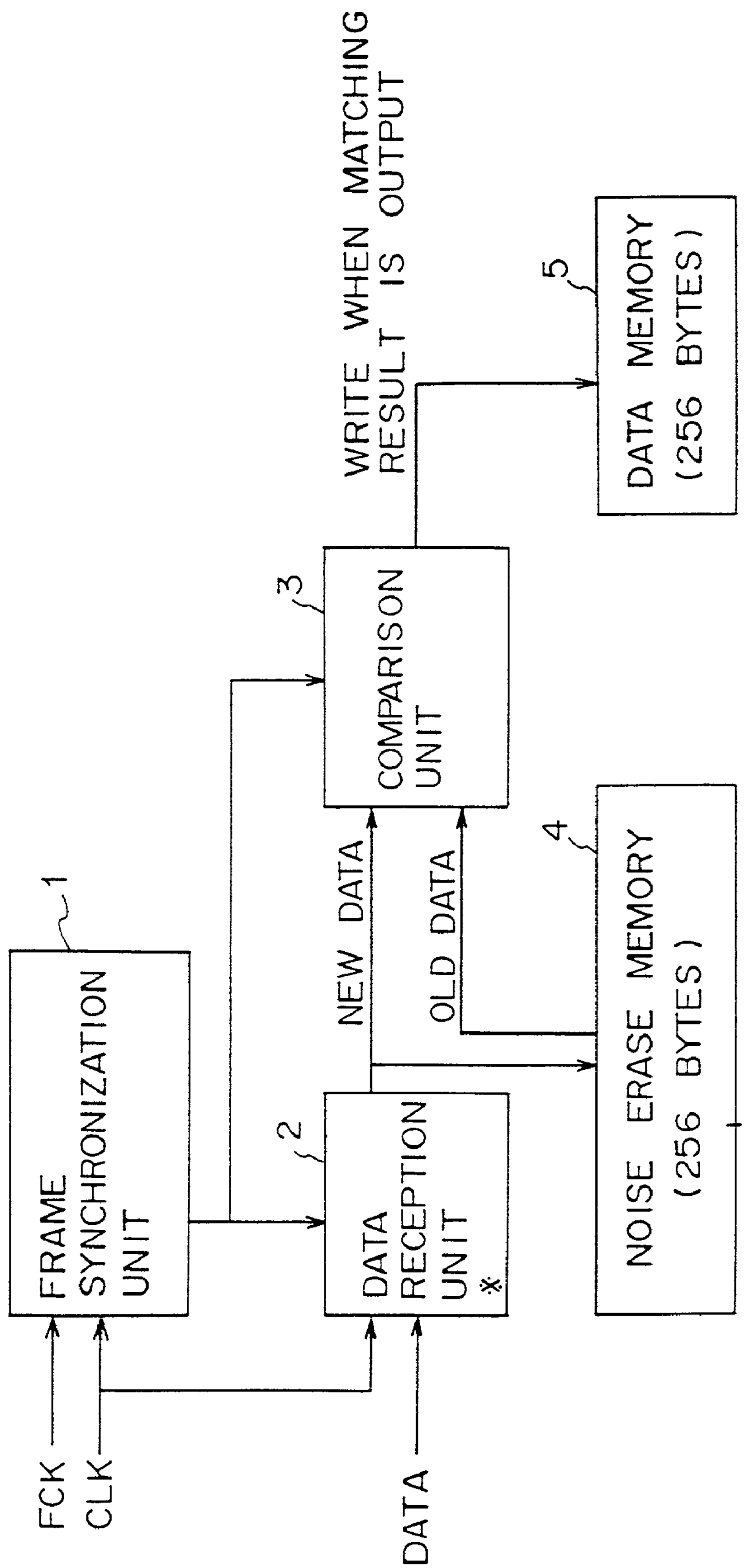
FIG. 113 is a block diagram showing the functions in the individual unit for performing a series of processes of fetching data described in 3.3.2.3.2, 3.3.2.3.3, and 3.3.1.3.4.

FIG. 112 is a flowchart showing the operations of these processes. FIG. 113 is a block diagram showing the functions of the individual unit for performing these processes in series.

3.3.2.3.2. Frame Synchronization

The frame synchronization corresponds to step 1 shown in FIG. 112 and the functional portion 1 shown in FIG. 113.

The number of protection steps for the frame synchronization of the EMSD highway is 1 step each for forward and backward. The stack of the FCK (both L/H stacks) are detected.

Figure 109:
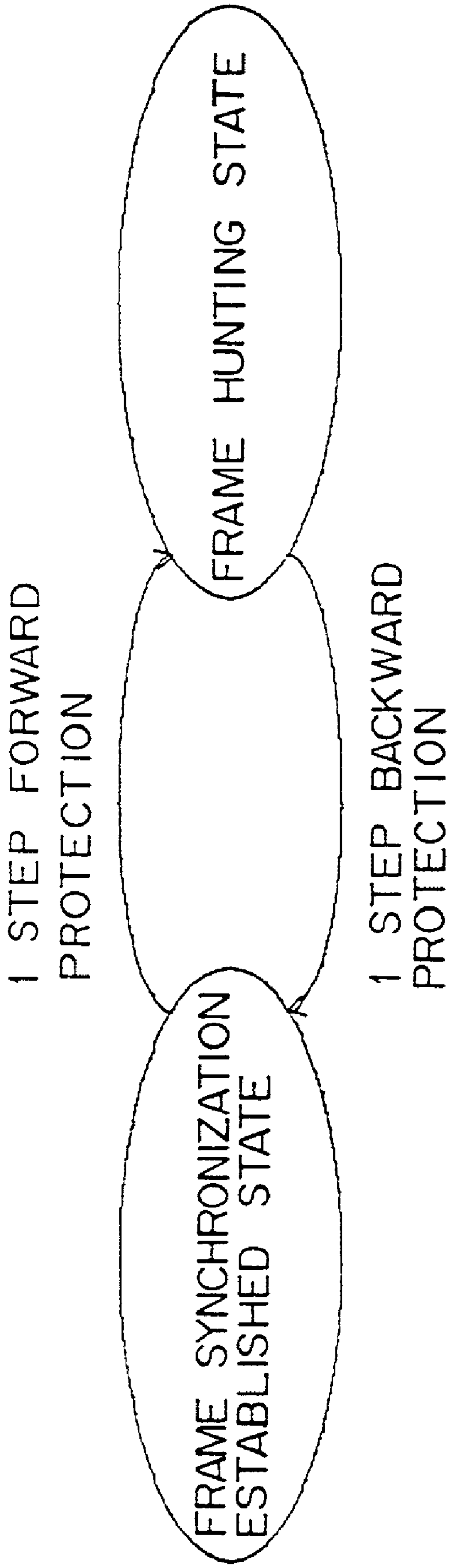
FIG. 109 shows the state transition of the frame synchronization process.

FIG. 109 shows the state transition of the frame synchronization process.

Figure 110:
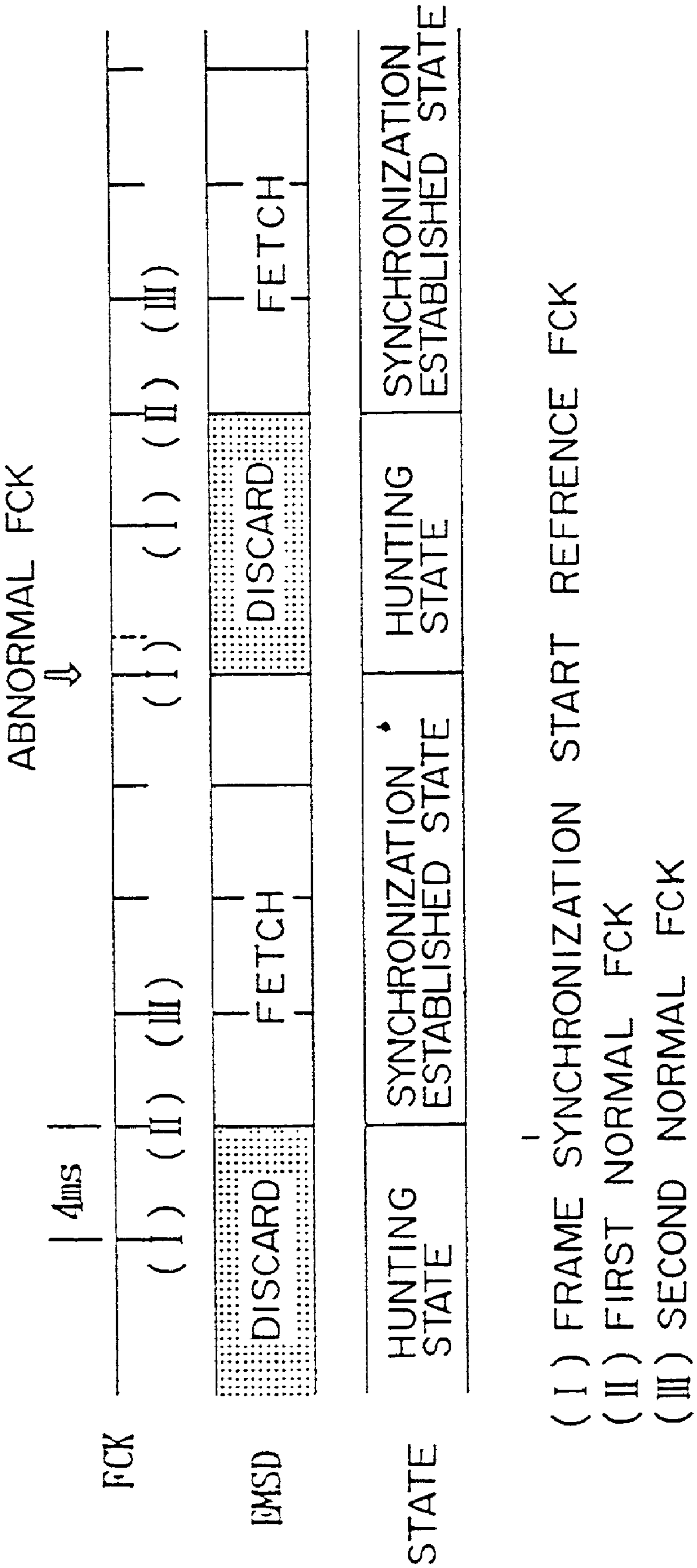
FIG. 110 shows the successful/unsuccessful frame synchronization process.

Practically, data is fetched from a corresponding frame when a normal synchronization FCK is received in a hunting state as shown in FIG. 110, If an abnormal FCK is once received in a synchronization established state, then the frame synchronization state changes into the hunting state and the data are discarded from this point, but the data received immediately before the point is stored until the synchronization is established next time. A normal FCK refers to the fact that the receiving terminal counter value (for example, a carry-out) depending on the CLK/FCK matches the next FCK in timing. An abnormal FCK refers to the fact that they don't match in timing.

Asynchronization is detected independently for systems 0 and 1. If the asynchronization of the FCK is detected, then the SIFCOM is notified of the fact by the EMSCN (002nd byte/bit D7 [SYNCF]: refer to FIGS. 58 and 59). The fault state is indicated as "H" in the BWB.

3.3.2.3.3. Pilot 0/1 Signal Check (detection of stack in EMSD highway)

The pilot 0/1 signal check corresponds to step 2 shown in FIG. 112 and the functional portion 2 shown in FIG. 113.

A pilot 0/1 signal is a highway stack monitor bit and pilot 0="L" and pilot 1="H" are constantly output from the SIFCOM in the BWB. The accommodation position of the pilot 0 signal in, the EMSD is the 000th byte/bit D7, while the accommodation position of the pilot 1 signal in the EMSD is the 000th byte/bit D7 (refer to FIGS. 58 and 59).

Figure 111:
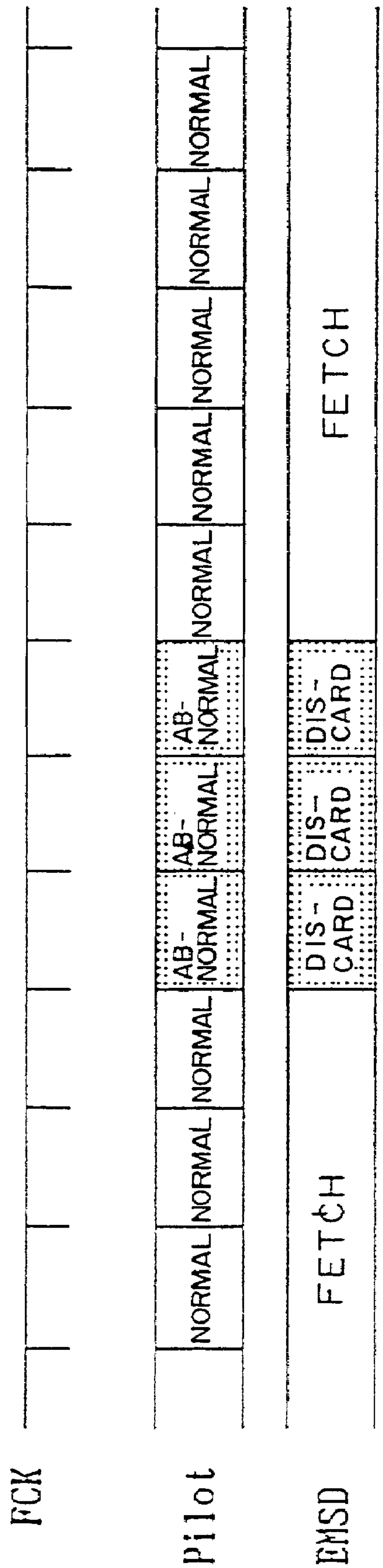
FIG. 111 shows the pilot signal detection/abnormal process.

The individual unit detects an EMSD highway stack fault when the alternation of the pilot signals 0/1 becomes irregular. The individual unit discards the data at and after an abnormal point as shown in FIG. 111, and then holds the data received immediately before the abnormal point until a normal pilot signal is detected.

A stack fault is detected independently for systems 0 and 1.

The SIFCOM is notified of a stack fault by the EMSC (002nd byte/bit D6 [PLTF]: refer to FIGS. 61 and 62.

3.3.2.3.4. Twice Reading Process

The data fetched in the frame synchronization process described in the 3.3.2.3.2. and the pilot 0/1 signal check process described in 3.3.2.3.3. is stored in a noise erase memory 4 shown in FIG. 113. A comparator 3 compares the contents of the data in the memory with the contents of newly fetched data (step 3 shown in FIG. 112). As a result, if these data match, that is, the same data is received twice consecutively, then the data is written to a data memory 5 shown in FIG. 113 (step 5 in FIG. 112). If these data do not match, then they are discarded.

A protection process is performed using a DTEN signal (step 4 shown in FIG. 112). The DTEN signal is set to indicate "L" in the BWB by a microprocessor in the SIFCOM. When the intra-shelf units are turned on simultaneously, a rise time conflict occurs after the release of the power-on reset for the SIFCOM and the individual unit, and a value of the EMSD highway becomes uncertain. The DTEN signal is used to control the individual unit such that it cannot fetch the EMSD data. Therefore, the individual unit ignores all EMSD data when the DTEN signal indicates "H". The DTEN signal is accommodated in the leading bit (000th byte/bit D0) of the EMSD highway (refer to FIGS. 58 and 59).

3.3.2.3.5. Individual Unit Sending Specification

Described below is the logical specification of an EMSCN sending process in the individual unit.

The EMSCN of an active system transmits an echo-back in response to the EMSD information and the notification of an EMSD highway stack.

The EMSCN of a standby system transmits data as in the EMSCN in the active system at the same timing.

A pilot 0/1 signal is inserted to the same accommodation position in the EMSCN highway as in the EMSD highway. Since the signal is used to monitor a stack in the EMSCN highway, it does not indicate an echo-back in response to the EMSD information.

Figure 114:
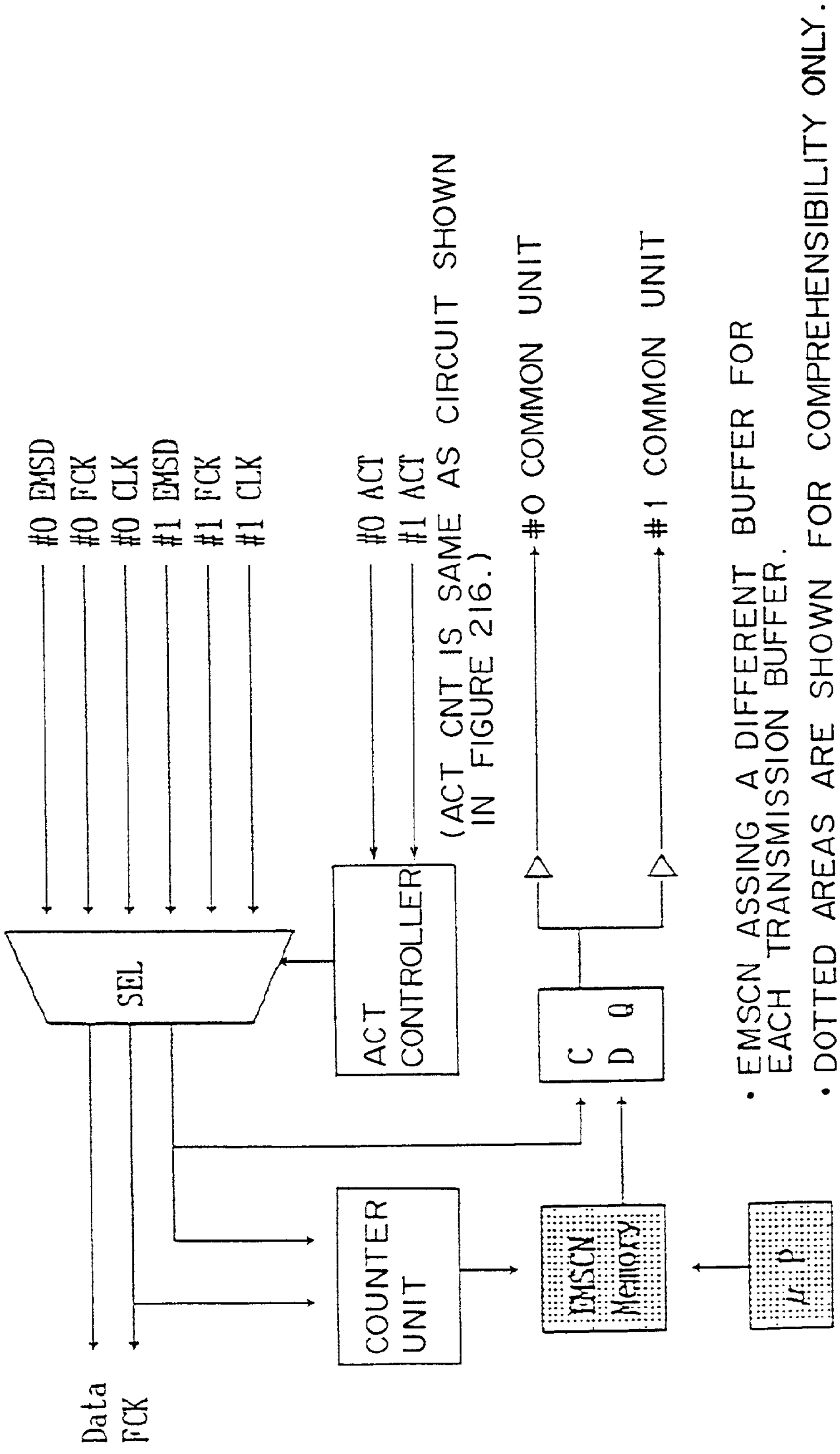
FIG. 114 is a block diagram showing the EMSCN transmission circuit in the individual unit.

FIG. 114 is a block diagram showing the EMSCN sending circuit in the individual unit.

3.3.2.3.6 Fault Detection

FIG. 115 is a list of the methods of detecting and notifying in the individual unit of the interface fault between the SIFCOM and the individual unit, and of the method of detecting the fault in the SIFCOM and the contents of the recognized faults.

3.4. Clock Interface

The clock interface refers to clock systems in the SIFCOM and individual unit along the flow of cells.

In the SIFCOM, a cell is written to the DMUX buffer in the DMX-LSI in synchronism with a 12.96 MHz clock obtained by dividing a 77.76 MHz clock transferred from the ASSW (ATM switch) into 6 units.

Figure 116:
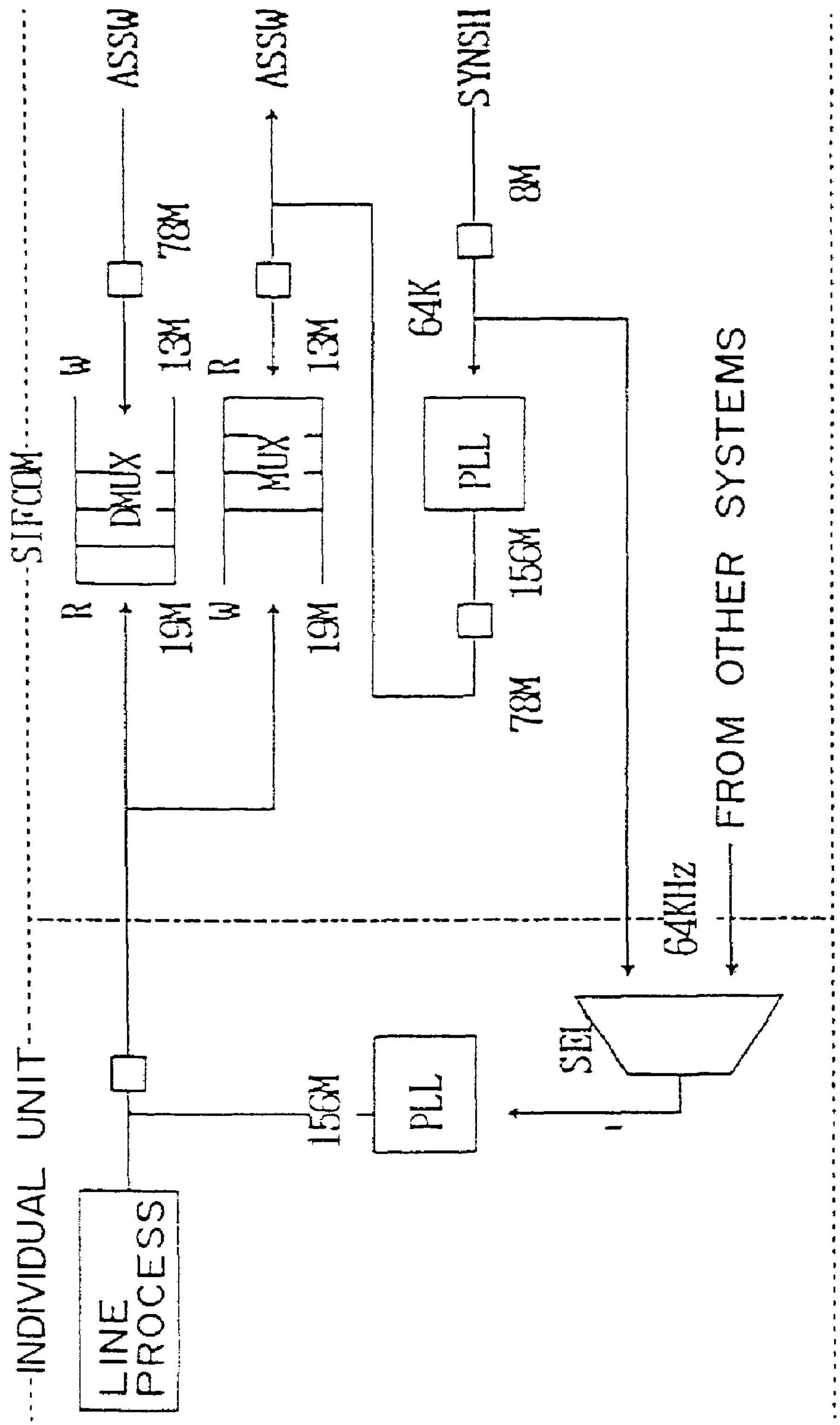
FIG. 116 shows a clock interface along the cell stream in the SIFSH-A and between the individual units.

As shown in FIG. 116, a cell is read from the DMUX buffer in the DMX-LSI to the individual unit in synchronism with a 19 MHz (19.44 MHz precisely) clock transferred from the individual unit. The 19 MHz clock from the individual unit is generated as follows. That is, as shown in FIG. 116, a 64 KHz clock is transferred to the individual unit in the SIFCOM after being obtained by dividing into 128 units an 8 MHz clock received from the SYNSH through an optical link. According to the clock, the PLL module in the individual unit generates a 156 MHz (155.52 MHz precisely) clock. Then, the above described 19 MHz clock can be generated by dividing the 156 MHz clock.

The PLL module in the SIFCOM also generates a 156 MHz clock according to the 64 KHz clock obtained by dividing into 128 units the 8 MHz clock received from the SYNSH. An upward cell is written to the MUX buffer in the MUX-LSI corresponding to each circuit in synchronism with the 19 MHz clock transferred from the individual unit. The cell is read from the MUX buffer in synchronism with the 13 MHz (12.96 MHz precisely) clock obtained by dividing the above described 156 MHz clock. The read cell is converted from the parallel data format into the serial data format, and transmitted to the ASSW at a bit rate of 78 MHz (77.76 MHz precisely).

4. Software Interface

Described below are the interface between the SIFCOM and the switch software, that is, an ATM layer cell format, SAR-PDU format, and LAP-D layer 2 (L2) format. The LAP-D layer 3 (L3) format is explained in 10.9 of part 2. The switch software refers to a program executed in a processor for controlling the entire process of the switch (call process, switch control process, etc.).

4.1. Outline

The SIFCOM communicates with the switch software by performing an intra-station control communications with the BSGC using a simple LAP through a path in the switch passing through the ASSWSH (refer to FIG. 94). The BSGC communicates with the switch processor through an interface type T (INFT).

A simple LAP-D is a protocol newly developed by the Applicant of the present invention to reduce the load on the hardware and firmware. Specifically, numbered frames in layer 2, which charge a heavy load on the hardware, can be successfully removed. As a result, only unnumbered frames are processed in layer 2. To avoid missing and duplicate messages, numbered frames are processed in layer 3. Since the number management function is originally indispensable for firmware, the numbered frames in layer 3 do not cause an increased load on the firmware.

The simple LAP-D frames in layer 2 are stored after being divided into ATM cells each having 54-octet data length and transferred via the highway in the switch, thereby realizing an in-band intra-station communications.

The in-band communication is a technology required in connecting a broadband remote line concentrator (BRLC: refer to FIG. 34) to a host switch. The in-band communication in the host switch realizes a common control system in the BRLC and the host switch and successfully reduces the number of cables for connecting a control bus to a shelf in the host.

4.2. Layer Structure in Intra-station Control Communications

Figure 117:
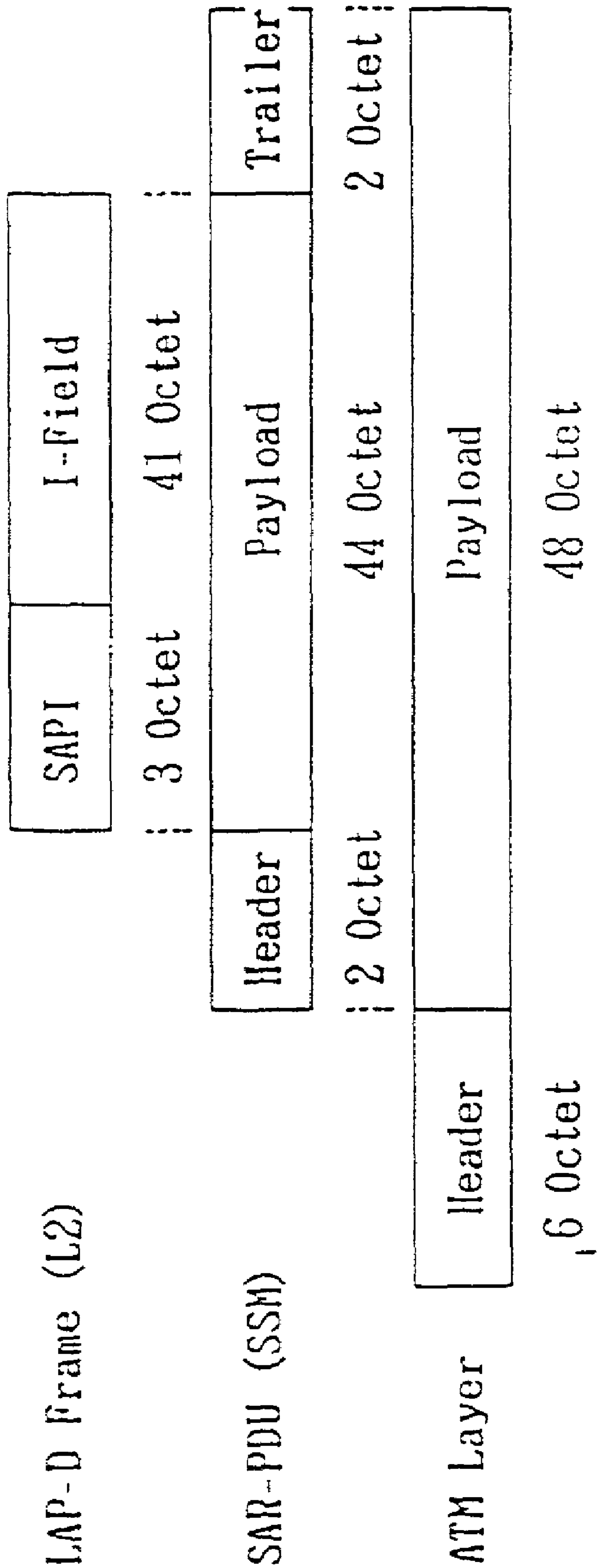
FIG. 117 shows the structure of the layer of the intra-station control communications.

FIG. 117 shows the layer structure in the intra-station control communications with the CD-PDU (described later) omitted.

4.2.1. ATM Layer Cell Format

FIG. 118 shows the cell format of an ATM layer in the simple LAP-D.

4.2.2. SAR-PDU Format

Figure 119:
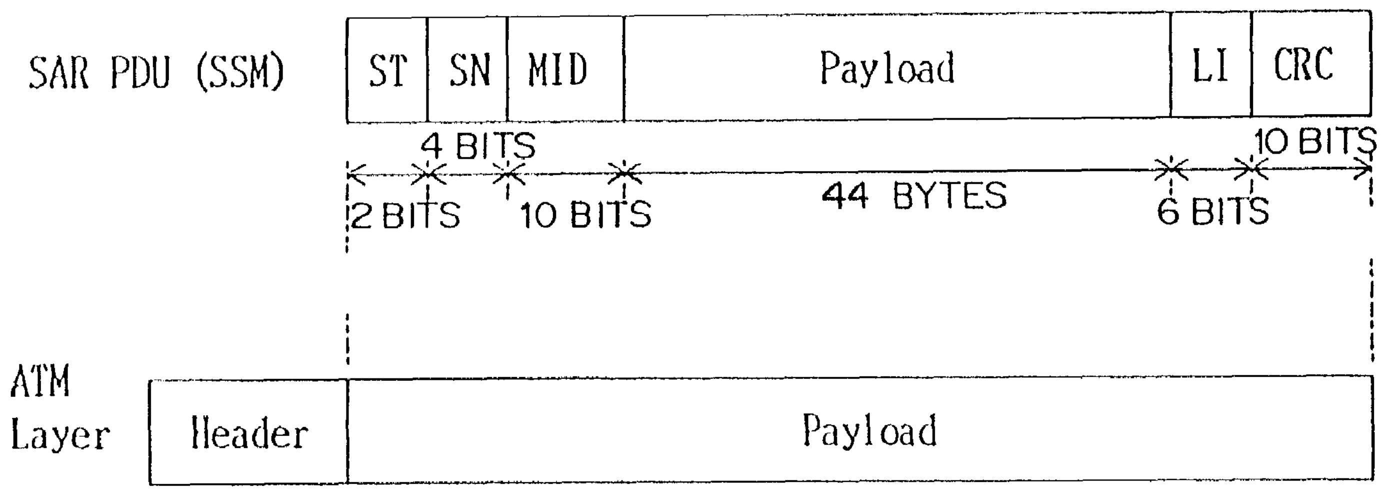
FIG. 119 shows the format of the SAR-PDU in the simple LAP-D.

FIG. 119 shows the SAR-PDU format for the simple LAP-D.

The SAR-PDU format can be based on the ATM adaptation layer (AAL) protocol type 3 or 4.

An SAR-PDU consists of a segment type (ST), sequence number (SN), MID (don't care in an intra-station control communications cell) payload, payload byte length indicator (LI), and CRC (ST, SN, MID, and CRC-10 for a payload). It is stored in a payload of an ATM cell, and provided with an ATM header at its head.

The payload of the SAR-PDU stores a LAP-D message.

If the data length of the LAP-D data is 44 bytes (refer to FIG. 749 in part 7), then the message is stored in the payload of a single SAR-PDU. In this case in the SAR-PDU, a single segment message (SSM) is set as an ST and the LI is set to 44 bytes.

If the data length of the LAP-D is 256 bytes (refer to FIG. 750 in part 7), the message is divided into a plurality of 44-byte segments to be stored in the payloads of plural SAR-PDUs. Accordingly, the LAP-D data is stored and transferred after being divided into a plurality of ATM cells. In this case, the SAR-PDU storing the leading segment is assigned a beginning of message (BOM) for its ST and 44 bytes for its LI. The SAR-PDU storing an intermediate segment is assigned a continuation of message (COM) for its ST and 44 bytes for its LI. The SAR-PDU storing the trailing segment is assigned an end of message (EOM) for its ST and 36 bytes for its LI (refer to FIG. 750 in part 7).

4.2.3. LAP-D Format (Layer 2)

FIG. 120 shows the LAP-D format of layer 2. A LAP-D frame is stored in he payload of the SAR-PDU after being properly divided as described in 4.2.2. above.

5. Allocation of Tag

FIG. 121 shows the format of an ATM cell processed in the SIFSH-A.

According to the present embodiment, an ATM cell is routed using a tag added as its header. A part of bits in the virtual path identifier area is used as a tag area. As a result, a VPI which can be defined for the DS1 transmission line is 64 at maximum. All tags for 156 Mbps transmission line are accommodated in the second octet. If a transmission line has a network node interface (NNI), then a total of 6 bits of the MUXM, ADS1-BLK, and ADS1-SEL as shown in FIG. 121 are assigned to the VPI.

Figure 122:
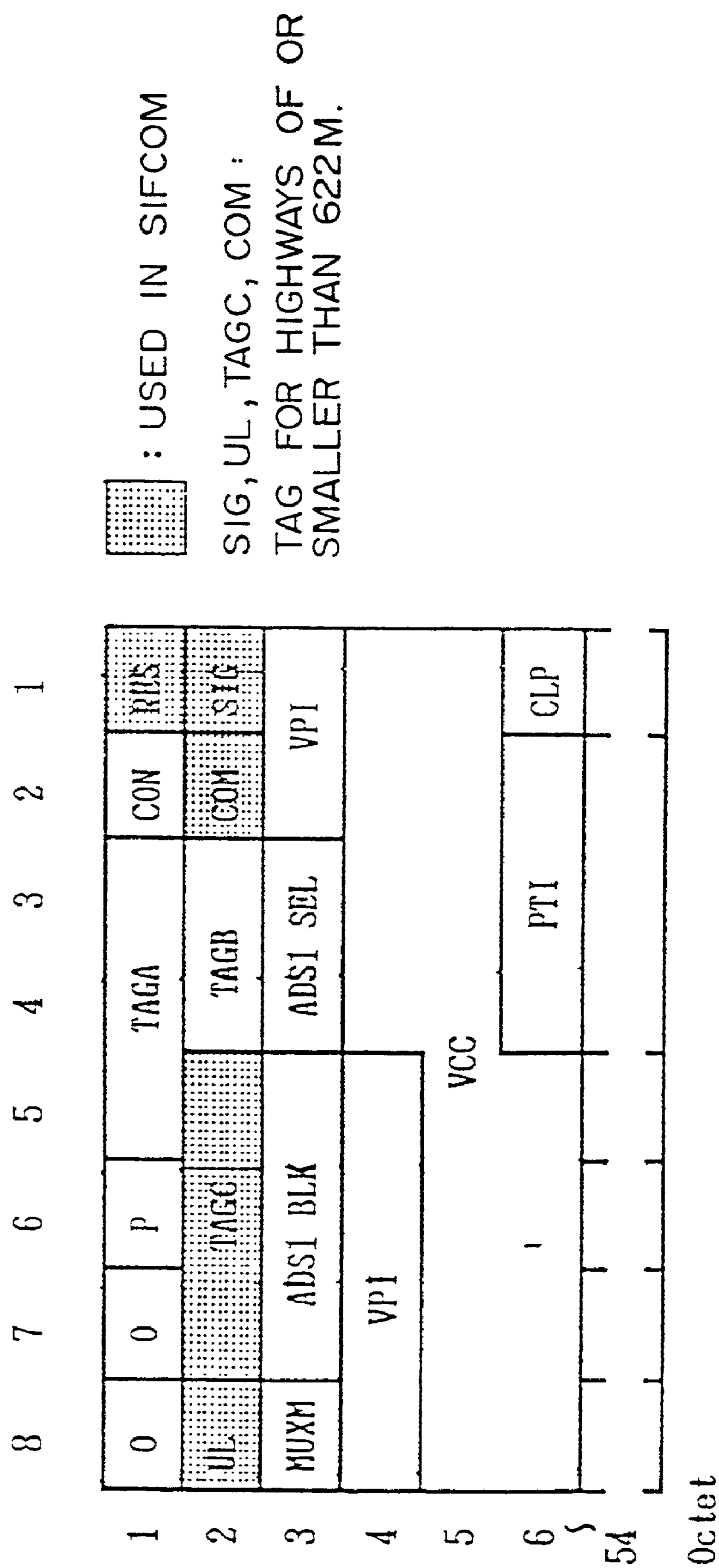

FIG. 122 shows the configuration of the ATM cell header data used in the SIFSH-A. FIG. 123 shows the use of an ATM cell header data in the SIFSH-A.

Figure 124:
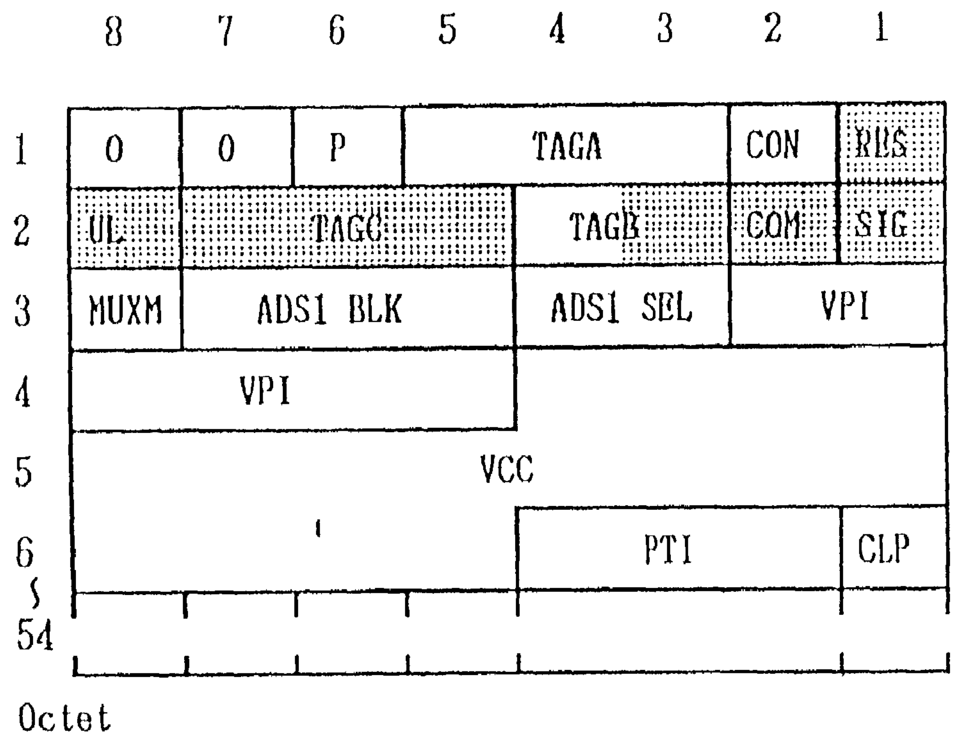

FIG. 124 shows the configuration of the ATM cell header data used in the RMXSH (refer to FIG. 34). FIG. 125 shows the use of an ATM cell header data in the RMXSH.

Figure 126:
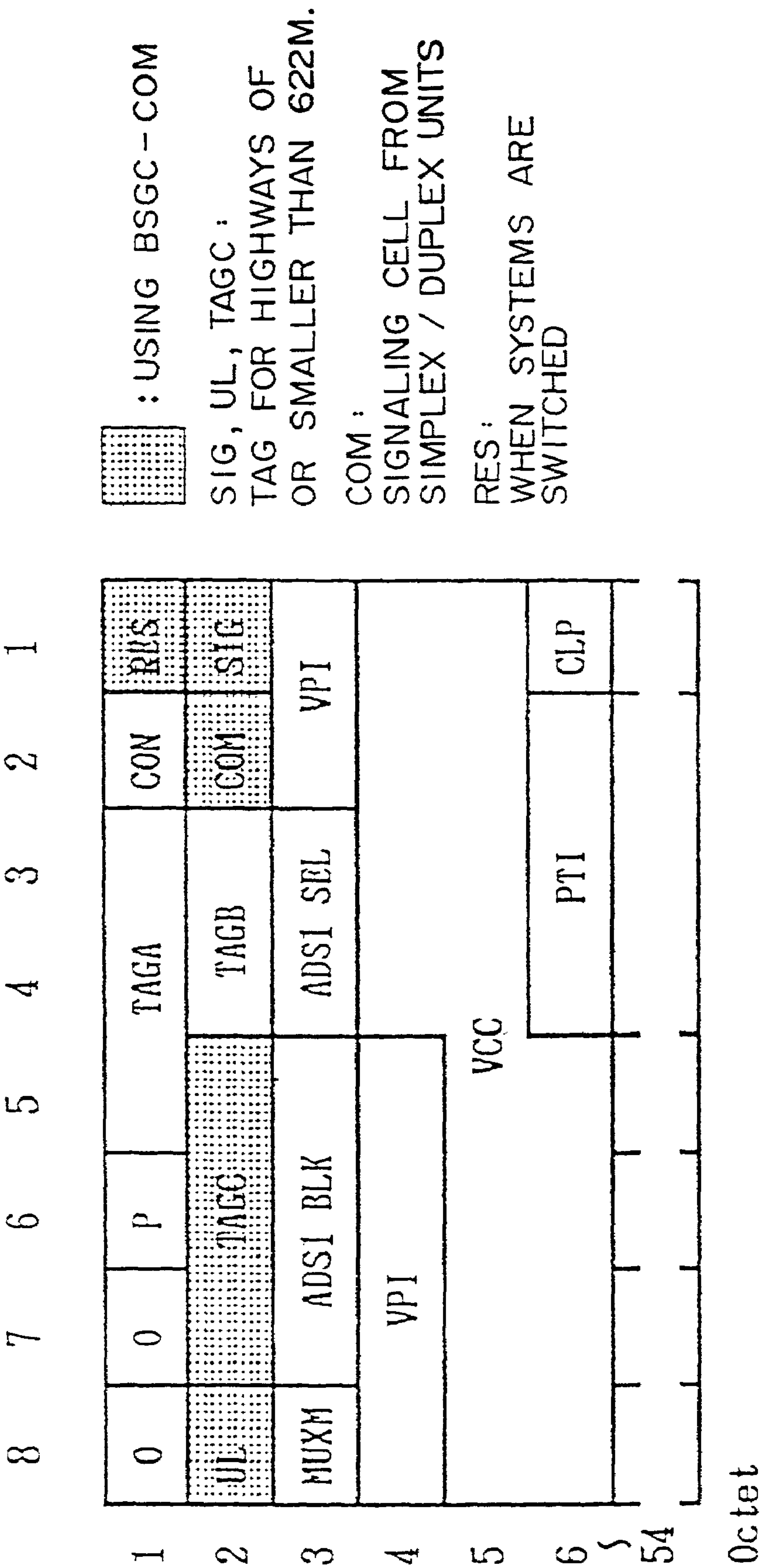

FIG. 126 shows the configuration of the ATM cell header data used in the BSGCSH (refer to FIG. 94). FIG. 127 shows the use of an ATM cell header data in the BSGCSH.

FIG. 128 shows the use of a SIG/ADS1BLK/ADS1SEL in the SIFSH-A.

Figure 129:
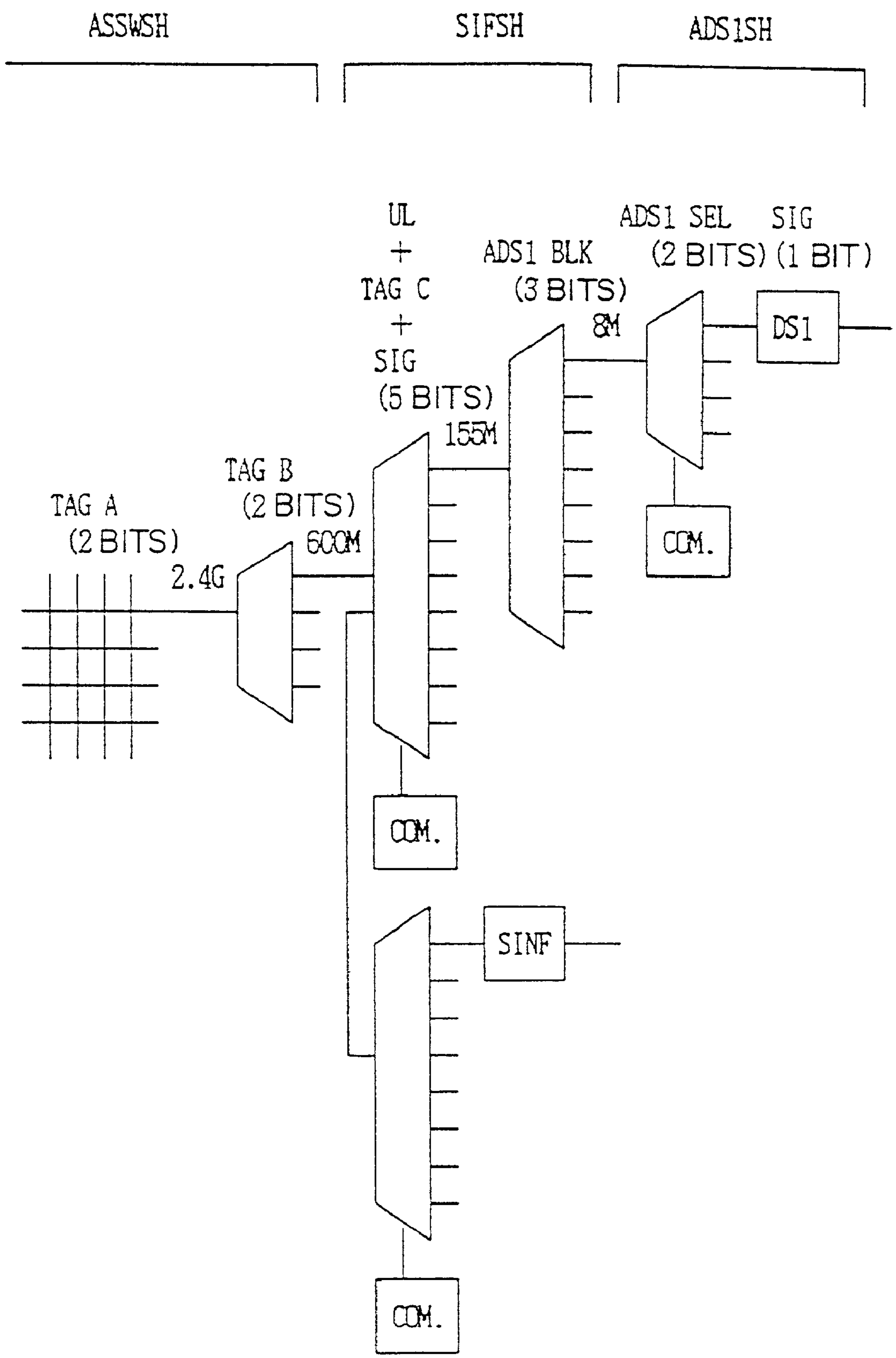

FIG. 129 shows the allocation of functions of ATM cell header data defined in FIGS. 122, 123, and 128 in the SIFSH-A and ADS1SH (refer to FIG. 8).

6. Functions

The functions of the SIFCOM are explained from the viewpoint of the hardware configuration.

6.1. MUX 6.1.1. Outline

Figure 130:
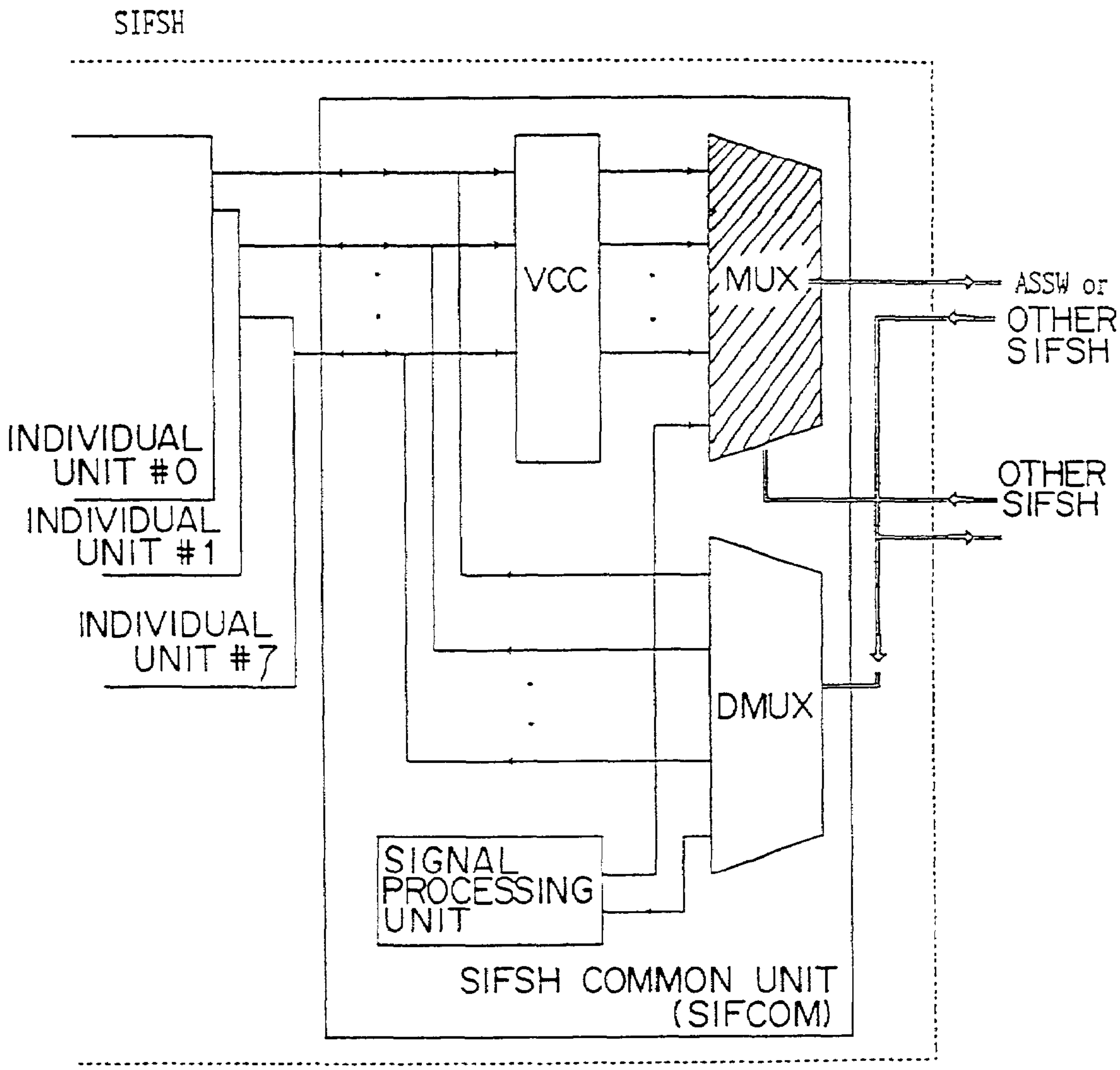

FIG. 130 shows the position (hatched portion) of the MUX in the SIFSH-A.

The MUX multiplexes in the upward highway to the ASSW the ATM cell (whose header has been converted by a VCC) transferred from individual units #0 #7 accommodated in the SIFSH-A, and a signaling cell generated by the signal processing unit in the SIFCOM.

Figure 131:
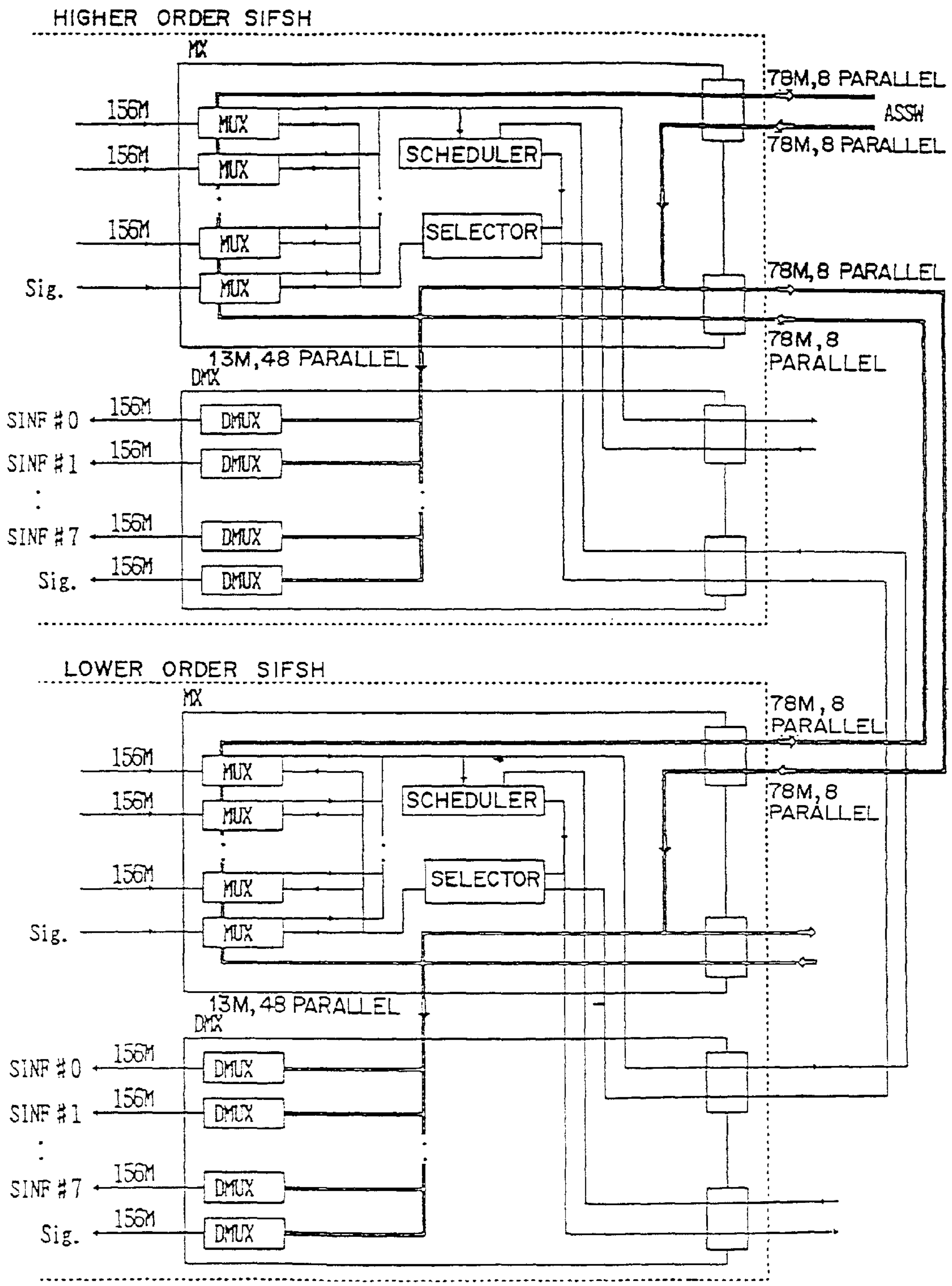

If the SIFSH is connected in series, then the multiplexing control of both MUXes is performed collectively, and the data for two shelves is multiplexed in one upward highway and transmitted from a higher order SIFSH-A to the ASSW. FIG. 131 shows the configuration of the serial connection of the SIFSH-A.

6.1.2. Configuration of MUX

Figure 132:
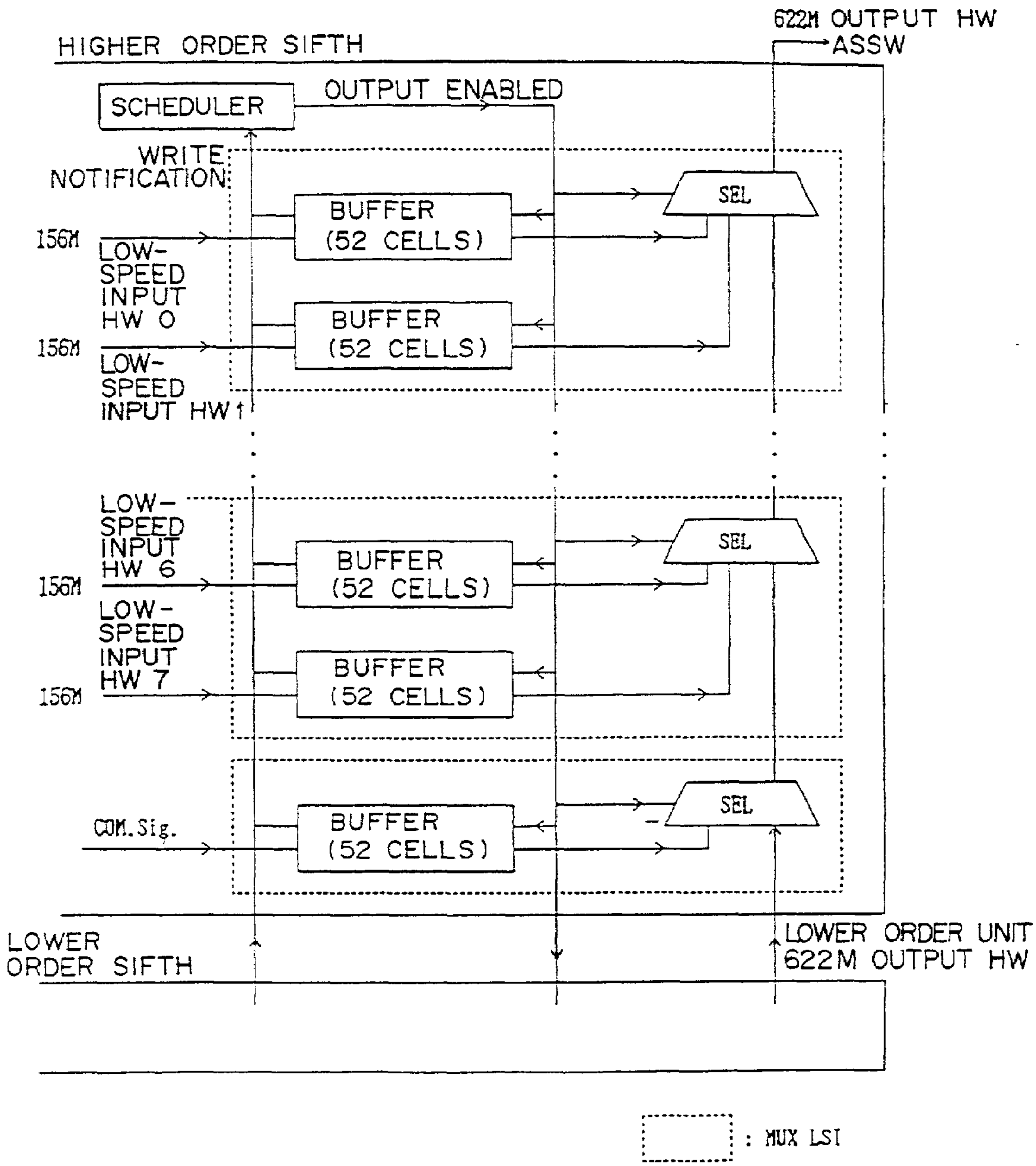

FIG. 132 shows the configuration of the MUX.

The MUX multiplexes a cell in the 156 Mbps upward highway connected to each individual unit and a signaling cell generated in the signal processing unit (shown in FIG. 130) in the SIFCOM in the 622 Mbps upward highway to the ASSW. The cell transferred from each individual unit is input to the MUX after its header is converted according to the VCC (refer to FIG. 130).

The MUX comprises a buffer for 52 cells corresponding to each individual unit, and only valid cells are stored in the buffer. Each buffer notifies the multiplexing control unit (scheduler) of a write of a cell each time a cell is written to the buffer. When each buffer receives output permission from the scheduler, it multiplexes a cell by reading the cell in the buffer.

6.1.3. Multiplexing Control System

The multiplexing control of an ATM cell in the 156 Mbps highway extended from each individual unit is performed by a scheduler. A scheduler is assigned to each 622 Mbps upward highway. If the SIFSH-A is connected in series, then the scheduler in the lower order SIFSH-A is not operated, and the multiplexing control of the lower-order SIFSH-A is performed by the scheduler in the higher order SIFSH-A.

Figure 133:
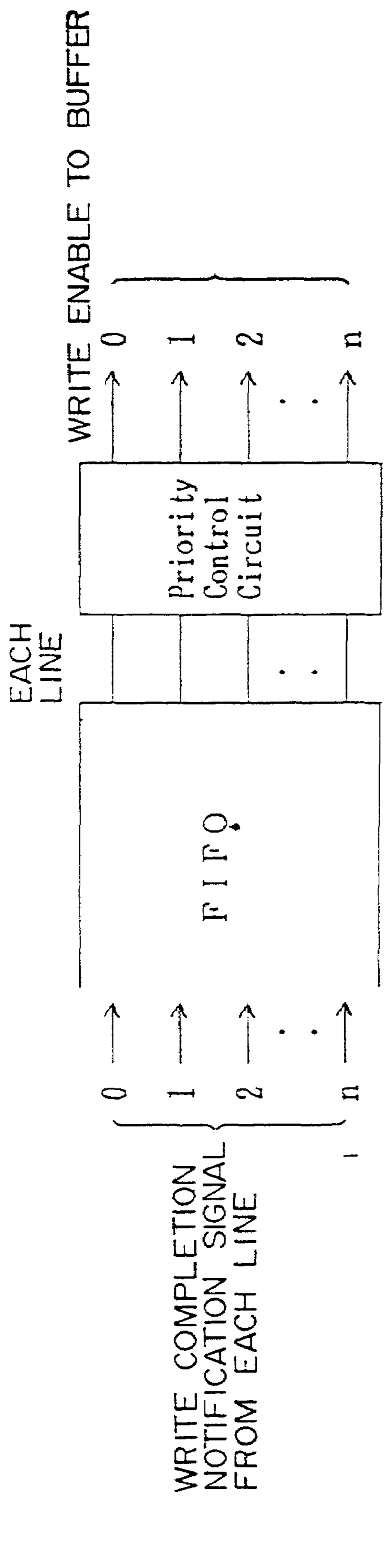

FIG. 133 shows the outline of the configuration of the scheduler.

If a valid cell is written to a buffer (FIG. 132) for each line, then a write completion signal indicating that a cell in the 156 Mbps highway has been written to the buffer is transmitted from a write control unit (not shown in FIG. 133) in each buffer to the scheduler.

As shown in FIG. 133, the scheduler contains a FIFO having 18-bit width corresponding to the number of circuits (individual units) to be monitored by the scheduler, samples the write completion signal received from each circuit on a 2.7 μsec cycle, and writes the write completion signal to the FIFO. The 2.7 μsec cycle corresponds to the time required to transmit one cell in the 156 Mbps highway.

Each bit position in the FIFO is output as an output permission signal to a buffer on a cycle of approximately 700 μsec as shown in FIG. 135 after the priority is determined in a priority control circuit. The approximately 700 μsec cycle corresponds to the time required to transmit one cell in the 600 Mbps highway.

Each individual unit has a simplex configuration, while the SIFCOM has a duplex configuration. This scheduler multiplexing control system is applied so that the loss of cells can be minimized by matching the sequence of cells in an active system in the duplex portion including the ASSW (ATM switch) with that in a standby system.

6.1.4. Monitor of Buffer

The MUX comprises a dual port RAM having a capacity of 52 cells (8 bits×54 octet×52 cells=22464 bits) per circuit (individual unit) as a buffer used in multiplexing ATM cells in a low-speed input highway into a high-speed input highway, and the RAM is used as a FIFO.

6.1.5. Write Control

Input cells are written to the buffer only if the following conditions are satisfied.

(1) Input cells are valid.

(2) The buffer is not full.

(3) Congestion control is not performed (refer to 6.1.9.).

6.1.6. Abnormal Write Process

If an abnormal cell described in 6.1.6.1. and 6.1.6.2. below is input, then the following abnormal write process is performed.

6.1.6.1. Too Small Cell Length

If the data length of an input cell is too small as shown in FIG. 136, then the cell is discarded, and written is a cell subsequently input at the corresponding address in the buffer.

6.1.6.2. Too Long Cell Length

If an abnormal cell described in 6.1.6.1. and 6.1.6.2. below is input, then the leading 54-octet data forming the cell is written at the specified address in the buffer, and the following data forming the cell is ignored.

6.1.7. Read Control

A cell is read from each buffer only if the scheduler inputs "H" indicating an output permission signal to the buffer.

6.1.8. Abnormal Read Process

If the scheduler inputs to a buffer an output permission signal at intervals within approximately 700usec (refer to FIG. 135) as shown in FIG. 138, then the buffer ignores an output permission signal input at short time intervals, and the cell is read from the buffer according to the subsequent output permission signal.

6.1.9. Buffer Congestion Control

The MUX controls the congestion of each buffer in the MUX according to the pattern of each value of P bit and CON bit (FIG. 121) indicated in the tag area in the header in an ATM cell.

The buffer congestion control data is set by the switch software as EMST information through the intra-station control communications. The information is provided by the microprocessor in the SIFCOM for each buffer in the DMUX. A threshold at 9 levels should be set to control the quality and priority at the congestion of a buffer. FIG. 139 shows a determined threshold.

At the reset of the SIFSH-A hardware, the maximum buffer length, which is an initial value, is set as a cell discard start threshold. If the cell discard is started, then the number of cells discarded according to each threshold corresponding to each of the thresholds Qa, Qb, Qc, and Qd is counted.

Each threshold should be set through the intra-station control communications such that the following conditions can be satisfied. These conditions are not checked by hardware.

$Q0 \geqq Q1 \geqq Qa \geqq Qa' > 0$, $Q0 \geqq Q1 \geqq Qb \geqq Qb' > 0$ $Q0 \geqq Q1 \geqq Qc \geqq Qc' > 0$, $Q0 \geqq Q1 \geqq Qd \geqq Qd' > 0$ 6.2. DMUX 6.2.1. Outline FIG. 140 shows the position (hatched portion) of the DMUX in the SIFSH-A.

The DMUX demultiplexes the ATM cell in a high-speed highway down the ASSW or a higher order SIFSH-A connected in series into a cell toward a low-speed highway downward each of the individual units in the SIFSH-A and a signaling cell input to the signal processing unit in the SIFCOM. The cells are demultiplexed according to the tag in the header of each cell.

6.2.2. Functions

FIG. 141 shows the configuration of the DMUX. FIG. 142 shows the format of a cell in the switch. FIG. 143 shows the location of the matching bit of the header to be used in the DMUX.

The DMUX demultiplexes a cell to each of up to 8 individual units in the shelf and a signaling cell from the 622 Mbps high-speed highway according to the data (hatched portion shown in FIG. 142) of the SIG, UL, and COM in a cell header. Then, the DMUX transmits the former through the 156 Mbps low-speed highway connected to each individual unit, and the latter to the signal processing unit (FIG. 140) in the SIFCOM. In this case, the DMUX comprises a buffer for 112 cells for each individual unit.

A cell dropper (cell DRP) for each individual unit in the DMUX shown in FIG. 141 determines whether or not a cell is dropped into the 156 Mbps low-speed highway connected to itself by determining whether or not the pattern of each data (hatched portion shown in FIG. 142) of the SIG, UL, TAGC, and COM in the header of an input cell matches the matching pattern (shelf/line ID) (refer to FIG. 143) preliminarily set in itself.

6.2.3. Dynamic Tag Matching

The SIFCOM has the dynamic tag matching function to set a matching pattern shown in FIG. 143 for the DMUX at the instruction of the-switch software.

A tag is autonomously set depending on each line number as a hardware default. The above described dynamic tag matching function is required when an umbilical link is set between a host switch and the BRLC (refer to FIG. 34).

That is, the SIFSH-A accommodating the umbilical link set for the BRLC requires a redundancy configuration referred to as a circuit protection (N+1 system) described later in 9. In this case, TAGC="100" is set from the switch software through the microprocessor in the SIFCOM according to command A at the DMUX 0 corresponding to the individual unit accommodating the active circuit of the umbilical link as shown in FIG. 144, while TAGC="000" is set according to command B at the DMUX 4 corresponding to the individual unit accommodating a standby circuit of the umbilical link. If a fault occurs in the active circuit, then two TAGC values set at DMUX 0 and DMUX 4 are swapped to switch the active and standby circuits.

6.2.4. Monitor of Buffer

Each buffer of the DMUX (refer to FIG. 141) controls the congestion as follows by monitoring the number of cells (length of queue) stored in itself.

(1) The microprocessor is notified of the present length of queue.

When the microprocessor issues a request to read the number of cells, the cell count value is moved to a register and the count value is reset (read reset).

(2) The congestion is controlled according to the threshold of 9 levels as shown in FIG. 145.

The buffer congestion control: data is set by the switch software as the EMSD information through the intra-station control communications The information is provided by the microprocessor in the SIFCOM for each buffer in the DMUX.

At a SIFSH-A hardware reset, the maximum buffer length, which is an initial value, is set as a cell discard process start threshold.

Listed below are the relationships between each threshold and a buffering operation in each buffer.

(1) If a queue length exceeds threshold QA, then the buffer notifies the microprocessor of it and simultaneously notifies a light controller (not shown in the drawings) in the buffer of a marking cell discard instruction. A marking cell refers to a cell in which P bit and CON bit (refer to FIG. 142) displayed in the tag area of a header are set. Unless the microprocessor specifies the priority control and quality control, the buffer autonomously start the congestion control.

(2) If the queue length is restored to threshold QA', then the buffer notifies the microprocessor of it, and simultaneously notifies the light controller in the buffer of the stop of the discard of marking cells. The quality control or priority control is not stopped, but the discard of cells is stopped.

(3) When the queue length reaches threshold Q1, the buffer notifies the microprocessor of the occurrence of a fault, and simultaneously instructs the light controller to stop the buffering operation even if the cell to be input to the buffer is a valid cell.

Likewise, the congestion control listed in (1), (2), and (3) is performed on thresholds QB, QC, and QD.

(4) The DMUX indicates no special relationship between the priority control and the quality control. That is, the priority and quality control are performed independently using control bits corresponding to each control.

Each threshold should be set through the intra-station control communications such that the following conditions can be satisfied. These conditions are not checked by the hardware. The buffering operation is not guaranteed in the DMUX when the conditions are-not satisfied.

Q0>Q1>QA>QA'>0 Q0>Q1>QB>QB'>0

Q0>Q1>QC>QC'>0 Q0>Q1>QD>QD'>0

6.3. VCC 6.3.1. Position of VCC

A virtual channel controller (VCC) retrieves on a table a VPI/VCI/TAG (hereinafter referred to as an output VPI/VCI, TAG) corresponding to the VPI/VCI (hereinafter referred to as an input VPI/VCI) assigned to an input ATM cells, and assigns the output VPI/VCI/TAG to the ATM cell.

The position of the VCC is a duplex portion SIFCOM.

The VCC is required for each circuit and should be loaded individually. However, it is loaded into the SIFCOM on the following grounds.

Assume that the VCC is loaded into the individual unit having the configuration of a duplex VCC. Furthermore, assume that the cell transmitted from subscriber line A (A sub) is received by subscriber line B (B sub) as shown in FIG. 146, and the cell transmitted from subscriber line C (C sub) is received by subscriber line D (D dub).

Under the assumption above, further assume that a fault occurs at the VCC in the individual unit for subscriber A (A sub) as shown in FIG. 146, and that a cell is routed such that it is transferred from subscriber line A (A sub) to subscriber line D (D sub). As a result, cells are concentrated in a specific transmission line in the ASSW, and congestion arises at the position marked with ● (FIG. 146), thereby possibly causing a switch fault. In the worst case, a fault at the VCC corresponding to a single subscriber line may undesirably affect 64 or more circuits.

In this case, the fault detecting process can monitor an MC (monitoring cell) at a receiving equipment. In this process, a fault can be detected by inserting a monitoring cell (MC1 and MC2 in FIG. 146) in each subscriber line at the sending equipment and monitoring the cell in each subscriber line at the receiving equipment. However, if the. above described switch fault has arisen, then both monitoring cell MC1 inserted in subscriber line A (A sub) in which the fault has arisen and monitoring cell MC2 inserted in subscriber line C (C sub) in which no fault has arisen are discarded. As a result, cells cannot be normally monitored, and an exact cause of the fault can hardly be specified.

If a switch fault has arisen, the systems in the SIFCOM and ASSW are switched. However, since the fault has occurred in the VCC of the individual unit having a simplex configuration, a switch fault will soon occur in a newly active ASSW.

If the VCC is loaded into the SIFCOM having a duplex configuration of the VCC, then the system of the operating SIFCOM is switched into the system of the SIFCOM containing the VCC indicating no fault, thereby successfully recovering from the fault.

After the switch of systems, the faulty VCC can be specified using a test cell generator (TCG), etc.

The VCC can be loaded into the SIFCOM on the above listed grounds.

6.3.2. Capacity of VCC Memory

As shown in FIG. 143, the VCC memory stores two VCC tables in consideration of the future virtual path (VP) services.

Table 1 (Table-1) is used to retrieve an intermediate VPI using an input VPI (VPI assigned to an input cell) as an address. According to the present embodiment, an input VPI value=an intermediate VPI value assuming that no VP services are provided.

Table 2-(Table-2) is used to retrieve an output VPI/VCI using an intermediate VPI+input VCI (VCI assigned to an input cell) as an address. According to the present embodiment, an input VPI value=an intermediate VPI value assuming that no VP services are provided.

6.3.3. Inter-System VCC Copy 6.3.3.1. Object

Described below is the inter-system copy required in the OUS→INS procedure.

6.3.3.2. Timing of Inter-System Copy

The inter-system copy is performed in the OUS→INS procedure in a state in which one system is active and the other system is in an OUS state.

6.3.3.3. Copy Object Information

All information set on the VCC table is copy object information. Listed below is the information. The values in the parentheses indicate the number of bits of respective pieces of information.

(1) Settings of VCC as valid/invalid (1)
(2) CLP (cell loss priority) copy control (1)
(3) Output highway specified tag field (8)
(4) Signaling identification (1)
(5) Higher order/lower order identification (1)
(6) SIFCOM specification (1)
(7) MUX multicast indication (1)
(8) ADS1-SEL identification (1)
(9) ADS1-BLK identification (1)
(10) Quality class (1)
(11) Intra-system test cell indication (1)
(12) Congestion control (1)
(13) Output VPI (8)
(14) Output VCI (16)
(15) Distribution connection (fixed to “0”) (1)
(16) Payload type (3)
(17) Switch IN/OUT indication (1)

The VCC table contains a parity bit which is not copy object information but is checked at a reading operation on the VCC table and is generated at a writing operation.

6.3.3.4. Procedure for INS Process

The state transition from OUS to INS is carried out after a switch processor (CC) issues a copy start command to instruct the VCC table of an active system to be copied to the VCC table of an OUS system, and after the contents of the VCC table of the active system are all copied to the VCC table of the OUS system.

Before the copy start command is issued, the CC issues a reset request command to the SIFCOM of the OUS system. The copy process is performed after the contents of the VCC table in the SIFCOM of the OUS system is reset. Furthermore, the SIFCOM of the OUS system notifies the CC of the reset completion notification status after the reset is completed. The reset process enables only the VPI/VCI on the VCC table in the SIFCOM of the active system to be copied to the VCC table in the SIFCOM of the OUS system, thereby shortening the copying time.

FIG. 148 is an arrow diagram showing the procedure for an INS process. The procedure is described below by referring to FIG. 148.

If the copy process terminates normally, then the SIFCOMs of both systems notify the CC of a copy completion status. Unless the copy process terminates normally due to an inter-system communications fault, etc. from no response of a corresponding SIFCOM, then a copy disable status is provided for the CC. As a result, the CC determines failure in the copy process and resets again the SIFCOM of the OUS system. If any of the SIFCOMs of both systems issues the copy disable status, then the SIFCOM of the OUS system is reset again. FIG. 149 shows the status of each system and the process of the CC.

Normally, a set/release command (call process command) is issued by the CC to the SIFCOM of both systems independently. The SIFCOM is configured such that it can receive a call process command in a VCC copy process. During the VCC copy process, the command is issued by the CC not to the SIFCOM of both systems but to the SIFCOM of the active system. This is because the call process command reaches the SIFCOM of the OUS system faster than the SIFCOM of the active system, and the contents of the VCC table in the SIFCOM of the OUS system may be set again to the previous contents through the copy process on the VCC table from the SIFCOM of the active system when the VCC table in the SIFCOM of the OUS system is updated to the new contents. Since preventing the inconsistency through the hardware complicates the protocol and enlarges the scale of the hardware, a call process command is issued only to the SIFCOM of the active system.

Accordingly, if the state of the SIFCOM is changed from the copy state to the operation state, then required is a protocol for preventing the specification of a call process command from the CC to the SIFCOM of the old OUS system from being lost by the crossing of a command and a status. Listed below are the important points of the protocol.

(1) The SIFCOM of the active system informs of a copy completion status after completing the copy of the VCC table.

(2) After receiving the status described in (1) above, the CC issues a copy completion notification command to the SIFCOM of the active system.

(3) The SIFCOM of the active system copies to the other system all call process commands received before receiving the command described in (2) above. All call process commands received after receiving the command described in (2) above are executed only in its own system and are not copied to the other system.

(4) When receiving a copy completion notification from the SIFCOM of the active system, the SIFCOM of the OUS system issues a copy completion status to the CC. The items (2) through (4) above are not restricted in timing among them.

(5) After receiving the status described in (4) above, the CC issues a copy completion notification command to the SIFCOM of the OUS system.

(6) After transmitting the command described in (5) above, the CC issues an online mode set command to the SIFCOM of the OUS system.

(7) If the queue stores a call process command to a new standby system while the processes described in (3) through (6) are executed, then the CC issues the command immediately.

After the process (7) above, the CC issues a call process command independently to each SIFCOM of the active and standby systems.

6.3.3.5. Copy Disable Report

The SIFCOMs of both systems notify the CC of the copy completion if the VCC table has been normally copied. If it cannot be normally copied, then the copy disable report is provided for the CC. The copy disable report is issued if any of the following faults occurs in the inter-system cross connection.

(1) Timeout

A copy start request is not issued by the SIFCOM of the OUS system in response to the copy start request from the SIFCOM of the active system.

A copy start request is not issued by the active system in response to the copy start request from the SIFCOM of the OUS system.

A copy completion notification is not issued from the SIFCOM of the active system.

(2) Detection of Parity Error

A parity error has occurred during the transfer.

6.3.4. Relationship between VCC and SMDS Service

The VCC in the SIFCOM specifies the permanent virtual circuit (PVC) established-between the SIFCOM and the SBMESH (FIG. 8) for providing the SMDS service from the specific value (for example, VPI=3F, VCI=03FF) added by the individual unit, and simultaneously changes the value of the VPI/VCI assigned to the header of the ATM cell containing the payload field input from the individual unit of the DS3-SMDS interface, etc. and the L2-PDU of the SMDS service into the value of the VPI/VCI specifying the subscriber network interface (SNIP terminating the individual unit which transmits the ATM cell. Accordingly, the PVC established between the SIFCOM and the SBMESH is assigned the value of the VPI/VCI of the number corresponding to the number of the SNI terminated by the individual unit connected to the SIFCOM and used for the SMDS service. The SIFCOM adds to the head of the ATM cell a tag for use in autonomously switching the ATM cell in the ATM switch and transferring it to the SBMESH.

6.4. Signaling Process (EGCLAD)

6.4.1. Outline

FIG. 150 shows the position of the signal processing unit (EGCLAD) in the SIFSH-A.

An EGCLAD LSI converts between a simple LAP-D based frame and an ATM cell to realize the intra-station control communications between the SIFSH-A and the BSGC (FIG. 94).

The microprocessor and the EGCLAD LSI communicate LAP-D layer 2 frames through the dual port SRAM (DPRAM shown in FIG. 150).

6.4.2. Functions of EGCLAD LSI

The EGCLAD LSI has the following functions to compose and decompose a signaling cell.

6.4.2.1. ATM Header Check Functions

The EGCLAD LSI checks the contests of the hatched portion shown in FIG. 151 in the header of the signaling cell transferred from the BSGC through the ASSW (FIG. 94). Then, the EGCLAD LSI composes the LAP-D frame based on the cell determined to be good as a check result. The EGCLAD LSI writes framed data to the dual port SRAM and sets a reception completion flag, thereby notifying the microprocessor of the existence of a received frame.

The microprocessor reads the received frame from the dual port SRAM if the flag is set.

6.4.2.2. ATM Header Inserting Function

The microprocessor writes the LAP-D layer 2 frame to the dual port SRAM and notifies the EGCLAD LSI of the write completion through the register.

After receiving the write completion notification, the EGCLA-D LSI reads LAP-D layer 2 frame in the dual port SRAM. Then, the EGCLAD LSI converts the frame into a signaling cell by inserting to the frame the header and trailer indicated as hatched portions in FIG. 152. The EGCLAD LSI sends the signaling cell in synchronism with the shaping clock provided externally.

7. Test and Maintenance

The ATM switch is monitored and tested by the following steps.

(1) Monitoring the quality of a path using a monitoring cell (MC)

(2) Circuit test for a test cell using the test cell generator (TCG)

7.1. Monitor of Quality of Path Using MC

As shown in FIG. 153, an MC is inserted in a subscriber interface at an input terminal. The MC should be inserted at predetermined intervals of cells for each path. The SINF at an output terminal requires the function of monitoring the MC inserted at predetermined cell intervals.

Monitoring an MC is effective only for an active system because all MCs passing through the ASSW of a standby system are discarded in the SIFCOM at the output terminal of the standby system and do not reach the SINF at the output terminal as indicated by broken lines shown in FIG. 153.

Accordingly, the quality of a path in the standby system is tested only by the TCG.

The quality of a path using an MC is monitored in all SINFs, not in the SIFCOM.

7.2. Circuit Test of Test Cell through TCG

The circuit test through a TCG-is activated by the following tests.

(1) On Demand Test on Active System

Fault portion specifying test based on maintainer's command at an occurrence of a fault in the active system (2) On Demand Test on Standby System Normality confirmation test through online software at the switch of systems (3) On Demand Test and Diagnostics test on the OUS system Fault portion specifying test based on maintainer's command at an occurrence of a fault in the standby system Diagnostics As shown in FIG. 154, since a test of specifying a faulty portion in an active system and a test of confirming normality before switching systems for a standby system are conducted, the SINF and SIFCOM are loaded with the cell-by-cell loopback function for performing a normal process on a user cell and looping back only cells generated by the TCG.

The cell-by-cell loopback function indicates a loopback for each VPI/VCI. Therefore, the switch software notifies a loopback unit of a VPI/VCI value of a looped-back cell through an MSD.

Since the test on the standby system or the OUS system through the TCG can only be conducted on a duplex portion, the normality of the dotted portion in FIG. 154 cannot be checked. Accordingly, the normality of the dotted portion is monitored by the monitoring function through the hardware (for example, a loopback function using a parity pilot signal). If a fault occurs at the portion, it is informed of by the MSCN information.

The OUS system as well as the active system and standby system has the cell-by-cell loopback function and also can activate the entire cell collective loopback function which is activated by the MSD information from the switch software.

8. Fault Correcting Process 8.1. Fault Detection Point and Notification System

Described below is the fault detection and notification system for each fault mode in correcting faults relating the SIFSH-A.

8.1.1. Fault Mode (1) OBP fault (OBP fault loaded on each package)

(2) Package missing fault (3) Fuse disconnection fault (4) SIFCOM package front connector missing fault (5) Package erroneous insertion fault (6) Individual unit package fault (simplex unit fault)

(7) SIFCOM package fault (duplex unit fault)

a) Individual unit interface fault b) Common unit fault (8) Individual unit-SIFCOM interface fault (simplex/duplex cross-connected portion fault)

8.1.2. OBP Fault

This fault is described in 14.1.2. in part 2.

8.1.2.1. Individual Unit OBP Fault

This fault is described in 14.1.3. in part 2.

8.1.2.2. OBP Fault in SIFCOM

This fault is detected by monitoring the value of the OBP fault register in the SIFCOM of the mate system to the SIFCOM of the fault monitor object system as shown in FIG. 155.

The output of the LED output terminal of the OBP indicates a release state in a normal operation and a ground state in an abnormal operation. Therefore, a fault value is set in the OBP fault register when the output of the LED terminal indicates a ground state.

Since the SIFCOM comprises 4 packages and each package is loaded with an OBP, a signal line connecting the LED output terminals of all these OBP is connected to the SIFCOM of the mate system.

8.1.3. Package Missing Fault 8.1.3.1. Individual Unit Package Missing Fault

This fault is described in 14.1.4. in part 2.

8.1.3.2. SIFCOM Package Missing Fault

This fault is detected by detecting the voltage release state of the monitor signal line in the SIFCOM of the mate system to the SIFCOM of the fault monitor object system as shown in FIG. 156.

8.1.3.3. Power Package Missing Fault

This fault is detected by monitoring the state of the loop signal line in the SIFCOM of the mate system to the SIFCOM of the fault monitor object system as shown in FIG. 157.

8.1.4. Fuse Disconnection Fault 8.1.4.1. Individual Unit Fuse Disconnection Fault This fault is described in 14.1.5. in part 2.

8.1.4.2. SIFCOM Fuse Disconnection Fault

This fault is detected by monitoring the state of the signal line connected to the SIFCOM fuse in the SIFCOM of the mate system to the SIFCOM of the fault monitor object system as shown in FIG. 158.

When this fault is detected, the SIFCOM package missing fault described in 8.1.3.2. is detected simultaneously. However, the fuse disconnection fault is detected by priority by the firmware in the SIFCOM and the switch software is informed of only the occurrence of the fuse disconnection fault.

8.1.5. SIFCOM Package Front Connector Missing Fault 8.1.5.1. 50-core Coaxial Flat Cable Fault (1) ASSW→Higher Order Shelf→Lower Order Shelf The disconnection of a 78 Mbps clock and cell frame pulse (CFP) is detected by the configuration shown in FIG. 159 as a disconnection fault of a 50-core downward coaxial flat cable connected to the ASSW.

The switch software is notified of the detected software through the SIFCOM of the mate system to the SIFCOM of the fault monitor object system.

Since the 70 Mbps clock from the ASSW and the CFP are distributed to the lower order shelf, these faults are detected in the higher and lower order shelves simultaneously, and can be notified of from the SIFCOM of the lower order mate system to the switch software.

(2) Lower Order Shelf→ASSW

As shown in FIG. 160, the detecting unit similar to that shown in FIG. 159 relating to (1) above is mounted to both higher and lower shelves. However, as shown in FIG. 160, the detection output of the lower order shelf is masked. The clock disconnection fault detected in the higher order shelf is provided by the SIFCOM of its system (monitor object system) for the switch software.

8.1.5.2. 50-core TD Bus Cable Fault

This cable transmits a cell write notification signal and a cell output permission signal (6.1.3., etc.) from a higher order shelf to a lower order shelf. The fault of this cable is detected by grounding an idle pin in the cable in the higher order shelf and monitoring the state of the pin in the lower order shelf.

8.1.6. Erroneous Package Insertion Fault

This fault is described in 14.1.6. in part 2.

8.1.7. Individual Unit Package Fault

This fault is described in 14.1.7. in part 2.

8.1.8. SIFCOM Package Fault

The faults in the SIFCOM are classified into the following two types.

(1) Interface-unit fault in individual unit (2) Common unit fault

FIG. 162 shows the component in which a fault occurs. FIG. 163 shows a faulty portion, detection logic, detected portion, fault notifying method, and detection cycle.

9. Line Protection (N+1 System)

9.1. Outline of N+1 Protection System

An N+1 protection system is adopted as a subscriber path reassignment control system at the occurrence of a transmission line fault between a broadband remote line concentrator (BRCL; refer to FIG. 34) or a broadband remote line switching unit (BRSU) and a host switch.

According to the present embodiment, two in-band signaling routes are preliminarily provided to control the BRLC, etc. from the host switch. The two routes are accommodated by different transmission lines. As a result, control can be transferred from the host switch to the BRLC even when a fault occurs in a single transmission line.

Furthermore, according to the present embodiment, if the host switch is connected to the BRLC via N umbilical lines as shown in FIG. 164, then any of the lines, if a fault has arisen in the line, can be switched to a standby line (line P).

9.2. Line Reassignment Sequence

All faults in an umbilical line are detected in the individual unit (OC3C or DS-3; refer to FIG. 94).

A detected line fault is provided as EMSCN information by the individual unit for the SIFCOM, and then transmitted from the SIFCOM to the switch software via the BSGC.

The EMSCN notification is a fault representative notification, and the detailed fault information is read according to a command request from the switch software to the individual unit.

The individual unit notifies the switch software of the detailed fault information in response to the command.

FIG. 165 shows the sequence of reassigning a line in a line protection process.

9.3. Setting VCC in Standby Line

A standby line is provided with a VCC table whose contents are the same as those of the VCC table of N active lines. If a fault has arisen in any of the active lines, then the faulty line can be switched to a standby line immediately.

Since the active lines and the standby line are provided with the VCC—tables of the same hardware scale, the VPI/VCI assignable to the umbilical line should satisfy the following restrictions.

(1) Each VPI/VCI set for the N lines should be unique.

(2) The type of the VPI/VCI set for the N lines should not exceed 216.

(3) A VCC set command to the active lines and a VCC set command to the standby line should be simultaneously issued.

The above listed restrictions are placed on the SIFSH of the host and the RMXSH of the BRLC.

9.4. Switch to Standby Line

This function is described in 6.2.3.

9.5. Switch Command

Both SIFCOM and RMXCOM can adopt the configuration of the serial connection. In this case, the higher order shelf and the lower order shelf are controlled by independent microprocessors. Assuming that the active and standby lines are accommodated in both higher and lower shelves, the command format shown in FIG. 166 is adopted to prevent the effect of the switch command from the active line to the standby line from being different between the serial connection and non-serial connection.

As shown in FIG. 166, this command only contains the information about the identification number (Unit No.) of a unit which changes a tag value and about the tag value (TAGC) itself. That is, a tag value switch command is issued to each of the switching-from line and the switched-to line (protection line).

<Part 4>

An ATM switch ASSWSH (ATM subscriber switch shelf) is described in detail in Part 4.

1. Outline 1.1. Summary of Function

An ATM switch ASSWSH shown in FIG. 8 comprises an ASSWSH-A having a 4×4 panel ATM switching function and a CLKSH-A having a timing signal generating function.

The ASSW-A has the function of switching cells in the four input ATM highways each having the transmission speed of 622 Mbps to any of the four output ATM highways each having the transmission speed of 622 Mbps. This switching operation is performed according to the routing information written in the tag area in the ATM cell.

2. Configuration of Device 2.1. Configuration of Device

FIG. 167 shows the internal configuration of the ASSWSH-A.

In FIG. 167, the SWMDX (HMX03A) is an interface for the SIFSH, SBMESH, or BSGCSH (refer to FIG. 8).

The SWMX (HSR00A) is a switch matrix.

The SCLK (HTG02A) provides a timing signal generated by a CLKSH-A (HTG00A) for the SWMDX (HMX03A), SWMX (HSR00A), or SWCNT-(HSR01A).

The SWCNT (HSR01A) is connected to a system bus not shown in FIG. 167 via the interface type A (INFA) to relay the communications of control data between the SWMDX (HMX03A), SWMX (HSR00A), or SCLK (HTG02A) and the switch processor (CC).

3. Interface 3.1. Communication Line System

FIG. 168 shows the connection configuration of the communication line system.

A signal of the communication line system is connected to the SWMDX via the 50-core flat coaxial cable.

A signal in the ATM highway (HW) of 622 Mbps comprises 8-bit parallel data (having the transmission speed of 72 Mbps per bit), a parity signal for the data, a 78 MHz clock, a cell frame pulse indicating the head of a cell, and a cell enable signal indicating the validity/invalidity of the cell. All these signals have an interface having a circuit configuration of an emitter-coupled logic (ECL) through a balanced transmission. A JSOUxN signal indicating the existence of cable connection has an interface having a circuit configuration of a transistor logic (TTL) through a non-balanced transmission.

A parity refers to an odd parity for 8-bit parallel data excluding an enable signal. Parity bits of valid cells only are checked in the input unit of the ATM switch, and parity bits are assigned to valid cells only in the output unit of the ATM switch. The contents of the data in the information field (payload) of an invalid cell are not guaranteed.

FIG. 169 shows the signal timing of the interface between the SWMDX shown in FIG. 168 or 167 and the ATM highway of 622 Mbps. FIG. 170 shows the cell format in the interface.

3.2. Control System

As shown in FIG. 167, the ASSWSH-A and CLKSH-A are controlled by the CC not shown in FIG. 167 by being connected to a system bus not shown in FIG. 167 through the switch controller (SWCNT) and interface type A (INFA).

A switch controller (SWCNT) (FIG. 167) is provided with an inter-system cross-connection interface between the INFAs of both active systems and standby systems. Each block in the SWCNT and ASSWSH-A is connected via a processor data bus and an address bus.

Each block is controlled mainly by monitoring a fault. In this case, there are two types of fault results, that is, faults notified of by the MSCN to the CC through the INF and those notified of by an event to the CC.

FIG. 171 shows the interface between the INFA and ASSWSH-A.

The SWCNT is provided not only with an interface to the INFAs of both systems but also an interface to the SWCNT of the other system. FIG. 172 shows an interface between the SWCNT of its own system and the SWCNT of the other system.

In addition to the control function in the switch module, the function of the control system of the ASSWSH-A can be an active/standby control function to each terminal unit. As shown in FIGS. 167 and 168, the SWCNT comprises 32 output units corresponding to 32 output highways of 622 Mbps on both ends (sides 0 and 1: left and right sides of the SWMX) through the SWMDX. From the output units-through the SWTIF not shown in FIG. 167, a system selection signal and its strobe signal are transmitted at the timing shown in FIG. 173. Since the system selection signal is not a signal indicating an active/standby system, it is output as a signal having the same polarity in both systems. Each terminal unit selects an active system device in the system according to the system selection logic shown in FIG. 174.

3.3. Clock System

Each device in the ASSWSH-A is operated using the clock of 155.52 MHz generated by the SCLK shown in FIG. 167 according to the clock of 10.368 MHz received from the CLKSH-A.

The ASSWSH-A and CLKSH-A each comprising two systems are cross-connected among the systems. A clock to be used in the ASSWSH-A is autonomously selected in the ASSWSH-A. If the disconnection of a clock is detected in the CLKSH-A of one system and the system is a master system, then the system is automatically switched to another.

In the clock system in the ASSWSH-A, each block of the SWMDX and SWMX is assigned a clock of 155.52 MHz, and one cell frame pulse is transmitted every 27th clock for use in reading a buffer in each block.

3.4 Inter-block Interface in ASSWSHA

The interfaces among the blocks in the ASSWSH-A are listed below.

FIGS. 175 and 176 shows the external interfaces relating to the SWMX shown in FIG. 167.

FIGS. 177 and 178 show the external interfaces relating to the SWMDX shown in FIG. 167.

FIGS. 179 and 180 show the external interfaces relating to the SWCNT shown in FIG. 167.

4. Detailed Function

FIG. 181 shows the detailed function of each block forming the ASSWSH.

FIG. 182 shows each block forming the SWMDX shown in FIG. 167. FIG. 183 shows the function of each block.

FIG. 184 shows each block forming the SWMX shown in FIG. 167. FIG. 185 shows the function of each block.

FIG. 186 shows each block forming the SWCNT shown in FIG. 167. FIG. 187 shows the function of each block.

FIG. 188 shows each block forming the SWTIF (not shown in FIG. 167). FIG. 189 shows the function of each block.

FIG. 190 shows each block forming the SCLK shown in FIG. 167. FIG. 191 shows the function of each block.

5. Traffic Control 5.1. Cell Discard Class

According to the present embodiment, the cell discard class shown in FIG. 192 is defined in the switch system to provide assured services and non-assured services.

In FIG. 192, the CLP and P correspond to the CLP bit and P bit in the header of each ATM cell. In the system, the CLP bit is used to quality-control the assured services, while the P bit is used to distinguish the assured services from the non-assured services.

In the ASSWSH-A, control is performed only to distinguish the assured services from the non-assured services. Therefore, only the P bit is used to control the process. During the congestion, a cell designated for a non-assured service is discarded.

5.2. Congestion Control

The function of controlling a cell discard class as shown in FIG. 192 is assigned in the ASSWSH-A to the 2.4 Gbps/622 Mbps DMUX unit in the SWMX and the SWMDX. A threshold (Xp) is set for the cell buffer in the LSI as the congestion control. If the length of the queue exceeds the threshold (Xp) in the buffer, then the cell whose P bit is set to 1 is discarded. If the length of the queue is smaller than the threshold (Xp), then the cell discard is suspended.

5.2.1. Congestion Control in SWMX

As shown in FIG. 184, the SWMX comprises the SWCNT LSI and the ATMSW LSI. The SECNT LSI manages the length of the queue in the ATMSW LSI, and the SWCNT LSI outputs a discard instruction to the ATMSW LSI if the length of the queue exceeds the threshold.

The threshold of the buffer is set by the CC using an SO command in the initialization procedure. In this case, a default value Xp=A8 (H) is set as the above described threshold at the initialization of the firmware. Since the values of the sides can be specified as the parameters of the SO commands, independent thresholds can be set for both sides (sides 0 and 1: on the left and right sides of the SWMX shown in FIG. 168) of the SWMX.

5.2.2. Congestion Control in SWMDX

The 2.4 Gbps/622 Mbps DMUX unit in the SWMDX is provided in the ADMUX LSI shown in FIG. 182. Setting the threshold for the SLI performs congestion control.

As in the case of the SWMDX, the threshold of the buffer is set by the CC using the SO command in the initialization procedure. In this case, the default value Xp=71(H) is set as the above described threshold at the initialization of the firmware. The same threshold (threshold specified by the SO command) is set in the SWMDX in the same ASSWSH-A regardless of the side.

5.2.3. Cell Discard

Cells may be discarded in the ASSWSH-A due to the congestion, congestion control, faults, etc. At this time the occurrence of the cell discard is reported to the CC and the reporting processes are different between the SEMX and SWMDX. The cell discard reporting processes for the SWMX and SWMDX are described individually as follows.

In the SWMX, cell discard is regarded as a fault. At the notification of the occurrence of cell discard, "a fault in the SW" in the 22nd bit of the MSCN is determined, and displayed is the input highway of the self-routing module (SRM) in which the cell discard has occurred in the detailed fault data. The fault data is described in detail in 7.

In the SWMDX, cell discard is not regarded as a fault. Since the 622 Mbps/2.4 Gbps MUX unit in the SWMDX is an STM, the no discard occurs and the discard portion is exclusively the 2.4 Gbps/622 Mbps DMUX unit. The number of times in every 15 minutes that cells are discarded is counted in the traffic measure process described in 5.3. The occurrence of cell discard is recognized by the CC's reading the count value.

5.3. Traffic Measure Process

In the ASSWSH-A, the number of the following cells is counted in the 2.4 Gbps/622 Mbps DMUX unit as the function similar to the performance monitor in order to manage the status of the network.

(1) number of passing cells (P=0) per 622 Mbps highway (2) number of passing cells (P=1) per 622 Mbps highway (3) number of discarded cells (P=0) per 622 Mbps highway (4) number of discarded cells (P=1) per 622 Mbps highway Each of the above described parameters is collected every 15 minutes with the notification received from the CC every 15 minutes as a trigger.

FIG. 193 is a block diagram showing the traffic measure circuit.

The cells are counted according to the output L, V, and H from the ADMUX LSI 1 (FIG. 182) as shown in FIG. 193, and the values are stored in the external RAMs 4 and 5.

The traffic count is performed for each highway by the 8-bit counters 2 and 3 on the cycle of about 25 μsec. The count value is stored at a specified address in the RAM 4 or 5 through the selector (SEL) 8 and adder (ADD) 9. The adder (ADD) 9 adds up in the next cycle the count value read from the RAM 4 or 5 through the selector (SEL) 6 or 7 and the count value read from the counter 2 or 3 through the selector (SEL) 8, and the sum is stored again at the above described specified address. The TG 10 outputs a switch instruction to the selectors (SEL) 6 through 8 each time it receives a notification from the CC every 15 minutes, and switches the RAM to which the count value is written to the RAM 4 or 5. As a result, the RAM 4 or 5 in which writing of a count value has been stopped stores the count value received in the latest 50 minutes immediately before the switch instruction. The count for the subsequent 15 minutes is performed in the RAM 4 or 5 to which a count value is newly written.

After the notification at every 15th minute from the CC, each count value is read from the RAM 4 or 5 in which writing of a count value has been stopped. The read count values are stored in the firmware until the CC requests using an SO command to read the count value.

FIG. 194 is a timing chart showing the operation of the traffic measure circuit shown in FIG. 193. The signals A through E shown in FIG. 194 correspond to the signals A through E shown in FIG. 193.

6. Function of Firmware

The ASSWSH-A contains the firmware in the SWCNT to provide an intra-switch control function and an INFA interface function.

Described below are the functions of the firmware and the interface between the firmware and hardware.

6.1. INFA Interface

The interface between the ASSWSH-A and the INFA has a predetermined format in the data bus (SB0 through SB77).

The information is transferred in this format for the following operations.

(1) CC access (IN instruction)

(2) CC access (OUT instruction)

(3) DMA access (read)

(4) DMA access (write)

FIG. 195 is a timing chart (a) of the CC access (IN instruction) and an address/data format (b);

FIG. 196 is a timing chart (a) of the CC access (OUT instruction) and an address/data format (b);

FIG. 197 is a timing chart (a) of the DMA access (read) and an address/data format (b); and FIG. 198 is a timing chart (a) of the DMA access (write) and an address/data format (b).

The order received in the ASSWSH-A is classified to each order as shown in FIG. 199 according to the value of the 4 lower bits in the 4th word at the address. Described below is the process in the ASSWSH-A at the reception of each order.

Activation of a command: The procedure described later in 7.2.1. is followed.

Retry instruction: When a DMA access is in a prohibition state, the DMA access is retried.

If the retrial is performed successfully, the DMA access prohibition is released.

If the retrial is performed but failed, then the DMA access prohibition is maintained.

If the DMA access is not in the prohibition state, then the order is ignored.

MSCN read: The contents of the MSCN table in the ASSWSH-A are returned and the table is cleared.

6.2. Intra-device hard Interface

The interface between the firmware and each block in the ASSWSH-A is realized by the order from the SWCNT and response in a specified format in a data bus.

6.3. Fault Correcting Process 6.3.1. Fault Detection

The important functions of the firmware in the SWCNT are to collect the fault information in the ASSWSH-A and to notify a higher order device (CC) of the fault information.

FIG. 200 shows the fault detection procedure followed when a notification is made by the MSCN. FIG. 201 shows the fault detection procedure followed when a status is autonomously notified of.

If a fault occurs in any block in the ASSWSH-A, then the block causes an interruption for the firmware in the SWCNT and notifies the firmware of the contents of the fault through the response described in 6.1. above.

An interrupt handler (INTO handler) generates fault notification data (message box: MSG BOX) to be provided for the fault correcting task and activates the fault correcting task.

The fault correcting task updates detailed fault data according to the contents of the message box. If the contents of the data refer to the fault in the MSCN, then the MSCN table is also updated.

The above described process is realized by the process modules (1) through (3) listed below.

| | |
|---|---|
| (1) Alarm interruption handler | |
| Trigger of process | occurrence of a fault<br>reading a fault register<br>updating a fault counter<br>generating fault notification data (MSG BOX) activating a fault correcting task |
| (2) Cycle activation task | |
| Trigger of process | 100 msec cycle |
| Process | comparing fault counters<br>clearing fault counters |

-continued

| | |
|---|---|
| (3) Fault correcting task | |
| Trigger of process | receiving an MSG BOX |
| Process | notifying a higher order process of the contents of a fault:<br>generating detailed fault data<br>updating an MSCN table<br>generating and notifying of an autonomous status |

Each time a fault is reported from each block, the fault counter (refer to FIG. 231 described later) is updated by the alarm interruption handler listed as (1) above. If the fault refers to a fixed fault, the fault counter is incremented each time it is reported. If a fault refers to an intermittent fault, then the fault counter is not incremented or incremented only a little bit. Therefore, according to the cycle activation task listed as (2) above, it is determined whether a fault reported by each block refers to an intermittent fault or a fixed fault by checking the value of the fault counter.

6.3.2. Message Box

FIG. 202 shows a basic format of a message box processed by the fault correcting task.

(1) Listed below are the contents of the message box having the format shown in FIG. 202 when the disconnection of the clock of one system is reported from the SCLK.

| | |
|---|---|
| Line address | 0xFF |
| Control field | 0x06 |
| MSCN setup bit | 0x00 |
| Additional information | 0x02/0x04<br>(system 0/system 1) |
| Contents of fault | 0x00004000 |
| Message Box Address | 19BBA(H) |

(2) Listed below are the contents of the message box having the format shown in FIG. 202 when a common fault other than the disconnection in one system is reported from the SWMX, SWMDX, SCLK, etc.

| | |
|---|---|
| Line address | 0xFF |
| Control field | 0x03 |
| MSCN setup bit | depends on the contents of a fault (write over the existing value by OR) |
| Additional information | 0x00 |
| Contents of fault | depends on the contents of a fault (write over the existing value by OR) |
| Message Box Address | 19BBA(H) |

FIG. 203 shows the fault content write data in the message box having the format shown in FIG. 202. In FIG. 203, the representations “intra-” and “inter-” indicate that the fault occurs in the package and between the packages respectively. The identification is made according to the contents of the fault (reported in the format described in 6.2. above) in each device.

6.4. Self-Diagnosis

Upon receipt of a self-diagnosis setup command from the CC (switch processor), the firmware in the SWCNT makes a diagnosis of each fault monitoring function according to an order.

The firmware issues the following orders among the orders described in 6.2. above and performs a diagnostic process and checks the result.

| | |
|---|---|
| (1) SWMX compulsory alarm | highway parity error |
| (2) SWMX compulsory alarm | clock disconnection |
| (3) SWMX compulsory alarm | FIFO parity error |
| (4) SWMX compulsory alarm | buffer FULL |
| (5) SWMX compulsory alarm | highway parity error |
| (6) SWMX compulsory alarm | clock disconnection |
| (7) SWMX compulsory alarm | hardware error |

A self-diagnosis is effective when the state of the ASSWSH-A is blocked. Otherwise, a command illegal is output. Upon receipt of a self-diagnosis setup command, the firmware shifts the state of the ASSWSH-A from a blocked state to a self-diagnostic state.

The self-diagnostic procedure is described in 7. below.

7. Maintenance 7.1. Software-Hardware Interface

The procedure of maintaining the ASSWSH-A is described including the interface between the switch software and the hardware of the ASSWSH-A.

The interface between the CC and the ASSWSH-A is performed through the INFA (refer to FIG. 167). The switch software operated by the CC controls the ASSWSH-A by transmitting and receiving a command and status. The interface between the ASSWSH-A and the INFA is performed by the firmware described in 6. above.

7.2. Operations 7.2.1. State Transition

The ASSWSH-A indicates any of the following states.

(1) Initialization state: A reset signal has been received and the firmware of the device is being initialized.

(2) Blocked state: A reset completion notification has been issued and an initialize command can be executed.

(3) Operating state: An online setup command has been received and the intrinsic operations are being performed.

(4) Fault state: A fault has occurred in the device and the device cannot be operated.

(5) Self-diagnostic state: The initialization has been completed and a self-diagnosis is being performed.

7.2.2. Loading HMX03A

Up to 4 pieces of the HMX03A (SWMDX) (refer to FIG. 167), which is provided in the ASSWSH-A and assigned the MUX function, can be mounted on either side of the HSR00A (SWMX), that is, a total of 8 pieces can be mounted. Since the HMX03A is mounted by specification, the ASSWSH-A successfully functions only by loading the HMX03A of the number of highways used on the conditions of the station.

However, the firmware of the ASSWSH-A requires an answer from a package when it accesses the package. Therefore, if there is an unused HMX03A slot, the firmware should recognize the slot in controlling the packet.

The firmware controls the device according to the following procedure after recognizing the load of a specified HMX03A.

(1) When the ASSWSH-A is in the initialization state, the firmware sends an individual reset order to each HMX03A and waits for an answer.

The firmware determines that the HMX03A is mounted for the slot which has sent back an answer, and that it is not mounted for the slot which returned no answer.

The firmware performs these processes only for load-recognized slots.

(2) After terminating the initialization of the device, the state of the ASSWSH-A changes into the operating state in which the system initialization is performed from a higher order process. At this time, the firmware is notified of the load state of the HMX03A displayed by the station data stored by the switch software, and the state is compared with the load state recognized by the firmware in the process described in (1) above.

(3) In the comparing process in (2) above, if there is a slot which is recognized by the firmware as not being loaded with the HMX03A and is displayed according to the station data as being loaded with HMX03A, then the firmware determines that a fault has occurred on the slot. In this case, the firmware determines a "fault in the SW" of the 22nd bit of the MSCN and includes the slot in the detailed fault data.

(4) In the comparing process described in (2) above, if there is a slot which is recognized by the firmware as being loaded with the HMX03A and is displayed according to the station data as not being loaded with HMX03A, then the firmware determines that a fault has not occurred on the slot. In this case, the subsequent control is performed according to the station information.

7.3. Fault Correcting Process

The ASSWSH-A has the specification of monitoring a fault as follows.

(1) A duplex configuration is adopted as a redundant configuration (one shelf for one system)

(2) Various fault detection processes are performed, and the systems are switched according to the detection result (control by the switch software).

(3) An intermittent/fixed fault is determined in monitoring a fault, and the determination result is reported to the CC. In determining a fault, if faults are detected 3 times consecutively on a cycle of 0.1 through 1 second, the faults are determined to be fixed faults. Otherwise, the intermittent faults are not reported to the CC.

(4) Faults are notified of by either the MSCN or an event.

(5) If a fault is reported, an alarm LED provided for the power source package (not shown in the drawing) is lit under the control of the switch software.

<Part 5>

In part 5, described in detail is the subscriber message handler (SBMH)

1. General Descriptions 1.1. Summary

The subscriber message handler shelf (SBMESH) switches data of the SMDS subscriber. The switch is performed actually in cell unit while the message format is checked. As for a protocol, terminated are level 2 (AAL-SAR) and level 3 (AAL-CS,CL) of the SNI interface protocol (SIP) which is a protocol of an SMDS subscriber. In the drawings, the SBMESH-A also refers to the SBMESH.

1.1.1. Positioning in System

FIG. 204 shows the positioning of the SBMESH in the system. It specifically shows the SBMESH (and the GWMESH described in Part 6) in the configuration shown in FIG. 8 and described in Part 1 of the present embodiment.

Up to 4 SBMESHs can be daisy-chained for each highway connected to the ASSW. An SBMESH group connected to one of the highways is referred to as a subscriber message handler (SBMH) as shown in FIG. 204.

In FIG. 204, an actual SMDS terminal unit is connected beyond the subscriber network interface (SNI). Likewise, an switching system (SS) is connected beyond the inter-switching-system interface (ISSI), and a LATA SS is connected beyond the inter-carrier interface (ICI).

The SBMESH (SBMH) comprises an S portion and an R portion, and the data input from the SNI to the system is processed in the S portion of the SBMESH, and the data processed in the R portion of the SBMESH (SBMH) is output from the system to the SNI. The connection between the SBMESH and the GWMESH (WGMH) is described in Part 6.

1.1.2. Outline of SMDS Data Process

FIG. 205 shows the route of SMDS data between SNIs, and the data is processed in the following procedure.

1. The data input from the SNI to the ASSW (UP) through the SIFSH, etc. is transferred to the SBMH(S) via a fixed path or a semi-fixed path in the ASSW (UP). In this case, the VPI/VCI stored in the header of a cell indicates the routing from the SNI to the SBMESH.
2. The SBMESH analyzes the destination address (DA) contained in the data, retrieves a route to the SBMH (R) accommodating the destination SNI, and transmits the data to the ASSW (UP)
3. The above described data is entered in the SBMH (R) accommodating the destination SNI through the ASSW (UP), LLP, and ASSW (DOWN).
4. The SBMH (R) refers to the destination address (DA) in the received data, fetches the data addressed to the SNI accommodating the SBMH (R) (filtering), retrieves the route to the destination SNI, and transmits the data to the ASSW (DOWN). The circuit connecting the SBMH (R) to the destination SNI is connected via a fixed or semi-fixed path.

FIG. 206 shows the transmission of SMDS data from the SNI to the ISSI or ICI FIG. 207 shows the transmission of the SMDS data from the ISSI or ICI to the SNI. FIG. 208 shows the transmission route of the SMDS data from the ISSI or ICI to the ISSI of ICI. In these figures, the data is transmitted through the route represented by bold lines.

Thus, in the case of the data transmission between the SNIs, processes are performed only by the SBMH. When the data is transferred to and from other SS and LATA SS, the processes are performed by the SBMH and GWMH. The actual routing control, the relationship between-each route and a VPI/VCI, etc. are described later in detail.

1.2. System Configuration

FIG. 209 is a block diagram showing the SBMESH.

As shown in FIG. 209, the SBMESH comprises an MH-COM unit for interfacing with the ASSW and an LP unit for performing actual switching.

The MH-COM unit comprises an SDMX, RDMX, SMUX, and RMUX. The characters S and R for the MUX and DMX correspond to the SBMH(S) and SBMH(R) shown in FIG. 204. For example, the SDMX multiplexes the data from the SBMESH connected to the downstream of the corresponding SBMESH in a plurality of SBMESHs daisy-chained to the output of the ASSW. The above described DMX fetches the data output from the ASSW to its own SBMESH, and the MUX outputs data from its own SBMESH to the ASSW.

A link access procedure (LAP) terminating equipment and a VCI converter (VCI) are equipped in addition to the above described configuration although they are not show in FIG. 209. The VCC is set by the LAP. The MH-COM unit has a checking function and detected information is provided with interface to the software through the LAP or the broadband signaling controller (BSGC) described later in Part 7.

The LP unit comprises an SMLP, RMLP, and LP-COM. The initial characters S and R of the SMLP and RMLP correspond to the SBMH (S) and SBMH (R) and switch data. The LP-COM controls the SMLP and RMLP and interfaces with the software through the INF (interface). The station data required for a switching, subscriber data, information detected by each checking function in the LP unit, billing information, etc. are provided with interface to the software through the INF.

As described above, up to 4 SBMESHs can be daisy-chained. The data received by the SBMESH is multiplexed and demultiplexed by the SDMX, RDMX, SMUX, and RMUX. On the other hand, the LP unit and the INF is connected one to one. For example, if four SBMESHs are daisy-chained, four transmission lines are required accordingly.

1.3. Redundant Configuration

As shown in FIG. 210, the MH-COM and LP units have duplex configurations (systems #0 and #1).

The MH-COM unit has a master/slave configuration exclusive for the ASSW, while the LP unit has an independent master/slave configuration. The master system (for example, #0) and slave system (for example, #1) of the LP unit have basically the same function, and the slave system can actually perform a switching operation. In this case, the billing information obtained through the slave system's switching is not reported to the software.

There is an inter-system cross-connection between the duplex MH-COM unit and LP unit, that is, between system #0 of the MH-COM unit and system #1 of the LP unit and between system #1 of the MH-COM unit and system #0 of the LP unit. However, no inter-system cross-connection exists between system #0 of the LP unit and system #1 of the INF and between system #1 of the LP unit and system #0 of the INF.

The RMLP in system #0 of the LP unit receives data from the RDMX of system #0 of the MH-COM unit and data from the RDMX of system #1 of the MH-COM unit. The selector (not shown in the figure) in the input unit of the RMLP selects the data from the master system of the MH-COM unit. Likewise, the SMUX of the MH-COM unit receives data from the SMLP of system #0 of the LP unit and data from the SMLP of system #1 of the LP unit. The selector (not shown in the figure) in the input unit of the SMUX selects the data from the master system of the LP unit.

2. Process Method 2.1. Configuration of Message Handler (MH) Network

A message issued from the SNI is transmitted to a predetermined SMLP in the SBMH through a digital terminal (DT), etc. from the SNI. A message received at the SNI is transmitted from a predetermined RMLP in the SBMH to the SNI. The message is transmitted via a path comprising a permanent virtual circuit or permanent virtual channel (PVC) through the ASSW. Since each of the SMLP and RMLP accommodates a plurality of SNIs, the above described transfer destination is identified by a VCI.

As shown in FIG. 211, MHs (including the GWMH) are fullmesh-connected. The connection is made using a PVC through the ASSW. However, since each RMLP (receiving SBMH and GWMH) receives a message from a plurality of SMLPs (sending SBMH and GWMH), the message is identified by a VCI specifying each PVC.

The band (average and peak) of each PVC is, for example, 2.1 M between the SNI and the MH, and the DS3-SNI is set to 38.88 M. Between MHs, the band is set depending on the number of MHs when the system is set. It can also be set optionally by the system maintainer, etc.

A message issued to the ISSI or the ICI connects the route from the SMIP in the GWMH accommodating the ISSI or ICI to the ISSI or ICI by the PVC through the ASSW. A-message issued from the ISSI or ICI connects the route from the ISSI or ICI to the RMIP in the GWMH accommodating the ISSI or ICI by the PVC through the ASSW. However, since the SMIP or RMIP of each GWMH accommodates a plurality of ISSIs or ICIs, it is individually identified depending on the VCI specifying each PVC.

2.2. Routing System

A routing process is performed in the SMLP shown in FIG. 209. That is, the data issued by a subscriber terminal unit is entered in the SBMH through a PVC. In the SMLP of the SBMH, the destination address DA of the transfer data is identified. An MH accommodating the destination subscriber terminal unit is identified according to the identified DA. The MH is uniquely assigned a VCI, and the data is output to the ASSW. (The VCI in the SNI normally refers to a specific fixed value indicating that the transfer data is SMDS data. However, a VCC is actually provided between the above described SBMH and the RMLP of the MH accommodating the destination subscriber terminal unit, and the VCI is converted into that indicating the PVC to the MH).

On the other hand, in the RMLP, the SNI of the destination subscriber terminal unit is identified according to the above described DA. In the VCC provided between the RMLP and the SNI, a VCI specifying the SNI is assigned. Thus, the routing control in the SMLP and RMLP is normally performed according to the destination address DA.

The destination address DA is a concept defined in message units (L3-PDU units), that is, in layer 3. However, an actual switching is performed in cell units. Described below is the control method.

The decomposition and assembly og user information in layer 3 are explained by referring to FIG. 212. The user information issued by a subscriber terminal unit has a destination address DA written at the header in layer 3. When the information is converted into data in a 53-byte cell (actually 53 bytes containing the header and trailer for the L2-PDU), which is a data transmission unit, in the AAL/SAR in layer 2, the message in the above described layer 3 is decomposed into a BOM (beginning od message), COM (continuation of message), and EOM (end of message). If this message is small enough to be stored in a single cell, it is put in one type of cell (single segment message).

FIG. 213 shows the data configuration in the AAL/SAR in layer 2. As shown in FIG. 213, the destination address DA specified by the message of layer 3 is stored in the payload of the BOM (or SSM) in the AAT/SAR of layer 2. The type of cell BOM, COM, EOM, or SSM is stored in the 6th byte as a segment type ST. A message identifier (MID) is an identifier uniquely assigned to each message (or each SNI).

Upon receipt of a BOM or SSM, the SBMH analyzes the DA stored in the payload and determined the output VCI according to the DA. It then rewrites the VCI of the header into the determined output VCI. It also retrieves an unused MID for the output VCI, and rewrites the MID stored in the input cell into the retrieved MID (output MID). If a BOM is received, it has the routing memory store the correspondence between the input VCI/MID and the output VCI/MID for the subsequent COM and EOM.

Upon receipt of a COM or EOM, the SBMH reads the output VCI/MID by retrieving the above described routing memory through the input VCI/MID of the cell as a key, and writes the cell at a predetermined position. FIG. 214 is a list showing the method of determining an output VCI/MID.

Described below are the routing processes.

(a) Routing from Source SNI to Source SBMH The VCI of a cell output from a source SNI has a predetermined fixed value as described above. However, in the VCC provided in the SIFSH between the SNI and the SBMH, the VCI is converted into one predetermined for the source SNI. The cell is assigned tag information such that the cell can be transferred to the SBMESH accommodating the source SNI. The source SBMH allocates the cell to a predetermined SMLP according to the allocated tag.

Thus, in routing a cell from a source SNI to a source SBMH, a cell is transmitted through a route determined by the VCI, that is, through a predetermined PVC. In the above described routing, the source SNI is accommodated in the DS3-DT card.

(b) Routing from Source SBMESH (SBMH) to Destination SBMH

In a source SBMESH, a destination SBMESH is determined according to the DA stored in an input cell for a BOM or SSM, and according to the input VCI/MID of the cell for a COM or EOM. In the source SBMESH, a VCI/MID for a PVC preliminarily provided between the source SBMESH and the destination SBMH is assigned to the cell. Additionally, the cell is assigned a tag such that the cell can be transmitted to the destination SBMH. The SBMH obtains an output VCI/MID according to the DA for a BOM or SSM and according to an input VCI/MID of an input cell to a destination SBMH for a COM or EOM. The obtained output VCI/MID is assigned to a predetermined RMLP as routing information for output.

(c) Routing from Destination SBMESH to Destination SNI

A destination SBMESH determines in the RMLP a destination SNI according to the DA for a BOM or SSM and according to an input VCI/MID of an input cell to a destination SBMH for a COM or EOM. In the RMLP, a VCI/MID for a PVC preliminarily provided between the destination SBMESH and the source SNI is assigned to the cell. Additionally, the cell is assigned a tag such that the cell can be transmitted to the destination SNI. The above described routing is an example where the above described SNI is accommodated in the DS3-DT card.

FIG. 215 shows the above described routing operation.

2.3. VPI/VCI and MID Assigning Method 2.3.1. VPI/VCI Assigning Method

As a rule, a VPI/VCI is assigned the same value in the same PVC regardless of the data transfer direction.

(1) Assignment Between SNI and SBMH

A VPI/VCI is assigned a fixed value in the SNI and B-UNI.

VPI/VCI of a cell transferred from a subscriber to the ASSW in the SNI (a) The MSB 8 bits are optionally set.

(b) The subsequent 20 bits are set to “fffff(h)”

VPI/VCI of a cell transferred from the ASSW to a subscriber in the SNI “00fffff(h)”

VPI/VCI of an SMDS cell transferred from a subscriber to the ASSW in the B-UNI (a) The MSB 4 bits are optionally set (GFC field).

(b) The subsequent 24 bits are set to "00000f(h)"

VPI/VCI of an SMDS cell transferred from the ASSW to a subscriber in the B-UNI "000000f(h)"

The VCI between the ASSW and SBMESH is assigned a VPI/VCI uniquely corresponding to each SNI such that the SNI can be correctly identified in the SMLP as shown in FIG. 216.

FIGS. 217 and 218 show the above described method of assigning a VPI/VCI between the SNI and SBMH. As an example, a method of assigning a VPI/VCI for "from SNI to SMLP (upward)" shown at the middle portion in FIG. 217 is explained below.

As shown in FIG. 217, a fixed value xxfffff(h) is assigned to the header of the cell in the SNI. Upon receipt of the cell assigned the fixed value of xxfffff(h) from the SNI, the DT (for example, the DS3-SMDS interface explained in Part 2) converts the value into "03f03ff(h)" as if it were hardware. Then, the SIFCOM converts the VPI/VCI into "03f0307(h). The value "07" represented by the lower bits corresponds to the SNI number #7. A cell assigned a value of "03f03ff(h)" as a VPI/VCI is transferred to the SBMH.

Upon receipt of the cell, the SBMH recognizes from its VPI/VCI that the cell is SMDS data output from the SNI #7.

(2) Assignment Between MHs (in the Station)

Between SMLP and VC of VCC output by SMLP The VPI uses the value 03f(h) and VCI uses the values 0300 through 03ff(h).

The number identifying the MH at the receiving equipment is set to the 8 lower bits of the VCI.

Between VCC output from SMLP and VCC of ASSW at receiving equipment A VPI/VCI in this portion is not defined.

Between VCC of ASSW at receiving equipment and RMLP and SMIP The VPI is "03f(h)" and the VCI is a value in the range of 0300 through 03ff(h).

The value identifying the MH at the sending equipment is set at the 8 lower bits of the VCI.

FIG. 219 is a table showing the method of assigning a VPI/VCI between the above described MHs. FIG. 220 shows an example of assigning a VPI/VCI between the above described MHs.

As shown in FIG. 220, "03f0303(h)" is assigned as a VPI/VCI when a cell is transferred from the SBMH #4 to the SBMH #3, and the 8 lower bits indicate the SBMH #3 which is a receiving MH. If the cell is entered in the SIFCOM connected to the SBMH #3 through the switch (AISW), etc., then the VPI/VCI of the cell is converted into "03f0304(h)", and the 8 lower bits indicate the SBMH#4 which is a sending MH. Thus, the MHs at the sending and receiving equipments are recognized depending on the VPI/VCI 2.3.2. MID Assigning Method (1) Between SNI and SBMH An MID assigning method for a cell to be transferred from the SNI to the SBMH depends on the configuration of the connected subscriber terminal unit. Therefore, the SMLP has the configuration capable of receiving all patterns of MID. The MID can be simultaneously assigned 16 values for each SNI. The MID of the cell transmitted from the SBMH to the SNI can be in the range of 000 through 1ff(h).

(2) Between MHs

In the SMLP, the number of MIDs of the cell transmitted to the destination MH is 256 per VCI (that is, per destination MH. As described above, a source MH is identified using the VCI of a received cell at the destination MH. If a plurality of SMLPs which belong to the same source MH (for example, if a single SBMH has a plurality of daisy-chained SBMESH, each SBMESH has its own SMLP) uses the same MID, an SMLP cannot be specified at the destination MH. Therefore, the range of the MID assigned to each SMLP belonging to the same source MH is defined as shown in FIG. 221. The SMLP #0 in FIG. 221 refers to the SMLP provided in the highest order SBMESH in up to 4 daisy-chained SBMESHs, sequentially followed by #1, #2, #3, . . . downward.

2.4. Group Address

If a destination address DA refers to a group address, the message transferred according to the DA is copied at the SBMH and transferred to all destination SBMHs and source GWMHs in the station. In the destination SBMH, the RMLP accommodating the SNI at the destination group address fetches the message. The RMLP recognizes the number of SNIs belonging to the group address, makes copies for the number of the SNIs, and transfers the copied message to each SNI. FIG. 222 shows the distribution of data using the group address.

2.5. Multiplexing

The SMLP and RMLP can accommodate a plurality of SNIs. Accordingly, each ENI can be identified for each cell. Since the SMLP and RMLP simultaneously process a plurality of L3-PDUs, they-use a VPI/VCI and MID to identify the L3-PDU to which each cell belongs.

2.6. Outline of Functions

FIG. 224 is a block diagram showing the functions of the SBMESH. Each block shown in FIG. 224 is described later. In FIG. 224, the division of the PWCB is not shown for each observation of the drawings.

3. SMLP 3.1. Outline of Processes

In the SMLP, a protocol performance check of the SIP L2 and SIP L3 is made for the cell entered after being DMUXed by the MH-COM unit. The destination address DA of the cell is analyzed, and the cell is transmitted to the SBMH accommodating a corresponding SNI (subscriber) and the GWMH accommodating corresponding ISSI and ICI. The SMLP-also has the function of converting the SIP L3 format into the ISSI L3 format (half encapsulation).

3.2. Configuration

FIG. 225 shows the entire configuration of the SMLP.

The SMLP comprises four printed wiring circuit boards (PWCB) HMH03A through HMH06A. HMH03A and HMH04A mainly perform a protocol performance check. A cell determined to be an error in the check is so identified with an error flag to be transferred together with the cell data. Finally, the cell is discarded at the output unit of the HMH06A. The HMH05A performs routing as a DA analysis and destination MH determination process. The HMH06A mainly performs a PVC band restriction process. FIGS. 226 through 228 show the outline of the functions of each block and the relationship between an error cell and a maintenance cell.

(1) Error Cell

An error cell refers to a cell whose master error flag (EF1 MS) is set to NG (ON), and it should be discarded. The SMLP uses memory for various objects, and skips write access to memory if an error cell is detected.

(2) CRC-10 Error Cell

A CRC-10 error indicates an error in the data of SIP-L2.

If an error exists in data, conducting a protocol performance check using the erroneous data may cause another error. Since the L3-PDU (or a SIP-L3 message) is identified from another L3-PDU using an MID, an error caused by a SIP-L3 message may be regarded as an error pointed to by another SIP-L3 message if the MID value is incorrect. Therefore, if a CRC-10 error is detected, no subsequent protocol performance check is made.

(3) LP Test Cell (Diagnosis)

In the diagnosis of the SBMESH, a test cell is transmitted from the HLP02A, and returned to the HLP02A from each processing unit in the SMLP to check error flags, etc.).

The diagnosis is conducted when the SMLP is in the OUS state (out of service state). The subscriber data for use in testing corresponding to each SNI is set on a table used in transferring actual data, and not table is provided for test use. Therefore, an LP test cell which will not set an error flag is transferred to the MUX of the MH-COM unit without being discarded. However, since the SMLP is not in the master state (in the OUS state), the above described test cell is discarded by the selector at the input unit of the MUX.

(4) PVC Test (1) PVC Test Between SBMESH-MHs

In this test, the HLP02A of the SBMESH (HLP024 is a PWCB in the LP-COM described later) sends a test cell to the SMLP. The SMLP sends the test cell to the RMLP of the destination MH through the ASSW. The RMLP sends the test cell to the HLP02A in the MH to check the normality of the cell. Thus, the PVC test is conducted between the SBMESH and the destination MH. The test cell is transmitted from the HLP02A with a specific VCI value.

When the test cell identification bit in the VCI (this bit is described in detail later, but is referred to as an 0 bit or bit-7) indicates 1, the test cell is implied and a process is performed for the test. Since the test is conducted in the INS state (in-service state), the protocol performance check is not made to give no effect on normal message.

(2) PVC Test Between SNI and SBMESH

In this test, a test cell is transmitted to the RMLP. The test cell is looped back at the SNI (SIFSH in this embodiment) and input to the SMLP. Each checker in the SMLP performs on the test cell a process similar to that performed on a common cell. A routing unit checks a cell according to the DA. If it is a test cell, it is transmitted as VCI="FF(h)" to the HLP02A. The test is conducted with the object SNI blocked.

3.3. Correspondence Between Each Function Block and Error Flag

FIGS. 229 through 232 show the conditions under which each function block and an error flag (EF) for each function block operate. The tables shown in these figures are described below.

The vertical axis indicates a function block.

The horizontal axis indicates the states of the error flags EF (EF1 and EF2) and the states of the test between the MESH and PVC.

Each item is divided into two portions. An upper portion indicates the EF which is set to NG after the function block is checked, and controls the EF described as "ON" if it is set to NG. A lower portion indicates whether or not the function should be operated (if the unit is a checker, it indicates whether or not a check should be made) or whether or not a check result should be provided for the EF.

FIGS. 233 through 237 show the correspondence between the error flag (EF) and the error name (at TR) and the position of the EF in a cell.

3.4. Process in Each Block

In the drawings of this chapter, the process described as "own" indicates read/write memory of the hardware.

(1) Cross-Connection Selection S

According to the act information (SWACTA: home system SW ACT=L; mate system SW ACT=H) of the switch set by the HLP02A, active type data is selected. The ACT control at the switch unit, that is, "retaining ACT" is controlled by the HOL02A. Since the data from the home and mate system switches are not aligned for the header of the cell (not in phase), the data is once written to the buffer and then read from the home and mate systems after adjusting the phase of each of the cells.

If the SW of the active system is switched, the selector of the data is actually switched. The timing is adjusted between the cells. FIG. 238 shows the timing.

Since the SMLP receives a TCG cell (test cell generator cell) for use in conducting a switching test for an ATM layer together with other common data, the TCG cell should be invalidated. The TCG cell is identified by an 0 bit at the 14th bit in the tag area. In this block, "enable" indicates "valid". A cell having an 0 bit set to 1 performs a process of setting "enable" to "disable". If "enable" is set to "disable", the parity should be adjusted correspondingly. FIG. 239 shows the format of the cell. In FIG. 239, the 0 bit is shown in shade.

(2) Test Cell Multiplexing S

A test cell multiplexing unit multiplexes a test cell from the HLP02A at a timing of an idle cell in the line. The HLP02A optionally transmits a test cell at any timing. When the line is in the idle cell state (when enable (ENB)=H) in the present block, a test cell is multiplexed and transmitted, and notifies the HLP02A of the result using a signal (TSOK) indicating the "test cell multiplexed?". If a valid cell is transmitted from the line, the signal is set to NG. Unless a valid cell is received as a normal test cell, the TSOK is set to NG.

If the LP (LP-COM, SMLP, and RMLP) makes a self-diagnosis ("OUS" state during the diagnosis), all cells in the line are masked to "disable" to multiplex only the test cells from the HLP02A. The designation of the LP unit self-diagnosis is set by the MSD in the HMH03A. FIG. 240 shows the outline of the descriptions-above.

(3) CRC-10 Check S

A CRC division is performed on the payload of a cell to check the existence of an error EFCC is set to L when the CRC polynomial indicates a value other than 0 (L2 payload CRC violation).

A process object is a cell having a test bit 1 of the 02nd word (inter-MESH PVC test cell), and is masked with an error edit IS. The EFIRM is set to L to indicate that the L2 header is NG. FIG. 241 is a table showing this correspondence (4) PL Length Check S The valid payload length of a cell is checked (for each segment type).

When the table of FIG. 242 is used, the EFPL is set to L. The cell (L2 payload length error) having the test bit 1 of the 02nd word (inter-MESH PVC test cell) is not an object cell. If a check is made on an inter-MESH PVC test cell, a check is actually made and the check result is masked with an error edit IS. The EFIRM is set to L to indicate that the L2 header is NG.

(5) MID Value Check S

If an error is detected in a BOM, EOM, or SSM, the EFIM of the E2 is set to L. If an error is detected in a COM, the KEFIM of the E1 is set to L (BOM/SSM/with invalid MID error).

Since a cell having a test bit 1 of the 02nd word (inter-MESH PVC test cell) is not a process object, it is masked with an error edit IS. The EFIRM is set to L to indicate that the L2 header is NG. FIG. 243 shows the error condition in the above described test.

(6) MID Check S

A check is made on a BOM whether or not the VCI/MID indicates "not active", while a check is made on a COM and EOM whether or not the VCI/MID indicates "active".

The VCI/MID is read from the memory using the VCI/MID as the address (key) at the arrival of the BOM.

1. If it is used ('1'), an error flag (the EFMA of the EF2) is set (MID currently active) and the preceding message is erroneous. Accordingly, the master flag (EFMS) is held.
2. If it is not used ('0'), it is accepted.
3. "Used" ('1') is written to the memory.

The VCI/MID is read as an address from the memory at the arrival of the COM.

1. If it is not used ('0'), an error flag (the EFMA of the EF1) is set.
2. If it is used ('1'), it is accepted.
3. If it is in the state of 1. above, "no used" ('0') is written to the memory. If it is in the state of 2. above, "used" ('1') is written to the memory.

The VCI/MID is read as an address from the memory at the arrival of the EOM.

1. If it is not used ('0'), an error flag (the EFMA of the EF2) is set (EOM with unapproved MID).
2. If it is used ('1'), it is accepted.
3. "No used" ('0') is written to-the memory.

The SSM is not a process object.

1. The test bit of the 02nd word in a cell indicates "1" (inter-MESH PVC test cell).
2. Error in a CRC-10 check, PL length check, and MID value check.
3. The ENB of the line cell is DSB (invalid).

If a cell satisfies any of the conditions of 1, 2, or 3 above, the memory is not accessed for the cell. If a cell satisfies the conditions of 1. above, its error flag is set to the value indicating OK. FIG. 244 shows the MID check.

(7) SN Check S

The sequence number (SN) is initialized in the BON and SSM, and the sequence of the SN is checked in the COM and EOM.

The VCI/MID is read from the memory using the VCI/MID as the address (key) at the arrival of the BOM and SSM.

1. No error flag (EFSN) is set regardless of the matching between the SN and the read value.
2. The value of the SN+1 is written to the memory using the VCI/MID as the address.

The VCI/MID is read from the memory using the VCI/MID as the address at the arrival of the COM and EOM.

1. If the SN and the read value match each other, it is accepted and no error flag (EFSN) is set.
2. Unless the SN and the read value match each other, it is rejected and an error flag (EFSN) is set.
3. The value of the SN+1 is written to the memory using the VCI/MID as an address.
1. The test bit of the 02nd word of the cell indicates 1 (inter-MESH PVC test cell).
2. The MID indicates "not active".
3. The ENB of the line cell indicates DSB (invalid).

If a cell satisfies any of the conditions of 1, 2, or 3 above, the memory is not accessed for the cell.

If the EFRM indicates the NG (an error in CRC-10 check, PL length check, or MID value check), the memory is not accessed for the cell.

The error flag (EF2MA and EF1MA) of the cell satisfying the 1. above is masked with an error edit IS.

FIG. 245 shows the summary of the above described SN check.

(8) Address Format Check S

A format check is made on the SA and DA of the header of the SIP.

If the 4 bits indicating the address type in the SA and DA address fields satisfy the conditions shown in FIG. 246, it indicates an error. If the test bit of the 02nd word of the cell indicates 1 (inter-MESH PVC test cell), the cell is not a process object and masked with an error edit IS.

(9) DA Check S

An internal loopback cell is turned back.

The DA is received at the CAM as an address at the arrival of the BOM and SSM.

1. When a non-matching result is output;

The 15th bit of the 02nd word of a cell indicates 0 (route retrieval is required in a routing process).

2. When a matching result is output;

An error flag (EFSA) is set if the matching address is equal to the SNI ID.

The COM and CEO are not process objects.

If the test bit of the 02nd word of a cell indicates 1 (inter-MESH PVC test cell), it is not a process object and is masked with an error edit IS.

Although the group address is not a check object, a non-matching result is output for the CAM.

FIG. 247 shows the summary of the above described DA check.

(10) BA Size Check S

It is checked whether or not the size of the BA of the SIP L# (L3-PDU) is correct.

When an error is indicated, the EFBA is set to L. If the test bit of the 02nd word of a cell indicates 1 (inter-MESH PVC test cell), it is not a process object and is masked with an error edit IS. FIG. 248 shows the error conditions of the BA size check.

(11) Ingress Flow Check S

The access class is divided into 5 levels for the DS3 class of each SNI, and it is checked whether or not the limited speed is observed. The number of octets is incremented for each class from the leaky packet (9192 oct) of a fixed capacity for each subscriber. It is checked whether or not a BAsize is acceptable for the leaky packet at the arrival of the BOM and SSM.

At every 32th cell frame (SNI #0 through #31), a predetermined number of octets are incremented from a leaky packet of each SNI (an increment process for each subscriber).

After the increment process is performed on a single SNI in a single cell frame, it is determined whether or not the BAsize is acceptable for the SNI corresponding to an arrived BOM.

No increment flow check is required for the access class word 0 and 5 (0 indicates DS1, while 5 indicates DS3).

However, the increment process can be performed by setting the number of the increment octets to all 1.

The firmware sets the number of increment octets for each SNI and buffer capacity (9192: predetermined value)

A practical process is performed as follows.

1. Increment process (a process of each subscriber is performed for each cell frame.

The number of increment octets is read from the increment octet number memory using the SNI ID (SNI number) as an address (key).

The read value and the number of increment octet number are added up after reading the buffer capacity from the leaky packet memory using the SNI ID as an address.

If the sum is larger than 9192, it is written to the leaky packet memory as the buffer capacity of 9192. If it is equal to or smaller than 9192, it is written to the leaky packet memory.

2. Data is read from the leaky packet memory using the SNI ID as an address upon receipt of the BOM and SSM, and the BAsize of 32 is subtracted from the read value. If the difference is larger than 0, it is written to the leaky packet memory. If the difference is equal to or smaller than 0, the buffer capacity read from the leaky packet memory is written to the memory as is (without subtraction) and an EF2AC is set.

1. The COM and EOM are not process objects.
2. The test bit of the 02nd word of a cell is 1 (inter-MESH PVC test cell).
3. If the EFIRM indicates L (error in CRC, PL length, or MID value) or the BAsize check outputs an error, then they are not process objects.
4. The ENB of the line system cell indicates DSB (invalid)

If a cell satisfies the condition of any of the above described 1., 2., 3., and 4, the memory is not accessed for the cell. An error flag (EF2AC) of the cell satisfying the condition of 2. above is masked with an error edit IS.

FIG. 249 shows the above described ingress flow check.

(12) Error Edit IS

As error checked by each checker is assigned to each position of the error flag.

If a flag is set as an error flag EF2, the flag of the EFMS of the EF1 is set. However, the EFMS is not set even if the error is indicated by the EF2MA.

The 2-bit segment type (ST) and the 10-bit message identifier (MID) are copied to the 00-th word of the cell. The received VCI (the 8 lower bits of the SNI number (SNI ID) is given) is copied to the 01-th word of the cell.

If the test bit of the 02nd word of a cell indicates 1 (inter-MESH PVC test cell), the error flag of the cell is masked.

(13) Simultaneous Input Number Check S

The number of messages simultaneously receivable for each SNI is restricted. If the number of arriving messages exceeds the restriction number (1 or 16), the arriving messages are discarded.

At the initialization for the restriction number (1 or 16), 0 or 1 (0 indicates the restriction number of 1; and 1-indicates the restriction number of 16) is set in the simultaneous input restriction number memory.

Process at the arrival of the BOM

1. When the number of received messages≠16 (or ≠1) for the SNI (in a normal operation);

The RMID is read from the RMID management table using a next read counter+SNI ID as an address (key). (The RMID is, as described later, a value obtained by combining the MID and the SNI number, and is uniquely assigned to an SNI and each MID in the SNI).

The VCI+MID is written to the RMID conversion CAM using the RMID as an address.

The RMID is written to the 03-th word (LSB 10 bits) of a cell.

The number of received messages (0 through 16) is incremented (+1).

If the restriction number is 16 (determined by the value in the simultaneous input restriction number memory), the next read counter (0 through 15) is incremented (+1).

2. When the number of received messages=16 (or 1) for the SNI, an error flag (E2EM and E1MS) is set.

Process at the arrival of the SSMS

1. When the number of received messages≠16 (or ≠1) for the SNI (in a normal operation);

The RMID is read from the RMID management table using a next read counter+SNI ID as an address.

The RMID is written to the RMID management table using the next write counter+SNI ID as an address.

The RMID is written to the 03-th word (LSB 10 bits) of a cell.

If the restriction number is 16 (determined by the value in the simultaneous input restriction number memory), the next read counter (0 through 15) and the next write counter are incremented (+1).

2. When the number of received messages=16 (or 1) for the SNI, an error flag (E2EM and E1MS) is set.

At the arrival of the COM, a matching process is performed using the VCI/MID as a matching address in the RMID converting CAM.

1. When a matching result is output;

The RMID is written to the third word (LSB 10 bits) of a cell using the RMID as the matching address.

2. When a non-matching result is output;

An error flag (E1RM or E1MS) is set.

At the arrival of the EOM, a matching process is performed using the VCI/MID as a matching address in the RMID converting CAM.

1. When a matching result is output;

The RMID is used as a matching address.

The RMID is written to the third word (LSB 10 bits) of a cell.

The RMID is written to the RMID management table using the next write counter+SNI ID as an address.

The number of received messages (0 through 16) is decremented (−1).

If the restriction number of 16, the next write counter (0 through 15) is incremented (+1).

2. When a non-matching result is output;

An error flag (E1RM or E1MS) is set.

The determination as to whether or not a timeout cell (EOM) is issued is made by checking whether or not the master (MS) error assignment memory (1 bit) of the error discard unit indicates 1. If the timeout cell has been issued, the error discard process invalidates the EOM cell.

No process is performed on the inter-MESH PVC test cell (test bit is 1), but an error cell (EF1MS indicates 1) is processed appropriately.

FIG. 250 shows the above described simultaneous input number check.

(14) MRI Timeout S

The time from the reception of the BOM to the reception of the EOM is monitored, and the MRI timeout is determined.

An MRI timeout message is detected by entering time in the CAM each time a cell arrives (including an idle cell).

1. A matching process is performed for each cell frame at the MRI time CAM using the "used(0)+1+current time" as matching data (process for each cell frame).

I. When a matching result is output;

1. A timeout cell (refer to the following NOTE 1) is generated for an idle cell, and all 1 is written to the RMID conversion CAM and the MRI time CAM.

2. "Used(0)+1+all 1" is written to the MRI time CAM using the matching address as an address for a cell other than an idle cell (BOM, COM, EOM, and SSM).

II. No process is performed when a non-matching result is output.

2. After performing a process for each cell frame, the following processes are performed for each cell.

For an idle cell;

I. When a matching result is output for the MRI time CAM in the process for each cell frame, the process described in 1-1 above is performed.

II. If a non-matching result is output for the MRI time CAM in the process for each cell frame, a matching process is performed for the MRI time CAM using the "used(0)+0+all 1" as matching data.

1. When a matching result is output, a timeout cell (refer to NOTE 1) is generated and all 1 is written to the RMID conversion CAM and the time CAM as a matching address.

2. When a non-matching result is output, no process is performed.

NOTE 1: An EOM cell (input VCI and input MID are written) having an error flag (E2MT) as a timeout cell is generated. The VCI+MID are read from the RMID conversion CAM using the matching address RMID as an address of the input VCI and MID.

At this time, in the simultaneous input number check S process described in (13) above, the following process is performed. That is, the matching address RMID is written to the RMID management table using the next write counter+SNI ID (VCI) as an address. Then, the number of received messages (0 through 16) for the SNI ID is decremented (−1). If the restriction number is 16, the next write counter (0 through 15) for the SNI ID is incremented (+1).

When the BOM is received;

"Used(0)+1+[timeout point (present time+T)]" is written to the MRI time CAM using the RMID as an address. (For example, T=2.7 μs/cell×64k (16 bit) ≈177 ms)

When the EOM is received;

1. "All 1" is written to the RMID conversion CAM and MRI time CAM using the RMID as an address if a matching result is output for the RMID conversion CAM described in (13) above.

2. No MRI timeout process is performed if aanon-matching result is output for the RMID conversion CAM described in (13) above.

No MRI timeout S process is performed on the COM/SSM.

No process is performed on the inter-MESH PVC test cell (test bit is 1).

An error cell (EF1MS is 1) is processed appropriately.

The above listed MRI timeout processes are shown in the drawings. FIG. 251 shows the calculation of the MRI Time. FIG. 252 shows the RMID conversion CAM and the read/write data to the MRI CAM. FIG. 253 shows the timing of each cell. FIG. 254 is a flowchart showing the simultaneous input number restriction RMID acquisition/MRI timeout process.

Described below is the supplementary explanation of the simultaneous input check S, MRI timeout S, (and RMID acquisition).

RMID

Considering the necessary process capacity in the SMLP, up to 32 subscribers (SNI) can be accommodated in one SMLP, and up to 16 simultaneous input restriction number of the L3-PDU is acceptable in one SNI. Therefore, up to 512 L3-PDU can be present simultaneously (32SNI×16 L3-PDU=512).

The RMID is a management number uniquely assigned to the 512 L3-PDU in the SMLP and consists of a VCI and MID. Using the RMID, an address of each type of table can be degenerated from the 32 VCI×1024 MID=32 kilobits to the RMID of 512 bits, thereby successfully saving the table capacity. FIG. 255 shows the above described degeneration.

The RMID is acquired (set on the RMID conversion table) at the following points.

When a normal BOM is received.

When a normal SSM is received (in the case of the SSM, data is not set on the RMID conversion table even if the RMID is acquired).

The RMID is released (the RMID conversion table is cleared) in the following cases.

When a normal EOM is received.

When an MRI T.O. EOM is received (transmission of the EOM at the MRI timeout)

When a normal SSM is received (in the case of the SSM, data is not set on the RMID conversion table, and the release process is not required).

When the RMID is acquired at the reception of an erroneous BOM, COM, or EOM.

The COM/EOM is assigned the RMID after the already acquired RMID is read from the RMID conversion table based on the VCI+MID.

FIG. 256 shows processes on normal and abnormal cells in the RMID acquisition unit, simultaneous input restriction, and the MRI T.O. set/releases.

1) When the input MID is not fixed;

The RM refers to an EF1RM and indicates that an NG has been detected in the following checks if the RM is set ON at the entry.

CRC-10

PL length

MID check

If the result of any of the above listed checks indicates an NG, then the MID value may not be correct and the RMID acquifing unit (including simultaneous input restriction and the MRI timeout check) performs no processes.

In the following blocks, data is read from or written to the memory using the RMID as an address. The RMID acquiring unit transmits the input MID as an RMID when the RM is set ON and no RMID is received. In this case, the data written using a correct RMID as an address can be destroyed. To prevent this, the RMID value should be 11 1111 1111 if no RMID is acquired (or assigned) and an unused address of the memory is accessed.

Error discard unit S

Routing information S

GA copy S

VC-SH transmission OK S

The similar problem may occur in the following blocks. To avoid the problem, no process is performed when the RM is set ON. Normally, if the RMID value is 11 1111 1111, an unused address in the memory should be accessed. The RM can be used without problem, but conformity is also expected.

BAsize matching, BEtag matching, Length check, output MID acquisition

Others

If the BOM indicates "RM ON"?, and the COM and EOM in the same L3-PDU indicate "RM OFF", then the input MID of the BOM may not be correct and the processes are performed on the COM and EOM as if no BOM were entered.

If the RM is set ON for the EOM, the input MID may not be correct and the RMID or MRI T.O. are not released or cleared. Accordingly, the RMI timeout occurs.

2) When a master error NG is detected (RM indicates OFF);

If an input message indicates a master error NG (EFLMS ON), it is checked on the BOM/COM/EOM/SSM whether or not the RMID as well as the message indicating the OK has been acquired in the input VCI+MID.

If it has been acquired, the acquired RMID (matching address in the RMID CAM) is assigned as an RMID. Since the MS is set ON, the process of the L3-PDU should be stopped and the RMID is then released and the MRI T.O is cleared.

If no RMID has been acquired, the RMID is set to 11 1111 1111 and the EF1RM is set ON.

3) When OK is received;

When an OK message is received, it is checked on the BOM/COM/EOM/SSM whether or not the RMID has been acquired.

If it has been acquired;

1. For the BOM: An RMID is assigned to set an MRI T.O. again.
2. For the COM: An RMID is assigned (in a normal state).
3. For the EOM: After an RMID is assigned, it is released immediately and the MRI T.O. is cleared (in a normal state).
4. For the SSM: After an RMID is assigned, it is released immediately and the MRI T.O. is cleared.

If the RMID has not been acquired;

1. For the BOM: An RMID is acquired to set an MRI T.O. (in a normal state)
2. For the COM: An RMID is set to 11 1111 1111 and the MS and RM are set ON.
3. For the EOM: An RMID is set to 11 1111 1111 and the MS and RM are set ON.
4. For the SSM: After an RMID is assigned, it is released immediately (in a normal state).

4) When a simultaneous input restriction NG is received;

A simultaneous input restriction is checked in this block.

When a BOM/SSM is received, it is set on the simultaneous input restriction table by the firmware. The simultaneous input restriction number (when the restriction number is 1, 0 is set on the table; when the restriction number is 16, 1 is set on the table) is compared with the number of the L3-PDU (the number of received messages) which has received a BOM but not an EOM (no MRI T.O. has occurred). If a matching result is output, an error flag MS and an EM are set ON. At this time, the RMID is set to 11 1111 1111. The RMID is not acquired and the RMI T.O. is not set.

The number of received messages is counted at the BOM only when the RMID is newly acquired.

The number of received messages is counted in the following cases.

When the process normally terminates at the EOM;

When a timeout EOM is transmitted; and

When the RM is set OFF, the MS is set ON, and the RMID is acquired at the BOM/COM/EOM.

5) When an MRI timeout check is made;

An MRI timeout check is made in this block.

The MRI timout check is monitored for each cell regardless of the validity of a received cell. If timeout is detected, the timeout pattern is set on the MRI T.O. table using the corresponding RMID as an address.

If the cell is invalid, the MRI T.O. table is checked for the existence of a timeout pattern. If a timeout pattern is detected, the VCI+MID read from the RMID conversion table and the RMID are assigned to the T.O. EOM (timeout EOM) and transmitted. At this time, the error flag sets the MS and MT to ON. After the T.O. EOM has been transmitted, the RMID is released and the MRI T.O is cleared. The timeout point of the MRI T. O table is set at the BOM when the RMID is newly set or set again.

The timeout point of the MRI T.O, table is cleared in the following cases.

When the process normally terminates at the EOM;

When a timeout EOM is transmitted; and

When the RM is set OFF, the MS is set ON, and the RMID is acquired at the BOM/COM/EOM.

6) Processing a PVC (between MESH and MH)

No RMID acquisition, simultaneous input restriction, or MRI T.O. process is performed on a PVC test cell between the MESH and MH. The data of an input cell is output as is together with the area of the RMID and an error flag.

(15) Hel Check S

It is checked whether or not the header extension length is set to 3. If the value is other than 3, the EFHE is set to L.

If the test bit of the-O2nd word of a cell is 1 (inter-MESH PVC test cell), the cell is not a process object.

(16) HE Format Check S

It is checked whether or not the first 3 octets (first element) of a header extension is set to 3 (element length), 0 (element type), and 1 (element value). If it is set to different values, the EFVE is set to L.

If the element type represented by the second octet in the second element (next 3 octets) of the header extension indicates 1, then the element length represented by the first octet is checked. If it indicates a value other than 4, 6, or 8, the EFCS is set to L.

If the test bit of the 02nd word of a cell is 1 (inter-MESH PVC test cell), the cell is not a process object.

FIG. 257 is a table showing the summary of the above described HE format check.

(17) SA Check S

It is checked whether or not the SA stored in the input cell is that entered in the transmission SNI.

The SA is input to the CAM at the arrival of the BOM and SSM.

Unless a matching result is output, an error flag (EFSA) is set.

If a matching result is output, an error flag (EFSA) is set only when the matching address is other than the SNI ID.

If a matching result is output, no process is performed when the result equals the SNI ID.

The COM and EOM are not check objects.

If the test bit of the 02nd word of a cell is 1 (inter-MESH PVC test cell), the cell, is not a process object.

FIG. 258 is a table showing the summary of the above described SA check.

(18) DA Screening S

A sending restriction is placed on a destination SNI.

Process at the arrival of the BOM and SSM

1. It is determined whether the AT (address type) indicates an individual address (IA) or a group address (GA), and reads from the SC attribute memory the attribute to the AT (IA or GA).
2. A matching process is performed at the DA screening CAM using the DA as matching data.

Refer to FIG. 259 showing the SC attribute and the matching state. If it indicates an error, an error flag is set to L.

The COM and EOM are not process objects.

If the test bit of the 02nd word of a cell is 1 (inter-MESH PVC test cell), the cell is not a process object.

(19) BEtag Match S

It is checked whether or not the BE tags stored in the header of the SIP (L3-PDU) and the trailer match each other.

If the BEtag of the SIP L3-PDU stored in the payload field of the BOM is stored and the EOM is received, then the stored BEtag is compared with the BEtag stored in the EOM. If they are different from each other, the EFBE is set to L.

If the test bit of the 02nd word of a cell is 1 (inter-MESH PVC test cell), the cell is not a process object.

FIG. 260 is a table showing the summary of the above described BE tag.

(20) BAsize Matching Check S

It is checked whether or not the BAsize stored in the header field of the SIP (L3-PDU) and the length value stored in the trailer match each other.

If the BAsize stored in the payload field of the BOM is stored and the EOM is received, then the stored BAsize is compared with the length stored in the EOM. If they are different from each other, the EFLE is set to L.

If the test bit of the 02nd word of a cell is 1 (inter-MESH PVC test cell), the cell is not a process object.

FIG. 261 is a table showing the summary of the above described BAsize match check.

(21) Information Length Check S

It is checked whether or not the BAsize and the information length of a received L3-PDU match each other.

Process at the arrival of the BOM

The number of the necessary cells and the length of the information (PL length) contained in the last cell (EOM) are calculated. The calculation is made according to the equation BAsize÷40 oct=quotient+remainder, thereby obtaining a quotient=cell count value and the PL length of the EOM=remainder+40 oct.

The calculation result is written to the cell count memory and the PL length memory using the RMID as an address (key).

At the arrival of the COM, a value is read from the cell count memory using the RMID as an address.

1. If the read value is 0, an error flag (EFIL) is set.
2. If the read value is not 0, the read value is incremented and written to the cell count memory.

At the arrival of the EOM, a value is read from the cell count memory using the RMID as an address.

1. If the read value is not 0, an error flag (EFIL) is set.
2. If the read value is 0, a value is read from the PL length memory is read using the RMID as an address.

The read value is compared with the actual payload length of the EOM. If they are different, an error flag (EFIL) is set.

If the test bit of the 02nd. word of a cell is 1 (inter-MESH PVC test cell), the cell is not a process object.

FIG. 262 is a table showing the summary of the above described information length check.

(22) Error Edit II S

An error checked by each checker is assigned to each position of the error flag.

If the flag is set at error flag E2, a flag EFMS is set.

(23) Errorred L3-PDU control and encapsulation S (1) Errorred L3-PDU Control

The following two processes are performed in this block.

1. Discard of error message in L3-PDU units

When a BON or COM having a master error (EFMS) set ON is received, the master error is set ON in this block for the COM and EOM having the same SNI/MID value received subsequently even if the L2-PDU is normal. FIG. 263 shows the discard of the error message of the above described L3-PDU.

2. Discard of messages received after the MRI timeout EOM (reception of pseudo EOM)

If the MRI timeout is detected, a pseudo EOM is generated at the MRI timeout unit of the HMH04A and then transmitted. In the blocks after the MRI timeout unit, the L3-PDU termination process is performed based on the pseudo EOM. The cells received after the pseudo EOM are processed as follows.

COM: A master flag (MS-FLAG) is set ON, and subsequent cells are processed as error cells.

EOM: Discarded as an invalid cell. At this time, a signal is output to count the number of discarded cells.

FIG. 264 shows the discard of the message received after the above described MRI timeout EOM.

A master error flag is set for the message of an error cell (for which a master error flag is set) in the process 1 above.

If a cell is an error cell at the arrival of the BOM, the master error information (hereinafter referred to as an MS) is written to the error memory using the test bit+input VCI+input MID as an address (key), and the timeout information (hereinafter referred to as a DM) is initialized.

If it is not an error cell, the MS and DM at the corresponding address are initialized (refer to 1 and 2 shown in FIG. 265).

The MS and DM are read from the memory using the test bit+input VCI+input MID as an address at the arrival of the COM (refer to 3 through 7 in FIG. 265).

I. If the MS of the read value is erroneous, a master error flag is set for the arriving cell (refer to 4 in FIG. 265).

II. If the DM of the read value is erroneous, a master error flag is set for the arriving cell (refer to 5 in FIG. 265).

III. If the arriving cell is erroneous, the MS is written to the corresponding address (refer to 6 and 7 in FIG. 265).

The MS and DM are read from the error memory using the test bit+input VCI+input MID as an address at the arrival of the EOM (refer to 8 through 10 in FIG. 265).

I. If no error is detected in the MS and DM of the read values, the DM is written to the corresponding address (refer to 8 in FIG. 265).

II. If the MS of the read value is erroneous, a master error flag is set for the-arriving cell, and the DM is written to the corresponding address (refer to 9 in FIG. 265).

III. If the DM of the read value is erroneous, the cell is invalidated (refer to 10 shown in FIG. 265).

(2) Encapsulation

In the process 2 above, the SIP L3-PDU is converted into the Inter-MH inf. PDU (inter-message-handler interface protocol data unit)(the SIP BOM cell is copied to generate an Inter-MH BOM cell).

An erroneous cell (marked with a master flag) is not a process object.

A cell is buffered at the arrival of the BOM and SSM.

The arriving BOM and SSM are copied to generate an encapsulated BOM (inter-MH inf BOM) (an ISSI header [ES: explicit selection] and a carrier are assigned). The encapsulated BOM cell is then transmitted.

The arriving BOM is transmitted when-an idle cell is detected with the segment type (ST) assigned to the COM.

The arriving SSM is transmitted when an idle cell is detected with the segment type (ST) assigned to the EOM.

At the arrival of the COM and EOM;

I. If the corresponding cell (determined by the RMID) is stored in the buffer, the cell in the buffer is transmitted first (to prevent the rearrangement of the sequence of cells for the message).

II. Unless the corresponding cell (determined by the RMID) is stored in the buffer, the cell is transmitted.

If the cell cannot be written to the buffer;

1. The cell is discarded (as an invalid cell).

2. To count the number of discarded cells, a discard signal is provided for the HMH06A in synchronism with the cell frame (indicating that one cell is discarded in one cell frame).

FIG. 266 is a table showing the summary of the above described encapsulation. FIG. 267 is a table showing the ISSI header to be assigned to the inter-MH INF BOM. FIG. 268 shows the cell format of the inter-MH inf BOM.

(24) Carrier Selection S

At the arrival of the BOM and SSM;

1. If no carrier selection is detected in the second element of the header extension, the explicit selection bit of the ISSI header is set to 0.

The carrier ID is read from the memory using the SNI ID as an address.

The read carrier ID is written to the carrier area of the ISSI header.

2. When a carrier selection is detected in the second element of the header extension, the explicit selection bit of the ISSI header is set to 1.

The carrier ID of the header extension is written to the carrier area of the ISSI header 3. An erroneous cell (marked with a master flag) is not a process object.

The COM and EOM are not process objects.

FIG. 269 shows the above described carrier selection.

(25) Routing S

The route information is retrieved and assigned an output VCI (destination MHID).

At the arrival of the BOM;

I. For a group address (GA) (when the address type of the DA is GA (1110)), a broadcast is performed to all SBMH/GWMH in the station.

1. A broadcast is specified for the BC area of the 02nd word of the cell. All 0 is written to the VCI area.

2. The BC of the 02nd word of the cell and the output VCI are written to the routing information memory using the RMID as an address.

II. For an individual address (IA) (when the address type of the DA is IA (1100), data is simultaneously read from the intra-station, intra-station number, and inter-station number tables using the DA as matching data. The matching priority is set in the order of the intra-station, intra-station number, and inter-station number tables.

1. An SBMH designation VCI is assigned when a matching result is output in the intra-station routing table. The output VCI is read from the intra-station phone number VCI assignment table using the matching address as an address, and is written to the VCI area of the 02nd word of the cell. A broadcast is designated for the BC area.

The BC and the output VCI of the 02nd word of the cell are written to the routing information memory using the RMID as an address.

The ISSI carrier area is set to all 0.

2. When a matching result is output on the intra-station phone number table, the data is broadcast to all SBMHs.

A broadcast is specified for the BC area of the 02nd word of the cell. All 0 is written to the VCI area.

The BC of the 02nd word of the cell and the output VCI are written to the routing information memory using the RMID as an address.

The ISSI carrier area is set to all 0.

3. An GWMH designation VCI is assigned when a matching result is output in the inter-station routing table.

The output VCI is read from the inter-station phone number VCI assignment table using the matching address as an address, and is written to the VCI area of the 02nd word of the cell. A broadcast is designated for the BC area.

The BC of the 02nd word of the cell and the output VCI are written to the routing information memory using the RMID as an address.

4. Unless a non-matching result is output on the three routing tables, the data is broadcast to all GWMHs in the LATA.

A broadcast is specified for the BC area of the 02nd word of the cell. All 0 is written to the VCI area.

The BC of the 02nd word of the cell and the output VCI are written to the routing information memory using the RMID as an address.

For the COM and EOM, the route information is read from the routing information memory using the RMID as an address and written to the BC area and the VCI area of the 02nd word of the cell.

FIG. 270 is a table showing the summary of the above described routing process. FIG. 271 is a block diagram showing the above described routing process.

(26) Carrier Screening S

A sending restriction is placed on the carrier specified by each SMI.

At the arrival of the BOM and SSM, a matching process is performed on the SMI ID+carrier of the ISSI header as data by the carrier screening CAM. If a matching result is output, the ISSI carrier area is cleared (all '0') and an error flag (EFEB) is set. FIG. 272 shows the above described carrier cleaning and the state of the carrier.

(27) GA Copy S

Cells of the number of the implemented MHs are copied and an output VCI-is assigned to transmit a broadcast cell to an implemented MH.

When a cell arrives, the BC area (12th and 13th bits) of the 02nd word of the cell is checked and a transfer destination MH is determined according to the conditions shown in FIG. 273.

Process performed when the BOM arrives

1. When there is a space area in the buffer (buffer≠full)

I 0 is written to the FIFO write NG memory, and the cell is written to the buffer.

II The cell is read from the buffer and written to the copy memory with the BC area specified.

III An output VCI is assigned and 0 is written to the CP area and then the cell is transmitted. It is transmitted without performing any process if the BC area is 00.

IV If 1 is set in the BC area (in either of the two bits), reading a cell from the buffer is stopped. The MH ID corresponds to the address of the implemented/unimplemented memory (addresses 00 through 1F to the SBMH and addresses 40 through 5F to the GWMH). Data is read from the copy memory (copying cells) and an output VCI is assigned in the address order.

V When c-ells-are-copied, 1 is written-to the CP area.

2. When the buffer contains no space area (buffer=full);

I The cell is discarded (as an invalid cell).

II The number of discarded cells is counted (written to the dual port RAM directly connected to the μ-P bus).

III 1 is written to the FIFO write NG memory.

Process performed when the COM/EOM arrives

1. When the buffer contains a space area (buffer≠full);

I Data is read from the FIFO write NG memory. If the read data indicates 0, the cell is written to the buffer.

II Cells are retrieved from the buffer and written to the copy memory with the BC area specified.

III An output VCI is assigned and transmitted with 0 written to the CP area. If the BC area indicates 00, the cell is transmitted with no process performed IV If the BC area indicates 1 (in either of the two bits), reading a cell from the buffer is stopped. The MH ID corresponds to the address of the implemented/unimplemented memory (addresses 00 through 1F to the SBMH and addresses 40 through 5F to the GWMH). Data is read from the copy memory (copying cells) and an output VCI is assigned in the address order.

V When cells are copied, 1 is written to the CP area.

2. When the buffer contains no space area (buffer=full) and the FIFO write NG memory is 1;

I The cell is discarded (as an invalid cell).

II The number of discarded cells is counted (written to the dual port RAM directly connected to the μ-p bus).

III 1 is written to the FIFO write NG memory.

Process when an error cell is set (setting a master error flag)

1. When the BC area indicates 00, the cell is transmitted with no process performed.

2. When the BC area is set to a (in either of the two bits);

An output VCI is assigned and the cell is transmitted without any process if the cells after the BOM are error cells.

If the cells after the COM/EOM are erroneous cells, 1 is written to the CV area only in the first error cell having the same error message and a normal copying operation is performed. For the second and subsequent error cells, 0 is written to the CV area and an output VCI is assigned. The cell is transmitted with no other processes performed.

FIG. 274 shows the GA copying operation. FIG. 275 shows the cell format after the broadcast. FIG. 276 is a flowchart of the GA copy process.

(28) Restriction of the Output Band S

A restriction is placed on the output (peak rate) for each transmission MH (32 SBMH/32 GWMH).

The number of messages discarded due to the absence of space areas in the buffer is counted. FIG. 277 shows the above described output band restriction.

(29) Output MID Acquisition S

An MID (the same MID can be assigned to different message handler MHs) is assigned to each destination MH. Up to 256 MIDs can be provided for one MH ID. However, MESH #0 can be assigned 1-255; MESH #1 can be assigned 256-511; MESH #2 can be assigned 512-755; and MESH #3 can be assigned 756-1023. The MESHID is identified by the firmware.

Process performed when the BOM arrives

1. When the number of possibly acquired MIDs for the MH ID is not 0 (next read counter ⊂ next write counter);

An MID is read from the-MID management table using the next read counter+MH ID as an address.

The MID is written to the MID conversion memory using the MH ID+RMID of the cell as an address.

The read MID is written to the 3rd word of the cell (LSB 10 bits).

The next read counter (0 through 255) is incremented.

1 is written to the flag (1 bit) of the MID conversion memory using the RMID+MH ID as an address.

2. When the number of possibly acquired MIDs for the MH ID is 0 (next read counter=next write counter);

A master error flag (EIMS) and an error flag (E2MN) are set.

Process performed when a COM arrives

An MID+flag is read from the MID management memory using MH ID+RMID of the cell as an address.

1. If the read flag value is 1, the read MID is written to the 3rd word (LSB 10 bits) of the cell.

2. If the read flag value is 0, a master error flag (E1MS+E1MN) is set.

When the EOM arrives;

An MID+flag is read from the MID management memory using MH ID+RMID of the cell as an address.

1. If the read flag value is 1, the read MID is written to the 3rd word (LSB 10 bits) of the cell.

The MID releasing operation is performed as follows.

The MID is written to the MID management table using the next write counter+MH ID as an address.

The next write counter (0 through 255) is incremented.

2. If the read flag value is 0, a master error flag (E1MS+E1MN) is set.

An error cell (for which a master error flag (MS) is set) is not a process object.

However, if the MID conversion memory flag is 1 when the COM/EOM arrives, the MID releasing operation is performed.

FIG. 278 shows the above described output MID acquisition process. FIG. 279 is a flowchart showing the MID acquisition process.

(30) Discard Count S

The number of cells discarded at the VC-SH LSI is counted.

The number of messages discarded at the VC-SH LSI is counted.

The number of cells discarded at the GA copying unit is counted.

The number of cells discarded at the encapsulating unit is counted.

(31) SN Assignment S

A value obtained by subtracting 1 from the SN is assigned to the BOM.

No process is performed for the COM and EOM.

(32) Error Cell Discard S

The master error (MS) of an error flag discards a rejected cell.

(33) VPI/VCI Assignment S

The 01st word (4 bits at MSB and 4 bits at LSB) is assigned 0(H) and the 02nd word (4 bits at MSB) is assigned 3(H).

(34) μ-P Interface S[

Interfaces with the MNG μP from the HLP02A.

(35) Timing S 9M clock and a cell frame are generated based on the 19M clock and cell frame received from the HLP02A.

Each block of the SMLP is described above in detail. FIGS. 280 and 281 show a list of SMLP tables.

4. RMLP 4.1. Outline of Process

A destination address (DA) in a message is referred to and a message only addressed to a subscriber accommodated in the present RMLP is filtered. Then, a route to the destination subscriber is retrieved and the VCI to the line to the destination is written to the cell header. The cell is then transmitted to the SW.

4.2. Configuration

FIG. 282 shows the entire configuration of the RMLP. FIGS. 283 and 284 show the outline of the functions of each clock shown in FIG. 282. (The item numbers correspond to the numbers 01 through 23 in the figure).

4.2.1. PVC Test

FIGS. 285 through 287 show the route of the test cell processed in the PVC test. FIG. 285 shows the SNI loopback test; FIG. 286 shows the inter-MH (using a specific DA) test; and FIG. 287 shows the inter-MH (using an assigned DA) test.

4.2.2. MSCN

FIG. 288 shows the MSCN of the RMLP.

4.2.3. MSD

FIG. 289 shows the MSD of the RMLP.

4.2.4. Correspondence between each Function Block and Error Flag

FIG. 290 is a table showing an error flag (F-F) operated for each function block of the RMLP. The conditions on which function blocks are operated are also described on the table shown in FIG. 290.

How to refer to the table:

The vertical axis shows the function blocks.

The horizontal axis shows the EFs (EF1 and EF2) and the state of the PVC test.

Each item is divided into upper and lower columns. The upper columns show EFs rejected by the check of a function block. If an EF is rejected, the EF represented by 'ON' is controlled. The lower columns show whether or not the EFs are processed with the check results.

4.2.5. Data Interface Between RMLP and LPCOM

FIGS. 291 through 295 show the data interface between the RMLP and the LP-COM and the cell format. Described below is the detailed explanation of the cell format shown in FIGS. 291 through 295.

IST: Segment type (ST) of the inter-MH interface format

DM: Result of matching of the DA-CTL LSI of the HMH00A (1: matching; 0: non-matching)

Output MID: Copy of 5 lower order bits of the output MID

RDA: Combined area of the D.C. of the 00-th word and the output MID'. The DA-ID is entered corresponding to the DA of the inter-MH interface format. Assigned by the DA CTL LSI of the HMH00A and changed into the D.C. and the output MID' after the output MI of the HMH02A is acquired.

Input VCI: The source MH number is represented by 8 LSB bits of the VCI input from the MDX. 15-12 are 4 bits of the MSB; and 03-00 are 4 bits of the LSB.

BRLC: The BRLC number (umbilical link ID) of the destination SNI is input. If the destination SNI is HOST SW, it is set to 0.

Output VCI: Indicates a destination SNI. In a test cell, one MSB bit indicates 1.

PT: Payload type (no process is performed in a processor.)

CLP: Cell loss priority (no process is performed in a processor.)

SST: Segment type of the SIP. An encapsulated segment has the same value as the IST.

SN: Sequence number. An original value is transmitted from the processor to the PM unit/billing unit.

Output MID: Message identifier

1. An RMID is assigned after VCI and MID are degenerated by the acquisition of the RMID of the HMH01A.
2. Changed into an output MID after the output MID of the HMH02A is acquired.

PL: The PL of the SIP is input.

CRC: A reassigned PL is input to the billing unit.

4.3. HMH00A

FIG. 296 is a block diagram showing the function of the HMH00A. FIG. 297 is a table showing the summary of the functions of each block shown in FIG. 296.

4.3.1. Selection of Cross-Connection R

Data from MH-COM is selected and transmitted to a processor.

(1) Outline of Functions

FIG. 298 is a block diagram showing the functions of selecting the cross-connection R; and FIG. 299 is a table showing the summary of the function of each block.

4.3.1-1, 2, and 3 System Cross-Connection

The HMH00A is an entry of the RMLP, and enables cross-connection to another RMLP system. It fetches data from its own MDX through the B.W.B and simultaneously outputs data to another system through front connector B. It also fetches the data of other systems through front connector A (FIG. 300).

4.3.1-4 39 MHz FIFO

The data asynchronously fetched internally and externally is synchronized by reading the data using the V1 DMX LSI, the same clock, and CF. The reading CF is generated by the timing generator R (FIG. 301).

4.3.1-5 Selection of Cross-Connection Data

The internal and external data output by the FIFO, whichever is in an active system, is selected by the SWACT. The data is selected in cell frames (FIG. 302).

4.3.1-7 Address Filter R Inf.

An address filter R converts a 39M/16 bit parallel signal into a 13M/48 bit parallel signal using the CSPC-AD LSI because it uses the DA-CTL LSI. The CSPC-AD LSI reassigns a parity because the parity does not contain "enable".

(2) MSCN Point

FIG. 303 shows an MSCN point relating to the cross-connection selecting unit. The polarity is represented as being faulty by 'H'. A pseudo-fault is represented as a pseudo-fault by 'H'. The numbers (1 through 4) of the items on the table correspond to those shown in FIG. 298.

4.3.2. Timing Generator

A timing generator generates a clock and a cell frame to be used in the RMLP after receiving a clock and a cell frame from the internal HLP02A.

(1) Outline of Functions

FIG. 304 is a block diagram showing the functions of the timing generator R; and FIG. 305 is a table showing the summary of the functions of each block.

4.3.2-139 MHz CF Generator

The VI DMUX read CF requires a timing in which the same cell can be read from both home and mate systems. If the read CF is between the home and mate write CFs, a cell immediately before or after is read. Accordingly, the read CF is delayed by 9τ if a write CF (home or mate) reaches at 6τ before or after the generated CF. It is processed as a read CF after it is written (home and mate) to the V1 DMUX. FIG. 306 shows the above described operations.

(2) MSCN Point

FIG. 307 shows the MSCN point relating to the timing generator R. The polarity is represented as being faulty by 'H'. A pseudo-fault is represented as a pseudo-fault by 'H'. The numbers (1 through 3) of the items on the table correspond to those shown in FIG. 304.

4.3.3. Address Filter R

It is determined whether or not the cell is to be processed in the home RMLP. The cell is then transmitted to the processor of 155.

(1) Outline of Functions

FIG. 308 is a block diagram showing the functions of the address filter R; and FIG. 309 is a table showing the summary of the functions of each block shown in FIG. 308.

4.3.3-1 DA Matcher

When the BOM and SSM arrive, a matching process is performed between the DA of the cell and the internal data of the table. A matching signal and a matching address are then output, the matching cell is fetched, and matching information and a matching address are assigned to the tag field. No operations are performed when a COM or EOM arrives.

4.3.3-2 VCI/MID Matcher

The COM and EOM are filtered using the VCI/MID of the BOM for which the DA matcher output a matching result so that only a cell containing a message to the internal MESH.

4.3.3-3 Enable Control

The "enable" assigned to a TCG test cell and a cell for which the DA matcher and the VCI/MID matcher output a non-matching result is canceled. The enable-canceled data is reassigned a parity.

FIG. 310 is a table showing the summary of the conditions of the VCI/MID matcher.

(2) MSCN Point

FIG. 311 shows the MSCN point relating to the address filter R. The polarity is represented as being faulty by 'H'. A pseudo-fault is represented as a pseudo-fault by 'H'. The numbers (1 through 5) of the items on the table correspond to those shown in FIG. 308.

4.4. HMH01A

FIG. 312 is a block diagram showing the functions of the HMH01A; and FIG. 312 shows the summary of the functions of each block shown in FIG. 312.

4.4.1. Test Cell Multiplexing R and 9MG R

When the circuit indicates an idle cell, a test cell from the HLP02A is multiplexed and transmitted to the processor. A 9MCK is generated based on the 19MCK and the FP from the HLP02A.

(1) Outline of Functions

FIG. 314 is a block diagram showing the functions of the test cell multiplexing R and 9MG R and a table showing the summary of the functions of each block.

(2) MSCN Point

FIG. 315 shows the MSCN point relating to the test cell multiplexing R and 9MG R., The polarity is represented as being faulty by 'H'. A pseudo-fault is represented as a pseudo-fault by 'H'. The numbers (1, 2, and 3) of the items on the table correspond to those shown in FIG. 314.

4.4.2. MID Check R

An MID check is performed on the cell data.

(1) Outline of Functions

FIG. 316 is a block diagram showing the functions of the MID check R and a table showing the summary of the functions of each block.

(2) MID Check

In the MID check R, a process shown in FIG. 317 is performed according to the segment type, DM, and RAM information.

(3) Error Flag

If an error is detected in the MID check R, an error flag is set to 'L' as shown in FIG. 318 according to the segment type. A test cell (SNI loopback) is not a process object.

(4) MSCN Point

FIG. 319 shows the MSCN point relating to the MID check R unit. The polarity is represented as being faulty by 'H'. A pseudo-fault is represented as a pseudo-fault by 'H'. The numbers (1 and 2) of the items on the table correspond to those shown in FIG. 316. Since the unit shares the memory with the SN check unit and the encapsulation unit, the MSCN point is shared among the MID check unit, the SN check unit, and the encapsulation unit.

4.4.3. SN Check R

An SN check is performed on cell data.

(1) Outline of Functions

FIG. 320 is a block diagram showing the functions of the SN check R and a table showing the summary of the functions of each block. This process is performed simultaneously with the MID check and the encapsulation.

(2) Error Flag

If an error is detected in the SN check R, an error flag is set to 'L' as shown in FIG. 321 according to the segment type. A test cell (SNI loopback) is not a process object.

(3) MSCN Point

FIG. 322 shows the MSCN point relating to the SN check R unit. The polarity is represented as being faulty by 'H'. A pseudo-fault is represented as a pseudo-fault by 'H'. The MSCN point is shared among the MID check unit, the SN check unit, and the encapsulation unit. The number 1 of the item on the table corresponds to that shown in FIG. 320.

4.4.4. Encapsulation R

The SIP interface protocol data unit (SIP inf. PDU) is retrieved from the message handler inter-MH interface protocol data unit (inter-MH inf. PDU) to alter the segment type ST.

(1) Outline of Functions

FIG. 323 is a block diagram showing the functions of the encapsulation R and a table showing the summary of the functions of each block. This process is performed simultaneously with the MID check and the SN check.

(2) Error Flag

FIG. 324 shows an error flag relating to the encapsulation unit. The polarity is represented as being faulty by 'L'. A test cell is a process object.

(3) MSCN Point

FIG. 325 shows the MSCN point relating to the encapsulation unit. The polarity is represented as being faulty by 'H'. A pseudo-fault is represented as a pseudo-fault by 'H'. The number 1 of the item on the table corresponds to that shown in FIG. 323. The MSCN point is shared among the MID check unit, the SN check unit, and the encapsulation unit.

4.4.5. Error Edit IR

An error checked by each checker is assigned to each position of the error flag.

(1) Outline of Functions

FIG. 326 is a block diagram showing the error edit I R and a table showing the summary of the functions of each block.

4.4.6. RMID Acquisition R

Data is compressed for internal process according to the VCI/MID.

(1) Outline of Functions

FIG. 327 is a block diagram showing the functions of the RMID acquisition R; and FIG. 328 is a table showing the summary of the functions of each block shown in FIG. 327.

(2) Error Flag

FIG. 329 shows an error flag relating to the RMID acquisition unit. The polarity is represented as being faulty by 'L'.

4.4.7. MRI Timeout Check R

The MRI timeout of the message received from the HMH00A is determined.

(1) Outline of Functions

FIG. 330 is a block diagram showing the functions of the MRI timeout check R; and FIG. 331 is a table showing the summary of the functions of each block shown in FIG. 330.

(2) Detailed Explanation of Functions

1. ST determination of Cell

Refer to the ST acquisition unit because the process is similar to that performed by the ST acquisition unit for MID compression.

2. Cell Counter

Cells are counted by two methods, that is, a total cell counting mode and a valid cell counting mode. The modes can be switched by the MSD.

MRITEM: address 0218, bit 03, 0 for total cell count, and 1 for valid cell count 3. Generation of Space Pattern Since the process is similar to that of the MID compressed space pattern unit.

4. MRI TIME (AMDCAM)

1. The present time is written from the cell counter at the receipt of the BOM.

2. The time written to the COM and EOM is compared with the present time.

3. If a matching result is output, a timeout pattern is generated and written.

4. If a non-matching result is output and an EOM is reached, a space pattern is generated.

5. Generation of timeout pattern

A timeout pattern is output to the MRI TIME according to a matching signal of the MRI TIME.

6. Transmission of TO cell

A timeout cell (TO cell) is generated and transmitted when an invalid cell is detected. FIG. 332 shows the header format of the TO cell.

A matching address in the timeout pattern indicates the RMID. A destination SNI-ID is assigned and transmitted according to this RMID by the GA copying unit. Accordingly, the destination SNI-ID shown in FIG. 332 is exactly "Don't care" (D.C.), and is assigned a destination SNI-ID by the GA copying unit.

(3) Error Flag

FIG. 333 shows an error flag relating to the MRI timeout check unit. The polarity is represented as being faulty by 'L'.

4.4.8. GA Copy

A cell input at the GA is output to each subscriber.

(1) Outline of Functions

FIG. 334 is a block diagram showing the functions of the GA copy R; and FIG. 335 is a table showing the summary of the functions of each block shown in FIG. 334.

(2) Error Flag

FIG. 336 shows an error flag relating to the GA copy unit. The polarity is represented as being pseudo-faulty by 'L'.

(3) MSCN Point

FIG. 337 shows the MSCN point relating to the GA copying unit. The polarity is represented as being faulty by 'H'. A pseudo-fault is represented as a pseudo-fault by 'H'. The numbers (1 through 5) of the items on the table correspond to those shown in FIG. 334.

4.4.9. SNI Available R

A cell is discarded when it cannot be received due to a DT fault of the SIP, etc.

(1) Outline of Functions

FIG. 338 is a block diagram showing the SNI available R and a table showing the summary of the functions of each block.

(2) Error Flag

If an error is detected in the SNI available R, an error flag is set to 'L' as shown in FIG. 339 according to the segment type. If the highest order bits of the inter-MH COM, EOM and destination SNI-ID indicate '1', it is not a process object. An error cell (SNI loopback) is a process object.

(3) MSCN Point

FIG. 340 shows the MSCN point relating to the SNI available R unit. The polarity is represented as being faulty by 'H'. A pseudo-fault is represented as a pseudo-fault by 'H'.

4.4.10 Error Edit II R

An error checked by each checker is assigned to each position of the error flag.

(1) Outline of Functions

FIG. 341 is a block diagram showing the error edit II R and a table showing the summary of the functions of each block.

4.4.11 SA Check R

In response to the GA message, an internal loopback cell is turned back.

(1) Outline of Functions

FIG. 342 is a block diagram showing the SA check R and a table showing the summary of the functions of each block.

(2) Error Flag

If an error is detected in the SA check R, an error flag is set to 'L' as shown in FIG. 343 according to the segment type. If the highest order bits of the inter-MH COM and destination SNI-ID indicate '1', it is not a process object. If a cell is assigned an EFMS (master flag) it is not a process object.

(3) MSCN Point

FIG. 344 shows the MSCN point relating to the SA checking unit. The polarity is represented as being faulty by 'H'. A pseudo-fault is represented as a pseudo-fault by 'H'. The numbers (1 and 2) of the items on the table correspond to those shown in FIG. 342.

4.5. HMH04A

HMH04A realizes only the functions of the SA screening R to the RMLP. Since the 9MGS and the µP interface S are shared with the SMLP, they are not explained in detail here.

4.5.1. SA Screening R

Outline of Functions

Restrictions are placed on the reception of cells at a destination SNI. The following two methods are adopted to restrict the reception of cells.

1. Restrictions are placed on the reception of cells from an entered address (IA) (SC attribute=1).
2. Restrictions are placed on the reception of cells from an address other than an entered address (IA) (SC attribute=0).

These reception restricting methods are stored in the SC attribute memory.

Process performed when the BOM and SSM arrive

1. The attribute of the IA of the SC attribute memory (shared by the DA screening of the SMLP) is read.
2. A matching process is performed at the SS screening CAM (physically the same LSI as the DA screening CAM used in the SMLP) using the SA as matching data.

The table of FIG. 345 showing the state of matching with the SC attribute is referred to. If it is determined as an error, the error flag (EFSS) is set to L.

The COM and EOM are not process objects.

If the highest order bit (bit 11 of the 02nd word) of the destination SNI-ID is 1, it refers to an MESH-MH PVC test cell and is not a process object.

4.6. HMH02A.

The HMH02A controls the band of the SBMESH-RMLP unit and limits the number of transmitted messages. FIG. 346 is a block diagram showing the entire configuration of the HMH02A.

4.6.1. Outline of Configuration

FIG. 347 is a block diagram showing the functions of the HMH02A. In FIG. 347, the horizontal connection mainly refers to the highway HW data system. The vertical connection mainly refers to control data and control signals.

4.6.2. Outline of Functions

FIG. 348 is a table showing the functions of each block shown in FIG. 347.

4.6.3. Outline of Interface I/F

FIG. 349 shows the state of the interface I/F of the HMH02A. The horizontal connection mainly refers to the HW data system. The vertical connection mainly refers to control data and control signals.

4.6.4. Detailed Explanation

Sequentially described below in detail are the functions according to the above described outline.

4.6.4.1. Message Control

FIG. 350 is a table showing the contents of the message control.

(1) Restriction of the Number of Simultaneously-Transmitted Messages

A received message is managed for each SNI, and the number (corresponding to the number of MID for each SNI) of messages simultaneously transmitted is controlled. Messages exceeding the restriction number or containing an error are removed from the HW.

FIG. 351 is a detailed block diagram showing the above described simultaneously transmitted message number restricting unit.

The simultaneously transmitted message number restricting unit manages the transmission of messages by comparing the number of transmitted messages with the restriction number. Unless the number of transmitted messages exceeds the restriction number when messages arrive, the messages is allowed to be transmitted and the number of the messages are added to the transmission number. If the number of transmitted messages has already reached the restriction number, arriving messages are rejected. The first rejected message is buffered (buffering is described later). The other rejected messages are processed as invalid messages with an error flag set. No process is performed on the subsequent messages over the number of the simultaneously transmitted messages. The restriction number of simultaneously transmitted messages is 1 or 16.

(1)-1 Management of Transmission Number

The number of transmitted messages is managed for each SNI. FIG. 352 is a table showing the management of the number of transmitted messages for a specified SNI.

(1)-2 Removing Error Cells

The error flags of transmitted cells are monitored. Erroneous cells are processed as invalid cells and removed from the process flow not to be transmitted to the processors after restricting the number of simultaneously-transmitted messages. If an invalid cell is detected, the message related to the cell is also processed as an invalid message An erroneous cell is entered in error type statistics data and transmitted to the LP-COM for analysis.

(1)-3 Buffering Control

Buffering control is performed in message units by identifying a cell belonging to a message to be buffered, accessing a cell memory, and managing the number of cells.

Data is buffered only if messages cannot be simultaneously transmitted and the cell memory is unused. Although the data is buffered in message units, various messages actually arrive in cell units and therefore it requires control in cell units.

A determination is made when a message passes the IBOM as to whether or not the message can be buffered. If the determination indicates "yes", it is so entered. The message entry state is retrieved for the subsequent cell groups, and the cells are processed according to the retrieved state.

1. Message Write Control

If an arriving cell belongs to a message which can be buffered, it is written to the cell memory. The number of cells written to the cell memory is calculated for each SNI, and managed for each message.

2. Message Read Control

A buffered message is determined as possibly being read from a buffer when the number of messages simultaneously transmitted to the destination SNI does not exceed the restriction number. If a message is determined as possibly being read from the buffer, it is read in cell units from the cell memory and transmitted at a timing of an idle cell. At this time, the number of cells read from the memory is counted as in 1 above and managed as having been read.

The state of a message is monitored by comparing 1 with 2 above.

If 2 is smaller than 1, it indicates that a cell exists in the cell memory. If they are equal to each other, it indicates that the read has been completed.

FIG. 353 shows the concept of the buffering management.

(2) Output MID Acquisition

Since the RMID is a compressed MID after being combined with the SNI in the HMH01A, it cannot be transmitted as is to the MDX unit. Therefore, an output MID is acquired based on the RMID and then replaces the RMID. Using the MID identifies messages of different types to be transferred to the same VCI (SNI), and also identifies messages in cell units. FIG. 354 is a block diagram showing the output MID acquiring unit.

As shown in FIG. 355, an output MID is acquired based on the VCI of the IBOM and RMID when the IBOM arrives. An output MID acquisition table (memory shown in FIG. 354) is referred to by using the VCI of the arriving IBOM cell as a key. The VCI of the IBOM cell refers to a specific SNI. An output MID is obtained by adding a predetermined fixed data to the address of data having the SNI corresponding to the VCI of the above described IBOM cell. Then, the message can be entered by writing the RMID to the shadowed area of the address. The entry of the message completes the acquisition of the output MID.

In the cell groups after the above described IBOM, the VCI/RMID written to the output MID acquisition process of the IBOM is retrieved based on their own VCI/RMID as a key. Predetermined fixed data is added to a resultant address to obtain an output MID. That is, relating to cell groups after the IBOM, the output MID acquisition table is generated when the IBOM arrives and used to obtain the output MID simply by retrieving necessary data from the table using their own VCI/RMID as a key.

If an IEOM or an error cell arrives, the obtained MID is released by deleting the RMID written to the above described output MID acquisition table in the output MID acquisition process.

(3) Restriction of Egress Flow

An egress flow restricting unit classifies received messages for each SNI and controls the output band based on a predetermined band.

A band is controlled by managing and controlling the time interval of transmitting cells. A cell flow increases if the interval of transmitting cells is shorter, but decreases if the interval is longer according to the basic concept of the ATM.

Practically, the time interval of transmitting cells is controlled according to the time parameter defined by the band, and the time information is constantly stored and managed for each SNI using the time table. The parameter for use in controlling the band is generated according to the band assigned individually to each subscriber. In the SBMESH unit, the table manipulation, settings, etc. are collectively managed by the up unit provided for the HLP02A of the LP-COM unit. FIG. 356 is a block diagram showing the egress flow restricting unit.

(4) Discard Counter

Cells discarded by the band control through the restriction of an egress flow are counted and the information is transmitted to the PM unit (HLM01A).

The counter comprises a duplex configuration memory in the RAM. It releases one portion of the memory at the HLM01A's request for data and counts discarded cells in the other portion of the memory. These RAM portions are switched according to a RAMCHG signal from the HLM01A. FIG. 357 is a block diagram showing the discard counter unit.

(5) Generation of CRC-10

A CRC-10 generating unit allows the CRC to manage a cell payload unit to ensure the normality and quality of data. Generating and adding a CRC-10 enables a single-bit error to be detected and corrected and also enables a plural-bit error to be detected. FIG. 358 is a block diagram showing the CRC-10 generating unit. FIG. 359 shows the positions where a polynomial of the CRC-10 generated by the CRC-10 generating unit and a CRC-10 polynomial in a cell are stored.

4.6.4.2. Clock Generating Unit

A clock generating unit receives a master clock and generates a 9 MHz clock for use in a highway HW data process in the RMLP unit and for an external I/F.

The master clock manages the SBMESH internal clock for the present system, prevents the waste of the resources for the BWB, etc. by transmitting the clock for plural times, and receives a share from the HLP02A. A synchronizing frame pulse (FP) is also distributed to ensure uniform rise and fall of a generated clock. The 9 MHz clock is generated based on the master clock. Its phase is synchronized by the FP, and then the clock runs autonomously (it can be constantly synchronized by the FP). FIG. 360 is a block diagram showing the clock generating unit. FIG. 361 shows the method of generating the clock.

4.6.4.3. μP I/F

This interface receives addresses, data band control signals, etc. from the μP unit provided in the HLP02A, transmits data, and controls and manages each function of internal units. FIG. 362 shows the contents of the μP I/F.

5. MH-COM Unit 5.1. General Descriptions

The MH-COM unit comprises the following functions.

1. Data is demultiplexed after being transmitted from an ATM switch, and then transmitted to the LP unit.
2. The data from the LP unit is multiplexed and transmitted to the ATM switch.
3. The signaling through the LAP is terminated.

The MH-COM unit has a duplex configuration exclusive to the ATM switch system, and has a cross-connection for signaling and VCC copying between systems. The MH-COM unit comprises four PWCBs. FIG. 363 shows the PWCBs and the functions of each PWCB.

5.2. RDMX/SMUX Function (HMX10A)

As shown in FIG. 204, the SBMESH is connected to sides 0 and 1 of the ATM switch (ASSW). Physically, the same cable is used for connection between the ASSW upward side 0 and the SBMESH and between the ASSW downward side 0 and the SBMESH. This cable is connected to the A-conn. of the HMX10A PWCB (another cable is connected to the b-conn. for a daisy chain).

As shown in FIG. 204, the cable transmits the following two types of data.

- data to be transmitted to the sending terminal of the SBMESH, that is, from the SMLP to the ASSW.
- data to be transmitted from the ASSW to the receiving terminal of the SBMESH, that is, to the RMLP.

To transmit the data, the HMX10A has the following functions.

Multiplexing data to be transmitted from the SMLP to the ASSW (SMUX function)

Demultiplexing data to be transmitted from the ASSW to the RMLP (RDMX function)

FIG. 364 is a block diagram showing the HMX10A. FIGS. 365 and 366 show the monitor items of the HMX10A.

The actual RDMX function does not demultiplex data according to the tag information but fetches data to the RMLP according to the destination address DA in consideration of the broadcast of the group address GA. Thus, the HMX10A does not have an actual multiplexing function, but the function is practically performed by the RMLP. The HMX10A transmits the data from the ASSW to the RMLP. The DMUX LSI shown in the figures processes test cells.

5.3. SDMX/RMUX Function (HMX11A)

As shown in FIG. 204, the SBMESH is connected to sides 0 and 1 of the ATM switch (ASSW). Physically, the same cable is used for connection between the ASSW upward side 1 and the SBMESH and between the ASSW downward side 1 and the SBMESH. This cable is connected to the A-conn. of the HMX11A PWCB (another cable is connected to the b-conn. for a daisy chain).

As shown in FIG. 204, the cable transmits the following two types of data.

data to be transmitted to the receiving terminal of the SBMESH, that is, from the RMLP to the ASSW.

data to be transmitted from the ASSW to the sending terminal of the SBMESH, that is, to the SMLP.

To transmit the data, the HMX11A has the following functions.

Multiplexing data to be transmitted from the RMLP to the ASSW (RMUX function)

Demultiplexing data to be transmitted from the ASSW to the SMLP (SDMX function)

The HMX11A also has the function of multiplexing and demultiplexing signalling data through the LAP.

FIG. 367 is a block diagram showing the HMX11A. FIGS. 368 through 370 show the monitor items of the HMX10A.

Unlike the demultiplexing function of the HMX10A, that of the HMX11A is realized according to the tag information. Therefore, not only test cells but also data to be transmitted to the SMLP-is extracted by the DMUX LSI shown in FIG. 367.

5.4. VCC Function/Test Cell Multiplexing Function/Scheduling Function (HMX12A)

5.4.1. VCC Function

Figure 372B:
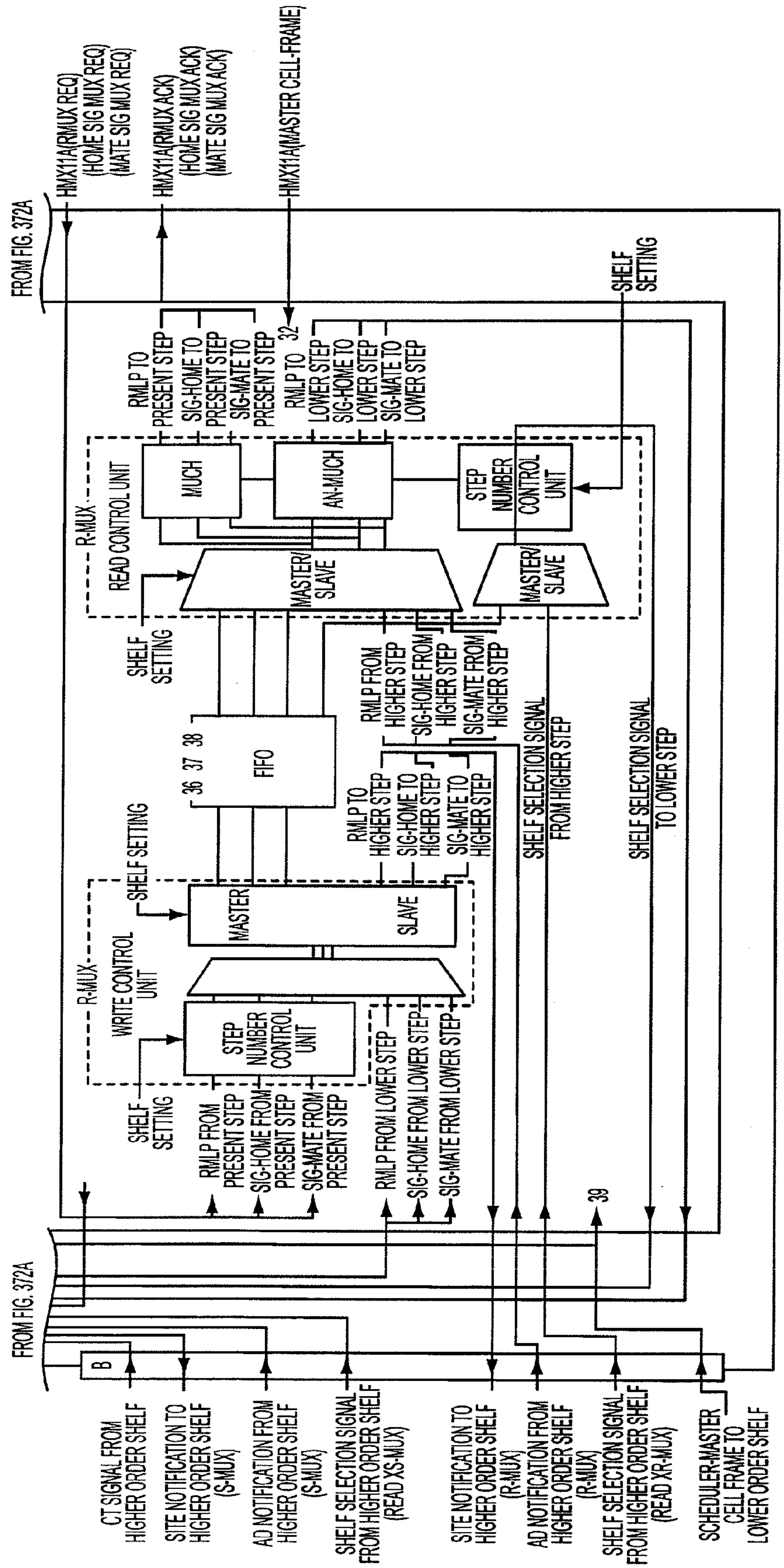

FIG. 371 is a block diagram mainly showing the VCC function of the HMX12A. FIGS. 372A and 372B are block diagrams mainly showing the scheduler function of the HMX12A. FIGS. 373 through 375 show monitor items in the fault process.

The cell data from the SMLP and RMLP, and the header field of a TCG cell are converted. The header field is converted by the VCIP-LSI (VCIP of the SMLP, and VCIP of the RMLP) shown in FIG. 371.

A VCC value is set by writing it from the BSGC to the VCIP-LSI through the HSF05A. The VCIP-LSI reads the information in the header field and converts the header value according to the information written in the RAM.

5.4.2. Test Cell Multiplexing Function

There are two types of SEL-N1-LSIs, that is, one to multiplex a data cell from the SMLP and a TCG cell from the HMX11A, and another to multiplex a TCG cell from the HMX11A. The SEL-N1-LSI multiplexes cells from the SMLP/RMLP as is. However, a TCG cell is multiplexed only after the information in the header field is read and recognized as a TCG cell.

5.4.3. Schedule Function (multiplex-LSI Control)

A multiplex-LSI HMX10A provided in the HMX10A and HMX11A is controlled and multiplexed.

The scheduler function is designed inside the LCA of the HMX12A. There are two LCAs, one for controlling the multiplexing function of the HMX10A and another for controlling the multiplexing function of the LCA.

The function of the LCA (scheduler function) allows a read enable signal to be sent to each MUX-LSI according to a write notification signal from each MUX-LSI.

The HMX12A has four connectors on the front panel two of which are used for inter-system cross-connection between signaling data, the other two of which are used to daisy-chain scheduler function signals.

5.5. LAP Terminating/Starting Clock Distribution (HSF05A)

5.5.1. LAP Terminating/Starting Process

FIG. 376 is a block diagram showing the function of the HSF05A. FIG. 377 shows the monitor items on the fault correcting process of the above described HSF05A.

A signaling cell transferred by the LAP through the BSGC is terminated by the EGCLAD shown in FIG. 376, and the signaling data is processed by the μP. Actually, an MSCN is collected, an MSD is set, an LSI is set and monitored, a VCC copy is performed, a fault monitor is performed, etc. Additionally, the information of a fault inside and outside the MH-COM is notified.

(1) MSCN/MSD

The MSCN is used in each package PKG unit and functions as monitor of abnormal electric volume of CK/CF, parity, OBP, fuse, etc. The MSD applies a pseudo fault to a checkpoint of the MSCN.

(2) Setting/Notifying LSI

The LSI is set through the LAP using the UP. Furthermore, errors are monitored, cells are discarded, etc.

(3) VCC Copying

A VCC copy is performed to copy the VCC information of the presently active system to a next-active system.

(4) Communications with Another System

The SIC notifies another system of the start/end of the VCC copy, fault information, etc.

5.5.2. Distribution of Clock

The HSF05A receives a source clock from the SYNSH and uses 64 KHz in the MH-COM and LP-COM. The MH-COM generates 155.52 MHz and generates various timing signals according to the clock. FIG. 378 shows the clock system of the SBMESH.

6. Protocol Performance Monitor 6.1. Outline

The SBMESH monitors the protocol performance of the L3-PDU of layer 3. The protocol performance monitor operates generally in accordance with the TR-TSV-000774 issue 1 (hereinafter referred to as TR-774 for short) published by Bell Communications Research.

This protocol performance monitor is realized by the HLM01A. The HLM01A also corrects data as described later.

FIG. 379 is a block diagram showing the function of the HLM01A. FIGS. 380 and 381 show the outline of the functions of each block in the HLM01A. FIGS. 382 and 383 show checks performed by the HLM01A. The check names shown in FIGS. 382 and 383 correspond to the names shown in FIG. 379.

The results of the checks above are written to the MSCN register shown in FIG. 379 and provided for the HLP02A. The results of the following items (not described above) are also written to the MSCN register.

initialization in process

LCA configuration in process cross communications cable missing mate system fuse alarm timeout of a watchdog timer of the mate system HLP02A In FIGS. 382 and 383, no checks are made if the conditions defined for each item are not satisfied for the check items below the check name=PCC. Checks are not made unless a cell is valid.

6.2. Layer 2 Protocol Performance Monitor

The SBMESH monitors the protocol performance of each of the following parameters of layer 2.

(1) payload CRC violation (2) payload length error (3) invalid sequence number (4) currently active MID (5) BOMs/SSMs having an invalid MID (6) EOMs having an unauthorized MID If an error notification (to be described later in detail) is received from the SMLP in the HLM01 of the SBMESH, a layer-2 protocol performance monitor is performed on each of the parameters (1) through (6) above through the sum-of-errors algorithm for each input SNI. A threshold for the sum-of-errors algorithm is set for each SNI by the software as a part of the subscriber data.

The TR-774 defines that the above described threshold is variable in the range of 1 through $2^{22}-1$. In the HLM01A of the SBMESH, the threshold is regarded by the software as being contained in $(2^x-1)$ and as parts of subscriber data. An 8-digit value set by the software is a binary representation of the exponent X of $(2^x-1)$.

The count value is compared with the threshold in the sum-of-errors algorithm autonomously by the hardware. If a count value exceeds the threshold, it is provided as a flag for the firmware. The firmware periodically monitors the flag. If it detects an ON state, it notifies the software of the ON state. In response to the notification, the software generates a TCA.

TR-774 defines a current 15-minute counter and 32 previous 15-minute registers as parts of the sum-of-errors algorithm.

Two 15-minute counters are provided to switch phases in the SBMESH. Within 15 minutes after a phase switch instruction, the software picks up a count value from the 15-minute counter corresponding to the previous 15-minute register. That is, the software provides 32 previous 15-minute registers of the TR-774.

The 774 also defines the count of errors for each of the parameters (1) through (6). Practically, as in the sum-of-errors algorithm, it defines for each parameter a current 15-minute counter and 32 previous 15-minute registers.

The SBMESH provides two 15-minute counters as described above for use in a phase switch, and the software provides 32 previous 15-minute registers.

The definition of the number of digits of the counter and the register is in accordance with the number of digits specified as the sum-of errors algorithm.

The TR-774 defines that the payload CRC violation described in (1) above and the HCS violation are counted by the same counter, and the previous 15-minute register is shared by both parameters. In the SBMESH, the payload CRC violation described in (1) above is checked by the SBMESH itself, and the HCS violation is checked by the DT. The SBMESH counts the invalid sequence number described in (3) above and the currently active MID described in (4) above are counted according to an error notification from the RMLP (described later in detail). (Since each of the above described checks is made and cells are discarded when an error is detected in the RMLP, the counting operations are performed. The number of digits of each counter is also in accordance with that requested by the sum-of-errors algorithm).

The above described counting operation is performed for each MH transmitting an errored L2-PDU. In this case, the SBMESH provides two 15-minute counters to switch phases.

6.3. Layer-3 Protocol Performance Monitor

The SBMESH monitors a protocol performance for each of the following parameters in layer 3.

(1) invalid BA size field value (2) invalid HEL field value (3) invalid header extension version element (4) invalid header extension carrier selection element (5) BEtag mismatch (6) non-matching between BA size field and Length field (7) incorrect length (8) MRI timeout (9) invalid DA type

(10) invalid SA type

(11) invalid DA assigned to the original SNI

If an error notification (described later in detail) is received from the SMLP in the HLM01A of the SBMESH, a layer-3 protocol performance monitor is performed on each of the parameters in (1) through (8) above using the sum-of-errors algorithm and Bursty error algorithm for each input SNI.

The threshold of the sum-of-errors algorithm is set for each SNI by the software as parts of the subscriber data as in the case of layer 2. Also as in the case of layer 2, the count value exceeding the threshold is notified as an error notification to the software through the firmware. In layer 3, as in layer 2, the SBMESH provides two 15-minute counters for a phase switch. The software provides 32 previous 15-minute registers of the TR-774.

The contents of the log generated when an error occurs relating to each of the parameters (1) through (8) is as follows.

(a) error detection date (year, month, day, hour, minute, second)

(b) SNI (c) source address (d) destination address (including address type)

(e) special occurrence state

When a log object error occurs, the hardware sets the contents of (b) through (e) in the log register. The firmware reads the contents of the log from the register and notifies the software of the contents. The contents of the is not provided from the hardware to the firmware. When the firmware fetches the contents of the log other than the (a) above, they are assigned the time information managed by the firmware. The contents of the notification for the software do not contain year/month/day information. The information is managed by the software. The SBMESH realizes the log retrieval through the software.

The threshold for the Bursty error algorithm is also transmitted from the software to the SBMESH-A as parts of subscriber data as in the case of layer 2. It is not necessarily set for each SNI, and is accumulated and managed by the firmware.

According to the TR-774, the threshold is variable in the range of 1 through 100. The SBMESH specifies an 8-digit threshold through the software. Ni and Nb are used in the Bursty error algorithm, also transmitted from the software as parts of subscriber data, and set for each SNI.

According to TR-774, Ni and Nb is defined as variable in the range of 1 through ($2^{22}-1$), but this can be processed as a variation of $2^x$ and the SBMESH processes it as if an 8 software-specified digits represent the exponent X of the above value as a binary.

According to the TR-774, Ni and Nb should be set for each SS NE, but they are set to the same value for each SNI as described above.

Refer to the TR-774 for the details of the Bursty error algorithm. That is;

When Ni L3-PDUs are received, an interval counter is incremented.

If the number of errored L3-PDUs received exceeds Nb, a bad interval counter is incremented.

A ratio of the bad interval counter to the interval counter is obtained every 15th minute. If the value exceeds a predetermined threshold, a TCA is generated.

In the above described procedure, the two counters are autonomously incremented by the hardware. The firmware calculates the ratio every 15th minute. If the ratio exceeds the threshold, it then notifies the software of the information, and the software generates a TCA.

According to the TR-774, a current 15-minute counter is provided for each of the bad interval, the interval, and the ratio. Furthermore, 32 previous 15-minute registers are provided for each of the bad interval and the interval. The SBMESH provides two 15-minute counters for each of the bad interval and the interval to use them for a phase switch. As in the sum-of-errors algorithm, the SBMESH provides 32 previous 15-minute registers through the software. No current 15-minute counters exist to count the above described ratio.

The TR-774 defines each of the error counts for the parameters (9) through (11). The configuration of the above described counter and register is the same as that of the sum-of-errors algorithm.

In the SBMESH, the MRI timeout described above in (10) is counted in response to an error notification from the RMLP (described later in detail). In the RMLP, the counting operation is performed because the above described check is made in the RMLP and data is discarded if a related error is detected. The number of digits is in accordance with the requirements of the sum-of-errors algorithm). The counting is performed for each MH. In the SBMESH, two 15-minute counter are provided for use in switching phases.

6.4. Protocol Performance Monitor in Ingress Unit 6.4.1. Process System

FIG. 384 shows based on the TR-774 the check items in the ingress unit, appropriate actions when an NG is detected, and checking procedure. Additionally, SBMESH-related items are included Parameters are grouped and checked in an alphabetical order. For example, if an NG is detected when a parameter belonging to group A is checked, then each of the parameters in group B and the subsequent groups need not be checked (including the actions taken when an NG is detected). If a plurality of parameters exist in a group, the parameters can be checked in any order.

“No” is described later.

The MRI timeout of group A includes the counting and logging when an NG is detected.

Group 0 indicates the specification unique to the SBMESH.

The MID assigned error is an error in the SBMESH internal process. An end user blocking indicates a carrier screening error.

Although the invalid BAsize field and the invalid header extension element length are indicated as being defined by the FR-774, they are not listed above.

Since each of the parameters belonging to groups B through D is checked in the DT unit, it is not a check object in the SBMESH.

Each parameter in item 2 of group L and in items 4 through 6 of group M refers to a network data collection and relates to traffic measurement. Therefore, it does not relate to a protocol performance monitor. (However, a number is assigned as described later).

Each of the parameters in items 2 and 3 of groups J and K is not checked in the SMLP. Therefore, no error notification is issued, but an area is reserved for an error count.

Although the process is performed by the HLM01A as described above, an error notification to be issued in each check in the ingress unit is received from the SMLP as described above.

The HLM01A receives data, cell frames, and enable signals from the SMLP. FIG. 385 is a time chart of each signal. FIG. 386 shows the explanation of each signal.

As shown in FIG. 385, data is received from the SMLP in a 16-bit parallel cell format. In a switch (including the SBMESH), data is processed as 1 cell=54 octets, and 1 cell of input data is 27τ in length at 8M clock.

One cell comprises a portion of 3τ in length corresponding to an ATM header (the format of the 3τ portion is an internal format of the SBMESH and does not completely match a common ATM header format. As shown in the figures, this portion contains a portion (source SNI ID) indicating the source SNI of the cell) and a remaining 24τ portion. The contents of the cell shown in FIG. 385 are examples of a case where the cell is a SIP-BOM.

FIG. 387 shows a method of identifying a cell segment type in an ST identification block shown in FIG. 379. Thus, combining the SST shown in FIG. 385 and the value stored in the IST identifies the segment type ST.

In FIG. 387, the inter-BOM refers to a BOM incremented as a result of a half encapsulation process performed in the SMLP. However, this process is not performed on an erroneous cell. Therefore, no inter-BOM is received. The ISTs of the SIP-BOM and SIP-SSM are 10 and 11 respectively.

Described below is the error determining method in the error analysis block shown in FIG. 379.

FIG. 385 shows values 0 through 26 in parentheses at a 9M clock. As described above, 1 cell equals 27τ, and a cell shows 0 at the first τ of the cell, increments 1 for each of the subsequent τ, and indicates 27 at the 27th τ. These values correspond to the “No” of various check items shown in FIG. 384. That is, as the method of identifying an error type according to an error notification signal (2), an error notification signal indicates L, that is, an error, at the portion corresponding to the number 6 in the parenthesis in FIG. 385.

An invalid sequence number corresponds to “No.6” shown in FIG. 384. That is, the above described example indicates that the cell has the error as a result of various checks in the SMLP. This signal constantly indicates L at the point of the number 26 in the parenthesis regardless of the existence of an error in the cell. This signal is not used to indicate an error but to monitor the stack this signal. 0 is not used for an error notification signal. An error type is determined by the above described method. However, only valid cells are objects of determination. If a plurality of errors exist in a single cell, an error notification is issued for all the errors. Since the check items are arranged in the checking order and the "No" is assigned in this order in FIG. 384, an error correcting process is performed only on an error corresponding to the data for which the error notification signal first indicates L in this block. When a valid inter-BOM (SIP-BOM or SIP-SSM if half encapsulation is not made on an error cell) is received, the SA/DA accumulation RAM shown in FIG. 379 accumulates the SA and DA in the cell. Described below is the reason for the accumulation of the SA and DA.

The object parameters of the protocol performance monitor of layer 3 are 11 items listed at the beginning of 6.3. above. In the 11 items, a log is requested for (1) through (8) when an error is detected. Since the SA and DA are contained in the inter-BOM (having the same contents as the SIP-SOM and SIP-SSM), no accumulation is required when an error occurs in the SIP-BOM or SIP-SSM. However, if a BEtag mismatch error, etc. occurs, the error is detected when the EOM is received. Therefore, the SA and DA in the inter-BOM of the L3-PDU are accumulated.

In the SA and DA accumulation method, the identification of the L3-PDU is performed by combining (corresponding to the RMID) the sending SNI ID and the receiving MID in the cell. Accordingly, the data is stored in the RAM using the (source SNI ID+MID) as an address (key). However, as shown in FIG. 385, the source SNI ID field is 6 bits and the number of SNIs accommodated by each SBMESH is 32. Therefore, only 5 lower bits of the field are used together with the 10-bit input MID field. A total of 15 bits, that is, $2^{15}$ is used for an address of the RAM.

If a cell is an SIP-BOM in the groups shown in FIG. 384, a MID currently active is determined. If it is an EOM, an unauthorized MID is determined and counted separately.

The MRI timeout indicates an error that a timeout occurs without an EOM cell reaching the SMLP. In this case, a pseudo EOM cell is generated in the SMLP and the cell is transmitted together with an error notification indicating the MRI timeout. The sending SNIID and receiving MID in the pseudo EOM cell are the same as those of the corresponding BOM for the reason described below.

If an error of the object item is determined in an error analyzing block, a process as a protocol performance monitor is suspended. If an error requires a log, the contents of the log are stored in the register (ingress LOG-Reg in FIG. 379).

The "test" in FIG. 385 indicates whether or not the cell is an MESH-MH PVC test cell. If the field indicates 1, no process is performed relating to a monitor of an ingress protocol performance.

The "CP" in FIG. 385 indicates that the cell is copied when a GA copy process is performed by the SMLP. If the field indicates 1, no process is performed relating to a monitor of an ingress protocol performance.

Each counter shown in FIG. 379 stores a count value (for each SNI, error type, etc.) in the RAM, reads and counts a necessary count value, and then stores it in the RAM. The RAM comprises a dual port RAM, and is divided into two, one as a current counter for hardware access, and the other as a previous register for firmware access. The assignment of a phase is not fixed to a RAM address, but is switched according to a phase switch instruction from the firmware issued every 15th minute. The above described RAM is provided with chips for an L2/3 Sum of Err. count value, an L2/3 individual Err. count value, and an L3 Bursty Err. count value as shown in FIG. 379.

Each of the RAM and counter control blocks shown in FIG. 379 controls the access from the hardware of the-RAM. The RAM is autonomously cleared by the hardware (for example, when the system is powered).

If an error actually has arisen in a cell, an error correcting process is performed (by incrementing the count value, etc.) during the reception of the next cell because, in the case of, for example, an end user blocking, the error type can be determined almost at the end of the cell. FIG. 388 is a time chart showing the process performed at the occurrence of an error.

As described above, each count value is stored in the RAM. To increment the count value, the count value is read from the RAM, incremented externally, and stored again in the RAM.

In the layer 3 Bursty Err. process, access is made to obtain a worst PDU count, errored PDU count, invalid count, bad interval count. The access is made in series.

The count value is incremented conditionally for the value smaller than the errored PDU count. If the conditions are not satisfied, the count value is not incremented. Regardless of the layer 3 Bursty Err. process, the subsequent counting operations are not performed if the count value has reached the maximum counter value determined by the hardware.

6.4.2. Detailed Process

1. L2/3 Sum of Err. Count

If an L2/3 Sum of Err. error is reported;

(1) The count value is incremented (+1) by reading it from the count value storage RAM. Simultaneously, a threshold is read from the threshold RAM.

(2) The count value incremented as described in (1) above is compared with the threshold. If the result indicates that the count value is larger than the threshold, the Err. flag-Reg. flag is set ON and the result is reported to the firmware.

(3) The incremented count value is stored in the RAM.

Although the count value is represented by 24 bits, the reading and writing operations in the RAM are performed three separate times divisionally 8 bits each. The increment of the count value, the comparison with the threshold, and setting a flag-on are performed for each sending SNI.

If the count value is the maximum value in the case (1) above, it is not incremented as described above in 6.4.1. A parity check is carried out when the threshold is read, a parity is generated when the count value is stored, and the parity check is made when the count value is read.

FIG. 389 is a time chart showing the access timing of the threshold and the count value.

2. L2/3 Individual Error Count

When an error to be individually counted is reported, the following processes are performed.

(1) A count value is read from the count value storage RAM and incremented (+1).

(2) The incremented count value is stored in the RAM.

FIG. 390 is a time chart showing the L2/3 individual error count process.

3. Layer 3 Bursty Err.

When an error relating to Bursty Err. is reported, the following processes are performed.

(1) An Errored-PDU count value is read from the count value storage RAM and incremented (+1).

(2) The incremented Errored-PDU count value is stored in the RAM.

FIG. 390 is a time chart showing the L2/3 individual error count process.

When an SIP-BOM and SSM are received, the following processes are performed.

(1) A PDU count value, Errored-PDU count value, interval count value, and bad interval count value are read from the count value storage RAM. Then, only the PDU count is incremented (+1), and the Ni and Nb are read from the Ni and Nb storage RAM.

(2) The PDU count value incremented in (1) above is compared with Ni. If the result indicates the PDU count value=Ni;

(a) The interval count value read in (1) above is incremented (+1).

(b) The Errored-count value is compared with the Nb. Only when the Errored-PDU count value>Nb, the bad interval count value read in (1) above is incremented.

(c) The PDU count value and Errored-PDU count value are cleared (set to all 0) and stared in the RAM. The interval count value incremented in (a) above is stored in the RAM, and the bad interval count value is stored in the RAM only when it is incremented in (b) above.

Unless the result of (2) above indicates the PDU count value=Ni, only the PDU count value incremented in (1) above is stored in the RAM.

Each of the incrementing and Ni/Nb comparing operations is performed for each sending SNI. A parity bit is checked when the Ni and Nb are read, generated when each count value is stored, and also checked when each count value is read.

FIG. 391 is a time chart showing the Layer 3 Bursty Err. process.

The above described Errored-PDU is counted as one error for a plurality of errors in a single L3-PDU, but an error notification is made from the SMLP each time an error occurs. On the other hand, a "1" is written to the E-PDU flag RAM if a burst error occurs in the RAM accessed using an address represented as a source SNI+MID. When an EOM is received, the RAM is read. Only if "1" is read, the Errored-PDU is incremented.

FIG. 392 shows the method of accessing the E-PDU flag RAM.

6.5. Protocol Performance Monitor in Egress Unit 6.5.1. Process System

FIG. 393 shows the outline of the check items in the egress unit, the actions taken when an NG is detected, and the checking procedure. In FIG. 393, a unique use of the SBMESH is added for the TR-774.

The groups and Nos. are used similarly as shown in FIG. 384. The classification and the position of the groups are in accordance with the TR-774 for E and F. Other items are the same as those shown in FIG. 384.

Each parameter of groups B and G is not checked by the RMLP. Therefore, no error notification is made, but an area is reserved to count errors in the PWCB.

The process is performed by the HLM01A PWCB as described above. However, an error notification of each check made by the egress unit is received from the RMLP as described above.

The HLM01A furthermore receives data, cell frames, and enable frame signals from the PMLP. FIG. 394 is a time chart of each signal. FIG. 395 shows the explanation of each signal (the signals are the same as those received from the SMLP for the protocol performance monitor in the ingress unit).

The processes performed in the egress unit are basically indicated by each signal received from the SMLP in monitoring the protocol performance in the above described ingress unit.

The format of the portion 3τ corresponding to the ATM header is an internal format of the SBMESH, and does not completely match a common ATM header format. As shown in FIG. 394, the cell comprises a field (source MH ID) indicating the source MH of the cell and a field (destination SNI ID) indicating the destination SNI. The cell shown in FIG. 394 is an example of the SIP-BOM.

The error notifying method followed at an MRI timeout is similar to that of the ingress unit. That is, a pseudo EOM cell is generated in the RMLP, and an error notification indicating an MRI timeout is issued together with the cell. The destination SNI ID in the pseudo EOM cell is the same as that of the corresponding BOM.

FIG. 396 shows the method of identifying the segment type of a cell in the ST identification block shown in FIG. 379. Thus, combining the IST with the SST shown in FIG. 394 identifies the segment type of a cell.

Each of the blocks shown in FIG. 379 has the same function and operates the same way as those in the ingress unit.

The "trial" of the 1τ data 15 shown in FIG. 394 shows whether or not the cell is an MESH-MH VPC test cell. If the cell is an SNI-SBMESH PVC test cell or an MESH-MH PVC test cell, none of the processes relating to the egress protocol performance monitor are performed.

6.5.2. Details of Processes

Since the processes are basically the same as those in the ingress unit, only a time chart of the L2/3 individual Err. count process is shown as FIG. 397.

7. Network Data Correction 7.1. General Descriptions

The SBMESH corrects data for the L2-PDU and L3-PDU. The data correction is generally in accordance with the TR-774. The function of the data correction is realized by the HLM01A.

7.2. Network Data Correction Parameter

The SBMESH corrects network data of each of the following parameters for each SNI.

(1) Total originating individually addressed L3-PDUs (2) Total Terminating individually addressed L3-PDUs (3) Total originating L2 PDUs (4) Total terminating L2 PDUs (5) Total originating group addressed L3-PDUs (6) Total terminating group addressed L3-PDUs (7) Discarded L3 PDUs due to access class violations (8) Discarded L3 PDUs in the Ingress Unit due to exceeding a predetermined maximum value for the number of data units (9) Discarded L3 PDUs in the Egress Unit due to exceeding a predetermined maximum value for the number of data units

(10) Discarded L3 PDUs due to SA screening violations

(11) Discarded L3 PDUs due to DA screening violations

(12) Discarded L3 PDUs due to not assigning an SA to a source SNI

(13) Discarded L3 PDUs due to an unavailable destination SNI

The above listed (1) through (6) indicate the numbers of the L2 and L3 PDUs including the number of discarded L3 PDUs. In counting the PDUs in and after (7), the number of L3 PDUs discarded for various reasons is counted.

According to the TR-774, counting the number of L3 PDUs requires the following values.

Total originating (terminating) L3 PDUs

Total originating (terminating) group addressed L3 PDUs

On the other hand, the SBMESH counts each of the following numbers, and the software adds the counted numbers to obtain the total number.

Total originating (terminating) individually addressed L3 PDUs

Total originating (terminating) group addressed L3 PDUs

If an error notification is received from the SMLP or RMLP in the HLM01A of the SBMESH, the network data correction is performed for each of the parameters (1) through (13).

According to the TR-774, an interval is set as 15 minutes and various data for at least the past 2 intervals is stored.

The SBMESH provides two 15-minute counters for switching phases as in the configuration of the protocol performance monitor. Within 15 minutes after a phase switch instruction, the software receives and stores a count value from the 15-minute counter corresponding to the previous 15-minute register. That is, the software stores various data of at least the past two intervals.

According to the TR-774, each of the above listed parameters (7) through (13) requires a log at the occurrence of an error.

The log should contain the following data.

(a) Source address (b) Destination address (including address type)

(c) SNI (d) State code (e) Date of error detection (represented by year, month, day, hour, minute, and second)

(f) Address screening

When a log object error occurs, the hardware sets the above listed (a) through (d) in the log register. The firmware reads the contents of the log from the register, and notifies the software of the read contents. The contents of (e) are not transferred from the hardware to the firmware. The contents are assigned the time information managed by the firmware when the firmware fetches the contents of the logs other than (e) and (f). However, the notification to the software does not contain the data of year, month and day, which is managed by the software. (f) is provided by the software, and each function of managing the log contents is realized by the software.

7.3. Network Data Correction in Ingress Unit 7.3.1. Process System

In the parameters (1) through (13) to be corrected in the above described network data correction, the ingress unit processes 7 items, that is, (1), (3), (5), (7), (8), (11), and (12). In the 7 items, four items in and after (7) relate to errors and are processed as in the protocol performance monitor process of the ingress unit described in chapter 6.4.

The numbers of the L2 and L3 PDUs of (1), (3), and (5) are counted regardless of errors in the L2-PDU or the L3-PDU.

This process is performed by the HLM01A as described above, but an error notification of various checks of the ingress unit is received from the SMLP. The error notification is also used in the protocol performance monitor, and the process system is the same as the protocol performance monitor process.

Since the SBMESH receives data in the cell format, the number of L2-PDUs can be easily counted for each SNI, and the ST unit of the L2-PDU is analyzed. The number of L3-PDU is incremented in the case of an SIP-SSM or SIP-BOM. Simultaneously, the SA is analyzed to determine whether or not it is an individually addressed L3 PDU. As described above, half-encapsulated cells are received from the SMLP. However, the cells increased in number through the half-encapsulation are not counted.

As in the protocol performance monitor, none of the processes relating to the ingress network data correction are performed if the cell is an MESH-MH PVC test cell and a cell copied in the GA copy process.

The SA/DA accumulation RAM and each of the blocks for timing generation, SNI identification, SA/DA identification, error analysis, and RAM and counter are shared with the protocol performance monitor process. Each counter is the same as that in the protocol performance monitor process.

FIG. 398 is a time-chart showing the process of correcting network data in the ingress unit.

7.3.2. Details of Processes

If valid cells are received as other than inter-BOMs and incremented through the half encapsulation, the following processes are performed.

(1) (1) An L2 PDU count value is read from the count value storage RAM and incremented (+1).

(2) The incremented L2 PDU count value is stored in the RAM.

If an SIP-BOM or an SIP-SSM is received, the following processes are performed.

(1) An L3 PDU count value is read from the count value storage RAM and incremented (+1). At this time, the SA unit is analyzed to determine whether it is an individually addressed L3 PDU or a group address L3 PDU. The values are individually incremented.

(2) The incremented L3 PDU count value is stored in the RAM.

The following processes are performed if errors to be individually counted in the network data correction are reported.

(1) The incremented error count value is stored in the RAM.

Although the count value is represented by 32 bits, a reading and a writing operations to the RAM are separately performed each using 16 bits. The value is incremented for each source SNI, but is not incremented if the count value is a maximum value.

As described above, the L2 and L3 PDU are counted regardless of the existence of an error. The above described error count is not performed only when an error occurs. A parity bit is generated when a count value is stored and it is checked when it is read. FIG. 399 is a time chart showing the data correction process.

7.4. Network Data Correction 7.4.1. Process System

In the parameters (1) through (13) to be corrected in the above described network data correction, the egress unit processes 6 items, that is, (2), (4), (6), (9), and (13). In the 13 items, three items in and after (9) relate to errors and are processed as in the protocol performance monitor process of the egress unit described in chapter 6.4.

The numbers of the L2 and L3 PDUs of (2), (4), and (6) are counted regardless of errors in the L2-PDU or the L3-PDU. This process is performed by the HLM01A PWCB as described above, but an error notification of various checks of the egress unit is received from the RMLP.

The error notification is also used in the protocol performance monitor. Other process systems are the same as the protocol performance monitor process. (The protocol performance monitor process is performed for each source MH. However, the network data correction process is performed for each destination SNI. Another difference is that an error type is accumulated for a log notification.) Error types are accumulated on the following grounds. That is, a log is required for (9), (10), and (13) when an error is detected. The requirement includes an error type of the error. The error type is determined by the "Inter-BOM". Since valid SA and DA are determined when the SIP-BOM is received, the error type should be accumulated.

Since the SBMESH receives data in the cell format, the number of L2-PDUs can be easily counted for each SNI, and the ST unit of the L2-PDU is analyzed. The number of L3-PDU is incremented in the case of an SIP-SSM or SIP-BOM. (Simultaneously, the SA-is analyzed to determine whether it is an individually addressed L3 PDU or a group address L3 PDU. As described above, half-encapsulated cells are received from the RMLP. However, the cells increased in number through the half-encapsulation are not counted.)

As in the protocol performance monitor, none of the processes relating to the egress network data correction are performed if the cell is an SNI-SBMESH PVC test cell or an MESH-MH PVC test cell.

7.4.2. Explanation of Process

The processes are the same as the network data correction process in the ingress unit except that cells are counted for each destination SNI.

8. Billing Function 8.1. General Descriptions

According to the TR-775 (issued by Bell Communications Research) defines the billing process, the SBMESH performs the billing process only relating to a normally transmitted L3-PDU. This billing function is realized by the HLM00A.

8.2. Billing Process

FIG. 400 is a block diagram showing the billing unit. This billing unit performs a billing process in response to a notification from the RMLP.

A signal received from the RLML to the billing unit for use in the billing process is cell-formatted, but the cell received for use in the billing process does not contain an error. That is, when the RMLP detects an error, the related cell and the cells associated with the erroneous cell are not transmitted to the billing unit. For example, if an erroneous cell is the BOM of the L3-PDU, the COM and EOM in and after the L3-PDU are not transmitted to the billing unit. Therefore, the billing unit performs its billing process assuming that the received cells are all normal cells having no errors. Additionally, all cells received at the billing unit are half-encapsulated and their BOM contains the information about the SA and carrier in the original L3-PDU, while their EOM contains the information about the data length in the original L3-PDU.

As described in the general descriptions above, the billing process is performed on a normal L3-PDU (or cells forming parts of the normal L3-PDU). The TR-775 requires the following items.

(1) destination address DA
(2) source address SA
(3) SNI address
(4) state code
(5) segment count (number of L2-PDUs)
(6) packet count (number of L3-PDUs)

The billing process is performed at the destination equipment. The SNI address can be uniquely obtained by analyzing the destination address DA. Accordingly, the SNI address is obtained by analyzing the DA through the software. The state code indicates whether the billing data refers to a normal L3-PDU or a partially transmitted L3-PDU. Since the billing process is performed only on normal L3-PDUs as described above, the state code is simply defined.

Each parameter is accumulated in the L2-PDU, L3-PDU, SA, and carrier accumulation RAM shown in FIG. 400. Then the firmware fetches various data from the above listed items and transmits them to the software. The summary of the billing process is described below by referring to the cell format shown in FIG. 401.

If a half-encapsulated BOM is received by the billing unit, the 64-bit source address SA and the 50-bit carrier information are stored in the SA and carrier accumulation RAM (the I/O is separately processed in FIG. 401, but actually the I/O is processed collectively).

The 50-bit carrier information comprises a 16-bit ICI carrier ID, a 16-bit incoming network ID, a 16-bit incoming ICI TPS ID, and a 2-bit IIT.

The address in the above described accumulation RAM for storing data is represented as a 5-bit destination SNI ID and a 5-bit MIE in the BOM.

In the cell-formatted data from the RMLP, the destination SNI ID is an 8-bit-field. However, only the lower order 5 bits are used if the maximum number of the SNI accommodated by each SBMESH is set to 32.

If a non-half-encapsulated BOM is received by the billing unit, a 9-bit RDA compressed from the 64-bit DA in the BOM and a D bit are stored in the SA, carrier and RDA accumulation RAM.

The reason for compressing the DA into 9 bits and the D bit are explained later. A storage address is similarly determined as described above using the destination SNI ID and MID in the cell as keys.

Thus, a RAM of the capacity of $2^{10}$(=1k)×128 bits is required to stored the above listed information. Physically, a 64k×16 bits RAM is enough to store the information. However, since 32 bits are operated in the hardware when the RAM is accessed, two 64k×16 bits RAM are required. FIG. 402 shows a model of data stored in the SA, carrier, and RDA accumulation RAM.

The destination address DA is compressed into 9 bits only when the number of individual addresses (IA) and group addresses (GA) for each SNI is limited to 8 each. That is, if there are 32 SNIs, a total of 512 addresses are managed, thereby representing each address by 9 bits.

Concerning the GA, the same DA can be defined for a plurality of SNIs. That is, a normal CAM may cause plural matchings. Therefore, a CAM is divided into blocks such that a single block has 8IA+8GA=16 matching patterns for corresponding SNIs. The SNI ID specifies in which block a specific matching is made. The matching pattern in a CAM is set by the firmware when a subscriber data is received. The interface with the firmware is realized through a command memory and a response memory.

FIG. 403 shows the image of the DA compression CAM. The DA compression CAM is used when a 64-bit destination address DA is received and a 9-bit RDA is generated as shown in FIG. 400. The firmware stores the correspondence among the RDA, SNI, ID, and DA. If none of the above described matching patterns match the received cell, a D bit is provided to indicate the presence/absence of matching for a compressed DA and stored in the DA, carrier, and RDA accumulation RAM. If the D bit indicates 1 (matching), the billing process is performed. If it indicates 0 (non-matching), the billing process is not performed.

The billing unit does not operate until a half-encapsulated EOM is received after the RDA is accumulated. Although the number of the L2-PDUs should be counted, it is not counted when the BOM is received (the SA, etc. is accumulated). The count of the L2-PDUs is described later.

The operation performed when the EOM is received is described by referring to FIG. 404.

First, the number of L2-PDUs is calculated from the data length information "length" of the L3-PDU in the EOM. The "length" uniquely matches the number of L2-PDUs. Therefore, when the billing unit receives an EOM, the length stored in the EOM is output as the length address as shown in FIG.

400. In FIG. 400, the 16-bit length is assigned as a ROM address. If the maximum value of the length is given, an appropriate number of bits can be assigned based on the maximum value. The length address is assigned a parity for use in a normality check so that a check is made when data is read from the ROM.

Concurrently read are the SA, carrier, and RDA preliminarily (for example, when a BOM is received corresponding to the EOM, etc.) stored in the SA, carrier, and RDA accumulation RAM using the destination SNI ID and MID of the EOM as addresses.

First, the 64-bit source address SA is compressed by the SA compression CAM shown in FIG. 400. A total of 256 matching patterns are managed and the compressed SA (RSA) is represented by 8 bits.

When data is input to the SA and carrier compression CAM, the data should be cell-formatted. Cells are formatted by the CLFM shown in FIG. 400. In the SA and carrier compression CAM, a total of 58 bits comprising the 8-bit RSA and 50-bit carrier are further compressed. In this example, 256 matching patterns are managed and the compressed SA and carrier (RSAC) are represented by 8 bits. The SA compression CAM, SA, and carrier compression CAM perform hardware autonomous operations.

Practically, it is checked whether or not the input SA and carrier pattern match the internally stored matching pattern. If a matching result is output, the register number is output as an RSA and an RSAC. If a non-matching result is output, the input SA and carrier pattern are entered in an available register, and the register number is output as an RSA and an RSAC. No interface is made with the firmware (The interface is provided for maintenance).

Using a total of 17 bits comprising the thus obtained 8-bit RSAC and 9-bit RDA as an address, the L2-PDU, L3-PDU, SA, and carrier accumulation RAM shown in FIG. 400 are. accessed (the I/O is separately processed in FIG. 401, but actually the I/O3 is processed collectively).

Using the address, the number of the L2-PDUs is read, and the number is added to the L2-PDU forming the L3-PDU corresponding to the EOM. Then, the sum is stored again in the L2-PDU, L3-PDU, SA, and carrier accumulation RAM. Although not yet shown in the figures, the number of the L3-PDUs is read, incremented, and then stored again in the L2-PDU, L3-PDU, SA, and carrier accumulation RAM. Simultaneously, the 64-bit SA and 50-bit carrier are stored. The firmware accesses the L2-PDU, L3-PDU, SA, and carrier accumulation RAM to collect the billing information. Practically, there are two RAM to be switched by the firmware at predetermined time intervals (for example, every minute). In one phase the hardware accesses them, and in another phase the firmware fetches various data.

The bit width representing the numbers of the L2-PDUs and the L3-PDUs in the RAM is calculated according to the number of cells received in a predetermined time (for example, a minute).

Since half-encapsulated cells are received in the billing unit, an SSM is counted as 2. 11 M cells of 2.7 μs are transmitted, thereby amounting to 24 bits as a bit width. The bit width for the number of the L3-PDUs requires bits smaller than 24.

Thus, the capacity of the RAM is $2^{17}$(128 k)×128 bits for one phase. Physically, eight 512 k×8 bits RAM is used for one phase. FIG. 405 shows the RAM for accumulating the billing data. The RAM is directly connected to the p-p bus. The other phase of the RAM comprising two phases accesses a bank after adding +10 to each bank number.

FIG. 405 shows a parity bit for use in a normality check made when the hardware accesses the RAM. When the firmware reads data, no process is made. The parity bit is set to 1 when data is cleared.

In fetching billing data, the firmware recognizes the existence of a destination SNI ID and the DA assignment. Therefore, reading significant information only successfully shortens the operation time.

In this hardware configuration, 256 variations of the SA-carrier combination for each combination of the destination SNI ID and the DA. (The 256 variations assigned to the combination of one destination SNI ID and DA cannot be different from those assigned to the combination of another destination SNI ID and DA. That is, the 256 variations of the combination can be commonly assigned to the combination of all SNI IDs and DAs.) The maximum value and the number of variations of actual combination can be determined by reading the entries of matching patterns (autonomously made by the hardware) from the SA and carrier compression CAM shown in FIG. 400.

Thus, the user need not access all RSACs at lower order addresses, thereby reducing the data fetching time.

8.3. Checking Function

Various checking functions in the billing unit is described below by referring to FIG. 406.

FIG. 406 shows the output of checking results as follows.

As a checker in the μP unit, a watch dog timer check, a command response check, and a 16M clock checks are made (refer to the WDTO, CRNG, and CLKa).

A parity check, a clock check, and a CF check are made at the receiving equipment of the RMLP (refer to PCa, CLKb, and CLKc in FIG. 406).

A parity check is made for the compressed data entered through each CAM (refer to PCb, PCd, and PCf in FIG. 406).

A parity check is made for the compressed data output through each CAM (refer to PCc, PCe, and PCg in FIG. 406).

When data is read from each RAM and ROM, a parity check is made (refer to PCi and PCJ).

The L2-PDU, L3-PDU, SA, and carrier accumulation RAM are accessed by the hardware and firmware. The above listed parity checks are effective only when access is gained by the hardware, and no parity check is made while the firmware gains access to the L2-PDU, L3-PDU, SA, or carrier accumulation RAM.

In the RAM comprising two phases, the firmware performs a phase switching control and the hardware fetches data from the phase not accessing data. Since each CAM is provided with interface with the firmware, data is written, read, etc. at the diagnostics. In the compression normality check and the PDU number adding process using "Add" in each CAM, the above listed checks are not made, but a test cell is issued from the test cell generating unit at the diagnostics for detailed checks.

9. LPCOM Unit (INF Interface Unit)

9.1. General Descriptions

The LP-COM unit has the following functions.

(1) interfacing with the INF and controlling the SMLP and RMLP (2) performing an billing process (3) performance monitor and data correction (traffic monitor)

Physically, the following 3 PWCBs are contained.

(a) HLP02A (b) HLM00A (c) HLM01A

The above listed functions (1) through (3) correspond to the PWCB of (a) through (c).

The billing processes are described in chapter 8, the performance monitor is described in chapter 6, and the data correction is described in chapter 7. Described below is the interfacing function, and the controlling function of the SMLP and RMLP, that is, the HLP02A.

9.2. Outline of Functions

FIG. 407 is a block diagram showing the HLP02A. FIGS. 408 and 409 shows the functions of each block of the HLP02A.

The detailed explanation of the functions of the HLP02A is illustrated in FIGS. 408 and 409. The important functions are interfacing with the INF, setting and managing in the LP and each table, and error monitoring and state controlling in the LP and LP-COM.

9.3. INF Interface Control Procedure 9.3.1. INF Interface Control

Described below is the control procedure of the interface using the INF between the SBMESH (MNG-Firm) and the BCPR.

a. INF Command Activation (1) DMA settings are made in the CPU (microprocessor).

(2) When the BCPR activates a command in an INF order, it specifies the MM address as being shifted 2 bits rightwards (0, 4, and 8 are shifted to 0, 1, and 2). Therefore, when the INF is received, the SBMESH performs the following operations.

1. Upon recognition of the command activation, the MM address and the number of commands are received from port A of the SBIF LSI.
2. The higher, middle, and lower bits of the MM address is inverted and set in port B of the SBIF LSI
3. The transfer length (number of commands×4 words) is set in port F of the SBIF LSI.
4. A DMA read start is set in port C of the SBIF LSI.

b. Notification of INF Status

An MM address specified in a status notification is obtained by a 2-bit rightward shift (that is, 0, 4, and 8 are shifted to 0, 1, and 2 respectively) as specified in the reception-buffer notification.

The message length is indicated as MSB for the left and LSB for the right in the BCPR memory.

The SBMESH performs the following operations.

(1) The higher, middle, and lower bits of the MM address is inverted and set in port B of the SBIF LSI (2) The transfer length (number of commands×4 words) is set in port F of the SBIF LSI.

(3) A DMA read start is set in port C of the SBIF LSI.

The MM address and message length specified in the command and status are as follows.

(1) An MM address specified in a command is obtained by a 2-bit rightward shift.

(2) The message length is indicated as MSB for the left and LSB for the right in the BCPR memory.

In the status notification, the MM address is specified in the reception buffer notification.

The status queue address and the reception buffer address are as follows.

(1) The BCPR preliminarily notifies the SBMESH of the status queue and the MM address of the reception buffer.

(2) The MM address is specified as being shifted 2 bits rightwards.

(3) A byte length is specified as the message length.

9.3.2. IPF Interface Interruption Control

Described below is the control of the interruption in controlling the INF interface in the SBMESH.

a. Command Activation

A command is activated by an external interruption INTO. The interruption INTO is reset by a 3-word read of port A.

b. Transmission of Status

A billing status is transmitted after being generated every minute by the ACC-firm. A log status (when a log object area is generated) is transmitted after being generated by the MSR-firm.

c. DMA Control

The DMA is controlled by the DMA controller in the CPU. The available DMA channel is 0. The DMA is terminated by either an interruption or a look-in. An interruption is controlled by an INT bit of the DMA control register in the CPU.

Since the DMA transfer speed of the INF is 4 Mbytes/sec, a 4-byte read of the-DMA (tail pointer, look-in, etc.) terminates in 1 μs if the CPU clock is operated by 8 Mhz. Accordingly, the DMA is not terminated by an interruption but by a look-in.

9.4. SMLP/RMLP Control

The control by the SMLP/RMLP is performed as follows.

The following state control information is provided by the HLP02A for the SMLP/RMLP.

ACT/SBY (active/standby) of home system

Shelf No. (0-3) of home shelf

Reset at initialization

Fault reset of each checker

Settings of each MSD table

Resetting of each MSD table

Hardware inhibit state signal (masking the operation of a hardware.

HLP02A collects the MSCAN information from each package of the SMLP/RMLP and monitors the states.

10. Various interfaces 10.1. General Descriptions

Described in this chapter is the logical interface among the blocks of the SBMESH (including the interface between the SBMESH and the ATM switch ASSW).

10.2. ASSW→SDMUX (HMX11A)

FIG. 410 shows the format-of a cell (header field) to be input from the ASSW to the SDMUX (refer to FIG. 209 for the route).

The following three types of cells can be input from the ASSW to the SDMUX.

1. Test cell from the TCG
2. Signaling cell from the BSGC
3. Normal user cell

For any of the above listed cells, the TAGA and TAGB specify a 622M highway to which a corresponding SBMH is connected. The TAGC also specifies the SBMESH in the SBMH (for example, 0, 1, 2, and 3 in the order from the nearest to the ASSW). Thus, the contents of the tag field are provided by the same method for any type of the cells. Other data are individually provided for each type as follows.

1. Test cell from the TCG
   0: 1 (0 bit)
   UL: 0
   COM: 0
   SIG: 0
   VPI: 000(H)
   VCI: 03FA(H) or 03FB(H)
2. Signaling cell from the BSGC
   0: 0
   UL: 0
   COM: 1
   SIG: 1
   VPI: 000(H)
   VCI: 03FC(H) or 03FD(H)
3. Normal user cell
   0: 0
   UL: 0
   COM: 0
   SIG: 0
   VPI: 03F(H)
   VCI: 03xy(H) (where xy indicates an SNI number.

For example, if the SNI number is 0, xy=00. If the SNI number is 31, xy=1F(H))

10.3. SDMUX (HMH11A)→ SMLP (a) (HMH03A)

FIG. 411 shows the format of a cell to be input from the SDMUX to the SMLP(a). FIG. 411 specifically shows the portion referred to by the SMLP(a) (refer to FIG. 209 for the route).

The following two types of cells are input from the SDMUX to the SMLP(a).

1. test cell from the TCG
2. normal user cell

A signaling cell from the BSGC is not input to the SMLP (a).

If the 6th bit (O bit) in the first byte is set to 1, that is, if it is a test cell from the TCG, then the test cell is discarded in the SMLP(a) and is not an object of the process. If the bit is set to 0, that is, if it is a normal user cell, then the cell is not an object of the process in the SMLP(a). The VPI/VCI of the normal user cell are as follows.

VPI: 03F(H)

VCI: 03xy(H) (where xy indicates an SNI number as described in 10.2 above).

Thus, the VPI/VCI of a normal user cell is input as is to the SMLP(a) without being rewritten for the state input from the ASSW to the SDMUX. Therefore, the source SNI of the cell can be recognized by the VCI in the SMLP(a). The ST, SN, and MID are input as is, that is, as being input from a source subscriber (received by the SDMUX from the ASSW).

In the SMLP(a), processes are performed similarly on normal user cells and SNI-SBMESH PVC test cells. 10.4. LP-COM (HLP02A)→SMLP(a) (HMH03A)

FIG. 412 shows the format of the cell input from the LP-COM to the SMLP(a). FIG. 412 specifically shows the portion referred to by the SMLP(a) (refer to FIG. 209 for the route).

Cells input from the LP-COM to the SMLP(a) are test cells and classified into the following two types.

1. MESH-MH PVC test
2. diagnostics

The MESH-MH PVC test is conducted when data is mastered, while the diagnostics is performed in an OUS (out of services) state.

1. in the MESH-MH PVC test
   VPI: 03F(H)
   VCI: 03FF(H)
2. in the diagnostics
   VPI: 03F(H)
   VCI: 03xy(H) (where xy indicates an SNI number as described in 10.2. above).

The 6th bit in the first byte is set to 0.

In the case of 1 above, the VCI is set to a specific value not used for a normal user cell and identified in the SMLP(a). The value of the specific VCI is, for example, 03FF(H). That is, the value is set to 0000 0011 1111 1111 (B). The underlined 1 indicates that the present cell is the test cell.

In the case of 2 above, the VPI/VCI is set to represent the diagnostic cell as if it were a normal user cell from any SNI.

In 1 and 2 above, the ST, SN, and MID are appropriately assigned. However, the MID at the MESH-MH PVC test is set to 10 0000 0000 (the same value is set for the SSM).

10.5. SMLP(a) (HMH03A)→SMLP(b) (HMH04A)

FIG. 413 shows the format of the cell input from the SMLP (a) (HMH03A) to the SMLP(b) (HMH04A) (refer to FIG. 225 for the route).

IN the SMLP(a), the following processes are performed on the header field.

The ST, SN, and MID remain in the same state without rewriting the state input from the SDMUX or the LP-COM to the SMLP(a).

The SST and input MID are copies of the ST and MID respectively. The RVPI represents the 8 lower bits of the 12-bit VPI input from the SDMUX or the LP-COM to the SMLP(a). The RVCI represents the 8 lower bits of the 16-bit VCI input to the SMLP(a). The SNI-ID(1) represents the 4 higher bits of the RVCI and the SNI-ID(2) represents the 4 lower bits of the RVCI.

In the SMLP(a), a DA check is made for each cell. It is determined whether or not the cell is to be routed to its own MESH (whether or not the DA of the cell should be assigned to the SNI of a related MESH). If the cell should be routed to its own MESH, the X in the figure is 1 If the cell should not be routed to its own MESH, the X is 0. The process is performed in the SMLP(c), but the own-MESH routing process is not performed in the SMLP(d) (HMH05A).

If the cell is input from the LP-COM in the MESH-MH PVC test as described above, then each MSB of the RVCI, and SNI-ID(1) in the figure indicates 1. Similarly, the MSB of the MID also indicates 1. A normal user cell (including an SNI-MESH-MH PVC test cell) is not specifically recognized as a cell from the LP-COM at the diagnostics (as if it were a cell from the SNI).

10.6. SMLP(b) (HMH04A)→SMLP(c) (HMH05A)

FIG. 414 shows the format of a cell input from the SMLP (b) (HMH04A) to the SMLP(c) (HMH05A) (refer to FIG. 225 for the route).

The difference from the 10.5. above is RMID. That is, the MSLP(b) generates an RMID (unique in its own SMLP) using the RVCI (indicating a source SNI number in this case) from the SMLP(a) and the MID (unique in the SNI).

Although an RMID field is represented by 10 bits, 9 lower bits are actually valid. (the RMID occupies up to 0-511(D)) If a cell is input from the LP-COM in the MESH-MH PVC test, no RMID is acquired.

As described above, if a cell is input from the LP-COM in the MESH-MH PVC test, each MSB of the RVCI and SNI-ID(1) indicates 1 (recognized by the SMLP(c)). Since no RMID is acquired in this case, the LPCOM assigns to the MID a value 512(H) other than the RMID 0 through 511(H).

10.7. SMLP(b) (HMH04A)→SMLP (HMH05A): MRI Timeout Dummy Cell

FIG. 415 shows the format of a timeout dummy cell input from the SMLP(b) (HMH04A) to the SMLP (HMH05A).

An IRI timeout check is made in the SMLP(b). If an NG is detected in the check, a dummy cell is transmitted to, for example, inform of the NG.

In FIG. 415, a blank indicates "don't care". An area preceded by the header field also indicates "don't care".

The ST and SST indicate EOMs. Other input MID, SNI-ID(1), (2), X, and RMID are assigned the value for the original EOM.

10.8. SMLP(c) (HMH05A)→SMLP(d) (HMH06A)

FIG. 416 shows the format of a cell input from the SMLP (c) (HMH05A) to the SMLP(d) (HMH06A) (refer to FIG. 225 for the route).

There are three differences from 10.6. above in the BC, RVCI', and IST.

The SMLP(c) encapsulates a cell (error cells are not objects of the process).

1 cell is added to the header field of the SIP-L3 PDU. Therefore, the IST of the added cell (I-BOM) indicates a BOM, and the original BOM (S-BOM) becomes a COM. The IST of the original SSM (S-SSM) becomes an EOM.

The SST is not rewritten, but holds the ST as the SIP-L2 PDU. (The SST of the I-BOM is a BOM).

The SMLP(c) also performs a routing process and the result is provided for the BC and RVCI'. (The routing process is also performed on error cells).

"BC" is short for broadcast, and specifies the existence of a copy of a cell in the SMLP(d) and a copy object MH. Refer to the following data for details.

- BC=11(B): The cells are copied to all MH (all SBMH+all GWMH).
- BC=01(B) The cells are copied to all SBMH.
- BC=10(B) The cells are copied to all GWMH.
- BC=00(B) No copies are required (if a destination MH can be specified.)

The RVCI' reflects the routing process result, etc. as follows.

- If a destination MH is specified as a result of the routing process, a destination MH·ID is entered (The SBMH is 00-IF, and the GWMH is 40-5F (if no copies are required)).
- If a destination MH cannot be specified as a result of the routing process, 00 is entered (if no copies are required).
- "FF" is entered for an SNI-SBMESH PVC test cell (in this case, if BC=00 and the cell is an actual cell, the encapsulation process is performed on the present cell. The SMLP(c) recognizes that the DA of the present test PDU refers to a test DA, and sets the RVCI' as FF.)

Thus, if the cell is input from the LP-COM of the MESH-MH PVC test, the MSB of the SNI-ID(1) indicates 1. However, this may be ignored in the SMLP(c), but processed as a normal user cell in the encapsulation process and routing process.

10.9. SMLP(c) (HMH05A)→SMLP(d) (HMH06A): I-BOM

FIG. 417 shows the format of a cell of an I-BOM input from the SMLP(c) (HMH05A) to the SMLP(d) (HMH06A). An I-BOM is generated as a result of the encapsulation process in the SMLP(c).

The contents of bytes 00 through 07 are the same as those described in 10.8. above. The contents of bytes 08 through 43 and bytes 52 and 53 are the same as the original S-BOM and S-SSM to generate the I-BOM. Therefore, bytes 44 through 52 are rewritten as follows.

IIR=01(H)
INID=0000(H)
IITPS=0000(H)

These value indicate that the cells are issued from the SNI.

RV=all 0

The value is fixed.

The ES is 1 when the element type in the header extension of the SIP-L3 PDU is 1 (indicating a carrier selection). Otherwise, it is 0.

The carrier in FIG. 417 contains a carrier in the header extension of the SIP-L3 PDU when the carrier is selected. Otherwise, it contains a pre-selected carrier. If an NG is detected in the carrier screening process, 0000(H) is stored in this area.

If an error cell is detected, the above described process is not performed (no encapsulation process is performed).

10.10. SMLP(d)(HMH06A)→SMUX(HMX12A)

FIG. 418 shows the format of the cell input from the SMLP (d)(HMH06A) to the SMUX(HMX12A) (refer to SMLP→SMUX in FIG. 209 for the route).

In most cases, the contents received by the SMLP(d) from the SMLP(c) are passed. (Refer to the explanation in 10.8. for the SST, input MID, RVPI, and IST).

The areas of the SNI-ID(1) and (2), X, and BC are assigned in specific patterns as shown in FIG. 418.

The RVCI" is a destination MH ID. (A cell requiring a copy when the SMLP(d) is input (RVCI') is 00(H). After the cell is copied in the SMLP(d), a destination MH ID is assigned to each cell). The RVCI" of the SNI-SBMESH PVC test cell is FF(H). (A cell received by the SMLP(d) from the WMLP(c) is passed.)

An output MID is uniquely assigned for each destination MH ID, but is not assigned to an error cell. Although 10 bits are reserved for an output MID field; 256 variations are actually supported per source MESH. At a destination MH, each MID area is separated from other areas in up to 4 source MESHes forming each source MH so that each MESH can be clearly identified as follows.

- source MESH 0 (source MESH connected to the ASSW): available MID 000-FF(H)
- source MESH 1 (source MESH connected nearest to the ASSW after 0): available MID 100-1FF(H)
- source MESH 2 (source MESH connected nearest to the ASSW after 1): available MID 200-2FF(H)
- source MESH 3 (source MESH connected nearest to the ASSW after 2): available MID 300-3FF(H)

The SN of the I-BOM generated in the encapsulation process in the SMLP(c) is a copy of the SN of the original S-BOM or of the S-SSM.

The MESH-MH PVC test cell may be ignored in the SMLP (d) and processed as if it were a normal user cell.

0000+RVPI shown in FIG. 418 corresponds to the VPI. Since the RVPI represents 8 lower bits of the 12-bit VPI received by the MSLP(a) from the SDMUX or the LP-COM, the VPI of the cell transferred from the SMLP(d) to the SMUX is 03F(H).

0000+0011+RVCI" shown in FIG. 418 corresponds to the VCI. RVCI" indicates a destination MH ID as described above, and the destination MH ID is 00-1F for the SBMH and 40-5F for the GWMH as described in 10.8. above. As a result, the VCI of the cell to be transferred from the SMLP(d) to the SMUX is represented as follows.

VCI: 03xy(H) where xy indicates a destination MH ID. (xy=00, . . . when the SBMH indicates 0; xy=1F, . . . when the SBMH indicates 31; xy=40, . . . when the GWMH indicates 0; and xy=5F when the GWMH indicates 31.)

An SNI-SBMESH PVC test cell is discarded in the SMUX and not output to the ASSW.

10.11 SMLP(d)(HMH06A)→LP-COM(HLP02A, HLM01A)

FIG. 419 shows the format of the cell input from the SMLP (d)(HMH06A) to the LP-COM(HLP02A, HLM01A).

In most cases, the contents received by the SMLP(d) from the SMLP(c) are passed. Refer to the explanation in 10.10. for the SST, input MID, RVPI, RVCI", SN, and output MID.

The difference from the contents in 10.10. above is as follows.

CP indicates 0 for original data and 1 for copied data.

The HMH06A controls data including erroneous data. The HLM01A counts only original cells for L3, L2, error, and GA.

The LHP02A requires only an SNI-SBMESH PVC test, but transmits normal user cells. As described above, the RVCI" of a user cell indicates a destination MH ID (00-1F and 40-5F) and can be distinguished from the RVCI" of a test cell indicating FF.

The HLM01A counts errors for the protocol performance monitor and also counts the PDU for the network NW data correction. Data are counted for each source SNI according to the source SNI number obtained from the SNI-ID as described above.

An error log requires not only a source SNI number but also an ID of a cell from the source SNI. Accordingly, an input MID is analyzed using the MID of the PDU transmitted from the source SNI.

The RVCI" of an SNI-SBMESH PVC test cell indicates FF as described above. The MSB of the SNI-ID(1) in the MESH-MH PVC test cell is 1.

10.12 SMUX(HMX12A)→ASSW

FIG. 420 shows the format of a cell output from the SMUX to the ASSW (refer to FIG. 209 for the route).

The following two types of cells are output from the SMUX to the ASSW.

1. test cell to the TCG
2. normal user cell

A normal user cell is input from the SMLP(d) to the SMUX and assigned additional data or converted in the VCC of the SMUX so as to be represented in the format shown in FIG. 420. The SBMESH is independent of the value of each parameter, and the value is not defined here. A MESH-MH PVC test cell is processed similarly to a normal user cell in the above described points.

A test cell to the TCG is input from the RDMUX to the SMUX and assigned additional data or converted in the VCC of the SMUX so as to be represented in the format shown in FIG. 420.

10.13 ASSW RDMUX(HMX10A)

FIG. 421 shows the format of a cell output from the ASSW to the RDMUX (refer to FIG. 209 for the route).

The following two types of cells are output from the ASSW to the RDMUX.

1. test cell to the TCG
2. normal user cell

Either of the above listed two types of cells specifies a 622M highway to which the SBMH is connected at the TAGA and TAGB. The TAGC depends on each type and requires other parameters as follows.

1. test cell from the TCG
   0: 1 (0 bit)
   UL: 0
   COM: 0
   SIG: 0
   VPI: 000(H)
   VCI: 03FA(H) or 03FB(H)
   TAGC: depending on the corresponding SEMESH (0, 1, 2, and 3 in the order from the nearest to the ASSW.
2. normal user cell
   0: 0
   UL: 0
   COM: 0
   SIG: 0
   VPI: 03F(H)
   VCI: 03xy(H) where xy indicates a source MH ID (SBMH: 00-1F and GWMF: 40-5F)
   TAGC: all zero A MESH-MH PVC test cell is equivalent to a normal user cell.

10.14 RDMUX(HMX10A)→RMLP(a)(HMH00A)

FIG. 422 shows the format of a cell input from the RDMUX(HMX10A) to the RMLP(a)(HMH00A) (refer to FIG. 209 for the route).

The RDMUX is provided only for the interface with the ASSW and transmits data received from the ASSW to the RMLP(a) without rewriting the data.

A test cell from the TCG is also input to the RMLP(a) and discarded not to be processed. A normal user cell (including a MESH-MH PVC test cell) having 0 in 0 bit is an object of the process of the RMLP(a). The VPI and VCI of the cell are listed as follows.

VPI: 03F(H)

VCI: 03xy(H) where xy indicates a source MH ID (SBMH: 00-1F and GWMF: 40-5F)

A source MH can be specified using the VCI. The ST, SN, and MID are assigned at the MH and entered as is.

10.15 RMLP(a)(HMH00A)→RMLP(b)(HMH01A)

FIG. 423 shows the format of the cell input from the RMLP (a)(HMH00A) to the RMLP(b)(HMH01A) (refer to FIG. 181 for the route).

The RMLP(a) passes the contents received from the RDMUX almost without rewriting them. Only the contents to be rewritten By the RMLP(a) are the IST, DM, and RDA.

The IST is a copy of the ST.

The RMLP(a) refers to the DA of an input PDU and determines whether or not it should be fetched into its own MESH. The determination is made at the DA in the I-BOM (also I-SSM). The determination result is reflected on the DM and RDA as follows.

If the IBOM and ISSM are to be fetched to its own MESH;

DM=1

RDA: for use in its own MESH (DA ID image in its own MESH

If the IBOM and ISSM are not to be fetched to its own MESH;

DM=0

RDA: don't care

The above listed values are for the IBOM and ISSM. The ICOM and IEOM indicate "don't care" for the DM and RDA (regardless of fetching them).

There are two types of MESH-MH PVC test cells, that is, cells provided with a specific test DA and those provided with an allotted DA. The RDA of the IBOM of the former type test cell indicates IFF(H).

10.16 LP-COM(HLP02A)→RMLP(b)(HMH01A)

FIG. 424 shows the format of a cell input from the LP-COM(HLP02A) to RMLP(b)(HMH01A) (refer to FIG. 209 for the route).

There are two types of test cells input from the LP-COM to the RMLP(b).

1. SNI-SBMESH PVC test
2. diagnostics

The SNI-SBMESH PVC test is conducted when data is mastered, while the diagnostics is performed in an OUS (out of services) state.

The VPI and VCI are listed below.

1. in the SNI SBMESH PVC test
   VPI: 03F(H)
   VCI: 03FF(H)
2. in the diagnostics
   VPI: 03F(H)
   VCI: 03xy(H) where xy indicates an MH ID (SBMH: 00-1F and GWMH: 40-5F)

In the case of 1 above, the VCI is set to a specific value and identified in the RMLP(b). That is, the value of the specific VCI is set to 03FF(H)=0000 0011 1111 1111 (B). The underlined 1 indicates that the present cell is the test cell.

In the case of 2 above, the VPI/VCI is set to represent the diagnostic cell as if it were a normal user cell from a source MH.

10.17 RMLP(b)(HMH01A)→RMLP(c)(HMH04A)

FIG. 425 shows the format of the cell input from the RMLP (b)(HMH01A) to the RMLP(c)(HMH04A) (refer to FIG. 282 for the route).

The RMLP(b) performs the following various processes on the header field of a cell as shown in FIG. 282. The RMLP(b) receives IST, DM, and SN and uses them as is.

The PL is the contents of the 4 higher bits of the 6-bit payload length field. The 9 lower bits of the 10-bit RDA are valid and actually used as an RDA'.

A source MH ID is represented by a source MH ID(1) and (2) The 8 lower bits of the VCI described in 10.16 above normally indicates the ID. The 4 higher bits of the 8 bits represent the source MH ID(1), and the 4 lower bits represent the source MH ID(2).

The BRLC field is assigned a BRLC number (exactly an umbilical link number) obtained in the RMLP(b) and is to be reached by the present cell.

Likewise, the RVCI is assigned the destination SNI ID of the present cell The RVCI of a MESH-MH PVC test cell (using a specific DA) indicates FF(H).

The SST is assigned the ST without encapsulation (that is, back in the SIP).

The RMLP(b) generates and assigns an RMID (unique in the present RMLP) using a received VCI (corresponding to a source MH ID) and a MID (unique in a source MH). If no RMID can be assigned (the EFMN or EFMD is set ON), the RMID indicates "don't care" and the RVCI is set to EO(H).

10.18 RMLP(b)(HMH01A)→RMLP(c)(HMH04A) MRI Timeout Dummy Cell

FIG. 426 shows the format of the timeout dummy cell transferred from the RMLP(b)(HMH01A) to the RMLP(c) (HMH04A) (refer to FIG. 282 for the route).

An MRI timeout check is made in the RMLP(b). If an NG is detected in the check, a dummy cell is transmitted as an NG notification, etc.

The RVCI contains a destination SNI ID. (The 5 higher bits are all 0). Refer to 10.17 above for the RMID.

In FIG. 426, the contents of the blank portion and the area preceded by the header field are "don't care".

10.19 RMLP(c)(HMH04A)→RMLP(d)(HMH02A)

FIG. 427 shows the format of a cell input from the RMLP (c)(HMH04A) to the RMLP(d)(HMH02A) (refer to FIG. 282 for the route).

Each of the parameters shown in FIG. 427 are passed in the RLMP(c). Therefore, the contents output by the RMLP(b) are inherited as is by the RMLP(d). (The above described MRI timeout dummy cell is also passed).

10.20 RMLP(d)(HMH02A)→LP-COM(HLP02A, HLM00A)

FIG. 428 shows the format of a cell to be input from the RMLP(d)(HMH02A) to the LP-COM(HLP02A, HLM00A).

The HLP02A requires a test cell used in the diagnostics and the MESH-MH PVC test (when an allotted DA is used). No error cells are output from the RMLP(d).

An output MID is assigned such that it indicates a unique value for the destination SNI. Although 10 bits are reserved for the output MID, only the 5 lower bits are actually used and the 5 higher bits are set to all zero (the 5 lower bits are also set to all zero for the S-SSM). The 5 lower bits represent an output MID'.

The present cell remains encapsulated

If a specific DA of the MESH-MH PVC test is used, the RDA (RDA' when input to the RMLP(d)) indicates IFF(H), while the RVCI indicates FF(H). These are determined in the RMLP(d) and the cell is prevented from being output.

The HLP02A requires receiving a test cell in the diagnostics and the MESH-MH PVC test (using an allotted DA). Since a user cell input from the ASSW to the RMLP is rejected during the diagnostics, a test can be conducted. (A cell is fetched according to the RVCI). A cell is also fetched according to the RVCI in the MESH-MH PVC test (using an allotted DA). The RVCI indicates a destination SNI ID.

The HLM00A requires receiving a billing cell. Billing data contains a destination SNI number which can be determined by the RVCI.

A billing operation is performed on an incoming cell during the diagnostics. There is no problem during the diagnostics because the MESH is in the OUS state. The billing operation is also performed on the SNI-SBMESH PVC test cell, but the billing data is ignored because the SNI is blocked.

The billing operation is also performed on the MESH-MH PVC test cell (using an allotted DA), but the billing data is ignored according to the specific SA.

10.21 RMLP(d)(HMH02A)→LP-COM(HLP02A, HLM01A)

FIG. 429 shows the format of a cell input from the RMLP (d)(HMH02A) to the LP-COM(HLP02A, HLM01A).

The HLP02A requires a diagnostic test cell and a MESH-ME PVC test cell (using a specific DA), and the HLM01A requires a PM/TM cell. All cells (encapsulated) including erroneous cells are output to the necessary interface.

The units shown in FIG. 429 are those input to the RMLP (d).

The HLP02A requires receiving a test cell in the diagnostics and the MESH-MH PVC test (using a specific DA). Since a user cell input from the ASSW to the RMLP is rejected during the diagnostics, a test can be conducted. (A cell is fetched according to the RVCI).

As described above, when a specific DA of the MESH-MH PVC test is used, the RDA (the RDA' when input at the RMLP(d)) indicates IFF(H), while the RVCI indicates FF(H).

Although cells are received during the MESH-MH PVC test (using an allotted DA), HLP02A does not operate in a cell reception mode. Furthermore, cells can be input as SNI- SBMESH PVC test cells. Likewise, the HLP02A does not operate in the cell reception mode.

The HLM01A requires receiving a PM/TM cell. The PM uses a source MH while the TM uses a destination SNI according to the a source MH ID (1), (2), and RMCI.

Various operations are performed on received cells during the diagnostics, but the MESH is in the OUS state.

The 8 lower bits of the VCI input from the RMLP(b) are copied to the source MH ID (1) and (2). Since no PM/TM operations are performed in the SNI-SBMESH PVC test cell, the MSB of the source MH ID(1) of the test cell is set to 1.

The RVCI indicates FF(H) in the MESH-MH PVC test (using a specific DA). According to the value, the data is masked in the PM/TM operations.

10.22 RMLP(d)(HMH02)→RMUX(HMX12A)

FIG. 430 shows the format of a cell input from the RMLP (d)(HMH02) to RMUX(HMX12A) (refer to FIG. 209).

The interface ignores the encapsulation, and no erroneous cells are output.

The cells are similar to those in 10.20 above. The source MH ID (1), (2), and the BRLC area are specified parameters as shown in FIG. 430.

The area of 0000 0011 1111 corresponds to the VPI, that is, 03F(H). 0000 0011 RVCI corresponds to the VCI.

The RVCI indicates a destination SNI ID, that is, in the range of 0300 through 031F.

The MESH-MH PVC test cell is not transmitted from the interface. Practically, the MSB of 1 is detected in the RVCI, and the test cell is identified. A cell having an allotted DA is transmitted to the RMUX, and the cell is also output to the ASSW. During the test, the SNI-is blocked.

10.23 RMUX (HMX12A) ASSW

FIG. 431 shows the format of a cell output from the RMUX (HMX12A) to the ASSW (refer to FIG. 209 for the route).

There are the following 3 types of cells to be output from the RMUX to the ASSW.

1. test cell to the TCB
2. signalling cell to the BSGC
3. normal user cell

A normal user cell is input from the RMLP(d) to the RMUX, assigned various data and converted into a specific format, resulting in the format shown in FIG. 431. The value of each parameter is ignored by the SBMESH and therefore is not defined here (the descriptions are also applied to the SNI-SBMESH PVC test cell).

A test cell to the TCG is input from the SDMUX to the RMUX, assigned various data and converted into a specific format, resulting in the format shown in FIG. 431. The value of each parameter is ignored by the SBMESH and therefore is not defined here.

A signalling cell to the BSGC is also ignored by the SBMESH and therefore is not defined here.

10.24 Error Flag (at SMLP)

FIG. 432 shows the error flag at the SMLP.

10.25 Error Flag (at FMLP)

FIG. 433 shows the error flag at the RMLP.

11. Software Interface 11.1 Initialization

The following 2 types of initialization are performed by the SBMESH on the software.

1. initialization of the MH-COM
2. initialization of the LP unit

The initialization is performed through the LAP in 1, and through the INF in 2. The initialization is performed on the entire SBMESH in the order of 1 and 2.

Each of the following cases is described below.

11.1.1. Initialization of MH-COM (1) Procedure of the Initialization of the MH-COM FIG. 434 is a flowchart showing the initialization of the HM-COM.

1. The intra-station LAP is established simultaneously in the ACT and the SBY.
2. An individual reset request (ROW0:D6) is issued from the ACT and SBY. Simultaneously, the reset timer (set to 1 minute for timeout) is started.
3. The MH-COM is set as a reset state and the intra-station LAP is disconnected. As a result, the BCPR detects the disconnection of the intra-station communications link. However, the BCPR continues transmitting a request to establish an intra-station communications link until the reset timer indicates timeout (the BSGC continues transmitting the SABM).
4. The MH-COM returns an UA in response to the SABM received after the system is reset. Thus, the intra-station communications link is established again.
5. The BCPR issues a COM-EMSCN read request command (COM-EMSCN-RD-RQ). A response is returned from the MH-COM (COM-EMSCN-DAT-RP). At this time, the E-MSCN are all masked and the EMSCN bits received by the BCPR are all OK.
6. The BCPR sets the mask pattern according to the COM-E-MSD (ROW 180 through 195).
7. The BCPR sets a threshold according to the COM-E-MSD if necessary (ROW 36 through 51).
8. If the reset timer indicates timeout before the reset is completed, the reset is rejected as a fault.

(2) Intra-Station Communications

The intra-station communications is explained by referring to FIG. 435. FIG. 436 shows an example of the VPI/VCI of the intra-station communications cell.

A simple LAP procedure is used in the intra-station communications The E-MSD/E-MSCN and device control relating to the MH-COM are all processed in the simple LAP procedure. The LP and the LP-COM are not controlled.

Logically, a communications link is set between the BSGC-MH-COM. However, since the MH-COM is duplex, each of the systems has its own communications link. As shown in FIG. 435, the highway of one system contain the intra-station communications cells (ATM cells from simple LAPs) of both systems in BSGC→MH-COM and MH-COM→BSGC.

The VCI values of the cell in BSGC→MH-COM are different in the two systems. The value is fixed in each system. The MH-COM receives an intra-station communications cell for its own system only according to the VCI, and discards the cells of the other system.

Although the cell of the MH-COM→BSGC has the same VCI value in the two systems, different COM bits in the ATM are used in the two systems. (If a cell is an intra-station communications cell for its own system, the COM is assigned 1. If it is a cell for the other system, the COM is assigned 0.) The BSGC terminates only the cells to be terminated by itself according to the COM bits and discards the cells for the other system The BSGC can be accommodated in either of the sides 0 and 1 of the ASSW. The SBMESH is connected to both sides 0 and 1 of the ASSW, but the intra-station communications link is established to the BSGC on side 0 only as shown in FIG. 437.

Up to 4 SBMESHs are cascade-connected to a 622 Mbps highway in a daisy chain. When a plurality of SBMESHs are connected to a highway, an intra-station communications link is set for each SBMESH. At this time, the VPI/VCI value of the intra-station communications cell of the BSGC→MH-COM is common, but the TAGC value depends on each device.

The MH-COM obtains the TAGC value (tag C) of the cell to be fetched by itself according to the shelf number of the SBMESH in which it is accommodated, and then fetches the corresponding cells.

As described above, the MH-COM determines the operation to be performed when a cascade-connection is made according to a TAGC value. The UL under the control of the ATM is not used (fixed at "0").

The shelf number of the SBMESH is 0 for a single SBMESH. Each time an SBMESH is added, the value is incremented by 1. The shelf number and the TAGC value of the BSGC→MH-COM intra-station communications cell match each other as shown in FIG. 438.

(3) Setting a Private Line

Private lines (PVC) connect the SNI to MESH, MESH to MH, and MESH to SNI. The private lines are set immediately after the initialization. Described below is the tag field. The VPI/VCI of the private line is described in Chapter 2.

SNI→MESH

The SBMESH accommodating the SNI is specified using a tag. (It is assumed that the TAGA and TAGB specify the 600 M highway connecting a predetermined SBMESH.)

FIG. 439 shows the tag field of the MESH input cell specifying the SBMESH. A predetermined tag specifies the route from the SNI in the BRLC to the host, and assigns the tag if it is routed to the MESH in the host.

MESH→MH

The SBMESH (0-3) is not specified, but the SBMH is specified. That is, the 600 M highway of the SBMH corresponding at TAGA and TAGB is specified. FIG. 440 shows the tag field of the cell specifying a specific SBMH.

MESH→SNI

The SNI is specified using a tag. The detailed explanation is omitted here.

The VCC should also be set for a periodical test path using a tag in addition to the case above. The setting of the VCC of the test cell path for use in this test is set and released each time the test starts and terminates respectively.

11.1.2 Initialization of LP Unit

The LP unit starts various processes upon receipt of the online operation activation. The subscriber data, etc. are transmitted later to the LP unit. Accordingly, various types of errors may occur (not hardware error, but protocol performance monitor errors, etc.). To prevent the errors, software processes are performed. The processes are explained by referring to FIG. 441.

The statistic time information entry 1 shown in FIG. 441 is transmitted in response to the online operation response status from the LP unit. The statistic time information entry 2 is transmitted every 15th minute. Although the subsequent entries are not shown in FIG. 441, they are transmitted every 15th minute. The interval between the 1 and 2 above can be variable in the range from 0 to 14 minutes.

Although a normal cell is input to the SBMESH in the period (period 3 in FIG. 441) from the online operation activation to the completion of the entry of the subscriber data and various station data as described above, no subscriber data or station data are set. Therefore, error may occur relating to the protocol performance monitor or network data collection, and the error counting starts and may generate a TCA. The error log can be transmitted from the firmware to the software depending on the error type. Accordingly, the software ignores the error log for period 3, and processes the error log for period 5 as a correct record.

Since the error count in period 3 is not guaranteed, various count values and TCA in the period (period 4 shown in FIG. 441) up to the statistic time information entry 2 (to be exact, the collecting phase switch) should be ignored.

Subscriber data entry

Subscriber data entry commands are processed in SNI units, and are transmitted to an SBMESH for the SNIs (up to 32 SNIs) accommodated in the SBMESH.

The firmware has all SNIs blocked by default. The block is released for the subscriber who has sent the command as being a subscriber accommodated in the home SBMH. These processes are performed when the process request indicates "add/modify". If this command indicates "delete" as a process request during the operation, the corresponding SNI is blocked. A single SNI block entry command and SNI block entry release command can block/block-release a plurality of SNIs. Such a command is received to block/block-release SNIs, but it is not generally used to delete/add SNIs, but used to temporarily block the SNI for any factor or release the temporary block.

Using this command, up to 16 individual addresses, 48 group addresses, 128 screening addresses, and 16 blocking carriers can be set per SNI.

The same GAID can be assigned to plural SNIs within a single GA (also to plural MESHs and MHs within the same SS).

At the initialization, the addresses are set for all accommodated SNIs. When SNIs are added or deleted during the operation, the addresses are set for only the corresponding SNIs by this command. When each parameter is altered for an SNI during the process, only the parameter corresponding to the SNI is set by this command (the command alters a parameter to be modified and sends those as is without rewriting them). The following points should be carefully considered when an individual address or group address is deleted.

FIG. 442 shows an example of deleting C in A, B, C, and D entered as individual addresses.

Normally D replaces C, but actually the C to be deleted in FIG. 442 is filled with 0 and transmitted. This restriction is placed on the individual address and group address. The screening address and blocking carrier are "filled" when they are deleted.

The above described restriction is derived from the billing unit. If Ds are filled instead of "all 0s" in the above described example, the billing data for C cannot be distinguished from that for D from the point when Ds are filled to the point when the next billing data is transmitted to the software. Otherwise, the "all 0" can be replaces with newly entered addresses after C is set to all 0 and the billing data for C is then fetched. If an SNI is added or deleted, and if a parameter is changed for an individual address, etc. of an existing SNI using the subscriber data entry command, then an error may occur in the protocol performance monitor, etc. as in the initialization. Thus, the TCA can be generated and a log can be made depending on the type of error. Therefore, an error at the initialization is ignored through the software.

If an SNI is added or deleted during the operation, an error can be expected. However, since a large-scale error is not estimated, it is recognized as an error and a resultant TCA and log are accepted.

Various station data entries

Station data can be entered using the following commands.

(1) Station data (individual) entry command (2) Station data (group) entry command (3) Station data (MH) entry command (4) Station data (GWMH) entry command (5) Station data (intra-station number) entry command (6) Station data (β) entry command (1) Station Data (Individual) Entry Command The unit of this command is SBMESH, and an individual address supported by the SBMESH specified by the parameter (MHAT+MHID+MESHID) in the command is reported.

Therefore, at the initialization of an SBMESH, this command related to all SBMESHs in the SS including the SBMESH is transmitted to the SBMESH. When there are 32 MHs in the SS and each MH has four SBMESHs connected in a daisy chain, the command is transmitted 128 times to the SBMESH, and transmitted totally 1282 times at the initialization of the system.

If an amendment is made to an individual address of the SNI accommodated in an SBMESH, the amendment is reported in this command to the SBMESH.

A parameter (MHAT+MHID+MESHID) and a subscriber identifier are used in a plurality of commands, and the parameter commonly used in such plural commands is assigned as commonly recognized.

An address identifier is assigned to an individual address for the SNI specified by the (MHAT+MHID+MESHID+subscriber identifier).

The individual address specifying field in the subscriber data entry command can specify 16 individual addresses, sets to 0 the identifier of the individual address first specified in the command message for the SNI, and sequentially sets 1. 2, . . . , 15.

This command is used to set the routing table in the SMLP. One method is to analyze all DAs in the routing table. The number of command transmissions can be reduced depending on the system configuration. For example, assume that the routing table supports only for 4 SBMH×4 SBMESH×32 SNI×4 IA.

Even if the system accommodates 32 SBMH and each SBMH comprises 4 SBMESHs, only 0-3 MHIDs can be set on the table. Therefore, the command can be transmitted only 4 SBME×SBMECH=16 times to an SBMESH, and can be totally transmitted only 16×128 times. The number of individual addresses defined in each command can be 21 SNI×4 IA=128.

Assume that there are 6 SBMHs A, B, C, D, E, and F in the system, there is heavy traffic in the group of A, B, C, and D and in the group of E and F, and there is little traffic between the groups. If an IA for 4 SBMHs is automatically transmitted to all MHs using this command, the group of A, B, C, and D can specify the DA. The group of E and F cannot specify the DA and accept the broadcast. In this case, if an IA for the 4 SBMHs of A, B, C, and D is transmitted to A, B, C, and D, and an IA for the 2 SBMH of E and F is transmitted to E and F using this command, then the group of E and F can also specify the DA, thereby reducing the broadcast.

(2) Station Data (Group) Entry Command

This command reports the correspondence between the GAID and the group address. Since this command is not used in the SBMESH, there is no need to transmit it to the SBMESH.

(3) Station Data (MH) Entry Command

This command is used to assign to an SBMESH a band between the SBMESH and each SBMH (including the SBMESH) and GWMH (SMLP→RMLP). (Simultaneously, the implementation/non-implementation information of each SBMH and GWMH is assigned). The command is transmitted once for each SBMESH.

This command is transmitted to an SBMESH and another SBMESH with the same implementation/non-implementation information for each SBMH and GWMH and normally different values of band.

When an amendment is made to a band, it is reported by this command to the corresponding SBMESH. Since this command cannot report only amended portions, non-amended portions are unnecessarily reported. If one of the SBMHs or GWMHs is extended, this command reports it to all SBMESHs.

At the initial stage, the software does not control the band between the MESH and MH, and the entire bus is reported as a full 155 M band. This command is transmitted in such a case. Since this command reports the MH implementation information as well as the band to the MESHS, the firmware cannot operate by default.

(4) Station Data (GWMH) Entry Command

This command reports the correspondence between the GWMH and the number of the station in the LATA under the GWMH (and the number ID of the station in the LATA). The same command is transmitted to all SBMESHs. The number of the station in the LATA under the GWMH refers to the same LATA and is assigned to a separate SS. It does not include the station number of the SS in the home system. This number is defined as an intra-station number described below.

This command is issued for each SBMESH. When a change occurs, the changed portion is reported to all SBMESHs. The command is used to set a routing table in the SMLP. One command can report up to 512 LATA intra-station numbers. The command format is defined such that the 512 types optionally correspond to the GWMHID. If there are a small number of station numbers supported by the routing table, the command length can be reduced.

(5) Station Data (Intra-Station Number) Entry Command

This command reports the correspondence between the intra-station number and the intra-station number ID. The same command is issued to all SBMESHs.

This command is issued for each SBMESH. When a change occurs, the changed portion is reported to all SBMESHs.

(6) Station Data (β) Entry Command

This command reports the correspondence between the BRLC number, umbilical link number and X which is a restriction value of the traffic in the umbilical link.

Although this command is issued once for each SBMESH, the contents of the report for each SBMESH are different from those for each other. When a change occurs, the changed portion is reported to the related SBMESH. The default value for the SBMESH is β=1.

11.2 INS Process (In-Service Process)

Described below are the INS process in the MH-COM and the INS process in the LP. The INS process refers to the process of incorporating an OUS system (a system in an out-of-service state) into an INS system (a system in an in-service system).

11.2.1 INS Process of MH-COM

The INS process of the MH-COM is described by referring to FIG. 443.

The INS process of the MH-COM mainly copies the contents of the master system VCC table to the VCC of the system to be processed into an INS system. The procedure is described as follows. No diasnostics are made when incorporating the system in the INS process. The INS process is performed on condition that no fault is detected in the corresponding OUS system, and that the initialization is completed and the intra-station communications link has been established.

1. The BCPR issues a VCC copy request command (VCC-CPY-RQ) to both ACT and OUS systems.
2. The ACT system MH-COM connects its own μP-bus to the OUS system after receiving the VCC-CPY-RQ, and notifies the OUS system of the VCC copy request in the inter-system communications through the SIC. Then, it returns an ACK in response to the VCC-CPY-RQ to the BCPR.

When the OUS system MH-COM receives the VCC-CPY-RQ from the BCPR and a VCC copy request from the ACT system in the inter-system communications, it disconnects its own system VCC from the bus (thus, enabling the OUS system VCC to be viewed in the I/O space of the ACT system μP-bus). Then, it returns an ACK to the BCPR.

3. The ACT system μP starts copying the VCC (the settings of its own system VCC are sequentially read and written to the other system VCC viewed through its own system bus). If the read contents of the copied-from VCC are not set on the table, then the address is not copied but the next address is read.

The BCPR issues a VCC-SET-RQ only to the ACT system VCC (normally, it is issued simultaneously to both systems) after receiving an ACK in response to the VCC-CPY-RQ from the MH-COMs of both systems (that is, during the copying operation).

4. After copying the VCC, the ACT system MH-COM transmits a VCC copy completion notification (VCC-CPY-CMP) to the BCPR. When the ACT system MH-COM receives the ACK in response to the VCC-CPY-CMP, it returns a VCC copy completion notification to the OUS system MH-COM in the inter-system communications.

The BCPR receives the VCC-CPY-CMP from the ACT system MH-COM, returns an ACK, and immediately issues a VCC-CPY-CMP to both systems.

5. After the OUS system MH-COM receives a VCC copy completion notification from the ACT system MH-COM through the inter-system communications, it transmits a VCC-CPY-CMP to the BCPR. After an ACK is received from the BCPR in response to the VCC-CPY-RQ, the a unit connected through the μp-bus restores its own VCC, and issues a VCC copy completion notification to the ACT system MH-COM through the inter-system communications. After the ACT system MH-COM receives the VCC copy completion notification from the OUS system, it disconnects its own system bus from the bus of the other system.

The above listed processes 1 through 5 put the OUS system in an INS state.

11.2.2. INS Process in LP

This procedure is to perform on only the system to be converted into an INS system the process of initializing the LP on both systems as described in 11.1.2.

11.3 Fault Monitor and System Switch

The following 5 types of faults are detected in the SBMESH by the software.

1. a fault in the LAP link between the SBMESH and the MH-COM
2. a fault in the communications using the INF between the SBMESH and the LP
3. MSCN in the MH-COM
4. MSCN in the LP
5. a fault in the health check of the LP Each of the above listed cases is explained below, and the system switch is summarized later.

11.3.1 Fault Monitor of MH-COM

A fault in the MH-COM is reported by the intra-station communication LAP to the BCPR through the BSGC. The fault information reported through a simple LAP is referred to as an E-MSCN.

There are two types of MH-COM faults, that is, a fault to be reported by its own E-MSCN to the BCPR and a fault to be reported through the E-MSCN of the other system. A fault not reported by its own E-MSCN or not accepted even if it is reported is accommodated by the E-MSCN of the other system. Such a fault can be one of the following types.

μP fault (watch dog timer)

power source fault (disconnected fuse/abnormal OBP)

intra-station communications processing unit fault (EGCLD-LSI fault/signalling DMX fault)

When a fault occurs in an ACT system (active system), the systems are switched by the ASSW to block the fault in the old ACT system and activate diagnostics. When a fault occurs in an SBY system (standby system), the systems are not switched by the ASSW to block the fault in the SBY system and activate diagnostics. FIG. 444 shows the operation to be performed when a fault occurs in the MH-COM.

11.3.2 MH-COM Fault Reporting and Processing Sequence

Described below are the MH-COM fault reporting and processing sequences.

(1) Difference Report

A fault of the MH-COM is reported by the E-MSCN in the difference report. For example, the BCPR does not periodically issue an E-MSCN read command to collect E-MSCN by itself, but receives a report from the MH-COM each time a fault occurs. The similar process is performed when the system recovers from a fault. That is, a report is transmitted to the BCPR only when a change occurs in the bits of the E-MSCN. The E-MSCN is assigned a mask pattern (set from the BCPR by the E-MSD) and no report is made relating to masked E-MSCN bits even if a change occurs therein.

However, a COM-E-MSCN-DAT-RQ command can be used to read the E-MSCN from the BCPR at any time. The E-MSCN read through this command is not masked.

(2) Fault Correcting Process Sequence

The sequence in a fault correcting process depends on whether the fault is reported by its own system E-MSCN or by other system E-MSCN, and whether the fault correcting system is an ACT system or an SBY system. Described below is the fault correcting process sequence of each case.

1. When a fault reported by the E-MSCN of its own system occurs in an SBY system
2. When a fault reported by the E-MSCN of its own system occurs in an ACT system
3. When a fault reported by the E-MSCN of the other system occurs in an SBY system
4. When a fault reported by the E-MSCN of the other system occurs in an ACT system FIGS. 445 through 448 show the cases in 1 through 4 as listed above.

11.3.3 Fault in Communications Through INF with LP

The SBMESH-A is interfaced with the BCPR through the INFT and the INFA as shown in FIG. 449.

The fault occurs between the SBMESH and the INFA and the normality of the BCPR, INFT, and INFA is ensured (for the portions not facing the SBMESH).

The concept to be followed is described below. The fault of the DMA is displayed on the INF MSCN. Basically, it is similar to the fault monitor relating to the communications through the INF between the software and the BSGC, and also to the control timing of the OUS and ALM lamp.

When a fault occurs in the communications to the master system LP;

Systems are switched at the LP of the SBMESH. The old master system LP is an OUS system and the diagnostics is started.

When a fault is detected in the communications to the LP of the slave system, the LP of the slave system is an OUS system and the diagnostics is started.

The status returned by the SBMESH in response to a command from the software may contain a factor code, but a BS hardware fault is not reported through this parameter.

11.3.4 Fault detected in MSCN of LP

Check results of various checkers in the LP are reported to the software through the INF.

The MSCN points are roughly grouped into the following four types.

1. Points relating to the inter-state cross-connection of the MH-COM and the LP
2. NG or point other than 1
3. Point other than 1 and 2
4. Detailed point The above listed 1 through 3 are accommodated in the 32-bit INF MSCN. FIG. 450 shows the 32-bit INF MSCN. 4 is not an INF MSCN, but a detailed MSCN.

If a fault, etc. is reported in the 32-bit INF MSCN, an INF interruption occurs to the CC (software).

The above listed 1 indicates the result of a check relating to the inter-system inter connections. FIG. 451 shows the concept of the check.

The cross-connection from the DMUX of the MH-COM to the LP normally transmits data and clock from the MH-COM to the LPs of both systems independently. However, the system shown in FIG. 451 is used under the physical restrictions (connector necks, etc.).

The checkers of the data and clock transmitted by the LPs from the DMUX of the MH-COM are the CKaH and CAaM shown in FIG. 451. The trailing H and M indicate the data and clock from the home MH-COM and the mate MH-COM.

The correspondence to the INF MSCN bit number is as follows.

CKaH: bits 21, 20, 13, and 12

CKaM: bits 19, 18, 11, and 10

The checkers of the data and clock transmitted from the LP to the MUX block of the MH-COM are the CKbH and CKbM shown in FIG. 451. The meanings of the trailing H and M are the same as described above. These checkers are in the MH-COM, and the check results are returned to the sending LPs of the data and clock (for example, the check results of the #0 CKbM of the MH-COM is returned to the LP #1) and accommodated in the INF MSCN.

The correspondence to the INF MSCN bit number is as follows.

CKbH: bits 17, 16, 09, and 08

CKbM: bits 15, 14, 07, and 06

The clock of the LP is generated in the PLL of the LP and requires finally synchronizing with the clock of the MH-COM. Therefore, the source clock (64 k) is provided by the MH-COM for the PLL in the LP so that the inter-system cross-connection can exist with this clock. The LP checks the source clock from the MH-COMs of both systems.

The correspondence to the INF MSCN bit number is as follows.

CKaH: bit 01

CKaM: bit 00

The bits relating to item 1 above are a total of 18 bits per SBMESH and 36 bits for the two systems. The 36 bits are divided into nine 4-bit groups. Determination is made in each group.

bits 17 and 15 of systems 0 and 1 of group (1)
bits 16 and 14 of systems 0 and 1 of group (2)
bits 09 and 07 of systems 0 and 1 of group (3)
bits 08 and 06 of systems 0 and 1 of group (4)
bits 21 and 19 of systems 0 and 1 of group (5)
bits 20 and 18 of systems 0 and 1 of group (6)
bits 13 and 11 of systems 0 and 1 of group (7)
bits 12 and 10 of systems 0 and 1 of group (8)
bits 01 and 00 of systems 0 and 1 of group (9)

A normal fault will not generate an NG simultaneously covering two or more groups However, the fault may occur in the case of the power fault in the MH-COM. For example, if the power fault occurs in the MH-COM #0, the LAP link to the MH-COM is disconnected. Otherwise, since it is determined in the MSCN through the MH-COM #1, the process is performed by referring to the determination. Described below is the reconfiguration of the system in group units.

Group (1)

As shown in FIG. 452A, if the two points in the MH-COM (#0) indicate NG, the MH-COM is considered to be faulty. Therefore, if the MH-COM is a master, the systems of the MH-COM are switched with the old master system set as an OUS system and diagnostics is activated. When the MH-COM is a slave, it is set as an OUS system and diagnostics is activated.

As shown in FIG. 452B, if the two points corrresponding to an LP (#0) indicate NG, the LP is considered to be faulty. Therefore, if the LP is a master, the systems of the LP are switched with the old master system set as an OUS system and diagnostics is activated. When the LP is a slave, it is set as an OUS system and diagnostics is activated.

As described in FIG. 452C, if one point each of the LP and MH-COM indicates NG, it cannot be determined whether the fault exists in the LP or the MH-COM. In the example shown in FIG. 452C, The MH-COM #0 and the LP#0 are set as OUS system an diagnostics is activated. If the MH-COM #0 is a master or the LP #0 is the master, the systems are switched.

In FIG. 452C, LP #0 bit 17 indicates NG and bit 15 indicates OK. If bit 17 indicates OK and bit 15 indicates NG, then the MH-COM #1 and the LP #0 are set as OUS systems and diagnostics is activated. In this case, the LP #1 is also to be checked in the diagnostics result analysis In the example shown in FIG. 452, The MH-COM can be referred to at four points in the INS mode in both systems.

FIG. 453 shows an example where one system of the MH-COM is in the SBY or OUS state and only the two points of the master system can be referred to. When one of the LP is in the OUS state, the corresponding two points cannot be referred to. Furthermore, another one point is prevented from being referred to under the condition of the physical inter-connecting configuration.

FIG. 453A shows the MH-COM #1 in the state other than the INS state (that is, SBY or OUS state) with two points prohibited from being referred to. At this time, two points in the MH-COM #0 indicate NG. Although the MH-COM #0 is faulty, a message is output only.

FIG. 453B shows the MH-COM #1 in the state other than the INS state with two points prohibited from being referred to. At this time, one point in the MH-COM #0 indicates NG. It cannot be determined whether the MH-COM #0 or the LP is faulty, Since the MH-COM cannot be restructured, the LP #0 is an OUS system and diagnostics is activated in the example shown in FIG. 453B. Normally, systems are switched when the LP #0 is a master system. In FIG. 453B, the LP #0 bit 17 indicates NG, and the LP #1 bit 15 indicates OK. Otherwise, the LP #1 is set to an OUS state and diagnostics is activated. However, the LP #0 is to be checked in the diagnostics result analysis.

FIG. 454A shows that the LP #1 is in the OUS state and two points in the corresponding LP #1 and a point obtained through the LP in the OUS state, that is, a total of 3 points, are not referred to. The remaining 1 point indicates NG. In this case, only a message is output to indicate that the restructure is not allowed.

FIG. 454B shows that the LP #1 is in the OUS state and the MH-COM #0 is in a state other than the INS state. At this time, none of the four points can be referred to. This state is defined as a double fault state.

Group (2)

Refer to the case of group (1).

Bit correspondences indicate bit 17 to bit 16, and bit 15 to bit 14.

Group (3)

Refer to the case of group (1).

Bit correspondences indicate bit 17 to bit 09, and bit 15 to bit 07.

Group (4)

Refer to the case of group (1).

Bit correspondences indicate bit 17 to bit 08, and bit 15 to bit 06.

Group (5)

FIG. 455A shows an example where two points of the LP (#0) indicate NG. In this case, the LP is faulty. If the LP is a master, then the systems are switched, the old master system is set as an OUS system, and diagnostics is activated. If the LP is a slave, it is set as an OUS system and diagnostics is activated.

FIG. 455B shows an example where two points corresponding to an MH-COM (#0) indicate NG. In this case, it cannot be determined whether the MH-COM or the LP directly connected to the MH-COM is faulty. Therefore, the MH-COM #0 and the LP #0 are set as OUS systems, and diagnostics is activated for each system. If the MH-COM #0 is a master system or the LP #0 is a master system, the systems are switched.

FIG. 455C shows an example where only one point indicates NG. In this case, the LP is considered to be faulty. If the LP is a master, then the systems of the LP are switched, the old master system is set as an OUS system, and diagnostics is activated. If the LP is a slave, it is set as an OUS state and diagnostics is activated. In FIG. 455C, the LP #0 bit 21 indicates NG, and the LP #0 bit 19 indicates OK. Otherwise, the LP #0 is set to an OUS state and diagnostics is activated. However, the LP #1 is to be checked in the diagnostics result analysis.

In the example shown in FIG. 455, the LP can be referred to at four points in both systems INS.

An example where one system of the LP is in the OUS state is described below by referring to FIG. 456. In this case, two points of the OUS system cannot be referred to. Furthermore, another one point is prevented from being referred to under the condition of the physical inter-connecting configuration. If one system of the MH-COM is in the OUS state, the corresponding two points are prohibited from being referred to.

FIG. 456A shows that the LP #1 is in the OUS state and two points in the corresponding LP #1 and a point obtained through the LP in the OUS state, that is, a total of 3 points, are not referred to. The remaining 1 point indicates NG. In this case, only a message is output to indicate that the restructure is not allowed.

FIG. 456B shows an example where the MH-COM #1 is in the OUS state and the corresponding two points are prohibited from being referred to. At this time they as well as the remaining two points indicate NG. Also in this case, a message is output only indicating that the restructure is not allowed.

FIG. 456C shows that the MH-COM #1 is in the OUS state and the corresponding two points are not to be referred to. At this time, only one point in the remaining two points indicates NG, and the LP is considered to be faulty. Therefore, if the LP is a master, then the systems of the LP are switched, the old master system is set as the OUS state, and diagnostics is activated. If the LP is a slave, it is set as the OUS state and diagnostics is activated. In FIG. 456C, the LP #0 bit 21 indicates NG, and the LP #0 bit 19 indicates OK. Otherwise, the LP #0 is set to an OUS state and diagnostics is activated. However, the LP #0 is to be checked in the diagnostics result analysis.

FIG. 456D shows an example where the LP #0 is in the OUS state and the MH-COM #1 is also in the OUS state. At this time, none of the four points can be referred to. This state is determined as a double fault state.

Group (6)

Refer to the case of group (5).

Bit correspondences indicate bit 21 to bit 20, and bit 19 to bit 18.

Group (7)

Refer to the case of group (5).

Bit correspondences indicate bit 21 to bit 13, and bit 19 to bit 11.

Group (8)

Refer to the case of group (5).

Bit correspondences indicate bit 21 to bit 12, and bit 19 to bit 10.

Group (9)

Refer to the case of group (5).

Bit correspondences indicate bit 21 to bit 01, and bit 19 to bit 00.

11.3.5 Health Check of LP

After the actual operation is started, the following information is communicated between the software and the SBMESH LP.

1. Billing information
2. Protocol performance monitor information
3. Network data collection information
4. Error log information relating to 2 and 3 above
5. Statistic time information The above information 1 and 4 is autonomously transmitted from the LP to the software, but is not transmitted when information to be reported to the software is found. The software does not check whether or not the information 1 above is periodically transmitted. The information 2, 3, and 5 is transmitted every 15th minute. If a fault occurs relating to the INF communications during the actual operation, the fault may exist for 15 minutes in the worst case until the next information 2, 3, and 5 is transmitted. To prevent this, a health check is made for the LP (both master and slave). FIG. 457 shows the concept of the health check.

The software periodically (for example, every 5th second) issues a health check command to the LP, and simultaneously activates, for example, a 2-second timer. If a health check response is received before the timer reaches its timeout, a normal condition is determined. If the timer reaches its timeout before the response, the fault recognition method is left to the driver software. (For example, the driver software retries 3 times at 2-second intervals and then determines a fault if an NG appears after the three retrials.) If a master system of the LP is determined to be faulty, the systems of the LP are switched, the old master system of the LP is set as the OUS state, and diagnostics is activated. If the slave system of the LP is determined to be faulty, the system is set as the OUS and diagnostics is activated.

The BSGC similarly makes the health check, and additionally determines whether or not the software normally operates in the BSGC (whether or not a health check command is issued periodically).

11.3.6 System Switch

The systems are switched in the SBMESH by the following two methods.

(1) System switch in the 1H-COM (2) System switch in the LP

Each method is described below.

(1) System Switch in the MH-COM

The systems of the MH-COM are exclusive to the ASSW and independent of the system of the LP. The MH-COM receives an ACT signal from the ASSW via the front cable. The ACT signal to the MH-COM is distributed through an exclusive line not through the intra-station communications LAP.

The ACT signal to the MH-COM in each system is not a signal reporting the ACT/SBY to the signal receiving system, but a signal reporting whether the present ACT system is a #0 system or #1 system. Therefore, in a normal state (not in a transitional state in which systems are being switched), the information received by the ACT signal receiving unit shown in FIG. 458 is the same in both system.

When systems are switched, the ACT signals from the ASSW change simultaneously in logic to indicate a new ACT system. Actually, the ACT signals of both systems does not change simultaneously. There is necessarily a moment when the ACT signal received by the MH-COM #0 indicates that the #1 system is an ACT system while the ACT signal received by the MH-COM #1 indicates that the #0 system is an ACT system (or vice versa) in a transitional state.

The act determination unit is provided in the MH-COM to prevent the state of the system of the MH-COM from becoming unstable in the transitional state. It monitors the ACT signals received by the systems and stores the states of the systems indicated before the ACT signals change until the contents of the ACT signals coincide between both systems.

If the cable for transmitting the above described ACT signals is lost in the ACT system and if the ACT signal receiving unit of the system is stacked at the ACT system, then the BCPR detects the loss of the cable (the loss of the ACT cable is reported by the E-MSCN to the BCPR), and the ACT signal may not be used to switch the systems. To prevent this, the ACT signal receiving unit which detects the loss of an ACT cable is operated as if it received a signal indicating the other system is an ACT system. The system switch is made in a state in which the commands issued to both systems of the MH-COM match each other. No command is issued or no fault is monitored during the system switch.

(2) System Switch of in the LP

The systems are switched by changing the ACT state of the INFA.

11.4 Test and Diagnostics

The following three tests are conducted relating to the SBMESH.

1. Test using a TCG
2. PVC-test between SNI-SBMESHs
3. PVC test between MESH-MHs Fundamentally, the test 1 above is periodically conducted and the tests 2 and 3 are conducted at the requests of the subscribers. Either the test 2 or 3 can be conducted while the test 1 is being carried out. In this case, the test 1 may have to be waited for while the test 2 or 3 is being conducted.

Each of the tests and the diagnostics are described below.

11.4.1 Test Using TCG

The SBMESH has a test cell loopback function at the 156 M level immediately after the DMUX as in the SIFSH, etc. FIG. 459 shows the loopback test of the SBMESH.

The actual loopback is performed through the route shown by the bold lines. For example, a test cell from the side 1 of the ASSW (UP) to the SDMX of the SBMESH is looped back to the RMUX as shown in FIG. 459, and sent to the side 1 of the ASSW (DOWN). Likewise, a test data from the side 0 of the ASSW (DOWN) to the SBMESH is transmitted to the side 0 of the ASSW (UP).

For example, the SIFSH (loaded with the SINF/DS3) can be connected only to the side 0 of the ASSW of both switches. The test data from the side 0 of the ASSW (DOWN) is transmitted to the side 0 of the ASSW (UP). A loopback test of the SBMESH using the TCG is conducted by combining these images.

In the SBMESH, the MH-COM (SMUX, SDMX, RMUX, and SDMX in FIG. 459) and the LP (SMLP and RMLP in FIG. 459) are duplex, operated in separate master/slave modes, and inter-connected in the two systems. However, the above described test cell is, for example, transmitted from the SMUX of the #0 system if the test cell is received by the RDMX of the #0 system. Thus, the inter-system cross-connection route is not followed, but an input/output is made from the same system regardless of the master/slave correlation.

This test is periodically conducted in both master and slave systems for the following two purposes.

(1) Confirming the normality of the switch at the ASSW intersection (2) Confirming the DMUX and MUX functions in each shelf (SBMESH in this example)

For example, in the SIFSH, eight individual units exist under the SIF-COM. Immediately after DMUXing each individual unit, a loopback MUX is performed. FIG. 460 shows a loopback image in the individual unit accommodated in the SIFSH.

For the confirmation (1) above in the SIFSH, a loopback test should be conducted for any individual unit. Accordingly, a loopback function for the individual unit 0 is adopted. For the confirmation (2) above, a loopback function for one of the individual units 1 through 7 is adopted. Which loopback function should be selected is controlled by the tag information (TAGC) of the transmitted test cell.

As compared with the SIFSH, the SBMESH has an individual unit (LP in this example) accommodated in the MH-COM. However, up to four SBMESHs can be connected in a daisy chain to the highway from the ASSW. Each shelf corresponds to an individual unit. FIG. 461 shows a loopback image at the LP of each SBMESH.

For the confirmation (1) above in the SBMESH, the loopback function for the shelf 0 is adopted. For the confirmation (2) above, a loopback function for one of the shelves 1 through 3 is adopted. Which loopback function should be selected is controlled by the tag information (TAGC) of the transmitted test cell.

FIG. 462 shows the tag information of a test cell (as being input at the SBMESH) to be transmitted from the TCG to the SBMESH. A 600M highway to which the SBMESH is connected is specified at the TAGA and TAGB.

The VPI of the above described test cell is all 0, and the VCI is 03FA(H) or 03FB(H). However, the SBMESH does not check them specifically, but loops them back with the condition of 0 bit=1. (An 0 bit corresponds to, for example, the −6 bits of the first byte in the cell format shown in FIG. 411).

The above described test cell is looped back from, for example, the RDMUX to the SMUX in the MH-COM. Simultaneously, a test cell is input from the RDMX to the RMLP, and to the SMLP when it is looped back from the SDMX to the RMUX. It may be discarded under the condition of 0 bit=1 in the RMLP and SMLP.

After the loopback, the test cell is assigned a tag in the VCC of the SBMESH and returned back to the TCG through the ASSW. However, in the loopback process, no change is made to the tag, VPI, or VCI of the test cell. That is, the test cell is input to the VCC of the SBMESH with its TAG, VPI, and VCI unchanged as being input to the SBMESH. FIG. 463 shows this. Only the process SDMX→RMUX is shown in FIG. 463, but it is also applied to the process RDMX→SMUX.

The SBMESH has a loopback routes SDMX→RMUX and RDMX→SMUX. They correspond to the loopback route for the TCG connected to the side 0 of the ASSW and for the TCG connected to the side 1 of the ASSW.

As described above, this test aims at confirming the ASSW and confirming the DMUX and MUX functions in the SBMESH. The test specification does not relate to whether the side 0 or 1 (or both) of the TCG should be used to attain the first purpose (to confirm the ASSW). To attain the second purpose (to confirm the DMUX and MUX functions of the SBMESH), a test using the TCG of the side 0 and the test using the TCG of the side 1 are conducted. FIG. 464 shows the test to confirm the DMUX and MUX functions of the SBMESH.

As described above, the SDMX performs a DMUX process (that is, specidies a highway) according to the tag information. This test is conducted to test the DMUX function. (Simultaneously, the test is conducted to test the connection to the ASSW, a daisy chain, and the RMUX function.)

On the other hand, the RDMX is not the DMUX based on the tag information, but the DMUX based on the destination address. Accordingly, this test cannot check the RDMX function, but checks the connection to the ASSW, a daisy chain, and the RMUX function.

11.4.2 Loopback Test in SBMESH

This test is defined in the TR-774 and therefore the detailed description is omitted here. The outline of the method is described below.

First, the test PDU is output from the device connected to the SNI, looped back at the switch, and checked by the sending device. At the switch, the test PDU is identified by the DA (the DA is preliminarily set), and exchanged with the SA to loop back the test PDU.

11.4.3 PVC Test Between SNI-SBMESH

This test is conducted upon subscriber's complaint (request and complaint). The VPI and VCI of the test cell are the same as those of the PVC to be tested. That is, the VCC need not be set in the test. FIG. 465 shows the PVC test between the SNI-SBMESH. In the example shown in FIG. 465, the SINF in the SIFSH is tested.

A test cell is generated by the SBMESH and output. In this example, a test cell is generated by the generating unit (gen.) in the RMLP of the SBMESH. The test cell is transferred to the SINF through the PVC to be tested, and the loopback process is performed on the test cell at the SINF. The test cell is returned through the PVC and received by the SBMESH. It is then checked by the check unit provided in the SMLP of the SBMESH.

FIG. 466 shows the testing SINF, the existence of a DT block, and the loopback unit (some SINFs and DTs do not be blocked, but an SNI is blocked).

As shown in FIG. 466, the function of looping back by the test object device to the TCG a test cell from the TCG in conducting this test. That is, when the test is conducted, the periodical test conducted by the TCG should be stopped.

The test SNI is blocked when the test is conducted. Even if a PDU to be provided for a test SNI is entered from an SNI other than the test SNI to the SBMESH, it is not transmitted to the test SNI. At this time an error count is made in the protocol performance monitor, etc. relating to the above described PDU, but the error is allowable.

Described below is the procedure of the PVC test. In this test, each command is issued to a master system. Although the command is issued to a slave system, the process can be performed. However, the response status in response to the PVC test result request command is issued from the master system and is checked.

(1) An SNI block entry command is issued to the SBMESH to report the block of the test SNI. According to the table shown in FIG. 466, the block (DT) accommodating the test SNI is blocked.

(2) According to the table shown in FIG. 466, a loopback command is issued to the block (DT and SINF) accommodating the test SNI.

(3) A PVC test start command is issued to the SBMESH.

The test type is 01, and the test PVC and subscriber identifier refer to the test SNI number.

A test cell DA refers to an unused individual address type.

A test cell SA refers to an unused individual address type.

(4) The timing is to be set to 5 seconds or more.

(5) A PVC test terminate command is issued to the SBMESH.

(6) A PVC test result request command is issued to the SBMESH, and a test result of the corresponding response status is checked.

(7) The loopback specified by the (2) above is released.

(8) The block specified by the (1) above is released.

Thus, the PVC test start command, PVC test terminate command, and PVC test result request command are a command set.

The commands are processed in a logic check in the SBMESH. For example, if a PVC test start command is not received but a PVC test terminate command and a PVC test result request command are received, or if the PVC test start command is received but the PVC test result request command is received without receiving the PVC test terminate command, that is, if the command set is incomplete, then the logic check indicates NG. Practically, the factor code of the status of the (set destroying) command is referred to as indicating an abnormal termination. In the SBMESH, the test result is cleared after the status of the PVC test result request command is returned.

When a command is issued to the SBMESH as a test procedure, the subsequent step is followed after the status of the command is confirmed. No command set is formed. (As described above, a test SA is provided for the SBMESH for the purpose of preventing an erroneous billing. However, the report is first received by the management firmware of the SBMESH LP, and then transmitted to the billing firmware. If a command set is formed and is provided in series to the SBMESH, then the test cell may arrive to make an erroneous billing before the billing firmware recognizes the test SA according to the notification from the LP management firmware.)

The process from the command logic check to the prohibition of a command set in the test procedure is the same as that in the MESH-MH PVC test described below.

11.4.4 MESH-MH PVC Test

This test is conducted upon complaint of a subscriber request. Since it is a PVC test, the PVI and VCI of a test cell are the same as those of the test PVC. That is, the VCC is not to be set before the test.

The MESH-MH PVC test is described below by referring to FIG. 467.

In the example shown in FIG. 467, the SBMESH(b) and SBMESH(c) are provided in the same MH (MH 1). Then, the SBMESH(a) is connected to the MH 1 through the PVC. In this example, the PVC between the SBMESH (a) and the MH is tested.

The generating unit (gen.) in the SMLP of the SBMESH(a) generates a test cell, and the test cell is transferred to the MH1 accommodating the SBMESH(b) and (c) along the PVC. The SBMESH(b) and (c) check the DA of the test cell and fetches it if it should be fetched. The test cell is checked in the check unit in the RMLP. Thus, it is determined according to the DA whether or not the cell should be fetched. Therefore, an RDMX function which cannot be checked in the test using tag information can be checked.

FIG. 467 shows the SBMESH for generating a test cell and the SBMESH for receiving the test cell. These SBMESHs exist in separate shelves in FIG. 467. However, in the MESH-MH PVC, the sending MESH can be included in the destination MH. That is, the SBMESH which generates a test cell can be in the same shelf as the SBMESH which receives the test cell.

There can be more than one shelf that receives the test cell. That is, a plurality of shelves can receive the test cell. Furthermore, they can be accommodated in the same MH. Although FIG. 467 shows the shelf SBMESH receiving a test cell, but a GWMESH can also receive the test cell. Accordingly, they are represented as “MESH”.

As described later in detail, this test specifies the DA for the sending and receiving MESHs. The DA used in this test can be specified by the following two methods.

(1) An unused DA is specified.

(2) A DA which has been processed by the receiving MESH is specified. (In the SBMESH, an address allocated to the SNI accommodated in the SBMESH is specified.)

In (1) above, the MESH-MH PVC is mainly tested. For example, the test is conducted when communications cannot be established from a MESH to any subscriber accommodated in another SBMESH. The DA is hereinafter referred to as a “specific test DA”.

The (2) above is used in the DA test rather than the PVC test. For example, the test is conducted if the communications can be normally established from the MESH to the subscriber accommodated in another SBMESH, but cannot be established only to a specific DA. The DA is hereinafter referred to as an “allocated DA”.

The test DA can be specified by its individual address type or group address. FIG. 468 shows the outline of specifying the DA and the test with the type specified.

When the test is conducted, the MESH need not be blocked. In the test using a specific test DA, a test cell is not output from the receiving MESH. By contrast, in the test using an allocated DA, a test cell is transmitted to the destination SNI containing the DA. In this case, the destination SNI is blocked. Thus, since the destination SNI is blocked, a PDU does not reach the destination subscriber accommodated by the SNI even if the PDU to be transmitted from the SNI to the blocked destination SNI is input to the SBMESH.

Described below is the procedure of the MESH-MH PVC test. In this test, each command is basically issued to a master system. The process can be performed even if a command is issued to a slave system. However, a response status is checked in response to a PVC test result request command to a master system. The “don’t care” described below refers to, for example, all 0.

(1) If an allocated DA is used in the test, an SNI block entry command is issued to the SBMESH and the test SNI block is reported. (If the SNI is accommodated in the SMDS DS1/DS3, the DT itself is blocked.)

(2) A PVC test start command is issued to a destination MESH. If there are a plurality of destination MESHs, the command is issued individually. If the command is sent and received by the same MESH it is specified in (3).

The test type is specified as 02 for cases A and B and 03 for cases C and D shown in FIG. 468.

The transmission identification of 02 is specified.

The test PVC of “don’t care” is specified.

The subscriber identifier of “don’t care” is specified for cases A and B, and an SNI number of the destination SNI including the test cell DA is specified for cases C and D.

The test cell DA of an unused individual address type/group address type is specified for cases A and B, and a test DA is specified for cases C and D.

The test cell SA is “don’t care” for cases A and B, and an unused individual address type for cases C and D (to prevent an erroneous billing).

(3) A PVC test start command is issued to the source MESH.

The test type is 02 specified for cases A and B and 03 specified for cases C and D.

The transmission identification of 01 is normally specified and 03 is specified if the sending MESH is also the receiving MESH.

The test PVC of the destination MH MHID is specified for cases A and C, and “don’t care” is specified for cases B and D.

The subscriber identifier is normally “don’t care”. If the receiving MESH is also the destination MESH, the “don’t care” is specified for cases A and B and the SNI number of the destination SNI containing the test cell DA is specified for cases C and D.

The test cell DA of an unused individual address type/group-address type is specified for-cases A-and B, and the test DA is specified for cases C and D.

The test cell SA of "don't care" is specified for cases A and B, and an unused individual address type is specified for cases C and D (to prevent an erroneous billing).

(4) The timing is to be set to 5 seconds or more.

(5) A PVC test terminate command is issued to the source MESH.

(6) A PVC test result request command is issued to the source MESH, and a test result of the corresponding response status is checked. if the source MESH is also the destination MESH, a check to be made by the destination MESH should be carried out.

(7) A PVC test start command is issued to a destination MESH. If there are a plurality of destination MESHS, the command is issued individually.

(8) A PVC test result request command is issued to the source MESH, and a test result of the corresponding response status is checked. If there are a plurality of destination MESHs, the command is issued and checked individually.

(9) The block indicated in (1) above is released.

In case D, a test cell is copied to be transmitted to all destination SNIs including the test cell DA in the destination MESH. In these cells, only those for the destination SNI specified by the subscriber identifier in the PVC test start command can be checked. Therefore, the steps (2) through (8) should be repeated for all SNIs to test for all the destination SNIs.

11.4.5 PVC Test Result Check

FIG. 469 shows the PVC test results contained in the response status in response to the PVC test result request command.

There are two types (three types precisely) of PVC tests to be conducted in the same format. FIG. 469 is a table showing the printout examples. The table is printed out when the test results in NG. However, if an SNI-SBMESH PVC test is conducted, the MESH-MH PVC test result indication area (when a specific test DA is used and when an allocated DA is used) need not be printed out.

The 16-bit test cell transmission unit fault indication area indicates whether or not the test cell transmission unit is in a test cell transmission disable state. If the transmission is disabled, the cause is indicated. The enable/disable of transmission is indicated as follows.

all-0 pattern for 16 bits: no disable state (OK)

non-all-0 pattern for 16 bits: disable state (NG)

FIG. 470 shows an example. If B indicates 1 in FIG. 470, the transmission of the test cell is not completed. If a MESH is not the source MESH in the MESH-MH PVC test, the 16 bits are all zero.

The 16-bit test cell receiving unit fault indication area indicates whether or not the test cell receiving unit is in a test cell receiving disable state. If the reception is disabled, the cause is indicated. The enable/disable of reception is indicated as follows.

all-0 pattern for 16 bits: no disable state (OK)

non-all-0 pattern for 16 bits: disable state (NG)

FIG. 471 shows an example. If a MESH is not the destination MESH in the MESH-MH PVC test, the 16 bits are all zero.

The SNI-SBMESH PVC test result indication area is divided into 32 4-bit blocks (cells 0 through 32 in FIG. 469) as shown in the upper 4 rows in FIG. 469. In hardware, the capacity of the test cell receiving unit is 32 cells. Only test cells can be received during this test. Each block indicates whether or not a test cell has been received, and indicates the validity of the contents if the test cell has been received. The summary of the contents of the bit pattern of each block is shown below.

all zero 4-bit pattern: received and normal

'0001' 4-bit pattern: received but abnormal

'1000' 4-bit pattern: not received

There are 6 test cells in a test, and each result is displayed in the area of cells 0 through 5. The area of cells 6 through 31 in the block are all 0. That is, the patterns are as follows.

all-0 pattern for all blocks: OK non-all-0 pattern in any block: NG

Likewise, the MESH-MH PVC test result indication area (using a specific test DA) can be recognized.

During the SNI-SBMESH PVC test, or during the MESH-MH PVC test using an allocated DA, the area is entirely all 0. Even during the MESH-MH PVC test using the specific test DA and even if the MESH is not the destination MESH, this area is entirely all 0.

The MESH-MH PVC test result indication area (using an allocated DA) is also divided into 32 blocks. Since an allocated DA is used in the test, received data is not limited to test cells. For example, if a PDU arrives with a test allocated DA from the MESH not associated with the test, it is received by the test cell receiving unit. Although there are six test cells, all received data are not test cells as described above. Therefore, the entire blocks of cells 0 through 31 is checked.

It is indicated whether or not each 4-bit block has received a test cell. If yes, then the validity of the contents of the block should be indicated. Furthermore, it should be indicated whether or not the cell is received from a non-test MESH. The outline is described as follows.

all zero 4-bit pattern: a test cell is received and the contents are normal

'0001' 4-bit pattern: a test cell is received but the contents are abnormal

'1000' 4-bit pattern: neither a test cell nor a cell from a non-test MESH is received all 14-bit pattern: a cell is received from a non-test MESH During the SNI-SBMESH PVC test or during the MESH-MH PVC test using a specific test DA, this area is set to all 0. Even during the MESH-MH PVC test using an allocated DA, this area is set to all 0 even when the MESH is not the destination MESH. In this test, a test cell may not be received if a cell should be received from a non-test MESH. Therefore, unlike the other tests, a retrial is allowed in this test.

The checking method is described below in detail for each test type.

In the SNI-SBMESH PVC test;

Only one MESH is related to this test. The MESH is a source and destination MESH.

The software should check in the test result the test cell sending unit fault indication area, test receiving unit fault indication area, and SNI-SBMESH PVC test result indication area: Other areas are insignificant and not objects of a software check. However, the all 0 in the insignificant area is reserved. In this test, a check area of all 0 is accepted as OK, but is indicated as NG if it has any other pattern. FIG. 472 shows the result of this test in the printout format.

In the MESH-MH PVC test (using a specific test DA);

Only one source MESH is related to this test. However, there can be a plurality of destination MESHs, and the source MESH can be one of the destination MESHs.

The software should check in the test result the test cell sending unit fault indication area in the source MESH, and test receiving unit fault indication area and MESH-MH PVC test result indication area (using the specific test DA) in the destination MESHs. Other areas are insignificant and not objects of a software check. However, the all 0 in the insignificant area is reserved. In this test, a check area of all 0 is accepted as OK, but is indicated as NG if it has any other pattern. FIG. 473 shows the result of this test in the printout format.

In the MESH-MH PVC test (using an allocated DA);

Only one source MESH is related to this test. However, there can be a plurality of destination MESHs, and the source MESH can be one of the destination MESHs.

The software should check in the test result the test cell sending unit fault indication area in the source MESH, and test receiving unit fault indication area and MESH-MH PVC test result indication area (using an allocated DA) in the destination MESHs. Other areas are insignificant and not objects of a software check. However, the all 0 in the insignificant area is reserved.

In this test, a test cell sending unit fault indication area and test cell receiving unit fault indication area of all 0 are accepted as OK, but are indicated as NG if they have any other pattern. The MESH-MH PVC test result indication area (using an allocated DA) is indicated as follows.

Retrial

If this area is all 1, all of the 32 cells received by the test cell receiving unit are from the non-test MESH.

OK

This area is a combination of an all-1 pattern and an all-0 pattern. That is, there is at least one normal test cell receiving unit, and the others are filled with the cells from a non-test MESH.

NG

Six test cells are related to one test. When the test results in NG, the pattern of this area comprises less than 6 blocks of all 0 in 32 blocks and more than 1 block of 1000 pattern (The description can be applied identically regardless of the existence of an all-1 pattern block. It indicates that the test cess receiving unit does not receive 32 cells and the test cells of the predetermined number are not received (there can be a missing test cell). Furthermore, NG is output when one or more test cells containing abnormal contents are received. In this case, the pattern of this area comprises one or more '0001' in 32 blocks ("don't care" for other blocks). FIG. 474 is the printout of the rest result.

11.4.6 Diagnostics of MH-COM (1) Diagnostic Function of MH-COM

The diagnostic functions of the MH-COM are listed below.

(a) Self-diagnostics

1. Self-diagnostics for test section
2. Diagnostics for construction (P-ON)
3. Self-diagnostics activated by the BCPR The diagnostic programs of the 1 through 3 above are almost identical.

(b) Continuity test using TCG

A continuity test is conducted by generating a test cell by the TCG, switching from the MH-COM unit to this MH-COM at the ASSW, looping back the test cell at the MH-COM, and returning it to the TCG.

Since the SBMESH interfaces with both sides 0 and 1 of the ASSW, the following two loopback patterns are prepared.

1. A test cell is fetched at the SDMX and looped back to the RMUX.
2. A test cell is fetched at the RDMX and looped back to the SMUX.

1 and 2 above can be specified together.

The MH-COM loops back the transparency of a received test cell. A passing TCG cell is not processed. Described below is the DEMUX/MUX of test cells.

(1) S→R Direction

A test cell is fetched at the DMUX-LSI which DMUXes the SMLP data at the SDMX. Therefore, the test cell has the same tag value as the data to the SMLP. The VPI/VCI values are different between a cell to the SMLP and a test cell.

Only data cells to the SMLP are fetched according to the VPI/VCI in the SMLP, and the test cell is discarded.

Only a cell in which an 0 bit is set (only a test cell has an 0 bit) in the cells (combination of SMLP cells and test cells) DEMUXed at the SDMX in the receiving SEL-N1 is multiplexed to a highway receiving the cells from the RMLP. That is, the VPI/VCI value is "don't care" in the SEL-N1.

A test cell multiplexed in the highway from the RMLP is converted in its VCI by the RVCC and returned to the TCG.

(2) R→S Direction

A test cell is demultiplexed from the 622 Mbps from the ASSW through the DMUX-LSI (R-TCG DMUX) exclusive for a test cell of the RDMX. However, the demultiplexing process is performed only by a tag value (regardless of the 0 bit). Therefore, the demultiplexed cell data is not limited to test cells.

Only data cells to the RMLP are fetched according to the VPI/VCI in the RMLP, and the test cell is discarded.

Only a cell in which an 0 bit is set in the cells (combination of RMLP cells and test cells) DEMUXed at the R-TCG in the sending SEL-N1 is multiplexed to a highway receiving the cells from the SMLP. That is, the VPI/VCI value is "don't care" in the SEL-N1.

A test cell multiplexed in the highway from the SMLP is converted in its VCI by the SVCC and returned to the TCG.

(2) Outline of MHCOM Self-Diagnostics

FIG. 475 shows the outline of the MHCOM self-diagnostics.

(2)-1 TP

There are three types of TPs, that is, a 1-trial TP, 3-trial TP, and construction TP. The TP is activated by depressing the reset switch on the front panel of the HSF05A when it is powered. Which TP is activated depends on the settings of the dip switch on the HSF05A. The diagnostic result from the TP is displayed on the 7-seg. LED of the HSF05A.

(2)-2 DP

An online diagnostics can be activated either from an ACT system to an OUS system or directly in the OUS system. The diagnostics can be activated by the following triggers. Activation i) when the diagnostics is activated from an ACT system to an OUS system 1. After a mate-system fault is detected (a diagnostics result is reported to the ACT system and reported to the software by the COM-E-MSCN of the ACT system).

Activation ii) when the diagnostics is activated directly in an OUS system

1. After a home-system fault is detected
2. Diagnostic command input (a diagnostics result is reported to the software by the COM-E-MSCN of the ACT system in the OUS system LAP).

(3) Diagnostics Result Report (3)-1 DP Result

After performing the DP, the DP result (OK/NG, length, details) is reported to its own COM-E-MSCN if the diagnostics is activated by the home system, to the mate system through the inter-system communications if the diagnostics is activated by the mate system as shown in FIG. 476, and to the software by the COM-E-MSCN of the mate system.

i) RESULT: An NG PWCB is set. (FIG. 477)

ii) length: The number of bytes containing detailed information of the diagnostics NB-is clearly described (refer to FIG. 478).

iii) result: The detailed NG information of the indicated length is described (FIG. 479).

11.4.7 Diagnostics of LP

The diagnostics of the LP is described as follows.

The main items of the diagnostics are:

1. ING interface test

2. LP unit function test

The item 1 above is conducted by the diagnostic program and equivalent to the INF interface test conducted at the beginning of the BSGC diagnostics.

The item 1 above consists of the following two parts.

(1) CC access write/read test (2) DMA transfer test

FIG. 480 shows in detail the performance of these tests. FIG. 480 shows the actual results only and the portions such as APID, etc. are omitted.

In FIG. 480, *1 is the area indicating the diagnostics result of OK or NG. The area is 8 bits indicating an all-0 pattern, that is, NG. If the diagnostics is OK, the area other than *1 is "don't care". If the diagnostics is NG, the area other than *1 is significant The phase number area, sub-phase number area, and test number area contain an NG phase number, sub-phase number, and test number respectively in right-justified binary numbers.

The phase number is an autonomous diagnostic phase number, and is not a diagnostic number of the SBMESH LP.

The NG priority indication area is divided into two parts each indicating for the home or mate systems, and is further divided into 4-bit data to indicate for each PWCB. For example, is the #0 system is processed by the diagnostics, the home system refers to a #0 system and the mate system refers to a #1 system. As described above, the systems are interconnected between the LP unit and the MH-COM unit. Accordingly, the PWCB in the mate system can be an NG PWCB. An NG PWCB is reported for each PWCB. An NG priority is indicated in right-justified binary numbers.

In this area, all 0 refers to a non-NG PWCB. In representing data in decimal, 1 indicates the most doubtful PWCB (having the highest NG priority), sequentially followed by 2, 3, . . . . However, some cannot be assigned priority numbers. In this case, they are reported as having an equal priority. At a timeout, the diagnostics result report from LP status wait state is released to state an NG PWCB.

As described above, the diagnostics should be performed on both LP and MH-COM units depending on the NG bit pattern of the INF MSCN of the LP unit (because it cannot be determined which is faulty, the LP unit or the MH-COM unit).

The diagnostics is performed through the INF in the LP and through the LAP in the MH-COM. Even if it is performed on both LP and MH-COM, it is not performed simultaneously on both units. That is, one unit is processed first, and the other unit is not processed until the first process is completed.

The reason is explained in the following example. For instance, a pseudo-fault test is conducted such that the parity of the data transmitted to the LP is not damaged as a part of the diagnostics of the MH-COM. (This is to confirm the detection of an NG by means of the parity checker in the MH-COM. The data is transmitted also to the LP.) If the diagnostics of the LP is performed simultaneously and a test is being conducted in which a parity check as a part of the diagnostics of the data from the MH-COM is expected to be OK, then the test results in NG.

If the test 1 above results in NG, the test 2 is not conducted. The test 1 is divided into (1) and (2), and the test (2) is not conducted if the test (1) results in the test (1).

The test 2 is an autonomous diagnostics made by the μ-p and comprises a plurality of phases, sub-phases, and tests. If a test results in NG, the autonomous diagnostics is aborted immediately and a diagnostic result notification status is transmitted.

11.5 MSCN

The following two MSCNs are provided for the SBMESH.

1. relating to the MH-COM 2. relating to the LP

The tests 1 and 2 above interface with the software respectively through the LAP and INF. Described below are the details of each MSCN.

11.5.1 MSCN of MH-COM

As described above, the MSCN of the MH-COM is the E-MSCN reported through a simple LAP. The E-MSCN is transmitted to the BCPR basically as a difference report.

In the case of the SBMESH, faults accommodated in the E-MSCN relate to the MH-COM. The fault information relating to the LP is not included. The fault information of only the MH-COM indicates that the MSCN of the SBMESH is a common unit E-MSCN (COM-E-MSCN). That is, the information does not contain the data of an individual unit. The E-MSCN of the MH-COM does not distinguish NG-OR from detailed information. (All data refer to detailed information points.) The BCPR takes an action according to the contents of each point.

1. Format of the MH-COM E-MSCN

The E-MSCN of the MH-COM is represented by an 8-bit-256-row map as shown in FIG. 481. The 256 rows are grouped into some areas and accommodated in units of action type to be takes upon occurrence of a fault in the BCPR. The E-MSCN is difference-reported, but all the 256 rows are reported to the BCPR if any bit in the format shown in FIG. 481 changes.

The E-MSCN enables a mask to be specified in word units (in 2-row units) using the E-MSD. No report is made even if a masked bit changes. If a masked bit is transmitted together with a changed unmasked bit (this normally happens), the bit is reported as OK.

The polarity of the E-MSCN is represented as 0 for OK and 1 for NG (set by NG). The polarity of the blank area in FIG. 481 is set to 0.

The E-MSCN point of the fault information indication is output as a result obtained by editing at the μP of the HSF05A the output of the checker arranged at each PWCP forming part of the MH-COM. Each checker does not have a protective means. If an NG is detected, the result is stored until the fault reset instruction is received from the μP. The μP periodically monitors the checkers, reads the check results, and repeats the fault-reset operation. If NG is detected twice consecutively in the monitoring method, then it is recognized that the faults occurred at the checker and the E-MSCN point of the checker is set as NG. The monitor cycle of the checkers depends on the purpose of each checker.

Described below are the details of each area.

(1) MH-COM Control MSD Echo Area (0-35 Rows)

This area accommodates the echo data of the MH-COM control MSD (E-MSD). The polarity remains the same after the accommodation (the same polarity as the E-MSD).

(2) Device State Indication Area (36-39 Rows)

This area accommodates the information about the state of a device such as an ACT state, clock selection, etc., but not fault information of the MH-COM.

(3) Mate System Fault Indication Area (40-45 Rows)

This area accommodates the fault information about the MH-COM of a mate system. The mate system fault information is reported through an inter-system communications link between MH-COMs or other lines. The system switch of the ASSW is triggered by a fault accommodated in this area and the system in an ACT state.

(4) Home System Fault Indication Area (46-55 Rows)

This area contains the fault information about the MH-COM of a home system. The system switch of the ASSW is triggered by a fault accommodated in this area and the system in an ACT state.

(5) Warning Indication Area (72-83 Rows)

This area contains the warning information in the MH-COM. It is a buffer full/cell discard indicator relating to a buffer which accumulates highway data in the MH-COM. The bit set accommodated in this area can be an ACT system, but cannot directly trigger the system switch of the ASSW.

(6) Diagnostic Result Indication Area (84-99 Rows)

This area accommodates the result of the online DP for the MH-COM.

(7) Statistic Information Indicator Area (100-119 Rows)

This area accommodates various statistic data in the MH-COM. The statistic data indicate the number of cells reported and discarded in each multiplexer and demultiplexer.

11.5.2 MSCN of LP

There are the following two types of MSCNs.

(1) INF MSCN (2) detailed MSCN

As described above, if a fault occurs in the LP of the SBMESH, it is reported to the software as an INF interruption. The software issues an MSCN read command in response to the interruption, and the 32-bit INF MSCN shown in FIG. 450 is obtained in response to the command.

The software recognizes the type of a fault based on the data. At this time, a detailed fault inquire command is issued if necessary to obtain further detailed information. The detailed MSCN is obtained as a result of this command.

Detailed MSCN

FIG. 482 shows the concept of accommodating the detailed MSCN.

The LP comprises 10 pieces of PWCB, that is, the HMH00A through HMH06A, HLM00A, HLM01A, and HLP02A. Each PWCB is assigned 128 bits and arranged in the order as shown in FIG. 482.

The area of each PWCB comprises a 64-bit MSCN area accommodating the check result of each checker and a 64-bit MSD echoback area accommodating the echoback of the pseudo-fault point for the checker as shown in FIG. 482.

The 64-bit MSCN area is divided into four 16-bit blocks.

11.6 MSD

The following two MSDs are provided for the SBMESH.

1. relating to the MH-COM
2. relating to the LP

The tests 1 and 2 above interface with the software respectively through the LAP and INF.

11.6.1 MSD of HM-COM

The MSD of the MH-COM is accommodated in an intra-station communications LAP and accesses an MSD table on the MH-COM from the BCPR through the BSGC. The MSD through the intra-station communications LAP is referred to as an E-MSD. The E-MSD for the SBMESH accommodates only the MSD point relating to the MH-COM.

1. Format of MH-COM E-MSD

As shown in FIG. 483, the E-MSD of the MH-COM is represented by a 8-bit-256-row map. The 256 rows are grouped into some areas and are separately accommodated according to the meaning of each E-MSD point. The BCPR transmits all 8-bit-256-row areas as well as operation object bits through a COM-E MSD command. An MH-COM which received the command compares the received E-MSD table with that received previously, and recognizes all changed portions as new settings. Therefore, the BCPR sets the point which is not an object of the operation to the value of the E-MSD table.

The polarity of the E-MSD is reset by 0 and set by 1. A part of areas on the E-MSD table are echoed back to the E-MSCN. At this time, the polarity of the E-MSD remains unchanged. Described below in details is the area of each MH-COM-MSD shown in FIG. 483.

(1) MH-COM Control E-MSD Area (0-35 Rows)

This area accommodates the MH-COM control E-MSD area (0-35 rows). This area is echoed back to the E-MSCN. FIG. 484 shows the accommodation of this area. FIGS. 485 and 486 show the contents of each point of this area.

(2) Statistic Threshold Design Area (36-51 Rows)

This area accommodates a threshold for each statistic function in the MH-COM. FIG. 487 shows the accommodation of this area. FIGS. 488 and 189 show the contents of each point of this area.

COM-E-MSCN Mask Pattern Setting Area (180-195 Rows)

This area accommodates the mask pattern for the E-MSCN. The mask is set and released in word (2-row or 16-bit) units. A mask-specified E-MSCN point is set as OK. Even if a fault occurs to a mask-specified E-MSCN point, or even if an event of inverting the polarity of the point occurs, no E-MSCN report (difference report) is made. However, a masked point causes the current data to be returned in response to the E-MSCN read request command (COM-EM-SCN-DAT-RQ) as if it were not masked. Immediately after the initialization, All fields of the E-MSCN are masked until a mask pattern is specified by the BCPR.

FIG. 490 shows the contents of this area. FIG. 491 shows the contents of the mask-specified point of this area.

11.6.1 MSD of LP

The LP comprises 10 pieces of PWCB, that is, the HMH00A through HMH06A, HLM00A, HLM01A, and HLP02A. Each PWCB is assigned a 128-bit area. In each PWCB, most MSD points are pseudo-fault points for use in diagnostics. Therefore, the diagnostics of the MSD point of the LP is autonomously made by the μ-p, and only the firmware should be controllable with the software possibly uncontrolled.

11.7 Billing and Statistic Processes 11.7.1 General Descriptions

The following five billing and statistic processes are prepared for the SBMESH.

1. Statistic process in the MH-COM
2. Billing process in the LP
3. Protocol performance monitor process in the LP
4. Network data collection process in the LP
5. Cell-number processes in the LP (traffic control)

The process 1 above interfaces with the software through the LAP, and the processes 2 through 5 interface with the software through the INF.

1. Statistic Process in MH-COM

The statistic processes in the MH-COM can be performed at the following points.

(1) SDMX unit (DMUX function 600 Mbps→155 Mbps)

In the SBMESH, no statistic process is performed in the RDMX.

(2) SMUX RMUX unit (MUX function 600 Mbps→155 Mbps)

(3) LAP terminal downward (DMUX function 600 Mbps→155 Mbps)

(4) LAP terminal upward (MUX function 155 Mbps→600 Mbps)

(5) R-TCG unit (test cell MUX/DMUX)

FIG. 492 shows the sequence of the statistic processes.

(1) Statistic Process Sequence

The collection and notification of statistic information can be made through the COM-E-MSD instruction and COM-E-MSCN notification. The statistic process is performed by saving the count data at a time set (15 minutes) instruction and is reported to the BCPR at a read request later The sequence is listed below.

(1) A buffer threshold is set for each line MUX and DMUX.

(2) The statistics is started by a statistics start instruction (for each line MUX/DMUX).

(3) The counter data is saved at the phase switch (15 minutes) instruction, and simultaneously the counter is reset.

(4) The statistic data is reported at a statistic information read request.

(5) The steps (3) through (4) are repeated.

(2) Statistic Information Collection Error

Described below are the points to be carefully considered in using a simple LAPD protocol in the intra-station process in the statistic process.

When a link is reset, an NS (sequence number for a software command number check) is initialized. Therefore, a command can be erroneously set double. FIG. 493 shows an example in which the MH-COM statistic processes are abnormally collected.

The BCPR indicates a UI timeout because an ACK is not returned in response to the time setting, and another time set command is issued after re-establishing a link. At this time, since the NS is initialized and the NS number check is initialized at the device, the device cannot detect the double setting of the command, thereby erroneously setting the command double. If a command is erroneously set double in switching phases, the 15-minute-interval statistic data collection generates errors. Therefore, the following protection is gained in the application of the MH-COM statistic process.

(1) If no read request follows a phase switch instruction after starting the statistic process, the subsequent phase switch instruction is ignored.

(2) The software should issue a statistic information read request to a circuit performing a statistic process after a phase switch instruction.

FIG. 494 shows the sequence of the processes when a statistic process is abnormally performed.

Described next is the sequence of the steps 2 through 5.

FIG. 901 shows the sequence of the steps (2) through (5) above.

Various counters for protocol performance monitors, network data collection, etc. have two-phase configurations in hardware and switch access phases of the hardware according to a collection phase switch request command from the software.

In the counting process, the software issues a collection phase switch request command to the SBMESH LP unit at every 00, 15, 30, and 45 minutes. Various count values are read within 15 minutes from a switch to the next switch.

The performance information request command, traffic measurement information request command, and discarded cell number request command are introduced above. Obviously, the order of the commands is not limited to this example. However, each command (including a collection phase switch request command) should be issued at some second intervals. (If a command group is issued simultaneously, there can be congestion in the firmware).

The statistic time information command is issued every 15th minute as described above. This command is issued only to correct the time managed by the firmware. There is no special definition for the phase relation between this command and other commands. (The intervals between the commands are set in second unit).

The above described process is controlled by the software. The following four variations of status are autonomously transmitted by the hardware to the software.

(1) Billing data notification (2) Protocol performance log notification (3) Traffic measurement log notification (4) TCA notification related to protocol performance monitor (1) above is transmitted every minute basically. (2) and (3) are transmitted each time an error which requires a log occurs. However, a filter is applied in hardware and the intervals are set in second unit even if the log is reported the most frequently. (4) above is transmitted each time an error count exceeds the threshold.

11.7.2 Billing Process

Billing data is reported to the software autonomously by the hardware basically every minute according to a billing data notification status. If there is no arrival of a cell within a minute and therefore no billing data to be reported to the software, then the billing data notification status is not issued.

According to the TR-775, it is instructed that the following data should be collected for a billing process.

(1) DA (2) SA (3) SNI address (4) condition code (5) L2 PDU count (6) L3 PDU count (7) data collection time]

In consideration of figure inter-LATA communications, the information relating to carriers is also collected.

Listed below are correspondences between the information about parameters and carriers (1) through (7) and the parameters in the billing data notification status.

The DA of (1) above is not defined as an independent parameter in the status. It is obtained by the software according to the WHAT, MHID, MESHID, SNI, ID, and address ID.

The SA of (2) above is included in the status.

The SNI address of (3) above is obtained by the software according to the method of the TR-775. (It is not defined as an independent parameter in the status).

The condition code of (4) above is 0 for no error in L3-PDU, and is defined by the TR-775 depending on each error type for an error in L3-PDU. However, since the hardware o the SBMESH performs a billing process only on no-error L3-PDU, the code is set to 0, and it is assigned by the software.

The information relating to the L2/L3 PDU count, data collection time, and carriers of (5) through (7) is included in the status.

The total amount of data is not fixed, but depends on the number of arriving cells, etc. in one minute immediately before. Therefore, if the data cannot be contained in one message of a billing data communications status, then variations of the status are transmitted.

In hardware, the billing data accumulation RAM has a duplex configuration, and the data transmitted to the software is the data accumulated in the hardware non-access phase (frozen phase). In the billing data notification status, there is a parameter (block number) indicating which of the two phases accumulates the data. Since the billing data can be reported by plural variations of status, the sequence numbers are used as parameters (0 through 4095 available).

After all billing data are transmitted, a billing transfer completion status is transmitted by the firmware. In response to the billing transfer completion status, the software sends a billing reception completion command in response to which the firmware sends a billing reception completion status, thereby completing a series of billing data transmission.

To be exact, there is a reception result parameter in the billing reception completion command from the software. If it is an ACK, the process is accepted and the firmware sends a billing reception completion response status, thereby terminating the process. The firmware clears the transmission completion phase of the billing data accumulation RAM.

If the reception result parameter in the billing reception completion command indicates an NCK, then it is NG and the billing data is transmitted again. All billing data is transmitted again in the re-transmission process. (Furthermore, all billing data is transmitted again for any data re-transmission.) If the software detects an abnormal condition (lost numbers) in sequence numbers during the reception of billing data notification status, then (even before receiving the billing transfer completion status) a billing reception completion command, whose reception result parameter is NcK, is transmitted. Upon receipt of the command, the firmware retransmits the billing data. Additionally, when sending a billing transfer completion status, the firmware activates a 200 ms timer and waits for a billing reception completion command from the software.

When the timeout occurs, the billing data is retransmitted. If the timeout occurs again in retransmitting the data, the process is retried without limit. However, since the billing data is transmitted in 1-minute cycle, the retransmitting process is not continued but aborted.

As described above, a data collection time parameter is contained in the billing data notification status. A retransmitted parameter has the same value as a parameter of the previously transmitted billing data notification status.

There is also a data collection start time parameter in the billing transfer completion status. The value is set to a value within a minute from the data collection time parameter value in the billing data notification status preceding the billing transfer completion status.

According to the hardware configuration of the billing unit, up to 256 types of combination of SA and carrier information can be realized. If the variations exceed 256, the phase is switched even if one minute has not passed since the previous phase switch of the billing data accumulation RAM, and the billing data notification status is transmitted.

Described above is the transmission of billing data from autonomous firmware. The data can also be transmitted at an inquiry from the software. For example, an adjusting process is performed after deleting a telephone number.

In this case, the software issues an account adjustment data transfer request command. In issuing the command, a telephone number to be adjusted is included as a parameter. The firmware does not immediately transmits the corresponding billing data in response to the request command, but only transmits an account adjustment data transfer response status. The corresponding billing data is transmitted after the first phase switch of the billing data accumulation RAM upon receipt of the command.

Before transmitting a normal billing data notification status, the corresponding billing data is transmitted as billing adjustment data notification status. If a request is issued to adjust a plurality of telephone numbers within 1 minute, the corresponding billing data is collectively transmitted. If the corresponding billing data indicates 0, the information indicating that there is no billing data is issued.

In this step, as in the billing data notification status, there are parameters of block numbers and sequence numbers (a sequence number is assigned as a serial number with that of the billing data notification status to be issued after this status), and a plurality of messages can be generated. A completion notification parameter indicates as to whether or not the billing adjustment data is the final data as the billing adjustment data. The telephone number to be adjusted is included as a parameter.

The transmitting operation is performed similarly to the normal operation. That is, all data is retransmitted including adjustment data. The billing data is transmitted to the software through the area basically reported according to an INF initial data entry command. If the firmware recognizes that this area is running short, it issues a billing buffer request status to the software, and the area reported by the software according to the billing buffer entry command is used.

If there is no area notification to the billing buffer request status according to a billing buffer entry command from the software, then the billing data is discarded. The firmware sets a 10-second timer when the billing buffer request status is issued. Only one retrial is allowed at timeout. If there is no notification from the software, the cell is to be discarded.

11.7.3. Protocol Performance Monitor Process

The SBMESH performs a protocol performance monitor process according to the TR-774. Additional explanation is given in this process as described in Chapter 6. The following three protocol performance monitor processes are required.

(1) Storing various count values at every 15th minute (2) Generating a TCA when an error count value exceeds a threshold value (3) Occurrence of an error log Each of the counters has a duplex configuration for the hardware, and the two phases are switched according to the collection phase switch request command from the software. The software picks up during the 15 minutes to the next issue of the command a count value of the past 15 minutes according to the performance information request command. Each of the various count values for each 15 minutes defined by the TR-774 is stored by the software.

In the process performed in a response status, that is, in response to a performance information request command, no bursty error algorithm is realized, but the L2 #bad intervals, L2 #intervals, and L2 bursty error quotient are processed as "don't care". The portion not practically defined by the TR-774 is processed as follows.

L3-PDU transferred count (source): a count value as a part of network data collection Errored L3-PDU count (source): a sum of an L3 sum of errors count value counted as a part of a protocol performance monitor and an individual count value.

L2-PDU transferred count (source): a value counted as a part of the network data collection Errored L2-PDU count (source): L2 sum of errors count value counted as a part of the protocol performance monitor.

L3-PDU transferred count destination): a value counted as a part of the network data collection Errored L3-PDU count (destination): 0

L2-PDU transferred count destination): a value counted as a part of the network data collection Errored L2-PDU count (destination): 0

Relating to the L3-PDU transferred count, the cells are counted after dividing DAs into individual addresses and group addresses, and the sum is reported.

The L3-PDU transferred count and the L2-PDU transferred count include the count values of normal PDUs and errored PDUS.

The errored PDU count indicates the number of errors relating to the protocol performance monitor and is reported in this status.

The number of errors at the destination is set to 0. At the source, various checks are made in the L2 and L3. In the case of the L2, each error is individually counted, and is also counted for sum or errors. Accordingly, a sum of errors is also reported. In the case of the L3, errors are either individually counted or counted for a sum of errors. Therefore, each sums are reported.

In the process in which a TCA is generated when an error count value exceeds a threshold, the firmware autonomously generates a status to the software when the firmware detects that the error count value exceeds the threshold. This relates to the sum of errors algorithm. There are two variations of autonomous status to the L2 and L3.

The software generates a TCA message in response to an autonomous status, and the message requires an SNI number. The SBMESH contains 32 SNIs and there is a 32-bit area each corresponding to each SNI. The area indicates the existence of the SNI (corresponding to on/off of each bit) exceeding the threshold. The software obtains an SNI number from the bit number. The following points should be carefully considered.

The hardware error counter has two phases which are switched according to the collection phase switch request command from the software. A new hardware access phase starts counting from 0. For a sum of errors, the count value is increased and exceeding (at SNIx) and an autonomous status is generated to the software. In this status, it is reported that only the SNIx exceeds the threshold.

Assume that the time further passed (before the next collection phase switch request command) and the SNI y exceeds the threshold. In this case, an autonomous status is generated, and the information is transmitted reporting about a newly exceeding SNI y and the previously exceeding SNI x. At this time, the software adopts the method of, for example, a last look, etc. and generates only the sum of error TCA of the newly exceeding SNI y.

Regarding a bursty error, the hardware only performs a counting operation, calculates a ratio by being triggered by the collection phase switch request command from the software. If the obtained value exceeds the threshold, it is reported to the software in the autonomous status (different from the sum of errors of the L2 and L3 described above). Like the autonomous status related to the sum of errors, there is a 32-bit area corresponding to each of the 32 SNIs and indicating the existence of an exceeding condition in the SNI represented by on/off of each bit.

If the hardware of the SBMESH is normal, system 1 exceeds the threshold if system 0 exceeds the threshold. However, an autonomous status is issued by the master system only.

According to the TR-774, it is requested that the threshold should be altered, the present count should be read, and the present count value should be cleared relating to the protocol performance monitor. These processes can be performed by the limit value change request command, current performance information request command, current performance counter clear request command respectively.

If an error occurs and it requires logging, it is reported in the protocol performance log notification status. The data (and the autonomous status related to the above described TCA) is transmitted to the transmission area for the software. Basically, the area reported by the INF initial data entry command is used. If the firmware recognizes that the area is running short, it sends a logging buffer request status to the software and uses the area reported by the logging buffer entry command. If no area report is made about the logging buffer entry command from the software to the logging buffer request status, the logging data is discarded. Unlike the billing buffer, this logging buffer does not activate the timer or retrial process.

11.7.4. Network Data Collection Process

The SBMESH performs a network data collection process according to the TR-774. In addition to the detailed explanation in Chapter 7, described below are supplementary descriptions. The following two network data collection processes-are required.

(1) Storing various count values at every 15th minute (2) Occurrence of an error log Each of the counters has a duplex configuration for the hardware, and the two phases are switched according to the collection phase switch request command from the software. The software picks up during the 15 minutes to the next issue of the command a count value of the past 15 minutes according to the traffic measurement information request command. Each of the various count values for each 15 minutes is stored by the software.

The following points should be carefully considered about the response status.

The six count values of total originating L3-PDUs through total terminating group addressed L3-PLUs contain not only the number of normal PDUs but also that of errored PDUs. The two count values of total originating/terminating L3-PDUs refer to the L3-PDU whose DA is of an address type. The true sum is a total of this count value and the total originating/terminating group addressed L3-PDUs. The four count values of and after the L3-PDUs discarded by congestion controls don't include the present hardware which is processed as "don't care".

As in the protocol performance monitor process, the present count value can be read and cleared according to the current traffic information request command and current traffic counter clear request command respectively.

If an error occurs and it requires logging according to the TR-774, it is reported in the traffic measurement log notification status. The data is transmitted to the transmission area for the software. Basically, the area reported by the INF initial data entry command is used. If the firmware recognizes that the area is running short, it sends a logging buffer request status to the software and uses the area reported by the logging buffer entry command. (used in combination with protocol performance log).

If no area report is made about the logging buffer entry command from the software to the logging buffer request status, the logging data is discarded. Unlike the billing buffer, this logging buffer does not activate the timer or retrial process.

11.7.5. Various Cell Number Process

When the software issues a discarded cell number request command, the number of discarded L2-PDUs and L3-PDUs in the VC-shaper (block having the shaping function) at the output unit of the SMLP and RMLP can be calculated. The count value is used to control the traffic (especially when the SBMESH is increased or decreased in number) of the entire system. A practical usage is determined by the traffic WG.

As in the protocol performance monitor process, the present count value can be read and cleared by the current discarded cell number request command and current discarded cell number clear request command respectively.

Various error countings are made in the SBMESH. They are conducted in response to an independent count information request command. When these errors occur, error cells are discarded and the number of the discarded cells is counted. These error count values can be not only read by the command entered by the maintainer, but also used in a fault correcting process.

These count values can be read and cleared by the current independent count information request command and current independent count clear command respectively.

<Part 6>

In part 6, the gateway message handler (GWMH) is explained in detail.

1. General Descriptions 1.1 Summary

The gateway message handler shelf (GWMESH) is a device for converting data between SMDS switches. In the switching process, the message format is carefully considered, but only cells are actually switched. In protocols, level 2 (AAL-SAR) and level 3 (AAL-CS and CL) of the SNI interface protocol (SIP) which is a subscriber protocol of the SMDS are terminated.

1.1.1 Position in System

FIG. 496 shows one switching system and the position of the GWMESH in the system. FIG. 496 mainly shows the GWMESH (and the above described SBMESH) in the entire configuration shown in FIG. 8 in part 1 of this embodiment. The SIFSH containing the DS3, etc. is explained in parts 2 and 3. The SIFSH having the LLP is the SIFSH shown in FIG. 9 of part 1.

Up to four GWMESHs can be daisy-chained to each highway connected to the ASSW. A GWMESH group connected to a highway is called a GWMH. The relationship between the GWMESH and the GWMH is the same at that between the SBMESH and the SBMH.

In FIG. 496, the SNI is short for a subscriber network interface to which an actual SMDS subscriber is connected. The ISSI is short for an intra-switching system to which another switching system (SS) is connected. The ICI is short for an inter-carrier interface to which another LATA is connected through a carrier.

The GWMESHs (GWMHS) are grouped into incoming (IC) units and outgoing (OG) units. Data input through the ISSI or the ICI is processed in the IC unit of the GWMESH, and the data processed in the OG unit of the GWMESH is output to the ISSI or ICI.

1.1.2 Route for SMDS Data Process

FIGS. 497 through 591 illustrate the summary of the routing process of the SMDS data in the SBMESH and GWMESH. The explanation partially doubles that of the SBMESH.

FIG. 497 shows the process of the SMDS data between the SNIs accommodated in the switching system.

When data is transferred from SNI-1 to SNI-2, as shown in FIG. 497, the data (message) output from the SNI-1 is terminated by SIFSH 11, decomposed into one or more cells, and input to the SBMH(S) through a fixed path or a semi-fixed path (PVC) set between the above described SIFsh 11 and the SBMH(S). The VPI/VCI specifying the above described PVC is written to the header field of the cell.

The SBMH(S) recognizes from the address information (destination address DA) stored in the cell that the cell destination subscriber is accommodated in the home switching system, and writes and outputs the value indicating the PVC set between the SBMH(S) and SBMH(R) as the VPI/VCI of the cell.

The path from the above described SBMH(S) to the SBMH (R) is established through the SIFSH 12 as shown in FIG. 497. According to the configuration of the SIFSH 12 shown in FIG. 9, the VCC is set in the SIF-COM unit as in the SIFSH described in part 3 of this embodiment. When the data is transferred, the cell output from the SBMH(S) is first transferred to the SIFSH 12 and then output to the SBMH(R) through the VCC in the SIFSH 12. These paths are also connected through the PVC.

The SBMH(R) which received the cell recognizes the SIFSH (SIFSH 11) accommodating the SNI-2 according to the address information stored in the cell, and writes and outputs the VPI/VCI indicating the PVC set between the SBMH(R) and the above described SIFSH 11.

Thus, in the SMDS data process between SNIs accommodated in the same switching system, no GWMESH is used and the routing is set only through the SBMH(S) and SBMH (R).

Described below briefly is the path specifying method.

The VPI/VCI is specified in the SBMH(S) or SBMH(R) according to the address information (DA) stored in the cell. The specification is not performed on all cells, but on each message output from the SNI-1. That is, if the message is decomposed into a plurality of cells, the DA of the message is stored at a predetermined position in the payload of the BOM (SSM if the message is converted into a single cell). The SBMH(S) or the SBMH(R) sets on the table the correspondence between the input VPI/VCI and input MID and the output VPI/VCI according to the above described address information. When the SBMH(S) or SBMH(R) receives the COM and EOM preceded by the BOM, the VPI/VCI to be written to the cell is obtained, assigned, and output by retrieving the table using as a key the input VPI/VCI and input MID in the COM and EOM.

Thus, a message of any length is routed in cell units. At this time, the routing process of a COM and EOM is performed in hardware only on the input VPI/VCI and input MID. Since the process is not performed in the layer 3 (or layers in higher order) which requires a software process, it can be performed at a high speed. The SBMH(S) or SBMH(R) is described above, but the descriptions can be applied to the GWMH(I) or GWMH(O).

FIG. 498 shows the process of the SMDS data in SNI→ISSI or ICI. In FIG. 498, the process is performed similarly with the example shown in FIG. 497 up to the steps in which the message output by the SNI is decomposed and input to the SBMH(S). However, since the destination subscriber of the message is accommodated in another switching system in this process, the GWMH is used. That is, in the SBMH(S), the VPI/VCI specifying the PVC set between the SBMH(S) and the GWMH(O) accommodating the above described destination subscriber is written to the header of the cell, and the cell is output. (Actually, it is actually transferred through the SIFSH 12). When the GWMH(O) receives the cell, it writes the VPI/VCI specifying the PVC set between the GWMH(O) and the GWMH(I) of the other switching system to the header field of the cell, and outputs the cell.

FIG. 499 shows the process of the SMDS data in ISSI or ICI→SNI. As shown in FIG. 499, a cell input from another switching system to the present switching system is input to the GWMH(I). In this case, the GWMH(O) of the other switching system writes and outputs the VPI/VCI indicating the PVC between the GWMH(O) and the GWMH(I) of the present system to the header field of the cell. When the above described GWMH(I) recognizes the destination of the received cell as the subscriber accommodated in the present system, it writes the VPI/VCI indicating the PVC between the GWMH(I) and SBMH(R) to the header field of the cell, and outputs it. (Also in this case, the data is actually transferred through the SIFSH 12). The SBMH(R) transfers the above described cell to the destination subscriber.

FIG. 500 shows the SMDS data process in ISSI or ICI→ISSI or ICI. In this case, the present system relays the data when the data (message) is transferred from the subscriber accommodated in the other switching system to the subscriber accommodated in the other switching system.

As described above by referring to FIGS. 500, the description is the same as that for FIG. 499 where the cell input from another switching system to the present switching system is input to the GWMH(I). When the GWMH(I) recognizes that the destination of the cell refers to the other switching system, it writes the VPI/VCI specifying the PVC between the GWMH(I) and GWMH(O) to the header field of the cell and outputs the cell. Then, the GWMH-(O) writes the VPI/VCI indicating the PVC set between the GWMH(O) and the GWMH(I) accommodating the above described destination subscriber to the header field of the cell and outputs the cell. (Also in this case, the cell is actually transferred through the SIFSH 12).

Described next is the SMDS data process performed according to the address.

(1) For Individual Addresses, Group Addresses Other Than GAA (Home Switching System is not the Agent of the GA), and Embodied SAC The data from the ICI and ISSI is transferred to the GWMESH(I) via the fixed or semi-fixed path (PVC) of the ASSW(UP). The GWMESH(I) retrieves the route to the SBMH(R) and GWMH(O) accommodating the destination SNI, ICI, and ISSI by analyzing the address type and destination address (DA:E164 address) in the data, adds the retrieved route to the output data, and outputs the data to the ASSW(UP). the GWMESH(I), SBMH(R), and GWMH(O) are connected through the PVC.

The data is input to a predetermined SBMH(R) or GWMH (O) through the ASSW(UP), LLP, and ASSW (DOWN). The SBMH(R) or GWMH(O) refers to the DA in the data, filters only the data to the SNI (for the SBMESH) or ICI, and ISSI (for the GWMESH) accommodated in the present switching system, retrieves the route to the destination SNI or ICI, and ISSI, and output the data to the ASSW (DOWN). The SBMH (R) or GWMH(O), SNI or ICI, and ISSI are connected through the PVC.

(2) For Group Addresses of GAA

The processes are the same as (1) above up to the entry of the data from the ICI and ISSI to the present system and the entry to a predetermined SBMH(R) or GWMH(O). The SBMH(R) or GWMH(O) refers to the DA of the filtered data and performs the following processes when it recognizes that the home switching system is the GAA of the GA.

The SBMH(R) copies data for the subscribers connected to the SNI accommodated by the home switching system, converts the GA into the individual address of each subscriber, assigns the address to each piece of the copied data, and transfers the data.

When data is transferred to another switching system through the ICI and ISSI, the GWMH(O) copies the data, converts the data into an individual address from the above described GA, and transfers the data.

1.2 System Configuration

As shown in FIG. 501, the GWMESHs are grouped into MH-COMs and LPs for performing an actual switching process.

The MH-COM comprises the SDMX, RDMX, SMUX, and RMUX. The unit starting with S corresponds to the GWMESH(I) and that starting with R corresponds to the GWMESH(O). The DMX demultiplexes the data from the ASSW and fetches the data to the home shelf. The MUX multiplexes the data from the home shelf and sends the data to the ASSW The GWMESH further comprises the LAP terminating unit and VCC not shown in the figures. The VCC is set at LAP from the BSGC. The information about each checker in the MH-COM unit is interfaced with the software by the LAP using the BSGC.

The LP unit is grouped into the incoming, outgoing, and LP-COM units The incoming and outgoing units correspond to the GWMESH(I) and GWMESH(O) respectively, and relate to data switching functions. The LP-COM is the control unit for the incoming and outgoing units, and interfaces with the software at through the INF. The various station data, subscriber data, checker information in the LP, and billing information are interfaced with the software through the INF. Hereinafter, the incoming unit of the LP unit is referred to as the ICLP, and the outgoing unit is referred to as the OGLP.

As described above, up to four GWMESHs can be daisy-chained to-each highway of the ASSW with the LP unit and the INF connected one to one. Therefore, when four GWMESHs are daisy-chained to a highway, four paths are required from the INF (precisely INFA).

1.3 Redundant Configuration

FIG. 502 shows the redundant configuration of the GWMESH.

Each of the MH-COM and LP are duplex. The MH-COM is a duplex system in the master/slave format exclusive to the ASSW, while the LP is an independent duplex system. A switching operation is performed in the LP of a slave system, but the slave system does not notify the software of the billing information.

The inter-system interconnection exists between the duplex MH-COM and LP. That is, information can be communicated between the #0 of the MH-COM unit and #1 of the LP unit and between the #1 of the MH-COM unit and #0 of the LP unit. No inter-system interconnection exists between the LP unit and INF.

For example, data are input from the RDMX of the MH-COM #0 and the RDMX of the MH-COM #1 to the outgoing unit of the LP #0. In the outgoing unit of #0 of the LP unit, the selector (not shown in the drawings) provided at the input unit selects the data from the RDMX of the master system in the above described #0 and #1. Likewise, data is input from the incoming unit of the LP #0 and the incoming unit of the LP#1 to the SMUX of the MH-COM #0. In the SMUX of the MH-COM #0, the selector (not shown in the drawings) provided at the input unit selects the data from the incoming unit of the master system in the above described #0 and #1.

2. Process Method 2.1 Network Configuration

FIG. 503 shows an example of the SMDS network configuration. As shown in FIG. 503, the subscriber terminal (corresponding to CPE) is accommodated in the switching system SS through the SNI. Each SS is connected to each other through the ISSI in a network (corresponding to the LEC, BOC, and ILEC in FIG. 503). The communications with the SS accommodated in another network is made through the ICI. The system shown in FIG. 496 is provided for each SS.

2.2 Routing System

FIG. 504 shows an example of the routing process performed when data is transferred using an individual address. FIG. 505 shows examples of four types of communications paths shown in FIG. 504 together with the network configuration. In this case, each SS determines a destination by referring to the DA.

(1) The intra-SS communications refer to the communications between the customer premise equipment CPE(A) and CPE(B) accommodated in the same SS 1. In this case, the SS 1 performs the process shown in FIG. 497.

(2) The intra-LEC communications refer to the communications from the CPE(A) accommodated by the SS 1 to the CPE(C) accommodated by the SS 2. In this case, the SS 1 performs the process shown in FIG. 498, and the SS 2 performs the process shown in FIG. 499.

(3) The ex-LEC intra-LATA communications refer to the communications from the CPE(A) accommodated by the SS 1 to the CPE(D) accommodated by the SS 5 in another LEC in the LATA of the SS 1. The SS1 is connected to the SS 3 in the same LEC through the ISSI, and the SS4 is connected to the SS5 in another LEC through the ISSI. In this case, the SS 1 performs the process shown in FIG. 498 and the SS5 performs the process shown in FIG. 499. The SS3 and SS4 perform the process shown in FIG. 500.

(4) The ex-LATA communications refer to the communications from the CPE(A) accommodated by the SS 1 to the CPE(F) accommodated by the SS 8 in the network of the LATA accommodating the SS 1. The SS1 is connected to the SS 6 in the same LEC through the ISSI. The SS 7 is connected to the SS 8 in another LEC through the ISSI. Furthermore, the SS 6 is connected to the SS 7 in the ICI through the IC network. In this case, the SS 1 performs the process shown in FIG. 498, and the SS 8 performs the process shown in FIG. 499. The SS 6 and SS 7 perform the process shown in FIG. 500.

2.3 Group Address Process

FIG. 506 shows an example of the process of transferring data using a group address. FIGS. 507 through 509 show examples of the three types of communications paths shown in FIG. 506 together with the network configurations. Each SS refers to a DA (GA in this example). If the SS determines that the GA is within a specified area, the SBMESH or GWMESH accommodated in the SS copies input data and transfers the data to all SSs. The data transfer up to the input to the GA-specified area GAA is the same as the transfer of data having individual addresses as shown in FIG. 504.

(1) A case in which the home LEC is a GAA refers to the communications in which the CPE(A) accommodated in the SS 1 in the GA-specified area GAA is a data source. In this case, data is copied in the SBMH accommodated in the SS 1. As shown in FIG. 507, the data is transferred to all the other SSs.

(2) A case in which the other ILECs in the LATA are GAAs refers to the communications in which the data source CPE(E) is accommodated by the SS 2, the ILEC containing the SS 2 is external to the GA-specified area GAA (LEC network (GAA) shown in FIG. 508), and the SS 2 and GAA are in the same LATA. The transfer from the CPE(E) to the SS 4 is the same as the transfer using specified individual addresses. Data is copied in the GWMH accommodated in the SS 4, and the data is transferred to all the other SSs as shown in FIG. 508.

(3) A case in which the GAA is external to the LATA refers to the communications in which the data source CPE(G) is accommodated in the SS 5, the ILEC having the SS 5 is external to the LATA to which the GA-specified area GAA (LECNetwork (GAA) shown in FIG. 509) belongs (connected through the ICI). The transfer from the FPE (G) to the SS 7 is the same as the transfer using specified individual addresses. Then, data is copied in the GWMH accommodated in the SS 7, and transferred to all the other SSs as shown in FIG. 509.

2.4. Load Splitting

Load splitting refers to-sharing a load among a plurality of links when there are two or more physical (or logical) links in the ISSI connecting two SSs or in the ICI connecting an SS and the POP of other carriers. If there are a plurality of paths between the SSs, that is, if two SSs are connected through different relays SS, the load is not split to the paths. FIG. 510 shows the image of the link.

As a rule, a message having a pair of the same DA and SA uses the same link as long as the state of the link remains unchanged. Thus, the transfer sequence is maintained between the messages having the same DA and SA. If the DA and SA are picked up at random, the load in each link is balanced. To attain this, the load splitting comprises the following two steps.

Key generation

A key to a value in a range (key space) is generated according to the DA and SA of a message.

Key assignment

A message is assigned to an actual link according to the key of the message.

2.4.1 Features of Load Splitting

The ISSIs connecting the SSs in the network of the same carrier or the ICIs connecting the SS-POPs, that is, the ISSIs (ICIs) belonging to the same ISSI (ICI) link set are accommodated in-the same GWMH (refer to FIG. 511).

The following load splitting algorithm is applied to the IA data (data having specified individual addresses) and the group address GA data not copied in each SS (GWMH), and the data is then processed in the corresponding GWMESH. The load splitting algorithm is based on a well-known algorithm (for example, TR-1059, issue 2, chapter 9). If plural copies of GA data (that is, the data to be developed to IA) are transmitted to the same link set in each SS, then each ISSI (ICI) link is allocated to each of the assigned IAs.

Described below is the load splitting algorithm applied when no copies are made.

2.4.2. Key Generation

A 16-bit key is generated by performing a CRC-16 division on a bit string of a DA and SA. Since a key is generated for each piece of data, it is performed by the hardware. The key generation is performed in the following procedure.

(a) polynomial:

$$L(x)=x^{15}+x^{14}+x^{13}+\ldots+x+1$$

generation polynomial:

$$G(x)=x^{16}+x^{12}+x^{5}+1$$

b) A 128-bit string F(x) is generated for a pair of a DA and an SA to set the MSB of the DA at the MSB and the LSB of the SA at the LSB. That is, if the bit string of the DA is D(x) and the bit string of the SA is S(x), the string is generated by the following equation.

$$F(x)=x^{64}\cdot D(x)+S(x)$$

(c) The residue R(x) obtained by dividing $F(x)\cdot x^{16}+L(x)\cdot x128$ by the above described generation polynomial G(x) is set as a load splitting key.

2.4.3 Key Assignment

In assigning a key, a message is assigned to each active link according to the key generated as described above. That is, key space is divided. Each divided key space is assigned to an active link. A key is generated for a message. When the key is in the range assigned in the link, the message is transferred through the link.

The default value of an assigned key range is proportional to the ISSI/ICI link band. The value can be altered by a command. The assignment can be performed by the software in consideration of the assignment covering plural GWMESHs, and the key is reported for each link to the hardware. In the hardware, the data is obtained in a predetermined link after being processed and determined by the GWMESH according to the generated key.

FIG. 512 shows the load splitting algorithm.

3. ICLP 3.1 Summary of Process

The ICLP performs an ICIP/ISSIP L2 and L3 protocol performance check on the cell demultiplexed according to the information of a tag added to the header of the cell in the MH-COM corresponding to the incoming shown in FIG. 501 and input as 156 Mbps data. The ICLP also analyzes the DA (destination address) of the cell and transmits the cell to the SBMH accommodating the corresponding subscriber (SNI) and the GWMH accommodating the corresponding ISSI/ICI.

3.2 Configuration

FIG. 513 is a block diagram showing the entire configuration of the ICLP. As shown in FIG. 513, the ICLP comprises three PWCBs HMH11A through HMH13A.

The HMH11A mainly performs a protocol performance check. An erroneous cell is indicated by an error flag transferred concurrently with the cell. After performing a predetermined process on the contents of the error flag, the erroneous cell is finally discarded by the output unit of the HMH13A. The HMH12A mainly performs a routing process which is a DA analyzing and destination MH determining process. The HMH13A mainly performs a band limiting process on the PVC between the ICLP and RMLP/OGLP. FIG. 514 shows the table listing the functions of each block of the ICLP.

FIG. 514 shows as a supplementary list the functions of the ICLP.

(1) Checking Order

The protocol performance check is performed in the order shown in FIGS. 515 and 516.

When a CRC-10 error occurs at the initial stage of the check, it indicates erroneous data in the ICIP/ISSIP L2. If the protocol performance check is performed using the erroneous data, the error may be further developed. Therefore, if the CRC-10 error is detected, no subsequent protocol performance check should be made to alter the table.

For example, if a MID value is erroneous, an ICIP/ISSIP L3 message may be implied. This holds true also with payload length error and encapsulation error. Accordingly, if the CRC-10 error occurs, no such checks should be made.

(2) Error Cell Discard Process

An error cell is identified by an error flag (EF1 MS) indicating NG (in this case, the flag is set ON at NG), and should be discarded. In the case of “BOM with unexpected MID” (BOM having an MID other than a predetermined value), the cell is not discarded. The memory is used for various uses in the ICLP, and there is the function of skipping the write access to the memory if an error occurs.

(3) LP Test Cell (Diagnostics)

In the diagnostics of the GWMESH, a test cell is transmitted from the HLP07A (in the LP-COM unit) and returned to the HLP07A through each processing unit in the ICLP unit to check the error flag.

This diagnostics is made when the ICLP is in the OUS state (out of service state). The subscriber data for use in the test for each link is set on an actual table because there is no test table. An LP test cell having no error flag is not discarded but transmitted to the MUX of the MH-COM. Since this ICLP is not in a master state (that is, in the OUS state), the test cell is discarded by the selector in the input unit of the MUX.

(4) PVC Test

1. MESH-MH PVC Test

The HLP07A transmits a test cell to the ICLP in this test. The test cell is transmitted from the ICLP to the object SMLP/OGLP through the ASSW. The OGLP transmits this test cell to the HLP07A to check the normality of the cell.

The DA, etc. of this test cell is set by a specific VCI value (FF) and transmitted from the HLP07A. The ICLP recognizes the test cell if the test cell identification bit (bit 7) in the VCI indicates 1, and performs a corresponding process. Since this test is conducted in an INS state (in service state), no protocol performance check is made not to affect a normal message.

If an allocated-DA test is conducted in this test, the SNI/link of the destination MH is blocked. Refer to the error flag table shown in FIGS. 515 and 516 for details.

2. Link-GWMESH PVC Test

The HLP07A transmits a test cell to the OGLP in this test. The test cell is looped back in the test object link and input to the ICLP. Each checker of the ICLP performs on this cell a process for a normal cell. The routing unit determines whether or not the cell is a test cell according to the DA. If it is a test cell, it is transmitted to the HLP07A with the VCI set to ‘FF’ (h).

This test is conducted with the link blocked. Refer to the error flag table shown in FIGS. 515 and 516 for details.

3. Loopback Test

The HLP07A transmits a test cell to the OGLP in this test. The test cell is looped back by a specified SS and input to the ICLP. Each checker of the ICLP performs on this cell a process for a normal cell. The routing unit determines whether or not the cell is an NME cell addressed to the home station according to the DA. If it is an NME cell addressed to the home station, it is transmitted to the HLP07A with the VCI set to FFI(h). Refer to the error flag table shown in FIGS. 515 and 516 for details.

3.3 Correspondence Between Each Function Block and Error Flag

An error flag (EF) operating for each function block of the ICLP is shown in FIGS. 515 and 516. FIGS. 515 and 516 also show the conditions under which each function block operates. The table shown in these figures is used as follows.

The vertical axis indicates a function block.

The horizontal axis indicates an error flag EF (EF1 and EF2) and the state of an inter-MESH PVC test.

Each item is divided into upper entry and lower entry. The upper entry indicates an EF which turns to NG after a check of a functional block. If the state is NG, an EF described as ON is controlled. The lower entry indicates the conditions under which the functional block should be operated (or the functional block should be checked) or the check result should be reflected on the EF. Refer to the LP-COM in chapter 5 for the correspondence between an error flag (EF) and an error name (name according to the TR) and for the position of the EF.

3.4. ICLP Input/Output Format

FIGS. 517 through 522 show the formats of an input cell to the ICLP.

FIGS. 523 through 528 show the formats of an output cell from the ICLP.

FIGS. 529 and 530 show the formats of an input/output cell of the HMH12A of the ICLP.

FIGS. 531 through 542 show the formats of an input/output cell of the HMH13A of the ICLP.

3.5 ICLP Process Flow

FIG. 543 is a check flowchart followed when the ICLP receives a message. FIGS. 544 and 545 show a message routing flow in the ICLP. The numbers 1 through 6 shown in FIGS. 544 and 545 indicate the corresponding processes.

3.6 PKG Block 3.6.1 HMH11A 3.6.1.1 Summary of Function

FIG. 546 is a block diagram showing the HMH11A. The HMH11A has the following functions.

(1) Function of checking the consistency of a message entered from the ICI (2) Function of checking the consistency of a message entered from the ISSI (3) function of generating a pseudo-EOM to release the function of each unit of the device when a message is lost (4) function of converting the cell format of the ICI/ISI into the inter-MESH interface cell format 3.6.1.2 External Terminal Unit FIG. 547 is a table showing the external terminal of the HMH11A.

3.6.1.3 Block Diagram and Explanation of Functions

FIGS. 548 through 553 show the circuits of the important portions of the HMH11A. FIGS. 554 through 560 shows the timing in checking messages.

3.6.2 HMH12A

FIG. 561 is a block diagram of the HMH12A.

FIG. 562 is a process flowchart of the routing function of the HMH12A.

FIG. 563 is a process flowchart of the broadcast function of the HMH12A.

FIGS. 564 and 565 is a process flowchart of the copy control of the HMH12A.

FIG. 566 is a process flowchart of transmitting a pseudo-EOM.

3.6.3 HMH13A

FIG. 567 is a block diagram of the HMH13A. The HMH13A has the following function.

1. Output band control
2. Output MID acquisition
3. VPI/VCI reassignment
4. Discarded cell number count 3.6.3.1 Output Band Limit The burst property is absorbed by periodically reading data using a buffer memory and the output band from the ICLP to the OGLP or RMLP is controlled. This function can be realized by the VC-SH LSI shown in FIG. 567. FIG. 568 shows the configuration of the circuit of the VC-SH LSI for controlling the output band and the units around it.

3.6.3.2 Acquisition of Output MID

The output MID acquiring unit assigns the MID corresponding to the output VCI. This function is realized by the MOCTL LSI shown in FIG. 567. FIG. 569 shows the configuration of the circuit of the output MID acquiring unit. FIG. 570 shows the table for use in the output MID acquiring process. FIG. 571 is a flowchart showing the process of reserving an output VIC.

If the EOM of an L3-PDU is lost and the EOM is not input to the HMH13A, the output MID reserved for each L3-PDU is not released from the table shown in FIG. 570. To avoid this, the MOCTL LSI monitors the timeout of the system. FIG. 572 is a flowchart showing the process of the timeout monitor.

3.6.3.3 Reassignment of VPI/VCI

FIG. 573 shows the format of re-assigning a VPI/VCI. FIG. 574 shows the configuration of the hardware for reassigning a VPI/VCI.

3.6.3.4 Discarded Cess Number Count

Since the buffer size is limited in the GA copy unit (HMH12A) and output band limit unit (HMH13A) in the ICLP, cell may be discarded through the overflow of the buffer depending on the burst data size. The discarded cell number count unit accumulates the number of discarded cells according to the discarded cell signal received from the HMH12A, and sequentially adds the result to the number of discarded cells obtained in the output band limit unit, and records the sum to the DP-RAM (a two-phase configuration RAM corresponding to the discarded number write table shown in FIG. 567). The HLM03A accesses the DP-RAM to perform the NDC process.

3.6.3.5 Fault Monitor

The HMH13A is connected to the duplex MH-COMs and therefore has the home system fault monitor function and mate system fault monitor function. FIG. 575 shows the configuration of the home system fault monitor. FIG. 576 shows the configuration of the mate system fault monitor.

4. OGLP 4.1 Summary of Process

The OGLP refers to the destination address DA in the message input from the MH-COM, filters only the message addressed to the home MESH, and performs an ICIP/ISSIP L2 and L3 protocol performance check. It also determines an output link according to the VCI value, splits a load according to the SA and DA values, performs the GA process, and sends cells to each link.

4.2 Configuration

FIG. 577 is a block diagram showing the outline of the functions of the OGLP unit. FIG. 578 is a block diagram showing the detailed functions of the OGLP unit. FIG. 579 is a block diagram showing the IC arrangement of the OGLP unit.

The OGLP unit comprises four PWCBs HMH07A through HMH10A.

The HMH07A makes a DA filtering, that is, determines whether or not the input data is to be received according to the destination address DA. The HMH08A splits a load, that is, controls the distribution of a load. The HMH09A converts a group address GA into IA, that is, converts the GA into an individual address IA implied by the GA according to the GA of the input data. The HMH10A limits the band of the PVC between the OGLP and OSSI/ICI.

FIG. 580 shows the outline of the functions of each block of the OGLP unit and the process for error cells and maintenance cells. FIG. 580 shows the functions of the OGLP unit.

(1) Error cell

Error cells are indicated by a master error flag (EFI MS) set ON (as NG), and to be discarded. The OGLP uses the memory for various uses and skips the write access to the memory. Refer to the outline of the functions shown in FIG. 580 for details.

(2) LP Test Cell (Diagnostics)

In the diagnostics of the GWMESH, the HLP07A sends a test cell and receives it back from each processing unit in the OGLP to conduct an error flag test.

This diagnostics is made in the QUS state of the OGLP unit. The subscriber data for use in a test for each link is set on an actual table. No test table is provided. Therefore, an LP test cell which has no error flag set is not discarded, but is sent to the MUX of the MH-COM. Since the OGLP unit is not in a master state (OUS) when this diagnostics is made, the above described test cell is discarded by the selector of the input unit of the MUX.

(3) PCV Test

1. MESH-MH PVC Test

The HLP07A transmits a test cell to the ICLP in this test. The test cell is transmitted from the ICLP to the OGLP through the ASSW. The OGLP transmits this test cell to the HLP07A to check the normality of the cell.

A specific VCI value (FF) of this test cell is set and transmitted from the HLP07A. The ICLP recognizes the test cell if the test cell identification bit (bit 7) in the VCI of the input cell indicates 1, and performs a corresponding process.

Practically, since this test is conducted in an INS state, no protocol performance check is made not to affect a normal message. Refer to the outline of the functions shown in FIG. 580 for details.

2. Link-GWMESH PVC Test

The HLP07A transmits a test cell to the OGLP in this test. The test cell is looped back in the test object link and input to the ICLP. Each checker of the ICLP performs on this cell a process for a normal cell. The routing unit determines whether or not the cell is a test cell according to the DA. If it is a test cell, it is transmitted to the HLP07A with the VCI set to 'FF' (h).

This test is conducted with the link blocked. Refer to the outline of the functions shown in FIG. 580 for details, 4.3 Correspondence Between Each Function Block and Error Flag FIG. 581 shows an error flag (EF) operating for each function block of the LP. FIG. 581 also shows the conditions under which each function block operates. The table shown in these figures is used as follows.

The vertical axis indicates a function block.

The horizontal axis indicates an error flag EF (EF1 and EF2) and the state of an inter-MESH PVC test.

Each item is divided into upper entry and lower entry. The upper entry indicates an EF which turns to NG after a check of a functional block. If the state is NG, an EF described as ON is controlled. The lower entry indicates the conditions under which the functional block should be operated (or the functional block should be checked) or the check result should be reflected on the EF.

4.4 Cell Format

FIGS. 582 through 628 show the format of the cell of each segment type in each unit of the OGLP.

4.5 Process Flow

FIG. 629 is a flowchart of the routing process of the outgoing unit in the GWMESH. FIG. 630 is a flowchart of the transfer of GA data shown in the flowchart in FIG. 629. FIGS. 631 through 633 are examples of the tables used in each step shown in FIGS. 629 and 630.

4.6 PKG Block 4.6.1 HMH07A

FIGS. 634 and 635 show the configuration of the circuit of the HMH07A. FIG. 634 corresponds to the cross-connection selection and the units around it shown in the entire block diagram shown in FIG. 578. FIG. 635 corresponds to the DA filtering and the units around it.

FIGS. 636 and 637 shows the write timing to the FIFO shown in FIG. 634. FIGS. 638 through 640 are time charts of the signal processed by the HMH07A.

4.6.2 HMH08A

FIGS. 641 and 642 shows the configuration of the circuit of the HMH08A. FIG. 641 corresponds to the load splitting, DMUX, and the units around them shown in the entire block diagram shown in FIG. 578. FIG. 642 corresponds to the test cell multiplexing and the units around it.

4.6.3 HMH09A

FIG. 643 shows the configuration of the circuit of the HMH09A. FIG. 643 corresponds to the GA copy, IC/ILEC unavailable, and the units around it shown in the entire block diagram shown in FIG. 578.

FIGS. 644 and 645 are flowcharts of the GA copy process in the HMH09A. FIG. 644 is a flowchart of write control. FIG. 645 is a flowchart of read control.

4.6.4 HMH10A

The HMH10A performs the MRI timeout determination, MID conversion, output band limitation, various error count, format conversion, etc. in the outgoing unit (GWMESH (OG)) of the GWMESH.

FIG. 646 shows the configuration of the circuit of the HMH10A. FIG. 647 shows the functions of each block of the HMH10A. Described below in detail is each function.

(1) Parity Check

A parity check is made on 16 data signals and enable signals input from the HMH09A. The parity bit is odd in number. If the check result indicates an error, an ODPC ("H" for an error) is output and passed to the MSCN unit. A compulsory error can be generated through a pseudo-fault input.

This function is realized by the TO CTL LSI. FIG. 648 is a functional block diagram showing the connection between the parity check unit and the units around it.

(2) MRI Timeout

The MRI timeout determination is made for each message from its BOM to its EOM. When the BOM is reached, "present time"+"timeout time" is written. The time is referred to when the cell arrives, and the matching time is recognized as the timeout. This function is realized by the TO CTL LSI.

Generating an idle pattern: The MRI TIME (AND-CAM) is initialized.

MRI TIME (AMD-CAM): An idle pattern is transmitted at a BOM. Timeout is checked for each cell.

Generating a TO pattern: A TO pattern is output to the MRI TIME (AMD-CAM) at timeout to release the MID.

Transmitting a TO cell: The timeout is output instead of the BOM of the timeout message through the setting pin OTOO"H".

Cell counter: There are a mode in which each arriving cell (of every type) is counted, and another mode in which only valid cells are counted. Only valid cells are counted in a test. The settings are determined by the MSD.

FIG. 649 is a block diagram showing the function of the MRI timeout unit.

(3) MID Conversion

Conversion is made from an input VPI, VI and MID to an output VCI and MID.

When a BOM arrives, the input VPI, input VCI, and input MID are written to the AMD CAM (Am9910a).

If a COM and an EOM arrive, the input VPI, input VCI, and input MID are provided for the AMD CAM, and they match the values written when the BOM cell arrives, then the MID conversion is made using the output VCI, output VPI and output MID as matching addresses. The existence of conversion is determined by a mode pin (DIVM), and a releasing process is performed if a conversion bit allocated EOM is indicated. This function is realized by the TO CTL LSI.

FIG. 650 is a block diagram showing the function of the MID converting unit.

(4) Delay of Cell

The cell delay unit delays a primary signal with the delay required by the timeout determination process and MID conversion process. This function is realized by the TO CTL LSI. FIG. 651 is a block diagram showing the function of the cell delay unit.

(5) Discard of Error Cell

An error flag is identified to discard an object cell if the error flag (master flag) indicates L. This function is realized by the TO CTL LSI. Described below is the cell discard conditions in each PWCB.

Discard condition in HMH08A

BOM unexpected MID

COM unexpected MID

EOM unexpected MID encapsulation error unexpected sequence number error

Discard condition in HMH09A

GA bit error

GA active error

ISSI/ICI unavailable

Discard condition in HMH10A

MRI timeout error

Exceed maximum number of CDU

CDU active error

FIG. 652 is a block diagram showing the function of the error cell discard unit.

(6) Output Band Limit

The output band of each message is limited based on a predetermined band. The band is limited by managing and controlling the interval in time unit of cells of a message. If the interval of cells of a message is reduced in time unit, the flow is increased. If the interval is made larger, the flow is reduced. A band limit parameter is generated based on the contract of each subscriber, provided by the μp unit of the LP-COM, and collectively managed for the table manipulation, setting, etc. The function of limiting a flow is managed by the VC-SH LSI.

FIG. 653 is a block diagram showing the function of the output band limiting unit. FIG. 654 shows the configuration of the circuit of the VC-SH LSI for limiting the output band and the units around it.

(7) Format Conversion

The segment type ST(PI) of a cell is identified, and the cell is converted into the format of the ISSI or ICI. This function is realized by the MH10A LCA.

FIG. 655 is a block diagram showing the function of the format converting unit. FIG. 656 is a table showing the format conversion process.

(8) CRC-10 Generation and Assignment

To confirm the normality of data, a CRC operation is performed for the payload field. The operation result is added to the data and output. A CRC check is made by another PWCB. Then, the occurrence of an error is determined by the PWCB. This function is realized by the MH10A LCA. FIG. 657 is a block diagram showing the function for the CRC-10 generation and assignment unit. FIG. 658 shows the CRC-10 operation.

(9) Count of Discard

The number of cells suppressed by the output band limit, the number of discard signals from the HWH08A, and the number of discard signals from the HMH09A are counted and the information is sent to the LP-COM unit. The counter used in the counting operation has the RAM of a duplex configuration, releasing one phase at a request for data from the LP-COM unit and performs the discard counting in the other phase. The phase switch of the RAM is controlled by the RAMCHG signal from the LP-COM. This function is realized by the MH10B LCA. FIG. 659 is a block diagram showing the function of the discard counting unit.

5. MH-COM Unit 5.1 General Descriptions

The MH-COM comprises four PWCBs (HMX10A, HMX11A, HMX12A, and HSF05A) and has the following functions. The MH-COM unit is a duplex configuration exclusive to the ATM switch (ASSW) and there are cross connections for signaling and VCC copying between systems. A three important functions of the MH-COM are listed above.

1. The data received from the ATM switch is demultiplexed and provided for the LP.
2. The data received from the LP is multiplexed and provided for the ATM switch.
3. The signalling of the LAP is terminated.

Since the MH-COM of the GWMESH is the same as the MH-COM of the SBMESH, the detailed explanation is not given here, but the outline of the functions of each PWCB is described as follows.

5.2 HMX10A

FIG. 660 is a block diagram showing the HMX10A. The HMX10A has the following functions.

1. Multiplexing the data from the ICLP (incoming unit of the LP) to the 622 Mbps highway and outputting the result to the ASSW (IMUX function) under the scheduler control from the HMX12A.
2. Demultiplexing the data input from the 622 Mbps highway at the output terminal of the ASSW according to the destination address DA of the data and transmitting the data to the OGLP (outgoing unit of the LP). Actually, the DA is checked in the BOM cell. If the data should be demultiplexed, the MID information is recorded, and a demultiplexing process is performed by referring to the recorded MID when the COM and EOM cells arrive.
3. Demultiplexing a test cell from the test cell generating unit (TCG) according to the O-bit value input through the 622 Mbps highway at the output terminal of the ASSW.

(Demultiplexing as a function different from 2 above).

Between the ASSW and GWMESH, the data from the ASSW to the ICLP and the data from the OGLP to the ASSW are physically accommodated in a single 50-core coaxial flat cable. The cable is connected to the A connector of the HMX10A. A cable connecting a highway to the downward GWMESH is connected to the B connector of the HMX10A in a daisy chain.

5.3 HMX11A

FIG. 661 is a block diagram showing the HMX11A. The HMX11A has the following functions.

1. Multiplexing the data from the OGLP (incoming unit of the LP) to the 622 Mbps highway and outputting the result to the ASSW (OMUX function) under the scheduler control from the HMX12A.
2. Demultiplexing the data input from the 622 Mbps highway at the output terminal of the ASSW according to the tag information of the data and transmitting the data to the ICLP. Demultiplexing a test cell from the TCG according to the 0-bit value.
3. Between the ASSW and GWMESH, the data from the ASSW to the OGLP and the data from the ICLP to the ASSW are physically accommodated in a single 50-core coaxial flat cable. The cable is connected to the A connector of the HMX10A. A cable connecting a highway to the downward GWMESH is connected to the B connector of the HMX10A in a daisy chain.

5.4 HMX12A

HMX12A has the following functions.

1. Converting VPI/VCI and assigning switching tag information to a cell multiplexed by the HMX10A and HMX11A (VCC function).
2. Multiplexing a test cell from the TCG demultiplexed by the HMX10A and HMX11A to the MUX highway of the HMX10A and HMX11A.
3. Scheduler function of multiplexing by means of the HMX10A and HMX11A.

FIG. 662 is a block diagram of the VCC function. FIG. 663 is a block diagram of the scheduler function.

In the front connectors of the HMX12A, the A.C connector is used for the inter-system cross-connection of signalling data and B and D connector scheduler function signals in a daisy chain.

5.5 HSF05A

The HSF05A has the following functions.

1. Terminating a LAP signal for use in setting a VCC, monitoring the MSCN in the MH-COM unit, controlling the MSD, etc. by way of the BSGC.
2. Generating various timing signals for use in the MH-COM according to the source clock (8 MHz) from the SYNSH.

FIG. 664 is the block diagram of the HSF05A. FIG. 665 shows the clock system of the SBMESH.

6. Protocol Performance Monitor 6.1 General Descriptions

The GWMESH performs a protocol performance monitor on the L2-PDU and L3-PDU. This protocol performance monitor is in accordance with the TR-TSV-1061 and TR-TSV-1063 (hereinafter referred to simply as TR-1061 and TR-1063) of the Bell Communication Research. This protocol performance monitor function is realized by the HLM03A PWCB. The protocol performance monitor function of the GWMESH is fundamentally the same as that of the SBMESH.

FIG. 666 is a block diagram showing the HLM03A for carrying out the protocol performance monitor function. The HLM03A is provided in the LP-COM described later. The HLM03A also performs the data collection function described later. FIGS. 667 and 768 show the outline of the functions of each block.

The HLM03A makes the check shown in FIG. 669 (the check name on the table corresponds to the name of the block diagram showing the functions of the HLM03A). The check result is displayed on the MSCN register shown in FIG. 666 and reported to the HLP07A (also provided in the LP-COM unit).

In addition to the check result shown in FIG. 669, the HLM03A displays on the MSCN register the following results.

initialization
LCA configuration
cross-connection cable missing
mate system power source fault
mate system fuse alarm
timeout of watch dog timer of a mate system HLP07A The items preceded by the check name=PCd shown in FIG. 669 are conditional check item, and are not checked unless the conditions meet. According to the conditions, an object cell should be valid, and each check item shown in FIG. 670 should meet an individual condition.

6.2 L2 Protocol Performance Monitor

The GWMESH carries out the protocol performance monitor of the following L2 parameters.

(1) MRI timeout
(2) invalid payload length error
(3) payload length error
(4) MID currently active
(5) EOM having an unapproved MID
(6) unexpected sequence number error When the HLM03A receives an error notification (described later in detail) from the ICLP unit, it performs the L2 protocol performance monitor by adopting the sum-of-errors algorithm in each input link for each of the above listed parameters (1)-(6).

Since the method of setting a threshold for the sum-of-errors algorithm and the method of realizing the counter and register defined in the TR-1061 and 1063 are basically the same as those in the descriptions of the SBMESH, the descriptions are omitted here.

When the HLM03A of the GWMESH receives an error notification (described later in detail) from the OGLP unit, an error count is defined for each parameter of the above listed (1), (4), and (5). Since the method of recognizing the counter and register used in counting errors are described for the SBMESH, it is not described here.

The above described error count is performed for each message handler MH.

6.3 L3 Protocol Performance Monitor

The GWMESH performs a protocol performance monitor on each of the following L3 parameters.

(1) invalid BA size field value (2) invalid DA type (3) invalid SA type (4) invalid protocol ID (5) invalid service type (6) invalid protocol discriminator (7) hop count 0

(8) invalid ingress interface type (9) BE tag mismatch

(10) BA size field not matching length field

(11) unavailable ISSI/ICI

When the HLM03A of the GWMESH receives an error notification (described later in detail) from the ICLP unit, it performs the L3 protocol performance monitor by adopting the sum of errors algorithm in each input link for each of the above listed parameters (1)-(10).

Since the method of setting a threshold for the sum-of-errors algorithm and the method of realizing the counter and register used in the sum-of-errors algorithm are basically the same as those in the descriptions of the SBMESH, the descriptions are omitted here.

The TR-1061 and 1063 requests the log at the occurrence of an error relating to each of the above listed parameters (2)-(8). The contents of the logs are listed below.

(a) error detection date (in the form of year, month, day, time, minute, and second)

(b) link ID (c) source address (including an address type)

(d) destination address (including an address type)

(e) special originating state

In the system of the present embodiment, the above listed (b) through (e) are set in the log register. The firmware reads the contents of the log from the register and report them to the software. The contents of the (a) above are not passed from the hardware to the firmware. When the firmware fetches the contents of the log other than the contents of (a) above, the time managed by the firmware is assigned to them. However, the contents are not reported to the software in the form of year, month, and day. This form is managed by the software.

The GWMESH reports the log of each error to the software when it is detected, and the log data retrieving function, etc. is realized by the software.

The TR-1061 and 1063 define the error count for each of the above listed parameters (2), (3), (9), and (10). The counting operation of this embodiment is the same as the sum-of-errors algorithm, and the same method of realizing the counter and register is used for the counting operation.

6.4 Protocol Performance Monitor in Incoming Unit 6.4.1 Processing Method

FIG. 671 shows the outline of the check items, operations at the detection of NG, and checking procedure in the incoming unit.

In FIG. 671, the "GROUP" shows the grouping of parameters. The group G has a unique GWMESH specification not defined by the TR-1061 and 1063 and indicates an error in the GWMESH internal process.

This process is performed by the HOM03A as described above. Error reports of various checks in the incoming unit are received from the ICLP unit. In addition, the HLM03A receives data, cell frames, and enable signals from the OCLP unit. FIG. 672 is a time chart of each signal. FIG. 673 lists the explanation of each signal.

As shown in FIG. 672, data are input from the ICLP unit in a 16-bit parallel cell format. Since one cell equals 54 octets in a switch (including the GWMESH), 1 cell of input data has the length of 27$\tau$through the 9M clock.

One cell consists of 3$\tau$ portion corresponding to an ATM header (it is in the internal format of the GWMESH and does not match a common ATM header format. As shown in FIG. 672, this portion contains the portion (source link ID) indicating the source link ID of the cell) and other 27$\tau$ portion. The contents of the cell shown in FIG. 672 indicate an example in which the cell is an inter-BOM cell.

Described below is the method of identifying the cell segment type in the ST identification block shown in FIG. 666. A segment type is identified by the combination of the SST and IST shown in FIG. 672. FIG. 674 shows the relationship between the combination and the segment type. The inter BOM refers to a BOM half-encapsulated in the SMLP unit and indicates an increase.

The method of determining errors in the error analysis block shown in FIG. 666 is basically the same as the contents described for the SBMESH. Therefore, the explanation is omitted here. However, the SBMESH identifies the SNI when an error is identified, while the GWMESH identifies the links. FIG. 675 is a time chart of an error analysis block process.

6.4.2 Detailed Process

1. L2/3 sum of err. count

2. L2/3 individual error count

Since the above described processes 1 and 2 are basically the same as the contents of the SBMESH, and are not explained here. For the SBMESH, the count-up operation, threshold comparison, and flag settings are performed in SNI units, while they are processed in source link units for the GWMESH.

6.5 Protocol Performance Monitor in Outgoing Unit 6.5.1 Process Method

FIG. 676 shows the outline of the check items, operations at the detection of NG, and checking procedure in the outgoing unit.

In FIG. 676, the "GROUP" shows the grouping of parameters as described above. The group E has a unique specification in the GWMESH internal process.

The protocol performance monitor counts errors for each parameter. The counting operation is performed for each source MH. However, the ISSI/ICI unavailable refers to a log object error.

This process is performed by the HOM03A as described above. Error reports of various checks in the outgoing unit are received from the OGLP unit. In addition, the HLM03A receives data, cell frames, and enable signals from the OCLP unit. FIG. 677 is a time chart of each signal. FIG. 673 lists the explanation of each signal.

The signal received by the outgoing unit is basically the same as each signal received by the ICLP unit to perform the protocol performance monitor in the incoming unit.

The format of the 3τ portion corresponding to an ATM header is the internal format of the GWMESH and does not match a common ATM header format. As shown in FIG. 677, this portion contains the portion (source MH ID) indicating the source MH of the cell and another portion (destination ID) indicating the destination link (destination link ID). FIG. 677 shows an example of the inter-BOM.

The error notification method of the MRI timeout is the same as that of the incoming unit. That is, a pseudo-EOM cell is generated in the OGLP unit, and an error notification reporting the MRI timeout is transmitted with the cell. The destination link ID in the pseudo EOM cell is the same as that of the corresponding BOM. The cell segment type identifying method if the same as that for the incoming unit as shown in FIG. 674. For each block shown in FIG. 666, this unit has the same function and performs the same operations as the incoming unit.

The "TRIAL" entered as data 15 in FIG. 677 in line τ is a field indicating whether or not the cell is a LINK-GWMESH PVC test cell, and the 2τ-th data 11 "TRIAL" is a field indicating whether or not the cell is a MESH-MH PVC test cell. If the cell is a LINK-GWMESH PVC test cell or a MESH-MH PVC test cell, none of the processes relating to the outgoing protocol performance monitor are performed.

6.5.2 Detailed Processes

The process of counting individual errors is the same as the process described for the SBMESH, and the descriptions are omitted here except the time chart shown by FIG. 678.

7. Network Data Collection 7.1 General Descriptions

The GWMESH collects data for the L2-PDU and L3-PDU. The data collection is almost in accordance with the TR-1061 and 1063. The data collecting function is realized by the HLM03A. FIGS. 666 through 668 are block diagram showing the HLM03A and the functions of each block.

7.2 Network Data Collection Parameter

The GWMESH keeps the network data collection (scheduled measurement made for each link) for each of the following parameters.

(1) Total originating 12 PDUs
(2) Total terminating 12 PDUs
(3) Total originating individually addressed L3 PDUs
(4) Total terminating individually addressed L3 PDUs
(5) Total originating group addressed L3 PDUs
(6) Total terminating group addressed L3 PDUs The above listed (1) through (6) indicate the count of L2 and L3 PDUs.

The GWMESH counts the number of PDUs as listed above as:

total originating (terminating) individually addressed L3 PDUs; and total originating (terminating) group addressed L3 PDUs.

If the total number of L3 PDUs is calculated, the software adds up these values.

According to the TR-1061 and 1063, one interval equals 15 minutes, and various data is stored at least for the past 2 intervals. Based on this definition, the GWMESH of the present embodiment provides two 15-minute counters as in the protocol performance monitor to use them when switching the operation phases. Within 15 minutes after issuing a phase switch instruction, the software retrieves a count value from the 15-minute counter corresponding to the 15-previous-minute register, and then stores it. That is, the software stores various data for at least the part two intervals.

7.3 Network Data Collection in Incoming Unit 7.3.1 Process System

In the above listed network data collection object parameters (1) through (6), three items (1), (3), and (5) are processed in the incoming unit.

The numbers of L2 and L3 PDUs of (1), (3), and (5) are counted regardless of the existence of errors in the L2-PDU or L3-PDU.

Since the incoming unit receives data in the cell format, the number of L2-PDUs can be easily counted for each link. The ST of the L2-PDU is analyzed and the number of the L3-PDUs is increased if the analysis indicates an inter-BOM. Then, the DA is analyzed to determine whether it is an individually addressed L3-PDU or a group addressed L3 PDU.

As in the protocol performance monitor, none of the processes relating to the ingress network data collections are performed if the cell is a MESH-MH PVC test cell and a cell copied in the GA copying process in the network data collection. Each block for timing generation, link identification, SA/DA identification, RAM and counter and SA/DA accumulation RAM are also used in the protocol performance monitor process. Each counter stores a count value in the dual port RAM (for each link and L2 and L3 PDU) as shown in FIG. 666 as in the protocol performance monitor process to read a necessary count value, increment the count value, and store the result in the RAM.

FIG. 679 is a time chart relating to the network data collection in the incoming unit.

7.3.2 Detailed Process

When a valid cell is received, the following processes are performed.

(1) An L2-PDU count value is read from the count value storage RAM and the value is incremented (+1).
(2) The incremented L2-PDU count value is stored in the RAM.

When a valid inter-BOM is received, the following processes are performed (1) An L3-PDU count value is read from the count value storage RAM and the value is incremented (+1). At this time, the DA is analyzed to be determined whether it indicates an individual address L3-PDU or a group address L3-PDU, and the count value is incremented.
(2) The incremented L3-PDU count value is stored in the RAM.

The count value is represented by 32 bits and the read/write in the RAM is performed twice in 16-bit units. The count value is incremented for each source link. A count is not incremented if the count value in (1) above indicates the maximum value. As described above, the L2-PDU and L3-PDU values are counted regardless of the existence of errors.

A parity is generated when a count value is stored, and is checked when the count value is read. FIG. 680 is a read/write timechart of count values relating to the network data collection in the incoming unit 7.4 Network Data Collection in the Outgoing Unit 7.4.1 In the Above Described Network Data Collection Object Parameters (1) Through (6) the Parameters to be Processed in the Outgoing Unit are Three Parameters (2), (4), and (6).

The count of the L2-PDU and L3-PDU for the (2), (4), and (6) is performed only on normal L2-PDU or L3-PDU having no errors.

Since data is input to the outgoing unit in a cell format, the number of L2-PDU can be easily counted for each link and the ST of the L2-PDU is analyzed. If it indicates an inter-BOM, the number of L3-PDUs is incremented. Simultaneously, the DA is analyzed and it is determined whether the DA indicates an individual address L3-PDU or a group address L3-PDU.

If the cell is a LINK-SBMESH PVC test cell or a MESH-MH PVC test cell, none of the processes for the outgoing network data collection are performed. The outgoing network data collection (NDC) unit of the HLM03A also counts the L2-PDU and L3-PDU for billing data. However, the L3-PDU for billing data is counted only for the total terminating L3-PDUs.

7.4.2 Detailed Processes

When a normal cell having no errors is received, the following processes are performed.

(1) An L2-PDU count value is read from the NDC count value storage RAM and is incremented (+1).
(2) The incremented L2-PDU count value is stored in the RAM.
(3) An L2-PDU count value is read from the billing data count value storage RAM and is incremented (+1).
(4) The incremented L2-PDU count value is stored in the RAM.

When a normal inter-BOM is received, the following processes are performed.

(1) An L3-PDU count value is read from the NDC count value storage RAM and is incremented (+1). At this time, the DA is analyzed to be determined whether it indicates an individual address L3-PDU or a group address L3-PDU, and the count value is incremented.
(2) The incremented L3-PDU count value is stored in the RAM.
(3) An L3-PDU count value is read from the billing data count value storage RAM and is incremented (+1).
(4) The incremented L3-PDU count value is stored in the RAM.

The count value is represented by 32 bits and the read/write in the RAM is performed twice in 16-bit units. The count value is incremented for each destination link. A count is not incremented if the count value in (1) above indicates the maximum value. A parity is generated when a count value is stored, and is checked when the count value is read.

FIG. 681 is a read/write timechart of count values relating to the network data collection in the outgoing unit.

8. Billing

In a billing process, usage information required to support the billing function for the SMDS covering a plurality of carriers between, for example, the XA and SMDS and between the BBC and ILEC, is generated and the usage measurement process is performed. FIG. 682 shows the classification of billing functions and their procedures.

8.1 Data Generation (1) Generation for Individual Address Data Transfer

Billing point (refer to FIG. 683)

1. Switching system SS for transferring the ICIP L3-PDU directly to another LEX network or an IC network in the sending LEC network.

2. Switching system SS for transferring the SIP L3-PDU directly to the destination SNI in the destination LEC network. However, each SBMH contains the billing function for the intra-station SMDS and the terminal usage information is generated in the SBMH so that the functions can be shared.

Billing object

The billing process is performed only on the data determined as successfully transferred L3-PDU according to the protocol check, feature processing results, etc.

Billing information

The usage information containing the information shown in FIG. 684 is generated in packet units.

(2) Generation for Group Address Data Transfer

Billing point

1. SS for transferring each ICIP L3 PDU of a GA and its copy directly to another LEC network or a selected IC network.

2. SS for transferring a copied SIP L3 PDU to the destination SNI according to the GA.

Billing object

The billing process is performed only on the data determined as successfully transferred L3-PDU according to the protocol check, feature processing results, etc.

Billing information

The usage information containing the information shown in FIG. 684 is generated in packet units.

(3) Contents of Usage Information destination address destination address consisting of an address type and address subfield address type='1100': individual address='1110': group address source address A source address consists of an address type and an address subfield.

address type='1100'

SNI address

If the LEC is a GA agent, an individual address of a GA member is set.

Unless the LEC is a GA agent, an individual address is set.

State code

A transfer state of the ICIP or SIP L3-PDU. "1" indicates normal transfer.

Identification of outgoing network

Destination carrier of an ICIP L3-PDU (LEC and IC)

Identification of the settings of outgoing ICI transfer paths

Identification of ICI transfer path which sent an ICIP L3-PDU

Identification of incoming network

Source carrier of an ICIP L3-PDU (LEC and IC)

Identification of the settings of incoming ICI transfer paths

Identification of ICI transfer path which received an ICIP L3-PDU

Identification of carrier

Set is an ICI assigned by the service specific unit of the L3-PDU header described in 5.5.1 of the TR-1060.

Segment count

Number of transferred L2 PDUs

Packet count

Number of transferred L3 PDUs

Ingress interface type

Determination of the code in the incoming/outgoing network identification. If the destination is an IC, the type is "CIC". If the destination is an ILEC, the type is "NECA".

FIG. 684 shows the usage information generated in the LEC network for an inter-carrier SMDS.

8.2 Data Aggregation

The usage information of an inter-network SMDS is added at time intervals predetermined in the LEC network for the successfully transmitted L3-PDU between a specified SA and DA.

Time interval=1 minute (same as SBMH)

Combination of usage information=64K (maximum)

Cell and packet count=24 bits (maximum)

Considering the combination of the usage information required to collect billing data, the variations of the combination of SA and DA, each being represented by 64 bits, amounts to $2^{64}\times2^{64}$. This requires a lot of memory. Therefore, assuming that up to 64K combination of usage information can be obtained, the memory can be distributed as follows.

$$RDA(SIP)+RDA(ICIP)+RSA+RCA=64K\times(SA64\text{ bits}+DA(SIP)64\text{ bits}+DA(ICIP)64\text{ bits}+\text{carrier information 37 bits})$$

where the carrier information can be 16-bit incoming NW ID, 16-bit incoming ICI TPS, 16-bit outgoing ICI TPS, and 8-bit ingress inf. type.

Since eight exclusive links of the ISSI/ICI is supported by the GWMESH, the outgoing NW ID and the outgoing ICI TPS can be collectively represented by 3 bits. The lower two bits are used for the ingress inf. type. Therefore, the entire carrier information is represented by 37 bits. FIG. 685 shows the SA, DA (SIP), DA (ICIP), and carrier information compressed memory image.

A total number of the L2-PDUs and L3-PDUs are written for each address to the billing data accumulation memory. The billing data accumulation memory is accessed by the firmware to collect the billing information. Practically, this memory has a duplex configuration and the firmware issues a phase switch instruction at predetermined intervals (every minute). If the memory becomes full before a predetermined time is reached, then the phases are switched immediately. The hardware gains access in one phase and the firmware retrieves each data in the other phase. The numbers of the L2-PDU and L3-PDU can be written to the billing data accumulation memory for each output link. FIG. 686 shows the memory image.

The above described billing function is realized in the network data collecting unit, that is, the HLM03A.

9. LP-COM (INF)

9.1 General Descriptions

The LP-COM has the following functions.

(1) Interfacing with the INF to control the ICLP and OGLP (2) Billing process (3) Performance monitor and data collection (traffic monitor)

Physically, it comprises the following three PWCBS.

(a) HLP07A (b) HLM02A (c) HLM03A

The above listed functions (1) through (3) are performed in the PWCB of (a) through (c) respectively. The HLM02A uses the HLM00A in the SBMESH, but does not perform an actual billing process.

Refer to chapter 8 for the billing process, chapter 6 for the performance monitor, and chapter 7 for the data collection.

Described in this chapter are the interfacing function with the INF and controlling function of the SMLP and RMLP, that is, the HLP07A.

9.2 Outline of Functions

FIG. 687 is a block diagram showing the HLP07A. FIGS. 688 and 689 show the functions of each block of the HLP07A.

The important functions of the HLP07A are listed below.

interfacing with the INF setting and managing the LP and each table monitoring errors in the LP and LP-COM controlling states 9.3 INF Interface Control Unit 9.3.1 INF Interface Control Listed below is the control procedure of the interface using the INF between the GWMESH (MNG-Firm) and BCPR.

a. INF Command Activation (1) A DMA is set on the CPU (microprocessor).

(2) When a command is activated in an INF order, the BCPR specifies with the MM address shifted 2 bits to the right (0, 4, 8 are shifted to 0.1.2). Therefore, when the INF is received, the SBMESH performs the following processes.

1. When a command activation is recognized the MM address and the number of commands are received from port A of the SBIF LSI.

2. The MM address is set in the port B of the SBIF LSI with the higher, intermediate, and lower orders shifted.

3. The transfer length (number of commands×4 words) is set in the port F of the SBIF LSI.

4. The DMA read start is set in the port C of the SBIF LSI.

b. INF Status Notification

The MM address specified in the status notification is shifted 2 bits to the right (0, 4, and 8 are shifted to 0, 1, and 2), and is specified by the receiving buffer notification. The message length is from MSB for the left to LSB for the right in the BCPR memory. The GWMESH performs the following operations.

(1) The MM address is set in the port B of the SBIF LSI with the higher, intermediate, and lower orders shifted.

(2) The transfer length (number of commands×4 words) is set in the port F of the SBIF LSI.

(3) The DMA read start is set in the port C of the SBIF LSI.

The MM address and message length specified in the command and status are as follows.

(1) The MM address specified in the command is shifted 2 bits to the right.

(2) The message length is from MSB for the left to LSB for the right in the BCPR memory.

(3) All data except the MM address is defined in the interface specification.

The status notification is set similarly. The MM address is the same as that specified in the reception buffer notification.

The notification of the status queue address and reception buffer address is as follows.

(1) The BCPR notifies the GWMESH of the MM addresses of a status queue and reception buffer.

(2) The MM address is shifted 2 bits to the right.

9.3.2 INF Interface Interruption Control

Described below is the interruption control in controlling the INF interface in the GWMESH.

a. Command Activation

The command activation is processed through an interruption, that is, an external interruption INTO. The INTO interruption is reset by 3-word read from port A.

b. Transmitting a Status

When a log object error occurs, a log status arising from the MSR-firm is transmitted.

c. Controlling DMA

The DMA is controlled by a DMA controller. The available DMA channel is 0. The DMA termination is used as an interruption and look-in. The interruption is controlled by the INT bit of the DMA control register in the CPU.

Since the DMA transfer speed of the INF is 4 Mbytes/sec, the 4-byte DMA read (tail pointer look-in, etc.) terminates in 1μ second with an 8-MHz CPU clock. Therefore, the DMA termination is not attained by an interruption, but by a look-in.

9.4 Controlling ICLP/OGLP

The control of the ICLP/OGLP, that is, the state control information from the HLP07A to the ICLP/CGLP, is listed as follows.

ACT/SBY (active/standby) of the home system

Shelf No. (0-3) of the home shelf (shelf number)

Reset at initialization

Fault reset to various checkers

Settings to various MSD tables

Resettings to various MSD tables

Hardware INHBIT state signal (masking a hardware operation according to an inhibition signal)

The HLP07A additionally collects the MSCAN information from each package PKG in the ICLP/OGLP to monitor the state.

10. Software Interface 10.1 Initialization

The software performs the following two types of initialization on the GWMESH.

1. Initialization of MH-COM
2. Initialization of LP

First, the software initializes the MH-COM through the LAP, and then initializes the LP through the INF.

10.1.1 Initialization of MH-COM

The device control of the E-MSD/E-MSCN relating to the MH-COM is performed through the intra-station communications using the simple LAP (EZLAP). The fixed value shown in FIG. 690 is used as a VPI/VCI of the intra-station communication.

One EZLAP link is established each in systems 0 and 1 between the BSGC and MHCOM. The intra-station communications cells for systems 0 and 1 are input to both links.

An MH-COM accepts at the IDMX a cell having switching tag information addressed to the MH-COM. Since intra-station communications cells for systems 0 and 1 have different VCI values, a cell to be processed in the home system is identified by a VCI value and discards the cells for a mate system.

The VCI value of the intra-station communications cell for system 0 is the same as that for system 1 at the BSGC, and the cells are distinguished by the COM-bit "1" for the cell fetched by a home system and the COM-bit "0" for the cell fetched by a mate system (refer to the explanation in FIG. 410). The system fetches a cell addressed to it and discards a cell addressed to a mate system.

10.1.2 Initialization of LP

The LP is initialized through the INF.

10.2 INS Process

In the GWMESH, the MH-COM and LP can have system configurations independently. Therefore, the MH-COM and LP independently perform the INS process (in-service process).

10.2.1 INS Process of MH-COM

The MH-COM is controlled using the EZLAP. The main process in the INS process of the MH-COM is to copy a VCC.

10.2.2 INS Process of LP

Only the initialization is performed in the INS process of the LP.

10.3 Switching Systems

Systems are switched in the GWMESH as follows

1. Switching systems by switches in the MH-COM
2. Switching systems independently of the MH-COM 10.3.1 Switching Systems in MH-COM The MH-COM is interlocked with switches and receives a system switch signal through the ASSWSH. Therefore, the system switching procedure of the MH-COM is the same as that of the ASSWSH.

10.3.2 Switching Systems in LP

The ACT is changed in the INFA.

10.4 Fault Monitor 10.4.1 Fault Monitor in MH-COM

The faults in the MH-COM is reported to the BCPR in the MSCN format using the EZLAP. The MSCN contains home system monitor information and mate system monitor information for different processes.

FIG. 691 shows the operation to be performed when the MH-COM is faulty.

10.4.2 Fault Monitor Relating to INF Communications

The fault monitor on the INF communications are performed in accordance with the BSGC process, and is not described in detail here.

10.5 Test and Diagnostics

The tests of the GWMESH are the same as those of the SBMESH as listed below.

1. Test using a TCG
2. PVC test between ICI/ISSI and GWMESH
3. PVC test between SBMESH or GWMESH and GWMESH
4. Inter-station loopback test Fundamentally, test 1 is conducted periodically and tests 2, 3, and 4 are conducted at the request and complaint (claim), etc. of the subscriber.

10.5.1 Test Using TCG

Like the SIFSH, BSGCSH, SBMESH, etc. connected to the highway of another ASSW, the GWMESH has the function of automatically MUXing a test cell input from the ASSW again in the 155M highway immediately after the DMUX, and looping it back to the ASSW. The test cell generated and output at the TCG has the information shown in FIG. 692 in the header field. The rightmost bit in FIG. 692 indicates an 0 bit. The 0 bit of 1 indicates that the cell is a test cell.

Examples of loopback tests of a TCG cell in the GWMESH are explained by referring to the function image charts shown in FIGS. 693 and 694.

The following processes (1) and (2) are performed in the IDMX (ODMX) of the GWMESH.

(1) Data matching according to the TAGC information is fetched (2) data matching according to the TAGC information and having an 0-bit=1 is fetched.

The cell fetched under the condition (1) above is transmitted to the ICLP (OGLP). A cell is discarded if its 0 bit indicates 1, and other cells are processed in a normal routing process. The cell fetched under the condition (2) is looped back in the GWMESH according to the value of the above described 0 bit. The cell is then MUXed and looped back by the ASSW after passing through the VCC of the GWMESH. Unless the VCC for the test cell is set at the MUX, the loopback process is not performed. FIG. 693 shows the function image of only one system. The same image is shown for the duplex GWMESH. In this test, the normality of the switching at the intersection of the ASSW, and the normality of the DMUX and MUX of the GWMESH and SIFSH are checked.

The operation of the test shown in FIG. 693 is described. First, the test cell generated and output by the CGSH has a $VCI_1$, and the 0 bit indicates 1. The above described $VCI_1$ specifies the path between the TCGSH and the IDMX of the GWMESH. Since the test cell is fetched under the conditions (1) and (2) above, and the 0 bit of the test cell fetched under the condition (2) indicates 1, it is looped back to the OMUX.

The VCC is provided at the input terminal of the OMUX and the routing information of the test cell is converted from $VCI_1$ into $VCI_2$ and is output to the ASSW. The $VCI_2$ specifies the path between the OMUX of the GWMESH and the DMX of the SIFSH. As in the GWMESH, the test cell is looped back to the MUX in the SIFSH according to the 0 bit of 1. The test cell is converted from $VCI_2$ into $VCI_3$ in the VCC provided at the input terminal of the MUX of the SIFSH and output again to the ASSW. The $VCI_3$ specifies the path between the MUX of the SIFSH and the IDMX of the GWMESH.

The GWMESH loops back the test cell to the OMUX as described above, and then converts it from the $VCI_3$ into the $VCI_4$ and outputs it to the ASSW. The $VCI_4$ specifies the path between the OMUX of the GWMESH and the TCGSH.

Thus, the TCGSH checks the normality of the IDMX and OMUX of the GWMESH (as well as the DMX and MUX of the SIFSH) by receiving the test cell output by the TCGSH itself.

The operation of the test shown in FIG. 694 is fundamentally the same as that shown in FIG. 693. In this test, the LOOPS replaces the SIFSH and checks the normality of the IMUX and ODMX of the GWMESH. The above described LOOPS corresponds to the LLP shown in FIG. 9.

10.5.2 PVC Test Between ICI/ISSI and GWMESH

Since the trunk of the ICI/ISSI, etc. may be used in other MHs, a test is not conducted in the OUS (out of service) state of the line, but is conducted in the INS (in-service) state. FIG. 695 shows the functional image of the GWMESH in the ICI/ISSI-GWMESH PVC test.

In this test, the firmware transmits to the OGLP a test cell having the VCI=xxFF(h) (x indicates an optional value) at the instruction from the software. In the OGLP, the test cell is determined to be a test cell if the VCI value of an input cell is xxxx xxxx 1xxx xxxx (b). The routing process is performed on the test cell as if it were a normal user cell, and the test cell is transmitted to the requesting (claiming) trunk. The following operations 1 and 2 are not performed on the test cell.

1. predetermined operation on the BA size or length (a predetermined value is subtracted depending on the segment type)
2. Protocol check of L2

The test cell which is output by the GWMESH, passes through the ASSW (downwards), and arrives at the SIFSH is looped back at a predetermined trunk of the SIFSH, and output to the ICLP of the GWMESH for the trunk. The predetermined trunk of the SIFSH has the function of looping back the cell having the VPI/VCI which refers to a PVC test cell.

In the cells received at the ICLP, the cells whose service types are 48 or 60 are not copied for their BE tags. Furthermore, the cells whose DAs indicate their home SS station numbers and whose service types are 48 or 60 are not processed in a predetermined operation relating to the BA size and length. Then, the VCI value of the above described cell is converted into xxFF(h). The reception of the test cell is reported to the firmware at the MSCN.

Only the cell having the VCI=xxFF(h) is filtered and fetched by receiving unit of the firmware. The firmware reports the storage position of the received test cell data and has the test result checked by the software. The VCI value of the test cell passed to the highway is not stored in the VCC unlike a normal cell. Therefore, it is discarded at the VCC.

In the PVC test, the VPI/VCI is obtained from the actual service cell. Therefore, during the test, a cell having a VPI/VCI except the test VPI/VCI can be used for service, but cannot be used for service if the cell has the test VPI/VCI In the GWMESH, the VPI/VCI values for service are 03F(h) for the VPI, and 0300(h) through 0307(h)(ISSI) and 0310(h) through 0317(h)(ICI) for the VCI.

10.5.3 SBMESH/GEMESH—GWMESH PVC Test

This function is the same as the PVC test function between the MESH and MH of the SBMESH. The combination of the SBMESH and GWMESH is listed below.

(a) SMLP-RMLP
(b) SMLP-OGLP
(c) ICLP-RMLP
(d) ICLP-OGLP

FIG. 697 shows the image of the PVC test between the SBMESH/GEMESH and GWMESH.

In this test, the firmware transmits to the ICLP a test cell having the VCI=xxFF(h) (x indicates an optional value) at the instruction from the software. In the ICLP, the test cell is determined to be a test cell if the VCI value of an input cell is xxxx xxxx 1xxx xxxx. The routing process is performed using the DA on the test cell as if it were a normal user cell, and the test cell is transmitted to the requesting (claiming) SBMH and GWMH. The BE tag copy and protocol check of layers 2 and 3 are not made for the test cell.

The test cell looped back at the LLP in the SIFSH shown in FIG. 696 is transferred to the SBMH and GWMH in which the PVC is set, and arrives at the corresponding RMLP or OGLP according to the DA (destination address) described in the test cell. In the cells entered in the RMLP or OGLP, those having the test DA value preliminarily specified by the firmware is converted into the VCI=xxFF(h).

Only the cell having the VCI=xxFF(h) is filtered and fetched by receiving unit of the firmware. The firmware reports the storage position of the received test cell data and has the test result checked by the software. The VCI value of the test cell passed to the highway is not stored in the VCC unlike a normal cell. Therefore, it is discarded at the VCC.

The following two types of the DA values are used in this test.

1. An allocated DA value

2. A specific DA value specifically determined for the test

Since the VPI/VCI used in the test using 1 above are the same as the actual service cell, the test cell and normal cell cannot be distinguished by their VPI/VCI. Therefore, the cell having the test VPI/VCI cannot be used for service.

In the test using 2 above, an exclusive internal VCI value is defined for the above described specific DA. Therefore, the test cell can be clearly distinguished from a normal service cell, and the normal service cell does not have an undesirable influence in the test.

In the GWMESH, the VPI/VCI values for service are 03F (h) for the VPI, and 0340(h) through 035F(h) for the VCI.

10.5.4 Inter-Station Test

FIG. 697 shows the function image of the GWMESH in the inter-station test.

In this test, the firmware transmits to the OGLP a test cell having the VCI=xxFF(h) (x indicates an optional value) at the instruction from the software. In the OGLP, the test cell is determined to be a test cell if the VCI value of an input cell is xxxx xxxx 1xxx xxxx. The routing process is performed on the test cell as if it were a normal user cell, and the test cell is transmitted to the inter-station interface (ISSI and ICI). No operations are performed relating to the BA size or length, or no protocol checks are made.

The test cell input to the destination station via an inter-station transmission line is transferred to the ICLP of the GWME in which the PVC is set. In the cells received at the ICLP, the cells whose service types are 48 or 60 are not copied for their BE tags. Furthermore, the cells whose DAs indicate their home SS station numbers and whose service types are 48 or 60 are not processed in a predetermined operation relating to the BA size and length. Then, the VCI value of the above described cell is converted into xxFF(h). The reception of the test cell is reported to the firmware at the MSCN.

The firmware recognizes the reception of a test cell by the MSCN. Only the cell having the VCI=xxFF(h) is filtered and fetched by receiving unit of the firmware. The firmware reports the storage position of the received test cell data. The software exchanges the DA and SA and returns the test cell to the source. The result is reported to the software through the firmware Thus, a loopback test covering a plurality of stations is conducted. Since the test is a PVC test, the VPI/VCI of the actual service cell is used. The test cell and a normal cell can be distinguished by a service type, and the test can be conducted during the service operation.

In the GWMESH, the VPI/VCI values for service are 03F (h) for the VPI, and 0300(h) through 0307(h)(ISSI) and 0310 (h) through 0317(h)(ICI) for the VCI. Since the ES, hop count ID, and carrier ID similar to those of other user cells are rotated in the hardware in the OGLP, the values set by the firmware are inversely rotated so that correct values can be obtained by the rotation in the hardware.

10.5.5 Test Functions of Each Unit

Summarized below are the functions of each unit required for the above described tests.

1. In the ICLP;
   - Service type of 48 or 60
   - (1) A BE tag is not copied.
   - DA for SS of home system and service type of 48 or 60
   - (1) Converting VCI into xxFF(h)
   - (2) Reporting to MSCN
   - (3) No process for BA size or length
   - VCI value of xxxx xxxx 1xxx xxxx
   - (1) Mask in protocol check (layers 2 and 3)
   - (2) Routing with DA (DA of user cell)
   - (3) BE tag is not copied.
2. In the OGLP;
   - Test DA reported by firmware
   - (1) Converting VCI into xxFF(h)
   - VCI value of xxxx xxxx 1xxx xxxx
   - (1) Mask in protocol check (layer 2)
   - (2) No process for BA size or length
3. In the firmware;
   - Since the ES, hop count ID, and carrier ID are rotated in the hardware, the values are inversely rotated in consideration of the rotation in the hardware.

10.5.6 Self-Diagnostics

The self-diagnostics can be made by the MH-COM and LP.

The self-diagnostics of the MH-COM checks the normality of the fault-monitor system. That is, it is to confirm that no fault flag in the MSCN in a normal state, and to confirm the fault flag in the MSCN for the process performed for a pseudo-fault point of the MSD.

The self-diagnostics of the LP confirms the normality of the fault monitor system and conducts a data transparency test in the LP using a test cell.

The normality test of the fault monitor system is to confirm that no fault flag in the MSCN in a normal state, and to confirm the fault flag in the MSCN for the process performed for a pseudo-fault point of the MSD.

In the data transparency test of the LP, a test cell is output from the test cell multiplexing unit of the ICLP and OGLP, and checked are the cell, NDC data (network data collection data), and billing data after the incoming process and outgoing process are completed.

<Part 7>

In part 7, the broadband signaling group controller (BSGC) is described in detail.

1. General Descriptions

The broadband signaling group controller shelf (BSGC) terminates a layer 2 protocol in the communications of the control information with each subscriber terminal unit and each intra-station device under the control of the broadband call processor (BCPR) (refer to FIG. 698) which function as switch processor. A single BSGC terminates LAPD communications ports 256 through 1024.

The BSGCSH accommodates six BSGCs per system. That is, a single BSGCSH can accommodate 2048 through 8192 LAPD communications ports.

1.1 Positions of BSGCSH and BSGC in Switch System

FIG. 698 shows the position (shown as patched portions) of the BSGCSH and BSGC in the switch system according to the present embodiment.

FIG. 699 shows the terminal point of the intra-station LAPD communications.

FIG. 700 shows the terminal point of the subscriber LAPD communications.

1.2 Sharing Functions of BSGC

The BSGC shares the four important functions listed below.

(1) Communications with the BCPR through the INF (2) Terminating the layer 2 of each communications control under the control of the BCPR (3) Initializing and monitoring the port for an intra-station communications link (4) Establishing interface with the ATM switch through the CARP LSI function and the VCC function loaded onto the BSGC 1.2.1 Functions of INF The BCPR and BSGC are switch processors shown in FIG. 698, and the communications between them are interfaced through an interface (INF). The PIF comprises an interface type T (INFT) and interface type A (INFA) as shown in FIG. 698

The INFT is an interface connected to the system bus (TOX-BUS)(refer to FIG. 698) and realizes interface with a device in the BCPR. The interface is of an ECL (emitter-coupled logic) balanced transmission type (32 MHz 1-bit data serial). The INFT consists of four interface terminals and connected to up to four lower order devices with four TD cables. A signal is multiplexed for four highways in each TD cable.

The INFA is located in the INFT to extend the functions of the interface with the communications line device, and controls the interface between the BCPR and the communications line device (BSGC). The interface can be the V.11 balanced transmission system (4 MHz, 8-bit data serial). The 32 Mbps interface in which a signal multiplexed by the INFT for four highways is demultiplexed into 4 Mbps interfaces for individual highways.

Up to four INFAs can be connected to one INFT, and up to four BSGCs can be connected to one INFA.

1.2.2 Functions of LAPD

The BSGC terminates a layer 2 protocol in the communications of control information with each subscriber terminal and each intra-station device under the control of the BCPR.

A subscriber terminal refers to a B-ISDN terminal in a user network interface (UNI) or a frame relay (FR) terminal at the SVC. An intra-station control device refers to a SISFH (refer to part 3), remote multiplex shelf (RMXSH)(refer to FIG. 34, etc.), message handler shelf (MESH, that is, SBMESH and GWMESH)(refer to parts 5 and 6), subscriber line interface (SINF), DS3-SMDS interface (DS3)(refer to part 2), frame relay interface (FR), etc.

1.2.3 Intra-Station Control Communications Link

The BSGC terminates the layer 2 in the communications of the control data between the BCPR and all intra-station devices. The communications protocol can be the simple LAPD using a UI frame. To prevent a missing signal, the BCPR and each intra-station device performs a layer 3 missing message monitor process.

A simple LAPD protocol is adopted to reduce the load on the LAPD communications of each intra-station device.

The intra-station control communications can be established by simplex devices or duplex devices.

In the simplex device communications, a signal of an active system passes through the ASSWs (ATM switch) of both active and standby systems. The object devices are various intra-station devices such as a SINF, DS3, DS1 frame relay interface (DS1FR).

In the duplex device communications, a system-specific signal passes through the ASSW (ATM switch) of each of the active and standby systems. The communications are established through both active and standby systems of each duplex device and two ports for the active system of the BSGC. This system is used to improve the reliability through a duplex communications link in preventing the occurrence of a fault in both systems from a fault in the cross-connection unit of the duplex device. The object communications device can be a SIFCOM in the SIFSH-A (refer to part 3), message handler shelf (MESH, that is, SBMESH and GWMESH) (refer to parts 5 and 6), remote multiplex shelf (RMXSH) (refer to FIG. 34), etc.

1.2.4 Interface with ATM Switch

As described in 10.3 in part 2, the BSGC sets an intra-station communications link to the DS3-SMDS interface using a VPI/VCI value assigned by the switch software.

Tag information required in routing an intra-station communications cell from the SIFSH to the BSGC is added by the virtual channel converter (VCC) in the SIFCOM (refer to FIG. 8).

Tag information required in routing an intra-station communications cell from the BSGC to the SIFSH is added by the virtual channel converter (VCC) in the common unit (BSGC-COM) of the BSGC.

However, when the BSGC communicates with the MESH or LLP (refer to FIG. 699), the BSGC performs the VCC conversion in both directions.

The VCC is loaded into each of the duplex units of the SIFSH, BSGCSH, and MESH.

1.2.5 Meta-Signaling Communications

The BSGC provides a port for meta-signaling communications established to a user network interface (UNI) terminal unit (subscriber terminal unit). The VPI/VCI for use in the procedure of the meta-signaling communications between the BSGC and UNI terminal units can be assigned and communicated by the BCPR. The BSGC does not analyze a meta-signaling message.

1.3 Number and Assignment Condition of BSGC Port

The port type of the BSGC and the number of ports per BCPR are listed below.

1.3.1 Maximum Number of Ports (1) Intra-station control communications LAPD port The intra-station control communications ports can be simplex device ports or duplex device ports.

(a) Duplex device communications port

SIFSH: 2 (daisy chain)×14 (highway)×2 (ACT/SBY)=56 (including SIFSH for loop)

MESH: 4 (daisy chain)×2 (highway)×2 (ACT/SBY)=16

RMXSH: 16 (RMXSH)×2 (ACT/SBY)×2 (redundancy)=64

(b) Simplex device communications port

SINF: 8 (SINF)×2 (SIFSH)×14 (highway)=224

DS3: 8 (daisy chain)×2 (SISFH)×14 (highway)=224

FR: 4 (DSI)×8 (DTC)×4 (MUX)×2 (FIFSH)×14 (highway)=3584

FR accommodated by RMXSH: 4 (DSI)×8 (DTC)×4 (MUX)×2 (SIFSH)×16 (RMXSH)=4096

(2) Subscriber control communications LAPD port (a) UNI B-ISDN terminal unit 20 (TE)×8 (SINF)×2 (SIFSH)×14 (highway)=4480

(b) FR at SVC: Same as the FR (3584) of (1)(b), and the FR (4096) accommodated by the RMXSH (c) Meta-signaling: Same as the SINF (224) of (1)(b)

1.3.2 Required Number of Ports (1) Common Units

SIFCOM: 2 ports (ACT/SBY) for intra-station control communications

MESH common unit: 2 ports (ACT/SBY) for intra-station control communications

RMXSH common unit: 4 ports (ACT/SBY and SIFSH) for intra-station control communications (2) Individual Unit SINF: 2 ports for intra-station control communications and meta-signaling; and n ports for connected terminals DS3: 1 port for intra-station control communications FR/SMDS: 1 port for intra-station control communications; and additional 1 port if the SVC is performed.

1.3.3 Transfer Speed Between BSGC and Other Devices (1) The transfer speed between the BSGC and BCPR (INFA) is 4 Mbyte/sec. The execution speed is approximately 2 Mbyte/sec.

(2) The clock rate of the ATM switch control LSI is 2 Mbyte/sec.

(3) The band for the ATM switch is 1 Mbyte/sec.

(4) The communications between the BSGC and ATM switch are established after the communications procedure is determined between the BCPR (BSGC) and each intra-station device so that signals may not be stagnant in the BSGC. To prevent the signals from being stagnant in the BSGC, the number of ports accommodated in the BSGC are specified as follows (in the case of peak rate assignment).

(a) 1,024 16-Kbps ports to be accommodated (b) 256 64-Kbps ports to be accommodated (c) 128 128-Kbps ports to be accommodated (d) 64 256-Kbps ports to be accommodated The communications speed of the intra-station control communications link is 64 Kbps. Since the shortage of the band is expected in consideration of the concentration rate of the RMXSH, the communications speed can be altered by a command from the BCPR.

1.3.4 Throughput of BSGC and Port Assignment Condition

The throughput of the BSGC is approximately 200 messages per second. The ports accommodated by the ESGC should be assigned under careful consideration of the throughput of the BSGC and the transfer speed indicated in 1.3.3. The subscriber signaling band for use in a signaling process is assigned likewise.

2. Outline of Functions of BSGCSH 2.1 Specification

FIG. 701 shows the outline of the functions of the BSGCSH.

2.2 Higher Order Interface (INF Interface)

As explained in 1.2.1, the communications are set between the BSGC and BCPR through the INF.

2.2.1 Hardware Configuration Under Control of INF (Peripheral Interface)

FIG. 702 shows the connections of the hardware among the BCPR, INF, and BSGC.

2.2.2 INF Interface Control Procedure

The peripheral (INF) interface can be controlled by the BCPR through an order and DMA transmission.

The ordering function can be realized as the function of the SBIF LSI in the BSGC. The orders relating to the BSGC include the followings.

(1) specifying an individual system to specify an active/standby system of the BSGC (2) resetting BSGC (3) instruction to the BSGC (a) command activation: notification request for a command group generated by the BCPR (b) retry instruction: retransmission request when a DMA access error occurs (c) MSCN read: request to read through MSCN (d) test loopback: write request of test loopback data (e) reading test loopback data: request to read test loopback data FIG. 703 shows the control sequence between the BSGC and BCPR.

The DMA transfer is activated by a command activation order (step 2). Then, the command group stored at the address in the BCPR memory reported by a command from the BCPR (step 1) is DMA transferred (step 3) to the memory in the BSGC under the control of the BSGC through the SBIF LSI and 80186 DMA function in the BSGC, and each command is processed (step 4). The transferred command group contains a plurality of commands, and the command instructs various requests from the BCPR to the BSGC. A command group is notified from the BCPR to the BSGC at 8-sec intervals. When the command group has been transferred, a command group reception notification is transferred from the BSGC to the BCPR (step 5).

When the BSGC generates an event to be provided for the BCPR, it generates a status (step 6), and a plurality of status notifications are reported to the BCPR in 8-msec units as status groups (step 7). The BCPR performs a reception process for the reported status (step 8). This is reported as a DMA transfer to the address of the memory in the BCPR preliminarily specified by a command from the memory in the BSGC.

2.3 Switch Interface (CARP and VCC Interface)

An intra-switch layer 1 is controlled by the CARP LSI mounted in the BSGC. The LSI has the function of assembling and disassembling a frame of an ATM adaptation layer (AAL) protocol type 3, 4, or 5.

The highway in the switch is determined by the VCC loaded into the BSGC-COM in the BSGC (BSGC common unit), the VCC loaded into the SIFCOM in the SIFSH, and the VCC loaded into the common unit in the MESH as shown in FIG. 704. The contents of the VCCs are set by the switch software executed by the BCPR.

2.3.1 Hardware Configuration for Controlling Intra-Switch Duplex Device

FIG. 704 shows the configuration of the hardware configuration for controlling an intra-switch duplex device.

2.3.2 Intra-Switch Signal Control

The BCPR preliminarily notifies the BSGC of the attribute of each port and a VPI/VCI. The BSGC initializes each port according to specified information.

The CARP sets an ATM cell header according to the specified VPI/VCI.

The switch software executed by the BCPR sets the contents of the VCC loaded into the BSGC-COM in the BSGC, the VCC loaded into the SIFCOM in the SIFSH, and the VCC loaded into the common unit in the MESH.

The functions of the VCC are listed below.

(1) The VCC is set by the BSGC, SIFSH, and MESH according to the instruction of the BCPR.

(2) The VCC is positioned in the duplex BSGC, SIFSH, and MESH. The VCC table of the two systems is copied by each device.

(3) The VCC is controlled by the BSGC having the smallest number.

The intra-switch control system is applied if it successfully reduces the loss of cells by switching the systems of ATM switches by transmitting the same signal to the ATM switches of active and standby systems.

The signal system model is shown as follows.

2.3.2.1 Signaling Control Model (Including Simplex Device)

In this model, a control signal relating to a simplex device and subscriber is transferred in an ATM switches of both active and standby systems.

FIG. 705 shows the signaling control model of a signal transmitted in the direction from the terminal unit to the switch. In FIG. 705, the system #0 is an active system.

For example, a signal from the terminal unit is distributed from the duplex ADS1 system to both active and standby systems of the duplex DTC. The signals received from the terminal units and distributed to the DTCs of the active and standby systems are distributed to the active and standby systems of the duplex ADSINFs. Then, the active and standby systems of the duplex SIFCOM fetch the signal from the terminal unit and distributed to the ADSINF of the active system (system #0). The signals from the terminal unit and fetched by the SIFCOM of the active system and standby system are distributed to the active and standby systems of the duplex ASSW. In the BSGCSH, the signal from the ASSW of the standby system is discarded by the BSGC-COM. A signal cell to be discarded is identified by an added tag. The discard process is described in 2.3.4.

FIG. 706 shows the signaling control model of a signal in the direction from a switch to a terminal unit. FIG. 706 shows that system #0 is an active system.

For example, a signal from the BSGC is distributed through a BSGC-COM to both active and standby systems of the duplex ASSW. The signals received from the BSGC and distributed to the ASSWs of the active and standby systems are distributed to the active and standby systems of the duplex SIFCOMs. Then, the active and standby systems of the duplex ADSINF fetch the signal from the BSCG and distributed to the ASSW of the active system (system #0). The signals from the BSCG and fetched by the ADSINF of the active system and standby system are distributed to the active and standby systems of the duplex DTC.

2.3.2.2 Duplex Device Signal Control Model (for Common Unit)

In this model, a signal related to each system of a duplex device is transferred in the ATM switch of each of the active and standby systems.

The communications are maintained by both active and standby systems of each duplex devices through the two ports for the BSGC-of the active system. The BSGC and BSGC-COM each comprising two systems can be cross-connected. Accordingly, when a switch port of a standby system is accommodated by the BSGC of the standby system, the standby system route in the ATM switch is blocked when the BSGC of the standby system is in an OUS (out of service) state. To avoid this state, the two ports of the BSGC of the active system are connected to the active and standby systems of the duplex device.

For example, as shown in FIG. 707, the signal transferred to the BSGC from the SIFSH (SIF) of the active system is transmitted to the ASSW of the active system, and the signal transferred from the SIFSH (SIF) of the standby system to the BSGC is transmitted to the ASSW of the standby system.

The signal input from the device in the active system to the BSGC and the signal input from the device in the standby system to the BSGC are input through different ports of the BSGC. Therefore, they are provided with different tags. However, the BSGC of the active system and the BSGC of the standby system are assigned the same tag.

The BSGC-COM identifies the cells addressed to the two communications ports by a tag assigned to each signal cell input to the BSGC-COM, and transmits signal cells addressed to the ports to the BSGC without discarding them. The details of the process are described in 4. later.

The SIFSH transmits signals to the ASSWs of both active and standby systems. At this time, the signal cell transmitted to the standby system is provided with a tag indicating the discard by the BSGC-COM.

As shown in FIG. 708, when the BSGC transmits a signal to a duplex system, for example the SIFSH, the BSGC transmits the signal to the ASSWs of the active system and standby system from each of the two ports. the signal cell transmitted to both systems is provided with a fixed VCI. The SIFSH of each system receives only the signal from the ASSW of the matching system.

2.3.3 Intra-Station Control Communications VPI/VCI

When a signal is transferred from the SIFSH to the BSGC, the VCC in the SIFSH (refer to 6.3 in part 3) determines an output VPI/VCI/TAG specifying the BSGC using the VPI/VCI assigned to the subscriber as an input VPI/VCI as shown in FIG. 709A. The VCC in the SIFCOM is allocated for each SINF (individual unit) in the SINF in the SIFSH containing the SIFCOM.

If a signal is transferred from the BSGC to the SIFSH, the VCC determines an output VPI/VCI/TAG specifying each destination device/terminal unit using the BSGC card/port number connected to the VCC as an input VPI/VCI as shown in FIG. 709B. The VPI/VCI contains the VPI/VCI for the subscriber terminal unit determined by the meta-signaling. The BSGC card corresponds to the VPI, and the BSGC port corresponds to the VCI. Therefore, the software interface between the BCPR and the BSGC is established by using the above mentioned VCI.

When the communications are set between the BSGC and RMXSH, each device in the RMXSH is assigned a VPI/VCI similar to that assigned to the terminal unit in the SINF. The VPI/VCI is a fixed value corresponding to the device number.

FIG. 710 is a list of VPIs/VCIs.

2.3.4 Cell Discard System in BSGC-COM

FIG. 711 shows the cell discard function in the BSGC-COM.

The DMUX-LSI in the BSGC-COM fetches a signal cell indicating a SIG/UL/TAGC pattern, that is, a tag assigned to the head of an input signal cell, only if the pattern matches a predetermined pattern. As described above in 2.3.2.1, the DMUX-LSI in the BSGC-COM discards a signal from the duplex device input from the ASSW of the standby system according to a predetermined standby condition.

2.4 BSGC Device Control

Each device in the BSGC is a duplex system and normally operated in a master/slave state.

The active system of the BSGC is specified depending on the specification of the individual system in the peripheral interface control through the BCPR. Likewise, the active system of the BSGC-COM is specified depending on the specification of the active system of the ASSW connected to the BSGC-COM (refer to FIG. 704).

2.4.1 State of Device in BSGC

The contents of the memory in the BSGC of the master system are copied to the memory in the BSGC of the slave system. The contents of the VCC table loaded into the BSGC-COM of the master system are also copied to the VCC table in the BSGC-COM of the slave system. After copying data to the memory, every order from the BCPR is written to the memory in the BSGCs of both systems As shown in FIG. 712, the BSGC can be in one of the OUS, INS (master/slave), and standby states under the control of the BCPR.

(1) OUS (Out of Service) State

A state in which an INSTSBY activation from the BCPR is expected after the reset process in the BSGC. The determination about the BSGC and ATM switch is made only in this state.

(2) INS (in Service) State

A state in which the system is operable after initialization is completed in both BSGCs of active and standby systems. The BSGC of the active system can communicate with each intra-station device and subscriber terminal unit because the port of the active system has been initialized.

(3) Standby (SBY) State

A state of the BSGC in an INS incorporating process

Listed below are the operation states in the BSGC of active and standby systems.

(1) Master/Slave State

A state in which data has been copied from the master system to the slave system and a duplex and synchronous operation is being performed when both systems are in the INS state. The BSGC of the master system monitors a fault in the BSGC of the slave system.

(2) Master-Standby State

A state in the INS incorporating state for the BSGC of the standby system (3) Master OUS State An OUS state of the BSGC of the standby system. The BSGC of the master system does not monitor faults of the BSGC of the OUS system.

All the above listed states are managed by the BCPR.

2.4.2 BSGC Fault Correcting Process

A fault in each system of the BSGC processor and BSGC-COM (switch unit) is monitored by the BCPR. The hardware for monitoring the faults is configured in the BSGC, and a detected fault is reported to the BCPR with an interruption to the INF. When an interruption is issued to the INF, the BCPR reads the MSCN according to the INF order, analyzes the contents of the fault, and performs a fault correcting process.

When the BSGCs are switched due to the fault between the BSGC and BSGC-COM, they are switched by the switch (resumption at interrupted point) of the Ph-A of the BSGC.

The fault of the active/standby system cross-connecting unit can be detected by cyclically monitoring the slave BSGC by the firmware of the master BSGC only when the BSGC is performing a master/slave synchronous operation. The slave BSGC monitors the power disconnection of the master BSGC.

Monitoring a BSGC-COM fault is stopped after it is detected, and is resumed by the trigger of ASSW INS (starting VCC copy). After the BSGC fault is detected, the BSGC is in a reset wait state.

The OUS state is entered after the BSGC/BSGC-COM fault occurs, and the fault is when the automatic diagnostics result indicates OK at the next resumption.

2.5 Communications Control

The LAPD control through the BSGC is realized as the function of the firmware in the BSGC. The maximum simultaneous connection at the LAPD control equals the number of CARP ports (for example, 256)

The BSGC performs the LAPD control on the LAPD communications to subscriber terminal units and the simple LAP communications (intra-station control communications) to intra-station devices.

2.5.1 Difference from Q.922

In the layer 2 control of the LAPD, a revised LAPD is applied based on the CCITT (current ITU-T)-recommended Q.922 (LAPF).

FIG. 713 shows the frame format of the revised LAPD.

Listed below are the functions deleted from the Q.922.

(1) F pattern
(2) CRC generation/error check
(3) "0" insertion/deletion
(4) DLCI multiplex
(5) ECN, DE, D/C bit specification
(6) XID frame
(7) Dynamic window control
(8) I response reception
(9) FRMR response "0" (fixed) is set in the DLCI and ECN. The layer 2 multiplex (multi-LAP) is not realized, either. the "0" is not checked in the receiving equipment.

2.5.2 Intra-Station LAPD Communications (intra-Station Control Communications)

In the intra-station LAPD communications control, a link is established between an intra-station device and the BSGC, and a cyclical monitor process is performed. A UI frame is used as a communications message to apply the protocol having the procedure of confirming data in the layer 3. In the BSGC, the sequence of messages is not checked.

An intra-station control communications link is autonomously established up to the layer 2 according to the information from the BCPR.

This function is performed to reduce the load from the INF transfer then the resumption of the BCPR/BSGC operations are resumed. Therefore, this function is effective only when the BCPR/BSGC operations are resumed. When a link is not successfully established or after a link is disconnected, an individual request from the BCPR to establish a link is required.

Links corresponding to two communications ports for a duplex device are simultaneously established.

FIG. 714 shows the procedure of establishing the intra-station control communications link. FIG. 715 shows the procedure of establishing the intra-station control communications link for the BRLC.

2.6 Diagnostic Functions

The BSGC has the function of diagnosing the BSGCSH and providing a communications link for diagnosing the intra-station duplex device such as an ASSW.

2.6.1 Diagnosis Object Items

Described below are the diagnostic functions of the BSGCSH.

(1) INF interface
   i) CC access read/write
   ii) DMA transfer read/write
(2) BSGC intra-package functions
   i) deleting no function items based on present SGC diagnosis (MACH-1.2), and entering additional functions
   (diagnosing all portions accessible by the CPU self-diagnostics)

(3) BSGC-SWINF i) setting a loop between the BSGCSH and SWINF and testing a sending/receiving cell (4) VCC memory test i) read/write test on the VCC table memory in the order starting with the BSGC having the smallest number (5) BSGCSH i) establishment test on the LAP link between the BSGCSH and other devices (6) Cell-by-cell loop test in the BSGC-COM using a TCG (refer to 9.2).

2.6.2 Intra-Station Duplex Device Diagnostic Communications Link

The intra-station duplex device diagnostic communications link is established by the procedure similar to the active system BSGC online control procedure. To perform this function, either 0 (online) or 1 (diagnostics) can be specified as a parameter of the online operation activate command.

The BSGC activation sequence during the online diagnostics is explained in 5.2.

2.7 Configuration of Program Module

FIG. 716 shows the program module in the BSGC.

An INF control unit (INF-IOCS) 1 controls the communications between the BSGC and BCPR through the INF (INFA and INFT).

A device control unit 2 manages a device including the setting of the VCC.

A patrol control unit 3 checks for health between the BCPR and BCGC.

An inter-system communications control unit 4 controls the communications between the active and standby systems.

A memory copy control unit 5 copies the contents of the CPU memory.

A memory read/write control unit 6 performs a read/write process to the memory according to a command.

A system switch controlling unit 7 controls the switch of the active and standby systems.

A watch dog control unit 8 confirms and controls the normal operation of the BSGC.

A LAPD managing unit 9 manages the LAP link including the establishment of an intra-station LAP.

A LAPD control unit 10 performs the layer 2 control in accordance with the recommendation-Q.922.

A CARP handler 11 converts VPI/VCI.

A switch control unit 12 controls the CARP.

3. INF Interface 3.1 Hardware Configuration

The INF is controlled by the BSGC as a function of the SBIF LSI in the BSGC. FIG. 717 shows the hardware configuration relating to the INF.

3.2 DMA Bit Configuration

During the DMA access (write/read) the bit configuration is represented as follows among the BCPR, INF, and BSGC.

3.2.1 Bit Configuration of DMA Transfer Data

FIG. 718 shows the bit configuration of the DMA transferred data between the main storage (MM) and BSGC.

3.3 INF Control Procedure

The present Applicant has established the method of minimizing the DMA transfer through the INFT and INFA under the control of the INF between the BCPR and BSGC to attenuate the load onto the BSGC.

3.3.1 Command Queue and Status Queue (1) A reception buffer is preliminarily reported in block units.

In the BSGC, up to two blocks of reception buffers are constantly reserved. If one block becomes full another block is added by the lead of the BCPR.

(2) A status queue is reported each time an event occurs.

The BSCG is uniquely provided with an unused pointer for a status queue. The pointer is updated by reading the value of the tail pointer to the status queue in the BCPR only when the entire status queue is used. When the status queue is full, a space monitor process is performed (by reading a tail pointer) at a 128 cycle.

(3) An end of command notification, which increases the load by reporting a status, is replaced by the following processes.

i) A command response 7f is made when all processes including the DMA transfer of the I frame in the command group are completed. If an abnormal condition is detected in the entire command group, a command response 55 is returned.

ii) Simultaneously, end information is prepared for each command for each bit, and output as an NG response when a signal is discarded for any factor in the BSGC. The factor of the NG response can be the shortage of a reception buffer. When the end information indicates NG, the entire command group is normal and a command response 7F is returned.

iii) The BSPR performs an end of command process at the trigger of the above described response.

(4) Up to 64 commands can be entered in a command group in consideration of the throughput of the BSGC.

(5) Up to 8 commands can be entered in a status group simultaneously transmitted in consideration of the conflict in a DMA transfer.

3.3.2 Conflict at Command Activation and Status Activation

When a command is activated or a status is activated, the DMA transfer is activated under the control of the BSGC. Described below is the procedure of the process.

(1) Command Activation

The process of completing the DMA transfer of a command queue and completing the DMA transfer specified in the command queue is performed as a series of processes. The activation of a command from the BCPR is processed as an interruption in the BSGC.

(2) Status Activation

The process of completing a 1-frame DMA transfer, a status DMA transfer, and the DMA transfer for the update of a head pointer is performed as a series of processes. The status activation to the BCPR is performed at an 8 msec cycle. Events occurring within an 8 msec are collectively DMA-transferred. 1-frame DMA transfer is performed before any other transfer each time an event occurs. Except in a contention of commands, status to be reported to the status queue, if existing, is transmitted repeatedly.

Commands and status are processed in the DMA transmission termination process as an intra-BSGC interruption or look-in process.

(3) Contention Control

No contention or interruption occurs in a series of processes in (1) and (2) above.

Possible contention at the activation is controlled according to the following references.

i) Intra-BSGC priority control is performed such that the DMA transfer is activated without idle INF transfer.

ii) The next command is waited for according to the logic in the BSGC until the BSGC completes its internal process on a received command.

3.3.3 Congestion Control

The congestion control in the BSGC can be receiving system congestion control, sending system congestion control, and BSGC congestion control.

3.3.3.1 Receiving System Congestion Control

The congestion control of a receiving buffer is exercised for each link.

When congestion occurs in a receiving buffer, the RNR is transmitted for each link. The receiving buffer is used with all ports chained to the CARP LSI for controlling the interface with the ATM switch. Therefore, the congestion control of the receiving buffer is exercised among a switch control unit (CARP IOCS) 1, LAPD control unit 2, and INF control unit (INF IOCS) in the BSGC as shown in FIG. 719 (also refer to FIG. 716).

If a busy receiving buffer prevents the CARP IOCS 1 from hunting the receiving buffer and the receiving buffer from being connected to the CARP, then the CARP is underlined only. However, since the process of the L2 information only is required even during the congestion, the number of buffers required by the CARP (maximum number of control channels) is required in the process between the CARP IOCS 1 and the LAPD control unit.

The congestion in the receiving buffer occurs in the BSGC when data cannot be transmitted to the BCPR through the INF due to too many transactions in the BCPR. The control of the congestion for the factors of the BSGC is explained in 3.3.3.3.

3.3.3.2 Sending System Congestion Control

The sending buffer congestion control is exercised for each link.

If the congestion has arisen in the sending buffer, the information as to whether the congestion refers to the first, second, or third congestion is reported to the BCPR.

The first, second, and third congestion occurs when the use rate of the transmission buffer reaches 70%, 80%, and 100% respectively. The first congestion is reported only when the congestion continues for a predetermined period in the BSGC.

<Control for the First Congestion>

If the first congestion occurs, the BCPR does not accept a new call.

After the occurrence of the first congestion, the number of signals processed by the BSGC is maintained and not reduced.

<Control for the Second Congestion>

If the second congestion occurs, the BCPR sends only the required number of signals required by the intra-station LAPD, etc. In the port using UI frames, an ACK (response) wait process is not performed for the transmitted UI frames, and the UI frames stay in the BSGC for a very short time.

The BSGC gains congestion control (number of buffer count), similar to that over the receiving buffer, between an INF control unit 1 and switch control unit 12 shown in FIG. 716 for each port. Furthermore, the BSGC performs the DMA transfer relating to the sending buffer after the INF control unit 1 (FIG. 716) gets a port number in the command field. Accordingly, the sending buffer can be managed in port units. If the sending buffer of the port to be limited is running short in spite of the limit based on the above described first and second congestion control, then new congestion control can be exercised without using the buffer of the other port. This congestion control is referred to as third congestion control.

<Control for the Third Congestion>

(1) When the BSGC receives a buffered-command for the line having no sending buffer, it answers the BCPR with an NG response as end of command group information of the INF.

(2) The BCPR transmits a DL-EST-RQ (link reset request) to the corresponding line in the BSGC when the end of command group information indicates NG. After reporting the end of command information NG and before receiving the DL-EST-RQ (link reset request), the BSGC continues answering with the end of command information NG in response to the I frame transmission request to the corresponding port.

(3) All signals in the link of the BSGC are discarded by resetting the link, thereby enabling the communications of new information.

(4) The BCPR performs a matching process between the BCPR and a terminal unit or an intra-station device.

If the third congestion occurs, no retry process is performed because the BSGC is considered not to be normally operating for the reasons listed below in (a) through (c).

(a) The third congestion is preceded by the restrictions under the control of the first and second congestion control.

(b) If the I frame stays in the BSGC for more than 200 hours, a corresponding link is autonomously reset according to the logic in the BSGC. However, the logic is not applied to the UI frame.

(c) If the communications exceed the throughput of the BSGC, the first congestion control is exercised under the BSGC congestion control explained in 3.3.3.3. BSGC Congestion Control The BSGC monitors the use rate of the CPU in the BSGC every 10 seconds, and calculates the average every minute and every 15th minute. The BSGC issues a congestion report to the BCPR when the state in which the average CPU use rate equals or exceeds 90% is maintained for longer than a predetermined threshold time.

Upon receipt of the report, the BCPR determines the occurrence of the first congestion in all ports in the BSGC and restricts the setting of a new call.

FIG. 720 shows the model of the number of BSGC signals under the above described congestion control.

3.4 Initializing INF

The BCPR notifies the BSGC of the INF control information according to the procedure listed below to communicate with the BSGC through the INF (INFT and INFA).

(1) At the initialization of the INF control information, only an initialization command is transmitted from the BCPR.

(2) Set in the initialization command is the address of the INF initialization information setting table storing the INF interface information such as an entered status queue, receiving buffer, etc. The BSGC acquires the INF interface information from the table. The INF initialization information setting table is provided in physical memory space in series.

(3) FIG. 721 shows the format of the initialization command and INF initialization information setting table.

3.5 INF Priority Control

In the signal process for the switch software executed by the BSGC and BCPR, the following process system is adopted to perform by priority the fault correcting processes from the SIFSH, etc. In this system, a plurality of transmission queues of messages to be transmitted from the BSGC to the switch software are provided. A signal received by the BSGC is distributed to any of the queues depending on the priority level assigned to the signal.

4. Switch Interface 4.1 Assigning Tag 4.1.1 Concept of Assigning Tag

The concept of assigning a tag is explained in 5. of part 3 (refer to FIGS. 121, 126, 129, etc.)

4.1.2 Assigning Tag in Communications from BSGC to ASSW

FIG. 722 shows the method of using the tag SIG/UL/TAGC through the SIFSH in the communications from the BSGC to the SIFSH.

FIG. 723 shows the method of using the tag SIG/UL/ADS1BLK/ADS1SEL through the SIFSH in the communications from the BSGC to the RMXSH.

FIG. 724 shows the method of using the tag SIG/UL/TAGC through the SIFSH in the communications from the BSGC to the SIFSH.

4.1.3 Assigning Tag in Communications from ASSW to BSGC

FIG. 725 shows the method of using the tag SIG/UL/TAGC through the BSGCSH in the communications from the ASSW to BSGC. The BSGCSH identifies the above mentioned tag through the DMUX-LSI loaded into the BSGC-COM.

4.2 CARP Control Procedure

The layer 1 control in the ASSW (ATM switch) interface is gained by the CARP LSI. The LSI has the function of assembling and disassembling an AAL (ATM Adaptation Layer) protocol type frame of type 3, 4, or 5.

The CARP LSI consists of CARP 1 and CARP 2 to simultaneously assemble and disassemble up to 1024 channels of cells (up to 256 channels in the BSGC by the restrictions of the firmware) under the control of the CPU (80186 system).

The protocol type 3, 4, or 5 can be set for each port, and these types can be mixed in the BSGC according to the settings through the switch software.

4.2.1 Frame Format

FIG. 726 shows the SAR-PDU of protocol type 3 (as in type 4) and the configuration of the header field of the ATM cell containing the SAR-PDU. FIG. 727 shows the frame (CPAAL5-PDU) of protocol type 5. Refer to 4.2, etc. of part 3. The contents of the ATM header shown in FIG. 726 are set by the CVV in the BSGC-COM. In this case, the identification number of the BSGC is set as a VCI and the port number in the BSGC is set as a VPI in the ATM. The other fields are set to 0.

The payload of the SAR-PDU of protocol type 3 shown in FIG. 726 stores a LAPD message.

If the data length of the LAPD data is 44 bytes (refer to FIG. 749), the message is stored in the payload of a single SAR-PDU. In this case, a single segment message (SSM) is set as an ST in the SAR-PDU, and 44 bytes are assigned to an LI.

If the data length of the LAPD is 256 bytes (refer to FIG. 750), the message is divided into 44-byte segments, and the segments are stored in the payloads of a plurality of SAR-PDU. Therefore, the LAPD data is divided and stored in a plurality of ATM cells, and then transferred. In this case, the beginning of message (BOM) is set as an ST in the SAR-PDU storing the leading segment, and 44 bytes are assigned as an LI. The continuation of message (COM) is set as an ST in the SAR-PDU storing an intermediate segment, and 44 bytes are assigned as an LI. Furthermore, the end of message (EOM) is set as an ST in the SAR-PDU storing the trailing segment, and 36 bytes are assigned as an LI (FIG. 750).

The frame of protocol type 5 shown in FIG. 727 is divided into 48-byte segments, and the segments are stored in the payloads of a plurality of ATM cells.

4.2.2 Functions of CARP LSI

The transmitting functions for the CARP LSI are listed below.

(1) write to transmission cell (2) generation of SAR-PDU header (numerical control)

The receiving functions for the CARP LSI are listed below.

(1) header check (2) check of long/short frame

The BSGC does not check an HEC.

4.2.3 Statistic Functions

The numbers of passing cells and discarded cells are counted by the MUX/DMUX LSI. The number of CRC errors is counted by the CARP LSI.

4.3 VCC Setting Procedure and VCC Copying Procedure

The BSGC writes data for the VCC of both systems when it receives a VCC copy start request or VCC setting request (for both systems) from the BCPR.

When the ATM switch is turned into the OUS state, the BSGC writes data for the VCC of one system if it receives a single-system VCC set request.

The write highway (mate system/home system) of the VCC is specified by the BCPR through a COM INS report.

FIG. 728 shows the VCC setting procedure. FIG. 729 shows the copy start procedure. FIG. 730 shows the copy stop procedure.

5. BSGC Device Controlling Procedure 5.1 BSGC Fault Monitor

The fault correcting process to be performed by the BSGC handles the following faults.

(1) faults of the BSGC itself (2) INF interface fault; reporting by interrupting the INFs of both systems (3) faults detected by active BSGC (a) fault of switch (b) standby system inter-system cross connection fault reported by status. (including a mate BSGC IBP fault)

Since the fault of the BSGC of the master system should be urgently corrected, it is reported by an interruption to the INF. If a fault occurs in the BSGC itself and the BSGC is an active system, then the systems are switched and the faulty system is recognized as an OUS state. If the BSGC is a standby system, then an ISOL is set in the active system and the faulty system is recognized as an OUS state (refer to 1 and 2 of FIG. 731).

If a fault occurs in the ASSW, an ASSW fault correcting process is performed. The majority logic is not applied to the BSGC-COM at the system switch (refer to (3) of FIG. 731).

If a fault indicated by (2) in FIG. 731 occurs, it is not determined whether the fault exists in the BSGC or BSGC-COM. The BCPR reads the factor of the fault from the faulty BSGC having the numbers #0 through #5 of both systems and obtains a normal route, thereby performing a fault correcting process.

5.1.1 Faulty Portion Detected in BSGCSH

FIG. 731 shows the model of the fault range.

In FIG. 731, fault (1) refers to a fault of the BSGC (watch dog time over, DRAM parity error, etc.). Fault (2) refers to a data parity error between the BSGC and BSGC-COM, disconnection of a clock/cell frame, etc. Fault (3) refers to an alarm from the LSI of the DMUX, MUX, etc. of the BSGC-COM, data parity error in the inter-package communications, etc.

The report to the switch software is made by an interruption to the INF from the BSGC of the system which detected the fault. The report is made to each of the faults (1), (2), and (3) shown in FIG. 731 using the MSCN.

5.1.2 System Management at Fault Occurrence (1) BSGC Fault (fault (1) shown in FIG. 731 or (1) at the rightmost column shown in FIG. 745)

If an INF interruption occurs from the BSGC of an active system, the BSGC system is switched.

If an INF interruption occurs from the BSGC of a standby system, an AISOL is set in the active system and the faulty system is recognized as an OUS state.

(2) Fault Between BSGC and BSGC-COM (fault (2) shown in FIG. 731 or (2) at the rightmost column shown in FIG. 745)

This fault is reported from each BSGC of the active and standby systems through an INF interruption.

The system management according to the report from each fault detection point is shown in and after FIG. 733—

(3) BSGC-COM Fault (fault (3) shown in FIG. 731 or (3) at the rightmost column shown in FIG. 745)

This fault is reported from each BSGC of the active and standby systems through an INF interruption.

The BSGC-COM of the faulty system is put in the OUS state, and the BSGC-COM of the non-faulty system is put in the active state. Since the active/standby state of the BSGC-COM is subject to that of the ASSW, the systems of the ASSW are switched in the above described case.

FIG. 732 shows the method of detecting the BSGCSH-COM fault through the BSGC, and of notifying the switch software of the fault As shown in FIG. 732, the BSGC has the 2-bit information for the home/mate systems for each fault point of the BSGC-COM. However, the BSGC-COM common fault point (a single fault point for each BSGC-COM system) has 2-bit information for the home/mate system only in the BSGC of the smallest number.

Described below is the system management method followed when a fault occurs between the BSGC and the BSGC-COM.

(1) Fault Detected by a Checker in the BSGC-COM when Data is Sent from the BSGC to the BSGC-COM FIG. 733 shows the detection point of a fault detected by the checker in the BSGC-COM in sending data from the BSGC to the BSGC-COM.

(1)-1 When 1-bit fault detection bit is set in FIGS. 733(*a*) through (*b*) (when the fault occurs at a single point);

If a fault occurs at the fault point (a) shown in FIG. 733, the fault occurs in the data in one of the two destination systems receiving data from the #0 BSGC (#0 system BSGC→#0 system BSGC-COM, and #0 system BSGC→#1 system BSGC-COM). However, no fault occurs in the data of the two destination systems receiving data from the #1 system BSGC. Therefore, the #1 system BSGC is put in the active state and the #0 system BSGC is put int the OUS state. Likewise, FIG. 734 shows the state entered when a fault occurs at one of the fault points (a), (a)', (b), and (b)' shown in FIG. 733. A diagnostics process (DP) is carried out on the BSGC in the OUS system to specify the fault point.

In FIG. 734 (note 1), in setting the duplex communications, the BSGC systems are switched as shown in the above described table. If a fault is detected by the checker in the BSGC-COM in the diagnostics process (DP) activated after the OUS state is determined in the BSGC, the system is maintained after the BSGC-COM of the faulty system is put in the OUS state.

(1)-2 When a 2-bit fault detection bit is set in FIGS. 733(*a*) through (*b*)' (when faults occur at two or more points);

The following two cases can be assumed.

i) If faults are detected at two fault points (a) and (b), or if the faults are from the data sent from the same BSGC as in the case where the faults are detected in the two fault points (a)' and (b)'.

ii) If faults are detected at two fault points (a) and (a)', or if the faults are from the data sent from the same BSGC-COM checker as in the case where the faults are detected in the two fault points (b) and (b)'.

In the example i) above, if faults are detected in the two fault points (a) and (b) shown in FIG. 733, then it is determined that the #0 system BSGC is faulty, and the #0 system BSGC is in the OUS state, while the #1 system BSGC is in the active state. If faults are detected in the two fault points (a)' and (b)', then it is determined that the #1 system BSGC is faulty, and the #1 system BSGC is in the OUS state, while the #0 system BSGC is in the active state.

In the case ii above, if faults are detected in the fault points (a) and (a)' shown in FIG. 733, it is determined that the #0 system BSGC-COM is faulty. Since the system of the BSGC-COM is set subject to the setting of the system of the ASSW, the systems of the ASSW are switched when the #0 system ASSW is a master system, thereby putting the #0 system ASSW in the OUS state and setting the #1 system ASSW as a master system. The systems of the ASSW are not switched when the #0 system ASSW is a slave system, thereby maintaining the #0 system ASSW in the OUS state. If faults are detected in the two fault points (b) and (b)' shown in FIG. 733, then it is determined that the #1 system BSGC-COM is faulty. Since the system of the BSGC-COM is set subject to the setting of the system of the ASSW, the systems of the ASSW are switched when the #1 system ASSW is a master system, thereby putting the #1 system ASSW in the OUS state and setting the #0 system ASSW as a master system. The systems of the ASSW are not switched when the #1 system ASSW is a slave system, thereby maintaining the #1 system ASSW in the OUS state.

FIG. 735 shows the state detected when faults are detected at 2 points of the fault points (a), (a)', (b), and (b)' shown in FIG. 733. The diagnostics process (DP) is performed on the OUS system BSGC to specify fault points.

FIG. 736 shows the case in which a fault of the checker in the BSGC-COM is determined after the fault shown in FIG. 735 (Note 1) is detected and the diagnostics process is performed.

FIG. 737 shows the case in which a fault of the checker in the BSGC-COM is determined after the fault shown in FIG. 735 (Note 2) is detected and the diagnostics process is performed.

If a fault described in note 3 or 4 shown in FIG. 735 is detected, it indicates that the standby system link to the intra-station duplex device is disconnected. When this fault occurs, the diagnostics process (DP) is not performed, but the BSGC-COM package of the faulty system is switched according to the following references.

If faults are detected in fault points (a) and (a)' or (b) and (b)', the following four cases can be assumed as a fault point.

i) When the factor of the fault resides in only the BSGC-COM package.

ii) When the factor of the fault resides in both sending function of the BSGC and receiving function of the BSGC-COM, and when the fault occurs in only one route of the sending function of the BSGC and the receiving function of the BSGC-COM.

iii) When the fault factor the same as that shown in ii above is present, and when the fault occurs only in the route different from that described in ii above.

iv) In the above described case i, the system can recover from the fault by exchanging the BSGC-COM packages. In case ii or iii, a maintenance process can be performed because one fault detection bit is set after exchanging the BSGC-COMs. In the case iv above, the same fault will occur again even after the exchange of the BSGC-COMs, and the BSGC-COMs of both #0 and #1 systems are exchanged.

If faults are detected at both fault points (a) and (a)', the following procedures are required to specify the BSGC or BSGC-COM for the fault point.

Condition: the #0 system BSGC is the active system and the #1 system BSGC is the slave system.

Procedure 1: Since the #1 system BSGC is a slave system, the #1 system BSGC is put in the OUS state, and the diagnostics process (DP) is performed. Fault points can be specified relating to the fault at fault point (a)' between the #1 system BSGC and #0 system BSGC-COM.

Procedure 2: Then, the states of systems #0 and #1 of the BSGC are switched. That is, after the #1 system BSGC is put in the OUS state and then set as a slave system, the master/slave states of the #0 and #1 BSGCs are switched. Finally, the #0 system BSGC is set as a slave system and then put in the OUS state. The diagnostics process (DP) is then performed and fault points can be specified relating to the fault at fault point (a).

If faults are detected at both fault points (b) and (b)', the fault points can be specified, the BSGC or BSGC-COM, for the fault point according to the above described procedure.

If the combination other than the two fault detection bits is set, or if 3 or more fault detection bits are set, then double faults are assumed and no system can be restructured. However, a fault message should be output and the contents are designed as a pattern different from the message output at the occurrence of the fault. In this case, the detailed fault contents collected from the BSGCs of both systems are completely output.

(2) Fault Detected by the Checker in the BSGC when Data is Sent from the BSGC-COM to the BSGC FIG. 738 shows the detection point of a fault detected by the checker in the BSGC in sending data from the BSGC-COM to the BSGC.

(2)-1 When 1-bit fault detection bit is set in FIGS. 738(*a*) through (*b*)' (when the fault occurs at a single point);

If a fault occurs at the fault point (a) shown in FIG. 733, the fault occurs in the data in one system receiving data from the #0 BSGC-COM (#0 system BSGC-COM #0 system BSGC), and #0 system BSGC→#1 system BSGC-COM). However, the fault factor comes from either the sending function of the #0 system BSGC-COM or the receiving function of the #0 system BSGC. When the fault occurs, it is assumed that the problem resides in the receiving function of the #0 system BSGC and the #0 system BSGC is put in the OUS state and the #1 system BSGC is put in the active state. Then, the diagnostics process (DP) is activated, and it is determined whether the fault point refers to the BSGC-COM or the BSGC. If it is determined that the sending function of the #0 system BSGC-COM has a problem, then the #0 system BSGC-COM is put in the OUS state (the #0 system ASSW is put in the OUS state), the #1 system BSGC-COM is put in the active state (the #0 system ASSW is put in the active state), and the maintenance process is performed.

FIG. 739 shows the state entered when a fault occurs at one of the fault points (a), (a)', (b), and (b)' shown in FIG. 738.

(2)-2 When a 2-bit fault detection bit is set in FIGS. 738(*a*) through (*b*)' (when faults occur at two or more points);

The following two cases can be assumed.

i) If faults are detected at two fault points (a) and (b), or if the faults are from the data sent from the same BSGC as in the case where the faults are detected in the two fault points (a)' and (b)'.

ii) If faults are detected at two fault points (a) and (a)', or if the faults are from the data sent from the same BSGC-COM checker as in the case where the faults are detected in the two fault points (b) and (b)'.

In the example i) above, if faults are detected in the two fault points (a) and (b) shown in FIG. 733, then it is determined that the #0 system BSGC is faulty. Since the system of the BSGC-COM is set subject to the setting of the system of the ASSW, the systems of the ASSW are switched when the #0 system ASSW is a master system, thereby putting the #0 system ASSW in the OUS state and setting the #1 system ASSW as a master system. The systems of the ASSW are not switched when the #0 system ASSW is a slave system, thereby maintaining the #0 system ASSW in the OUS state. If faults are detected in the two fault points (a)' and (b)' shown in FIG. 733, then it is determined that the #1 system BSGC-COM is faulty. Since the system of the BSGC-COM is set subject to the setting of the system of the ASSW, the systems of the ASSW are switched when the #1 system ASSW is a master system, thereby putting the #1 system ASSW in the OUS state and setting the #0 system ASSW as a master system. The systems of the ASSW are not switched when the #1 system ASSW is a slave system, thereby maintaining the #1 system ASSW in the OUS state.

In the case ii above, if faults are detected in the fault points (a) and (a)' shown in FIG. 733, it is determined that the #0 system BSGC-COM is faulty, and the #0 system BSGC is in the OUS state, while the #1 system BSGC is in the active state. If faults are detected in the two fault points (b) and (b)', then it is determined that the #1 system BSGC is faulty, and the #1 system BSGC is in the OUS state, while the #0 system BSGC is in the active state.

FIG. 740 shows the state where faults are detected at two points in the fault points (a), (a)', (b), and (b)' shown in FIG. 738. The diagnostics process (DP) is performed on the OUS system BSGC to specify a fault point.

FIG. 741 shows the case in which a fault of the checker in the BSGC-COM is determined after the fault shown in FIG. 740 (Note 3) is detected and the diagnostics process is performed.

FIG. 742 shows the case in which a fault of the checker in the BSGC-COM is determined after the fault shown in FIG. 740 (Note 4) is detected and the diagnostics process is performed.

If a fault described in note 1 or 2 shown in FIG. 740 is detected, it indicates that the standby system link to the intra-station duplex device is disconnected. When this fault occurs, the diagnostics process (DP) is not performed, but the BSGC-COM package of the faulty system is switched according to the following references.

If faults are detected in fault points (a) and (b) or (a)' and (b)', the following four cases can be assumed as a fault point i) When the factor of the fault resides in only the BSGC-COM package.

ii) When the factor of the fault resides in both sending function of the BSGC and receiving function of the BSGC-COM, and when the fault occurs in only one route of the sending function of the BSGC and the receiving function of the BSGC-COM.

iii) When the fault factor the same as that shown in ii above is present, and when the fault occurs only in the route different from that described in ii above.

iv) In the above described case i, the system can recover from the fault by exchanging the BSGC-COM packages. In case ii or iii, a maintenance process can be performed because one fault detection bit is set after exchanging the BSGC-COMs In the case iv above, the same fault will occur again even after the exchange of the BSGC-COMs, and the BSGC-COMs of both #0 and #1 systems are exchanged.

If faults are detected at both fault points (a) and (b), the following procedures are required to specify the BSGC or BSGC-COM for the fault point.

Condition: the #0 system BSGC is the active system and the #1 system BSGC is the slave system.

Procedure 1: Since the #1 system BSGC is a slave system, the #1 system BSGC is put in the OUS state, and the diagnostics process (DP) is performed. Fault points can be specified relating to the fault at fault point (b) between the #1 system BSGC and #0 system BSGC-COM.

Procedure 2: Then, the states of systems #0 and #1 of the BSGC are switched. That is, after the #1 system BSGC is put in the OUS state and then set as a slave system, the master/slave states of the #0 and #1 BSGCs are switched. Finally, the #0 system BSGC is set as a slave system and then put in the OUS state. The diagnostics process (DP) is then performed and fault points can be specified relating to the fault at fault point (a).

If faults are detected at both fault points (a)' and (b), the fault points can be specified, the BSGC or BSGC-COM, for the fault point according to the above described procedure.

If the combination other than the two fault detection bits is set, or if 3 or more fault detection bits are set, then double faults are assumed and no system can be restructured. However, a fault message should be output and the contents are designed as a pattern different from the message output at the occurrence of the fault. In this case, the detailed fault contents collected from the BSGCs of both systems are completely output.

5.1.3 Report to BSGC

FIG. 743 shows the fault report model.

The report from the BSGC-COM <fault detection point> to the BSGC is made according to the level signal.

The fault of the BSGC-COM <fault detection point> is terminated by the SBIF LSI (refer to 3.1 and FIG. 717), and reported to the switch software by an INF interruption.

In response to the above described interruption, the switch software reads the detailed fault information by an MSCN read order.

The MSCN read order resets the MSCN layer in the BSGC and the alarm for the fault occurrence point is nullified.

5.1.4 Recovery Monitor 5.1.4.1 Recovery Monitor by BSGC

The BSGC does not monitor the recovery from faults. It is considered that the system successfully recovers from a fault when the built-in diagnostics process results in OK.

5.1.4.2 Recovery Monitor in Switch Software

The switch software monitors the recovery from faults (in both active and standby systems) of (1), (2), and (3) introduced at the beginning of 5.4. The system switch of the BSGC and ASSW (system switch of the BSGC-COM) should be managed by the BSGC, and the recovery cannot be monitored by the BSGC. The recovery monitor is performed by the switch software.

5.1.5 Fault to be Detected by the BSGC Hardware

The fault to be detected by the BSGC hardware can be a fault in the INF and in the BSGC itself. The fault is reported to BCPR and the firmware of the BSGC through interruption. The fault is detected and reported by the BSGC hardware of each of the active and standby systems.

FIG. 744 shows the detained fault factors.

The fault detected in the INF interface by the BSGC can be directly checked by an MSCN read command. The fault of the BSGC is a representative point in the MSCN. Therefore, the details of the fault should be collected by the MSCN read sequence.

FIG. 745 shows the accommodation of the BSGC MSCN.

The MSCN shows each fault occurrence point using a representative point. The fault occurrence point is shown in FIG. 731.

Correspondence between each bit of the MSCN shown in FIG. 745 and the fault points (a), (a)', (b), and (b)' shown in FIGS. 733 and 738 is represented as shown below.

Correspondence Between FIGS. 745 and 733

MSCN data of #0 system BSGC→(a): bits 15, 14 (b): bit 12, 11

MSCN data of #1 system BSGC→(a)': bits 12, 11 (b)': bit 15, 14

Correspondence Between FIGS. 745 and 734

MSCN data of #0 system BSGC→(a): bits 09, 08 (a)': bit 06, 05

MSCN data of #1 system BSGC (b): bits 09, 08 (b)': bit 06, 05

The exact factor of the BSGC fault shown in FIG. 746 is reported to the BCPR through a TM save FIG. 747 shows an exact factor of the fault reported through an MSCN details read command.

5.1.6 Fault Detected by BSGC Firmware

The BSGC firmware performs the two following types of fault monitor.

(1) Hardware fault of both systems of the BSGC-COM (including the hardware fault between the BSGC and BSGC-COM)

(2) Fault of standby system BSGC. This fault is monitored by an active system BSGC firmware.

The above described fault (1) is reported by an interruption from the fault detecting BSGC to the INF. It is explained in detail in 5.4.6.1.

The above described fault (2) is reported from an active system BSGC as a status. It is explained in detail in 5.4.6.2.

5.1.6.1 Fault in BSGC-COM (Excluding Faults of the BSGC)

FIG. 748 shows the detection sequence of the fault in the BSGC-COM.

This fault is detected by the BSGC firmware's detecting the state detected by the BSGC hardware in the 8-msec-cycle look-in process. Then, the INF interruption register is set. When an INF interruption is issued, the BCPR sets a timer of up to 16 msec. When the timer indicates timeout (refer to FIG. 748), a fault generation point is specified by issuing the MSCN read command. The BCPR further issues an MSCN details read command to the interrupting BSGCM to collect detailed information. When the BSGC receives the command, it reports the fault data stored in the register. The BCPR performs the system management process described in 5.4.2 according to the MSCN data and the data obtained in response to the MSCN details read command.

5.1.6.2 Fault in Standby System BSGC

This fault is detected by an active system BSGC's periodical monitoring the fault of the duplex process control unit of the standby system BSGC. The monitor cycle is 2 sec. The monitor is performed only when the active system is operated in synchronism with the standby system. The fault is reported by the active system BSGC as a status.

5.2 TM Save System

When a processor fault occurs, the BSGC saves the fault information in the memory of the home system. This is referred to as a TM save process. The BCPR detects the BSGC processor fault through an INF interruption. The detailed fault information is read from the memory in the BSGC according to the MSCN read command and MSCN detailed read command issued from the BCPR to the BSGC after the INF interruption, and then transferred to the BCPR.

5.3 Statistic Function

The BSGC statistic function is provided as the following two methods.

(A) Function of collecting data by the BSGC firmware according to an instruction from the BCPR. The statistics data is read according to the 15-minute notification from the BCPR. There are the three types of statistics items as follows.

(1) BSGC CPU use rate (2) Numbers of L2 transmission frames and of octets (in port units)

(3) Number of CRC errors

The cell statistics is obtained by the statistics function of the D-MUX/MUX LSI loaded into the BSGC-COM. There are three types of statistics items as follows The BCPR reads the three types of the statistics data each time it issues a statistics read/write request.

(1) Number of reported cells (2) Number of discarded cells (3) Number of passing cells with specific VPI/VCI 6. Communications Control 6.1 Control of Intra-Station Control Communications Described below is the interface required by the BSGC for the intra-station control communications. Layer 1 is based on the type 3, that is, the ATM adaptation layer (AAL) protocol type (refer to 4.2.1, etc.) Layer 2 is based on the revised LAPD. The difference from the revised LAPD is described in 6.1.2.

6.1.1 Signaling Cell Format

If an I field is transferred as signaling information, the data length of the LAPD layer 3 (L3) storing I field is 41 octets corresponding to a single segment message (SSM) as shown in FIG. 749. In this case, 4 octets in the 41-octet I field are used for the application of the switch software, and the remaining 37 octets are used as a data field. The 41-octet I field is provided with the information of the LAPD layer 2 (L2), with the information of the AAL type 3, and also with the ATM cell information (refer to FIG. 726).

If the MSD/MSCN is transferred as signaling information, the data length of the LAPD layer 3 (L3) storing the MSD/MSCN is fixed to 253 octets as shown in FIG. 750. In this case, the 253-octet MSD/MSCN data is provided with the 3-octet LAPD layer 2 (L2), thereby adding up to the 256-octet data. The 256-octet data is divided into 44-octet segments, each segment being provided with the AAL type 3 information, and also with the ATM cell information (refer to FIG. 726). Therefore, the above described 256-octet LAPD data is transferred by six ATM cells. In this case, the valid data length in the payload of the last cell is 44-(6×44-256)=36 octets.

6.1.2 Difference from Revised LAPD

Listed below are the processes unique to the intra-station devices.

(1) UI frames are used in transferring information. All-0 DLCI is used as an address of the LAPF.

(2) Signal Priority Control

A signal from an intra-station device should be provided with a priority level to priority-control from the BSGC the transmission signal to be sent to the switch software executed by the BCPR. The priority level is represented by congestion control bits in the address of the LAPF. FIG. 751 shows the UI format.

(3) Information Field

The information field is defined between the BCPR and each device. FIG. 752 defines the common field of each device. In this format, the value of the APID/MESG for each device is centrally managed by the switch software.

The formats of the simple LAP and full LAPD are different to each other in the following points.

(a) The maximum message length is 509 bytes for the simple LAP.

(b) The NS field is fixed to 0 in the full LAPD.

7. BSGC-COM 7.1 Hardware Configuration of BSGC-COM

FIGS. 753 through 755 are block diagrams showing the functions of the BSGC-COM hardware.

7.2 Explanation of Blocks Showing Functions of BSGC-COM

FIG. 756 shows the function of the HMX00A package in the BSGC-COM.

FIG. 757 shows the function of the HMX01A package in the BSGC-COM.

FIG. 758 shows the function of the HSF00A/HSF04A in the BSGC-COM.

7.3 Switch Interface

FIG. 759 shows the interface for the signal transferred from the HMX00A package in the BSGC-COM to the SWMDX (HMX03A) package in the ASSWSH (refer to FIG. 167).

FIG. 760 shows the interface for the signal transferred from the SWMDX (HMX03A) package in the ASSWSH to the HMX00A package in the BSGC-COM.

7.4 SWTIF Interface

FIGS. 761(*a*) and 761(*b*) show the interface of a signal transferred between the HSF04A package in the BSGC-COM and the SWTIF (HNC00A) package in the ASSWSH (refer to part 4).

7.5 Configuration of Higher/Lower Shelf of BSGCSH

The BSGCSH can daisy-chain up to two shelves. FIG. 762 shows the daisy chain of the BSGCSH.

7.6 BSGC-COM Loopback Configuration 7.6.1 Cell Loopback of BSGC and BSGC-COM in INS State FIG. 763 shows the configuration of the cell loopback in an INS state for both BSGC and BSGC-COM.

When a loop is set, the state of a cell enable signal is changed from the gate-stop state to the pass-through state at position A in FIG. 763. FIG. 764 shows the logic of setting the loopback for the loopback configuration shown in FIG. 763.

7.6.2 Cell Loopback in OUS State for BSGC and BSGC-COM

FIG. 765 shows the configuration of the cell loopback in an OUS state for both BSGC and BSGC-COM.

The loop points are (1) and (2) shown in FIG. 765.

Control Procedure of Loopback at Loop Point (1)

When the loopback is set at loop point (1), the state of a cell enable signal is changed from the gate-stop state to the pass-through state at position (1). FIG. 766 shows the logic of setting the loopback for the loopback configuration at loop point (1) shown in FIG. 765.

For the cell route in the loopback at loop point (1), the upward (BSGC ASSW) 2/1 cell in the HSF00/04A should be routed toward the test system. FIG. 767 shows the logic of setting a cell route in the loopback at loop point (1).

FIG. 768 shows the logic of setting the VCC in the loopback at loop point (1).

Control Procedure of Loopback at Loop Point (2)

When the loopback is set at loop point (2), the logic of the reset terminal of the CSPC-ADP is set to 1 at position (1). This state is set by the I/O register in the BSGC package. FIG. 769 shows the logic of setting the loopback for the loopback configuration at loop point (2) shown in FIG. 765.

The cell route in the loopback at loop point (2) is set as in the loopback at loop point (1).

The logic of setting the VCC in the loopback at loop point (2) is the same as that in the loopback at loop point (1).

8. Duplex Process Control 8.1 Hardware Configuration 8.1.1 BSGC Hardware Configuration FIG. 770 shows the hardware configuration of the BSGC.

8.1.2 General Description of the BSGC Hardware

FIG. 771 shows the outline of the BSGC hardware.

8.1.3 Memory Map

FIG. 772 shows the memory map of the BSGC.

8.1.4 I/O Map

FIG. 773 shows the I/O Map in the BSGC.

9. Maintenance and Operation

Described below is the maintenance and operation of the BSGCSH.

9.1 Diagnostics Functions 9.1.1 Diagnostics Object Items

The diagnostics object items are listed below.

(1) INF interface i) CC access read/write ii) DMA transfer read/write (2) Functions in BSGC package: No-function items are deleted from the present SGC diagnostics. Additional functions are entered as (MACH-1.2).

(All points accessible by the CPU are diagnosed=self-diagnosis)

(3) between BSGC and SWINF i) A loop is set between the BSGC and SWINF and a sending/receiving cell test is conducted.

(4) VCC memory test: a read/write test of a VCC table memory from the BSGC card of the smallest number.

(5) BSGCSH: a link establishment test on the LAP to another device (6) Cell-by-cell loop test at BSGC-COM using a TCG (refer to 9.2).

9.1.2 Details

Described below are the detailed explanation of each diagnostics item.

9.1.2.1 INF Interface→BCPR Access Read/Write Diagnosis

FIG. 774 shows the BCPR access read/write.

9.1.2.2 INF Interface DMA Transfer Read/Write Diagnosis

During the DMA transfer test, 1) a command is activated, and concurrently 2) a retry instruction is issued. A command to DMA-write for diagnostics is prepared in the command entered in the BSGC after the activation of the command. The necessary information is (1) an MM transfer address, (2) the number of transferred words, and (3) a transfer data pattern. (1) and (2) are reported directly to the BSGC as being stored in a command. As the data of (3), two patterns are prepared as shown in FIG. 775.

9.1.2.3 Diagnostics of Functions in BSGC

The functions in the BSGC are self-diagnosed.

9.1.2.4 Diagnostics Between BSGC and BSGC-COM

The function test is conducted as a single phase of self-diagnosing the BSGC in 9.1.2.3. FIG. 776 shows the position of a loop in the diagnostics between the BSGC and BSGC-COM. In FIG. 776, the loop test between the BSGC and BSGC-COM can be the home system BSGC-COM loop test conducted at point (2) and the mate system BSGC-COM loop test conducted at point (3). The loop test at point (1) is a self-loop test of the CARP-LSI.

9.1.2.5 VCC Memory Test

This test is conducted as a single phase of the self-diagnostics in the BSGC. This test phase can only be conducted from the BSGC of the smallest number. This phase can be effective only in the OUS state of the BSGC-COM of either #0 or #1 system. Therefore, the OUS/active/standby information of the BSGC-COM (ASSW) should be reported before starting the test. Before starting this test, the VCC selector compulsory selection register should compulsorily route the output of the 2-1 selector, located before the VCC, toward the test BSGC. FIG. 777 shows the state of the VCC read/write test entered when the #1 system ESGC is making the diagnostics in the OUS state.

9.1.2.6 LAP Link Establishment Test Between BSGC and Another Device

A command is prepared to compulsorily route the output of the standby system BSGC-COM selector (for selecting a BSGC signal) toward the diagnostics performing BSGC.

<Test Method>

The test is conducted in accordance with the inter-device LAP link establishment procedure to be followed by the device control software. Accordingly, no special diagnostics LAP link establishment program is prepared for the BSGC.

9.2 TC Function

Described below are the functions of the BSGCSH in the continuity test using the TCG.

9.2.1 Basic Policy

FIG. 778 shows the basic policy of the continuity test in the BSGCSH in the active system/standby system/OUS state.

9.2.2 Cell-by-Cell Loopback (OUS State)

There are two systems as follows.

(1) The process is realized in the BSGC-COM. The loopback point is located as having a transmission speed for the BSGC. That is, no loopback is made under the transmission speed of 622 Mbps. The loopback requires the following conditions (refer to FIG. 782).

<Condition>

(a) The cell-by-cell loopback is performed by the SEL N-1 LSI using the AHM.

(b) The cell-by-cell loopback has the only function of determining the 0 bit of the tag for loopback.

(c) The tag (TCG→BSGCSH) of a test cell (TC) is the same as that used in the standby system-duplex device so that it is not dropped in the standby system BSGC-COM.

(2) The loopback is not realized in the BSGC.

The output of the BSGC→ASSW direction selector in the standby system BSGC-COM should be compulsorily directed to the standby system BSGC. If a cell is being transmitted from the standby system BSGC, the cell of the duplex device at the standby unit is stopped in the active system BSGC and the loopback is not realized in the BSGC.

9.2.3 Cell-by-Cell Loopback Position

FIG. 779 indicates the position of the cell-by-cell loopback in the BSGC-COM. The loopback position is set in BSGC units (that is, DMUX units). 9.2.4 TC Stop Function in Active System BSGC during OUS Test FIG. 780 shows the hardware configuration for the TC stop function in the active system BSGC during the OUS test.

The BSGC is loaded with an MUX to receive cells from both active and standby systems. When one system is in an OUS state, the test cell (TC) from the standby system ASSW should not be received by the active system BSGC. Therefore, the cell from the BSGC-COM, which is in the OUS state before the input into the MUX, is stopped.

Cells are stopped by setting the I/O register in the active system BSGC.

FIG. 781 shows the transmission signaling route from the BSGC to the duplex device or simplex device.

FIG. 782 shows the reception signaling route and test cell route from the duplex device or simplex device to the BSGC.

<Part 8>

Described in part 8 are the configuration and the function, etc. relating to the present invention.

FIG. 783 shows the protocol data unit (L2-PDU and L3-PDU) of layers 2 and 3 related to the system of the present embodiment.

The L3-PDU (described later for the detailed format) contains the destination address DA and source address SA. When the L3-PDU is transmitted, the destination is determined by the destination address DA. Then, a variable length data is stored after the header field.

If the L3-PDU is transferred in the SMDS over the ATM switching network (ASSW) shown in FIG. 8. it should be converted into a 53-byte-based cell format. At this-time, the L3-PDU is converted into the L2-PDU. When the L2-PDU is generated from the L3-PDU, the L2-PDU is decomposed into a BOM cell, COM cell, and EOM cell as described above. (When the L3-PDU is converted into a single L2-PDU, it is output as an SSM.)

The L2-PDU shown in FIG. 783 is an example of a BOM cell. The leading 5 bytes of a BOM is a header field containing routing information, etc. The detailed description is given above. The 2 bytes preceded by the header field stores a segment type ST, sequence number SN, and message identifier MID (or a multiplex identifier).

The segment type ST is a 2-bit field and indicates the SOM, COM, EOM, and SSM. The sequence number SN is a serial number assigned to a transferred cell for convenience in detecting the cell if it is lost or mistakenly inserted. A message identifier MID is a 10-bit field and identifies the L3-PDU for each SNI. Therefore, the same message identifier MID is assigned to a plurality of L2-PDUs generated from a single L3-PDU. The message identifier MID is not used double for each SNI. In the system of the present embodiment, up to 16 message identifiers MID can be assigned to each SNI.

The above described information is followed by a 44-byte user information field (payload) The user information field stores the destination address DA and source address SA of the L3-PDU for the BOM or COM. The user information field is further followed by an information length indicator (LI) and cyclic symbol check CRC. The information length indicator LI is a bit indicating the valid information of a cell. For example, the BOM and COM are represented by 44 bits, and the length of the SOM and SSM depends on the cell.

Described below is the routing process. The routing process is realized by the SBMH (SBSMESH) described in part 5 and the GWMH (GWMESH) described in part 6.

The SBMESH (or GWMESH) generates a table from which tag information and output MID is retrieved to be assigned to a cell using the MID (input MID) of an input cell as a key as shown in FIG. 784 (in the case of the system of the ASSW as shown in FIG. 8, an input cell is input to the SBMESH in an ATM cell format and processed as an L2-PDU in the SBMESH For simplicity, both are referred to as cells). The method of generating the table and the routing process using the table are described by referring to the flowchart shown in FIG. 785.

If a cell is input to the SBMESH (or GWMESH), the segment type ST of the cell is checked in step S10. If the input cell refers to a BOM, then the destination address DA of the L3-PDU stored in the payload field of the BOM is extracted and the route to the destination is determined according to the DA in step S11. Actually, a PVC is preliminarily set between the SBMESH and the destination, and the tag information stored for the DA is retrieved. The tag information is 2-byte information containing tags A, B, and C as shown in FIG. 420.

In step S12, an output MID is acquired. The output MID is determined such that it is not defined double in the message handler at the destination. Refer to (29) in chapters 3 and 4 in part 5 for details. In step S13, the acquired tag information and output MID is assigned to the above described BOM and output. In step S14, a table storing the retrieved tag information and output MID is generated using the MID (input MID) assigned to the BOM at the input as a key.

In step S10, if an input cell refers to an SSM, the processes in steps S21 through S23 are performed. The processes in steps S21 through S23 are the same as those in steps S11 through S13. Then, an output MID is released in step S24.

In step S10, if an input cell refers to a COD, the above described table is retrieved in step S31 using the input MID of the COM as a key. Then, in step S32, the tag information and output MID retrieved from the table are assigned to the COM and output.

In step S10, if an input cell refers to an EOM, the tag information and output MID retrieved from the table are assigned to the EOM and output in steps S41 and S42 as in the case of the COM. Then, the output MID is released in step S43.

Thus, the routing process is performed for the BOM and SSM using the DA of the L3-PDU stored in the payload field. For the COM and EOM, routing information is retrieved using the same message identifier MID set for a plurality of cells obtained from a single L3-PDU. Thus, the routing process is performed in cell units on cells of any segment type. Thus, the routing process is performed in L2-PDU units without assembling L3-PDUs.

Described below is the collection of error log.

In the system according to the present embodiment, error log is collected in L2-PDU units (cell units). The error log is collected by the SBMESH (or GWMESH).

The SBMESH (or GWMESH) has a table (RAM) using MIDs and SNI numbers as keys (addresses). The table generating method is basically the same as the method of generating the above described table. The error log collection table stores destination addresses DA and source addresses SA of the L3-PDU using input MIDs and SNI numbers as keys.

As described above, an input MID is assigned such that it is not assigned double in a single SNI. Therefore, MIDs can be identified even if a plurality of users exist in a single SNI and the users simultaneously transmit data. However, since the SBMESH of this embodiment contains a plurality of SNIs (up to 32 SNIs) and SNI numbers should be identified to identify all L3-PDUs. In this system, the SNI number is identified by the VCI as shown in FIG. 217.

When an NG is detected as a result of an error log object check, the above described table is searched using the input MID and SNI number of the L2-PDU as keys regardless of the segment type of the L2-PDU. Thus, the DA and SA of the L3-PDU corresponding to the L2-PDU are obtained and those associated with errors are stored together with the SNI number and error type in the interface register for the software.

The error log is collected by the following triggers.

(a) After setting each parameter in the above described interface register, an interruption is generated in the software. The software starts collecting the log through the interruption.

(b) After setting each parameter in the above described interface register, the flag for the software is set ON. The software constantly monitors (looks in) the flag, and starts collecting the log when the flag is set ON.

(c) Error type 0 does not refer to any specific error type. The software constantly monitors the error type field of the above described interface register, and the field starts collecting the log when the field is not 0 (in this case, the parameter for the error type is set last of all).

In collecting the log by any of the methods (a) through (c), the software clears the interface register after collecting the log (if (b) above is adopted, the flag is set OFF). Thus, a series of log collecting operation is completed.

In the descriptions above, only one type of error log parameter can be set in the interface register at a specific timing. If the register is provided with the FIFO of the depth calculated according to the throughput of the software and error occurrence rate, plural types of error log parameters are set simultaneously to collect error log.

In the above listed methods, the table requires a large capacity to store SAs and DAs. That is, the MID is 10-bit information and another 10 bits are reserved for the SNI number. Therefore, the combination of a MID and an SNI requires a total of 20 bits. The 20-bit addresses amount to $2^{20}$=1 megabytes. The DA and SA are 64 bits each. If the combination of a MID and an SNI number is used as a key to the table, the capacity of the RAM for the table is undesirably large.

Therefore, in the present embodiment, the number of L3-PDUs simultaneously transmitted in any SNI (number of MIDs for each SNI) is defined as up to 16. That is, 10 bits are assigned to an MID field. According to the above mentioned definition, each L3-PDU transmitted simultaneously in any SNI can be identified by 4 bits.

As a result, the address of $2^{20}$=1M for the combination of the MID and SNI can be reduced to $2^{14}$=16K according to this method. In the conversion above, a pattern matcher (conversion table) for the MID and SNI number is used to calculate where in the SNI the 10-bit MID is located (as described above, up to 16 MIDs are simultaneously allowed in each SNI, and the MID is one of the first through the 16th MID).

In the processes preceded by the above described conversion process, the error log collection is performed as described above.

In this method, a table (RAM) is provided to store DAs and SAs. When an NG is detected as a result of the error log object check, the DA and SA are read from the table and stored in the interface register for the software together with the SNI number and error type.

On the other hand, the table can be an interface to the software with the DA and SA table storing SNI numbers and error types. That is, the DA and SA of the BOM are stored in the table using the MID and SNI number of the BOM (or the values converted as described above) as an address each tome a BOM arrives. When an NG is detected as a result of the error log object check, the SNI number and error type are written to the table using the MID and SNI number of the L2-PDU as a key (address) for an L2-PDU of every segment type.

The log collection trigger of the software is effective to any of (a) through (c) above. (c) is most appropriate.

Thus, in the error log collection method of the present embodiment, error information generated for each L2-PDU can be collected in L3-PDU units without converting into L3-PDU. Furthermore, the capacity of the table required for collecting error log is reduced considerably by performing a predetermined conversion on the combination of an MID and SNI number.

Described below is the inter-station loopback test to be conducted from a subscriber terminal unit.

This test is conducted to confirm by the subscriber the quality and normality of the transmission line between predetermined switching station in the network. The outline of the test method is described by referring to FIG. 786. Conducted in this example is the test of the transmission line from subscriber terminal 2 to SW stations 3 and 6 accommodating the subscriber terminal unit 2 in FIG. 786.

First, a test start request packet is issued from subscriber terminal unit 2 to SW station 3. The test start request packet has a header field whose specific ID indicates a test start request to discriminate it from a packet for transmitting normal data. Practically, a specific test request DA is set.

When SW station 3 receives the above described test start request packet, it generates a test packet and outputs it to SW station 6. At this time, the destination address DS of the test packet indicates SW station 6, and the source address SA indicates SW station 3. The test packet arrives at SW station 6 through SW stations 4 and 5. SW station 6 exchanges the DA and SA of the test packet and returns the packet to SW 3.

SW station 3 receives the test packet and collects the test result. That is, SW station 3 (source station) writes the time to the payload field when the test packet is generated, and SW station 6 (destination station) writes to the payload field when the test packet is received. Accordingly, if SW 3 receives the returned test packet, it can be confirmed that the data have been transmitted through the transmission line between SW stations 3 and 6, and the transmission time (transmission delay) can also be informed of. SW station 3 notifies the customer terminal unit 2 of the test result. Thus, the subscriber tests the predetermined transmission line and is informed of the result.

The above described test method is described in detail by referring to FIG. 787. A customer premise's equipment (CPE) 10 corresponds to the customer terminal unit 2. A customer line control connection less server (CLS-SU) 20 and trunk control connectionless server (CLS-TRK) 30 are, for example, servers provided in SW station 3 shown in FIG. 786. A call processor (CPR) 40 is a processor accessed by the server.

When the test is activated, a test start request message packet is generated by a loopback test control unit 11 in the CPE 10, and the request packet is transferred as a common user packet over the network. The telephone number (DA) set in the level 3 header field in the test start request message packet is a special telephone number (specific DA) defined between the control unit and the network.

The test start request message packet is terminated by an L3 header analyzing unit 21 in the CLS-SUB 20. The L3 header analyzing unit 21 analyzes the header field of the received packet and determines whether or not the DA of the packet refers to the above described specific DA. Unless it is the specific DA, the packet is processed as a common user packet in a normal routing process. If it is the specific DA, the received cell is recognized as a test start request message packet and transmitted to a specific packet control unit 22 in the CLU-SUB 20.

The payload field of the test start request message packet stores the ID of the subscriber, station number of the loopback terminal station, time stamp, etc. The CLU-SUB 20 transmits these data to the CPR 40. According to the information, the CPR 40 transfers the test start request t the CLS-TRK 30 in the procedure followed in activating the inter-station loopback test so as to activate the intra-station loopback test from the subscriber.

When the CLS-TRK 30 receives the above described test start request, a packet generating unit 31 generates a test packet and outputs it. The DA of the test packet is the number of the loopback terminal station stored in the test start request message packet. The SA of the test packet is the value of the ID of the CLS-TRK 30 or the CPE 10.

The loopback terminal station has the server similar to the CLS-TRK 30. When the CLS-TRK 30 of the terminal station receives a test packet, and realizes the DA of the test packet as the station itself, it exchanges the DA with the SA in an DA/SA inverting unit 32. It also writes to the test packet the time when the CLS-TRK 30 of the destination station received the test packet. Then, it is indicated (backward line indicator) that the loopback process has been performed in the terminal station. After these processes, the test packet is output to the SA set by the exchange of the DA and SA.

The subscriber is reported as follows when a test packet is looped back at the terminal station. That is, if the CLS-TRK 30 shown in FIG. 787 receives a test packet, it recognizes on the backward line indicator that the packet has been looped back, and notifies the CPR 40 of the test result (delay time, etc.) by transferring the contents of the test packet to the CPR 40. The CPR 40 analyzes the contents of the packet, selects the CLS-SUB accommodating the corresponding subscriber, and issues a test result notification packet issue request. When the CLU-SUB 20 receives the request, it generates a test result notification packet and sends it to the CPE 10. The SA set for the test result notification packet is a special telephone number (specific SA) defined over the network, and is recognized by the loopback test control unit 11 of the CPE 10. Thus, the test information is extracted. The test result notification packet stores the delay time as the test result.

In the above described procedure, the determination of the test packet is made at a specific DA. The necessary data is stored in another field portion in the header of level 3, and the determination can be made according to the data. If the test packet is not returned to the CLS-TRK 30 within a predetermined time after the CPE 10 issued the test start request, a packet indicating the packet transmission is not in a normal state can be generated and it can be reported to the CPE 10.

Furthermore, the above described test method can be applied to the connectionless communications using the SMDS. In this case, the CLU-SUB 20 and the CLS-TRK 30 are realized by the SMDS processing server, and a specific identifier, instead of the specific DA, can be set in the header field of the L2-PDU.

Described below is the method of testing the PVC set in the connectionless communications system using the SMDS.

First, the range of the influence of the fault of an optional PVC is shown by referring to FIG. 899 showing the prior art technology. The PVC is classified into 3 types as follows.

1. Source SMDS subscriber (a)(b) SMDS support module S (PVC 1, 2)
2. SMDS support module S—SMDS support module R (PVC 3)
3. SMDS support module R—SMDS subscriber (x)(y) (PVC 4, 5)

When a fault occurs in the PVC of 1, the source SMDS subscribers (a) and (b) cannot communicate with any destination SMDS subscriber. No communications can be set between the source SMDS subscribers (a) and (b).

If a fault occurs in the PVC of 2, no source SMDS subscribers accommodated in the SMDS support module S at the source of the PVC can communicate with any destination SMDS subscriber accommodated in the SMDS support module R at the destination of the PVC. That is, the source SMDS subscribers (a) and (b) cannot communicate with the destination SMDS subscribers (x) and (y).

If a fault occurs in the PVC of 3, no source SMDS subscriber can communicate with any destination SMDS subscriber. For example, if a fault occurs in PVC 4, no subscriber can communicate with any destination SMDS subscriber (x).

The PVC can be validated as follows.

(1) The validation is triggered by a subscriber complaint (request or complaint).

(2) The validation is periodically performed to prevent mixed faults.

In the case of (2) above, the validation 1 through 3 should be automatically performed.

In the case of (1) above, the faulty point can be presumed by analyzing the complaint. After the presumption, a suspect PVC is validated. FIG. 788 shows the algorithm.

When a complaint occurs from a subscriber, it is checked in step S1 whether or not the complaint has come from a single source SMDS subscriber. If the complaint has come from a plurality of subscribers, it is checked in step S2 whether or not the contents of the complaint refer to the incapable communications to a single destination SMDS subscriber. If "yes" in step S2, the fault is considered to have resulted from the PVC of 3 above. If "no" in step S2, then the fault is considered to have resulted from the PVC of 2 above.

In step S1, if the complaint has come from a single source SMDS subscriber, it is checked in step S3 whether or not the complaint refers to the incapable communications to any destination SMDS subscriber. If "yes" in step S3, the fault of 1 above is determined. If "no" in step S3, it is checked in step S4 whether or not the contents of the complaint refer to the incapable communications to a single destination SMDS subscriber. If "yes" in step S2, the fault of the PVC of 3 above is determined. If "no" in step S2, the fault of the PVC of 2 above is determined.

Thus, if the complaint has come from the subscriber, then the complaint is analyzed, the faulty portion is detected, and the PVC test explained below is conducted, thereby reducing the recovery time.

The above mentioned algorithm of analyzing a fault can be performed manually, but can also be automatically analyzed by entering the complaint in the system. In this case, a validation process can be automatically performed based on the analysis result.

In the PVC validation method, a test message is transmitted to a PVC to be tested to confirm the matching between the received message and transmitted message. For example, to verify the PVC between the source SMDS subscriber (a) and SMDS support module S shown in FIG. 899, the test message generator and test message checker should be provided in respectively the source SMDS subscriber (a) and SMDS support module S. Thus, a test message can be sent and received for validation. To validate the PVC between the SMDS support module R and the destination SNDS subscriber (x), the test message checker and test message generator should be provided in respectively the destination SMDS subscriber (x) and SMDS support module R. Thus, a test message can be sent and received for validation.

However, since these method requires the test message generator and test message checker for each SMDS subscriber, the system according to the present embodiment has the following configuration.

FIG. 789 shows the system configuration using the SMDS. The configuration is the same as that of the prior art shown in FIG. 899. In FIG. 899, the SMDS subscribers are described as source and destination subscribers. Actually, there are no source-exclusive subscribers or destination-exclusive subscribers. Subscribers (a) and (b) can be destination SNDS subscribers for the SMDS support module. Subscribers (x) and (y) can also be source SMDS subscribers. Therefore, the configuration shown in FIG. 899 is the same at that shown in FIG. 789.

To validate the PVC between 1 and 3 above, that is, to validate the fault in the PVC between the SMDS subscriber and SMDS support module, the test message generating unit (test message generator) and a test message check unit (test message checker) are provided in the SMDS support module. Thus, the test message generating unit and test message check unit can be centrally managed, thereby reducing the entire cost.

A test message loopback function is provided at the terminal to the SMDS subscriber. This function is realized by the following two processes.

A test message is determined by the VPI/VCI and only the test message is looped back.

All input messages are looped back.

If an SMDS subscriber shown in FIG. 789 is actually an SMDS-exclusive subscriber, the loopback can be performed by the latter method. If the SMDS subscriber processes normal ATM cell data in addition to the SMDS, then the former method is recommendable. Since the SMDS message and ATM cell data have different VPIS/VCIS, an SMDS message can be selectively looped back. A service can be continued for the ATM cell data during the validation, and totally improved services can be provided.

The following two processes can be performed to loopback messages at the terminal to the SMDS subscriber.

The SMDS subscriber sets the loopback.

The SMDS subscriber can a loopback instruction from the system (the terminal at the SW).

FIG. 790 shows the test image of the PVC of 1 above (with the source SMDS subscriber (a)). FIG. 791 shows the test image of the PVC of 3 above (with the destination SMDS subscriber (x)). (A test message appears along the bold line shown in FIG. 791.)

The tests are conducted according to the same method. That is, a test message generating unit is provided in the SMDS support module R, and the test message generated in the module is transmitted to the SMDS subscriber along the route represented by the bold line shown in FIG. 791. Then, the message is returned to the SMDS support module S along the route represented by the bold line shown in FIG. 791 after being looped back by the SMDS subscriber, and is checked by the test message check unit provided in the module S.

As shown in FIG. 792, there are two positions where a test message is multiplexed into normal SMDS messages in the SMDS support module R. One method is, as shown in FIG. 792(*a*), to multiplex the test message to a normal SMDS message and check it in various processes. Another method is, as shown in FIG. 792(*b*), to multiplex the message during the checks. If the PVC tests are performed exclusively, these methods are not discriminated from each other. However, if the method shown in FIG. 792(*a*) is adopted, the internal test of the SMDS support module R can be desirably conducted.

The following three multiplexing methods are shown in FIG. 792.

simply selecting a normal SMDS message and a test message detecting an idle timing of a normal SMDS message in a multiplexing block, reporting the timing to the test message generating unit, and instructing the transmission of the test message.

The test message generating unit simply transmits a test message, buffers it in the multiplexing block, detects the idle timing of the normal SMDS message, and multiplexes the message.

In the first method, only a test message is transmitted during the test and a normal SMDS message cannot be transmitted. Therefore, it undesirably influences the subscribers other than the test objects In the second and third methods, a normal SMDS messages are sent from the subscribers other than the test objects, and a test message can be transmitted during the idle time.

There are also plural points where a test message is separated from normal SMDS message in the SMDS support module S. As shown in FIG. 793(*a*), a test message check unit is provided immediately after the reception of the test message. In the method shown in FIG. 793(*b*), the test message is separated from the normal SMDS message after various checks, and then the message is checked. (Additionally the message can be demultiplexed during the DA analysis, various checks, etc.)

In this case, if the PVC tests are performed exclusively, these methods are not discriminated from each other. However, if the method shown in FIG. 793(*b*) is adopted, the internal test of the SMDS support module S can be desirably conducted. The test message checker has the function of fetching only the message having the test object PVC/VCI.

As described above, in the PVC test of 1 and 3 above, the SMDS support module R comprises a test message generating unit, and the SMDS support module S comprises a test message checker.

To test the PVC of 2 above, that is, to test the PVC between the SMDS support modules, the SMDS support module S comprises a test message generator and the SMDS support module R comprises a test message checker. FIG. 794 shows the test image. A test message is transmitted along the bold line shown in FIG. 794.

The multiplexing portion for a test message in the SMDS support module S and the demultiplexing portion for a test message in the SMDS support module R are similar to those shown in the configuration according to FIGS. 793 and 794. In any method, if the PVC tests are performed exclusively, these methods are not discriminated from each other. However, if the message is multiplexed before each check and demultiplexed after each check, the internal test of the SMDS support module can be desirably conducted.

Assuming that, as shown in FIG. 795, the test message in testing the PVC of 1 and 3 above is multiplexed before each check and the test message in testing the PVC of 2 above is demultiplexed after each check in the SMDS support module R. In this case, the test message generating unit and checker provided for a PVC test can realize the testing of the functions of various checks in and for the home module. This holds true with the SMDS support module S.

Described below is a more practical test method. in any of the tests of the PVC in 1 through 3 above, a test message is prepared in the test message generating unit as a: test start instruction. The VPI/VCI for the test PVC is added to the test message and then transmitted. (Otherwise, when a test message is prepared, the VPI/VCI for the test PVC is written as a part of the test message. In this case, the test message is transmitted at the start of the test.)

A test message is transmitted through the test PVC and enters the test message checker. (As described above, the test message checker is assigned the VPI/VCI for the test PVC so that only a message having the VPI/VCI may be entered and accumulated.) According to the test start instruction, test messages accumulated in the test message checker are read and checked for their contents after a predetermined time period (longer than the time logically required for the test message to arrive at the test message checker from the test message generating unit). (The accumulating unit in the test message checker is cleared before the start of the test.)

The number of the test messages can be only one, but is commonly plural. (The physical restriction defines the limit of the number.) In this case, the PVC test checks the number of test messages and the contents of the messages.

In the PVC test of 1 and 3 above, the SMDS subscriber for the test PVC follows the loopback mode. Assume that a message arrives from an SMDS subscriber at the SMDS subscriber for the test PVC in this mode.

In the above described method of simply selecting a test message and a normal message, all normal SMDS messages are discarded. Therefore, the SMDS message is not transmitted to the SMDS subscriber for the test PVC, causing no trouble in the test. However, in the method of inserting a test message at an idle timing of normal messages, the SMDS message is transmitted to the SMDS subscriber for the test PVC. The VPI/VCI is the same as that for the test PVC, and cannot distinguished from the test message.

The following two countermeasures can be taken.

The first method is to recognize the VPI/VCI for the test PVC in the multiplexing unit, check the VPI/VCI of the normal SMDS message, and discard the message when it has the VPI/VCI for the test PVC is received.

The second method is to preliminarily assign identification information, etc. to the test message without taking any hardware process, and make a determination when it is read by the test message checker. The second method is described below in detail.

If only one test message is assumed in the test method, determination is made as to whether or not a single message is accumulated in the test message checker.

If there is no message accumulated, the test is recognized as NG.

If there is one test message, it is read and determined whether or not it refers to a test message. If it is a test message, its contents are checked whether they are OK or NG. If the message is not a test message, a test retrial is made. To prevent infinite retrial, there is an algorithm prepared to determine no more tests after a predetermined number of retrials.

If n test messages are assumed in the test method, the test message checker first determines whether or not n messages have been accumulated in the test message checker.

If then umber is smaller than n, the test is determined as NG.

If the number is n, the first message is read to be determined whether or not it refers to a test message. If so, its contents are checked and determined whether they are OK or NG. If NG, the entire test result is determined as NG. If OK, the second message is processed similarly. If the first message is not a test message, the second message is processed immediately.

Thus, the process is repeated for n determinations. If m test messages are received ($m \leqq n$) and their contents are completely OK, the entire test result is recognized as OK. If the number of test messages in the above mentioned number n is smaller than a predetermined number m (m can be optionally set), then a retrial is made. To prevent infinite retrial, there is an algorithm prepared to determine no more tests after a predetermined number of retrials.

This method can be applied to the test of the PVC of 2 above.

Described below are the BE tag and BAsize check of layer 3 to be confirmed for the normality of the SMDS data, and the length check of layer 2. These checks are made in the SBMESH (or GWMESH) according to the present embodiment.

FIG. 796 shows the format of the L3-PDU. As shown in FIG. 796, the leading Rsvd field of the L3-PDU is a 1-octet area provided to define the format (not currently used). The BEtag field is 1-octet information to be compared with the BE tag written to the trailer of the L3-PDU. If a matching result is confirmed at a receiving terminal, the data is recognized as normal. The BAsize field is a 1-octet information notifying the data receiving unit of the buffer size. The DA and SA fields are assigned 8 octets each. The data after the SA field before the Info field is not related to the present embodiment.

The Info field is an area storing actual transfer data. It is variable and up to 9,188 octets. The Rsvd, BEtag, and Length fields in the trailer store the same information as the Rsvd, BEtag, and BAsize fields stored at the head of the L3-PDU.

The correlation between the L2-PDU and L3-PDU is explained by referring to FIG. 797. As shown in FIG. 797, the BAsize of the L3-PDU can be obtained by subtracting the leading 4 octets of the L3-PDU (Rsvd, BEtag, and BAsize fields) and 4 octets of the trailer (Rsvd, BEtag, and Length fields) from the total length of the L3-PDU. The length of the payload length is obtained by subtracting 7 octets of the header and 2 octets of the trailer from the total length (53 bytes) of the L2-PDU. The length of the payload of the L2-PDU refers to the valid length of the payload. Therefore, the length of the payload of the BOM and COM is 44 octets, but the length of the payload of the EOM and SSM is variable.

Assuming that the BAsize of the L3-PDU is 100, the conversion of the L3-PDU into the L2-PDU is described below.

The L2-PDU BOM stores 44 octets containing a part of the header and information fields of the L3-PDU. The L2-PDU COM stores 44 octets containing the information field of the L3-PDU. The L2-PDU EOM stores 20 octets containing data in the information field and trailer field of the L3-PDU. Therefore, the valid payload length of the L2-PDU EOM is 20 octets.

Described below are the three checks to be made according to the present embodiment. These checks are controlled under the restriction that an error is allowed only at the SSM and EOM, and that the BAsize and BEtag are not NG when the result of the L2 payload length check is NG.

The three following checks are made according to the present embodiment.

1. L2-PDU payload length check at SSM and EOM
2. L3-PDU EBtag check
3. L3-PDU BAsize check Before explaining these checks, the data format is explained briefly. The L3-PDU has the format shown in FIG. 796 as described above. The length of the L3-PDU is represented by octets of a multiple of 4. At this time, it is indicated which part of the L3-PDU data divided into the L2-PDU segment types is put in the segment unit of the L2-PDU. The sum of the SNI and MID is referred to as an RMID.

(1) L2-PDU Payload Length Check at SSM and EOM (FIG. 798)

In this check, a predetermined value is subtracted from the BAsize of the L3-PDU for each of the BOM, COM, and EOM (or SSM). Then the BAsize is compared with the valid payload length of the EOM (or SSM), and the normality of the data is confirmed according to a matching result.

First, the BAsize of the L3-PDU format is extracted. The BAsize is stored in the received BOM, and then stored in the table using the RMID of the BOM as a key (address). The BAsize is then retrieved to subtract 9 from the BAsize value and write the balance to the table again. (When a BOM is received, 36 octets are actually subtracted. However, since the length of the L3-PDU is represented by octets of a multiple of 4, all values including the BAsize are represented in the format using the divisor of 4 for simplicity of calculation as described above.

If the COM is received and it is assigned the same RMID as the above described BOM, data is read-from the table according to the RMID as a key. Then, 11 is subtracted from the read value, and the balance is written again to the table. If there are a plurality of COMs, the process is repeatedly performed.

If the EOM is received and it is assigned the same RMID as the above described BOM, data is read from the table according to the RMID as a key. If the value is 0, or if the value does not match the valid payload length of the EOM, it indicates an error. If the values match each other, it indicates that the L2-PDU payload is normal.

Important Points of the Process

A count value may not match the L2-PDU payload length if, for example, one L2-PDU is lost. If an L2-PDU is lost, the BAsize is not counted down. In this case, the error flag indicates NG only for the L2 length. The L3-PDU BEtag check or the L3-PDU BAsize check does not indicate NG. This holds true when the L2-PDU has increased for any reason.

The subtraction process using the counter can be performed through the operation circuit. Since the data length is represented by a multiple of 4, 44, 36, and 32 can replace 11, 9, and 8 respectively for simplified operations.

(2) L2-PDU BEtag (FIG. 799)

In this check, the BEtags of the header is compared with the trailer in the L3-PDU to monitor the transmission or data by checking the comparison result.

When a BOM is received, the BEtag of the header field of the L3-PDU stored in the payload is retrieved. The BEtag is stored in the RAM using the RMID of the BOM as a key. No process is performed when a COM is received. When an EOM is received, data is read from the RAM using the RMID of the EOM as a key to compare the read BEtag with the BEtag of the trailer of the L3-PDU stored in the payload of the EOM. If the comparison outputs a matching result, it is determined that the SMDS data is normally transmitted. If the comparison outputs a non-matching result, it indicates abnormal transmission.

When an SSM is received, the BEtag of the header field of the L3-PDU stored in the SSM payload is compared with the BEtag of the trailer of the L3-PDU.

(3) L3-PDU BAsize Check (FIG. 800)

In this check, the BAsize of the header is compared with the LENGTH of the trailer in the L3-PDU to monitor the data transmission by checking the comparison result.

When a BOM is received, the BAsize of the L3-PDU stored in the payload is retrieved. The BAsize is stored in the RAM using the RMID of the BOM as a key. No process is performed when a COM is received. When an EOM is received, data is read from the RAM using the RMID of the EOM as a key to compare the read BEsize with the LENGTH of the L3-PDU stored in the payload of the EOM. If the comparison outputs a matching result, it is determined that the SMDS data is normally transmitted. If the comparison outputs a non-matching result, it indicates abnormal transmission.

When an SSM is received, the BAsize of the L3-PDU stored in the SSM payload is compared with the LENGTH of the L3-PDU.

FIG. 801 is a block diagram showing the above described checks.

When the L2-PDU is received as SMDS data, a segment type detecting unit 1 recognizes it as a BOM, COM, EOM, or SSM. Simultaneously, a RAM address generating unit 2 obtains an RMID from the SNI and MID of the L2-PDU and sets the value as an access address to a RAM 10.

The BEtag, EAsize (LENGTH), and L2-Payload-LENGTH are respectively detected by a BEtag detecting unit 3, a BSsize detecting unit 4, and an L2-LENGTH detecting unit 5. The detected values are written at an address generated by the RAM address generating unit 2 in the RAM 10. A down counter 6 performs a predetermined operation (subtraction) on the value read from the RAM 10, and the calculation result is rewritten to the RAM 10. A BEtag comparing unit 7, BAsize comparing unit 8, and L2-LENGTH comparing unit 9 perform the above described comparing operations and output the results.

Described below is the system connected via a private line to a connectionless data processing server.

FIG. 802 shows the system configuration according to the present embodiment. In FIG. 802, SW 1-1-1-4 are switches realized by ATM switches. CPR 2-1-2-4 are call processors. CLS 3-1-3-4 are connectionless process servers. CPR 2-1-2-4 and CLS 3-1-3-4 perform various processes while communicating information. A private line 5 can be, for example, a high-speed bus.

In FIG. 802, subscriber 1 accommodated in SW 1-1 through subscriber 4 accommodated in SW 1-4 indicate a route through which data is transferred in connectionless communications. In this case, the connectionless data output from subscriber 1 is transferred to CLS 3-1 through SW 1-1. The transfer is made through, for example, the PVC. CLS 3-1 interprets a message, determines a call type, etc. in collaboration with CPR 2-1. When it realizes that the call communications mode refers to connectionless communications and the destination is subscriber 4 connected to CLS 3-4, the connectionless data is transferred to CLS 3-4 through the private line 5. Thus, the data is transmitted from CLS 3-4 to subscriber 4 through SW 1-4.

As described above, the connectionless data is transferred between the CLSs via a private line without switching by the SW.

FIG. 803 is a block diagram showing the CPR and CLS. A CPR 10 comprises a message interpreting device 11, call type determining device 12, and subscriber data device 13. A CLS 20 comprises an address determining device 21, home CLS data management device 22, and mate CLS data management device 23. FIG. 804(*a*) shows an example of a table managed by the home CLS data management device 22. FIG. 804(*b*) shows an example of a table managed by the mate CLS data management device 23. The routing operations of the CPR 10 and CLS 20 are described by referring to the flowchart shown in FIG. 805. In this example, the switch is an ATM switch, and the connectionless communications system is SMDS.

When a message is received from the switch, it is interpreted in step S1. This is performed by the message interpreting device 11 in the CPR 10. Then, it is determined in step S2 whether or not the received message is in the connectionless service. In the determination, the call type determining device 12 searches the subscriber data device 13 and checks whether or not the calling subscriber is entered in the subscriber data device 13 as a connectionless service subscriber, or checks that the VPI/VCI of the message refers to an SMDS cell.

In a connection service, the process is performed in step S3. In a connectionless service, the management data for the CLS 20 is retrieved in step S4. First, the table managed by the home CLS data management device 22 is searched to determine whether or not the destination of the data is a terminal unit connected to the home CLS (step S5). If it is a terminal unit connected to the home CLS, a routing process is performed in step S6.

If the destination of the data is a terminal not connected to the home CLS, a table managed by the mate CLS data management device 23 is searched. If the destination of the data exists in the table, the connectionless data is transferred according to the CLS identification number through the private line 5. If the destination of the data is not detected in the table, the data is discarded.

When the routing method is followed in cell units in the SMDS, the process shown in FIG. 805 can be performed on the BOM (or SSM). If a COM and EOM are received with the routing information obtained by the process performed on the BOM and stored as a MID (or MID+SNI) of the BOM as a key, then the routing information is retrieved using the MID (or the MID+SNI) as a key.

The transmission method in the private line can be realized by a fixed time slot assignment method, variable time slot random assignment method, and variable time slot control assignment method.

FIG. 806 shows the configuration based on other features of the present invention and shows a terminal point of the intra-station LAPD communications. In FIG. 806, a switch processor (CC) 1 is a main CPU for controlling a switch, and its program is stored in an-MM 2.

An input/output control unit 4 is connected to a system bus 3 and controlled by the CC 1. The input/output control unit 4 is connected to a LAP control device (BSGC) 5 and an ATM switch 6, and interfaces between each device and the CC 1 through the system bus 3 for the communications of control information.

The CC 1 transmits control information to the BSGC 5 or ATM switch 6 through the input/output control unit 4. Each of the devices receives the control data, and requests the input/output control unit 4 for a DMA if it needs reading data from the MM 2.

The input/output control unit 4 sequentially accepts the requests and transfers the control information in the MM 2 to each device using the DMA.

The BSGC 5, ATM switch 6, and input/output control unit 4 are directly connected via cable.

The BSGC 5 has an interface based on the intra-station devices 7 and 8, and the LAP, assembles a LAP frame using the data received from the input/output control unit 4, and transfers the frame to each intra-station device. As described as a DS3-SMDS interface in part 2, the intra-station device (SINF) 7 controls a subscriber cell and managed by an intra-station device (SIFSH) 8. The intra-station devices 7 and 8 are connected via cable. As described as a DS3-SMDS interface in part 3, the intra-station device 8 has the functions of concentrating each of the intra-station device 7, identifying a subscriber cell and intra-station control communications cell (signaling cell), and converting an intra-station control communications cell into a LAP frame. As explained in part 4, the ATM switch (ASSWSH) 6 has the function of routing a subscriber cell and an intra-station control communications cell according to the tag information assigned to each cell.

The intra-station control communications are described in detail in part 7, and also described in 10 in part 2, and 4 or 6 in part 3.

FIG. 807 shows another configuration according to the present invention.

In controlling a terminal unit (TERM) 14, a direct memory access (DMA) method is adopted. In this method, read and write are carried out on a divided area of a memory. As shown in FIG. 807, a main memory device (MM) 7 is positioned in the switch.

FIG. 808 shows the division of the MM 7 and control information format. As shown in FIG. 808, the MM 7 is divided into 2 areas DM 1 and DM 2. The TERM 14 writes the control information to one area DM 1, and the main processor (MPR) 1 reads the control information The MPR 1 writes the control information to another area DM 2, and the TERM 14 reads the control information. The control information such as the status from the TERM 14, for example, fault information, an answer to a received command is written to the DM 1. The MPR 1 reads the control information to recognize the state of the TERM 14. A command from the MPR 1 is written to the DM 2. The control process is performed in response to the command by the TERM 14's reading the command.

FIG. 809(*a*) shows the format of the control information. The control information is represented in a 2-word (1 words=32 bits) format. The configuration is the same as the command in status. The leading 8 bits in the first word indicate the contents of the command and status. If the command refers to a fault information read command, it is defined as 01(H) and the contents are unified for all terminals. The area except the leading 8 bits in the first word refers to an address, and an address in the MM 7 to be accessed is set. The second word indicates a data area in which the information to be written to the MM 7 is set. If the status indicates a fault information notification, the contents of the fault information is set in the format shown in FIG. 809(*b*). The control information shown in FIG. 809(*a*) is stored in a control cell in the format shown in FIG. 809(*c*). The VPI/VCI of the control cell is uniquely assigned in a station.

The actual control is performed as follows.

In FIG. 807, a specific VPI/VCI is assigned to each of the TERMs 14. A tag is set in each multiplexing device CMUX 12. If control information is transmitted from the MPR 1 to the TERM 14, the MPR 1 writes the control information such as a command at an address in the MM 7 and notifies the TERM 14 of the necessity of the transmission of a command. A specific command code is used in the notification, and a VPI/VCI for the destination TERM 14 and a tag specifying the routing to the TERM 14 are set in the cell storing the command code. The cell is transmitted to the CMUX 12.

An SRM 11 routes the cell according to the tag assigned to the cell. When the TERM 14 recognizes that the VPI/VCI of the arriving cell indicates a control cell, a reading process starts for the MM 7. An address in the MM 7 and the number of commands (words) are specified in the data area of a command transmission notification control cell transmitted from the MPR 1.

The TERM 14 sets an address specified by the control cell from the MPR 1 in the address area in the control cell transmitted by the TERM 14. A VPI/VCI is assigned for the control cell and the cell is transmitted to the CMUX 12.

The VCC in the CMUX 12 assigns an output VPI/VCI instead of the input VPI/VCI assigned to the input control cell, and sets a specific tag for the input VPI/VCI. The control cell is input to the SRM 11 with other user cells.

When a cell having a tag for a control cell is received, a tag comparing unit (TAGCMP) 10 notifies an address decoder (ADRS DEC) 9 of the information.

The ADRS DEC 9 retrieves the address data from the control cell and outputs the address to the address bus 5. As shown in FIG. 808, the MM 7 is divided into two areas DM 1 and DM 2. As viewed from the TERM 14, an area assigned a larger address in the MM 7 is a read area, and an area assigned a smaller address In the MM 7 is a write area. Therefore, the ADRS DEC 9 provides a read/write enable signal for the MM 7 by decoding a higher order bit of the address in the control cell.

If the TERM 14 transmits a control cell indicating a read of a command from the MM 7 as described above, the ADRS DEC 9 outputs a read address stored in the input control cell to an address bus 5 and outputs a read enable signal to MM 7. As a result, a command group written by the MPR 1 in the DM 2 of the MM 7 is read from the MM 7 to a data bus 4.

An ATM interface device (ATMIF) 6 fetches the command group read to the data bus 4 and stores them in an ATM cell and inputs it to the CMUX 12. As a result, the ATM cell containing the command group is transferred from the CMUX 12 to the TERM 14 through the downward SRM 11.

When a status should be transmitted due to an occurrence of a fault in the TERM 14, the TERM 14 generates a control cell and transmits it to the CMUX 12. The control cell contains an address for use in accessing the DM 1 in the MM 7.

The arrival of the control cell is detected by the TAGCMP 10. The ADRS DEC 9 determines that the address stored in the input control cell is a write address by determining the higher order bit of the address.

Then, it outputs the write address to the address bus 5 and outputs a write enable signal to the MM 7.

The status information stored in the control cell is retrieved by a data converter 8 and transmitted to the data bus 4.

As a result, the status information stored in the i15 control cell is written to the DM 1 of the MM 7 through the data bus 4.

A health check is made on a predetermined cycle to monitor whether or not the communications between the MPR 1 and the TERM 14 are constantly normal. The ATMIF 6 has the function of generating an idle pattern for use in the idle check, and transmits the health check cell to the TERM 14 on a predetermined cycle.

The TERM 14 receives a cell arriving on the cycle and returns an answer cell. The answer cell specifies a write of a specific pattern at a predetermined address in the DM 1 as control information. The MPR 1 monitors whether or not the communications between the MPR 1 and the TERM 14 are normal by monitoring the address in the DM 1 divided for each TERM 14 on each cycle (refer to FIG. 808).

FIG. 810 shows the configuration of the circuit of the TAGCMP 10 shown in FIG. 807. FIG. 811 is a timing chart of the operation.

FIG. 812 shows the configuration of the circuit of the ADRS DEC 9 shown in FIG. 807. FIG. 813 is a timing chart of the operation.

FIG. 814 shows the configuration of the circuit of the ATMIF 6 shown in FIG. 807. FIG. 815 is a timing chart of the operation.

FIG. 816 shows other characteristic configurations of the present invention.

First, a jig 4 for looping back a cell is connected to an output terminal of a multiplexer (MUX) 9 and an input terminal of a demultiplexer (DMUX) 5. Then, a microprocessor specifies a loopback for a selector 6 through an I/O register 11 or for a selector 7 through an independent function.

The microprocessor 1 executes a test program stored in a RAM 10, etc. As a result, for example, a test cell is transferred through the test route shown by the broken lines in FIG. 816.

That is, a test cell is transmitted from a LAP communications control unit (LAP) 2 to the MUX 9, and transferred through the route MUX 9→jig 4 (loopback)→DMUX 5→selector 6 or selector 7 (loopback)→routing symbol adding unit (VCC) 8→MUX 9→jig 4 (loopback)→DMUX 5 LAP 2. If a test cell transmitted by the LAP 2 is received by the LAP 2 within a predetermined time period in which the transmitted cell is monitored by the test program, it is determined that the provided test route is normal and the information is recorded in the RAM 10.

The microprocessor 1 can be designed such that the test program also checks for a fault of each device shown in FIG. 816 and operating under the control of the microprocessor.

FIGS. 817 and 818 show other characteristic configurations related to the present invention. FIG. 817 shows the entire image. FIG. 818 shows the software control.

A test is started by entering a test command 5 from a maintenance terminal unit 3 connected to a source station (ATM switch) 1. The input information of the test command 5 refers to the station number of the destination station (ATM switch).

A test cell sending program 8 receives the test command 5, reads the telephone number of the home station, and generates a test cell. The test cell contains sending route information, a telephone number of the destination station, and a telephone number of the source station as test cell information.

The test cell is directly inserted to an inter-station connecting device 9 for switching data between stations and transmitted between the stations. If the inter-station connecting device 9 recognizes the telephone number of the destination station in the test cell as that of the home station, a test cell receiving program 11 is activated by the test cell.

The test cell receiving program 11 determines the sending/returning route information stored in the test cell as test cell information.

When the test cell receiving program 11 determines the sending route information stored as the test cell information, it outputs a selector cell reception information 6 through an autonomous message to notify the maintainer that the test cell has arrived.

Then, the test cell receiving program 11 generates an answering test cell. The test cell contains, as test cell information, returning route information, a telephone number of the destination station (telephone number of the source station added to the received test cell), and a telephone number of the source station (telephone number of the destination station added to the received test cell).

The test cell generated by the test cell receiving program 11 is inserted to an inter-station connecting device 10 and transmitted between the stations. When the test cell is received at the source station which entered the test command, the inter-station connecting device 9 extracts the test cell and the test cell receiving program 12 is activated. If the returning route in the test cell information stored in the test cell is determined, the cell reception information 7 is output and the test terminates.

FIG. 819 shows other characteristic configuration related to the present invention. The configuration is the same as that shown in FIG. 193 in the traffic measuring process in 5.3 ASSWSH in part 4.

That is, in the ATM switch (ASSWSH), the following numbers of the cells are counted in the 2.4 Gbps/622 Mbps switch unit or DMUX unit as the function similar to the performance monitor to manage the state of the network.

(1) number of passing cells (P=0) for each 622 Mbps highway (2) number of passing cells (P=1) for each 622 Mbps highway (3) number of discarded cells (P=O) for each 622 Mbps highway (4) number of discarded cells (P=1) for each 622 Mbps highway Each of the above described parameters is collected every 15th minute as being triggered by the 15-minute notification from the switch processor (CC).

The number of cells is counted according to the output L, V, and H shown in FIG. 819 from an ADMUX LSI 1 (refer to FIG. 182), and the count values are stored in RAM 4 and 5. The traffic is counted on a cycle of about 25 p by 8-bit counters 2 and 3 for each highway. The count value is stored at a specific address in the RAM 4 or 5 through a selector (SEL) 8 and an adder (ADD) 9. On the next cycle, the count value read from the RAM 4 or 5 through a selector (SEL) 6 or 7 is added by the adder (ADD) 9 to the next count value read by the counter 2 or 3 through the selector (SEL) 8. The sum is stored again at the above described specific address. Each time a TG 10 receives a 15-minute notification from the CC, it outputs a switch instruction to the selectors (SEL) 6 through 8 and switches the count value write RAM into the RAM 4 or 5. As a result, the RAM 4 or 5 which has stopped writing count values stores the count value at 15 minutes before the above described notification. The next 15-minute count is performed using the RAM 4 or 5 which has started writing a new count value.

After the 15-minute notification from the CC, each count value is read from the RAM 4 or 5 which has stopped writing count values. The read count value is stored in the firmware until a count value is read from the CC by an SO command.

When the numbers of passing and discarded cells at the ATM switch unit or the DMUX unit are counted, the ATM switch unit or the DMUX unit operate at a high speed and have the transmission speed of 2.4 Gbps. If all cells in the ATM switch unit or DMUX unit are valid or the all cells are discarded, then a counter of up to 28 bits is required. Providing such a counter for each information unit makes an undesirably large hardware configuration. According to the present embodiment, a small counter of 4 or 8 bits is provided for the CNTR unit comprising the counters 2 and 3 and selector (SEL) 8. A long-time counting operation can be realized by adding the output to the previous count value within a short time.

FIGS. 820, 821, and 822 show the configuration of the circuit of the memory map of the RAM 4 and 5, circuit configuration of the CNTR unit, and adder (ADD) 9 shown in FIG. 819 with the object ATM switch of 2.4 Gbps highway speed, 8-bit capacity of the counters 2 and 3 in the CNTR unit, 8-bit data direction area of the RAM 4 and 5, and 15-minute switch unit time of the RAM 4 and 5.

The memory map in the RAM 4 and 5 shown in FIG. 820 requires 28 bits for the count value. Therefore, assuming that the data direction area of the RAM 4 and 5 is 8 bits, 4 addresses are required for a count value and each count value is assigned 4 addresses from address 00H.

FIG. 821 shows the configuration of the circuit of the CNTR unit shown in FIG. 819. The CNTR unit comprises an 8-bit counter 1 for counting the numbers of passing cells and discarded cells (corresponding to the counter 2 or 3 shown in FIG. 819). If a valid cell notification or a discard notification is input from the ATM switch unit of DMUX unit, the counter 1 is incremented according to the notification. Each count value is input to a selector 2 (corresponding to the selector (SEL) 8 shown in FIG. 819), multiplexed according to the control signal from the TG 10 shown in FIG. 819. and then output.

FIG. 822 shows the configuration of the ADD 9 shown in FIG. 819. The ADD 9 comprises adders 1 and 2 of 4 lower bits and 4 higher bits with a CO signal embedded between them for carry. In this case, an adding operation is performed 4 times because a piece of information contains 4 addresses. Practically added are only the lowest address, and the remaining 3 addresses are used in a calculation with carry. Therefore, in FIG. 819, the count value entered to the ADD 9 from the CNTR unit is divided into 4 blocks. Only the leading block is an actual count value and the remaining blocks are masked to 0. The output ADDV of the adder 1 is an output of the ADD 9 shown in FIG. 819.

FIG. 823 shows the configuration of the TG 10 shown in FIG. 819. The TC 10 has a built-in 8-bit counter which controls all timings and RAM. FIG. 824 is a timing chart. The TG 10 switches the RAM 4 and 5 according to the 15-minute notification from the CC.

With the above described configuration, a long-time counting operation can be realized. The header in the ATM cell contains a CLP bit indicating the priority level of a cell, and the bit is retrieved from the header information from the ATM switch or DMUX unit and added to the counter enable condition in the CNTR unit shown in FIG. 819. As a result, four counters, control signals SL1 and SL2 from the TG10, and four types of maps of the RAM 4 and 5 allow the numbers of passing cells and discarded cells to be counted in priority level units.

FIG. 825 shows the configuration of the CNTR unit. FIG. 823 shows the configuration of the TG 10.

The configuration shown in FIG. 819 can be applied to the DMUX unit by the method using the cell header information. The DMUX process is performed according to the tag information normally assigned to the header of a cell. Receiving the information from the DMUX unit allows the numbers of passing cells and discarded cells demultiplexed in output line units to be counted However, as in the case of the priority level, the enable condition of the counter in he CNTR unit, maps of the RAM 4 and 5, the extension of the TG 10 address counter, and the addition of control signals are required. By referring to an object DMUX unit, FIG. 826 shows the configuration of the CNTR unit shown in FIG. 819; FIG. 823 shows the configuration of the TG 10; and FIG. 822 shows the configuration of the ADD 9.

FIG. 827 shows other characteristic configuration of related to the present invention.

According to the following explanation, it is assumed that FIGS. 813 through 816 are appropriately referred to even if they are not specified.

The problem to be solved here is to select the trailer length, 13 nibbles or 14 nibbles, in accordance with proper rules in the period of 125 μsec when a PLCP multiframe is transmitted with the number of bits in the PLCP multiframe set to 5524 bits when the trailer length indicates 13 nibbles and 5528 bits when the trailer length indicates 14 nibbles while the number of the bits transmitted through the DS3 payload is 5592×84/85=5526.211. If the cycle staff counter of C1 bytes is used to indicate the trailer length, the C1 byte is cyclically changed on a three-multiframe cycle (refer to FIG. 815). The more practical problem in this case is to set in accordance with proper rules pattern P of 13-nibble trailer length of the third multiframe with pattern Q of 14-nibble trailer length of the third multiframe.

Described below is the first configuration to solve the above described problem.

As described above, the pattern of the number of nibbles of the trailer for the pattern P of 13-nibble trailer length of the third multiframe is a pattern 13→14→13, and the pattern for the pattern Q of 14-nibble trailer length of the third multiframe is a pattern 13→14→14.

Assuming that the ratio of pattern P to pattern Q is a:b, the ratio m:n of the multiframe of the 13-nibble trailer length to that of the 14-nibble trailer length is calculated as follows.

$$m:n=(2a+b):(a+2b) \quad \text{[equation 2]}$$

Using m and n, the average bit number of the PLCP multiframes can be represented by the following equation.

$$(Mm+Nn)/(m+n) \quad \text{[equation 3]}$$

where M indicates the number of bits of multiframes of 13-nibble trailer length, and M=5524 bits as described above, and N indicates the number of bits of multiframes of 14-nibble trailer length, and M=5528 bits as described above.

Furthermore, assuming that the number of bits transmitted by the DS3 payload in the period of 125 μsec is X, the following equation exists.

$$X=5592\times 84/85 \text{ bits} \quad \text{[equation 4]}$$

Thus, equations 3 and 4 generate the following equation because the number of bits X only has to be equal to the average number of bits of the PLCP multiframe.

$$(Mm+Nn)/(m+n)=X \quad \text{[equation 5]}$$

According to equations 5 and 2 above, the ratio a:b can be represented by the following equation.

$$a:b=29:56 \quad \text{[equation 6]}$$

According to equation 6, if the ratio of pattern P to pattern Q is 29:56, the number of bits transmitted by the DS3 payload is equal to the average number of bits in the 125 μsec, thereby transmitting the PLCP multiframe by the DS3 payload in the 125 μsec period without deficit or excess.

Considering that the shortest cycle containing pattern P and Q meeting the above described conditions refers to 29+56=85 PLCP multiframes, 29×N patterns P and 56×N patterns Q are transmitted for each of N times 85 (N is an integer of 1 or larger than 1) PLCP multiframe cycles. This is shown in FIGS. 827 and 828. FIG. 829 shows the operation of such a configuration.

PLCP frame generating units 1 and 2 of patterns P and Q store ATM cells or L2-PDU cells in the PLCP payload and adds a PLCP header and trailer to assemble a PLCP frame. The pattern P PLCP frame generating unit 1 adds a trailer on the three cycles of 13, 14, and 13 nibbles. The pattern Q PLCP frame generating unit 2 adds a trailer on the three cycles of 13, 14, and 14 nibbles.

With the configuration shown in FIG. 828 corresponding to the sending pattern selecting unit 4 shown in FIG. 827, a selector 2 receives 85×N input values consisting of 29×N Os and 56×N 1s. The 85×N division counter has the selector 2 cyclically select 85×N input values input to the selector 2 in synchronism with the cycle of the ELCP and output the input value to a selector 3 shown in FIG. 827 as a pattern switch signal.

The selector 3 selects inputs A1 and A2 according to the above described pattern switch signal. That is, the selector 3 selects pattern P when the pattern switch signal indicates 0 and pattern Q when the signal indicates 1.

A DS3 interface unit 5 inserts the PLCP frame into the DS3 payload in synchronism with the transmission speed of 44.736 MHz, adds a DS3 header, and assembles and transmits the DS3 frame.

With the configurations shown in FIGS. 827 and 828, the ratio of pattern P to pattern Q in the PLCP multiframe output from the selector 3 is 29:56 as shown in FIG. 829, thereby transmitting the PLCP multiframe by the DS3 payload in the 125 μsec period without deficit or excess.

Described below is the second configuration with which the above described problem is solved.

With the ratio of pattern P to pattern Q of 29:56 defined by the above listed equation 6, 1 is subtracted from the value 29 for pattern P to obtain the half of the value 56 for pattern Q. Based on this, the transmitted PLCP multiframe pattern can be obtained as follows assuming that the cycle of the combination of patterns P and Q contains 85 multiframes. It satisfies the condition of equation 6 with a 28-repetitive pattern and a last-added pattern P.

| | 1 | 2 | 3 | . . . | 28 | |
|---|---|---|---|---|---|---|
| combination sample 1 | PQQ | PQQ | PQQ | . . . | PQQ | P |
| combination sample 2 | QQP | QQP | QQP | . . . | QQP | P |
| combination sample 3 | QPQ | QPQ | QPQ | . . . | QPQ | P |

a 85-multiframe cycle

The above listed combinations can reduce the difference in the number of transmitted PLCP multiframes. FIGS. 827 and 830 show the configurations which realize these combinations. FIG. 831 shows the operations corresponding to the configurations.

With the configuration shown in FIG. 830 corresponding to a transmission pattern selecting unit 4, the selector 2 receives a total of 85 input values consisting of 28 sets of 101 input value groups and an input value of 0. The 85×N division counter has the selector 2 cyclically select 85 input values input to the selector 2 in synchronism with the cycle of the PLCP and output the input value to a selector 3 shown in FIG. 827 as a pattern switch signal.

With the configurations shown in FIGS. 827 and 830, as in the case of the first configuration, the ratio of pattern P to pattern Q in the PLCP multiframe output from the selector 3 is 29:56 as shown in FIG. 831, thereby transmitting the PLCP multiframe by the DS3 payload in the 125 μsec period without deficit or excess. Since the pattern QPQ is frequently repeated, the difference in the number of transmitted PLCP multiframes can be reduced.

Described below is the switch having multicasting capabilities

The switch according to the present embodiment is based on the ATM switch for switching an ATM cell. In the ATM switch, the following functions are required to realize the multicasting capabilities.

1. Copying a cell
2. Reassigning a VPI/VCI

When a cell is copied, the two following processes are required.

1. Copying in a switch
2. Copying on the same line

FIG. 832 shows the configuration of the switch for realizing the point-to-multipoint function. (a) indicated a trunk system; (b) indicates an input unit copy system; and (c) indicates an internal copy system.

(1) Trunk system: A point-to-multipoint connection cell which is output from a source terminal and distributed to a plurality of subscribers temporarily enters a trunk (for example, a message handler in the SMDS) through a switch. After copying cells and reassigning their VPI/VCIs in the trunk, the cells are transferred again to the switch and distributed to a plurality of destination subscribers.

(2) Input unit copy system: A block is provided before a switch to copy cells to. A point-to-multipoint cell is copied to the block. The switch only has the function of switching (connecting) a copied cell.

(3) Internal copy system: A cell is copied in the multistage self-routing (MSSR) configuration.

In the point-to-multipoint connection cell, information indicating that the cell is a point-to-multipoint connection cell is set. The point-to-multipoint connection cell represents a plurality of destination subscribers by, for example, the VPI/VCI of the cell.

FIG. 833 is a table showing the features of the three systems shown in FIG. 832.

If there are a small number (10~100) of point-to-multipoint connections supported in the system, the trunk system is recommended. If there are a large number (100 or more) of point-to-multipoint connections supported in the system, the input unit copy system or the internal copy system is recommended. If the number of sources requesting the point-to-multipoint transfer is almost equal to that of the lines (channels) of the cell destination subscribers, then the input unit copy system is recommended If these numbers are quite different, then the internal copy system is recommended.

As a switch network, even if there is a small difference in number of channels of lines between the source and destination subscribers, there can be a case in which internal copy system is recommended. That is, when a point-to-multipoint connection is provided, a source device does not have to provide a plurality of sources. However, in consideration of available bands, the same band as the point-to-multipoint connection is used. As a result, the input copy system does not have advantageous points as a switching network. If there is large difference between the source and subscriber lines in a switch, the internal copy system is advantageous because it does not require adding blocks (copy function shown in FIG. 832B. Thus, an internal copy system is advantageous especially it is used in a large scale system.

FIG. 834 shows the configuration for realizing the point-to-multipoint connection using the internal copy system.

When the point-to-multipoint connection is realized by the internal copy system, a bit map is used. Assuming that there are 64 output paths and the concentration ratio is 4:1 in the MSSR, the output paths to individual lines are 16×4×64=6496 in excess of the number displayed by the bit-map representation. Therefore, the multicast connection system according to the present. embodiment is configured as follows.

1. 1st stage in the MSSR: point-to-multipoint connection
2. 2nd state in the MSSR: bit map for point-to-multipoint connection
3. 3rd stage in the MSSR: bit map for point-to-multipoint connection
4. DMUX unit: bit map through decoding the VPI/VCI The number of bits used in the bit map in the point-to-multipoint connection is defined as follows.

1. 1st stage in the MSSR: 3 bits (for an 8×8 switch for instance)
2. 2nd stage in the MSSR: 8 bits
3. 3rd stage in the MSSR: 8×8 bits Each bit in the above described bit map is written to a tag area added to each cell in the switch. In the case above, 9 octets are required for a tag area. However, the size of the tag area in the switch can be optionally set for each switch, and the above described bit map can be realized with the tag information set for 9 octets and the length of each cell set for 64 octets. If the cell length is set to a larger value, the clock should be sped up in performing processes in the switch. For example, if 54-octet cells are normally processed, the clock speed should be 64/54 times sped up.

FIG. 835 shows the system or realizing the above described bit map without extending the cell length.

In this case, the bit map processed by the 3rd stage of the MSSR with the configuration shown in FIG. 834 is processed by the external trunk 2. That is, the point-to-multipoint connection cell transmitted to the switch 1 is input to the trunk 2 and copied the number of connections for the 3rd stage of the MSSR in the switch 1. A VCCT 3 is provided at the output unit of the trunk 2 for adding an 8-bit bit map to each of the copied cells and transferring it to the switch 1. Thus, the bit map for the point-to-multipoint bit map can be realized without extending the cell length.

FIG. 836 shows the VPI/VCI decoding circuit. The VPI/VCI decoding circuit shown in FIG. 836 is provided in, for example, the DMUX unit shown in FIG. 834.

The table 1 provided in the VPI/VCI decoding circuit is searched using the VPI/VCI of an input cell as an address. The retrieved data is a bit map of 16×4=64 bits.

The C bit check unit 2 retrieves the bits (C bits) set at a predetermined position in the tag information of an input cell.

When the value is 1, it is determined that the input cell is a point-to-multipoint connection cell. The determination result of the C bit check unit 2 is reported to the processor and used when the table 1 is searched.

The point-to-multipoint connection on the same line is described below. The process on the same line requires the two following functions.

1. VPI/VCI decoding function as the copying function on the same line
2. VPI/VCI reassigning function at an output terminal Reassigning a VPI/VCI at an output terminal requires a VPI/VCI conversion table (VCCT). The VCCT is required for a point-to-point connection and a point-to-multipoint connection. The VCCT is a table from which information (output VPI/VCI, etc.) is retrieved using a VPI/VCI of a cell. If information is to be assigned to all VPI/VCI, the memory of storing $2^{24}$ pieces of information is required when the number of bits of the VPI/VCI is, for example, 24 bits. Providing such memory is not practical, and the switch according to the present embodiment is configured as follows.

At the input terminal, a process of reassigning a VPI/VCI of an input cell and a process of assigning tag information are performed. At this time, the path of a newly assigned VPI/VCI only has to identify a path on an output line or each line, and does not have to identify all VPI/VCI. Therefore, an address value much smaller than the number of bits of the VPI/VCI is used as a VPI/VCI at the input terminal. The actual VPI/VCI is retrieved using the address value as a key. Thus, a smaller size of memory is obtained in the switch by using a degenerated VPI/VCI.

FIG. 837 shows the configuration of a point-to-multipoint connection.

In the following explanation, the VPI/VCI of a cell input to the switch is referred to as an I VPI/VCI, the VPI/VCI used in the switch is referred to as an S VPI/VCI, and the VPI/VCI set for the cell output from the switch is referred to as an O VPI/VCI.

The VPI/VCI for which a point-to-point connection is set indicates the following settings. That is, an S VPI/VCI, tag information, and the information (C bit is set to 0) indicating a point-to-point connection are set in the input unit VCCT (IVCC) 1 for each I VPI/VCI as a path set for the I VPI/VCI of an input cell. At the output unit VCCT (OVCC) 2, 0 VPI/VCI is set for each S VPI/VCI. The decoding table 3 has no settings.

In a point-to-multipoint connection, an S VPI/VCI, tag information, and the information (C bit is set to 1) indicating the point-to-multipoint are set for each I VPI/VCI in the input unit VCCT (IVCC) 1. The decoding table 3 has a bit map in the DMUX 4 for each SVPI/VCI. The bit map can have one or more output units VCCT (OVCC) 2 in the plurality of output units VCCT. In the output unit VCCT (OVCC) 2, the number of copies for each line and the O VPI/VCI are set for each SVPI/VCI.

FIG. 838 shows the configuration of the buffer and output unit VCCT provided for each output line.

With the configuration shown in FIG. 838, the copy process for point-to-multipoint cells is performed using a buffer, and the VPI/VCI reassigning process is performed using a table provided for a point-to-point connection. With the configuration, the hardware can be greatly reduced.

Upon receipt of a cell output from the DMUX 4, the C bit set at a predetermined position of the tag information of a cell is referred to. If the C bit is 0, it refers to a point-to-point connection. If the line number set in the tag information refers to the number of the VCCT of the output unit, the cell is written to a predetermined class (for example, 0) in the buffer 1.

If the C bit is 1, it refers to a point-to-point connection. In this case, the bit map set in the decode table 3 shown in FIG. 837 is referred to. If the number of the VCCT of the output unit (line number) is specified, the cell is written to the buffer 1. At this time, the cell is written to more than 1 class in classes 0~3 according to the class identification information set in the tag information in the cell.

The cell read process from the buffer 1 is performed according to the information set by the software for managing the switch when a path is set. The software sets the following information.

1. Band assigned to each class (contents of the scheduler of the DMUX controller)
2. Contents of the table of the VCCT of the output unit (in case of a point-to-point connection, O VPI/VCI for S VPI/VCI: in case of a point-to-multipoint connection, the number of copies, a value of S VPI/VCI for reserving a path, and O VPI/VCI)

FIG. 839 is a table of the contents of the output unit VCCT set by the firmware according to the software settings.

In the case of the point-to-point connection, the E-F bit is set to 1. In the case of the point-to-multipoint connection, one of the O VPI/VCIs corresponding to the destinations is set. Then, the values of S VPI/VCI for reserving the paths of the O VPI/VCI are sequentially set to Q-ADD, and O VPI/VCI is set at the address for the S VPI/VCI. At the last address, the E-F bit is set to 1. Otherwise, the E-F bit is set to 0.

FIG. 840 shows an example of a table on which an output VPI/VCI is set.

In the example shown in FIG. 840, multicasting transfer is performed for 4 paths (to destinations 1-4) on the same line. The value of S VPI/VCI is a; the value of O VPI/VCI is b0~b3; and the band assigned to each path is c0~c3.

FIG. 841 is a flowchart explaining the process of the VCCT of the output unit. The VCCT of the output unit extracts the tag information and VPI/VCI, etc. added to each cell, copies the cell by referring to the table shown in FIG. 840, and writes the output VPI/VCI for each of the copied cells.

A class number (i) for use in identifying a class whose cells are next read is determined. The Q-address and E-F bit identified by the determined class number are read from the class process memory, and cells are read from class i in the QCP buffer (step S1-S3).

If the E-F bit is 0, the S VPI/VCI of the cell read in the above step S3 is set as the Q-address read from the class process memory (steps S4 and S5).

The O VPI/VCI, Q-address, and E-F bit are read from the output unit VCCT using the S VPI/VCI as an address. For example, if a cell is addressed to the destination 2 in the example shown in FIG. 840, b1, c1, and 0 are retrieved according to the address c0 (step S6).

The O VPI/VCI read in step S6 is written to the cell and output, and then the Q-address and E-F bit are written to the class process memory (steps S7 and S8).

The processes in steps S1-S8 are repeatedly performed until the E-F bit indicates 1. When the E-F bit indicates 1, the buffer address, etc. related to class i is released. In the example shown in FIG. 840, the processes in steps S1-S8 are repeatedly performed until the cell addressed to destination 4 is output (steps S9 and S10). The self-routing module (SRM) forming part of the MSSR of the switch identifies a path according to the VPI/VCI of a cell input by the switch. The routing in the switch is performed in path units according to the tag information added to a cell. Therefore, at the entry point of the cell, the information designating the routing in the switch of the cell is retrieved according to the VPI/VCI set in the cell. The function of adding the retrieved routing information to the cell as tag information is required. In the switching process, the function of reassigning the VPI/VCI set in the input cell as an output VPI/VCI is also required.

For the switch of the MSSR configuration, the above described function (VCCT) may be provided in each SRM. However, the number of bits of a VPI/VCI is 28 for the network-to-network interface and 24 for the user-to-network interface. Providing a plurality of a large table (memory) in which tag information and output VPI/VCI are set for all VPI/VCIs undesirably requires large-scale hardware.

Therefore, a VCI conversion table (VCCT) for use in realizing the above described functions is provided at the entry point of the switch. According to the VCCT, the tag is added and the VPI/VCI is rewritten.

FIG. 842 shows the configuration of the switching system whose switch is equipped with a VCCT at its entry point.

Assume that the table is searched using the VPI/VCI as is with the VCCT. As described above, the VPI/VCI is 28 or 24 bits. Setting the tag information and output VPI/VCI for all the VPI/VCI requires the memory (VCC table) having $2_{23}$ or $2_{24}$ addresses. Such large memory is undesirably accompanied by a large-scale hardware configuration. Likewise, the use amount parameter control/network parameter control (UPC/NPC) is searched using a VPI/VCI. In this case, the table searching system using the VPI/VCI as is requires undesirably large memory.

The switching system according to the present embodiment has the function of converting (degenerating) a VPI/VCI into a memory retrieving address of a smaller number of bits. In the point-to-multipoint connection, cells are copied in a switch and a VCCT is required for each output line.

FIG. 843 shows the configuration of the switching system according to the present embodiment.

As shown in FIG. 843, an I VPI/VCI converting unit 1 is provided at the entrance (UPC, before the tag assigning unit) of the exchange station. The I VPI/VCI converting unit 1 converts the VPI/VCI (I VPI/VCI) of an input cell into the VPI/VCI (S VPI/VCI) in the exchange station to be used as a memory retrieving address. An S VPI/VCI converting unit 2 for converting the S VPI/VCI into an output VPI/VCI (O VPI/VCI) is provided at the output unit of the exchange station.

In the ATM communications service, VP service and VC service are provided. In the VP service, data is transferred in the unit of virtual paths VP-accommodating a plurality of virtual channels VC. Therefore, a communications lines can be identified by a VPI only without using a VCI in the VP service. This helps reducing the size of the VCCT.

First, the service identification information is set to output tag information of each cell indicating the VP service or VC service. The exchange station provides a table for use in the VP service and a table for use in the VC service. An output VPI is set for an input VPI on the table for the VP service. An output VPI/VCI is set for an input VPI/VCI on the table for the VC service. When a cell enters the exchange station, the cell's service identification information recognizes the service type and performs a VPI/VCI conversion according to one of these tables. The process is performed by the I VPI/VCI converting unit 1.

The cell that has passed the switch recognizes the service type according to the service identification information in the S VPI/VCI converting unit 2. The O VPI/VCI table 3 referred to by the S VPI/VCI converting unit 2 comprises a table for the VP service and a table for the VC service One of these tables are accessed depending on the service type.

If the tables for the VP service and VC service are provided individually as in the configuration above, the size of the hardware can be reduced because the table for the VP service is comparatively small.

Thus, there are various method of degenerating the VPI/VCI. The method of limiting the number of bits used for a VPI/VCI may generate a problem about system operations. Therefore, the memory can be reduced in size by limiting the number of paths that are set simultaneously.

As described above, a point-to-multipoint connection can be realized without an external device according to the exchange station of the present embodiment.

Described below is the embodiment of a system of transferring information necessary for the point-to-multipoint connection in parallel with the cell in the exchange station.

As described above, the functions of copying a cell and reassigning the VPI/VCI of the copied cell are required to realize the point-to-multipoint connection. These functions are performed in cell units.

FIG. 844 shows the format of a cell in the switch. As shown in FIG. 844, a cell comprises, in a switch, tag information, header, and payload, and is processed in the 8-bit parallel format. The tag information contains routing information in the exchange station, etc. and is added at the entrance of the exchange station according to the VPI/VCI of each cell. In the switch, the cell is controlled (routing control, copy instruction, etc.) by the tag information only. According to the system of the present embodiment, the control information necessary for the point-to-multipoint connection is transferred in parallel with the cell in the exchange station, and is processed in the 9-bit parallel format.

FIG. 845 shows the configuration of the exchange station according to the present embodiment.

The cell transferred through the user-to-network interface or network-to-network interface (UNI/NNI) is terminated by the line interface unit 1 provided for each line. The VPI/VCI converting unit (VCCT) 2 rewrites the VPI/VCI of an input cell. The multiplexing unit MUX 3 multiplexes a cell input through a plurality of lines. The switch 4 is an 8×8 buffer type switch. The demultiplexing unit DMUX 5 distributes a cell output from the switch 4 to a predetermined line interface unit 1.

FIG. 846 shows an example of the configuration of the control information for a point-to-multipoint connection.

The point-to-multipoint connection control information comprises a switching bit map, DMUX bit map, and subscriber ID. In the switching bit map, the switch has an 8×8 configuration and refers to 8-bit information. In the DMUX bit map, the number of lines distributed by the demultiplexing unit DMUX 5 is 16, and is assigned 16 bits. The subscriber ID identifies a destination subscriber and is assigned 8 bits.

The point-to-multipoint connection control information in the above described configuration is provided in the VPI/VCI converting unit (VCCT) 2 corresponding to the VPI/VCI stored in the header of the input cell. The information is set when a call is connected. It is not set for a point-to-point connection. The VPI/VCI converting unit (VCCT) 2 transfers the point-to-multipoint connection control information in parallel with an input cell when the cell is transferred to a switch with tag information added. The synchronization is established between a cell and point-to-multipoint connection control information, and they are transferred in the 9-bit parallel format.

The point-to-multipoint connection according to the present embodiment has the two important functions as follows.

1. Copying in the switching unit and DMUX unit.
2. Copying and VPI/VCI reassigning in the line interface unit First, the copying capabilities in a switch unit are explained. When a cell enters the exchange station, tag information is added-to the cell in the VPI/VCI converting unit (VCCT) 2 shown in FIG. 845. In the tag information, the information indicating that the cell is a point-to-point connection cell or a point-to-multipoint cell is set as C bit information. If the C bit information is 0, it refers to a point-to-point connection and the cell is processed according to the routing information set in the tag information added to the cell in the exchange station.

FIG. 847A shows the configuration of the buffer of a switch. FIG. 847B shows an example of the switching bit map in the point-to-multipoint connection control information.

If the C bit information is 1, it refers to a point-to-multipoint connection, and the point-to-multipoint connection control information transferred in parallel with the cell in the exchange station is referred to. In the switch unit, the switching bit map is referred to. At this stage, a cell whose C bit information is set to 1 enters the switch from the input highway 1, and the switching bit map is shown in FIG. 847B. In this case, the cell is written to buffers 12, 13, 15, and 16. Accordingly, the cell input from the input highway 11 is output to the output highway 2, 3, 5, and 6. Thus, the function of copying cells can be realized in the switch unit. Cells can be copied likewise in the DMUX unit.

Described below are the copying function and VPI/VCI reassigning function.

Upon receipt of a cell whose C bit is 1, the line interfacing unit 1 determines a point-to-multipoint connection and retrieves a subscriber ID in the point-to-multipoint connection control information. The line interface unit 1 is provided with a table searched using a subscriber ID as a key. The table contains the number of copies and a VPI/VCI assigned to each cell generated by a copying process. The line interface unit 1 accesses the table by the retrieved subscriber ID, copies a cell, and reassigns the VPI/VCI.

The process of the software of the exchange station related to the point-to-multipoint connection is explained below. Upon receipt of a point-to-multipoint connection request in response to a path setting request (call connection request), the software of the exchange station sets the C bit to 1 corresponding to the VPI/VCI to be assigned to the path. In setting the path, the destination subscriber ID is specified, and the software of the exchange station writes to the table provided in the line interfacing unit 1 according to the specification the number of copies and the VPI/VCI set for each cell generated by the copy.

When a cell enters the exchange station, the above described hardware made a point-to-multipoint connection according to the information set by the software of the exchange station.

With the above configuration, a point-to-multipoint connection can be realized in the switch without providing a device for copying a cell external to the switch. Since the point-to-multipoint control information is transferred not as a tag information, but in parallel with the cell in the exchange station, the throughput is not degraded.

FIG. 848 shows another characteristic configuration of the present invention. FIG. 848 shows an example in which a source terminal 1 multicast-transfers data to destination terminals 4-1-4-5 through an exchange station 2.

When the source terminal 1 makes a multicast connection, the transfer data (hereinafter referred to as a cell) is transferred to a multicast device 6. That is, the source terminal 1 transmits the cell to the ATM exchange station 2 using the destination address of the multicast device 6. The ATM exchange station 2 connects the path 5 according to the destination address and transfers the cell to the multicast device 6. At this time, the transmission lines between the source terminal 1 and the multicast device 6, that is, the line 3 and path 5 are in the communications state of connection of 1:1.

Upon receipt of the cell transmitted by the source terminal 1, the multicast device 6 transfers the cell to the destination terminal 4-1. That is, the multicast device 6 transmits the cess to the ATM exchange station 2 with the destination terminal 4-1 set as the destination address of the cell. The ATM exchange station 2 connects the path 7-1 according to the destination address and transfers the cell to the destination terminal 4-1 through the path 7-1.

Then, the multicast device 6 transfers the cell transmitted by the source terminal 1 to the destination terminals 4-2-4-5 sequentially. At this time, ATM exchange station 2 connects the paths 7-2-7-5.

The multicast device 6 is provided in the exchange station, and the destination information, etc. is set for each multicast service request from the user. A plurality of multicast services are processed.

As mentioned above, the multicast device 6 has the ability to copy cells. When the copied cells are distributed to N destination terminals (5 terminal in FIG. 848), the multicast device 6 transfers the cells to each destination terminal sequentially. The amount of the resources is the same as that in the 1:1 connection.

FIG. 849 shows an example in which the multicast function of the present embodiment is applied to the video distribution service. In FIG. 849, shows an example in which video data stored in the video server 11 is distributed to the subscriber terminals 20-1-20-3.

The controller 12 controls video data and transfers a video signal to the B-ISDN adapter 13. The B-ISDN adapter 13 transmits the video signal transferred from the controller 12 to the network interface device 15 according to the protocol of the subscriber line interface 14.

The network interface device 15 converts the transfer data including the video signal into the data in the format processed by the exchange station 16. The exchange station 16 is hereinafter referred to as an ATM exchange station. In this case, the network interface device 15 converts the transfer data including the video signal into an ATM cell. The network interface device 15 sets in each cell the VPI/VCI identifying the multicast device 30 as the destination address, and transmits the cells to the exchange station 16. The VPI/VCI identifying the multicast device 30 is reported by the controller 27 as described later.

Upon receipt of the cell, the exchange station 16 connects the path 17 for connecting the network interface device 15 with the multicast device 30 according to the VPI/VCI set in the cell to transfer the cell through the path 17.

FIG. 850 shows the configuration of the multicast device 30.

The VPI/VCI conversion table 31 is written when a multicast connection requesting call is connected. For example, if a call connection request is issues to multicast-distribute video data stored in the video server 11 to the subscriber terminals 20-1-20-3, then the controller 27 first obtains a VPI/VCI (VPI/VCI 17) specifying the path (path 17) for connecting the network interface device 15 with the multicast device 30. Then, the controller 27 reports the VPI/VCI 17 to the network interface device 15 and reserves the area for the VPI/VCI 17 on the VPI/VCI conversion table 31.

Then, the controller 27 obtains the VPI/VCIs (VPI/VCIs 1-3) specifying the paths (paths 22-1-22-3) for connecting the multicast device 30 with the network interface devices 23-1-23-3. Then, it writes the VPI/VCIs 1-3 to the area reserved for the VPI/VCI 17 on the VPI/VCI conversion table 31.

Described below is the operation of the multicast device 30 when it receives a cell. The cell is transferred from the network interface device 15 through the exchange station 16, and is temporarily stored in the receiving unit 32. The control unit 33 searches the VPI/VCI conversion table 31 according to the VPI/VCI set in the cell stored in the receiving unit 32. Since the VPI/VCI set in the input cell is VPI/VCI 17, the VPI/VCIs 1 through 3 are retrieved as output VPI/VCIs. These output VPI/VCIs are passed to the VPI/VCI assigning unit 34. The control unit 33 recognizes the number of the destination subscribers from the retrieved VPI/VCIs.

Then, the copying unit 35 copies the cell stored in the receiving unit 32 according to the instruction of the control unit 33 and writes it to the output buffer 36. At this time, the VPI/VCI assigning unit 34 sets "VPI/VCI 1" for the cell copied by the copying unit 35. The copying unit 35 copies two cells stored in the receiving unit 32, and the cells are assigned VPI/VCI 2 and VPI/VCI 3 and written to the output buffer 36.

The control unit 33 first transfers the cell assigned VPI/VCI 1 to the exchange station 21. The exchange station 21 is an ATM exchange station comprising a self-routing module. Upon receipt of the cell, the exchange station 21 connects the path 22-1 between the multicast device 30 and the network interface device 23-1. Therefore, the video data read from the video server 11 is transferred to the network interface device 23-1 through the path 22-1. Then, the data received by the network interface device 23-1 is transferred to the subscriber terminal 20-1 through the controller 25.

Likewise, the control unit 33 sequentially transfers the cells assigned VPI/VCI 2 and VPI/VCI 3 to the exchange station 21. Upon receipt of the cell, the exchange station 21 establishes the paths 22-2 and 22-3 according to the VPI/VCI values. The cells assigned VPI/VCI 2 and VPI/VCI 3 are transferred to the paths 22-2 and 22-3 respectively, and reach the subscriber terminals 20-2 and 20-3.

The controller 27 recognizes the use state of the exchange stations 16 and 21 through the connection admission control (CAC) function. The control unit 33 receives from the controller 27 a notification about the use state of the exchange stations 16 and 21. If the exchange station 21 is in the congestion state, the control unit 33 stops the cell read process from the output buffer 36. With the configuration, cells may be discarded in the output buffer 36 when the congestion state of the exchange station 21 continues. However, the entire exchange station can recover from the congestion state.

As described above, the multicast connection system can reduce the load on the source terminal and the use rate of the line between the source terminal and the exchange station and the operations of the exchange station can be successfully reduced because the data transmitter has only to transmit the same amount of data as the case of the one-to-one connection regardless of the number of the destinations. Therefore, the hardware resources which becomes in an idle state with the configuration (above described lines and exchange stations) can be usefully assigned to other services.

When a multicast connection service is provided through the conventional exchange stations, it can be realized only by providing the above described multicast device. Since the ATM exchange station greatly depends on the hardware configuration, it is a large merit to realize a multicast connection service without design amendments to the exchange stations.

FIG. 851 shows the configuration of the system for communications among a plurality of communicators through a multiple communications trunk built in the exchange station. In this example, subscriber A accommodated in the concentrator 1 communicates with subscribers B and C accommodated in the concentrator 2. The 3-subscriber communications are referred to as a TV-telephone conference through voice and images. The concentrators 1 and 2 are connected to the host exchange station 3. The host exchange station 3 is an ATM exchange station comprising a self-routing switch, and a path is set according to the VPI/VCI of each cell. The multiple subscriber communications trunk 4 is connected to the host exchange station 3 in, for example, a switching station, and edits and synthesizes image and voice data transferred in the cell format from each subscriber according to the VPI/VCI of the cell. Then, it adds the edited or synthesized data to the cell assigned the VPI/VCI specifying a destination subscriber and transmits them to the host exchange station 3. The multiple subscriber communications trunk 4 is provided for each multiple subscriber communication.

Subscriber A is connected to the multiple subscriber communications trunk 4 through the bi-directional virtual path 5 specified by the VPI/VCI=xa. Subscribers B and C are connected to the multiple subscriber communications trunk 4 through the bi-directional virtual paths 6 and 7 specified by the VPI/VCI=xb and VPI/VCI=xc respectively.

When subscribers A, B, and C start the 3-subscriber communications with the above described configuration, the transmission data from each subscriber is temporarily transferred to the multiple subscriber communications trunk 4 and then transmitted to the destination subscriber after being edited by the multiple subscriber communications trunk 4. Thus, with the above described configuration, the system provides multiple subscriber communications services through the functions of the exchange station.

FIG. 852 shows the configuration of the system for multiple subscriber communications using a multiple termination unit in the subscriber line.

The system shown in FIG. 852 uses the multiple termination unit 11 when subscribers A, B, and C enter the 3-subscriber communications. The multiple termination unit 11 is accommodated in the concentrator 1 through a subscriber line. The bi-directional virtual path 12 specified by VPI/VCI=yd connects subscriber A with the multiple termination unit 11. The bi-directional virtual paths 13 and 14 specified by VPI/VCI=ye and VPI/VCI=yf connect subscribers B and C with the multiple termination unit 11 respectively.

The multiple termination unit 11 can simultaneously process data transferred through a plurality of virtual paths specified by a plurality of VPI/VCIs, and adds the edited or synthesized data to the cell assigned the VPI/VCI specifying a destination subscriber and transmits them to the host exchange station 3. Thus, with the above described configuration, the system provides a multiple subscriber communications through a terminal provided in the subscriber line.

Described below is the procedure of providing a multiple subscriber communications service in the system shown in FIG. 851 or 852.

FIG. 853 is a process flowchart showing the 3-subscriber communications service in the system shown in FIG. 851. In this example, subscriber C is called in the 2-subscriber communications state in which subscribers A and B communicate each other, and the 3-subscriber communications state is entered.

A predetermined VPI/VCI (for example, VPI/VCI ab) connects subscriber A with subscriber B. In such a 2-subscriber communications state, one of the subscribers A and B issues a 3-subscriber communications request by specifying subscriber C according to a predetermined procedure.

Upon receipt of the 3-subscriber communications request, the host exchange station 3 calls subscriber C if an unused multiple subscriber communications trunk 4 is available (step S1 and S2).

The host exchange station 3 receives the response from subscriber C and reports it to the multiple subscriber communications trunk 4 (step S3).

The VPI/VCIs of a predetermined number are assigned to the multiple subscriber communications trunk 4 to connect each of subscribers A, B, and C with the multiple subscriber communications trunk 4. The host exchange station 3 selects VPI/VCI=xa, xb, and xc as the VPI/VCI specifying the path between each of the subscribers A, B, and C and the multiple subscriber communications trunk 4. At this time, 3 is set as the number of subscribers being connected (steps S4 and 5).

Upon receipt of the response of subscriber C in step S3 above, the host exchange station 3 disconnects the path between subscribers A and B, and establishes the paths 5, 6, and 7 between the multiple subscriber communications trunk 4 and each of the subscribers A, B, and C (steps S6 and 7).

Then, the cells transmitted from each of the subscribers A, B, and C are first transferred to the multiple subscriber communications trunk 4, edited there, and then transferred to the destination subscriber. Thus, the 2-subscriber communications state is switched into the 3-subscriber communications state. If the image and sound data transmitted from the multiple subscriber communications trunk 4 can be contained in the band assigned to one subscriber, there is no need for a band check when the 3-subscriber communications state is entered.

FIG. 854 is a flowchart showing the process of the multiple subscriber communications service in the system shown in FIG. 851. Described below is the procedure of calling up a number of subscribers in a three or more subscriber communications state.

In the multiple subscriber communications state, one of the communicating subscribers requests to add the n-th subscriber (subscriber N) to the multiple subscriber communications. Upon receipt of the request, the host exchange station 3 checks if the value n is smaller than the number of users who can simultaneously use the multiple subscriber communications trunk 4. That is, the multiple subscriber communications trunk 4 determined whether or not the number of communicators exceeds the maximum value for the multiple subscriber communications (steps S11 and 12).

If the maximum value for the number of communicators is exceeded, the process of rejecting the request is performed (step S13).

If the number of the communicators is smaller than the maximum value, the host exchange station 3 calls the subscriber N and selects the VPI/VCI specifying the path between each of the subscriber N and the multiple subscriber communications trunk 4. At this time, the number of subscribers being connected is updated. That is, the number is set to n. Then, the path between each subscriber N and the multiple subscriber communications trunk 4 is established to enter an n-subscriber communications state (steps S14-18).

FIG. 855 is a flowchart showing the process of the multiple subscriber communications service using a group identification number. Described below is the case where any subscriber (subscriber D) issues a request for multiple subscriber communications. The multiple subscriber communications service is given to a group of preliminarily designated subscribers, and a group identification number is assigned to each group. The multiple subscriber communications trunk 4 is assigned to the multiple subscriber communications of each group.

When the host exchange station 3 receives a special number of the multiple subscriber communications service request and a group identification number from a subscriber, it determines whether or not the multiple subscriber communications are being performed in a group designated by the group identification number (steps S21 and 22).

If the multiple subscriber communications are performed in a group, the host exchange station 3 is recognizes the multiple subscriber communications trunk 4 which provides the multiple subscriber communications service, and checks whether or not the number of the communicators exceeds the maximum value for the multiple subscriber communications trunk 4 when one communicator is added to the currently communicating subscribers (step S23).

Unless the maximum value is exceeded, control is passed to step S26. If it is exceeded, then the process of rejecting the request is performed (step S24).

When it is determined in step S22 that the multiple subscriber communications are not performed in the group, the multiple subscriber communications trunk 4 in an idle state is obtained, and control is passed to step S26 (step S25).

The host exchange station 3 selects the VPI/VCI specifying the path between the subscriber D requesting the multiple subscriber communications in step S21 and the multiple subscriber communications trunk 4. At this time, the number of subscribers being connected is updated. Then, a bath is established between the subscriber D and the multiple subscriber communications trunk 4. Thus, any subscriber can take part in the multiple subscriber communications in a specific group (steps S26 through 28).

FIG. 856 shows the flowchart of the process in the 3-subscriber communications service in the system shown in FIG. 852. In this system, a path is established between the multiple termination unit 11 in the subscriber circuit and each subscriber. The process order is fundamentally the same as that shown in FIG. 853.

FIG. 857 is a flowchart showing the multiple subscriber communications service in the system shown in FIG. 852. In this system, a path is established between the multiple termination unit 11 in the subscriber circuit and the newly called subscriber. The process order is fundamentally the same as that shown in FIG. 854.

FIG. 858 is a flowchart of the call waiting service in the system shown in FIG. 851. In this example, subscriber C (the third party) issues a connection request to subscriber A while the two-subscriber communications are performed between subscribers A and B.

Upon receipt of a connection request from subscriber C to subscriber A in the 2-subscriber communications state between subscribers A and B, then the host exchange station 3 selects the VPI/VCIs in the range where the multiple subscriber communications trunk 4 is available, and sets new virtual paths between the multiple subscriber communications trunk 4 and each of the subscribers A and C (steps S31-33).

The host exchange station 3 notifies subscriber A that the connection request has been received from the third party. In response to this, subscriber A determines whether or not he or she requests to communicate with subscriber B again after the communication with the third party (subscriber C).

When the host exchange station 3 receives a request to communicate with subscriber B again after the communications with the third party, the host exchange station 3 sets subscriber B in a standby state and connects subscriber A with subscriber C through the multiple subscriber communications trunk 4 (steps S34-S38).

When the host exchange station 3 receives a request to terminate the communications between subscribers A and C from subscriber A or C, the host exchange station 3 releases the virtual paths set between the multiple subscriber communications trunk 4 and subscribers A and C, and connects again subscriber A with subscriber B (steps S39-S41).

When the host exchange station 3 receives a request to stop the communications with subscriber B after the communications with the third party, it disconnects subscriber B. Then, the host exchange station 3 releases the virtual paths set between the multiple subscriber communications trunk 4 and subscribers A and C, and directly connects subscriber A with subscriber C (steps S34, 42, and 43).

FIG. 859 is a flowchart (1) of a call transfer service in the system shown in FIG. 851. Described below is the connection made by subscriber A between subscriber B and subscriber C (third party) while subscribers A and B are in the 2-subscriber communications.

When the host exchange station 3 receives from subscriber A a call transfer request and a call transfer destination information indicating subscriber C, it selects the VPI/VCI identifying the range where the multiple subscriber communications trunk 4 is available, and sets new virtual paths between the multiple subscriber communications trunk 4 and subscribers B and C (steps S51-S54).

The host exchange station 3 calls subscriber C. If subscriber C returns a response, the host exchange station 3 connects subscriber B with subscriber C through the multiple subscriber communications trunk 4 (steps S55 and S56).

FIG. 860 is a flowchart (2) of a call transfer service in the system shown in FIG. 851.

When the host exchange station 3 receives from subscriber A who transfers the call after steps S51-S55 shown in FIG. 859, the host exchange station 3 releases the virtual paths set between the multiple subscriber communications trunk 4 and subscribers B and C to directly connect subscriber B with subscriber C (steps S61-S63).

According to the system shown in FIG. 859 or 860, a call from subscriber B to subscriber A can be transferred to subscriber C.

FIG. 861 is a flowchart showing the point-to-multipoint connection service in the system shown in FIG. 851. Described below is the case where subscribers B and C access subscriber A (information providing subscriber).

When the host exchange station 3 receives a point-to-multipoint connection request from subscriber A, it selects the VPI/VCI in the range where the multiple subscriber communications trunk 4 is available and sets a virtual path between subscriber A and the multiple subscriber communications trunk 4 (steps S71 and S72).

When the host exchange station 3 receives a connection request from subscribers B and C to subscriber A, it selects two VPI/VCIs in the range where the multiple subscriber communications trunk 4 is available and sets virtual paths between the multiple subscriber communications trunk 4 and subscribers B and C. Afterwards, the point-to-multipoint communications can be established through the multiple subscriber communications trunk 4 (steps S73-S75).

A multicast transfer can be made from subscriber A to subscribers B and C. In this case, subscriber A specifies subscribers B and C as connection-to information in step S73.

FIGS. 862 through 865 are flowcharts of various services provided by the system shown in FIG. 852, and correspond to FIGS. 858 through 861 respectively. In the system shown in FIGS. 862 through 865, the multiple termination unit 11 processes virtual paths.

According to the above described embodiment, the multiple subscriber communications trunk provided for the exchange station or the multiple termination unit provided in the subscriber line give services such as multiple subscriber communications services, call waiting services, transfer services, etc.

Described below is another characteristic configurations of the present invention. The configuration corresponds to the 18th object of the present invention previously described in the "Subject to be solved by the Invention".

The embodiment described below realizes collecting information about the line processed by a device in the exchange station and a correct change of devices in the exchange station when a failure occurs.

FIG. 866 shows the configuration of the ATM switch When an ATM cell is transmitted from a subscriber terminal not shown in FIG. 866, it is switched by a communications line switch (SW) 3 through a terminal equipment 1 and common device 2. common device 2. The terminal equipment 1 and common device 2 are communications line system devices for processing more than one line.

FIG. 867 is a block diagram showing the present embodiment. In FIG. 867, a subscriber data management unit 4, service management unit 5, line connection control unit 6 device management control unit 7, input/output device management unit 8, and line connection management unit 9 are realized as functions of the control program or firmware executed by a central program (not shown in FIG. 867) for controlling the ATM switching system shown in FIG. 866.

The terminal equipment 1 and common device 2 are the same as those shown in FIG. 866.

A main storage device 14 stores a use state table 11, device service management table 12, device service management table 12, and management information table 13. The use state table 11 is accessed by the line connection control unit 6 and stores entries of use states and available bands. The device service management table 12 is accessed by the line connection management unit 9 and provided for each of either terminal equipments 1 or common devices 2. Each of them stores entries of the services used by the terminal equipment 1 or common device 2. The management information table 13 is accessed by the service management unit 5 and stores the identification information (VPI/VCI) of the line used by the user, the device number of the terminal equipment 1 or common device 2 which processes the line, and priority/non-priority information.

The normal line connection process performed with the above listed configuration is described by referring to the flowchart of the operations shown in FIG. 868. In the following explanation, reference numbers S1-S11 indicate the steps on the flowchart shown in FIG. 868.

The subscriber data management unit 4 receives a line connection request from a subscriber terminal not shown in FIG. 868 (SI).

The subscriber data management unit 4 determines the type of service according to the connection request (S2), and outputs a line connection request to the service management unit 5 depending on the determined service type. The service management unit 5 transfers the line connection request to the line connection control unit 6 (S3).

The line connection control unit 6 inquires the device management control unit 7 which manages each of either terminal equipments 1 or common devices 2 which issued the line connection request of the state of each of either terminal equipments 1 or common devices 2 (S4 and S5).

As a result, when no device management control unit 7 returned an availability state, the above described line connection request is rejected.

If any of the device management control units 7 returns an availability state, the line connection control unit 6 compares the request band corresponding to the line connection request with the state of the line (virtual line identified by a VPI/VCI) used by the terminal equipment 1 or common device 2 managed by the device management control unit 7 (S6), and determines whether or not the terminal equipment 1 or common device 2 can accept the line (request line) requesting the above described request band (S7).

If the terminal equipment 1 or common device 2 cannot accept the request line, the line connection request is rejected.

If the terminal equipment 1 and common device 2 can accept the above described request line, the line connection control unit 6 connects the request line to the terminal equipment 1 or common device 2 by setting the VPI/VCI identifying the request line in the terminal equipment 1 or common device 2 through the device management control unit 7 which manages them (S8).

Then, the line connection control unit 6 enters the set line and its available band for the use state table 11 (S9). FIG. 872 shows practical examples of the terminal equipment 1, common device 2, and the use state table 11 in the main storage device 14 in the configuration of the ATM switch. The LLP-A, LLP-B, etc. are line processors, and the SHELF-A1, SHELF-B1, SHELF-B2, etc. are line concentrators. They correspond to the common device 2 shown in FIGS. 866 and 867. T1, T2, etc. are line termination. They correspond to the terminal equipment 1 shown in FIG. 866 or 867. Furthermore, SW is a communications line switch and corresponds to SW3 shown in FIG. 866 or 867.

As shown in the example above, the use state table 11 stores for each line the entries of the use state and available band.

Then, the line connection control unit 6 notifies the service management unit 5 which issued the line connection request of the device number of the terminal equipment 1 or common device 2 for which a line is connected.

Based on the notification, the service management unit 5 enters the identification information (VPI/VCI) of the line used by the subscriber, the device number (point) of the device which processes the line, and the priority/non-priority information (described later) for the management information table 13 in the main storage device 14 managed by the service management unit 5 (S10). FIG. 872 shows an example of the management information table 13.

Furthermore, the service management unit 5 notifies the line connection management unit 9 of the service information managed by the service management unit 5 and the device number of the terminal equipment 1 or common device 2 notified by the line connection control unit 6. According to the notification, the line connection management unit 9 enters the reported services for the device service management table 12 (shown in FIG. 872) in the main storage device 14 identified by the device number (S11).

Described below by referring to the flowchart shown in FIG. 869 is the reporting process performed by the configuration shown in FIG. 866 or 867 when a system failure occurs. In the description, the reference numbers S12-S16 refer to the steps in the flowchart shown in FIG. 869.

First, when the device management control unit 7 receives from the terminal equipment 1 or common device 2 managed by the device management control unit 7 a notification that a failure has been detected (S12), the notification is transferred to the line connection management unit 9.

The line connection management unit 9 confirms the device service management table 12 in the main storage device 14 corresponding to the reported device number and detects the service, on which a failure has been detected, related to the terminal equipment 1 or common device 2 (S13).

As a result, the line connection management unit 9 notifies each service management unit 5 managing each of the detected services of the detection of a failure reported by the device management control unit 7 on the terminal equipment 1 or common device 2 (S14).

After receiving the notification of the detection of the failure from the line connection management unit 9, the service management unit 5 retrieves the identification information (VPI/VCI) of the line using the reported terminal equipment 1 or common device 2 from the management information table 13 (FIG. 872) in the main storage device 14 (S20). The retrieval result is reported to the device management control unit 7 corresponding to the terminal equipment 1 or common device 2 on which the failure has been detected (S15).

The processes in steps S14 and S15 are repeatedly performed on each of the services associated with the terminal equipment 1 or common device 2 on which the failure has been detected by the line connection management unit 9 in S 13.

After receiving the identification information (VPI/VCI) of the line from each of the service management units 5 corresponding to each service related to the terminal equipment 1 or common device 2, the device management control unit 7 edits the information that a failure has been detected in the terminal equipment 1 or common device 2 managed by the device management control unit 7 and the identification information (VPI/VCI) of the line reported by the service management unit 5. The result of the edition is transmitted to an input/output device 10 through the input/output device management unit 8 (S16).

Described below by referring to the flowchart shown in FIGS. 870 and 871 is the automatic line connection switching process performed by the configuration shown in FIG. 866 or 867 when a system failure occurs. In the description, the reference numbers S17-S27 refer to the steps in the flowchart shown in FIG. 870, and the reference numbers S28 and S29 refer to the steps in the flowchart shown in FIG. 871

First, when the device management control unit 7 receives from the terminal equipment 1 or common device 2 managed by the device management control unit 7 a notification that a failure has been detected (S17), the notification is transferred to the line connection management unit 9.

The line connection management unit 9 confirms the device service management table 12 in the main storage device 14 corresponding to the reported device number and detects the service, on which a failure has been detected, related to the terminal equipment 1 or common device 2 (S18).

As a result, the line connection management unit 9 notifies each service management unit 5 managing each of the detected services of the detection of a failure reported by the device management control unit 7 on the terminal equipment 1 or common device 2 (S19).

After receiving the notification of the detection of the failure from the line connection management unit 9, the service management unit 5 first confirms that the terminal equipment 1 and common device 2 are processed in the automatic line connection switching process. As a result, the service management unit 5 retrieves the identification information (VPI/

VCI) of the line which uses the reported terminal-equipment 1 or common device 2 from the management information table 13 (FIG. 872) in the main storage device 14 (S20).

The service management unit 5 notifies the line connection control unit 6 of the detected line connection change request (S21).

The system can be designed such that the service management unit 5 retrieves by priority the data with the priority/non-priority information in the management information table 13 and issues by priority the connection change request of the related line.

Upon receipt of the request, the line connection control unit 6 disconnects the request line from the terminal equipment 1 or common device 2 on which a failure has been detected by deleting the VPI/VCI of the request line from the terminal equipment 1 or terminal equipment 1 through the device management control unit 7 for controlling the terminal equipment 1 or common device 2 on which the failure has been detected. Simultaneously, the line connection control unit 6 deletes the request line and the entry of the available band from the use state table 11 in the main storage device 14. The available band is held as the request band corresponding to the line connection change request. Furthermore, the line connection control unit 6 inquires the device management control unit 7 which manages each of either terminal equipments 1 or common devices 2 of the state of each of other terminal equipments 1 or common devices 2 (S22 and S23).

As a result, when no device management control unit 7 returned an availability state, the above described line connection request is rejected and the line is disconnected.

If any of the device management control units 7 returns an availability state, the line connection control unit 6 compares the request band corresponding to the line connection request with the state of the line (virtual line identified by a VPI/VCI) used by the terminal equipment 1 or common device 2 managed by the device management control unit 7 (S24), and determines whether or not the terminal equipment 1 or common device 2 can accept the line (request line) requesting the above described request band (S25).

If the terminal equipment 1 or common device 2 cannot accept the request line, the line connection request is rejected and the line is disconnected.

If the terminal equipment 1 and common device 2 can accept the above described request line, the line connection control unit 6 connects the request line to the terminal equipment 1 or common device 2 by setting the VPI/VCI identifying the request line in the terminal equipment 1 or common device 2 through the device management control unit 7 which manages them (S26).

Then, the line connection control unit 6 enters the set line and its available band for the use state table 11 (S27).

Next, the line connection control unit 6 notifies the service management unit 5 which issued the line connection request of the device number of the terminal equipment 1 or common device 2 for which a line is connected. Based on the notification, the service management unit 5 retrieves data of the line, for which the connection is changed, in the management information table 13 of the main storage device 14 managed by the service management unit 5, deletes from the data the device number of the terminal equipment 1 or common device 2 on which a failure has occurred, and enters the device number of a new terminal equipment 1 and common device 2 reported by the line connection control unit 6 (S28).

Furthermore, the service management unit 5 notifies the line connection management unit 9 of the service information managed by the service management unit 5 and the device number of the new terminal equipment 1 or common device 2 notified by the line connection control unit 6. According to the notification, the line connection management unit 9 enters the reported services for the device service management table 12 (shown in FIG. 872) in the main storage device 14 identified by the device number (S29). The line connection management unit 9 deletes the entries of the services corresponding to the service management unit 5 which issued the above notification from the device service management table 12 (FIG. 872) in the main storage device 14 for the terminal equipment 1 or common device 2 on which the failure has been detected.

The processes in steps S19 and S29 are repeatedly performed on each of the services associated with the terminal equipment 1 or common device 2 on which the failure has been detected by the line connection management unit 9 in S 18.

Described below is the line connection state output process performed on a specified terminal equipment 1 or common device 2 with the configuration shown in FIG. 866 or 867.

First, the input/output device 10 issues a line connection state output request to the terminal equipment 1 or common device 2.

The line connection state output request is transferred to the subscriber data management unit 4 through the input/output device management unit S. The subscriber data management unit 4 notifies the line connection management unit 9 of the device number of the specified terminal equipment 1 or common device 2.

The line connection management unit 9 detects a service to which the line connection state output request specified terminal equipment 1 or common device 2 is related by confirming the device service management table 12 in the main storage device 14 corresponding to the reported device number.

As a result, the line connection management unit 9 instructs each of the service management units 5 for managing each of the detected services to output a line connection state of the specified terminal equipment 1 or common device 2.

Upon receipt of the instruction, the service management unit 5 retrieves the identification information (VPI/VCI) of the line which uses the specified terminal equipment 1 or common device 2 from the management information table 13 (FIG. 872) in the main storage device 14, and notifies the subscriber data management unit 4 of the retrieval result.

The subscriber data management unit 4 collects the identification information (VPI/VCI) of the line which uses the specified terminal equipment 1 or common device 2 from all service management units 5 related to the line connection state output request. The collection result is output to the input/output device 10 through the input/output device management unit 8.

Described below is the line connection switch process performed on a specified terminal equipment 1 or common device 2 with the configuration shown in FIG. 866 or 867.

First, the input/output device 10 issues a line connection switch request to the terminal equipment 1 or common device 2.

The line connection switch request is transferred to the subscriber data management unit 4 through the input/output device management unit 8. The subscriber data management unit 4 notifies the line connection management unit 9 of the device number of the specified terminal equipment 1 or common device 2.

The subsequent processes are the same as the processes in and after step S18 shown in FIG. 870.

However, if the process of switching to the terminal equipment 1 or common device 2 cannot be successfully performed, the line connection switch request is rejected and the state immediately before the issue of the request is maintained.

According to the embodiment with the configuration shown in FIG. 866 or 867, the terminal equipment 1 or common device 2 can be preliminarily set such that an automatic line connection switch process can be performed when a failure occurs on a device or such that the occurrence of a failure on a device is first reported to the input/output device 10 and, in response to the report, the maintenance staff performs the line connection switch process by specifying the terminal equipment 1 or common device 2 from the input/output device 10.

Described below is another characteristic configuration of the present invention. The configuration corresponds to the 19th object previously described under the title "Problems to be solved by the Invention".

According to the following embodiment, lines are switched successfully in band (VPI/VCI) units when a failure is detected on a line.

According to the embodiment, it is assumed that a layer 1 line failure (physical line failure) or a layer 2 line failure (device failure) has been detected when a remote concentrator is connected to an ATM switch through a plurality of physical lines.

In this case, the communications continue for a non-faulty band (VPI/VCI) in the faulty line. Then, the value of the faulty band in the faulty line is compared with the sum of the idle bands in each of the non-faulty lines.

If the value of the faulty band is equal to or smaller than the sum of the idle bands in each of the non-faulty lines, the band on which a failure has occurred is reassigned to an idle band in a non-faulty line.

If the value of the faulty band is larger than the sum of the idle bands in each of the non-faulty lines, the physical line containing the faulty band is physically switched to a spare line as in the conventional methods.

Described below by referring to the explanatory view in FIG. 873 and the sequence shown in FIG. 874 is the process of reassigning for a faulty band an idle band in a non-faulty line performed when the faulty band value is equal to or smaller than the sum of idle bands in each of the non-faulty lines.

In this example, the communications continue in the non-faulty band (VPI/VCI) of the faulty lines #x and #y as shown in FIG. 873.

Information about the priority level of each band is added to the header of an ATM cell communicated through each band. Each band on which a failure has occurred in the faulty lines #x and #y is reassigned to an idle band in a non-faulty line in order of priority level starting with the band through which the cell assigned the highest priority level is communicated.

A band on which a failure has occurred is not reassigned to a non-faulty band in the faulty lines #x and #y.

FIG. 874 shows a practical sequence of reassigning processes.

That is, a line failure is detected when an ATM cell is communicated between the line termination connected to the ATM switch and the line termination connected to the remote concentrator (S1).

In this case, a line failure is detected for each layer in each Vcc control device (S3) by communicating a failure detection signal, a response signal to the failure detection signal, and a signal relating to a performance monitor between the Vcc control device in the ATM switch and the Vcc control device in the remote concentrator (S2). The Vcc control device controls the VPI/VCI identifying each band (virtual line or a connection) in a physical line.

As a result, each of the bands on which a failure has occurred is reassigned to an idle band in a non-faulty line between the Vcc control device in the ATM switch and the line termination in the ATM switch and between the VCC control device in the remote concentrator and the line termination in the remote concentrator. These reassigning processes are fundamentally the same as shown in S4-S13 in FIG. 874. Therefore, the restrictions are not placed between the ATM switch and remote concentrator hereinafter, but the processes are described as those between the Vcc control device and the line termination.

First, the Vcc control device stops the process of monitoring the occurrence of a failure (S4).

Then, between the Vcc control device and line termination, communications are made to confirm the start of the reassignment process for a faulty band (S5).

The Vcc control device starts buffering the ATM cells input from the line termination to the Vcc control device (S6). In the buffering process, the cells input from the line termination are buffered in the buffer of the Vcc control device according to the priority level as shown in FIG. 877. The information indicating the priority level is added to, for example, a cell loss priority (CLP) bit in the header field of each ATM cell as described above. An ATM cell using the same band is assigned the same priority level information. The buffering process prevents the ATM cell input from the line termination during the reassignment process for a faulty band from being discarded. FIG. 878 shows an example of assigning a priority level.

Next, the Vcc control device checks the faulty bands in the faulty lines and the idle bands in each of the non-faulty lines (S7). As a result, the Vcc control device determines that the value of the faulty bands is equal to or smaller than the sum of the idle bands in each of the non-faulty lines.

Then, the Vcc control device sequentially performs the processes in the following steps S8-S11 on the faulty bands in a faulty line in order of priority level starting with the band through which the information assigned the highest priority level is communicated.

That is, the Vcc control device first deletes the settings of the VPI/VCI for a faulty band on the table of the device (S8).

Next, the Vcc control device resets the VPI/VCI for the idle band in an appropriate non-faulty line (S9).

The Vcc control device sweeps to the line termination the ATM cell buffered in the buffer of the Vcc control device according to the current priority levels (S10), and releases the cell buffering process (S1).

After performing the processes in S8-S11 according to the priority levels, the Vcc control device resumes the process of monitoring the occurrence of failures (S12).

Finally, the communications are made between the Vcc control device and the line termination to confirm the termination of the reassignment process for a faulty band (S13).

According to the above listed sequence, a band on which a failure has occurred is reassigned to an idle band in a non-faulty line when the value of the faulty band is equal to or smaller than the sum of the idle bands in each of the non-faulty lines.

Described below by referring to the explanatory view in FIG. 875 and the sequence shown in FIG. 876 is the process of reassigning for a faulty band an idle band in a non-faulty line performed when the faulty band value is larger than the sum of idle bands in each of the non-faulty lines.

As shown in FIG. 875, each of the bands on which failures have occurred in the faulty line #x is sequentially reassigned to a band which has recovered from a failure in the spare line #z in order of priority level starting with the faulty band in which the ATM cell assigned the highest priority level information is communicated.

FIG. 876 shows a practical sequence.

First, the processes in S1-S6 shown in FIG. 876 are the same as those in S1-S6 shown in FIG. 874.

After the processes in S1-S6, the Vcc control device checks the faulty bands in the faulty lines and the idle bands in each of the non-faulty lines (S7). As a result, the Vcc control device determines that the value of the faulty bands is equal to or smaller than the sum of the idle bands in each of the non-faulty lines.

Then, the Vcc control device sequentially performs the processes in the following steps S8-S11 on the faulty bands in a faulty line in order of priority level starting with the band through which the information assigned the highest priority level is communicated.

That is, the Vcc control device first deletes the settings of the VPI/VCI for a faulty band on the table of the device (S8).

Next, the Vcc control device resets on the table of the device the VPI/VCI for the idle band in a spare line (S9).

The Vcc control device sweeps to the line termination the ATM cell buffered in the buffer of the Vcc control device according to the current priority levels (S10), and releases the cell buffering process (S11).

After performing the processes in S8-S11 according to the priority levels, the Vcc control device resumes the process of monitoring the occurrence of failures (S12).

Finally, the communications are made between the Vcc control device and the line termination to confirm the termination of the switch from the faulty line to the spare line (S13).

According to the above listed sequence, the faulty lines are switched to the spare lines when the value of the faulty band is larger than the sum of the idle bands in each of the non-faulty lines.

According to the above described embodiment, each of the processes of reassigning a band or switching lines is sequentially performed in order from the highest priority level of the band. However, the processes can be performed in order of service of each band.

Described below is another characteristic configuration of the present invention. The configuration corresponds to the 20th object previously described under the title "Problems to be solved by the Invention".

In the embodiment described below, it is assumed that a line failure has been detected when a remote concentrator is connected to a host switch (ATM switch) through a plurality of physical lines as in the above described embodiment. A practical technology is provided to switch lines in the event of the line failure.

FIG. 879 shows the configuration of the system in which a remote concentrator 1 is connected to a host switch 2 as the basic components of the present embodiment. The remote concentrator 1 is equipped with a plurality of microprocessors (up) 4. Controlling the microprocessor 4 by a call processor (CPR) 3 in the host switch 2 allows the path from the subscriber accommodated by the remote concentrator 1 to the host switch 2 and the path from the host switch 2 to the subscriber accommodated by the remote concentrator 1 to be properly controlled.

FIG. 880 shows the common principle of the ATM switch system related to the present embodiment. A virtual path identifier (VPI) and a virtual channel identifier (VCI) which identify the virtual line through which an ATM cell is transmitted are added to the header of the ATM cell. An input multiplexing unit (MUX) 5 has a VCC table 7 on which its contents are set by a microprocessor (μP) 6. When an ATM cell having VPI=AA and VCI=BB is input to the MUX 5, the MUX 5 retrieves VPI=XX and VCI=YY at the output terminal and a self-routing tag #4 by retrieving the address (AA.+BB.) corresponding to the above described VPI=AA and VCI=BB, Then, it converts the VPI and VCI of the ATM cell into XX and YY, adds the tag #4 to the head of the ATM cell, and transfers the ATM cell to a switch unit 8. The hardware switch in the switch unit 8 autonomously switches the ATM cell according to the tag 14 added to the head of the transferred cell and outputs the ATM cell to the route #4 at the output terminal. The MUX unit at the next stage not shown in FIG. 880 performs the similar switching operation according to the VPI=XX and VCI=YY added to the ATM cell.

FIG. 881 shows the position where the VCC table is accommodated for use by the upward path from the remote concentrator 1 to the host switch 2 in the system in which the remote concentrator 1 is connected to the host switch 2 (HOST 2) shown in FIG. 879. The first upward VCC table is provided in the MUX (multiplexing device) in the remote concentrator 1 for multiplexing the ATM cell from the subscriber accommodated by the remote concentrator 1. The second upward VCC table is provided in the MUX of the host switch 2 for multiplexing the ATM cell from the remote concentrator 1. For example, the VPI and VCI of the ATM cell of the subscriber input from the #a line accommodated by the remote concentrator 1 are converted into the values AAAA and BBBB for the route #1 from the remote concentrator 1 to the host switch 2 according to the principle as shown in FIG. 880 and first upward VCC table. The tag #1 for the route #1 is added to the head of the ATM cell. As a result, the ATM cell is output to the route #1 from the remote concentrator 1 to the host switch 2. Next, the VPI and VCI of the ATM cell input from the route #1 to the host switch 2 are converted into the values XXXX and YYYY for the route #A output from the host switch 2 according to the second upward VCC table. The tag #A for route #A is added to the head of the ATM cell. As a result, the ATM cell is switched in the host switch 2 and output to the route #A.

FIG. 882 shows the position where the VCC table is accommodated for use by the downward path from the host switch 2 (HOST 2) to the remote concentrator 1 in the system in which the remote concentrator 1 is connected to the host switch 2 (HOST 2) shown in FIG. 879. The first downward VCC table is provided in the MUX (multiplexing device) in the host switch 2 for multiplexing the ATM cell from another host switch connected to the HOST 2 or the subscriber. The second downward VCC table is provided in the MUX of the remote concentrator 1 for multiplexing the ATM cell from the host switch 2. For example, the VPI and VCI of the ATM cell input from the other host switch or subscriber are converted into the values AAAA and BBBB for the route #1 from the host switch 2 to the remote concentrator 1 according to the principle as shown in FIG. 880 and first downward VCC table. The tag #1 for the route 41 is added to the head of the ATM cell. As a result, the ATM cell is output to the route #1 from the host switch 2 to the remote concentrator 1. Next, the VPI and VCI of the ATM cell input from the route #1 to the remote concentrator 1 are converted into the values XXXX and YYYY for the route #a output from the remote concentrator 1 according to the second downward VCC table. The tag #a for route #a is added to the head of the ATM cell. As a result, the ATM cell is output from the remote concentrator 1 to the route #a.

FIGS. 883 through 885 show the first process example of reassigning a path when a failure occurs according to the embodiment based on the configuration shown in FIGS. 879, 881, and 882.

FIG. 883 is a flowchart showing the path connecting operations performed by the call processor 3 in the host switch 2, the microprocessor 4 in the remote concentrator 1, and the microprocessor not shown in FIG. 883.

When a request is issued to connect a bus between the remote concentrator 1 and host switch 2 (yes in determination in S1), the bands of a normal route and a spare route, and a VPI and VCI are reserved for each of the first upward VCC table, second upward VCC table, first downward table, and second downward table (S2). Simultaneously, normal VCC data and reassignment VCC data shown in FIG. 884 are generated. The normal VCC data is transmitted through the normal route and the reassignment VCC data is transmitted through the spare route. A set of the normal and reassignment VCC data is generated for each of the first upward VCC table, second upward VCC table, first downward table, and second downward table.

Then, only the corresponding normal VCC data is set in the first upward VCC table and the first downward VCC table while the corresponding normal VCC data and reassignment VCC data are set in the second upward VCC table and second downward VCC table (S3).

As a result, ATM cells are transmitted through the normal route according to the normal VCC data when no error occurs. Unless an ATM cell flows from the route for the reassignment VCC data from the remote concentrator 1 to the host switch 2 with the VPI/VCI set corresponding to the route, the reassignment VCC data on the second upward VCC table is not referred to. Therefore, there are no problems if the reassignment VCC data is preliminarily set on the second upward VCC table. Likewise, unless an ATM cell flows from the route for the reassignment VCC data from the host switch 2 to the remote concentrator 1 with the VPI/VCI set corresponding to the route, the reassignment VCC data on the second downward VCC table is not referred to. Therefore, there are no problems if the reassignment vCC data is preliminarily set on the second downward VCC table.

FIG. 885 is a flowchart showing the path reassigning operations performed when a failure occurs by the call processor 3 in the host switch 2, the microprocessor 4 in the remote concentrator 1, and the microprocessor not shown in FIG. 883.

First, a route (transmission line) in which a failure occurs is specified, and the path which uses the faulty route is extracted as a path to be reassigned (S4). In this process, tag information corresponding to the faulty route is detected in each VCC table, and the address (input VPI/VCI) at which the tag information is set is extracted.

Then, for all paths to be reassigned, corresponding reassignment VCC data (FIG. 884) is set on the first upward VCC table and a clock VCC table 7.

As a result, the faulty route is disconnected and an ATM cell is transmitted through a spare route according to the reassignment VCC data. At this time, an ATM cell flows from the route for the reassignment VCC data from the remote concentrator 1 to the host switch 2 with the VPI/VCI set corresponding to the route, and the reassignment VCC data preliminarily-set on the second upward VCC table is referred to. Likewise, an ATM cell flows from the route for the reassignment VCC data from the host switch 2 to the remote concentrator 1 with the VPI/VCI set corresponding to the route, and the reassignment VCC data preliminarily set on the second downward VCC table is referred to.

FIGS. 886 through 889 show the second process example of reassigning a path when a failure occurs according to the embodiment based on the configuration shown in FIGS. 879, 881, and 882.

According to the above described first process example, only the corresponding normal VCC data is set in the first upward VCC table and the first downward VCC table while the corresponding normal VCC data and reassignment VCC data are set in the second upward VCC table and second downward VCC table. According to the second process example, the corresponding normal VCC data and reassignment VCC data are set also in the first upward VCC table and the first downward VCC table. Simultaneously, a select bit indicating the data referred to at the address as the normal VCC data or assignment VCC data is added to each address on the first upward VCC table and the first downward VCC table.

FIG. 886 shows the contents of the first upward VCC table and the second upward VCC table when no failure occurs.

Since the value of the select bit corresponding to the #a line is 0 on the first upward VCC table, the normal VCC data is referred to as VCC data. Therefore, the VPI and VCI of an ATM cell from the subscriber input through the #a line accommodated in the remote concentrator 1 are converted into the values AAAA and BBBB of the route #1 from the remote concentrator 1 to the host switch 2 according to the principle shown in FIG. 880. The tag #1 for the route #1 is added to the head of the ATM cell. As a result, the ATM cell is output to the route #1 from the remote concentrator 1 to the host switch 2.

At address AA.+BB on the second upward VCC table, the normal VCC data is stored for use when the ATM cell having VPI=AA and VCI=BB is received through the route #1. At address CC.+DD on the second upward vcc table, the assignment VCC data is stored for use when the ATM cell having VPI=CC and VCI=DD is received through the route #4. VPI=AAAA and VCI=BBBB added to the ATM cell input to the host switch 2 through the route #1 are converted into XXXX and YYYY for the route #A output from the host switch 2 by the normal VCC data stored at address AA.+BB on the second upward VCC table. The tag #A for the route #A is added to the head of the ATM cell. As a result, the ATM cell is switched in the host switch Z and output to the route #A. Since no ATM cells are received from the spare route #4 from the remote concentrator 1 to the host switch 2, the assignment VCC data is not referred to.

When a failure has occurred, a path can be reassigned as shown in FIG. 887 only by changing the value of the select bit corresponding to the #a line, that is, the path in the faulty route on the first upward VCC table from 0 to 1.

Since the value of the select bit corresponding to the #a line is 1 on the first upward VCC table, the reassignment VCC data is referred to as VCC data. Therefore, the VPI and VCI of an ATM cell from the subscriber input through the #a line accommodated in the remote concentrator 1 are converted into the values CCCC and DDDD of the route #4 from the remote concentrator 1 to the host switch 2 by the corresponding assignment VCC data on the first upward VCC table according to the principle shown in FIG. 880. The tag #4 for the route #4 is added to the head of the ATM cell. As a result, the ATM cell is output to the route #4 from the remote concentrator 1 to the host switch 2.

VPI=CCCC and VCI=DDDD added to the ATM cell input to the host switch 2 through the route #4 are converted into XXXX and YYYY for the route #A output from the host switch 2 by the assignment VCC data stored at address CC.+DD on the second upward VCC table. The tag #A for the route

#A is added to the head of the ATM cell. As a result, the ATM cell is switched in the host switch 2 and output to the route #A.

FIG. 888 shows the contents of the first downward VCC table and the second downward VCC table when no failure occurs.

Since the value of the select bit is 0 on the first downward VCC table, the normal VCC data is referred to as VCC data. Therefore, the VPI and VCI of an ATM cell from another host switch or the subscriber are converted by the corresponding normal VCC data in the first downward VCC table into the values AAAA and BBBB of the route #1 from the host switch 2 to the remote concentrator 1 according to the principle shown in FIG. 880. The tag #1 for the route #1 is added to the head of the ATM cell. As a result, the ATM cell is output to the route #1 from the host switch 2 to the remote concentrator 1.

At address AA.+BB on the second downward VCC table, the normal VCC data is stored for use when the ATM cell having VPI=AA and VCI=BB is received through the route #1. At address CC.+DD on the second upward VCC table, the assignment VCC data is stored for use when the ATM cell having VPI=CC and VCI=DD is received through the route #4. VPI=AAAA and VCI=BBBB added to the ATM cell input to the remote concentrator 1 through the route #1 are converted into XXXX and YYYY for the route #A output from the remote concentrator 1 by the normal VCC data stored at address AA.+BB on the second downward VCC table. The tag #a for the route #a is added to the head of the ATM cell. As a result, the ATM cell is output from the remote concentrator 1 to the route #a. Since no ATM cells are received from the spare route #4 from the host switch 2 to the remote concentrator 1, the assignment VCC data is not referred to.

When a failure has occurred, a path can be reassigned as shown in FIG. 889 only by changing the value of the select bit corresponding to the path on the faulty route on the first downward VCC table from 0 to 1.

As a result, the assignment VCC data is referred to as VCC data corresponding to the path contained in the faulty route on the first downward VCC table. Therefore, the VPI and VCI of an ATM cell from another host switch or the subscriber are converted into the values CCCC and DDDD of the route #4 from the host switch 2 to the remote concentrator 1 by the corresponding assignment VCC data on the first downward VCC table according to the principle shown in FIG. 880. The tag #4 for the route #4 is added to the head of the ATM cell. As a result, the ATM cell is output to the route #4 from the host switch 2 to the remote concentrator 1.

VPI=CCCC and VCI=DDDD added to the ATM cell input to the host switch 2 through the route #4 are converted into XXXX and YYYY for the route #a output from the remote concentrator 1 by the assignment VCC data stored at address CC.+DD on the second downward VCC table. The tag #a for the route #a is added to the head of the ATM cell. As a result, the ATM cell is output from the remote concentrator 1 to the route #a.

FIGS. 890 through 893 show the third process example of reassigning a path when a failure occurs according to the embodiment based on the configuration shown in FIGS. 879, 881, and 882.

In this process example, the configuration shown in FIGS. 879, 881, and 882 is designed, for example, as shown in FIG. 890, to comprise a protection line (P-line) which is a spare route exclusively for use in the event of a failure. In this example, the second upward VCC table and second downward VCC table are divided for a normal route and a protection line respectively as shown in FIGS. 890 through 893, and controlled by separate microprocessors 4 (FIG. 879).

The contents of the first upward VCC table and second upward VCC table when no failure is detected are, for example, shown in FIG. 890. That is, the contents of the first upward VCC table and second upward VCC table for the normal route are the same as those shown in FIG. 881, and the second upward VCC table is blank.

As a result, the upward routing when no failure is detected is the same as that shown in FIG. 881.

If a failure has occurred, the contents of the tag for the ra line which is the path on the faulty route on the first upward VCC table are converted from the value #1 for the route #1 into the value #4 for the route #4 which is a protection line as shown in FIG. 891. Then, the VCC data for the path on the faulty route on the second upward VCC table for a normal route is copied to the second upward VCC table for a protection line. Thus, the path reassigning process can be completed.

As a result, the VPI and VCI of an ATM cell of the subscriber input through the #a line accommodated by the remote concentrator 1 are converted into the values AAAA and BBBB by the corresponding VCC data on the first upward VCC table according to the principle shown in FIG. 880. The tag #4 for the route #4, which is a protection line, is added to the head of the ATM cell. Accordingly, the ATM cell is output to the route #4, that is, the protection line from the remote concentrator 1 to the host switch 2.

VPI=AAAA and VCI=BBBB added to the ATM cell input from the route #4, that is, a protection line, to the host switch 2 are converted into the values XXXX and YYYY for the route #A output from the host switch 2 by the vCC data stored at address AA.+BB on the second upward VCC table for a protection line. The tag #A for the route #A is added to the head of the ATM cell. As a result, the ATM cell is switched in the host switch 2 and output to the route #A.

The contents of the first downward VCC table and second downward VCC table when no failure is detected are, for example, shown in FIG. 892. That is, the contents of the first downward vcc table and second downward VCC table for the normal route are the same as those shown in FIG. 882, and-the second downward VCC table is blank.

As a result, the downward routing when no failure is detected is the same as that shown in FIG. 882.

If a failure has occurred, the contents of the tag for the path on the faulty route on the first downward VCC table are converted from the value #1 for the route #1 into the value #4 for the route #4 which is a protection line as shown in FIG. 893. Then, the VCC data for the path on the faulty route on the second downward VCC table for a normal route is copied to the second downward VCC table for a protection line. Thus, the path reassigning process can be completed.

As a result, the VPI/VCI of the ATM cell input from another host switch or subscriber are converted into the values AAAA and BBBB by the corresponding VCC data on the first downward VCC table according to the principle shown in FIG. 880. The tag #4 for the route #4, which is a protection line, is added to the head of the ATM cell. Accordingly, the ATM cell is output to the route #4, that is, the protection line from the host switch 2 to the remote concentrator 1.

VPI=AAAA and VCI=BBBB added to the ATM cell input from the route #4, that is, a protection line, to the remote concentrator 1 are converted into the values XXXX and YYYY for the route #a output from the remote concentrator 1 by the VCC data stored at address AA.+BB on the second downward VCC table for a protection line. The tag #a for the route #a is added to the head of the ATM cell. As a result, the ATM cell is output from the remote concentrator to the route #a.

According to the above described embodiment, each of the second upward VCC table and second downward VCC table is divided for use with the normal route and protection line and controlled by a separate microcomputer. However, the VCC table for the normal route and the VCC table for the protection line can be controlled by a single microcomputer to realize the above described function.

Unlike the above described embodiment in which the contents of the tag for the path on the faulty route of the first upward VCC table or the first downward VCC table are rewritten, the ATM cell to which a tag for the faulty route is added can be designed to be output to the route functioning as protection line in hardware.

According to the above described embodiment, a path can be correctly reassigned in a short time when a failure occurs by preliminarily setting a path for a spare route in addition to the normal route when a path is connected between the remote concentrator 1 and host switch (HOST) 2.

Described below is another characteristic configuration of the present invention. The configuration corresponds to the 21st object previously described under the title "Problems to be solved by the Invention".

An intra-station device such as a VCC control device, etc. comprising a microprocessor containing the VCC table shown in FIG. 880 should be normally duplexed to guarantee the reliability in communications. When a failure occurs in the intra-station device of the active system, various communications control data set in the device are transferred to the inter-station device of the spare system. Then, the operations of the intra-station device which has been a device in the active system are stopped and simultaneously the operations of the intra-station device which has been a device in the spare system are started as a device in a new active system. In the above described example of the VCC control device, the contents of the VCC table contained therein should be transferred to the VCC control device of the spare system.

Described below is an embodiment of the transfer process correctly and quickly.

FIG. 894 shows the configuration of the embodiment of the VCC control device having the above described high-speed table data tansferring function.

In FIG. 894, a cell header address conversion circuit 1 converts a cell header of m-bit x n-word size into a size of m×n bit=1 word.

A VCC table 2 stores a new cell header comprising an output VPI/VCI and a tag at each address for the input VPI/VCI of the cell header of each input cell as described by referring to FIG. 880. If parallel data is input from the cell header address conversion circuit 1, the VCC table 2 outputs a new cell header for the parallel data.

A various timing generation circuit 3 controls various access to the VCC table 2 when a cell is input, data is read/written by a microprocessor, a table is initialized, or data is copied between systems, etc.

A delay circuit 4 delays the transfer of input cell data by the process time required for the reassignment of the cell header of the input cell data.

A cell header insertion control circuit 6 converts the cell header of cell data input from the destination terminal into a new cell header output from the VCC table 2.

An inter-system copy control circuit 5 controls a process of copying table data of the VCC table 2 in the VCC control device of the system (active system) containing the inter-system copy control circuit 5 to the VCC table 2 in the VCC control device of another system (spare system).

A table data setting circuit 7 controls processes of reading and writing table data from the microprocessor (for example, the microprocessor 46 shown in FIG. 880) not shown in the attached drawings to the VCC table 2.

First, the input cell data is input at a timing shown in FIG. 895A.

The cell header address conversion circuit 1 outputs the cell header in the input cell data as parallel data of m×n bits=1 word at a timing shown in FIG. 895B.

The parallel data is input to the VCC table 2 according to the timing data output by the various timing generation circuit 3 at the timing shown in FIG. 895C. The VCC table 2 outputs a new cell header at the timing shown in FIG. 895D.

The new header is latched in the cell header insertion control circuit 6 at the timing shown in FIG. 895E.

The input cell passing through the cell header address conversion circuit 1 is delayed in the delay circuit 4 and input to the cell header insertion control circuit 6 at the timing shown in FIG. 895F, that is, the timing shown in FIG. 895E.

The cell header insertion control circuit 6 converts the cell header of the cell input through the delay circuit 4 into a new cell header output from the VCC table 2 and outputs a new output cell header to the ATM switch not shown in the figures at the timing shown in FIG. 895G.

FIG. 896A shows the timing of accessing the VCC table by the microprocessor.

The address data for use in accessing the VCC table 2 is set by the microprocessor at the table data setting circuit 7 as the VCC table setting data at the timing shown in FIG. 896A(a).

Based on the data, the various timing generation circuit 3 outputs the access timing data through the delay circuit 4 different from the access timing data through an input cell output at the timing shown in FIG. 896A(b) to the VCC table 2 at the timing shown in FIG. 896A(c). Synchronously, the table data setting circuit 7 outputs address data to the VCC table 2 at the timing shown in FIG. 896A(d).

The table data setting circuit 7 writes the table data transferred from the microprocessor to the VCC table 2 at the timing shown in FIG. 896A(e), reads the table data from the VCC table 2, and transfers the data to the microprocessor.

FIG. 896B shows the timing of copying VCC table data between systems.

If the inter-system copying is carried out, the various timing generation circuit 3 outputs the inter-system copy timing data different from the access timing data through an input cell and the access timing data through the microprocessor output at the timing shown in FIG. 896B(a) and (b) to the VCC table 2 at the timing shown in FIG. 896B(c). Synchronously, the inter-system copy control circuit 5 outputs address data to the VCC table 2 at the timing shown in FIG. 896B(d).

As a result, the table data is output from the VCC table 2 to the inter-system copy control circuit 5 at the timing shown in FIG. 896B(e).

The inter-system copy control circuit 5 latches the table data output from the VCC table 2, converts the table data into serial data, and outputs the serial data to the VCC control device in another device in synchronism with the clock of the home system generated by the VCC control device in the home system in which the inter-system copy control circuit 5 is built.

The inter-system copy control circuit 5 in the VCC control device of the mate system not shown in the attached drawings latches the serial data, converts the data into parallel data in synchronism with the clock of the mate system generated by the VCC control device of the mate system, and writes the parallel data to the VCC table 2 of the VCC control device of the mate system.

In the configuration of the above described embodiment, the inter-system copy control circuit 5 preliminarily stores a series of address data for the VCC table 2 from the microprocessor 4, and sequentially designates the data for the VCC table 2 when the inter-system copy is carried out.

The table data of the VCC table 2 output from the inter-system copy control circuit 5 of the home system to the inter-system copy control circuit 5 of the mate system can be parallel data, not serial data.

When the table data is output from the inter-system copy control circuit 5 of the home system to the inter-system copy control circuit 5 of the mate system, the inter-system copy control circuit 5 of the mate system can easily receive the table data according to the unique clock by adding to the table data the data indicating the start and end of the table data.

When the table data is output from the inter-system copy control circuit 5 of the home system to the inter-system copy control circuit 5 of the mate system, the inter-system copy control circuit 5 of the mate system can detect and correct errors on the received table data by adding to the table data a parity bit.

As described above, the hardware table having message identifiers MID as keys according to the present invention allows the routing process to be performed in L2-PDU units using a microcomputer program independent of the hardware without analyzing the L3-PDU. Since it is not necessary to assemble the L3-PDU from the L2-PDU in the routing process, the capacity of the hardware for storing a lot of L2-PDUs can be successfully reduced. Furthermore, applying the above described system to error log collection according to the present invention-logs errors related to the L3-PDU in the L2-PDU process. The subscriber can be informed of various transmission quality information (network quality information such as the normality of the transmission line, transmission delay time, etc. between a subscriber terminal unit and an intra-network switch node). The subscriber also evaluate the factor of the deteriorated quality of the entire system from the transmission lines to the terminal units. The procedure is also effective in a packet continuity test performed by a craftsman when a new subscriber is entered or a customer claim is processed.

In the PVC test according to the present invention, the function of generating and checking test data are provided only in the connectionless communications server, thereby realizing the system at a lower cost. The verification of the PVC improves the reliability of the system, and the algorithm of the present invention shortens the time required to correct errors.

In the SMDS data normality check system according to the present invention, the process is performed for each L2-PDU, and the hardware configuration for making the check can he simplified, thereby considerably reducing the cost. Furthermore, since the data is transmitted to and from the servers for the connectionless process through a private line (highway bus) without performing a switching process at a switch, the band resource for the switch can be effectively used and the resource management involved can be simplified. Thus, the switch can be largely improved in performance.

According to the present invention, only a specific intra-station device has to be connected to the system bus, which simplifies the wiring in the station and is effective in reducing the cost. Furthermore, reducing the number of devices connected to the system bus also reduces the conflicts for the acquisition of a bus access right, thereby reducing the load on the buss access. A remote device can be controlled by the LAP to maintain the transmission quality and easily recover from a transmission error, even if it occurs, under the error control process. Thus, the intra-station devices can be stably controlled to improve the system performance of the ATM switching system.

Taking full advantage of the features of the ATM allows the terminal units in the network to be controlled and managed using a simple interface and communications format. The in-slot system through a data highway enables the control information to be transmitted at a high speed.

The present invention realizes an efficient test within a short time by performing a test cell loopback check, which has been made in a test device, through a test program in the switch. Additionally, transmitting cell data from a test device requires no testing units because the loopback jig can replace the testing units.

According to the present invention, no test environment should be set (setting testing devices, setting an operator in a standby state, etc.), and the test can be conducted by a simple method of inputting a command, thereby conducting an inter-station test among a plurality of stations. A fault is detected at its earliest stage, and the services and reliability of the ATM switch can be greatly improved.

According to the present invention, cells in the high-speed highway in the ATM, etc. can be counted with a small-scale hardware. The features, performances, and operation states of the ATM switches, etc. can be determined effectively.

The present invention also determines the pattern transmission rules and simplifies the operations and the circuit configuration for realizing the operations.

In addition to the above listed effects, the present invention successfully reduces the difference in the number of transmission frames.

The present invention can provide a point-to-multipoint connection ability with which the size of a switching system can be reduced and the system can be easily extended at a lower cost.

The present invention also provides the point-to-multipoint connection ability without additionally providing a device external to the switch.

The present invention provides a multicast connection efficiently using the hardware resources.

Furthermore, the present invention provides call processing capabilities of a multi-terminal connection service such as three-subscriber communications using image data in a broadband communications network.

The present invention also collects information about the lines processed by an intra-switch device and realizes a correct switch of intra-switch devices in the event of a failure.

When a failure is detected on a line, the present invention correctly switches the line in band (VPI/VCI) units.

When a failure is detected on a line and the lines are switched in band (VPI/VCI) units, the present invention can provide a practical technology for switching the lines with the configuration comprising a remote concentrator and ATM exchange.

Furthermore, the present invention correctly and quickly transfers various communications control data set in an intra-station device of an active system to the intra-station device of a spare system.

What is claimed is:

1. A switch station, comprising:

a switch exchanging an ATM cell;

a memory storing control data to control operations of the switch station;

an intra-station device, accommodating a subscriber line, performing a communication operation on a subscriber ATM cell that is transmitted to or received from the subscriber line;

a control processor generating control information in a link access protocol (LAP) frame data format, which cannot be exchanged by said switch; and an interface unit converting the data format of the generated control information into the data format of the ATM cell to transmit the control information to the intra-station device through the switch, wherein the control information is communicated according to link access protocol, the intra-station device, upon receiving the control information from the control processor, transmits a direct memory access request to the interface unit to obtain control data stored in the memory, said interface unit obtains the control data from the memory according to the direct memory access request, and converts the data format of the control data into the data format of the ATM cell to transmit the control data to the intra-station device through the switch, and the intra-station device performs the communication operation on the subscriber ATM cell based on the control data received through the switch.

2. The switch station according to claim 1, wherein said intra-station device comprises identifying means for identifying whether received data is subscriber data or the control information; and said intra-station device transmits the received data after adding routing information, when said identifying means has received the subscribed data, to received subscriber data to be routed to a destination, and after adding the routing iformation, when said identifying means has received the control information, to received control information to be routed to said interface unit of the switch station.

* * * * *